US011535781B2

(12) United States Patent
Kumakura et al.

(10) Patent No.: US 11,535,781 B2
(45) Date of Patent: Dec. 27, 2022

(54) REFRIGERATION CYCLE APPARATUS

(71) Applicant: DAIKIN INDUSTRIES, LTD., Osaka (JP)

(72) Inventors: Eiji Kumakura, Osaka (JP); Takuro Yamada, Osaka (JP); Atsushi Yoshimi, Osaka (JP); Ikuhiro Iwata, Osaka (JP); Mitsushi Itano, Osaka (JP); Daisuke Karube, Osaka (JP); Yuuki Yotsumoto, Osaka (JP); Kazuhiro Takahashi, Osaka (JP); Tatsuya Takakuwa, Osaka (JP); Yuzo Komatsu, Osaka (JP); Shun Ohkubo, Osaka (JP); Keisuke Ohtsuka, Osaka (JP); Yoshinari Asano, Osaka (JP); Keiji Aota, Osaka (JP); Yuuichi Yanagi, Osaka (JP); Yoshikazu Nakao, Osaka (JP); Takeo Abe, Osaka (JP); Yumi Toda, Osaka (JP); Tetsushi Tsuda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/955,565

(22) PCT Filed: Dec. 18, 2018

(86) PCT No.: PCT/JP2018/046666

§ 371 (c)(1),
(2) Date: Jun. 18, 2020

(87) PCT Pub. No.: WO2019/124409

PCT Pub. Date: Jun. 27, 2019

(65) Prior Publication Data

US 2020/0332166 A1 Oct. 22, 2020

(30) Foreign Application Priority Data

Dec. 18, 2017 (JP) ............................ JP2017-242183
Dec. 18, 2017 (JP) ............................ JP2017-242185
(Continued)

(51) Int. Cl.
*C09K 5/04* (2006.01)
*F25B 13/00* (2006.01)
(Continued)

(52) U.S. Cl.
CPC ............ *C09K 5/045* (2013.01); *F24F 1/0059* (2013.01); *F24F 1/0063* (2019.02);
(Continued)

(58) Field of Classification Search
CPC .. F25B 13/00; F25B 21/00; F25B 1/00; F25B 9/006; F25B 39/00; F25B 29/00;
(Continued)

(56) References Cited

U.S. PATENT DOCUMENTS 5,185,092 A 2/1993 Fukuda et al.
5,344,069 A 9/1994 Narikiyo
(Continued)

FOREIGN PATENT DOCUMENTS

AU 2001284508 3/2002
CN 1288132 3/2001
(Continued)

OTHER PUBLICATIONS

International Search Report dated Mar. 19, 2019 in International Application No. PCT/JP2018/046531.
(Continued)

*Primary Examiner* — Kun Kai Ma
(74) *Attorney, Agent, or Firm* — Wenderoth, Lind & Ponack, L.L.P.

(57) ABSTRACT

A refrigeration cycle apparatus (1) is capable of performing a refrigeration cycle using a small-GWP refrigerant. The
(Continued)

refrigeration cycle apparatus (1) includes a refrigerant circuit (10) and a refrigerant enclosed in the refrigerant circuit (10). The refrigerant circuit includes a compressor (21), a condenser (23), a decompressing section (24), and an evaporator (31). The refrigerant contains at least 1,2-difluoroethylene.

13 Claims, 219 Drawing Sheets

(30) Foreign Application Priority Data

Dec. 18, 2017 (JP) ............................ JP2017-242186
Dec. 18, 2017 (JP) ............................ JP2017-242187

(51) Int. Cl.

| | |
|---|---|
| ***F25B 29/00*** | (2006.01) |
| ***F25B 31/00*** | (2006.01) |
| ***F25B 49/02*** | (2006.01) |
| ***F24H 4/02*** | (2022.01) |
| ***F25B 41/00*** | (2021.01) |
| ***F24F 1/0059*** | (2019.01) |
| ***F24F 1/24*** | (2011.01) |
| ***F24F 13/30*** | (2006.01) |
| ***F24F 1/0067*** | (2019.01) |
| ***F24F 1/0063*** | (2019.01) |
| ***F24F 3/052*** | (2006.01) |
| ***F25B 7/00*** | (2006.01) |
| ***F25B 39/00*** | (2006.01) |
| ***F25B 39/02*** | (2006.01) |
| ***F24F 1/14*** | (2011.01) |
| ***F24F 1/32*** | (2011.01) |
| ***F24F 1/34*** | (2011.01) |
| ***F24F 1/38*** | (2011.01) |
| ***F25B 9/00*** | (2006.01) |
| ***F25B 1/00*** | (2006.01) |
| ***F25B 31/02*** | (2006.01) |
| ***F24F 5/00*** | (2006.01) |
| ***F24F 11/88*** | (2018.01) |
| ***F25B 1/04*** | (2006.01) |
| ***F24H 1/00*** | (2022.01) |
| ***F25B 21/00*** | (2006.01) |
| ***F25B 41/34*** | (2021.01) |
| *H02K 7/14* | (2006.01) |

(52) U.S. Cl.

CPC .............. *F24F 1/0067* (2019.02); *F24F 1/14* (2013.01); *F24F 1/24* (2013.01); *F24F 1/32* (2013.01); *F24F 1/34* (2013.01); *F24F 1/38* (2013.01); *F24F 3/052* (2013.01); *F24F 5/001* (2013.01); *F24F 11/88* (2018.01); *F24F 13/30* (2013.01); *F24H 1/0018* (2013.01); *F24H 4/02* (2013.01); *F25B 1/00* (2013.01); *F25B 1/04* (2013.01); *F25B 7/00* (2013.01); *F25B 9/002* (2013.01); *F25B 9/006* (2013.01); *F25B 13/00* (2013.01); *F25B 21/00* (2013.01); *F25B 29/003* (2013.01); *F25B 31/002* (2013.01); *F25B 31/006* (2013.01); *F25B 31/026* (2013.01); *F25B 39/00* (2013.01); *F25B 39/028* (2013.01); *F25B 41/00* (2013.01); *F25B 41/34* (2021.01); *F25B 49/02* (2013.01); *F25B 49/022* (2013.01); *C09K 2205/106* (2013.01); *C09K 2205/122* (2013.01); *C09K 2205/126* (2013.01); *C09K 2205/128* (2013.01); *C09K 2205/22* (2013.01); *C09K 2205/24* (2013.01); *C09K 2205/43* (2013.01); *F25B 2313/0233* (2013.01); *F25B 2400/07* (2013.01); *F25B 2400/121* (2013.01); *F25B 2500/05* (2013.01); *F25B 2500/07* (2013.01); *F25B 2600/05* (2013.01); *F25B 2600/2513* (2013.01); *F25B 2700/04* (2013.01); *F25B 2700/1931* (2013.01); *H02K 7/14* (2013.01)

(58) Field of Classification Search

CPC .......... C09K 2205/128; C09K 2205/43; C09K 2205/106; C09K 2205/122; C09K 2205/24; C09K 2205/126; C09K 2205/22

See application file for complete search history.

(56) References Cited

U.S. PATENT DOCUMENTS

| | | | | |
|---|---|---|---|---|
| 5,851,968 | A | 12/1998 | Schnur | |
| 6,591,631 | B1 | 7/2003 | Taira | |
| 6,667,285 | B1 | 12/2003 | Kawahara et al. | |
| 8,358,040 | B2 | 1/2013 | Komuro et al. | |
| 10,131,827 | B2 | 11/2018 | Fukushima et al. | |
| 10,883,745 | B2 | 1/2021 | Higashiiue et al. | |
| 2002/0140309 | A1 | 10/2002 | Yanashima et al. | |
| 2002/0193262 | A1 | 12/2002 | Kaimai et al. | |
| 2004/0011062 | A1 | 1/2004 | Taira | |
| 2006/0000224 | A1 | 1/2006 | Matsuoka | |
| 2007/0209373 | A1 | 9/2007 | Taira et al. | |
| 2008/0184723 | A1 | 8/2008 | Sato et al. | |
| 2008/0184731 | A1 | 8/2008 | Sienel et al. | |
| 2008/0188173 | A1 | 8/2008 | Chen et al. | |
| 2009/0260382 | A1 | 10/2009 | Takeichi et al. | |
| 2010/0067264 | A1 | 3/2010 | Ohashi et al. | |
| 2010/0082162 | A1 | 4/2010 | Mundy et al. | |
| 2010/0122545 | A1 | 5/2010 | Minor et al. | |
| 2011/0108756 | A1 | 5/2011 | Tsuchiya et al. | |
| 2011/0167848 | A1 | 7/2011 | Wakashima et al. | |
| 2012/0260679 | A1 | 10/2012 | Huerta-Ochoa | |
| 2014/0070132 | A1 | 3/2014 | Fukushima | |
| 2014/0077123 | A1 | 3/2014 | Fukushima | |
| 2014/0291411 | A1 | 10/2014 | Tamaki et al. | |
| 2014/0314606 | A1 | 10/2014 | Maeyama et al. | |
| 2014/0373569 | A1 | 12/2014 | Tsuboe et al. | |
| 2015/0001981 | A1 | 1/2015 | Hattori et al. | |
| 2015/0075203 | A1 | 3/2015 | Mochizuki et al. | |
| 2015/0096321 | A1 | 4/2015 | Kawano et al. | |
| 2015/0143841 | A1 | 5/2015 | Kawano et al. | |
| 2015/0256038 | A1 | 9/2015 | Nigo et al. | |
| 2015/0362199 | A1 | 12/2015 | Yumoto et al. | |
| 2015/0376486 | A1 | 12/2015 | Hashimoto et al. | |
| 2016/0018135 | A1 | 1/2016 | Yuzawa et al. | |
| 2016/0047579 | A1 | 2/2016 | Yan et al. | |
| 2016/0075927 | A1 | 3/2016 | Fukushima | |
| 2016/0131378 | A1 | 5/2016 | Hinokuma et al. | |
| 2016/0276886 | A1 | 9/2016 | Baba et al. | |
| 2016/0333241 | A1 | 11/2016 | Fukushima et al. | |
| 2016/0333243 | A1 | 11/2016 | Fukushima et al. | |
| 2016/0340565 | A1 | 11/2016 | Tasaka et al. | |
| 2016/0348933 | A1 | 12/2016 | Takeuchi et al. | |
| 2016/0355719 | A1 | 12/2016 | Fukushima et al. | |
| 2017/0002245 | A1 | 1/2017 | Fukushima | |
| 2017/0058172 | A1 | 3/2017 | Fukushima et al. | |
| 2017/0058173 | A1 | 3/2017 | Fukushima | |
| 2017/0058174 | A1 | 3/2017 | Fukushima et al. | |
| 2017/0121581 | A1 | 5/2017 | Horiike et al. | |
| 2017/0138642 | A1* | 5/2017 | Ueno | F04B 39/00 |
| 2017/0166831 | A1 | 6/2017 | Matsumoto | |
| 2017/0248328 | A1 | 8/2017 | Eskew et al. | |
| 2017/0328586 | A1 | 11/2017 | Maeyama | |
| 2017/0336085 | A1 | 11/2017 | Yasuo et al. | |
| 2017/0338707 | A1 | 11/2017 | Shono et al. | |
| 2018/0051198 | A1* | 2/2018 | Okamoto | C09K 5/044 |
| 2018/0094844 | A1 | 4/2018 | Suzuki | |
| 2018/0138763 | A1 | 5/2018 | Nakamura et al. | |
| 2018/0156217 | A1 | 6/2018 | Sakima et al. | |
| 2018/0156511 | A1 | 6/2018 | Chikami et al. | |

(56) References Cited

U.S. PATENT DOCUMENTS

2018/0254676 A1 9/2018 Nigo et al.
2018/0299175 A1 10/2018 Hayamizu et al.
2018/0320942 A1 11/2018 Hayamizu et al.
2018/0331436 A1 11/2018 Hayamizu et al.
2018/0358861 A1 12/2018 Hayamizu et al.
2019/0063773 A1 2/2019 Nagahashi et al.
2019/0068015 A1 2/2019 Yabe et al.
2019/0309963 A1 10/2019 Zaki et al.
2020/0079985 A1 3/2020 Okamoto et al.
2020/0262188 A1* 8/2020 Tsuboi .................. B32B 27/322
2020/0318023 A1* 10/2020 Bujouves ........... C10M 171/008
2020/0321816 A1 10/2020 Watanabe
2020/0325375 A1 10/2020 Kumakura et al.
2020/0325376 A1 10/2020 Kumakura et al.
2020/0325377 A1 10/2020 Kumakura et al.
2020/0326100 A1 10/2020 Ukibune et al.
2020/0326101 A1 10/2020 Itano et al.
2020/0326102 A1 10/2020 Kumakura et al.
2020/0326103 A1 10/2020 Kumakura et al.
2020/0326105 A1 10/2020 Kumakura et al.
2020/0326109 A1 10/2020 Kumakura et al.
2020/0326110 A1 10/2020 Asano et al.
2020/0332164 A1 10/2020 Itano et al.
2020/0332166 A1 10/2020 Kumakura et al.
2020/0333041 A1 10/2020 Itano et al.
2020/0333054 A1 10/2020 Asano et al.
2020/0347283 A1 11/2020 Itano et al.
2020/0363085 A1 11/2020 Itano et al.
2020/0363105 A1 11/2020 Kumakura et al.
2020/0363106 A1 11/2020 Itano et al.
2020/0363112 A1 11/2020 Ohtsuka et al.
2020/0369934 A1 11/2020 Itano et al.
2020/0385620 A1 12/2020 Itano et al.
2020/0385621 A1 12/2020 Itano et al.
2020/0385622 A1 12/2020 Itano et al.
2020/0392387 A1 12/2020 Ohtsuka et al.
2020/0392388 A1 12/2020 Itano et al.
2020/0393178 A1 12/2020 Kumakura et al.
2021/0018191 A1 1/2021 Itano et al.
2021/0135520 A1 5/2021 Shimokawa et al.
2021/0189209 A1 6/2021 Yotdumoto et al.
2021/0222040 A1 7/2021 Fukushima et al.
2021/0355359 A1 11/2021 Ohkubo et al.

FOREIGN PATENT DOCUMENTS

CN 1447491 10/2003
CN 1455855 11/2003
CN 1723373 1/2006
CN 1987264 6/2007
CN 101235815 8/2008
CN 101441012 5/2009
CN 102401519 4/2012
CN 103562338 2/2014
CN 203704143 7/2014
CN 103975204 8/2014
CN 104094069 10/2014
CN 104456760 3/2015
CN 104578493 4/2015
CN 204534884 8/2015
CN 104903661 9/2015
CN 104937350 9/2015
CN 204648544 9/2015
CN 105102905 11/2015
CN 204943959 1/2016
CN 205261858 5/2016
CN 106029821 10/2016
CN 106030222 10/2016
CN 106062159 10/2016
CN 106085363 11/2016
CN 106103992 11/2016
CN 106133110 11/2016
CN 106414653 2/2017
CN 106414654 2/2017
CN 106415152 2/2017
CN 106574802 4/2017
CN 106661477 5/2017
CN 106839496 6/2017
CN 107110570 8/2017
CN 107112830 8/2017
CN 107429957 12/2017
CN 107614980 1/2018
CN 107925285 4/2018
CN 108139112 6/2018
CN 108431414 8/2018
CN 108469126 8/2018
EP 1 231 255 8/2002
EP 1 246 348 10/2002
EP 1 326 057 7/2003
EP 1 632 732 3/2006
EP 1 953 388 8/2008
EP 2 423 609 2/2012
EP 2 620 736 7/2013
EP 2 711 405 3/2014
EP 2 789 933 10/2014
EP 2 840 335 2/2015
EP 2 853 826 4/2015
EP 2 918 953 9/2015
EP 2 952 828 12/2015
EP 2 980 508 2/2016
EP 3 012 555 4/2016
EP 3 012 557 4/2016
EP 3 070 417 9/2016
EP 3 109 302 12/2016
EP 3 101082 12/2016
EP 3 115 716 1/2017
EP 3 121 242 1/2017
EP 3 128 259 2/2017
EP 3 147 595 3/2017
EP 3 153 559 4/2017
EP 3 153 561 4/2017
EP 3 170 881 5/2017
EP 3 222 934 9/2017
EP 3 249 309 11/2017
EP 3 299 731 3/2018
EP 3 358 272 8/2018
EP 3 358 278 8/2018
EP 3 399 189 11/2018
GB 2530915 4/2016
JP 51-90115 7/1976
JP 52-13025 4/1977
JP 57-198968 12/1982
JP 59-39790 3/1984
JP 62-69066 3/1987
JP 63-69066 3/1987
JP 2-4163 1/1990
JP 5-264070 10/1993
JP 5-272823 10/1993
JP 7-19627 1/1995
JP 7-190571 7/1995
JP 8-200273 8/1996
JP 10-46170 2/1998
JP 10-300292 11/1998
JP 10-309050 11/1998
JP 10-318564 12/1998
JP 11-206001 7/1999
JP 11-256358 9/1999
JP 2000-161805 6/2000
JP 2000-220877 8/2000
JP 2000-234767 8/2000
JP 2000-304302 11/2000
JP 2001-82755 3/2001
JP 2001-139972 5/2001
JP 2002-54888 2/2002
JP 2002-89978 3/2002
JP 2002-257366 9/2002
JP 2002-272043 9/2002
JP 2002-318028 10/2002
JP 2003-18776 1/2003
JP 2003-83614 3/2003
JP 2003-174794 6/2003
JP 2004-28035 1/2004
JP 2004-132647 4/2004
JP 2004-215406 7/2004

(56) References Cited

FOREIGN PATENT DOCUMENTS

| | | |
|---|---|---|
| JP | 2004-251535 | 9/2004 |
| JP | 2004-361036 | 12/2004 |
| JP | 2005-61711 | 3/2005 |
| JP | 2005-241045 | 9/2005 |
| JP | 2005-288502 | 10/2005 |
| JP | 2006-162197 | 6/2006 |
| JP | 2006-211824 | 8/2006 |
| JP | 2006-313027 | 11/2006 |
| JP | 2008-39305 | 2/2008 |
| JP | 2008-54488 | 3/2008 |
| JP | 2008-190377 | 8/2008 |
| JP | 2008-245384 | 10/2008 |
| JP | 2008-286422 | 11/2008 |
| JP | 2009-63216 | 3/2009 |
| JP | 2009-92274 | 4/2009 |
| JP | 2009-121654 | 6/2009 |
| JP | 2009-150620 | 7/2009 |
| JP | 2009-299975 | 12/2009 |
| JP | 2010-28985 | 2/2010 |
| JP | 2010-103346 | 5/2010 |
| JP | 2010-119190 | 5/2010 |
| JP | 2010-164222 | 7/2010 |
| JP | 2010-230242 | 10/2010 |
| JP | 2011-4449 | 1/2011 |
| JP | 2011-43304 | 3/2011 |
| JP | 2011-52884 | 3/2011 |
| JP | 2011-94841 | 5/2011 |
| JP | 2011-135638 | 7/2011 |
| JP | 2011-202738 | 10/2011 |
| JP | 2011-252636 | 12/2011 |
| JP | 2012-42169 | 3/2012 |
| JP | 2012-112617 | 6/2012 |
| JP | 2012-132637 | 7/2012 |
| JP | 2012-151969 | 8/2012 |
| JP | 2013-124848 | 6/2013 |
| JP | 2013-126281 | 6/2013 |
| JP | 2013-139990 | 7/2013 |
| JP | 2013-155892 | 8/2013 |
| JP | 2013-155921 | 8/2013 |
| JP | 2013-172615 | 9/2013 |
| JP | 2013-200090 | 10/2013 |
| JP | 2013-221671 | 10/2013 |
| JP | 2014-70840 | 4/2014 |
| JP | 2014-75971 | 4/2014 |
| JP | 2014-89004 | 5/2014 |
| JP | 2014-129543 | 7/2014 |
| JP | 2014-152999 | 8/2014 |
| JP | 2014-167381 | 9/2014 |
| JP | 2015-23721 | 2/2015 |
| JP | 2015-55455 | 3/2015 |
| JP | 2015-78789 | 4/2015 |
| JP | 2015-82875 | 4/2015 |
| JP | 2015-111012 | 6/2015 |
| JP | 2015-114082 | 6/2015 |
| JP | 2015-145765 | 8/2015 |
| JP | 2015-158282 | 9/2015 |
| JP | 2015-218909 | 12/2015 |
| JP | 2015-218912 | 12/2015 |
| JP | 2015-229767 | 12/2015 |
| JP | 2016-1062 | 1/2016 |
| JP | 2016-11423 | 1/2016 |
| JP | 2016-56340 | 4/2016 |
| JP | 2016-125808 | 7/2016 |
| JP | 2016-133256 | 7/2016 |
| JP | 2016-172869 | 9/2016 |
| JP | 2016-174461 | 9/2016 |
| JP | 2017-36861 | 2/2017 |
| JP | 2017-46430 | 3/2017 |
| JP | 2017-53285 | 3/2017 |
| JP | 2017-67373 | 4/2017 |
| JP | 2017-67428 | 4/2017 |
| JP | 2017-122549 | 7/2017 |
| JP | 2017-145975 | 8/2017 |
| JP | 2017-192190 | 10/2017 |
| JP | 2018-25377 | 2/2018 |
| KR | 2001-0029975 | 4/2001 |
| KR | 2003-0028838 | 4/2003 |
| KR | 10-0939609 | 10/2003 |
| KR | 10-2004-0075737 | 8/2004 |
| KR | 10-2005-0044931 | 5/2005 |
| KR | 10-2017-0034887 | 3/2017 |
| RU | 2013 156 380 | 6/2015 |
| TW | 20030103482 | 2/2003 |
| WO | 01/36571 | 5/2001 |
| WO | 02/23100 | 3/2002 |
| WO | 2009/069679 | 6/2009 |
| WO | 2009/093345 | 7/2009 |
| WO | 2012/157764 | 11/2012 |
| WO | 2012/157765 | 11/2012 |
| WO | WO-2012157765 A1 * | 11/2012 ............ C09K 5/045 |
| WO | 2013/084301 | 6/2013 |
| WO | 2013/146103 | 10/2013 |
| WO | 2013/146208 | 10/2013 |
| WO | 2013/151043 | 10/2013 |
| WO | 2014/045400 | 3/2014 |
| WO | 2014/118945 | 8/2014 |
| WO | 2014/119149 | 8/2014 |
| WO | 2014/156190 | 10/2014 |
| WO | 2014/203353 | 12/2014 |
| WO | 2014/203354 | 12/2014 |
| WO | 2015/071967 | 5/2015 |
| WO | 2015/115252 | 8/2015 |
| WO | 2015/125763 | 8/2015 |
| WO | 2015/125884 | 8/2015 |
| WO | 2015/136981 | 9/2015 |
| WO | 2015/140827 | 9/2015 |
| WO | 2015/141678 | 9/2015 |
| WO | 2015/186557 | 12/2015 |
| WO | 2015/186670 | 12/2015 |
| WO | 2016/009884 | 1/2016 |
| WO | 2016/017460 | 2/2016 |
| WO | 2016/103711 | 6/2016 |
| WO | 2016/104418 | 6/2016 |
| WO | 2016/117443 | 7/2016 |
| WO | 2016/157538 | 10/2016 |
| WO | 2016/182030 | 11/2016 |
| WO | 2016/190232 | 12/2016 |
| WO | 2017/038489 | 3/2017 |
| WO | 2017/056789 | 4/2017 |
| WO | 2017/057004 | 4/2017 |
| WO | 2017/115636 | 7/2017 |
| WO | 2017/122517 | 7/2017 |
| WO | 2017/195248 | 11/2017 |
| WO | 2019/123 804 | 6/2019 |
| WO | 2019/123 806 | 6/2019 |
| WO | 2019/123 807 | 6/2019 |
| WO | 2019/123782 | 6/2019 |
| WO | 2019/123805 | 6/2019 |
| WO | 2019/124400 | 6/2019 |
| WO | 2019/124401 | 6/2019 |
| WO | 2019/124402 | 6/2019 |
| WO | 2019/124403 | 6/2019 |
| WO | 2019/124404 | 6/2019 |

OTHER PUBLICATIONS

International Preliminary Report on Patentability dated Jun. 23, 2020 in International Application No. PCT/JP2018/046531.

International Preliminary Report on Patentability dated Jun. 23, 2020 in International Application No. PCT/JP2018/045978.

International Search Report dated Mar. 19, 2019 in International Application No. PCT/JP2018/045978.

International Preliminary Report on Patentability dated Jun. 23, 2020 in International Application No. PCT/JP2018/046532.

International Search Report dated Feb. 12, 2019 in International Application No. PCT/JP2018/046532.

International Preliminary Report on Patentability dated Jun. 23, 2020 in International Application No. PCT/JP2018/042027.

International Search Report dated Feb. 12, 2019 in International Application No. PCT/JP2018/042027.

International Preliminary Report on Patentability dated Jun. 23, 2020 in International Application No. PCT/JP2018/042032.

(56) References Cited

OTHER PUBLICATIONS

International Search Report dated Feb. 19, 2019 in International Application No. PCT/JP2018/042032.
International Preliminary Report on Patentability dated Jun. 23, 2020 in International Application No. PCT/JP2018/046666.
International Search Report dated Apr. 2, 2019 in International Application No. PCT/JP2018/046666.
International Preliminary Report on Patentability dated Jun. 23, 2020 in International Application No. PCT/JP2018/045336.
International Search Report dated Feb. 19, 2019 in International Application No. PCT/JP2018/045336.
International Preliminary Report on Patentability dated Jun. 23, 2020 in International Application No. PCT/JP2018/045557.
International Search Report dated Mar. 12, 2019 in International Application No. PCT/JP2018/045557.
International Preliminary Report on Patentability dated Jun. 23, 2020 in International Application No. PCT/JP2018/046426.
International Search Report dated Feb. 19, 2019 in International Application No. PCT/JP2018/046426.
International Preliminary Report on Patentability dated Jun. 23, 2020 in International Application No. PCT/JP2018/046427.
International Search Report dated Feb. 19, 2019 in International Application No. PCT/JP2018/046427.
International Preliminary Report on Patentability dated Jun. 23, 2020 in International Application No. PCT/JP2018/046428.
International Search Report dated Mar. 19, 2019 in International Application No. PCT/JP2018/046428.
International Preliminary Report on Patentability dated Jun. 23, 2020 in International Application No. PCT/JP2018/046581.
International Search Report dated Mar. 5, 2019 in International Application No. PCT/JP2018/046581.
International Preliminary Report on Patentability dated Jun. 23, 2020 in International Application No. PCT/JP2018/046630.
International Search Report dated Mar. 5, 2019 in International Application No. PCT/JP2018/046630.
International Preliminary Report on Patentability dated Jun. 23, 2020 in International Application No. PCT/JP2018/046582.
International Search Report dated Mar. 5, 2019 in International Application No. PCT/JP2018/046582.
International Preliminary Report on Patentability dated Jun. 23, 2020 in International Application No. PCT/JP2018/046631.
International Search Report dated Mar. 5, 2019 in International Application No. PCT/JP2018/046631.
International Preliminary Report on Patentability dated Jun. 23, 2020 in International Application No. PCT/JP2018/046627.
International Search Report dated Mar. 19, 2019 in International Application No. PCT/JP2018/046627.
International Preliminary Report on Patentability dated Jun. 23, 2020 in International Application No. PCT/JP2018/046628.
International Search Report dated Mar. 19, 2019 in International Application No. PCT/JP2018/046628.
International Preliminary Report on Patentability dated Jun. 23, 2020 in International Application No. PCT/JP2018/045979.
International Search Report dated Mar. 12, 2019 in International Application No. PCT/JP2018/045979.
International Preliminary Report on Patentability dated Jun. 23, 2020 in International Application No. PCT/JP2018/046434.
International Search Report dated Feb. 19, 2019 in International Application No. PCT/JP2018/046434.
International Preliminary Report on Patentability dated Jun. 23, 2020 in International Application No. PCT/JP2018/045290.
International Search Report dated Jan. 22, 2019 in International Application No. PCT/JP2018/045290.
International Preliminary Report on Patentability dated Jun. 23, 2020 in International Application No. PCT/JP2018/045288.
International Search Report dated Jan. 22, 2019 in International Application No. PCT/JP2018/045288.
International Preliminary Report on Patentability dated Jun. 23, 2020 in International Application No. PCT/JP2018/045289.
International Search Report dated Jan. 22, 2019 in International Application No. PCT/JP2018/045289.
International Preliminary Report on Patentability dated Jun. 23, 2020 in International Application No. PCT/JP2018/046639.
International Preliminary Report on Patentability dated Jun. 23, 2020 in International Application No. PCT/JP2018/046642.
International Preliminary Report on Patentability dated Jun. 23, 2020 in International Application No. PCT/JP2018/038746.
International Preliminary Report on Patentability dated Jun. 23, 2020 in International Application No. PCT/JP2018/046643.
International Preliminary Report on Patentability dated Jun. 23, 2020 in International Application No. PCT/JP2018/038748.
International Preliminary Report on Patentability dated Jun. 23, 2020 in International Application No. PCT/JP2018/046640.
International Preliminary Report on Patentability dated Jun. 23, 2020 in International Application No. PCT/JP2018/046644.
International Preliminary Report on Patentability dated Jun. 23, 2020 in International Application No. PCT/JP2018/038749.
International Preliminary Report on Patentability dated Jun. 23, 2020 in International Application No. PCT/JP2018/037483.
International Search Report dated Feb. 19, 2019 in International Application No. PCT/JP2018/045335.
International Preliminary Report on Patentability dated Jun. 23, 2020 in International Application No. PCT/JP2018/045335.
International Search Report dated Feb. 19, 2019 in International Application No. PCT/JP2018/046435.
International Preliminary Report on Patentability dated Jun. 23, 2020 in International Application No. PCT/JP2018/046435.
International Search Report dated Mar. 19, 2019 in International (PCT) Application No. PCT/JP2018/046530.
International Preliminary Report on Patentability dated Jun. 23, 2020 in International Application No. PCT/JP2018/046530.
International Search Report dated Feb. 12, 2019 in International (PCT) Application No. PCT/JP2018/046533.
International Preliminary Report on Patentability dated Jun. 23, 2020 in International Application No. PCT/JP2018/046533.
Hirahara et al., "Latest trend of alternative refrigerant: LCCP-analogy for HFO-1234yf Air Conditioners using a Simulation with R134a Properties", Refrigeration, Jan. 15, 2010, vol. 85, No. 987, pp. 15-20, with partial translation.
International Preliminary Report on Patentability dated Jun. 23, 2020 in International Application No. PCT/JP2018/038747.
International Search Report dated Mar. 12, 2019 in International (PCT) Application No. PCT/JP2018/046639.
International Search Report dated Mar. 12, 2019 in International (PCT) Application No. PCT/JP2018/046642.
International Search Report dated Dec. 18, 2018 in International (PCT) Application No. PCT/JP2018/038746.
International Search Report dated Mar. 19, 2019 in International (PCT) Application No. PCT/JP2018/046643.
International Search Report dated Dec. 18, 2018 in International (PCT) Application No. PCT/JP2018/038748.
International Search Report dated Mar. 12, 2019 in International (PCT) Application No. PCT/JP2018/046640.
International Search Report dated Mar. 19, 2019 in International (PCT) Application No. PCT/JP2018/046644.
International Search Report dated Dec. 18, 2018 in International (PCT) Application No. PCT/JP2018/038749.
International Search Report dated Dec. 18, 2018 in International (PCT) Application No. PCT/JP2018/037483.
International Search Report dated Dec. 18, 2018 in International (PCT) Application No. PCT/JP2018/038747.
Summary, Collection of Papers of the 2nd Symposium on New Technologies of Refrigeration and Air Conditioning, 2nd Edition, Ding Guoliang, Ed., published by Shanghai Jiatong University Press, 2003, with Concise Explanation.

* cited by examiner

| | | REFRIGERANT A COPPER PIPE (C1220T) | REFRIGERANT A ALUMINUM PIPE (A3003TD) | REFRIGERANT A COPPER PIPE (C1220T) | REFRIGERANT A ALUMINUM PIPE (A3003TD) |
|---|---|---|---|---|---|
| HORSEPOWER [HP] | REFRIGERATION CAPACITY [kW] | GAS SIDE [mm] | GAS SIDE [mm] | LIQUID SIDE [mm] | LIQUID SIDE [mm] |
| 0.8 | 2.2 | φ12.7 | φ12.7 | φ6.4 | φ6.4 |
| 1.0 | 2.8 | φ12.7 | φ12.7 | φ6.4 | φ6.4 |
| 1.3 | 3.6 | φ12.7 | φ12.7 | φ6.4 | φ6.4 |
| 1.6 | 4.5 | φ12.7 | φ12.7 | φ6.4 | φ6.4 |
| 2.0 | 5.6 | φ15.9 | φ15.9 | φ9.5 | φ9.5 |
| 2.5 | 7.1 | φ15.9 | φ15.9 | φ9.5 | φ9.5 |
| 2.9 | 8.0 | φ15.9 | φ15.9 | φ9.5 | φ9.5 |
| 3.2 | 9.0 | φ15.9 | φ19.1 | φ9.5 | φ9.5 |
| 4.0 | 11.2 | φ19.1 | φ19.1 | φ9.5 | φ9.5 |
| 5 | 14 | φ19.1 | φ19.1 | φ9.5 | φ9.5 |
| 6 | 16 | φ19.1 | φ19.1 | φ9.5 | φ9.5 |
| 8 | 22.4 | φ22.2 | φ22.2 | φ12.7 | φ12.7 |
| 10 | 28 | φ22.2 | φ25.4 | φ12.7 | φ12.7 |
| 12 | 33.5 | φ25.4 | φ25.4 | φ12.7 | φ12.7 |
| 14 | 40 | φ25.4 | φ28.6 | φ12.7 | φ15.9 |
| 16 | 45 | φ28.6 | φ28.6 | φ15.9 | φ15.9 |
| 18 | 50 | φ28.6 | φ31.8 | φ15.9 | φ15.9 |
| 20 | 56 | φ28.6 | φ31.8 | φ15.9 | φ15.9 |
| 22 | 61.5 | φ31.8 | φ38.1 | φ15.9 | φ15.9 |
| 24 | 69 | φ31.8 | φ38.1 | φ15.9 | φ19.1 |
| 26 | 73 | φ31.8 | φ38.1 | φ19.1 | φ19.1 |
| 28 | 80 | φ31.8 | φ38.1 | φ19.1 | φ19.1 |
| 30 | 85 | φ38.1 | φ38.1 | φ19.1 | φ19.1 |
| 32 | 90 | φ38.1 | φ38.1 | φ19.1 | φ19.1 |
| 34 | 95 | φ38.1 | φ38.1 | φ19.1 | φ19.1 |
| 36 | 100 | φ38.1 | φ38.1 | φ19.1 | φ19.1 |
| 38 | 109 | φ38.1 | φ44.5 | φ19.1 | φ19.1 |
| 40 | 112 | φ38.1 | φ44.5 | φ19.1 | φ19.1 |
| 42 | 118 | φ38.1 | φ44.5 | φ19.1 | φ22.2 |
| 44 | 125 | φ38.1 | φ44.5 | φ19.1 | φ22.2 |
| 46 | 132 | φ44.5 | φ44.5 | φ19.1 | φ22.2 |
| 48 | 136 | φ44.5 | φ44.5 | φ19.1 | φ22.2 |
| 50 | 140 | φ44.5 | φ44.5 | φ22.2 | φ22.2 |
| 52 | 145 | φ44.5 | φ44.5 | φ22.2 | φ22.2 |
| 54 | 150 | φ44.5 | φ44.5 | φ22.2 | φ22.2 |

FIG. 23C

| | PIPE MATERIAL | COPPER (C1220T-1/2T) | | ALUMINUM (A3003TD-H14) | |
|---|---|---|---|---|---|
| | DESIGN PRESSURE (MpaG) | 4.0 | | 4.0 | |
| NOMINAL PIPE SIZE | OUTSIDE DIAMETER (mm) | WALL THICKNESS (mm) | INSIDE DIAMETER (mm) | WALL THICKNESS (mm) | INSIDE DIAMETER (mm) |
| φ6.4 | φ6.35 | 0.8 | φ4.75 | 0.8 | φ4.75 |
| φ9.5 | φ9.52 | 0.8 | φ7.92 | 0.8 | φ7.92 |
| φ12.7 | φ12.70 | 0.8 | φ11.10 | 1.0 | φ10.70 |
| φ15.9 | φ15.88 | 1.0 | φ13.88 | 1.3 | φ13.28 |
| φ19.1 | φ19.05 | 1.0 | φ17.05 | 1.5 | φ16.05 |
| φ22.2 | φ22.22 | 1.0 | φ20.22 | 1.7 | φ18.82 |
| φ25.4 | φ25.40 | 1.0 | φ23.40 | 2.0 | φ21.40 |
| φ28.6 | φ28.58 | 1.0 | φ26.58 | 2.2 | φ24.18 |
| φ31.8 | φ31.75 | 1.1 | φ29.55 | 2.5 | φ26.75 |
| φ38.1 | φ38.10 | 1.4 | φ35.40 | 3.0 | φ32.10 |
| φ44.5 | φ44.45 | 1.6 | φ41.25 | 3.4 | φ37.65 |
| φ50.8 | φ50.80 | 1.8 | φ47.20 | 3.9 | φ43.00 |
| φ63.5 | φ63.50 | 2.5 | φ58.50 | 4.9 | φ53.70 |

FIG. 23D

REFRIGERATION CYCLE APPARATUS

TECHNICAL FIELD

The present disclosure relates to a refrigeration cycle apparatus.

BACKGROUND ART

In the related art, R410A has been frequently used as a refrigerant in refrigeration cycle apparatuses such as air conditioners. R410A is a two-component mixed refrigerant of difluoromethane ($CH_2F_2$; HFC-32 or R32) and pentafluoroethane ($C_2HF_5$; HFC-125 or R125), which is a pseudo-azeotropic composition.

However, R410A has a global warming potential (GWP) of 2088. From the viewpoint of increasing concern for global warming, R32 having a lower GWP has been more frequently used in recent years.

Therefore, for example, PTL 1 (International Publication No. 2015/141678) proposes various low-GWP mixture refrigerants as alternatives to R410A.

SUMMARY OF THE INVENTION (1) First Group

It has not been studied that good lubricity in a refrigeration cycle apparatus is achieved when a refrigeration cycle is performed using a refrigerant having a sufficiently low GWP.

In view of the foregoing, it is an object of the present disclosure to provide a refrigeration cycle apparatus in which good lubricity can be achieved when a refrigeration cycle is performed using a refrigerant having a sufficiently low GWP.

A refrigeration cycle apparatus according to a first aspect of first group comprises a working fluid for a refrigerating machine that contains a refrigerant composition containing a refrigerant and that contains a refrigerating oil. The refrigerant comprises trans-1,2-difluoroethylene (HFO-1132 (E)), trifluoroethylene (HFO-1123), and 2,3,3,3-tetrafluoro-1-propene (R1234yf).

Since this refrigeration cycle apparatus contains a refrigerant having a sufficiently low GWP and a refrigerating oil, good lubricity in the refrigeration cycle apparatus can be achieved when a refrigeration cycle is performed using the above refrigerant composition. In this refrigeration cycle, good lubricity in the refrigeration cycle apparatus can also be achieved when a refrigerant having a refrigeration capacity (may also be referred to as a cooling capacity or a capacity) and a coefficient of performance (COP) equal to those of R410A is used.

A refrigeration cycle apparatus according to a second aspect of first group is the refrigeration cycle apparatus according to the first aspect of first group, wherein the refrigerating oil has a kinematic viscosity at 40° C. of 1 $mm^2/s$ or more and 750 $mm^2/s$ or less.

A refrigeration cycle apparatus according to a third aspect of first group is the refrigeration cycle apparatus according to the first aspect or the second aspect of first group, wherein the refrigerating oil has a kinematic viscosity at 100° C. of 1 $mm^2/s$ or more and 100 $mm^2/s$ or less.

A refrigeration cycle apparatus according to a fourth aspect of first group is the refrigeration cycle apparatus according to any one of the first aspect to the third aspect of first group, wherein the refrigerating oil has a volume resistivity at 25° C. of $1.0\times10^{12}$ Ω·cm or more.

A refrigeration cycle apparatus according to a fifth aspect of first group is the refrigeration cycle apparatus according to any one of the first aspect to the fourth aspect of first group, wherein the refrigerating oil has an acid number of 0.1 mgKOH/g or less.

A refrigeration cycle apparatus according to a sixth aspect of first group is the refrigeration cycle apparatus according to any one of the first aspect to the fifth aspect of first group, wherein the refrigerating oil has an ash content of 100 ppm or less.

A refrigeration cycle apparatus according to a seventh aspect of first group is the refrigeration cycle apparatus according to any one of the first aspect to the sixth aspect of first group, wherein the refrigerating oil has an aniline point of −100° C. or higher and 0° C. or lower.

A refrigeration cycle apparatus according to an eighth aspect of first group is the refrigeration cycle apparatus according to any one of the first aspect to the seventh aspect of first group and includes a refrigerant circuit. The refrigerant circuit includes a compressor, a condenser, a decompressing unit, and an evaporator connected to each other through a refrigerant pipe. The working fluid for a refrigerating machine circulates through the refrigerant circuit.

A refrigeration cycle apparatus according to a ninth aspect of first group is the refrigeration cycle apparatus according to any one of the first aspect to the eighth aspect of first group, wherein a content of the refrigerating oil in the working fluid for a refrigerating machine is 5 mass % or more and 60 mass % or less.

A refrigeration cycle apparatus according to a tenth aspect of first group is the refrigeration cycle apparatus according to any one of the first aspect to the ninth aspect of first group, wherein the refrigerating oil contains at least one additive selected from an acid scavenger, an extreme pressure agent, an antioxidant, an antifoaming agent, an oiliness improver, a metal deactivator, an anti-wear agent, and a compatibilizer. A content of the additive is 5 mass % or less relative to a mass of the refrigerating oil containing the additive.

(2) Second Group

It has not been studied that good lubricity in a refrigeration cycle apparatus is achieved when a refrigeration cycle is performed using a refrigerant having a sufficiently low GWP.

In view of the foregoing, it is an object of the present disclosure to provide a refrigerating oil for refrigerants or refrigerant compositions in which good lubricity can be achieved when a refrigeration cycle is performed using a refrigerant having a sufficiently low GWP, a method for using the refrigerating oil, and use of the refrigerating oil.

A refrigerating oil for a refrigerant composition according to a first aspect of second group is a refrigerating oil for a refrigerant composition containing a refrigerant, wherein the refrigerant includes any one of refrigerants A to D which are described at (26) Detail of refrigerant for each of groups hereafter.

A refrigerating oil for a refrigerant composition according to a second aspect of second group is the refrigerating oil for a refrigerant composition according to the first aspect of second group, wherein the refrigerating oil has a kinematic viscosity at 40° C. of 1 $mm^2/s$ or more and 750 $mm^2/s$ or less.

A refrigerating oil for a refrigerant composition according to a third aspect of second group is the refrigerating oil for a refrigerant composition according to the first aspect or the second aspect of second group, wherein the refrigerating oil has a kinematic viscosity at 100° C. of 1 $mm^2/s$ or more and 100 $mm^2/s$ or less.

A refrigerating oil for a refrigerant composition according to a fourth aspect of second group is the refrigerating oil for a refrigerant composition according to any one of the first aspect to the third aspect of second group, wherein the refrigerating oil has a volume resistivity at 25° C. of $1.0\times10^{12}$ Ω·cm or more.

A refrigerating oil for a refrigerant composition according to a fifth aspect of second group is the refrigerating oil for a refrigerant composition according to any one of the first aspect to the fourth aspect of second group, wherein the refrigerating oil has an acid number of 0.1 mgKOH/g or less.

A refrigerating oil for a refrigerant composition according to a sixth aspect of second group is the refrigerating oil for a refrigerant composition according to any one of the first aspect to the fifth aspect of second group, wherein the refrigerating oil has an ash content of 100 ppm or less.

A refrigerating oil for a refrigerant composition according to a seventh aspect of second group is the refrigerating oil for a refrigerant composition according to any one of the first aspect to the sixth aspect of second group, wherein the refrigerating oil has an aniline point of −100° C. or higher and 0° C. or lower.

A method for using a refrigerating oil according to an eighth aspect of second group is a method for using a refrigerating oil together with a refrigerant composition containing a refrigerant, wherein the refrigerant includes any one of the refrigerants which are described at (26) Detail of refrigerant for each of groups In this method for using a refrigerating oil, good lubricity can be achieved when a refrigeration cycle is performed using a refrigerant having a sufficiently low GWP or a refrigerant composition containing the refrigerant.

A method for using a refrigerating oil according to a ninth aspect of second group is the method for using a refrigerating oil according to the eighth aspect of second group, wherein the refrigerating oil has a kinematic viscosity at 40° C. of 1 $mm^2/s$ or more and 750 $mm^2/s$ or less.

A method for using a refrigerating oil according to a tenth aspect of second group is the method for using a refrigerating oil according to the eighth aspect or the ninth aspect of second group, wherein the refrigerating oil has a kinematic viscosity at 100° C. of 1 $mm^2/s$ or more and 100 $mm^2/s$ or less.

A method for using a refrigerating oil according to an eleventh aspect of second group is the method for using a refrigerating oil according to any one of the eighth aspect to the tenth aspect of second group, wherein the refrigerating oil has a volume resistivity at 25° C. of $1.0\times10^{12}$ Ω·cm or more.

A method for using a refrigerating oil according to a twelfth aspect of second group is the method for using a refrigerating oil according to any one of the eighth aspect to the eleventh aspect of second group, wherein the refrigerating oil has an acid number of 0.1 mgKOH/g or less.

A method for using a refrigerating oil according to a thirteenth aspect of second group is the method for using a refrigerating oil according to any one of the eighth aspect to the twelfth aspect of second group, wherein the refrigerating oil has an ash content of 100 ppm or less.

The method for using a refrigerating oil according to a fourteenth aspect of second group is the method for using a refrigerating oil according to any one of the eighth aspect to the thirteenth aspect of second group, wherein the refrigerating oil has an aniline point of −100° C. or higher and 0° C. or lower.

Use of a refrigerating oil according to a fifteenth aspect of second group is use of a refrigerating oil used together with a refrigerant composition containing a refrigerant, wherein the refrigerant includes any one of the refrigerants which are described at (26) Detail of refrigerant for each of groups hereafter.

In the use of a refrigerating oil, good lubricity can be achieved when a refrigeration cycle is performed using a refrigerant having a sufficiently low GWP or a refrigerant composition containing the refrigerant.

Use of a refrigerating oil according to a sixteenth aspect of second group is the use of a refrigerating oil according to the fifteenth aspect of second group, wherein the refrigerating oil has a kinematic viscosity at 40° C. of 1 $mm^2/s$ or more and 750 $mm^2/s$ or less.

Use of a refrigerating oil according to a seventeenth aspect of second group is the use of a refrigerating oil according to the fifteenth aspect or the sixteenth aspect of second group, wherein the refrigerating oil has a kinematic viscosity at 100° C. of 1 $mm^2/s$ or more and 100 $mm^2/s$ or less.

Use of a refrigerating oil according to an eighteenth aspect of second group is the use of a refrigerating oil according to any one of the fifteenth aspect to the seventeenth aspect of second group, wherein the refrigerating oil has a volume resistivity at 25° C. of $1.0\times10^{12}$ Ω·cm or more.

Use of a refrigerating oil according to a nineteenth aspect of second group is the use of a refrigerating oil according to any one of the fifteenth aspect to the eighteenth aspect of second group, wherein the refrigerating oil has an acid number of 0.1 mgKOH/g or less.

Use of a refrigerating oil according to a twentieth aspect of second group is the use of a refrigerating oil according to any one of the fifteenth aspect to the nineteenth aspect of second group, wherein the refrigerating oil has an ash content of 100 ppm or less.

Use of a refrigerating oil according to a twenty-first aspect of second group is the use of a refrigerating oil according to any one of the fifteenth aspect to the twentieth aspect of second group, wherein the refrigerating oil has an aniline point of −100° C. or higher and 0° C. or lower.

(3) Third Group

A specific refrigerant circuit that can use such a small-GWP refrigerant has not been studied at all.

A refrigeration cycle apparatus according to a first aspect of third group includes a refrigerant circuit and a refrigerant. The refrigerant circuit includes a compressor, a condenser, a decompressing section, and an evaporator. The refrigerant contains at least 1,2-difluoroethylene. The refrigerant is enclosed in the refrigerant circuit.

Since the refrigeration cycle apparatus can perform a refrigeration cycle using the refrigerant containing 1,2-difluoroethylene in the refrigerant circuit including the compressor, the condenser, the decompressing section, and the evaporator, the refrigeration cycle apparatus can perform a refrigeration cycle using a small-GWP refrigerant.

A refrigeration cycle apparatus according to a second aspect of third group is the refrigeration cycle apparatus according to the first aspect of third group, in which the refrigerant circuit further includes a low-pressure receiver. The low-pressure receiver is provided midway in a refrigerant flow path extending from the evaporator toward a suction side of the compressor.

The refrigeration cycle apparatus can perform a refrigeration cycle while the low-pressure receiver stores an excessive refrigerant in the refrigerant circuit.

A refrigeration cycle apparatus according to a third aspect of third group is the refrigeration cycle apparatus according to the first aspect or the second aspect of third group, in which the refrigerant circuit further includes a high-pressure receiver. The high-pressure receiver is provided midway in a refrigerant flow path extending from the condenser toward the evaporator.

The refrigeration cycle apparatus can perform a refrigeration cycle while the high-pressure receiver stores an excessive refrigerant in the refrigerant circuit.

A refrigeration cycle apparatus according to a fourth aspect of third group is the refrigeration cycle apparatus according to any one of the first aspect to the third aspect of third group, in which the refrigerant circuit further includes a first decompressing section, a second decompressing section, and an intermediate-pressure receiver. The first decompressing section, the second decompressing section, and the intermediate-pressure receiver are provided midway in a refrigerant flow path extending from the condenser toward the evaporator. The intermediate-pressure receiver is provided between the first decompressing section and the second decompressing section in the refrigerant flow path extending from the condenser toward the evaporator.

The refrigeration cycle apparatus can perform a refrigeration cycle while the intermediate-pressure receiver stores an excessive refrigerant in the refrigerant circuit.

A refrigeration cycle apparatus according to a fifth aspect of third group is the refrigeration cycle apparatus according to any one of the first aspect to the fourth aspect of third group, in which the refrigeration cycle apparatus further includes a control unit. The refrigerant circuit further includes a first decompressing section and a second decompressing section. The first decompressing section and the second decompressing section are provided midway in a refrigerant flow path extending from the condenser toward the evaporator. The control unit adjusts both a degree of decompression of a refrigerant passing through the first decompressing section and a degree of decompression of a refrigerant passing through the second decompressing section.

The refrigeration cycle apparatus, by controlling the respective degrees of decompression of the first decompressing section and the second decompressing section provided midway in the refrigerant flow path extending from the condenser toward the evaporator, can decrease the concentration of the refrigerant located between the first decompressing section and the second decompressing section provided midway in the refrigerant flow path extending from the condenser toward the evaporator. Thus, the refrigerant enclosed in the refrigerant circuit is likely present more in the condenser and/or the evaporator, thereby improving the capacity.

A refrigeration cycle apparatus according to a sixth aspect of third group is the refrigeration cycle apparatus according to any one of the first aspect to the fifth aspect of third group, in which the refrigerant circuit further includes a refrigerant heat exchanging section. The refrigerant heat exchanging section causes a refrigerant flowing from the condenser toward the evaporator and a refrigerant flowing from the evaporator toward the compressor to exchange heat with each other.

With the refrigeration cycle apparatus, in the refrigerant heat exchanging section, the refrigerant flowing from the evaporator toward the compressor is heated with the refrigerant flowing from the condenser toward the evaporator. Thus, liquid compression by the compressor can be controlled.

(4) Fourth Group

Some of low GWP refrigerants are flammable. Accordingly, it is preferable to employ a layout structure that, even if a flammable refrigerant leaks, reduces the likelihood of the leaked refrigerant reaching the vicinity of electric components.

The present disclosure has been made in view of the above, and accordingly it is an object of the present disclosure to provide a heat exchange unit with which, even if a flammable refrigerant containing at least 1,2-difluoroethylene is used, the likelihood of the refrigerant reaching electric components is reduced.

A heat exchange unit according to a first aspect of fourth group is a heat exchange unit that constitutes a portion of a refrigeration cycle apparatus, and includes a housing, a heat exchanger, a pipe connection part, and an electric component unit. The heat exchange unit is one of a service-side unit and a heat source-side unit. The service-side unit and the heat source-side unit are connected to each other via a connection pipe. The heat exchanger is disposed inside the housing. A refrigerant flows in the heat exchanger. The pipe connection part is connected to the connection pipe. The electric component unit is disposed inside the housing. The refrigerant is a refrigerant mixture containing at least 1,2-difluoroethylene, and is a flammable refrigerant. When the heat exchange unit is in its installed state, the lower end of the electric component unit is positioned above the pipe connection part.

As used herein, the term flammable refrigerant means a refrigerant with a flammability classification of "class 2L" or higher under the US ANSI/ASHRAE 34-2013 standard.

Although not particularly limited, a pipe connection part may be a connection part connected, either directly or indirectly via another element, to a refrigerant pipe extending from a heat exchanger.

The type of the electric component unit is not particularly limited. The electronic component unit may be an electric component box accommodating a plurality of electric components, or may be a substrate provided with a plurality of electric components.

When the heat exchange unit is in its installed state, the lower end of the electric component unit is positioned above the pipe connection part. Therefore, even if a flammable refrigerant containing 1,2-difluoroethylene leaks from the pipe connection part, the flammable refrigerant is unlikely to reach the electric component unit because 1,2-difluoroethylene is heavier than air.

(5) Fifth Group

The operation efficiency of a refrigeration cycle when a refrigerant containing at least 1,2-difluoroethylene is used as a refrigerant having a sufficiently low GWP has not been considered at all up to this time.

The content of the present disclosure is based on the point above, and an object is to provide a refrigeration cycle apparatus that can improve operation efficiency when using a refrigerant containing at least 1,2-difluoroethylene.

A refrigeration cycle apparatus according to a first aspect of fifth group includes a compressor, a condenser, a decompressor, an evaporator, and an injection flow path. The compressor sucks a low-pressure refrigerant from a suction flow path, compresses the refrigerant, and discharges a high-pressure refrigerant. The condenser condenses the high-pressure refrigerant discharged from the compressor. The decompressor decompresses the high-pressure refrigerant that has exited from the condenser. The evaporator evaporates the refrigerant decompressed at the decompressor. The injection flow path is at least either one of an intermediate injection flow path and a suction injection flow path. The intermediate injection flow path allows a part of a refrigerant that flows toward the evaporator from the condenser to merge with an intermediate-pressure refrigerant in the compressor. The suction injection flow path allows a part of a refrigerant that flows toward the evaporator from the condenser to merge with the low-pressure refrigerant that is sucked by the compressor. The refrigerant contains at least 1,2-difluoroethylene.

The refrigeration cycle apparatus can improve the operation efficiency of a refrigeration cycle by using the injection flow path, while sufficiently reducing GWP by using the refrigerant containing 1,2-difluoroethylene.

A refrigeration cycle apparatus according to a second aspect of fifth group is the refrigeration cycle apparatus of the first aspect of fifth group and further includes a branching flow path, an opening degree adjusting valve, and an injection heat exchanger. The branching flow path branches off from a main refrigerant flow path that connects the condenser and the evaporator to each other. The opening degree adjusting valve is provided in the branching flow path. The injection heat exchanger causes a refrigerant that flows in the main refrigerant flow path and a refrigerant that flows on a downstream side with respect to the opening degree adjusting valve in the branching flow path to exchange heat. A refrigerant that exits from the injection heat exchanger and flows in the branching flow path flows in the injection flow path.

The refrigeration cycle apparatus can further improve the operation efficiency of a refrigeration cycle.

A refrigeration cycle apparatus according to a third aspect of fifth group is the refrigeration cycle apparatus of the first aspect or the second aspect of fifth group and further includes a refrigerant storage tank that is provided in a main refrigerant flow path that connects the condenser and the evaporator to each other. A gas component of a refrigerant that accumulates in the refrigerant storage tank flows in the injection flow path.

The refrigeration cycle apparatus can improve the efficiency of a refrigeration cycle, while accumulating an excess refrigerant in the refrigerant storage tank.

A refrigeration cycle apparatus according to a fourth aspect of fifth group is the refrigeration cycle apparatus of any one of the first aspect to the third aspect of fifth group, in which the compressor includes a fixed scroll and a swinging scroll. The fixed scroll includes a end plate and a lap that stands spirally from the end plate. The swinging scroll forms a compression chamber by engaging with the fixed scroll. A refrigerant that flows in the injection flow path merges at the compression chamber.

The refrigeration cycle apparatus can improve the operation efficiency of a refrigeration cycle while using a scroll compressor.

(6) Sixth Group

For a case where a refrigerant containing at least 1,2-difluoroethylene is used as a refrigerant having a sufficiently low GWP, using a refrigeration cycle apparatus or its component device having any pressure resistance strength is not considered or suggested at all.

For example, for a refrigeration cycle apparatus in which a refrigerant, such as R410A and R32 that are often used so far, when existing connection pipes are used, and the refrigerant is replaced with a refrigerant containing at least 1,2-difluoroethylene, there are concerns about occurrence of damage to the existing connection pipes if a device that is a component of the refrigeration cycle apparatus operates under a pressure exceeding the withstanding pressure of the existing connection pipes.

The contents of the present disclosure are described in view of the above-described points, and it is an object to provide a heat source unit and a refrigeration cycle apparatus that are able to reduce damage to a connection pipe when a refrigerant containing at least 1,2-difluoroethylene is used.

A heat source unit according to a first aspect of sixth group includes a compressor and a heat source-side heat exchanger. The heat source unit is connected via a connection pipe to a service unit and is a component of a refrigeration cycle apparatus. The service unit includes a service-side heat exchanger. In the heat source unit, a refrigerant containing at least 1,2-difluoroethylene is used as a refrigerant. A design pressure of the heat source unit is lower than 1.5 times a design pressure of the connection pipe.

A "design pressure" means a gauge pressure (hereinafter, the same applies).

Since the heat source unit has a design pressure lower than 1.5 times the design pressure of the connection pipe, the heat source unit is operated at a pressure lower than a withstanding pressure of the connection pipe. Therefore, even when the heat source unit is connected to the connection pipe and used, damage to the connection pipe can be reduced.

A refrigeration cycle apparatus according to a second aspect of sixth group includes a service unit, a connection pipe, and the heat source unit of the first aspect. In the refrigeration cycle apparatus, a refrigerant containing at least 1,2-difluoroethylene is used. The design pressure of the heat source unit is equivalent to a design pressure in a refrigeration cycle apparatus in which refrigerant R22 or refrigerant R407C is used.

Here, the "equivalent" pressure preferably falls within the range of ±10% of the design pressure in a refrigeration cycle apparatus in which refrigerant R22 or refrigerant R407C is used.

With this refrigeration cycle apparatus, even when a refrigeration cycle apparatus in which refrigerant R22 or refrigerant R407C is used is modified to a refrigeration cycle apparatus in which a refrigerant containing at least 1,2-difluoroethylene is used while the original connection pipe is used, damage to the connection pipe can be reduced when the design pressure of the heat source unit, equivalent to or the same as that of the pre-modified one, is used.

A refrigeration cycle apparatus according to a third aspect of sixth group is the refrigeration cycle apparatus of the second aspect of sixth group, and the design pressure of the heat source unit is higher than or equal to 3.0 MPa and lower than or equal to 3.7 MPa.

A refrigeration cycle apparatus according to a fourth aspect of sixth group includes a service unit, a connection pipe, and the heat source unit of the first aspect. In the refrigeration cycle apparatus, a refrigerant containing at least 1,2-difluoroethylene is used. The design pressure of the heat source unit is equivalent to a design pressure in a refrigeration cycle apparatus in which refrigerant R410A or refrigerant R32 is used.

Here, the "equivalent" pressure preferably falls within the range of ±10% of the design pressure in a refrigeration cycle apparatus in which refrigerant R410A or refrigerant R32 is used.

With this refrigeration cycle apparatus, even when a refrigeration cycle apparatus in which refrigerant R410A or refrigerant R32 is used is modified to a refrigeration cycle apparatus in which a refrigerant containing at least 1,2-difluoroethylene is used while the original connection pipe is used, damage to the connection pipe can be reduced when the design pressure of the heat source unit, equivalent to or the same as that of the pre-modified one, is used.

A refrigeration cycle apparatus according to a fifth aspect of sixth group is the refrigeration cycle apparatus of the fourth aspect of sixth group, and the design pressure of the heat source unit is higher than or equal to 4.0 MPa and lower than or equal to 4.8 MPa.

A refrigeration cycle apparatus according to a sixth aspect of sixth group includes a heat source unit, a service unit, and a connection pipe. The heat source unit includes a compressor and a heat source-side heat exchanger. The service unit includes a service-side heat exchanger. The connection pipe connects the heat source unit and the service unit. In the refrigeration cycle apparatus, a refrigerant containing at least 1,2-difluoroethylene is used. A design pressure of the heat source unit is equivalent to a design pressure in a refrigeration cycle apparatus in which refrigerant R22 or refrigerant R407C is used.

Here, the "equivalent" pressure preferably falls within the range of ±10% of the design pressure in a refrigeration cycle apparatus in which refrigerant R22 or refrigerant R407C is used.

With this refrigeration cycle apparatus, even when a refrigeration cycle apparatus in which refrigerant R22 or refrigerant R407C is used is modified to a refrigeration cycle apparatus in which a refrigerant containing at least 1,2-difluoroethylene is used while the original connection pipe is used, damage to the connection pipe can be reduced when the design pressure of the heat source unit, equivalent to or the same as that of the pre-modified one, is used.

A refrigeration cycle apparatus according to a seventh aspect of sixth group is the refrigeration cycle apparatus of the sixth aspect of sixth group, and the design pressure of the heat source unit is higher than or equal to 3.0 MPa and lower than or equal to 3.7 MPa.

A refrigeration cycle apparatus according to an eighth aspect of sixth group includes a heat source unit, a service unit, and a connection pipe. The heat source unit includes a compressor and a heat source-side heat exchanger. The service unit includes a service-side heat exchanger. The connection pipe connects the heat source unit and the service unit. In the refrigeration cycle apparatus, a refrigerant containing at least 1,2-difluoroethylene is used. A design pressure of the heat source unit is equivalent to a design pressure in a refrigeration cycle apparatus in which refrigerant R410A or refrigerant R32 is used.

Here, the "equivalent" pressure preferably falls within the range of ±10% of the design pressure in a refrigeration cycle apparatus in which refrigerant R410A or refrigerant R32 is used.

With this refrigeration cycle apparatus, even when a refrigeration cycle apparatus in which refrigerant R410A or refrigerant R32 is used is modified to a refrigeration cycle apparatus in which a refrigerant containing at least 1,2-difluoroethylene is used while the original connection pipe is used, damage to the connection pipe can be reduced when the design pressure of the heat source unit, equivalent to or the same as that of the pre-modified one, is used.

A refrigeration cycle apparatus according to a ninth aspect of sixth group is the refrigeration cycle apparatus of the eighth aspect of sixth group, and the design pressure of the heat source unit is higher than or equal to 4.0 MPa and lower than or equal to 4.8 MPa.

A heat source unit according to a tenth aspect of sixth group includes a compressor, a heat source-side heat exchanger, and a control device. The heat source unit is connected via a connection pipe to a service unit and is a component of a refrigeration cycle apparatus. The service unit includes a service-side heat exchanger. In the heat source unit, a refrigerant containing at least 1,2-difluoroethylene is used as a refrigerant. The control device is configured to set or be able to set an upper limit of a controlled pressure of the refrigerant such that the upper limit is lower than 1.5 times a design pressure of the connection pipe.

The heat source unit is configured to set or be able to set an upper limit of a controlled pressure of the refrigerant made by the control device such that the upper limit is lower than 1.5 times a design pressure of the connection pipe. Therefore, even when the heat source unit is connected to the connection pipe and used, operation control is ensured at a pressure lower than the withstanding pressure of the connection pipe, so damage to the connection pipe can be reduced.

A refrigeration cycle apparatus according to an eleventh aspect of sixth group includes a service unit, a connection pipe, and the heat source unit of the tenth aspect of sixth group. In the refrigeration cycle apparatus, a refrigerant containing at least 1,2-difluoroethylene is used. The control device is configured to set or be able to set an upper limit of a controlled pressure of the refrigerant such that the upper limit is equivalent to an upper limit of a controlled pressure in a refrigeration cycle apparatus in which refrigerant R22 or refrigerant R407C is used.

Here, the "equivalent" pressure preferably falls within the range of ±10% of the controlled pressure in a refrigeration cycle apparatus in which refrigerant R22 or refrigerant R407C is used.

With this refrigeration cycle apparatus, even when a refrigeration cycle apparatus in which refrigerant R22 or refrigerant R407C is used is modified to a refrigeration cycle apparatus in which a refrigerant containing at least 1,2-difluoroethylene is used while the original connection pipe is used, the refrigeration cycle apparatus is configured to set or be able to set the upper limit of the controlled pressure of the refrigerant by the control device of the heat source unit such that the upper limit is equal to or the same as the upper limit of the controlled pressure of the heat source unit in a refrigeration cycle apparatus in which refrigerant R22 or refrigerant R407C is used, so damage to the connection pipe can be reduced.

A refrigeration cycle apparatus according to a twelfth aspect of sixth group is the refrigeration cycle apparatus of the eleventh aspect of sixth group, and the upper limit of the controlled pressure is set to be higher than or equal to 3.0 MPa and lower than or equal to 3.7 MPa.

A refrigeration cycle apparatus according to a thirteenth aspect of sixth group includes a service unit, a connection pipe, and the heat source unit of the tenth aspect. In the refrigeration cycle apparatus, a refrigerant containing at least 1,2-difluoroethylene is used. The control device is configured to set or be able to set an upper limit of a controlled pressure of the refrigerant such that the upper limit is equivalent to an upper limit of a controlled pressure in a refrigeration cycle apparatus in which refrigerant R410A or refrigerant R32 is used.

Here, the "equivalent" pressure preferably falls within the range of ±10% of the controlled pressure in a refrigeration cycle apparatus in which refrigerant R410A or refrigerant R32 is used.

With this refrigeration cycle apparatus, even when a refrigeration cycle apparatus in which refrigerant R410A or refrigerant R32 is used is modified to a refrigeration cycle apparatus in which a refrigerant containing at least 1,2-difluoroethylene is used while the original connection pipe is used, the refrigeration cycle apparatus is configured to set or be able to set the upper limit of the controlled pressure of the refrigerant by the control device of the heat source unit such that the upper limit is equal to or the same as the upper limit of the controlled pressure of the heat source unit in a refrigeration cycle apparatus in which refrigerant R410A or refrigerant R32 is used, so damage to the connection pipe can be reduced.

A refrigeration cycle apparatus according to a fourteenth aspect of sixth group is the refrigeration cycle apparatus of the thirteenth aspect of sixth group, and the upper limit of the controlled pressure is set to be higher than or equal to 4.0 MPa and lower than or equal to 4.8 MPa.

A refrigeration cycle apparatus according to a fifteenth aspect of sixth group includes a heat source unit, a service unit, a connection pipe, and a control device. The heat source unit includes a compressor and a heat source-side heat exchanger. The service unit includes a service-side heat exchanger. The connection pipe connects the heat source unit and the service unit. In the refrigeration cycle apparatus, a refrigerant containing at least 1,2-difluoroethylene is used. The control device is configured to set or be able to set an upper limit of a controlled pressure of the refrigerant such that the upper limit is equivalent to an upper limit of a controlled pressure in a refrigeration cycle apparatus in which refrigerant R22 or refrigerant R407C is used.

Here, the "equivalent" pressure preferably falls within the range of ±10% of the controlled pressure in a refrigeration cycle apparatus in which refrigerant R22 or refrigerant R407C is used.

With this refrigeration cycle apparatus, even when a refrigeration cycle apparatus in which refrigerant R22 or refrigerant R407C is used is modified to a refrigeration cycle apparatus in which a refrigerant containing at least 1,2-difluoroethylene is used while the original connection pipe is used, the refrigeration cycle apparatus is configured to set or be able to set the upper limit of the controlled pressure of the refrigerant by the control device of the heat source unit such that the upper limit is equal to or the same as the upper limit of the controlled pressure of the heat source unit in a refrigeration cycle apparatus in which refrigerant R22 or refrigerant R407C is used, so damage to the connection pipe can be reduced.

A refrigeration cycle apparatus according to a sixteenth aspect of sixth group is the refrigeration cycle apparatus of the fifteenth aspect of sixth group, and the upper limit of the controlled pressure is set to be higher than or equal to 3.0 MPa and lower than or equal to 3.7 MPa.

A refrigeration cycle apparatus according to a seventeenth aspect of sixth group includes a heat source unit, a service unit, a connection pipe, and a control device. The heat source unit includes a compressor and a heat source-side heat exchanger. The service unit includes a service-side heat exchanger. The connection pipe connects the heat source unit and the service unit. In the refrigeration cycle apparatus, a refrigerant containing at least 1,2-difluoroethylene is used. The control device is configured to set or be able to set an upper limit of a controlled pressure of the refrigerant such that the upper limit is equivalent to an upper limit of a controlled pressure in a refrigeration cycle apparatus in which refrigerant R410A or refrigerant R32 is used.

Here, the "equivalent" pressure preferably falls within the range of ±10% of the controlled pressure in a refrigeration cycle apparatus in which refrigerant R410A or refrigerant R32 is used.

With this refrigeration cycle apparatus, even when a refrigeration cycle apparatus in which refrigerant R410A or refrigerant R32 is used is modified to a refrigeration cycle apparatus in which a refrigerant containing at least 1,2-difluoroethylene is used while the original connection pipe is used, the refrigeration cycle apparatus is configured to set or be able to set the upper limit of the controlled pressure of the refrigerant by the control device of the heat source unit such that the upper limit is equal to or the same as the upper limit of the controlled pressure of the heat source unit in a refrigeration cycle apparatus in which refrigerant R410A or refrigerant R32 is used, so damage to the connection pipe can be reduced.

A refrigeration cycle apparatus according to an eighteenth aspect of sixth group is the refrigeration cycle apparatus of the seventeenth aspect of sixth group, and the upper limit of the controlled pressure is set to be higher than or equal to 4.0 MPa and lower than or equal to 4.8 MPa.

(7) Seventh Group

Low-GWP refrigerants include flammable refrigerants. In air-conditioning units, an electric heater having a high electric power consumption can be used for various purposes. In this way, in air-conditioning units in which an electric heater having a high electric power consumption is used, it is desired to suppress ignition at the electric heater even when leakage of flammable refrigerant occurs.

The contents of the present disclosure are described in view of the above-described points, and it is an object to provide an air-conditioning unit that is able to suppress ignition at an electric heater even when leakage of refrigerant occurs while a low-GWP refrigerant is used.

An air-conditioning unit according to a first aspect of seventh group includes a casing, a device, and an electric heater. The device is provided inside the casing. The electric heater is provided inside the casing. The device is a compressor configured to compress refrigerant containing 1,2-difluoroethylene and/or a heat exchanger configured to exchange heat between outside air and refrigerant containing 1,2-difluoroethylene. An electric power consumption of the electric heater is lower than or equal to 300 W.

The air-conditioning unit is not limited and may be, for example, a heat source unit or a service unit in a refrigeration cycle apparatus, such as an air conditioner in which the heat source unit, such as an outdoor unit, and the service unit, such as an indoor unit, are connected via a connection pipe. The heat source unit may include only the heat exchanger, and the compressor may be provided in a different unit.

In this air-conditioning unit, the compressor configured to compress refrigerant containing 1,2-difluoroethylene and/or the heat exchanger configured to exchange heat between outside air and refrigerant containing 1,2-difluoroethylene is accommodated together with the electric heater in the casing; however, the electric power consumption of the electric heater is lower than or equal to 300 W. Therefore, if the above-described refrigerant leaks, ignition at the electric heater is suppressed.

An air-conditioning unit according to a second aspect of seventh group is the air-conditioning unit of the first aspect of seventh group, and the casing has an air outlet for discharging air having passed through the heat exchanger at a side in an installation state. The electric power consumption of the electric heater is higher than or equal to 75 W.

Since the electric power consumption of the electric heater is higher than or equal to 75 W in this air-conditioning unit, the function of the electric heater is easily exercised.

An air-conditioning unit according to a third aspect of seventh group is the air-conditioning unit of the second aspect of seventh group and has a single fan configured to form air flow passing through the heat exchanger. The electric power consumption of the electric heater is higher than or equal to 75 W and lower than or equal to 100 W.

Preferably, an internal volume (the volume of fluid that can be filled inside) of the heat exchanger of the air-conditioning unit including only a single fan is greater than or equal to 0.4 Land less than 3.5 L. Specifically, for the one in which no refrigerant container (which is a low-pressure receiver, a high-pressure receiver, or the like, except an accumulator attached to the compressor) in a refrigerant circuit in which the air-conditioning unit is used, the internal volume is preferably greater than or equal to 0.4 L and less than or equal to 2.5 L; for the one in which a refrigerant container is provided in a refrigerant circuit (preferably, the number of service units, such as indoor units, is one), the internal volume is preferably greater than or equal to 1.4 L and less than 3.5 L.

Since this air-conditioning unit has a capacity to such a degree that only a single fan is provided, even when the electric power consumption of the electric heater is lower than or equal to 100 W, the function of the electric heater is sufficiently exercised.

An air-conditioning unit according to a fourth aspect of seventh group is the air-conditioning unit of the second aspect of seventh group and has two fans configured to form air flow passing through the heat exchanger. The electric power consumption of the electric heater is higher than or equal to 100 W.

Preferably, an internal volume (the volume of fluid that can be filled inside) of the heat exchanger of the air-conditioning unit including two fans is greater than or equal to 3.5 L and less than or equal to 7.0 L. Specifically, for the one in which one or multiple service units, such as indoor units including no expansion valve are provided in a refrigerant circuit in which an air-conditioning unit is used, the internal volume is preferably greater than or equal to 3.5 L and less than 5.0 L; for the one in which multiple service units, such as indoor units including an expansion valve are provided in a refrigerant circuit, the internal volume is preferably greater than or equal to 5.0 L and less than or equal to 7.0 L.

Since this air-conditioning unit includes two fans, the capacity of the air-conditioning unit is large, and a large-capacity electric heater tends to be required. Here, the electric power consumption of the electric heater is higher than or equal to 100 W, so the function of the electric heater can be sufficiently exercised appropriately for the capacity of the air-conditioning unit.

An air-conditioning unit according to a fifth aspect of seventh group is the air-conditioning unit of the first aspect of seventh group, and the casing has an air outlet for upwardly discharging air having passed through the heat exchanger. The electric power consumption of the electric heater is higher than or equal to 200 W.

Preferably, an internal volume (the volume of fluid that can be filled inside) of the heat exchanger of the air-conditioning unit that upwardly discharges air having passed through the heat exchanger is greater than or equal to 5.5 L and less than or equal to 38 L. Preferably, the one in which the internal volume of the heat exchanger is greater than or equal to 5.5 L and less than or equal to 38 L in this way is employed in the one in which multiple service units, such as indoor units including an expansion valve, are provided in a refrigerant circuit.

Since this air-conditioning unit upwardly sends air having passed through the heat exchanger, the capacity of the air-conditioning unit is large, and a large-capacity electric heater tends to be required. Here, the electric power consumption of the electric heater is higher than or equal to 200 W, so the function of the electric heater can be sufficiently exercised appropriately for the capacity of the air-conditioning unit.

An air-conditioning unit according to a sixth aspect of seventh group is the air-conditioning unit of any one of the first aspect to the fifth aspect of seventh group, and the electric heater is at least any one of a drain pan heater, a crankcase heater, and a refrigerant heater.

When this air-conditioning unit includes a drain pan heater, freezing of dew condensation water on a drain pan can be suppressed in the air-conditioning unit including the drain pan. When the air-conditioning unit includes a crankcase heater, generation of bubbles of refrigerating machine oil (oil foaming) at the startup of the compressor can be suppressed in the air-conditioning unit including the compressor. When the air-conditioning unit includes a refrigerant heater, refrigerant in the refrigerant circuit can be heated.

(8) Eighth Group

An example of an index concerning prevention of global warming may be an index called life cycle climate performance (LCCP). The LCCP is an index concerning prevention of global warming, and is a numerical value obtained by adding an energy consumption when greenhouse effect gases to be used are manufactured (indirect impact) and a leakage to the outside air (direct impact) to a total equivalent warning impact (TEWI). The unit of the LCCP is kg-$CO_2$. That is, the TEWI is obtained by adding a direct impact and an indirect impact calculated using respective predetermined mathematical expressions. The LCCP is calculated using the following relational expression.

$$\mathrm{LCCP}=\mathrm{GWPRM}\times W+\mathrm{GWP}\times W\times(1-R)+N\times Q\times A$$

In the expression, GWPRM is a warming effect relating to manufacturing of a refrigerant, W is a refrigerant filling amount, R is a refrigerant recovery amount when an apparatus is scrapped, N is a duration of using the apparatus (year), Q is an emission intensity of $CO_2$, and A is an annual power consumption.

Regarding the LCCP of the refrigeration cycle apparatus, when the filling amount in the refrigerant circuit is too small, an insufficiency of the refrigerant decreases cycle efficiency, resulting in an increase in the LCCP; and when the filling amount in the refrigerant circuit is too large, the impact of the GWP increases, resulting in an increase in the LCCP. Moreover, a refrigerant having a lower GWP than R32 which has been frequently used tends to have a low heat-transfer capacity, and tends to have a large LCCP as the result of the decrease in cycle efficiency.

The content of the present disclosure aims at the above-described point and an object of the present disclosure is to provide a refrigeration cycle apparatus capable of keeping a LCCP low when a heat cycle is performed using a sufficiently small-GWP refrigerant, and a method of determining a refrigerant enclosure amount in the refrigeration cycle apparatus.

A refrigeration cycle apparatus according to a first aspect of eighth group includes a heat source unit, a service unit, and a refrigerant pipe. The heat source unit includes a compressor and a heat-source-side heat exchanger. The service unit includes a service-side heat exchanger. The refrigerant pipe connects the heat source unit and the service unit to each other. A refrigerant containing at least 1,2-difluoroethylene is enclosed in a refrigerant circuit that is constituted by connecting the compressor, the heat-source-side heat exchanger, and the service-side heat exchanger to one another. An enclosure amount of the refrigerant in the refrigerant circuit satisfies a condition of 160 g or more and 560 g or less per 1 kW of refrigeration capacity of the refrigeration cycle apparatus.

Note that the refrigeration capacity of the refrigeration cycle apparatus represents a rated refrigeration capacity.

Since the refrigerant containing at least 1,2-difluoroethylene is enclosed in the refrigerant circuit by an amount of 160 g or more and 560 g or less per 1 kW of refrigeration capacity, when the refrigeration cycle apparatus performs a heat cycle using a refrigerant with a sufficiently small GWP, the LCCP can be kept low.

Note that, for the inner capacity (the volume of a fluid with which the inside can be filled) of the heat-source-side heat exchanger, when the refrigerant circuit is not provided with a refrigerant container (for example, a low-pressure receiver or a high-pressure receiver, excluding an accumulator belonging to a compressor), the inner capacity is preferably 0.4 L or more and 2.5 L or less. When the refrigerant circuit is provided with a refrigerant container, the inner capacity is preferably 1.4 L or more and less than 5.0 L.

Moreover, for the inner capacity (the volume of a fluid with which the inside can be filled) of the heat-source-side heat exchanger included in the heat source unit provided with only one fan, when the heat source unit has a casing having a blow-out port for blowing out the air which has passed through the heat-source-side heat exchanger in a side surface in an installed state (when the heat source unit is trunk type or the like), the inner capacity is preferably 0.4 L or more and less than 3.5 L. For the inner capacity (the volume of a fluid with which the inside can be filled) of the heat-source-side heat exchanger included in the heat source unit provided with two fans, when the heat source unit has a casing having a blow-out port for blowing out the air which has passed through the heat-source-side heat exchanger in a side surface in an installed state (when the heat source unit is trunk type or the like), the inner capacity is preferably 3.5 L or more and less than 5.0 L.

A refrigeration cycle apparatus according to a second aspect of eighth group includes a heat source unit, a first service unit, a second service unit, and a refrigerant pipe. The heat source unit includes a compressor and a heat-source-side heat exchanger. The first service unit includes a first service-side heat exchanger. The second service unit includes a second service-side heat exchanger. The refrigerant pipe connects the heat source unit, the first service unit, and the second service unit to one another. A refrigerant containing at least 1,2-difluoroethylene is enclosed in a refrigerant circuit that is constituted by connecting the first service-side heat exchanger and the second service-side heat exchanger in parallel to the compressor and the heat-source-side heat exchanger. An enclosure amount of the refrigerant in the refrigerant circuit per 1 kW of refrigeration capacity satisfies a condition of 190 g or more and 1660 g or less.

Since the refrigerant containing at least 1,2-difluoroethylene is enclosed in the refrigerant circuit including the plurality of service-side heat exchangers connected in parallel to each other, by an amount of 190 g or more and 1660 g or less per 1 kW of refrigeration capacity, when the refrigeration cycle apparatus performs a heat cycle using a refrigerant with a sufficiently small GWP, the LCCP can be kept low.

Note that, for the inner capacity (the volume of a fluid with which the inside can be filled) of the heat-source-side heat exchanger, when the first service unit does not have an expansion valve on the liquid side of the first service-side heat exchanger and the second service unit also does not have an expansion valve on the liquid side of the second service-side heat exchanger, the inner capacity is preferably 1.4 L or more and less than 5.0 L. When the first service unit has an expansion valve on the liquid side of the first service-side heat exchanger and the second service unit also has an expansion valve on the liquid side of the second service-side heat exchanger, the inner capacity is preferably 5.0 L or more and 38 L or less.

Moreover, for the inner capacity (the volume of a fluid with which the inside can be filled) of the heat-source-side heat exchanger included in the heat source unit provided with only one fan, when the heat source unit has a casing having a blow-out port for blowing out the air which has passed through the heat-source-side heat exchanger in a side surface in an installed state (when the heat source unit is trunk type or the like), the inner capacity is preferably 0.4 L or more and less than 3.5 L. For the inner capacity (the volume of a fluid with which the inside can be filled) of the heat-source-side heat exchanger included in the heat source unit provided with two fans, when the heat source unit has a casing having a blow-out port for blowing out the air which has passed through the heat-source-side heat exchanger in a side surface in an installed state (when the heat source unit is trunk type or the like), the inner capacity is preferably 3.5 L or more and 7.0 L or less. For the inner capacity (the volume of a fluid with which the inside can be filled) of the heat-source-side heat exchanger included in the heat source unit that blows out upward the air which has passed through the heat-source-side heat exchanger, the inner capacity is preferably 5.5 L or more and 38 L or less.

(9) Ninth Group

For existing refrigeration cycle apparatuses in which R410A or R32 is used, the pipe outer diameter of each of a liquid-side connection pipe and a gas-side connection pipe that connect a heat source unit having a heat source-side heat exchanger and a service unit having a service-side heat exchanger is specifically considered and suggested.

However, for a refrigeration cycle apparatus using a refrigerant containing at least 1,2-difluoroethylene as a refrigerant having a sufficiently low GWP, the pipe outer diameter of the liquid-side connection pipe or gas-side connection pipe is not considered or suggested at all.

The contents of the present disclosure are described in view of the above-described points, and it is an object to provide a refrigeration cycle apparatus that is able to suppress a decrease in capacity when a refrigerant containing at least 1,2-difluoroethylene is used.

A refrigeration cycle apparatus according to a first aspect of ninth group includes a refrigerant circuit in which a compressor, a heat source-side heat exchanger, a decompression part, a liquid-side connection pipe, a service-side heat exchanger, and a gas-side connection pipe are connected. In the refrigeration cycle apparatus, a refrigerant containing at least 1,2-difluoroethylene is used. A pipe outer diameter of the liquid-side connection pipe and a pipe outer diameter of the gas-side connection pipe each are $D_0/8$ inches (where, "$D_0-1/8$ inches" is a pipe outer diameter of a connection pipe when refrigerant R32 is used), in the liquid-side connection pipe, a range of the $D_0$ is "$2\leq D_0\leq 4$", and, in the gas-side connection pipe, a range of the $D_0$ is "$3\leq_0\leq 8$".

The decompression part is not limited and may be an expansion valve or may be a capillary tube. Preferably, in the liquid-side connection pipe, a range of the $D_0$ is "$2\leq D_0\leq 3$", and, in the gas-side connection pipe, a range of the $D_0$ is "$4\leq D_0\leq 7$".

This refrigeration cycle apparatus is able to suppress a decrease in capacity while sufficiently reducing a GWP by using a refrigerant containing 1,2-difluoroethylene.

The refrigeration cycle apparatus according to the first aspect of ninth group may be configured as follows in consideration of the difference in physical properties between the refrigerant of the present disclosure and refrigerant R32.

In the refrigeration cycle apparatus according to the first aspect of ninth group, a rated refrigeration capacity of the refrigeration cycle apparatus may be greater than or equal to 6.3 kW and less than or equal to 10.0 kW, the pipe outer diameter of the liquid-side connection pipe may be $D_0/8$ inches (where, "$D_0-1/8$ inches" is the pipe outer diameter of the liquid-side connection pipe when refrigerant R32 is used), and the $D_0$ of the liquid-side connection pipe may be 3.

In the refrigeration cycle apparatus according to the first aspect of ninth group, a rated refrigeration capacity of the refrigeration cycle apparatus may be less than or equal to 4.0 kW, the pipe outer diameter of the gas-side connection pipe may be $D_0/8$ inches (where, "$D_0-1/8$ inches" is the pipe outer diameter of the gas-side connection pipe when refrigerant R32 is used), and the $D_0$ of the gas-side connection pipe may be 4.

In the refrigeration cycle apparatus according to the first aspect of ninth group, a rated refrigeration capacity of the refrigeration cycle apparatus may be greater than or equal to 6.3 kW and less than or equal to 10.0 kW, the pipe outer diameter of the gas-side connection pipe may be $D_0/8$ inches (where, "$D_0-1/8$ inches" is the pipe outer diameter of the gas-side connection pipe when refrigerant R32 is used), and the $D_0$ of the gas-side connection pipe may be 5.

In the refrigeration cycle apparatus according to the first aspect of ninth group, a rated refrigeration capacity of the refrigeration cycle apparatus may be greater than or equal to 15.0 kW and less than or equal to 19.0 kW, the pipe outer diameter of the gas-side connection pipe may be $D_0/8$ inches (where, "$D_0-1/8$ inches" is the pipe outer diameter of the gas-side connection pipe when refrigerant R32 is used), and the $D_0$ of the gas-side connection pipe may be 6.

In the refrigeration cycle apparatus according to the first aspect of ninth group, a rated refrigeration capacity of the refrigeration cycle apparatus may be greater than or equal to 25.0 kW, the pipe outer diameter of the gas-side connection pipe may be $D_0/8$ inches (where, "$D_0-1/8$ inches" is the pipe outer diameter of the gas-side connection pipe when refrigerant R32 is used), and the $D_0$ of the gas-side connection pipe may be 7.

A refrigeration cycle apparatus according to a second aspect of ninth group is the refrigeration cycle apparatus of the first aspect of ninth group, a rated refrigeration capacity of the refrigeration cycle apparatus is greater than 5.6 kW and less than 11.2 kW, and the $D_0$ of the liquid-side connection pipe is 3 (that is, a pipe diameter is 3/8 inches). Preferably, a rated refrigeration capacity of the refrigeration cycle apparatus is greater than or equal to 6.3 kW and less than or equal to 10.0 kW, and the $D_0$ of the liquid-side connection pipe is 3 (that is, a pipe diameter is 3/8 inches).

A refrigeration cycle apparatus according to a third aspect of ninth group is the refrigeration cycle apparatus of the first aspect of ninth group, a rated refrigeration capacity of the refrigeration cycle apparatus is greater than 22.4 kW, and the $D_0$ of the gas-side connection pipe is 7 (that is, a pipe diameter is 7/8 inches), or the rated refrigeration capacity of the refrigeration cycle apparatus is greater than 14.0 kW and less than 22.4 kW, and the $D_0$ of the gas-side connection pipe is 6 (that is, the pipe diameter is 6/8 inches), or the rated refrigeration capacity of the refrigeration cycle apparatus is greater than 5.6 kW and less than 11.2 kW, and the $D_0$ of the gas-side connection pipe is 5 (that is, the pipe diameter is 5/8 inches), or the rated refrigeration capacity of the refrigeration cycle apparatus is less than 4.5 kW, and the $D_0$ of the gas-side connection pipe is 4 (that is, the pipe diameter is 1/2 inches). Preferably, a rated refrigeration capacity of the refrigeration cycle apparatus is greater than or equal to 25.0 kW, and the $D_0$ of the gas-side connection pipe is 7 (that is, a pipe diameter is 7/8 inches), or the rated refrigeration capacity of the refrigeration cycle apparatus is greater than or equal to 15.0 kW and less than 19.0 kW, and the $D_0$ of the gas-side connection pipe is 6 (that is, the pipe diameter is 6/8 inches), or the rated refrigeration capacity of the refrigeration cycle apparatus is greater than or equal to 6.3 kW and less than 10.0 kW, and the $D_0$ of the gas-side connection pipe is 5 (that is, the pipe diameter is 5/8 inches), or the rated refrigeration capacity of the refrigeration cycle apparatus is less than 4.0 kW, and the $D_0$ of the gas-side connection pipe is 4 (that is, the pipe diameter is 1/2 inches).

A refrigeration cycle apparatus according to a fourth aspect of ninth group includes a refrigerant circuit in which a compressor, a heat source-side heat exchanger, a decompression part, a liquid-side connection pipe, a service-side heat exchanger, and a gas-side connection pipe are connected. In the refrigeration cycle apparatus, a refrigerant containing at least 1,2-difluoroethylene is used. A pipe outer diameter of the liquid-side connection pipe and a pipe outer diameter of the gas-side connection pipe each are $D_0/8$ inches, in the liquid-side connection pipe, a range of the $D_0$ is "$2 \le D_0 \le 4$", and, in the gas-side connection pipe, a range of the $D_0$ is "$3 \le D_0 \le 8$". The pipe outer diameter of the liquid-side connection pipe is same as a pipe outer diameter of a liquid-side connection pipe when refrigerant R410A is used, and the pipe outer diameter of the gas-side connection pipe is same as a pipe outer diameter of a gas-side connection pipe when refrigerant R410A is used.

The decompression part is not limited and may be an expansion valve or may be a capillary tube. Preferably, in the liquid-side connection pipe, a range of the $D_0$ is "$2 \le D_0 \le 3$", and, in the gas-side connection pipe, a range of the $D_0$ is "$4 \le D_0 \le 7$".

This refrigeration cycle apparatus is able to suppress a decrease in capacity while sufficiently reducing a GWP by using a refrigerant containing 1,2-difluoroethylene.

A refrigeration cycle apparatus according to a fifth aspect of ninth group is the refrigeration cycle apparatus of the fourth aspect of ninth group, and the $D_0$ of the liquid-side connection pipe is 2 (that is, a pipe diameter is 1/4 inches).

A refrigeration cycle apparatus according to a sixth aspect of ninth group is the refrigeration cycle apparatus of the fourth aspect of ninth group, a rated refrigeration capacity of the refrigeration cycle apparatus is greater than or equal to 6.3 kW and the $D_0$ of the liquid-side connection pipe is 3 (that is, a pipe diameter is 3/8 inches), or the rated refrigeration capacity of the refrigeration cycle apparatus is less than 6.3 kW and the $D_0$ of the liquid-side connection pipe is 2 (that is, the pipe diameter is 1/4 inches).

A refrigeration cycle apparatus according to a seventh aspect of ninth group is the refrigeration cycle apparatus of the fourth aspect of ninth group, a rated refrigeration capacity of the refrigeration cycle apparatus is greater than or equal to 6.0 kW and the $D_0$ of the gas-side connection pipe is 4 (that is, a pipe diameter is 1/2 inches), or the rated refrigeration capacity of the refrigeration cycle apparatus is less than 6.0 kW and the $D_0$ of the gas-side connection pipe is 3 (that is, the pipe diameter is 3/8 inches).

A refrigeration cycle apparatus according to an eighth aspect of ninth group is the refrigeration cycle apparatus of the fourth aspect of ninth group, a rated refrigeration capacity of the refrigeration cycle apparatus is greater than or equal to 25.0 kW, and the $D_0$ of the gas-side connection pipe is 7 (that is, a pipe diameter is ⅞ inches), or the rated refrigeration capacity of the refrigeration cycle apparatus is greater than or equal to 15.0 kW and less than 25.0 kW, and the $D_0$ of the gas-side connection pipe is 6 (that is, the pipe diameter is 6/8 inches), or the rated refrigeration capacity of the refrigeration cycle apparatus is greater than or equal to 6.3 kW and less than 15.0 kW, and the $D_0$ of the gas-side connection pipe is 5 (that is, the pipe diameter is ⅝ inches), or the rated refrigeration capacity of the refrigeration cycle apparatus is less than 6.3 kW, and the $D_0$ of the gas-side connection pipe is 4 (that is, the pipe diameter is ½ inches).

A refrigeration cycle apparatus according to a ninth aspect of ninth group includes a refrigerant circuit in which a compressor, a heat source-side heat exchanger, a decompression part, a liquid-side connection pipe, a service-side heat exchanger, and a gas-side connection pipe are connected. In the refrigeration cycle apparatus, a refrigerant containing at least 1,2-difluoroethylene is used. A pipe outer diameter of the liquid-side connection pipe and a pipe outer diameter of the gas-side connection pipe each are $D_0/8$ inches, in the liquid-side connection pipe, a range of the $D_0$ is "$2 \leq D_0 \leq 4$", and, in the gas-side connection pipe, a range of the $D_0$ is "$3 \leq D_0 \leq 8$".

The decompression part is not limited and may be an expansion valve or may be a capillary tube. Preferably, in the liquid-side connection pipe, a range of the $D_0$ is "$2 \leq D_0 \leq 3$", and, in the gas-side connection pipe, a range of the $D_0$ is "$4 \leq D_0 \leq 7$".

This refrigeration cycle apparatus is able to suppress a decrease in capacity while sufficiently reducing a GWP by using a refrigerant containing 1,2-difluoroethylene.

A refrigeration cycle apparatus according to a tenth aspect of ninth group is the refrigeration cycle apparatus of the ninth aspect of ninth group, and the $D_0$ of the liquid-side connection pipe is 2 (that is, a pipe diameter is ¼ inches).

A refrigeration cycle apparatus according to an eleventh aspect of ninth group is the refrigeration cycle apparatus of the ninth aspect of ninth group, a rated refrigeration capacity of the refrigeration cycle apparatus is greater than or equal to 7.5 kW, and the $D_0$ of the liquid-side connection pipe is 2.5 (that is, a pipe diameter is 5/16 inches), or the rated refrigeration capacity of the refrigeration cycle apparatus is greater than or equal to 2.6 kW and less than 7.5 kW, and the $D_0$ of the liquid-side connection pipe is 2 (that is, the pipe diameter is ¼ inches), or the rated refrigeration capacity of the refrigeration cycle apparatus is less than 2.6 kW, and the $D_0$ of the liquid-side connection pipe is 1.5 (that is, the pipe diameter is 3/16 inches).

A refrigeration cycle apparatus according to a twelfth aspect of ninth group is the refrigeration cycle apparatus of the ninth aspect of ninth group, a rated refrigeration capacity of the refrigeration cycle apparatus is greater than or equal to 6.3 kW, and the $D_0$ of the liquid-side connection pipe is 3 (that is, a pipe diameter is ⅜ inches), or the rated refrigeration capacity of the refrigeration cycle apparatus is less than 6.3 kW, and the $D_0$ of the liquid-side connection pipe is 2 (that is, the pipe diameter is ¼ inches).

A refrigeration cycle apparatus according to a thirteenth aspect of ninth group is the refrigeration cycle apparatus of the ninth aspect of ninth group, a rated refrigeration capacity of the refrigeration cycle apparatus is greater than or equal to 12.5 kW, and the $D_0$ of the liquid-side connection pipe is 3 (that is, a pipe diameter is ⅜ inches), or the rated refrigeration capacity of the refrigeration cycle apparatus is greater than or equal to 6.3 kW and less than 12.5 kW, and the $D_0$ of the liquid-side connection pipe is 2.5 (that is, the pipe diameter is 5/16 inches), or the rated refrigeration capacity of the refrigeration cycle apparatus is less than 6.3 kW, and the $D_0$ of the liquid-side connection pipe is 2 (that is, the pipe diameter is ¼ inches).

A refrigeration cycle apparatus according to a fourteenth aspect of ninth group is the refrigeration cycle apparatus of the ninth aspect of ninth group, a rated refrigeration capacity of the refrigeration cycle apparatus is greater than or equal to 6.0 kW, and the $D_0$ of the gas-side connection pipe is 4 (that is, a pipe diameter is ½ inches), or the rated refrigeration capacity of the refrigeration cycle apparatus is less than 6.0 kW, and the $D_0$ of the gas-side connection pipe is 3 (that is, the pipe diameter is ⅜ inches).

A refrigeration cycle apparatus according to a fifteenth aspect of ninth group is the refrigeration cycle apparatus of the ninth aspect of ninth group, a rated refrigeration capacity of the refrigeration cycle apparatus is greater than or equal to 6.0 kW, and the $D_0$ of the gas-side connection pipe is 4 (that is, a pipe diameter is ½ inches), or the rated refrigeration capacity of the refrigeration cycle apparatus is greater than or equal to 3.2 kW and less than 6.0 kW, and the $D_0$ of the gas-side connection pipe is 3 (that is, the pipe diameter is ⅜ inches), or the rated refrigeration capacity of the refrigeration cycle apparatus is less than 3.2 kW, and the $D_0$ of the gas-side connection pipe is 2.5 (that is, the pipe diameter is 5/16 inches).

A refrigeration cycle apparatus according to a sixteenth aspect of ninth group is the refrigeration cycle apparatus of the ninth aspect of ninth group, a rated refrigeration capacity of the refrigeration cycle apparatus is greater than or equal to 25.0 kW, and the $D_0$ of the gas-side connection pipe is 7 (that is, a pipe diameter is ⅞ inches), or the rated refrigeration capacity of the refrigeration cycle apparatus is greater than or equal to 15.0 kW and less than 25.0 kW, and the $D_0$ of the gas-side connection pipe is 6 (that is, the pipe diameter is 6/8 inches), or the rated refrigeration capacity of the refrigeration cycle apparatus is greater than or equal to 6.3 kW and less than 15.0 kW, and the $D_0$ of the gas-side connection pipe is 5 (that is, the pipe diameter is ⅝ inches), or the rated refrigeration capacity of the refrigeration cycle apparatus is less than 6.3 kW, and the $D_0$ of the gas-side connection pipe is 4 (that is, the pipe diameter is ½ inches).

(10) Tenth Group

In recent years, from the point of view of environmental protection, a refrigerant (hereinafter referred to as low GWP refrigerant) having low global warming potential (GWP) has been examined as a refrigerant to be used in an air conditioner. As the low GWP refrigerant, a mixed refrigerant containing 1,2-difluoroethylene is firstly presented.

However, the number of prior arts considering from an aspect of high efficiency of an air conditioner that uses the aforementioned refrigerant is small. When the aforementioned refrigerant is to be applied to an air conditioner, there is a problem that how high efficiency of a compressor is achieved.

A compressor according to a first aspect of tenth group includes a compression unit and a motor. The compression unit compresses a mixed refrigerant containing at least 1,2-difluoroethylene. The motor has a rotor including a permanent magnet and drives the compression unit.

Due to the motor having the rotor that includes the permanent magnet, the compressor is suitable for a variable capacity compressor in which the number of rotations of the motor can be changed. In this case, in the air conditioner that uses the mixed refrigerant containing at least 1,2-difluoroethylene, the number of rotations of the motor can be changed in accordance with an air conditioning load, which enables high efficiency of the compressor.

A compressor according to a second aspect of tenth group is the compressor according to the first aspect of tenth group, in which the rotor is a magnet-embedded rotor. In the magnet-embedded rotor, a permanent magnet is embedded in the rotor.

A compressor according to a third aspect of tenth group is the compressor according to the first aspect or the second aspect of tenth group, in which the rotor is formed by laminating a plurality of electromagnetic steel plates in a plate thickness direction. The thickness of each of the electromagnetic steel plates is 0.05 mm or more and 0.5 mm or less.

Generally, the thinner the plate thickness, the more it is possible to reduce the eddy-current loss. The plate thickness is, however, desirably 0.05 to 0.5 mm considering that processing of electromagnetic steel plates is difficult when the plate thickness thereof is less than 0.05 mm and that it takes time for siliconizing from the steel plate surface and diffusing for optimizing Si distribution when the plate thickness thereof is more than 0.5 mm.

A compressor according to a fourth aspect of tenth group is the compressor according to the first aspect or the second aspect of tenth group, in which the rotor is formed by laminating a plurality of plate-shaped amorphous metals in a plate thickness direction.

This compressor realizes a motor having a less iron loss and high efficiency, which enables high efficiency of the compressor.

A compressor according to a fifth aspect of tenth group is the compressor according to the first aspect or the second aspect of tenth group, in which the rotor is formed by laminating a plurality of electromagnetic steel plates in a plate thickness direction, the plurality of electromagnetic steel containing 5 mass % or more of silicon.

This compressor realizes, due to the electromagnetic steel plates in which hysteresis is reduced by containing a suitable amount of silicon, a motor having a less iron loss and high efficiency, which enables high efficiency of the compressor.

A compressor according to a sixth aspect of tenth group is the compressor according to any one of the first aspect to the fifth aspect of tenth group, in which the permanent magnet is a Nd—Fe—B-based magnet.

This compressor realizes a motor capable of increasing a magnetic energy product, which enables high efficiency of the compressor.

A compressor according to a seventh aspect of tenth group is the compressor according to any one of the first aspect to the sixth aspect of tenth group, in which the permanent magnet is formed by diffusing a heavy-rare-earth element along grain boundaries.

This compressor improves demagnetization resistance of the permanent magnet and can increase the holding force of the permanent magnet with a small amount of the heavy-rare-earth element, which enables high efficiency of the compressor.

A compressor according to an eighth aspect of tenth group is the compressor according to the sixth aspect of tenth group, in which the permanent magnet contains 1 mass % or less of dysprosium.

This compressor improves the holding force of the permanent magnet, which enables high efficiency of the compressor.

A compressor according to a ninth aspect of tenth group is the compressor according to any one of the first aspect to the eighth aspect of tenth group, in which the average crystal gain size of the permanent magnet is 10 μm or less.

This compressor improves the demagnetization resistance of the permanent magnet, which enables high efficiency of the compressor.

A compressor according to a tenth aspect of tenth group is the compressor according to the first aspect or the second aspect of tenth group, in which the permanent magnet has a flat shape and in which a plurality of the permanent magnets are embedded in the rotor to form a V-shape. The holding force of a part positioned at the bottom portion of the V-shape is set to be higher than the holding force of other parts by $\{1/(4\pi)\}\times10^3$ [A/m].

This compressor suppresses demagnetization of the permanent magnet, which enables high efficiency of the compressor.

A compressor according to an eleventh aspect of tenth group is the compressor according to the first aspect or the second aspect of tenth group, in which the rotor is formed by laminating a plurality of high-tensile electromagnetic steel plates in a plate thickness direction, the plurality of high-tensile electromagnetic steel each having a tensile strength of 400 MPa or more.

This compressor improves durability of the rotor during high-speed rotation, which enables high efficiency of the compressor.

A compressor according to a twelfth aspect of tenth group is the compressor according to the eleventh aspect of tenth group, in which the permanent magnet forms a flat plate having a predetermined thickness. The rotor has an accommodation hole, a non-magnetic space, and a bridge. A plurality of the permanent magnets are embedded in the accommodation hole.

The non-magnetic space extends from each of end portions of the permanent magnets accommodated in the accommodation hole to the vicinity of the surface of the rotor. The bridge is positioned on the outer side of the non-magnetic space and couples magnetic poles to each other. The thickness of the bridge is 3 mm or more.

This compressor improves durability during high-speed rotation, which enables high efficiency of the compressor.

A compressor according to a thirteenth aspect of tenth group is the compressor according to the first aspect of tenth group, in which the rotor is a surface-magnet rotor. In the surface-magnet rotor, the permanent magnet is affixed to the surface of the rotor.

A refrigeration cycle apparatus according to a fourteenth aspect of the tenth group includes the compressor according to any one of the first through thirteenth aspects of the tenth group.

(11) Eleventh Group

International Publication No. 2015/141678 suggests various types of low-GWP refrigerant mixtures as alternatives to R410A.

As a refrigeration cycle apparatus using R32 as a refrigerant, as described in, for example, PTL 2 (Japanese Unexamined Patent Application Publication No. 2002-054888), setting a pipe diameter of each heat transfer tube of a heat exchanger to greater than or equal to 7 mm and less than or equal to 10 mm is suggested to improve energy efficiency in the case where R32 is used as a refrigerant.

However, in the case where a refrigerant containing at least 1,2-difluoroethylene is used as a refrigerant having a sufficiently low GWP, the pipe diameter of each heat transfer tube of a heat exchanger, which is able to reduce the amount of refrigerant used while a pressure loss is reduced, has not been studied at all.

The contents of the present disclosure are described in view of the above-described points, and it is an object to provide a refrigeration cycle apparatus that is able to reduce the amount of refrigerant used while reducing a pressure loss in the case where a refrigerant containing at least 1,2-difluoroethylene is used.

A refrigeration cycle apparatus according to a first aspect of eleventh group includes a refrigerant circuit and a refrigerant. The refrigerant circuit includes a compressor, a heat source-side heat exchanger, a decompression part, and a service-side heat exchanger. The refrigerant contains at least 1,2-difluoroethylene and is sealed in the refrigerant circuit. The heat source-side heat exchanger has a heat transfer tube of which a pipe diameter is greater than or equal to 6.35 mm and less than 10.0 mm.

The decompression part is not limited and may be an expansion valve or may be a capillary tube.

This refrigeration cycle apparatus is able to sufficiently reduce a GWP by using a refrigerant containing 1,2-difluoroethylene, and reduce the amount of refrigerant used while reducing a pressure loss.

A refrigeration cycle apparatus according to a second aspect of eleventh group is the refrigeration cycle apparatus of the first aspect of eleventh group, and the heat source-side heat exchanger has the heat transfer tube of which the pipe diameter is any one of 6.35 mm, 7.0 mm, 8.0 mm, and 9.5 mm.

A refrigeration cycle apparatus according to a third aspect of eleventh group is the refrigeration cycle apparatus of the first aspect or the second aspect of eleventh group, and the heat source-side heat exchanger has the heat transfer tube of which the pipe diameter is greater than or equal to 7.0 mm.

A refrigeration cycle apparatus according to a fourth aspect of eleventh group includes a refrigerant circuit and a refrigerant. The refrigerant circuit includes a compressor, a heat source-side heat exchanger, a decompression part, and a service-side heat exchanger. The refrigerant contains at least 1,2-difluoroethylene and is sealed in the refrigerant circuit. The service-side heat exchanger has a heat transfer tube of which a pipe diameter is greater than or equal to 4.0 mm and less than 10.0 mm.

This refrigeration cycle apparatus is able to sufficiently reduce a GWP by using a refrigerant containing 1,2-difluoroethylene, and reduce the amount of refrigerant used while reducing a pressure loss.

A refrigeration cycle apparatus according to a fifth aspect of eleventh group is the refrigeration cycle apparatus of the fourth aspect of eleventh group, and the service-side heat exchanger has the heat transfer tube of which the pipe diameter is less than or equal to 8.0 mm.

A refrigeration cycle apparatus according to a sixth aspect of eleventh group is the refrigeration cycle apparatus of the fourth aspect or the fifth aspect of eleventh group, and the service-side heat exchanger has the heat transfer tube of which the pipe diameter is any one of 4.0 mm, 5.0 mm, 6.35 mm, 7.0 mm, and 8.0 mm.

(12) Twelfth Group

In recent years, from the point of view of environmental protection, a refrigerant (hereinafter referred to as GWP refrigerant) having low global warming potential (GWP) has been examined as a refrigerant to be used in an air conditioner. As the low GWP refrigerant, a mixed refrigerant containing 1,2-difluoroethylene is firstly presented.

However, the number of prior arts considering from an aspect of high efficiency of an air conditioner that uses the aforementioned refrigerant is small. When the aforementioned refrigerant is to be applied to an air conditioner, there is a problem that how high power of a compressor is achieved.

A compressor according to a first aspect of twelfth group includes a compression unit that compresses a mixed refrigerant containing at least 1,2-difluoroethylene and an induction motor that drives the compression unit.

Employing an induction motor, as described above, in a compressor that compresses a mixed refrigerant containing at least 1,2-difluoroethylene enables high power at comparatively low costs.

A compressor according to a second aspect of twelfth group is the compressor according to the first aspect of twelfth group, in which a rotor of the induction motor has a plurality of conducting bars that are bar-shaped conductors and that are disposed in an annular form, and an end ring that short-circuits the plurality of conducting bars at an end portion in an axial direction. At least the conducting bars are formed of a metal whose electric resistance is lower than electric resistance of aluminum.

In this compressor, heat generation due to current that flows through the conducting bars of the induction motor is suppressed, and thus, high power is enabled.

A compressor according to a third aspect of twelfth group is the compressor according to the first aspect of twelfth group, in which a rotor of the induction motor has a heat-radiation structure.

In this compressor, a temperature increase of the rotor of the induction motor is suppressed, and thus, high power is enabled.

A compressor according to a fourth aspect of twelfth group is the compressor according to the third aspect of twelfth group, in which the rotor of the induction motor has a plurality of conducting bars that are bar-shaped conductors and that are disposed in an annular form, and an end ring that short-circuits the plurality of conducting bars at an end portion in an axial direction. The heat-radiation structure is formed on the end ring.

In this compressor, heat radiation properties are improved because the heat-radiation structure rotates itself, and moreover, the rotation causes forced convection and suppresses an increase in the peripheral temperature, which enables high power.

A compressor according to a fifth aspect of twelfth group is the compressor according to the third aspect or the fourth aspect of twelfth group, in which the heat-radiation structure is a heat sink.

In this compressor, it is possible to integrally mold the heat sink when molding the end ring of the induction motor, and thus, high power is enabled at comparatively low costs.

A compressor according to a sixth aspect of twelfth group is the compressor according to the first aspect of twelfth group, in which a cooling structure that cools a stator of the induction motor by a refrigerant is further provided.

This compressor enables high power because the induction motor is cooled.

A compressor according to a seventh aspect of twelfth group is the compressor according to the sixth aspect of twelfth group, in which the cooling structure cools the stator by the cool heat of a refrigerant that flows in a refrigerant circuit to which the compressor is connected.

A refrigerant cycle apparatus according to a eighth aspect of the twelfth group includes the compressor according to any of the first aspect to the seventh aspects of twelfth group.

(13) Thirteenth Group

In recent years, use of refrigerant with a low GWP (hereinafter referred to as low-GWP refrigerant) in air conditioners has been considered from the viewpoint of environmental protection. A dominant example of low-GWP refrigerant is a refrigerant mixture containing 1,2-difluoroethylene.

However, the related art giving consideration from the aspect of increasing the efficiency of air conditioners using the foregoing refrigerant is rarely found. For example, in the case of applying the foregoing refrigerant to the air conditioner disclosed in PTL 1 (Japanese Unexamined Patent Application Publication No. 2013-124848), there is an issue of how to achieve high efficiency.

An air conditioner according to a first aspect of thirteenth group includes a compressor that compresses a refrigerant mixture containing at least 1,2-difluoroethylene, a motor that drives the compressor, and a power conversion device. The power conversion device is connected between an alternating-current (AC) power source and the motor, has a switching element, and controls the switching element such that an output of the motor becomes a target value.

In the air conditioner that uses a refrigerant mixture containing at least 1,2-difluoroethylene, the motor rotation rate of the compressor can be changed in accordance with an air conditioning load, and thus a high annual performance factor (APF) can be achieved.

An air conditioner according to a second aspect of thirteenth group is the air conditioner according to the first aspect of thirteenth group, in which the power conversion device includes a rectifier circuit and a capacitor. The rectifier circuit rectifies an AC voltage of the AC power source. The capacitor is connected in parallel to an output side of the rectifier circuit and smoothes voltage variation caused by switching in the power conversion device.

In this air conditioner, an electrolytic capacitor is not required on the output side of the rectifier circuit, and thus an increase in the size and cost of the circuit is suppressed.

An air conditioner according to a third aspect of thirteenth group is the air conditioner according to the first aspect or the second aspect of thirteenth group, in which the AC power source is a single-phase power source.

An air conditioner according to a fourth aspect of thirteenth group is the air conditioner according to the first aspect or the second aspect of thirteenth group, in which the AC power source is a three-phase power source.

An air conditioner according to a fifth aspect of thirteenth group is the air conditioner according to the first aspect of thirteenth group, in which the power conversion device is an indirect matrix converter including a converter and an inverter. The converter converts an AC voltage of the AC power source into a direct-current (DC) voltage. The inverter converts the DC voltage into an AC voltage and supplies the AC voltage to the motor.

This air conditioner is highly efficient and does not require an electrolytic capacitor on the output side of the rectifier circuit, and thus an increase in the size and cost of the circuit is suppressed.

An air conditioner according to a sixth aspect of thirteenth group is the air conditioner according to the first aspect of thirteenth group, in which the power conversion device is a matrix converter that directly converts an AC voltage of the AC power source into an AC voltage having a predetermined frequency and supplies the AC voltage having the predetermined frequency to the motor.

This air conditioner is highly efficient and does not require an electrolytic capacitor on the output side of the rectifier circuit, and thus an increase in the size and cost of the circuit is suppressed.

An air conditioner according to a seventh aspect of thirteenth group is the air conditioner according to the first aspect of thirteenth group, in which the compressor is any one of a scroll compressor, a rotary compressor, a turbo compressor, and a screw compressor.

An air conditioner according to an eighth aspect of thirteenth group is the air conditioner according to any one of the first aspect to the seventh aspect of thirteenth group, in which the motor is a permanent magnet synchronous motor having a rotor including a permanent magnet.

(14) Fourteenth Group

In recent years, use of refrigerant with a low GWP (hereinafter referred to as low-GWP refrigerant) in air conditioners has been considered from the viewpoint of environmental protection. A dominant example of low-GWP refrigerant is a refrigerant mixture containing 1,2-difluoroethylene.

However, the related art giving consideration from the aspect of increasing the efficiency of air conditioners using the foregoing refrigerant is rarely found. In the case of applying the foregoing refrigerant to the air conditioner, there is an issue of how to achieve high efficiency.

An air conditioner according to a first aspect of fourteenth group includes a compressor that compresses a refrigerant mixture containing at least 1,2-difluoroethylene, a motor that drives the compressor, and a connection unit that causes power to be supplied from an alternating-current (AC) power source to the motor without frequency conversion.

In the air conditioner that uses a refrigerant mixture containing at least 1,2-difluoroethylene, the compressor can be driven without interposing a power conversion device between the AC power source and the motor. Thus, it is possible to provide the air conditioner that is environmentally friendly and has a relatively inexpensive configuration.

An air conditioner according to a second aspect of fourteenth group is the air conditioner according to the first aspect of fourteenth group, in which the connection unit directly applies an AC voltage of the AC power source between at least two terminals of the motor.

An air conditioner according to a third aspect of fourteenth group is the air conditioner according to the first aspect or the second aspect of fourteenth group, in which the AC power source is a single-phase power source.

An air conditioner according to a fourth aspect of fourteenth group is the air conditioner according to any one of the first aspect to the third aspect of fourteenth group, in which one terminal of the motor is connected in series to an activation circuit.

An air conditioner according to a fifth aspect of fourteenth group is the air conditioner according to the fourth aspect of fourteenth group, in which the activation circuit is a circuit in which a positive temperature coefficient thermistor and an operation capacitor are connected in parallel to each other.

In the air conditioner that uses a refrigerant mixture containing at least 1,2-difluoroethylene, after the compressor has been activated, the PTC thermistor self-heats and the resistance value thereof increases, and switching to an operation circuit substantially by the operation capacitor occurs. Thus, the compressor enters a state of being capable of outputting a rated torque at appropriate timing.

An air conditioner according to a sixth aspect of fourteenth group is the air conditioner according to the first aspect or the second aspect of fourteenth group, in which the AC power source is a three-phase power source.

This air conditioner does not require an activation circuit and thus the cost is relatively low.

An air conditioner according to a seventh aspect of fourteenth group is the air conditioner according to any one of the first aspect to the sixth aspect of fourteenth group, in which the motor is an induction motor.

In this air conditioner, the motor is capable of high output with relatively low cost, and thus the efficiency of the air conditioner can be increased.

(15) Fifteenth Group

There has been widely used a warm-water generating apparatus that generates warm water by a boiler or an electric heater. In addition, there is also a warm-water generating apparatus that employs a heat pump unit as a heat source.

A conventional warm-water generating apparatus that employs a heat pump unit frequently uses carbon dioxide as a refrigerant in the heat pump unit. However, there is a demand for generating warm water more efficiently as compared to the conventional warm-water generating apparatus.

A warm-water generating apparatus according to a first aspect of fifteenth group uses, as a refrigerant, a mixed refrigerant containing at least 1,2-difluoroethylene (HFO-1132(E)). The warm-water generating apparatus includes a compressor, a heat-source-side first heat exchanger, an expansion mechanism, and a use-side second heat exchanger. The second heat exchanger causes the mixed refrigerant flowing therein and first water to exchange heat with each other to heat the first water.

The warm-water generating apparatus uses, as the refrigerant, the above-described mixed refrigerant instead of carbon dioxide which has been frequently used. Accordingly, warm water can be efficiently generated.

A warm-water generating apparatus according to a second aspect of fifteenth group is the warm-water generating apparatus according to the first aspect of fifteenth group, and further includes a tank and a circulation flow path. A circulation flow path allows the first water to circulate between the tank and the second heat exchanger.

A warm-water generating apparatus according to a third aspect of fifteenth group is the warm-water generating apparatus according to the first aspect of fifteenth group, and further includes a first circulation flow path, a second circulation flow path, a third heat exchanger, and a tank. The first circulation flow path allows the first water heated by the second heat exchanger to circulate. The second circulation flow path is different from the first circulation flow path. The third heat exchanger causes the first water flowing through the first circulation flow path and second water flowing through the second circulation flow path to exchange heat with each other to heat the second water flowing through the second circulation flow path. The tank stores the second water heated by the third heat exchanger.

A warm-water generating apparatus according to a fourth aspect of fifteenth group is the warm-water generating apparatus according to the first aspect of fifteenth group, and further includes a first circulation flow path and a tank. The first circulation flow path allows the first water heated by the second heat exchanger to circulate. A portion of the first circulation flow path is disposed in the tank and allows the first water flowing through the first circulation flow path and second water in the tank to exchange heat with each other to heat the second water in the tank.

A warm-water generating apparatus according to a fifth aspect of fifteenth group is the warm-water generating apparatus according to the first aspect of fifteenth group, and further includes a tank, a first circulation flow path, a third heat exchanger, a second circulation flow path, and a third flow path. The first circulation flow path allows the first water to circulate between the second heat exchanger and the tank. The second circulation flow path allows the first water to circulate between the third heat exchanger and the tank. The third flow path is different from the first circulation flow path and the second circulation flow path. The third heat exchanger causes the first water flowing from the tank and third water flowing through the third flow path to exchange heat with each other to heat the third water flowing through the third flow path.

A warm-water generating apparatus according to a sixth aspect of fifteenth group is the warm-water generating apparatus according to the first aspect of fifteenth group, and further includes a tank, a first circulation flow path, and a second flow path. The first circulation flow path allows the first water to circulate between the tank and the second heat exchanger. The second flow path is different from the first circulation flow path. A portion of the second flow path is disposed in the tank and allows the first water in the tank and second water flowing through the second flow path to exchange heat with each other to heat the second water flowing through the second flow path.

A warm-water generating apparatus according to a seventh aspect of fifteenth group is the warm-water generating apparatus according to the first aspect of fifteenth group, and further includes a tank that stores the first water and a flow path through which second water flows. A portion of the flow path is disposed in the tank. The second heat exchanger heats, in the tank, the first water stored in the tank. The first water stored in the tank heats the second water flowing through the flow path.

A warm-water generating apparatus according to an eighth aspect of fifteenth group is the warm-water generating apparatus according to the first aspect of fifteenth group, and further includes a tank and a flow path through which the first water flows from a water supply source to the tank. The second heat exchanger heats the first water flowing through the flow path.

A warm-water generating apparatus according to a ninth aspect of fifteenth group is the warm-water generating apparatus according to any one of the first aspect to the eighth aspect of fifteenth group, and further includes a use-side fourth heat exchanger and a fourth circulation flow path. The fourth heat exchanger is a heat exchanger that is different from the second heat exchanger. In the fourth circulation flow path, fourth water for cooling or heating flows. The fourth heat exchanger causes the mixed refrigerant flowing therein and the fourth water flowing through the fourth circulation flow path to exchange heat with each other to cool or heat the fourth water.

(16) Sixteenth Group

There has been a refrigeration cycle apparatus including a heat exchanger as described in, for example, PTL 1 (Japanese Unexamined Patent Application Publication No. 11-256358). Like the heat exchanger of the refrigeration cycle apparatus described in PTL 1, a heat transfer tube may use a copper pipe.

However, the heat exchanger that uses the copper pipe as the heat transfer tube is expensive.

In this way, the refrigeration cycle apparatus including the heat exchanger has an object to decrease the material cost.

A refrigeration cycle apparatus according to a first aspect of sixteenth group includes a flammable refrigerant containing at least 1,2-difluoroethylene; an evaporator that evaporates the refrigerant; and a condenser that condenses the refrigerant; at least one of the evaporator and the condenser is a heat exchanger that includes a plurality of fins made of aluminum or an aluminum alloy and a plurality of heat transfer tubes made of aluminum or an aluminum alloy, and that causes the refrigerant flowing inside the heat transfer tubes and a fluid flowing along the fins to exchange heat with each other; and the refrigerant repeats a refrigeration cycle by circulating through the evaporator and the condenser.

With the refrigeration cycle apparatus, since the plurality of fins made of aluminum or an aluminum alloy and the plurality of heat transfer tubes made of aluminum or an aluminum alloy are included, for example, as compared to a case where a heat transfer tube uses a copper pipe, the material cost of the heat exchanger can be decreased.

A refrigeration cycle apparatus according to a second aspect of sixteenth group is the refrigeration cycle apparatus according to the first aspect of sixteenth group, in which each of the plurality of fins has a plurality of holes, the plurality of heat transfer tubes penetrate through the plurality of holes of the plurality of fins, and outer peripheries of the plurality of heat transfer tubes are in close contact with inner peripheries of the plurality of holes.

A refrigeration cycle apparatus according to a third aspect of sixteenth group is the refrigeration cycle apparatus according to the first aspect of sixteenth group, in which the plurality of heat transfer tubes are a plurality of flat tubes, and flat surface portions of the flat tubes that are disposed next to each other face each other.

A refrigeration cycle apparatus according to a fourth aspect of sixteenth group is the refrigeration cycle apparatus according to the third aspect of sixteenth group, in which each of the plurality of fins is bent in a waveform, disposed between the flat surface portions of the flat tubes disposed next to each other, and connected to the flat surface portions to be able to transfer heat to the flat surface portions.

A refrigeration cycle apparatus according to a fifth aspect of sixteenth group is the refrigeration cycle apparatus according to the third aspect of sixteenth group, in which each of the plurality of fins has a plurality of cutouts, and the plurality of flat tubes are inserted into the plurality of cutouts of the plurality of fins and connected thereto to be able to transfer heat to the plurality of fins.

(17) Seventeenth Group

Hitherto, as an air conditioning apparatus that air-conditions a plurality of rooms in an interior by one air conditioning apparatus, a multi-type air conditioning apparatus has been known.

A multi-type air conditioning apparatus such as the multi-type air conditioning apparatus includes a first indoor unit and a second indoor unit that are disposed in different rooms. In such an air conditioning apparatus, since a refrigerant is caused to circulate in the first indoor unit and the second indoor unit, the amount of refrigerant with which the air conditioning apparatus is filled is large.

An air conditioning apparatus that air-conditions a plurality of rooms in an interior has a problem in that the amount of refrigerant with which the air conditioning apparatus needs to be reduced.

An air conditioning apparatus according to a first aspect of seventeenth group includes a compressor, a use-side heat exchanger that exchanges heat with first air, a heat-source-side heat exchanger that exchanges heat with second air, a refrigerant that contains at least 1,2-difluoroethylene and that circulates in the compressor, the use-side heat exchanger, and the heat-source-side heat exchanger to repeat a refrigeration cycle, a first duct that supplies the first air to a plurality of rooms in an interior, and a casing that includes a use-side space that is connected to the first duct and that accommodates the use-side heat exchanger, the casing being configured to allow the first air after heat exchange with the refrigerant at the use-side heat exchanger to be sent out to the first duct.

Since the number of indoor-side heat exchangers of this air conditioning apparatus is smaller than the number of indoor-side heat exchangers of air conditioning apparatus in which a plurality of indoor units are disposed in a plurality of rooms, it is possible to reduce the amount of refrigerant with which the air conditioning apparatus is filled.

An air conditioning apparatus according to a second aspect of seventeenth group is the air conditioning apparatus of the first aspect of seventeenth group and includes a second duct that introduces the first air from the interior, a use-side unit that includes the casing and that is configured to guide the first air introduced from the interior to the use-side heat exchanger with the casing connected to the second duct, and a heat-source-side unit that accommodates the heat-source-side heat exchanger and that differs from the use-side unit.

In the air conditioning apparatus, since the use-side unit and the heat-source-side unit are different units, the air conditioning apparatus is easily installed.

An air conditioning apparatus according to a third aspect of seventeenth group is the air conditioning apparatus of the first aspect of seventeenth group and includes a third duct that introduces the first air from an exterior, a use-side unit that includes the casing and that is configured to guide the first air introduced from the exterior to the use-side heat exchanger with the casing connected to the third duct, and a heat-source-side unit that accommodates the heat-source-side heat exchanger and that differs from the use-side unit.

In the air conditioning apparatus, since the use-side unit and the heat-source-side unit are different units, the air conditioning apparatus is easily installed.

An air conditioning apparatus according to a fourth aspect of seventeenth group is the air conditioning apparatus of the first aspect of seventeenth group and includes a second duct that is connected to the casing and that supplies the first air introduced from the interior to the use-side space, wherein the casing is provided with a partition plate that partitions the casing into a heat-source-side space through which the second air introduced from an exterior passes and the use-side space to prevent circulation of air in the heat-source-side space and the use-side space, and wherein the heat-source-side heat exchanger is disposed in the heat-source-side space.

In the air conditioning apparatus, since, in one casing, the use-side heat exchanger and the heat-source-side heat exchanger are accommodated in the use-side space and the heat-source-side space that are separated by the partition plate in the same casing, the air conditioning apparatus is easily installed by using a limited space.

(18) Eighteenth Group

In a refrigeration cycle using a nonazeotropic mixed refrigerant, when a refrigerant is evaporated under a constant pressure in a heat-source-side heat exchanger, the capacity of heat exchange is not sufficiently provided.

A refrigeration cycle according to a first aspect of eighteenth group is a refrigeration cycle using a mixed refrigerant which is a flammable refrigerant and which contains at least 1,2-difluoroethylene (HFO-1132(E)), and includes a compressor, a heat-source-side heat exchanger, an expansion mechanism, a use-side heat exchanger, and a decompression mechanism. The decompression mechanism decompresses, between an inlet and an outlet of the heat-source-side heat exchanger, the mixed refrigerant flowing through the heat-source-side heat exchanger that functions as an evaporator.

In this case, when the refrigerant evaporates in the heat-source-side heat exchanger, the decompression mechanism decreases the pressure of the refrigerant in the middle. Accordingly, the difference in evaporation temperature between the inlet and the outlet of the heat-source-side heat exchanger generated when the refrigerant is evaporated under the constant pressure can be decreased. Consequently, the capacity of heat exchange can be ensured, and the performance of the refrigeration cycle can be increased.

A refrigeration cycle according to a second aspect of eighteenth group is the refrigeration cycle according to the first aspect of eighteenth group, in which the decompression mechanism decompresses the mixed refrigerant flowing through the heat-source-side heat exchanger in accordance with a temperature gradient of the mixed refrigerant.

A refrigeration cycle according to a third aspect of eighteenth group is the refrigeration cycle according to the first aspect or the second aspect of eighteenth group, in which the heat-source-side heat exchanger includes a first heat exchange section and a second heat exchange section. The decompression mechanism is disposed between the first heat exchange section and the second heat exchange section.

A refrigeration cycle according to a fourth aspect of eighteenth group is the refrigeration cycle according to any one of the first aspect to the fourth aspect of eighteenth group, in which the use-side heat exchanger is disposed in a use unit. The use-side heat exchanger includes a third heat exchange section located on a front-surface side of the use unit, and a fourth heat exchange section located on a rear-surface side of the use unit. An upper portion of the fourth heat exchange section is located near an upper portion of the third heat exchange section. The third heat exchange section extends obliquely downward from the upper portion thereof toward the front-surface side of the use unit. The fourth heat exchange section extends obliquely downward from the upper portion thereof toward the rear-surface side of the use unit. A capacity of a refrigerant flow path of the third heat exchange section is larger than a capacity of a refrigerant flow path of the fourth heat exchange section.

In this case, the capacity of the refrigerant flow path of the third heat exchange section located on the front-surface side of the use unit is larger than the capacity of the refrigerant flow path of the fourth heat exchange section. Accordingly, the third heat exchange section having a larger capacity of the refrigerant flow path exchanges more heat between the mixed refrigerant and the air on the front-surface side of the use unit of which the velocity of the air passing through the heat exchange section tends to be high.

(19) Nineteenth Group

A control circuit of an air conditioner includes an inverter circuit and the like that generate heat. Therefore, the control circuit is cooled, as described in Japanese Unexamined Patent Application Publication No. 62-69066.

A mixed refrigerant including 1,2-difluoroethylene may be used as a refrigerant of an air conditioner. The mixed refrigerant including 1,2-difluoroethylene is less efficient than R32 refrigerant. Therefore, in an air conditioner using the mixed refrigerant including 1,2-difluoroethylene, the power consumption of a compressor increases, and the amount of heat generated by a control circuit such as an inverter circuit increases. Accordingly, it is necessary to cool the control circuit.

An air conditioner according to a first aspect of nineteenth group includes a printed circuit board and a refrigerant jacket. A power device is attached to the printed circuit board. The power device is thermally connected to the refrigerant jacket. A refrigerant flows through the refrigerant jacket. The power device is cooled by using the refrigerant that flows through the refrigerant jacket. The refrigerant is a mixed refrigerant that includes at least 1,2-difluoroethylene.

An air conditioner according to a second aspect of nineteenth group is the air conditioner according to the first aspect of nineteenth group, further including a refrigerant circuit that performs a refrigeration cycle. The refrigerant that flows through the refrigerant jacket circulates in the refrigerant circuit.

An air conditioner according to a third aspect of nineteenth group is the air conditioner according to the first aspect of nineteenth group, further including a refrigerant circuit that performs a refrigeration cycle. The refrigerant jacket includes a pipe that is hermetically filled with the refrigerant. The pipe does not supply the refrigerant to the refrigerant circuit and does not receive the refrigerant from the refrigerant circuit.

(20) Twentieth Group

Due to the growing consciousness of environmental protection in recent years, an air conditioner that uses a refrigerant having low global warming potential (GWP) is necessary. In this case, it is desirable that the air conditioner be capable of performing a dehumidifying operation while maintaining comfort.

An air conditioner according to a first aspect of twentieth group includes a refrigerant circuit in which a compressor, an outdoor heat exchanger, a decompressor, a first indoor heat exchanger, a decompressing device for dehumidification, and a second indoor heat exchanger are connected in a ring shape. The air conditioner performs a dehumidifying operation by causing the decompressor to be in an open state and using the decompressing device for dehumidification. In the air conditioner, a mixed refrigerant including at least 1,2-difluoroethylene is used as a refrigerant.

An air conditioner according to a second aspect of twentieth group is the air conditioner according to the first aspect of twentieth group, in which the decompressing device for dehumidification is disposed between the first indoor heat exchanger and the second indoor heat exchanger.

An air conditioner according to a third aspect of twentieth group is the air conditioner according to the first aspect or the second aspect of twentieth group, in which the decompressing device for dehumidification is an electromagnetic valve.

An air conditioner according to a fourth aspect of twentieth group is the air conditioner according to the first aspect or the second aspect of twentieth group, in which the decompressing device for dehumidification is an expansion valve.

(21) Twenty-First Group

To date, various air conditioners having a dehumidifying function have been developed. For example, there is an air conditioner in which an indoor heat exchanger is divided into two heat exchangers and the two heat exchangers are connected in series. During a dehumidifying operation, one of the two indoor heat exchangers condenses a refrigerant and the other indoor heat exchanger evaporates the refrigerant.

However, in such an air conditioner, a mechanism for controlling flow of refrigerant in the indoor heat exchangers is complex.

For such an air conditioner having a dehumidifying function, it is desirable that the configuration of a refrigerant circuit be simplified.

An air conditioner according to a first aspect of twenty-first group includes: a refrigerant including at least 1,2-difluoroethylene; and a refrigerant circuit including a compressor that compresses the refrigerant, a first heat exchanger that evaporates the refrigerant in an evaporation zone, a decompressor that decompress the refrigerant, and a second heat exchanger that condenses the refrigerant. The air conditioner is configured to be switchable between a first operation of blowing, into an indoor space, air whose heat has been exchanged by the first heat exchanger by using an entirety of the first heat exchanger as the evaporation zone, and a second operation of blowing, into the indoor space, air whose heat has been exchanged by the first heat exchanger by using only one part of the first heat exchanger as the evaporation zone.

The air conditioner has the refrigerant circuit that can perform dehumidification by evaporating the refrigerant in the evaporation zone and that is simplified.

An air conditioner according to a second aspect of twenty-first group is the air conditioner according to the first aspect of twenty-first group, in which the first heat exchanger is an auxiliary heat exchanger; the air conditioner includes a main heat exchanger downstream of the auxiliary heat exchanger in an airflow direction; and the air conditioner is configured to be switchable between a first operation of blowing, into an indoor space, air whose heat has been exchanged by the auxiliary heat exchanger and the main heat exchanger by using an entirety of the auxiliary heat exchanger as the evaporation zone, and a second operation of blowing, into the indoor space, air whose heat has been exchanged by the auxiliary heat exchanger and the main heat exchanger by using only one part of the first heat exchanger as the evaporation zone.

The air conditioner can suppress deterioration of COP for performing a dehumidifying operation in a cooling operation.

An air conditioner according to a third aspect of twenty-first group is the air conditioner according to the first or second aspect of twenty-first group, in which, in a dehumidifying operation mode for dehumidifying the indoor space, the air conditioner is configured to be switchable from the first operation to the second operation in accordance with a load.

With the air conditioner, if the load is high when the dehumidifying operation mode is selected and the operation is started, because sufficient dehumidification is possible even with the first operation due to a low temperature of the first heat exchanger, it is possible to efficiently perform dehumidification and cooling simultaneously by starting the first operation. When the indoor temperature decreases and the load decreases, because dehumidification becomes impossible with the first operation due to increase in evaporation temperature, the operation is switched to the second operation at this timing. Thus, it is possible to suppress the effect of deterioration of COP for performing the dehumidifying operation.

An air conditioner according to a fourth aspect of twenty-first group is the air conditioner according to the third aspect of twenty-first group, in which the load is detected based on a difference between a set temperature and a temperature of air in the indoor space whose heat is exchanged the first heat exchanger.

An air conditioner according to a fifth aspect of twenty-first group is the air conditioner according to the third or fourth aspect of twenty-first group, in which the load is detected based on a frequency of the compressor.

An air conditioner according to a sixth aspect of twenty-first group is the air conditioner according to any one of the first to fifth aspects of twenty-first group, in which, in a dehumidifying operation mode for dehumidifying the indoor space, the air conditioner is configured to perform the first operation without switching from the first operation to the second operation when an evaporation temperature of the refrigerant in the first heat exchanger is lower than a predetermined temperature.

The air conditioner can perform dehumidification without switching from the first operation to the second operation when the load decreases to a predetermined value or lower, because the evaporation temperature is lower than a predetermined value.

An air conditioner according to a seventh aspect of twenty-first group is the air conditioner according to any one of the first to sixth aspects of twenty-first group, in which, in the second operation, a part of the first heat exchanger other than the one part is a superheating zone in which the refrigerant has a temperature higher than or equal to the evaporation temperature.

(22) Twenty-Second Group

Configurations of refrigerant circuits that realize highly efficient operation by using a refrigerant having a low global warming potential have not been fully proposed.

A refrigeration cycle apparatus according to a first aspect of twenty-second group includes a refrigerant circuit including a compressor, a heat source-side heat exchanger, an expansion mechanism, and a usage-side heat exchanger. In the refrigerant circuit, a refrigerant containing at least 1,2-difluoroethylene (HFO-1132 (E)) is sealed. At least during a predetermined operation, in at least one of the heat source-side heat exchanger and the usage-side heat exchanger, a flow of the refrigerant and a flow of a heating medium that exchanges heat with the refrigerant are counter flows.

The refrigeration cycle apparatus according to the first aspect of twenty-second group realizes highly efficient operation effectively utilizing a heat exchanger, by using the refrigerant that contains 1,2-difluoroethylene (HFO-1132 (E)) and that has a low global warming potential.

A refrigeration cycle apparatus according to a second aspect of twenty-second group is the refrigeration cycle apparatus of the first aspect of twenty-second group, and, during an operation of the refrigeration cycle apparatus using the heat source-side heat exchanger as an evaporator, in the heat source-side heat exchanger, a flow of the refrigerant and a flow of a heating medium that exchanges heat with the refrigerant are counter flows.

A refrigeration cycle apparatus according to a third aspect of twenty-second group is the refrigeration cycle apparatus of the first aspect or the second aspect of twenty-second group, and, during an operation of the refrigeration cycle apparatus using the heat source-side heat exchanger as a condenser, in the heat source-side heat exchanger, a flow of the refrigerant and a flow of a heating medium that exchanges heat with the refrigerant are counter flows.

Here, even when a refrigerant is used, with which a temperature difference between the refrigerant and the heating medium is difficult to be generated on an exit side of the condenser due to influence of temperature glide, the temperature difference is relatively easily ensured from an entrance to the exit of the condenser, and efficient operation of the refrigeration cycle apparatus can be realized.

A refrigeration cycle apparatus according to a fourth aspect of twenty-second group is the refrigeration cycle apparatus of any one of the first to third aspects of twenty-second group, and, during an operation of the refrigeration cycle apparatus using the usage-side heat exchanger as an evaporator, in the usage-side heat exchanger, a flow of the refrigerant and a flow of a heating medium that exchanges heat with the refrigerant are counter flows.

A refrigeration cycle apparatus according to a fifth aspect of twenty-second group is the refrigeration cycle apparatus of any one of the first to fourth aspects of twenty-second group, and, during an operation of the refrigeration cycle apparatus using the usage-side heat exchanger as a condenser, in the usage-side heat exchanger, a flow of the refrigerant and a flow of a heating medium that exchanges heat with the refrigerant are counter flows.

A refrigeration cycle apparatus according to a sixth aspect of twenty-second group is the refrigeration cycle apparatus of any one of the first to fifth aspects of twenty-second group, and the heating medium is air.

A refrigeration cycle apparatus according to a seventh aspect of twenty-second group is the refrigeration cycle apparatus of any one of the first to fifth aspects of twenty-second group, and the heating medium is a liquid.

(23) Twenty-Third Group

Refrigeration cycle apparatuses using a refrigerant containing at least 1,2-difluoroethylene as a refrigerant with sufficiently low GWP have a problem in that, to reduce pressure loss, a pipe such as a liquid-side refrigerant connection pipe or gas-side refrigerant connection pipe is increased in outside diameter, potentially leading to increased cost.

The present disclosure has been made in view of the above, and accordingly it is an object of the present disclosure to provide a refrigeration cycle apparatus that minimizes an increase in cost associated with the use of a refrigerant containing at least 1,2-difluoroethylene.

A refrigeration cycle apparatus according to a first aspect of twenty-third group is a refrigeration cycle apparatus including a refrigerant circuit in which a compressor, a heat source-side heat exchanger, a decompression part, a liquid-side refrigerant connection pipe, a use-side heat exchanger, and a gas-side refrigerant connection pipe are connected. In the refrigeration cycle apparatus, a refrigerant containing at least 1,2-difluoroethylene is used, and the liquid-side refrigerant connection pipe and the gas-side refrigerant connection pipe are made of aluminum or aluminum alloy.

With the above-mentioned refrigeration cycle apparatus, even if the liquid-side refrigerant connection pipe and the gas-side refrigerant connection pipe are increased in diameter to minimize pressure loss in using a refrigerant containing 1,2-difluoroethylene, an increase in cost is minimized by using a pipe made of aluminum or aluminum alloy.

A refrigeration cycle apparatus according to a second aspect of twenty-third group is the refrigeration cycle apparatus according to the first aspect of twenty-third group, in which the liquid-side refrigerant connection pipe has a wall thickness greater than or equal to a wall thickness of a liquid-side refrigerant connection pipe made of copper or copper alloy that is used in a refrigeration cycle apparatus having a rated refrigeration capacity equal to a rated refrigeration capacity of the refrigeration cycle apparatus. Further, the gas-side refrigerant connection pipe has a wall thickness greater than or equal to a wall thickness of a gas-side refrigerant connection pipe made of copper or copper alloy that is used in a refrigeration cycle apparatus having a rated refrigeration capacity equal to a rated refrigeration capacity of the refrigeration cycle apparatus.

A refrigeration cycle apparatus according to a third aspect of twenty-third group is the refrigeration cycle apparatus according to the first aspect of twenty-third group, in which the liquid-side refrigerant connection pipe has an outside diameter greater than or equal to an outside diameter of a liquid-side refrigerant connection pipe made of copper or copper alloy that is used in a refrigeration cycle apparatus having a rated refrigeration capacity equal to a rated refrigeration capacity of the refrigeration cycle apparatus. Further, the gas-side refrigerant connection pipe has an outside diameter greater than or equal to an outside diameter of a gas-side refrigerant connection pipe made of copper or copper alloy that is used in a refrigeration cycle apparatus having a rated refrigeration capacity equal to a rated refrigeration capacity of the refrigeration cycle apparatus.

A refrigeration cycle apparatus according to a fourth aspect of twenty-third group is the refrigeration cycle apparatus according to the third aspect of twenty-third group, in which the liquid-side refrigerant connection pipe has an outside diameter equal to an outside diameter of a liquid-side refrigerant connection pipe made of copper or copper alloy that is used in a refrigeration cycle apparatus having a rated refrigeration capacity equal to a rated refrigeration capacity of the refrigeration cycle apparatus.

A refrigeration cycle apparatus according to a fifth aspect of twenty-third group is the refrigeration cycle apparatus according to the third aspect of twenty-third group, in which the liquid-side refrigerant connection pipe has an outside diameter ranging from 6.4 mm to 12.7 mm. Further, the gas-side refrigerant connection pipe has an outside diameter ranging from 12.7 mm to 25.4 mm.

A refrigeration cycle apparatus according to a sixth aspect of twenty-third group is the refrigeration cycle apparatus according to the fifth aspect of twenty-third group, in which the refrigeration cycle apparatus has a rated refrigeration capacity of not less than 8.5 kW and not more than 10.0 kW, and the gas-side refrigerant connection pipe has an outside diameter of 19.1 mm.

A refrigeration cycle apparatus according to a seventh aspect of twenty-third group is the refrigeration cycle apparatus according to the fifth aspect of twenty-third group, in which the refrigeration cycle apparatus has a rated refrigeration capacity of not less than 25.0 kW and not more than 28 kW, and the gas-side refrigerant connection pipe has an outside diameter of 25.4 mm.

A refrigeration cycle apparatus according to an eighth aspect of twenty-third group is the refrigeration cycle apparatus according to the first aspect of twenty-third group, in which the refrigeration cycle apparatus has a rated refrigeration capacity of not less than 25.0 kW, and the gas-side refrigerant connection pipe has an outside diameter of 25.4 mm, or in which the refrigeration cycle apparatus has a rated refrigeration capacity of not less than 19.0 kW and not more than 25.0 kW, and the gas-side refrigerant connection pipe has an outside diameter of 22.2 mm, or in which the refrigeration cycle apparatus has a rated refrigeration capacity of not less than 8.5 kW and not more than 19.0 kW, and the gas-side refrigerant connection pipe has an outside diameter of 19.1 mm, or in which the refrigeration cycle apparatus has a rated refrigeration capacity of not less than 5.0 kW and less than 8.5 kW, and the gas-side refrigerant connection pipe has an outside diameter of 15.9 mm, or in which the refrigeration cycle apparatus has a rated refrigeration capacity of less than 5.0 kW, and the gas-side refrigerant connection pipe has an outside diameter of 12.7 mm.

A refrigeration cycle apparatus according to a ninth aspect of twenty-third group is the refrigeration cycle apparatus according to the first aspect of twenty-third group, in which the refrigeration cycle apparatus has a rated refrigeration capacity of not less than 19.0 kW, and the liquid-side refrigerant connection pipe has an outside diameter of 12.7 mm, or in which the refrigeration cycle apparatus has a rated refrigeration capacity of not less than 5.0 kW and less than 19.0 kW, and the liquid-side refrigerant connection pipe has an outside diameter of 9.5 mm, or in which the refrigeration cycle apparatus has a rated refrigeration capacity of less than 5.0 kW, and the liquid-side refrigerant connection pipe has an outside diameter of 6.4 mm.

A refrigeration cycle apparatus according to a tenth aspect of twenty-third group is the refrigeration cycle apparatus according to any one of the first to ninth aspects of twenty-third group, in which a material used for each of the liquid-side refrigerant connection pipe and the gas-side refrigerant connection pipe is one of A3003TD, A3003TDS-O, A3005TDS-O, and A6063TDS-T84 defined by a Japanese Industrial Standard "JIS H 4080".

(24) Twenty-Fourth Group

Adequate proposals for achieving power load leveling in a refrigeration cycle including a low-GWP refrigerant still remain to be made.

A thermal storage device according to a first aspect of twenty-fourth group includes a thermal storage tank and a thermal storage heat exchanger. A thermal storage medium is stored in the thermal storage tank. The thermal storage heat exchanger is submerged in the thermal storage medium stored in the thermal storage tank. The thermal storage heat exchanger is connected to a refrigerant supply apparatus. The thermal storage heat exchanger cools the thermal storage medium by using refrigerant supplied by the refrigerant supply apparatus and containing at least 1,2-difluoroethylene (HFO-1132(E)).

In the thermal storage device according to the first aspect of twenty-fourth group, the refrigerant supplied by the refrigerant supply apparatus, containing 1,2-difluoroethylene (HFO-1132(E)), and having a low global warming potential is used to cool the thermal storage medium, and the thermal storage tank stores the resultant cold. This feature contributes to power load leveling.

(25) Embodiment of Twenty-Fifth Group

A refrigeration apparatus known in the art includes a high-temperature-side (primary-side) refrigeration cycle and a low-temperature-side (secondary-side) refrigeration cycle. For example, there is a two-stage refrigeration apparatus in which an HFC refrigerant (e.g., R410A and R32) or an HFO refrigerant is used as refrigerant for the high-temperature-side refrigeration cycle and a carbon dioxide refrigerant is used as refrigerant for the low-temperature-side refrigeration cycle.

Such a two-stage refrigeration apparatus in which two cycles are used in combination is in need of improvement in operational efficiency.

A refrigeration apparatus according to a first aspect of twenty-fifth group includes a first cycle and a second cycle. The first cycle includes a first compressor, a first radiator, a first expansion mechanism, and a first heat absorber that are arranged in such a manner as to be connected to the first cycle. A first refrigerant circulates through the first cycle. The second cycle includes a second radiator and a second heat absorber that are arranged in such a manner as to be connected to the second cycle. A second refrigerant circulates through the second cycle. The first heat absorber and the second radiator constitute a heat exchanger. In the heat exchanger, heat is exchanged between the first refrigerant flowing through the first heat absorber and the second radiator refrigerant through the second radiator. At least one of the first refrigerant and the second refrigerant is a refrigerant mixture containing at least 1,2-difluoroethylene (HFO-1132(E)).

The efficiency of heat exchange in the heat exchanger may be enhanced through the use of the refrigerant mixture.

A refrigeration apparatus according to a second aspect of twenty-fifth group includes a first cycle and a second cycle. The first cycle includes a first compressor, a first radiator, a first expansion mechanism, and a first heat absorber that are arranged in such a manner as to be connected to the first cycle. A first refrigerant circulates through the first cycle. The second cycle includes a second radiator and a second heat absorber that are arranged in such a manner as to be connected to the second cycle. A second refrigerant circulates through the second cycle. The first radiator and the second heat absorber constitute a heat exchanger. In the heat exchanger, heat is exchanged between the first refrigerant flowing through the first radiator and the second refrigerant flowing through the second heat absorber. At least one of the first refrigerant and the second refrigerant is a refrigerant mixture containing at least 1,2-difluoroethylene (HFO-1132 (E)).

The efficiency of heat exchange in the heat exchanger may be enhanced through the use of the refrigerant mixture.

A refrigeration apparatus according to a third aspect of twenty-fifth group is the refrigeration apparatus according to the first aspect of twenty-fifth group in which the second cycle further includes a second compressor and a second expansion mechanism that are arranged in such a manner as to be connected to the second cycle. The first refrigerant flowing through the first radiator of the first cycle releases heat into outside air. The first refrigerant is the refrigerant mixture. The second refrigerant is carbon dioxide.

A refrigeration apparatus according to a fourth aspect of twenty-fifth group is the refrigeration apparatus according to the first aspect of twenty-fifth group in which the second cycle further includes a second compressor and a second expansion mechanism that are arranged in such a manner as to be connected to the second cycle. The first refrigerant flowing through the first radiator of the first cycle releases heat into outside air. The first refrigerant is the refrigerant mixture. The second refrigerant is the refrigerant mixture.

A refrigeration apparatus according to a fifth aspect of twenty-fifth group is the refrigeration apparatus according to the first aspect of twenty-fifth group in which the second cycle further includes a second compressor and a second expansion mechanism that are arranged in such a manner as to be connected to the second cycle. The first refrigerant flowing through the first radiator of the first cycle releases heat into outside air. The first refrigerant is R32. The second refrigerant is the refrigerant mixture.

A refrigeration apparatus according to a sixth aspect of twenty-fifth group is the refrigeration apparatus according to the first aspect of twenty-fifth group in which the first refrigerant flowing through the first radiator of the first cycle releases heat into outside air. The first refrigerant is the refrigerant mixture. The second refrigerant is a liquid medium.

A refrigeration apparatus according to a seventh aspect of twenty-fifth group is the refrigeration apparatus according to the second aspect of twenty-fifth group in which the second cycle further includes a second compressor and a second expansion mechanism that are arranged in such a manner as to be connected to the second cycle. The first refrigerant flowing through the first heat absorber of the first cycle takes away heat from outside air. The first refrigerant is the refrigerant mixture. The second refrigerant is a refrigerant whose saturation pressure at a predetermined temperature is lower than a saturation pressure of the refrigerant mixture at the predetermined temperature.

(26) Detail of Refrigerant for Each of Groups

Each of 1st to 25th groups uses the refrigerant according to a first aspect that contains at least 1,2-difluoroethylene.

Preferably, each of techniques of 1st to 25th groups uses a refrigerant A, B, C or D as follows.

(26-1) The Refrigerant A

The refrigerant A according to a second aspect comprises trans-1,2-difluoroethylene (HFO-1132 (E)), trifluoroethylene (HFO-1123), and 2,3,3,3-tetrafluoro-1-propene (R1234yf).

The refrigerant A according to a third aspect is the refrigerant according to the second aspect, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments OD, DG, GH, and HO that connect the following 4 points:

point D (87.6, 0.0, 12.4),
point G (18.2, 55.1, 26.7),
point H (56.7, 43.3, 0.0), and
point O (100.0, 0.0, 0.0), or on the line segments OD, DG, and GH (excluding the points O and H);

the line segment DG is represented by coordinates ($0.0047y^2-1.5177y+87.598$, y, $-0.0047y^2+0.5177y+12.402$), the line segment GH is represented by coordinates ($-0.0134z^2-1.0825z+56.692$, $0.0134z^2+0.0825z+43.308$, z), and the line segments HO and OD are straight lines.

The refrigerant A according to a fourth aspect is the refrigerant according to the second aspect, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments LG, GH, HI, and IL that connect the following 4 points:

point L (72.5, 10.2, 17.3),
point G (18.2, 55.1, 26.7),
point H (56.7, 43.3, 0.0), and
point I (72.5, 27.5, 0.0), or on the line segments LG, GH, and IL (excluding the points H and I);

the line segment LG is represented by coordinates ($0.0047y^2-1.5177y+87.598$, y, $-0.0047y^2+0.5177y+12.402$), the line segment GH is represented by coordinates ($-0.0134z^2-1.0825z+56.692$, $0.0134z^2+0.0825z+43.308$, z), and the line segments HI and IL are straight lines.

The refrigerant A according to a fifth aspect is the refrigerant according to any one of the second aspect to fourth aspect, further comprising difluoromethane (R32).

The refrigerant A according to a sixth aspect is the refrigerant according to the fifth aspect, wherein when the mass % of HFO-1132(E), HFO-1123, R1234yf, and R32 based on their sum in the refrigerant is respectively represented by x, y, z, and a, if $0<a\leq 10.0$, coordinates (x,y,z) in a ternary composition diagram in which the sum of HFO-1132(E), HFO-1123, and R1234yf is 100 mass % are within the range of a figure surrounded by straight lines that connect the following 4 points:

point A ($0.02a^2-2.46a+93.4$, 0, $-0.02a^2+2.46a+6.6$),
point B' ($-0.008a^2-1.38a+56$, $0.018a^2-0.53a+26.3$, $-0.01a^2+1.91a+17.7$),
point C ($-0.016a^2+1.02a+77.6$, $0.016a^2-1.02a+22.4$, 0), and
point O (100.0, 0.0, 0.0), or on the straight lines OA, AB', and B'C (excluding point O and point C);

if $10.0<a\leq 16.5$, coordinates (x,y,z) in the ternary composition diagram are within the range of a figure surrounded by straight lines that connect the following 4 points:

point A ($0.0244a^2-2.5695a+94.056$, 0, $-0.0244a^2+2.5695a+5.944$),
point B' ($0.1161a^2-1.9959a+59.749$, $0.014a^2-0.3399a+24.8$, $-0.1301a^2+2.3358a+15.451$),
point C ($-0.0161a^2+1.02a+77.6$, $0.0161a^2-1.02a+22.4$, 0), and
point O (100.0, 0.0, 0.0), or on the straight lines OA, AB', and B'C (excluding point C and point C); or if $16.5<a\leq 21.8$, coordinates (x,y,z) in the ternary composition diagram are within the range of a figure surrounded by straight lines that connect the following 4 points:

point A ($0.0161a^2-2.3535a+92.742$, 0, $-0.0161a^2+2.3535a+7.258$),
point B' ($-0.0435a^2-0.0435a+50.406$, $-0.0304a^2+1.8991a-0.0661$, $0.0739a^2-1.8556a+49.6601$),
point C ($-0.0161a^2+0.9959a+77.851$, $0.0161a^2-0.9959a+22.149$, 0), and
point O (100.0, 0.0, 0.0), or on the straight lines OA, AB', and B'C (excluding point O and point C).

(26-2) The Refrigerant B

The refrigerant B according to a seventh aspect, the refrigerant comprising HFO-1132(E) and HFO-1123 in a total amount of 99.5 mass % or more based on the entire refrigerant B according to a seventh aspect, and the refrigerant comprising 62.5 mass % to 72.5 mass % of HFO-1132(E) based on the entire refrigerant B according to a seventh aspect.

(26-3) The Refrigerant C

The refrigerant C according to a eighth aspect is the refrigerant comprising HFO-1132(E), R32, and R1234yf, wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments AC, CF, FD, and DA that connect the following 4 points:

point A (71.1, 0.0, 28.9),
point C (36.5, 18.2, 45.3),
point F (47.6, 18.3, 34.1), and
point D (72.0, 0.0, 28.0), or on these line segments;

the line segment AC is represented by coordinates ($0.0181y^2-2.2288y+71.096$, y, $-0.0181y^2+1.2288y+28.904$), the line segment FD is represented by coordinates ($0.02y^2-1.7y+72$, y, $-0.02y^2+0.7y+28$), and the line segments CF and DA are straight lines.

The refrigerant C according to a ninth aspect is the refrigerant comprising HFO-1132(E), R32, and R1234yf, wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments AB, BE, ED, and DA that connect the following 4 points:

point A (71.1, 0.0, 28.9),
point B (42.6, 14.5, 42.9),
point E (51.4, 14.6, 34.0), and
point D (72.0, 0.0, 28.0),
or on these line segments;

the line segment AB is represented by coordinates ($0.0181y^2-2.2288y+71.096$, y, $-0.0181y^2+1.2288y+28.904$), the line segment ED is represented by coordinates ($0.02y^2-1.7y+72$, y, $-0.02y^2+0.7y+28$), and the line segments BE and DA are straight lines.

The refrigerant C according to a tenth aspect is the refrigerant comprising HFO-1132(E), R32, and R1234yf, wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments GI, J, and JG that connect the following 3 points:

point G (77.5, 6.9, 15.6),
point I (55.1, 18.3, 26.6), and
point J (77.5. 18.4, 4.1),
or on these line segments;

the line segment GI is represented by coordinates ($0.02y^2-2.4583y+93.396$, y, $-0.02y^2+1.4583y+6.604$), and the line segments J and JG are straight lines.

The refrigerant C according to a eleventh aspect is the refrigerant comprising HFO-1132(E), R32, and R1234yf, wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments GH, HK, and KG that connect the following 3 points:

point G (77.5, 6.9, 15.6),
point H (61.8, 14.6, 23.6), and
point K (77.5, 14.6, 7.9),
or on these line segments;

the line segment GH is represented by coordinates ($0.02y^2-2.4583y+93.396$, y, $-0.02y^2+1.4583y+6.604$), and the line segments HK and KG are straight lines.

(26-4) The Refrigerant D

The refrigerant D according to a twelfth aspect is the refrigerant comprising HFO-1132(E), HFO-1123, and R32, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments OC', C'D', D'E', E'A', and A'O that connect the following 5 points:

point O (100.0, 0.0, 0.0),
point C' (56.7, 43.3, 0.0),
point D' (52.2, 38.3, 9.5),
point E' (41.8, 39.8, 18.4), and
point A' (81.6, 0.0, 18.4),
or on the line segments C'D', D'E', and E'A' (excluding the points C' and A');

the line segment C'D' is represented by coordinates ($-0.0297z^2-0.1915z+56.7$, $0.0297z^2+1.1915z+43.3$, z), the line segment D'E' is represented by coordinates ($-0.0535z^2+0.3229z+53.957$, $0.0535z^2+0.6771z+46.043$, z), and the line segments OC', E'A', and A'O are straight lines.

The refrigerant D according to a thirteenth aspect is the refrigerant comprising HFO-1132(E), HFO-1123, and R32, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments OC, CD, DE, EA', and A'O that connect the following 5 points:

point O (100.0, 0.0, 0.0),
point C (77.7, 22.3, 0.0),
point D (76.3, 14.2, 9.5),
point E (72.2, 9.4, 18.4), and
point A' (81.6, 0.0, 18.4),
or on the line segments CD, DE, and EA' (excluding the points C and A');

the line segment CDE is represented by coordinates ($-0.017z^2+0.0148z+77.684$, $0.017z^2+0.9852z+22.316$, z), and the line segments OC, EA', and A'O are straight lines.

The refrigerant D according to a fourteenth aspect is the refrigerant comprising HFO-1132(E), HFO-1123, and R32, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments OC', C'D', D'A, and AO that connect the following 4 points:

point O (100.0, 0.0, 0.0),
point C' (56.7, 43.3, 0.0),
point D' (52.2, 38.3, 9.5), and
point A (90.5, 0.0, 9.5),
or on the line segments C'D' and D'A (excluding the points C' and A);

the line segment C'D' is represented by coordinates ($-0.0297z^2-0.1915z+56.7$, $0.0297z^2+1.1915z+43.3$, z), and the line segments OC', D'A, and AO are straight lines.

The refrigerant D according to a fifteenth aspect is the refrigerant comprising HFO-1132(E), HFO-1123, and R32, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments OC, CD, DA, and AO that connect the following 4 points:

point O (100.0, 0.0, 0.0),
point C (77.7, 22.3, 0.0),
point D (76.3, 14.2, 9.5), and
point A (90.5, 0.0, 9.5), or on the line segments CD and DA (excluding the points C and A);

the line segment CD is represented by coordinates $(-0.017z^2+0.0148z+77.684,\ 0.017z^2+0.9852z+22.316,\ z)$, and the line segments OC, DA, and AO are straight lines.

(27) Features of Each Group Using One of Refrigerants Noted Above

According to the technique of first group using any one of refrigerants having a sufficiently low GWP above, good lubricity in the refrigeration cycle apparatus can be achieved.

According to the technique of second group using any one of refrigerants having a sufficiently low GWP above, good lubricity can be achieved when a refrigeration cycle is performed.

According to the technique of third group using any one of refrigerants having a sufficiently low GWP above, a refrigeration cycle can be performed.

According to the technique of fourth group using any one of refrigerants having a sufficiently low GWP above, a refrigerant reaching electric components is reduced if the refrigerant leaks.

According to the technique of fifth group using any one of refrigerants having a sufficiently low GWP above, the operation efficiency of a refrigeration cycle can be improved.

According to the technique of sixth group using any one of refrigerants having a sufficiently low GWP above, damage to the connection pipe can be reduced.

According to the technique of seventh group using any one of refrigerants having a sufficiently low GWP above, if the above-described refrigerant leaks, ignition at the electric heater can be suppressed.

According to the technique of eighth group using any one of refrigerants having a sufficiently low GWP above, a refrigeration cycle can be performed.

According to the technique of ninth group using any one of refrigerants having a sufficiently low GWP above, a decrease in capacity can be suppressed.

According to the technique of tenth group using any one of refrigerants having a sufficiently low GWP above, the number of rotations of the motor can be changed in accordance with an air conditioning load, which enables high efficiency of the compressor.

According to the technique of eleventh group using any one of refrigerants having a sufficiently low GWP above, energy efficiency can be good.

According to the technique of twelfth group using any one of refrigerants having a sufficiently low GWP above, high power at comparatively low costs can be achieved by using an induction motor in the compressor.

According to the technique of thirteenth group using any one of refrigerants having a sufficiently low GWP above, the motor rotation rate of the compressor can be changed in accordance with an air conditioning load, and thus a high annual performance factor (APF) can be achieved.

According to the technique of fourteenth group using any one of refrigerants having a sufficiently low GWP above, it is possible to provide the air conditioner that is environmentally friendly.

According to the technique of fifteenth group using any one of refrigerants having a sufficiently low GWP above, warm water can be efficiently generated.

According to the technique of sixteenth group using any one of refrigerants having a sufficiently low GWP above, the material cost of the heat exchanger can be decreased.

According to the technique of seventeenth group using any one of refrigerants having a sufficiently low GWP above, it is possible to reduce the amount of refrigerant with which the air conditioning apparatus is filled.

According to the technique of eighteenth group using any one of refrigerants having a sufficiently low GWP above, the capacity of heat exchange of the heat-source-side heat exchanger can be increased.

According to the technique of nineteenth group using any one of refrigerants having a sufficiently low GWP above, it is possible to cool the control circuit.

According to the technique of twentieth group using any one of refrigerants having a sufficiently low GWP above, the reheat dehumidification operation can be appropriately performed.

According to the technique of twenty-first group using any one of refrigerants having a sufficiently low GWP above, the refrigerant circuit that can perform dehumidification by evaporating the refrigerant in the evaporation zone and that is simplified.

According to the technique of twenty-second group using any one of refrigerants having a sufficiently low GWP above, highly efficient operation can be achieved.

According to the technique of twenty-third group using any one of refrigerants having a sufficiently low GWP above, even if the liquid-side refrigerant connection pipe and the gas-side refrigerant connection pipe are increased in diameter to minimize pressure loss, an increase in cost is minimized by using a pipe made of aluminum or aluminum alloy.

According to the technique of twenty-fourth group using any one of refrigerants having a sufficiently low GWP above, the thermal storage tank can store the resultant cold.

According to the technique of twenty-fifth group using any one of refrigerants having a sufficiently low GWP above, the efficiency of heat exchange can be enhanced.

BRIEF DESCRIPTION OF THE DRAWINGS

FIG. 3O is a schematic configuration diagram of a refrigerant circuit according to an eighth embodiment of the technique of third group.

FIG. 4O is a schematic control block diagram of a refrigeration cycle apparatus in accordance with the third embodiment of the technique of fourth group.

FIG. 11H is a schematic control block configuration diagram of a refrigeration cycle apparatus according to the second embodiment of the technique of eleventh group.

FIG. 11I is a schematic appearance perspective view of an outdoor unit according to the second embodiment of the technique of eleventh group.

FIG. 11J is a perspective view that shows the schematic structure of the inside of the outdoor unit according to the second embodiment of the technique of eleventh group.

FIG. 11K is a schematic appearance perspective view of an indoor unit according to the second embodiment of the technique of eleventh group.

FIG. 11L is a side cross-sectional view that shows the schematic structure of the inside of the indoor unit according to the second embodiment of the technique of eleventh group.

FIG. 11M is a schematic configuration diagram of a refrigerant circuit according to a third embodiment of the technique of eleventh group.

FIG. 11N is a schematic control block configuration diagram of a refrigeration cycle apparatus according to the third embodiment of the technique of eleventh group.

FIG. 11O is a schematic appearance perspective view of an outdoor unit according to the third embodiment of the technique of eleventh group.

FIG. 11P is an exploded perspective view that shows the schematic structure of the inside of the outdoor unit according to the third embodiment of the technique of eleventh group.

FIG. 12A is a refrigeration circuit diagram of an air conditioner in which a compressor according to an embodiment of the technique of twelfth group is utilized.

FIG. 12B is a longitudinal sectional view of the compressor according to an embodiment of the technique of twelfth group.

FIG. 12C is a sectional view of a motor sectioned along a plane perpendicular to an axis of the technique of twelfth group.

Figure 12A:
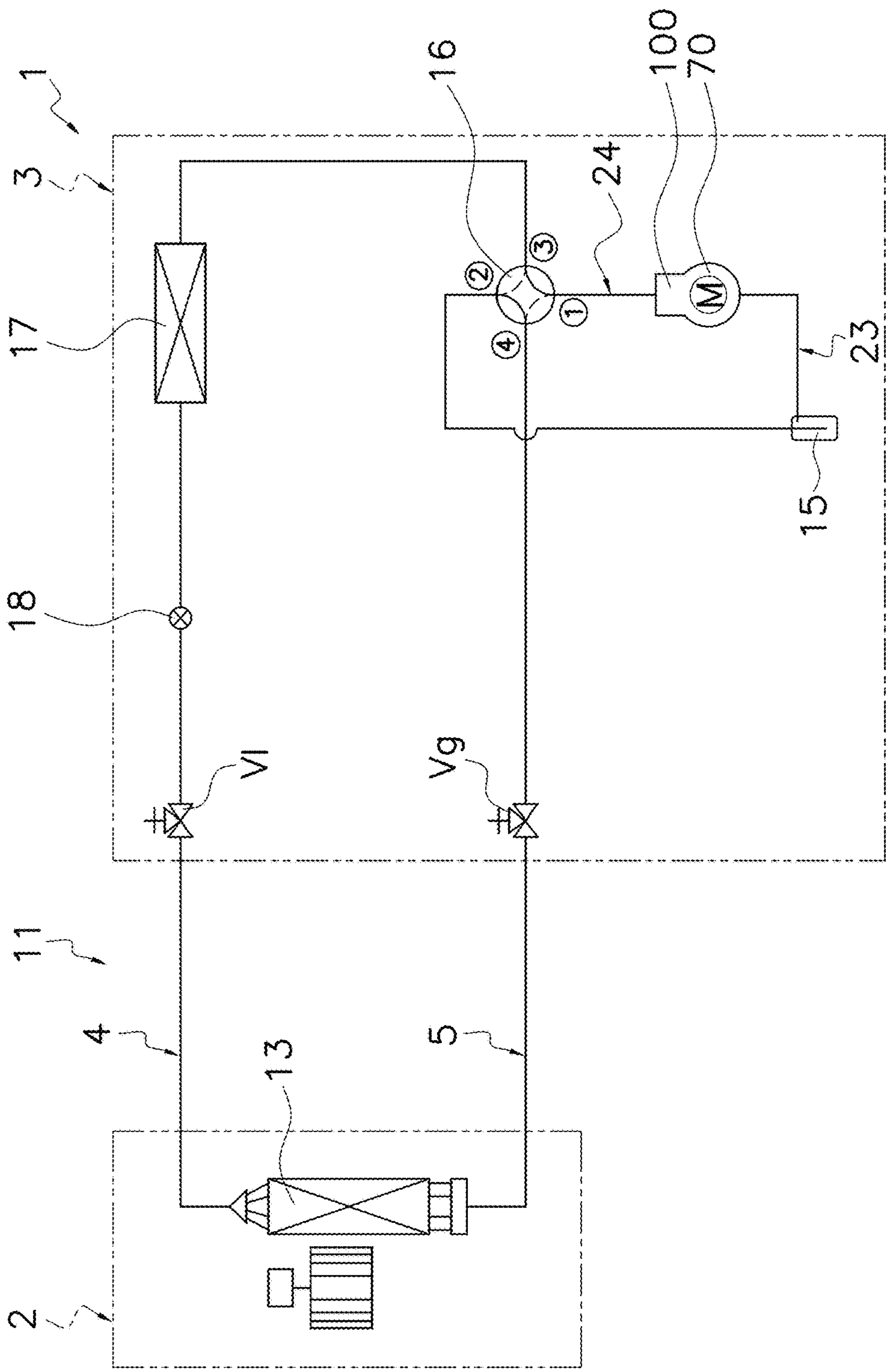
Figure 12B:
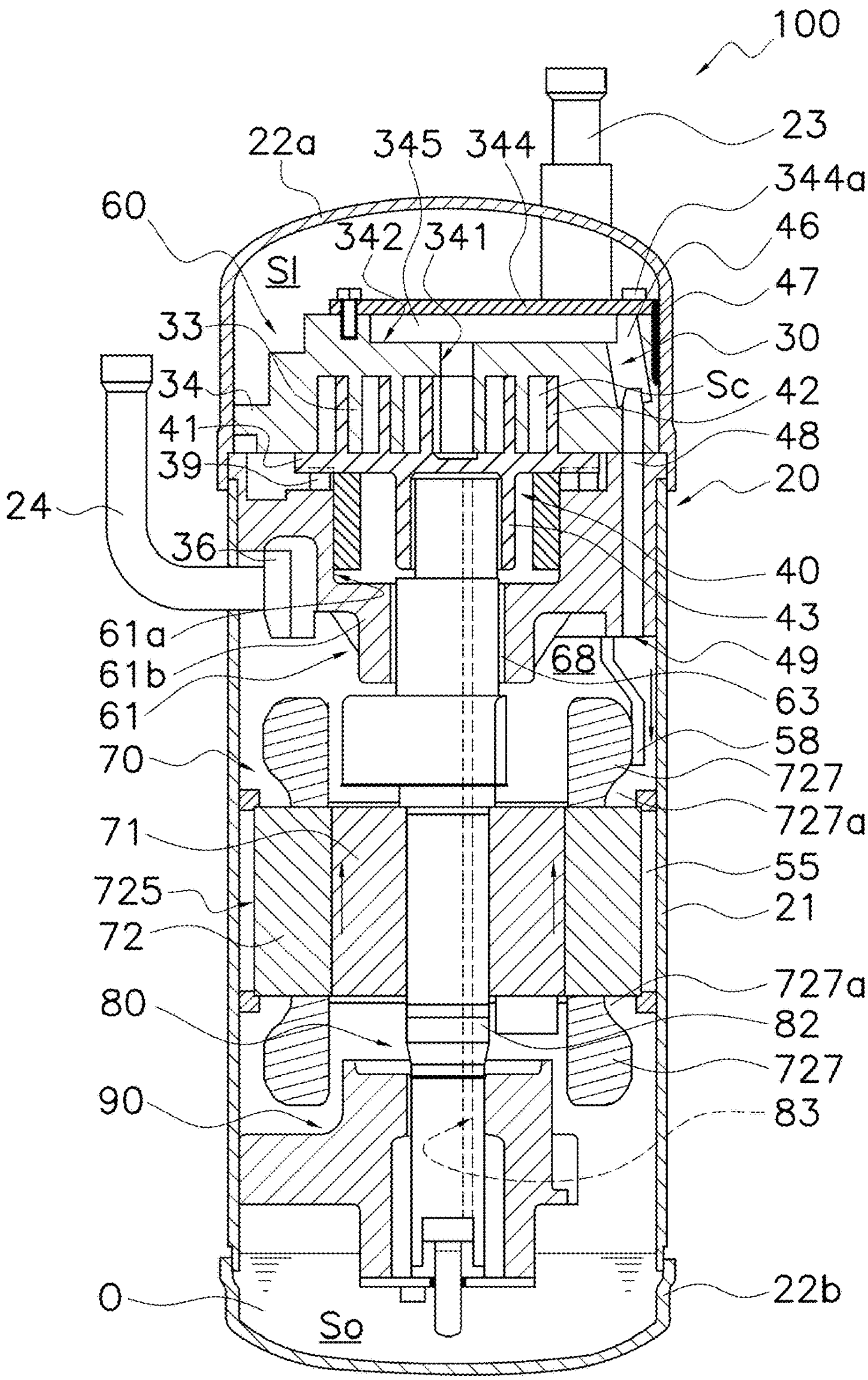
Figure 12C:
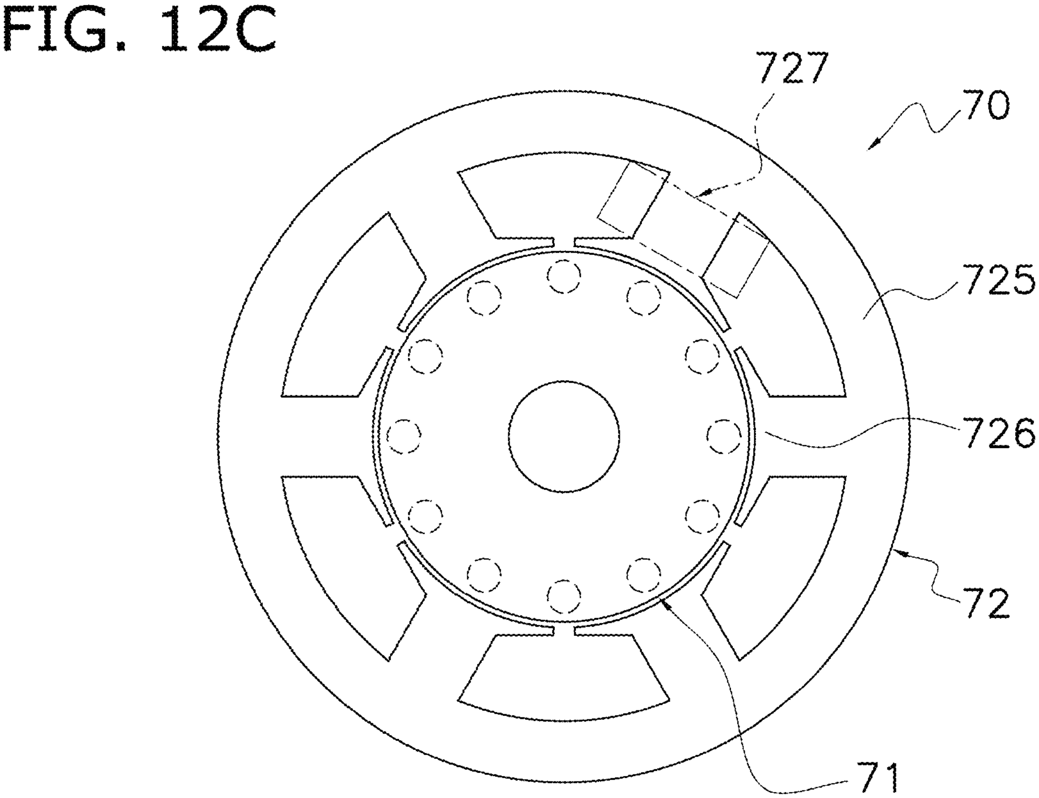
Figure 12D:
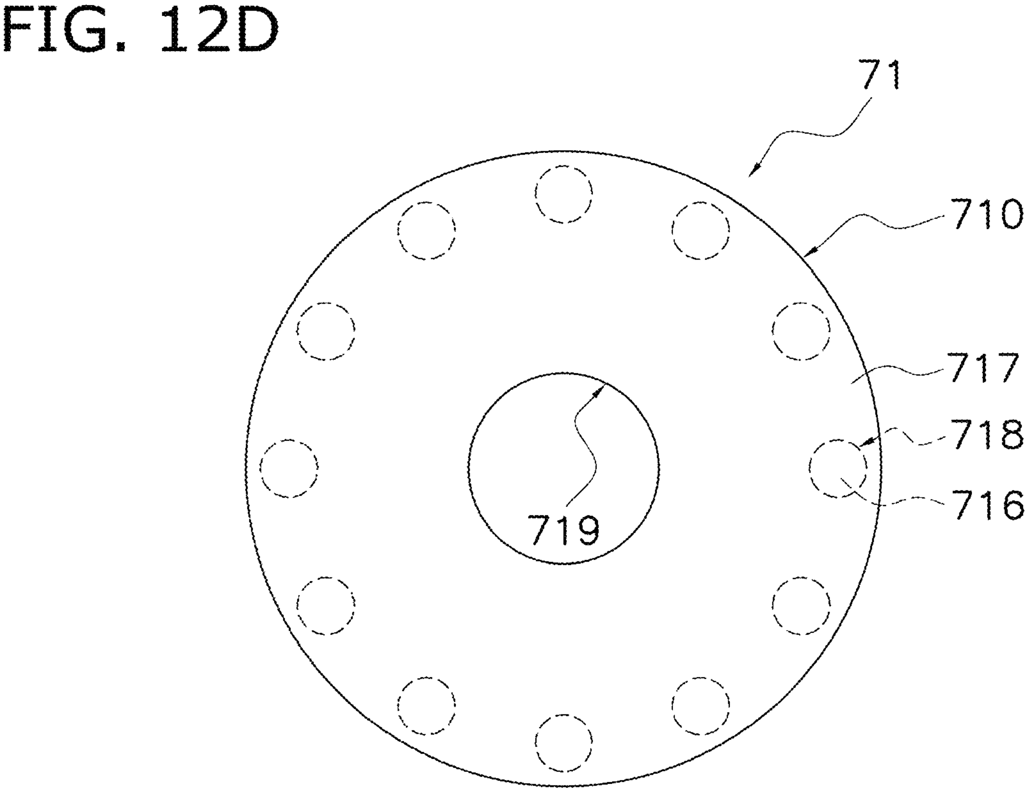

FIG. 12D is a sectional view of a rotor sectioned along a plane perpendicular to an axis of the technique of twelfth group.

Figure 12E:
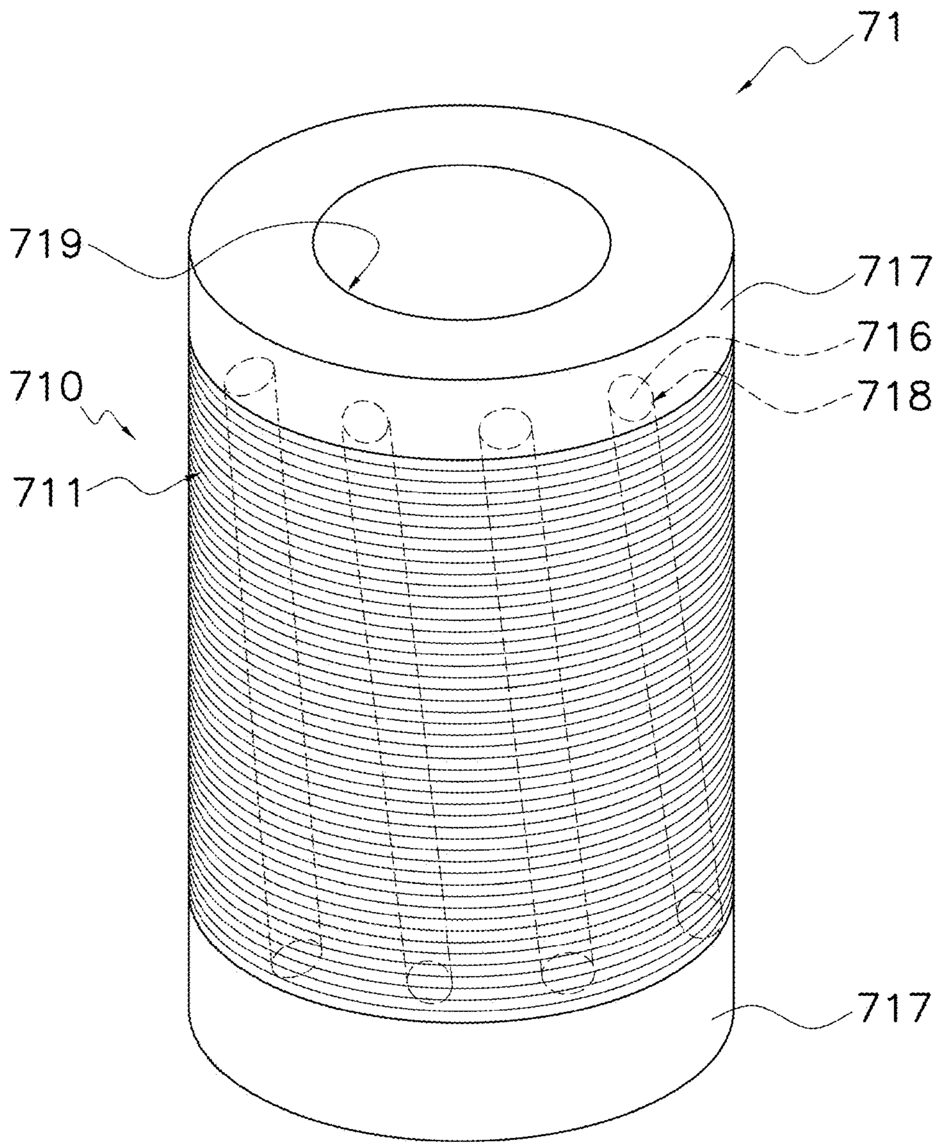

FIG. 12E is a perspective view of the rotor of the technique of twelfth group.

Figure 12F:
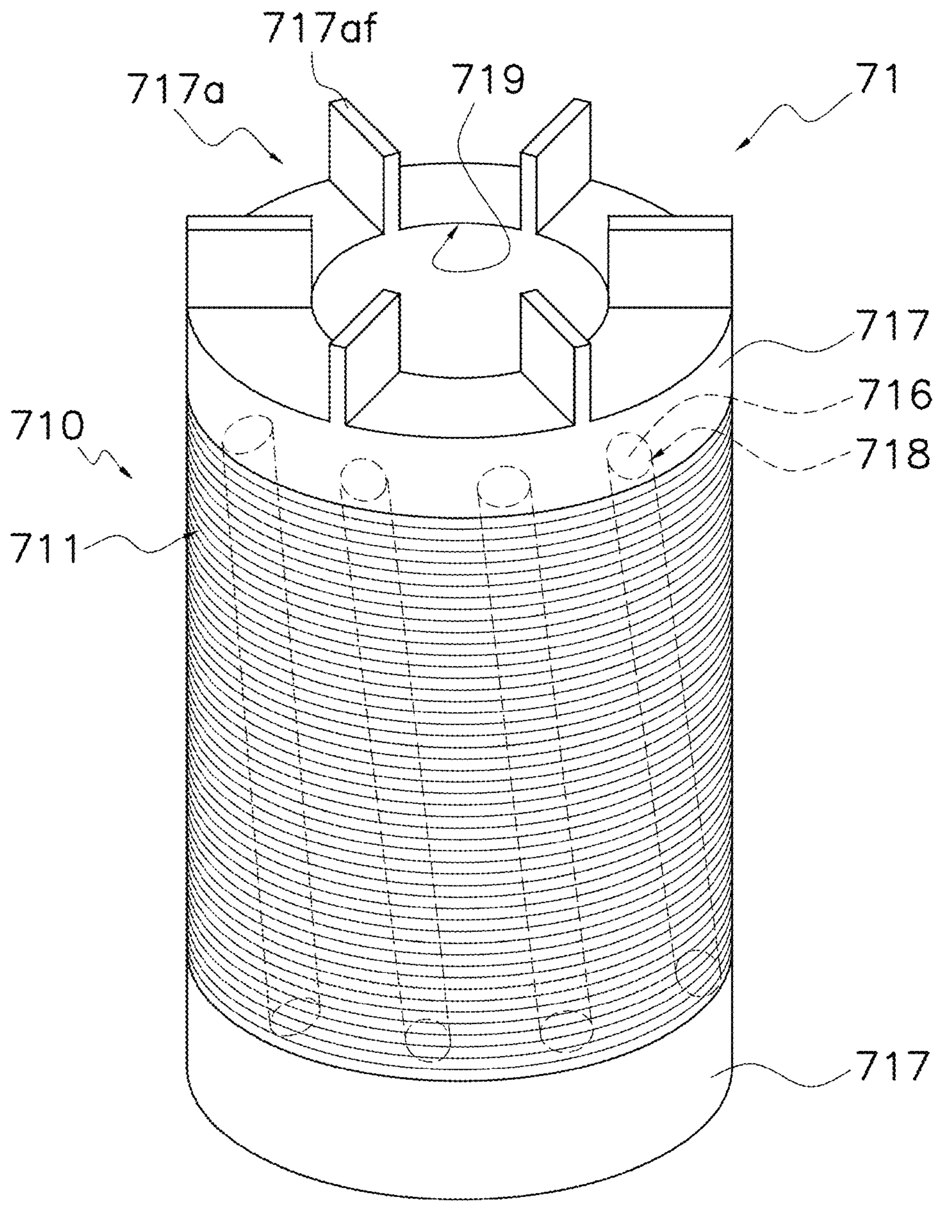

FIG. 12F is a perspective view of a rotor 71 used in an induction motor of a compressor according to a second modification of the technique of twelfth group.

Figure 12G:
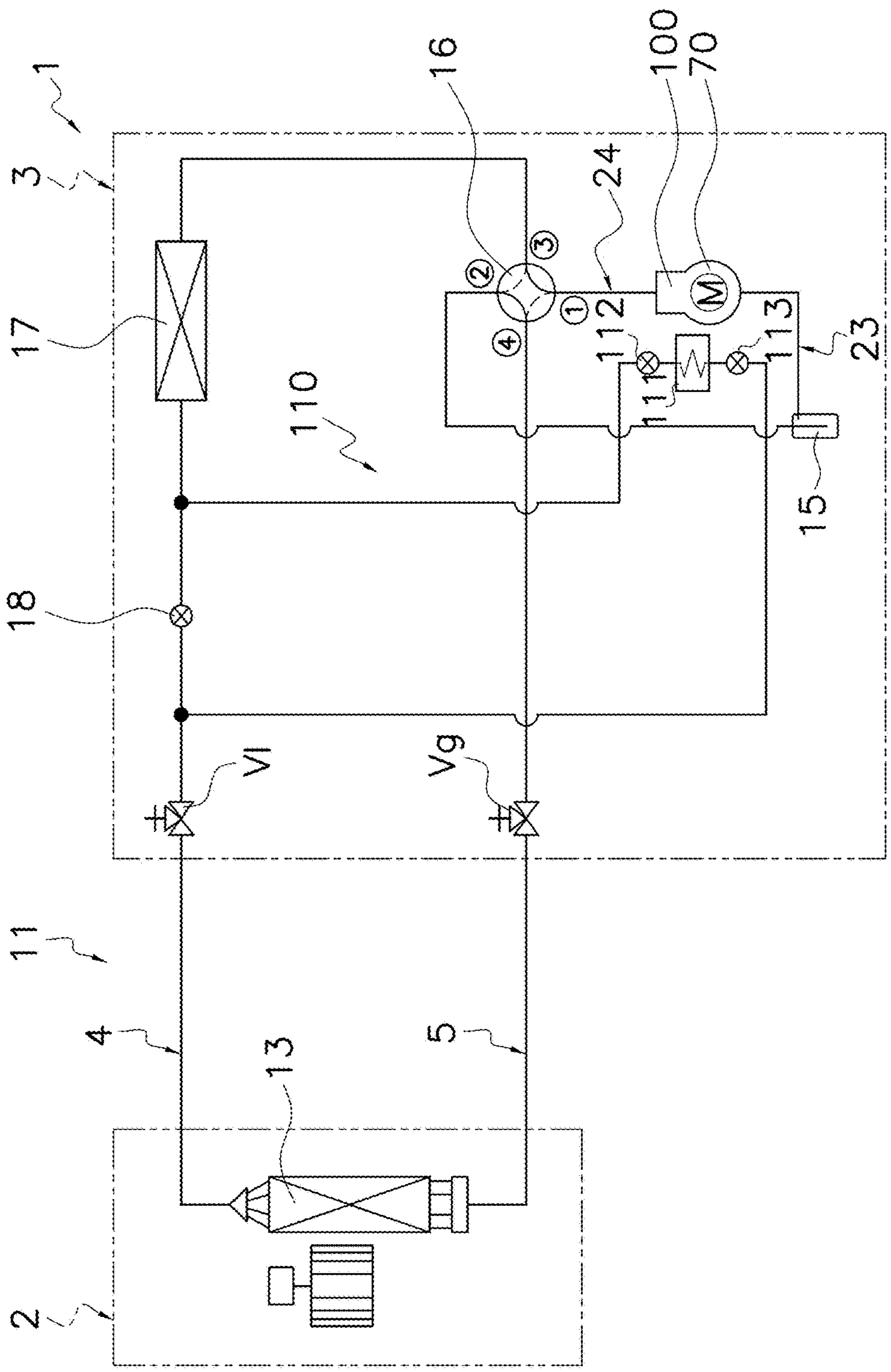

FIG. 12G is a refrigerant circuit diagram of an air conditioner in which a compressor according to a third modification of the technique of twelfth group is utilized.

Figure 12H:
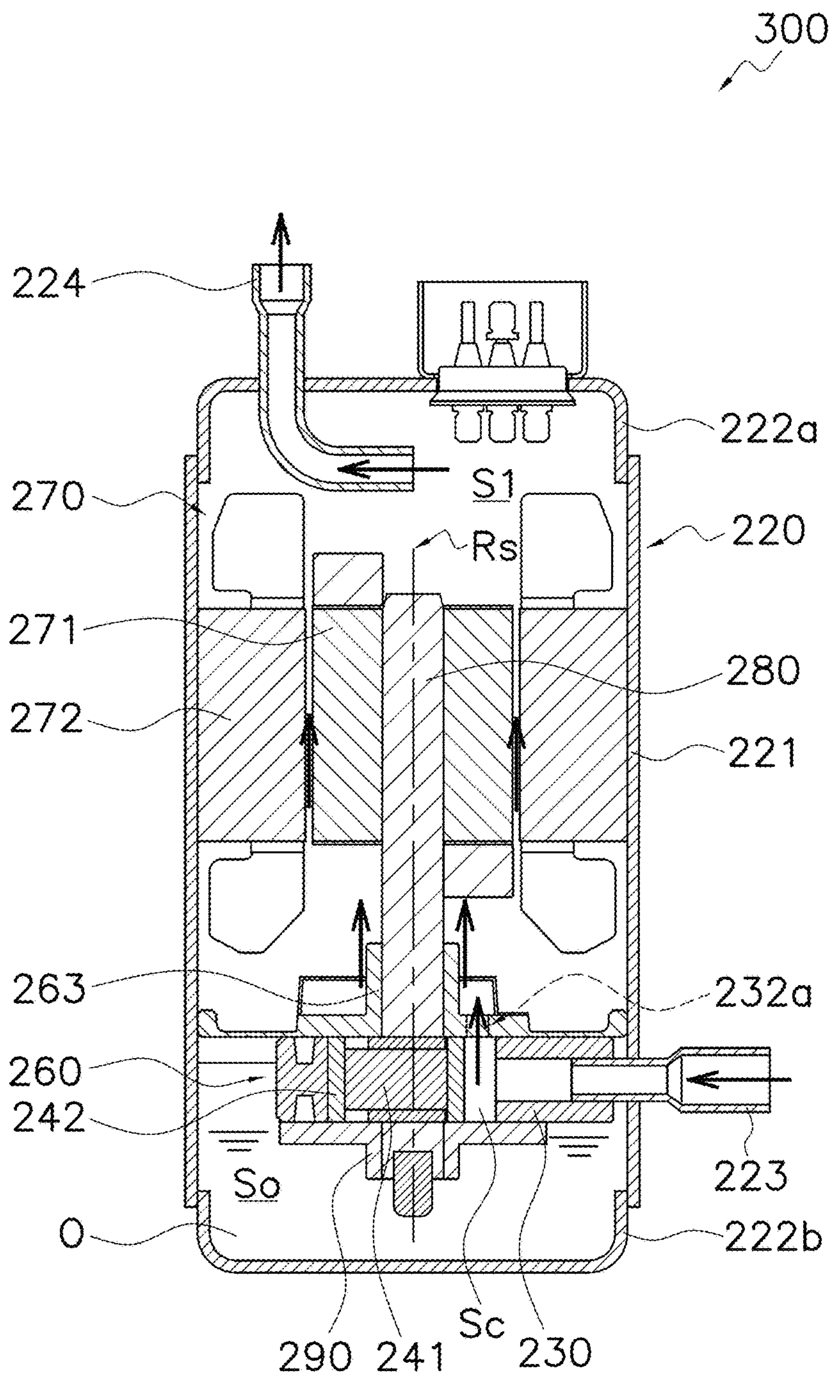

FIG. 12H is a longitudinal sectional view of a compressor according to a second embodiment of the technique of twelfth group.

Figure 13A:
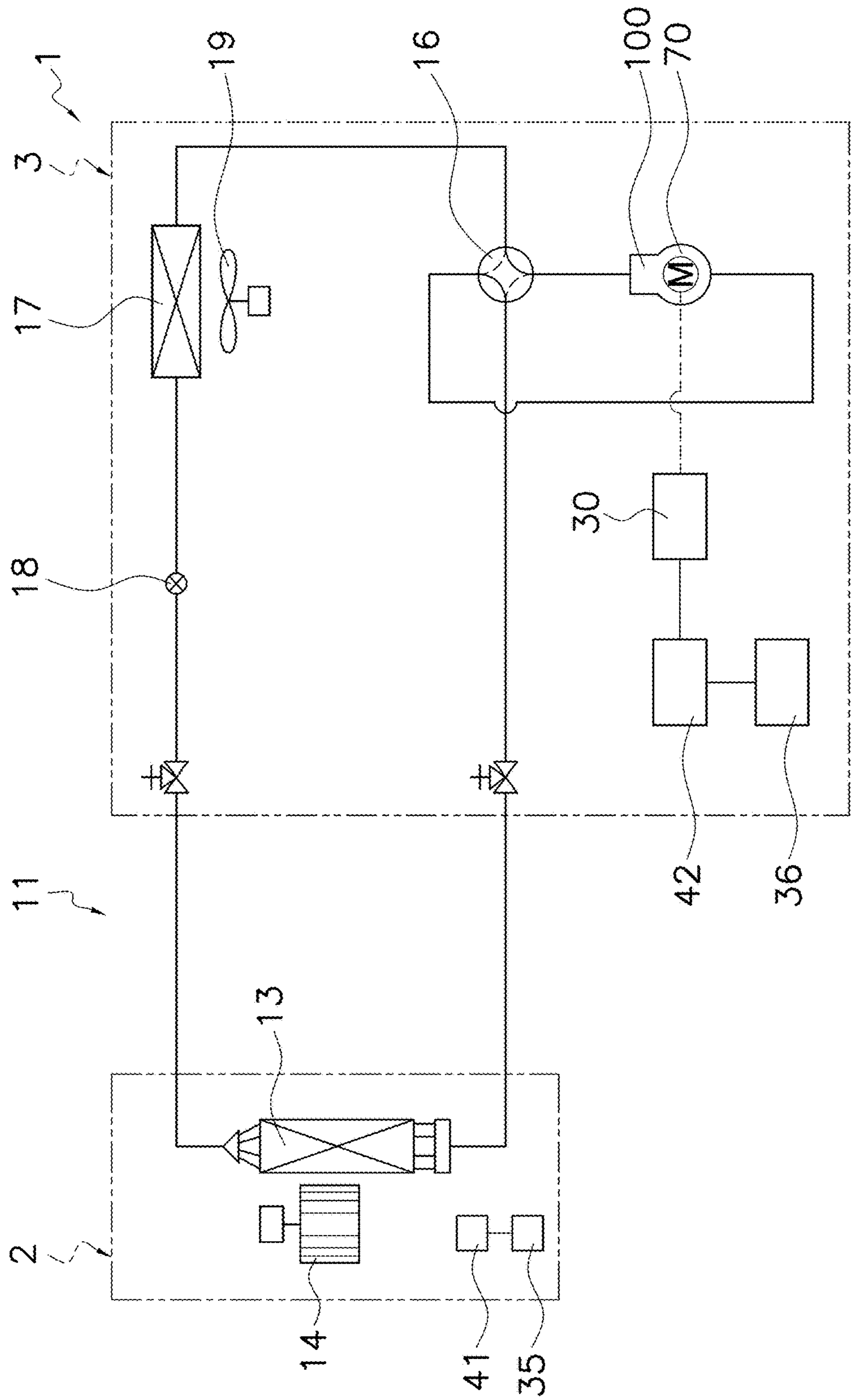

FIG. 13A is a configuration diagram of an air conditioner according to a first embodiment of the technique of thirteenth group.

Figure 13B:
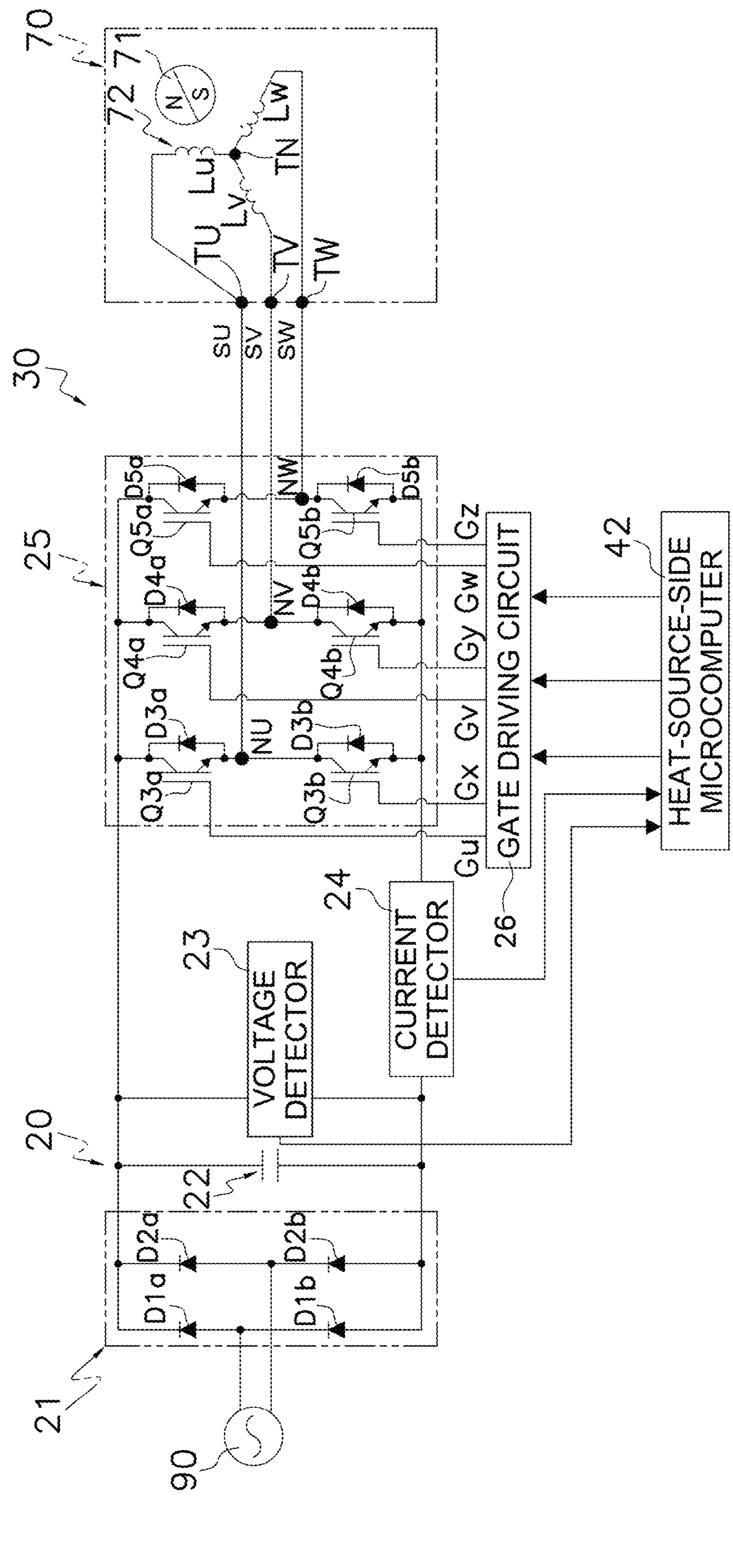

FIG. 13B is a circuit block diagram of a power conversion device mounted in an air conditioner according to the first embodiment of the technique of thirteenth group.

Figure 13C:
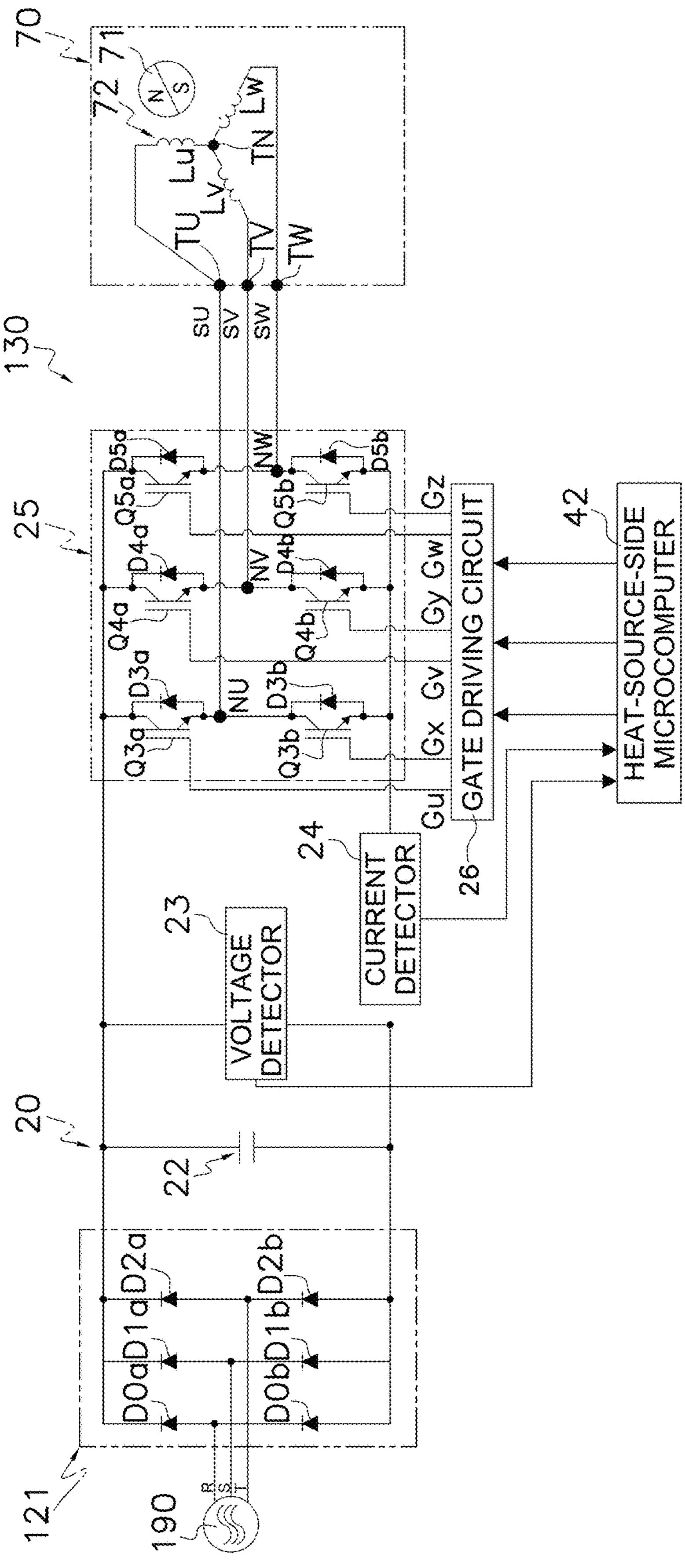

FIG. 13C is a circuit block diagram of a power conversion device according to a modification example of the first embodiment of the technique of thirteenth group.

Figure 13D:
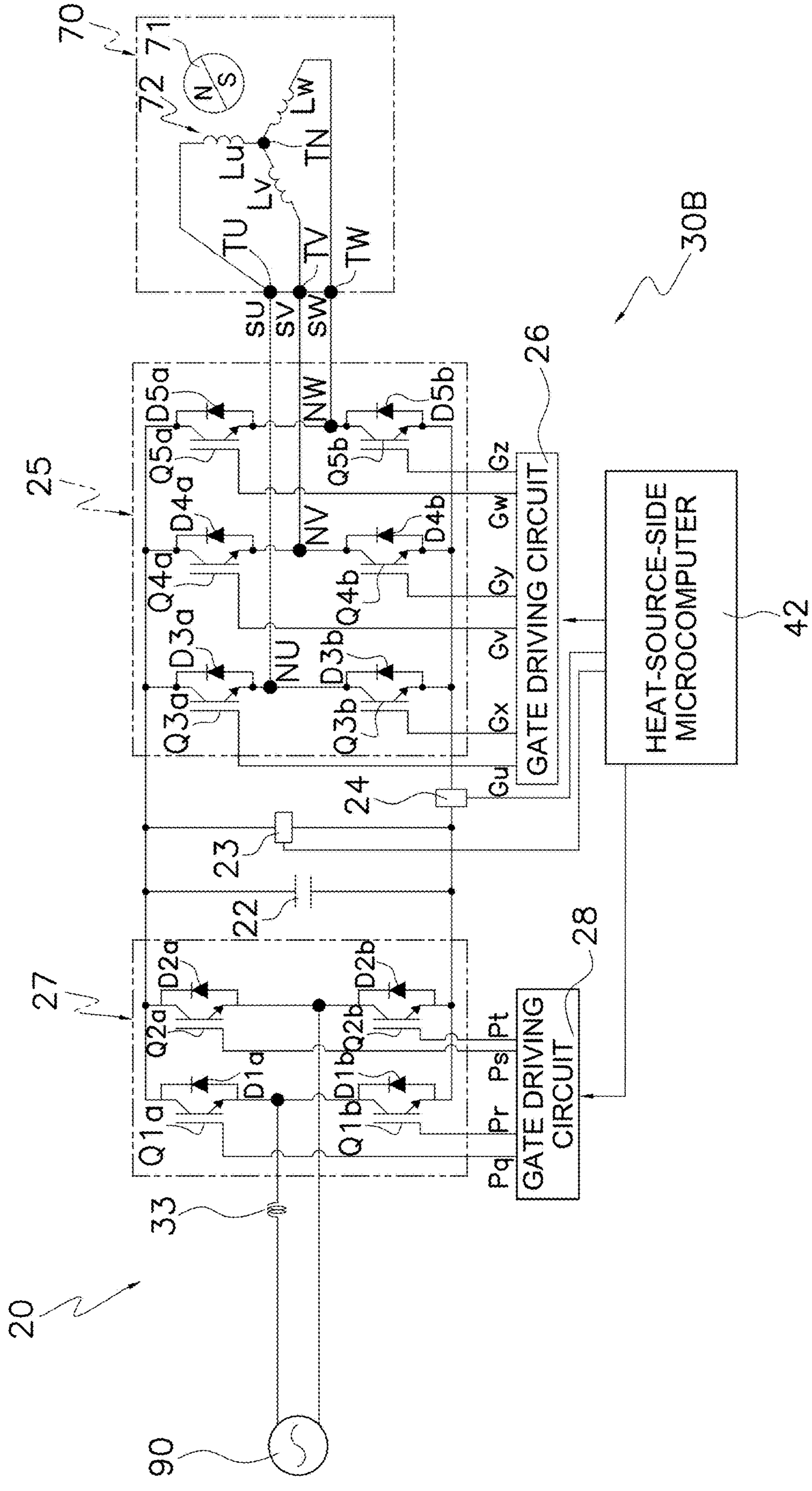

FIG. 13D is a circuit block diagram of a power conversion device mounted in an air conditioner according to a second embodiment of the technique of thirteenth group.

Figure 13E:
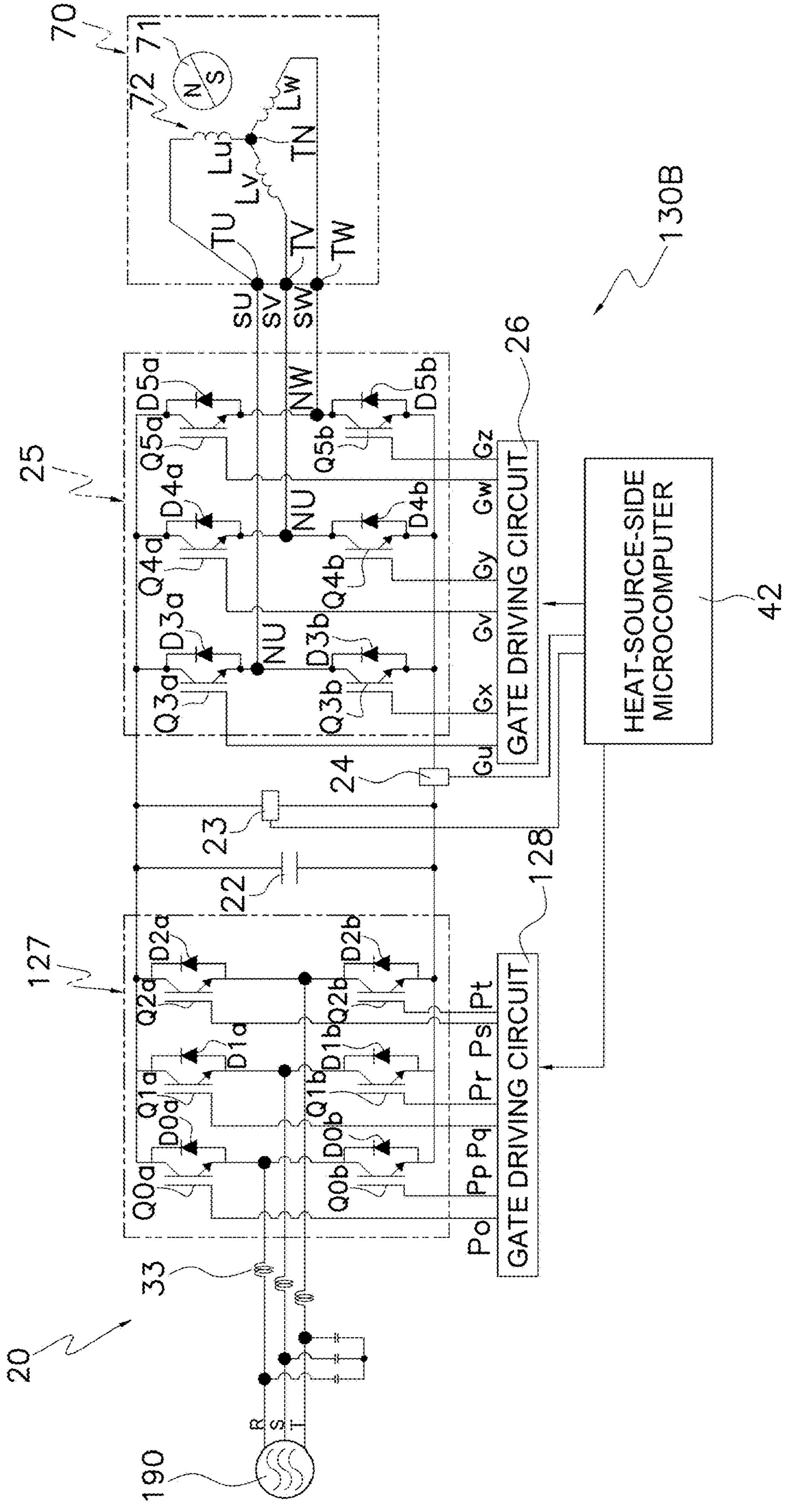

FIG. 13E is a circuit block diagram of a power conversion device according to a modification example of the second embodiment of the technique of thirteenth group.

Figure 13F:
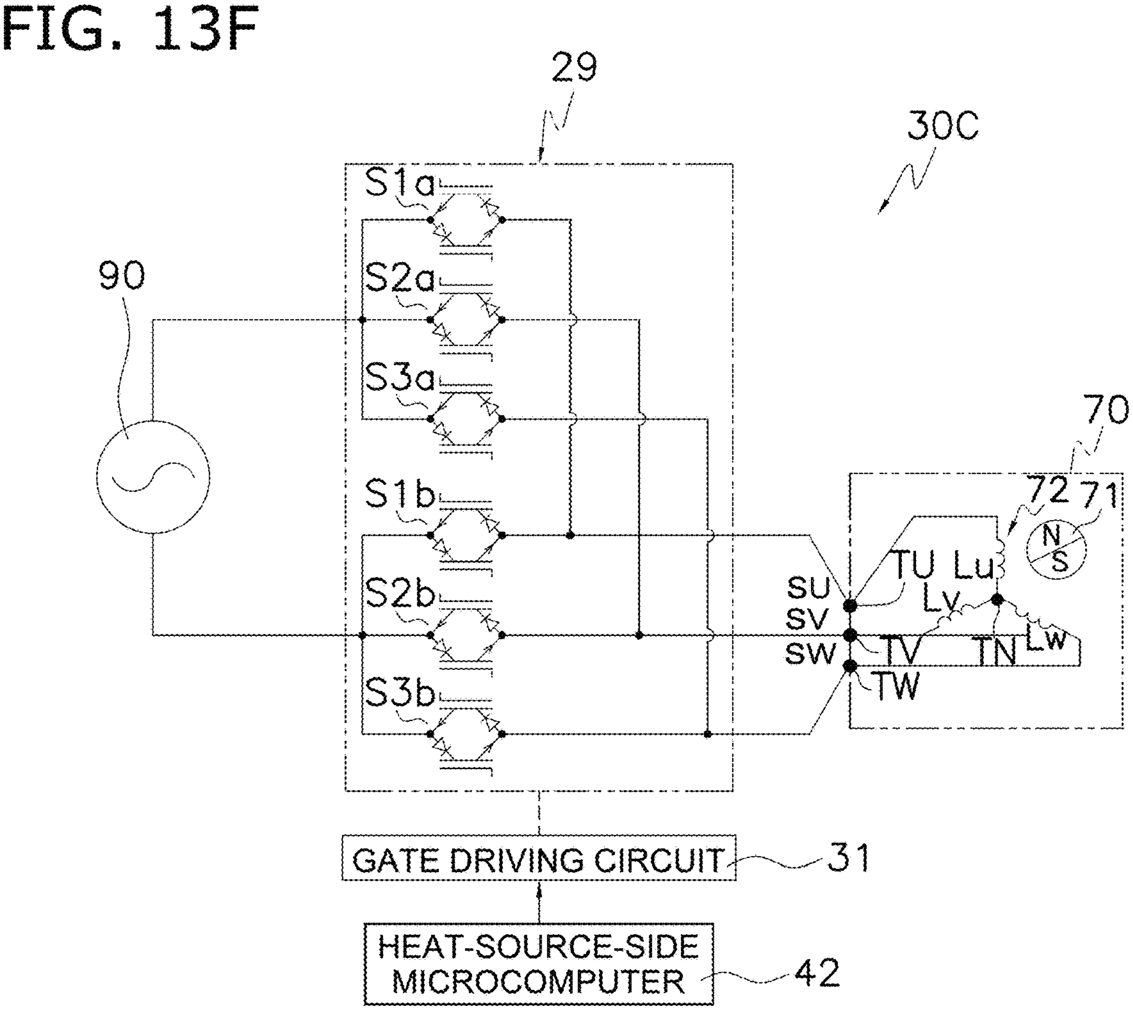

FIG. 13F is a circuit block diagram of a power conversion device mounted in an air conditioner according to a third embodiment of the technique of thirteenth group.

Figure 13G:
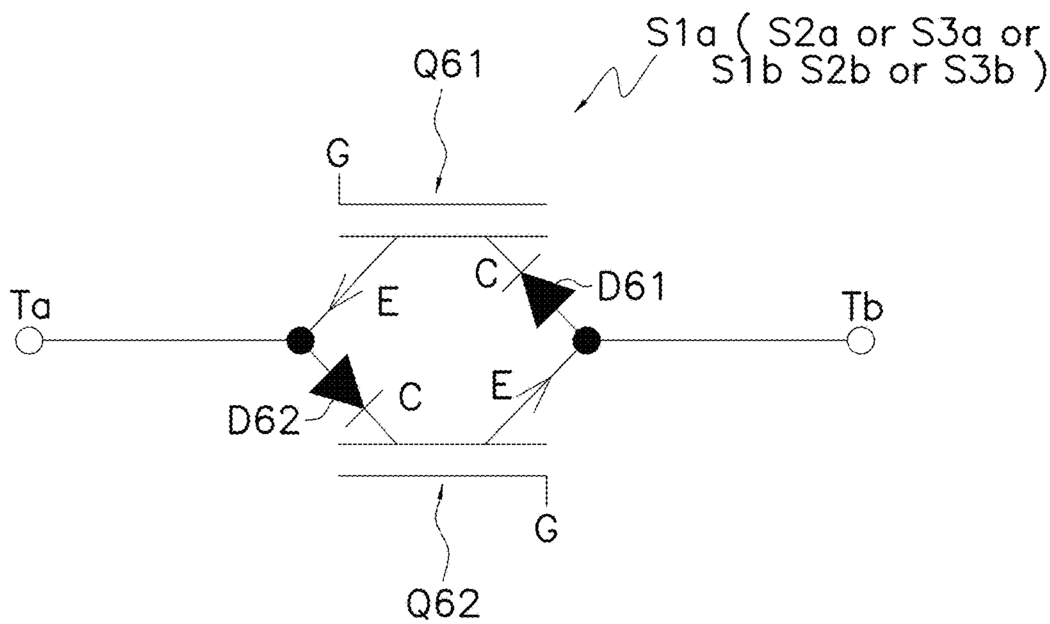

FIG. 13G is a circuit diagram conceptionally illustrating a bidirectional switch of the technique of thirteenth group.

Figure 13H:
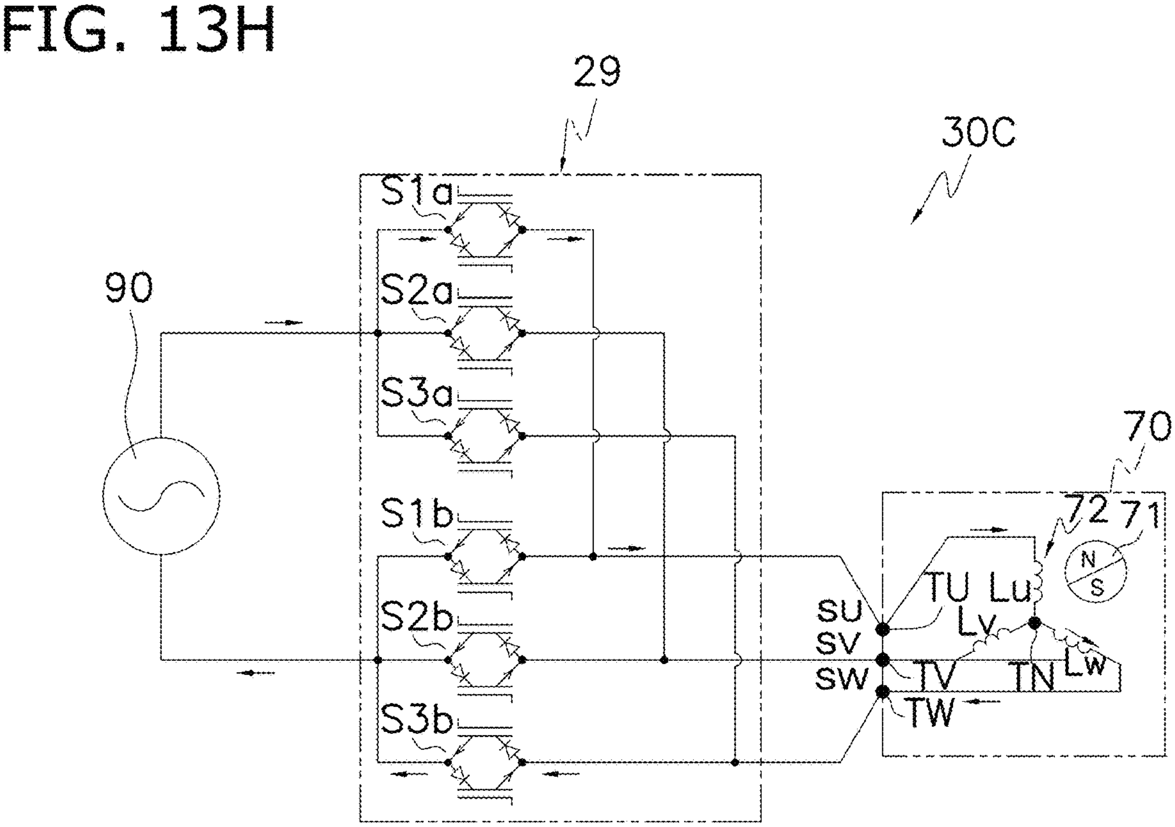

FIG. 13H is a circuit diagram illustrating an example of a current direction in a matrix converter of the technique of thirteenth group.

Figure 13I:
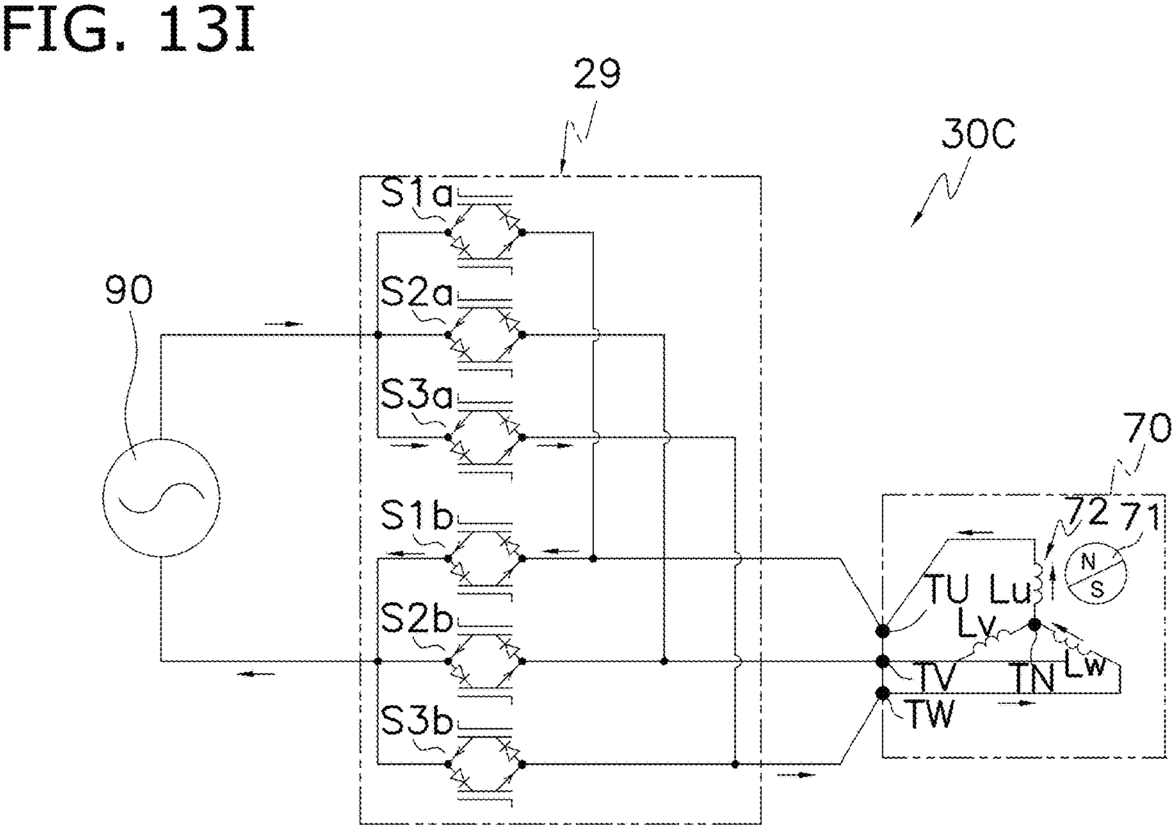

FIG. 13I is a circuit diagram illustrating an example of another current direction in the matrix converter of the technique of thirteenth group.

Figure 13J:
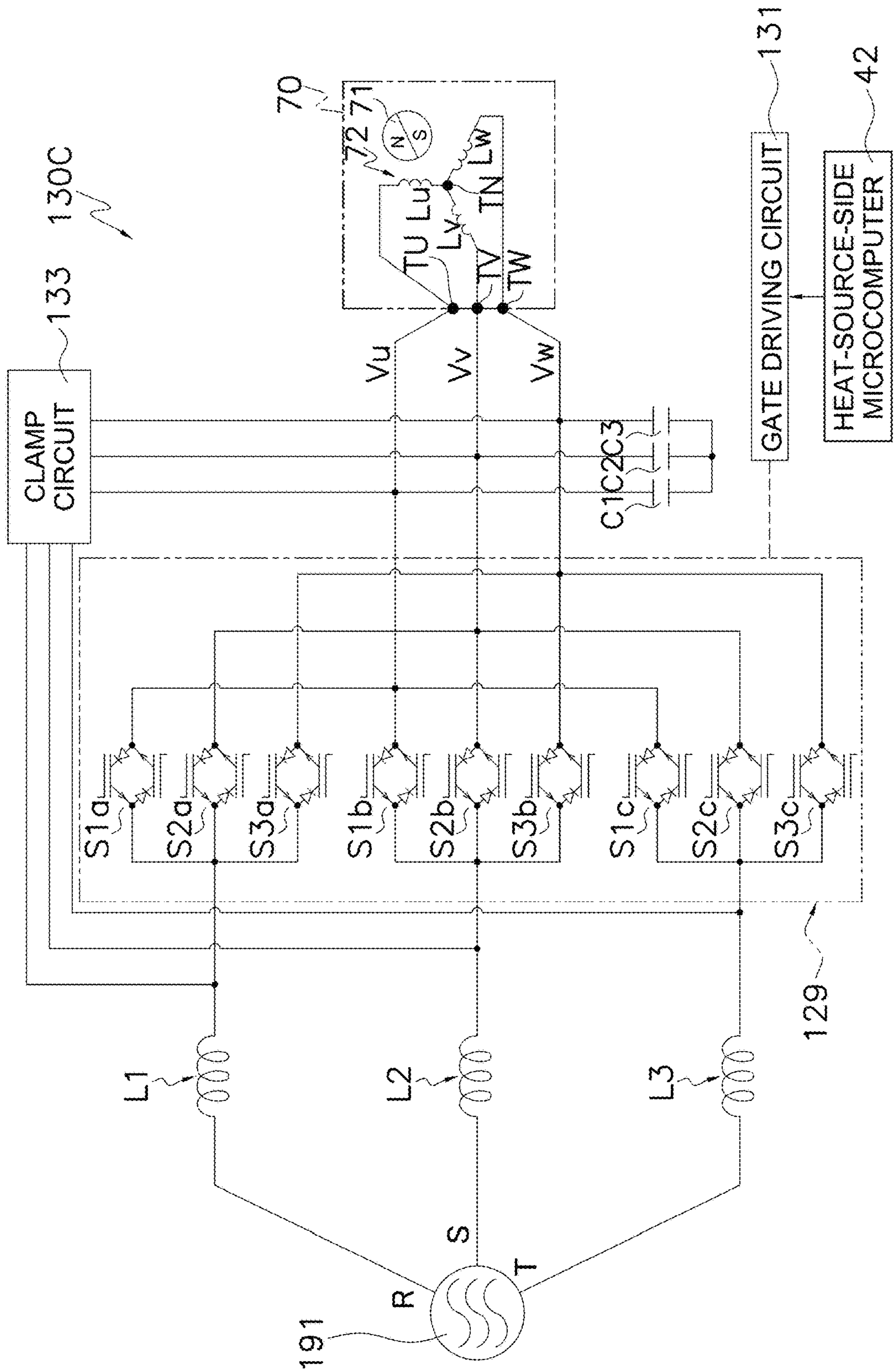

FIG. 13J is a circuit block diagram of a power conversion device according to a modification example of the third embodiment of the technique of thirteenth group.

Figure 13K:
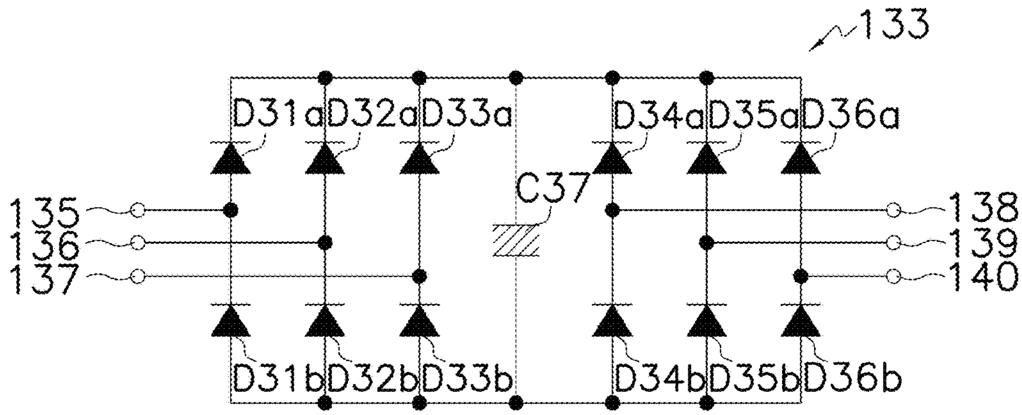

FIG. 13K is a circuit diagram of a clamp circuit of the technique of thirteenth group.

Figure 14A:
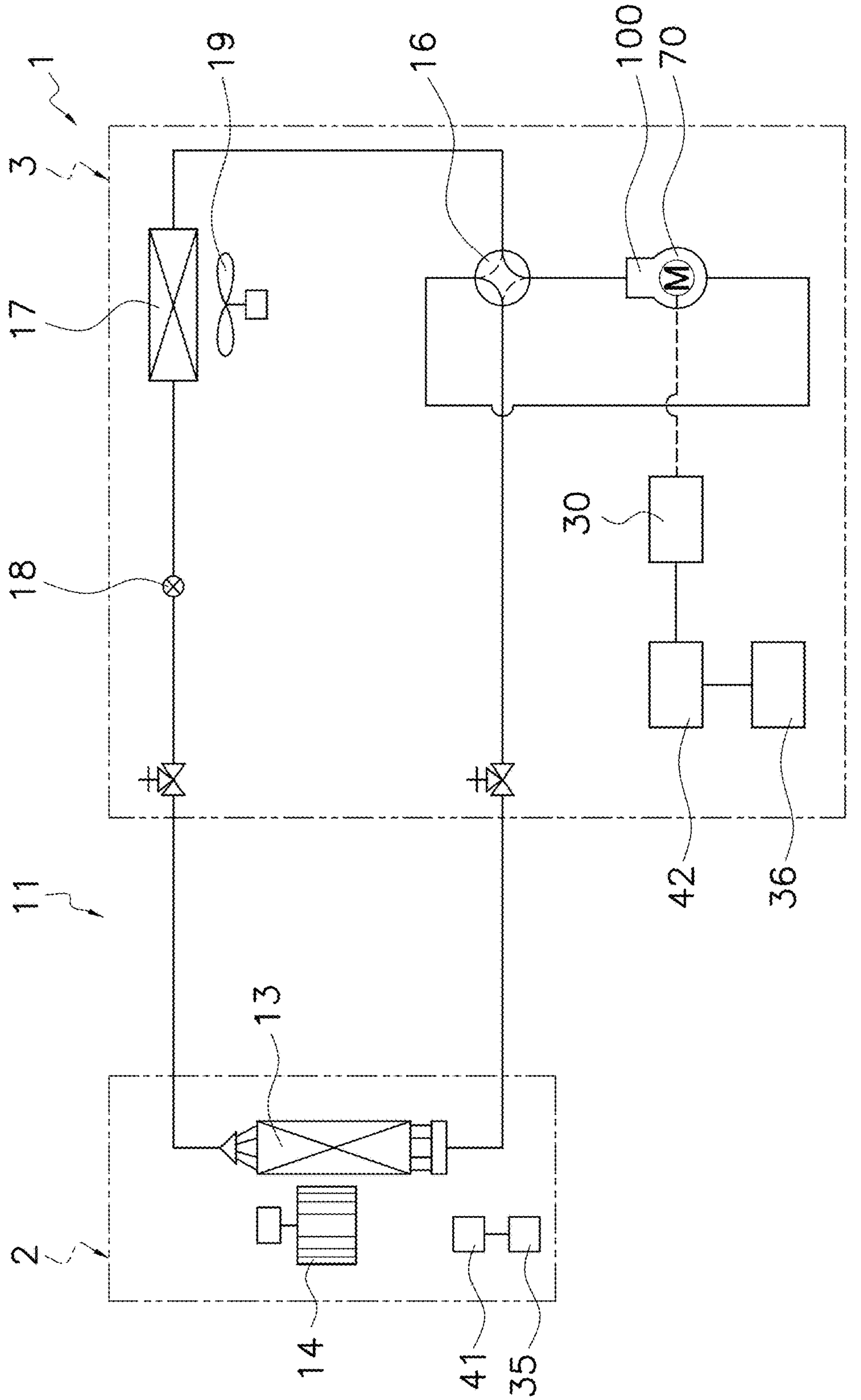

FIG. 14A is a configuration diagram of an air conditioner according to one embodiment of the technique of fourteenth group.

Figure 14B:
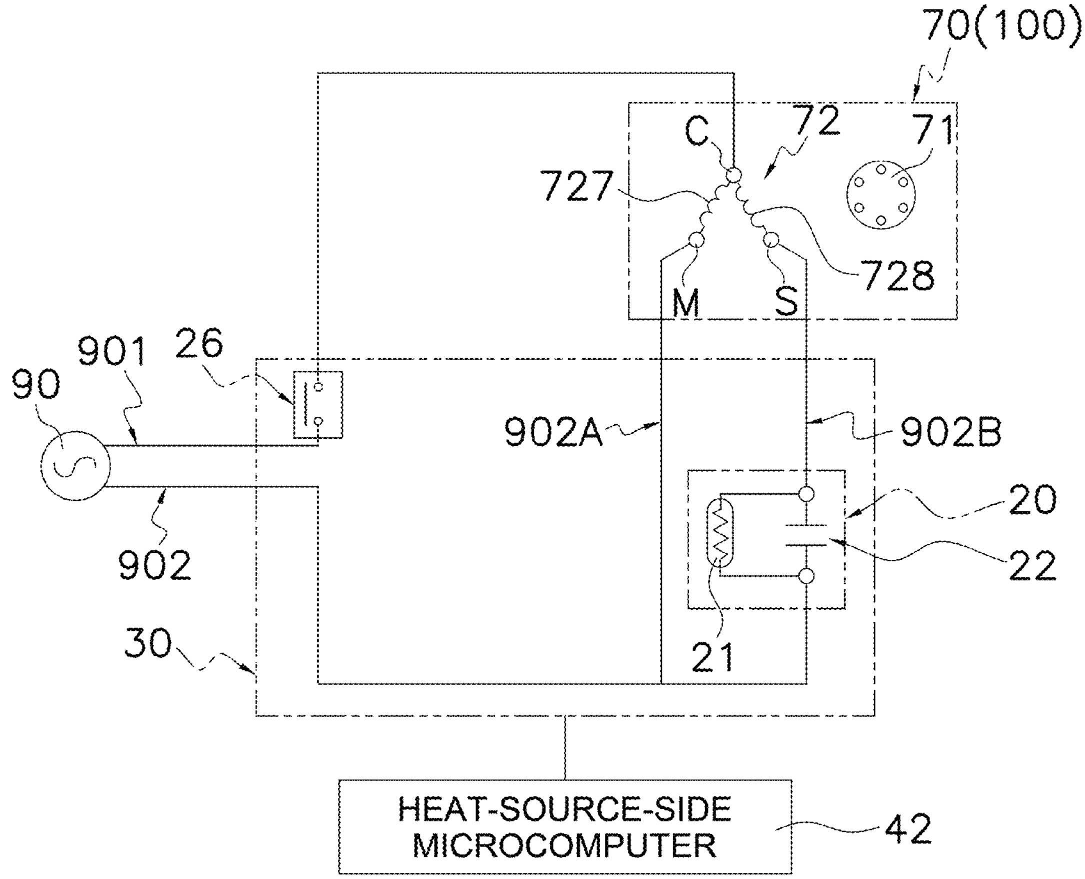

FIG. 14B is an operation circuit diagram of a motor of a compressor of the technique of fourteenth group.

Figure 14C:
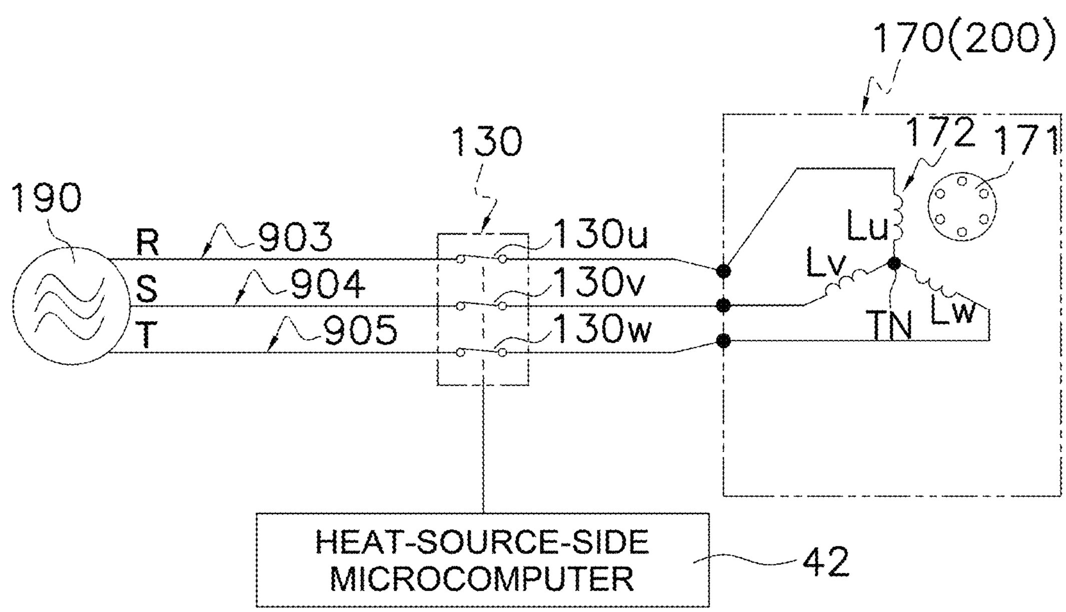

FIG. 14C is an operation circuit diagram of a motor of a compressor in an air conditioner according to a modification example of the technique of fourteenth group.

Figure 15A:
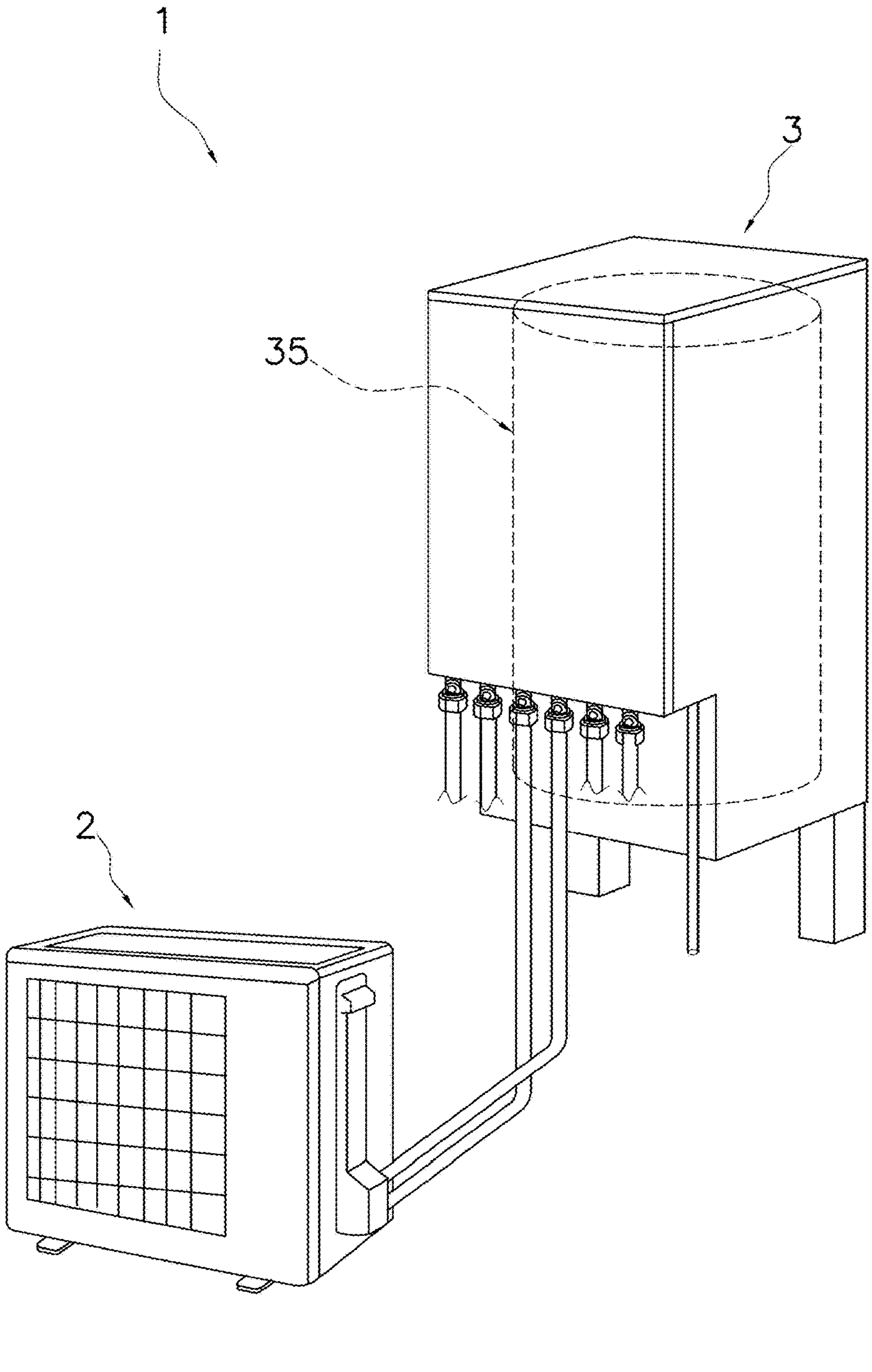

FIG. 15A is an external view of a warm-water supply system serving as a warm-water generating apparatus according to a first embodiment of the technique of fifteenth group.

Figure 15B:
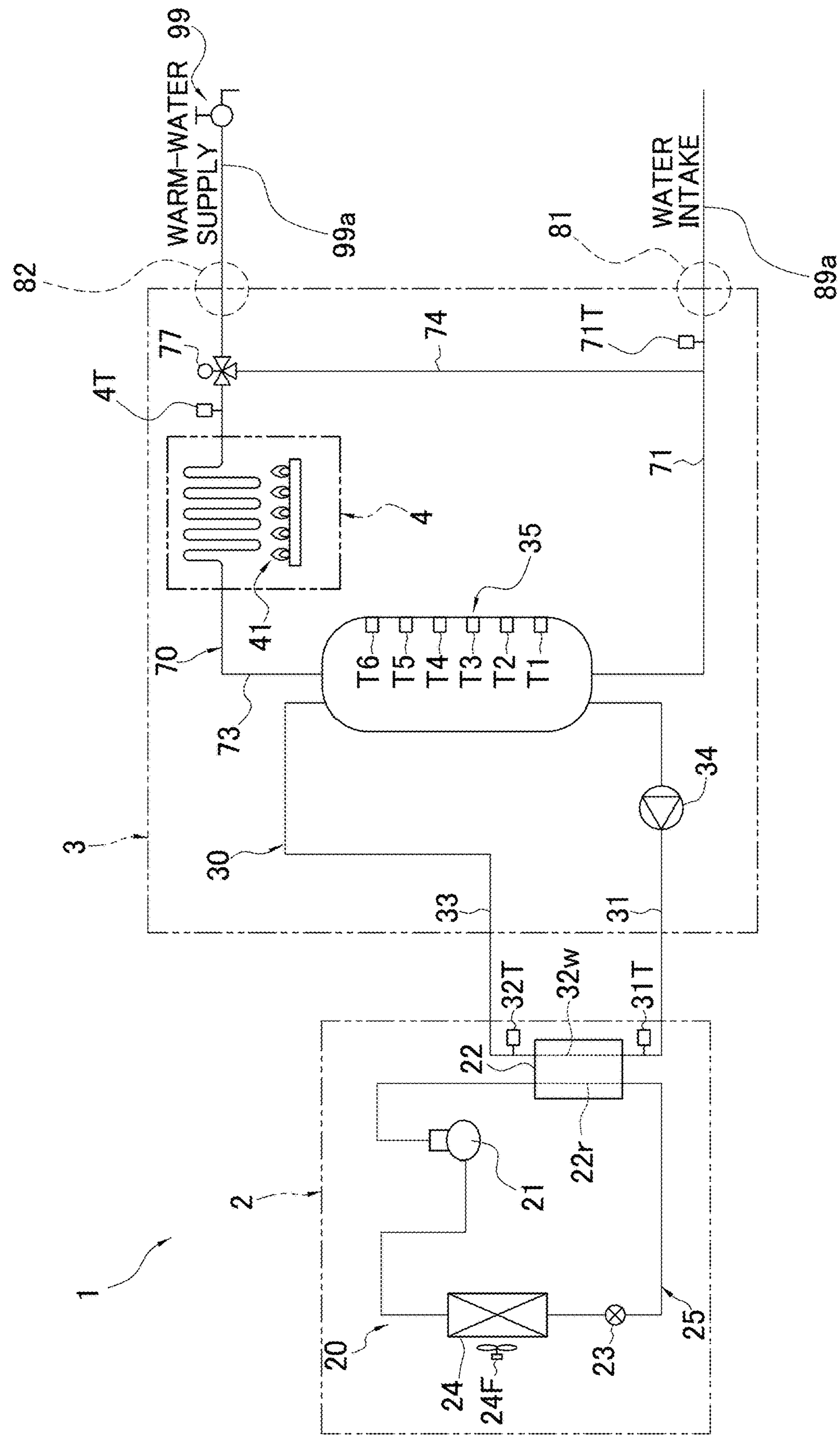

FIG. 15B is a water-circuit and refrigerant-circuit diagram of the warm-water supply system according to the first embodiment of the technique of fifteenth group.

Figure 15C:
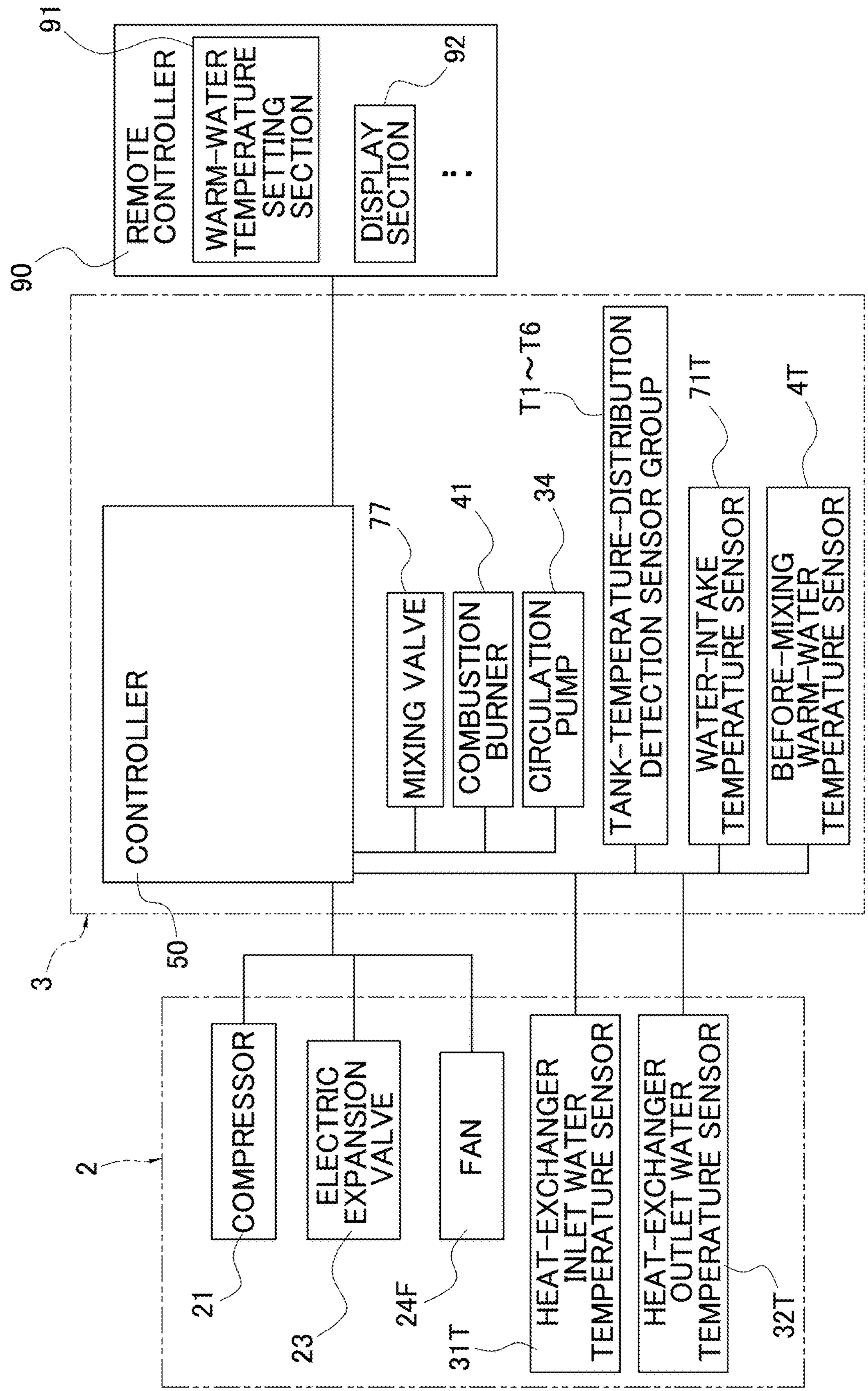

FIG. 15C is a control block diagram of the warm-water supply system according to a first embodiment of the technique of fifteenth group.

Figure 15D:
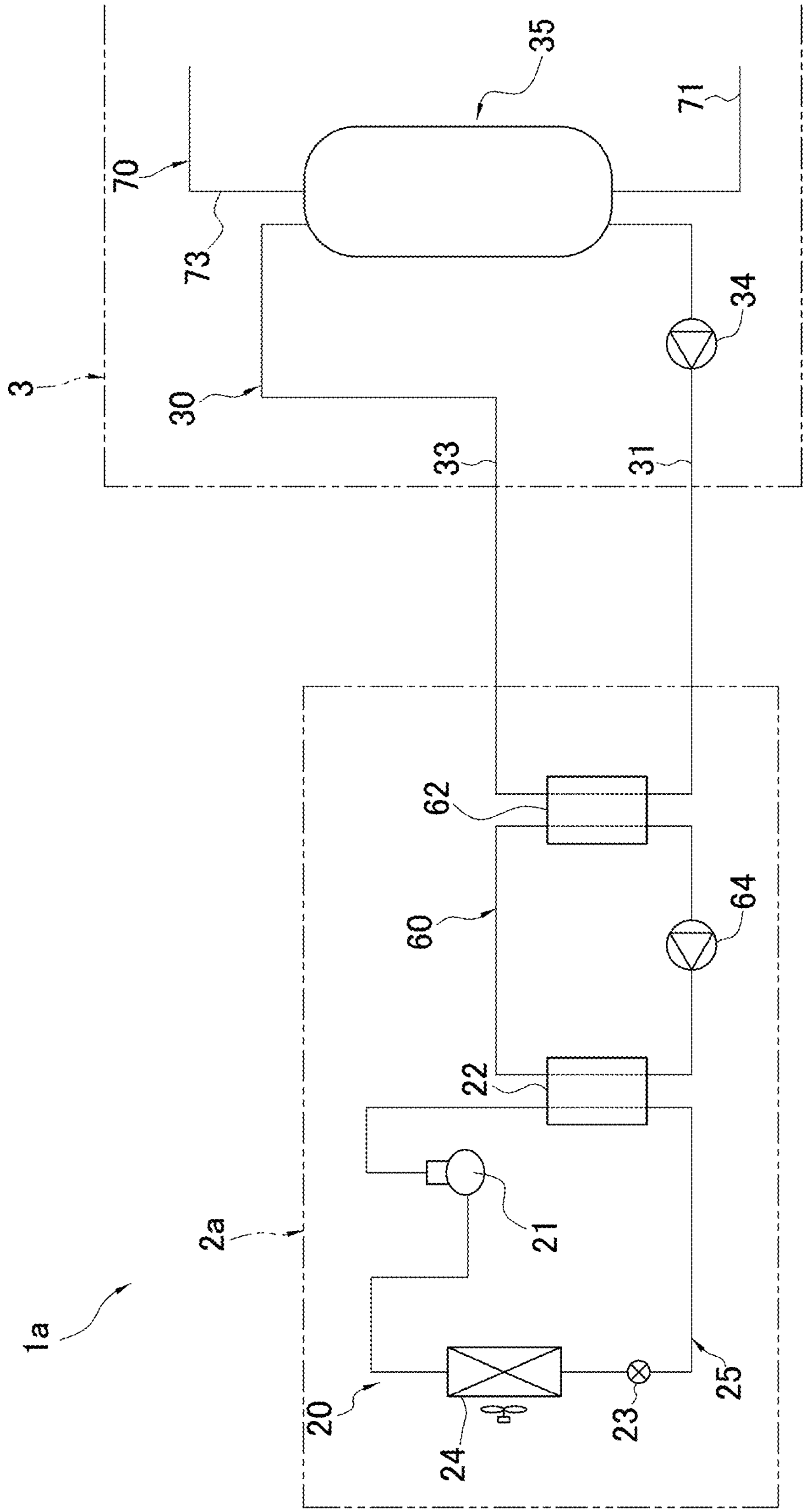

FIG. 15D is a water-circuit and refrigerant-circuit diagram of a warm-water supply system according to a first modification of the first embodiment of the technique of fifteenth group.

Figure 15E:
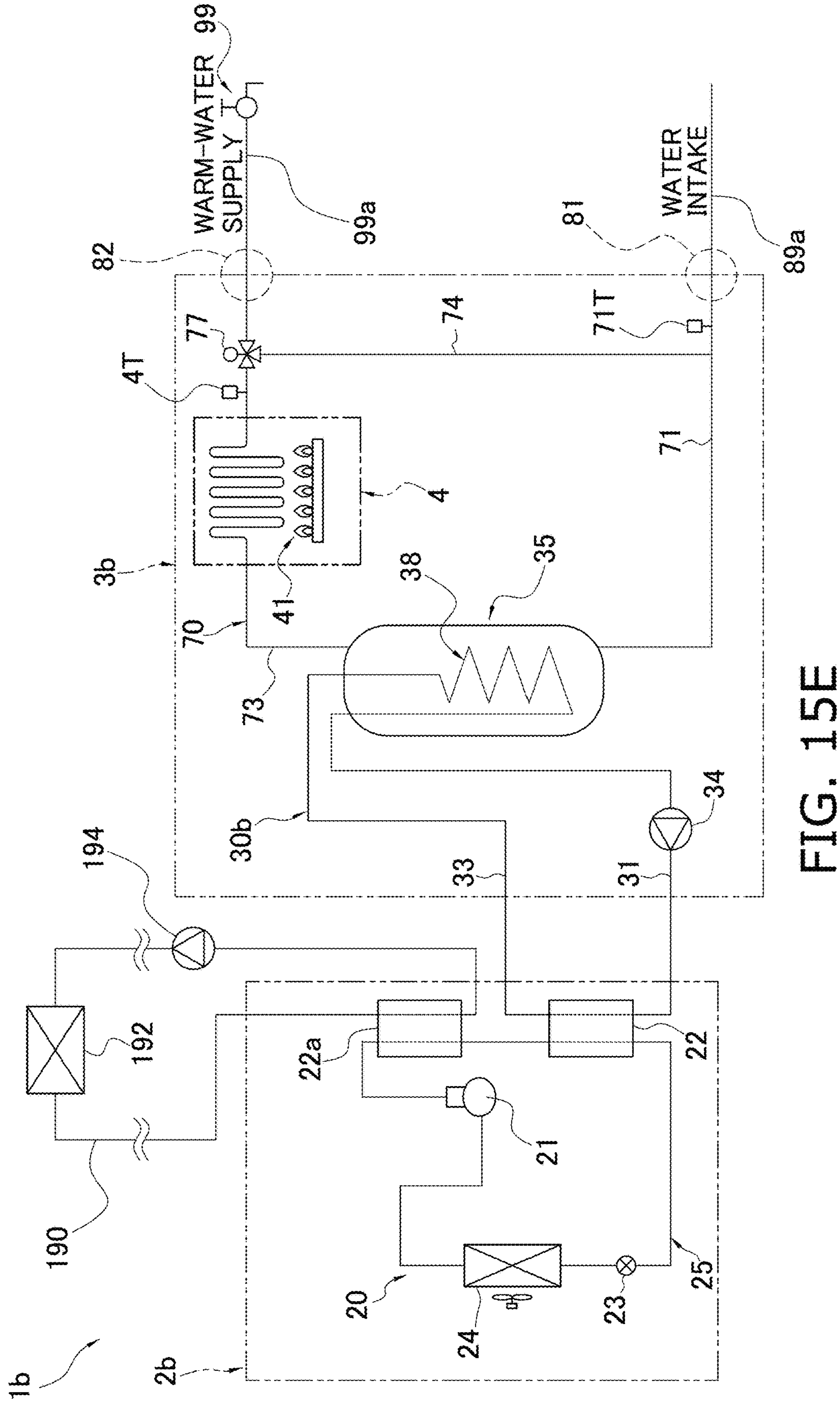

FIG. 15E is a water-circuit and refrigerant-circuit diagram of a warm-water supply system according to a second modification of the first embodiment of the technique of fifteenth group.

Figure 15F:
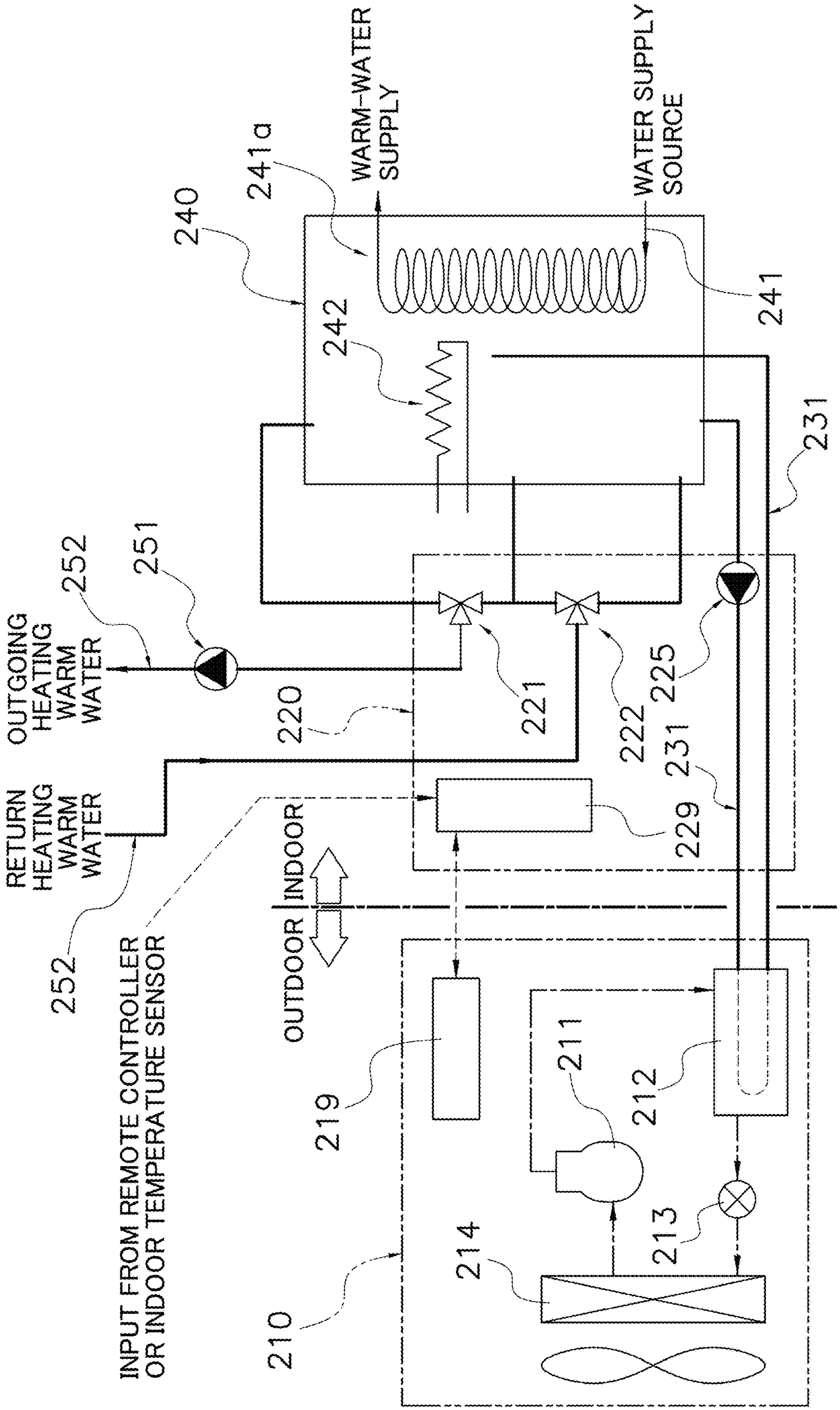

FIG. 15F illustrates a part of a configuration of a warm-water circulation heating system serving as a warm-water generating apparatus according to a second embodiment of the technique of fifteenth group.

Figure 15G:
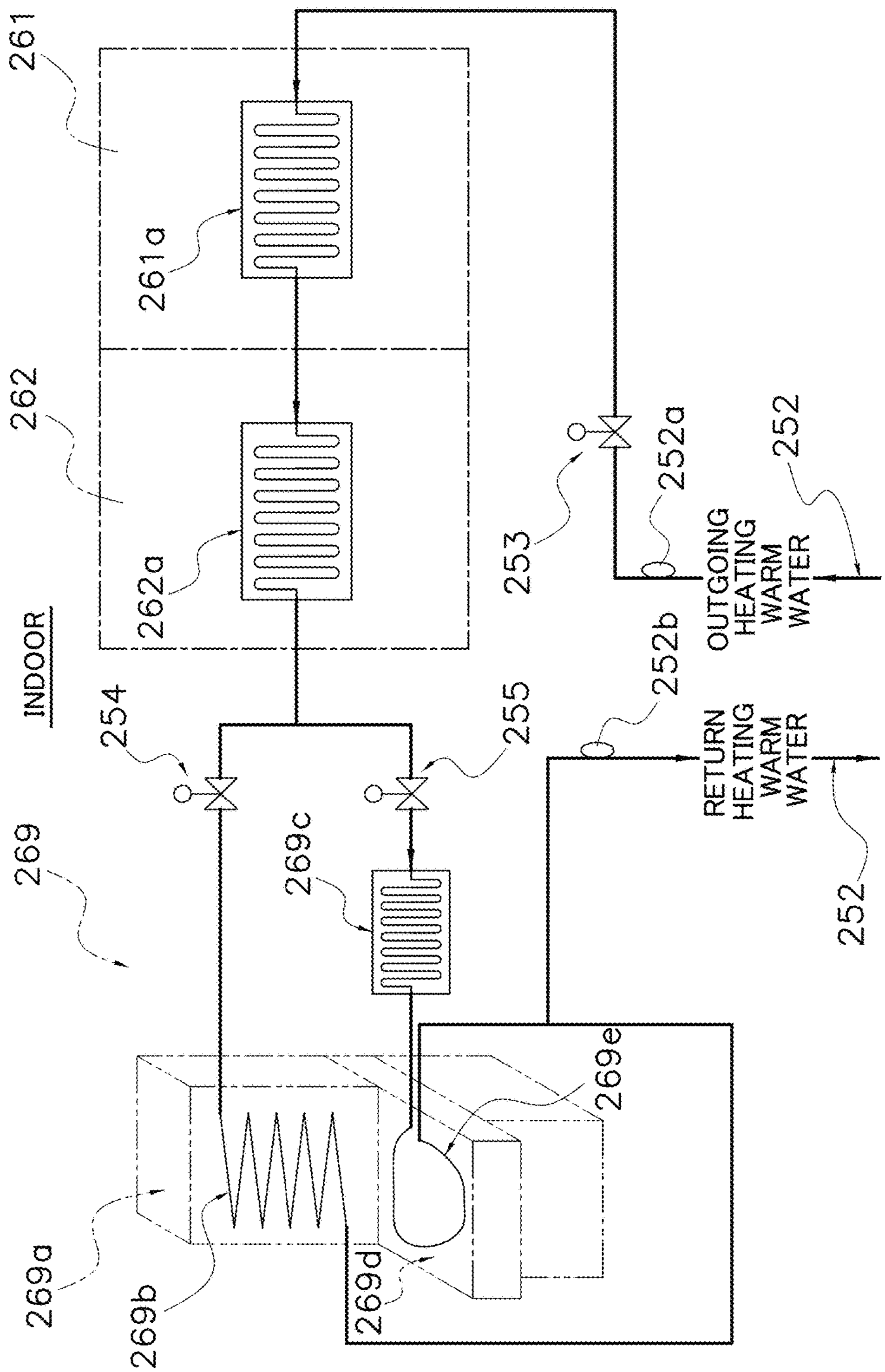

FIG. 15G illustrates a part of the configuration of the warm-water circulation heating system according to the second embodiment of the technique of fifteenth group.

Figure 15H:
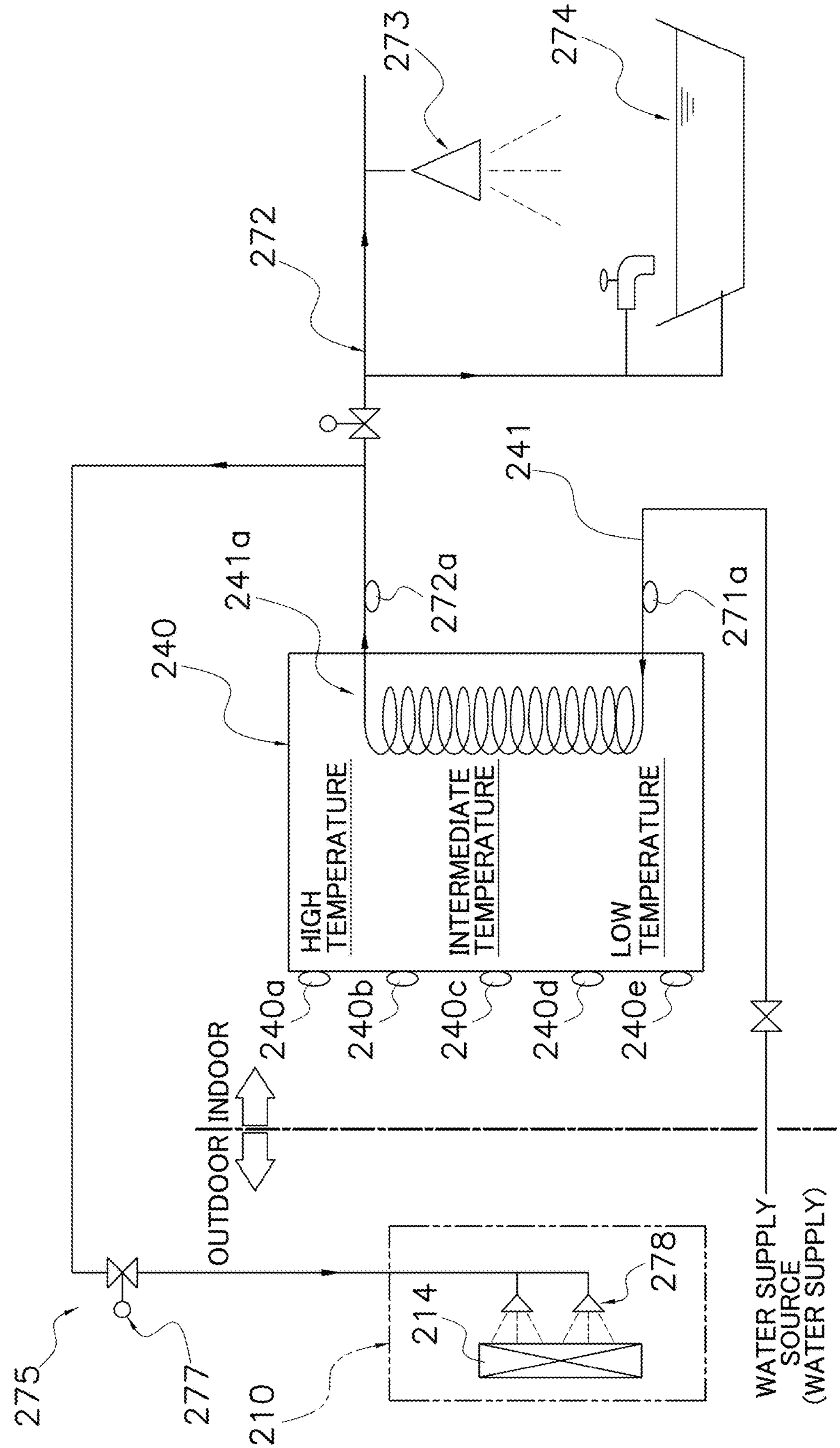

FIG. 15H illustrates a part of the configuration of the warm-water circulation heating system according to the second embodiment of the technique of fifteenth group.

Figure 15I:
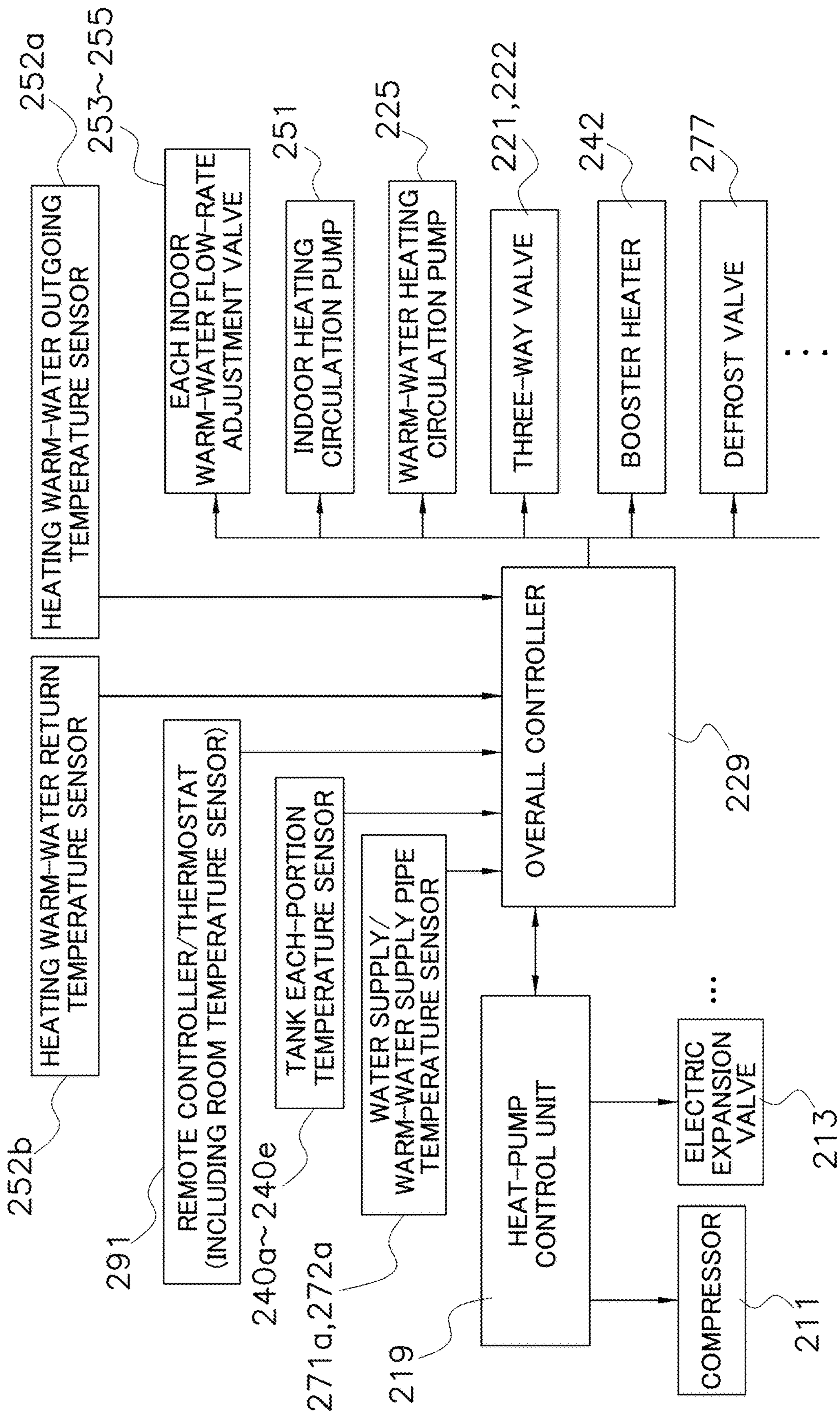

FIG. 15I is a control block diagram of the warm-water circulation heating system according to the second embodiment of the technique of fifteenth group.

Figure 15J:
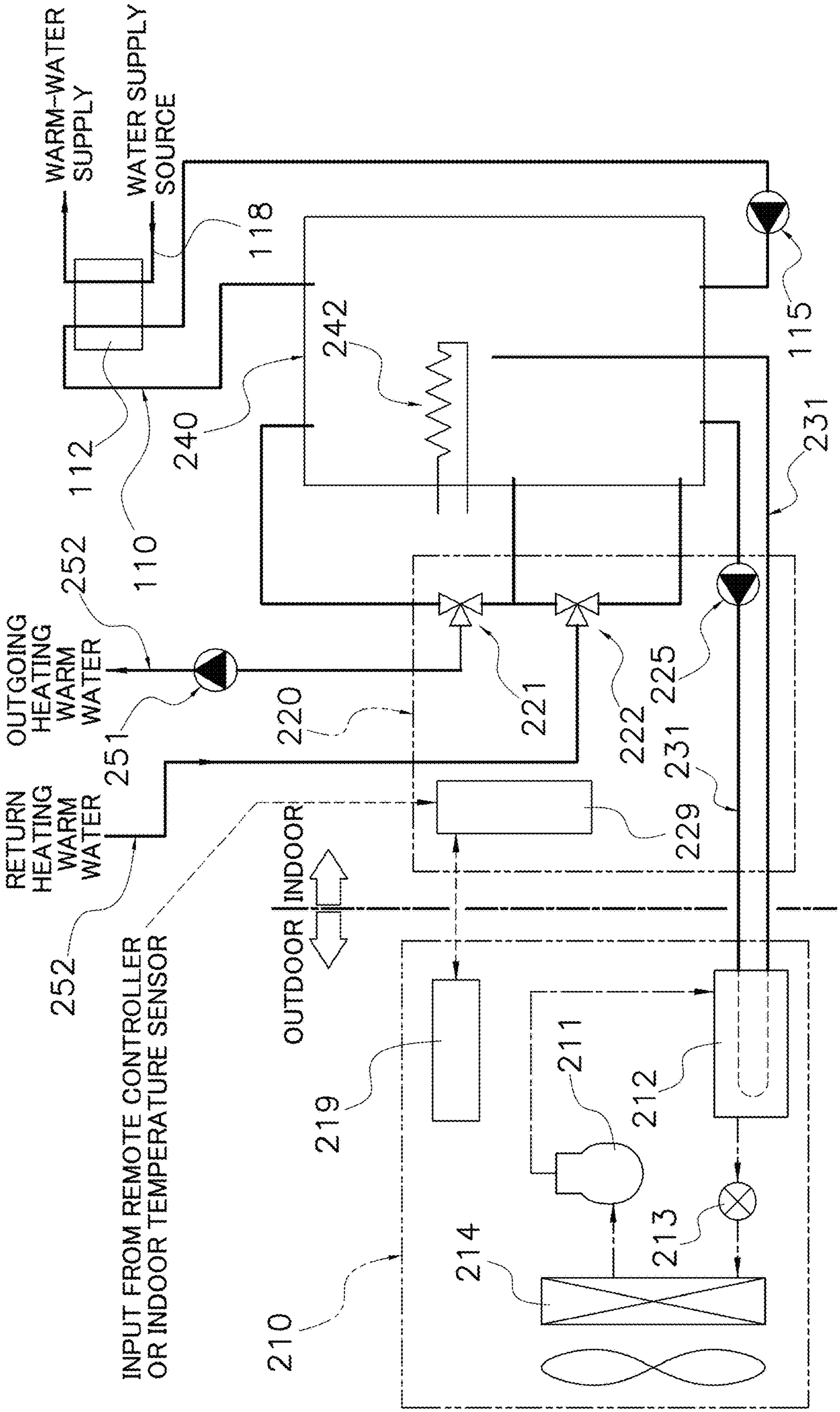

FIG. 15J illustrates a part of a configuration of a warm-water circulation heating system according to a first modification of the second embodiment of the technique of fifteenth group.

Figure 15K:
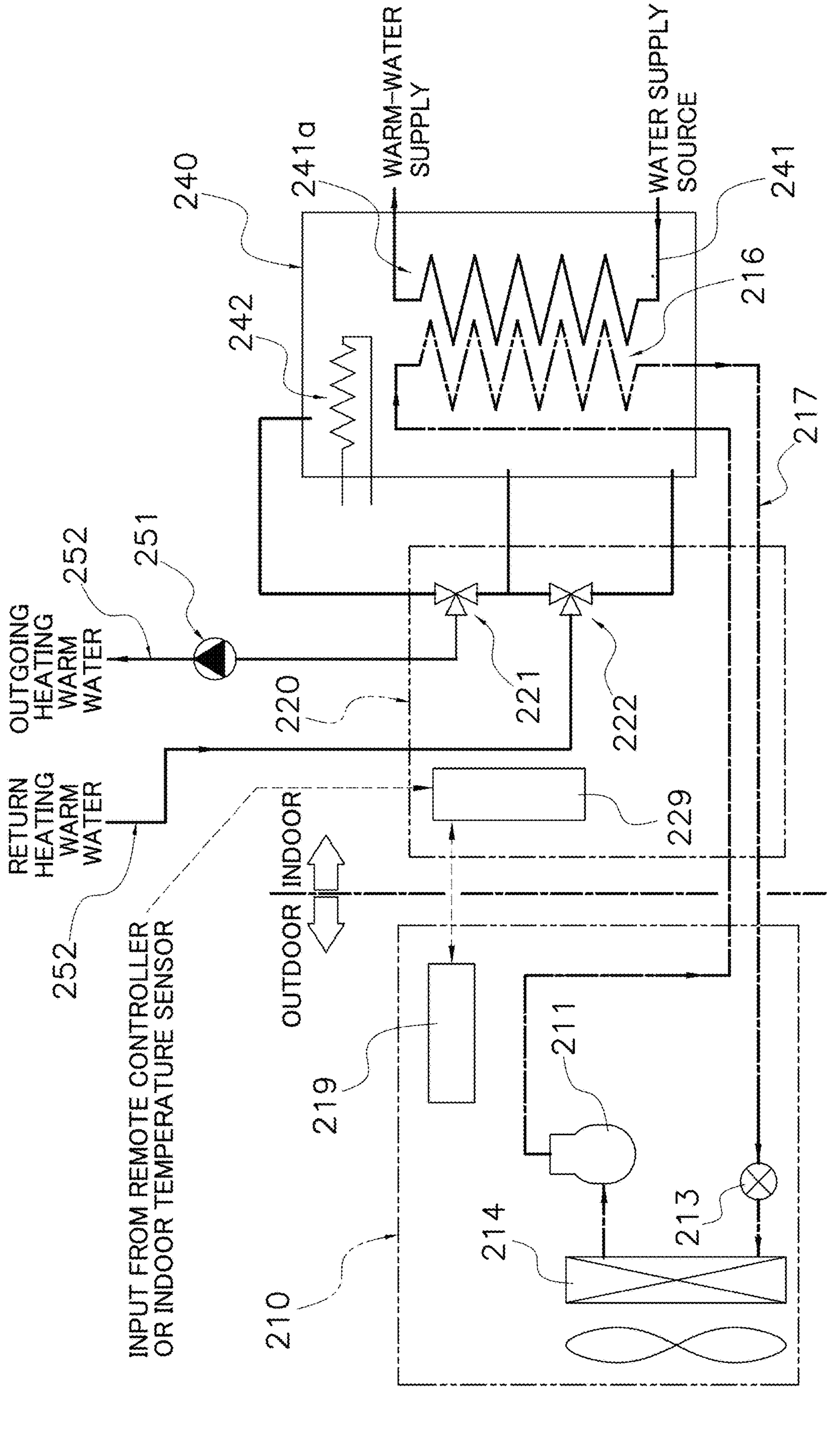

FIG. 15K illustrates a part of a configuration of a warm-water circulation heating system according to a second modification of the second embodiment of the technique of fifteenth group.

Figure 15L:
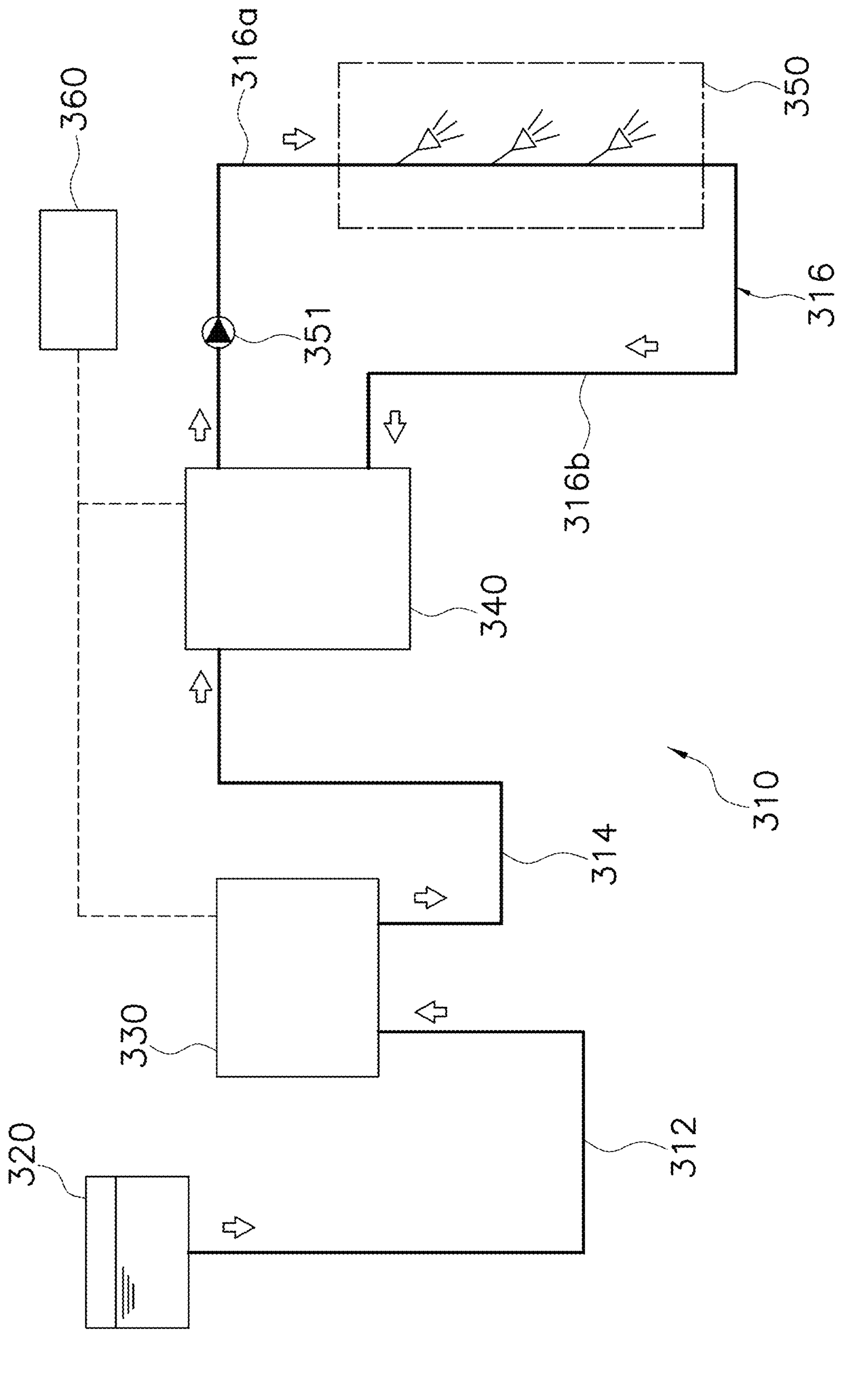

FIG. 15L is a schematic configuration diagram of a warm-water supply system serving as a warm-water generating apparatus according to a third embodiment of the technique of fifteenth group.

Figure 15M:
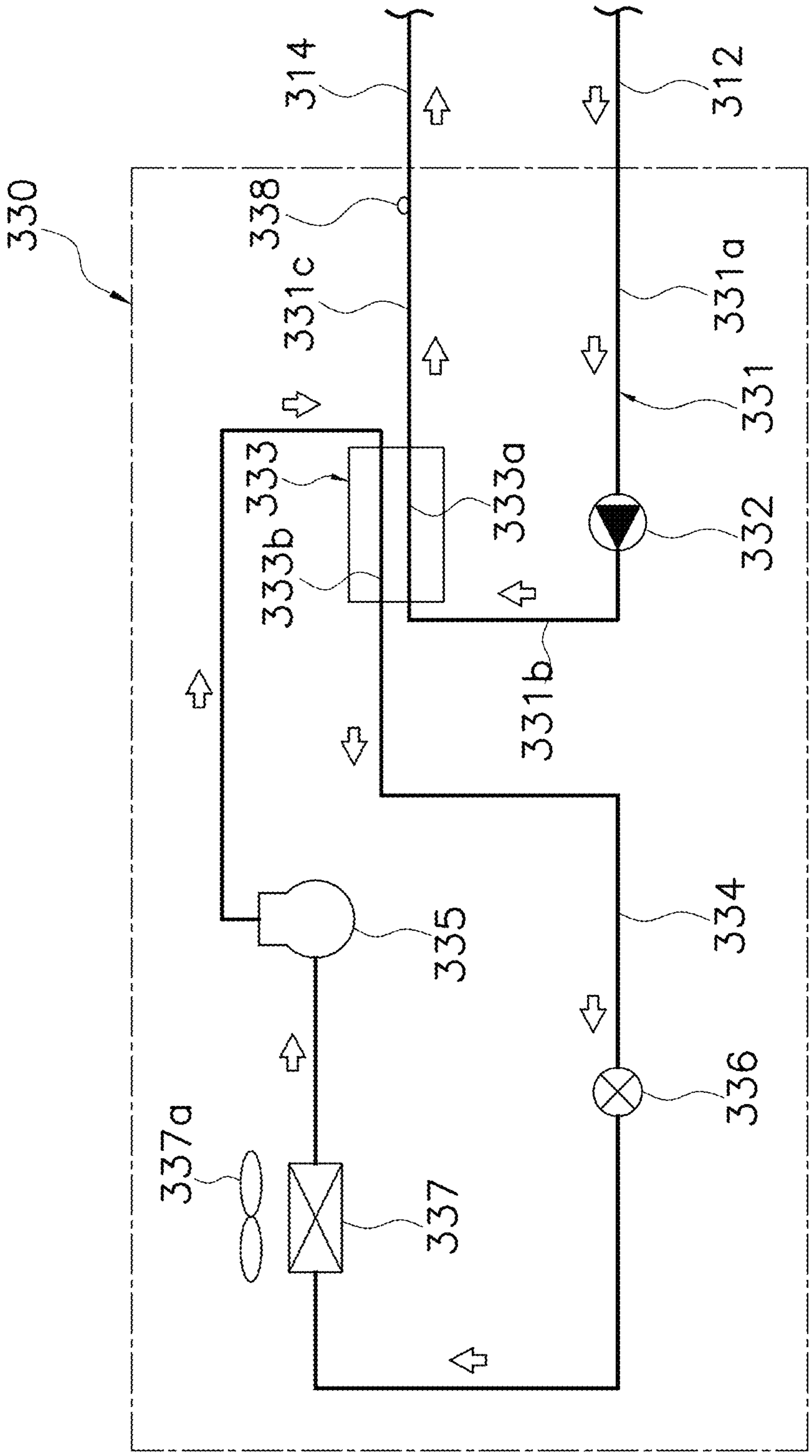

FIG. 15M is a schematic configuration diagram of a heat source unit of the warm-water supply system according to the third embodiment of the technique of fifteenth group.

Figure 15N:
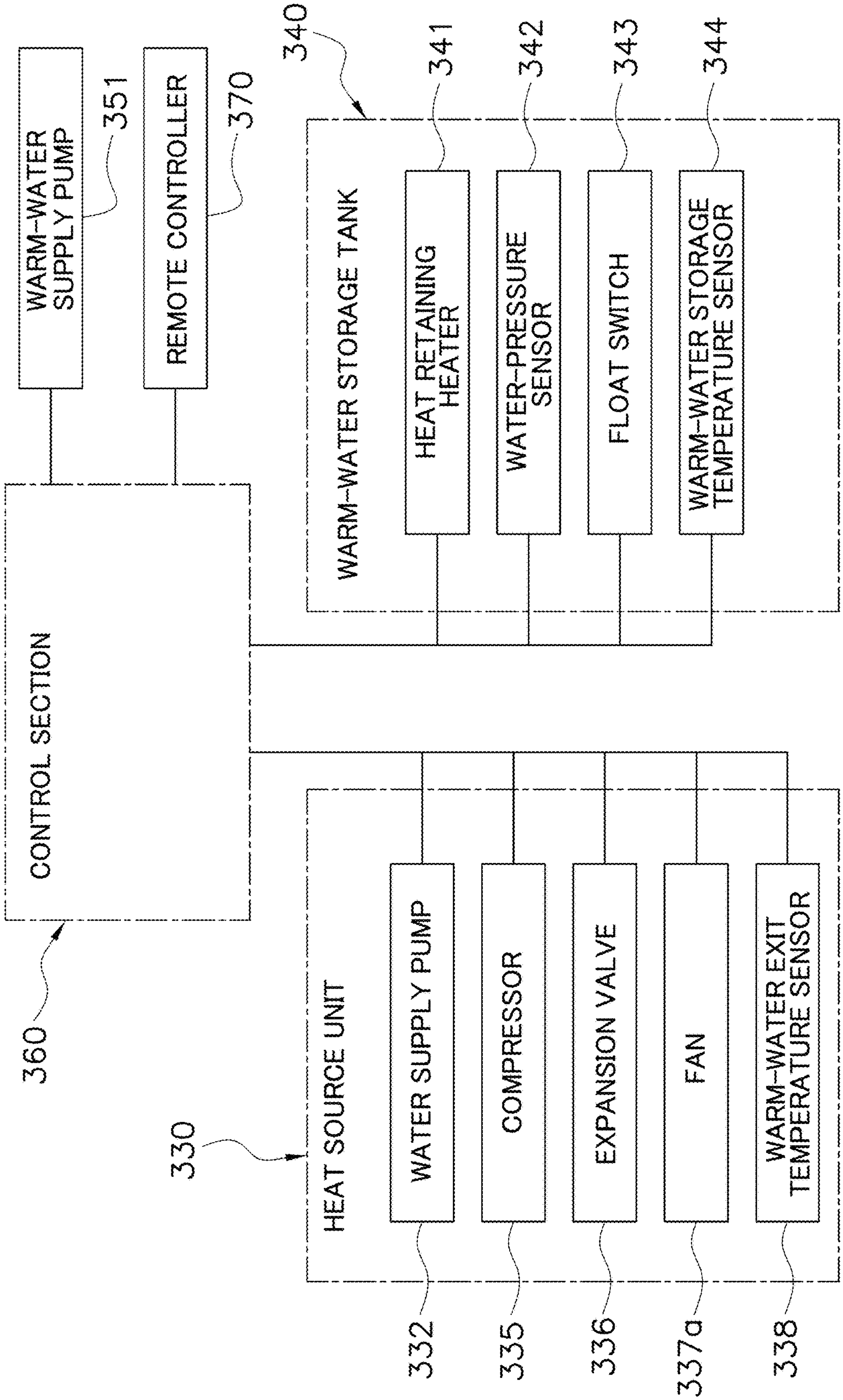

FIG. 15N is a control block diagram of the warm-water supply system according to the third embodiment of the technique of fifteenth group.

Figure 16A:
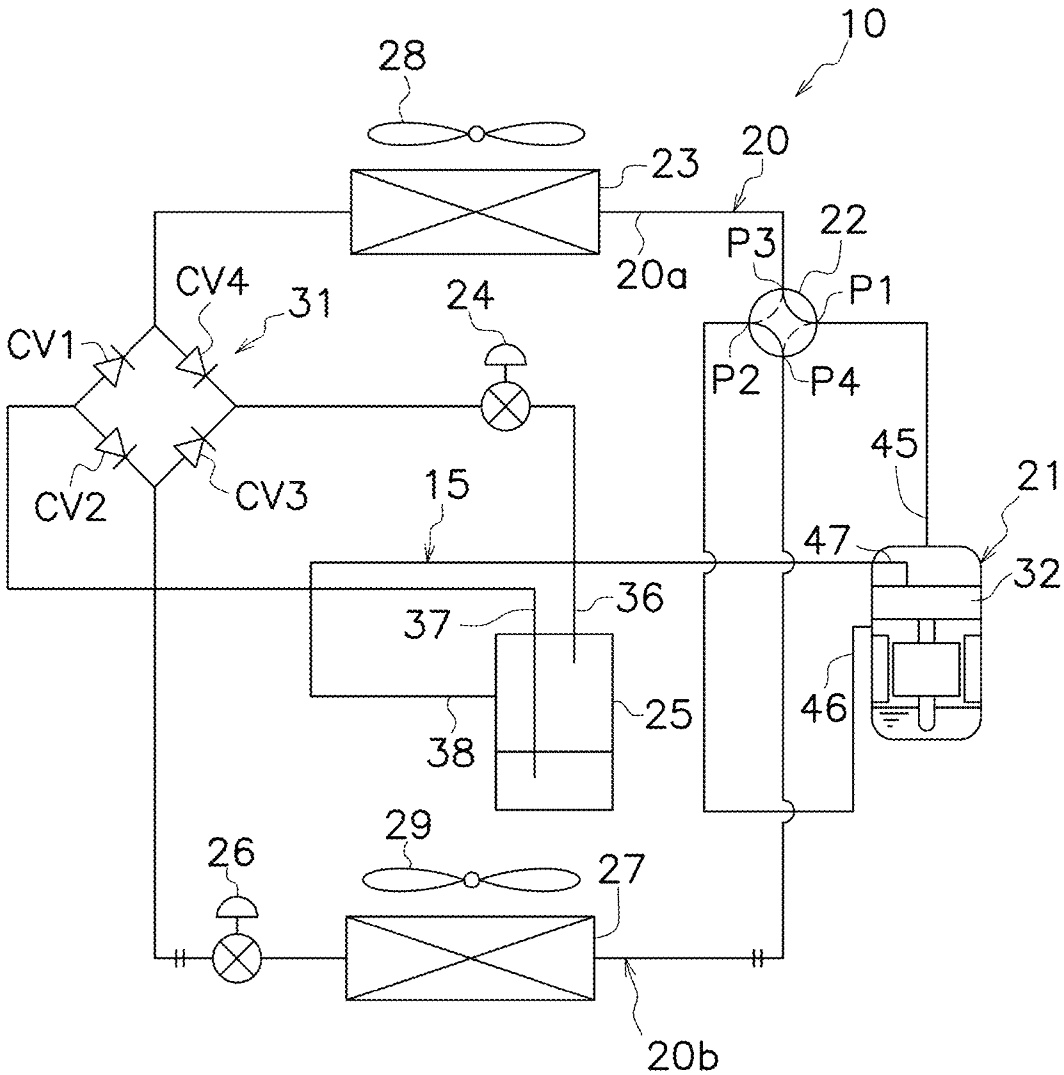

FIG. 16A is a schematic configuration diagram of a refrigeration apparatus according to a first embodiment of the technique of sixteenth group.

Figure 16B:
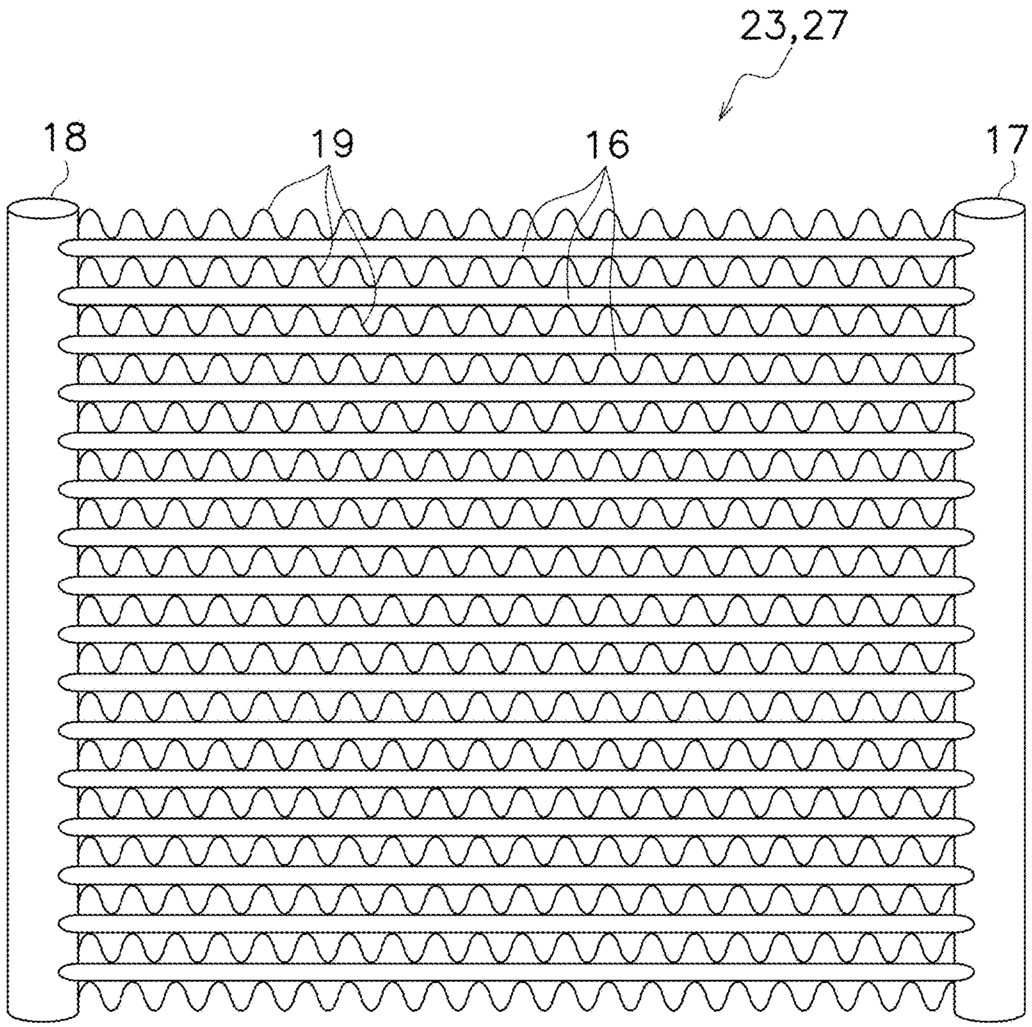

FIG. 16B is a front view of an outdoor heat exchanger or an indoor heat exchanger according to the first embodiment of the technique of sixteenth group.

Figure 16C:
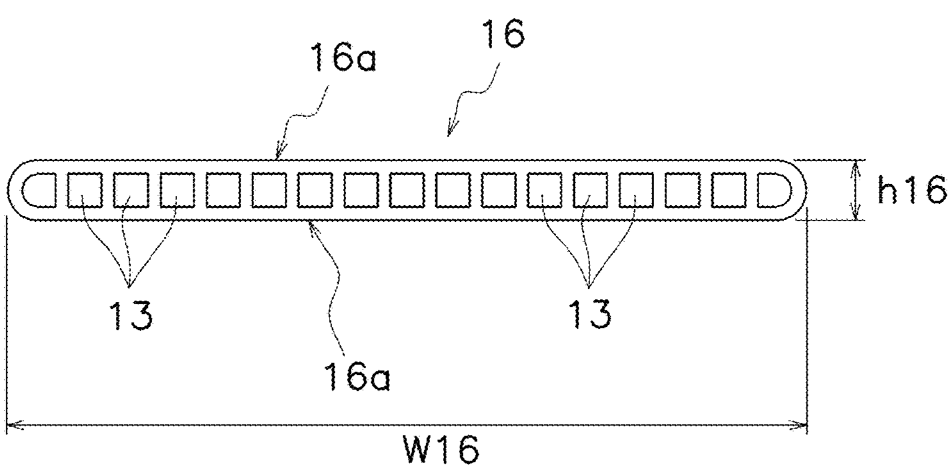

FIG. 16C is a sectional view of a flat tube of a heat exchanger according to the first embodiment of the technique of sixteenth group.

Figure 16D:
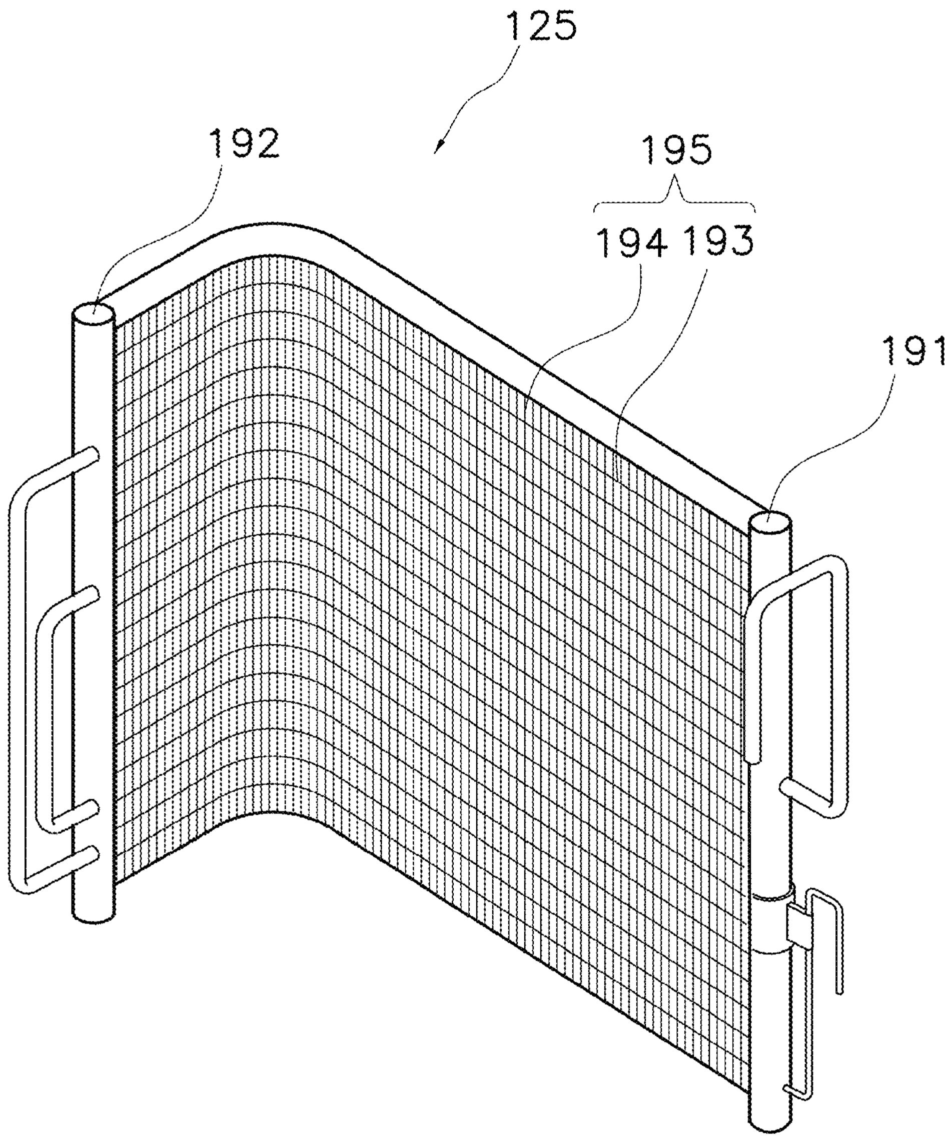

FIG. 16D is a schematic perspective view of an outdoor heat exchanger according to a second embodiment of the technique of sixteenth group.

Figure 16E:
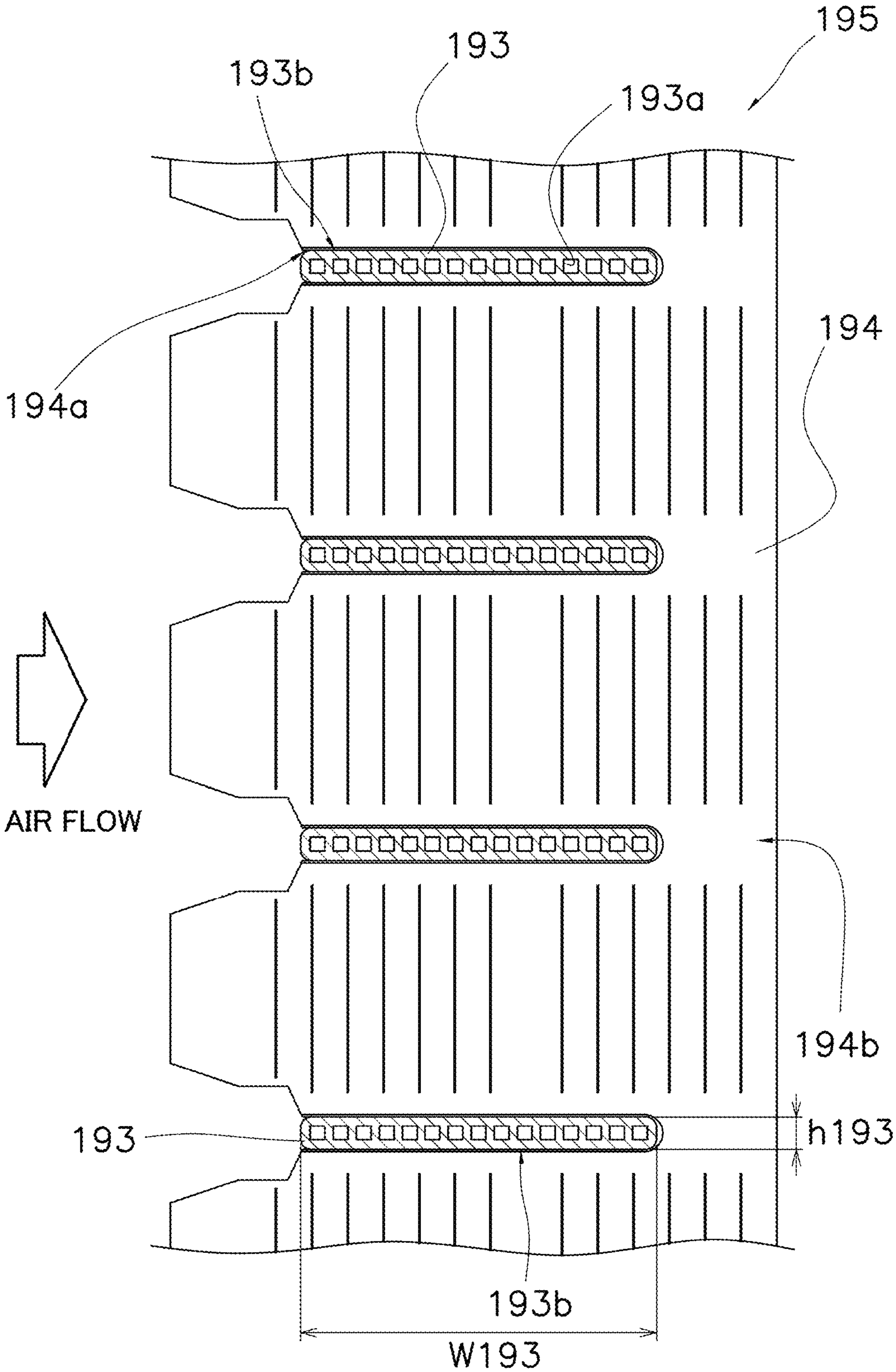

FIG. 16E is a partly enlarged view when a heat exchange section of the outdoor heat exchanger of the technique of sixteenth group is cut in the vertical direction.

Figure 16F:
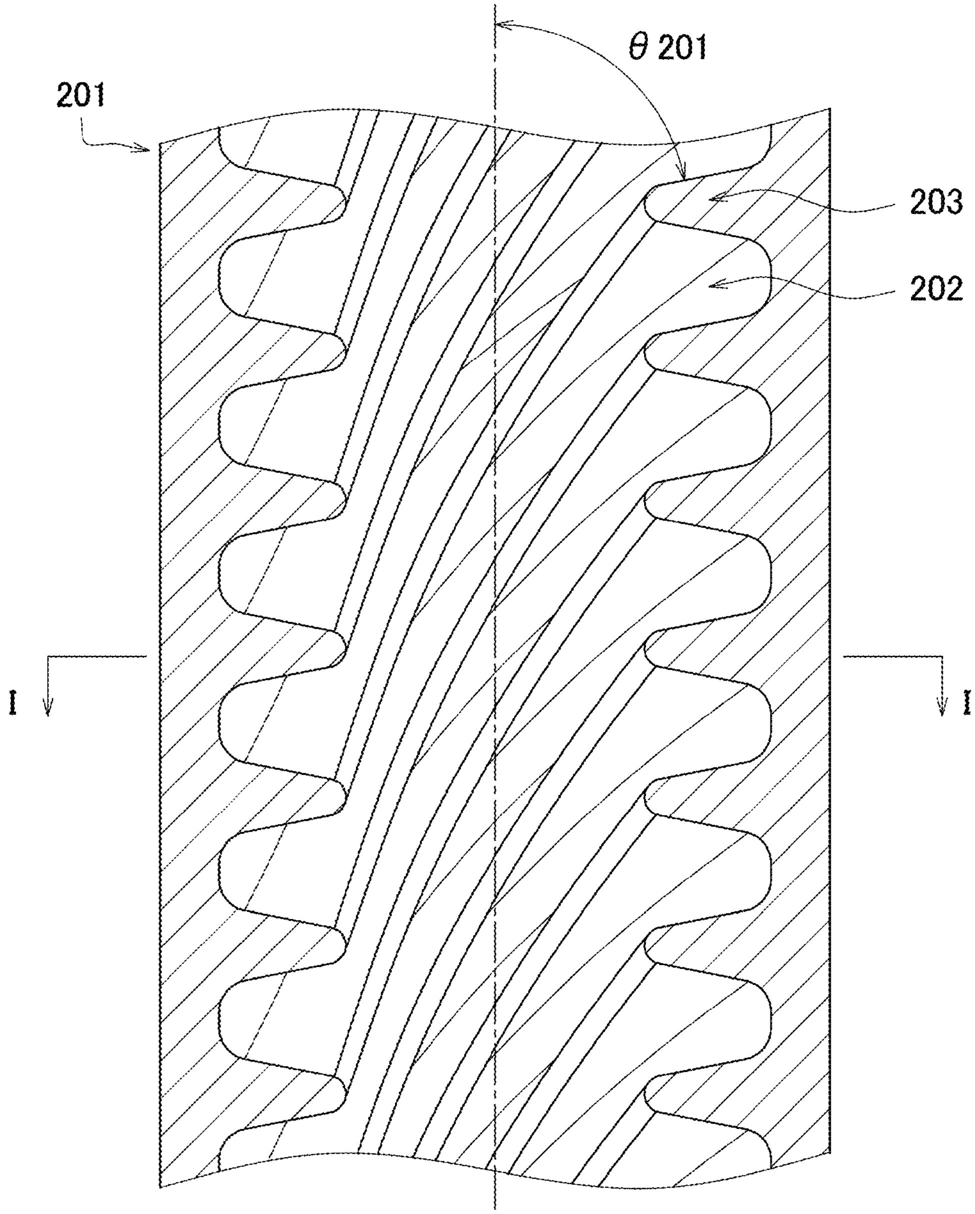

FIG. 16F is a sectional view in a pipe-axis direction illustrating an inner-surface grooved tube according to a third embodiment of the technique of sixteenth group.

Figure 16G:
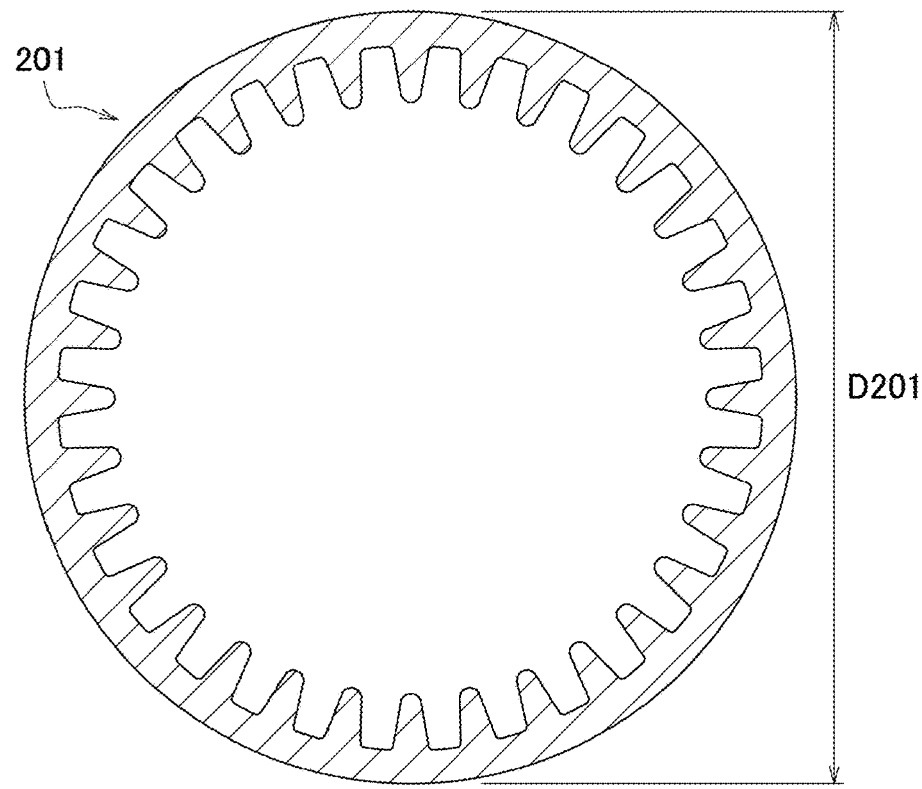

FIG. 16G is a sectional view taken along line I-I of the inner-surface grooved tube illustrated in FIG. 16F.

Figure 16H:
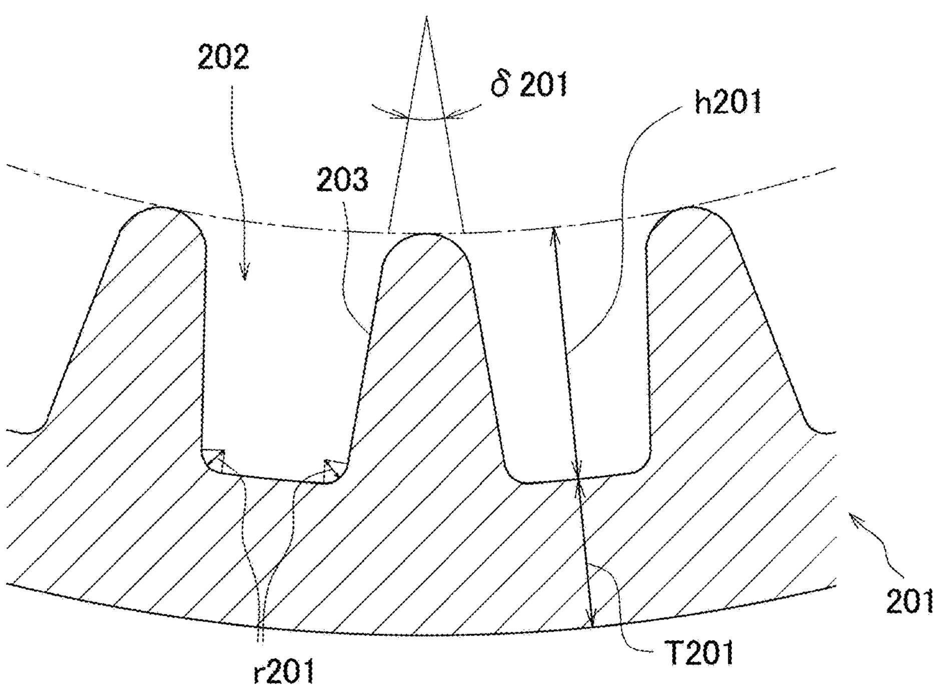

FIG. 16H is a partly enlarged view illustrating in an enlarged manner a portion of the inner-surface grooved tube illustrated in FIG. 16G.

Figure 16I:
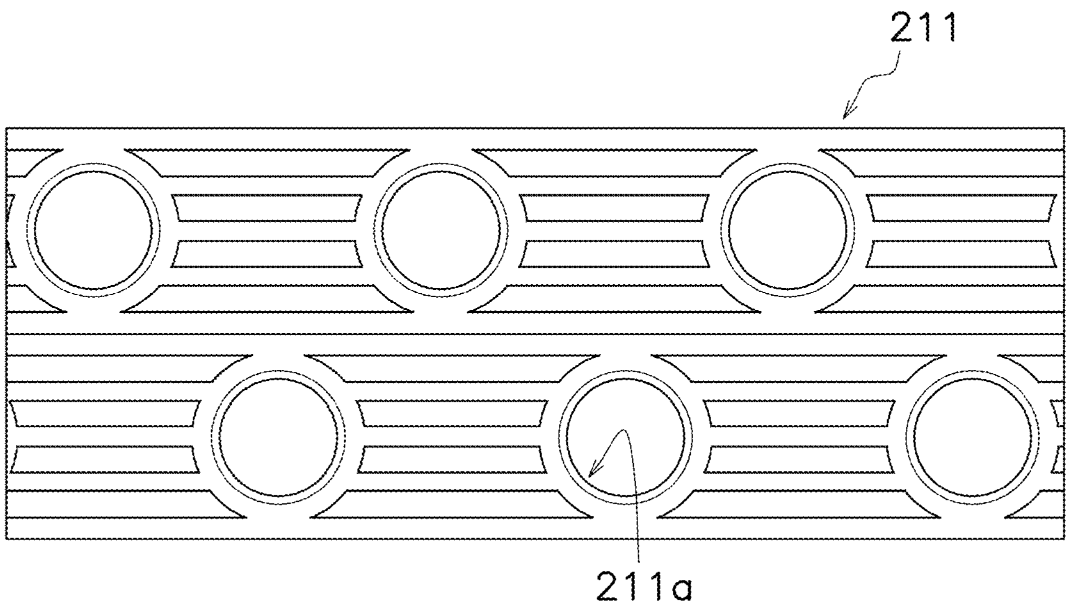

FIG. 16I is a plan view illustrating a configuration of a plate fin of the technique of sixteenth group.

Figure 17A:
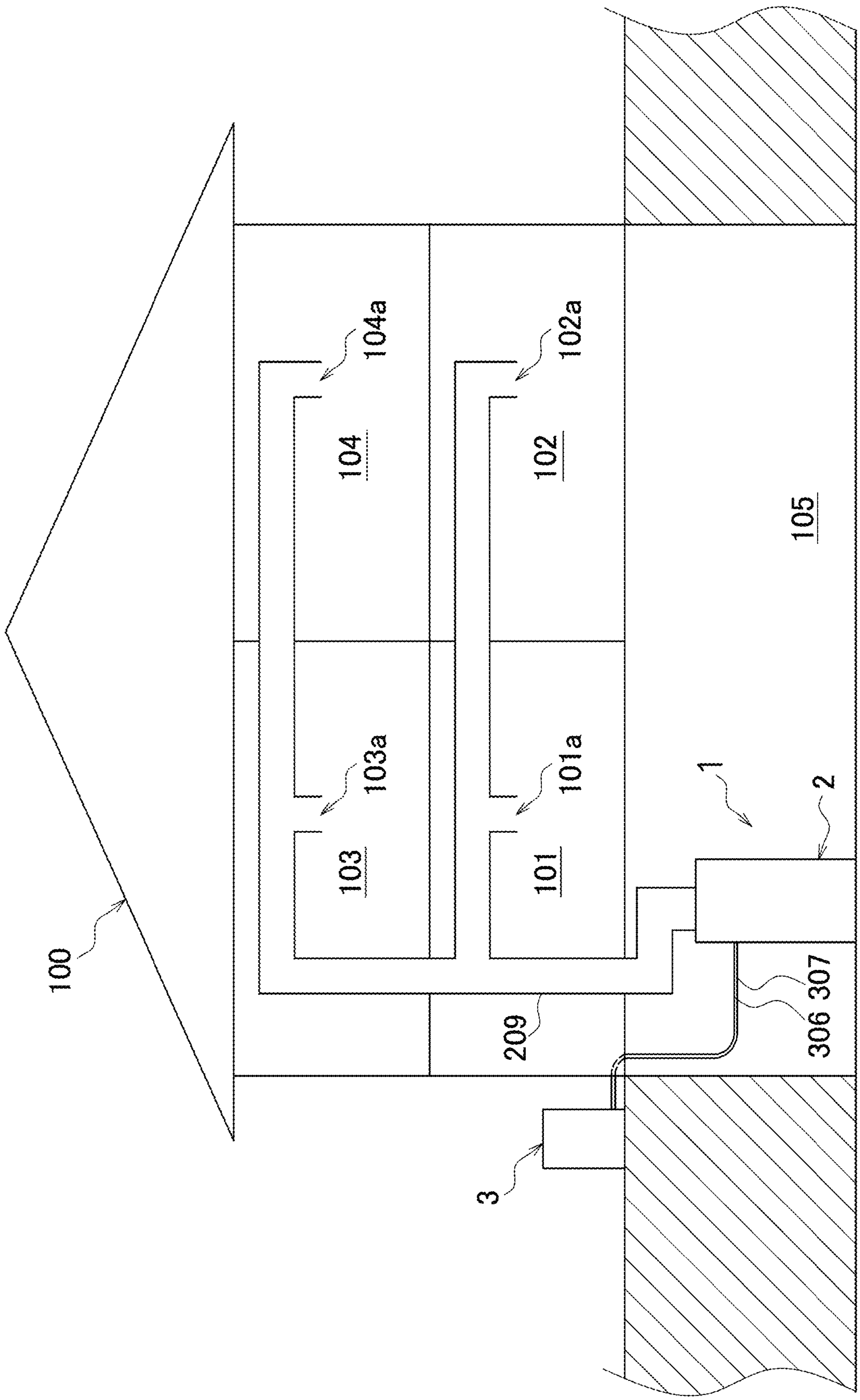

FIG. 17A is a schematic view showing a disposition of an air conditioning apparatus according to a first embodiment of the technique of seventeenth group.

Figure 17B:
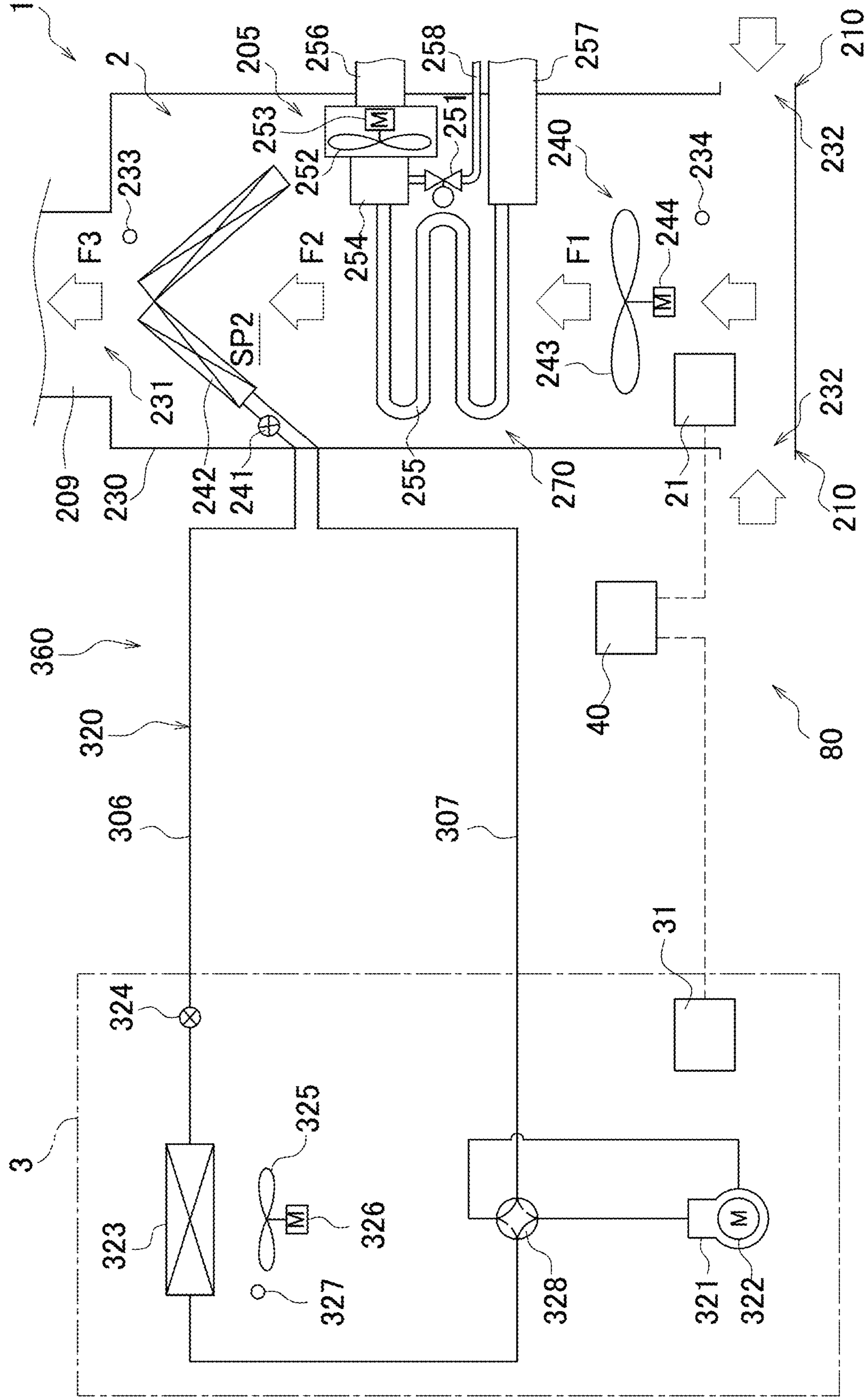

FIG. 17B is a schematic structural view of the air conditioning apparatus of the technique of seventeenth group.

Figure 17C:
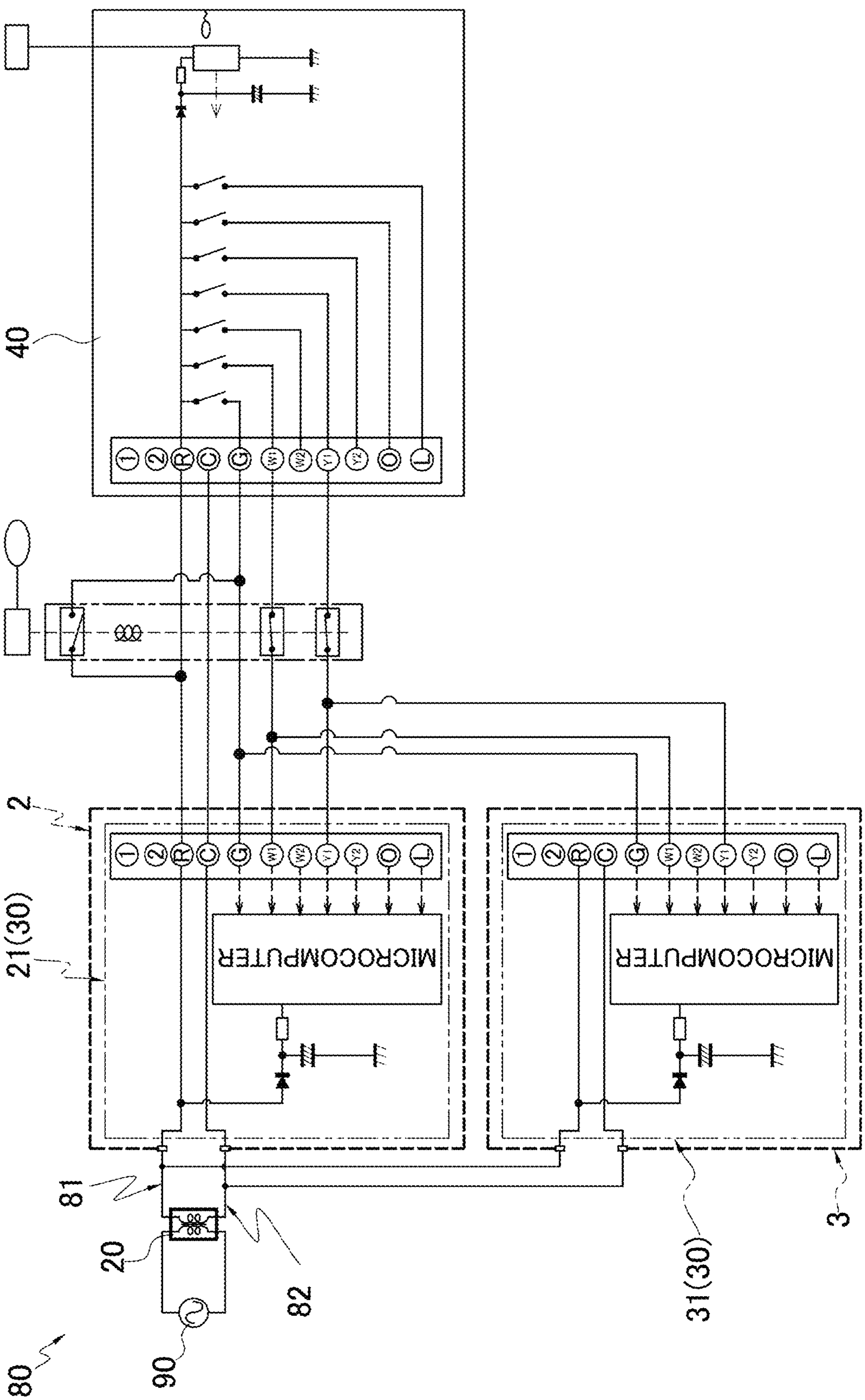

FIG. 17C is a block diagram showing an electrical connection state of a controller and a thermostat in an air conditioning system according to the first embodiment of the technique of seventeenth group.

Figure 17D:
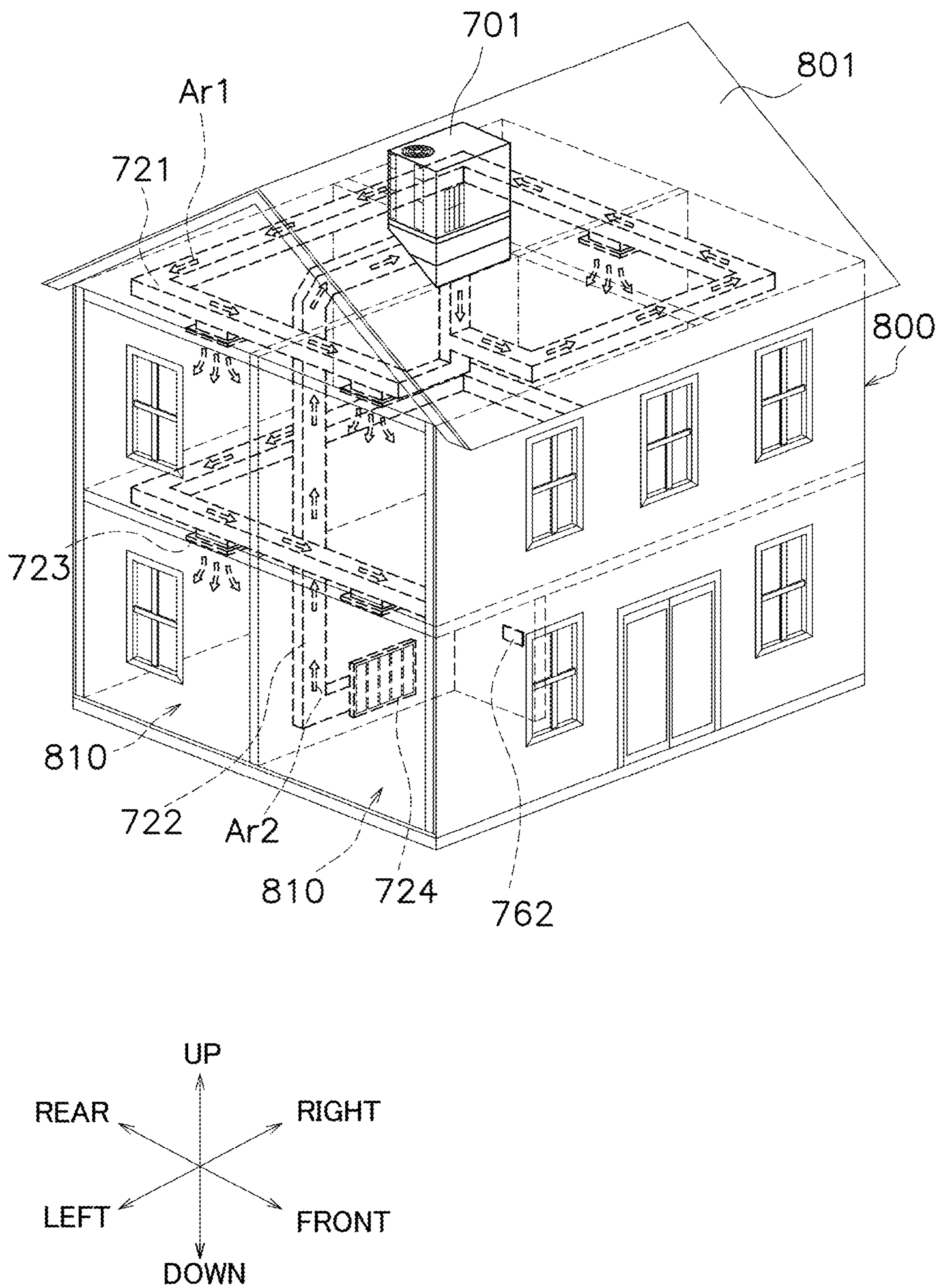

FIG. 17D is a perspective view of a state in which an air conditioning apparatus according to a second embodiment of the technique of seventeenth group is installed in a building.

Figure 17E:
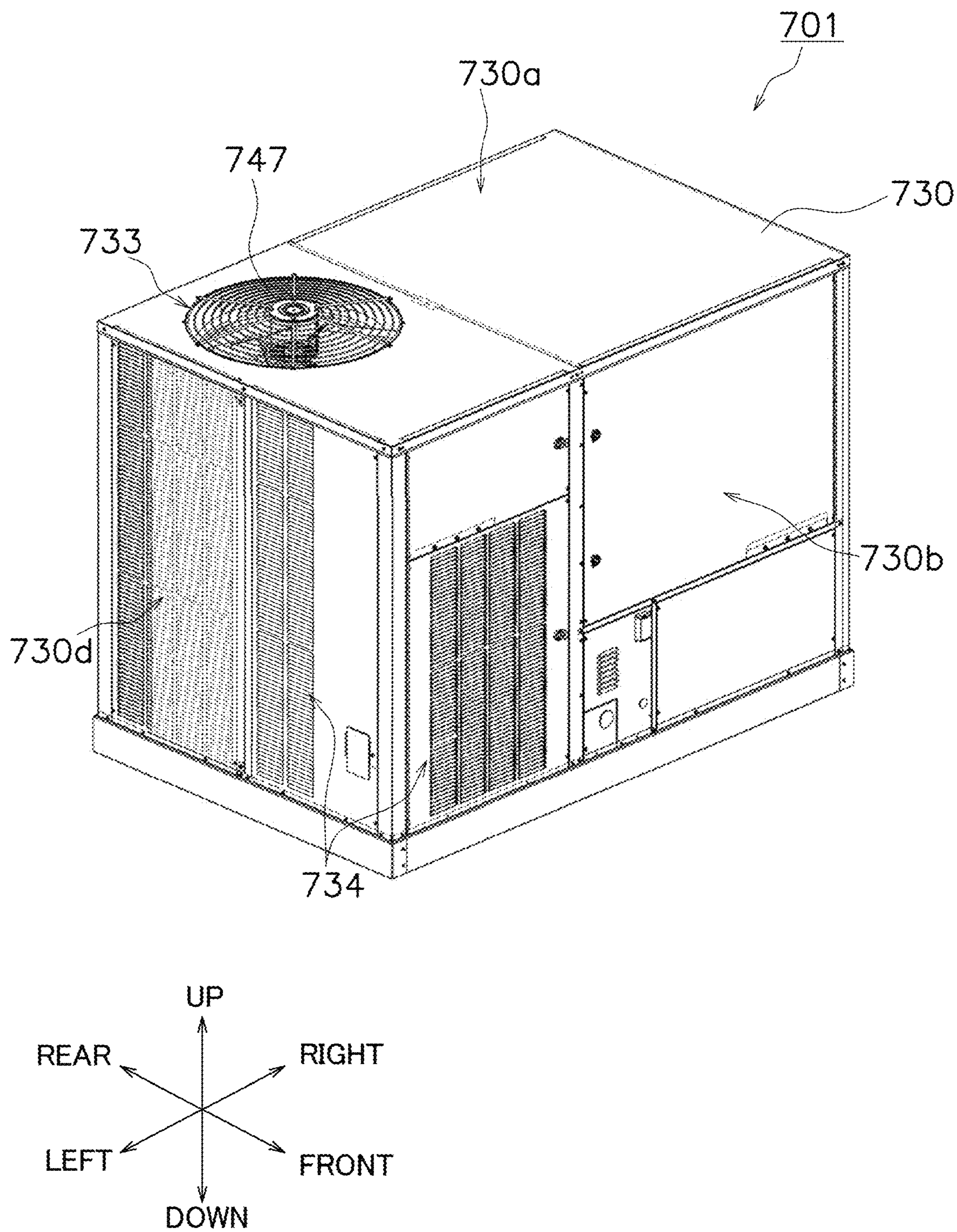

FIG. 17E is a perspective view showing an external appearance of the air conditioning apparatus of the technique of seventeenth group.

Figure 17F:
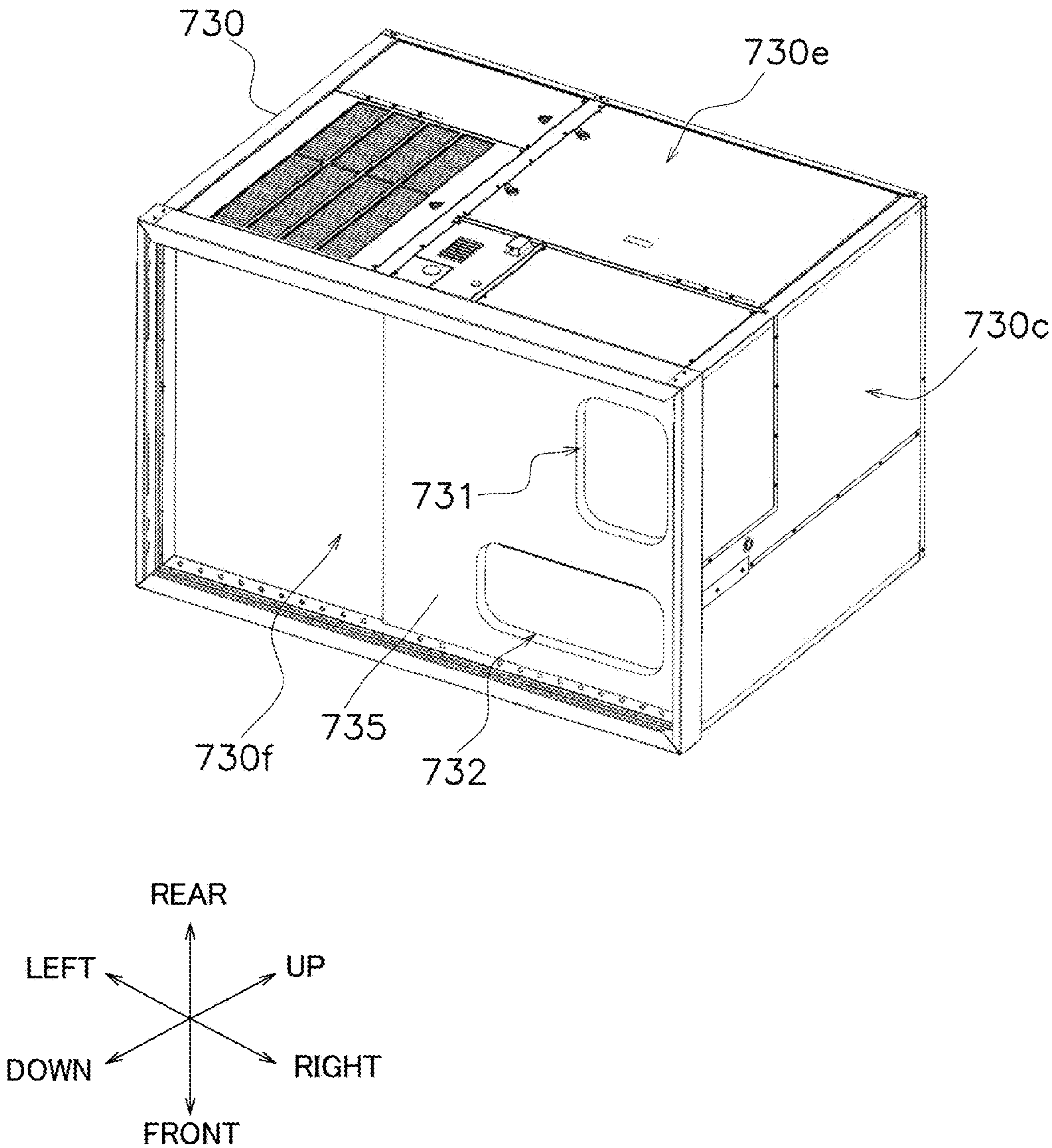

FIG. 17F is a perspective view showing the external appearance of the air conditioning apparatus of the technique of seventeenth group.

Figure 17G:
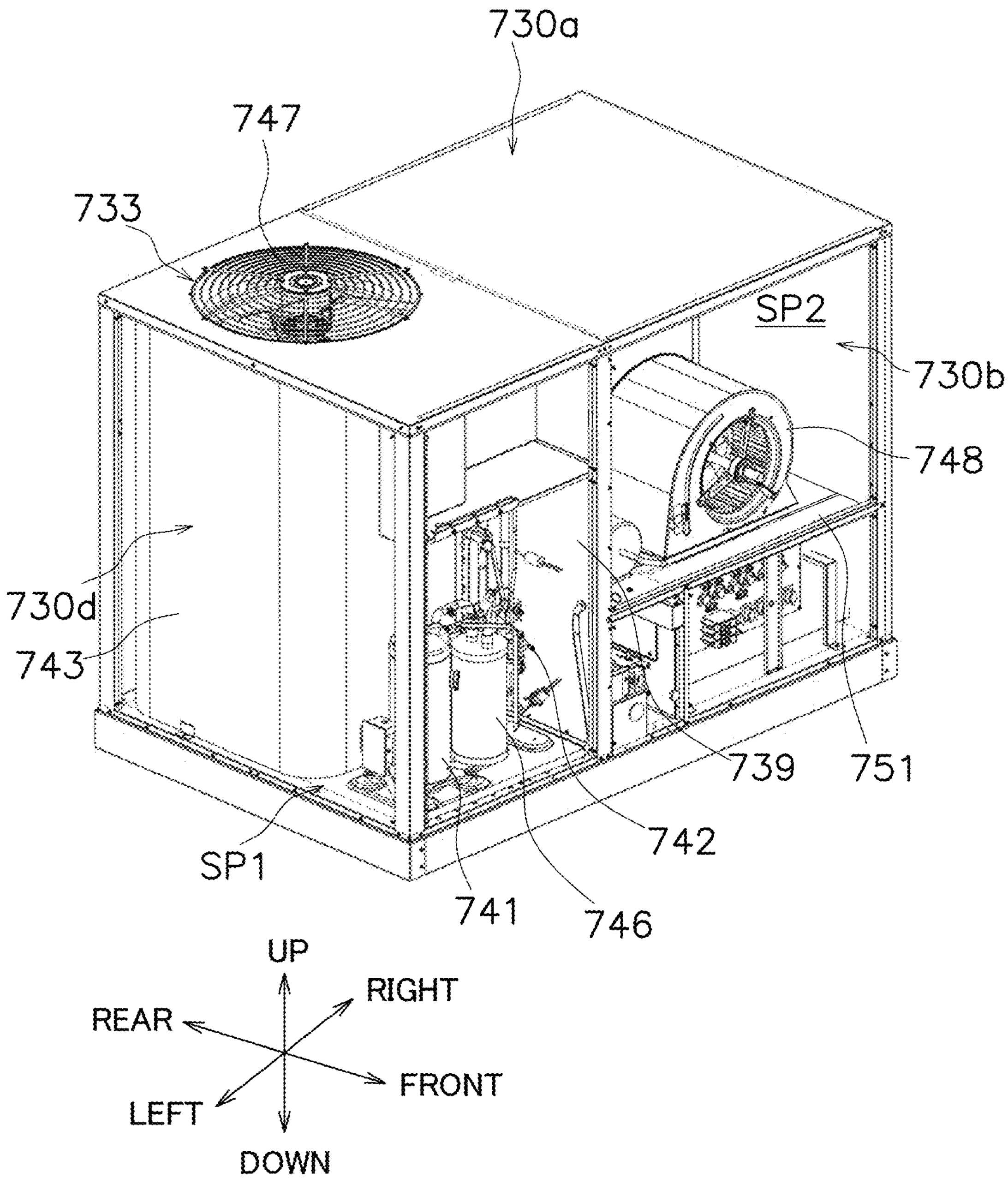

FIG. 17G is a perspective view for describing an internal structure of the air conditioning apparatus of the technique of seventeenth group.

Figure 17H:
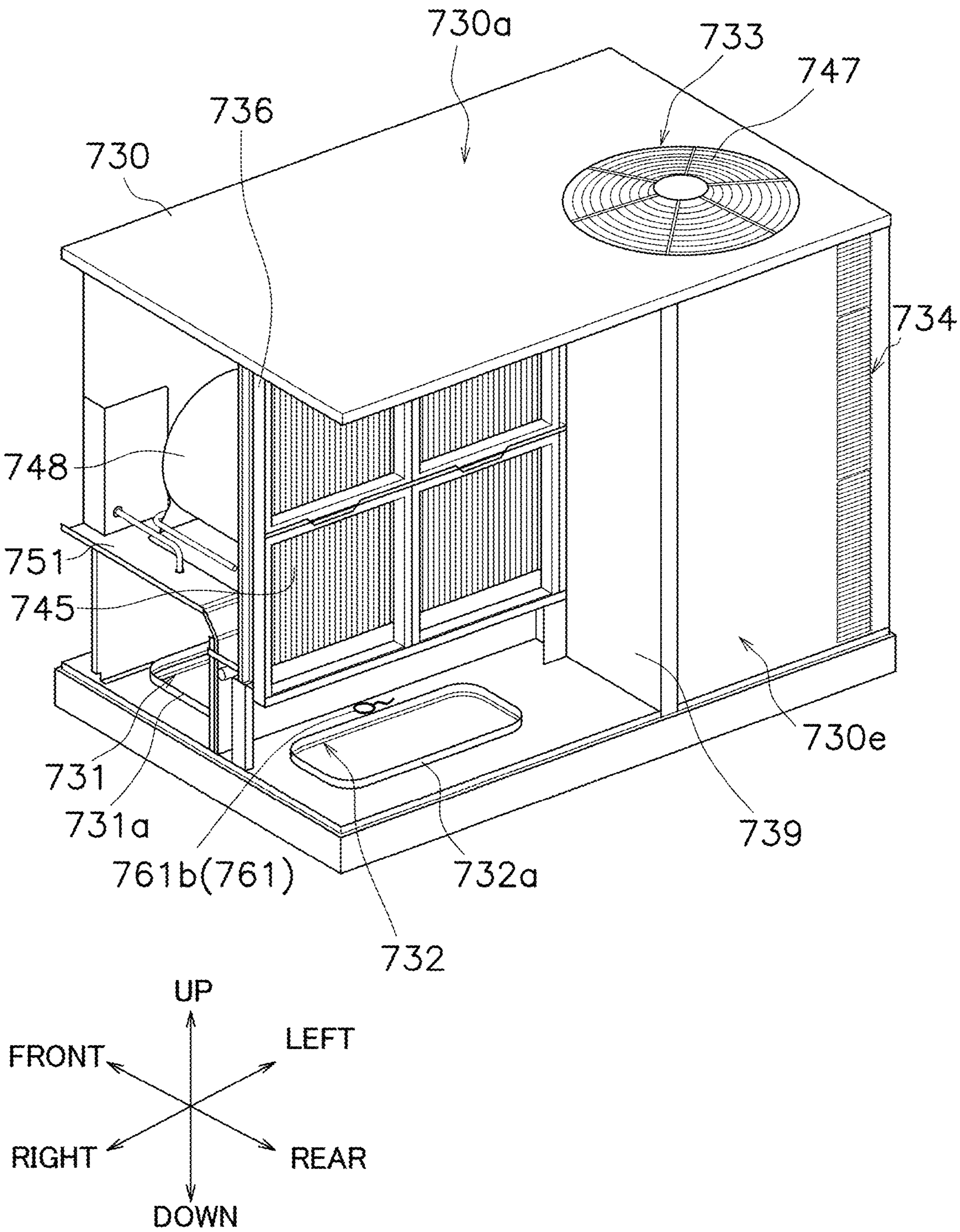

FIG. 17H is a perspective view for describing the internal structure of the air conditioning apparatus of the technique of seventeenth group.

Figure 17I:
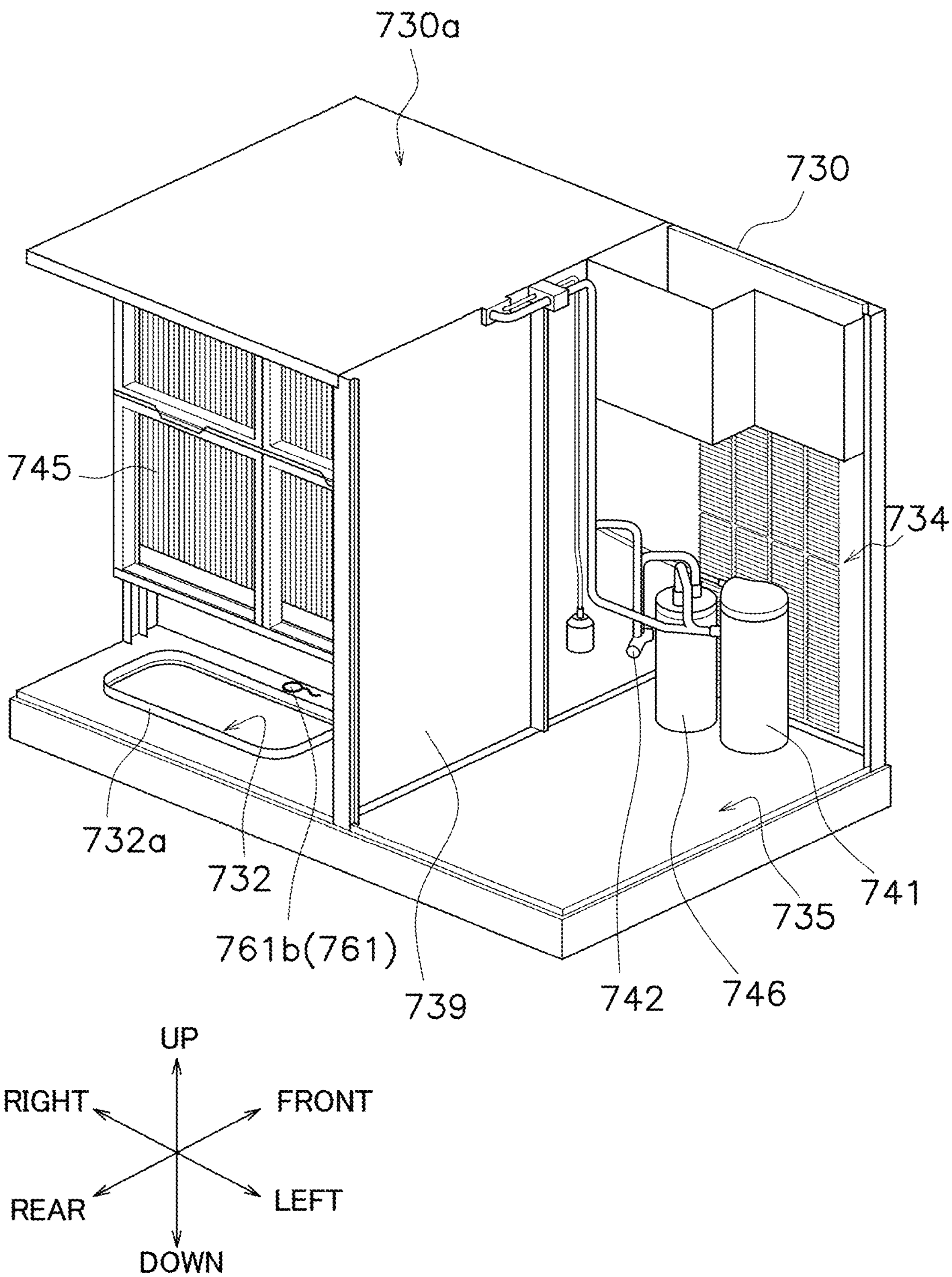

FIG. 17I is a perspective view for describing the internal structure of the air conditioning apparatus of the technique of seventeenth group.

Figure 17J:
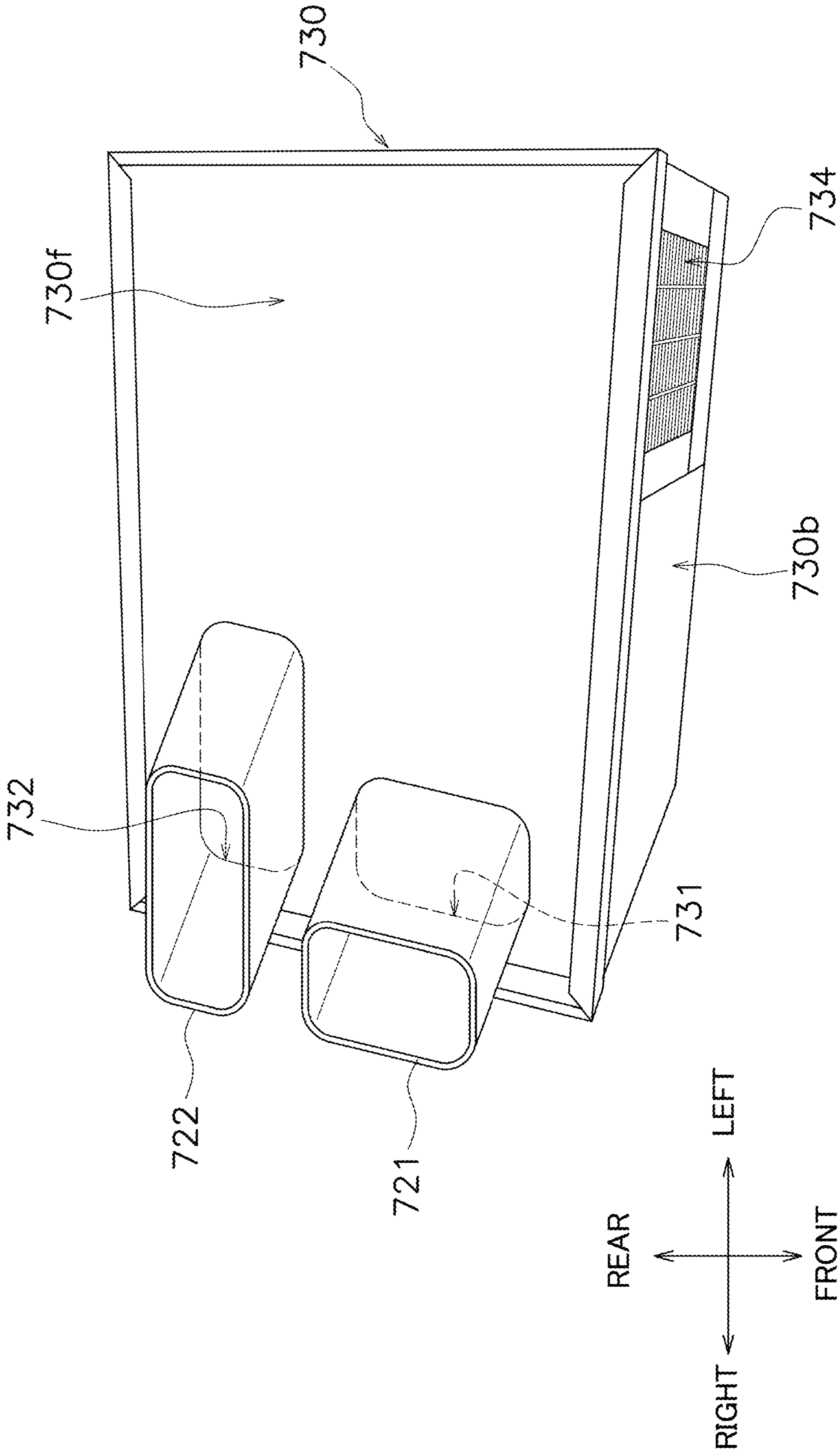

FIG. 17J is a perspective view for describing ducts of the air conditioning apparatus of the technique of seventeenth group.

Figure 17K:
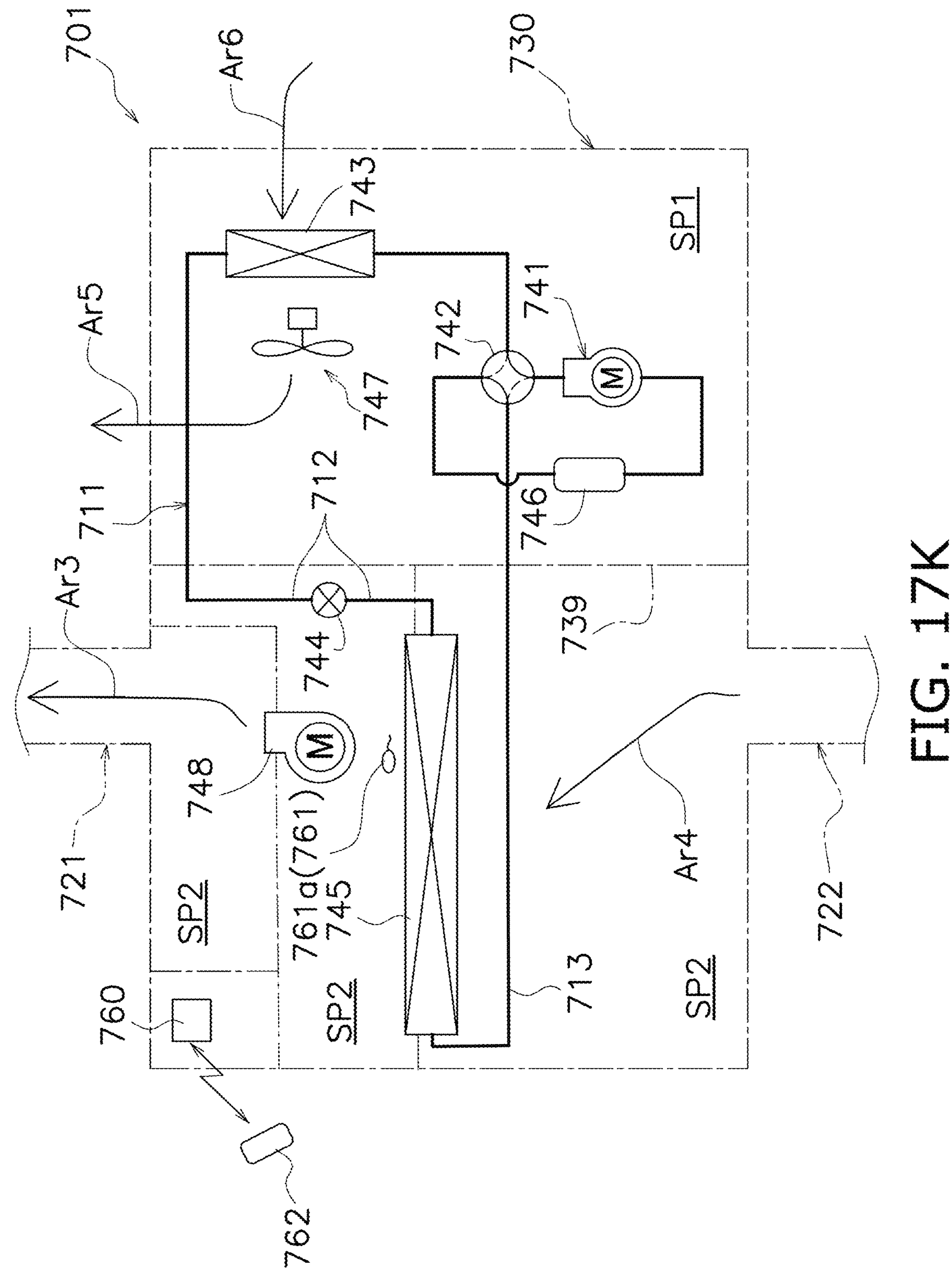

FIG. 17K illustrates a refrigerant circuit of the air conditioning apparatus according to the second embodiment of the technique of seventeenth group.

Figure 17L:
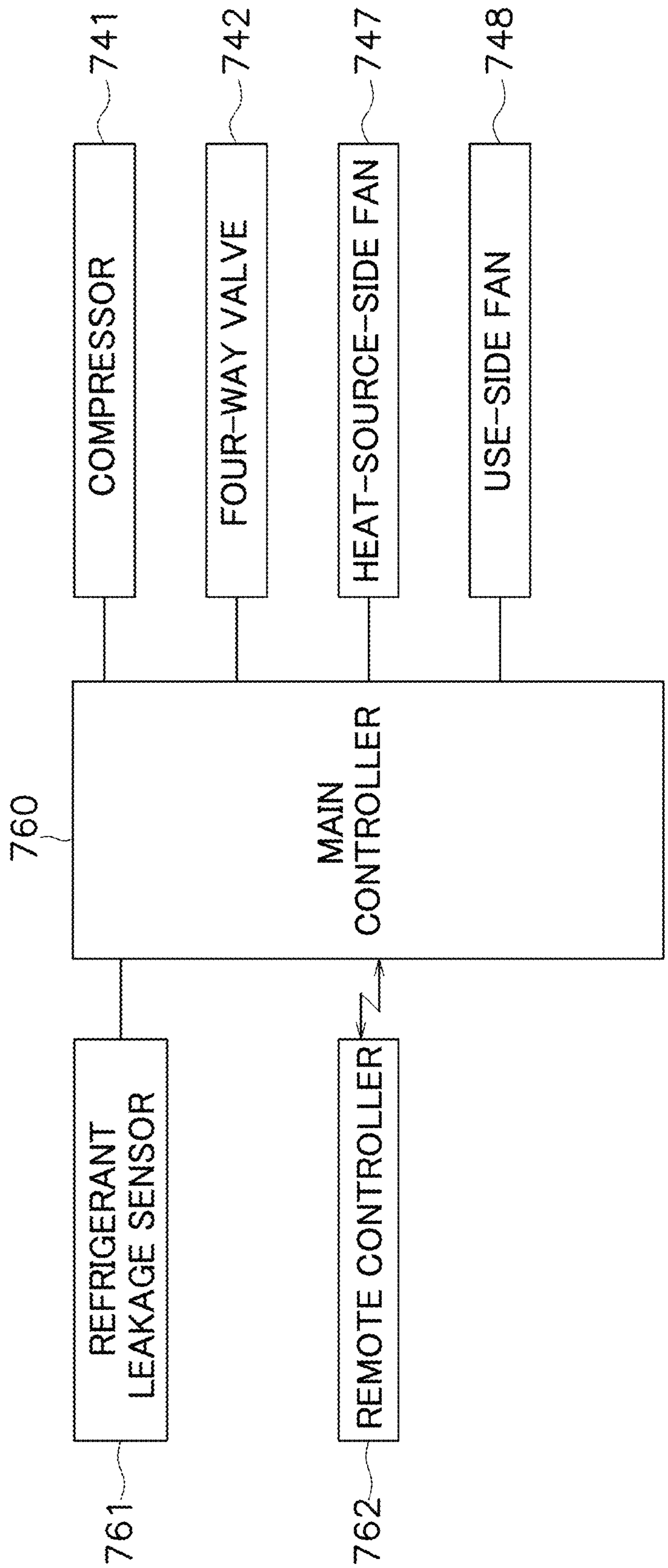

FIG. 17L is a block diagram for describing a control system of the air conditioning apparatus according to the second embodiment of the technique of seventeenth group.

Figure 17M:
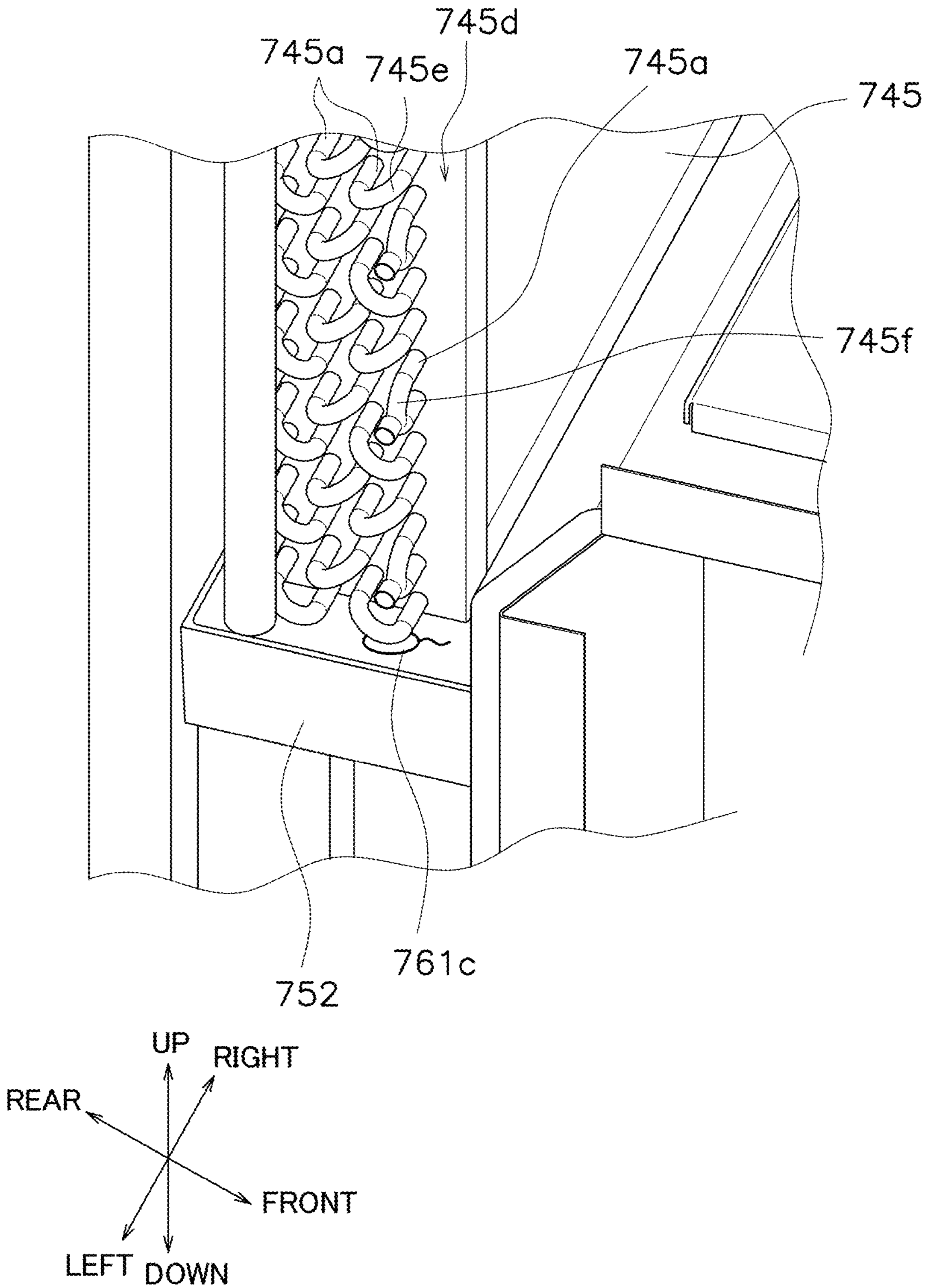

FIG. 17M is a partial enlarged perspective view of the vicinity of a left side portion of a use-side heat exchanger of the technique of seventeenth group.

Figure 17N:
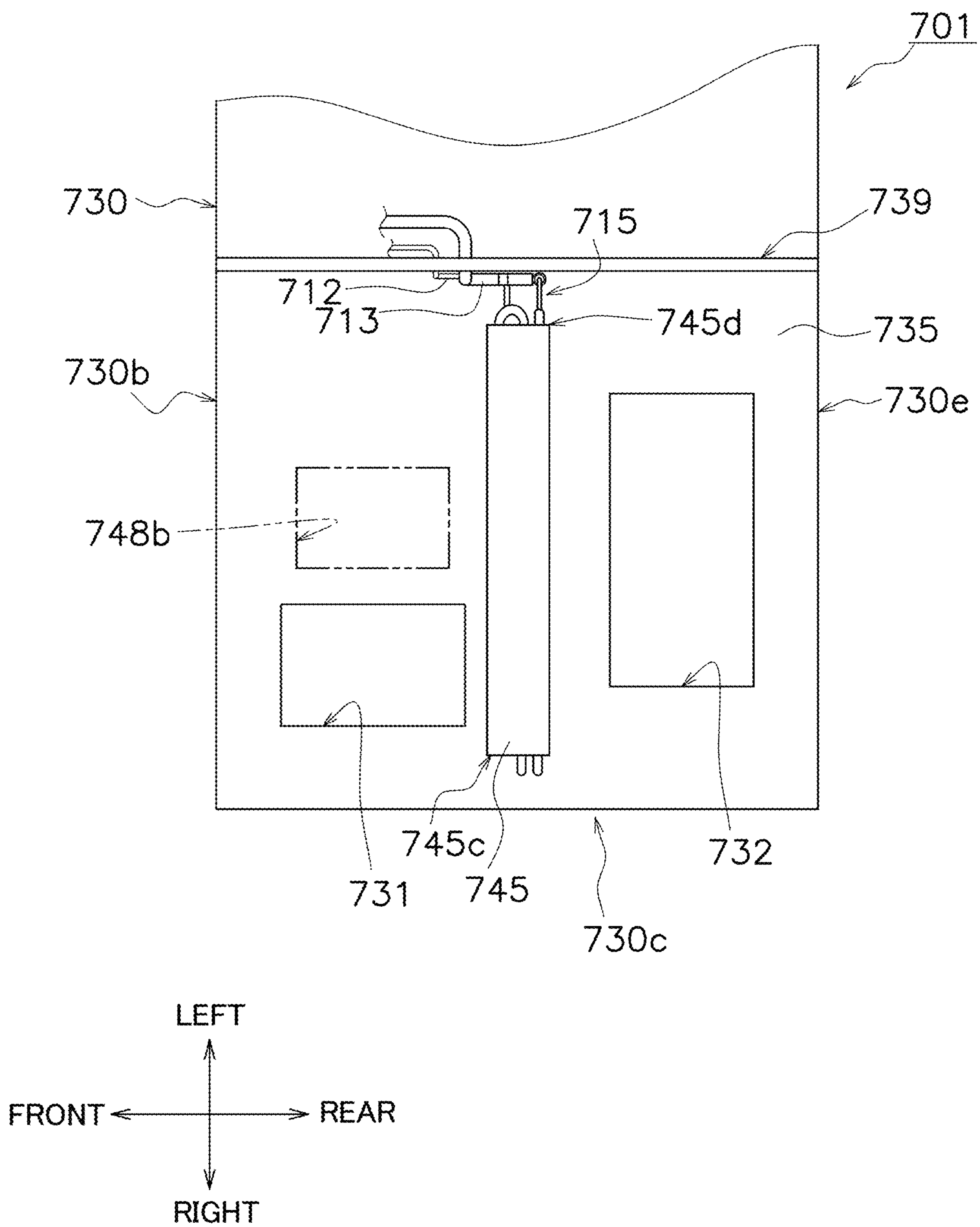
Figure 170:
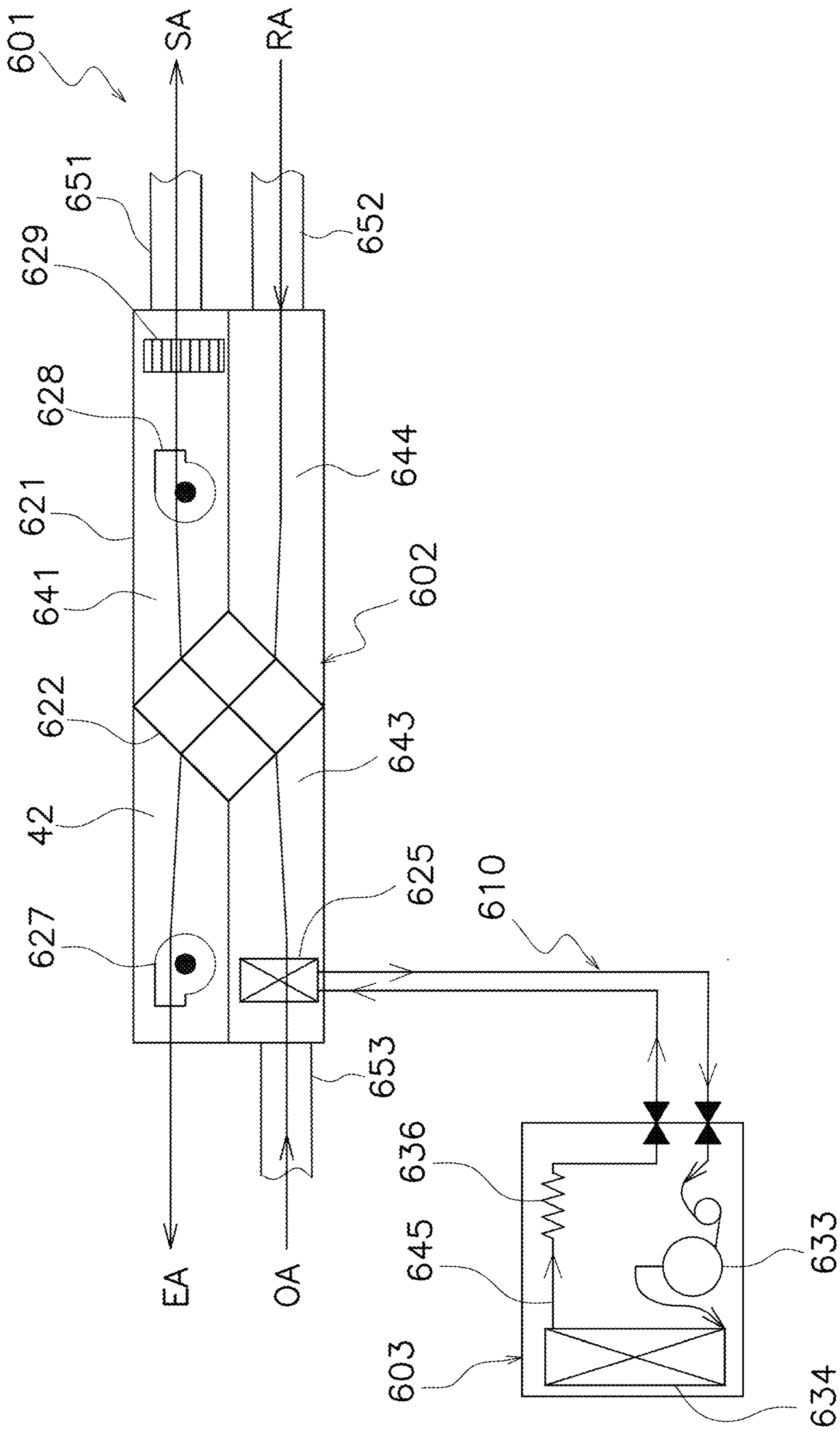

FIG. 17N is a schematic view for describing positional relationships between a first opening and a second opening and each member of the technique of seventeenth group.

FIG. 17O is a schematic view showing a structure of an air conditioning apparatus according to a third embodiment of the technique of seventeenth group.

Figure 18A:
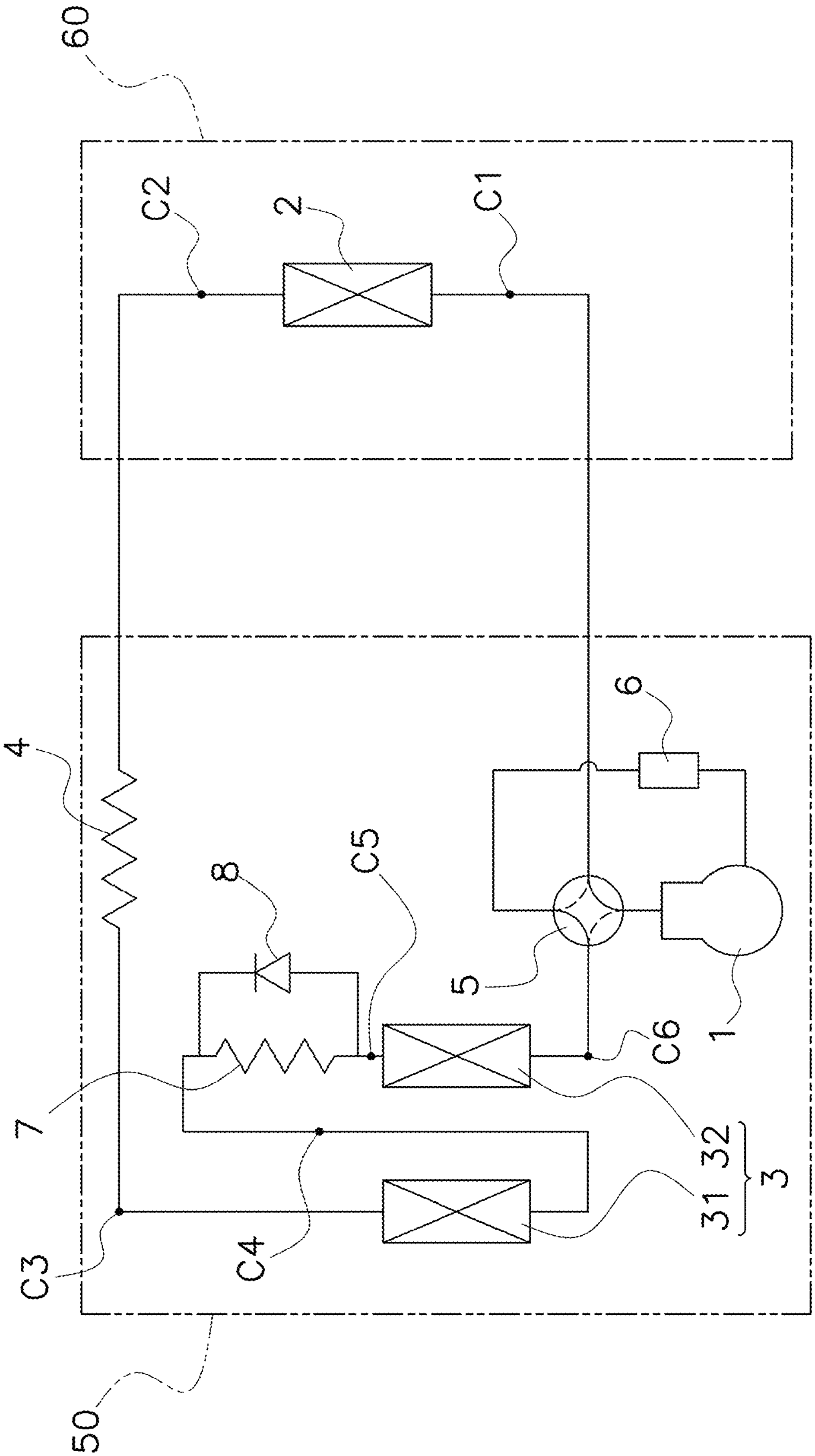

FIG. 18A is a refrigerant circuit diagram illustrating a refrigeration cycle according to a first embodiment of the technique of eighteenth group.

Figure 18B:
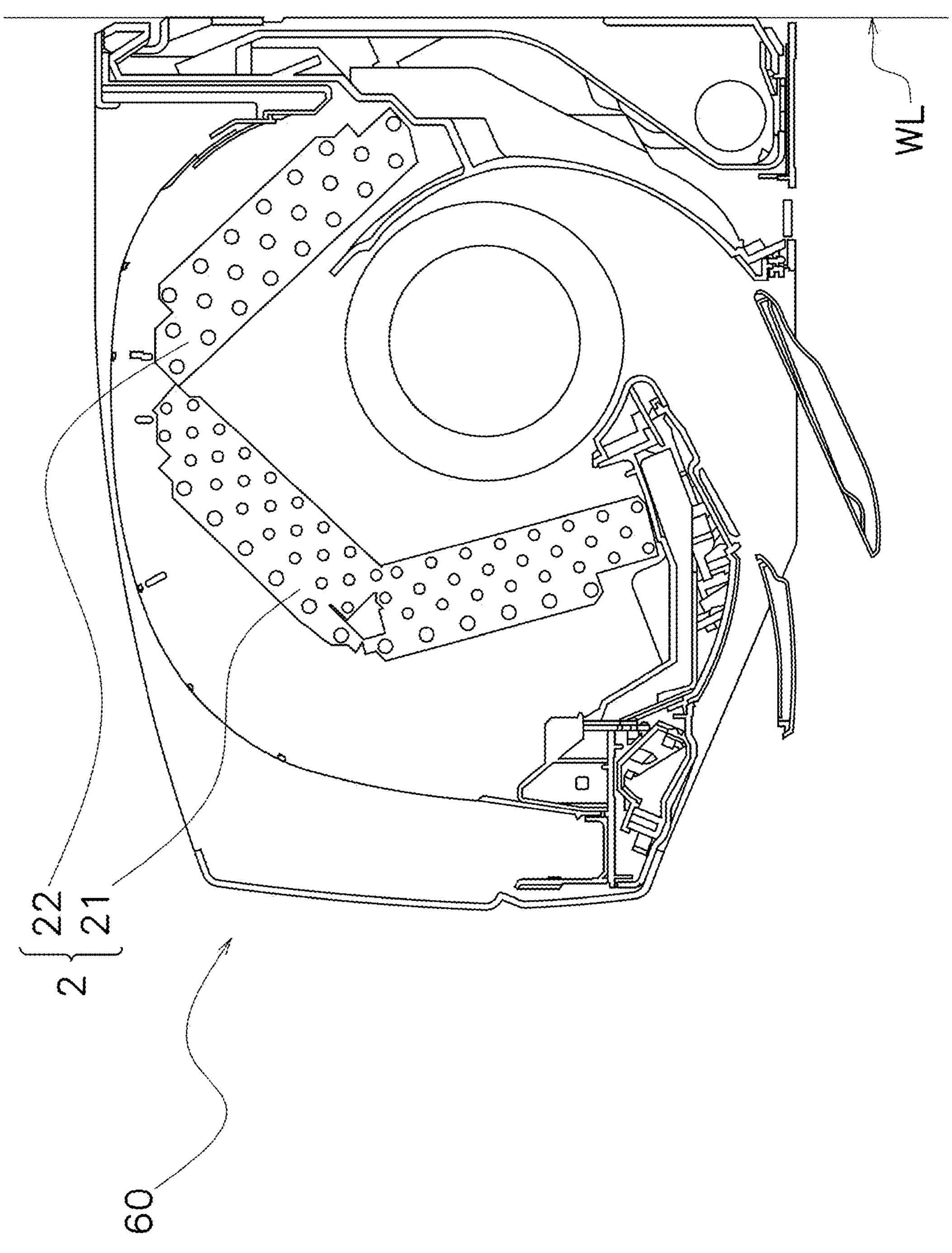

FIG. 18B is a vertical sectional view of a use unit of the technique of eighteenth group.

Figure 18C:
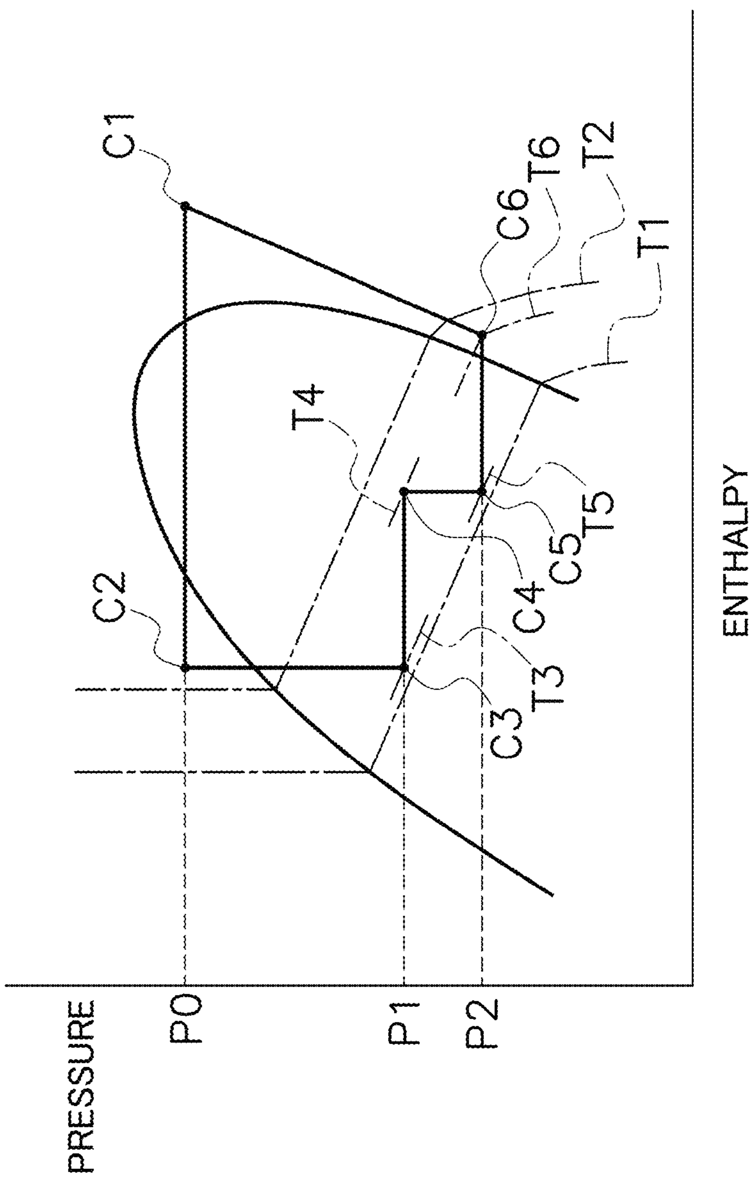

FIG. 18C is a Mollier diagram indicating an operating state of the refrigeration cycle according to the first embodiment of the technique of eighteenth group.

Figure 18D:
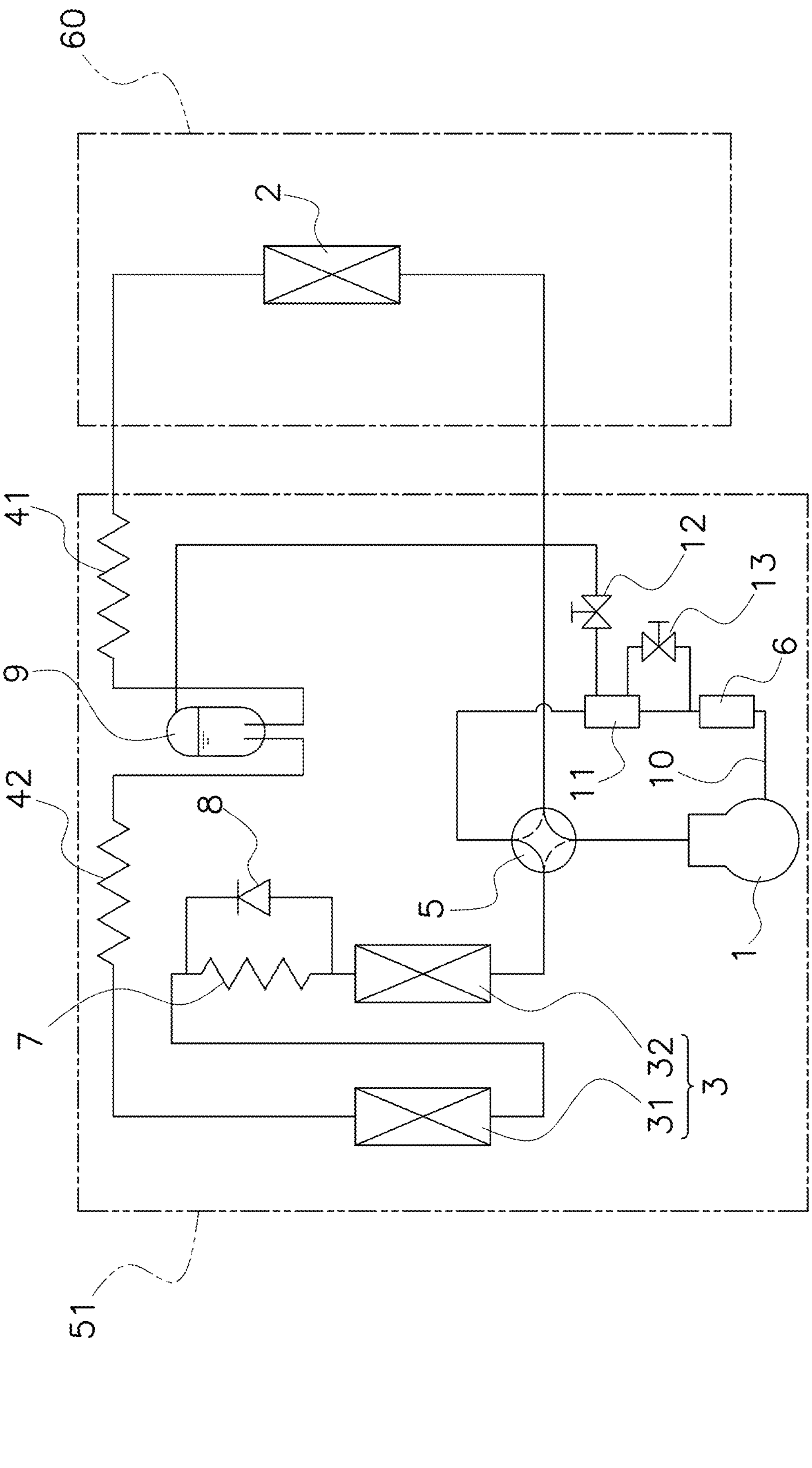

FIG. 18D is a refrigerant circuit diagram illustrating a refrigeration cycle according to a second embodiment of the technique of eighteenth group.

Figure 19A:
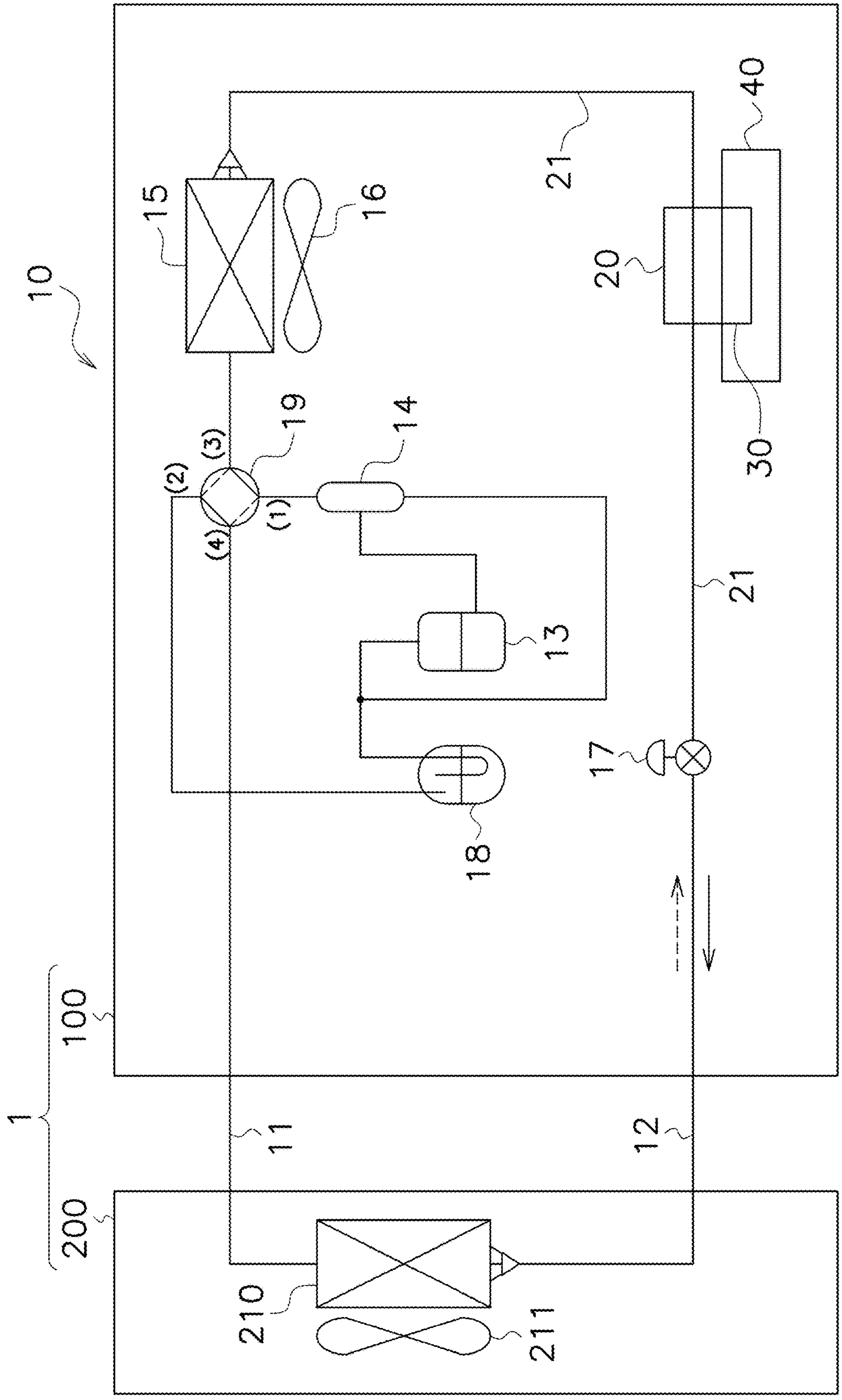

FIG. 19A is a piping system diagram of a refrigerant circuit 10 of an air conditioner 1 according to a first embodiment of the technique of nineteenth group.

Figure 19B:
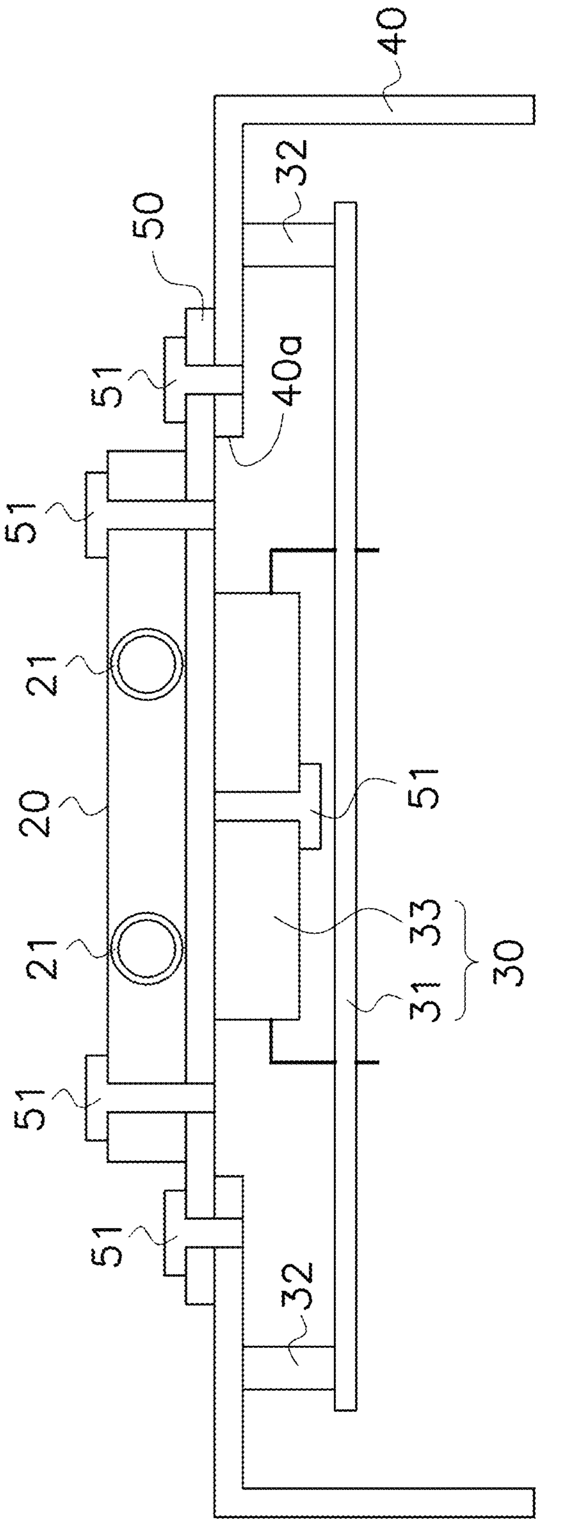

FIG. 19B illustrates an attachment structure of a power device 33, a refrigerant jacket 20, and a heat transfer plate 50 according to the first embodiment of the technique of nineteenth group.

Figure 19C:
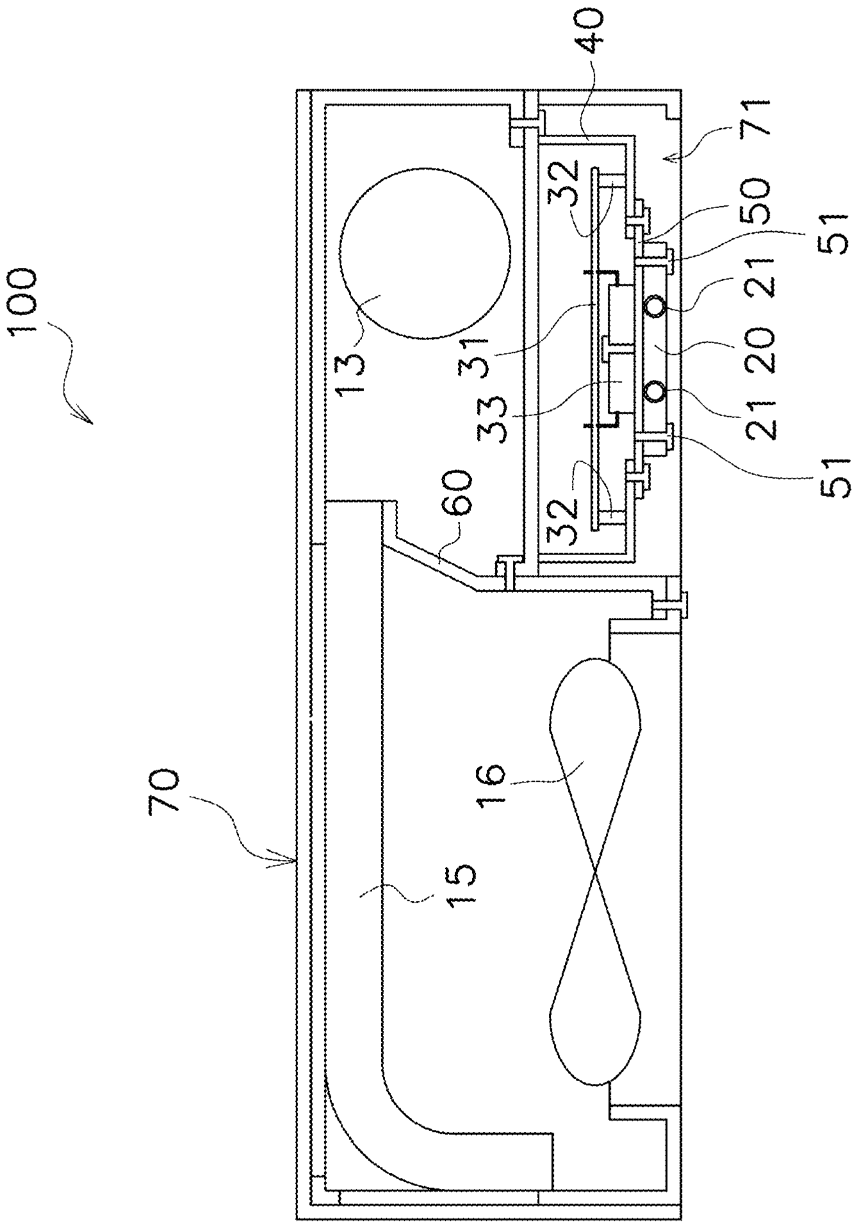

FIG. 19C schematically illustrates the cross-sectional shape of an outdoor unit 100 of the first embodiment of the technique of nineteenth group.

Figure 19D:
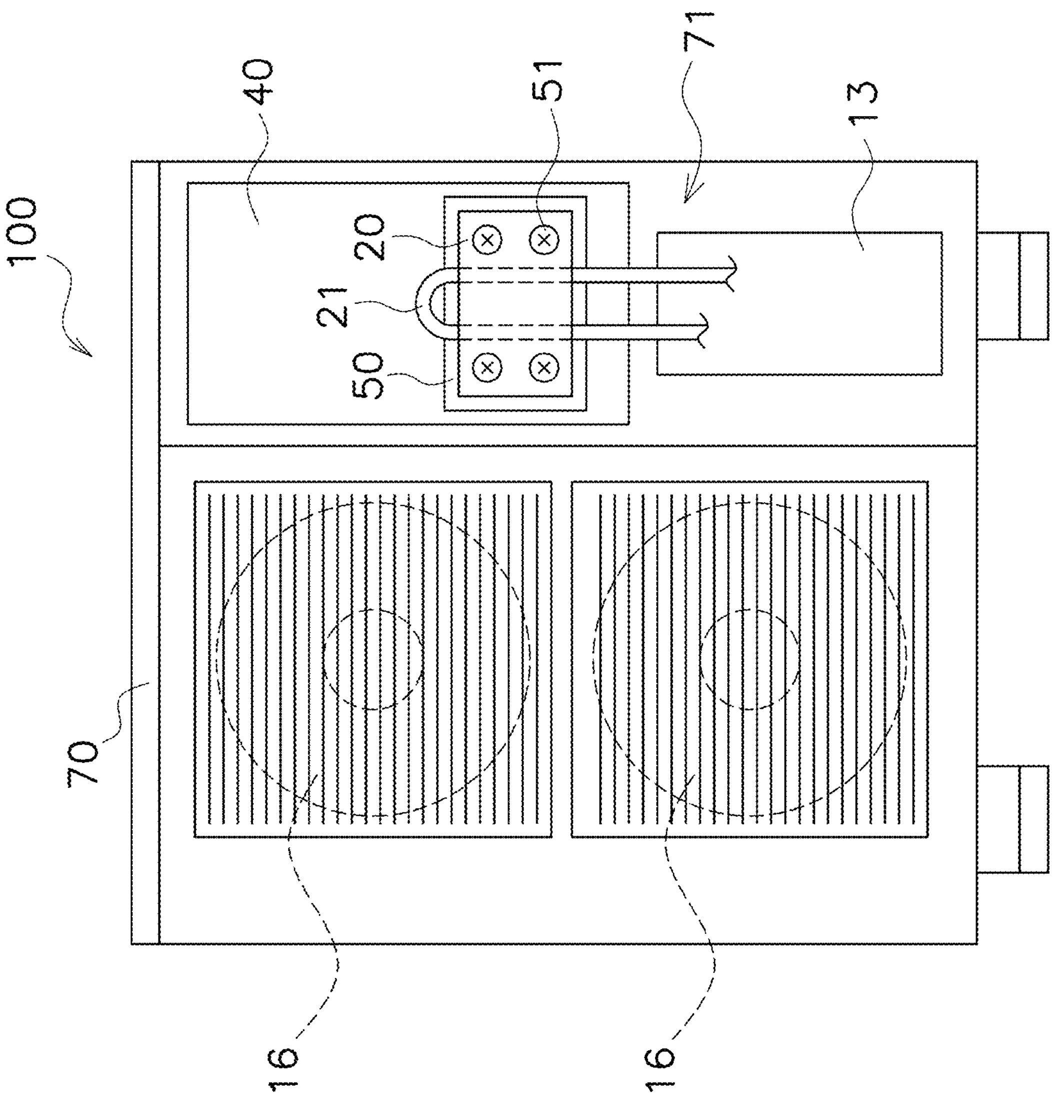

FIG. 19D is a front view of the outdoor unit 100 of the first embodiment of the technique of nineteenth group.

Figure 19E:
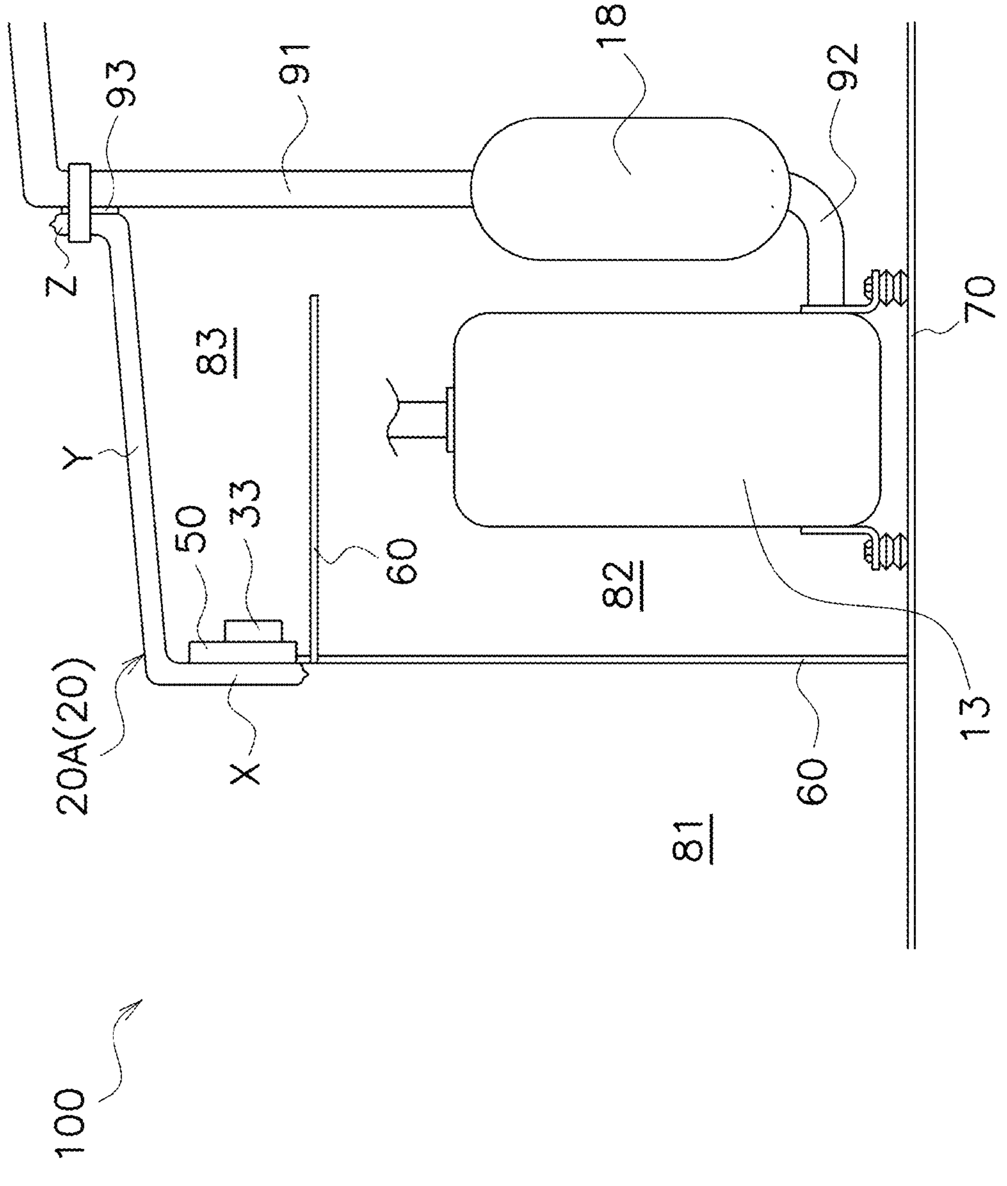

FIG. 19E is a partial schematic side view of an outdoor unit 100 of an air conditioner 1 according to a second embodiment of the technique of nineteenth group.

Figure 20A:
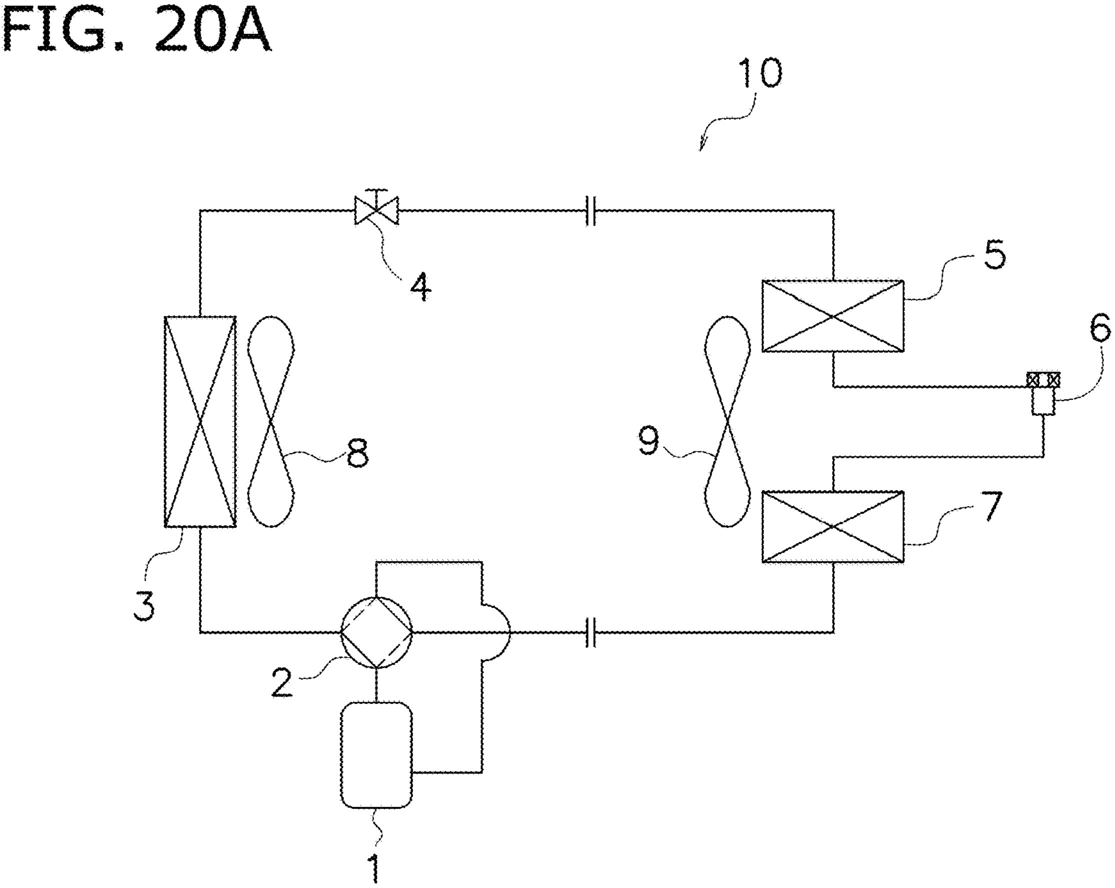

FIG. 20A is a circuit diagram of an air conditioner according to an embodiment of the technique of twentieth group.

Figure 20B:
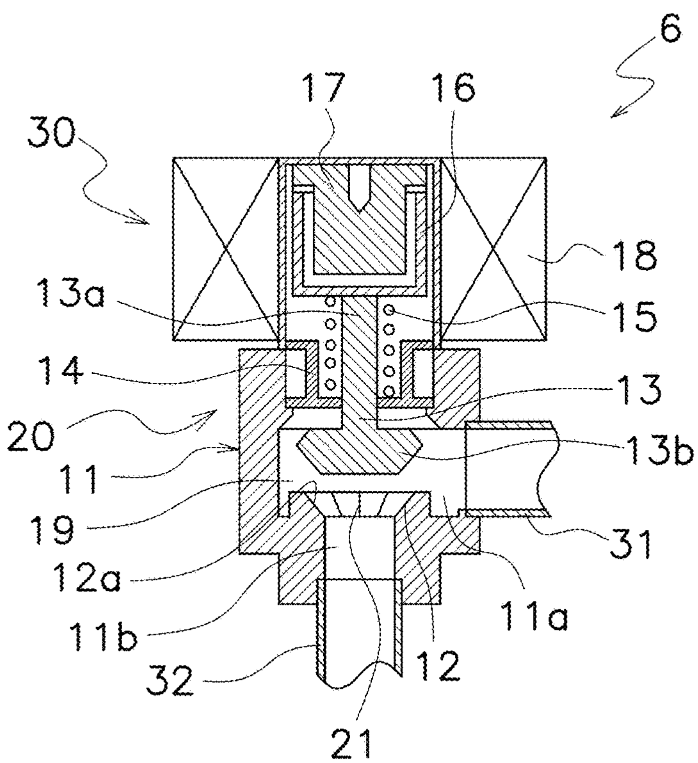

FIG. 20B is a sectional view illustrating the configuration of an electromagnetic valve for dehumidification according to the embodiment of the technique of twentieth group.

Figure 20C:
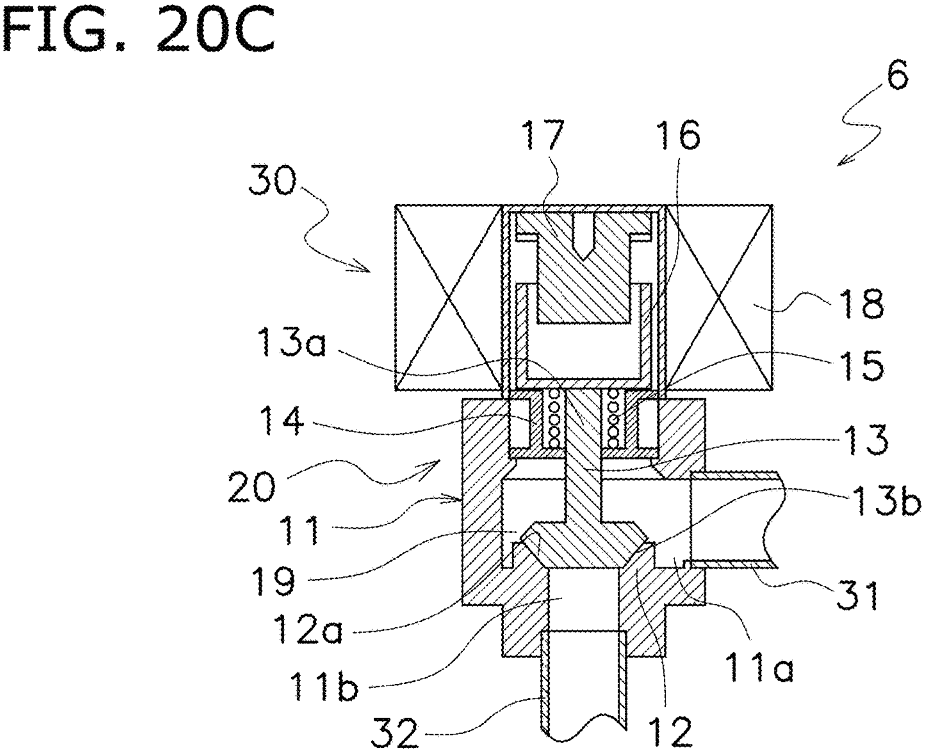

FIG. 20C is a sectional view illustrating the configuration of the electromagnetic valve for dehumidification according to the embodiment of the technique of twentieth group.

Figure 20D:
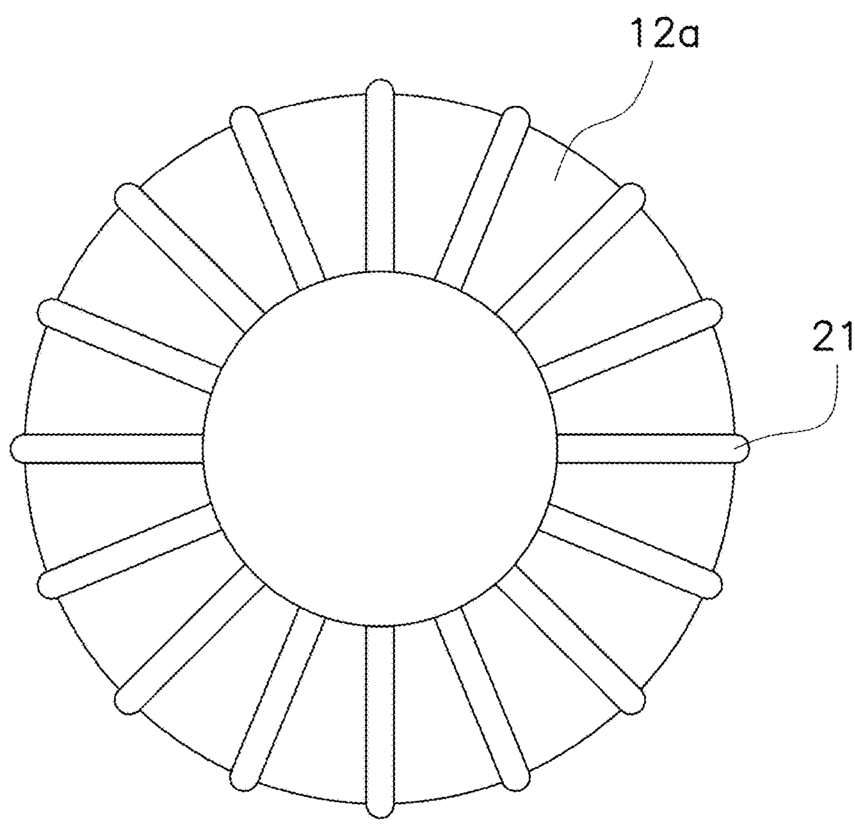

FIG. 20D illustrates the configuration of a tapered surface of a valve seat of the electromagnetic valve for dehumidification of the technique of twentieth group.

Figure 21A:
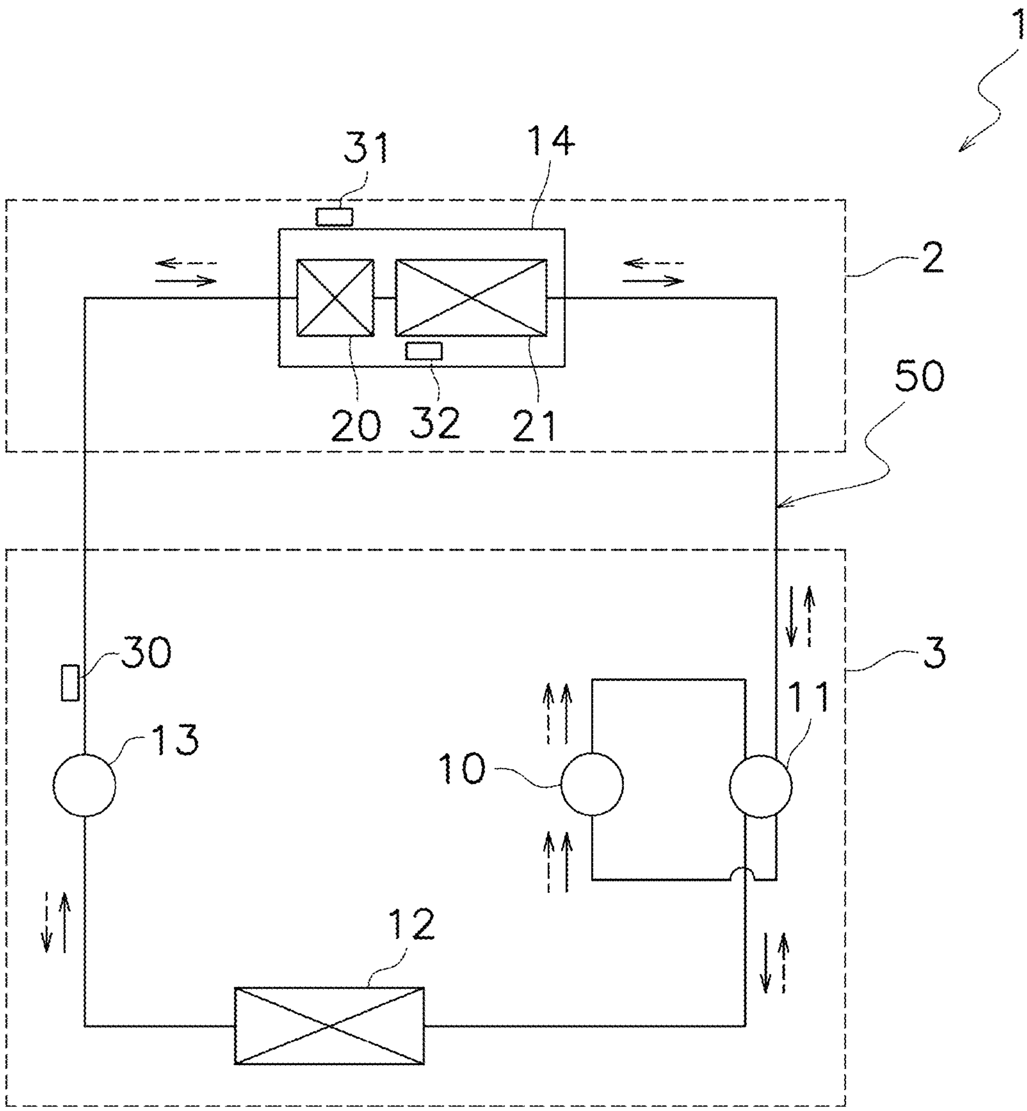

FIG. 21A is a circuit diagram of a refrigerant circuit of an air conditioner according to an embodiment of the technique of twenty-first group.

Figure 21B:
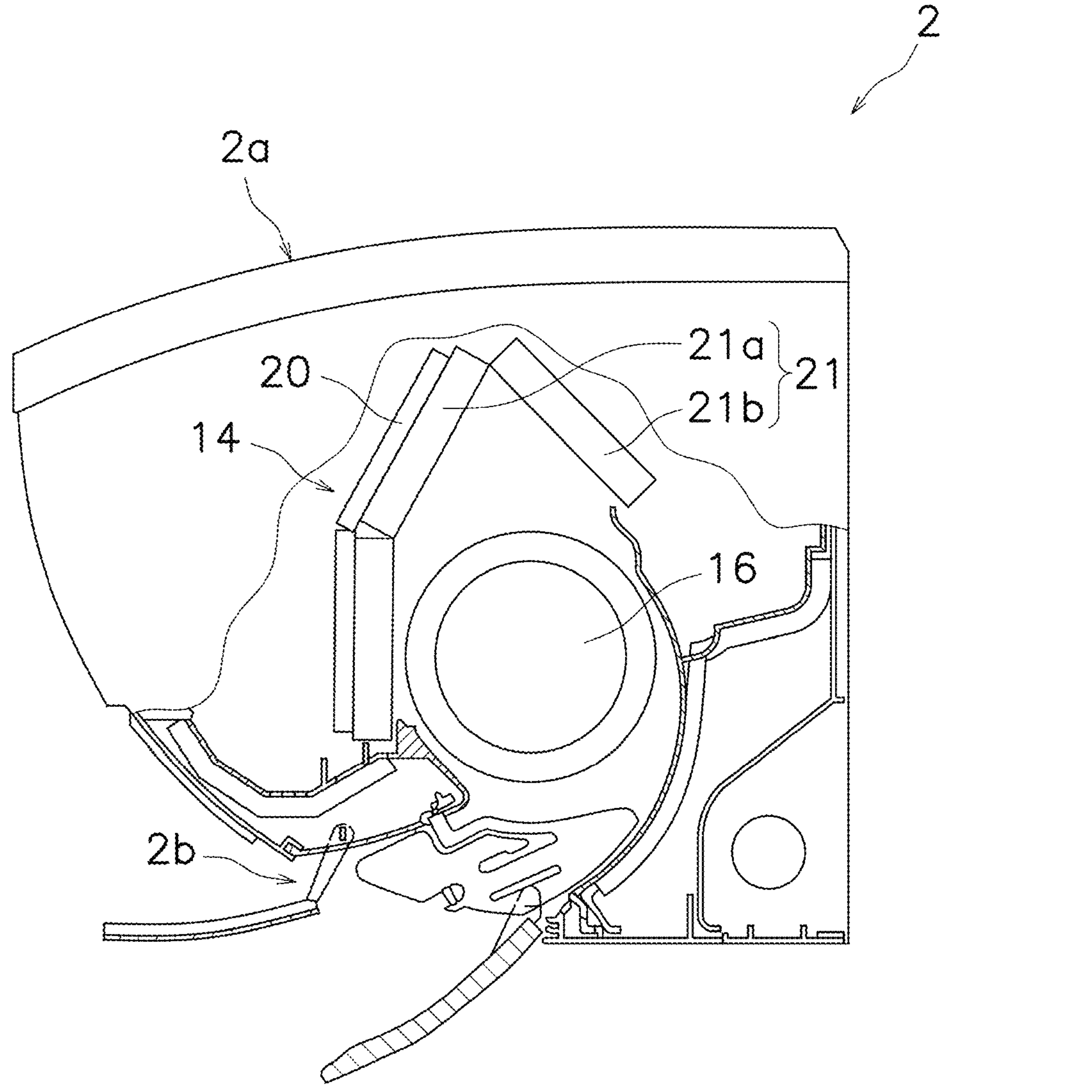

FIG. 21B is a schematic sectional view of an indoor unit of the air conditioner according to the embodiment of the technique of twenty-first group.

Figure 21C:
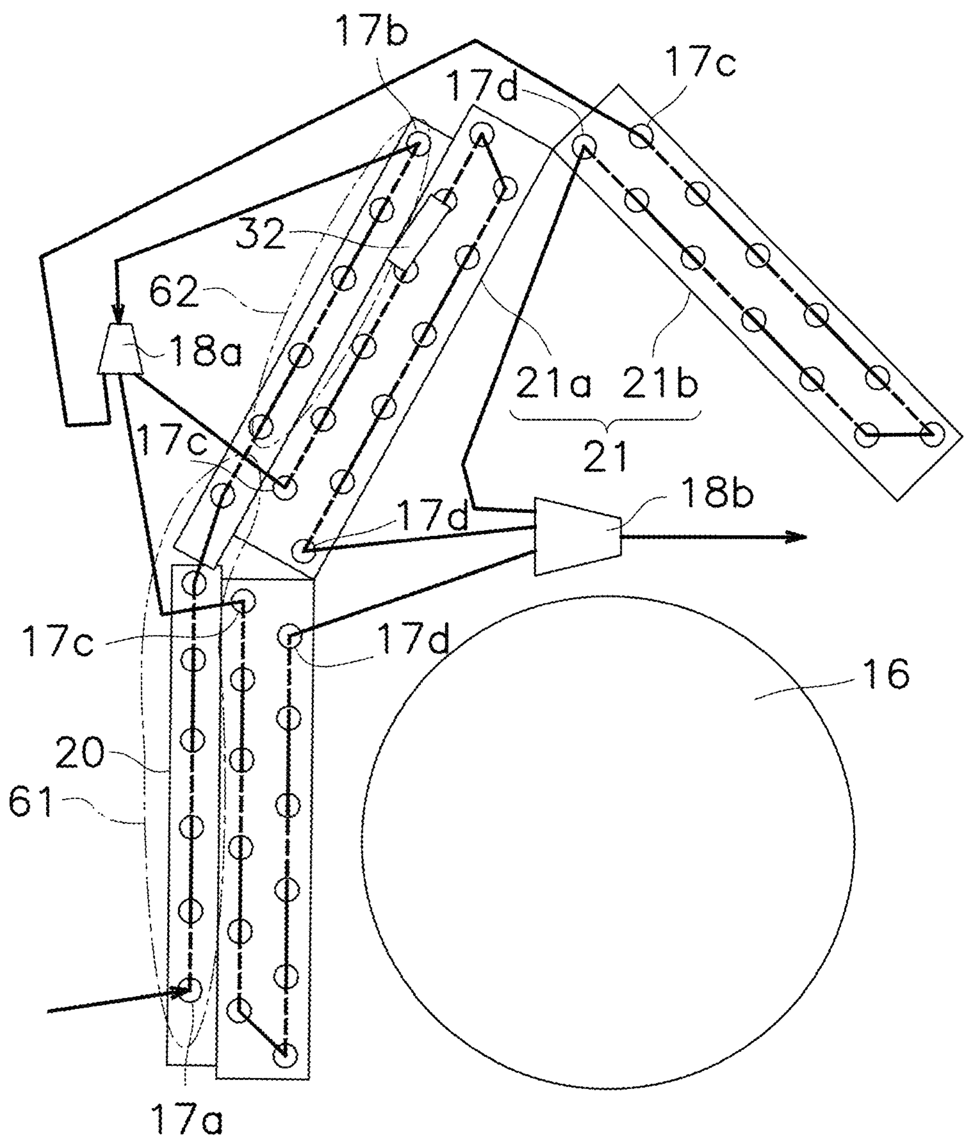

FIG. 21C illustrates the configuration of an indoor heat exchanger of the embodiment of the technique of twenty-first group.

Figure 21D:
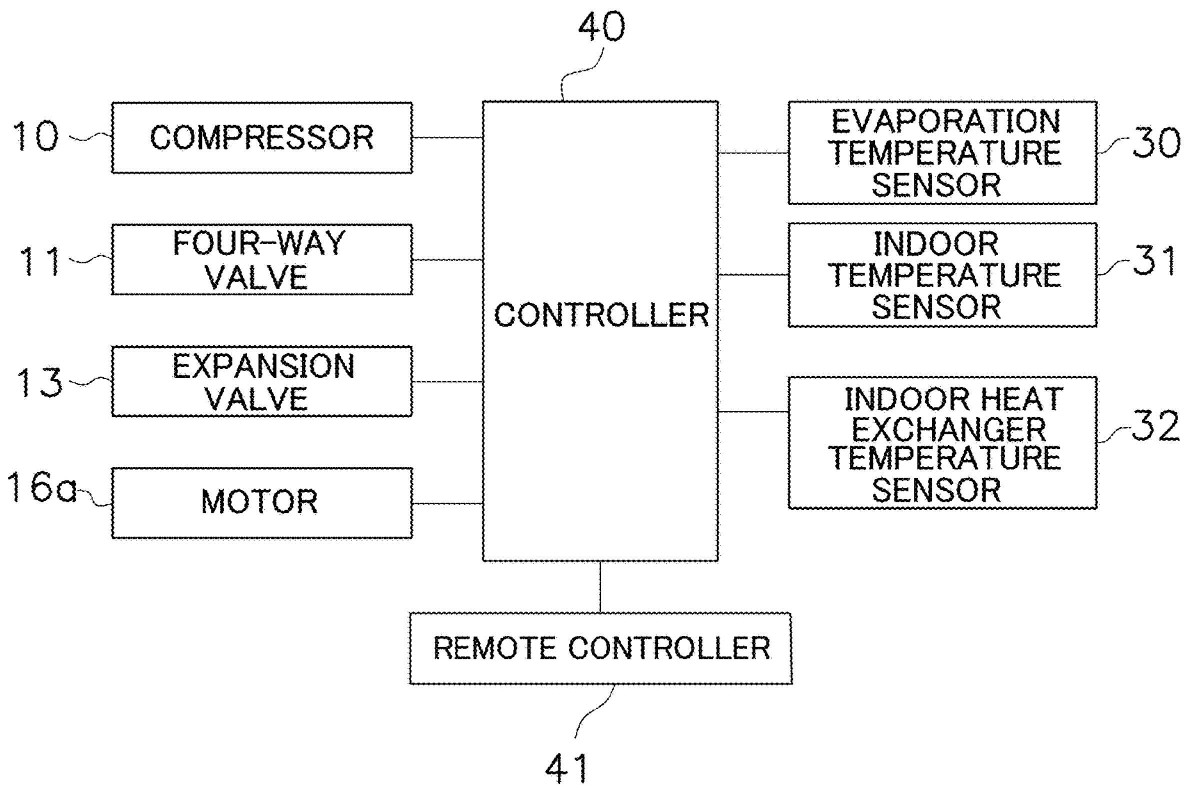

FIG. 21D illustrates a controller of the air conditioner according to the embodiment of the technique of twenty-first group.

Figure 21E:
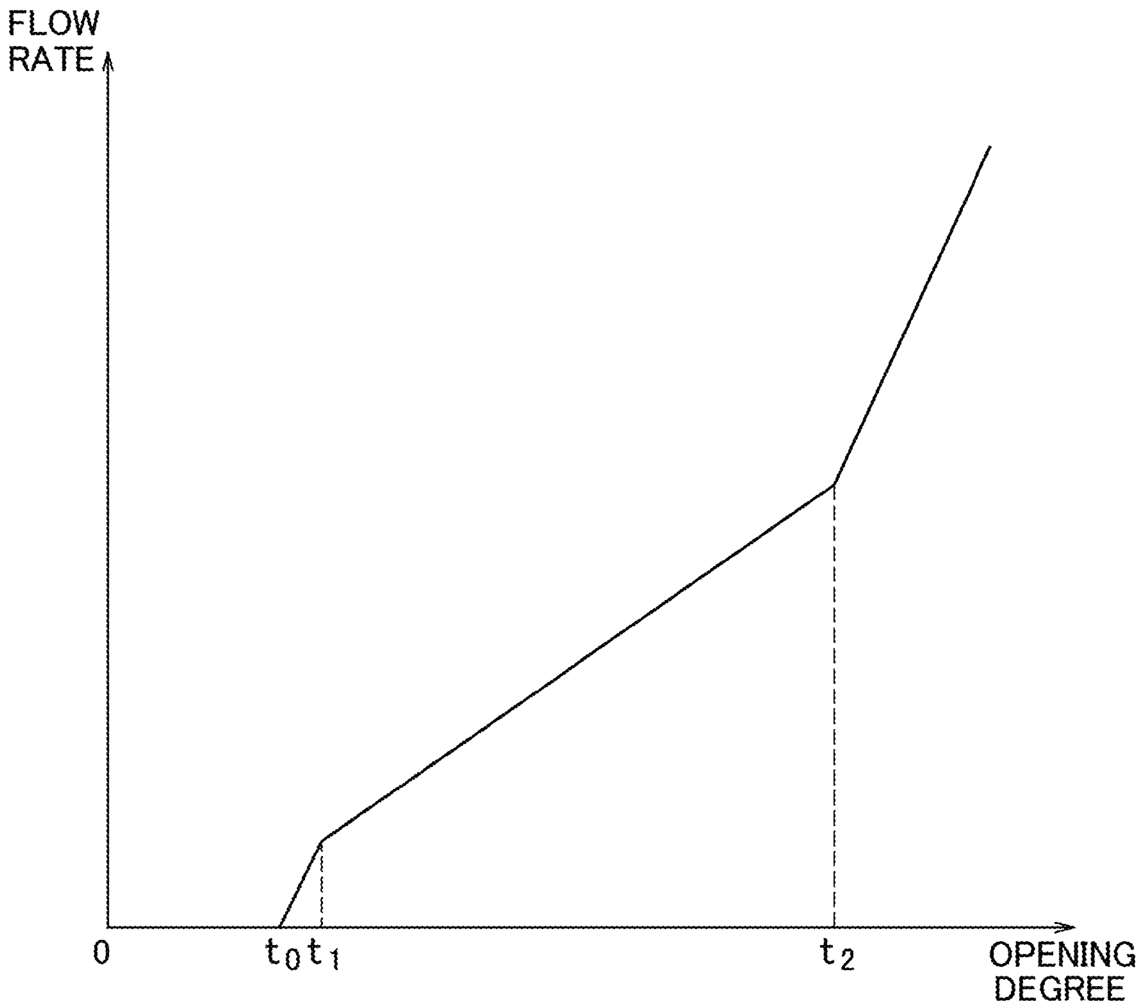

FIG. 21E illustrates an example of change in flow rate when the opening degree of an expansion valve of the embodiment of the technique of twenty-first group is changed.

Figure 21F:
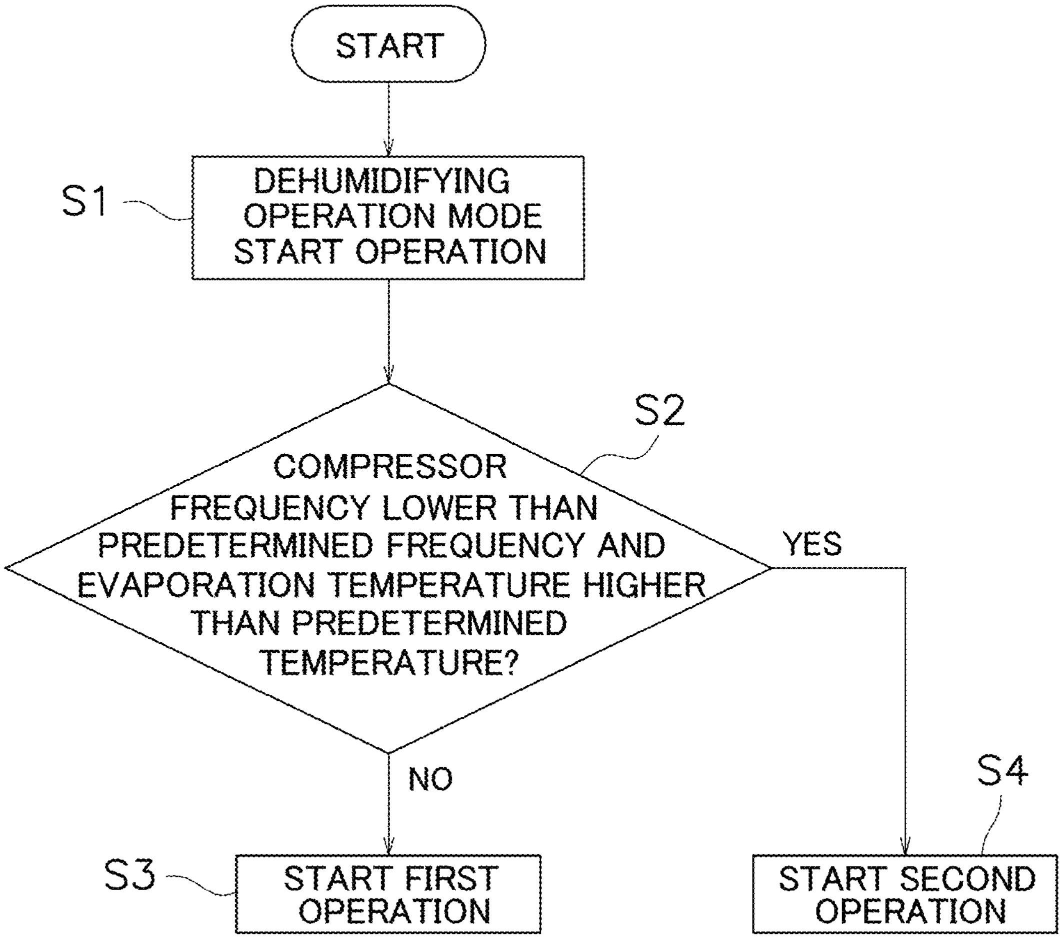

FIG. 21F illustrates an operation of the air conditioner according to the embodiment of the technique of twenty-first group.

Figure 22A:
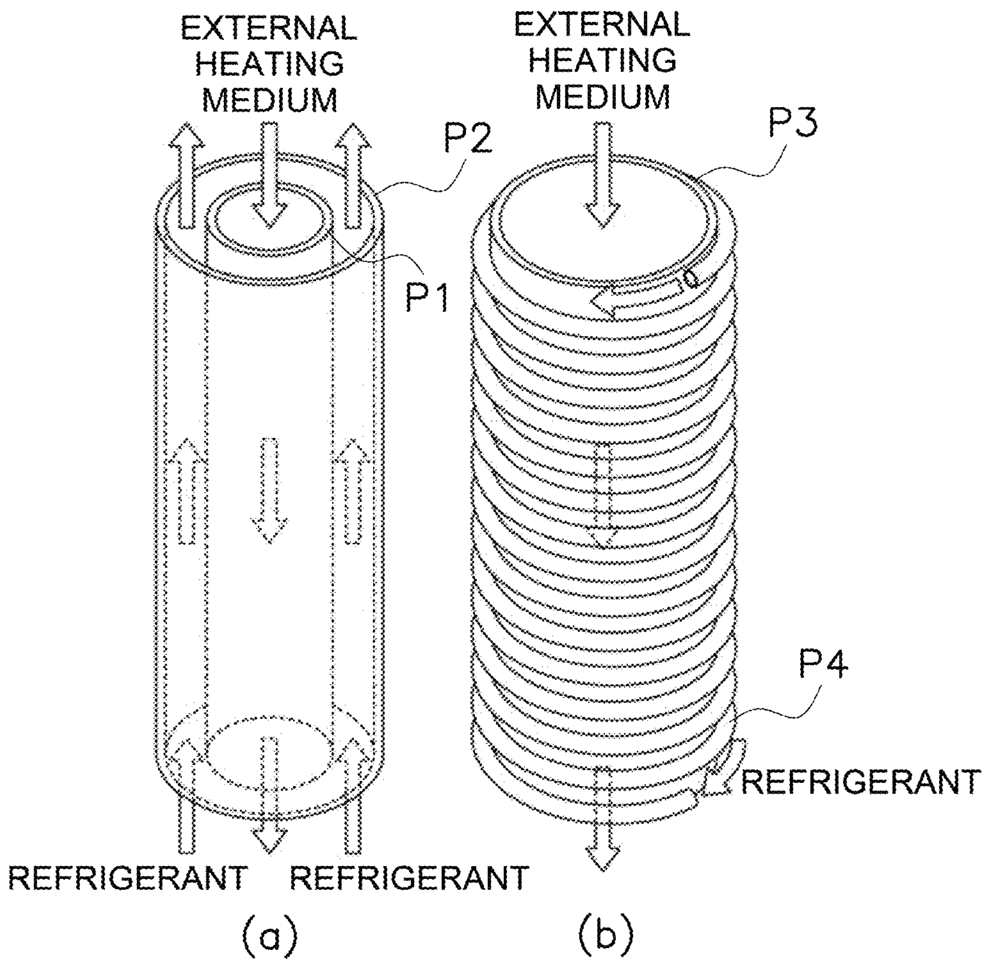

FIG. 22A is a schematic view of an example of a counter-flow-type heat exchanger according to an embodiment of the technique of twenty-second group.

Figure 22B:
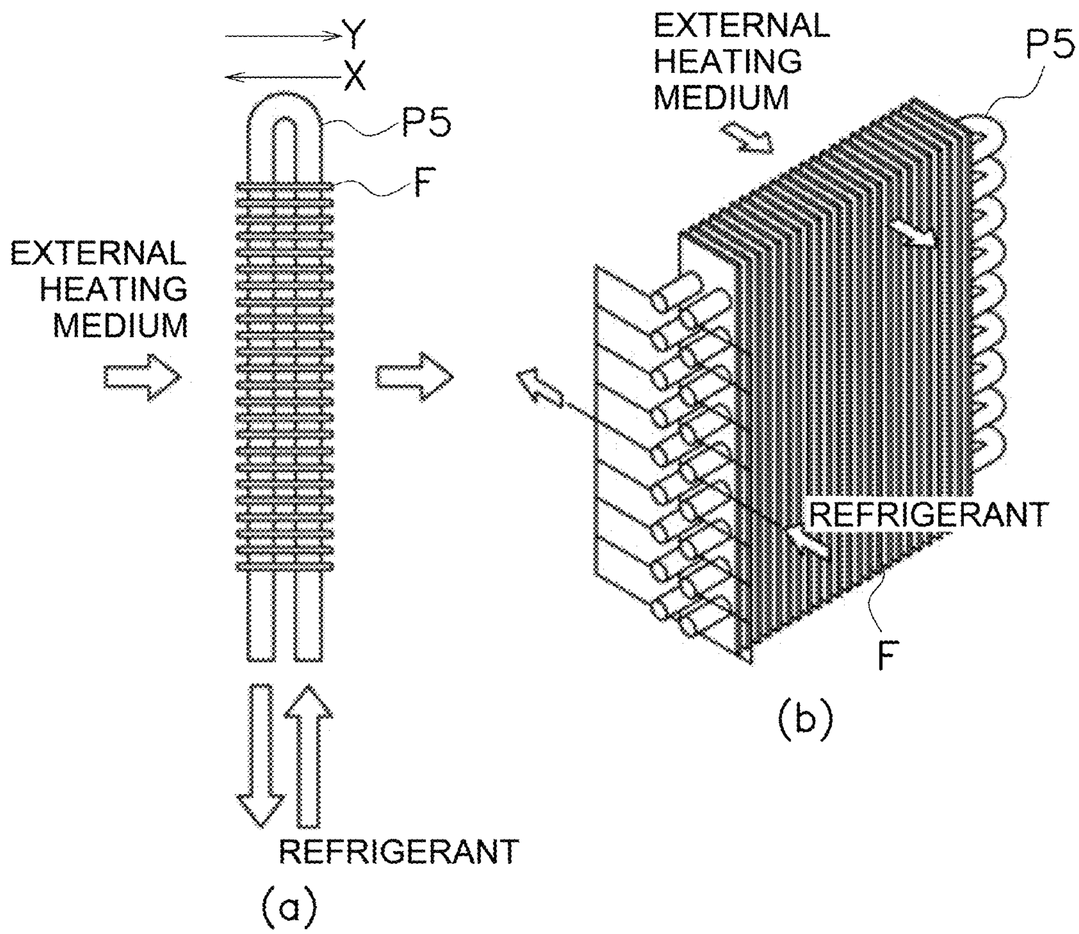

FIG. 22B a schematic view of another example of a counter-flow-type heat exchanger according to the embodiment of the technique of twenty-second group; (a) is a plan view and (b) is a perspective view.

Figure 22C:
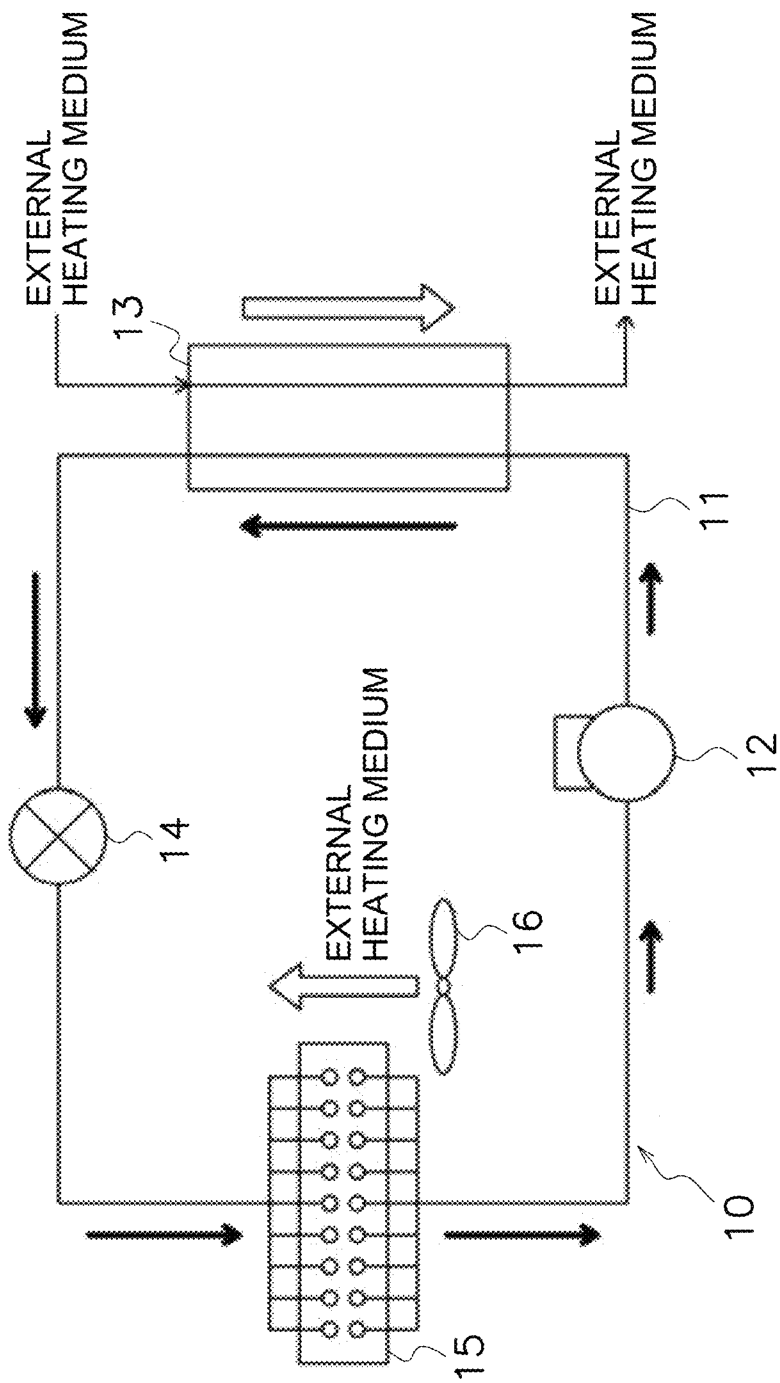

FIG. 22C is a schematic structural diagram of a form of a configuration of a refrigerant circuit in a refrigeration cycle apparatus according to a first embodiment of the technique of twenty-second group.

Figure 22D:
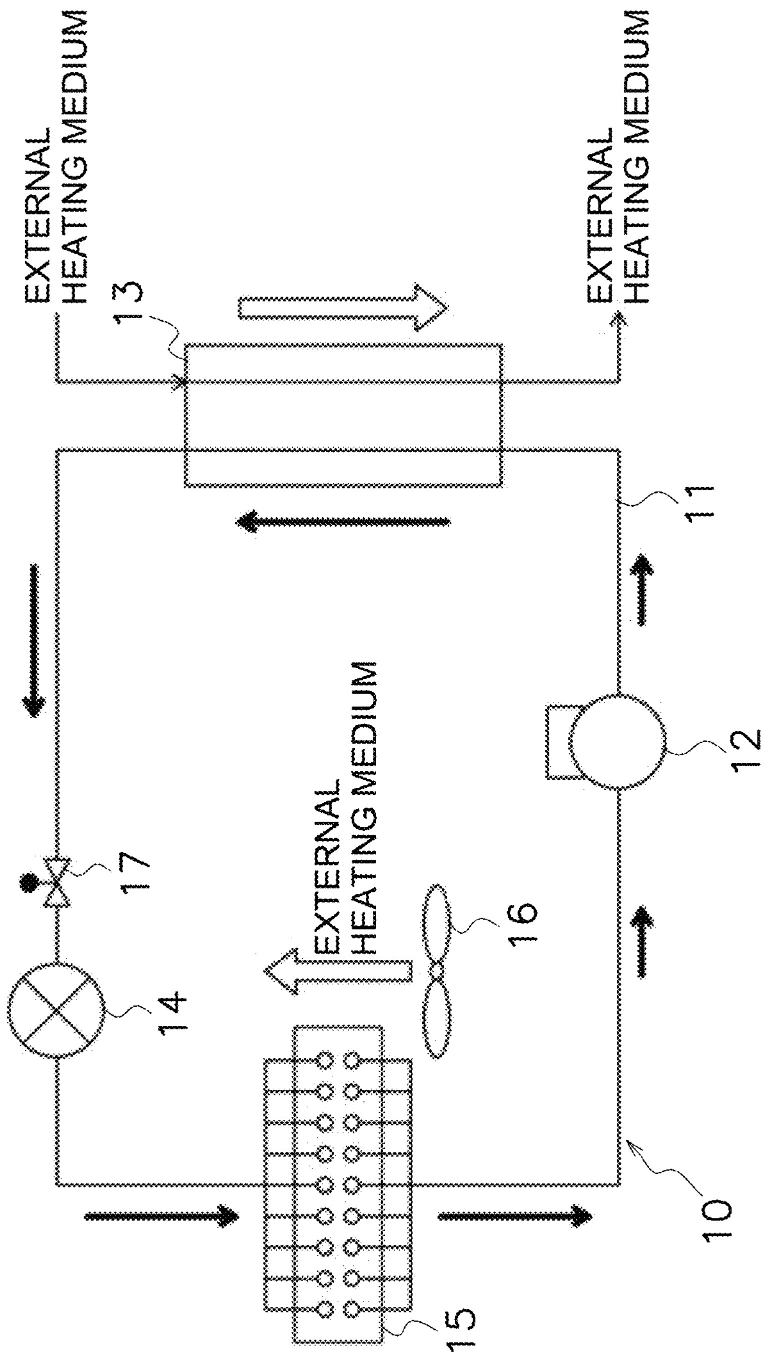

FIG. 22D is a schematic structural diagram of a modification of the refrigerant circuit of FIG. 22C.

Figure 22E:
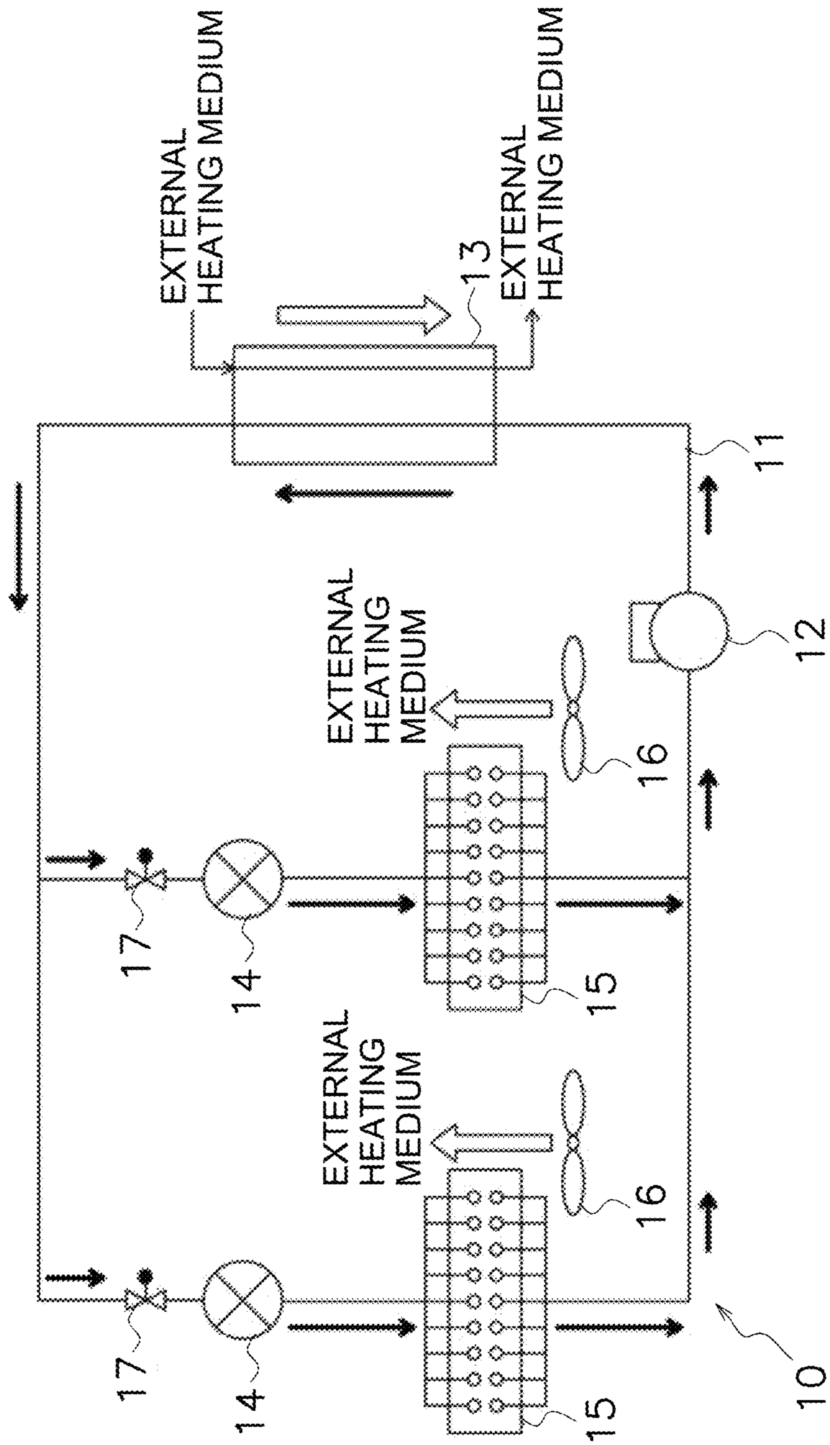

FIG. 22E is a schematic structural diagram of a modification of the refrigerant circuit of FIG. 22D.

Figure 22F:
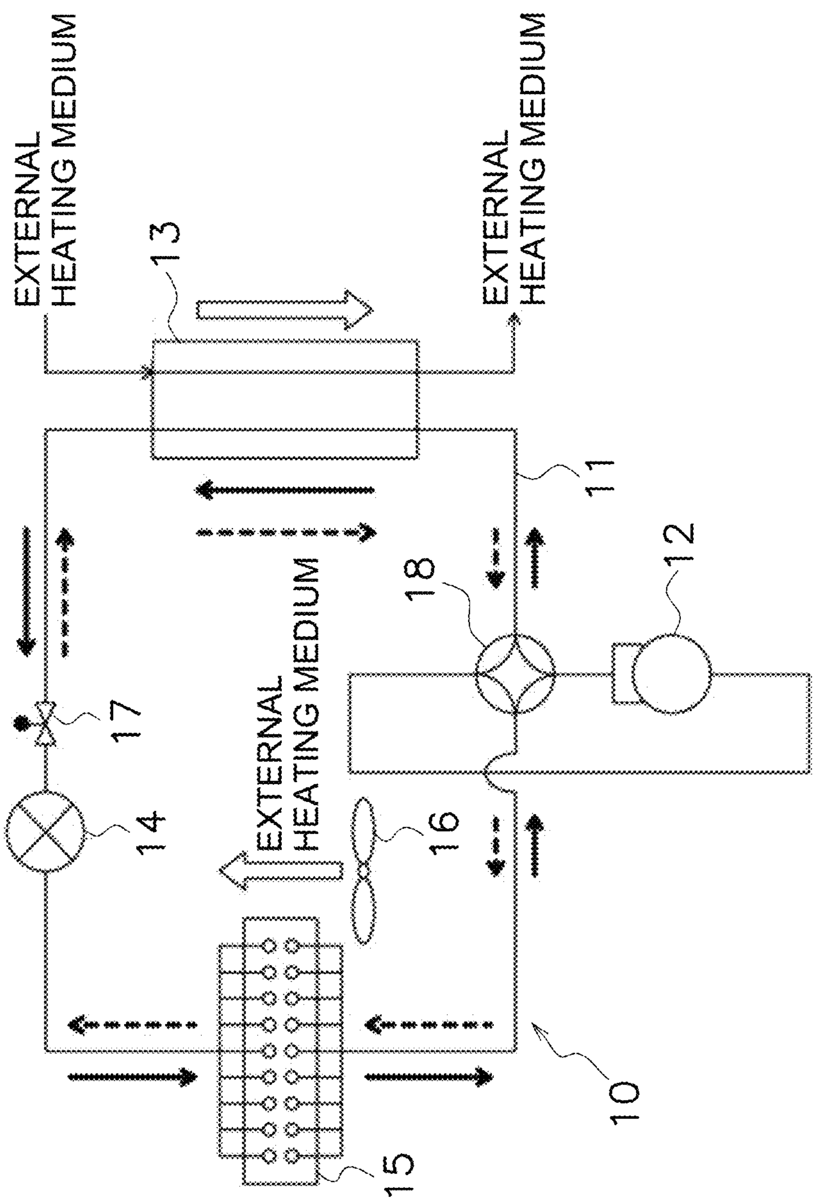

FIG. 22F is a schematic structural diagram of a modification of the refrigerant circuit of FIG. 22D.

Figure 22G:
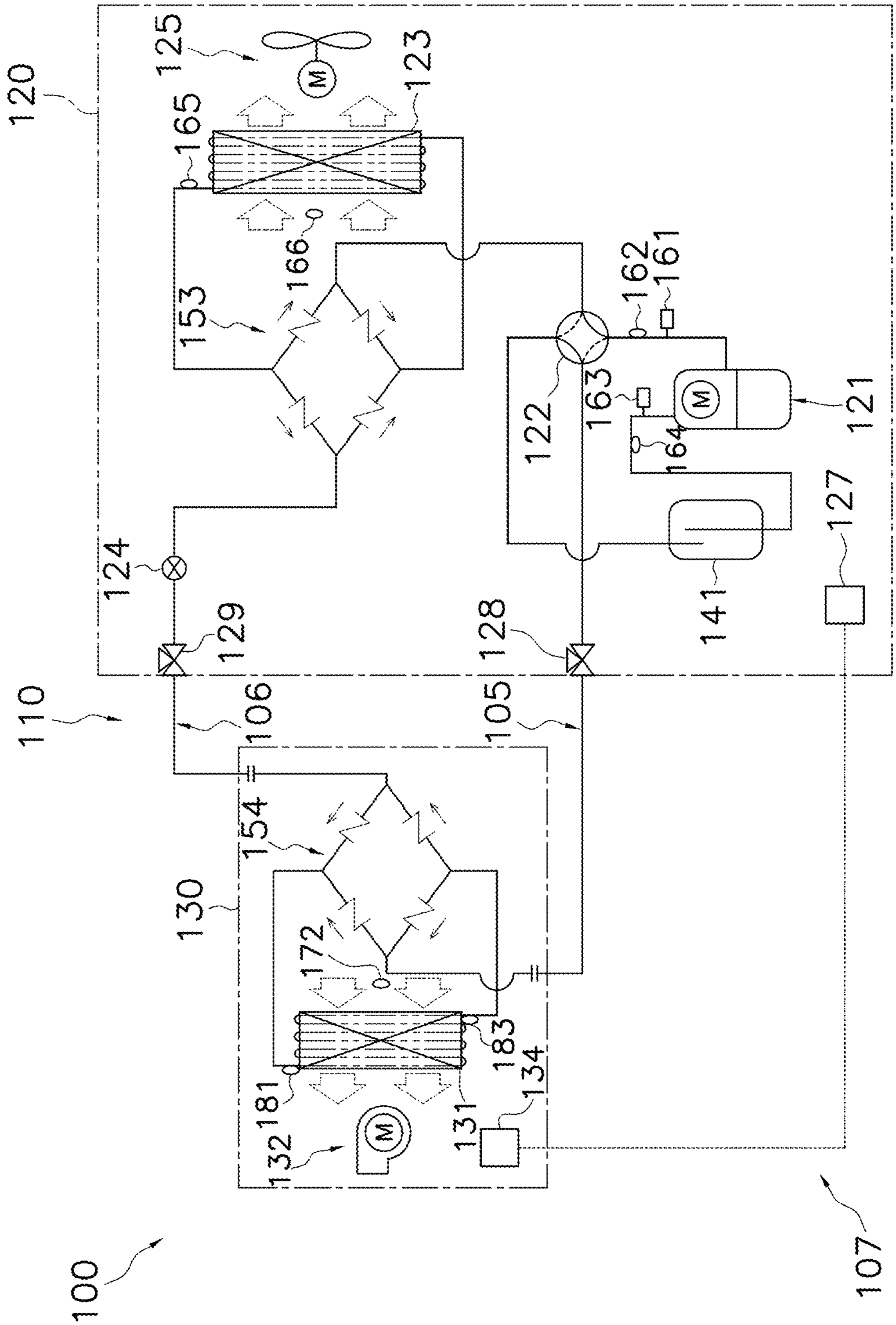

FIG. 22G is a schematic structural diagram of a configuration of a refrigerant circuit of an air conditioning apparatus as an example of a refrigeration cycle apparatus according to a second embodiment of the technique of twenty-second group.

Figure 22H:
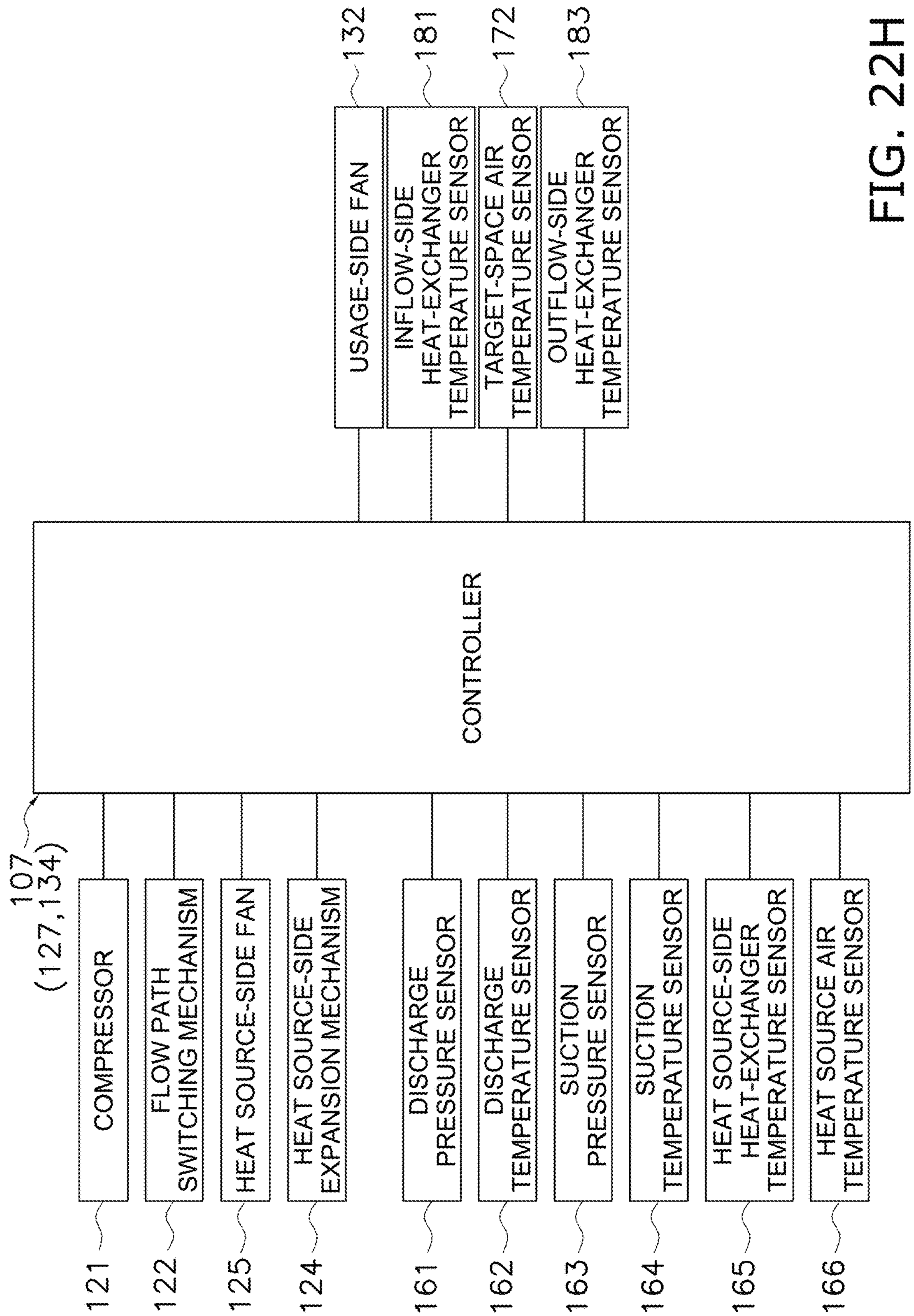

FIG. 22H is a schematic control block structural diagram of the air conditioning apparatus of FIG. 22G.

Figure 22I:
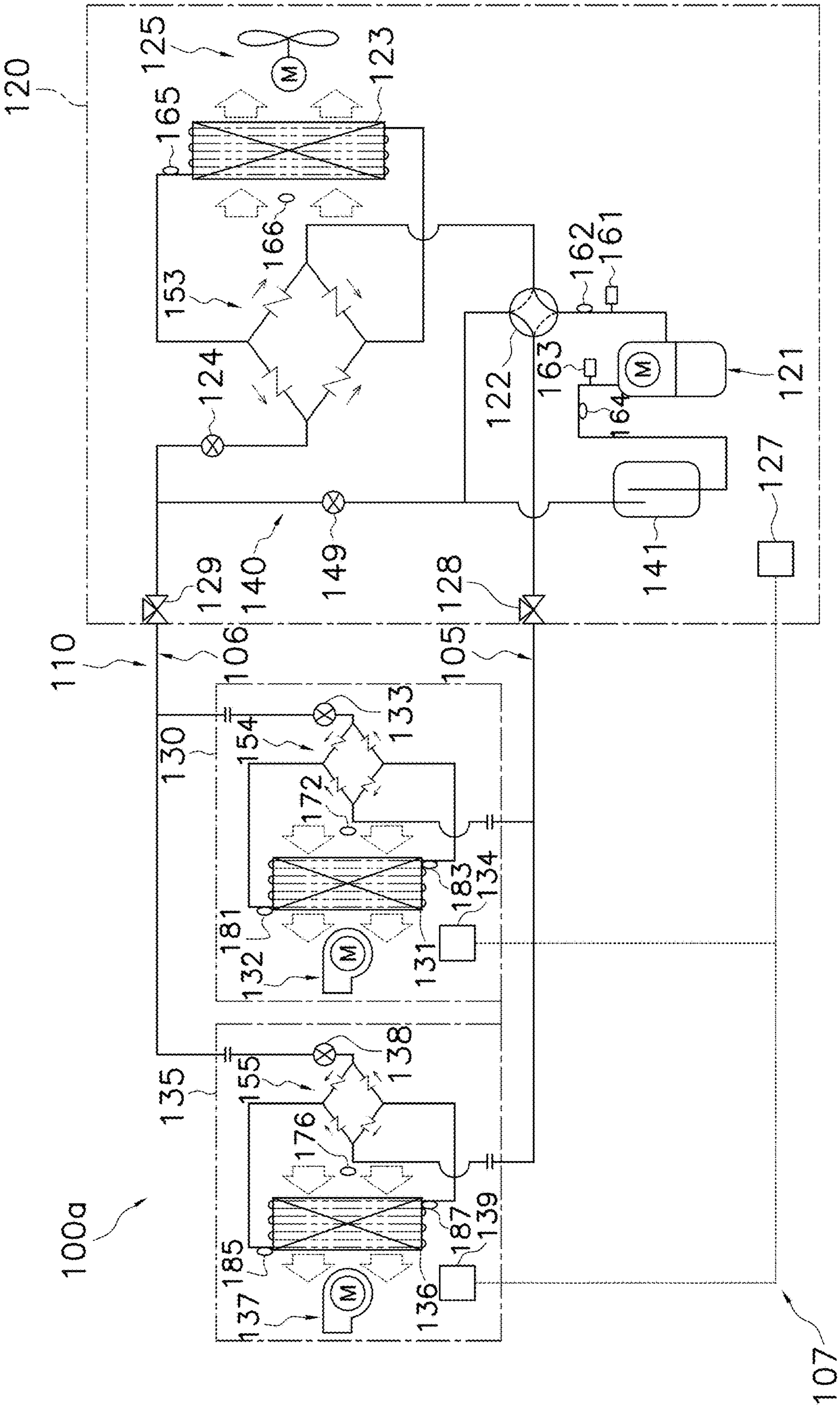

FIG. 22I is a schematic structural diagram of a configuration of a refrigerant circuit of an air conditioning apparatus as an example of a refrigeration cycle apparatus according to a third embodiment of the technique of twenty-second group.

Figure 22J:
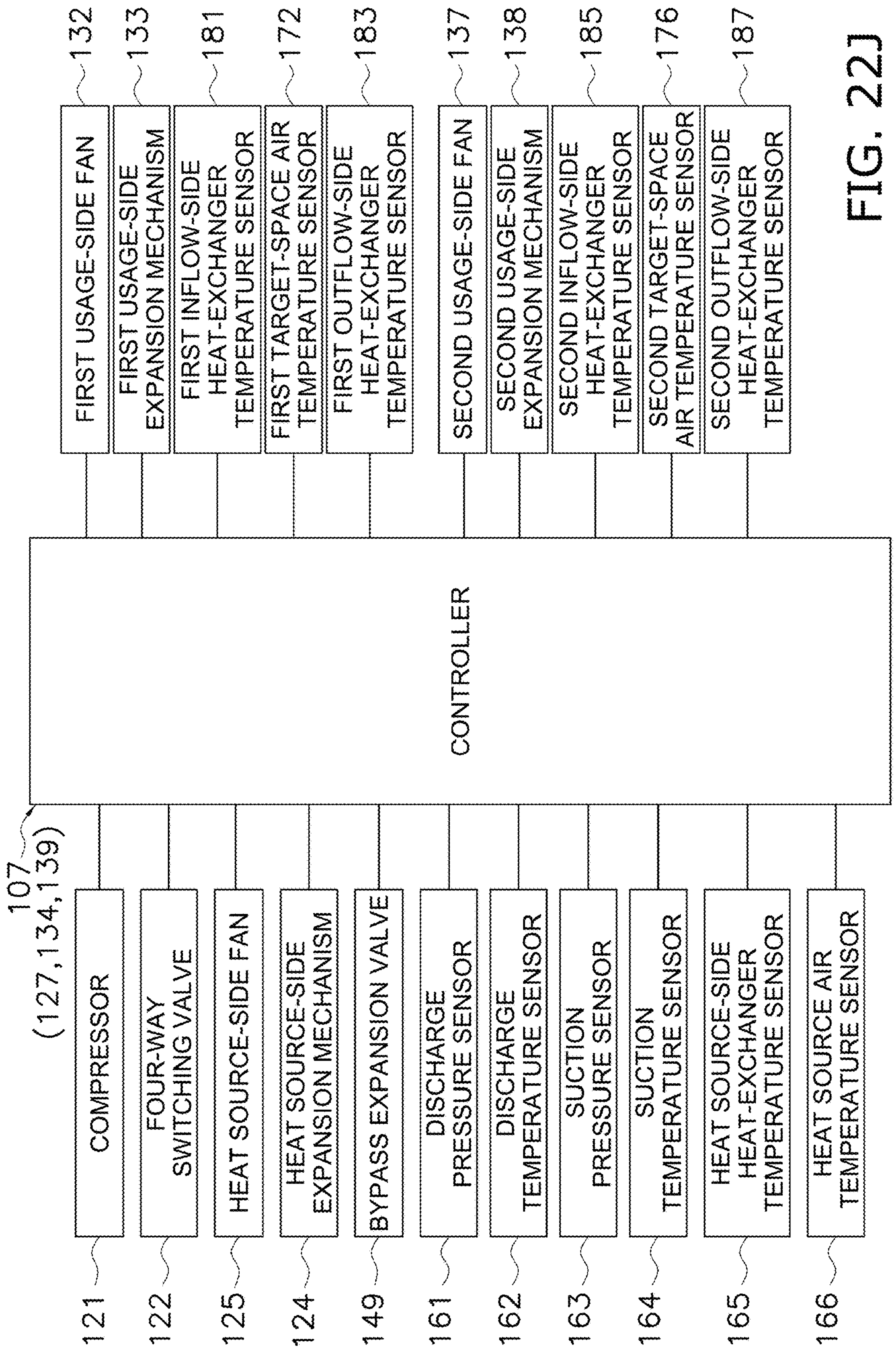

FIG. 22J is a schematic control block structural diagram of the air conditioning apparatus of FIG. 22I.

Figure 23A:
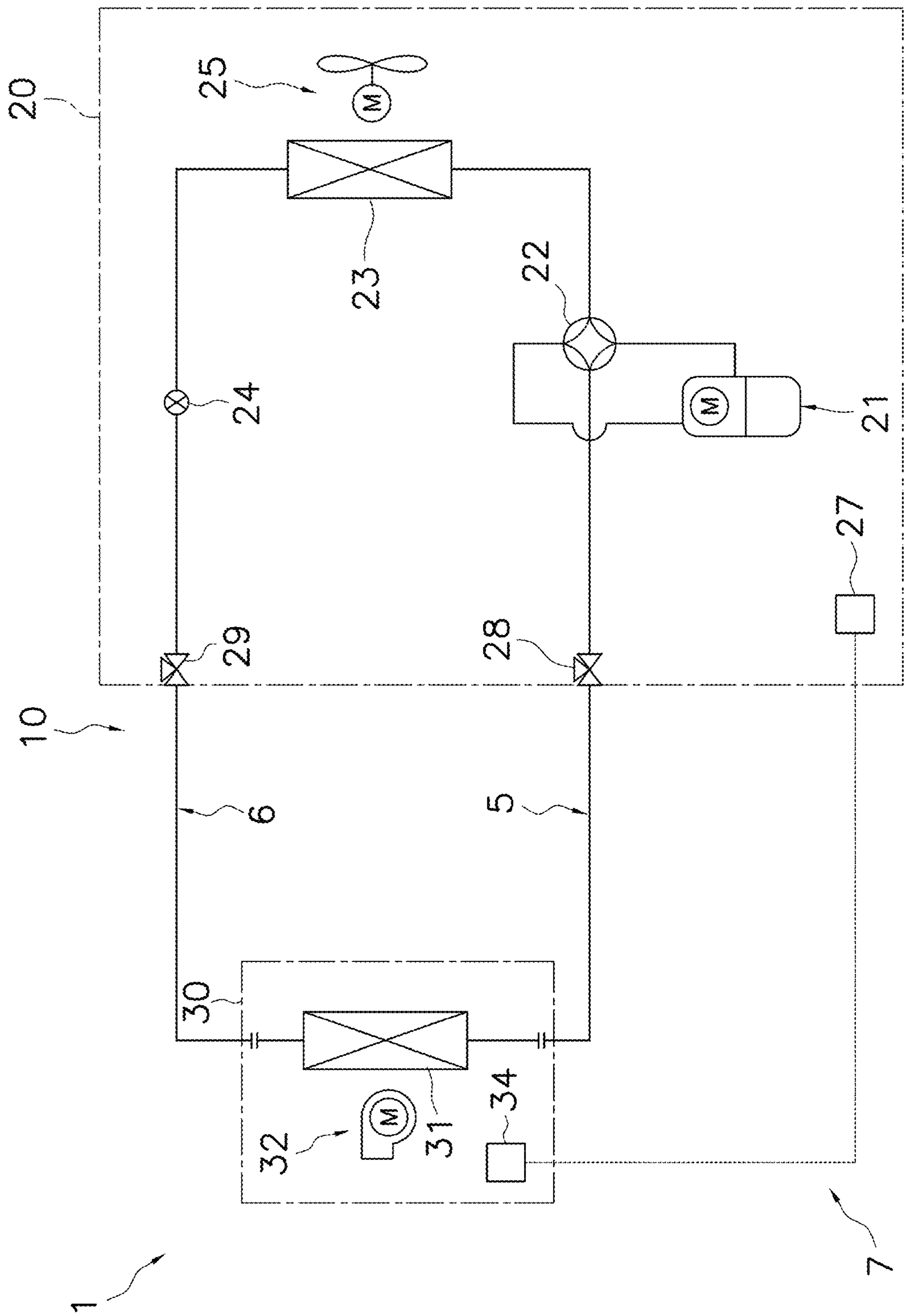

FIG. 23A is a schematic diagram of a refrigerant circuit in accordance with an embodiment of the technique of twenty-third group.

Figure 23B:
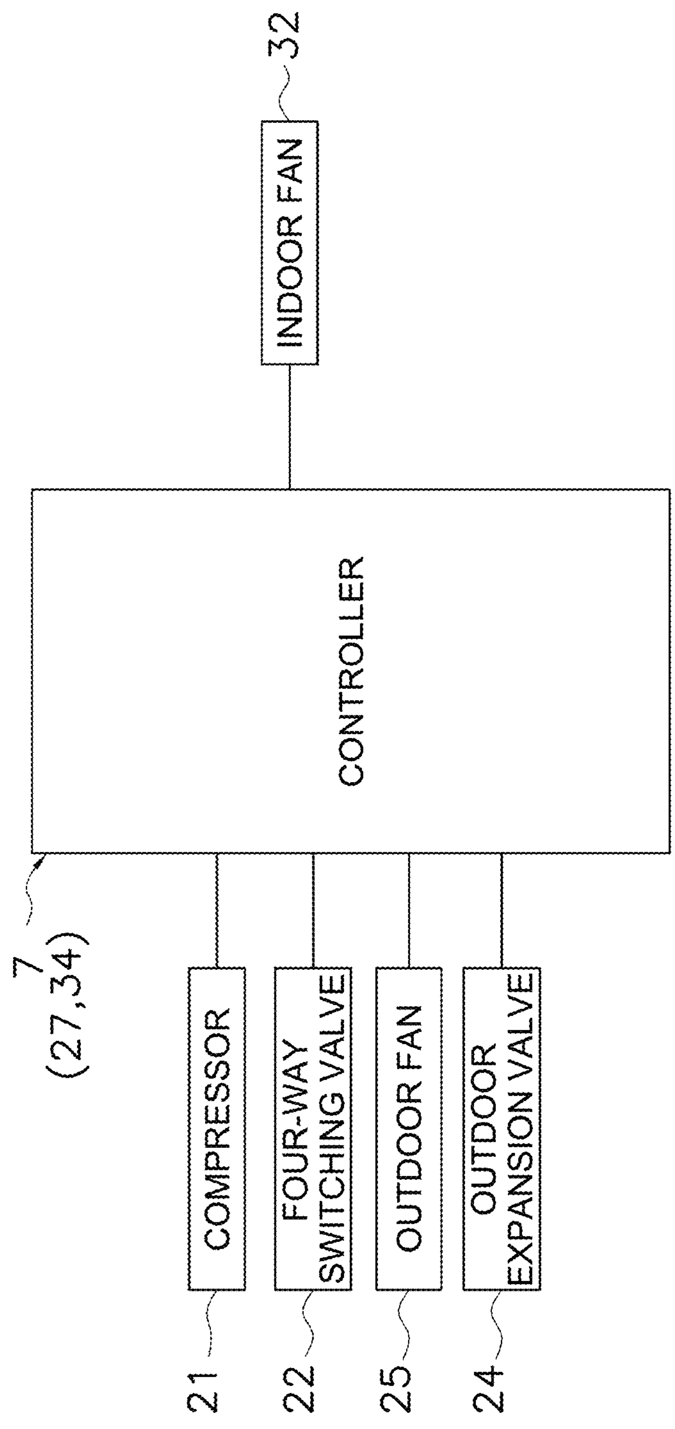

FIG. 23B is a schematic control block diagram of a refrigeration cycle apparatus in accordance with an embodiment of the technique of twenty-third group.

FIG. 23C is a comparison table illustrating, for each individual rated refrigeration capacity, the outside diameter of a copper pipe employed as each of a gas-side refrigerant connection pipe and a liquid-side refrigerant connection pipe of an air-conditioning apparatus that uses Refrigerant A, and the outside diameter of an aluminum pipe that is employed instead of a copper pipe as each of the gas-side refrigerant connection pipe and the liquid-side refrigerant connection pipe in accordance with an embodiment of the technique of twenty-third group.

FIG. 23D is a comparison table illustrating, for each "nominal pipe size", the wall thickness of each of a copper pipe and an aluminum pipe in accordance with an embodiment of the technique of twenty-third group.

Figure 24A:
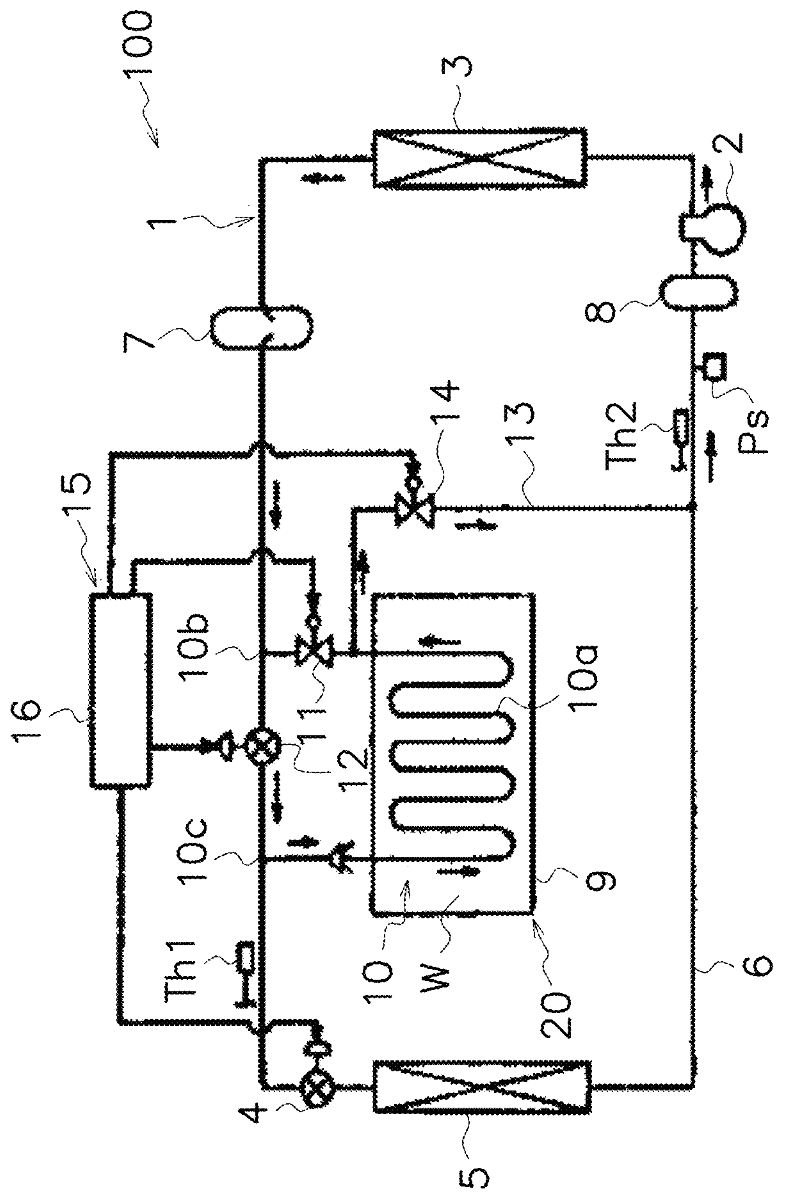

FIG. 24A is a circuit diagram illustrating the state in which a thermal storage device according to a first embodiment of the technique of twenty-fourth group performs thermal storage operation.

Figure 24B:
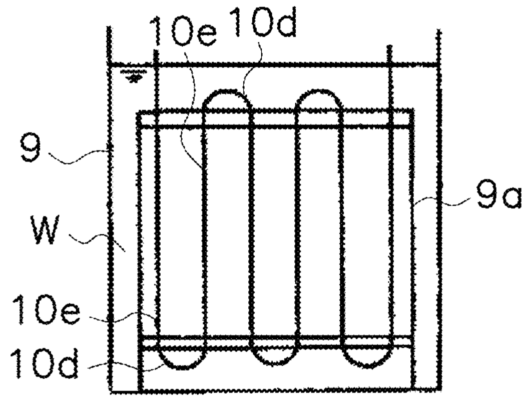

FIG. 24B is a longitudinal sectional view of a thermal storage tank included in the thermal storage device according to the first embodiment of the technique of twenty-fourth group.

Figure 24C:
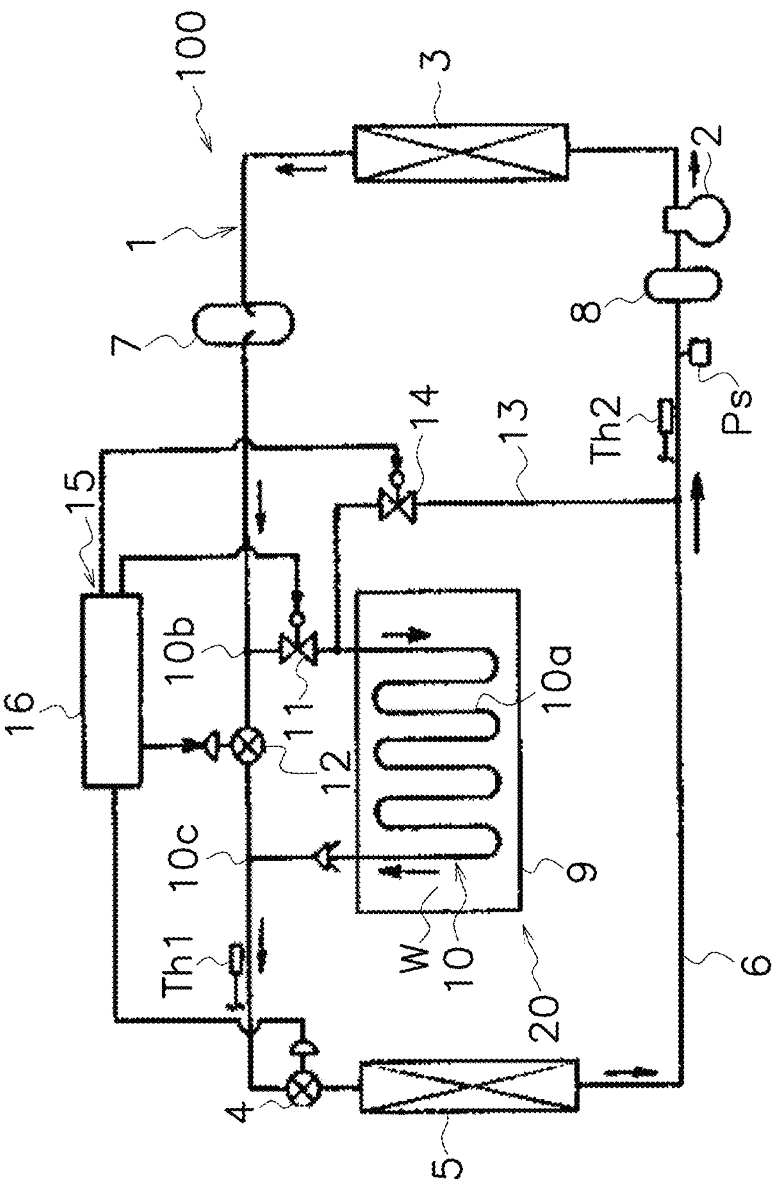

FIG. 24C corresponds to FIG. 24A and illustrates the state in which the thermal storage device according to the first embodiment of the technique of twenty-fourth group performs thermal storage recovery-cooling operation.

Figure 24D:
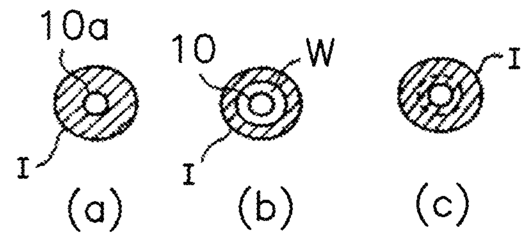

FIG. 24D is a cross-sectional view, illustrating the state in which a cooling tube of the thermal storage device according to the first embodiment of the technique of twenty-fourth group is encrusted with ice.

Figure 24E:
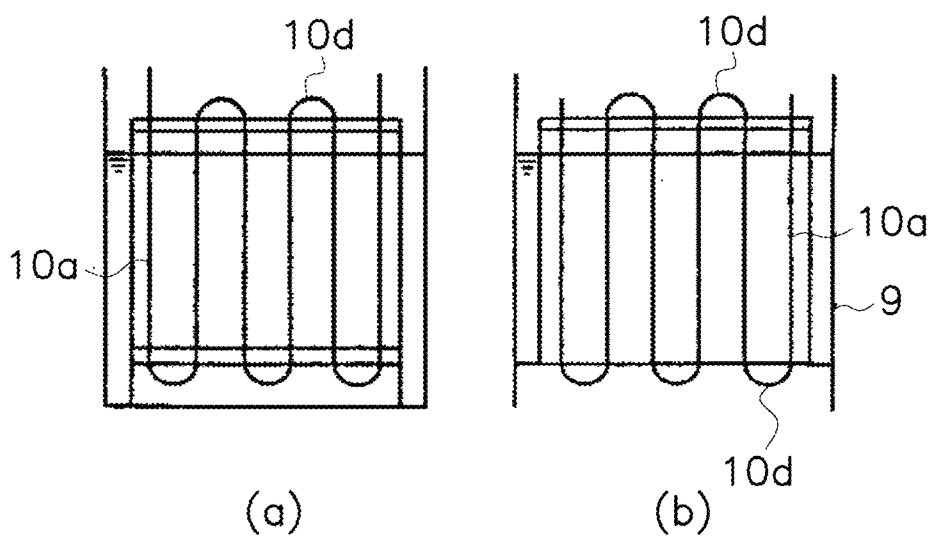

FIG. 24E corresponds to FIG. 24B and illustrates modifications of the cooling tube.

Figure 24F:
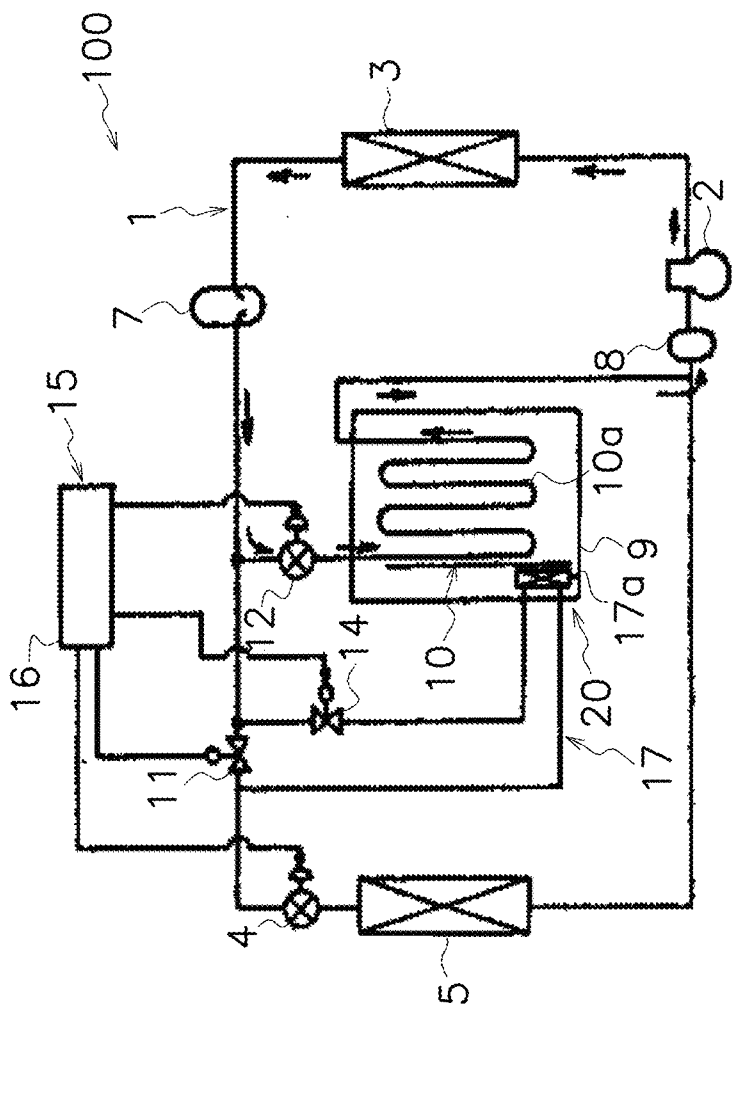

FIG. 24F is a circuit diagram illustrating the state in which a thermal storage device according to a second embodiment of the technique of twenty-fourth group performs thermal storage operation.

Figure 24G:
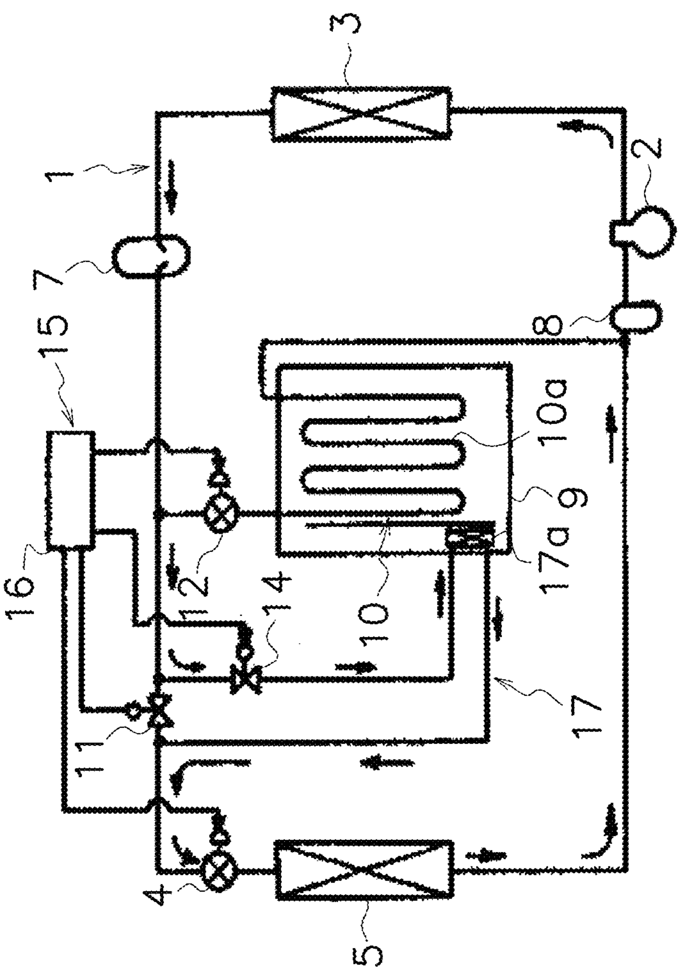

FIG. 24G corresponds to FIG. 24F and illustrates the state in which the thermal storage device according to the second embodiment of the technique of twenty-fourth group performs thermal storage recovery-cooling operation.

Figure 24H:
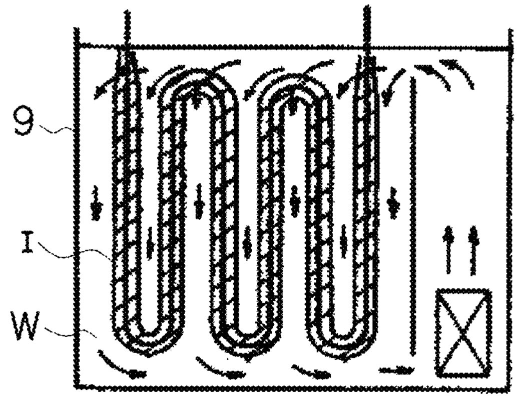

FIG. 24H is a longitudinal sectional view of a thermal storage tank included in the thermal storage device according to the second embodiment of the technique of twenty-fourth group, illustrating the state in which the thermal storage recovery-cooling operation is performed.

Figure 24I:
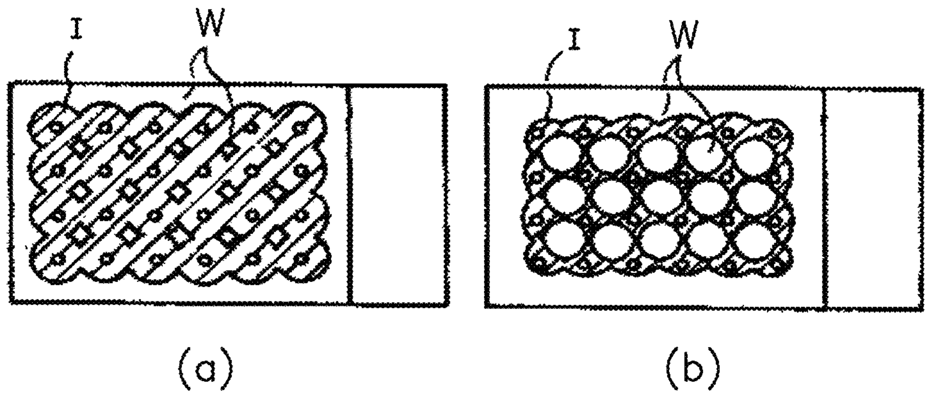

FIG. 24I is a cross-sectional view of the thermal storage tank included in the thermal storage device according to the second embodiment of the technique of twenty-fourth group, illustrating the state in which the thermal storage recovery-cooling operation is performed.

Figure 25A:
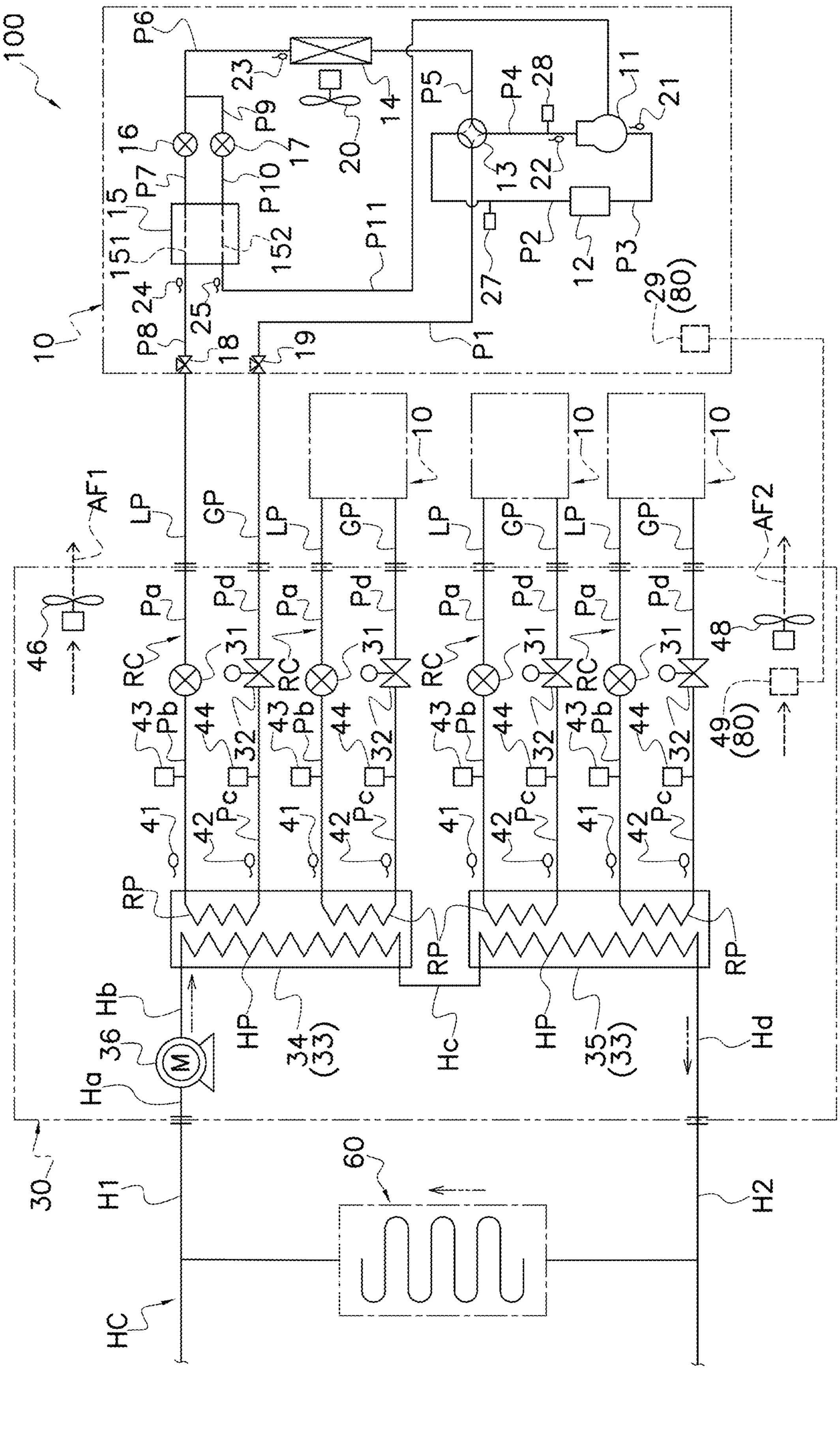

FIG. 25A is a schematic configuration diagram of a heat load treatment system that is a refrigeration apparatus according to a first embodiment of the technique of twenty-fifth group.

Figure 25B:
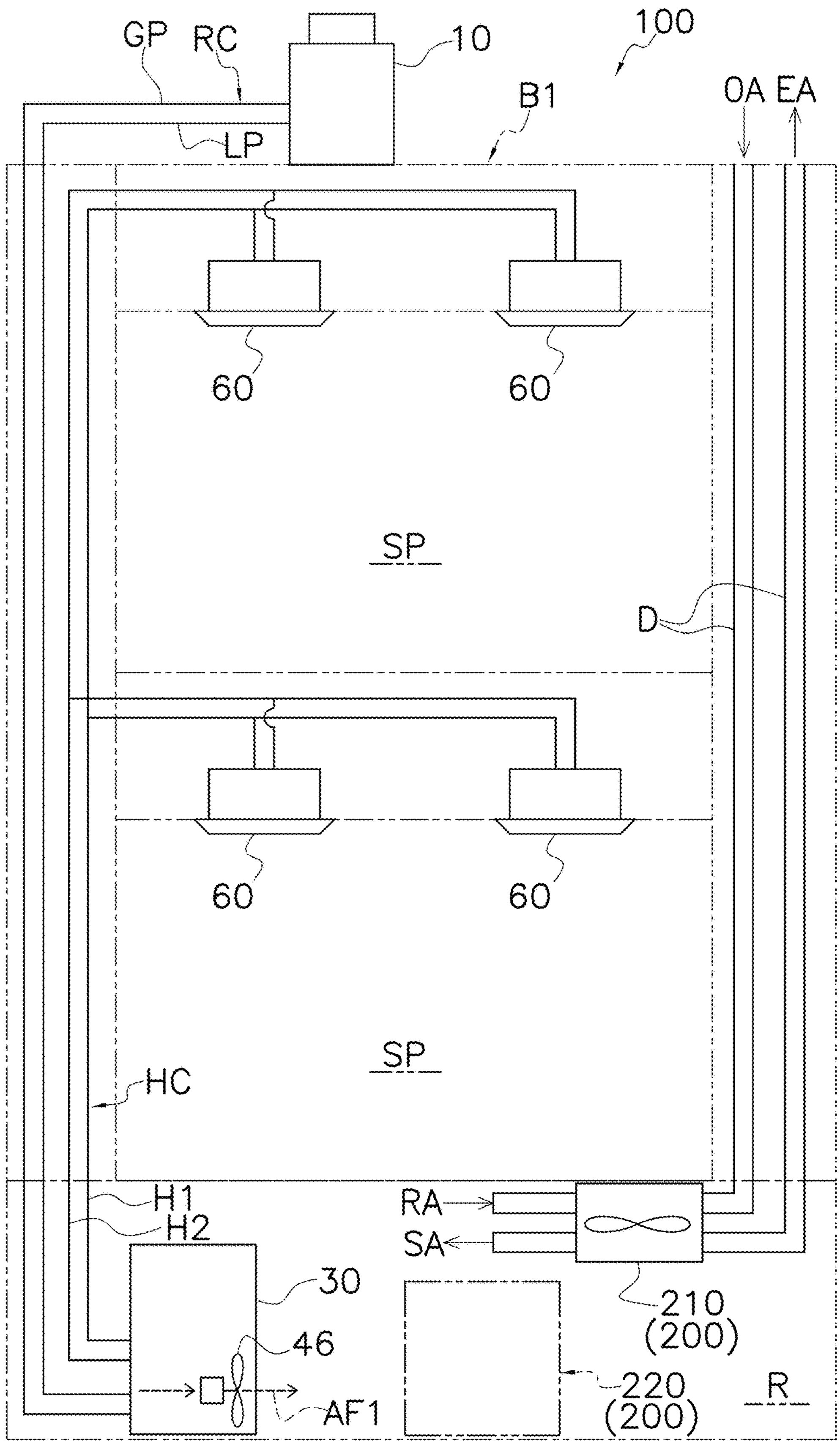

FIG. 25B is a schematic diagram illustrating an installation layout of the heat load treatment system according to the first embodiment of the technique of twenty-fifth group.

Figure 25C:
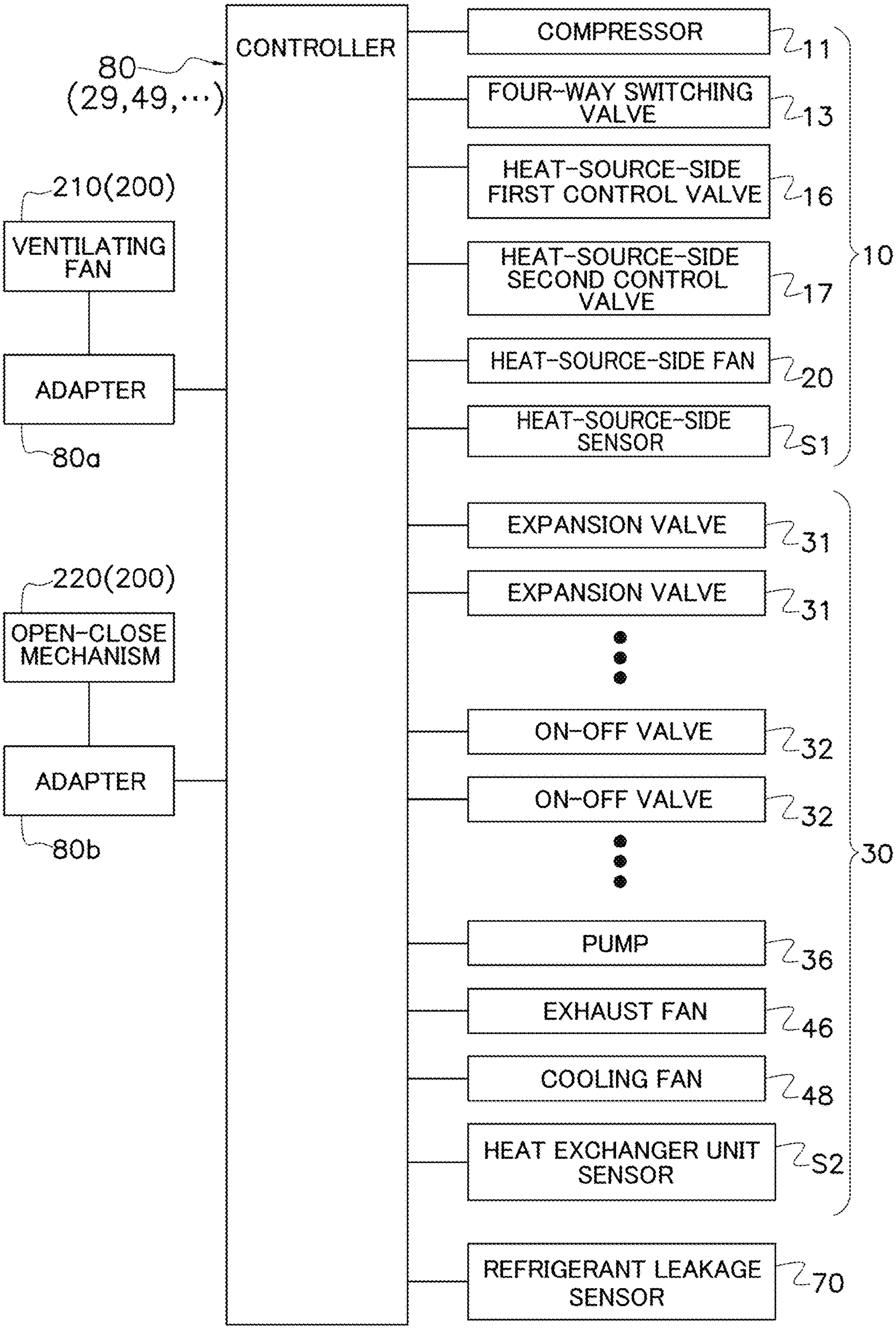

FIG. 25C illustrates a control block of the heat load treatment system according to the first embodiment of the technique of twenty-fifth group.

Figure 25D:
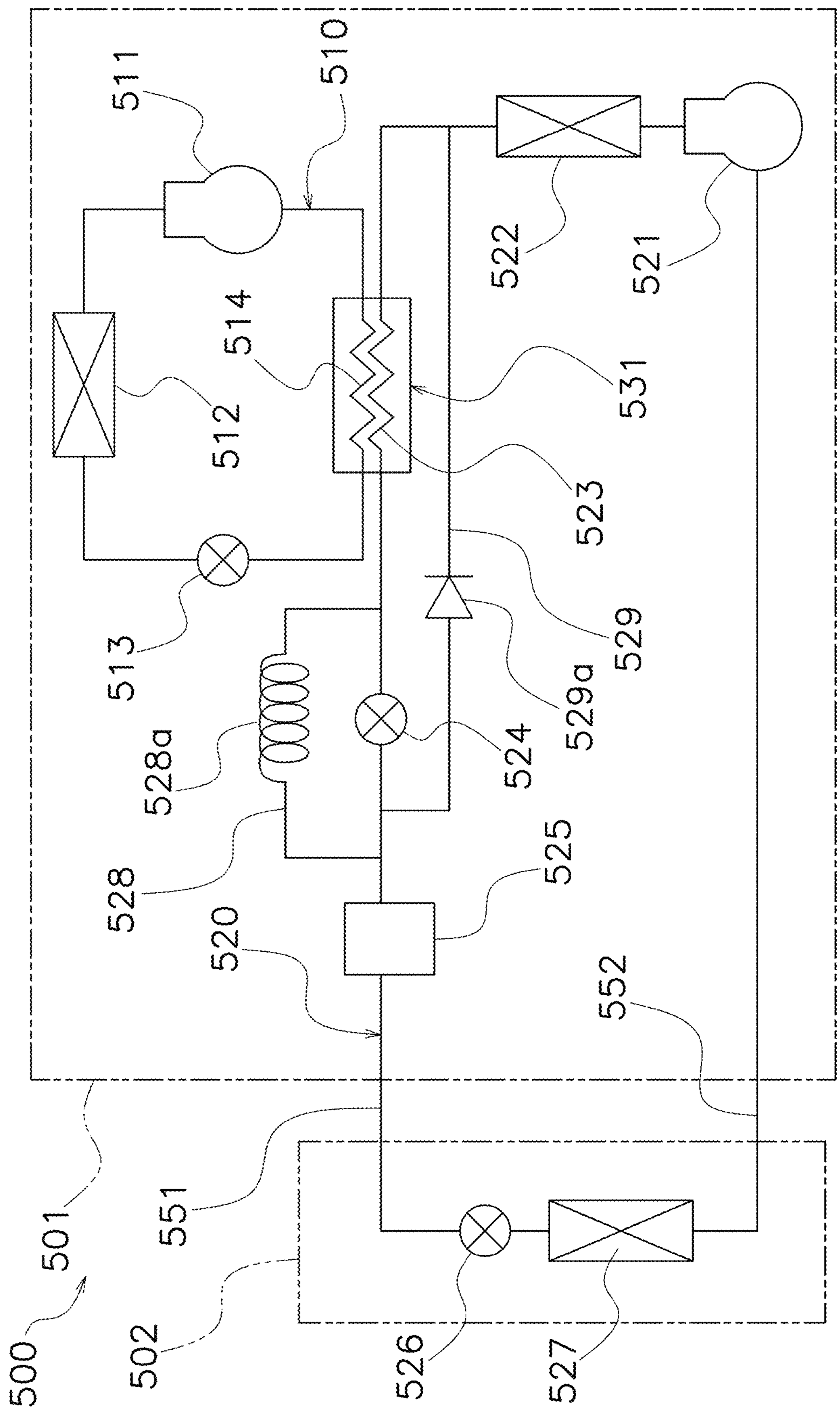

FIG. 25D is a diagram illustrating refrigerant circuits included in a two-stage refrigeration apparatus that is a refrigeration apparatus according to a second embodiment of the technique of twenty-fifth group.

Figure 25E:
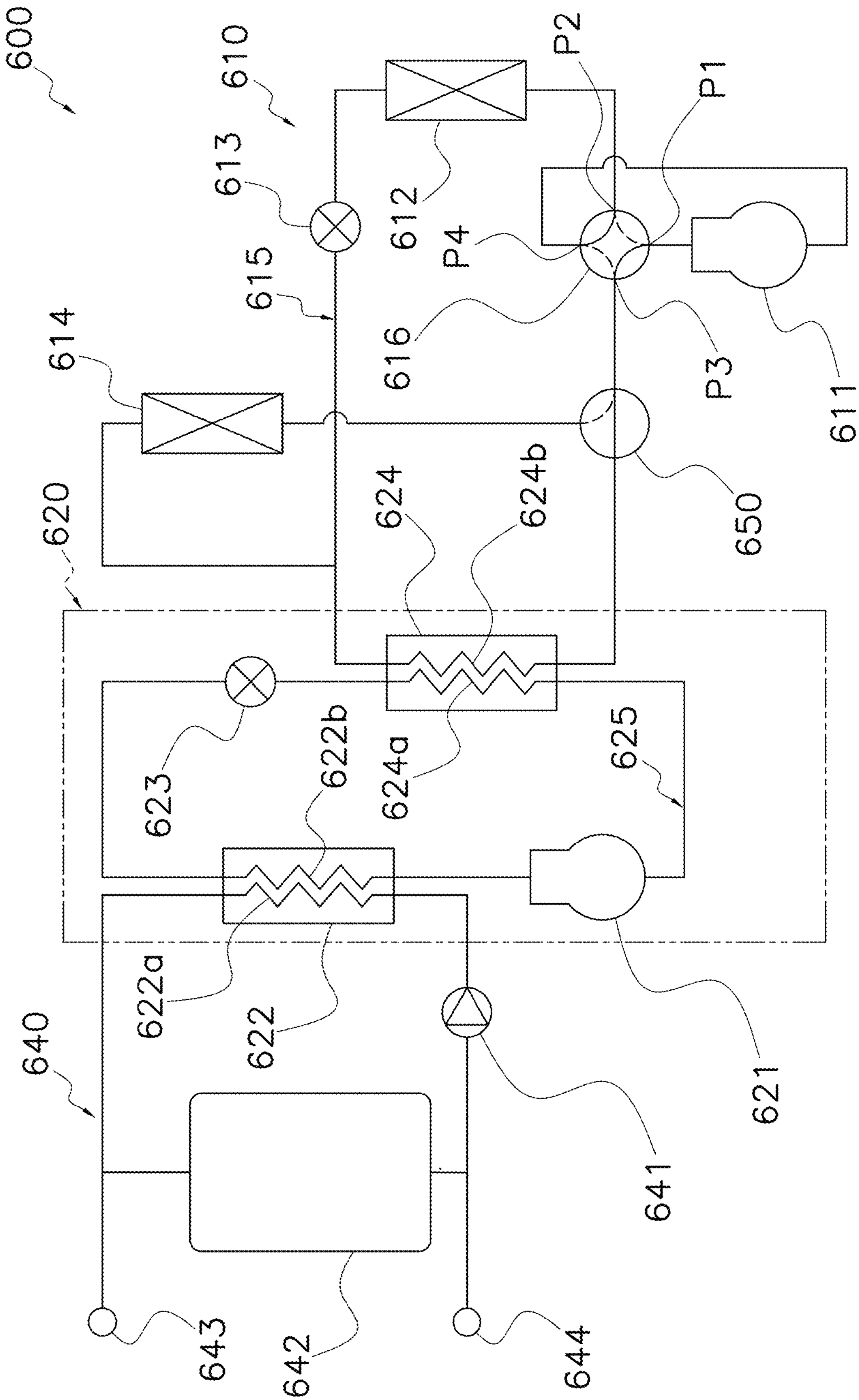

FIG. 25E is a circuit configuration diagram of an air-conditioning hot water supply system that is a refrigeration apparatus according to the second embodiment of the technique of twenty-fifth group.

DESCRIPTION OF EMBODIMENTS

1

(1-1) Definition of Terms

In the present specification, the term "refrigerant" includes at least compounds that are specified in ISO 817 (International Organization for Standardization), and that are given a refrigerant number (ASHRAE number) representing the type of refrigerant with "R" at the beginning; and further includes refrigerants that have properties equivalent to those of such refrigerants, even though a refrigerant number is not yet given. Refrigerants are broadly divided into fluorocarbon compounds and non-fluorocarbon compounds in terms of the structure of the compounds. Fluorocarbon compounds include chlorofluorocarbons (CFC), hydrochlorofluorocarbons (HCFC), and hydrofluorocarbons (HFC). Non-fluorocarbon compounds include propane (R290), propylene (R1270), butane (R600), isobutane (R600a), carbon dioxide (R744), ammonia (R717), and the like.

In the present specification, the phrase "composition comprising a refrigerant" at least includes (1) a refrigerant itself (including a mixture of refrigerants), (2) a composition that further comprises other components and that can be mixed with at least a refrigeration oil to obtain a working fluid for a refrigerating machine, and (3) a working fluid for a refrigerating machine containing a refrigeration oil. In the present specification, of these three embodiments, the composition (2) is referred to as a "refrigerant composition" so as to distinguish it from a refrigerant itself (including a mixture of refrigerants). Further, the working fluid for a refrigerating machine (3) is referred to as a "refrigeration oil-containing working fluid" so as to distinguish it from the "refrigerant composition."

In the present specification, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes a second type of "alternative," which means that equipment designed for operation using the second refrigerant is operated for the same use as the existing use with the first refrigerant by using the second refrigerant. This type of alternative means that the same use is achieved with an alternative refrigerant.

In the present specification, the term "refrigerating machine" refers to machines in general that draw heat from an object or space to make its temperature lower than the temperature of ambient air, and maintain a low temperature. In other words, refrigerating machines refer to conversion machines that gain energy from the outside to do work, and that perform energy conversion, in order to transfer heat from where the temperature is lower to where the temperature is higher.

In the present specification, a refrigerant having a "lower flammability" means that it is determined to be "Class 2L" according to the US ANSI/ASHRAE Standard 34-2013.

(1-2) Refrigerant

Although the details thereof are described later, any one of the refrigerants A, B, C, and D according to the present disclosure (sometimes referred to as "the refrigerant according to the present disclosure") can be used as a refrigerant.

(1-3) Refrigerant Composition

The refrigerant composition according to the present disclosure comprises at least the refrigerant according to the present disclosure, and can be used for the same use as the refrigerant according to the present disclosure. Moreover, the refrigerant composition according to the present disclosure can be further mixed with at least a refrigeration oil to thereby obtain a working fluid for a refrigerating machine.

The refrigerant composition according to the present disclosure further comprises at least one other component in addition to the refrigerant according to the present disclosure. The refrigerant composition according to the present disclosure may comprise at least one of the following other components, if necessary. As described above, when the refrigerant composition according to the present disclosure is used as a working fluid in a refrigerating machine, it is generally used as a mixture with at least a refrigeration oil. Therefore, it is preferable that the refrigerant composition according to the present disclosure does not substantially comprise a refrigeration oil. Specifically, in the refrigerant composition according to the present disclosure, the content of the refrigeration oil based on the entire refrigerant composition is preferably 0 to 1 mass %, and more preferably 0 to 0.1 mass %.

(1-3-1) Water

The refrigerant composition according to the present disclosure may contain a small amount of water. The water content of the refrigerant composition is preferably 0.1 mass % or less based on the entire refrigerant. A small amount of water contained in the refrigerant composition stabilizes double bonds in the molecules of unsaturated fluorocarbon compounds that can be present in the refrigerant, and makes it less likely that the unsaturated fluorocarbon compounds will be oxidized, thus increasing the stability of the refrigerant composition.

(1-3-2) Tracer

A tracer is added to the refrigerant composition according to the present disclosure at a detectable concentration such that when the refrigerant composition has been diluted, contaminated, or undergone other changes, the tracer can trace the changes.

The refrigerant composition according to the present disclosure may comprise a single tracer, or two or more tracers.

The tracer is not limited, and can be suitably selected from commonly used tracers.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide ($N_2O$). The tracer is particularly preferably a hydrofluorocarbon, a hydrochlorofluorocarbon, a chlorofluorocarbon, a hydrochlorocarbon, a fluorocarbon, or a fluoroether.

The following compounds are preferable as the tracer.

FC-14 (tetrafluoromethane, $CF_4$)
HCC-40 (chloromethane, $CH_3Cl$)
HFC-23 (trifluoromethane, $CHF_3$)
HFC-41 (fluoromethane, $CH_3Cl$)
HFC-125 (pentafluoroethane, $CF_3CHF_2$)
HFC-134a (1,1,1,2-tetrafluoroethane, $CF_3CH_2F$)
HFVC-134 (1,1,2,2-tetrafluoroethane, $CHF_2CHF_2$)
HFC-143a (1,1,1-trifluoroethane, $CF_3CH_3$)
HFC-143 (1,1,2-trifluoroethane, $CHF_2CH_2F$)
HFC-152a (1,1-difluoroethane, $CHF_2CH_3$)
HFVC-152 (1,2-difluoroethane, $CH_2FCH_2F$)
HFC-161 (fluoroethane, $CH_3CH_2F$)
HFC-245fa (1,1,1,3,3-pentafluoropropane, $CF_3CH_2CHF_2$)
HFC-236fa (1,1,1,3,3,3-hexafluoropropane, $CF_3CH_2CF_3$)
HFC-236ea (1,1,1,2,3,3-hexafluoropropane, $CF_3CHFCHF_2$)
HFC-227ea (1,1,1,2,3,3,3-heptafluoropropane, $CF_3CHFCF_3$)
HCFC-22 (chlorodifluoromethane, $CHCF_2$)
HCFC-31 (chlorofluoromethane, $CH_2ClF$)
CFC-1113 (chlorotrifluoroethylene, $CF_2{=}CCF$)
HFE-125 (trifluoromethyl-difluoromethyl ether, $CF_3OCHF_2$)
HFE-134a (trifluoromethyl-fluoromethyl ether, $CF_3OCH_2F$)
HFE-143a (trifluoromethyl-methyl ether, $CF_3OCH_3$)
HFE-227ea (trifluoromethyl-tetrafluoroethyl ether, $CF_3OCHFCF_3$)
HFE-236fa (trifluoromethyl-trifluoroethyl ether, $CF_3OCH_2CF_3$)

The refrigerant composition according to the present disclosure may contain one or more tracers at a total concentration of about 10 parts per million by weight (ppm) to about 1000 ppm, based on the entire refrigerant composition. The refrigerant composition according to the present disclosure may preferably contain one or more tracers at a total concentration of about 30 ppm to about 500 ppm, and more preferably about 50 ppm to about 300 ppm, based on the entire refrigerant composition.

(1-3-3) Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. The ultraviolet fluorescent dye is particularly preferably either naphthalimide or coumarin, or both.

(1-3-4) Stabilizer

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitro benzene and nitro styrene.

Examples of ethers include 1,4-dioxane.

Examples of amines include 2,2,3,3,3-pentafluoropropylamine and diphenylamine.

Examples of stabilizers also include butylhydroxyxylene and benzotriazole.

The content of the stabilizer is not limited. Generally, the content of the stabilizer is preferably 0.01 to 5 mass %, and more preferably 0.05 to 2 mass %, based on the entire refrigerant.

(1-3-5) Polymerization Inhibitor

The refrigerant composition according to the present disclosure may comprise a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the polymerization inhibitor is not limited. Generally, the content of the polymerization inhibitor is preferably 0.01 to 5 mass %, and more preferably 0.05 to 2 mass %, based on the entire refrigerant.

(1-4) Refrigeration Oil-Containing Working Fluid

The refrigeration oil-containing working fluid according to the present disclosure comprises at least the refrigerant or refrigerant composition according to the present disclosure and a refrigeration oil, for use as a working fluid in a refrigerating machine. Specifically, the refrigeration oil-containing working fluid according to the present disclosure is obtained by mixing a refrigeration oil used in a compressor of a refrigerating machine with the refrigerant or the refrigerant composition. The refrigeration oil-containing working fluid generally comprises 10 to 50 mass % of refrigeration oil.

(1-4-1) Refrigeration Oil

The composition according to the present disclosure may comprise a single refrigeration oil, or two or more refrigeration oils.

The refrigeration oil is not limited, and can be suitably selected from commonly used refrigeration oils. In this case, refrigeration oils that are superior in the action of increasing the miscibility with the mixture and the stability of the mixture, for example, are suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil. The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 to 400 cSt at 40° C. is preferable from the standpoint of lubrication.

The refrigeration oil-containing working fluid according to the present disclosure may further optionally contain at least one additive. Examples of additives include compatibilizing agents described below.

(1-4-2) Compatibilizing Agent

The refrigeration oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkanes. The compatibilizing agent is particularly preferably a polyoxyalkylene glycol ether.

(1-5) Various Refrigerants

Refrigerants A to D used in the present disclosure are described below in detail. The disclosures of the refrigerant A, the refrigerant B, the refrigerant C, and the refrigerant D are independent from each other. Thus, the alphabetical letters used for points and line segments, as well as the numbers used for Examples and Comparative Examples, are all independent in each of the refrigerant A, the refrigerant B, the refrigerant C, and the refrigerant D. For example, Example 1 of the refrigerant A and Example 1 of the refrigerant B each represent an example according to a different embodiment.

(1-5-1) Refrigerant A

Refrigerant A according to the present disclosure is a mixed refrigerant comprising trans-1,2-difluoroethylene (HFO-1132(E)), trifluoroethylene (HFO-1123), and 2,3,3,3-tetrafluoro-1-propene (R1234yf).

The refrigerant A according to the present disclosure has various properties that are desirable as an R410A-alternative refrigerant, i.e., a refrigerating capacity and a coefficient of performance that are equivalent to those of R410A, and a sufficiently low GWP.

The refrigerant A according to the present disclosure is a composition comprising HFO-1132(E) and R1234yf, and optionally further comprising HFO-1123, and may further satisfy the following requirements. This refrigerant A also has various properties desirable as an alternative refrigerant for R410A; i.e., it has a refrigerating capacity and a coefficient of performance that are equivalent to those of R410A, and a sufficiently low GWP.

Requirements

When the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments OD, DG, GH, and HO that connect the following 4 points:

point D (87.6, 0.0, 12.4),
point G (18.2, 55.1, 26.7),
point H (56.7, 43.3, 0.0), and
point O (100.0, 0.0, 0.0), or on the line segments OD, DG, and GH (excluding the points O and H);

the line segment DG is represented by coordinates $(0.0047y^2-1.5177y+87.598,\ y,\ -0.0047y^2+0.5177y+12.402)$, the line segment GH is represented by coordinates $(-0.0134z^2-1.0825z+56.692,\ 0.0134z^2+0.0825z+43.308,\ z)$, and the lines HO and OD are straight lines.

When the requirements above are satisfied, the refrigerant A according to the present disclosure has a refrigerating capacity ratio of 92.5% or more relative to that of R410A, and a COP ratio of 92.5% or more relative to that of R410A.

The refrigerant A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments LG, GH, HI, and IL that connect the following 4 points:

point L (72.5, 10.2, 17.3),
point G (18.2, 55.1, 26.7),
point H (56.7, 43.3, 0.0), and
point I (72.5, 27.5, 0.0), or on the line segments LG, GH, and IL (excluding the points H and I);

the line segment LG is represented by coordinates $(0.0047y^2-1.5177y+87.598,\ y,\ -0.0047y^2+0.5177y+12.402)$, the line segment GH is represented by coordinates $(-0.0134z^2-1.0825z+56.692,\ 0.0134z^2+0.0825z+43.308,\ z)$, and the line segments HI and IL are straight lines.

When the requirements above are satisfied, the refrigerant A according to the present disclosure has a refrigerating capacity ratio of 92.5% or more relative to that of R410A, and a COP ratio of 92.5% or more relative to that of R410A; furthermore, the refrigerant has a lower flammability (Class 2L) according to the ASHRAE standard.

The refrigerant A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments OD, DE, EF, and FO that connect the following 4 points:

point D (87.6, 0.0, 12.4),
point E (31.1, 42.9, 26.0),
point F (65.5, 34.5, 0.0), and
point O (100.0, 0.0, 0.0), or on the line segments OD, DE, and EF (excluding the points O and F);

the line segment DE is represented by coordinates $(0.0047y^2-1.5177y+87.598,\ y,\ -0.0047y^2+0.5177y+12.402)$, the line segment EF is represented by coordinates $(-0.0064z^2-1.1565z+65.501,\ 0.0064z^2+0.1565z+34.499,\ z)$, and the line segments FO and OD are straight lines.

When the requirements above are satisfied, the refrigerant A according to the present disclosure has a refrigerating capacity ratio of 93.5% or more relative to that of R410A, and a COP ratio of 93.5% or more relative to that of R410A.

The refrigerant A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments LE, EF, FI, and IL that connect the following 4 points:

point L (72.5, 10.2, 17.3),
point E (31.1, 42.9, 26.0),
point F (65.5, 34.5, 0.0), and
point I (72.5, 27.5, 0.0), or on the line segments LE, EF, and L (excluding the points F and I);

the line segment LE is represented by coordinates $(0.0047y^2-1.5177y+87.598,\ y,\ -0.0047y^2+0.5177y+12.402)$, the line segment EF is represented by coordinates $(-0.0134z^2-1.0825z+56.692,\ 0.0134z^2+0.0825z+43.308,\ z)$, and the line segments FI and IL are straight lines.

When the requirements above are satisfied, the refrigerant A according to the present disclosure has a refrigerating capacity ratio of 93.5% or more relative to that of R410A, and a COP ratio of 93.5% or more relative to that of R410A; furthermore, the refrigerant has a lower flammability (Class 2L) according to the ASHRAE standard.

The refrigerant A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within a figure surrounded by line segments OA, AB, BC, and CO that connect the following 4 points:

point A (93.4, 0.0, 6.6),
point B (55.6, 26.6, 17.8),
point C (77.6, 22.4, 0.0), and
point O (100.0, 0.0, 0.0), or on the line segments OA, AB, and BC (excluding the points O and C);

the line segment AB is represented by coordinates $(0.0052y^2-1.5588y+93.385,\ y,\ -0.0052y^2+0.5588y+6.615)$, the line segment BC is represented by coordinates $(-0.0032z^2-1.1791z+77.593,\ 0.0032z^2+0.1791z+22.407,\ z)$, and the line segments CO and OA are straight lines.

When the requirements above are satisfied, the refrigerant A according to the present disclosure has a refrigerating capacity ratio of 95% or more relative to that of R410A, and a COP ratio of 95% or more relative to that of R410A.

The refrigerant A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within a figure surrounded by line segments KB, BJ, and JK that connect the following 3 points:

point K (72.5, 14.1, 13.4), point B (55.6, 26.6, 17.8), and point J (72.5, 23.2, 4.3), or on the line segments KB, BJ, and JK;

the line segment KB is represented by coordinates ($0.0052y^2-1.5588y+93.385$, y, and $-0.0052y^2+0.5588y+6.615$), the line segment BJ is represented by coordinates ($-0.0032z^2-1.1791z+77.593$, $0.0032z^2+0.1791z+22.407$, z), and the line segment JK is a straight line.

When the requirements above are satisfied, the refrigerant A according to the present disclosure has a refrigerating capacity ratio of 95% or more relative to that of R410A, and a COP ratio of 95% or more relative to that of R410A; furthermore, the refrigerant has a lower flammability (Class 2L) according to the ASHRAE standard.

The refrigerant A according to the present disclosure may further comprise difluoromethane (R32) in addition to HFO-1132(E), HFO-1123, and R1234yf as long as the above properties and effects are not impaired. The content of R32 based on the entire refrigerant A according to the present disclosure is not limited and can be selected from a wide range. For example, when the R32 content of the refrigerant A according to the present disclosure is 21.8 mass %, the mixed refrigerant has a GWP of 150. Therefore, the R32 content can be 21.8 mass % or less. The R32 content of the refrigerant A according to the present disclosure may be, for example, 5 mass % or more, based on the entire refrigerant.

When the refrigerant A according to the present disclosure further contains R32 in addition to HFO-1132(E), HFO-1123, and R1234yf, the refrigerant may be a refrigerant wherein when the mass % of HFO-1132(E), HFO-1123, R1234yf, and R32 based on their sum is respectively represented by x, y, z, and a, if $0<a\leq 10.0$, coordinates (x,y,z) in a ternary composition diagram (FIG. 3 to 9) in which the sum of HFO-1132(E), HFO-1123, and R1234yf is 100 mass % are within the range of a figure surrounded by straight lines that connect the following 4 points:

point A ($0.02a^2-2.46a+93.4$, 0, $-0.02a^2+2.46a+6.6$), point B' ($-0.008a^2-1.38a+56$, $0.018a^2-0.53a+26.3$, $-0.01a^2+1.91a+17.7$), point C ($-0.016a^2+1.02a+77.6$, $0.016a^2-1.02a+22.4$, 0), and point O (100.0, 0.0, 0.0), or on the straight lines OA, AB', and B'C (excluding the points O and C);

if $10.0<a\leq 16.5$, coordinates (x,y,z) in the ternary composition diagram are within the range of a figure surrounded by straight lines that connect the following 4 points:

point A ($0.0244a^2-2.5695a+94.056$, 0, $-0.0244a^2+2.5695a+5.944$), point B' ($0.1161a^2-1.9959a+59.749$, $0.014a^2-0.3399a+24.8$, $-0.1301a^2+2.3358a+15.451$), point C ($-0.0161a^2+1.02a+77.6$, $0.0161a^2-1.02a+22.4$, 0), and point O (100.0, 0.0, 0.0), or on the straight lines OA, AB', and B'C (excluding the points O and C); or if $16.5<a\leq 21.8$, coordinates (x,y,z) in the ternary composition diagram are within the range of a figure surrounded by straight lines that connect the following 4 points:

point A ($0.0161a^2-2.3535a+92.742$, 0, $-0.0161a^2+2.3535a+7.258$), point B' ($-0.0435a^2-0.0435a+50.406$, $-0.0304a^2+1.8991a-0.0661$, $0.0739a^2-1.8556a+49.6601$), point C ($-0.0161a^2+0.9959a+77.851$, $0.0161a^2-0.9959a+22.149$, 0), and point O (100.0, 0.0, 0.0), or on the straight lines OA, AB', and B'C (excluding the points O and C).

Note that when point B in the ternary composition diagram is defined as a point where a refrigerating capacity ratio of 95% relative to that of R410A and a COP ratio of 95% relative to that of R410A are both achieved, point B' is the intersection of straight line AB and an approximate line formed by connecting the points where the COP ratio relative to that of R410A is 95%. When the requirements above are satisfied, the refrigerant A according to the present disclosure has a refrigerating capacity ratio of 95% or more relative to that of R410A, and a COP ratio of 95% or more relative to that of R410A.

The refrigerant A according to the present disclosure may further comprise other additional refrigerants in addition to HFO-1132(E), HFO-1123, R1234yf, and R32 as long as the above properties and effects are not impaired. In this respect, the refrigerant A according to the present disclosure preferably comprises HFO-1132(E), HFO-1123, R1234yf, and R32 in a total amount of 99.5 mass % or more, more preferably 99.75 mass % or more, and still more preferably 99.9 mass % or more, based on the entire refrigerant A.

The refrigerant A according to the present disclosure may comprise HFO-1132(E), HFO-1123, and R1234yf in a total amount of 99.5 mass % or more, 99.75 mass % or more, or 99.9 mass % or more, based on the entire refrigerant A.

The refrigerant A according to the present disclosure may comprise HFO-1132(E), HFO-1123, R1234yf, and R32 in a total amount of 99.5 mass % or more, 99.75 mass % or more, or 99.9 mass % or more, based on the entire refrigerant A.

The additional refrigerants are not limited, and can be selected from a wide range of refrigerants. The mixed refrigerant may comprise a single additional refrigerant, or two or more additional refrigerants.

The refrigerant A according to the present disclosure is suitable for use as an alternative refrigerant for R410A.

Examples of Refrigerant A

The refrigerant A is described in more detail below with reference to Examples. However, the refrigerant A according to the present disclosure is not limited to the Examples.

Mixed refrigerants were prepared by mixing HFO-1132 (E), HFO-1123, and R1234yf at mass % based on their sum shown in Tables 1 to 5.

The COP ratio and the refrigerating capacity ratio of the mixed refrigerants relative to those of R410 were determined. The conditions for calculation were as described below.

Evaporating temperature: 5° C.

Condensation temperature: 45° C.

Degree of superheating: 1 K

Degree of subcooling: 5 K $E_{comp}$(compressive modulus): 0.7 kWh

Tables 1 to 5 show these values together with the GWP of each mixed refrigerant.

TABLE 1

| Item | Unit | Comp. Ex. 1 | Example 1 A | Example 2 | Example 3 | Example 4 | Example 5 | Example 6 B |
|---|---|---|---|---|---|---|---|---|
| HFO-1132 (E) | mass % | R410A | 93.4 | 85.7 | 78.3 | 71.2 | 64.3 | 55.6 |
| HFO-1123 | mass % | | 0.0 | 5.0 | 10.0 | 15.0 | 20.0 | 26.6 |
| R1234yf | mass % | | 6.6 | 9.3 | 11.7 | 13.8 | 15.7 | 17.8 |
| GWP | — | 2088 | 1 | 1 | 1 | 1 | 1 | 2 |
| COP ratio | % (relative to R410A) | 100 | 98.0 | 97.5 | 96.9 | 96.3 | 95.8 | 95.0 |
| Refrigerating capacity ratio | % (relative to R410A) | 100 | 95.0 | 95.0 | 95.0 | 95.0 | 95.0 | 95.0 |

TABLE 2

| Item | Unit | Comp. Ex. 2 C | Example 7 | Example 8 | Example 9 |
|---|---|---|---|---|---|
| HFO-1132(E) | mass % | 77.6 | 71..6 | 65.5 | 59.2 |
| HFO-1123 | mass % | 22.4 | 23.4 | 24.5 | 25.8 |
| R1234yf | mass % | 0.0 | 5.0 | 10.0 | 15.0 |
| GWP | — | 1 | 1 | 1 | 1 |
| COP ratio | % (relative to R410A) | 95.0 | 95.0 | 95.0 | 95.0 |
| Refrigerating capacity ratio | % (relative to R410A) | 102.5 | 100.5 | 98.4 | 96.3 |

TABLE 3

| Item | Unit | Example 10 D | Example 11 | Example 12 | Example 13 | Example 14 | Example 15 | Example 16 G |
|---|---|---|---|---|---|---|---|---|
| HFO-1132 (E) | mass % | 87.6 | 72.9 | 59.1 | 46.3 | 34.4 | 23.5 | 18.2 |
| HFO-1123 | mass % | 0.0 | 10.0 | 20.0 | 30.0 | 40.0 | 50.0 | 55.1 |
| R1234yf | mass % | 12.4 | 17.1 | 20.9 | 23.7 | 25.6 | 26.5 | 26.7 |
| GWP | — | 1 | 2 | 2 | 2 | 2 | 2 | 2 |
| COP ratio | % (relative to R410A) | 98.2 | 97.1 | 95.9 | 94.8 | 93.8 | 92.9 | 92.5 |
| Refrigerating capacity ratio | % (relative to R410A) | 92.5 | 92.5 | 92.5 | 92.5 | 92.5 | 92.5 | 92.5 |

TABLE 4

| Item | Unit | Comp. Ex. 3 H | Example 17 | Example 18 | Comp. Ex. 4 F | Example 19 | Example 20 | Example 21 E |
|---|---|---|---|---|---|---|---|---|
| HFO-1132 (E) | mass % | 56.7 | 44.5 | 29.7 | 65.5 | 53.3 | 39.8 | 31.1 |
| HFO-1123 | mass % | 43.3 | 45.5 | 50.3 | 34.5 | 36.7 | 40.2 | 42.9 |
| R1234yf | mass % | 0.0 | 10.0 | 20.0 | 0.0 | 10.0 | 20.0 | 26.0 |
| GWP | — | 1 | 1 | 2 | 1 | 1 | 2 | 2 |
| COP ratio | % (relative to R410A) | 92.5 | 92.5 | 92.5 | 93.5 | 93.5 | 93.5 | 93.5 |
| Refrigerating capacity ratio | % (relative to R410A) | 105.8 | 101.2 | 96.2 | 104.5 | 100.2 | 95.5 | 92.5 |

TABLE 5

| Item | Unit | Comp. Ex. 5 I | Example 22 J | Example 23 K | Example 24 L | Comp. Ex. 6 M |
|---|---|---|---|---|---|---|
| HFO-1132 (E) | mass % | 72.5 | 72.5 | 72.5 | 72.5 | 72.5 |
| HFO-1123 | mass % | 27.5 | 23.2 | 14.1 | 10.2 | 0.0 |
| R1234yf | mass % | 0.0 | 4.3 | 13.4 | 17.3 | 27.5 |
| GWP | — | 1 | 1 | 1 | 2 | 2 |
| COP ratio | % (relative to R410A) | 94.4 | 95.0 | 96.4 | 97.1 | 98.8 |
| Refrigerating capacity ratio | % (relative to R410A) | 103.5 | 100.8 | 95.0 | 92.5 | 85.7 |

These results indicate that under the condition that the mass % of HFO-1132(E), HFO-1123, and R1234yf based on their sum is respectively represented by x, y, and z, when coordinates (x,y,z) in a ternary composition diagram in which the sum of HFO-1132(E), HFO-1123, and R1234yf is 100 mass % are within the range of a figure (FIG. 2) surrounded by line segments OD, DG, GH, and HO that connect the following 4 points:

point D (87.6, 0.0, 12.4),
point G (18.2, 55.1, 26.7),
point H (56.7, 43.3, 0.0), and
point O (100.0, 0.0, 0.0), or on the line segments OD, DG, and GH (excluding the points O and H), the refrigerant has a refrigerating capacity ratio of 92.5% or more relative to that of R410A, and a COP ratio of 92.5% or more relative to that of R410A.

Likewise, the results indicate that when coordinates (x,y,z) are within the range of a figure (FIG. 2) surrounded by line segments OD, DE, EF, and FO that connect the following 4 points:

point D (87.6, 0.0, 12.4),
point E (31.1, 42.9, 26.0),
point F (65.5, 34.5, 0.0), and
point O (100.0, 0.0, 0.0), or on the line segments OD, DE, and EF (excluding the points O and F), the refrigerant has a refrigerating capacity ratio of 93.5% or more relative to that of R410A, and a COP ratio of 93.5% or more relative to that of R410A.

Likewise, the results indicate that when coordinates (x,y,z) are within the range of a figure (FIG. 2) surrounded by line segments OA, AB, BC, and CO that connect the following 4 points:

point A (93.4, 0.0, 6.6),
point B (55.6, 26.6, 17.8),
point C (77.6, 22.4, 0.0), and
point O (100.0, 0.0, 0.0),
or on the line segments OA, AB, and BC (excluding the points O and C), the refrigerant has a refrigerating capacity ratio of 95% or more relative to that of R410A, and a COP ratio of 95% or more relative to that of R410A.

R1234yf contributes to reduction of flammability and reduction of deterioration of polymerization etc. in these compositions. Therefore, the composition according to the present disclosure preferably contains R1234yf.

Further, the burning velocity of these mixed refrigerants was measured according to the ANSI/ASHRAE Standard 34-2013. Compositions that showed a burning velocity of 10 cm/s or less were determined to be Class 2L (lower flammability). These results clearly indicate that when the content of HFO-1132(E) in a mixed refrigerant of HFO-1132 (E), HFO-1123, and R1234yf is 72.5 mass % or less based on their sum, the refrigerant can be determined to be Class 2L (lower flammability).

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

Mixed refrigerants were prepared by mixing HFO-1132 (E), HFO-1123, R1234yf, and R32 in amounts shown in Tables 6 to 12, in terms of mass %, based on their sum.

The COP ratio and the refrigerating capacity ratio of these mixed refrigerants relative to those of R410A were determined. The calculation conditions were the same as described above. Tables 6 to 12 show these values together with the GWP of each mixed refrigerant.

TABLE 6

| Item | Unit | Comp. Ex. 1 | Comp. Ex. 7 A | Comp. Ex. 8 | Comp. Ex. 9 | Example 25 B' | Comp. Ex. 10 B | Example 26 | Example 27 | Comp. Ex. 11 C |
|---|---|---|---|---|---|---|---|---|---|---|
| HFO-1132 (E) | mass % | R410A | 93.4 | 78.3 | 64.3 | 56.0 | 55.6 | 60.0 | 70.0 | 77.6 |
| HFO-1123 | mass % | | 0.0 | 10.0 | 20.0 | 26.3 | 26.6 | 25.6 | 23.7 | 22.4 |
| R1234yf | mass % | | 6.6 | 11.7 | 15.7 | 17.7 | 17.8 | 14.4 | 6.3 | 0.0 |
| R32 | mass % | | 0.0 | 0.0 | 0.0 | 0.0 | 0.0 | 0.0 | 0.0 | 0.0 |
| GWP | — | 2088 | 1 | 1.4 | 1.5 | 1.5 | 1.5 | 1.4 | 1.2 | 1.0 |
| COP ratio | % (relative to R410A) | 100 | 98.0 | 96.9 | 95.8 | 95.0 | 95.0 | 95.0 | 95.0 | 95.0 |
| Refrigerating capacity ratio | % (relative to R410A) | 100 | 95.0 | 95.0 | 95.0 | 95.0 | 95.0 | 96.5 | 100.0 | 102.5 |

TABLE 7

| Item | Unit | Comp. Ex. 12 A | Comp. Ex. 13 | Comp. Ex. 14 | Example 28 B' | Comp. Ex. 15 B | Example 29 | Example 30 | Comp. Ex. 16 C |
|---|---|---|---|---|---|---|---|---|---|
| HFO-1132 (E) | mass % | 81.6 | 67.3 | 53.9 | 48.9 | 47.2 | 60.0 | 70.0 | 77.3 |
| HFO-1123 | mass % | 0.0 | 10.0 | 20.0 | 24.1 | 25.3 | 21.6 | 19.2 | 17.7 |
| R1234yf | mass % | 13.4 | 17.7 | 21.1 | 22.0 | 22.5 | 13.4 | 5.8 | 0.0 |
| R32 | mass % | 5.0 | 5.0 | 5.0 | 5.0 | 5.0 | 5.0 | 5.0 | 5.0 |
| GWP | — | 35 | 35 | 35 | 35 | 35 | 35 | 35 | 35 |
| COP ratio | % (relative to R410A) | 97.6 | 96.6 | 95.5 | 95.0 | 95.0 | 95.0 | 95.0 | 95.0 |

TABLE 7-continued

| Item | Unit | Comp. Ex. 12 A | Comp. Ex. 13 | Comp. Ex. 14 | Example 28 B' | Comp. Ex. 15 B | Example 29 | Example 30 | Comp. Ex. 16 C |
|---|---|---|---|---|---|---|---|---|---|
| Refrigerating capacity ratio | % (relative to R410A) | 95.0 | 95.0 | 95.0 | 104.4 | 95.0 | 99.0 | 102.1 | 104.4 |

TABLE 8

| Item | Unit | Comp. Ex. 17 A | Comp. Ex. 18 | Comp. Ex. 19 | Example 31 B' | Comp. Ex. 20 B | Example 32 | Example 33 | Comp. Ex. 21 C |
|---|---|---|---|---|---|---|---|---|---|
| HFO-1132 (E) | mass % | 70.8 | 57.2 | 44.5 | 41.4 | 36.4 | 60.0 | 70.0 | 76.2 |
| HFO-1123 | mass % | 0.0 | 10.0 | 20.0 | 22.8 | 26.7 | 18.0 | 15.3 | 13.8 |
| R1234yf | mass % | 19.2 | 22.8 | 25.5 | 25.8 | 26.9 | 12.0 | 4.7 | 0.0 |
| R32 | mass % | 10.0 | 10.0 | 10.0 | 10.0 | 10.0 | 10.0 | 10.0 | 10.0 |
| GWP | — | 69 | 69 | 69 | 69 | 69 | 69 | 69 | 68 |
| COP ratio | % (relative to R410A) | 97.4 | 96.5 | 95.6 | 95.0 | 95.0 | 95.0 | 95.0 | 95.0 |
| Refrigerating capacity ratio | % (relative to R410A) | 95.0 | 95.0 | 95.0 | 106.2 | 95.0 | 101.5 | 104.4 | 106.2 |

TABLE 9

| Item | Unit | Comp. Ex. 22 A | Comp. Ex. 23 | Comp. Ex. 24 | Example 34 B' | Comp. Ex. 25 B | Example 35 | Example 36 | Comp. Ex. 26 C |
|---|---|---|---|---|---|---|---|---|---|
| HFO-1132 (E) | mass % | 62.3 | 49.3 | 37.1 | 34.5 | 24.9 | 60.0 | 70.0 | 74.5 |
| HFO-1123 | mass % | 0.0 | 10.0 | 20.0 | 22.8 | 30.7 | 15.4 | 12.4 | 11.2 |
| R1234yf | mass % | 23.4 | 26.4 | 28.6 | 28.4 | 30.1 | 10.3 | 3.3 | 0.0 |
| R32 | mass % | 14.3 | 14.3 | 14.3 | 14.3 | 14.3 | 14.3 | 14.3 | 14.3 |
| GWP | — | 98 | 98 | 98 | 98 | 98 | 98 | 97 | 97 |
| COP ratio | % (relative to R410A) | 97.3 | 96.5 | 95.7 | 95.5 | 95.0 | 95.0 | 95.0 | 95.0 |
| Refrigerating capacity ratio | % (relative to R410A) | 95.0 | 95.0 | 95.0 | 95.4 | 95.0 | 103.7 | 106.5 | 107.7 |

TABLE 10

| Item | Unit | Comp. Ex. 27 A | Comp. Ex. 28 | Comp. Ex. 29 | Example 37 B' | Comp. Ex. 30 B | Example 38 | Example 39 | Comp. Ex. 31 C |
|---|---|---|---|---|---|---|---|---|---|
| HFO-1132 (E) | mass % | 58.3 | 45.5 | 33.5 | 31.2 | 16.5 | 60.0 | 70.0 | 73.4 |
| HFO-1123 | mass % | 0.0 | 10.0 | 20.0 | 23.0 | 35.5 | 14.2 | 11.1 | 10.1 |
| R1234yf | mass % | 25.2 | 28.0 | 30.0 | 29.3 | 31.5 | 9.3 | 2.4 | 0.0 |
| R32 | mass % | 16.5 | 16.5 | 16.5 | 16.5 | 16.5 | 16.5 | 16.5 | 16.5 |
| GWP | — | 113.0 | 113.1 | 113.1 | 113.1 | 113.2 | 112.5 | 112.3 | 112.2 |
| COP ratio | % (relative to R410A) | 97.4 | 96.6 | 95.9 | 95.6 | 95.0 | 95.0 | 95.0 | 95.0 |
| Refrigerating capacity ratio | % (relative to R410A) | 95.0 | 95.0 | 95.0 | 95.7 | 95.0 | 104.9 | 107.6 | 108.5 |

TABLE 11

| Item | Unit | Comp. Ex. 32 A | Comp. Ex. 33 | Comp. Ex. 34 | Example 40 B' | Comp. Ex. 35 B | Example 41 | Example 42 | Comp. Ex. 36 C |
|---|---|---|---|---|---|---|---|---|---|
| HFO-1132 (E) | mass % | 53.5 | 41.0 | 29.3 | 25.8 | 0.0 | 50.0 | 60.0 | 71.7 |
| HFO-1123 | mass % | 0.0 | 10.0 | 20.0 | 25.2 | 48.8 | 16.8 | 12.9 | 9.1 |
| R1234yf | mass % | 27.3 | 29.8 | 31.5 | 29.8 | 32.0 | 14.0 | 7.9 | 0.0 |
| R32 | mass % | 19.2 | 19.2 | 19.2 | 19.2 | 19.2 | 19.2 | 19.2 | 19.2 |
| GWP | — | 131.2 | 131.3 | 131.4 | 131.3 | 131.4 | 130.8 | 130.6 | 130.4 |
| COP ratio | % (relative to R410A) | 97.4 | 96.7 | 96.1 | 97.8 | 95.0 | 95.0 | 95.0 | 95.0 |
| Refrigerating capacity ratio | % (relative to R410A) | 95.0 | 95.0 | 95.0 | 96.3 | 95.0 | 104.0 | 106.4 | 109.4 |

TABLE 12

| Item | Unit | Comp. Ex. 37 A | Comp. Ex. 38 | Comp. Ex. 39 | Example 43 B' | Comp. Ex. 40 B | Example 44 | Example 45 | Comp. Ex. 41 C |
|---|---|---|---|---|---|---|---|---|---|
| HFO-1132 (E) | mass % | 49.1 | 36.9 | 25.5 | 20.0 | 0.0 | 50.0 | 60.0 | 69.7 |
| HFO-1123 | mass % | 0.0 | 10.0 | 20.0 | 26.9 | 45.3 | 15.8 | 11.9 | 8.5 |
| R1234yf | mass % | 29.1 | 31.3 | 20.0 | 31.3 | 32.9 | 12.4 | 6.3 | 0.0 |
| R32 | mass % | 21.8 | 21.8 | 21.8 | 21.8 | 21.8 | 21.8 | 21.8 | 21.8 |
| GWP | — | 148.8 | 148.9 | 148.9 | 148.9 | 148.9 | 148.3 | 148.1 | 147.9 |
| COP ratio | % (relative to R410A) | 97.6 | 96.9 | 96.4 | 95.9 | 95.5 | 95.0 | 95.0 | 95.0 |
| Refrigerating capacity ratio | % (relative to R410A) | 95.0 | 95.0 | 95.0 | 98.4 | 95.0 | 105.6 | 108.0 | 110.3 |

These results indicate that the refrigerants according to the present disclosure that satisfy the following conditions have a refrigerating capacity ratio of 9500 or more relative to that of R410A, and a COP ratio of 95% or more relative to that of R410A:

when the mass % of HFO-1132(E), HFO-1123, R1234yf, and R32 based on their sum is respectively represented by x, y, z, and a, if $0<a\leq10.0$, coordinates (x,y,z) in a ternary composition diagram (FIGS. 3 to 9) in which the sum of HFO-1132(E), HFO-1123, and R1234yf is 100 mass % are within the range of a figure surrounded by straight lines that connect the following 4 points:

point A ($0.02a^2-2.46a+93.4$, 0, $-0.02a^2+2.46a+6.6$), point B' ($-0.008a^2-1.38a+56$, $0.018a^2-0.53a+26.3$, $-0.01a^2+1.91a+17.7$), point C ($-0.016a^2+1.02a+77.6$, $0.016a^2-1.02a+22.4$, 0), and point O (100.0, 0.0, 0.0), or on the straight lines OA, AB', and B'C (excluding the points O and C);

if $10.0<a\leq16.5$, coordinates (x,y,z) in the ternary composition diagram are within the range of a figure surrounded by straight lines that connect the following 4 points:

point A ($0.0244a^2-2.5695a+94.056$, 0, $-0.0244a^2+2.5695a+5.944$), point B' ($0.1161a^2-1.9959a+59.749$, $0.014a^2-0.3399a+24.8$, $-0.1301a^2+2.3358a+15.451$), point C ($-0.0161a^2+1.02a+77.6$, $0.0161a^2-1.02a+22.4$, 0), and point O (100.0, 0.0, 0.0), or on the straight lines OA, AB', and B'C (excluding the points O and C); or if $16.5<a\leq21.8$, coordinates (x,y,z) in the ternary composition diagram are within the range of a figure surrounded by straight lines that connect the following 4 points:

point A ($0.0161a^2-2.3535a+92.742$, 0, $-0.0161a^2+2.3535a+7.258$), point B' ($-0.0435a^2-0.0435a+50.406$, $-0.0304a^2+1.8991a-0.0661$, $0.0739a^2-1.8556a+49.6601$), point C ($-0.0161a^2+0.9959a+77.851$, $0.0161a^2-0.9959a+22.149$, 0), and point O (100.0, 0.0, 0.0), or on the straight lines OA, AB', and B'C (excluding the points O and C).

FIGS. 3 to 9 show compositions whose R32 content a (mass %) is 0 mass %, 5 mass %, 10 mass %, 14.3 mass %, 16.5 mass %, 19.2 mass %, and 21.8 mass %, respectively.

Note that when point B in the ternary composition diagram is defined as a point where a refrigerating capacity ratio of 95% relative to that of R410A and a COP ratio of 95% relative to that of R410A are both achieved, point B' is the intersection of straight line AB and an approximate line formed by connecting three points, including point C, where the COP ratio relative to that of R410A is 95%.

Points A, B', and C were individually obtained by approximate calculation in the following manner.

Point A is a point where the HFO-1123 content is 0 mass % and a refrigerating capacity ratio of 95% relative to that of R410A is achieved. Three points corresponding to point A were obtained in each of the following three ranges by calculation, and their approximate expressions were obtained.

TABLE 13

| Item | 10.0 ≥ R32 ≥ 0 | | | 16.5 ≥ R32 ≥ 10.0 | | | 21.8 ≥ R32 ≥ 16.5 | | |
|---|---|---|---|---|---|---|---|---|---|
| R32 | 0.0 | 5.0 | 10.0 | 10.0 | 14.3 | 16.5 | 16.5 | 19.2 | 21.8 |
| HFO-1132 (E) | 93.4 | 81.6 | 70.8 | 70.8 | 62.3 | 58.3 | 58.3 | 53.5 | 49.1 |
| HFO-1123 | 0.0 | 0.0 | 0.0 | 0.0 | 0.0 | 0.0 | 0.0 | 0.0 | 0.0 |
| R1234yf | 6.6 | 13.4 | 19.2 | 19.2 | 23.4 | 25.2 | 25.2 | 27.3 | 29.1 |
| R32 | x | | | x | | | x | | |
| HFO-1132 (E) approximate expression | 0.02x2 − 2.46x + 93.4 | | | 0.0244x2 − 2.5695x + 94.056 | | | 0.0161x2 − 2.3535x + 92.742 | | |
| HFO-1123 approximate expression | 0 | | | 0 | | | 0 | | |
| R1234yf approximate expression | 100-R32-HFO-1132 (E) | | | 100-R32-HFO-1132 (E) | | | 100-R32-HFO-1132 (E) | | |

Point C is a point where the R1234yf content is 0 mass % and a COP ratio of 95% relative to that of R410A is achieved. Three points corresponding to point C were obtained in each of the following three ranges by calculation, and their approximate expressions were obtained.

TABLE 14

| Item | 10.0 ≥ R32 ≥ 0 | | | 16.5 ≥ R32 ≥ 10.0 | | | 21.8 ≥ R32 ≥ 16.5 | | |
|---|---|---|---|---|---|---|---|---|---|
| R32 | 0 | 5 | 10 | 10 | 14.3 | 16.5 | 16.5 | 19.2 | 21.8 |
| HFO-1132 (E) | 77.6 | 77.3 | 76.2 | 76.2 | 74.5 | 73.4 | 73.4 | 71.7 | 69.7 |
| HFO-1123 | 22.4 | 17.7 | 13.8 | 13.8 | 11.2 | 10.1 | 10.1 | 9.1 | 8.5 |
| R1234yf | 0 | 0 | 0 | 0 | 0 | 0 | 0 | 0 | 0 |
| R32 | x | | | x | | | x | | |
| HFO-1132 (E) approximate expression | 100-R32HFO-1123 | | | 100-R32HFO-1123 | | | 100-R32HFO-1123 | | |
| HFO-1123 approximate expression | 0.016x2 − 1.02x + 22.4 | | | 0.0161x2 − 0.9959x + 22.149 | | | 0.0161*2 − 0.9959* + 22.149 | | |
| R1234yf approximate expression | 100-R32-HFO-1132 (E) | | | 100-R32-HFO-1132 (E) | | | 100-R32-HFO-1132 (E) | | |

Three points corresponding to point B' were obtained in each of the following three ranges by calculation, and their approximate expressions were obtained.

TABLE 15

| Item | 10.0 ≥ R32 ≥ 0 | | | 16.5 ≥ R32 ≥ 10.0 | | | 21.8 ≥ R32 ≥ 16.5 | | |
|---|---|---|---|---|---|---|---|---|---|
| R32 | 0 | 5 | 10 | 10 | 14.3 | 16.5 | 16.5 | 19.2 | 21.8 |
| HFO-1132(E) | 56 | 48.9 | 41.4 | 41.4 | 34.5 | 31.2 | 31.2 | 25.8 | 20 |
| HFO-1123 | 26.3 | 24.1 | 22.8 | 22.8 | 22.8 | 23 | 23 | 25.2 | 26.9 |
| R1234yf | 17.7 | 22 | 25.8 | 25.8 | 28.4 | 29.3 | 29.3 | 29.8 | 31.3 |
| R32 | | x | | | x | | | x | |
| HFO-1132(E) approximate expression | −0.008*2 − 1.38*56 | | | 0.0161x2 − 1.9959x + 59.749 | | | −0.0435x2 − 0.4456x + 50.406 | | |
| HFO-1123 approximate expression | 0.018x2 − 0.53x + 26.3 | | | 0.014x2 − 0.3399x + 24.8 | | | −0.0304*2 + 1.8991* − 0.0661 | | |
| R1234yf approximate expression | 100 − R32 − HFO-1132(E) | | | 100 − R32 − HFO-1132(E) | | | 100 − R32 − HFO-1132(E) | | |

(1-5-2) Refrigerant B

Refrigerant B according to the present disclosure is a mixed refrigerant comprising HFO-1132(E) and HFO-1123 in a total amount of 99.5 mass % or more based on the entire refrigerant B, and the refrigerant B comprising 62.5 mass % to 72.5 mass % of HFO-1132(E) based on the entire refrigerant B.

The refrigerant B according to the present disclosure has various properties that are desirable as an R410A-alternative refrigerant, i.e., (1) a coefficient of performance equivalent to that of R410A, (2) a refrigerating capacity equivalent to that of R410A, (3) a sufficiently low GWP, and (4) a lower flammability (Class 2L) according to the ASHRAE standard.

The refrigerant B according to the present disclosure is particularly preferably a mixed refrigerant comprising 72.5 mass % or less of HFO-1132(E), because it has a lower flammability (Class 2L) according to the ASHRAE standard.

The refrigerant B according to the present disclosure is more preferably a mixed refrigerant comprising 62.5 mass % or more of HFO-1132(E). In this case, the refrigerant B according to the present disclosure has a superior coefficient of performance relative to that of R410A, the polymerization reaction of HFO-1132(E) and/or HFO-1123 is further suppressed, and the stability is further improved.

The refrigerant B according to the present disclosure may further comprise other additional refrigerants in addition to HFO-1132(E) and HFO-1123, as long as the above properties and effects are not impaired. In this respect, the refrigerant B according to the present disclosure preferably comprises HFO-1132(E) and HFO-1123 in a total amount of 99.75 mass % or more, and more preferably 99.9 mass % or more, based on the entire refrigerant B.

Such additional refrigerants are not limited, and can be selected from a wide range of refrigerants. The mixed refrigerant may comprise a single additional refrigerant, or two or more additional refrigerants.

The refrigerant B according to the present disclosure is suitable for use as an alternative refrigerant for HFC refrigerants, such as R410A, R407C, and R404A, as well as for HCFC refrigerants, such as R22.

Examples of Refrigerant B

The refrigerant B is described in more detail below with reference to Examples. However, the refrigerant B according to the present disclosure is not limited to the Examples.

Mixed refrigerants were prepared by mixing HFO-1132(E) and HFO-1123 at mass % based on their sum shown in Tables 16 and 17.

The GWP of compositions each comprising a mixture of R410A (R32=50%/R125=50%) was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in PTL 1). The refrigerating capacity of compositions each comprising R410A and a mixture of HFO-1132(E) and HFO-1123 was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

Evaporating temperature: 5° C.
Condensation temperature: 45° C.
Superheating temperature: 1 K
Subcooling temperature: 5 K
Compressor efficiency: 70%

Tables 1 and 2 show GWP, COP, and refrigerating capacity, which were calculated based on these results. The COP and refrigerating capacity are ratios relative to R410A.

The coefficient of performance (COP) was determined by the following formula.

COP=(refrigerating capacity or heating capacity)/power consumption

For the flammability, the burning velocity was measured according to the ANSI/ASHRAE Standard 34-2013. Compositions having a burning velocity of 10 cm/s or less were determined to be "Class 2L (lower flammability)."

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was individualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

TABLE 16

| Item | Unit | Comp. Ex. 1 R410A | Comp. Ex. 2 HFO-1132E | Comp. Ex. 3 | Example 1 | Example 2 | Example 3 |
|---|---|---|---|---|---|---|---|
| HFO-1132E | mass % | 0 | 100 | 80 | 72.5 | 70 | 67.5 |
| HFO-1123 | mass % | 0 | 0 | 20 | 27.5 | 30 | 32.5 |
| GWP | — | 2088 | 1 | 1 | 1 | 1 | 1 |
| COP ratio | % (relative to R410A) | 100 | 98 | 95.3 | 94.4 | 94.1 | 93.8 |
| Refrigerating capacity ratio | % (relative to R410A) | 100 | 98 | 102.1 | 103.5 | 103.9 | 104.3 |
| Discharge pressure | MPa | 2.7 | 2.7 | 2.9 | 3.0 | 3.0 | 3.1 |
| Burning velocity | cm/sec | Non-flammable | 20 | 13 | 10 | 9 | 9 or less |

TABLE 17

| Item | Unit | Example 4 | Example 5 | Comp. Ex. 4 | Comp. Ex. 5 | Comp. Ex. 6 | Comp. Ex. 7 HFO-1123 |
|---|---|---|---|---|---|---|---|
| HFO-1132E | mass % | 65 | 62.5 | 60 | 50 | 25 | 0 |
| HFO-1123 | mass % | 35 | 37.5 | 40 | 50 | 75 | 100 |
| GWP | — | 1 | 1 | 1 | 1 | 1 | 1 |
| COP ratio | % (relative to R410A) | 93.5 | 93.2 | 92.9 | 91.8 | 89.9 | 89.9 |
| Refrigerating capacity ratio | % (relative to R410A) | 104.7 | 105.0 | 105.4 | 106.6 | 108.1 | 107.0 |
| Discharge pressure | MPa | 3.1 | 3.1 | 3.1 | 3.2 | 3.4 | 3.4 |
| Burning velocity | cm/sec | 9 or less | 9 or less | 9 or less | 9 or less | 9 or less | 5 |

The compositions each comprising 62.5 mass % to 72.5 mass % of HFO-1132(E) based on the entire composition are stable while having a low GWP (GWP=1), and they ensure ASHRAE 2L flammability. Further, surprisingly, they can ensure performance equivalent to that of R410A.

(1-5-3) Refrigerant C

Refrigerant C according to the present disclosure is a mixed refrigerant comprising HFO-1132(E), R32, and 2,3,3,3-tetrafluoro-1-propene (R1234yf).

The refrigerant C according to the present disclosure has various properties that are desirable as an R410A-alternative refrigerant; i.e., a refrigerating capacity equivalent to that of R410A, a sufficiently low GWP, and a lower flammability (Class 2L) according to the ASHRAE standard.

The refrigerant C according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments AC, CF, FD, and DA that connect the following 4 points:

point A (71.1, 0.0, 28.9),
point C (36.5, 18.2, 45.3),
point F (47.6, 18.3, 34.1), and
point D (72.0, 0.0, 28.0),
or on these line segments;

the line segment AC is represented by coordinates ($0.0181y^2-2.2288y+71.096$, y, $-0.0181y^2+1.2288y+28.904$), the line segment FD is represented by coordinates ($0.02y^2-1.7y+72$, y, $-0.02y^2+0.7y+28$), and the line segments CF and DA are straight lines. When the requirements above are satisfied, the refrigerant C according to the present disclosure has a refrigerating capacity ratio of 85% or more relative to that of R410A, a GWP of 125 or less, and a lower flammability (Class 2L) according to the ASHRAE standard.

The refrigerant C according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments AB, BE, ED, and DA that connect the following 4 points:

point A (71.1, 0.0, 28.9),
point B (42.6, 14.5, 42.9),
point E (51.4, 14.6, 34.0), and
point D (72.0, 0.0, 28.0),
or on these line segments;

the line segment AB is represented by coordinates ($0.0181y^2-2.2288y+71.096$, y, $-0.0181y^2+1.2288y+28.904$), the line segment ED is represented by coordinates $(0.02y^2-1.7y+72, y, -0.02y^2+0.7y+28)$, and the line segments BE and DA are straight lines. When the requirements above are satisfied, the refrigerant C according to the present disclosure has a refrigerating capacity ratio of 85% or more relative to that of R410A, a GWP of 100 or less, and a lower flammability (Class 2L) according to the ASHRAE standard.

The refrigerant C according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments GI, J, and JG that connect the following 3 points:

point G (77.5, 6.9, 15.6), point I (55.1, 18.3, 26.6), and point J (77.5. 18.4, 4.1), or on these line segments;

the line segment GI is represented by coordinates $(0.02y^2-2.4583y+93.396, y, -0.02y^2+1.4583y+6.604)$, and the line segments IJ and JG are straight lines. When the requirements above are satisfied, the refrigerant C according to the present disclosure has a refrigerating capacity ratio of 95% or more relative to that of R410A and a GWP of 100 or less, undergoes fewer or no changes such as polymerization or decomposition, and also has excellent stability.

The refrigerant C according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments GH, HK, and KG that connect the following 3 points:

point G (77.5, 6.9, 15.6), point H (61.8, 14.6, 23.6), and point K (77.5, 14.6, 7.9), or on these line segments;

the line segment GH is represented by coordinates $(0.02y^2-2.4583y+93.396, y, -0.02y^2+1.4583y+6.604)$, and the line segments HK and KG are straight lines. When the requirements above are satisfied, the refrigerant C according to the present disclosure has a refrigerating capacity ratio of 95% or more relative to that of R410A and a GWP of 100 or less, undergoes fewer or no changes such as polymerization or decomposition, and also has excellent stability.

The refrigerant C according to the present disclosure may further comprise other additional refrigerants in addition to HFO-1132(E), R32, and R1234yf, as long as the above properties and effects are not impaired. In this respect, the refrigerant C according to the present disclosure preferably comprises HFO-1132(E), R32, and R1234yf in a total amount of 99.5 mass % or more, more preferably 99.75 mass % or more, and still more preferably 99.9 mass % or more based on the entire refrigerant C.

Such additional refrigerants are not limited, and can be selected from a wide range of refrigerants. The mixed refrigerant may comprise a single additional refrigerant, or two or more additional refrigerants.

The refrigerant C according to the present disclosure is suitable for use as an alternative refrigerant for R410A.

Examples of Refrigerant C

The refrigerant C is described in more detail below with reference to Examples. However, the refrigerant C according to the present disclosure is not limited to the Examples.

The burning velocity of individual mixed refrigerants of HFO-1132(E), R32, and R1234yf was measured in accordance with the ANSI/ASHRAE Standard 34-2013. A formulation that shows a burning velocity of 10 cm/s was found by changing the concentration of R32 by 5 mass %. Table 18 shows the formulations found.

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

TABLE 18

| Item | Unit | Point D | R32 = 5 mass % | R32 = 10 mass % | R32 = 15 mass % | R32 = 20 mass % |
|---|---|---|---|---|---|---|
| HFO-1132E | Mass % | 72 | 64 | 57 | 51 | 46 |
| R32 | Mass % | 0 | 5 | 10 | 15 | 20 |
| R1234yf | Mass % | 28 | 31 | 33 | 34 | 34 |
| Burning Velocity | cm/s | 10 | 10 | 10 | 10 | 10 |

The results indicate that under the condition that the mass % of HFO-1132(E), R32, and R1234yf based on their sum is respectively represented by x, y, and z, when coordinates (x,y,z) in the ternary composition diagram shown in FIG. 10 in which the sum of HFO-1132(E), R32, and R1234yf is 100 mass % are on the line segments that connect the 5 points shown in Table 18 or on the right side of the line segments, the refrigerant has a lower flammability (Class 2L) according to the ASHRAE standard.

This is because R1234yf is known to have a lower burning velocity than HFO-1132(E) and R32.

Mixed refrigerants were prepared by mixing HFO-1132 (E), R32, and R1234yf in amounts (mass %) shown in Tables 19 to 23 based on the sum of HFO-1132(E), R32, and R1234yf. The coefficient of performance (COP) ratio and the refrigerating capacity ratio relative to those of R410A of the mixed refrigerants shown in Tables 19 to 23 were determined. The conditions for calculation were as described below.

Evaporating temperature: 5° C.

Condensation temperature: 45° C.

Degree of superheating: 1 K

Degree of subcooling: 5 K $E_{comp}$(compressive modulus): 0.7 kWh

Tables 19 to 23 show these values together with the GWP of each mixed refrigerant.

TABLE 19

| Item | Unit | Comp. Ex. 1 | Comp. Ex. 2 A | Example 1 | Example 2 | Example 3 B | Example 4 C |
|---|---|---|---|---|---|---|---|
| HFO-1132E | Mass % | R410A | 71.1 | 60.4 | 50.6 | 42.6 | 36.5 |
| R32 | Mass % | | 0.0 | 5.0 | 10.0 | 14.5 | 18.2 |
| R1234yf | Mass % | | 28.9 | 34.6 | 39.4 | 42.9 | 45.3 |
| GWP | — | 2088 | 2 | 36 | 70 | 100 | 125 |
| COP Ratio | % (relative to R410A) | 100 | 98.9 | 98.7 | 98.7 | 98.9 | 99.1 |
| Refrigerating Capacity Ratio | % (relative to R410A) | 100 | 85.0 | 85.0 | 85.0 | 85.0 | 85.0 |

TABLE 20

| Item | Unit | Comp. Ex. 3 O | Comp. Ex. 4 P | Comp. Ex. 5 Q | Comp. Ex. 6 R |
|---|---|---|---|---|---|
| HFO-1132E | Mass % | 85.3 | 0.0 | 81.6 | 0.0 |
| R32 | Mass % | 14.7 | 14.3 | 18.4 | 18.1 |
| R1234yf | Mass % | 0 | 85.7 | 0.0 | 81.9 |
| GWP | — | 100 | 100 | 125 | 125 |
| COP Ratio | % (relative to R410A) | 96.2 | 103.4 | 95.9 | 103.4 |
| Refrigerating Capacity Ratio | % (relative to R410A) | 105.7 | 57.3 | 107.4 | 60.9 |

TABLE 21

| Item | Unit | Comp. Ex. 7 D | Example 5 | Example 6 | Example 7 E | Example 8 | Example 9 F | Comp. Ex. 8 |
|---|---|---|---|---|---|---|---|---|
| HFO-1132E | Mass % | 72.0 | 64.0 | 57.0 | 51.4 | 51.0 | 47.6 | 46.0 |
| R32 | Mass % | 0.0 | 5.0 | 10.0 | 14.6 | 15.0 | 18.3 | 20.0 |
| R1234yf | Mass % | 28.0 | 31.0 | 33.0 | 34.0 | 34.0 | 34.1 | 34.0 |
| GWP | — | 1.84 | 36 | 69 | 100 | 103 | 125 | 137 |
| COP Ratio | % (relative to R410A) | 98.8 | 98.5 | 98.2 | 98.1 | 98.1 | 98.0 | 98.0 |
| Refrigerating Capacity Ratio | % (relative to R410A) | 85.4 | 86.8 | 88.3 | 89.8 | 90.0 | 91.2 | 91.8 |

TABLE 22

| Item | Unit | Comp. Ex. 9 | Comp. Ex. 10 | Example 10 | Example 11 H | Example 12 I |
|---|---|---|---|---|---|---|
| HFO-1132E | Mass % | 93.4 | 81.6 | 70.8 | 61.8 | 55.1 |
| R32 | Mass % | 0.0 | 5.0 | 10.0 | 14.6 | 18.3 |
| R1234yf | Mass % | 6.6 | 13.4 | 19.2 | 23.6 | 26.6 |
| GWP | — | 1 | 35 | 69 | 100 | 125 |
| COP Ratio | % (relative to R410A) | 98.0 | 97.6 | 97.4 | 97.3 | 97.4 |
| Refrigerating Capacity Ratio | % (relative to R410A) | 95.0 | 95.0 | 95.0 | 95.0 | 95.0 |

TABLE 23

| Item | Unit | Comp. Ex. 11 | Example 13 J | Example 14 K | Example 15 G | Comp. Ex. 12 |
|---|---|---|---|---|---|---|
| HFO-1132E | Mass % | 77.5 | 77.5 | 77.5 | 77.5 | 77.5 |
| R32 | Mass % | 22.5 | 18.4 | 14.6 | 6.9 | 0.0 |
| R1234yf | Mass % | 0.0 | 4.1 | 7.9 | 15.6 | 22.5 |
| GWP | — | 153 | 125 | 100 | 48.0 | 2 |
| COP Ratio | % (relative to R410A) | 95.8 | 96.1 | 96.5 | 97.5 | 98.6 |
| Refrigerating Capacity Ratio | % (relative to R410A) | 109.1 | 105.6 | 102.3 | 95.0 | 88.0 |

The results indicate that under the condition that the mass % of HFO-1132(E), R32, and R1234yf based on their sum is respectively represented by x, y, and z, when coordinates (x,y,z) in the ternary composition diagram in which the sum of HFO-1132(E), R32, and R1234yf is 100 mass % are within the range of a figure (FIG. 10) surrounded by line segments AC, CF, FD, and DA that connect the following 4 points:

point A (71.1, 0.0, 28.9), point C (36.5, 18.2, 45.3), point F (47.6, 18.3, 34.1), and point D (72.0, 0.0, 28.0), or on these line segments, the refrigerant has a refrigerating capacity ratio of 85% or more relative to that of R410A, a GWP of 125 or less, and a lower flammability (Class 2L) according to the ASHRAE standard.

Likewise, the results indicate that when coordinates (x,y, z) are within the range of a figure (FIG. 10) surrounded by line segments AB, BE, ED, and DA that connect the following 4 points:

point A (71.1, 0.0, 28.9), point B (42.6, 14.5, 42.9), point E (51.4, 14.6, 34.0), and point D (72.0, 0.0, 28.0), or on these line segments, the refrigerant has a refrigerating capacity ratio of 85% or more relative to that of R410A, a GWP of 100 or less, and a lower flammability (Class 2L) according to the ASHRAE standard.

Likewise, the results indicate that when coordinates (x,y, z) are within the range of a figure (FIG. 10) surrounded by line segments GI, IJ, and JG that connect the following 3 points:

point G (77.5, 6.9, 15.6), point I (55.1, 18.3, 26.6), and point J (77.5. 18.4, 4.1), or on these line segments, the refrigerant has a refrigerating capacity ratio of 95% or more relative to that of R410A and a GWP of 125 or less, undergoes fewer or no changes such as polymerization or decomposition, and also has excellent stability.

Likewise, the results indicate that when coordinates (x,y, z) are within the range of a figure (FIG. 10) surrounded by line segments GH, HK, and KG that connect the following 3 points:

point G (77.5, 6.9, 15.6), point H (61.8, 14.6, 23.6), and point K (77.5, 14.6, 7.9), or on these line segments, the refrigerant has a refrigerating capacity ratio of 95% or more relative to that of R410A and a GWP of 100 or less, undergoes fewer or no changes such as polymerization or decomposition, and also has excellent stability.

(5-4) Refrigerant D

Refrigerant D according to the present disclosure is a mixed refrigerant comprising HFO-1132(E), HFO-1123, and R32.

The refrigerant D according to the present disclosure has various properties that are desirable as an R410A-alternative refrigerant, i.e., a coefficient of performance equivalent to that of R410A and a sufficiently low GWP.

The refrigerant D according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments OC', C'D', D'E', E'A', and A'O that connect the following 5 points:

point O (100.0, 0.0, 0.0), point C' (56.7, 43.3, 0.0), point D' (52.2, 38.3, 9.5), point E' (41.8, 39.8, 18.4), and point A' (81.6, 0.0, 18.4), or on the line segments C'D', D'E', and E'A' (excluding the points C' and A');

the line segment C'D' is represented by coordinates $(-0.0297z^2-0.1915z+56.7,\ 0.0297z^2-1.1915z+43.3,\ z)$, the line segment D'E' is represented by coordinates $(-0.0535z^2+0.3229z+53.957,\ 0.0535z^2-0.6771z+46.043,\ z)$, and the line segments OC', E'A', and A'O are straight lines. When the requirements above are satisfied, the refrigerant D according to the present disclosure has a COP ratio of 92.5% or more relative to that of R410A, and a GWP of 125 or less.

The refrigerant D according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments OC, CD, DE, EA', and A'O that connect the following 5 points:

point O (100.0, 0.0, 0.0), point C (77.7, 22.3, 0.0), point D (76.3, 14.2, 9.5), point E (72.2, 9.4, 18.4), and point A' (81.6, 0.0, 18.4), or on the line segments CD, DE, and EA' (excluding the points C and A');

the line segment CDE is represented by coordinates $(-0.017z^2+0.0148z+77.684,\ 0.017z^2+0.9852z+22.316,\ z)$, and the line segments OC, EA', and A'O are straight lines. When the requirements above are satisfied, the refrigerant D according to the present disclosure has a COP ratio of 95% or more relative to that of R410A, and a GWP of 125 or less.

The refrigerant D according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments OC', C'D', D'A, and AO that connect the following 4 points:

point O (100.0, 0.0, 0.0), point C' (56.7, 43.3, 0.0), point D' (52.2, 38.3, 9.5), and point A (90.5, 0.0, 9.5), or on the line segments C'D' and D'A (excluding the points C' and A);

the line segment C'D' is represented by coordinates $(-0.0297z^2-0.1915z+56.7,\ 0.0297z^2+1.1915z+43.3,\ z)$, and the line segments OC', D'A, and AO are straight lines. When the requirements above are satisfied, the refrigerant D according to the present disclosure has a COP ratio of 93.5% or more relative to that of R410A, and a GWP of 65 or less.

The refrigerant D according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments OC, CD, DA, and AO that connect the following 4 points:

point O (100.0, 0.0, 0.0), point C (77.7, 22.3, 0.0), point D (76.3, 14.2, 9.5), and point A (90.5, 0.0, 9.5), or on the line segments CD and DA (excluding the points C and A);

the line segment CD is represented by coordinates ($-0.017z^2+0.0148z+77.684$, $0.017z^2+0.9852z+22.316$, z), and the line segments OC, DA, and AO are straight lines. When the requirements above are satisfied, the refrigerant D according to the present disclosure has a COP ratio of 95% or more relative to that of R410A, and a GWP of 65 or less.

The refrigerant D according to the present disclosure may further comprise other additional refrigerants in addition to HFO-1132(E), HFO-1123, and R32, as long as the above properties and effects are not impaired. In this respect, the refrigerant D according to the present disclosure preferably comprises HFO-1132(E), HFO-1123, and R32 in a total amount of 99.5 mass % or more, more preferably 99.75 mass % or more, and even more preferably 99.9 mass % or more, based on the entire refrigerant D.

Such additional refrigerants are not limited, and can be selected from a wide range of refrigerants. The mixed refrigerant may comprise a single additional refrigerant, or two or more additional refrigerants.

The refrigerant D according to the present disclosure is suitable for use as an alternative refrigerant for R410A.

Examples of Refrigerant D

The refrigerant D is described in more detail below with reference to Examples. However, the refrigerant D according to the present disclosure is not limited to the Examples.

Mixed refrigerants were prepared by mixing HFO-1132 (E), HFO-1123, and R32 at mass % based on their sum shown in Tables 24 to 26.

The COP ratio and the refrigerating capacity (which may be referred to as “cooling capacity” or “capacity”) ratio relative to those of R410 of the mixed refrigerants were determined. The conditions for calculation were as described below.

Evaporating temperature: 5° C.

Condensation temperature: 45° C.

Degree of superheating: 1K

Degree of subcooling: 5K $E_{comp}$ (compressive modulus): 0.7 kWh

Tables 24 to 26 show these values together with the GWP of each mixed refrigerant.

TABLE 24

| Item | Unit | Comp. Ex. 1 | Comp. Ex. 2 C | Example 1 | Example 2 D | Example 3 | Example 4 E | Comp. Ex. 3 O |
|---|---|---|---|---|---|---|---|---|
| HFO-1132(E) | mass % | R410A | 77.7 | 77.3 | 76.3 | 74.6 | 72.2 | 100.0 |
| HFO-1123 | mass % | | 22.3 | 17.7 | 14.2 | 11.4 | 9.4 | 0.0 |
| R32 | mass % | | 0.0 | 5.0 | 9.5 | 14.0 | 18.4 | 0.0 |
| GWP | — | 2088 | 1 | 35 | 65 | 95 | 125 | 1 |
| COP ratio | % (relative to R410A) | 100.0 | 95.0 | 95.0 | 95.0 | 95.0 | 95.0 | 97.8 |
| Refrigerating capacity ratio | % (relative to R410A) | 100.0 | 102.5 | 104.4 | 106.0 | 107.6 | 109.1 | 97.8 |

TABLE 25

| Item | Unit | Comp. Ex. 4 C' | Example 5 | Example 6 D' | Example 7 | Example 8 E' | Comp. Ex. 5 A | Comp. Ex. 6 B |
|---|---|---|---|---|---|---|---|---|
| HFO-1132(E) | mass % | 56.7 | 55.0 | 52.2 | 48.0 | 41.8 | 90.5 | 0.0 |
| HFO-1123 | mass % | 43.3 | 40.0 | 38.3 | 38.0 | 39.8 | 0.0 | 90.5 |
| R32 | mass % | 0.0 | 5.0 | 9.5 | 14.0 | 18.4 | 9.5 | 9.5 |
| GWP | — | 1 | 35 | 65 | 95 | 125 | 65 | 65 |
| COP ratio | % (relative to R410A) | 92.5 | 92.5 | 92.5 | 92.5 | 92.5 | 96.6 | 90.8 |
| Refrigerating capacity ratio | % (relative to R410A) | 105.8 | 107.9 | 109.7 | 111.5 | 113.2 | 103.2 | 111.0 |

TABLE 26

| Item | Unit | Comp. Ex. 7 A' | Comp. Ex. 8 B' | Example 9 | Example 10 | Example 11 | Comp. Ex. 9 | Comp. Ex. 10 |
|---|---|---|---|---|---|---|---|---|
| HFO-1132(E) | mass % | 81.6 | 0.0 | 85.0 | 65.0 | 70.0 | 50.0 | 20.0 |
| HFO-1123 | mass % | 0.0 | 81.6 | 10.0 | 30.0 | 15.0 | 20.0 | 20.0 |
| R32 | mass % | 18.4 | 18.4 | 5.0 | 5.0 | 15.0 | 30.0 | 60.0 |
| GWP | — | 125 | 125 | 35 | 35 | 102 | 203 | 405 |
| COP ratio | % (relative to R410A) | 95.9 | 91.9 | 95.9 | 93.6 | 94.6 | 94.3 | 97.6 |
| Refrigerating capacity ratio | % (relative to R410A) | 107.4 | 113.8 | 102.9 | 106.5 | 108.7 | 114.6 | 117.6 |

The results indicate that under the condition that the mass % of HFO-1132(E), HFO-1123, and R32 based on their sum is respectively represented by x, y, and z, when coordinates (x,y,z) in a ternary composition diagram in which the sum of HFO-1132(E), HFO-1123, and R32 is 100 mass % are within the range of a figure (FIG. 11) surrounded by line segments OC', C'D', D'E', E'A', and A'O that connect the following 5 points:

point O (100.0, 0.0, 0.0),
point C' (56.7, 43.3, 0.0),
point D' (52.2, 38.3, 9.5),
point E' (41.8, 39.8, 18.4), and
point A' (81.6, 0.0, 18.4), or on the line segments C'D', D'E', and E'A' (excluding the points C' and A'), the refrigerant has a COP ratio of 92.5% or more relative to that of R410A, and a GWP of 125 or less.

The results also indicate that when coordinates (x,y,z) are within the range of a figure (FIG. 11) surrounded by line segments OC, CD, DE, EA', and A'O that connect the following 5 points:

point O (100.0, 0.0, 0.0),
point C (77.7, 22.3, 0.0),
point D (76.3, 14.2, 9.5),
point E (72.2, 9.4, 18.4), and
point A' (81.6, 0.0, 18.4), or on the line segments CD, DE, and EA' (excluding the points C and A'), the refrigerant has a COP ratio of 95% or more relative to that of R410A, and a GWP of 125 or less.

The results also indicate that when coordinates (x,y,z) are within the range of a figure (FIG. 11) surrounded by line segments OC', C'D', D'A, and AO that connect the following 4 points:

point O (100.0, 0.0, 0.0),
point C' (56.7, 43.3, 0.0),
point D' (52.2, 38.3, 9.5), and
point A (90.5, 0.0, 9.5), or on the line segments C'D' and D'A (excluding the points C' and A), the refrigerant has a COP ratio of 92.5% or more relative to that of R410A, and a GWP of 65 or less.

The results also indicate that when coordinates (x,y,z) are within the range of a figure (FIG. 11) surrounded by line segments OC, CD, DA, and AO that connect the following 4 points:

point O (100.0, 0.0, 0.0),
point C (77.7, 22.3, 0.0),
point D (76.3, 14.2, 9.5), and
point A (90.5, 0.0, 9.5), or on the line segments CD and DA (excluding the points C and A), the refrigerant has a COP ratio of 95% or more relative to that of R410A, and a GWP of 65 or less.

In contrast, as shown in Comparative Examples 2, 3, and 4, when R32 is not contained, the concentrations of HFO-1132(E) and HFO-1123, which have a double bond, become relatively high; this undesirably leads to deterioration, such as decomposition, or polymerization in the refrigerant compound.

Moreover, as shown in Comparative Examples 3, 5, and 7, when HFO-1123 is not contained, the combustion-inhibiting effect thereof cannot be obtained; thus, undesirably, a composition having lower flammability cannot be obtained.

(2) Refrigerating Oil

A refrigerating oil as technique of second group can improve the lubricity in the refrigeration cycle apparatus and can also achieve efficient cycle performance by performing a refrigeration cycle such as a refrigeration cycle together with a refrigerant composition.

Examples of the refrigerating oil include oxygen-containing synthetic oils (e.g., ester-type refrigerating oils and ether-type refrigerating oils) and hydrocarbon refrigerating oils. In particular, ester-type refrigerating oils and ether-type refrigerating oils are preferred from the viewpoint of miscibility with refrigerants or refrigerant compositions. The refrigerating oils may be used alone or in combination of two or more.

The kinematic viscosity of the refrigerating oil at 40° C. is preferably 1 $mm^2/s$ or more and 750 $mm^2/s$ or less and more preferably 1 $mm^2/s$ or more and 400 $mm^2/s$ or less from at least one of the viewpoints of suppressing the deterioration of the lubricity and the hermeticity of compressors, achieving sufficient miscibility with refrigerants under low-temperature conditions, suppressing the lubrication failure of compressors, and improving the heat exchange efficiency of evaporators. Herein, the kinematic viscosity of the refrigerating oil at 100° C. may be, for example, 1 $mm^2/s$ or more and 100 $mm^2/s$ or less and is more preferably 1 $mm^2/s$ or more and 50 $mm^2/s$ or less.

The refrigerating oil preferably has an aniline point of −100° C. or higher and 0° C. or lower. The term “aniline point” herein refers to a numerical value indicating the solubility of, for example, a hydrocarbon solvent, that is, refers to a temperature at which when equal volumes of a sample (herein, refrigerating oil) and aniline are mixed with each other and cooled, turbidity appears because of their immiscibility (provided in JIS K 2256). Note that this value is a value of the refrigerating oil itself in a state in which the refrigerant is not dissolved. By using a refrigerating oil having such an aniline point, for example, even when bearings constituting resin functional components and insulating materials for electric motors are used at positions in contact with the refrigerating oil, the suitability of the refrigerating oil for the resin functional components can be improved. Specifically, if the aniline point is excessively low, the refrigerating oil readily infiltrates the bearings and the insulating materials, and thus the bearings and the like tend to swell. On the other hand, if the aniline point is excessively high, the refrigerating oil does not readily infiltrate the bearings and the insulating materials, and thus the bearings and the like tend to shrink. Accordingly, the deformation of the bearings and the insulating materials due to swelling or shrinking can be prevented by using the refrigerating oil having an aniline point within the above-described predetermined range (−100° C. or higher and 0° C. or lower). If the bearings deform through swelling, the desired length of a gap at a sliding portion cannot be maintained. This may result in an increase in sliding resistance. If the bearings deform through shrinking, the hardness of the bearings increases, and consequently the bearings may be broken because of vibration of a compressor. In other words, the deformation of the bearings through shrinking may decrease the rigidity of the sliding portion. Furthermore, if the insulating materials (e.g., insulating coating materials and insulating films) of electric motors deform through swelling, the insulating properties of the insulating materials deteriorate. If the insulating materials deform through shrinking, the insulating materials may also be broken as in the case of the bearings, which also deteriorates the insulating properties. In contrast, when the refrigerating oil having an aniline point within the predetermined range is used as described above, the deformation of bearings and insulating materials due to swelling or shrinking can be suppressed, and thus such a problem can be avoided.

The refrigerating oil is used as a working fluid for a refrigerating machine by being mixed with a refrigerant composition. The content of the refrigerating oil relative to the whole amount of working fluid for a refrigerating machine is preferably 5 mass % or more and 60 mass % or less and more preferably 10 mass % or more and 50 mass % or less.

(2-1) Oxygen-Containing Synthetic Oil

An ester-type refrigerating oil or an ether-type refrigerating oil serving as an oxygen-containing synthetic oil is mainly constituted by carbon atoms and oxygen atoms. In the ester-type refrigerating oil or the ether-type refrigerating oil, an excessively low ratio (carbon/oxygen molar ratio) of carbon atoms to oxygen atoms increases the hygroscopicity, and an excessively high ratio of carbon atoms to oxygen atoms deteriorates the miscibility with a refrigerant. Therefore, the molar ratio is preferably 2 or more and 7.5 or less.

(2-1-1) Ester-Type Refrigerating Oil

Examples of base oil components of the ester-type refrigerating oil include dibasic acid ester oils of a dibasic acid and a monohydric alcohol, polyol ester oils of a polyol and a fatty acid, complex ester oils of a polyol, a polybasic acid, and a monohydric alcohol (or a fatty acid), and polyol carbonate oils from the viewpoint of chemical stability.

(Dibasic Acid Ester Oil)

The dibasic acid ester oil is preferably an ester of a dibasic acid such as oxalic acid, malonic acid, succinic acid, glutaric acid, adipic acid, pimelic acid, suberic acid, azelaic acid, sebacic acid, phthalic acid, isophthalic acid, or terephthalic acid, in particular, a dibasic acid having 5 to 10 carbon atoms (e.g., glutaric acid, adipic acid, pimelic acid, suberic acid, azelaic acid, or sebacic acid) and a monohydric alcohol having a linear or branched alkyl group and having 1 to 15 carbon atoms (e.g., methanol, ethanol, propanol, butanol, pentanol, hexanol, heptanol, octanol, nonanol, decanol, undecanol, dodecanol, tridecanol, tetradecanol, or pentadecanol). Specific examples of the dibasic acid ester oil include ditridecyl glutarate, di(2-ethylhexyl) adipate, diisodecyl adipate, ditridecyl adipate, and di(3-ethylhexyl) sebacate.

(Polyol Ester Oil)

The polyol ester oil is an ester synthesized from a polyhydric alcohol and a fatty acid (carboxylic acid), and has a carbon/oxygen molar ratio of 2 or more and 7.5 or less, preferably 3.2 or more and 5.8 or less.

The polyhydric alcohol constituting the polyol ester oil is a diol (e.g., ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, or 1,12-dodecanediol) or a polyol having 3 to 20 hydroxyl groups (trimethylolethane, trimethylolpropane, trimethylolbutane, di-(trimethylolpropane), tri-(trimethylolpropane), pentaerythritol, di-(pentaerythritol), tri-(pentaerythritol), glycerol, polyglycerol (glycerol dimer or trimer), 1,3,5-pentanetriol, sorbitol, sorbitan, a sorbitol-glycerol condensate, a polyhydric alcohol such as adonitol, arabitol, xylitol, or mannitol, a saccharide such as xylose, arabinose, ribose, rhamnose, glucose, fructose, galactose, mannose, sorbose, cellobiose, maltose, isomaltose, trehalose, sucrose, raffinose, gentianose, or melezitose, or a partially etherified product of the foregoing). One or two or more polyhydric alcohols may constitute an ester.

For the fatty acid constituting the polyol ester, the number of carbon atoms is not limited, but is normally 1 to 24. A linear fatty acid or a branched fatty acid is preferred. Examples of the linear fatty acid include acetic acid, propionic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, oleic acid, linoleic acid, and linolenic acid. The hydrocarbon group that bonds to a carboxy group may have only a saturated hydrocarbon or may have an unsaturated hydrocarbon. Examples of the branched fatty acid include 2-methylpropionic acid, 2-methylbutanoic acid, 3-methylbutanoic acid, 2,2-dimethylpropionic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, 2,2,3-trimethylbutanoic acid, 2,3,3-trimethylbutanoic acid, 2-ethyl-2-methylbutanoic acid, 2-ethyl-3-methylbutanoic acid, 2-methylheptanoic acid, 3-methylheptanoic acid, 4-methylheptanoic acid, 5-methylheptanoic acid, 6-methylheptanoic acid, 2-ethylhexanoic acid, 3-ethylhexanoic acid, 4-ethylhexanoic acid, 2,2-dimethylhexanoic acid, 2,3-dimethylhexanoic acid, 2,4-dimethylhexanoic acid, 2,5-dimethylhexanoic acid, 3,3-dimethylhexanoic acid, 3,4-dimethylhexanoic acid, 3,5-dimethylhexanoic acid, 4,4-dimethylhexanoic acid, 4,5-dimethylhexanoic acid, 5,5-dimethylhexanoic acid, 2-propylpentanoic acid, 2-methyloctanoic acid, 3-methyloctanoic acid, 4-methyloctanoic acid, 5-methyloctanoic acid, 6-methyloctanoic acid, 7-methyloctanoic acid, 2,2-dimethylheptanoic acid, 2,3-dimethylheptanoic acid, 2,4-dimethylheptanoic acid, 2,5-dimethylheptanoic acid, 2,6-dimethylheptanoic acid, 3,3-dimethylheptanoic acid, 3,4-dimethylheptanoic acid, 3,5-dimethylheptanoic acid, 3,6-dimethylheptanoic acid, 4,4-dimethylheptanoic acid, 4,5-dimethylheptanoic acid, 4,6-dimethylheptanoic acid, 5,5-dimethylheptanoic acid, 5,6-dimethylheptanoic acid, 6,6-dimethylheptanoic acid, 2-methyl-2-ethylhexanoic acid, 2-methyl-3-ethylhexanoic acid, 2-methyl-4-ethylhexanoic acid, 3-methyl-2-ethylhexanoic acid, 3-methyl-3-ethylhexanoic acid, 3-methyl-4-ethylhexanoic acid, 4-methyl-2-ethylhexanoic acid, 4-methyl-3-ethylhexanoic acid, 4-methyl-4-ethylhexanoic acid, 5-methyl-2-ethylhexanoic acid, 5-methyl-3-ethylhexanoic acid, 5-methyl-4-ethylhexanoic acid, 2-ethylheptanoic acid, 3-methyloctanoic acid, 3,5,5-trimethylhexanoic acid, 2-ethyl-2,3,3-trimethylbutyric acid, 2,2,4,4-tetramethylpentanoic acid, 2,2,3,3-tetramethylpentanoic acid, 2,2,3,4-tetramethylpentanoic acid, and 2,2-diisopropylpropanoic acid. One or two or more fatty acids selected from the foregoing may constitute an ester.

One polyhydric alcohol may be used to constitute an ester or a mixture of two or more polyhydric alcohols may be used to constitute an ester. The fatty acid constituting an ester may be a single component, or two or more fatty acids may constitute an ester. The fatty acids may be individual fatty acids of the same type or may be two or more types of fatty acids as a mixture. The polyol ester oil may have a free hydroxyl group.

Specifically, the polyol ester oil is more preferably an ester of a hindered alcohol such as neopentyl glycol, trimethylolethane, trimethylolpropane, trimethylolbutane, di-(trimethylolpropane), tri-(trimethylolpropane), pentaerythritol, di-(pentaerythritol), or tri-(pentaerythritol); further preferably an ester of neopentyl glycol, trimethylolethane, trimethylolpropane, trimethylolbutane, pentaerythritol, or di-(pentaerythritol); and preferably an ester of neopentyl glycol, trimethylolpropane, pentaerythritol, di-(pentaerythritol), or the like and a fatty acid having 2 to 20 carbon atoms.

The fatty acid constituting such a polyhydric alcohol fatty acid ester may be only a fatty acid having a linear alkyl group or may be selected from fatty acids having a branched structure. A mixed ester of linear and branched fatty acids may be employed. Furthermore, two or more fatty acids selected from the above fatty acids may be used to constitute an ester.

Specifically, for example, in the case of a mixed ester of linear and branched fatty acids, the molar ratio of a linear fatty acid having 4 to 6 carbon atoms and a branched fatty acid having 7 to 9 carbon atoms is 15:85 to 90:10, preferably 15:85 to 85:15, more preferably 20:80 to 80:20, further preferably 25:75 to 75:25, and most preferably 30:70 to 70:30. The total content of the linear fatty acid having 4 to 6 carbon atoms and the branched fatty acid having 7 to 9 carbon atoms relative to the whole amount of fatty acid constituting the polyhydric alcohol fatty acid ester is preferably 20 mol % or more. The fatty acid preferably has such a composition that both of sufficient miscibility with a refrigerant and viscosity required as a refrigerating oil are achieved. The content of a fatty acid herein refers to a value relative to the whole amount of fatty acid constituting the polyhydric alcohol fatty acid ester contained in the refrigerating oil.

In particular, the refrigerating oil preferably contains an ester (hereafter referred to as a "polyhydric alcohol fatty acid ester (A)") in which the molar ratio of the fatty acid having 4 to 6 carbon atoms and the branched fatty acid having 7 to 9 carbon atoms is 15:85 to 90:10, the fatty acid having 4 to 6 carbon atoms contains 2-methylpropionic acid, and the total content of the fatty acid having 4 to 6 carbon atoms and the branched fatty acid having 7 to 9 carbon atoms relative to the whole amount of fatty acid constituting the above ester is 20 mol % or more.

The polyhydric alcohol fatty acid ester (A) includes a complete ester in which all hydroxyl groups of a polyhydric alcohol are esterified, a partial ester in which some hydroxyl groups of a polyhydric alcohol are left without being esterified, and a mixture of a complete ester and a partial ester. The hydroxyl value of the polyhydric alcohol fatty acid ester (A) is preferably 10 mgKOH/g or less, more preferably 5 mgKOH/g or less, and most preferably 3 mgKOH/g or less.

For the fatty acid constituting the polyhydric alcohol fatty acid ester (A), the molar ratio of the fatty acid having 4 to 6 carbon atoms and the branched fatty acid having 7 to 9 carbon atoms is 15:85 to 90:10, preferably 15:85 to 85:15, more preferably 20:80 to 80:20, further preferably 25:75 to 75:25, and most preferably 30:70 to 70:30. The total content of the fatty acid having 4 to 6 carbon atoms and the branched fatty acid having 7 to 9 carbon atoms relative to the whole amount of fatty acid constituting the polyhydric alcohol fatty acid ester (A) is 20 mol % or more. In the case where the above conditions for the composition of the fatty acid are not satisfied, if difluoromethane is contained in the refrigerant composition, both of sufficient miscibility with the difluoromethane and viscosity required as a refrigerating oil are not easily achieved at high levels. The content of a fatty acid refers to a value relative to the whole amount of fatty acid constituting the polyhydric alcohol fatty acid ester contained in the refrigerating oil.

Specific examples of the fatty acid having 4 to 6 carbon atoms include butanoic acid, 2-methylpropionic acid, pentanoic acid, 2-methylbutanoic acid, 3-methylbutanoic acid, 2,2-dimethylpropionic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and hexanoic acid. Among them, a fatty acid having a branched structure at an alkyl skeleton, such as 2-methylpropionic acid, is preferred.

Specific examples of the branched fatty acid having 7 to 9 carbon atoms include 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, 1,1,2-trimethylbutanoic acid, 1,2,2-trimethylbutanoic acid, 1-ethyl-1-methylbutanoic acid, 1-ethyl-2-methylbutanoic acid, octanoic acid, 2-ethylhexanoic acid, 3-ethylhexanoic acid, 3,5-dimethylhexanoic acid, 2,4-dimethylhexanoic acid, 3,4-dimethylhexanoic acid, 4,5-dimethylhexanoic acid, 2,2-dimethylhexanoic acid, 2-methylheptanoic acid, 3-methylheptanoic acid, 4-methylheptanoic acid, 5-methylheptanoic acid, 6-methylheptanoic acid, 2-propylpentanoic acid, nonanoic acid, 2,2-dimethylheptanoic acid, 2-methyloctanoic acid, 2-ethylheptanoic acid, 3-methyloctanoic acid, 3,5,5-trimethylhexanoic acid, 2-ethyl-2,3,3-trimethylbutyric acid, 2,2,4,4-tetramethylpentanoic acid, 2,2,3,3-tetramethylpentanoic acid, 2,2,3,4-tetramethylpentanoic acid, and 2,2-diisopropylpropanoic acid.

The polyhydric alcohol fatty acid ester (A) may contain, as an acid constituent component, a fatty acid other than the fatty acid having 4 to 6 carbon atoms and the branched fatty acid having 7 to 9 carbon atoms as long as the molar ratio of the fatty acid having 4 to 6 carbon atoms and the branched fatty acid having 7 to 9 carbon atoms is 15:85 to 90:10 and the fatty acid having 4 to 6 carbon atoms contains 2-methylpropionic acid.

Specific examples of the fatty acid other than the fatty acid having 4 to 6 carbon atoms and the branched fatty acid having 7 to 9 carbon atoms include fatty acids having 2 or 3 carbon atoms, such as acetic acid and propionic acid; linear fatty acids having 7 to 9 carbon atoms, such as heptanoic acid, octanoic acid, and nonanoic acid; and fatty acids having 10 to carbon atoms, such as decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, and oleic acid.

When the fatty acid having 4 to 6 carbon atoms and the branched fatty acid having 7 to 9 carbon atoms are used in combination with fatty acids other than these fatty acids, the total content of the fatty acid having 4 to 6 carbon atoms and the branched fatty acid having 7 to 9 carbon atoms relative to the whole amount of fatty acid constituting the polyhydric alcohol fatty acid ester (A) is preferably 20 mol % or more, more preferably 25 mol % or more, and further preferably 30 mol % or more. When the content is 20 mol % or more, sufficient miscibility with difluoromethane is achieved in the case where the difluoromethane is contained in the refrigerant composition.

A polyhydric alcohol fatty acid ester (A) containing, as acid constituent components, only 2-methylpropionic acid and 3,5,5-trimethylhexanoic acid is particularly preferred from the viewpoint of achieving both necessary viscosity and miscibility with difluoromethane in the case where the difluoromethane is contained in the refrigerant composition.

The polyhydric alcohol fatty acid ester may be a mixture of two or more esters having different molecular structures. In this case, individual molecules do not necessarily satisfy the above conditions as long as the whole fatty acid constituting a pentaerythritol fatty acid ester contained in the refrigerating oil satisfies the above conditions.

As described above, the polyhydric alcohol fatty acid ester (A) contains the fatty acid having 4 to 6 carbon atoms and the branched fatty acid having 7 to 9 carbon atoms as essential acid components constituting the ester and may optionally contain other fatty acids as constituent components. In other words, the polyhydric alcohol fatty acid ester (A) may contain only two fatty acids as acid constituent components or three or more fatty acids having different structures as acid constituent components, but the polyhydric alcohol fatty acid ester preferably contains, as an acid constituent component, only a fatty acid whose carbon atom (α-position carbon atom) adjacent to carbonyl carbon is not quaternary carbon. If the fatty acid constituting the polyhydric alcohol fatty acid ester contains a fatty acid whose α-position carbon atom is quaternary carbon, the lubricity in the presence of difluoromethane in the case where the difluoromethane is contained in the refrigerant composition tends to be insufficient.

The polyhydric alcohol constituting the polyol ester according to this embodiment is preferably a polyhydric alcohol having 2 to 6 hydroxyl groups.

Specific examples of the dihydric alcohol (diol) include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, and 1,12-dodecanediol. Specific examples of the trihydric or higher alcohol include polyhydric alcohols such as trimethylolethane, trimethylolpropane, trimethylolbutane, di-(trimethylolpropane), tri-(trimethylolpropane), pentaerythritol, di-(pentaerythritol), tri-(pentaerythritol), glycerol, polyglycerol (glycerol dimer or trimer), 1,3,5-pentanetriol, sorbitol, sorbitan, sorbitol glycerol condensates, adonitol, arabitol, xylitol, and mannitol; saccharides such as xylose, arabinose, ribose, rhamnose, glucose, fructose, galactose, mannose, sorbose, and cellobiose; and partially etherified products of the foregoing. Among them, in terms of better hydrolysis stability, an ester of a hindered alcohol such as neopentyl glycol, trimethylolethane, trimethylolpropane, trimethylolbutane, di-(trimethylolpropane), tri-(trimethylolpropane), pentaerythritol, di-(pentaerythritol), or tri-(pentaerythritol) is preferably used; an ester of neopentyl glycol, trimethylolethane, trimethylolpropane, trimethylolbutane, pentaerythritol, or di-(pentaerythritol) is more preferably used; and neopentyl glycol, trimethylolpropane, pentaerythritol, or di-(pentaerythritol) is further preferably used. In terms of excellent miscibility with a refrigerant and excellent hydrolysis stability, a mixed ester of pentaerythritol, di-(pentaerythritol), or pentaerythritol and di-(pentaerythritol) is most preferably used.

Preferred examples of the acid constituent component constituting the polyhydric alcohol fatty acid ester (A) are as follows:

(i) a combination of 1 to 13 acids selected from butanoic acid, 2-methylpropionic acid, pentanoic acid, 2-methylbutanoic acid, 3-methylbutanoic acid, 2,2-dimethylpropionic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and hexanoic acid and 1 to 13 acids selected from 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, and 2-ethyl-3-methylbutanoic acid;

(ii) A Combination of 1 to 13 Acids Selected from Butanoic Acid, 2-Methylpropionic Acid, pentanoic acid, 2-methylbutanoic acid, 3-methylbutanoic acid, 2,2-dimethylpropionic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and hexanoic acid and 1 to 25 acids selected from 2-methylheptanoic acid, 3-methylheptanoic acid, 4-methylheptanoic acid, 5-methylheptanoic acid, 6-methylheptanoic acid, 2,2-dimethylhexanoic acid, 3,3-dimethylhexanoic acid, 4,4-dimethylhexanoic acid, 5,5-dimethylhexanoic acid, 2,3-dimethylhexanoic acid, 2,4-dimethylhexanoic acid, 2,5-dimethylhexanoic acid, 3,4-dimethylhexanoic acid, 3,5-dimethylhexanoic acid, 4,5-dimethylhexanoic acid, 2,2,3-trimethylpentanoic acid, 2,3,3-trimethylpentanoic acid, 2,4,4-trimethylpentanoic acid, 3,4,4-trimethylpentanoic acid, 2-ethylhexanoic acid, 3-ethylhexanoic acid, 2-propylpentanoic acid, 2-methyl-2-ethylpentanoic acid, 2-methyl-3-ethylpentanoic acid, and 3-methyl-3-ethylpentanoic acid; and (iii) a combination of 1 to 13 acids selected from butanoic acid, 2-methylpropionic acid, pentanoic acid, 2-methylbutanoic acid, 3-methylbutanoic acid, 2,2-dimethylpropionic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and hexanoic acid and 1 to 50 acids selected from 2-methyloctanoic acid, 3-methyloctanoic acid, 4-methyloctanoic acid, 5-methyloctanoic acid, 6-methyloctanoic acid, 7-methyloctanoic acid, 8-methyloctanoic acid, 2,2-dimethylheptanoic acid, 3,3-dimethylheptanoic acid, 4,4-dimethylheptanoic acid, 5,5-dimethylheptanoic acid, 6,6-dimethylheptanoic acid, 2,3-dimethylheptanoic acid, 2,4-dimethylheptanoic acid, 2,5-dimethylheptanoic acid, 2,6-dimethylheptanoic acid, 3,4-dimethylheptanoic acid, 3,5-dimethylheptanoic acid, 3,6-dimethylheptanoic acid, 4,5-dimethylheptanoic acid, 4,6-dimethylheptanoic acid, 2-ethylheptanoic acid, 3-ethylheptanoic acid, 4-ethylheptanoic acid, 5-ethylheptanoic acid, 2-propylhexanoic acid, 3-propylhexanoic acid, 2-butylpentanoic acid, 2,2,3-trimethylhexanoic acid, 2,2,3-trimethylhexanoic acid, 2,2,4-trimethylhexanoic acid, 2,2,5-trimethylhexanoic acid, 2,3,4-trimethylhexanoic acid, 2,3,5-trimethylhexanoic acid, 3,3,4-trimethylhexanoic acid, 3,3,5-trimethylhexanoic acid, 3,5,5-trimethylhexanoic acid, 4,4,5-trimethylhexanoic acid, 4,5,5-trimethylhexanoic acid, 2,2,3,3-tetramethylpentanoic acid, 2,2,3,4-tetramethylpentanoic acid, 2,2,4,4-tetramethylpentanoic acid, 2,3,4,4-tetramethylpentanoic acid, 3,3,4,4-tetramethylpentanoic acid, 2,2-diethylpentanoic acid, 2,3-diethylpentanoic acid, 3,3-diethylpentanoic acid, 2-ethyl-2,3,3-trimethylbutyric acid, 3-ethyl-2,2,3-trimethylbutyric acid, and 2,2-diisopropylpropionic acid.

Further preferred examples of the acid constituent component constituting the polyhydric alcohol fatty acid ester are as follows:

(i) a combination of 2-methylpropionic acid and 1 to 13 acids selected from 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, and 2-ethyl-3-methylbutanoic acid; (ii) a combination of 2-methylpropionic acid and 1 to 25 acids selected from 2-methylheptanoic acid, 3-methylheptanoic acid, 4-methylheptanoic acid, 5-methylheptanoic acid, 6-methylheptanoic acid, 2,2-dimethylhexanoic acid, 3,3-dimethylhexanoic acid, 4,4-dimethylhexanoic acid, 5,5-dimethylhexanoic acid, 2,3-dimethylhexanoic acid, 2,4-dimethylhexanoic acid, 2,5-dimethylhexanoic acid, 3,4-dimethylhexanoic acid, 3,5-dimethylhexanoic acid, 4,5-dimethylhexanoic acid, 2,2,3-trimethylpentanoic acid, 2,3,3-trimethylpentanoic acid, 2,4,4-trimethylpentanoic acid, 3,4,4-trimethylpentanoic acid, 2-ethylhexanoic acid, 3-ethylhexanoic acid, 2-propylpentanoic acid, 2-methyl-2-ethylpentanoic acid, 2-methyl-3-ethylpentanoic acid, and 3-methyl-3-ethylpentanoic acid; and (iii) a combination of 2-methylpropionic acid and 1 to 50 acids selected from 2-methyloctanoic acid, 3-methyloctanoic acid, 4-methyloctanoic acid, 5-methyloctanoic acid, 6-methyloctanoic acid, 7-methyloctanoic acid, 8-methyloctanoic acid, 2,2-dimethylheptanoic acid, 3,3-dimethylheptanoic acid, 4,4-dimethylheptanoic acid, 5,5-dimethylheptanoic acid, 6,6-dimethylheptanoic acid, 2,3-dimethylheptanoic acid, 2,4-dimethylheptanoic acid, 2,5-dimethylheptanoic acid, 2,6-dimethylheptanoic acid, 3,4-dimethylheptanoic acid, 3,5-dimethylheptanoic acid, 3,6-dimethylheptanoic acid, 4,5-dimethylheptanoic acid, 4,6-dimethylheptanoic acid, 2-ethylheptanoic acid, 3-ethylheptanoic acid, 4-ethylheptanoic acid, 5-ethylheptanoic acid, 2-propylhexanoic acid, 3-propylhexanoic acid, 2-butylpentanoic acid, 2,2,3-trimethylhexanoic acid, 2,2,3-trimethylhexanoic acid, 2,2,4-trimethylhexanoic acid, 2,2,5-trimethylhexanoic acid, 2,3,4-trimethylhexanoic acid, 2,3,5-trimethylhexanoic acid, 3,3,4-trimethylhexanoic acid, 3,3,5-trimethylhexanoic acid, 3,5,5-trimethylhexanoic acid, 4,4,5-trimethylhexanoic acid, 4,5,5-trimethylhexanoic acid, 2,2,3,3-tetramethylpentanoic acid, 2,2,3,4-tetramethylpentanoic acid, 2,2,4,4-tetramethylpentanoic acid, 2,3,4,4-tetramethylpentanoic acid, 3,3,4,4-tetramethylpentanoic acid, 2,2-diethylpentanoic acid, 2,3-diethylpentanoic acid, 3,3-diethylpentanoic acid, 2-ethyl-2,3,3-trimethylbutyric acid, 3-ethyl-2,2,3-trimethylbutyric acid, and 2,2-diisopropylpropionic acid.

The content of the polyhydric alcohol fatty acid ester (A) is 50 mass % or more, preferably 60 mass % or more, more preferably 70 mass % or more, and further preferably 75 mass % or more relative to the whole amount of the refrigerating oil. The refrigerating oil according to this embodiment may contain a lubricating base oil other than the polyhydric alcohol fatty acid ester (A) and additives as described later. However, if the content of the polyhydric alcohol fatty acid ester (A) is less than 50 mass %, necessary viscosity and miscibility cannot be achieved at high levels.

In the refrigerating oil according to this embodiment, the polyhydric alcohol fatty acid ester (A) is mainly used as a base oil. The base oil of the refrigerating oil according to this embodiment may be a polyhydric alcohol fatty acid ester (A) alone (i.e., the content of the polyhydric alcohol fatty acid ester (A) is 100 mass %). However, in addition to the polyhydric alcohol fatty acid ester (A), a base oil other than the polyhydric alcohol fatty acid ester (A) may be further contained to the degree that the excellent performance of the polyhydric alcohol fatty acid ester (A) is not impaired. Examples of the base oil other than the polyhydric alcohol fatty acid ester (A) include hydrocarbon oils such as mineral oils, olefin polymers, alkyldiphenylalkanes, alkylnaphthalenes, and alkylbenzenes; and esters other than the polyhydric alcohol fatty acid ester (A), such as polyol esters, complex esters, and alicyclic dicarboxylic acid esters, and oxygen-containing synthetic oils (hereafter, may be referred to as "other oxygen-containing synthetic oils") such as polyglycols, polyvinyl ethers, ketones, polyphenyl ethers, silicones, polysiloxanes, and perfluoroethers.

Among them, the oxygen-containing synthetic oil is preferably an ester other than the polyhydric alcohol fatty acid ester (A), a polyglycol, or a polyvinyl ether and particularly preferably a polyol ester other than the polyhydric alcohol fatty acid ester (A). The polyol ester other than the polyhydric alcohol fatty acid ester (A) is an ester of a fatty acid and a polyhydric alcohol such as neopentyl glycol, trimethylolethane, trimethylolpropane, trimethylolbutane, pentaerythritol, or dipentaerythritol and is particularly preferably an ester of neopentyl glycol and a fatty acid, an ester of pentaerythritol and a fatty acid, or an ester of dipentaerythritol and a fatty acid.

The neopentyl glycol ester is preferably an ester of neopentyl glycol and a fatty acid having 5 to 9 carbon atoms. Specific examples of the neopentyl glycol ester include neopentyl glycol di(3,5,5-trimethylhexanoate), neopentyl glycol di(2-ethylhexanoate), neopentyl glycol di(2-methylhexanoate), neopentyl glycol di(2-ethylpentanoate), an ester of neopentyl glycol and 2-methylhexanoic acid-2-ethylpentanoic acid, an ester of neopentyl glycol and 3-methylhexanoic acid-5-methylhexanoic acid, an ester of neopentyl glycol and 2-methylhexanoic acid-2-ethylhexanoic acid, an ester of neopentyl glycol and 3,5-dimethylhexanoic acid-4,5-dimethylhexanoic acid-3,4-dimethylhexanoic acid, neopentyl glycol dipentanoate, neopentyl glycol di(2-ethylbutanoate), neopentyl glycol di(2-methylpentanoate), neopentyl glycol di(2-methylbutanoate), and neopentyl glycol di(3-methylbutanoate).

The pentaerythritol ester is preferably an ester of pentaerythritol and a fatty acid having 5 to 9 carbon atoms. The pentaerythritol ester is, specifically, an ester of pentaerythritol and at least one fatty acid selected from pentanoic acid, 2-methylbutanoic acid, 3-methylbutanoic acid, hexanoic acid, 2-methylpentanoic acid, 2-ethylbutanoic acid, 2-ethylpentanoic acid, 2-methylhexanoic acid, 3,5,5-trimethylhexanoic acid, and 2-ethylhexanoic acid.

The dipentaerythritol ester is preferably an ester of dipentaerythritol and a fatty acid having 5 to 9 carbon atoms. The dipentaerythritol ester is, specifically, an ester of dipentaerythritol and at least one fatty acid selected from pentanoic acid, 2-methylbutanoic acid, 3-methylbutanoic acid, hexanoic acid, 2-methylpentanoic acid, 2-ethylbutanoic acid, 2-ethylpentanoic acid, 2-methylhexanoic acid, 3,5,5-trimethylhexanoic acid, and 2-ethylhexanoic acid.

When the refrigerating oil according to this embodiment contains an oxygen-containing synthetic oil other than the polyhydric alcohol fatty acid ester (A), the content of the oxygen-containing synthetic oil other than the polyhydric alcohol fatty acid ester (A) is not limited as long as excellent lubricity and miscibility of the refrigerating oil according to this embodiment are not impaired. When a polyol ester other than the polyhydric alcohol fatty acid ester (A) is contained, the content of the polyol ester is preferably less than 50 mass %, more preferably 45 mass % or less, still more preferably 40 mass % or less, even more preferably mass % or less, further preferably 30 mass % or less, and most preferably 25 mass % or less relative to the whole amount of the refrigerating oil. When an oxygen-containing synthetic oil other than the polyol ester is contained, the content of the oxygen-containing synthetic oil is preferably less than 50 mass %, more preferably 40 mass % or less, and further preferably 30 mass % or less relative to the whole amount of the refrigerating oil. If the content of the polyol ester other than the pentaerythritol fatty acid ester or the oxygen-containing synthetic oil is excessively high, the above-described effects are not sufficiently produced.

The polyol ester other than the polyhydric alcohol fatty acid ester (A) may be a partial ester in which some hydroxyl groups of a polyhydric alcohol are left without being esterified, a complete ester in which all hydroxyl groups are esterified, or a mixture of a partial ester and a complete ester. The hydroxyl value is preferably 10 mgKOH/g or less, more preferably 5 mgKOH/g or less, and most preferably 3 mgKOH/g or less.

When the refrigerating oil and the working fluid for a refrigerating machine according to this embodiment contain a polyol ester other than the polyhydric alcohol fatty acid ester (A), the polyol ester may contain one polyol ester having a single structure or a mixture of two or more polyol esters having different structures.

The polyol ester other than the polyhydric alcohol fatty acid ester (A) may be any of an ester of one fatty acid and one polyhydric alcohol, an ester of two or more fatty acids and one polyhydric alcohol, an ester of one fatty acid and two or more polyhydric alcohols, and an ester of two or more fatty acids and two or more polyhydric alcohols.

The refrigerating oil according to this embodiment may be constituted by only the polyhydric alcohol fatty acid ester (A) or by the polyhydric alcohol fatty acid ester (A) and other base oils. The refrigerating oil may further contain various additives described later. The working fluid for a refrigerating machine according to this embodiment may also further contain various additives. In the following description, the content of additives is expressed relative to the whole amount of the refrigerating oil, but the content of these components in the working fluid for a refrigerating machine is desirably determined so that the content is within the preferred range described later when expressed relative to the whole amount of the refrigerating oil.

To further improve the abrasion resistance and load resistance of the refrigerating oil and the working fluid for a refrigerating machine according to this embodiment, at least one phosphorus compound selected from the group consisting of phosphoric acid esters, acidic phosphoric acid esters, thiophosphoric acid esters, amine salts of acidic phosphoric acid esters, chlorinated phosphoric acid esters, and phosphorous acid esters can be added. These phosphorus compounds are esters of phosphoric acid or phosphorous acid and alkanol or polyether-type alcohol, or derivatives thereof.

Specific examples of the phosphoric acid ester include tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyldiphenyl phosphate, and xylenyldiphenyl phosphate.

Examples of the acidic phosphoric acid ester include monobutyl acid phosphate, monopentyl acid phosphate, monohexyl acid phosphate, monoheptyl acid phosphate, monooctyl acid phosphate, monononyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate, and dioleyl acid phosphate.

Examples of the thiophosphoric acid ester include tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyldiphenyl phosphorothionate, and xylenyldiphenyl phosphorothionate.

The amine salt of an acidic phosphoric acid ester is an amine salt of an acidic phosphoric acid ester and a primary, secondary, or tertiary amine that has a linear or branched alkyl group and that has 1 to 24 carbon atoms, preferably 5 to 18 carbon atoms.

For the amine constituting the amine salt of an acidic phosphoric acid ester, the amine salt is a salt of an amine such as a linear or branched methylamine, ethylamine, propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, oleylamine, tetracosylamine, dimethylamine, diethylamine, dipropylamine, dibutylamine, dipentylamine, dihexylamine, diheptylamine, dioctylamine, dinonylamine, didecylamine, diundecylamine, didodecylamine, ditridecylamine, ditetradecylamine, dipentadecylamine, dihexadecylamine, diheptadecylamine, dioctadecylamine, dioleylamine, ditetracosylamine, trimethylamine, triethylamine, tripropylamine, tributylamine, tripentylamine, trihexylamine, triheptylamine, trioctylamine, trinonylamine, tridecylamine, triundecylamine, tridodecylamine, tritridecylamine, tritetradecylamine, tripentadecylamine, trihexadecylamine, triheptadecylamine, trioctadecylamine, trioleylamine, or tritetracosylamine. The amine may be a single compound or a mixture of two or more compounds.

Examples of the chlorinated phosphoric acid ester include tris(dichloropropyl) phosphate, tris(chloroethyl) phosphate, tris(chlorophenyl) phosphate, and polyoxyalkylene-bis[di (chloroalkyl)] phosphate. Examples of the phosphorous acid ester include dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleyl phosphite, diphenyl phosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, trioleyl phosphite, triphenyl phosphite, and tricresyl phosphite. Mixtures of these compounds can also be used.

When the refrigerating oil and the working fluid for a refrigerating machine according to this embodiment contain the above-described phosphorus compound, the content of the phosphorus compound is not limited, but is preferably 0.01 to 5.0 mass % and more preferably 0.02 to 3.0 mass % relative to the whole amount of the refrigerating oil (relative to the total amount of the base oil and all the additives). The above-described phosphorus compounds may be used alone or in combination of two or more.

The refrigerating oil and the working fluid for a refrigerating machine according to this embodiment may contain a terpene compound to further improve the thermal and chemical stability. The "terpene compound" in the present invention refers to a compound obtained by polymerizing isoprene and a derivative thereof, and a dimer to an octamer of isoprene are preferably used. Specific examples of the terpene compound include monoterpenes such as geraniol, nerol, linalool, citral (including geranial), citronellol, menthol, limonene, terpinerol, carvone, ionone, thujone, camphor, and borneol; sesquiterpenes such as farnesene, farnesol, nerolidol, juvenile hormone, humulene, caryophyllene, elemene, cadinol, cadinene, and tutin; diterpenes such as geranylgeraniol, phytol, abietic acid, pimaragen, daphnetoxin, taxol, and pimaric acid; sesterterpenes such as geranylfarnesene; triterpenes such as squalene, limonin, camelliagenin, hopane, and lanosterol; and tetraterpenes such as carotenoid.

Among these terpene compounds, the terpene compound is preferably monoterpene, sesquiterpene, or diterpene, more preferably sesquiterpene, and particularly preferably α-farnesene (3,7,11-trimethyldodeca-1,3,6,10-tetraene) and/or β-farnesene (7,11-dimethyl-3-methylidenedodeca-1,6,10-triene). In the present invention, the terpene compounds may be used alone or in combination of two or more.

The content of the terpene compound in the refrigerating oil according to this embodiment is not limited, but is preferably 0.001 to 10 mass %, more preferably 0.01 to 5 mass %, and further preferably 0.05 to 3 mass % relative to the whole amount of the refrigerating oil. If the content of the terpene compound is less than 0.001 mass %, an effect of improving the thermal and chemical stability tends to be insufficient. If the content is more than 10 mass %, the lubricity tends to be insufficient. The content of the terpene compound in the working fluid for a refrigerating machine according to this embodiment is desirably determined so that the content is within the above preferred range when expressed relative to the whole amount of the refrigerating oil.

The refrigerating oil and the working fluid for a refrigerating machine according to this embodiment may contain at least one epoxy compound selected from phenyl glycidyl ether-type epoxy compounds, alkyl glycidyl ether-type epoxy compounds, glycidyl ester-type epoxy compounds, allyloxirane compounds, alkyloxirane compounds, alicyclic epoxy compounds, epoxidized fatty acid monoesters, and epoxidized vegetable oils to further improve the thermal and chemical stability.

Specific examples of the phenyl glycidyl ether-type epoxy compound include phenyl glycidyl ether and alkylphenyl glycidyl ethers. The alkylphenyl glycidyl ether herein is an alkylphenyl glycidyl ether having 1 to 3 alkyl groups with 1 to 13 carbon atoms. In particular, the alkylphenyl glycidyl ether is preferably an alkylphenyl glycidyl ether having one alkyl group with 4 to 10 carbon atoms, such as n-butylphenyl glycidyl ether, i-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether, or decylphenyl glycidyl ether.

Specific examples of the alkyl glycidyl ether-type epoxy compound include decyl glycidyl ether, undecyl glycidyl ether, dodecyl glycidyl ether, tridecyl glycidyl ether, tetradecyl glycidyl ether, 2-ethylhexyl glycidyl ether, neopentyl glycol diglycidyl ether, trimethylolpropane triglycidyl ether, pentaerythritol tetraglycidyl ether, 1,6-hexanediol diglycidyl ether, sorbitol polyglycidyl ether, polyalkylene glycol monoglycidyl ether, and polyalkylene glycol diglycidyl ether.

Specific examples of the glycidyl ester-type epoxy compound include phenyl glycidyl ester, alkyl glycidyl esters, and alkenyl glycidyl esters. Preferred examples of the glycidyl ester-type epoxy compound include glycidyl-2,2-dimethyloctanoate, glycidyl benzoate, glycidyl acrylate, and glycidyl methacrylate.

Specific examples of the allyloxirane compound include 1,2-epoxystyrene and alkyl-1,2-epoxystyrenes.

Specific examples of the alkyloxirane compound include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,1,2-epoxyoctadecane, 2-epoxynonadecane, and 1,2-epoxyeicosane.

Specific examples of the alicyclic epoxy compound include 1,2-epoxycyclohexane, 1,2-epoxycyclopentane, 3,4-epoxycyclohexylmethyl-3,4-epoxycyclohexane carboxylate, bis(3,4-epoxycyclohexylmethyl) adipate, exo-2,3-epoxynorbornane, bis(3,4-epoxy-6-methylcyclohexylmethyl)

adipate, 2-(7-oxabicyclo[4.1.0]hept-3-yl)-spiro(1,3-dioxane-5,3'-[7]oxabicyclo[4.1.0]heptane, 4-(1'-methylepoxyethyl)-1,2-epoxy-2-methylcyclohexane, and 4-epoxyethyl-1,2-epoxycyclohexane.

Specific examples of the epoxidized fatty acid monoester include esters of an epoxidized fatty acid having 12 to 20 carbon atoms and an alcohol having 1 to 8 carbon atoms, phenol, or an alkylphenol. In particular, butyl, hexyl, benzyl, cyclohexyl, methoxyethyl, octyl, phenyl, and butyl phenyl esters of epoxystearic acid are preferably used.

Specific examples of the epoxidized vegetable oil include epoxy compounds of vegetable oils such as soybean oil, linseed oil, and cottonseed oil.

Among these epoxy compounds, phenyl glycidyl ether-type epoxy compounds, alkyl glycidyl ether-type epoxy compounds, glycidyl ester-type epoxy compounds, and alicyclic epoxy compounds are preferred.

When the refrigerating oil and the working fluid for a refrigerating machine according to this embodiment contain the above-described epoxy compound, the content of the epoxy compound is not limited, but is preferably 0.01 to 5.0 mass % and more preferably 0.1 to 3.0 mass % relative to the whole amount of the refrigerating oil. The above-described epoxy compounds may be used alone or in combination of two or more.

The kinematic viscosity of the refrigerating oil containing the polyhydric alcohol fatty acid ester (A) at 40° C. is preferably 20 to 80 $mm^2/s$, more preferably 25 to 75 $mm^2/s$, and most preferably 30 to 70 $mm^2/s$. The kinematic viscosity at 100° C. is preferably 2 to 20 $mm^2/s$ and more preferably 3 to 10 $mm^2/s$. When the kinematic viscosity is more than or equal to the lower limit, the viscosity required as a refrigerating oil is easily achieved. On the other hand, when the kinematic viscosity is less than or equal to the upper limit, sufficient miscibility with difluoromethane in the case where the difluoromethane is contained as a refrigerant composition can be achieved.

The volume resistivity of the refrigerating oil containing the polyhydric alcohol fatty acid ester (A) is not limited, but is preferably $1.0\times10^{12}$ Ω·cm or more, more preferably $1.0\times10^{13}$ Ω·cm or more, and most preferably $1.0\times10^{14}$ Ω·cm or more. In particular, when the refrigerating oil is used for sealed refrigerating machines, high electric insulation tends to be required. The volume resistivity refers to a value measured at 25° C. in conformity with JIS C 2101 "Testing methods of electrical insulating oils".

The water content of the refrigerating oil containing the polyhydric alcohol fatty acid ester (A) is not limited, but is preferably 200 ppm or less, more preferably 100 ppm or less, and most preferably 50 ppm or less relative to the whole amount of the refrigerating oil. In particular, when the refrigerating oil is used for sealed refrigerating machines, the water content needs to be low from the viewpoints of the thermal and chemical stability of the refrigerating oil and the influence on electric insulation.

The acid number of the refrigerating oil containing the polyhydric alcohol fatty acid ester (A) is not limited, but is preferably 0.1 mgKOH/g or less and more preferably 0.05 mgKOH/g or less to prevent corrosion of metals used for refrigerating machines or pipes. In the present invention, the acid number refers to an acid number measured in conformity with JIS K 2501 "Petroleum products and lubricants—Determination of neutralization number".

The ash content of the refrigerating oil containing the polyhydric alcohol fatty acid ester (A) is not limited, but is preferably 100 ppm or less and more preferably 50 ppm or less to improve the thermal and chemical stability of the refrigerating oil and suppress the generation of sludge and the like. The ash content refers to an ash content measured in conformity with JIS K 2272 "Crude oil and petroleum products—Determination of ash and sulfated ash".

(Complex Ester Oil)

The complex ester oil is an ester of a fatty acid and a dibasic acid, and a monohydric alcohol and a polyol. The above-described fatty acid, dibasic acid, monohydric alcohol, and polyol can be used.

Examples of the fatty acid include the fatty acids mentioned in the polyol ester.

Examples of the dibasic acid include oxalic acid, malonic acid, succinic acid, glutaric acid, adipic acid, pimelic acid, suberic acid, azelaic acid, sebacic acid, phthalic acid, isophthalic acid, and terephthalic acid.

Examples of the polyol include the polyhydric alcohols in the polyol ester. The complex ester is an ester of such a fatty acid, dibasic acid, and polyol, each of which may be constituted by a single component or a plurality of components.

(Polyol Carbonate Oil)

The polyol carbonate oil is an ester of a carbonic acid and a polyol.

Examples of the polyol include the above-described diols and polyols.

The polyol carbonate oil may be a ring-opened polymer of a cyclic alkylene carbonate.

(2-1-2) Ether-Type Refrigerating Oil

The ether-type refrigerating oil is, for example, a polyvinyl ether oil or a polyoxyalkylene oil.

(Polyvinyl Ether Oil)

Examples of the polyvinyl ether oil include polymers of a vinyl ether monomer, copolymers of a vinyl ether monomer and a hydrocarbon monomer having an olefinic double bond, and copolymers of a monomer having an olefinic double bond and a polyoxyalkylene chain and a vinyl ether monomer.

The carbon/oxygen molar ratio of the polyvinyl ether oil is preferably 2 or more and 7.5 or less and more preferably 2.5 or more and 5.8 or less. If the carbon/oxygen molar ratio is smaller than the above range, the hygroscopicity increases. If the carbon/oxygen molar ratio is larger than the above range, the miscibility deteriorates. The weight-average molecular weight of the polyvinyl ether is preferably 200 or more and 3000 or less and more preferably 500 or more and 1500 or less.

The pour point of the polyvinyl ether oil is preferably −30° C. or lower. The surface tension of the polyvinyl ether oil at 20° C. is preferably 0.02 N/m or more and 0.04 N/m or less. The density of the polyvinyl ether oil at 15° C. is preferably 0.8 $g/cm^3$ or more and 1.8 $g/cm^3$ or less. The saturated water content of the polyvinyl ether oil at a temperature of 30° C. and a relative humidity of 90% is preferably 2000 ppm or more.

The refrigerating oil may contain polyvinyl ether as a main component. In the case where HFO-1234yf is contained as a refrigerant, the polyvinyl ether serving as a main component of the refrigerating oil has miscibility with HFO-1234yf. When the refrigerating oil has a kinematic viscosity at 40° C. of 400 $mm^2/s$ or less, HFO-1234yf is dissolved in the refrigerating oil to some extent. When the refrigerating oil has a pour point of −30° C. or lower, the flowability of the refrigerating oil is easily ensured even at positions at which the temperature of the refrigerant composition and the refrigerating oil is low in the refrigerant circuit. When the refrigerating oil has a surface tension at 20° C. of 0.04 N/m or less, the refrigerating oil discharged from a compressor does not readily form large droplets of oil that are not easily carried away by a refrigerant composition. Therefore, the refrigerating oil discharged from the compressor is dissolved in HFO-1234yf and is easily returned to the compressor together with HFO-1234yf.

When the refrigerating oil has a kinematic viscosity at 40° C. of 30 $mm^2/s$ or more, an insufficient oil film strength due to excessively low kinematic viscosity is suppressed, and thus good lubricity is easily achieved. When the refrigerating oil has a surface tension at 20° C. of 0.02 N/m or more, the refrigerating oil does not readily form small droplets of oil in a gas refrigerant inside the compressor, which can suppress discharge of a large amount of refrigerating oil from the compressor. Therefore, a sufficient amount of refrigerating oil is easily stored in the compressor.

When the refrigerating oil has a saturated water content at 30° C./90% RH of 2000 ppm or more, a relatively high hygroscopicity of the refrigerating oil can be achieved. Thus, when HFO-1234yf is contained as a refrigerant, water in HFO-1234yf can be captured by the refrigerating oil to some extent. HFO-1234yf has a molecular structure that is easily altered or deteriorated because of the influence of water contained. Therefore, the hydroscopic effects of the refrigerating oil can suppress such deterioration.

Furthermore, when a particular resin functional component is disposed in the sealing portion or sliding portion that is in contact with a refrigerant flowing through the refrigerant circuit and the resin functional component is formed of any of polytetrafluoroethylene, polyphenylene sulfide, phenolic resin, polyamide resin, chloroprene rubber, silicon rubber, hydrogenated nitrile rubber, fluororubber, and hydrin rubber, the aniline point of the refrigerating oil is preferably set within a particular range in consideration of the adaptability with the resin functional component. By setting the aniline point in such a manner, for example, the adaptability of bearings constituting the resin functional component with the refrigerating oil is improved. Specifically, if the aniline point is excessively low, the refrigerating oil readily infiltrates bearings or the like, and the bearings or the like readily swell. On the other hand, if the aniline point is excessively high, the refrigerating oil does not readily infiltrate bearings or the like, and the bearings or the like readily shrink. Therefore, by setting the aniline point of the refrigerating oil within a particular range, the swelling or shrinking of the bearings or the like can be prevented. Herein, for example, if each of the bearings or the like deforms through swelling or shrinking, the desired length of a gap at a sliding portion cannot be maintained. This may increase the sliding resistance or decrease the rigidity of the sliding portion. However, when the aniline point of the refrigerating oil is set within a particular range as described above, the deformation of the bearings or the like through swelling or shrinking is suppressed, and thus such a problem can be avoided.

The vinyl ether monomers may be used alone or in combination of two or more. Examples of the hydrocarbon monomer having an olefinic double bond include ethylene, propylene, various butenes, various pentenes, various hexenes, various heptenes, various octenes, diisobutylene, triisobutylene, styrene, α-methylstyrene, and various alkyl-substituted styrenes. The hydrocarbon monomers having an olefinic double bond may be used alone or in combination of two or more.

The polyvinyl ether copolymer may be a block copolymer or a random copolymer. The polyvinyl ether oils may be used alone or in combination of two or more.

A polyvinyl ether oil preferably used has a structural unit represented by general formula (1) below.

[Chem. 1]

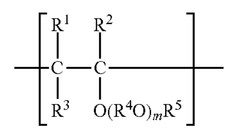

(1)

(In the formula, $R^1$, $R^2$, and $R^3$ may be the same or different and each represent a hydrogen atom or a hydrocarbon group having 1 to 8 carbon atoms, $R^4$ represents a divalent hydrocarbon group having 1 to 10 carbon atoms or an ether bond oxygen-containing divalent hydrocarbon group having 2 to 20 carbon atoms, $R^5$ represents a hydrocarbon group having 1 to 20 carbon atoms, m represents a number at which the average of m in the polyvinyl ether is 0 to 10, $R^1$ to $R^5$ may be the same or different in each of structural units, and when m represents 2 or more in one structural unit, a plurality of $R^4O$ may be the same or different.)

At least one of $R^1$, $R^2$, and $R^3$ in the general formula (1) preferably represents a hydrogen atom. In particular, all of $R^1$, $R^2$, and $R^3$ preferably represent a hydrogen atom. In the general formula (1), m preferably represents 0 or more and 10 or less, particularly preferably 0 or more and 5 or less, further preferably 0. $R^5$ in the general formula (1) represents a hydrocarbon group having 1 to 20 carbon atoms. Specific examples of the hydrocarbon group include alkyl groups such as a methyl group, an ethyl group, a n-propyl group, an isopropyl group, a n-butyl group, an isobutyl group, a sec-butyl group, a tert-butyl group, various pentyl groups, various hexyl groups, various heptyl groups, and various octyl groups; cycloalkyl groups such as a cyclopentyl group, a cyclohexyl group, various methylcyclohexyl groups, various ethylcyclohexyl groups, and various dimethylcyclohexyl groups; aryl groups such as a phenyl group, various methylphenyl groups, various ethylphenyl groups, and various dimethylphenyl groups; and arylalkyl groups such as a benzyl group, various phenylethyl groups, and various methylbenzyl groups. Among the alkyl groups, the cycloalkyl groups, the phenyl group, the aryl groups, and the arylalkyl groups, alkyl groups, in particular, alkyl groups having 1 to 5 carbon atoms are preferred. For the polyvinyl ether oil contained, the ratio of a polyvinyl ether oil with $R^5$ representing an alkyl group having 1 or 2 carbon atoms and a polyvinyl ether oil with $R^5$ representing an alkyl group having 3 or 4 carbon atoms is preferably 40%:60% to 100%:0%.

The polyvinyl ether oil according to this embodiment may be a homopolymer constituted by the same structural unit represented by the general formula (1) or a copolymer constituted by two or more structural units. The copolymer may be a block copolymer or a random copolymer.

The polyvinyl ether oil according to this embodiment may be constituted by only the structural unit represented by the general formula (1) or may be a copolymer further including a structural unit represented by general formula (2) below. In this case, the copolymer may be a block copolymer or a random copolymer.

[Chem. 2]

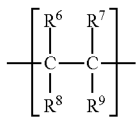

(2)

(In the formula, $R^6$ to $R^9$ may be the same or different and each represent a hydrogen atom or a hydrocarbon group having 1 to 20 carbon atoms.)

The vinyl ether monomer is, for example, a compound represented by general formula (3) below.

[Chem. 3]

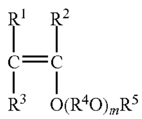

(3)

(In the formula, $R^1$, $R^2$, $R^3$, $R^4$, $R^5$, and m have the same meaning as $R^1$, $R^2$, $R^3$, $R^4$, $R^5$, and m in the general formula (1), respectively.)

Examples of various polyvinyl ether compounds corresponding to the above polyvinyl ether compound include vinyl methyl ether; vinyl ethyl ether; vinyl-n-propyl ether; vinyl-isopropyl ether; vinyl-n-butyl ether; vinyl-isobutyl ether; vinyl-sec-butyl ether; vinyl-tert-butyl ether; vinyl-n-pentyl ether; vinyl-n-hexyl ether; vinyl-2-methoxyethyl ether; vinyl-2-ethoxyethyl ether; vinyl-2-methoxy-1-methylethyl ether; vinyl-2-methoxy-propyl ether; vinyl-3,6-dioxaheptyl ether; vinyl-3,6,9-trioxadecylether; vinyl-1,4-dimethyl-3,6-dioxaheptyl ether; vinyl-1,4,7-trimethyl-3,6,9-trioxadecyl ether; vinyl-2,6-dioxa-4-heptyl ether; vinyl-2,6,9-trioxa-4-decyl ether; 1-methoxypropene; 1-ethoxypropene; 1-n-propoxypropene; 1-isopropoxypropene; 1-n-butoxypropene; 1-isobutoxypropene; 1-sec-butoxypropene; 1-tert-butoxypropene; 2-methoxypropene; 2-ethoxypropene; 2-n-propoxypropene; 2-isopropoxypropene; 2-n-butoxypropene; 2-isobutoxypropene; 2-sec-butoxypropene; 2-tert-butoxypropene; 1-methoxy-1-butene; 1-ethoxy-1-butene; 1-n-propoxy-1-butene; 1-isopropoxy-1-butene; 1-n-butoxy-1-butene; 1-isobutoxy-1-butene; 1-sec-butoxy-1-butene; 1-tert-butoxy-1-butene; 2-methoxy-1-butene; 2-ethoxy-1-butene; 2-n-propoxy-1-butene; 2-isopropoxy-1-butene; 2-n-butoxy-1-butene; 2-isobutoxy-1-butene; 2-sec-butoxy-1-butene; 2-tert-butoxy-1-butene; 2-methoxy-2-butene; 2-ethoxy-2-butene; 2-n-propoxy-2-butene; 2-isopropoxy-2-butene; 2-n-butoxy-2-butene; 2-isobutoxy-2-butene; 2-sec-butoxy-2-butene; and 2-tert-butoxy-2-butene. These vinyl ether monomers can be produced by a publicly known method.

The end of the polyvinyl ether compound having the structural unit represented by the general formula (1) can be converted into a desired structure by a method described in the present disclosure and a publicly known method. Examples of the group introduced by conversion include saturated hydrocarbons, ethers, alcohols, ketones, amides, and nitriles.

The polyvinyl ether compound preferably has the following end structures.

[Chem. 4]

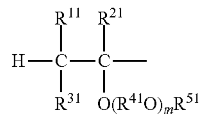

(4)

(In the formula, $R^{11}$, $R^{21}$, and $R^{31}$ may be the same or different and each represent a hydrogen atom or a hydrocarbon group having 1 to 8 carbon atoms, $R^{41}$ represents a divalent hydrocarbon group having 1 to 10 carbon atoms or an ether bond oxygen-containing divalent hydrocarbon group having 2 to 20 carbon atoms, $R^{51}$ represents a hydrocarbon group having 1 to 20 carbon atoms, m represents a number at which the average of m in the polyvinyl ether is 0 to 10, and when m represents 2 or more, a plurality of $R^{41}O$ may be the same or different.)

[Chem. 5]

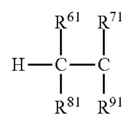

(5)

(In the formula, $R^6$, $R^{71}$, $R^{81}$, and $R^{91}$ may be the same or different and each represent a hydrogen atom or a hydrocarbon group having 1 to 20 carbon atoms.)

[Chem. 6]

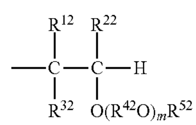

(6)

(In the formula, $R^{12}$, $R^{22}$, and $R^{32}$ may be the same or different and each represent a hydrogen atom or a hydrocarbon group having 1 to 8 carbon atoms, $R^{42}$ represents a divalent hydrocarbon group having 1 to 10 carbon atoms or an ether bond oxygen-containing divalent hydrocarbon group having 2 to 20 carbon atoms, $R^{52}$ represents a hydrocarbon group having 1 to 20 carbon atoms, m represents a number at which the average of m in the polyvinyl ether is 0 to 10, and when m represents 2 or more, a plurality of $R^{42}O$ may be the same or different.)

[Chem. 7]

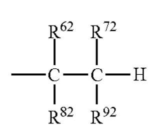

(7)

(In the formula, $R^{62}$, $R^{72}$, $R^2$, and $R^{92}$ may be the same or different and each represent a hydrogen atom or a hydrocarbon group having 1 to 20 carbon atoms.)

[Chem. 8]

(8)

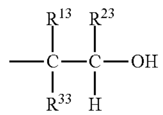

(In the formula, $R^{13}$, $R^{23}$, and $R^{33}$ may be the same or different and each represent a hydrogen atom or a hydrocarbon group having 1 to 8 carbon atoms.)

The polyvinyl ether oil according to this embodiment can be produced by polymerizing the above-described monomer through, for example, radical polymerization, cationic polymerization, or radiation-induced polymerization. After completion of the polymerization reaction, a typical separation/purification method is performed when necessary to obtain a desired polyvinyl ether compound having a structural unit represented by the general formula (1).

(Polyoxyalkylene Oil)

The polyoxyalkylene oil is a polyoxyalkylene compound obtained by, for example, polymerizing an alkylene oxide having 2 to 4 carbon atoms (e.g., ethylene oxide or propylene oxide) using water or a hydroxyl group-containing compound as an initiator. The hydroxyl group of the polyoxyalkylene compound may be etherified or esterified. The polyoxyalkylene oil may contain an oxyalkylene unit of the same type or two or more oxyalkylene units in one molecule. The polyoxyalkylene oil preferably contains at least an oxypropylene unit in one molecule.

Specifically, the polyoxyalkylene oil is, for example, a compound represented by general formula (9) below.

$$R^{101}\text{—}[(OR^{102})_k\text{—}OR^{103}]_l \quad (9)$$

(In the formula, $R^{101}$ represents a hydrogen atom, an alkyl group having 1 to 10 carbon atoms, an acyl group having 2 to 10 carbon atoms, or an aliphatic hydrocarbon group having 2 to 6 bonding sites and 1 to 10 carbon atoms, $R^{102}$ represents an alkylene group having 2 to 4 carbon atoms, $R^{103}$ represents a hydrogen atom, an alkyl group having 1 to 10 carbon atoms, or an acyl group having 2 to 10 carbon atoms, 1 represents an integer of 1 to 6, and k represents a number at which the average of k×l is 6 to 80.)

In the general formula (9), the alkyl group represented by $R^{101}$ and $R^{103}$ may be a linear, branched, or cyclic alkyl group. Specific examples of the alkyl group include a methyl group, an ethyl group, a n-propyl group, an isopropyl group, various butyl groups, various pentyl groups, various hexyl groups, various heptyl groups, various octyl groups, various nonyl groups, various decyl groups, a cyclopentyl group, and a cyclohexyl group. If the number of carbon atoms of the alkyl group exceeds 10, the miscibility with a refrigerant deteriorates, which may cause phase separation. The number of carbon atoms of the alkyl group is preferably 1 to 6.

The acyl group represented by $R^{101}$ and $R^{103}$ may have a linear, branched, or cyclic alkyl group moiety. Specific examples of the alkyl group moiety of the acyl group include various groups having 1 to 9 carbon atoms that are mentioned as specific examples of the alkyl group. If the number of carbon atoms of the acyl group exceeds 10, the miscibility with a refrigerant deteriorates, which may cause phase separation. The number of carbon atoms of the acyl group is preferably 2 to 6.

When $R^{101}$ and $R^{103}$ each represent an alkyl group or an acyl group, $R^{101}$ and $R^{103}$ may be the same or different.

Furthermore, when 1 represents 2 or more, a plurality of $R^{103}$ in one molecule may be the same or different.

When $R^{101}$ represents an aliphatic hydrocarbon group having 2 to 6 bonding sites and 1 to 10 carbon atoms, the aliphatic hydrocarbon group may be a linear group or a cyclic group. Examples of the aliphatic hydrocarbon group having two bonding sites include an ethylene group, a propylene group, a butylene group, a pentylene group, a hexylene group, a heptylene group, an octylene group, a nonylene group, a decylene group, a cyclopentylene group, and a cyclohexylene group. Examples of the aliphatic hydrocarbon group having 3 to 6 bonding sites include residual groups obtained by removing hydroxyl groups from polyhydric alcohols such as trimethylolpropane, glycerol, pentaerythritol, sorbitol, 1,2,3-trihydroxycyclohexane, and 1,3,5-trihydroxycyclohexane.

If the number of carbon atoms of the aliphatic hydrocarbon group exceeds 10, the miscibility with a refrigerant deteriorates, which may cause phase separation. The number of carbon atoms is preferably 2 to 6.

$R^{102}$ in the general formula (9) represents an alkylene group having 2 to 4 carbon atoms. Examples of the oxyalkylene group serving as a repeating unit include an oxyethylene group, an oxypropylene group, and an oxybutylene group. The polyoxyalkylene oil may contain an oxyalkylene group of the same type or two or more oxyalkylene groups in one molecule, but preferably contains at least an oxypropylene unit in one molecule. In particular, the content of the oxypropylene unit in the oxyalkylene unit is suitably 50 mol % or more.

In the general formula (9), l represents an integer of 1 to 6, which can be determined in accordance with the number of bonding sites of $R^1$. For example, when $R^{101}$ represents an alkyl group or an acyl group, l represents 1. When $R^{101}$ represents an aliphatic hydrocarbon group having 2, 3, 4, 5, and 6 bonding sites, l represents 2, 3, 4, 5, and 6, respectively. Preferably, 1 represents 1 or 2. Furthermore, k preferably represents a number at which the average of k×l is 6 to 80.

For the structure of the polyoxyalkylene oil, a polyoxypropylene diol dimethyl ether represented by general formula (10) below and a poly(oxyethylene/oxypropylene) diol dimethyl ether represented by general formula (11) below are suitable from the viewpoints of economy and the above-described effects. Furthermore, a polyoxypropylene diol monobutyl ether represented by general formula (12) below, a polyoxypropylene diol monomethyl ether represented by general formula (13) below, a poly(oxyethylene/oxypropylene) diol monomethyl ether represented by general formula (14) below, a poly(oxyethylene/oxypropylene) diol monobutyl ether represented by general formula (15) below, and a polyoxypropylene diol diacetate represented by general formula (16) below are suitable from the viewpoint of economy and the like.

$$CH_3O—(C_3H_6O)_h—CH_3 \quad (10)$$

(In the formula, h represents 6 to 80.)

$$CH_3O—(C_2H_4O)_i—(C_3H_6O)_j—CH_3 \quad (11)$$

(In the formula, i and j each represent 1 or more and the sum of i and j is 6 to 80.)

$$C_4H_9O—(C_3H_6O)_h—H \quad (12)$$

(In the formula, h represents 6 to 80.)

$$CH_3O—(C_3H_6O)_h—H \quad (13)$$

(In the formula, h represents 6 to 80.)

$$CH_3O—(C_2H_4O)_i—(C_3H_6O)_j—H \quad (14)$$

(In the formula, i and j each represent 1 or more and the sum of i and j is 6 to 80.)

$$C_4H_9O—(C_2H_4O)_i—(C_3H_6O)_j—H \quad (15)$$

(In the formula, i and j each represent 1 or more and the sum of i and j is 6 to 80.)

$$CH_3COO—(C_3H_6O)_h—COCH_3 \quad (16)$$

(In the formula, h represents 6 to 80.)

The polyoxyalkylene oils may be used alone or in combination of two or more.

(2-2) Hydrocarbon Refrigerating Oil

The hydrocarbon refrigerating oil that can be used is, for example, an alkylbenzene.

The alkylbenzene that can be used is a branched alkylbenzene synthesized from propylene polymer and benzene serving as raw materials using a catalyst such as hydrogen fluoride or a linear alkylbenzene synthesized from normal paraffin and benzene serving as raw materials using the same catalyst. The number of carbon atoms of the alkyl group is preferably 1 to 30 and more preferably 4 to 20 from the viewpoint of achieving a viscosity appropriate as a lubricating base oil. The number of alkyl groups in one molecule of the alkylbenzene is dependent on the number of carbon atoms of the alkyl group, but is preferably 1 to 4 and more preferably 1 to 3 to control the viscosity within the predetermined range.

The hydrocarbon refrigerating oil preferably circulates through a refrigeration cycle system together with a refrigerant. Although it is most preferable that the refrigerating oil is soluble with a refrigerant, for example, a refrigerating oil (e.g., a refrigerating oil disclosed in Japanese Patent No. 2803451) having low solubility can also be used as long as the refrigerating oil is capable of circulating through a refrigeration cycle system together with a refrigerant. To allow the refrigerating oil to circulate through a refrigeration cycle system, the refrigerating oil is required to have a low kinematic viscosity. The kinematic viscosity of the hydrocarbon refrigerating oil at 40° C. is preferably 1 $mm^2/s$ or more and 50 $mm^2/s$ or less and more preferably 1 $mm^2/s$ or more and 25 $mm^2/s$ or less.

These refrigerating oils may be used alone or in combination of two or more.

The content of the hydrocarbon refrigerating oil in the working fluid for a refrigerating machine may be, for example, 10 parts by mass or more and 100 parts by mass or less and is more preferably 20 parts by mass or more and 50 parts by mass or less relative to 100 parts by mass of the refrigerant composition.

(2-3) Additive

The refrigerating oil may contain one or two or more additives.

Examples of the additives include an acid scavenger, an extreme pressure agent, an antioxidant, an antifoaming agent, an oiliness improver, a metal deactivator such as a copper deactivator, an anti-wear agent, and a compatibilizer.

Examples of the acid scavenger that can be used include epoxy compounds such as phenyl glycidyl ether, alkyl glycidyl ether, alkylene glycol glycidyl ether, cyclohexene oxide, α-olefin oxide, and epoxidized soybean oil; and carbodiimides. Among them, phenyl glycidyl ether, alkyl glycidyl ether, alkylene glycol glycidyl ether, cyclohexene oxide, and α-olefin oxide are preferred from the viewpoint of miscibility. The alkyl group of the alkyl glycidyl ether and the alkylene group of the alkylene glycol glycidyl ether may have a branched structure. The number of carbon atoms may be 3 or more and 30 or less, and is more preferably 4 or more and 24 or less and further preferably 6 or more and 16 or less. The total number of carbon atoms of the α-olefin oxide may be 4 or more and 50 or less, and is more preferably 4 or more and 24 or less and further preferably 6 or more and 16 or less. The acid scavengers may be used alone or in combination of two or more.

The extreme pressure agent may contain, for example, a phosphoric acid ester. Examples of the phosphoric acid ester that can be used include phosphoric acid esters, phosphorous acid esters, acidic phosphoric acid esters, and acidic phosphorous acid esters. The extreme pressure agent may contain an amine salt of a phosphoric acid ester, a phosphorous acid ester, an acidic phosphoric acid ester, or an acidic phosphorous acid ester.

Examples of the phosphoric acid ester include triaryl phosphates, trialkyl phosphates, trialkylaryl phosphates, triarylalkyl phosphates, and trialkenyl phosphates. Specific examples of the phosphoric acid ester include triphenyl phosphate, tricresyl phosphate, benzyl diphenyl phosphate, ethyl diphenyl phosphate, tributyl phosphate, ethyl dibutyl phosphate, cresyl diphenyl phosphate, dicresyl phenyl phosphate, ethylphenyl diphenyl phosphate, diethylphenyl phenyl phosphate, propylphenyl diphenyl phosphate, dipropylphenyl phenyl phosphate, triethylphenyl phosphate, tripropylphenyl phosphate, butylphenyl diphenyl phosphate, dibutylphenyl phenyl phosphate, tributylphenyl phosphate, trihexyl phosphate, tri(2-ethylhexyl) phosphate, tridecyl phosphate, trilauryl phosphate, trimyristyl phosphate, tripalmityl phosphate, tristearyl phosphate, and trioleyl phosphate.

Specific examples of the phosphorous acid ester include triethyl phosphite, tributyl phosphite, triphenyl phosphite, tricresyl phosphite, tri(nonylphenyl) phosphite, tri(2-ethylhexyl) phosphite, tridecyl phosphite, trilauryl phosphite, triisooctyl phosphite, diphenylisodecyl phosphite, tristearyl phosphite, and trioleyl phosphite.

Specific examples of the acidic phosphoric acid ester include 2-ethylhexyl acid phosphate, ethyl acid phosphate, butyl acid phosphate, oleyl acid phosphate, tetracosyl acid phosphate, isodecyl acid phosphate, lauryl acid phosphate, tridecyl acid phosphate, stearyl acid phosphate, and isostearyl acid phosphate.

Specific examples of the acidic phosphorous acid ester include dibutyl hydrogen phosphite, dilauryl hydrogen phosphite, dioleyl hydrogen phosphite, distearyl hydrogen phosphite, and diphenyl hydrogen phosphite. Among the phosphoric acid esters, oleyl acid phosphate and stearyl acid phosphate are suitably used.

Among amines used for amine salts of phosphoric acid esters, phosphorous acid esters, acidic phosphoric acid esters, or acidic phosphorous acid esters, specific examples of mono-substituted amines include butylamine, pentylamine, hexylamine, cyclohexylamine, octylamine, laurylamine, stearylamine, oleylamine, and benzylamine. Specific examples of di-substituted amines include dibutylamine, dipentylamine, dihexylamine, dicyclohexylamine, dioctylamine, dilaurylamine, distearylamine, dioleylamine, dibenzylamine, stearyl-monoethanolamine, decyl-monoethanolamine, hexyl-monopropanolamine, benzyl-monoethanolamine, phenyl-monoethanolamine, and tolyl-monopropanolamine. Specific examples of tri-substituted amines include tributylamine, tripentylamine, trihexylamine, tricyclohexylamine, trioctylamine, trilaurylamine, tristearylamine, trioleylamine, tribenzylamine, dioleyl-monoethanolamine, dilauryl-monopropanolamine, dioctyl-monoethanolamine, dihexyl-monopropanolamine, dibutyl-monopropanolamine, oleyl-diethanolamine, stearyl-dipropanolamine, lauryl-diethanolamine, octyl-dipropanolamine, butyl-diethanolamine, benzyl-diethanolamine, phenyl-diethanolamine, tolyl-dipropanolamine, xylyl-diethanolamine, triethanolamine, and tripropanolamine.

Examples of extreme pressure agents other than the above-described extreme pressure agents include extreme pressure agents based on organosulfur compounds such as monosulfides, polysulfides, sulfoxides, sulfones, thiosulfinates, sulfurized fats and oils, thiocarbonates, thiophenes, thiazoles, and methanesulfonates; extreme pressure agents based on thiophosphoric acid esters such as thiophosphoric acid triesters; extreme pressure agents based on esters such as higher fatty acids, hydroxyaryl fatty acids, polyhydric alcohol esters, and acrylic acid esters; extreme pressure agents based on organochlorine compounds such as chlorinated hydrocarbons, e.g., chlorinated paraffin and chlorinated carboxylic acid derivatives; extreme pressure agents based on fluoroorganic compounds such as fluorinated aliphatic carboxylic acids, fluorinated ethylene resins, fluorinated alkylpolysiloxanes, and fluorinated graphites; extreme pressure agents based on alcohols such as higher alcohols; and extreme pressure agents based on metal compounds such as naphthenic acid salts (e.g., lead naphthenate), fatty acid salts (e.g., lead fatty acid), thiophosphoric acid salts (e.g., zinc dialkyldithiophosphate), thiocarbamic acid salts, organomolybdenum compounds, organotin compounds, organogermanium compounds, and boric acid esters.

The antioxidant that can be used is, for example, a phenol-based antioxidant or an amine-based antioxidant. Examples of the phenol-based antioxidant include 2,6-di-tert-butyl-4-methylphenol (DBPC), 2,6-di-tert-butyl-4-ethylphenol, 2,2'-methylenebis(4-methyl-6-tert-butylphenol), 2,4-dimethyl-6-tert-butylphenol, 2,6-di-tert-butylphenol, di-tert-butyl-p-cresol, and bisphenol A. Examples of the amine-based antioxidant include N,N'-diisopropyl-p-phenylenediamine, N,N'-di-sec-butyl-p-phenylenediamine, phenyl-α-naphthylamine, N,N'-di-phenyl-p-phenylenediamine, and N,N-di(2-naphthyl)-p-phenylenediamine. An oxygen scavenger that captures oxygen can also be used as the antioxidant.

The antifoaming agent that can be used is, for example, a silicon compound.

The oiliness improver that can be used is, for example, a higher alcohol or a fatty acid.

The metal deactivator such as a copper deactivator that can be used is, for example, benzotriazole or a derivative thereof.

The anti-wear agent that can be used is, for example, zinc dithiophosphate.

The compatibilizer is not limited, and can be appropriately selected from commonly used compatibilizers. The compatibilizers may be used alone or in combination of two or more. Examples of the compatibilizer include polyoxyalkylene glycol ethers, amides, nitriles, ketones, chlorocarbons, esters, lactones, aryl ethers, fluoroethers, and 1,1,1-trifluoroalkanes. The compatibilizer is particularly preferably a polyoxyalkylene glycol ether.

The refrigerating oil may optionally contain, for example, a load-bearing additive, a chlorine scavenger, a detergent dispersant, a viscosity index improver, a heat resistance improver, a stabilizer, a corrosion inhibitor, a pour-point depressant, and an anticorrosive.

The content of each additive in the refrigerating oil may be 0.01 mass % or more and mass % or less and is preferably 0.05 mass % or more and 3 mass % or less. The content of the additive in the working fluid for a refrigerating machine constituted by the refrigerant composition and the refrigerating oil is preferably 5 mass % or less and more preferably 3 mass % or less.

The refrigerating oil preferably has a chlorine concentration of 50 ppm or less and preferably has a sulfur concentration of 50 ppm or less.

(3) Embodiment of the Technique of Third Group

A refrigeration apparatus of the technique of first group and third group is an air conditioning apparatus.

(3-1) First Embodiment

An air conditioning apparatus 1 serving as a refrigeration cycle apparatus according to a first embodiment is described below with reference to FIG. 3A which is a schematic configuration diagram of a refrigerant circuit and FIG. 3B which is a schematic control block configuration diagram.

The air conditioning apparatus 1 is an apparatus that controls the condition of air in a subject space by performing a vapor compression refrigeration cycle.

The air conditioning apparatus 1 mainly includes an outdoor unit 20, an indoor unit 30, a liquid-side connection pipe 6 and a gas-side connection pipe 5 that connect the outdoor unit 20 and the indoor unit 30 to each other, a remote controller (not illustrated) serving as an input device and an output device, and a controller 7 that controls operations of the air conditioning apparatus 1.

The air conditioning apparatus 1 performs a refrigeration cycle in which a refrigerant enclosed in a refrigerant circuit 10 is compressed, cooled or condensed, decompressed, heated or evaporated, and then compressed again. In the present embodiment, the refrigerant circuit is filled with a refrigerant for performing a vapor compression refrigeration cycle. The refrigerant is a mixed refrigerant containing 1,2-difluoroethylene, and can use any one of the above-described refrigerants A to D. Moreover, the refrigerant circuit 10 is filled with a refrigerator oil together with the mixed refrigerant.

(3-1-1) Outdoor Unit 20

The outdoor unit 20 is connected to the indoor unit 30 via the liquid-side connection pipe 6 and the gas-side connection pipe 5, and constitutes a part of the refrigerant circuit 10. The outdoor unit 20 mainly includes a compressor 21, a four-way switching valve 22, an outdoor heat exchanger 23, an outdoor expansion valve 24, an outdoor fan 25, a liquid-side shutoff valve 29, and a gas-side shutoff valve 28.

The compressor 21 is a device that compresses the refrigerant with a low pressure in the refrigeration cycle until the refrigerant becomes a high-pressure refrigerant. In this case, a compressor having a hermetically sealed structure in which a compression element (not illustrated) of positive-displacement type, such as rotary type or scroll type, is rotationally driven by a compressor motor is used as the compressor 21. The compressor motor is for changing the capacity, and has an operational frequency that can be controlled by an inverter. The compressor 21 is provided with an additional accumulator (not illustrated) on the suction side (note that the inner capacity of the additional accumulator is smaller than each of the inner capacities of a low-pressure receiver, an intermediate-pressure receiver, and a high-pressure receiver which are described later, and is preferably less than or equal to a half of each of the inner capacities).

The four-way switching valve 22, by switching the connection state, can switch the state between a cooling operation connection state in which the discharge side of the compressor 21 is connected to the outdoor heat exchanger 23 and the suction side of the compressor 21 is connected to the gas-side shutoff valve 28, and a heating operation connection state in which the discharge side of the compressor 21 is connected to the gas-side shutoff valve 28 and the suction side of the compressor 21 is connected to the outdoor heat exchanger 23.

The outdoor heat exchanger 23 is a heat exchanger that functions as a condenser for the high-pressure refrigerant in the refrigeration cycle during cooling operation and that functions as an evaporator for the low-pressure refrigerant in the refrigeration cycle during heating operation.

The outdoor fan 25 sucks outdoor air into the outdoor unit 20, causes the outdoor air to exchange heat with the refrigerant in the outdoor heat exchanger 23, and then generates an air flow to be discharged to the outside. The outdoor fan 25 is rotationally driven by an outdoor fan motor.

The outdoor expansion valve 24 is provided between a liquid-side end portion of the outdoor heat exchanger 23 and the liquid-side shutoff valve 29. The outdoor expansion valve 24 may be, for example, a capillary tube or a mechanical expansion valve that is used together with a temperature-sensitive tube. Preferably, the outdoor expansion valve 24 is an electric expansion valve that can control the valve opening degree through control.

The liquid-side shutoff valve 29 is a manual valve disposed in a connection portion of the outdoor unit 20 with respect to the liquid-side connection pipe 6.

The gas-side shutoff valve 28 is a manual valve disposed in a connection portion of the outdoor unit 20 with respect to the gas-side connection pipe 5.

The outdoor unit 20 includes an outdoor-unit control unit 27 that controls operations of respective sections constituting the outdoor unit 20. The outdoor-unit control unit 27 includes a microcomputer including a CPU, a memory, and so forth. The outdoor-unit control unit 27 is connected to an indoor-unit control unit 34 of each indoor unit 30 via a communication line, and transmits and receives a control signal and so forth.

The outdoor unit 20 includes, for example, a discharge pressure sensor 61, a discharge temperature sensor 62, a suction pressure sensor 63, a suction temperature sensor 64, an outdoor heat-exchange temperature sensor 65, and an outdoor air temperature sensor 66. Each of the sensors is electrically connected to the outdoor-unit control unit 27, and transmits a detection signal to the outdoor-unit control unit 27. The discharge pressure sensor 61 detects the pressure of the refrigerant flowing through a discharge pipe that connects the discharge side of the compressor 21 to one of connecting ports of the four-way switching valve 22. The discharge temperature sensor 62 detects the temperature of the refrigerant flowing through the discharge pipe. The suction pressure sensor 63 detects the pressure of the refrigerant flowing through a suction pipe that connects the suction side of the compressor 21 to one of the connecting ports of the four-way switching valve 22. The suction temperature sensor 64 detects the temperature of the refrigerant flowing through the suction pipe. The outdoor heat-exchange temperature sensor 65 detects the temperature of the refrigerant flowing through the outlet on the liquid side of the outdoor heat exchanger 23 opposite to the side connected to the four-way switching valve 22. The outdoor air temperature sensor 66 detects the outdoor air temperature before passing through the outdoor heat exchanger 23.

(3-1-2) Indoor Unit 30

The indoor unit 30 is installed on a wall surface or a ceiling in a room that is a subject space. The indoor unit 30 is connected to the outdoor unit 20 via the liquid-side connection pipe 6 and the gas-side connection pipe 5, and constitutes a part of the refrigerant circuit 10.

The indoor unit 30 includes an indoor heat exchanger 31 and an indoor fan 32.

The liquid side of the indoor heat exchanger 31 is connected to the liquid-side connection pipe 6, and the gas-side end thereof is connected to the gas-side connection pipe 5. The indoor heat exchanger 31 is a heat exchanger that functions as an evaporator for the low-pressure refrigerant in the refrigeration cycle during cooling operation and that functions as a condenser for the high-pressure refrigerant in the refrigeration cycle during heating operation.

The indoor fan 32 sucks indoor air into the indoor unit 30, causes the indoor air to exchange heat with the refrigerant in the indoor heat exchanger 31, and then generates an air flow to be discharged to the outside. The indoor fan 32 is rotationally driven by an indoor fan motor.

The indoor unit 30 includes an indoor-unit control unit 34 that controls operations of respective sections constituting the indoor unit 30. The indoor-unit control unit 34 includes a microcomputer including a CPU, a memory, and so forth. The indoor-unit control unit 34 is connected to the outdoor-unit control unit 27 via a communication line, and transmits and receives a control signal and so forth.

The indoor unit 30 includes, for example, an indoor liquid-side heat-exchange temperature sensor 71 and an indoor air temperature sensor 72. Each of the sensors is electrically connected to the indoor-unit control unit 34, and transmits a detection signal to the indoor-unit control unit 34. The indoor liquid-side heat-exchange temperature sensor 71 detects the temperature of the refrigerant flowing through the outlet on the liquid side of the indoor heat exchanger 31 opposite to the side connected to the four-way switching valve 22. The indoor air temperature sensor 72 detects the indoor air temperature before passing through the indoor heat exchanger 31.

(3-1-3) Details of Controller 7

In the air conditioning apparatus 1, the outdoor-unit control unit 27 is connected to the indoor-unit control unit 34 via the communication line, thereby constituting the controller 7 that controls operations of the air conditioning apparatus 1.

The controller 7 mainly includes a CPU (central processing unit) and a memory, such as a ROM or a RAM. Various processing and control by the controller 7 are provided when respective sections included in the outdoor-unit control unit 27 and/or the indoor-unit control unit 34 function together.

(3-1-4) Operating Modes

Operating modes are described below.

The operating modes include a cooling operating mode and a heating operating mode.

The controller 7 determines whether the operating mode is the cooling operating mode or the heating operating mode and executes the determined mode based on an instruction received from the remote controller or the like.

(3-1-4-1) Cooling Operating Mode

In the air conditioning apparatus 1, in the cooling operating mode, the connection state of the four-way switching valve 22 is in the cooling operation connection state in which the discharge side of the compressor 21 is connected to the outdoor heat exchanger 23 and the suction side of the compressor 21 is connected to the gas-side shutoff valve 28, and the refrigerant filled in the refrigerant circuit 10 is circulated mainly sequentially in the compressor 21, the outdoor heat exchanger 23, the outdoor expansion valve 24, and the indoor heat exchanger 31.

More specifically, in the refrigerant circuit 10, when the cooling operating mode is started, the refrigerant is sucked into the compressor 21, compressed, and then discharged.

The compressor 21 performs capacity control in accordance with a cooling load required for the indoor unit 30. The capacity control is not limited, and, for example, controls the operating frequency of the compressor 21 such that, when the air conditioning apparatus 1 is controlled to cause the indoor air temperature to attain a set temperature, the discharge temperature (the detected temperature of the discharge temperature sensor 62) becomes a value corresponding to the difference between the set temperature and the indoor temperature (the detected temperature of the indoor air temperature sensor 72).

The gas refrigerant discharged from the compressor 21 passes through the four-way switching valve 22 and flows into the gas-side end of the outdoor heat exchanger 23.

The gas refrigerant which has flowed into the gas-side end of the outdoor heat exchanger 23 exchanges heat with outdoor-side air supplied by the outdoor fan 25, hence is condensed and turns into a liquid refrigerant in the outdoor heat exchanger 23, and flows out from the liquid-side end of the outdoor heat exchanger 23.

The refrigerant which has flowed out from the liquid-side end of the outdoor heat exchanger 23 is decompressed when passing through the outdoor expansion valve 24. The outdoor expansion valve 24 is controlled, for example, such that the degree of superheating of the refrigerant to be sucked into the compressor 21 becomes a target value of a predetermined degree of superheating. In this case, the degree of superheating of the sucked refrigerant of the compressor 21 can be obtained, for example, by subtracting a saturation temperature corresponding to a suction pressure (the detected pressure of the suction pressure sensor 63) from a suction temperature (the detected temperature of the suction temperature sensor 64). Note that the method of controlling the valve opening degree of the outdoor expansion valve 24 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the outdoor expansion valve 24 passes through the liquid-side shutoff valve 29 and the liquid-side connection pipe 6, and flows into the indoor unit 30.

The refrigerant which has flowed into the indoor unit 30 flows into the indoor heat exchanger 31; exchanges heat with the indoor air supplied by the indoor fan 32, hence is evaporated, and turns into a gas refrigerant in the indoor heat exchanger 30; and flows out from the gas-side end of the indoor heat exchanger 31. The gas refrigerant which has flowed out from the gas-side end of the indoor heat exchanger 31 flows to the gas-side connection pipe 5.

The refrigerant which has flowed through the gas-side connection pipe 5 passes through the gas-side shutoff valve 28 and the four-way switching valve 22, and is sucked into the compressor 21 again.

(3-1-4-2) Heating Operating Mode

In the air conditioning apparatus 1, in the heating operating mode, the connection state of the four-way switching valve 22 is in the heating operation connection state in which the discharge side of the compressor 21 is connected to the gas-side shutoff valve 28 and the suction side of the compressor 21 is connected to the outdoor heat exchanger 23, and the refrigerant filled in the refrigerant circuit 10 is circulated mainly sequentially in the compressor 21, the indoor heat exchanger 31, the outdoor expansion valve 24, and the outdoor heat exchanger 23.

More specifically, in the refrigerant circuit 10, when the heating operating mode is started, the refrigerant is sucked into the compressor 21, compressed, and then discharged.

The compressor 21 performs capacity control in accordance with a heating load required for the indoor unit 30. The capacity control is not limited, and, for example, controls the operating frequency of the compressor 21 such that, when the air conditioning apparatus 1 is controlled to cause the indoor air temperature to attain a set temperature, the discharge temperature (the detected temperature of the discharge temperature sensor 62) becomes a value corresponding to the difference between the set temperature and the indoor temperature (the detected temperature of the indoor air temperature sensor 72).

The gas refrigerant discharged from the compressor 21 flows through the four-way switching valve 22 and the gas-side connection pipe 5, and then flows into the indoor unit 30.

The refrigerant which has flowed into the indoor unit 30 flows into the gas-side end of the indoor heat exchanger 31; exchanges heat with the indoor air supplied by the indoor fan 32, hence is condensed, and turns into a refrigerant in a gas-liquid two-phase state or a liquid refrigerant in the indoor heat exchanger 31; and flows out from the liquid-side end of the indoor heat exchanger 31. The refrigerant which has flowed out from the liquid-side end of the indoor heat exchanger 31 flows to the liquid-side connection pipe 6.

The refrigerant which has flowed through the liquid-side connection pipe 6 flows into the outdoor unit 20, passes through the liquid-side shutoff valve 29, and is decompressed to a low pressure in the refrigeration cycle at the outdoor expansion valve 24. The outdoor expansion valve 24 is controlled, for example, such that the degree of superheating of the refrigerant to be sucked into the compressor 21 becomes a target value of a predetermined degree of superheating. Note that the method of controlling the valve opening degree of the outdoor expansion valve 24 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the outdoor expansion valve 24 flows into the liquid-side end of the outdoor heat exchanger 23.

The refrigerant which has flowed in from the liquid-side end of the outdoor heat exchanger 23 exchanges heat with the outdoor air supplied by the outdoor fan 25, hence is evaporated and turns into a gas refrigerant in the outdoor heat exchanger 23, and flows out from the gas-side end of the outdoor heat exchanger 23.

The refrigerant which has flowed out from the gas-side end of the outdoor heat exchanger 23 passes through the four-way switching valve 22 and is sucked into the compressor 21 again.

(3-1-5) Characteristics of First Embodiment

Since the air conditioning apparatus 1 can perform the refrigeration cycle using the refrigerant containing 1,2-difluoroethylene, the air conditioning apparatus 1 can perform a refrigeration cycle using a small-GWP refrigerant.

(3-2) Second Embodiment

An air conditioning apparatus 1*a* serving as a refrigeration cycle apparatus according to a second embodiment is described below with reference to FIG. 3C which is a schematic configuration diagram of a refrigerant circuit and FIG. 3D which is a schematic control block configuration diagram. Differences from the air conditioning apparatus 1 according to the first embodiment are mainly described below.

(3-2-1) Schematic Configuration of Air Conditioning Apparatus 1*a*

The air conditioning apparatus 1*a* differs from the air conditioning apparatus 1 according to the first embodiment in that the outdoor unit 20 includes a low-pressure receiver 41.

The low-pressure receiver 41 is a refrigerant container that is provided between the suction side of the compressor 21 and one of the connecting ports of the four-way switching valve 22 and that can store an excessive refrigerant in the refrigerant circuit 10 as a liquid refrigerant. Note that, in the present embodiment, the suction pressure sensor 63 and the suction temperature sensor 64 are provided to detect, as a subject, the refrigerant flowing between the low-pressure receiver 41 and the suction side of the compressor 21. Moreover, the compressor 21 is provided with an additional accumulator (not illustrated). The low-pressure receiver 41 is connected to the downstream side of the additional accumulator.

(3-2-2) Cooling Operating Mode

In the air conditioning apparatus 1*a*, in the cooling operating mode, capacity control is performed on the operating frequency of the compressor 21, for example, such that the evaporation temperature of the refrigerant in the refrigerant circuit 10 becomes a target evaporation temperature that is determined in accordance with the difference between the set temperature and the indoor temperature (the detected temperature of the indoor air temperature sensor 72). The evaporation temperature is not limited; however, may be recognized as, for example, the saturation temperature of the refrigerant corresponding to the detected pressure of the suction pressure sensor 63.

The gas refrigerant discharged from the compressor 21 flows through the four-way switching valve 22, the outdoor heat exchanger 23, and the outdoor expansion valve 24 in that order.

In this case, the valve opening degree of the outdoor expansion valve 24 is controlled to satisfy a predetermined condition, for example, such that the degree of subcooling of the refrigerant flowing through the liquid-side outlet of the outdoor heat exchanger 23 becomes a target value. The degree of subcooling of the refrigerant flowing through the liquid-side outlet of the outdoor heat exchanger 23 is not limited; however, for example, can be obtained by subtracting the saturation temperature of the refrigerant corresponding to a high pressure of the refrigerant circuit 10 (the detected pressure of the discharge pressure sensor 61) from the detected temperature of the outdoor heat-exchange temperature sensor 65. Note that the method of controlling the valve opening degree of the outdoor expansion valve 24 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the outdoor expansion valve 24 passes through the liquid-side shutoff valve 29 and the liquid-side connection pipe 6, flows into the indoor unit 30, is evaporated in the indoor heat exchanger 31, and flows into the gas-side connection pipe 5. The refrigerant which has flowed through the gas-side connection pipe 5 passes through the gas-side shutoff valve 28, the four-way switching valve 22, and the low-pressure receiver 41, and is sucked into the compressor 21 again. Note that the low-pressure receiver 41 stores, as an excessive refrigerant, the liquid refrigerant which has not been completely evaporated in the indoor heat exchanger 31.

(3-2-3) Heating Operating Mode

In the air conditioning apparatus 1*a*, in the heating operating mode, capacity control is performed on the operating frequency of the compressor 21, for example, such that the condensation temperature of the refrigerant in the refrigerant circuit 10 becomes a target condensation temperature that is determined in accordance with the difference between the set temperature and the indoor temperature (the detected temperature of the indoor air temperature sensor 72). The condensation temperature is not limited; however, may be recognized as, for example, the saturation temperature of the refrigerant corresponding to the detected pressure of the discharge pressure sensor 61.

The gas refrigerant discharged from the compressor 21 flows through the four-way switching valve 22 and the gas-side connection pipe 5, then flows into the gas-side end of the indoor heat exchanger 31 of the indoor unit 30, and is condensed in the indoor heat exchanger 31. The refrigerant which has flowed out from the liquid-side end of the indoor heat exchanger 31 flows through the liquid-side connection pipe 6, flows into the outdoor unit 20, passes through the liquid-side shutoff valve 29, and is decompressed to a low pressure in the refrigeration cycle at the outdoor expansion valve 24. Note that the valve opening degree of the outdoor expansion valve 24 is controlled to satisfy a predetermined condition, for example, such that the degree of subcooling of the refrigerant flowing through the liquid-side outlet of the indoor heat exchanger 31 becomes a target value. The degree of subcooling of the refrigerant flowing through the liquid-side outlet of the indoor heat exchanger 31 is not limited; however, for example, can be obtained by subtracting the saturation temperature of the refrigerant corresponding to a high pressure of the refrigerant circuit 10 (the detected pressure of the discharge pressure sensor 61) from the detected temperature of the indoor liquid-side heat-exchange temperature sensor 71. Note that the method of controlling the valve opening degree of the outdoor expansion valve 24 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the outdoor expansion valve 24 is evaporated in the outdoor heat exchanger 23, passes through the four-way switching valve 22 and the low-pressure receiver 41, and is sucked into the compressor 21 again. Note that the low-pressure receiver 41 stores, as an excessive refrigerant, the liquid refrigerant which has not been completely evaporated in the outdoor heat exchanger 23.

(3-2-4) Characteristics of Second Embodiment

Since the air conditioning apparatus 1*a* can perform the refrigeration cycle using the refrigerant containing 1,2-difluoroethylene, the air conditioning apparatus 1*a* can perform a refrigeration cycle using a small-GWP refrigerant.

Moreover, since the air conditioning apparatus 1*a* is provided with the low-pressure receiver 41, occurrence of liquid compression is prevented without execution of control (control of the outdoor expansion valve 24) to ensure that the degree of superheating of the refrigerant to be sucked into the compressor 21 is a predetermined value or more. Owing to this, the control of the outdoor expansion valve 24 can be control to sufficiently ensure the degree of subcooling of the refrigerant flowing through the outlet for the outdoor heat exchanger 23 when functioning as the condenser (which is similarly applied to the indoor heat exchanger 31 when functioning as the condenser).

(3-3) Third Embodiment

An air conditioning apparatus 1*b* serving as a refrigeration cycle apparatus according to a third embodiment is described below with reference to FIG. 3E which is a schematic configuration diagram of a refrigerant circuit and FIG. 3F which is a schematic control block configuration diagram. Differences from the air conditioning apparatus 1*a* according to the second embodiment are mainly described below.

(3-3-1) Schematic Configuration of Air Conditioning Apparatus 1*b*

The air conditioning apparatus 1*b* differs from the air conditioning apparatus 1*a* according to the second embodiment in that a plurality of indoor units are provided in parallel and an indoor expansion valve is provided on the liquid-refrigerant side of an indoor heat exchanger in each indoor unit.

The air conditioning apparatus 1*b* includes a first indoor unit 30 and a second indoor unit 35 connected in parallel to each other. Similarly to the above-described embodiment, the first indoor unit 30 includes a first indoor heat exchanger 31 and a first indoor fan 32, and a first indoor expansion valve 33 is provided on the liquid-refrigerant side of the first indoor heat exchanger 31. The first indoor expansion valve 33 is preferably an electric expansion valve of which the valve opening degree is adjustable. Similarly to the above-described embodiment, the first indoor unit 30 includes a first indoor-unit control unit 34; and a first indoor liquid-side heat-exchange temperature sensor 71, a first indoor air temperature sensor 72, and a first indoor gas-side heat-exchange temperature sensor 73 that are electrically connected to the first indoor-unit control unit 34. The first indoor liquid-side heat-exchange temperature sensor 71 detects the temperature of the refrigerant flowing through the outlet on the liquid-refrigerant side of the first indoor heat exchanger 31. The first indoor gas-side heat-exchange temperature sensor 73 detects the temperature of the refrigerant flowing through the outlet on the gas-refrigerant side of the first indoor heat exchanger 31. Similarly to the first indoor unit 30, the second indoor unit 35 includes a second indoor heat exchanger 36 and a second indoor fan 37, and a second indoor expansion valve 38 is provided on the liquid-refrigerant side of the second indoor heat exchanger 36. The second indoor expansion valve 38 is preferably an electric expansion valve of which the valve opening degree is adjustable. Similarly to the first indoor unit 30, the second indoor unit 35 includes a second indoor-unit control unit 39, and a second indoor liquid-side heat-exchange temperature sensor 75, a second indoor air temperature sensor 76, and a second indoor gas-side heat-exchange temperature sensor 77 that are electrically connected to the second indoor-unit control unit 39.

The air conditioning apparatus 1*b* differs from the air conditioning apparatus 1*a* according to the second embodiment in that, in an outdoor unit, the outdoor expansion valve 24 is not provided and a bypass pipe 40 having a bypass expansion valve 49 is provided.

The bypass pipe 40 is a refrigerant pipe that connects a refrigerant pipe extending from the outlet on the liquid-refrigerant side of the outdoor heat exchanger 23 to the liquid-side shutoff valve 29 and a refrigerant pipe extending from one of the connecting ports of the four-way switching valve 22 to the low-pressure receiver 41 to each other. The bypass expansion valve 49 is preferably an electric expansion valve of which the valve opening degree is adjustable. The bypass pipe 40 is not limited to one provided with the electric expansion valve of which the opening degree is adjustable, and may be, for example, one having a capillary tube and an openable and closable electromagnetic valve.

(3-3-2) Cooling Operating Mode

In the air conditioning apparatus 1*b*, in the cooling operating mode, capacity control is performed on the operating frequency of the compressor 21, for example, such that the evaporation temperature of the refrigerant in the refrigerant circuit 10 becomes a target evaporation temperature. In this case, the target evaporation temperature is preferably determined in accordance with one of the indoor units 30 and 35 having the largest difference between the set temperature and the indoor temperature (an indoor unit having the largest load). The evaporation temperature is not limited; however, can be recognized as, for example, the saturation temperature of the refrigerant corresponding to the detected pressure of the suction pressure sensor 63.

The gas refrigerant discharged from the compressor 21 passes through the four-way switching valve 22 and is condensed in the outdoor heat exchanger 23. The refrigerant which has flowed through the outdoor heat exchanger 23 passes through the liquid-side shutoff valve 29 and the liquid-side connection pipe 6, and is sent to the first indoor unit 30 and the second indoor unit 35.

In this case, in the first indoor unit 30, the valve opening degree of the first indoor expansion valve 33 is controlled to satisfy a predetermined condition, for example, such that the degree of superheating of the refrigerant flowing through the gas-side outlet of the first indoor heat exchanger 31 becomes a target value. The degree of superheating of the refrigerant flowing through the gas-side outlet of the first indoor heat exchanger 31 is not limited; however, for example, can be obtained by subtracting the saturation temperature of the refrigerant corresponding to a low pressure of the refrigerant circuit 10 (the detected pressure of the suction pressure sensor 63) from the detected temperature of the first indoor gas-side heat-exchange temperature sensor 73. Moreover, also for the second indoor expansion valve 38 of the second indoor unit 35, similarly to the first indoor expansion valve 33, the valve opening degree of the second indoor expansion valve 38 is controlled to satisfy a predetermined condition, for example, such that the degree of superheating of the refrigerant flowing through the gas-side outlet of the second indoor heat exchanger 36 becomes a target value. The degree of superheating of the refrigerant flowing through the gas-side outlet of the second indoor heat exchanger 36 is not limited, however, for example, can be obtained by subtracting the saturation temperature of the refrigerant corresponding to a low pressure of the refrigerant circuit 10 (the detected pressure of the suction pressure sensor 63) from the detected temperature of the second indoor gas-side heat-exchange temperature sensor 77. Each of the valve opening degrees of the first indoor expansion valve 33 and the second indoor expansion valve 38 may be controlled to satisfy a predetermined condition, for example, such that the degree of superheating of the refrigerant obtained by subtracting the saturation temperature of the refrigerant corresponding to the detected pressure of the suction pressure sensor 63 from the detected temperature of the suction temperature sensor 64. Furthermore, the method of controlling each of the valve opening degrees of the first indoor expansion valve 33 and the second indoor expansion valve 38 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the first indoor expansion valve 33 is evaporated in the first indoor heat exchanger 31, the refrigerant decompressed at the second indoor expansion valve 38 is evaporated in the second indoor heat exchanger 36, and the evaporated refrigerants are joined. Then, the joined refrigerant flows to the gas-side connection pipe 5. The refrigerant which has flowed through the gas-side connection pipe 5 passes through the gas-side shutoff valve 28, the four-way switching valve 22, and the low-pressure receiver 41, and is sucked into the compressor 21 again. Note that the low-pressure receiver 41 stores, as an excessive refrigerant, the liquid refrigerants which have not been completely evaporated in the first indoor heat exchanger 31 and the second indoor heat exchanger 36. Note that the bypass expansion valve 49 of the bypass pipe 40 is controlled to be opened or controlled such that the valve opening degree thereof is increased when the predetermined condition relating to that the refrigerant amount in the outdoor heat exchanger 23 serving as the condenser is excessive. The control on the opening degree of the bypass expansion valve 49 is not limited; however, for example, when the condensation pressure (for example, the detected pressure of the discharge pressure sensor 61) is a predetermined value or more, the control may be of opening the bypass expansion valve 49 or increasing the opening degree of the bypass expansion valve 49. Alternatively, the control may be of switching the bypass expansion valve 49 between an open state and a closed state at a predetermined time interval to increase the passing flow rate.

(3-3-3) Heating Operating Mode

In the air conditioning apparatus 1*b*, in the heating operating mode, capacity control is performed on the operating frequency of the compressor 21, for example, such that the condensation temperature of the refrigerant in the refrigerant circuit 10 becomes a target condensation temperature. In this case, the target condensation temperature is preferably determined in accordance with one of the indoor units 30 and 35 having the largest difference between the set temperature and the indoor temperature (an indoor unit having the largest load). The condensation temperature is not limited; however, may be recognized as, for example, the saturation temperature of the refrigerant corresponding to the detected pressure of the discharge pressure sensor 61.

The gas refrigerant discharged from the compressor 21 flows through the four-way switching valve 22 and the gas-side connection pipe 5; then a portion of the refrigerant flows into the gas-side end of the first indoor heat exchanger 31 of the first indoor unit 30 and is condensed in the first indoor heat exchanger 31; and another portion of the refrigerant flows into the gas-side end of the second indoor heat exchanger 36 of the second indoor unit 35 and is condensed in the second indoor heat exchanger 36.

Note that, the valve opening degree of the first indoor expansion valve 33 of the first indoor unit 30 is controlled to satisfy a predetermined condition, for example, such that the degree of subcooling of the refrigerant flowing through the liquid side of the first indoor heat exchanger 31 becomes a predetermined target value. Also for the second indoor expansion valve 38 of the second indoor unit 35, the valve opening degree of the second indoor expansion valve 38 is controlled likewise to satisfy a predetermined condition, for example, such that the degree of subcooling of the refrigerant flowing through the liquid side of the second indoor heat exchanger 36 becomes a predetermined target value. The degree of subcooling of the refrigerant flowing through the liquid side of the first indoor heat exchanger 31 can be obtained by subtracting the saturation temperature of the refrigerant corresponding to a high pressure of the refrigerant circuit 10 (the detected pressure of the discharge pressure sensor 61) from the detected temperature of the first indoor liquid-side heat-exchange temperature sensor 71. Also, the degree of subcooling of the refrigerant flowing through the liquid side of the second indoor heat exchanger 36 may be similarly obtained by subtracting the saturation temperature of the refrigerant corresponding to a high pressure of the refrigerant circuit 10 (the detected pressure of the discharge pressure sensor 61) from the detected temperature of the second indoor liquid-side heat-exchange temperature sensor 75.

The refrigerant decompressed at the first indoor expansion valve 33 and the refrigerant decompressed at the second indoor expansion valve 38 are joined. The joined refrigerant passes through the liquid-side connection pipe 6 and the liquid-side shutoff valve 29, then is evaporated in the outdoor heat exchanger 23, passes through the four-way switching valve 22 and the low-pressure receiver 41, and is sucked into the compressor 21 again. Note that the low-pressure receiver 41 stores, as an excessive refrigerant, the liquid refrigerant which has not been completely evaporated in the outdoor heat exchanger 23. In heating operation, although not limited, the bypass expansion valve 49 of the bypass pipe 40 may be maintained in, for example, a full-close state.

(3-3-4) Characteristics of Third Embodiment

Since the air conditioning apparatus 1*b* can perform the refrigeration cycle using the refrigerant containing 1,2-difluoroethylene, the air conditioning apparatus 1*b* can perform a refrigeration cycle using a small-GWP refrigerant.

Moreover, since the air conditioning apparatus 1*b* is provided with the low-pressure receiver 41, liquid compression in the compressor 21 can be suppressed. Furthermore, since superheating control is performed on the first indoor expansion valve 33 and the second indoor expansion valve 38 during cooling operation and subcooling control is performed on the first indoor expansion valve 33 and the second indoor expansion valve 38 during heating operation, the capacities of the first indoor heat exchanger 31 and the second indoor heat exchanger 36 are likely sufficiently provided.

(3-4) Fourth Embodiment

An air conditioning apparatus 1*c* serving as a refrigeration cycle apparatus according to a fourth embodiment is described below with reference to FIG. 3G which is a schematic configuration diagram of a refrigerant circuit and FIG. 3H which is a schematic control block configuration diagram. Differences from the air conditioning apparatus 1*a* according to the second embodiment are mainly described below.

(3-4-1) Schematic Configuration of Air Conditioning Apparatus 1*c*

The air conditioning apparatus 1*c* differs from the air conditioning apparatus 1*a* according to the second embodiment in that the outdoor unit 20 does not include the low-pressure receiver 41, but includes a high-pressure receiver 42 and an outdoor bridge circuit 26.

Moreover, the indoor unit 30 includes an indoor liquid-side heat-exchange temperature sensor 71 that detects the temperature of the refrigerant flowing through the liquid side of the indoor heat exchanger 31, an indoor air temperature sensor 72 that detects the temperature of indoor air, and an indoor gas-side heat-exchange temperature sensor 73 that detects the temperature of the refrigerant flowing through the gas side of the indoor heat exchanger 31.

The outdoor bridge circuit 26 is provided between the liquid side of the outdoor heat exchanger 23 and the liquid-side shutoff valve 29, and has four connection portions and check valves provided between the connection portions. Refrigerant pipes extending to the high-pressure receiver 42 are connected to two portions that are included in the four connection portions of the outdoor bridge circuit 26 and that are other than a portion connected to the liquid side of the outdoor heat exchanger 23 and a portion connected to the liquid-side shutoff valve 29. The outdoor expansion valve 24 is provided midway in a refrigerant pipe that is included in the aforementioned refrigerant pipes and that extends from a gas region of the inner space of the high-pressure receiver 42.

(3-4-2) Cooling Operating Mode

In the air conditioning apparatus 1*c*, in the cooling operating mode, capacity control is performed on the operating frequency of the compressor 21, for example, such that the evaporation temperature of the refrigerant in the refrigerant circuit 10 becomes a target evaporation temperature that is determined in accordance with the difference between the set temperature and the indoor temperature (the detected temperature of the indoor air temperature sensor 72). The evaporation temperature is not limited; however, may be recognized as, for example, the detected temperature of the indoor liquid-side heat-exchange temperature sensor 71, or the saturation temperature of the refrigerant corresponding to the detected pressure of the suction pressure sensor 63.

The gas refrigerant discharged from the compressor 21 passes through the four-way switching valve 22 and is condensed in the outdoor heat exchanger 23. The refrigerant which has flowed through the outdoor heat exchanger 23 flows into the high-pressure receiver 42 via a portion of the outdoor bridge circuit 26. Note that the high-pressure receiver 42 stores, as the liquid refrigerant, an excessive refrigerant in the refrigerant circuit 10. The gas refrigerant which has flowed out from the gas region of the high-pressure receiver 42 is decompressed in the outdoor expansion valve 24.

In this case, the valve opening degree of the outdoor expansion valve 24 is controlled to satisfy a predetermined condition, for example, such that the degree of superheating of the refrigerant flowing through the gas-side outlet of the indoor heat exchanger 31 or the degree of superheating of the refrigerant flowing through the suction side of the compressor 21 becomes a target value. Although not limited, the degree of superheating of the refrigerant flowing through the gas-side outlet of the indoor heat exchanger 31 may be obtained by subtracting the saturation temperature of the refrigerant corresponding to a low pressure of the refrigerant circuit 10 (the detected pressure of the suction pressure sensor 63) from the detected temperature of the indoor gas-side heat-exchange temperature sensor 73. Alternatively, the degree of superheating of the refrigerant flowing through the suction side of the compressor 21 may be obtained by subtracting the saturation temperature of the refrigerant corresponding to the detected pressure of the suction pressure sensor 63 from the detected temperature of the suction temperature sensor 64. Note that the method of controlling the valve opening degree of the outdoor expansion valve 24 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the outdoor expansion valve 24 passes through anther portion of the outdoor bridge circuit 26, passes through the liquid-side shutoff valve 29 and the liquid-side connection pipe 6, flows into the indoor unit 30, and is evaporated in the indoor heat exchanger 31. The refrigerant which has flowed through the indoor heat exchanger 31 passes through the gas-side connection pipe 5, the gas-side shutoff valve 28, and the four-way switching valve 22, and is sucked into the compressor 21 again.

(3-4-3) Heating Operating Mode

In the air conditioning apparatus 1*c*, in the heating operating mode, capacity control is performed on the operating frequency of the compressor 21, for example, such that the condensation temperature of the refrigerant in the refrigerant circuit 10 becomes a target condensation temperature that is determined in accordance with the difference between the set temperature and the indoor temperature (the detected temperature of the indoor air temperature sensor 72). The condensation temperature is not limited; however, may be recognized as, for example, the saturation temperature of the refrigerant corresponding to the detected pressure of the discharge pressure sensor 61.

The gas refrigerant discharged from the compressor 21 flows through the four-way switching valve 22 and the gas-side connection pipe 5, then flows into the gas-side end of the indoor heat exchanger 31 of the indoor unit 30, and is condensed in the indoor heat exchanger 31. The refrigerant which has flowed out from the liquid-side end of the indoor heat exchanger 31 flows through the liquid-side connection pipe 6, flows into the outdoor unit 20, passes through the liquid-side shutoff valve 29, flows through a portion of the outdoor bridge circuit 26, and flows into the high-pressure receiver 42. Note that the high-pressure receiver 42 stores, as the liquid refrigerant, an excessive refrigerant in the refrigerant circuit 10. The gas refrigerant which has flowed out from the gas region of the high-pressure receiver 42 is decompressed to a low pressure in the refrigeration cycle at the outdoor expansion valve 24.

Note that the valve opening degree of the outdoor expansion valve 24 is controlled to satisfy a predetermined condition, for example, such that the degree of superheating of the refrigerant to be sucked by the compressor 21 becomes a target value. The degree of superheating of the refrigerant flowing through the suction side of the compressor 21 is not limited; however, for example, can be obtained by subtracting the saturation temperature of the refrigerant corresponding to the detected pressure of the suction pressure sensor 63 from the detected temperature of the suction temperature sensor 64. Note that the method of controlling the valve opening degree of the outdoor expansion valve 24 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the outdoor expansion valve 24 flows through another portion of the outdoor bridge circuit 26, is evaporated in the outdoor heat exchanger 23, passes through the four-way switching valve 22, and is sucked into the compressor 21 again.

(3-4-4) Characteristics of Fourth Embodiment

Since the air conditioning apparatus 1*c* can perform the refrigeration cycle using the refrigerant containing 1,2-difluoroethylene, the air conditioning apparatus 1*c* can perform a refrigeration cycle using a small-GWP refrigerant.

Moreover, since the air conditioning apparatus 1*c* is provided with the high-pressure receiver 42, an excessive refrigerant in the refrigerant circuit 10 can be stored.

(3-5) Fifth Embodiment

An air conditioning apparatus 1*d* serving as a refrigeration cycle apparatus according to a fifth embodiment is described below with reference to FIG. 3I which is a schematic configuration diagram of a refrigerant circuit and FIG. 3J which is a schematic control block configuration diagram. Differences from the air conditioning apparatus 1*c* according to the fourth embodiment are mainly described below.

(3-5-1) Schematic Configuration of Air Conditioning Apparatus 1*d*

The air conditioning apparatus 1*d* differs from the air conditioning apparatus 1*c* according to the fourth embodiment in that a plurality of indoor units are provided in parallel and an indoor expansion valve is provided on the liquid-refrigerant side of an indoor heat exchanger in each indoor unit.

The air conditioning apparatus 1*d* includes a first indoor unit 30 and a second indoor unit 35 connected in parallel to each other. Similarly to the above-described embodiment, the first indoor unit 30 includes a first indoor heat exchanger 31 and a first indoor fan 32, and a first indoor expansion valve 33 is provided on the liquid-refrigerant side of the first indoor heat exchanger 31. The first indoor expansion valve 33 is preferably an electric expansion valve of which the valve opening degree is adjustable. Similarly to the above-described embodiment, the first indoor unit 30 includes a first indoor-unit control unit 34; and a first indoor liquid-side heat-exchange temperature sensor 71, a first indoor air temperature sensor 72, and a first indoor gas-side heat-exchange temperature sensor 73 that are electrically connected to the first indoor-unit control unit 34. The first indoor liquid-side heat-exchange temperature sensor 71 detects the temperature of the refrigerant flowing through the outlet on the liquid-refrigerant side of the first indoor heat exchanger 31. The first indoor gas-side heat-exchange temperature sensor 73 detects the temperature of the refrigerant flowing through the outlet on the gas-refrigerant side of the first indoor heat exchanger 31. Similarly to the first indoor unit 30, the second indoor unit 35 includes a second indoor heat exchanger 36 and a second indoor fan 37, and a second indoor expansion valve 38 is provided on the liquid-refrigerant side of the second indoor heat exchanger 36. The second indoor expansion valve 38 is preferably an electric expansion valve of which the valve opening degree is adjustable. Similarly to the first indoor unit 30, the second indoor unit 35 includes a second indoor-unit control unit 39, and a second indoor liquid-side heat-exchange temperature sensor 75, a second indoor air temperature sensor 76, and a second indoor gas-side heat-exchange temperature sensor 77 that are electrically connected to the second indoor-unit control unit 39.

(3-5-2) Cooling Operating Mode

In the air conditioning apparatus 1*c*, in the cooling operating mode, capacity control is performed on the operating frequency of the compressor 21, for example, such that the evaporation temperature of the refrigerant in the refrigerant circuit 10 becomes a target evaporation temperature. In this case, the target evaporation temperature is preferably determined in accordance with one of the indoor units 30 and 35 having the largest difference between the set temperature and the indoor temperature (an indoor unit having the largest load).

The gas refrigerant discharged from the compressor 21 passes through the four-way switching valve 22 and is condensed in the outdoor heat exchanger 23. The refrigerant which has flowed through the outdoor heat exchanger 23 flows into the high-pressure receiver 42 via a portion of the outdoor bridge circuit 26. Note that the high-pressure receiver 42 stores, as the liquid refrigerant, an excessive refrigerant in the refrigerant circuit 10. The gas refrigerant which has flowed out from the gas region of the high-pressure receiver 42 is decompressed in the outdoor expansion valve 24. In this case, during cooling operation, the outdoor expansion valve 24 is controlled such that, for example, the valve opening degree becomes a full-open state.

The refrigerant which has passed through the outdoor expansion valve 24 passes through anther portion of the outdoor bridge circuit 26, passes through the liquid-side shutoff valve 29 and the liquid-side connection pipe 6, and flows into the first indoor unit 30 and the second indoor unit 35.

The refrigerant which has flowed into the first indoor unit 30 is decompressed at the first indoor expansion valve 33. The valve opening degree of the first indoor expansion valve 33 is controlled to satisfy a predetermined condition, for example, such that the degree of superheating of the refrigerant flowing through the gas-side outlet of the first indoor heat exchanger 31 becomes a target value. Although not limited, the degree of superheating of the refrigerant flowing through the gas-side outlet of the first indoor heat exchanger 31 may be obtained by subtracting the saturation temperature of the refrigerant corresponding to a low pressure of the refrigerant circuit 10 (the detected pressure of the suction pressure sensor 63) from the detected temperature of the first indoor gas-side heat-exchange temperature sensor 73. Likewise, the refrigerant which has flowed into the second indoor unit 35 is decompressed at the second indoor expansion valve 38. The valve opening degree of the second indoor expansion valve 38 is controlled to satisfy a predetermined condition, for example, such that the degree of superheating of the refrigerant flowing through the gas-side outlet of the second indoor heat exchanger 36 becomes a target value. Although not limited, for example, the degree of superheating of the refrigerant flowing through the gas-side outlet of the second indoor heat exchanger 36 may be obtained by subtracting the saturation temperature of the refrigerant corresponding to a low pressure of the refrigerant circuit 10 (the detected pressure of the suction pressure sensor 63) from the detected temperature of the second indoor gas-side heat-exchange temperature sensor 77. Each of the valve opening degrees of the first indoor expansion valve 33 and the second indoor expansion valve 38 may be controlled to satisfy a predetermined condition, for example, such that the degree of superheating of the refrigerant obtained by subtracting the saturation temperature of the refrigerant corresponding to the detected pressure of the suction pressure sensor 63 from the detected temperature of the suction temperature sensor 64. Furthermore, the method of controlling each of the valve opening degrees of the first indoor expansion valve 33 and the second indoor expansion valve 38 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant evaporated in the first indoor heat exchanger 31 and the refrigerant evaporated in the second indoor heat exchanger 36 are joined. Then, the joined refrigerant passes through the gas-side connection pipe 5, the gas-side shutoff valve 28, and the four-way switching valve 22, and is sucked into the compressor 21 again.

(3-5-3) Heating Operating Mode

In the air conditioning apparatus 1*c*, in the heating operating mode, capacity control is performed on the operating frequency of the compressor 21, for example, such that the condensation temperature of the refrigerant in the refrigerant circuit 10 becomes a target condensation temperature. In this case, the target condensation temperature is preferably determined in accordance with one of the indoor units 30 and 35 having the largest difference between the set temperature and the indoor temperature (an indoor unit having the largest load). The condensation temperature is not limited; however, may be recognized as, for example, the saturation temperature of the refrigerant corresponding to the detected pressure of the discharge pressure sensor 61.

The gas refrigerant discharged from the compressor 21 flows through the four-way switching valve 22 and the gas-side connection pipe 5, and then flows into each of the first indoor unit 30 and the second indoor unit 35.

The gas refrigerant which has flowed into the first indoor heat exchanger 31 of the first indoor unit 30 is condensed in the first indoor heat exchanger 31. The refrigerant which has flowed through the first indoor heat exchanger 31 is decompressed at the first indoor expansion valve 33. The valve opening degree of the first indoor expansion valve 33 is controlled to satisfy a predetermined condition, for example, such that the degree of subcooling of the refrigerant flowing through the liquid-side outlet of the first indoor heat exchanger 31 becomes a target value. The degree of subcooling of the refrigerant flowing through the liquid-side outlet of the first indoor heat exchanger 31 can be obtained, for example, by subtracting the saturation temperature of the refrigerant corresponding to the detected pressure of the discharge pressure sensor 61 from the detected temperature of the first indoor liquid-side heat-exchange temperature sensor 71.

The gas refrigerant which has flowed into the second indoor heat exchanger 36 of the second indoor unit 35 is condensed in the second indoor heat exchanger 36 likewise. The refrigerant which has flowed through the second indoor heat exchanger 36 is decompressed at the second indoor expansion valve 38. The valve opening degree of the second indoor expansion valve 38 is controlled to satisfy a predetermined condition, for example, such that the degree of subcooling of the refrigerant flowing through the liquid-side outlet of the second indoor heat exchanger 36 becomes a target value. The degree of subcooling of the refrigerant flowing through the liquid-side outlet of the second indoor heat exchanger 36 can be obtained, for example, by subtracting the saturation temperature of the refrigerant corresponding to the detected pressure of the discharge pressure sensor 61 from the detected temperature of the second indoor liquid-side heat-exchange temperature sensor 75.

The refrigerant which has flowed out from the liquid-side end of the first indoor heat exchanger 31 and the refrigerant which has flowed out from the liquid-side end of the second indoor heat exchanger 36 are joined. Then, the joined refrigerant passes through the liquid-side connection pipe 6 and flows into the outdoor unit 20.

The refrigerant which has flowed into the outdoor unit 20 passes through the liquid-side shutoff valve 29, flows through a portion of the outdoor bridge circuit 26, and flows into the high-pressure receiver 42. Note that the high-pressure receiver 42 stores, as the liquid refrigerant, an excessive refrigerant in the refrigerant circuit 10. The gas refrigerant which has flowed out from the gas region of the high-pressure receiver 42 is decompressed to a low pressure in the refrigeration cycle at the outdoor expansion valve 24. That is, during heating operation, the high-pressure receiver 42 stores a pseudo-intermediate-pressure refrigerant.

Note that the valve opening degree of the outdoor expansion valve 24 is controlled to satisfy a predetermined condition, for example, such that the degree of superheating of the refrigerant to be sucked by the compressor 21 becomes a target value. The degree of superheating of the refrigerant to be sucked by the compressor 21 is not limited however, for example, can be obtained by subtracting the saturation temperature of the refrigerant corresponding to the detected pressure of the suction pressure sensor 63 from the detected temperature of the suction temperature sensor 64. Note that the method of controlling the valve opening degree of the outdoor expansion valve 24 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the outdoor expansion valve 24 flows through another portion of the outdoor bridge circuit 26, is evaporated in the outdoor heat exchanger 23, passes through the four-way switching valve 22, and is sucked into the compressor 21 again.

(3-5-4) Characteristics of Fifth Embodiment

Since the air conditioning apparatus 1*d* can perform the refrigeration cycle using the refrigerant containing 1,2-difluoroethylene, the air conditioning apparatus 1*d* can perform a refrigeration cycle using a small-GWP refrigerant.

Moreover, since the air conditioning apparatus 1*d* is provided with the high-pressure receiver 42, an excessive refrigerant in the refrigerant circuit 10 can be stored.

During heating operation, since superheating control is performed on the valve opening degree of the outdoor expansion valve 24 to ensure reliability of the compressor 21. Thus, subcooling control can be performed on the first indoor expansion valve 33 and the second indoor expansion valve 38 to sufficiently provide the capacities of the first indoor heat exchanger 31 and the second indoor heat exchanger 36.

(3-6) Sixth Embodiment

An air conditioning apparatus 1*e* serving as a refrigeration cycle apparatus according to a sixth embodiment is described below with reference to FIG. 3K which is a schematic configuration diagram of a refrigerant circuit and FIG. 3L which is a schematic control block configuration diagram. Differences from the air conditioning apparatus 1*a* according to the second embodiment are mainly described below.

(3-6-1) Schematic Configuration of Air Conditioning Apparatus 1*e*

The air conditioning apparatus 1*e* differs from the air conditioning apparatus 1*a* according to the second embodiment in that the outdoor unit 20 does not include the low-pressure receiver 41, but includes an intermediate-pressure receiver 43 and does not include the outdoor expansion valve 24, but includes a first outdoor expansion valve 44 and a second outdoor expansion valve 45.

The intermediate-pressure receiver 43 is a refrigerant container that is provided between the liquid side of the outdoor heat exchanger 23 and the liquid-side shutoff valve 29 in the refrigerant circuit 10 and that can store, as the liquid refrigerant, an excessive refrigerant in the refrigerant circuit 10.

The first outdoor expansion valve 44 is provided midway in a refrigerant pipe extending from the liquid side of the outdoor heat exchanger 23 to the intermediate-pressure receiver 43. The second outdoor expansion valve 45 is provided midway in a refrigerant pipe extending from the intermediate-pressure receiver 43 to the liquid-side shutoff valve 29. The first outdoor expansion valve 44 and the second outdoor expansion valve 45 are each preferably an electric expansion valve of which the valve opening degree is adjustable.

(3-6-2) Cooling Operating Mode

In the air conditioning apparatus 1*e*, in the cooling operating mode, capacity control is performed on the operating frequency of the compressor 21, for example, such that the evaporation temperature of the refrigerant in the refrigerant circuit 10 becomes a target evaporation temperature that is determined in accordance with the difference between the set temperature and the indoor temperature (the detected temperature of the indoor air temperature sensor 72).

The gas refrigerant discharged from the compressor 21 passes through the four-way switching valve 22 and then is condensed in the outdoor heat exchanger 23. The refrigerant which has flowed through the outdoor heat exchanger 23 is decompressed at the first outdoor expansion valve 44 to an intermediate pressure in the refrigeration cycle.

In this case, the valve opening degree of the first outdoor expansion valve 44 is controlled to satisfy a predetermined condition, for example, such that the degree of subcooling of the refrigerant flowing through the liquid-side outlet of the outdoor heat exchanger 23 becomes a target value.

The refrigerant decompressed at the first outdoor expansion valve 44 flows into the intermediate-pressure receiver 43. The intermediate-pressure receiver 43 stores, as the liquid refrigerant, an excessive refrigerant in the refrigerant circuit 10. The refrigerant which has passed through the intermediate-pressure receiver 43 is decompressed to a low pressure in the refrigeration cycle at the second outdoor expansion valve 45.

In this case, the valve opening degree of the second outdoor expansion valve 45 is controlled to satisfy a predetermined condition, for example, such that the degree of superheating of the refrigerant flowing through the gas side of the indoor heat exchanger 31 or the degree of superheating of the refrigerant to be sucked by the compressor 21 becomes a target value. Note that the method of controlling the valve opening degree of the second outdoor expansion valve 45 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the second outdoor expansion valve 45 to the low pressure in the refrigeration cycle passes through the liquid-side shutoff valve 29 and the liquid-side connection pipe 6, flows into the indoor unit 30, and is evaporated in the indoor heat exchanger 31. The refrigerant which has flowed through the indoor heat exchanger 31 flows through the gas-side connection pipe 5, then passes through the gas-side shutoff valve 28 and the four-way switching valve 22, and is sucked into the compressor 21 again.

(3-6-3) Heating Operating Mode

In the air conditioning apparatus 1*e*, in the heating operating mode, capacity control is performed on the operating frequency of the compressor 21, for example, such that the condensation temperature of the refrigerant in the refrigerant circuit 10 becomes a target condensation temperature that is determined in accordance with the difference between the set temperature and the indoor temperature (the detected temperature of the indoor air temperature sensor 72).

The gas refrigerant discharged from the compressor 21 flows through the four-way switching valve 22 and the gas-side connection pipe 5, then flows into the gas-side end of the indoor heat exchanger 31 of the indoor unit 30, and is condensed in the indoor heat exchanger 31. The refrigerant which has flowed out from the liquid-side end of the indoor heat exchanger 31 flows through the liquid-side connection pipe 6, flows into the outdoor unit 20, passes through the liquid-side shutoff valve 29, and is decompressed to an intermediate pressure in the refrigeration cycle at the second outdoor expansion valve 45.

In this case, the valve opening degree of the second outdoor expansion valve 45 is controlled to satisfy a predetermined condition, for example, such that the degree of subcooling of the refrigerant flowing through the liquid-side outlet of the indoor heat exchanger 31 becomes a target value.

The refrigerant decompressed at the second outdoor expansion valve 45 flows into the intermediate-pressure receiver 43. The intermediate-pressure receiver 43 stores, as the liquid refrigerant, an excessive refrigerant in the refrigerant circuit 10. The refrigerant which has passed through the intermediate-pressure receiver 43 is decompressed to a low pressure in the refrigeration cycle at the first outdoor expansion valve 44.

In this case, the valve opening degree of the first outdoor expansion valve 44 is controlled to satisfy a predetermined condition, for example, such that the degree of superheating of the refrigerant to be sucked by the compressor 21 becomes a target value. Note that the method of controlling the valve opening degree of the first outdoor expansion valve 44 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the first outdoor expansion valve 44 is evaporated in the outdoor heat exchanger 23, passes through the four-way switching valve 22, and is sucked into the compressor 21 again.

(3-6-4) Characteristics of Sixth Embodiment

Since the air conditioning apparatus 1*e* can perform the refrigeration cycle using the refrigerant containing 1,2-difluoroethylene, the air conditioning apparatus 1*e* can perform a refrigeration cycle using a small-GWP refrigerant.

Moreover, since the air conditioning apparatus 1*e* is provided with the intermediate-pressure receiver 43, an excessive refrigerant in the refrigerant circuit 10 can be stored. During cooling operation, since subcooling control is performed on the first outdoor expansion valve 44, the capacity of the outdoor heat exchanger 23 can be likely sufficiently provided. During heating operation, since subcooling control is performed on the second outdoor expansion valve 45, the capacity of the indoor heat exchanger 31 can be likely sufficiently provided.

(3-7) Seventh Embodiment

An air conditioning apparatus 1*f* serving as a refrigeration cycle apparatus according to a seventh embodiment is described below with reference to FIG. 3M which is a schematic configuration diagram of a refrigerant circuit and FIG. 3N which is a schematic control block configuration diagram. Differences from the air conditioning apparatus 1*e* according to the sixth embodiment are mainly described below.

(3-7-1) Schematic Configuration of Air Conditioning Apparatus 1*f*

The air conditioning apparatus 1*f* differs from the air conditioning apparatus 1*e* according to the sixth embodiment in that the outdoor unit 20 includes a first outdoor heat exchanger 23*a* and a second outdoor heat exchanger 23*b* disposed in parallel to each other, includes a first branch outdoor expansion valve 24*a* on the liquid-refrigerant side of the first outdoor heat exchanger 23*a*, and includes a second branch outdoor expansion valve 24*b* on the liquid-refrigerant side of the second outdoor heat exchanger 23*b*. The first branch outdoor expansion valve 24*a* and the second branch outdoor expansion valve 24*b* are each preferably an electric expansion valve of which the valve opening degree is adjustable.

Moreover, the air conditioning apparatus 1*f* differs from the air conditioning apparatus 1*e* according to the sixth embodiment in that a plurality of indoor units are provided in parallel and an indoor expansion valve is provided on the liquid-refrigerant side of an indoor heat exchanger in each indoor unit.

The air conditioning apparatus 1*f* includes a first indoor unit 30 and a second indoor unit 35 connected in parallel to each other. Similarly to the above-described embodiment, the first indoor unit 30 includes a first indoor heat exchanger 31 and a first indoor fan 32, and a first indoor expansion valve 33 is provided on the liquid-refrigerant side of the first indoor heat exchanger 31. The first indoor expansion valve 33 is preferably an electric expansion valve of which the valve opening degree is adjustable. Similarly to the above-described embodiment, the first indoor unit 30 includes a first indoor-unit control unit 34, and a first indoor liquid-side heat-exchange temperature sensor 71, a first indoor air temperature sensor 72, and a first indoor gas-side heat-exchange temperature sensor 73 that are electrically connected to the first indoor-unit control unit 34. The first indoor liquid-side heat-exchange temperature sensor 71 detects the temperature of the refrigerant flowing through the outlet on the liquid-refrigerant side of the first indoor heat exchanger 31. The first indoor gas-side heat-exchange temperature sensor 73 detects the temperature of the refrigerant flowing through the outlet on the gas-refrigerant side of the first indoor heat exchanger 31. Similarly to the first indoor unit 30, the second indoor unit 35 includes a second indoor heat exchanger 36 and a second indoor fan 37, and a second indoor expansion valve 38 is provided on the liquid-refrigerant side of the second indoor heat exchanger 36. The second indoor expansion valve 38 is preferably an electric expansion valve of which the valve opening degree is adjustable. Similarly to the first indoor unit 30, the second indoor unit 35 includes a second indoor-unit control unit 39, and a second indoor liquid-side heat-exchange temperature sensor 75, a second indoor air temperature sensor 76, and a second indoor gas-side heat-exchange temperature sensor 77 that are electrically connected to the second indoor-unit control unit 39.

(3-7-2) Cooling Operating Mode

In the air conditioning apparatus 1*f*, in the cooling operating mode, capacity control is performed on the operating frequency of the compressor 21, for example, such that the evaporation temperature of the refrigerant in the refrigerant circuit 10 becomes a target evaporation temperature. In this case, the target evaporation temperature is preferably determined in accordance with one of the indoor units 30 and 35 having the largest difference between the set temperature and the indoor temperature (an indoor unit having the largest load).

The gas refrigerant discharged from the compressor 21 passes through the four-way switching valve 22, then is branched and flows to the first outdoor heat exchanger 23*a* and the second outdoor heat exchanger 23*b*, and the respective branched refrigerants are condensed in the first outdoor heat exchanger 23*a* and the second outdoor heat exchanger 23*b*. The refrigerant which has flowed through the first outdoor heat exchanger 23*a* is decompressed at the first branch outdoor expansion valve 24*a* to an intermediate pressure in the refrigeration cycle. The refrigerant which has flowed through the second outdoor heat exchanger 23*b* is decompressed at the second branch outdoor expansion valve 24*b* to an intermediate pressure in the refrigeration cycle.

In this case, each of the first branch outdoor expansion valve 24*a* and the second branch outdoor expansion valve 24*b* may be controlled, for example, to be in a full-open state.

Moreover, when the first outdoor heat exchanger 23*a* and the second outdoor heat exchanger 23*b* have a difference in easiness of flowing of the refrigerant due to the structure thereof or the connection of refrigerant pipes, the valve opening degree of the first branch outdoor expansion valve 24*a* may be controlled to satisfy a predetermined condition, for example, such that the degree of subcooling of the refrigerant flowing through the liquid-side outlet of the first outdoor heat exchanger 23*a* becomes a common target value, and the valve opening degree of the second branch outdoor expansion valve 24*b* may be controlled to satisfy a predetermined condition, for example, such that the degree of subcooling of the refrigerant flowing through the liquid-side outlet of the second outdoor heat exchanger 23*b* becomes a common target value. With the control, an uneven flow of the refrigerant between the first outdoor heat exchanger 23*a* and the second outdoor heat exchanger 23*b* can be minimized.

The refrigerant which has passed through the first branch outdoor expansion valve 24*a* and the refrigerant which has passed through the second branch outdoor expansion valve 24*b* are joined. Then, the joined refrigerant flows into the intermediate-pressure receiver 43. The intermediate-pressure receiver 43 stores, as the liquid refrigerant, an excessive refrigerant in the refrigerant circuit 10. The refrigerant which has passed through the intermediate-pressure receiver 43 flows through the liquid-side shutoff valve 29 and the liquid-side connection pipe 6, and flows into each of the first indoor unit 30 and the second indoor unit 35.

The refrigerant which has flowed into the first indoor unit 30 is decompressed at the first indoor expansion valve 33 to a low pressure in the refrigeration cycle. The refrigerant which has flowed into the second indoor unit 35 is decompressed at the second indoor expansion valve 38 to a low pressure in the refrigeration cycle.

In this case, the valve opening degree of the first indoor expansion valve 33 is controlled to satisfy a predetermined condition, for example, such that the degree of superheating of the refrigerant flowing through the gas side of the first indoor heat exchanger 31 or the degree of superheating of the refrigerant to be sucked by the compressor 21 becomes a target value. Moreover, likewise, the valve opening degree of the second indoor expansion valve 38 is also controlled to satisfy a predetermined condition, for example, such that the degree of superheating of the refrigerant flowing through the gas side of the second indoor heat exchanger 36 or the degree of superheating of the refrigerant to be sucked by the compressor 21 becomes a target value. Note that the method of controlling each of the valve opening degrees of the first indoor expansion valve 33 and the second indoor expansion valve 38 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the first indoor expansion valve 33 is evaporated in the first indoor heat exchanger 31, the refrigerant decompressed at the second indoor expansion valve 38 is evaporated in the second indoor heat exchanger 36, and the evaporated refrigerants are joined. Then, the joined refrigerant passes through the gas-side connection pipe 5, the gas-side shutoff valve 28, and the four-way switching valve 22, and is sucked by the compressor 21 again.

(3-7-3) Heating Operating Mode

In the air conditioning apparatus 1*f*, in the heating operating mode, capacity control is performed on the operating frequency of the compressor 21, for example, such that the condensation temperature of the refrigerant in the refrigerant circuit 10 becomes a target condensation temperature. In this case, the target condensation temperature is preferably determined in accordance with one of the indoor units 30 and 35 having the largest difference between the set temperature and the indoor temperature (an indoor unit having the largest load).

The gas refrigerant discharged from the compressor 21 flows through the four-way switching valve 22 and the gas-side connection pipe 5, and then flows into each of the first indoor unit 30 and the second indoor unit 35.

The refrigerant which has flowed into the first indoor unit 30 is condensed in the first indoor heat exchanger 31. The refrigerant which has flowed into the second indoor unit 35 is condensed in the second indoor heat exchanger 36.

The refrigerant which has flowed out from the liquid-side end of the first indoor heat exchanger 31 is decompressed at the first indoor expansion valve 33 to an intermediate pressure in the refrigeration cycle. The refrigerant which has flowed out from the second indoor heat exchanger 36 is decompressed at the second indoor expansion valve 38 to an intermediate pressure in the refrigeration cycle.

In this case, the valve opening degree of the first indoor expansion valve 33 is controlled to satisfy a predetermined condition, for example, such that the degree of subcooling of the refrigerant flowing through the liquid-side outlet of the first indoor heat exchanger 31 becomes a target value. Also, the valve opening degree of the second indoor expansion valve 38 is controlled likewise to satisfy a predetermined condition, for example, such that the degree of subcooling of the refrigerant flowing through the liquid-side outlet of the second indoor heat exchanger 36 becomes a target value.

The refrigerant which has passed through the first indoor expansion valve 33 and the refrigerant which has passed through the second indoor expansion valve 38 are joined. Then, the joined refrigerant passes through the liquid-side connection pipe 6 and flows into the outdoor unit 20.

The refrigerant which has flowed into the outdoor unit 20 passes through the liquid-side shutoff valve 29, and is sent to the intermediate-pressure receiver 43. The intermediate-pressure receiver 43 stores, as the liquid refrigerant, an excessive refrigerant in the refrigerant circuit 10. The refrigerant which has passed through the intermediate-pressure receiver 43 flows in a separated manner to the first branch outdoor expansion valve 24*a* and the second branch outdoor expansion valve 24*b*.

The first branch outdoor expansion valve 24*a* decompresses the passing refrigerant to a low pressure in the refrigeration cycle. The second branch outdoor expansion valve 24*b* similarly decompresses the passing refrigerant to a low pressure in the refrigeration cycle.

In this case, each of the valve opening degrees of the first branch outdoor expansion valve 24*a* and the second branch outdoor expansion valve 24*b* is controlled to satisfy a predetermined condition, for example, such that the degree of superheating of the refrigerant to be sucked by the compressor 21 becomes a target value. Note that the method of controlling each of the valve opening degrees of the first branch outdoor expansion valve 24*a* and the second branch outdoor expansion valve 24*b* is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the first branch outdoor expansion valve 24*a* is evaporated in the first outdoor heat exchanger 23*a*, the refrigerant decompressed at the second branch outdoor expansion valve 24*b* is evaporated in the second outdoor heat exchanger 23*b*, and the evaporated refrigerants are joined. Then, the joined refrigerant passes through the four-way switching valve 22 and is sucked by the compressor 21 again.

(3-7-4) Characteristics of Seventh Embodiment

Since the air conditioning apparatus 1*f* can perform the refrigeration cycle using the refrigerant containing 1,2-difluoroethylene, the air conditioning apparatus 1*f* can perform a refrigeration cycle using a small-GWP refrigerant.

Moreover, since the air conditioning apparatus 1*f* is provided with the intermediate-pressure receiver 43, an excessive refrigerant in the refrigerant circuit 10 can be stored. During heating operation, since subcooling control is performed on the first indoor expansion valve 33 and the second indoor expansion valve 38, the capacity of the indoor heat exchanger 31 can be likely sufficiently provided.

(3-8) Eighth Embodiment

An air conditioning apparatus 1*g* serving as a refrigeration cycle apparatus according to an eighth embodiment is described below with reference to FIG. 3O which is a schematic configuration diagram of a refrigerant circuit and FIG. 3P which is a schematic control block configuration diagram. Differences from the air conditioning apparatus 1*b* according to the third embodiment are mainly described below.

(3-8-1) Schematic Configuration of Air Conditioning Apparatus 1*g*

The air conditioning apparatus 1*g* differs from the air conditioning apparatus 1*b* according to the third embodiment in that the bypass pipe 40 having the bypass expansion valve 49 is not provided, a subcooling heat exchanger 47 is provided, a subcooling pipe 46 is provided, a first outdoor expansion valve 44 and a second outdoor expansion valve 45 are provided, and a subcooling temperature sensor 67 is provided.

The first outdoor expansion valve 44 is provided between the liquid-side outlet of the outdoor heat exchanger 23 and the liquid-side shutoff valve 29 in the refrigerant circuit 10. The second outdoor expansion valve 45 is provided between the first outdoor expansion valve 44 and the liquid-side shutoff valve 29 in the refrigerant circuit 10. The first outdoor expansion valve 44 and the second outdoor expansion valve 45 are each preferably an electric expansion valve of which the valve opening degree is adjustable.

The subcooling pipe 46 is, in the refrigerant circuit 10, branched from a branch portion between the first outdoor expansion valve 44 and the second outdoor expansion valve 45, and is joined to a joint portion between one of the connecting ports of the four-way switching valve 22 and the low-pressure receiver 41. The subcooling pipe 46 is provided with a subcooling expansion valve 48. The subcooling expansion valve 48 is preferably an electric expansion valve of which the valve opening degree is adjustable.

The subcooling heat exchanger 47 is, in the refrigerant circuit 10, a heat exchanger that causes the refrigerant flowing through the portion between the first outdoor expansion valve 44 and the second outdoor expansion valve 45 and the refrigerant flowing through a portion on the joint portion side of the subcooling expansion valve 48 in the subcooling pipe 46 to exchange heat with each other. In the present embodiment, the subcooling heat exchanger 47 is provided in a portion that is between the first outdoor expansion valve 44 and the second outdoor expansion valve 45 and that is on the side closer than the branch portion of the subcooling pipe 46 to the second outdoor expansion valve 45.

The subcooling temperature sensor 67 is a temperature sensor that detects the temperature of the refrigerant flowing through a portion closer than the subcooling heat exchanger 47 to the second outdoor expansion valve 45 in a portion between the first outdoor expansion valve 44 and the second outdoor expansion valve 45 in the refrigerant circuit 10.

(3-8-2) Cooling Operating Mode

In the air conditioning apparatus 1*g*, in the cooling operating mode, capacity control is performed on the operating frequency of the compressor 21, for example, such that the evaporation temperature of the refrigerant in the refrigerant circuit 10 becomes a target evaporation temperature. In this case, the target evaporation temperature is preferably determined in accordance with one of the indoor units 30 and 35 having the largest difference between the set temperature and the indoor temperature (an indoor unit having the largest load).

The gas refrigerant discharged from the compressor 21 passes through the four-way switching valve 22 and is condensed in the outdoor heat exchanger 23. The refrigerant which has flowed through the outdoor heat exchanger 23 passes through the first outdoor expansion valve 44. Note that, in this case, the first outdoor expansion valve 44 is controlled to be in a full-open state.

A portion of the refrigerant which has passed through the first outdoor expansion valve 44 flows toward the second outdoor expansion valve 45 and another portion of the refrigerant is branched and flows to the subcooling pipe 46. The refrigerant which has been branched and flowed to the subcooling pipe 46 is decompressed at the subcooling expansion valve 48. The subcooling heat exchanger 47 causes the refrigerant flowing from the first outdoor expansion valve 44 toward the second outdoor expansion valve 45, and the refrigerant decompressed at the subcooling expansion valve 48 and flowing through the subcooling pipe 46 to exchange heat with each other. The refrigerant flowing through the subcooling pipe 46 exchanges heat in the subcooling heat exchanger 47, and then flows to join to a joint portion extending from one of the connecting ports of the four-way switching valve 22 to the low-pressure receiver 41. After the heat exchange in the subcooling heat exchanger 47, the refrigerant flowing from the first outdoor expansion valve 44 toward the second outdoor expansion valve 45 is decompressed at the second outdoor expansion valve 45.

As described above, the second outdoor expansion valve 45 is controlled to satisfy a predetermined condition, for example, such that the degree of subcooling of the refrigerant flowing through the liquid-side outlet of the outdoor heat exchanger 23 becomes a target value.

Moreover, the valve opening degree of the subcooling expansion valve 48 is controlled such that at least the refrigerant which reaches the first indoor expansion valve 33 and the second indoor expansion valve 38 is in a gas-liquid two-phase state to prevent occurrence of a situation in which all portions extending from the second outdoor expansion valve 45 via the liquid-side connection pipe 6 to the first indoor expansion valve 33 and the second indoor expansion valve 38 are filled with the refrigerant in a liquid state in the refrigerant circuit 10. For example, the valve opening degree of the subcooling expansion valve 48 is preferably controlled such that the specific enthalpy of the refrigerant which flows from the first outdoor expansion valve 44 toward the second outdoor expansion valve 45 and which has passed through the subcooling heat exchanger 47 is larger than the specific enthalpy of a portion in which the low pressure in the refrigeration cycle intersects with the saturated liquid line in the Mollier diagram. In this case, the controller 7 previously stores data in the Mollier diagram corresponding to the refrigerant, and may control the valve opening degree of the subcooling expansion valve 48 based of the specific enthalpy of the refrigerant which has passed through the subcooling heat exchanger 47 acquired from the detected pressure of the discharge pressure sensor 61, the detected temperature of the subcooling temperature sensor 67, and the data of the Mollier diagram corresponding to the refrigerant. The valve opening degree of the subcooling expansion valve 48 is preferably controlled to satisfy a predetermined condition, for example, such that the temperature of the refrigerant which flows from the first outdoor expansion valve 44 toward the second outdoor expansion valve 45 and which has passed through the subcooling heat exchanger 47 (the detected temperature of the subcooling temperature sensor 67) becomes a target value.

The refrigerant decompressed at the second outdoor expansion valve 45 passes through the liquid-side shutoff valve 29 and the liquid-side connection pipe 6, and is sent to the first indoor unit 30 and the second indoor unit 35.

In this case, in the first indoor unit 30, the valve opening degree of the first indoor expansion valve 33 is controlled to satisfy a predetermined condition, for example, such that the degree of superheating of the refrigerant flowing through the gas-side outlet of the first indoor heat exchanger 31 becomes a target value. Moreover, also for the second indoor expansion valve 38 of the second indoor unit 35, similarly to the first indoor expansion valve 33, the valve opening degree of the second indoor expansion valve 38 is controlled to satisfy a predetermined condition, for example, such that the degree of superheating of the refrigerant flowing through the gas-side outlet of the second indoor heat exchanger 36 becomes a target value. Each of the valve opening degrees of the first indoor expansion valve 33 and the second indoor expansion valve 38 may be controlled to satisfy a predetermined condition, for example, such that the degree of superheating of the refrigerant obtained by subtracting the saturation temperature of the refrigerant corresponding to the detected pressure of the suction pressure sensor 63 from the detected temperature of the suction temperature sensor 64. Furthermore, the method of controlling each of the valve opening degrees of the first indoor expansion valve 33 and the second indoor expansion valve 38 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the first indoor expansion valve 33 is evaporated in the first indoor heat exchanger 31, the refrigerant decompressed at the second indoor expansion valve 38 is evaporated in the second indoor heat exchanger 36, and the evaporated refrigerants are joined. Then, the joined refrigerant flows to the gas-side connection pipe 5. The refrigerant which has flowed through the gas-side connection pipe 5 passes through the gas-side shutoff valve 28 and the four-way switching valve 22, and is joined to the refrigerant which has flowed through the subcooling pipe 46. The joined refrigerant passes through the low-pressure receiver 41 and is sucked into the compressor 21 again. Note that the low-pressure receiver 41 stores, as an excessive refrigerant, the liquid refrigerants which have not been completely evaporated in the first indoor heat exchanger 31, the second indoor heat exchanger 36, and the subcooling heat exchanger 47.

(3-8-3) Heating Operating Mode

In the air conditioning apparatus 1*g*, in the heating operating mode, capacity control is performed on the operating frequency of the compressor 21, for example, such that the condensation temperature of the refrigerant in the refrigerant circuit 10 becomes a target condensation temperature. In this case, the target condensation temperature is preferably determined in accordance with one of the indoor units 30 and 35 having the largest difference between the set temperature and the indoor temperature (an indoor unit having the largest load).

The gas refrigerant discharged from the compressor 21 flows through the four-way switching valve 22 and the gas-side connection pipe 5 then a portion of the refrigerant flows into the gas-side end of the first indoor heat exchanger 31 of the first indoor unit 30 and is condensed in the first indoor heat exchanger 31, and another portion of the refrigerant flows into the gas-side end of the second indoor heat exchanger 36 of the second indoor unit 35 and is condensed in the second indoor heat exchanger 36.

Note that, the valve opening degree of the first indoor expansion valve 33 of the first indoor unit 30 is controlled to satisfy a predetermined condition, for example, such that the degree of subcooling of the refrigerant flowing through the liquid side of the first indoor heat exchanger 31 becomes a predetermined target value. Also for the second indoor expansion valve 38 of the second indoor unit 35, the valve opening degree of the second indoor expansion valve 38 is controlled likewise to satisfy a predetermined condition, for example, such that the degree of subcooling of the refrigerant flowing through the liquid side of the second indoor heat exchanger 36 becomes a predetermined target value.

The refrigerant decompressed at the first indoor expansion valve 33 and the refrigerant decompressed at the second indoor expansion valve 38 are joined. The joined refrigerant flows through the liquid-side connection pipe 6 and flows into the outdoor unit 20.

The refrigerant which has passed through the liquid-side shutoff valve 29 of the outdoor unit 20 passes through the second outdoor expansion valve 45 controlled to be in a full-open state, and exchanges heat with the refrigerant flowing through the subcooling pipe 46 in the subcooling heat exchanger 47. A portion of the refrigerant which has passed through the second outdoor expansion valve 45 and the subcooling heat exchanger 47 is branched to the subcooling pipe 46, and another portion of the refrigerant is sent to the first outdoor expansion valve 44. The refrigerant which has been branched and flowed to the subcooling pipe 46 is decompressed at the subcooling expansion valve 48, and then is joined to the refrigerant which has flowed from the indoor unit 30 or 35, in a joint portion between one of the connecting ports of the four-way switching valve 22 and the low-pressure receiver 41. The refrigerant which has flowed from the subcooling heat exchanger 47 toward the first outdoor expansion valve 44 is decompressed at the first outdoor expansion valve 44, and flows into the outdoor heat exchanger 23.

In this case, the valve opening degree of the first outdoor expansion valve 44 is controlled to satisfy a predetermined condition, for example, such that the degree of superheating of the refrigerant flowing through the suction side of the compressor 21 becomes a target value. Note that the method of controlling the valve opening degree of the first outdoor expansion valve 44 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

Moreover, the valve opening degree of the subcooling expansion valve 48 is controlled to satisfy a predetermined condition, for example, such that the degree of superheating of the refrigerant flowing through the suction side of the compressor 21 becomes a target value. Note that the method of controlling the valve opening degree of the subcooling expansion valve 48 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition. During heating operation, the subcooling expansion valve 48 may be controlled to be in a full-close state to prevent the refrigerant from flowing to the subcooling pipe 46.

The refrigerant decompressed at the first outdoor expansion valve 44 is evaporated in the outdoor heat exchanger 23, passes through the four-way switching valve 22, and is joined to the refrigerant which has flowed through the subcooling pipe 46. The joined refrigerant passes through the low-pressure receiver 41 and is sucked into the compressor 21 again. Note that the low-pressure receiver 41 stores, as an excessive refrigerant, the liquid refrigerant which has not been completely evaporated in the outdoor heat exchanger 23 and the subcooling heat exchanger 47.

(3-8-4) Characteristics of Eighth Embodiment

Since the air conditioning apparatus 1*g* can perform the refrigeration cycle using the refrigerant containing 1,2-difluoroethylene, the air conditioning apparatus 1*g* can perform a refrigeration cycle using a small-GWP refrigerant.

Moreover, since the air conditioning apparatus 1*g* is provided with the low-pressure receiver 41, liquid compression in the compressor 21 can be suppressed. Furthermore, since superheating control is performed on the first indoor expansion valve 33 and the second indoor expansion valve 38 during cooling operation and subcooling control is performed on the first indoor expansion valve 33 and the second indoor expansion valve 38 during heating operation, the capacities of the first indoor heat exchanger 31 and the second indoor heat exchanger 36 are likely sufficiently provided.

Furthermore, with the air conditioning apparatus 1*g*, during cooling operation, the space in the pipes from when the refrigerant passes through the second outdoor expansion valve to when the refrigerant reaches the first indoor expansion valve 33 and the second indoor expansion valve 38 via the liquid-side connection pipe 6 is not filled with the liquid-state refrigerant, and control is performed so that a refrigerant in a gas-liquid two-phase state is in at least a portion of the space. As compared with the case where all the space in the pipes extending from the second outdoor expansion valve 45 to the first indoor expansion valve 33 and the second indoor expansion valve 38 is filled with the liquid refrigerant, refrigerant concentration can be decreased in the portion. The refrigeration cycle can be performed while the amount of refrigerant enclosed in the refrigerant circuit 10 is decreased. Thus, even if the refrigerant leaks from the refrigerant circuit 10, the leakage amount of refrigerant can be decreased.

(3-9) Ninth Embodiment

An air conditioning apparatus 1*h* serving as a refrigeration cycle apparatus according to a ninth embodiment is described below with reference to FIG. 3Q which is a schematic configuration diagram of a refrigerant circuit and FIG. 3R which is a schematic control block configuration diagram. Differences from the air conditioning apparatus 1*e* according to the sixth embodiment are mainly described below.

(3-9-1) Schematic Configuration of Air Conditioning Apparatus 1*h*

The air conditioning apparatus 1*h* differs from the air conditioning apparatus 1*e* according to the sixth embodiment in that a suction refrigerant heating section 50 is included.

The suction refrigerant heating section 50 is constituted of a portion of the refrigerant pipe that extends from one of the connecting ports of the four-way switching valve 22 toward the suction side of the compressor 21 and that is located in the intermediate-pressure receiver 43. In the suction refrigerant heating section 50, the refrigerant flowing through the refrigerant pipe that extends from one of the connecting ports of the four-way switching valve 22 toward the suction side of the compressor 21 and the refrigerant in the intermediate-pressure receiver 43 exchange heat with each other without mixed with each other.

(3-9-2) Cooling Operating Mode

In the air conditioning apparatus 1*h*, in the cooling operating mode, capacity control is performed on the operating frequency of the compressor 21, for example, such that the evaporation temperature of the refrigerant in the refrigerant circuit 10 becomes a target evaporation temperature that is determined in accordance with the difference between the set temperature and the indoor temperature (the detected temperature of the indoor air temperature sensor 72).

The gas refrigerant discharged from the compressor 21 passes through the four-way switching valve 22 and then is condensed in the outdoor heat exchanger 23. The refrigerant which has flowed through the outdoor heat exchanger 23 is decompressed at the first outdoor expansion valve 44 to an intermediate pressure in the refrigeration cycle.

In this case, the valve opening degree of the first outdoor expansion valve 44 is controlled to satisfy a predetermined condition, for example, such that the degree of subcooling of the refrigerant flowing through the liquid-side outlet of the outdoor heat exchanger 23 becomes a target value.

The refrigerant decompressed at the first outdoor expansion valve 44 flows into the intermediate-pressure receiver 43. The intermediate-pressure receiver 43 stores, as the liquid refrigerant, an excessive refrigerant in the refrigerant circuit 10. In this case, the refrigerant which has flowed into the intermediate-pressure receiver 43 is cooled through heat exchange with the refrigerant flowing through a portion of the suction refrigerant heating section 50 on the suction side of the compressor 21. The refrigerant which has cooled in the suction refrigerant heating section 50 in the intermediate-pressure receiver 43 is decompressed to a low pressure in the refrigeration cycle at the second outdoor expansion valve 45.

In this case, the valve opening degree of the second outdoor expansion valve 45 is controlled to satisfy a predetermined condition, for example, such that the degree of superheating of the refrigerant flowing through the gas side of the indoor heat exchanger 31 or the degree of superheating of the refrigerant to be sucked by the compressor 21 becomes a target value. Note that the method of controlling the valve opening degree of the second outdoor expansion valve 45 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the second outdoor expansion valve 45 to the low pressure in the refrigeration cycle passes through the liquid-side shutoff valve 29 and the liquid-side connection pipe 6, flows into the indoor unit 30, and is evaporated in the indoor heat exchanger 31. The refrigerant which has flowed through the indoor heat exchanger 31 flows through the gas-side connection pipe 5, then passes through the gas-side shutoff valve 28 and the four-way switching valve 22, and flows inside the refrigerant pipe that passes through the inside of the intermediate-pressure receiver 43. The refrigerant flowing inside the refrigerant pipe that passes through the inside of the intermediate-pressure receiver 43 is heated through heat exchange with the refrigerant stored in the intermediate-pressure receiver 43, in the suction refrigerant heating section 50 in the intermediate-pressure receiver 43, and is sucked into the compressor 21 again.

(3-9-3) Heating Operating Mode

In the air conditioning apparatus 1*h*, in the heating operating mode, capacity control is performed on the operating frequency of the compressor 21, for example, such that the condensation temperature of the refrigerant in the refrigerant circuit 10 becomes a target condensation temperature that is determined in accordance with the difference between the set temperature and the indoor temperature (the detected temperature of the indoor air temperature sensor 72).

The gas refrigerant discharged from the compressor 21 flows through the four-way switching valve 22 and the gas-side connection pipe 5, then flows into the gas-side end of the indoor heat exchanger 31 of the indoor unit 30, and is condensed in the indoor heat exchanger 31. The refrigerant which has flowed out from the liquid-side end of the indoor heat exchanger 31 flows through the liquid-side connection pipe 6, flows into the outdoor unit 20, passes through the liquid-side shutoff valve 29, and is decompressed to an intermediate pressure in the refrigeration cycle at the second outdoor expansion valve 45.

In this case, the valve opening degree of the second outdoor expansion valve 45 is controlled to satisfy a predetermined condition, for example, such that the degree of subcooling of the refrigerant flowing through the liquid-side outlet of the indoor heat exchanger 31 becomes a target value.

The refrigerant decompressed at the second outdoor expansion valve 45 flows into the intermediate-pressure receiver 43. The intermediate-pressure receiver 43 stores, as the liquid refrigerant, an excessive refrigerant in the refrigerant circuit 10. In this case, the refrigerant which has flowed into the intermediate-pressure receiver 43 is cooled through heat exchange with the refrigerant flowing through a portion of the suction refrigerant heating section 50 on the suction side of the compressor 21. The refrigerant which has cooled in the suction refrigerant heating section 50 in the intermediate-pressure receiver 43 is decompressed to a low pressure in the refrigeration cycle at the first outdoor expansion valve 44.

In this case, the valve opening degree of the first outdoor expansion valve 44 is controlled to satisfy a predetermined condition, for example, such that the degree of superheating of the refrigerant to be sucked by the compressor 21 becomes a target value. Note that the method of controlling the valve opening degree of the first outdoor expansion valve 44 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the first outdoor expansion valve 44 is evaporated in the outdoor heat exchanger 23, passes through the four-way switching valve 22, and flows inside the refrigerant pipe that passes through the inside of the intermediate-pressure receiver 43. The refrigerant flowing inside the refrigerant pipe that passes through the inside of the intermediate-pressure receiver 43 is heated through heat exchange with the refrigerant stored in the intermediate-pressure receiver 43, in the suction refrigerant heating section 50 in the intermediate-pressure receiver 43, and is sucked into the compressor 21 again.

(3-9-4) Characteristics of Ninth Embodiment

Since the air conditioning apparatus 1*h* can perform the refrigeration cycle using the refrigerant containing 1,2-difluoroethylene, the air conditioning apparatus 1*h* can perform a refrigeration cycle using a small-GWP refrigerant.

Moreover, since the air conditioning apparatus 1*h* is provided with the intermediate-pressure receiver 43, an excessive refrigerant in the refrigerant circuit 10 can be stored. During cooling operation, since subcooling control is performed on the first outdoor expansion valve 44, the capacity of the outdoor heat exchanger 23 can be likely sufficiently provided. During heating operation, since subcooling control is performed on the second outdoor expansion valve 45, the capacity of the indoor heat exchanger 31 can be likely sufficiently provided.

Furthermore, since the suction refrigerant heating section 50 is provided, the refrigerant to be sucked into the compressor 21 is heated and liquid compression in the compressor 21 is suppressed. Control can be provided to cause the degree of superheating of the refrigerant flowing through the outlet of the indoor heat exchanger 31 that functions as the evaporator of the refrigerant during cooling operation to be a small value. Also, similarly in heating operation, control can be provided to cause the degree of superheating of the refrigerant flowing through the outlet of the outdoor heat exchanger 23 that functions as the evaporator of the refrigerant to be a small value. Thus, in either of cooling operation and heating operation, even when use of a nonazeotropic mixed refrigerant as the refrigerant causes a temperature glide in the evaporator, the capacity of the heat exchanger that functions as the evaporator can be sufficiently provided.

(3-10) Tenth Embodiment

An air conditioning apparatus 1*i* serving as a refrigeration cycle apparatus according to a tenth embodiment is described below with reference to FIG. 3S which is a schematic configuration diagram of a refrigerant circuit and FIG. 3T which is a schematic control block configuration diagram. Differences from the air conditioning apparatus 1*h* according to the ninth embodiment are mainly described below.

(3-10-1) Schematic Configuration of Air Conditioning Apparatus 1*i*

The air conditioning apparatus 1*i* differs from the air conditioning apparatus 1*h* according to the ninth embodiment in that the first outdoor expansion valve 44 and the second outdoor expansion valve 45 are not provided, the outdoor expansion valve 24 is provided, a plurality of indoor units (a first indoor unit 30 and a second indoor unit 35) are provided in parallel, and an indoor expansion valve is provided on the liquid-refrigerant side of an indoor heat exchanger in each indoor unit.

The outdoor expansion valve 24 is provided midway in a refrigerant pipe extending from the liquid-side outlet of the outdoor heat exchanger 23 to the intermediate-pressure receiver 43. The outdoor expansion valve 24 is preferably an electric expansion valve of which the valve opening degree is adjustable.

Similarly to the above-described embodiment, the first indoor unit 30 includes a first indoor heat exchanger 31 and a first indoor fan 32, and a first indoor expansion valve 33 is provided on the liquid-refrigerant side of the first indoor heat exchanger 31. The first indoor expansion valve 33 is preferably an electric expansion valve of which the valve opening degree is adjustable. Similarly to the above-described embodiment, the first indoor unit 30 includes a first indoor-unit control unit 34; and a first indoor liquid-side heat-exchange temperature sensor 71, a first indoor air temperature sensor 72, and a first indoor gas-side heat-exchange temperature sensor 73 that are electrically connected to the first indoor-unit control unit 34. Similarly to the first indoor unit 30, the second indoor unit 35 includes a second indoor heat exchanger 36 and a second indoor fan 37, and a second indoor expansion valve 38 is provided on the liquid-refrigerant side of the second indoor heat exchanger 36. The second indoor expansion valve 38 is preferably an electric expansion valve of which the valve opening degree is adjustable. Similarly to the first indoor unit 30, the second indoor unit 35 includes a second indoor-unit control unit 39; and a second indoor liquid-side heat-exchange temperature sensor 75, a second indoor air temperature sensor 76, and a second indoor gas-side heat-exchange temperature sensor 77 that are electrically connected to the second indoor-unit control unit 39.

(3-10-2) Cooling Operating Mode

In the air conditioning apparatus 1*i*, in the cooling operating mode, capacity control is performed on the operating frequency of the compressor 21, for example, such that the evaporation temperature of the refrigerant in the refrigerant circuit 10 becomes a target evaporation temperature. In this case, the target evaporation temperature is preferably determined in accordance with one of the indoor units 30 and 35 having the largest difference between the set temperature and the indoor temperature (an indoor unit having the largest load).

The gas refrigerant discharged from the compressor 21 passes through the four-way switching valve 22 and then is condensed in the outdoor heat exchanger 23. The refrigerant which has flowed through the outdoor heat exchanger 23 passes through the outdoor expansion valve 24 controlled to be in a full-open state.

The refrigerant which has passed through the outdoor expansion valve 24 flows into the intermediate-pressure receiver 43. The intermediate-pressure receiver 43 stores, as the liquid refrigerant, an excessive refrigerant in the refrigerant circuit 10. In this case, the refrigerant which has flowed into the intermediate-pressure receiver 43 is cooled through heat exchange with the refrigerant flowing through a portion of the suction refrigerant heating section 50 on the suction side of the compressor 21. The refrigerant which has cooled in the suction refrigerant heating section 50 in the intermediate-pressure receiver 43 passes through the liquid-side shutoff valve 29 and the liquid-side connection pipe 6, and flows into the first indoor unit 30 and the second indoor unit 35.

The refrigerant which has flowed into the first indoor unit 30 is decompressed at the first indoor expansion valve 33 to a low pressure in the refrigeration cycle. The refrigerant which has flowed into the second indoor unit 35 is decompressed at the second indoor expansion valve 38 to a low pressure in the refrigeration cycle.

In this case, the valve opening degree of the first indoor expansion valve 33 is controlled to satisfy a predetermined condition, for example, such that the degree of superheating of the refrigerant flowing through the gas side of the first indoor heat exchanger 31 or the degree of superheating of the refrigerant to be sucked by the compressor 21 becomes a target value. Moreover, the valve opening degree of the second indoor expansion valve 38 is controlled to satisfy a predetermined condition, for example, such that the degree of superheating of the refrigerant flowing through the gas side of the second indoor heat exchanger 36 or the degree of superheating of the refrigerant to be sucked by the compressor 21 becomes a target value.

The refrigerant decompressed at the first indoor expansion valve 33 is evaporated in the first indoor heat exchanger 31, the refrigerant decompressed at the second indoor expansion valve 38 is evaporated in the second indoor heat exchanger 36, and the evaporated refrigerants are joined. Then, the joined refrigerant flows through the gas-side connection pipe 5, the gas-side shutoff valve 28, and the four-way switching valve 22, and flows inside the refrigerant pipe that passes through the inside of the intermediate-pressure receiver 43. The refrigerant flowing inside the refrigerant pipe that passes through the inside of the intermediate-pressure receiver 43 is heated through heat exchange with the refrigerant stored in the intermediate-pressure receiver 43, in the suction refrigerant heating section 50 in the intermediate-pressure receiver 43, and is sucked into the compressor 21 again.

(3-10-3) Heating Operating Mode

In the air conditioning apparatus 1*i*, in the heating operating mode, capacity control is performed on the operating frequency of the compressor 21, for example, such that the condensation temperature of the refrigerant in the refrigerant circuit 10 becomes a target condensation temperature. In this case, the target condensation temperature is preferably determined in accordance with one of the indoor units 30 and 35 having the largest difference between the set temperature and the indoor temperature (an indoor unit having the largest load).

The gas refrigerant discharged from the compressor 21 flows through the four-way switching valve 22 and the gas-side connection pipe 5, and then flows into each of the first indoor unit 30 and the second indoor unit 35.

The refrigerant which has flowed into the first indoor unit 30 is condensed in the first indoor heat exchanger 31. The refrigerant which has flowed into the second indoor unit 35 is condensed in the second indoor heat exchanger 36.

The refrigerant which has flowed out from the liquid-side end of the first indoor heat exchanger 31 is decompressed at the first indoor expansion valve 33 to an intermediate pressure in the refrigeration cycle. The refrigerant which has flowed out from the liquid-side end of the second indoor heat exchanger 36 is decompressed at the second indoor expansion valve 38 to an intermediate pressure in the refrigeration cycle.

In this case, the valve opening degree of the first indoor expansion valve 33 is controlled to satisfy a predetermined condition, for example, such that the degree of subcooling of the refrigerant flowing through the liquid-side outlet of the first indoor heat exchanger 31 becomes a target value. Also, the valve opening degree of the second indoor expansion valve 38 is controlled to satisfy a predetermined condition, for example, such that the degree of subcooling of the refrigerant flowing through the liquid-side outlet of the second indoor heat exchanger 36 becomes a target value.

The refrigerant which has passed through the first indoor expansion valve 33 and the refrigerant which has passed through the second indoor expansion valve 38 are joined. Then, the joined refrigerant passes through the liquid-side connection pipe 6 and flows into the outdoor unit 20.

The refrigerant which has flowed into the outdoor unit 20 passes through the liquid-side shutoff valve 29, and flows into the intermediate-pressure receiver 43. The intermediate-pressure receiver 43 stores, as the liquid refrigerant, an excessive refrigerant in the refrigerant circuit 10. In this case, the refrigerant which has flowed into the intermediate-pressure receiver 43 is cooled through heat exchange with the refrigerant flowing through a portion of the suction refrigerant heating section 50 on the suction side of the compressor 21. The refrigerant which has cooled in the suction refrigerant heating section 50 in the intermediate-pressure receiver 43 is decompressed to a low pressure in the refrigeration cycle at the outdoor expansion valve 24.

In this case, the valve opening degree of the outdoor expansion valve 24 is controlled to satisfy a predetermined condition, for example, such that the degree of superheating of the refrigerant to be sucked by the compressor 21 becomes a target value. Note that the method of controlling the valve opening degree of the outdoor expansion valve 24 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the outdoor expansion valve 24 is evaporated in the outdoor heat exchanger 23, passes through the four-way switching valve 22, and flows inside the refrigerant pipe that passes through the inside of the intermediate-pressure receiver 43. The refrigerant flowing inside the refrigerant pipe that passes through the inside of the intermediate-pressure receiver 43 is heated through heat exchange with the refrigerant stored in the intermediate-pressure receiver 43, in the suction refrigerant heating section 50 in the intermediate-pressure receiver 43, and is sucked into the compressor 21 again.

(3-10-4) Characteristics of Tenth Embodiment

Since the air conditioning apparatus 1*i* can perform the refrigeration cycle using the refrigerant containing 1,2-difluoroethylene, the air conditioning apparatus 1*i* can perform a refrigeration cycle using a small-GWP refrigerant.

Moreover, since the air conditioning apparatus 1*i* is provided with the intermediate-pressure receiver 43, an excessive refrigerant in the refrigerant circuit 10 can be stored. During heating operation, since subcooling control is performed on the second outdoor expansion valve 45, the capacity of the indoor heat exchanger 31 can be likely sufficiently provided.

Furthermore, since the suction refrigerant heating section 50 is provided, the refrigerant to be sucked into the compressor 21 is heated and liquid compression in the compressor 21 is suppressed. Control can be provided to cause the degree of superheating of the refrigerant flowing through the outlet of the indoor heat exchanger 31 that functions as the evaporator of the refrigerant during cooling operation to be a small value. Also, similarly in heating operation, control can be provided to cause the degree of superheating of the refrigerant flowing through the outlet of the outdoor heat exchanger 23 that functions as the evaporator of the refrigerant to be a small value. Thus, in either of cooling operation and heating operation, even when use of a nonazeotropic mixed refrigerant as the refrigerant causes a temperature glide in the evaporator, the capacity of the heat exchanger that functions as the evaporator can be sufficiently provided.

(3-11) Eleventh Embodiment

An air conditioning apparatus 1*j* serving as a refrigeration cycle apparatus according to an eleventh embodiment is described below with reference to FIG. 3U which is a schematic configuration diagram of a refrigerant circuit and FIG. 3V which is a schematic control block configuration diagram. Differences from the air conditioning apparatus 1*h* according to the ninth embodiment are mainly described below.

(3-11-1) Schematic Configuration of Air Conditioning Apparatus 1*j*

The air conditioning apparatus 1*j* differs from the air conditioning apparatus 1*h* according to the ninth embodiment in that the suction refrigerant heating section 50 is not provided and an internal heat exchanger 51 is provided.

The internal heat exchanger 51 is a heat exchanger that exchanges heat between the refrigerant flowing between the first outdoor expansion valve 44 and the second outdoor expansion valve 45 and the refrigerant flowing through the refrigerant pipe extending from one of the connecting ports of the four-way switching valve 22 toward the suction side of the compressor 21.

(3-11-2) Cooling Operating Mode

In the air conditioning apparatus 1*j*, in the cooling operating mode, capacity control is performed on the operating frequency of the compressor 21, for example, such that the evaporation temperature of the refrigerant in the refrigerant circuit 10 becomes a target evaporation temperature that is determined in accordance with the difference between the set temperature and the indoor temperature (the detected temperature of the indoor air temperature sensor 72).

The gas refrigerant discharged from the compressor 21 passes through the four-way switching valve 22 and then is condensed in the outdoor heat exchanger 23. The refrigerant which has flowed through the outdoor heat exchanger 23 passes through the first outdoor expansion valve 44 controlled to be in a full-open state. The refrigerant which has passed through the first outdoor expansion valve 44 is cooled in the internal heat exchanger 51 and decompressed to a low pressure in the refrigeration cycle at the second outdoor expansion valve 45.

In this case, the valve opening degree of the second outdoor expansion valve 45 is controlled to satisfy a predetermined condition, for example, such that the degree of superheating of the refrigerant flowing through the gas side of the indoor heat exchanger 31 or the degree of superheating of the refrigerant to be sucked by the compressor 21 becomes a target value. Note that the method of controlling the valve opening degree of the second outdoor expansion valve 45 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the second outdoor expansion valve 45 to the low pressure in the refrigeration cycle passes through the liquid-side shutoff valve 29 and the liquid-side connection pipe 6, flows into the indoor unit 30, and is evaporated in the indoor heat exchanger 31. The refrigerant which has flowed through the indoor heat exchanger 31 flows through the gas-side connection pipe 5, then passes through the gas-side shutoff valve 28 and the four-way switching valve 22, is heated in the internal heat exchanger 51, and is sucked into the compressor 21 again.

(3-11-3) Heating Operating Mode

In the air conditioning apparatus 1*j*, in the heating operating mode, capacity control is performed on the operating frequency of the compressor 21, for example, such that the condensation temperature of the refrigerant in the refrigerant circuit 10 becomes a target condensation temperature that is determined in accordance with the difference between the set temperature and the indoor temperature (the detected temperature of the indoor air temperature sensor 72).

The gas refrigerant discharged from the compressor 21 flows through the four-way switching valve 22 and the gas-side connection pipe 5, then flows into the gas-side end of the indoor heat exchanger 31 of the indoor unit 30, and is condensed in the indoor heat exchanger 31. The refrigerant which has flowed out from the liquid-side end of the indoor heat exchanger 31 flows through the liquid-side connection pipe 6, flows into the outdoor unit 20, passes through the liquid-side shutoff valve 29, and passes through the second outdoor expansion valve 45 controlled to be in a full-open state. The refrigerant which has passed through the second outdoor expansion valve 45 is cooled in the internal heat exchanger 51 and decompressed to an intermediate pressure in the refrigeration cycle at the first outdoor expansion valve 44.

In this case, the valve opening degree of the first outdoor expansion valve 44 is controlled to satisfy a predetermined condition, for example, such that the degree of superheating of the refrigerant to be sucked by the compressor 21 becomes a target value. Note that the method of controlling the valve opening degree of the first outdoor expansion valve 44 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the first outdoor expansion valve 44 is evaporated in the outdoor heat exchanger 23, passes through the four-way switching valve 22, is heated in the internal heat exchanger 51, and is sucked into the compressor 21 again.

(3-11-4) Characteristics of Eleventh Embodiment

Since the air conditioning apparatus 1*j* can perform the refrigeration cycle using the refrigerant containing 1,2- difluoroethylene, the air conditioning apparatus 1*j* can perform a refrigeration cycle using a small-GWP refrigerant.

Furthermore, since the air conditioning apparatus 1*j* is provided with the internal heat exchanger 51, the refrigerant to be sucked into the compressor 21 is heated and liquid compression in the compressor 21 is suppressed. Control can be provided to cause the degree of superheating of the refrigerant flowing through the outlet of the indoor heat exchanger 31 that functions as the evaporator of the refrigerant during cooling operation to be a small value. Also, similarly in heating operation, control can be provided to cause the degree of superheating of the refrigerant flowing through the outlet of the outdoor heat exchanger 23 that functions as the evaporator of the refrigerant to be a small value. Thus, in either of cooling operation and heating operation, even when use of a nonazeotropic mixed refrigerant as the refrigerant causes a temperature glide in the evaporator, the capacity of the heat exchanger that functions as the evaporator can be sufficiently provided.

(3-12) Twelfth Embodiment

An air conditioning apparatus 1*k* serving as a refrigeration cycle apparatus according to a twelfth embodiment is described below with reference to FIG. 3W which is a schematic configuration diagram of a refrigerant circuit and FIG. 3X which is a schematic control block configuration diagram. Differences from the air conditioning apparatus 1*j* according to the tenth embodiment are mainly described below.

(3-12-1) Schematic Configuration of Air Conditioning Apparatus 1*k*

The air conditioning apparatus 1*k* differs from the air conditioning apparatus 1*j* according to the tenth embodiment in that the first outdoor expansion valve 44 and the second outdoor expansion valve 45 are not provided, but an outdoor expansion valve 24 is provided; a plurality of indoor units (a first indoor unit 30 and a second indoor unit 35) are provided in parallel; and an indoor expansion valve is provided on the liquid-refrigerant side of an indoor heat exchanger in each indoor unit.

The outdoor expansion valve 24 is provided midway in the refrigerant pipe extending from the internal heat exchanger 51 to the liquid-side shutoff valve 29. The outdoor expansion valve 24 is preferably an electric expansion valve of which the valve opening degree is adjustable.

Similarly to the above-described embodiment, the first indoor unit 30 includes a first indoor heat exchanger 31 and a first indoor fan 32, and a first indoor expansion valve 33 is provided on the liquid-refrigerant side of the first indoor heat exchanger 31. The first indoor expansion valve 33 is preferably an electric expansion valve of which the valve opening degree is adjustable. Similarly to the above-described embodiment, the first indoor unit 30 includes a first indoor-unit control unit 34, and a first indoor liquid-side heat-exchange temperature sensor 71, a first indoor air temperature sensor 72, and a first indoor gas-side heat-exchange temperature sensor 73 that are electrically connected to the first indoor-unit control unit 34. Similarly to the first indoor unit 30, the second indoor unit 35 includes a second indoor heat exchanger 36 and a second indoor fan 37, and a second indoor expansion valve 38 is provided on the liquid-refrigerant side of the second indoor heat exchanger 36. The second indoor expansion valve 38 is preferably an electric expansion valve of which the valve opening degree is adjustable. Similarly to the first indoor unit 30, the second indoor unit 35 includes a second indoor-unit control unit 39, and a second indoor liquid-side heat-exchange temperature sensor 75, a second indoor air temperature sensor 76, and a second indoor gas-side heat-exchange temperature sensor 77 that are electrically connected to the second indoor-unit control unit 39.

(3-12-2) Cooling Operating Mode

In the air conditioning apparatus 1*k*, in the cooling operating mode, capacity control is performed on the operating frequency of the compressor 21, for example, such that the evaporation temperature of the refrigerant in the refrigerant circuit 10 becomes a target evaporation temperature. In this case, the target evaporation temperature is preferably determined in accordance with one of the indoor units 30 and 35 having the largest difference between the set temperature and the indoor temperature (an indoor unit having the largest load).

The gas refrigerant discharged from the compressor 21 passes through the four-way switching valve 22 and then is condensed in the outdoor heat exchanger 23. The refrigerant which has flowed through the outdoor heat exchanger 23 is cooled in the internal heat exchanger 51, passes through the outdoor expansion valve 24 controlled to be in a full-open state, passes through the liquid-side shutoff valve 29, and the liquid-side connection pipe 6, and flows into each of the first indoor unit 30 and the second indoor unit 35.

The refrigerant which has flowed into the first indoor unit 30 is decompressed at the first indoor expansion valve 33 to a low pressure in the refrigeration cycle. The refrigerant which has flowed into the second indoor unit 35 is decompressed at the second indoor expansion valve 38 to a low pressure in the refrigeration cycle.

In this case, the valve opening degree of the first indoor expansion valve 33 is controlled to satisfy a predetermined condition, for example, such that the degree of superheating of the refrigerant flowing through the gas side of the first indoor heat exchanger 31 or the degree of superheating of the refrigerant to be sucked by the compressor 21 becomes a target value. Moreover, likewise, the valve opening degree of the second indoor expansion valve 38 is also controlled to satisfy a predetermined condition, for example, such that the degree of superheating of the refrigerant flowing through the gas side of the second indoor heat exchanger 36 or the degree of superheating of the refrigerant to be sucked by the compressor 21 becomes a target value.

The refrigerant decompressed at the first indoor expansion valve 33 is evaporated in the first indoor heat exchanger 31, the refrigerant decompressed at the second indoor expansion valve 38 is evaporated in the second indoor heat exchanger 36, and the evaporated refrigerants are joined. Then, the joined refrigerant flows through the gas-side connection pipe 5, passes through the gas-side shutoff valve 28 and the four-way switching valve 22, is heated in the internal heat exchanger 51, and is sucked by the compressor 21 again.

(3-12-3) Heating Operating Mode

In the air conditioning apparatus 1*k*, in the heating operating mode, capacity control is performed on the operating frequency of the compressor 21, for example, such that the condensation temperature of the refrigerant in the refrigerant circuit 10 becomes a target condensation temperature. In this case, the target condensation temperature is preferably determined in accordance with one of the indoor units 30 and 35 having the largest difference between the set temperature and the indoor temperature (an indoor unit having the largest load).

The gas refrigerant discharged from the compressor 21 flows through the four-way switching valve 22 and the gas-side connection pipe 5, and then flows into each of the first indoor unit 30 and the second indoor unit 35.

The refrigerant which has flowed into the first indoor unit 30 is condensed in the first indoor heat exchanger 31. The refrigerant which has flowed into the second indoor unit 35 is condensed in the second indoor heat exchanger 36.

The refrigerant which has flowed out from the liquid-side end of the first indoor heat exchanger 31 is decompressed at the first indoor expansion valve 33 to an intermediate pressure in the refrigeration cycle. The refrigerant which has flowed out from the liquid-side end of the second indoor heat exchanger 36 is also likewise decompressed at the second indoor expansion valve 38 to an intermediate pressure in the refrigeration cycle.

In this case, the valve opening degree of the first indoor expansion valve 33 is controlled to satisfy a predetermined condition, for example, such that the degree of subcooling of the refrigerant flowing through the liquid-side outlet of the first indoor heat exchanger 31 becomes a target value. Also, the valve opening degree of the second indoor expansion valve 38 is controlled to satisfy a predetermined condition, for example, such that the degree of subcooling of the refrigerant flowing through the liquid-side outlet of the second indoor heat exchanger 36 becomes a target value.

The refrigerant which has passed through the first indoor expansion valve 33 and the refrigerant which has passed through the second indoor expansion valve 38 are joined. Then, the joined refrigerant passes through the liquid-side connection pipe 6 and flows into the outdoor unit 20.

The refrigerant which has flowed into the outdoor unit 20 passes through the liquid-side shutoff valve 29 and is decompressed at the outdoor expansion valve 24 to a low pressure in the refrigeration cycle.

In this case, the valve opening degree of the outdoor expansion valve 24 is controlled to satisfy a predetermined condition, for example, such that the degree of superheating of the refrigerant to be sucked by the compressor 21 becomes a target value. Note that the method of controlling the valve opening degree of the outdoor expansion valve 24 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the outdoor expansion valve 24 is evaporated in the outdoor heat exchanger 23, passes through the four-way switching valve 22, is heated in the internal heat exchanger 51, and is sucked into the compressor 21 again.

(3-12-4) Characteristics of Twelfth Embodiment

Since the air conditioning apparatus 1*k* can perform the refrigeration cycle using the refrigerant containing 1,2-difluoroethylene, the air conditioning apparatus 1*k* can perform a refrigeration cycle using a small-GWP refrigerant.

In the air conditioning apparatus 1*k*, during heating operation, since subcooling control is performed on the first indoor expansion valve 33 and the second indoor expansion valve 38, the capacities of the first indoor heat exchanger 31 and the second indoor heat exchanger 36 can be likely sufficiently provided.

Furthermore, since the air conditioning apparatus 1*k* is provided with the internal heat exchanger 51, the refrigerant to be sucked into the compressor 21 is heated and liquid compression in the compressor 21 is suppressed. Control can be provided to cause the degrees of superheating of the refrigerant flowing through the outlets of the first indoor heat exchanger 31 and the second indoor heat exchanger 36 that function as the evaporators of the refrigerant during cooling operation to be small values. Also, similarly in heating operation, control can be provided to cause the degree of superheating of the refrigerant flowing through the outlet of the outdoor heat exchanger 23 that functions as the evaporator of the refrigerant to be a small value. Thus, in either of cooling operation and heating operation, even when use of a nonazeotropic mixed refrigerant as the refrigerant causes a temperature glide in the evaporator, the capacity of the heat exchanger that functions as the evaporator can be sufficiently provided.

(4) Embodiment of the Technique of Fourth Group (4-1) First Embodiment

Figure 4A:
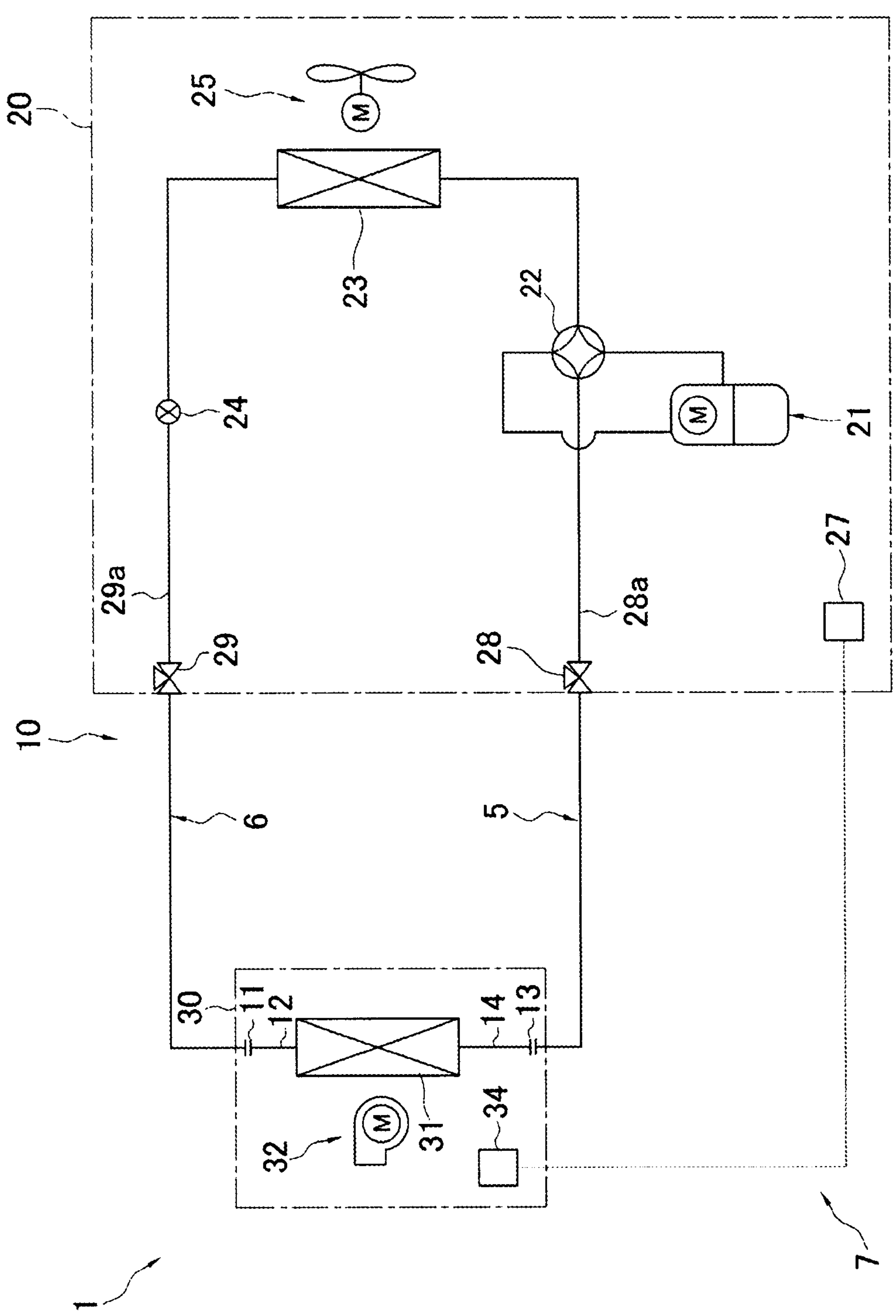
FIG. 4A illustrates the schematic configuration of a refrigerant circuit in accordance with a first embodiment of the technique of fourth group.
Figure 4B:
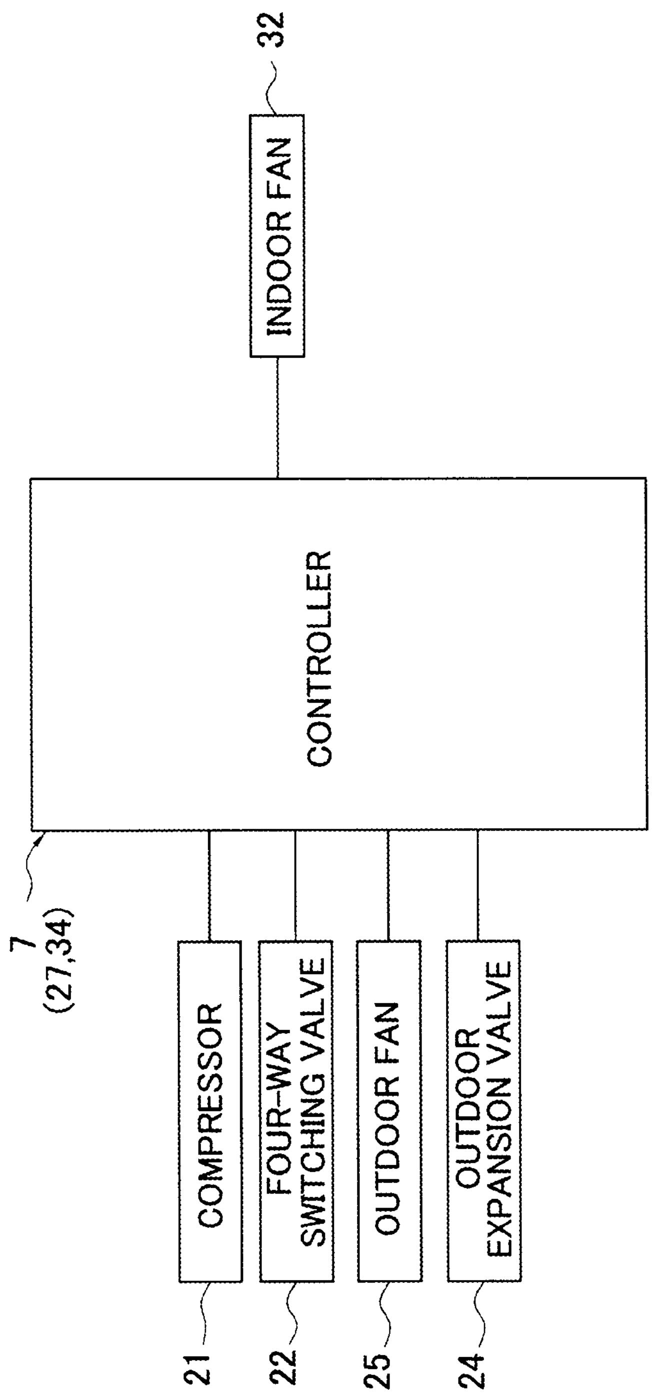
FIG. 4B is a schematic control block diagram of a refrigeration cycle apparatus in accordance with the first embodiment of the technique of fourth group.

Now, with reference to FIG. 4A that illustrates the schematic configuration of a refrigerant circuit, and FIG. 4B that is a schematic control block diagram, the following describes an air-conditioning apparatus 1 according to a first embodiment, which is a refrigeration cycle apparatus including an indoor unit serving as a heat exchange unit and an outdoor unit serving as a heat exchange unit.

The air-conditioning apparatus 1 is an apparatus that performs a vapor compression refrigeration cycle to condition air in a space that is to be air-conditioned.

The air-conditioning apparatus 1 includes the following components as its main components: an outdoor unit 20; an indoor unit 30; a liquid-side refrigerant connection pipe 6 and a gas-side refrigerant connection pipe 5 that connect the outdoor unit 20 and the indoor unit 30; a remote controller (not illustrated) serving as an input device and an output device; and a controller 7 that controls operation of the air-conditioning apparatus 1.

In the air-conditioning apparatus 1, a refrigeration cycle is performed in which refrigerant charged in a refrigerant circuit 10 is compressed, cooled or condensed, decompressed, and then heated or evaporated before being compressed again. In the first embodiment, the refrigerant circuit 10 is filled with a refrigerant used for performing a vapor compression refrigeration cycle. The refrigerant is a refrigerant containing 1,2-difluoroethylene. Any one of the refrigerants A to D mentioned above can be used as the refrigerant. Further, the refrigerant circuit 10 is filled with refrigerating machine oil together with the refrigerant.

(4-1-1) Outdoor Unit 20

Figure 4C:
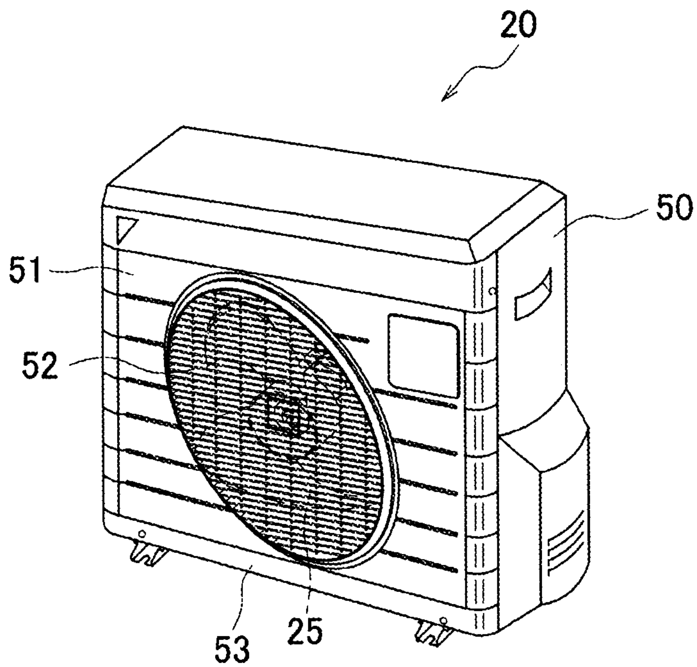
FIG. 4C is a schematic exterior perspective view of an outdoor unit in accordance with the first embodiment of the technique of fourth group.
Figure 4D:
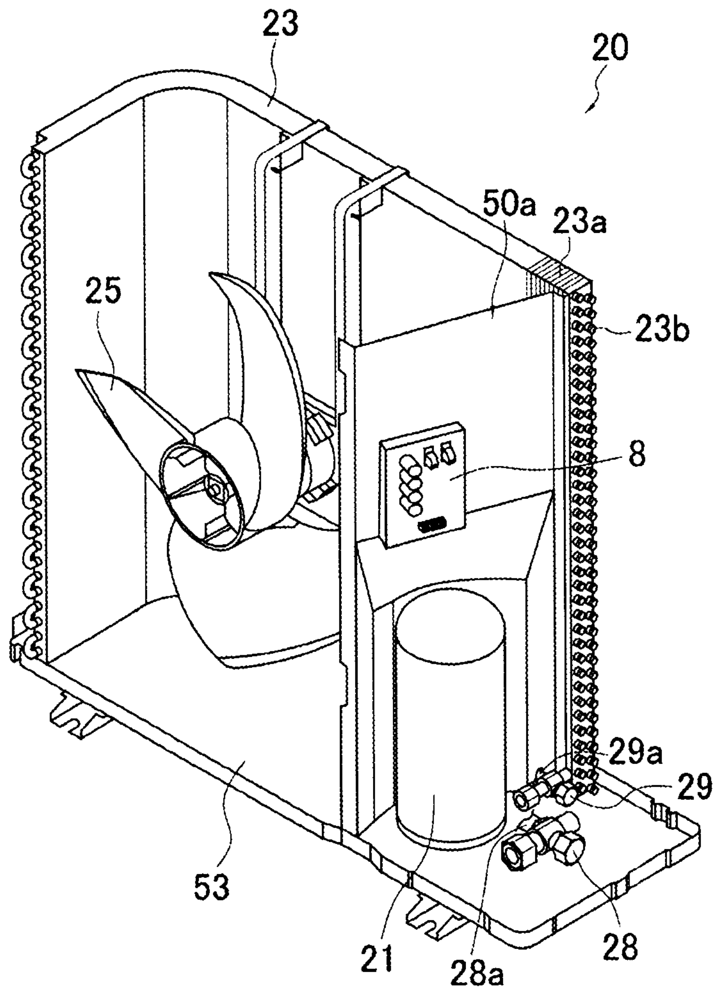
FIG. 4D is a perspective view illustrating the schematic internal structure of the outdoor unit in accordance with the first embodiment of the technique of fourth group.

As illustrated in FIG. 4C, the exterior of the outdoor unit 20 is defined by an outdoor housing 50 having a substantially cuboid box shape. As illustrated in FIG. 4D, the internal space of the outdoor unit 20 is divided by a partition plate 50*a* into left and right portions to define a fan chamber and a machine chamber.

The outdoor unit 20 is connected to the indoor unit 30 via the liquid-side refrigerant connection pipe 6 and the gas-side refrigerant connection pipe 5, and constitutes a portion of the refrigerant circuit 10. The outdoor unit 20 includes, as its main components, a compressor 21, a four-way switching valve 22, an outdoor heat exchanger 23, an outdoor expansion valve 24, an outdoor fan 25, a liquid-side shutoff valve 29, a gas-side shutoff valve 28, the outdoor housing 50, and an outdoor electric component unit 8.

The compressor 21 is a device that compresses low-pressure refrigerant into a high pressure in the refrigeration cycle. The compressor 21 used in the present case is a hermetic compressor with a rotary, scroll, or other type of positive displacement compression element (not illustrated) rotatably driven by a compressor motor. The compressor motor is used to change compressor capacity, and allows control of operating frequency by means of an inverter. The compressor 21 is provided with an attached accumulator (not illustrated) disposed on its suction side.

The four-way switching valve 22 is capable of switching its connection states between a cooling-operation connection state, in which the four-way switching valve 22 connects the discharge side of the compressor 21 with the outdoor heat exchanger 23 while connecting the suction side of the compressor 21 with the gas-side shutoff valve 28, and a heating-operation connection state, in which the four-way switching valve 22 connects the discharge side of the compressor 21 with the gas-side shutoff valve 28 while connecting the suction side of the compressor 21 with the outdoor heat exchanger 23.

The outdoor heat exchanger 23 is a heat exchanger that functions as a condenser for high-pressure refrigerant in the refrigeration cycle during cooling operation, and functions as an evaporator for low-pressure refrigerant in the refrigeration cycle during heating operation. The outdoor heat exchanger 23 is a cross-flow fin-and-tube heat exchanger including a plurality of heat transfer fins 23*a* disposed in the thickness direction in an overlapping manner, and a plurality of heat transfer tubes 23*b* penetrating and secured to the heat transfer fins 23*a*.

The outdoor fan 25 generates an air flow for sucking outdoor air into the outdoor unit for heat exchange with refrigerant in the outdoor heat exchanger 23, and then discharging the resulting air to the outside. The outdoor fan 25 is rotationally driven by an outdoor-fan motor. In the first embodiment, only one outdoor fan 25 is provided.

The outdoor expansion valve 24, whose opening degree can be controlled, is located between the liquid-side end portion of the outdoor heat exchanger 23, and the liquid-side shutoff valve 29.

The liquid-side shutoff valve 29 is a manual valve disposed at a location in the outdoor unit 20 where the outdoor unit 20 connects with the liquid-side refrigerant connection pipe 6. The liquid-side shutoff valve 29 is flare-connected to the liquid-side refrigerant connection pipe 6. The liquid-side shutoff valve 29, and the liquid-side outlet of the outdoor heat exchanger 23 are connected by an outdoor liquid-side refrigerant pipe 29*a*. The outdoor expansion valve 24 is disposed at a point along the outdoor liquid-side refrigerant pipe 29*a*.

The gas-side shutoff valve 28 is a manual valve disposed at a location in the outdoor unit 20 where the outdoor unit 20 connects with the gas-side refrigerant connection pipe 5. The gas-side shutoff valve 28 is flare-connected to the gas-side refrigerant connection pipe 5. The gas-side shutoff valve 28, and one of the connection ports of the four-way switching valve 22 are connected by an outdoor gas-side refrigerant pipe 28*a*.

As illustrated in FIG. 4C, the outdoor housing 50 is a box-shaped body having an air outlet 52 and in which the components of the outdoor unit 20 are accommodated. The outdoor housing 50 has a substantially cuboid shape. The outdoor housing 50 is capable of taking in outdoor air from the back side and one lateral side (the left side in FIG. 4C), and capable of blowing out air that has passed through the outdoor heat exchanger 23 forward through the air outlet 52 provided on a front face 51 of the outdoor housing 50. The lower end portion of the outdoor housing 50 is covered with a bottom plate 53. As illustrated in FIG. 4D, the outdoor heat exchanger 23 is disposed upright on top of the bottom plate 53 so as to extend along the back side and one lateral side. The upper surface of the bottom plate 53 can serve as a drain pan.

The outdoor electric component unit 8 includes an outdoor-unit control unit 27 that controls operation of each component constituting the outdoor unit 20. The outdoor electric component unit 8 is disposed above the compressor 21 in a space located inside the outdoor housing 50 of the outdoor unit 20 and defining the machine chamber partitioned off by the partition plate 50*a*. The outdoor electric component unit 8 is secured to the partition plate 50*a*. The lower end portion of the outdoor electric component unit 8 is positioned above the liquid-side shutoff valve 29 and the gas-side shutoff valve 28 with respect to the vertical direction. The outdoor electric component unit 8 is preferably positioned 10 cm or more above and away from the liquid-side shutoff valve 29 and the gas-side shutoff valve 28. The outdoor-unit control unit 27 of the outdoor electric component unit 8 has a microcomputer including a CPU, a memory, and other components. The outdoor-unit control unit 27 is connected to an indoor-unit control unit 34 of indoor unit 30 via a communication line to transmit and receive a control signal or other information. The outdoor-unit control unit 27 is electrically connected to various sensors (not illustrated) to receive a signal from each sensor.

(4-1-2) Indoor Unit 30

The indoor unit 30 is installed on, for example, the wall surface of an indoor space that is to be air-conditioned. The indoor unit 30 is connected to the outdoor unit 20 via the liquid-side refrigerant connection pipe 6 and the gas-side refrigerant connection pipe 5, and constitutes a portion of the refrigerant circuit 10.

The indoor unit 30 includes components such as an indoor heat exchanger 31, an indoor fan 32, an indoor liquid-side connection part 11, an indoor gas-side connection part 13, an indoor housing 54, and an indoor electric component unit 9.

The liquid side of the indoor heat exchanger 31 is connected with the liquid-side refrigerant connection pipe 6, and the gas-side end is connected with the gas-side refrigerant connection pipe 5. The indoor heat exchanger 31 is a heat exchanger that functions as an evaporator for low-pressure refrigerant in the refrigeration cycle during cooling operation, and functions as a condenser for high-pressure refrigerant in the refrigeration cycle during heating operation. The indoor heat exchanger 31 includes a plurality of heat transfer fins 31*a* disposed in the thickness direction in an overlapping manner, and a plurality of heat transfer tubes 31*b* penetrating and secured to the heat transfer fins 31*a*.

The indoor liquid-side connection part 11 is a connection part that is provided in an end portion of an indoor liquid-side refrigerant pipe 12 extending from the liquid side of the indoor heat exchanger 31, and is flare-connected to the liquid-side refrigerant connection pipe 6.

The indoor gas-side connection part 13 is a connection part that is provided in an end portion of an indoor gas-side refrigerant pipe 14 extending from the gas side of the indoor heat exchanger 31, and is flare-connected to the gas-side refrigerant connection pipe 5.

The indoor fan 32 generates an air flow for sucking indoor air into the indoor housing 54 of the indoor unit 30 for heat exchange with refrigerant in the indoor heat exchanger 31, and then discharging the resulting air to the outside. The indoor fan 32 is rotationally driven by an indoor-fan motor (not illustrated).

Figure 4E:
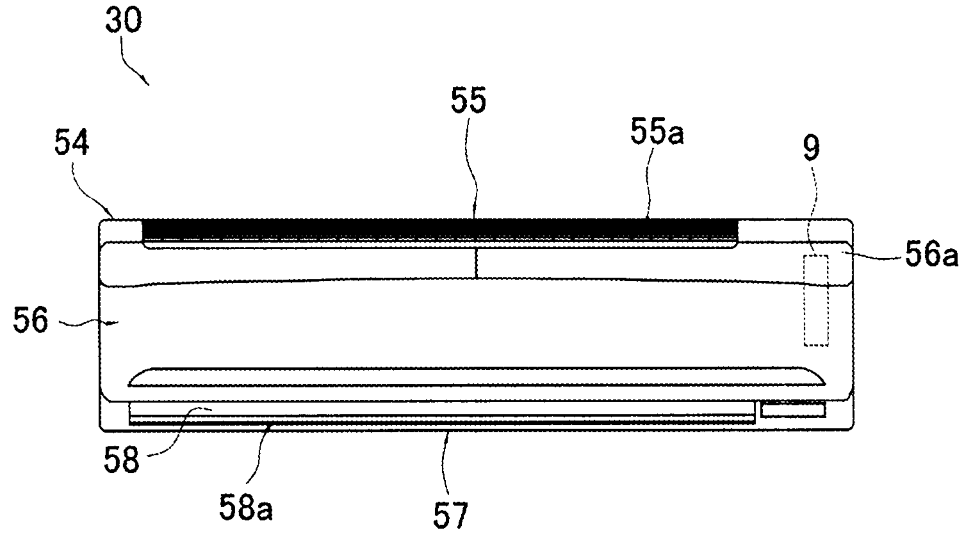
FIG. 4E is a schematic exterior front view of an indoor unit in accordance with the first embodiment of the technique of fourth group.
Figure 4F:
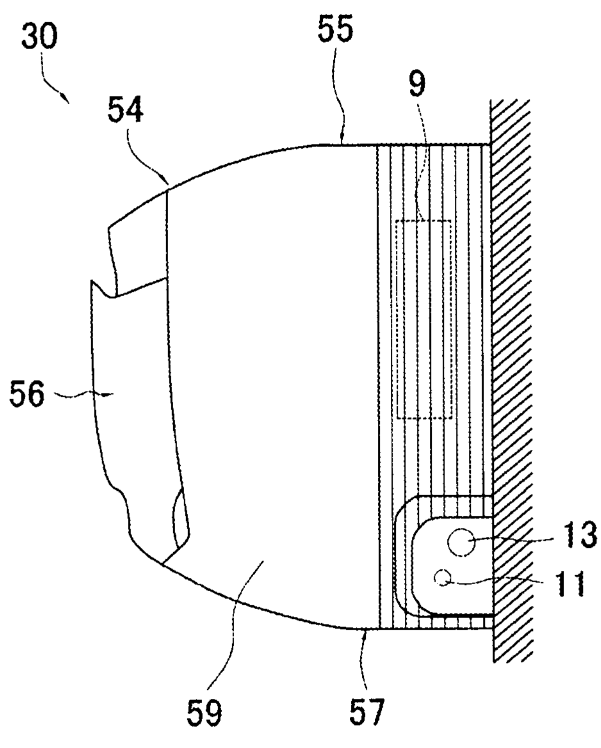
FIG. 4F is a schematic side view of the indoor unit in accordance with the first embodiment of the technique of fourth group.
Figure 4G:
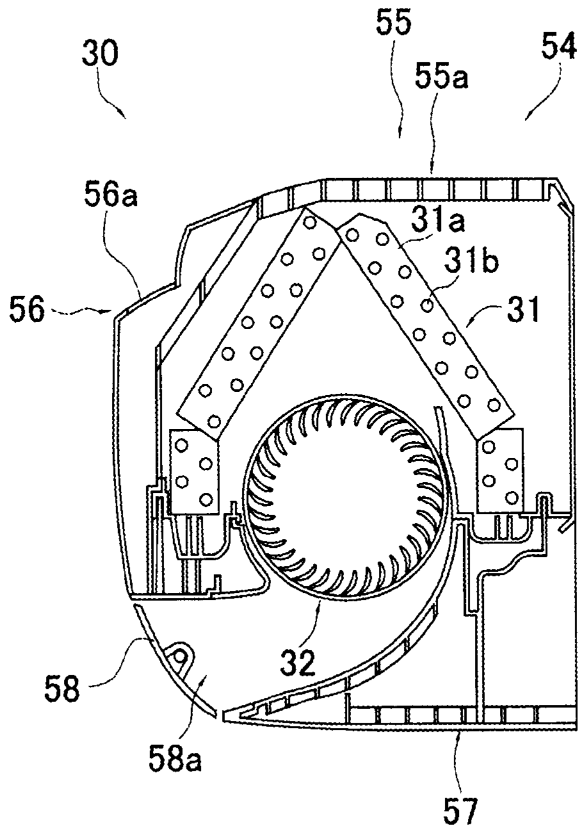
FIG. 4G is a cross-sectional view illustrating the schematic internal structure of the indoor unit in accordance with the first embodiment of the technique of fourth group.

As illustrated in FIGS. 4E, 4F, and 4G, the indoor housing 54 is a housing with a substantially cuboid shape that accommodates the indoor heat exchanger 31, the indoor fan 32, and the indoor-unit control unit 34. The indoor housing 54 has, for example, a top face 55 defining the upper end portion of the indoor housing 54, a front panel 56 defining the front portion of the indoor housing 54, a bottom face 57 defining the bottom portion of the indoor housing 54, an air outlet 58*a*, a louver 58, left and right side faces 59, and a back face facing the indoor wall surface. The top face 55 has a plurality of top air inlets 55*a* defined in the vertical direction. The front panel 56 is a panel that extends downward from the vicinity of the front end portion of the top face 55. The front panel 56 has, in its upper portion, a front air inlet 56*a* defined by a laterally elongated opening. Indoor air is admitted through the top air inlets 55*a* and the front air inlet 56*a* into an air passage defined by a space inside the indoor housing 54 where the indoor heat exchanger 31 and the indoor fan 32 are accommodated. The bottom face 57 extends substantially horizontally below the indoor heat exchanger 31, the indoor fan 32, and other components. The air outlet 58*a* is provided at a lower front location of the indoor housing 54, below the front panel 56 and at the front side of the bottom face 57, such that the air outlet 58*a* is directed toward the lower front. A laterally oriented opening is provided at a lower position on the right side face 59, near the back side. The indoor liquid-side connection part 11 and the indoor gas-side connection part 13 are located in the vicinity of the opening.

The indoor electric component unit 9 includes the indoor-unit control unit 34 that controls operation of each component constituting the indoor unit 30. The indoor electric component unit 9 is secured at an upper position inside the indoor housing 54 of the indoor unit 30 near a lateral end portion located rightward of the indoor heat exchanger 31. The lower end portion of the indoor electric component unit 9 is positioned above the indoor liquid-side connection part 11 and the indoor gas-side connecting part 13 with respect to the vertical direction. The indoor electric component unit 9 is preferably positioned 10 cm or more above and away from the indoor liquid-side connection part 11 and the indoor gas-side connecting part 13. The indoor-unit control unit 34 of the indoor electric component unit 9 has a microcomputer including a CPU, a memory, and other components. The indoor-unit control unit 34 is connected to the outdoor-unit control unit 27 via a communication line to transmit and receive a control signal or other information. The indoor-unit control unit 34 is electrically connected to various sensors (not illustrated) disposed inside the indoor unit 30, and receives a signal from each sensor.

(4-1-3) Details of Controller 7

For the air-conditioning apparatus 1, the outdoor-unit control unit 27 and the indoor-unit control unit 34 that are connected via a communication line constitute the controller 7 that controls operation of the air-conditioning apparatus 1.

The controller 7 includes, as its main components, a central processing unit (CPU), and a ROM, a RAM, or other memories. Various processes and controls are implemented by the controller 7 through the integral functioning of various components included in the outdoor-unit control unit 27 and/or the indoor-unit control unit 34.

(4-1-4) Operating Modes

Operating modes will be described below.

A cooling operation mode and a heating operation mode are provided as operation modes.

The controller 7 determines, based on an instruction accepted from a remote controller or other devices, whether the operating mode to be executed is the cooling operation mode or heating operation mode, and executes the operating mode.

(4-1-4-1) Cooling Operation Mode

In cooling operation mode, the air-conditioning apparatus 1 sets the four-way switching valve 22 to a cooling-operation connection state in which the four-way switching valve 22 connects the discharge side of the compressor 21 with the outdoor heat exchanger 23 while connecting the suction side of the compressor 21 with the gas-side shutoff valve 28, such that refrigerant charged in the refrigerant circuit 10 is circulated mainly through the compressor 21, the outdoor heat exchanger 23, the outdoor expansion valve 24, and the indoor heat exchanger 31 in this order.

More specifically, when the cooling operation mode is started, refrigerant in the refrigerant circuit 10 is sucked into and compressed by the compressor 21, and then discharged from the compressor 21.

The capacity of the compressor 21 is controlled in accordance with the cooling load required by the indoor unit 30. Gas refrigerant discharged from the compressor 21 passes through the four-way switching valve 22 into the gas-side end of the outdoor heat exchanger 23.

Upon entering the gas-side end of the outdoor heat exchanger 23, the refrigerant exchanges heat in the outdoor heat exchanger 23 with the outdoor-side air supplied by the outdoor fan 25 and thus condenses into liquid refrigerant, which then leaves the liquid-side end of the outdoor heat exchanger 23.

After leaving the liquid-side end of the outdoor heat exchanger 23, the refrigerant is decompressed when passing through the outdoor expansion valve 24. The outdoor expansion valve 24 is controlled such that the refrigerant passing through the liquid-side outlet of the outdoor heat exchanger 23 has a degree of subcooling that satisfies a predetermined condition.

The refrigerant decompressed in the outdoor expansion valve 24 then passes through the liquid-side shutoff valve 29 and the liquid-side refrigerant connection pipe 6 into the indoor unit 30.

Upon entering the indoor unit 30, the refrigerant flows into the indoor heat exchanger 31. In the indoor heat exchanger 31, the refrigerant exchanges heat with the indoor air supplied by the indoor fan 32 and thus evaporates into gas refrigerant, which then leaves the gas-side end of the indoor heat exchanger 31. After leaving the gas-side end of the indoor heat exchanger 31, the gas refrigerant flows toward the gas-side refrigerant connection pipe 5.

After flowing through the gas-side refrigerant connection pipe 5, the refrigerant passes through the gas-side shutoff valve 28 and the four-way switching valve 22 before being sucked into the compressor 21 again.

(4-1-4-2) Heating Operation Mode

In heating operation mode, the air-conditioning apparatus 1 sets the four-way switching valve 22 to a heating-operation connection state in which the four-way switching valve 22 connects the discharge side of the compressor 21 with the gas-side shutoff valve 28 while connecting the suction side of the compressor 21 with the outdoor heat exchanger 23, such that refrigerant charged in the refrigerant circuit 10 is circulated mainly through the compressor 21, the indoor heat exchanger 31, the outdoor expansion valve 24, and the outdoor heat exchanger 23 in this order.

More specifically, when the heating operation mode is started, refrigerant in the refrigerant circuit 10 is sucked into and compressed by the compressor 21, and then discharged from the compressor 21.

The capacity of the compressor 21 is controlled in accordance with the heating load required by the indoor unit 30. Gas refrigerant discharged from the compressor 21 flows through the four-way switching valve 22 and the gas-side refrigerant connection pipe 5, and then enters the indoor unit 30.

Upon entering the indoor unit 30, the refrigerant flows into the gas-side end of the indoor heat exchanger 31. In the indoor heat exchanger 31, the refrigerant exchanges heat with the indoor air supplied by the indoor fan 32 and thus condenses into gas-liquid two-phase refrigerant or liquid refrigerant, which then leaves the liquid-side end of the indoor heat exchanger 31. After leaving the liquid-side end of the indoor heat exchanger 31, the refrigerant flows toward the liquid-side refrigerant connection pipe 6.

After flowing through the liquid-side refrigerant connection pipe 6, the refrigerant is decompressed in the liquid-side shutoff valve 29 and the outdoor expansion valve 24 until its pressure reaches a low pressure in the refrigeration cycle. The outdoor expansion valve 24 is controlled such that the refrigerant passing through the liquid-side outlet of the indoor heat exchanger 31 has a degree of subcooling that satisfies a predetermined condition. The refrigerant decompressed in the outdoor expansion valve 24 flows into the liquid-side end of the outdoor heat exchanger 23.

Upon entering the liquid-side end of the outdoor heat exchanger 23, the refrigerant exchanges heat in the outdoor heat exchanger 23 with the outdoor air supplied by the outdoor fan 25 and thus evaporates into gas refrigerant, which then leaves the gas-side end of the outdoor heat exchanger 23.

After leaving the gas-side end of the outdoor heat exchanger 23, the refrigerant passes through the four-way switching valve 22 before being sucked into the compressor 21 again.

(4-1-5) Characteristic Features of First Embodiment

The air-conditioning apparatus 1 mentioned above uses a refrigerant containing 1,2-difluoroethylene, thus making it possible to keep the GWP sufficiently low.

The refrigerant containing 1,2-difluoroethylene is a flammable refrigerant. In this regard, the outdoor electric component unit 8 included in the outdoor unit 20 according to the first embodiment is positioned above the liquid-side shutoff valve 29 and the gas-side shutoff valve 28, which respectively connect the outdoor unit 20 to the liquid-side refrigerant connection pipe 6 and to the gas-side refrigerant connection pipe 5. This configuration ensures that even if a flammable refrigerant leaks from where the liquid-side shutoff valve 29 is connected and from where the gas-side shutoff valve 28 is connected, the likelihood of the leaked refrigerant reaching the outdoor electric component unit 8 is reduced, thus making it possible to increase the safety of the outdoor unit 20.

Further, the indoor electric component unit 9 included in the indoor unit 30 according to the first embodiment is positioned above the indoor liquid-side connection part 11 and the indoor gas-side connection part 13, which respectively connect the indoor unit 30 to the liquid-side refrigerant connection pipe 6 and to the gas-side refrigerant connection pipe 5. This configuration ensures that even if a flammable refrigerant leaks from where the indoor liquid-side connection part 11 is connected and from where the indoor gas-side connection part 13 is connected, the likelihood of the leaked refrigerant reaching the indoor electric component unit 9 is reduced, thus making it possible to increase the safety of the indoor unit 30.

(4-1-6) Modification A of First Embodiment

Although the foregoing description of the first embodiment is directed to an example in which the air-conditioning apparatus is provided with only one indoor unit, the air-conditioning apparatus may be provided with a plurality of indoor units connected in parallel with each other.

(4-1-7) Modification B of First Embodiment

The foregoing description is directed to an example in which the indoor unit used as the indoor unit 30 according to the first embodiment is of a type installed on, for example, the wall surface of an indoor space that is to be air-conditioned.

Figure 4H:
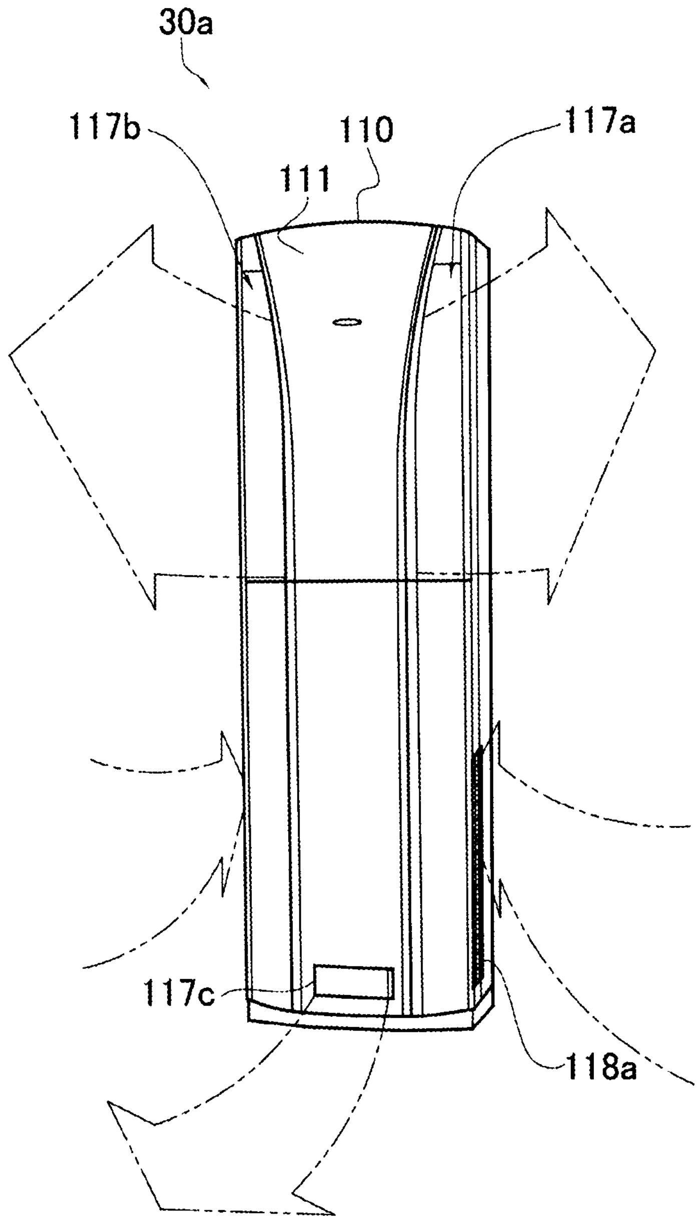
FIG. 4H is a schematic exterior front view of an indoor unit in accordance with Modification B of the first embodiment of the technique of fourth group.
Figure 4I:
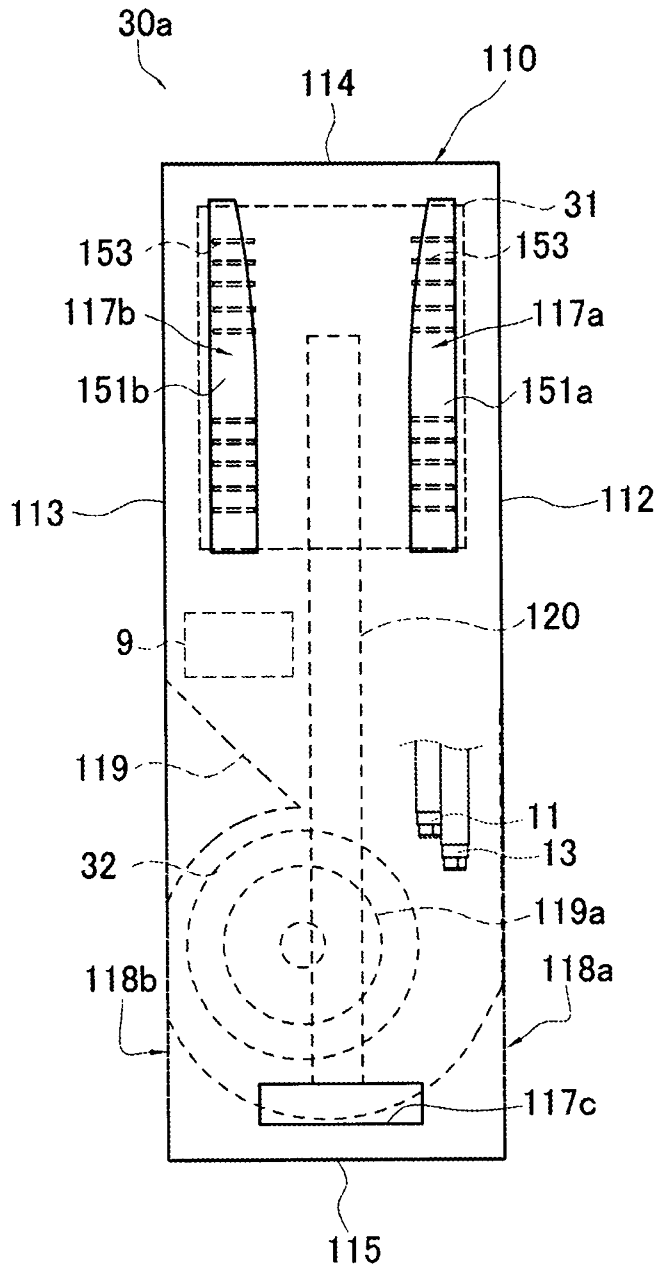
FIG. 4I is a schematic front view illustrating the internal structure of an indoor unit in accordance with Modification B of the first embodiment of the technique of fourth group.
Figure 4J:
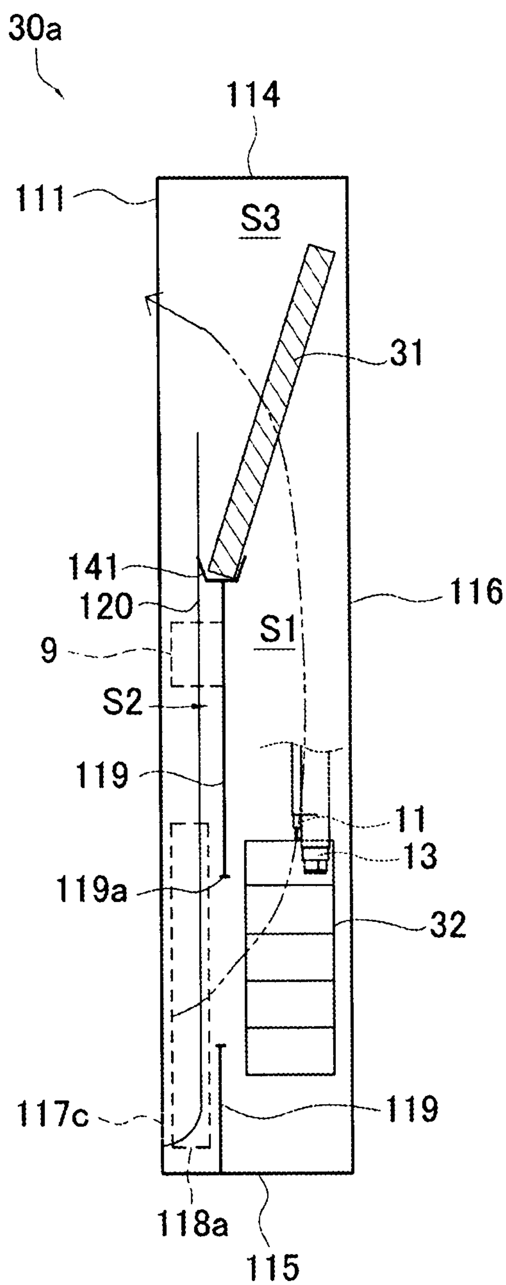
FIG. 4J is a schematic side view illustrating the schematic internal structure of the indoor unit in accordance with Modification B of the first embodiment of the technique of fourth group.

However, the indoor unit may not necessarily be of a type installed on the wall surface. For example, as illustrated in FIGS. 4H, 4, and 4J, the indoor unit used may be an indoor unit 30*a* of a floor-standing type placed on the indoor floor of an air-conditioned space.

The indoor unit 30*a* includes, as its main components, an indoor housing 110, the indoor heat exchanger 31, the indoor fan 32, the indoor electric component unit 9, the indoor liquid-side connection part 11, and the indoor gas-side connection part 13. The indoor heat exchanger 31 and the indoor fan 32 are accommodated in the indoor housing 110. The indoor heat exchanger 31 is disposed in an upper space inside the indoor housing 110, and the indoor fan 32 is disposed in a lower space inside the indoor housing 110.

The indoor housing 110 has a cuboid shape bounded by a front panel 111, a right side panel 112, a left side panel 113, a top panel 114, a bottom panel 115, and a back panel 116. The front panel 111 has a right-side air outlet 117*a* located at the upper right as viewed facing the front panel 111, a left-side air outlet 117*b* located at the upper left as viewed facing the front panel 111, and a lower air outlet 117*c* located in a lower, laterally central portion of the front panel 111. A vertical flap 151*a* is disposed at the right-side air outlet 117*a*. The vertical flap 151*a* is used to, during non-operation of the indoor unit 30*a*, cover the right-side air outlet 117*a* to constitute a portion of the indoor housing 110, and used to, during operation of the indoor unit 30*a*, adjust the lateral direction of the air flow (see the two-dot chain lines) blown out from the right-side air outlet 117*a*. Likewise, a vertical flap 151*b* is disposed at the left-side air outlet 117*b*. The vertical flap 151*b* is used to, during non-operation of the indoor unit 30*a*, cover the left-side air outlet 117*b* to constitute a portion of the indoor housing 110, and used to, during operation of the indoor unit 30*a*, adjust the lateral direction of the air flow blown out from the left-side air outlet 117*b*.

The right side panel 112 of the indoor housing 110 has a right-side air inlet 118*a* located in a lower portion toward the front. The left side panel 113 of the indoor housing 110 has a left-side air inlet 118*b* at a lower forward location.

The indoor fan 32 is, for example, a sirocco fan provided with a large number of blades and whose axis extends in the front-back direction. The indoor fan 32 is disposed in an internal space S1 partitioned off by a partition plate 119. An internal space S2 is defined forward of the internal space S1, between the partition plate 119 and the front panel 111. An internal space S3 is defined above the internal spaces S1 and S2, with the indoor heat exchanger 31 serving as the boundary.

The indoor heat exchanger 31 is positioned above the indoor fan 32, at the location of the boundary between the internal space S1 and the internal space S3. The indoor heat exchanger 31 is disposed in an inclined orientation such that its portion closer to the upper end is located closer to the back panel 116. The indoor heat exchanger 31 is supported at the lower end by a drain pan 141. The drain pan 141 is disposed on top of the partition plate 119. The partition plate 119 and the drain pan 141 serve as the boundary between the internal space S2 and the internal space S3. In other words, the internal space S1 is bounded by the right side panel 112, the left side panel 113, the bottom panel 115, the back panel 116, the partition plate 119, the drain pan 141, and the indoor heat exchanger 31. The internal space S2 is bounded by the front panel 111, the right side panel 112, the left side panel 113, the bottom panel 115, the partition plate 119, and the drain pan 141. The internal space S3 is bounded by the right side panel 112, the left side panel 113, the top panel 114, the indoor heat exchanger 31, the drain pan 141, and the partition plate 119.

The indoor liquid-side connection part 11 is a connection part that is provided in an end portion of the indoor liquid-side refrigerant pipe 12 extending from the liquid side of the indoor heat exchanger 31, and is flare-connected to the liquid-side refrigerant connection pipe 6. The indoor liquid-side connection part 11 is located at a height position similar to the upper end of the indoor fan 32.

The indoor gas-side connection part 13 is a connection part that is provided in an end portion of the indoor gas-side refrigerant pipe 14 extending from the gas side of the indoor heat exchanger 31, and is flare-connected to the gas-side refrigerant connection pipe 5. The indoor gas-side connection part 13 is located at a height position similar to the upper end of the indoor fan 32.

The indoor electric component unit 9 is disposed inside the indoor housing 110, below the indoor heat exchanger 31, above the indoor fan 32, and forward of the partition plate 119. The indoor electric component unit 9 is secured to the partition plate 119. The lower end portion of the indoor electric component unit 9 is positioned above the indoor liquid-side connection part 11 and the indoor gas-side connecting part 13 with respect to the vertical direction.

A duct 120, which extends vertically along the front panel 111, is provided in the internal space S2. An upper portion of the duct 120 extends to reach a position between the right-side air outlet 117*a* and the left-side air outlet 117*b* with respect to the vertical direction. The lower end of the duct 120 extends to reach an upper portion of the lower air outlet 117*c*.

The vertical flap 151*a* is disposed at the right-side air outlet 117*a*, and the vertical flap 151*b* is disposed at the left-side air outlet 117*b*. Changing the angle of the vertical flaps 151*a* and 151*b* with respect to the front panel 111 adjusts the angle at which to guide the conditioned air to be blown out.

Each of the right-side air outlet 117*a* and the left-side air outlet 117*b* is provided with a large number of horizontal flaps 153. Each horizontal flap 153 is capable of rotating about its axis to thereby change the direction of blown-out air.

For the above-mentioned indoor electric component unit 9 as well, even if a flammable refrigerant leaks from where the indoor liquid-side connection part 11 is connected and from where the indoor gas-side connection part 13 is connected, the likelihood of the leaked refrigerant reaching the indoor electric component unit 9 is reduced, thus making it possible to increase the safety of the indoor unit 30*a*.

(4-2) Second Embodiment

Figure 4K:
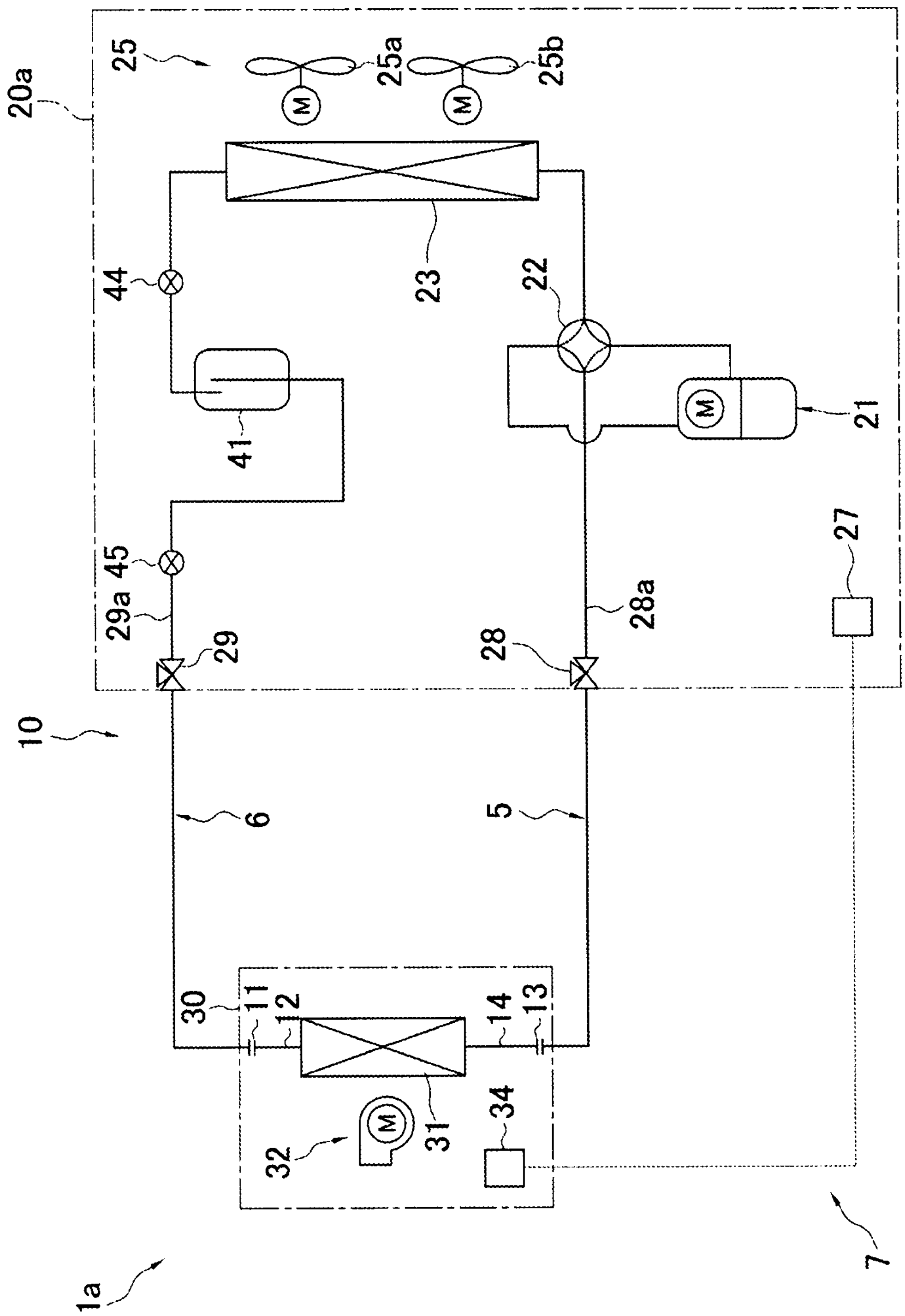
FIG. 4K illustrates the schematic configuration of a refrigerant circuit in accordance with a second embodiment of the technique of fourth group.
Figure 4L:
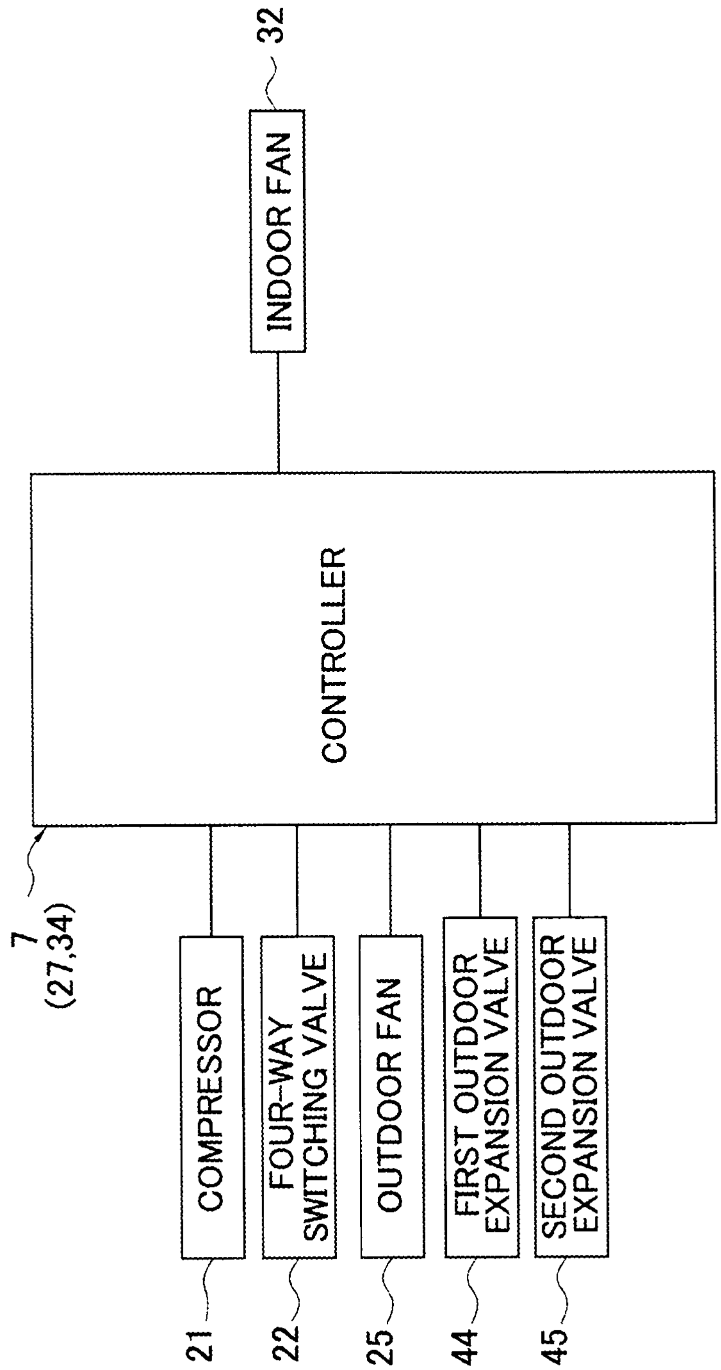
FIG. 4L is a schematic control block diagram of a refrigeration cycle apparatus in accordance with the second embodiment of the technique of fourth group.

Now, with reference to FIG. 4K that illustrates the schematic configuration of a refrigerant circuit, and FIG. 4L that is a schematic control block diagram, the following describes an air-conditioning apparatus 1*a* according to a second embodiment, which is a refrigeration cycle apparatus including an indoor unit serving as a heat exchange unit and an outdoor unit serving as a heat exchange unit.

The following description will mainly focus on differences of the air-conditioning apparatus 1*a* according to the second embodiment from the air-conditioning apparatus 1 according to the first embodiment.

For the air-conditioning apparatus 1*a* as well, the refrigerant circuit 10 is filled with, as refrigerant used for performing a vapor compression refrigeration cycle, any one of the refrigerants A to D described above that is a refrigerant mixture containing 1,2-difluoroethylene. The refrigerant circuit 10 is also filled with refrigerating machine oil together with the refrigerant.

(4-2-1) Outdoor Unit 20*a*

An outdoor unit 20*a* of the air-conditioning apparatus 1*a* according to the second embodiment includes, as the outdoor fan 25, a first outdoor fan 25*a* and a second outdoor fan 25*b*. The outdoor heat exchanger 23 of the outdoor unit 20*a* of the air-conditioning apparatus 1*a* is provided with a large heat exchange area to adapt to the flow of air received from the first outdoor fan 25*a* and the second outdoor fan 25*b*.

In the outdoor unit 20*a* of the air-conditioning apparatus 1*a*, instead of the outdoor expansion valve 24 of the outdoor unit 20 according to the first embodiment, a first outdoor expansion valve 44, an intermediate-pressure receiver 41, and a second outdoor expansion valve 45 are disposed in this order between the liquid-side of the outdoor heat exchanger 23 and the liquid-side shutoff valve 29. The respective opening degrees of the first outdoor expansion valve 44 and the second outdoor expansion valve 45 can be controlled. The intermediate-pressure receiver 41 is a container capable of storing refrigerant. An end portion of a pipe extending from the first outdoor expansion valve 44, and an end portion of a pipe extending from the second outdoor expansion valve 45 are both located in the internal space of the intermediate-pressure receiver 41.

Figure 4M:
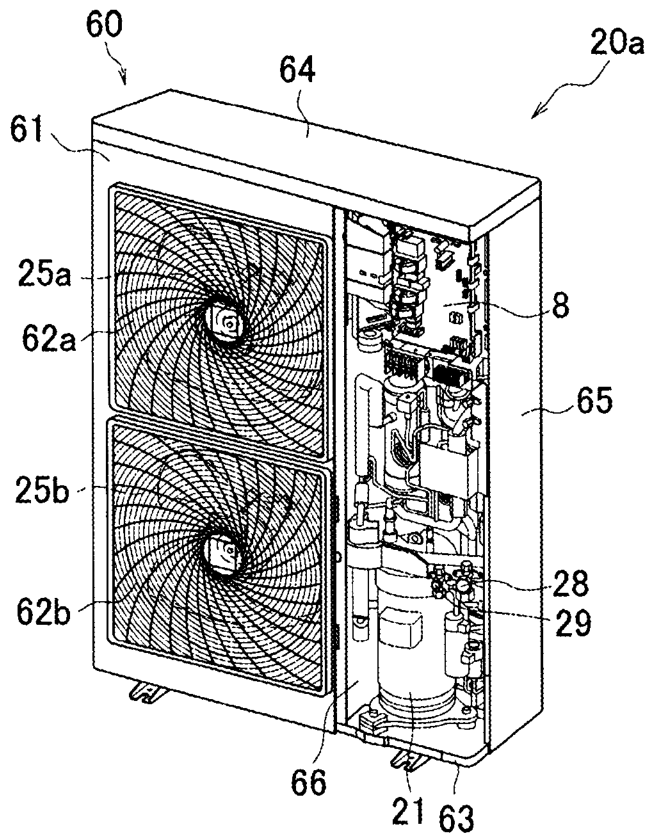
FIG. 4M is a perspective view illustrating the schematic configuration of an outdoor unit (with its front panel removed) in accordance with the second embodiment of the technique of fourth group.

As illustrated in FIG. 4M, the outdoor unit 20*a* according to the second embodiment has a structure (so-called trunk-type structure) in which the internal space of an outdoor housing 60 having a substantially cuboid box shape is divided by a vertically extending partition plate 66 into left and right portions to define a fan chamber and a machine chamber.

Components such as the outdoor heat exchanger 23 and the outdoor fan 25 (the first outdoor fan 25*a* and the second outdoor fan 25*b*) are disposed in the fan chamber within the outdoor housing 60. Components such as the compressor 21, the four-way switching valve 22, the first outdoor expansion valve 44, the second outdoor expansion valve 45, the intermediate-pressure receiver 41, the gas-side shutoff valve 28, the liquid-side shutoff valve 29, and the outdoor electric component unit 8 including the outdoor-unit control unit 27 are disposed in the machine chamber within the outdoor housing 60.

The outdoor housing 60 includes, as its main components, a bottom plate 63, a top plate 64, a left front plate 61, a left-side plate (not illustrated), a right front plate (not illustrated), a right-side plate 65, and the partition plate 66. The bottom plate 63 defines the bottom portion of the outdoor housing 60. The top plate 64 defines the top portion of the outdoor unit 20*a*. The left front plate 61 mainly defines the left front portion of the outdoor housing 60. The left front plate 61 has a first air outlet 62*a* and a second air outlet 62*b* that are defined in the front-back direction and arranged vertically one above the other. Air that passes through the first air outlet 62*a* is mainly the air that has been sucked into the outdoor housing 60 from the back and left sides of the outdoor housing 60 by means of the first outdoor fan 25*a* and has passed through an upper portion of the outdoor heat exchanger 23. Air that passes through the second air outlet 62*b* is mainly the air that has been sucked into the outdoor housing 60 from the back and left sides of the outdoor housing 60 by means of the second outdoor fan 25*b* and has passed through a lower portion of the outdoor heat exchanger 23. A fan grill is disposed at each of the first air outlet 62*a* and the second air outlet 62*b*. The left-side plate mainly defines the left side portion of the outdoor housing 60, and can also serve as an inlet through which air is sucked into the outdoor housing 60. The right front plate mainly defines the right front portion of the outdoor housing 60 and the forward portion of the right side face of the outdoor housing 60. The right-side plate 65 mainly defines the rearward portion of the right side face of the outdoor housing 60, and the rightward portion of the back face of the outdoor housing 60. The partition plate 66 is a vertically extending plate-shaped member disposed on top of the bottom plate 63. The partition plate 66 divides the internal space of the outdoor housing 60 into the fan chamber and the machine chamber.

The outdoor heat exchanger 23 is a cross-flow fin-and-tube heat exchanger including a plurality of heat transfer fins disposed in the thickness direction in an overlapping manner, and a plurality of heat transfer tubes penetrating and secured to the heat transfer fins. The outdoor heat exchanger 23 is disposed inside the fan chamber in an L-shape in plan view so as to extend along the left side face and back face of the outdoor housing 60.

The compressor 21 is placed on top of the bottom plate 63 inside the machine room of the outdoor housing 60, and secured in place with a bolt.

The gas-side shutoff valve 28 and the liquid-side shutoff valve 29 are disposed inside the machine chamber of the outdoor housing 60, at a height near the upper end of the compressor 21, in the vicinity of the right front corner.

The outdoor electric component unit 8 is disposed in a space inside the machine chamber of the outdoor housing 60 above the compressor 21. The lower end portion of the outdoor electric component unit 8 is positioned above both the gas-side shutoff valve 28 and the liquid-side shutoff valve 29.

With the air-conditioning apparatus 1*a* described above, in cooling operation mode, the first outdoor expansion valve 44 is controlled such that, for example, the refrigerant passing through the liquid-side outlet of the outdoor heat exchanger 23 has a degree of subcooling that satisfies a predetermined condition. Further, in cooling operation mode, the second outdoor expansion valve 45 is controlled such that, for example, the refrigerant sucked in by the compressor 21 has a degree of superheating that satisfies a predetermined condition.

In heating operation mode, the second outdoor expansion valve 45 is controlled such that, for example, the refrigerant passing through the liquid-side outlet of the indoor heat exchanger 31 has a degree of subcooling that satisfies a predetermined condition. Further, in heating operation mode, the first outdoor expansion valve 44 is controlled such that, for example, the refrigerant sucked in by the compressor 21 has a degree of superheating that satisfies a predetermined condition.

(4-2-2) Indoor Unit 30

The indoor unit 30 according to the second embodiment is similar to the indoor unit described above with reference to the first embodiment, and thus will not be described in further detail.

(4-2-3) Characteristic Features of Second Embodiment

As with the air-conditioning apparatus 1 according to the first embodiment, the air-conditioning apparatus 1*a* according to the second embodiment uses a refrigerant containing 1,2-difluoroethylene, thus making it possible to keep the GWP sufficiently low.

The refrigerant containing 1,2-difluoroethylene is a flammable refrigerant. In this regard, the outdoor electric component unit 8 included in the outdoor unit 20*a* according to the second embodiment is positioned above the liquid-side shutoff valve 29 and the gas-side shutoff valve 28, which respectively connect the outdoor unit 20*a* to the liquid-side refrigerant connection pipe 6 and to the gas-side refrigerant connection pipe 5. This configuration ensures that even if a flammable refrigerant leaks from where the liquid-side shutoff valve 29 is connected and from where the gas-side shutoff valve 28 is connected, the likelihood of the refrigerant reaching the outdoor electric component unit 8 is reduced, thus making it possible to increase the safety of the outdoor unit 20*a*.

(4-2-4) Modification A of Second Embodiment

Although the foregoing description of the second embodiment is directed to an example in which the air-conditioning apparatus is provided with only one indoor unit, the air-conditioning apparatus may be provided with a plurality of indoor units connected in parallel with each other.

(4-3) Third Embodiment

Figure 4N:
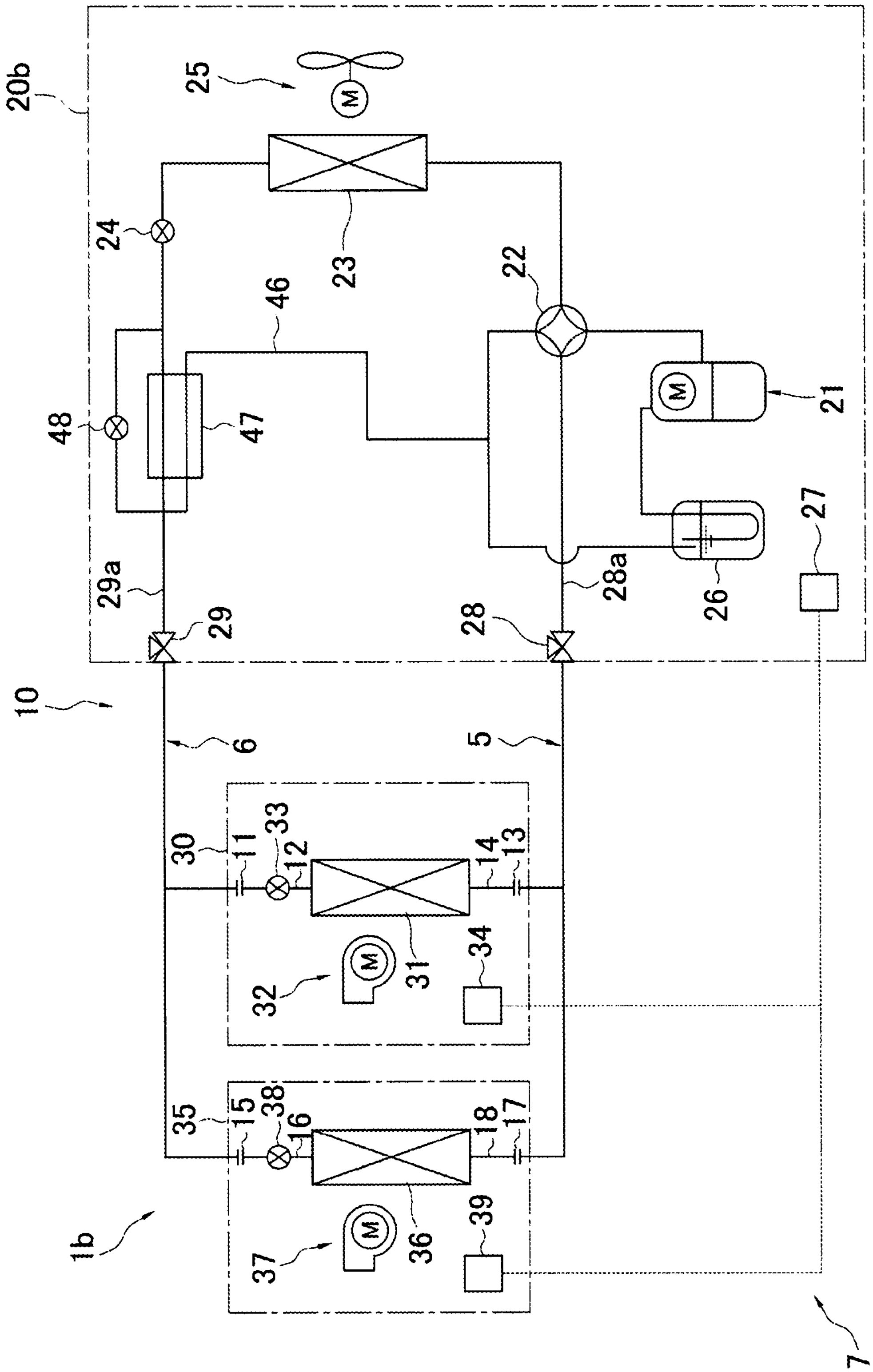
FIG. 4N illustrates the schematic configuration of a refrigerant circuit in accordance with a third embodiment of the technique of fourth group.
Figure 40:
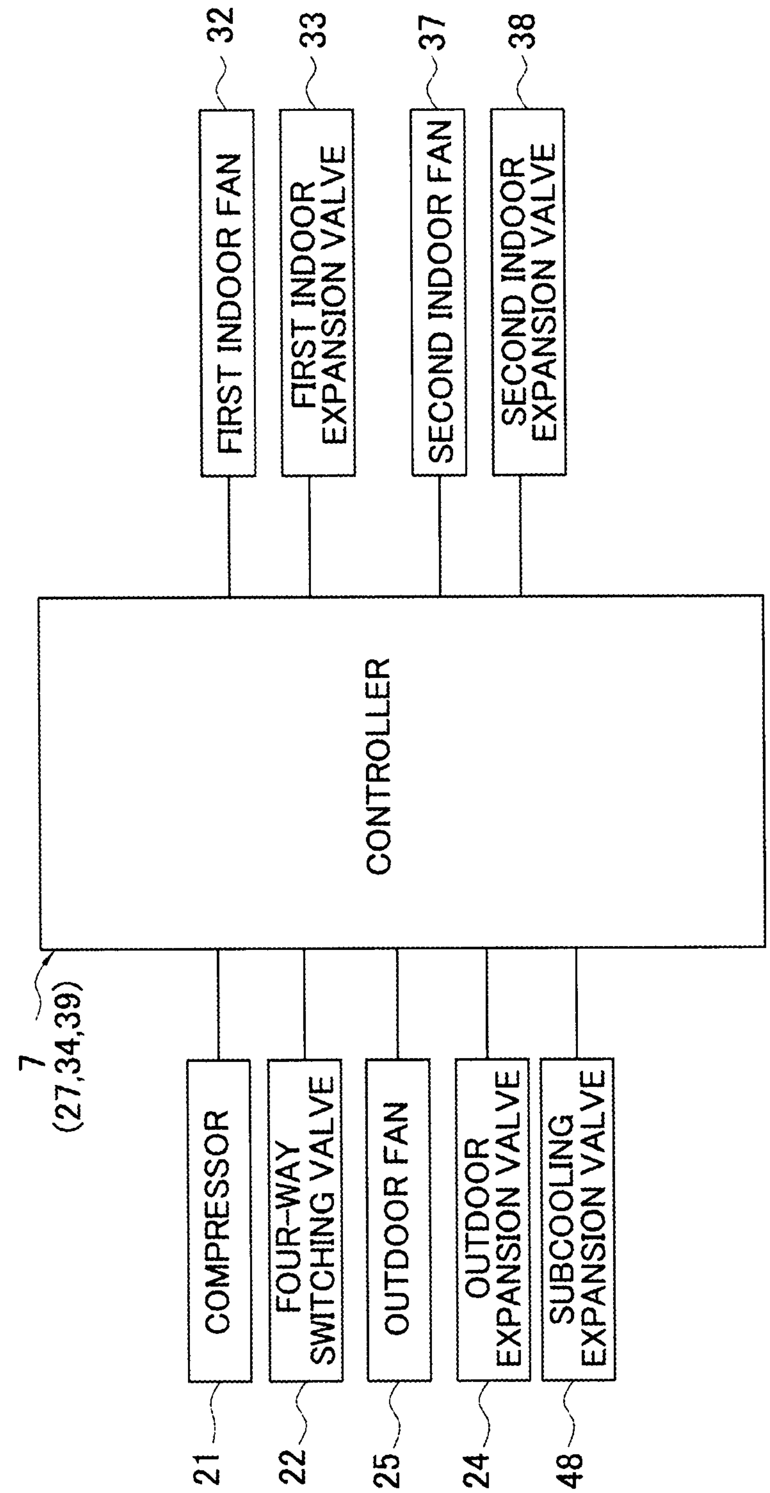

Now, with reference to FIG. 4N that illustrates the schematic configuration of a refrigerant circuit, and FIG. 4O that is a schematic control block diagram, the following describes an air-conditioning apparatus 1*b* according to a third embodiment, which is a refrigeration cycle apparatus including an indoor unit serving as a heat exchange unit and an outdoor unit serving as a heat exchange unit.

The following description will mainly focus on differences of the air-conditioning apparatus 1*b* according to the third embodiment from the air-conditioning apparatus 1 according to the first embodiment.

For the air-conditioning apparatus 1*b* as well, the refrigerant circuit 10 is filled with, as refrigerant used for performing a vapor compression refrigeration cycle, any one of the refrigerants A to D described above that is a refrigerant mixture containing 1,2-difluoroethylene. The refrigerant circuit 10 is also filled with refrigerating machine oil together with the refrigerant.

(4-3-1) Outdoor Unit 20*b*

An outdoor unit 20*b* of the air-conditioning apparatus 1*b* according to the third embodiment includes, in addition to the components of the outdoor unit 20 according to the first embodiment, a low-pressure receiver 26, a subcooling heat exchanger 47, and a subcooling circuit 46.

The low-pressure receiver 26 is a container capable of storing refrigerant and disposed between one of the connection ports of the four-way switching valve 22 and the suction side of the compressor 21. In the third embodiment, the low-pressure receiver 26 is provided separately from an attached accumulator provided to the compressor 21.

The subcooling heat exchanger 47 is disposed between the outdoor expansion valve 24 and the liquid-side shutoff valve 29.

The subcooling circuit 46 is a circuit that branches off from a main circuit between the outdoor expansion valve 24 and the subcooling heat exchanger 47, and extends so as to join a portion of the path from one of the connection ports of the four-way switching valve 22 to the low-pressure receiver 26. A subcooling expansion valve 48 is disposed at a point along the subcooling circuit 46 to decompress refrigerant passing through the subcooling expansion valve 48. The refrigerant flowing in the subcooling circuit 46 and decompressed by the subcooling expansion valve 48 exchanges heat in the subcooling heat exchanger 47 with the refrigerant flowing in the main circuit. As a result, the refrigerant flowing in the main circuit is further cooled, and the refrigerant flowing in the subcooling circuit 46 evaporates.

Figure 4P:
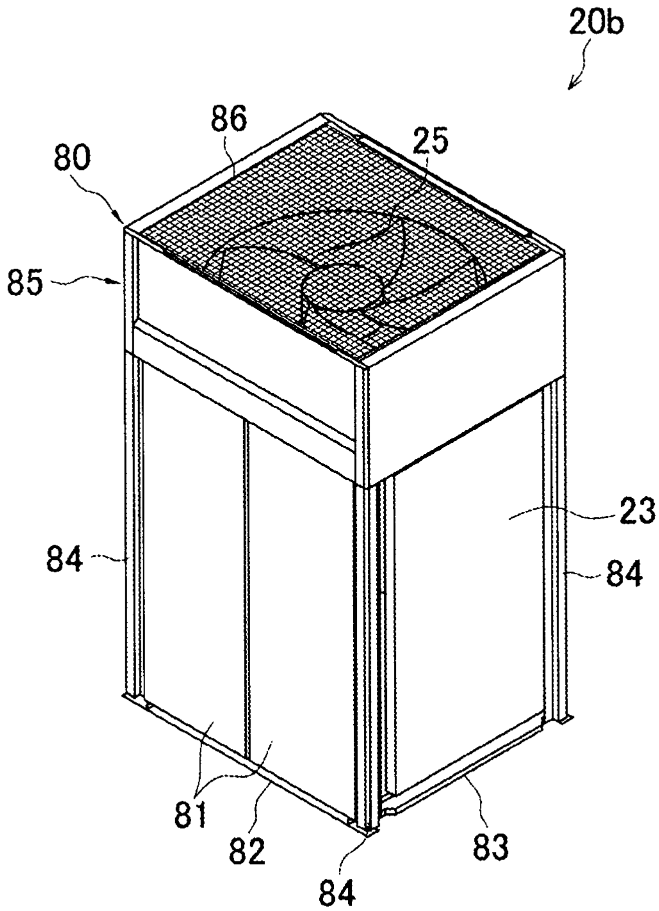
FIG. 4P is a schematic exterior perspective view of an outdoor unit in accordance with the third embodiment of the technique of fourth group.
Figure 4Q:
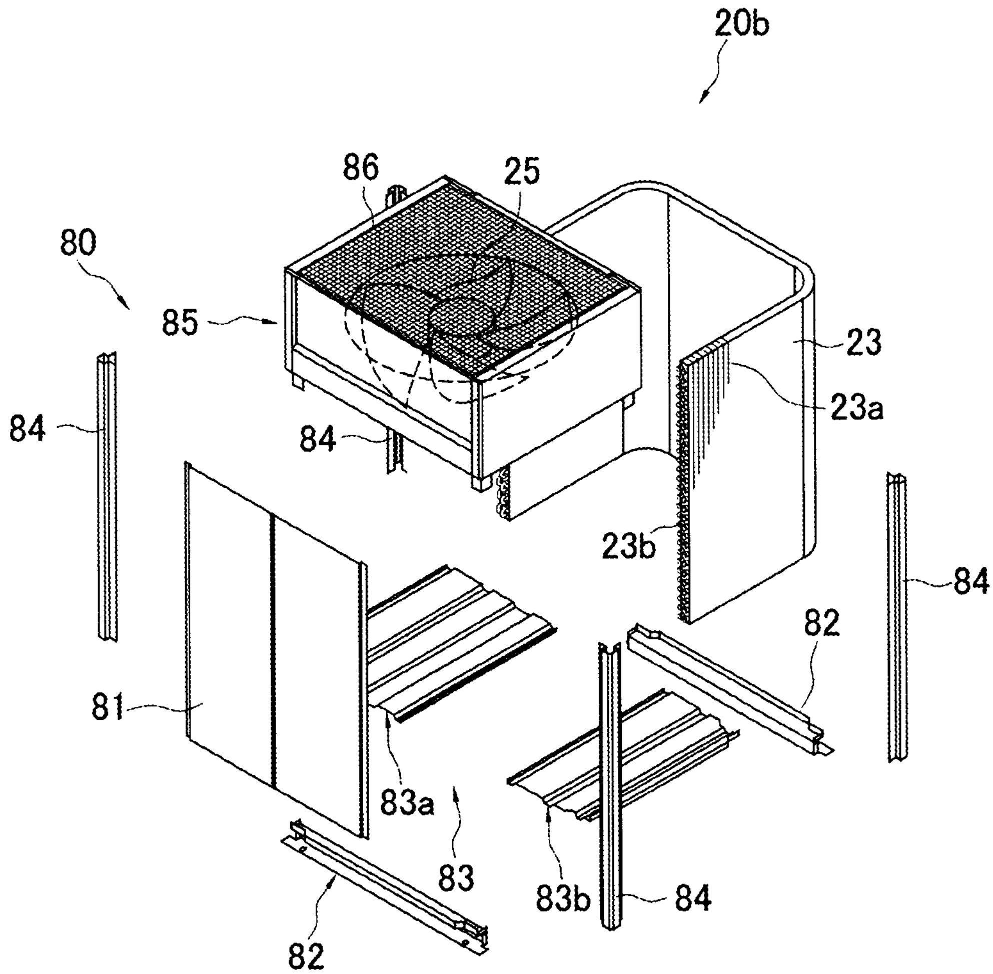
FIG. 4Q is an exploded perspective view illustrating the schematic internal structure of the outdoor unit in accordance with the third embodiment of the technique of fourth group.
Figure 4R:
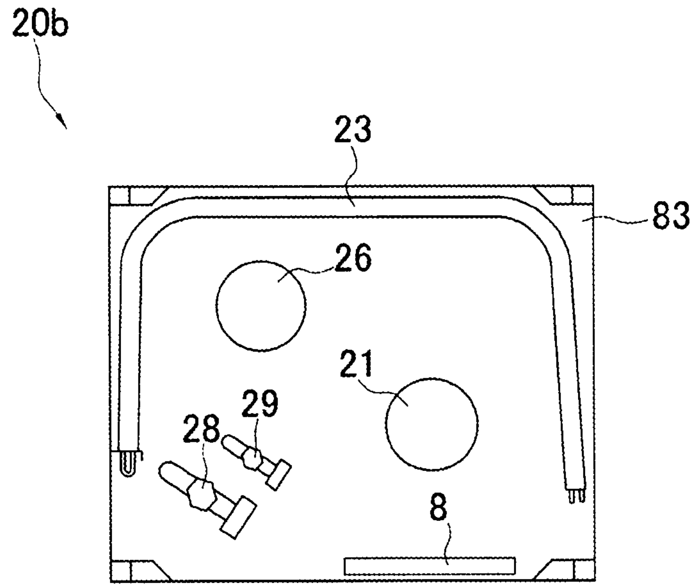
FIG. 4R is a plan view illustrating the schematic internal structure of the outdoor unit in accordance with the third embodiment of the technique of fourth group.
Figure 4S:
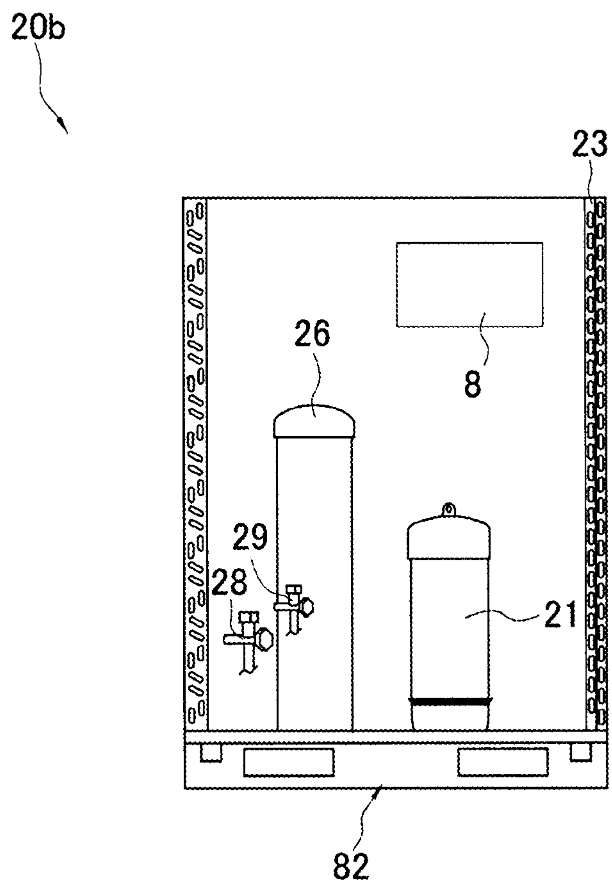
FIG. 4S is a front view illustrating the schematic internal structure of the outdoor unit in accordance with the third embodiment of the technique of fourth group.

A detailed structure of the outdoor unit 20*b* of the air-conditioning apparatus 1*b* according to the third embodiment will be described below with reference to FIG. 4P that is an exterior perspective view, FIG. 4Q that is an exploded perspective view, FIG. 4R that is a schematic plan layout view, and FIG. 4S that is a schematic front layout view.

The outdoor unit 20*b* of the air-conditioning apparatus 1*b* has a so-called top-blowing structure in which air is taken into an outdoor housing 80 from the bottom and air is blown to the outside of the outdoor housing 80 from the top.

The outdoor housing 80 includes, as its main components, a bottom plate 83 placed over a pair of laterally extending installation legs 82 so as to span therebetween, a support 84 that extends vertically from each corner of the bottom plate 83, a front panel 81, and a fan module 85. The bottom plate 83 defines the bottom face of the outdoor housing 80, and is divided into a first bottom plate 83*a* at the left side and a second bottom plate 83*b* at the right side. The front panel 81 is placed below the fan module 85 so as to span between the supports 84 located at the front side, and defines the front face of the outdoor housing 80. The following components are disposed in a space inside the outdoor housing 80 below the fan module 85 and above the bottom plate 83: the compressor 21, the outdoor heat exchanger 23, the low-pressure receiver 26, the four-way switching valve 22, the outdoor expansion valve 24, the subcooling heat exchanger 47, the subcooling expansion valve 48, the subcooling circuit 46, the gas-side shutoff valve 28, the liquid-side shutoff valve 29, and the outdoor electric component unit 8 including the outdoor-unit control unit 27. The outdoor heat exchanger 23 has a substantially U-shape in plan view that faces the back face and both left and right side faces of a portion of the outdoor housing 80 below the fan module 85. The outdoor heat exchanger 23 substantially defines the back face and both left and right faces of the outdoor housing 80. The outdoor heat exchanger 23 is disposed on and along the left-side, back-side, and right-side edges of the bottom plate 83. The outdoor heat exchanger 23 according to the third embodiment is a cross-flow fin-and-tube heat exchanger including a plurality of heat transfer fins 23*a* disposed in the thickness direction in an overlapping manner, and a plurality of heat transfer tubes 23*b* penetrating and secured to the heat transfer fins 23*a*.

The fan module 85 is disposed over the outdoor heat exchanger 23, and includes the outdoor fan 25, a bellmouth (not illustrated), and other components. The outdoor fan 25 is disposed in such an orientation that its axis extends vertically.

The gas-side shutoff valve 28 and the liquid-side shutoff valve 29 are disposed in a space inside the outdoor housing 80 below the fan module 85, at a height near the upper end of the compressor 21, in the vicinity of the left forward location. The gas-side shutoff valve 28 according to the third embodiment is connected by brazing to the gas-side refrigerant connection pipe 5. The liquid-side shutoff valve 29 according to the third embodiment is connected by brazing to the liquid-side refrigerant connection pipe 6.

The outdoor electric component unit 8 is disposed in a space inside the outdoor housing 80 below the fan module 85, above the compressor 21 and near the front side. The outdoor electric component unit 8 is secured to a rightward portion of the front panel 81. The lower end portion of the outdoor electric component unit 8 is positioned above both the gas-side shutoff valve 28 and the liquid-side shutoff valve 29.

As a result of the above-mentioned structure, the outdoor fan 25 produces a flow of air such that air flows into the outdoor housing 80 through the outdoor heat exchanger 23 from the surroundings of the outdoor heat exchanger 23, and is blown out upward through an air outlet 86, which is provided at the upper end face of the outdoor housing 80 in a vertically penetrating manner.

(4-3-2) First Indoor Unit 30 and Second Indoor Unit 35

The air-conditioning apparatus 1*b* according to the third embodiment includes, instead of the indoor unit 30 according to the first embodiment, a first indoor unit 30 and a second indoor unit 35 disposed in parallel with each other.

As with the indoor unit 30 according to the first embodiment, the first indoor unit 30 includes a first indoor heat exchanger 31, a first indoor fan 32, a first indoor liquid-side connection part 11, a first indoor gas-side connection part 13, and a first indoor electric component unit including a first indoor-unit control unit 34. The first indoor unit 30 additionally includes a first indoor expansion valve 33. The first indoor liquid-side connection part 11 is provided in an end portion of the first liquid-side refrigerant pipe 12 that extends so as to connect the liquid side of the first indoor heat exchanger 31 with the liquid-side refrigerant connection pipe 6. The first indoor gas-side connection part 13 is provided in an end portion of the first indoor gas-side refrigerant pipe 14 that extends so as to connect the gas side of the first indoor heat exchanger 31 with the gas-side refrigerant connection pipe 5. The first indoor expansion valve 33 is disposed at a point along the first indoor liquid-side refrigerant pipe 12. The opening degree of the first indoor expansion valve 33 can be controlled. In this case, as with the first embodiment, the first indoor electric component unit is positioned above the first indoor liquid-side connection part 11 and the first indoor gas-side connection part 13.

Likewise, as with the first indoor unit 30, the second indoor unit 35 includes a second indoor heat exchanger 36, a second indoor fan 37, a second indoor liquid-side connection part 15, a second indoor gas-side connection part 17, and a second indoor electric component unit including a second indoor-unit control unit 39. The second indoor unit 35 additionally includes a second indoor expansion valve 38. The second indoor liquid-side connection part is provided in an end portion of a second indoor liquid-side refrigerant pipe 16 that extends so as to connect the liquid side of the second indoor heat exchanger 36 with the liquid-side refrigerant connection pipe 6. The second indoor gas-side connection part 17 is provided in an end portion of a second indoor gas-side refrigerant pipe 18 that extends so as to connect the gas side of the second indoor heat exchanger 36 with the gas-side refrigerant connection pipe 5. The second indoor expansion valve 38 is disposed at a point along the second indoor liquid-side refrigerant pipe 16. The opening degree of the second indoor expansion valve 38 can be controlled. In this case as well, the second indoor electric component unit is positioned above the second indoor liquid-side connection part 15 and the second indoor gas-side connection part 17.

The controller 7 according to the third embodiment includes the outdoor-unit control unit 27, the first indoor-unit control unit 34, and the second indoor-unit control unit 39 that are connected in a manner that allows communication with each other.

With the air-conditioning apparatus 1*b* described above, in cooling operation mode, the outdoor expansion valve 24 is controlled such that the refrigerant passing through the liquid-side outlet of the outdoor heat exchanger 23 has a degree of subcooling that satisfies a predetermined condition. Further, in cooling operation mode, the subcooling expansion valve 48 is controlled such that the refrigerant sucked in by the compressor 21 has a degree of superheating that satisfies a predetermined condition. In cooling operation mode, the first indoor expansion valve 33 and the second indoor expansion valve 38 are controlled to be fully open.

In heating operation mode, the first indoor expansion valve 33 is controlled such that the refrigerant passing through the liquid-side outlet of the first indoor heat exchanger 31 has a degree of subcooling that satisfies a predetermined condition. Likewise, the second indoor expansion valve 38 is controlled such that the refrigerant passing through the liquid-side outlet of the second indoor heat exchanger 36 has a degree of subcooling that satisfies a predetermined condition. Further, in heating operation mode, the outdoor expansion valve 24 is controlled such that the refrigerant sucked in by the compressor 21 has a degree of superheating that satisfies a predetermined condition. In heating operation mode, the subcooling expansion valve 48 is controlled such that the refrigerant sucked in by the compressor 21 has a degree of superheating that satisfies a predetermined condition.

(4-3-3) Characteristic Features of Third Embodiment

As with the air-conditioning apparatus 1 according to the first embodiment, the air-conditioning apparatus 1*b* according to the third embodiment uses a refrigerant containing 1,2-difluoroethylene, thus making it possible to keep the GWP sufficiently low.

The refrigerant containing 1,2-difluoroethylene is a flammable refrigerant. In this regard, the outdoor electric component unit 8 included in the outdoor unit 20*b* according to the third embodiment is positioned above the liquid-side shutoff valve 29 and the gas-side shutoff valve 28, which respectively connect the outdoor unit 20*b* to the liquid-side refrigerant connection pipe 6 and to the gas-side refrigerant connection pipe 5. This configuration ensures that even if a flammable refrigerant leaks from where the liquid-side shutoff valve 29 is connected and from where the gas-side shutoff valve 28 is connected, the likelihood of the refrigerant reaching the outdoor electric component unit 8 is reduced, thus making it possible to increase the safety of the outdoor unit 20*b*.

For the first indoor electric component unit included in the first indoor unit 30 according to the third embodiment as well, the first indoor electric component unit is positioned above the first indoor liquid-side connection part 11 and the first indoor gas-side connection part 13. This configuration ensures that even if a flammable refrigerant leaks from where the first indoor liquid-side connection part 11 is connected and from where the first indoor gas-side connection part 13 is connected, the likelihood of the leaked refrigerant reaching the first indoor electric component unit is reduced, thus making it possible to increase the safety of the first indoor unit 30. Likewise, the second indoor electric component unit included in the second indoor unit 35 according to the third embodiment is also disposed above the second indoor liquid-side connection part 15 and the second indoor gas-side connection part 17. This configuration ensures that even if a flammable refrigerant leaks from where the second indoor liquid-side connection part 15 is connected and from where the second indoor gas-side connection part 17 is connected, the likelihood of the leaked refrigerant reaching the second indoor electric component unit is reduced, thus making it possible to increase the safety of the second indoor unit 35.

(4-4) Fourth Embodiment

Figure 4T:
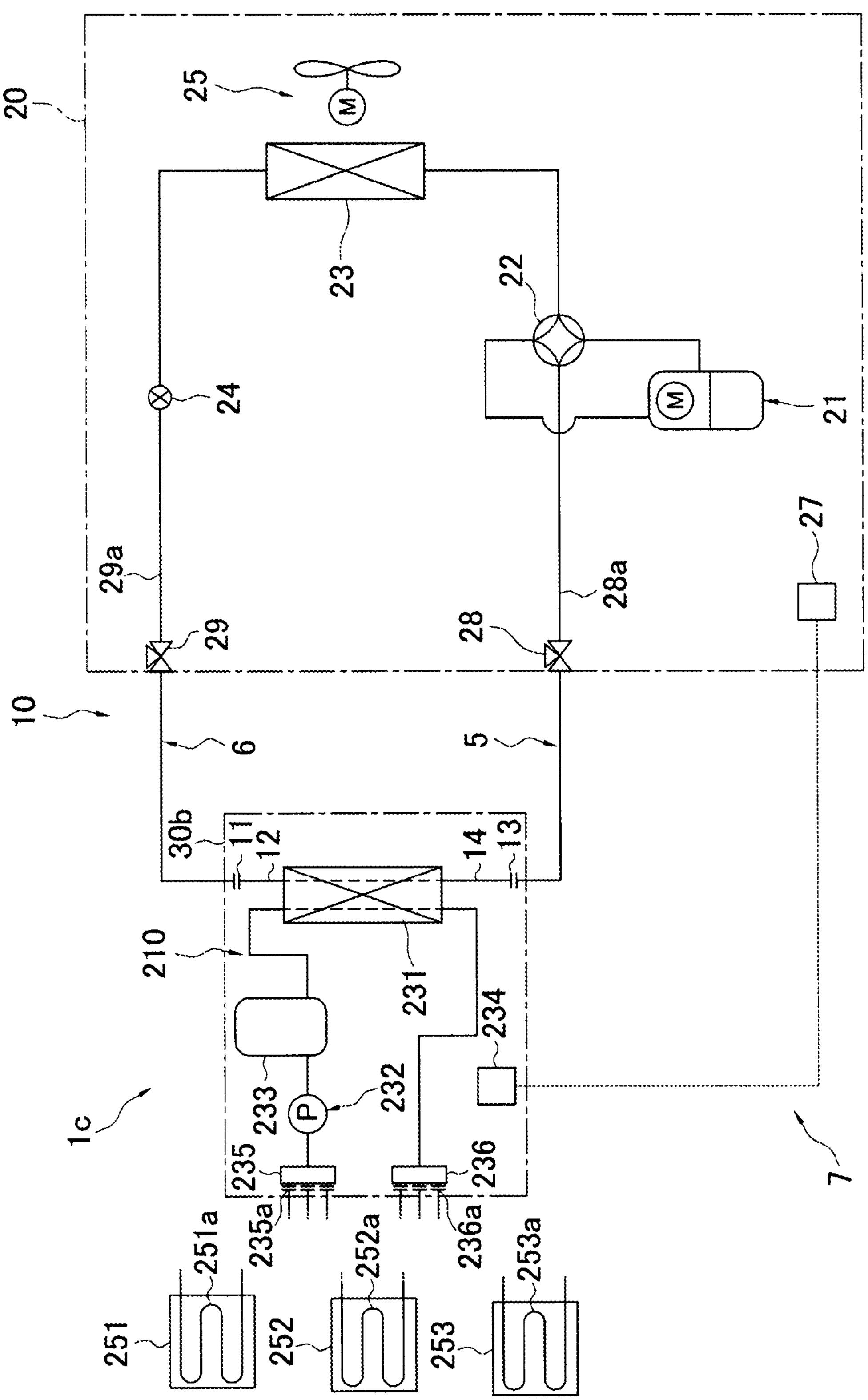
FIG. 4T illustrates the schematic configuration of a refrigerant circuit and a water circuit in accordance with a fourth embodiment of the technique of fourth group.
Figure 4U:
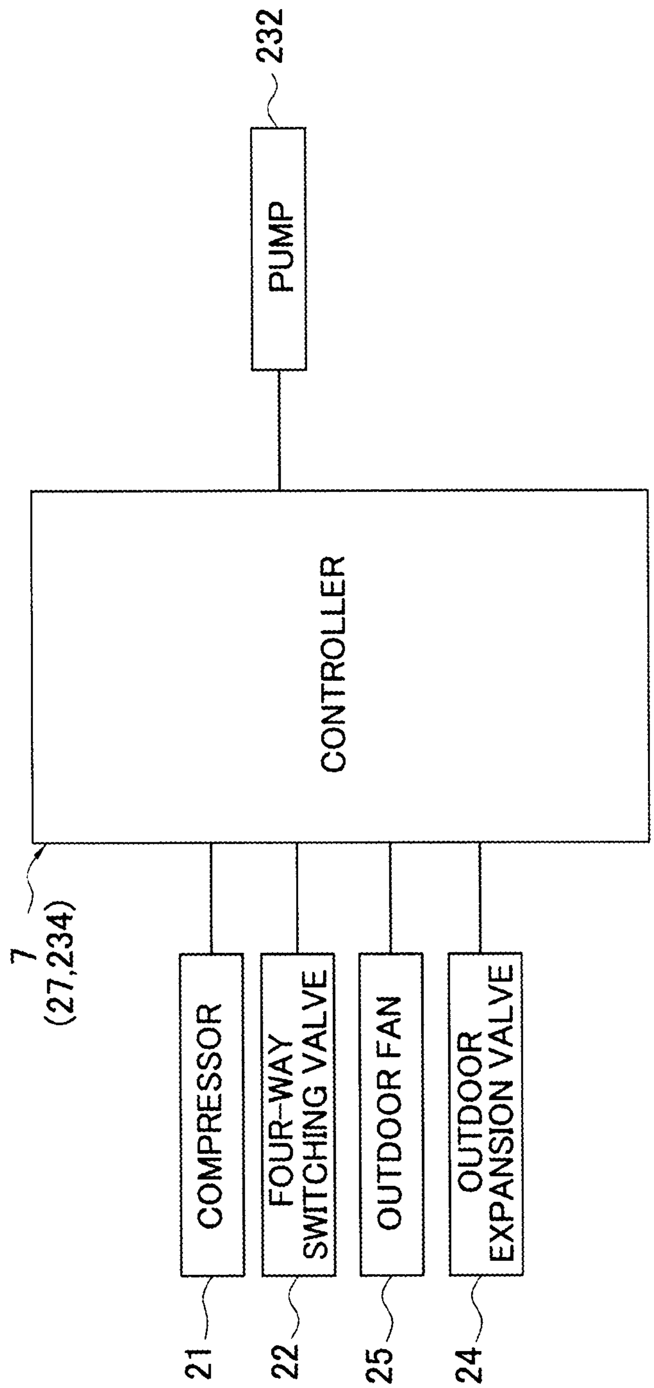
FIG. 4U is a schematic control block diagram of a refrigeration cycle apparatus in accordance with the fourth embodiment of the technique of fourth group.

Now, with reference to FIG. 4T that illustrates the schematic configuration of a refrigerant circuit, and FIG. 4U that is a schematic control block diagram, the following describes a cold/hot water supply apparatus 1*c* according to a fourth embodiment, which is a refrigeration cycle apparatus including a cold/hot water supply unit serving as a heat exchange unit and an outdoor unit serving as a heat exchange unit.

The following mainly describes the cold/hot water supply apparatus 1*c* according to the fourth embodiment, while focusing on differences from the air-conditioning apparatus 1 according to the first embodiment.

The cold/hot water supply apparatus 1*c* is an apparatus that obtains cold water or hot water, and supplies the cold water or hot water to floor heating panels 251, 252, and 253 installed under the indoor floor to thereby cool or heat the indoor floor.

For the cold/hot water supply apparatus 1*c* as well, the refrigerant circuit 10 is filled with, as refrigerant used for performing a vapor compression refrigeration cycle, any one of the refrigerants A to D described above that is a refrigerant mixture containing 1,2-difluoroethylene. The refrigerant circuit 10 is also filled with refrigerating machine oil together with the refrigerant.

(4-4-1) Outdoor Unit 20

The outdoor unit 20 of the cold/hot water supply apparatus 1*c* is similar to the outdoor unit 20 described above with reference to the first embodiment, and thus will not be described in further detail.

(4-4-2) Cold/Hot Water Supply Unit 30*b*

The cold/hot water supply unit 30*b* is used to cool or heat the floor surface of an indoor space that is to be cooled or heated. The cold/hot water supply unit 30*b* is connected to the outdoor unit 20 via the liquid-side refrigerant connection pipe 6 and the gas-side refrigerant connection pipe 5, and constitutes a portion of the refrigerant circuit 10.

The cold/hot water supply unit 30*b* includes components such as a water heat exchanger 231, a pump 232, a tank 233, the indoor liquid-side connection part 11, the indoor gas-side connection part 13, a return header 236, an outgoing header 235, an indoor housing 237, and a cold/hot-water electric component unit 9*a*.

The water heat exchanger 231 causes heat to be exchanged between refrigerant flowing inside the water heat exchanger 231, and water flowing in a water circuit 210. The liquid-refrigerant side of the water heat exchanger 231 is flare-connected to the liquid-side refrigerant connection pipe 6 via the indoor liquid-side refrigerant pipe 12 and the indoor liquid-side connection part 11, and the gas-refrigerant side is flare-connected to the gas-side refrigerant connection pipe 5 via the indoor gas-side refrigerant pipe 14 and the indoor gas-side connection part 13. During cooling operation, the water heat exchanger 231 functions as an evaporator for low-pressure refrigerant in the refrigeration cycle to cool water flowing in the water circuit 210, and during heating operation, the water heat exchanger 231 functions as a condenser for high-pressure refrigerant in the refrigeration cycle to heat water flowing in the water circuit 210.

The pump 232 produces a water flow that causes water in the water circuit 210 to circulate through the return header 236, a water flow path of the water heat exchanger 231, the tank 233, the outgoing header 235, and the floor heating panels 251, 252, and 253. The pump 232 is rotationally driven by a motor (not illustrated).

The tank 233 stores cold water or hot water whose temperature has been adjusted in the water heat exchanger 231.

The outgoing header 235 divides the cold or hot water delivered from the pump 232 into separate streams that flow to respective water circulation pipes 251*a*, 252*a*, and 253*a* of the floor heating panels 251, 252, and 253. The outgoing header 235 has a plurality of outgoing connection parts 235*a* each connected to an end portion of the corresponding one of the water circulation pipes 251*a*, 252*a*, and 253*a*.

The return header 236 combines the streams of water that have passed through the respective water circulation pipes 251*a*, 252*a*, and 253*a* of the floor heating panels 251, 252, and 253, and supplies the combined stream of water to the water heat exchanger 231 again. The return header 236 has a plurality of return connection parts 236*a* each connected to the other end of the corresponding one of the water circulation pipes 251*a*, 252*a*, and 253*a*.

The cold/hot-water electric component unit 9*a* includes a cold/hot-water-supply-unit control unit 234 that controls operation of each component constituting the cold/hot water supply unit 30*b*. Specifically, the cold/hot-water-supply-unit control unit 234 controls the flow rate of the pump based on the temperature adjustment load in each of the floor heating panels 251, 252, and 253.

Figure 4V:
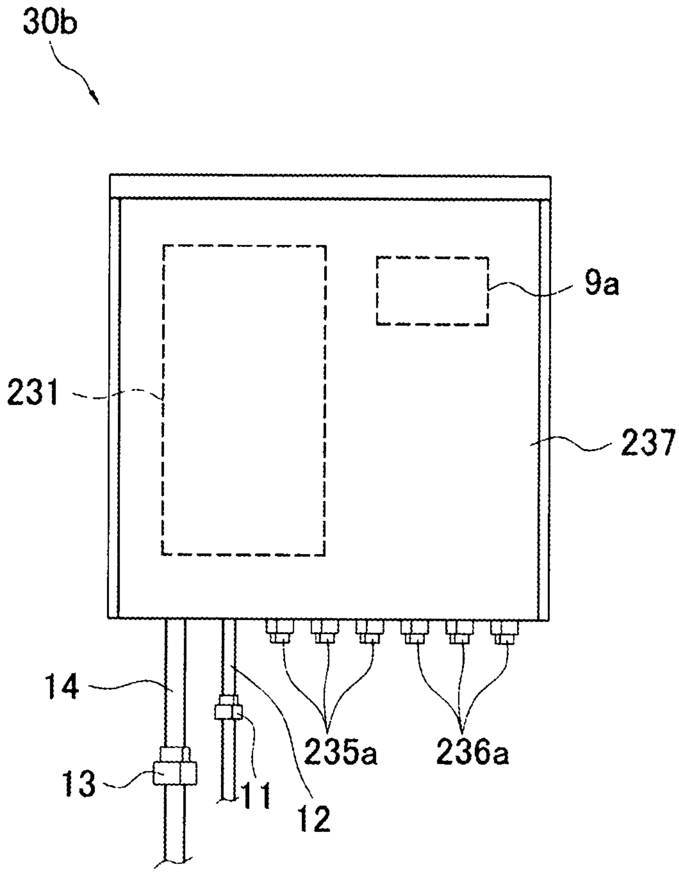
FIG. 4V illustrates the schematic structure of a cold/hot water supply unit in accordance with the fourth embodiment of the technique of fourth group.

As illustrated in FIG. 4V, the indoor housing 237 is a box-shaped body in which components such as the water heat exchanger 231 and the cold/hot-water electric component unit 9*a* are accommodated. Specifically, the cold/hot-water electric component unit 9*a* is disposed in an upper space inside the indoor housing 237. The outgoing connection parts 235*a* of the outgoing header 235, and the return connection parts 236*a* of the return header 236 are located below the indoor housing 237. Further, the indoor liquid-side refrigerant pipe 12 and the indoor gas-side refrigerant pipe 14 extend out from below the indoor housing 237. The indoor liquid-side connection part 11 is located at the lower end of the indoor liquid-side refrigerant pipe 12, and the indoor gas-side connection part 13 is located at the lower end of the indoor gas-side refrigerant pipe 14.

(4-4-3) Characteristic Features of Fourth Embodiment

The cold/hot water supply apparatus 1*c* mentioned above uses a refrigerant containing 1,2-difluoroethylene, thus making it possible to keep the GWP sufficiently low.

The refrigerant containing 1,2-difluoroethylene is a flammable refrigerant. In this regard, the cold/hot-water electric component unit 9*a* included in the cold/hot water supply unit 30*b* according to the fourth embodiment is positioned above the indoor liquid-side connection part 11 and the indoor gas-side connection part 13, which respectively connect the cold/hot water supply unit 30*b* to the liquid-side refrigerant connection pipe 6 and to the gas-side refrigerant connection pipe 5. This configuration ensures that even if a flammable refrigerant leaks from where the indoor liquid-side connection part 11 is connected and from where the indoor gas-side connection part 13 is connected, the likelihood of the leaked refrigerant reaching the cold/hot-water electric component unit 9*a* is reduced, thus making it possible to increase the safety of the cold/hot water supply unit 30*b*.

(4-4-4) Modification A of Fourth Embodiment

The fourth embodiment has been described above by way of example of the cold/hot water supply apparatus 1*c* in which cold or hot water obtained through heat exchange with refrigerant in the water heat exchanger 231 is supplied to the floor heating panels 251, 252, and 253 to thereby cool or heat the indoor floor.

Figure 4W:
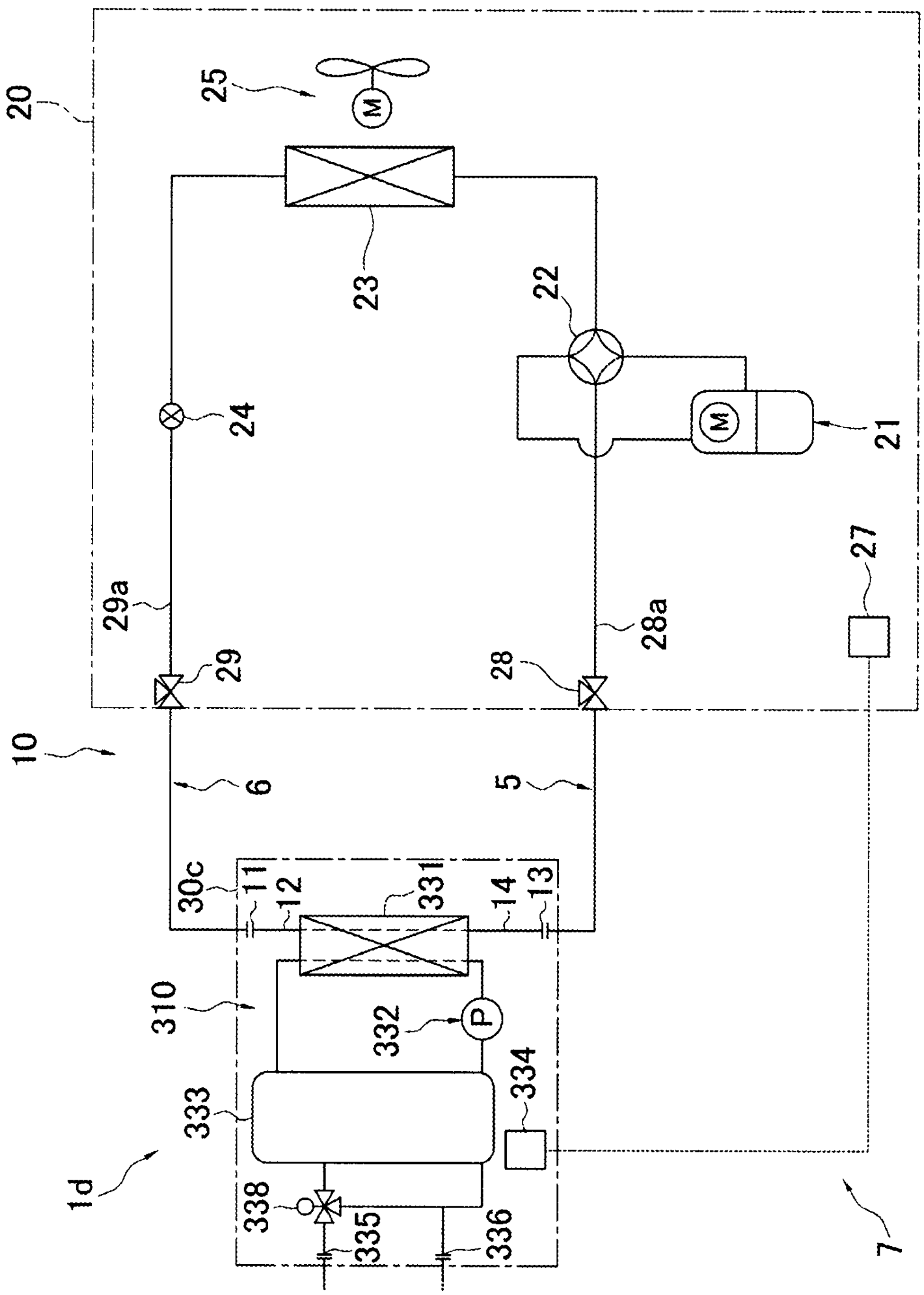
FIG. 4W illustrates the schematic configuration of a refrigerant circuit and a water circuit in accordance with Modification A of the fourth embodiment of the technique of fourth group.
Figure 4X:
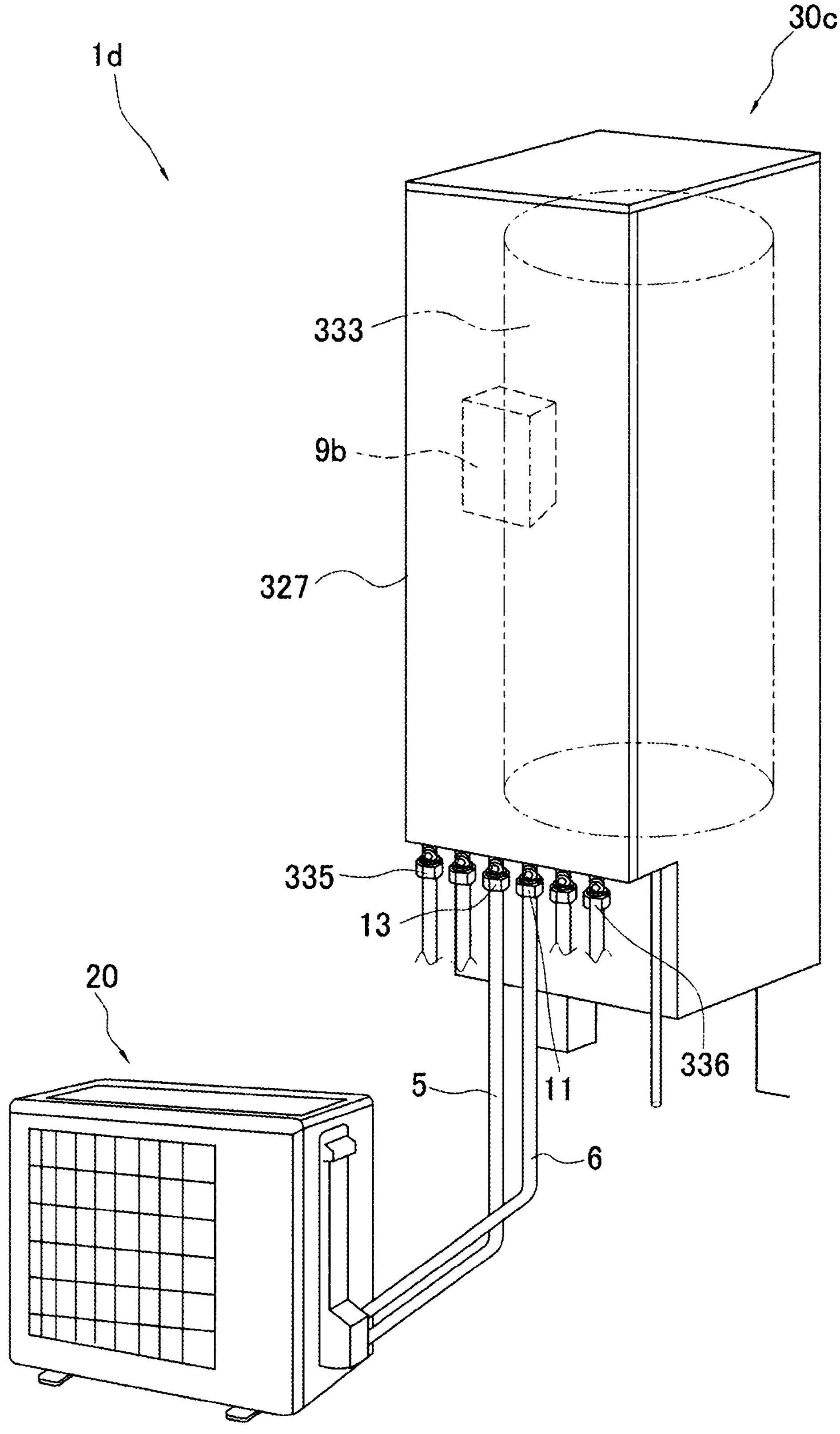
FIG. 4X illustrates the schematic configuration of a hot water storage apparatus in accordance with Modification A of the fourth embodiment of the technique of fourth group.

Alternatively, as illustrated in FIGS. 4W and 4X, hot water may be supplied by using the water heat exchanger 231 in a hot water storage apparatus 1*d*, which includes a hot water storage unit 30*c* and the outdoor unit 20 that are connected via the liquid-side refrigerant connection pipe 6 and the gas-side refrigerant connection pipe 5.

Specifically, a hot water storage housing 327 of the hot water storage unit 30*c* accommodates components such as a water heat exchanger 331, a pump 332, a hot water storage tank 333, a mixing valve 338, a water inlet 336, a water outlet 335, and a hot-water-storage electric component unit 9*b*. The outdoor unit 20 is similar to, for example, the outdoor unit 20 according to the fourth embodiment.

As with the water heat exchanger 231 according to the fourth embodiment mentioned above, the water heat exchanger 331 causes heat to be exchanged between refrigerant circulating through the outdoor unit 20, the liquid-side refrigerant connection pipe 6, and the gas-side refrigerant connection pipe 5, and water circulating through a water circuit 310 accommodated inside the hot water storage unit 30*c*.

The water circuit 310 includes the hot water storage tank 333, a water outgoing pipe extending from the lower end of the hot water storage tank 333 to the inlet of the water flow path of the water heat exchanger 331 and provided with the pump 332, and a water return pipe that connects the outlet of the water flow path of the water heat exchanger 331 with the upper end of the hot water storage tank 333.

City water that has passed through a water inlet pipe via the water inlet 336 is supplied to the hot water storage tank 333 from the lower end of the hot water storage tank 333. Hot water obtained in the water heat exchanger 331 and stored in the hot water storage tank 333 is delivered from the upper end of the hot water storage tank 333 toward the water outlet 335 through a water outlet pipe. The water inlet pipe and the water outlet pipe are connected by a bypass pipe. The mixing valve 338 is disposed at the coupling location between the water outlet pipe and the bypass pipe to allow mixing of city water and hot water.

The indoor liquid-side connection part 11, which is provided at the distal end of the indoor liquid-side refrigerant pipe 12 located on the liquid-refrigerant side of the water heat exchanger 331, is positioned below the hot water storage housing 327. Likewise, the indoor gas-side connection part 13, which is provided at the distal end of the indoor gas-side refrigerant pipe 14 located on the gas-refrigerant side of the water heat exchanger 331, is positioned below the hot water storage housing 327.

The hot water storage unit 30*c* is provided with the hot-water-storage electric component unit 9*b* including a hot-water-storage-unit control unit 334 that controls the driving of the pump 332. The hot-water-storage electric component unit 9*b* is installed in an upper space inside the hot water storage housing 327, and located above the indoor gas-side connection part 13 and the indoor liquid-side connection part 11.

For the above-mentioned hot water storage unit 30*c* as well, the hot-water-storage electric component unit 9*b* is positioned above the indoor gas-side connection part 13 and the indoor liquid-side connection part 11. This configuration ensures that even if refrigerant leaks from the indoor liquid-side connection part 11 or the indoor gas-side connection part 13, the likelihood of the leaked refrigerant reaching the hot-water-storage electric component unit 9*b* is reduced, thus making it possible to increase the safety of the hot water storage unit 30*c*.

(5) Embodiment of the Technique of Fifth Group (5-1) First Embodiment

Figure 5A:
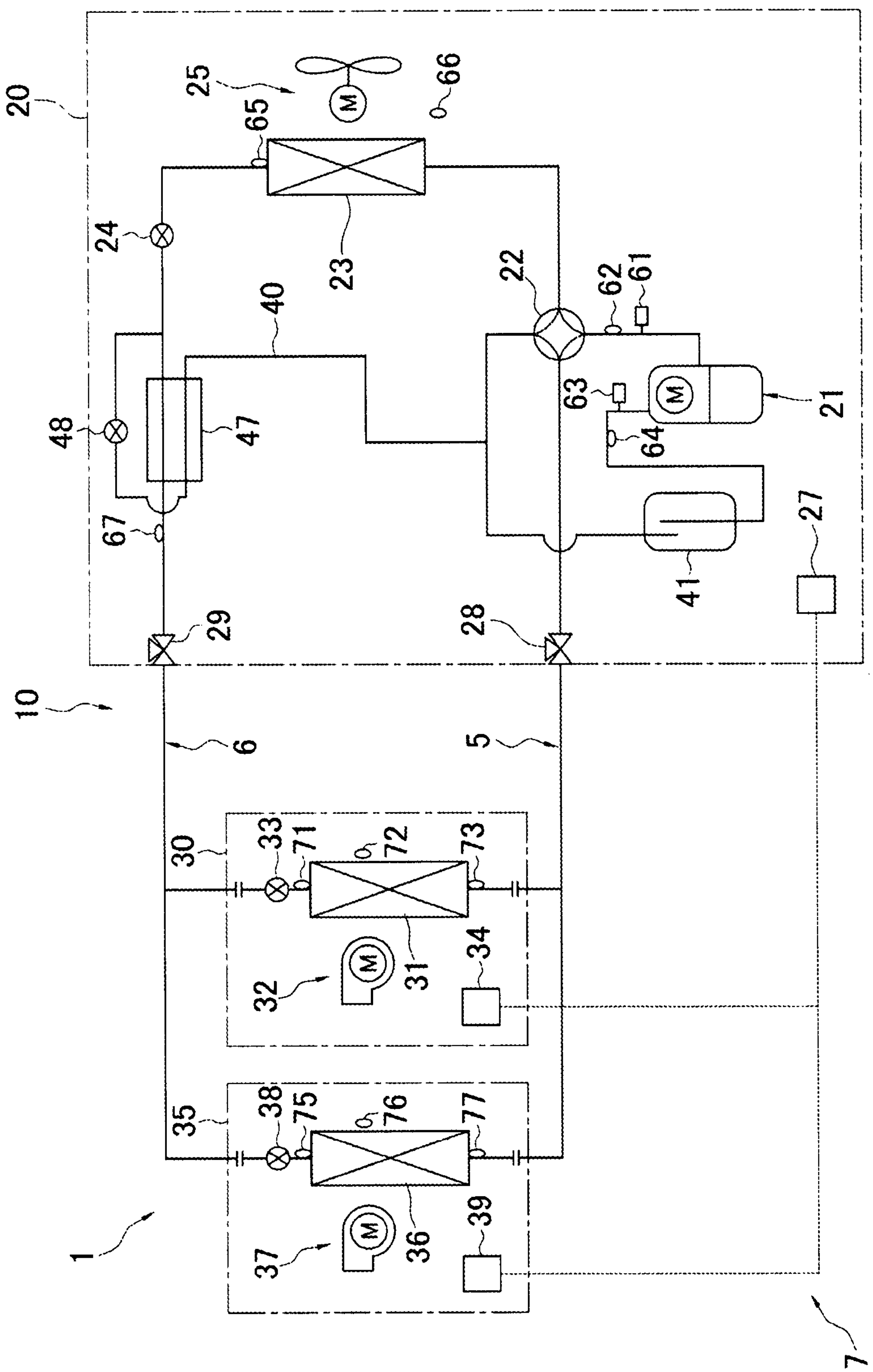
FIG. 5A is a schematic structural view of a refrigerant circuit according to a first embodiment of the technique of fifth group.
Figure 5B:
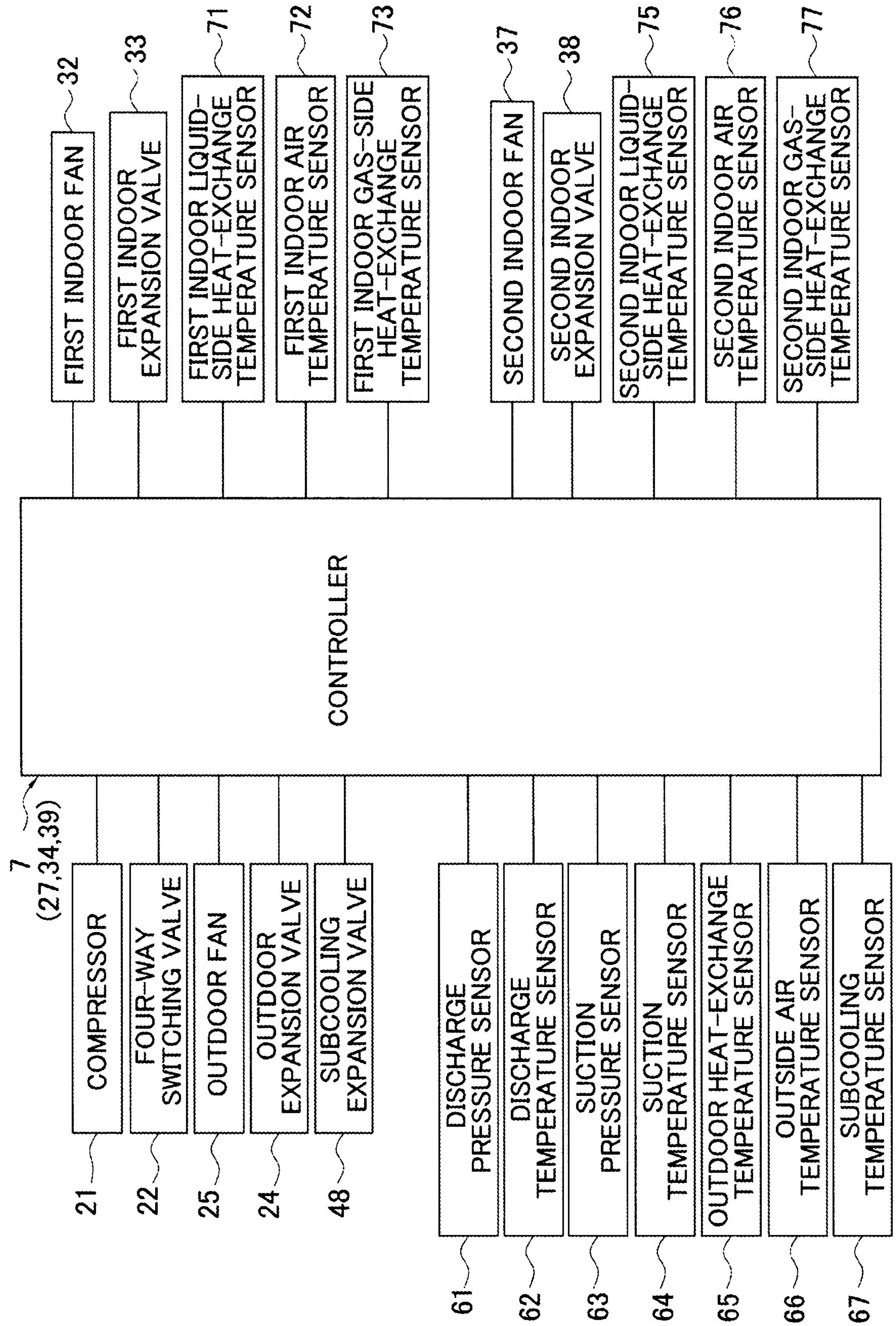
FIG. 5B is a schematic control block structural view of a refrigeration cycle apparatus according to the first embodiment of the technique of fifth group.

An air conditioning apparatus 1 serving as a refrigeration cycle apparatus according to a first embodiment, is described with reference to FIG. 5A, which is a schematic structural view of a refrigerant circuit, and FIG. 5B, which is a schematic control block structural view.

The air conditioning apparatus 1 is a apparatus that air-conditions a target space by performing a vapor compression refrigeration cycle.

The air conditioning apparatus 1 primarily includes an outdoor unit 20, a first indoor unit 30, a second indoor unit 35, a liquid-side refrigerant connection pipe 6 and a gas-side refrigerant connection pipe 5 that connect the first indoor unit 30 and the second indoor unit 35 in parallel with respect to the outdoor unit 20, a remote controller (not shown) that serves as an input device and an output device, and a controller 7 that controls the operation of the air conditioning apparatus 1.

The air conditioning apparatus 1 performs a refrigeration cycle in which the refrigerant sealed in a refrigerant circuit 10 is compressed, cooled or condensed, decompressed, and heated or evaporated, and is then compressed again. In the present embodiment, the refrigerant circuit 10 is filled with a refrigerant for performing the vapor compression refrigeration cycle. The refrigerant is a mixed refrigerant containing 1,2-difluoroethylene, and anyone of the refrigerants A to D above may be used. The refrigerant circuit 10 is filled with refrigerating-machine oil along with the mixed refrigerant.

(5-1-1) Outdoor Unit 20

The outdoor unit 20 is connected to the indoor unit 30 via the liquid-side refrigerant connection pipe 6 and the gas-side refrigerant connection pipe 5, and constitutes a part of the refrigerant circuit 10. The outdoor unit 20 primarily includes a compressor 21, a four-way switching valve 22, an outdoor heat exchanger 23, a subcooling heat exchanger 47, a suction injection pipe 40, a subcooling expansion valve 48, an outdoor expansion valve 24, an outdoor fan 25, a low-pressure receiver 41, a liquid-side shutoff valve 29, and a gas-side shutoff valve 28.

The compressor 21 is equipment that compresses a low-pressure refrigerant in the refrigeration cycle into a high-pressure refrigerant. Here, as the compressor 21, a compressor having a hermetic structure in which a displacement compression element (not shown) of, for example, a rotary type or scroll type is rotationally driven by a compressor motor is used. The compressor motor is a motor for changing capacity, and an operation frequency can be controlled by an inverter. An attachment accumulator (not shown) is provided on a suction side of the compressor 21 (the internal volume of the attachment accumulator is less than, and is desirably less than or equal to half of, the internal volume of refrigerant containers, such as low-pressure receivers, intermediate-pressure receivers, and high-pressure receivers).

The four-way switching valve 22 can be switched between a cooling operation connection state and a heating operation connection state by switching a connection state, the cooling operation connection state being a state in which the four-way switching valve 22 connects the suction side of the compressor 21 and the gas-side shutoff valve 28 to each other while connecting a discharge side of the compressor 21 and the outdoor heat exchanger 23, the heating operation connection state being a state in which the four-way switching valve 22 connects the suction side of the compressor 21 and the outdoor heat exchanger 23 to each other while connecting the discharge side of the compressor 21 and the gas-side shutoff valve 28.

The outdoor heat exchanger 23 is a heat exchanger that functions as a condenser for a high-pressure refrigerant in the refrigeration cycle during the cooling operation and that functions as an evaporator for a low-pressure refrigerant in the refrigeration cycle during the heating operation.

The outdoor expansion valve 24 is provided between a liquid-side outlet of the outdoor heat exchanger 23 and the liquid-side shutoff valve 29 in the refrigerant circuit 10. The outdoor expansion valve 24 is an electric expansion valve whose valve opening degree is adjustable.

The suction injection pipe 40 branches off from a branching portion between the outdoor expansion valve 24 and the liquid-side shutoff valve 29 in a main circuit of the refrigerant circuit 10, and is provided so as to merge at a merging portion between the low-pressure receiver 41 and one connection port of the four-way switching valve 22. The subcooling expansion valve 48 is provided at the suction injection pipe 40. The subcooling expansion valve 48 is an electric expansion valve whose valve opening degree is adjustable.

The subcooling heat exchanger 47 is a heat exchanger that causes heat to be exchanged between a refrigerant that flows along a portion of the refrigerant circuit 10 between the outdoor expansion valve 24 and the liquid-side shutoff valve 29 and a refrigerant that flows on a side of the merging portion of the subcooling expansion valve 48 in the suction injection pipe 40. In the present embodiment, the subcooling heat exchanger 47 is a portion between the outdoor expansion valve 24 and the liquid-side shutoff valve 29, and is provided closer than the branching portion of the suction injection pipe 40 to the liquid-side shutoff valve 29.

The outdoor fan 25 sucks outdoor air into the outdoor unit 20 and causes heat to be exchanged with a refrigerant in the outdoor heat exchanger 23, and then causes an air flow for discharge to the outside to be generated. The outdoor fan 25 is rotationally driven by an outdoor fan motor.

The low-pressure receiver 41 is provided between the suction side of the compressor 21 and the one connection port of the four-way switching valve 22, and is a refrigerant container that is capable of storing an excess refrigerant as a liquid refrigerant in the refrigerant circuit 10. The compressor 21 is provided with the attachment accumulator (not shown), and the low-pressure receiver 41 is connected on a downstream side of the attachment accumulator.

The liquid-side shutoff valve 29 is a manual valve disposed at a portion of the outdoor unit 20 that is connected to the liquid-side refrigerant connection pipe 6.

The gas-side shutoff valve 28 is a manual valve disposed at a portion of the outdoor unit 20 that is connected to the gas-side refrigerant connection pipe 5.

The outdoor unit 20 includes an outdoor unit control unit 27 that controls the operation of each portion that constitutes the outdoor unit 20. The outdoor unit control unit 27 includes a microcomputer including, for example, a CPU and a memory. The outdoor unit control unit 27 is connected to an indoor unit control units 34 and 39 of each indoor unit 30 and 35 via a communication line, and sends and receives, for example, control signals.

The outdoor unit 20 is provided with, for example, a discharge pressure sensor 61, a discharge temperature sensor 62, a suction pressure sensor 63, a suction temperature sensor 64, an outdoor heat-exchange temperature sensor 65, an outside air temperature sensor 66, and a subcooling temperature sensor 67. Each of these sensors is electrically connected to the outdoor unit control unit 27 and sends a detection signal to the outdoor unit control unit 27. The discharge pressure sensor 61 detects the pressure of a refrigerant that flows through a discharge tube that connects the discharge side of the compressor 21 and one connection port of the four-way switching valve 22. The discharge temperature sensor 62 detects the temperature of the refrigerant that flows through the discharge tube. The suction pressure sensor 63 detects the pressure of a refrigerant that flows through a suction tube that connects the suction side of the compressor 21 and the low-pressure receiver 41. The suction temperature sensor 64 detects the temperature of the refrigerant that flows through the suction tube. The outdoor heat-exchange temperature sensor 65 detects the temperature of a refrigerant that flows through the liquid-side outlet of the outdoor heat exchanger 23 on a side opposite to a side where the four-way switching valve 22 is connected. The outside air temperature sensor 66 detects the temperature of outdoor air that is air before passing through the outdoor heat exchanger 23. The subcooling temperature sensor 67 detects the temperature of a refrigerant that flows between the subcooling heat exchanger 47 and a second outdoor expansion valve 24 in the main circuit of the refrigerant circuit 10.

(5-1-2) First Indoor Unit 30 and Second Indoor Unit 35

The first indoor unit 30 and the second indoor unit 35 are installed on, for example, a ceiling or wall surfaces in a room corresponding to the same target space or different target spaces. The first indoor unit 30 and the second indoor unit 35 are connected to the outdoor unit 20 via the liquid-side refrigerant connection pipe 6 and the gas-side refrigerant connection pipe 5, and constitute a part of the refrigerant circuit 10.

The first indoor unit 30 includes a first indoor heat exchanger 31, a first indoor expansion valve 33, and a first indoor fan 32.

A liquid side of the first indoor heat exchanger 31 is connected to the liquid-side refrigerant connection pipe 6, and a gas side end of the first indoor heat exchanger 31 is connected to the gas-side refrigerant connection pipe 5. The first indoor heat exchanger 31 is a heat exchanger that functions as an evaporator for a low-pressure refrigerant in the refrigeration cycle during the cooling operation, and that functions as a condenser for a high-pressure refrigerant in the refrigeration cycle during the heating operation.

The first indoor expansion valve 33 is an electric expansion valve that is provided at a refrigerant pipe on a liquid refrigerant side of the first indoor heat exchanger 31 and whose valve opening degree is adjustable.

The first indoor fan 32 sucks indoor air into the first indoor unit 30 and causes heat to be exchanged with a refrigerant in the first indoor heat exchanger 31, and then causes an air flow for discharge to the outside to be generated. The first indoor fan 32 is rotationally driven by an indoor fan motor.

The first indoor unit 30 includes the first indoor unit control unit 34 that controls the operation of each portion that constitutes the first indoor unit 30. The first indoor unit control unit 34 includes a microcomputer including, for example, a CPU and a memory. The first indoor unit control unit 34 is connected to a second indoor unit control unit 39 and the outdoor unit control unit 27 via the communication line, and sends and receives, for example, control signals.

The first indoor unit 30 is provided with, for example, a first indoor liquid-side heat-exchange sensor 71, a first indoor air temperature sensor 72, and a first indoor gas-side heat-exchange temperature sensor 73. Each of these sensors is electrically connected to the first indoor unit control unit 34 and sends a detection signal to the indoor unit control unit 34. The first indoor liquid-side heat-exchange sensor 71 detects the temperature of a refrigerant that flows through a liquid-refrigerant-side outlet of the first indoor heat exchanger 31. The first indoor air temperature sensor 72 detects the temperature of indoor air that is air before passing through the first indoor heat exchanger 31. The first indoor gas-side heat-exchange temperature sensor 73 detects the temperature of a refrigerant that flows through a gas-refrigerant-side outlet of the first indoor heat exchanger 31.

The second indoor unit 35 is provided with a second indoor heat exchanger 36, a second indoor expansion valve 38, and a second indoor fan 37.

A liquid side of the second indoor heat exchanger 36 is connected to the liquid-side refrigerant connection pipe 6, and a gas side end of the second indoor heat exchanger 36 is connected to the gas-side refrigerant connection pipe 5. The second indoor heat exchanger 36 is a heat exchanger that functions as an evaporator for a low-pressure refrigerant in the refrigeration cycle during the cooling operation, and that functions as a condenser for a high-pressure refrigerant in the refrigeration cycle during the heating operation.

The second indoor expansion valve 38 is an electric expansion valve that is provided at a refrigerant pipe on a liquid refrigerant side of the second indoor heat exchanger 36 and whose valve opening degree is adjustable.

The second indoor fan 37 sucks indoor air into the second indoor unit 35 and causes heat to be exchanged with a refrigerant in the second indoor heat exchanger 36, and then causes an air flow for discharge to the outside to be generated. The second indoor fan 37 is rotationally driven by an indoor fan motor.

The second indoor unit 35 includes the second indoor unit control unit 39 that controls the operation of each portion that constitutes the second indoor unit 35. The second indoor unit control unit 39 includes a microcomputer including, for example, a CPU and a memory. The second indoor unit control unit 39 is connected to the first indoor unit control unit 34 and the outdoor unit control unit 27 via a communication line, and sends and receives, for example, control signals.

The second indoor unit 35 is provided with, for example, a second indoor liquid-side heat-exchange sensor 75, a second indoor air temperature sensor 76, and a second indoor gas-side heat-exchange temperature sensor 77. Each of these sensors is electrically connected to the second indoor unit control unit 39 and sends a detection signal to the second indoor unit control unit 39. The second indoor liquid-side heat-exchange sensor 75 detects the temperature of a refrigerant that flows through a liquid-refrigerant-side outlet of the second indoor heat exchanger 36. The second indoor air temperature sensor 76 detects the temperature of indoor air that is air before passing through the second indoor heat exchanger 36. The second indoor gas-side heat-exchange temperature sensor 77 detects the temperature of a refrigerant that flows through a gas-refrigerant-side outlet of the second indoor heat exchanger 36.

(5-1-3) Details of Controller 7

In the air conditioning apparatus 1, by connecting the outdoor unit control unit 27, the first indoor unit control unit 34, and the second indoor unit control unit 39 to each other via the communication lines, the controller 7 that controls the operation of the air conditioning apparatus 1 is formed.

The controller 7 primarily includes a CPU (central processing unit) and a memory, such as ROM or RAM. Various processing operations and control that are performed by the controller 7 are realized as a result of each portion included in the outdoor unit control unit 27 and/or the first indoor unit control unit 34 and/or the second indoor unit control unit 39 functioning together.

(5-1-4) Operation Modes

Operation modes are described below.

As the operation modes, a cooling operation mode and a heating operation mode are provided.

On the basis of an instruction received from, for example, a remote controller, the controller 7 determines whether or not a mode is the cooling operation mode or the heating operation mode, and executes the mode.

(5-1-4-1) Cooling Operation Mode

In the air conditioning apparatus 1, in the cooling operation mode, the compressor 21 is such that an operation frequency is capacity-controlled to cause the evaporation temperature of a refrigerant in the refrigerant circuit 10 to become a target evaporation temperature. Here, it is desirable that the target evaporation temperature be determined in accordance with the indoor unit 30 or 35 whichever has the largest difference between a set temperature and an indoor temperature (the indoor unit having the largest load).

A gas refrigerant discharged from the compressor 21 is condensed at the outdoor heat exchanger 23 via the four-way switching valve 22. The refrigerant that has flowed through the outdoor heat exchanger 23 passes through the outdoor expansion valve 24. In this case, the outdoor expansion valve 24 is controlled so as to be in a fully open state.

A portion of the refrigerant that has passed through the outdoor expansion valve 24 flows toward the liquid-side shutoff valve 29 and the other portion thereof flows into the branching portion of the suction injection pipe 40. The refrigerant that has flowed through the branching portion of the suction injection pipe 40 is decompressed at the subcooling expansion valve 48. At the subcooling heat exchanger 47, the refrigerant that flows toward the liquid-side shutoff valve 29 from the outdoor expansion valve 24 and the refrigerant that is decompressed at the subcooling expansion valve 48 and that flows in the suction injection pipe exchange heat. After the refrigerant that flows in the suction injection pipe 40 has finished exchanging heat at the subcooling heat exchanger 47, the refrigerant flows so as to merge at the merging portion between the low-pressure receiver 41 and the one connection port of the four-way switching valve 22. The valve opening degree of the subcooling expansion valve 48 is controlled so as to satisfy predetermined conditions such as the subcooling degree of the refrigerant that has passed though the subcooling heat exchanger 47 in the refrigerant circuit becoming a predetermined target value.

After the refrigerant that flows toward the liquid-side shutoff valve 29 from the outdoor expansion valve 24 has finished exchanging heat at the subcooling heat exchanger 47, the refrigerant flows through the liquid-side refrigerant connection pipe 6 via the liquid-side shutoff valve 29, and is sent to the first indoor unit 30 and the second indoor unit 35.

Here, in the first indoor unit 30, the valve opening degree of the first indoor expansion valve 33 is controlled so as to satisfy predetermined conditions such as the superheating degree of a refrigerant that flows through a gas-side outlet of the first indoor heat exchanger 31 becoming a predetermined target value. Similarly to the first indoor expansion valve 33, the valve opening degree of the second indoor expansion valve 38 of the second indoor unit 35 is controlled so as to satisfy predetermined conditions such as the superheating degree of a refrigerant that flows through a gas-side outlet of the second indoor heat exchanger 36 becoming a predetermined target value. The valve opening degree of the first indoor expansion valve 33 and the valve opening degree of the second indoor expansion valve 38 may be controlled so as to satisfy predetermined conditions such as the superheating degree of the refrigerant that is obtained by subtracting the saturation temperature of the refrigerant that is equivalent to a detected pressure of the suction pressure sensor 63 from a detected temperature of the suction temperature sensor 64 becoming a target value. Further, the method of controlling the valve opening degree of the first indoor expansion valve 33 and the valve opening degree of the second indoor expansion valve 38 are not limited, so that, for example, the valve opening degrees may be controlled to cause the discharge temperature of the refrigerant that is discharged from the compressor 21 to become a predetermined temperature, or the superheating degree of the refrigerant that is discharged from the compressor 21 to satisfy a predetermined condition. The refrigerant decompressed at the first indoor expansion valve 33 evaporates at the first indoor heat exchanger 31, the refrigerant decompressed at the second indoor expansion valve 38 evaporates at the second indoor heat exchanger 36, and the refrigerants merge, after which the refrigerant flows to the gas-side refrigerant connection pipe 5. The refrigerant that has flowed through the gas-side refrigerant connection pipe 5 merges with the refrigerant that has flowed through the suction injection pipe 40 via the gas-side shutoff valve 28 and the four-way switching valve 22. The merged refrigerant is sucked into the compressor 21 again via the low-pressure receiver 41. Liquid refrigerants that could not be evaporated at the first indoor heat exchanger 31, the second indoor heat exchanger 36, and the subcooling heat exchanger 47 are stored as excess refrigerants in the low-pressure receiver 41.

(5-1-4-2) Heating Operation Mode

In the air conditioning apparatus 1, in the heating operation mode, the compressor 21 is such that an operation frequency is subjected to capacity control to cause the condensation temperature of a refrigerant in the refrigerant circuit 10 to become a target condensation temperature. Here, it is desirable that the target condensation temperature be determined in accordance with the indoor unit 30 or 35 whichever has the largest difference between a set temperature and an indoor temperature (the indoor unit having the largest load).

After a gas refrigerant discharged from the compressor 21 has flowed through the four-way switching valve 22 and the gas-side refrigerant connection pipe 5, a portion of the refrigerant flows into a gas-side end of the first indoor heat exchanger 31 of the first indoor unit 30 and is condensed at the first indoor heat exchanger 31, and the other portion of the refrigerant flows into a gas-side end of the second indoor heat exchanger 36 of the second indoor unit 35 and is condensed at the second indoor heat exchanger 36.

The valve opening degree of the first indoor expansion valve 33 of the first indoor unit 30 is controlled so as to satisfy predetermined conditions, such as the subcooling degree of a refrigerant that flows along the liquid side of the first indoor heat exchanger 31 becoming a predetermined target value. Similarly, the valve opening degree of the second indoor expansion valve 38 of the second indoor unit 35 is controlled so as to satisfy predetermined conditions, such as the subcooling degree of a refrigerant that flows along the liquid side of the second indoor heat exchanger 36 becoming a predetermined target value.

After the refrigerant decompressed at the first indoor expansion valve 33 and the refrigerant decompressed at the second indoor expansion valve 38 have merged, the refrigerant flows through the liquid-side refrigerant connection pipe 6 and flows into the outdoor unit 20.

After the refrigerant that has passed through the liquid-side shutoff valve 29 of the outdoor unit 20 has flowed through the subcooling heat exchanger 47, the refrigerant is decompressed at the outdoor expansion valve 24. Here, the valve opening degree of the outdoor expansion valve 24 is controlled so as to satisfy predetermined conditions, such as the superheating degree of a refrigerant that flows along the suction side of the compressor 21 becoming a target value. The method of controlling the valve opening degree of the outdoor expansion valve 24 is not limited, so that, for example, the valve opening degrees may be controlled to cause the discharge temperature of the refrigerant that is discharged from the compressor 21 to become a predetermined temperature, or the superheating degree of the refrigerant that is discharged from the compressor 21 to satisfy a predetermined condition.

In the heating operation mode, since the subcooling expansion valve 48 that is provided at the suction injection pipe 40 is controlled so as to be in a fully closed state, the refrigerant does not flow through the suction injection pipe 40 and heat is also not exchanged at the subcooling heat exchanger 47.

The refrigerant decompressed at the outdoor expansion valve 24 is evaporated at the outdoor heat exchanger 23, flows through the four-way switching valve 22 and the low-pressure receiver 41, and is sucked into the compressor 21 again. A liquid refrigerant that could not be evaporated at the outdoor heat exchanger 23 is stored as an excess refrigerant in the low-pressure receiver 41.

(5-1-5) Features of the First Embodiment

Since the air conditioning apparatus 1 above uses a refrigerant containing 1,2-difluoroethylene, the air conditioning apparatus 1 can sufficiently reduce GWP.

Since the temperature of the refrigerant that is sucked into the compressor 21 can be reduced by the suction injection pipe 40, the air conditioning apparatus 1 can improve the operation efficiency in the refrigeration cycle.

(5-1-6) Modification A of the First Embodiment

Although, in the first embodiment, the air conditioning apparatus 1 is described by using as an example an air conditioning apparatus including a plurality of indoor units that are connected in parallel, an air conditioning apparatus including one indoor unit that is connected in series may be used as the air conditioning apparatus.

(5-1-7) Modification B of the First Embodiment

In the first embodiment, the air conditioning apparatus 1 including the suction injection pipe 40 that allows a refrigerant to be sent to the suction side of the compressor 21 after the refrigerant has flowed through the subcooling heat exchanger 47 is described as an example.

Figure 5C:
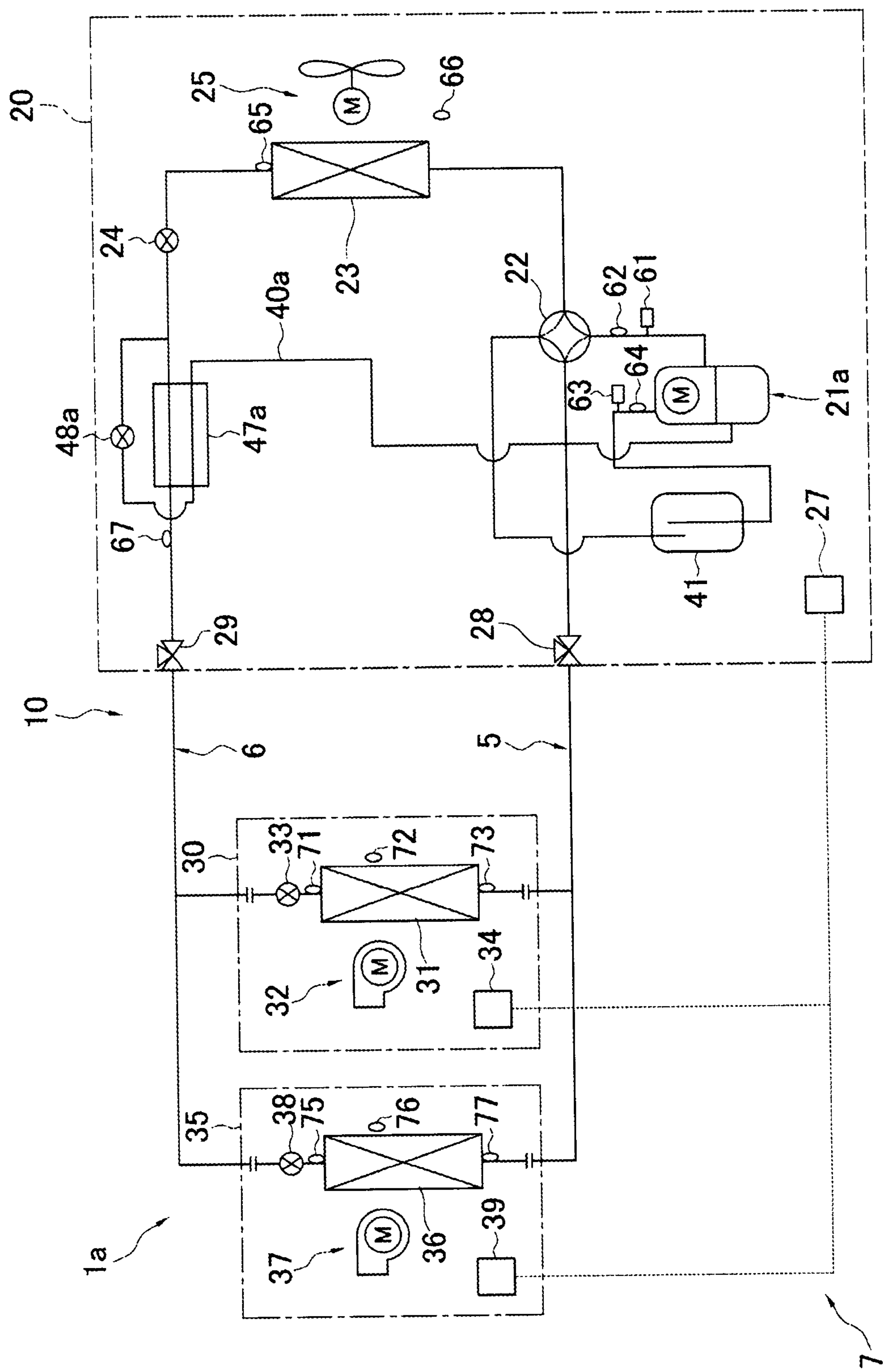
FIG. 5C is a schematic structural view of a refrigerant circuit according to Modification B of the first embodiment of the technique of fifth group.

In contrast, as an air conditioning apparatus, for example, as shown in FIG. 5C, an air conditioning apparatus 1*a* including an economizer injection pipe 40*a* that sends a refrigerant to a region of intermediate pressure of a compressor 21*a* after the refrigerant has flowed through an economizer heat exchanger 47*a* may be used.

The economizer injection pipe 40*a* is a pipe that branches off from a portion of a main circuit of a refrigerant circuit 10 between the outdoor expansion valve 24 and the liquid-side shutoff valve 29 and extends up to the region of intermediate pressure of the compressor 21*a*. An economizer expansion valve 48*a* whose valve opening degree can be controlled is provided at the economizer injection pipe 40*a*.

The economizer heat exchanger 47*a* is a heat exchanger that causes heat to be exchanged between a refrigerant that flows into a portion branching off from the main circuit of the refrigerant circuit 10, that flows in the economizer injection pipe 40*a*, and that has been decompressed at the economizer expansion valve 48*a* and a refrigerant that flows between the outdoor expansion valve 24 and the liquid-side shutoff valve 29 in the main circuit of the refrigerant circuit 10.

Figure 5D:
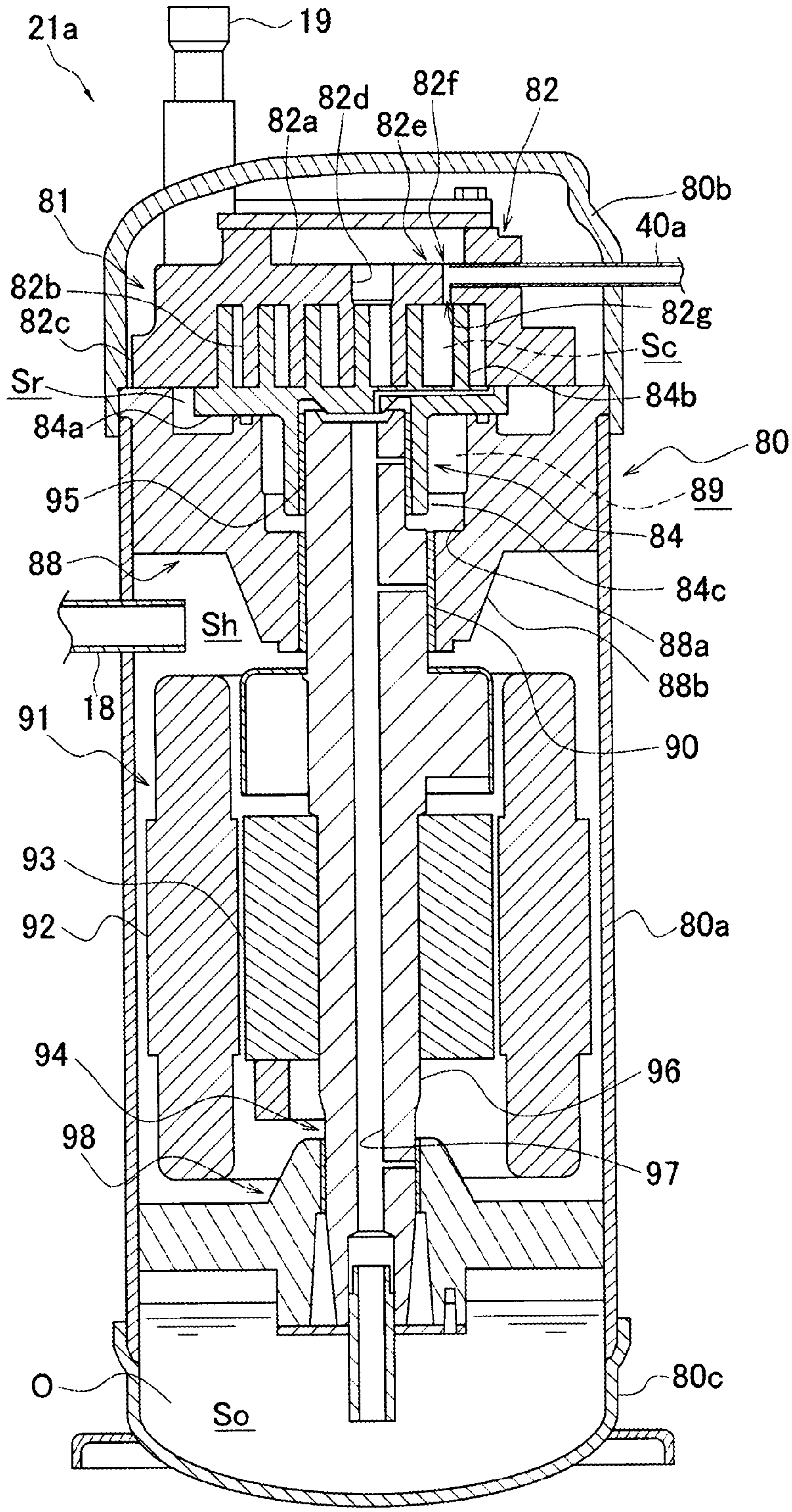
FIG. 5D is a side sectional view showing a schematic structure of a compressor according to the Modification B of the first embodiment of the technique of fifth group.

The compressor 21*a* is not limited, and, for example, a scroll compressor as that shown in FIG. 5D can be used.

The compressor 21*a* includes a casing 80, a scroll compression mechanism 81 including a fixed scroll 82, a driving motor 91, a crank shaft 94, and a lower bearing 98.

The casing 80 includes a circular cylindrical member 80*a* that is substantially circularly cylindrical and that has an open top and an open bottom, and an upper cover 80*b* and a lower cover 80*c* that are provided on an upper end and a lower end, respectively, of the circular cylindrical member 80*a*. The circular cylindrical member 80*a* and the upper cover 80*b* and the lower cover 80*c* are fixed to each other by welding so as to be kept air-tight. Pieces of structural equipment of the compressor 21*a* including the scroll compression mechanism 81, the driving motor 91, the crank shaft 94, and the lower bearing 98 are accommodated in the casing 80. An oil-storage space So is formed in a lower portion of the casing 80. A refrigerating-machine oil O for lubricating, for example, the scroll compression mechanism 81 can be stored in the oil-storage space So. A suction tube 19 that allows a low-pressure gas refrigerant in a refrigeration cycle of the refrigerant circuit 10 to be sucked and that allows a gas refrigerant to be supplied to the scroll compression mechanism 81 is provided at an upper portion of the casing 80 so as to extend through the upper cover 80*b*. A lower end of the suction tube 19 is connected to the fixed scroll 82 of the scroll compression mechanism 81. The suction tube 19 communicates with a compression chamber Sc of the scroll compression mechanism 81 described below. An intermediate portion of the circular cylindrical member 80*a* of the casing 80 is provided with a discharge tube 18 through which a refrigerant that is discharged to the outside of the casing 80 passes. The discharge tube 18 is disposed so that an end portion of the discharge tube 18 inside the casing 80 protrudes into a high-pressure space Sh formed below a housing 88 of the scroll compression mechanism 81. A high-pressure refrigerant in the refrigeration cycle that has been compressed by the scroll compression mechanism 81 flows through the discharge tube 18. A side surface of the upper cover 80*b* of the casing 80 has an injection connection port, and the economizer injection pipe 40*a* is connected in the injection connection port.

The scroll compression mechanism 81 primarily includes the housing 88, the fixed scroll 82 that is disposed above the housing 88, and a movable scroll 84 that forms the compression chamber Sc by being assembled to the fixed scroll 82.

The fixed scroll 82 includes a plate-shaped fixed-side end plate 82*a*, a spiral fixed-side lap 82*b* that protrudes from a front surface of the fixed-side end plate 82*a*, and an outer edge portion 82*c* that surrounds the fixed-side lap 82*b*. Anon-circular discharge port 82*d* that communicates with the compression chamber Sc of the scroll compression mechanism 81 is formed in a central portion of the fixed-side end plate 82*a* so as to extend through the fixed-side end plate 82*a* in a thickness direction thereof. A refrigerant compressed in the compression chamber Sc is discharged from the discharge port 82*d*, passes through a refrigerant passage (not shown) formed in the fixed scroll 82 and the housing 88, and flows into the high-pressure space Sh. The fixed-side end plate 82*a* has a supply passage 82*e* that opens in a side of the fixed-side end plate 82*a* and that communicates with the compression chamber Sc. The supply passage 82*e* allows an intermediate-pressure refrigerant that has flowed through the economizer injection pipe 40*a* to be supplied to the compression chamber Sc. The supply passage 82*e* has a horizontal passage portion 82*f* that extends in a horizontal direction from the opening in the side of the fixed-side end plate 82*a* toward the center of the fixed-side end plate 82*a*. The supply passage 82*e* has an injection port 82*g* that extends toward the compression chamber Sc from a portion of the horizontal passage portion 82*f* on a center side of the fixed-side end plate 82*a* (near an end portion of the horizontal passage portion 82*f* on the center side of the fixed-side end plate 82*a*) and that directly communicates with the compression chamber Sc. The injection port 82*g* is a circular hole.

The movable scroll 84 includes a plate-shaped movable-side end plate 84*a*, a spiral movable-side lap 84*b* that protrudes from a front surface of the movable-side end plate 84*a*, and a circular cylindrical boss portion 84*c* that protrudes from a rear surface of the movable-side end plate 84*a*. The fixed-side lap 82*b* of the fixed scroll 82 and the movable-side lap 84*b* of the movable scroll 84 are assembled to each other in a state in which a lower surface of the fixed-side end plate 82*a* and an upper surface of the movable-side end plate 84*a* face each other. The compression chamber Sc is formed between the fixed-side lap 82*b* and the movable-side lap 84*b* that are adjacent to each other. Due to the movable scroll 84 revolving with respect to the fixed scroll 82 as described below, the volume of the compression chamber Sc changes periodically, and a refrigerant is sucked, compressed, and discharged in the scroll compression mechanism 81. The boss portion 84*c* is a circular cylindrical portion whose upper end is closed. Due to a decentered portion 95 of the crank shaft 94 (described below) being inserted into a hollow portion of the boss portion 84*c*, the movable scroll 84 and the crank shaft 94 are coupled to each other. The boss portion 84*c* is disposed in a decentered-portion space 89 that is formed between the movable scroll 84 and the housing 88. The decentered-portion space 89 communicates with the high-pressure space Sh via, for example, an oil-supply path 97 of the crank shaft 94 (described below), and a high pressure acts in the decentered-portion space 89. This pressure causes a lower surface of the movable-side end plate 84*a* in the decentered-portion space 89 to be pushed upward toward the fixed scroll 82. This force causes the movable scroll 84 to closely contact the fixed scroll 82. The movable scroll 84 is supported by the housing 88 via an Oldham ring disposed in an "Oldham ring space Sr". The Oldham ring is a member that prevents the movable scroll 84 from rotating and that causes the movable scroll 84 to revolve. By using the Oldham ring, when the crank shaft 94 rotates, the movable scroll 84 connected to the crank shaft 94 at the boss portion 84*c* revolves without rotating with respect to the fixed scroll 82, and a refrigerant in the compression chamber Sc is compressed.

The housing 88 is press-fitted to the circular cylindrical member 80*a*, and an outer peripheral surface of the housing 88 is fixed to the circular cylindrical member 80*a* in its entirety in a peripheral direction. The housing 88 and the fixed scroll 82 are fixed to each other with, for example, a bolt (not shown) so that an upper end surface of the housing 88 is in close contact with a lower surface of the outer edge portion 82*c* of the fixed scroll 82. The housing 88 includes a concave portion 88*a* disposed so as to be recessed in a central portion of an upper surface of the housing 88 and a bearing portion 88*b* disposed below the concave portion 88*a*. The concave portion 88*a* surrounds a side surface forming the decentered-portion space 89 where the boss portion 84*c* of the movable scroll 84 is disposed. A bearing 90 that supports a main shaft 96 of the crank shaft 94 is disposed in the bearing portion 88*b*. The bearing 90 rotatably supports the main shaft 96 inserted in the bearing 90. The housing 88 has the Oldham ring space Sr where the Oldham ring is disposed.

The driving motor 91 includes a ring-shaped stator 92 fixed to an inner wall surface of the circular cylindrical member 80*a* and a rotor 93 rotatably accommodated on an inner side of the stator 92 with a slight gap (air gap passage) therebetween. The rotor 93 is connected to the movable scroll 84 via the crank shaft 94 disposed so as to extend in an up-down direction along an axial center of the circular cylindrical member 80*a*. Due to the rotation of the rotor 93, the movable scroll 84 revolves with respect to the fixed scroll 82.

The crank shaft 94 transmits driving force of the driving motor 91 to the movable scroll 84. The crank shaft 94 is disposed so as to extend in the up-down direction along the axial center of the circular cylindrical member 80*a*, and connects the rotor 93 of the driving motor 91 and the movable scroll 84 of the scroll compression mechanism 81 to each other. The crank shaft 94 includes the main shaft 96 whose center axis coincides with the axial center of the circular cylindrical member 80*a* and the decentered portion 95 that is decentered with respect to the axial center of the circular cylindrical member 80*a*. The decentered portion 95 is inserted into the boss portion 84*c* of the movable scroll 84 as described above. The main shaft 96 is rotatably supported by the bearing 90 at the bearing portion 88*b* of the housing 88 and the lower bearing 98 described below. The main shaft 96 is connected to the rotor 93 of the driving motor 91 at a location between the bearing portion 88*b* and the lower bearing 98. The oil-supply path 97 for supplying the refrigerating-machine oil O to, for example, the scroll compression mechanism 81 is formed in the crankshaft 94. A lower end of the main shaft 96 is positioned in the oil-storage space So formed in the lower portion of the casing 80, and the refrigerating-machine oil O in the oil-storage space So is supplied to, for example, the scroll compression mechanism 81 via the oil-supply path 97.

The lower bearing 98 is disposed below the driving motor 91. The lower bearing 98 is fixed to the circular cylindrical member 80*a*. The lower bearing 98 constitutes a bearing on a lower end side of the crank shaft 94, and rotatably supports the main shaft 96 of the crank shaft 94.

Next, an operation of the compressor 21*a* is described.

When the driving motor 91 starts up, the rotor 93 rotates with respect to the stator 92, and the crank shaft 94 fixed to the rotor 93 rotates. When the crank shaft 94 rotates, the movable scroll 84 connected to the crank shaft 94 revolves with respect to the fixed scroll 82. A low-pressure gas refrigerant in a refrigeration cycle passes through the suction tube 19 and is sucked into the compression chamber Sc from a peripheral edge side of the compression chamber Sc. As the movable scroll 84 revolves, the suction tube 19 and the compression chamber Sc no longer communicate with each other. As the volume of the compression chamber Sc is reduced, the pressure in the compression chamber Sc starts to increase.

An intermediate-pressure refrigerant that has flowed through the economizer injection pipe 40*a* is supplied to the compression chamber Sc during compression via the horizontal passage portion 82*f* and the injection port 82*g*.

As the compression of the refrigerant progresses, the compression chamber Sc no longer communicates with the injection port 82*g*. The refrigerant in the compression chamber Sc is compressed as the volume of the compression chamber Sc is reduced, and finally becomes a high-pressure gas refrigerant. The high-pressure gas refrigerant is discharged from the discharge port 82*d* that is positioned near the center of the fixed-side end plate 82*a*. Thereafter, the high-pressure gas refrigerant passes through the refrigerant passage (not shown) formed in the fixed scroll 82 and the housing 88, and flows into the high-pressure space Sh. The high-pressure gas refrigerant in the refrigeration cycle that has flowed into the high-pressure space Sh and that has been compressed by the scroll compression mechanism 81 is discharged from the discharge tube 18.

In the air conditioning apparatus 1*a*, due to the refrigerant that has flowed through the economizer injection pipe 40*a* merging in the region of intermediate pressure of the compressor 21*a*, the temperature of the refrigerant having intermediate pressure in the compressor 21*a* can be reduced, so that it is possible to increase the operation efficiency in the refrigeration cycle.

(5-1-8) Modification C of the First Embodiment

In the Modification B of the first embodiment, a scroll compressor is used as an example of the compressor to describe the compressor.

In contrast, as the compressor that is used in the first embodiment, a compressor 21*b*, which is a rotary compressor in a second embodiment described below, may be used.

(5-2) Second Embodiment

Figure 5E:
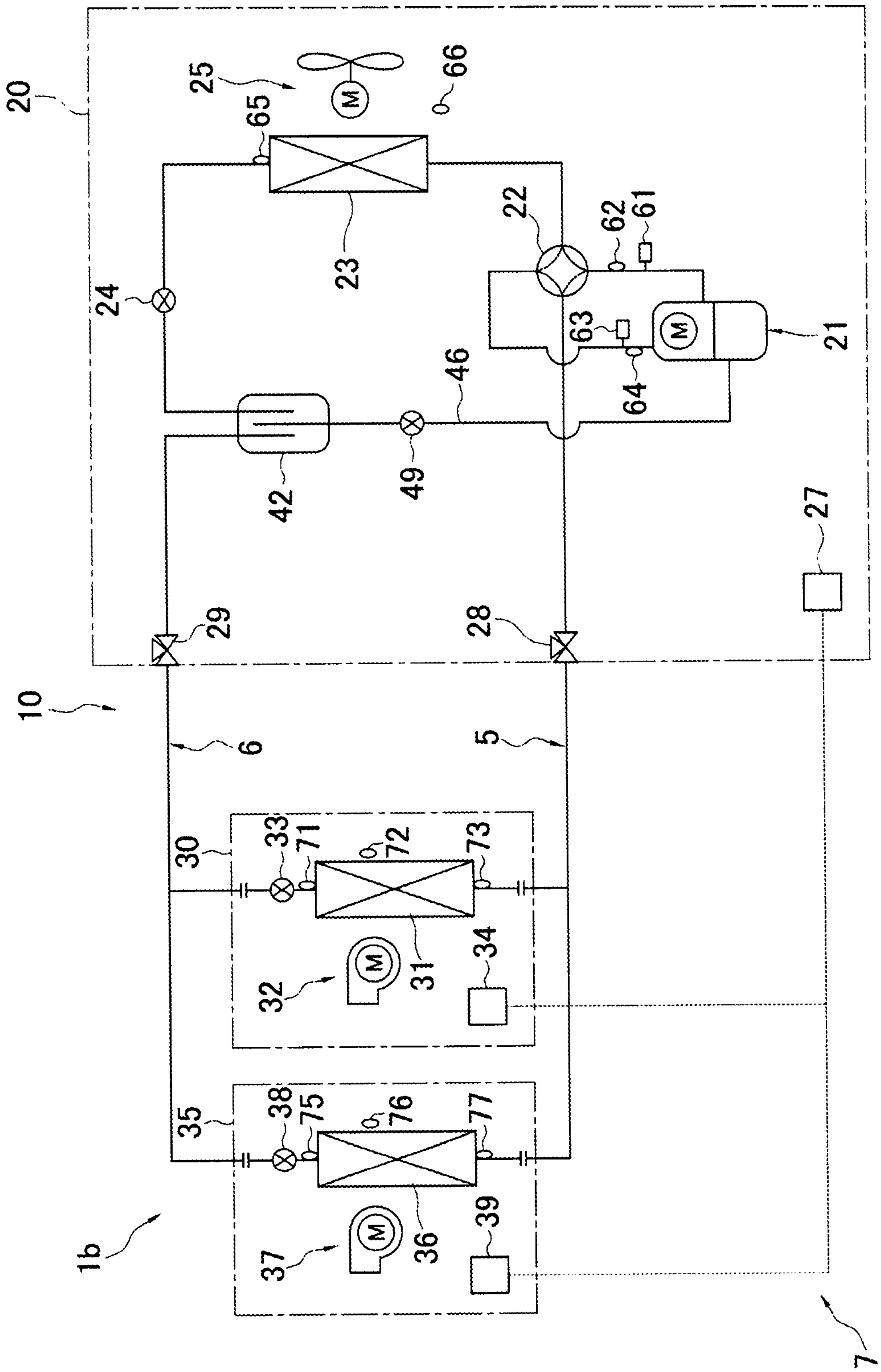
FIG. 5E is a schematic structural view of a refrigerant circuit according to a second embodiment of the technique of fourth group.
Figure 5F:
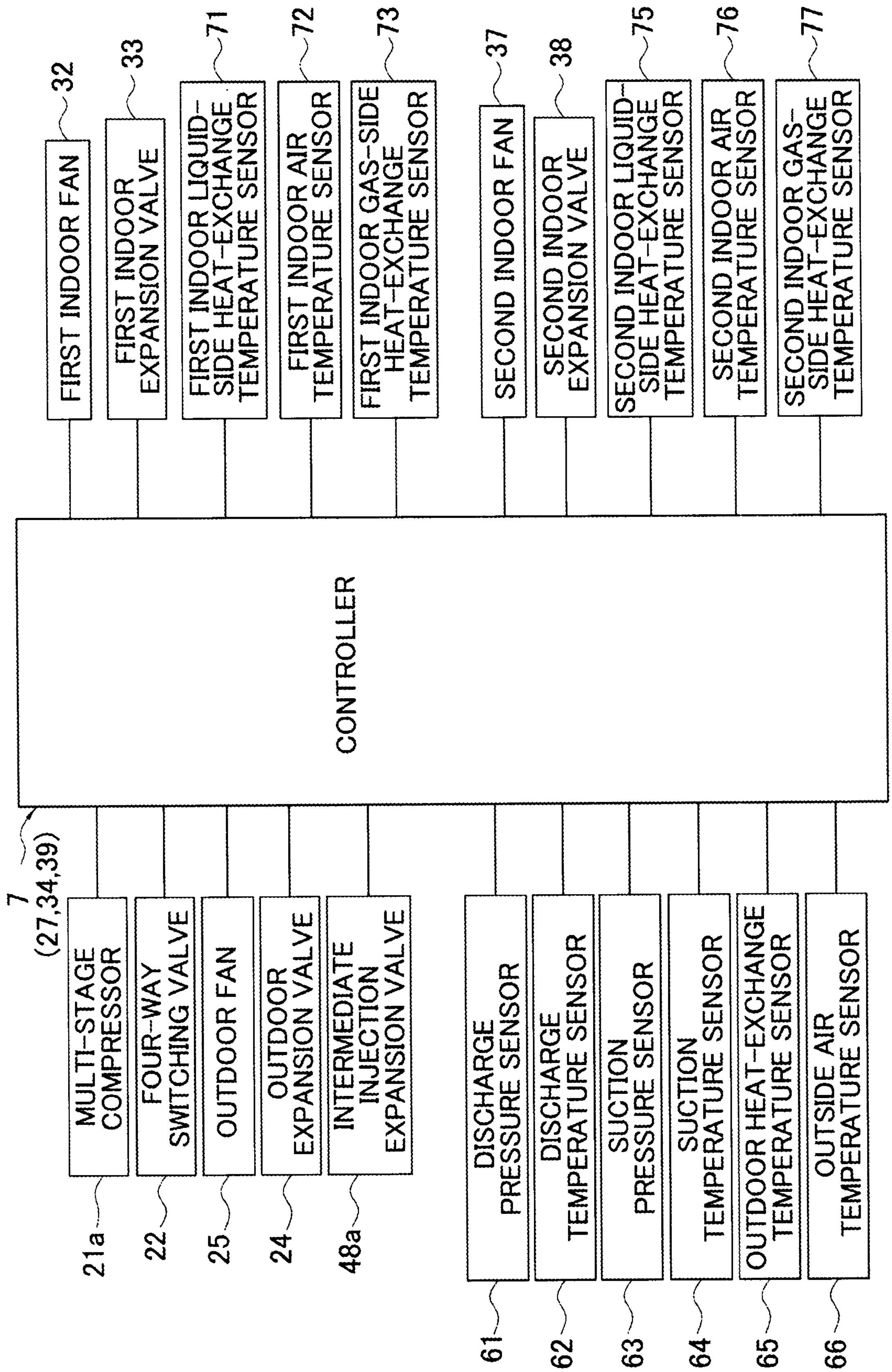
FIG. 5F is a schematic control block structural view of a refrigeration cycle apparatus according to the second embodiment of the technique of fourth group.

With reference to FIG. 5E, which is a schematic structural view of a refrigerant circuit, and FIG. 5F, which is schematic control block structural view, an air conditioning apparatus 1*b* serving as a refrigeration cycle apparatus according to the second embodiment is described below.

The air conditioning apparatus 1*b* of the second embodiment is described below primarily by focusing on portions that differ from those of the air conditioning apparatus 1 of the first embodiment.

Even in the air conditioning apparatus b, a refrigerant circuit 10 is filled with a refrigerant that is a mixed refrigerant containing 1,2-difluoroethylene as a refrigerant for performing a vapor compression refrigeration cycle, and is filled with any one of the refrigerants A to D above. The refrigerant circuit 10 is filled with refrigerating-machine oil along with the refrigerant.

(5-2-1) Outdoor Unit 20

An outdoor unit 20 of the air conditioning apparatus 1*b* of the second embodiment includes the compressor 21*b*, a high-pressure receiver 42, an intermediate injection pipe 46, and an intermediate injection expansion valve 49 instead of the compressor 21, the low-pressure receiver 41, the suction injection pipe 40, the subcooling expansion valve 48, the subcooling heat exchanger 47, and the subcooling temperature sensor 67 of the outdoor unit 20 in the first embodiment.

The high-pressure receiver 42 is provided between an outdoor expansion valve 24 and a liquid-side shutoff valve 29 in a main flow path of the refrigerant circuit 10. The high-pressure receiver 42 has an internal space having positioned therein both an end portion of a pipe that extends from a side of the outdoor expansion valve 24 and an end portion of a pipe that extends from a side of the liquid-side shutoff valve 29, and is a container that is capable of storing a refrigerant.

The intermediate injection pipe 46 extends from a gas region of the internal space of the high-pressure receiver 42, and is a pipe that is connected to a region of intermediate pressure of the compressor 21*b*. The intermediate injection expansion valve 49 is provided in the intermediate injection pipe 46, and has a controllable valve opening degree.

(5-2-2) Indoor Unit 30

Since a first indoor unit 30 and a second indoor unit 35 of the second embodiment are the same as those of the first embodiment, they are not described.

(5-2-3) Cooling Operation Mode and Heating Operation Mode

In the air conditioning apparatus 1*b* above, in a cooling operation mode, the outdoor expansion valve 24 is controlled so that, for example, the subcooling degree of a refrigerant that passes through a liquid-side outlet of an outdoor heat exchanger 23 satisfies a predetermined condition. The intermediate injection expansion valve 49 is controlled so that a refrigerant that flows from the high-pressure receiver 42 is reduced up to an intermediate pressure in the compressor 21*b*.

In a heating operation mode, the outdoor expansion valve 24 is controlled so that, for example, the superheating degree of a refrigerant that is sucked by the compressor 21*b* satisfies a predetermined condition. The intermediate injection expansion valve 49 is controlled so that the refrigerant that flows from the high-pressure receiver 42 is reduced up to the intermediate pressure in the compressor 21*b*.

(5-2-4) Compressor 21*b*

Figure 5G:
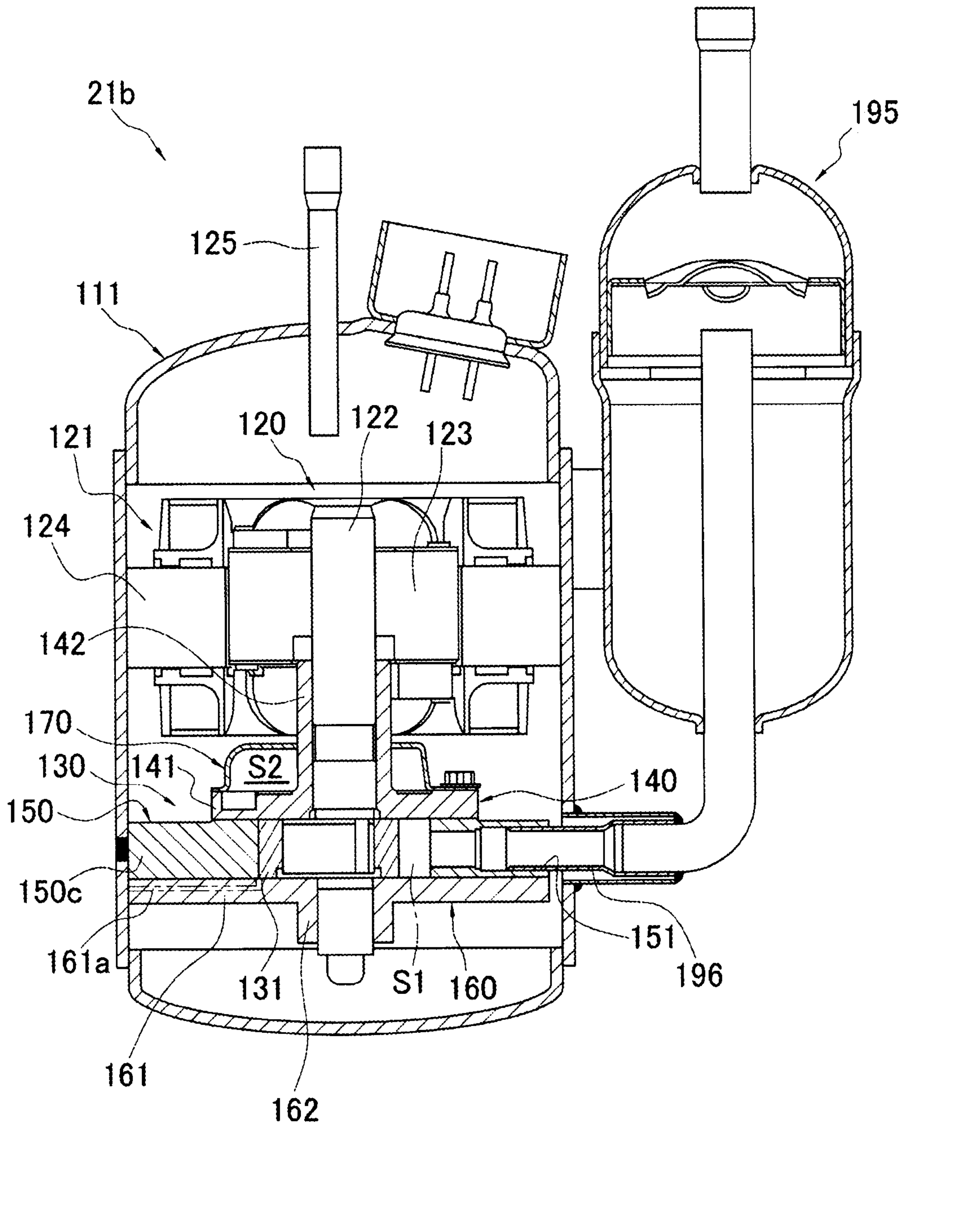
FIG. 5G is a side sectional view showing a schematic structure of a compressor according to the second embodiment of the technique of fourth group.

As shown in FIG. 5G, the compressor 21*b* is a 1-cylinder rotary compressor including a casing 111 and a driving mechanism 120 and a compression mechanism 130 that are disposed in the casing 111. In the compressor 21*b*, the compression mechanism 130 is disposed on a lower side of the driving mechanism 120 in the casing 111.

(5-2-4-1) Driving Mechanism

The driving mechanism 120 is accommodated in an upper portion of an internal space of the casing 111 and drives the compression mechanism 130. The driving mechanism 120 includes a motor 121 that is a drive source and a crank shaft 122 that is a drive shaft mounted on the motor 121.

The motor 121 is a motor for rotationally driving the crank shaft 122 and primarily includes a rotor 123 and a stator 124. The rotor 123 has the crank shaft 122 fitted into its internal space and rotates together with the crank shaft 122. The rotor 123 is constituted by electromagnetic steel plates that are stacked, and a magnet that is embedded in a rotor main body. The stator 124 is disposed on an outer side of the rotor 123 in a radial direction with a predetermined space from the rotor 123. The stator 124 is constituted by electromagnetic steel plates that are stacked, and a coil wound around a stator main body. The motor 121 causes the rotor 123 to rotate together with the crank shaft 122 by electromagnetic force that is generated at the stator 124 by causing an electric current to flow through the coil.

Figure 5H:
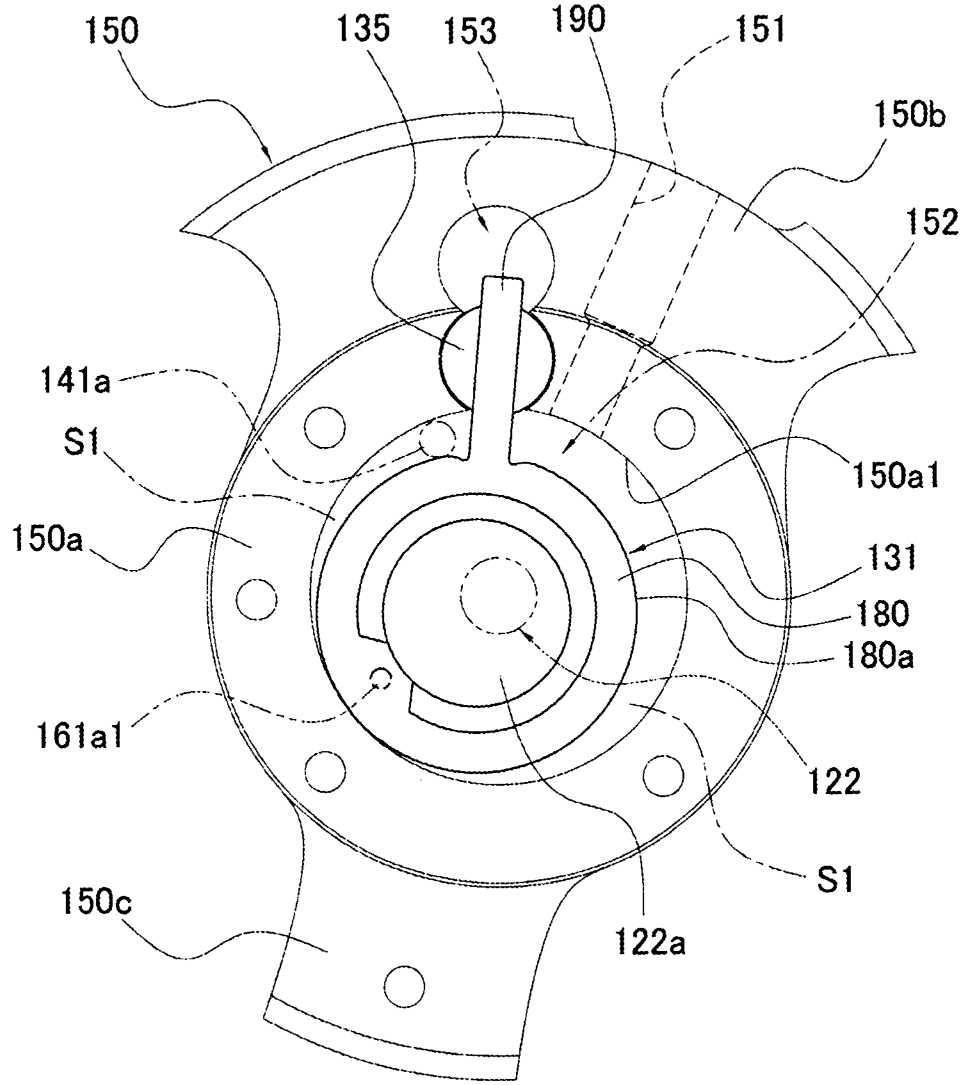
FIG. 5H is a plan sectional view showing the vicinity of a cylinder chamber of the compressor according to the second embodiment of the technique of fourth group.

The crank shaft 122 is fitted into the rotor 123 and rotates around a rotation axis as a center. As shown in FIG. 5H, a crank pin 122*a*, which is a decentered portion of the crank shaft 122, is inserted into a roller 180 (described below) of a piston 131 of the compression mechanism 130, and is fitted to the roller 180 with rotation force from the rotor 123 being in a transmittable state. The crank shaft 122 rotates in accordance with rotation of the rotor 123, causes the crank pin 122*a* to rotate in a decentered manner, and causes the roller 180 of the piston 131 of the compression mechanism 130 to revolve. That is, the crankshaft 122 has the function of transmitting driving force of the motor 121 to the compression mechanism 130.

(5-2-4-2) Compression Mechanism

The compression mechanism 130 is accommodated on a lower portion side in the casing 111. The compression mechanism 130 compresses a refrigerant sucked via a suction tube 196. The compression mechanism 130 is a rotary compression mechanism and primarily includes a front head 140, a cylinder 150, the piston 131, and a rear head 160. A refrigerant compressed in a compression chamber S1 of the compression mechanism 130 flows from a front-head discharge hole 141*a* that is formed in the front head 140 to a muffler space S2 surrounded by the front head 140 and a muffler 170, and is discharged to a space where the motor 121 is disposed and a lower end of the discharge tube 125 is positioned.

(5-2-4-2-1) Cylinder

The cylinder 150 is a metallic cast member. The cylinder 150 includes a circular cylindrical central portion 150*a*, a first extending portion 150*b* that extends toward a side of an attachment accumulator 195 from the central portion 150*a*, and a second extending portion 150*c* that extends to a side opposite to the first extending portion 150*b* from the central portion 150*a*. The first extending portion 150*b* has a suction hole 151 into which a lower-pressure refrigerant in a refrigeration cycle is sucked. A columnar space on an inner side of an inner peripheral surface 150*a*1 of the central portion 150*a* is a cylinder chamber 152 into which the refrigerant that is sucked from the suction hole 151 flows. The suction hole 151 extends toward an outer peripheral surface of the first extending portion 150*b* from the cylinder chamber 152 and is open at the outer peripheral surface of the first extending portion 150*b*. An end portion of the suction tube 196 extending from the accumulator 195 is inserted into the suction hole 151. For example, the piston 131 for compressing the refrigerant that has flowed into the cylinder chamber 152 is accommodated in the cylinder chamber 152.

The cylinder chamber 152 that is formed by the circular cylindrical central portion 150*a* of the cylinder 150 is open at a first end, which is a lower end of the cylinder chamber 152, and is also open at a second end, which is an upper end of the cylinder chamber 152. A first end, which is a lower end, of the central portion 150*a* is closed by the rear head 160 described below. A second end, which is an upper end, of the central portion 150*a* is closed by the front head 140 described below.

The cylinder 150 has a blade swing space 153 where a bush 135 and a blade 190 (described below) are disposed. The blade swing space 153 is formed in both the central portion 150*a* and the first extending portion 150*b*, and the blade 190 of the piston 131 is swingably supported by the cylinder 150 via the bush 135. The blade swing space 153 is formed so as to, in a plane, extend toward an outer peripheral side from the cylinder chamber 152 in the vicinity of the suction hole 151.

(5-2-4-2-2) Front Head

As shown in FIG. 5G, the front head 140 includes a front-head disk portion 141 that closes an opening at a second end, which is an upper end, of the cylinder 150, and a front-head boss portion 142 that extends upward from a peripheral edge of a front-head opening in the center of the front-head disk portion 141. The front-head boss portion 142 has a circular cylindrical shape, and functions as a bearing of the crank shaft 122.

In a planar position shown in FIG. 5H, the front-head disk portion 141 has the front-head discharge hole 141*a*. A refrigerant compressed in the compression chamber S1 whose volume changes in the cylinder chamber 152 of the cylinder 150 is intermittently discharged from the front-head discharge hole 141*a*. The front-head disk portion 141 is provided with a discharge valve that opens and closes an outlet of the front-head discharge hole 141*a*. The discharge valve opens due to a pressure difference when the pressure of the compression chamber S1 becomes higher than the pressure of the muffler space S2, and discharges the refrigerant to the muffler space S2 from the front-head discharge hole 141*a*.

(5-2-4-2-3) Muffler

As shown in FIG. 5G, the muffler 170 is mounted on an upper surface of a peripheral edge portion of the front-head disk portion 141 of the front head 140. The muffler 170 forms, along with an upper surface of the front-head disk portion 141 and an outer peripheral surface of the front-head boss portion 142, the muffler space S2 to reduce noise generated by the discharge of a refrigerant. As described above, the muffler space S2 and the compression chamber S1 communicate with each other via the front-head discharge hole 141*a* when the discharge valve is open.

The muffler 170 has a center muffler opening that allows the front-head boss portion 142 to extend therethrough and a muffler discharge hole in which a refrigerant flows toward an accommodation space of the motor 121, disposed above, from the muffler space S2.

For example, the muffler space S2, the accommodation space of the motor 121, a space above the motor 121 where the discharge tube 125 is positioned, and a space below the compression mechanism 130 where a lubricant is accumulated are all connected to each other, and form a high-pressure space having equal pressure.

(5-2-4-2-4) Rear Head

The rear head 160 includes a rear-head disk portion 161 that closes an opening at a first end, which is a lower end, of the cylinder 150, and a rear-head boss portion 162 that extends downward from a peripheral edge portion of a central opening of the rear-head disk portion 161 and serves as a bearing. As shown in FIG. 5H, the front-head disk portion 141, the rear-head disk portion 161, and the central portion 150*a* of the cylinder 150 form the cylinder chamber 152. The front-head boss portion 142 and the rear-head boss portion 162 are each a circular cylindrical boss portion, and support the crank shaft 122.

A supply flow path 161*a* is formed in the rear-head disk portion 161. The supply flow path 161*a* is connected to an injection hole (not shown) that opens in the casing 111, and is connected to the intermediate injection pipe 46. The supply flow path 161*a* extends horizontally toward a rotation axis CA of the crank shaft 122 from the injection hole of the casing 111, bends upward, and opens in an upper surface of the rear-head disk portion 161. An outlet opening 161*a*1 of the supply flow path 161*a* opens at a planar position shown by an alternate long and two short dashed line in FIG. 5H. That is, the outlet opening 161*a*1 of the supply flow path 161*a* opens into the cylinder chamber 152 on an inner side of the inner peripheral surface 150*a*1 of the central portion 150*a* of the cylinder 150. The supply flow path 161*a* has the role of, when the angle of revolution of the roller 180 of the piston 131 is in a certain range, allowing an intermediate-pressure refrigerant introduced from the outside of the compressor 21*b* to flow to the compression chamber S1 whose volume changes in the cylinder chamber 152. Therefore, when the angle of revolution of the roller 180 of the piston 131 is in a predetermined range other than the certain range above, the supply flow path is closed by a part of a lower end surface of the roller 180.

(5-2-4-2-5) Piston

The piston 131 is disposed in the cylinder chamber 152 and is mounted on the crank pin 122*a*, which is the decentered portion of the crank shaft 122. The piston 131 is a member including the roller 180 and the blade 190 that are integrated with each other. The blade 190 of the piston 131 is disposed in the blade swing space 153 that is formed in the cylinder 150 and, as described above, is swingably supported by the cylinder 150 via the bush 135. The blade 190 is slidable with respect to the bush 135, and, during operation, swings and repeatedly moves away from the crank shaft 122 and moves toward the crank shaft 122.

Figure 5I:
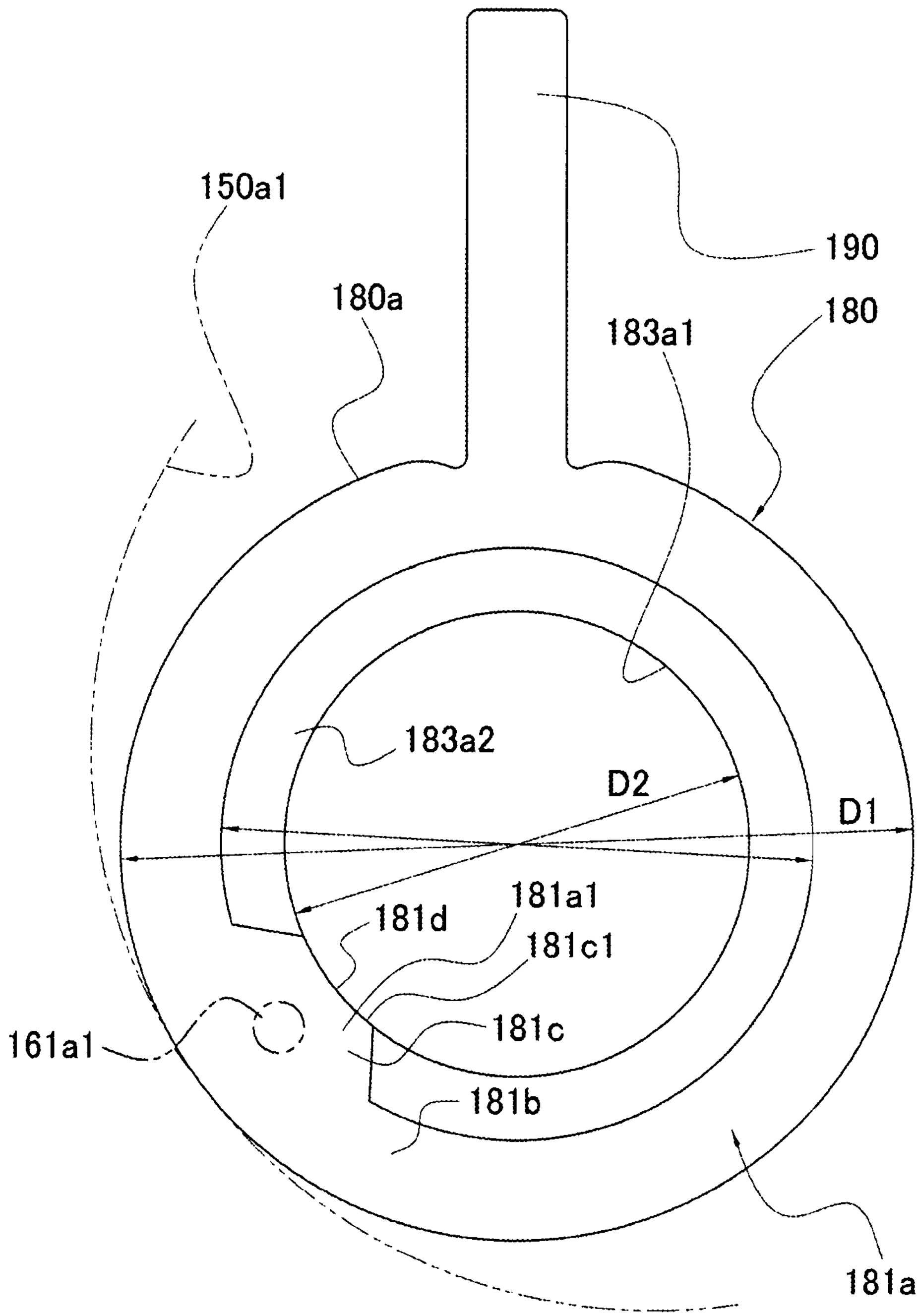
FIG. 5I is a plan sectional view of a piston of the compressor according to the second embodiment of the technique of fifth group.

The roller 180 includes a first end portion 181, where a first end surface 181*a* that is a roller lower end surface is formed, a second end portion 182, where a second end surface 182*a* that is a roller upper end surface is formed, and a central portion 183 that is positioned between the first end portion 181 and the second end portion 182. As shown in FIG. 5I, the central portion 183 is a circular cylindrical portion having an inside diameter D2 and an outside diameter D1. The first end portion 181 includes a circular cylindrical first main body portion 181*b* that has an inside diameter D3 and an outside diameter D1, and a first protruding portion 181*c* that protrudes inward from the first main body portion 181*b*. The outside diameter D1 of the first main body portion 181*b* is equal to the outside diameter D1 of the central portion 183. The inside diameter D3 of the first main body portion 181*b* is larger than the inside diameter D2 of the central portion 183. The second end portion 182 includes a circular cylindrical second main body portion 182*b* having an inside diameter D3 and an outside diameter D1 and a second protruding portion 182*c* that protrudes inward from the second main body portion 182*b*. Similarly to the outside diameter D1 of the first main body portion 181*b*, the outside diameter D1 of the second main body portion 182*b* is equal to the outside diameter D1 of the central portion 183. The inside diameter D3 of the second main body portion 182*b* is equal to the inside diameter D3 of the first main body portion 181*b*, and is larger than the inside diameter D2 of the central portion 183. An inner surface 181*c*1 of the first protruding portion 181*c* and an inner surface 182*c*1 of the second protruding portion 182*c* substantially overlap an inner peripheral surface 183*a*1 of the central portion 183 when viewed in a direction of the rotation axis of the crank shaft 122. In detail, in plan view, the inner surface 181*c*1 of the first protruding portion 181*c* and the inner surface 182*c*1 of the second protruding portion 182*c* are positioned slightly outward with respect to the inner peripheral surface 183*a*1 of the central portion 183. In this way, when the first protruding portion 181*c* and the second protruding portion 182*c* are excluded, the inside diameters D3 of the first main body portion 181*b* and the second main body portion 182*b* are larger than the inside diameter D2 of the central portion 183. Therefore, a first stepped surface 183*a*2 is formed at a height position of a boundary between the first end portion 181 and the central portion 183, and a second stepped surface 183*a*3 is formed at a height position of a boundary between the second end portion 182 and the central portion 183 (see FIG. 5I).

The ring-shaped first end surface 181*a* of the first end portion 181 of the roller 180 is in contact with the upper surface of the rear-head disk portion 161, and slides along the upper surface of the rear-head disk portion 161. The first end surface 181*a* of the roller 180 includes a first wide surface 181*a*1 whose width in a radial direction is partly large. The first protruding portion 181*c* of the first end portion 181 and a part of the first main body portion 181*b* of the first end portion 181 positioned outward with respect to the first protruding portion 181*c* form the first wide surface 181*a*1 (see FIG. 5I).

The ring-shaped second end surface 182*a* of the second end portion 182 of the roller 180 is in contact with a lower surface of the front-head disk portion 141, and slides along the lower surface of the front-head disk portion 141. The second end surface 182*a* of the roller 180 includes a second wide surface 182*a*1 whose width in a radial direction is partly large. The second wide surface 182*a*1 is positioned in correspondence with the position of the first wide surface 181*a*1 when viewed in the direction of the rotation axis of the crank shaft 122. The second protruding portion 182*c* of the second end portion 182 and a part of the second main body portion 182*b* of the second end portion 182 positioned outward with respect to the second protruding portion 182*c* form the second wide surface 182*a*1.

As shown in FIG. 5H, the roller 180 and the blade 190 of the piston 131 form the compression chamber S1 whose volume changes due to the revolution of the piston 131 while partitioning the cylinder chamber 152. The compression chamber S1 is a space that is surrounded by the inner peripheral surface 150*a*1 of the central portion 150*a* of the cylinder 150, the upper surface of the rear-head disk portion 161, the lower surface of the front-head disk portion 141, and the piston 131. The volume of the compression chamber S1 changes in accordance with the revolution of the piston 131, a low-pressure refrigerant sucked from the suction hole 151 is compressed and becomes a high-pressure refrigerant, and the refrigerant is discharged to the muffler space S2 from the front-head discharge hole 141*a*.

(5-2-4-3) Operation

In the compressor 21*b* above, movement of the piston 131 of the compression mechanism 130 that revolves due to rotation of the crank pin 122*a* in a decentered manner causes the volume of the compression chamber S1 to change. Specifically, first, a low-pressure refrigerant from the suction hole 151 is sucked into the compression chamber S1 while the piston 131 revolves. When the compression chamber S5 facing the suction hole 151 is sucking the refrigerant, the volume of the compression chamber S gradually increases. When the piston 131 revolves further, the state of communication between the compression chamber S and the suction hole 151 is stopped, and compression of the refrigerant is started in the compression chamber S1. Thereafter, after an intermediate-pressure refrigerant has been injected into the compression chamber S5 from the outlet opening 161*a*1 of the supply flow path 161*a*, the volume of the compression chamber S in a state of communication with the front-head discharge hole 141*a* becomes considerably small, and the pressure of the refrigerant is increased. Here, the first wide surface 181*a*1 of the first end surface 181*a* of the roller 180 of the piston 131 closes the outlet opening 161*a*1 of the supply flow path 161*a* of the rear-head disk portion 161, and the intermediate-pressure refrigerant is no longer in a state of being injected to the compression chamber S1. Thereafter, due to further revolution of the piston 131, the refrigerant whose pressure has become high pushes and opens the discharge valve from the front-head discharge hole 141*a*, and is discharged to the muffler space S2. The refrigerant introduced into the muffler space S2 is discharged to a space above the muffler space S2 from the muffler discharge hole of the muffler 170. The refrigerant discharged to the outside of the muffler space S2 passes through a space between the rotor 123 and the stator 124 of the motor 121, cools the motor 121, and is then discharged from the discharge tube 125.

(5-2-5) Features of the Second Embodiment

Similarly to the air conditioning apparatus 1 according to the first embodiment, since even the air conditioning apparatus 1*b* according to the second embodiment uses a refrigerant containing 1,2-difluoroethylene, the air conditioning apparatus 1*b* can sufficiently reduce GWP.

Since the air conditioning apparatus 1*b* can reduce the temperature of an intermediate-pressure refrigerant in the compressor 21*b* by causing a refrigerant that has flowed through the intermediate injection pipe 46 to merge at the region of intermediate pressure of the compressor 21*b*, the air conditioning apparatus 1*b* can improve an operation efficiency in a refrigeration cycle.

(5-2-6) Modification A of the Second Embodiment

Although, in the second embodiment, the air conditioning apparatus 1*b* is described by using as an example an air conditioning apparatus including a plurality of indoor units that are connected in parallel, an air conditioning apparatus including one indoor unit that is connected in series may be used as the air conditioning apparatus.

(5-2-7) Modification B of the Second Embodiment

In the second embodiment, the compressor 21*b* is described by using a rotary compressor as an example.

In contrast, as the compressor that is used in the second embodiment, the compressor 21*a*, which is the scroll compressor that is described in the Modification B of the first embodiment, may be used.

(5-2-8) Modification C of the Second Embodiment

The second embodiment is described by using as an example a case in which a gas refrigerant in the high-pressure receiver 42 is caused to merge at the region of intermediate pressure of the compressor 21*b* by the intermediate injection pipe 46.

In contrast, the gas refrigerant in the high-pressure receiver 42 in the second embodiment may be caused to merge on a suction side instead of at the region of intermediate pressure of the compressor. In this case, by reducing the temperature of the refrigerant that is sucked into the compressor, it is possible to increase the operation efficiency in a refrigeration cycle.

(6) Embodiment of the Technique of Sixth Group (6-1) First Embodiment

Figure 6A:
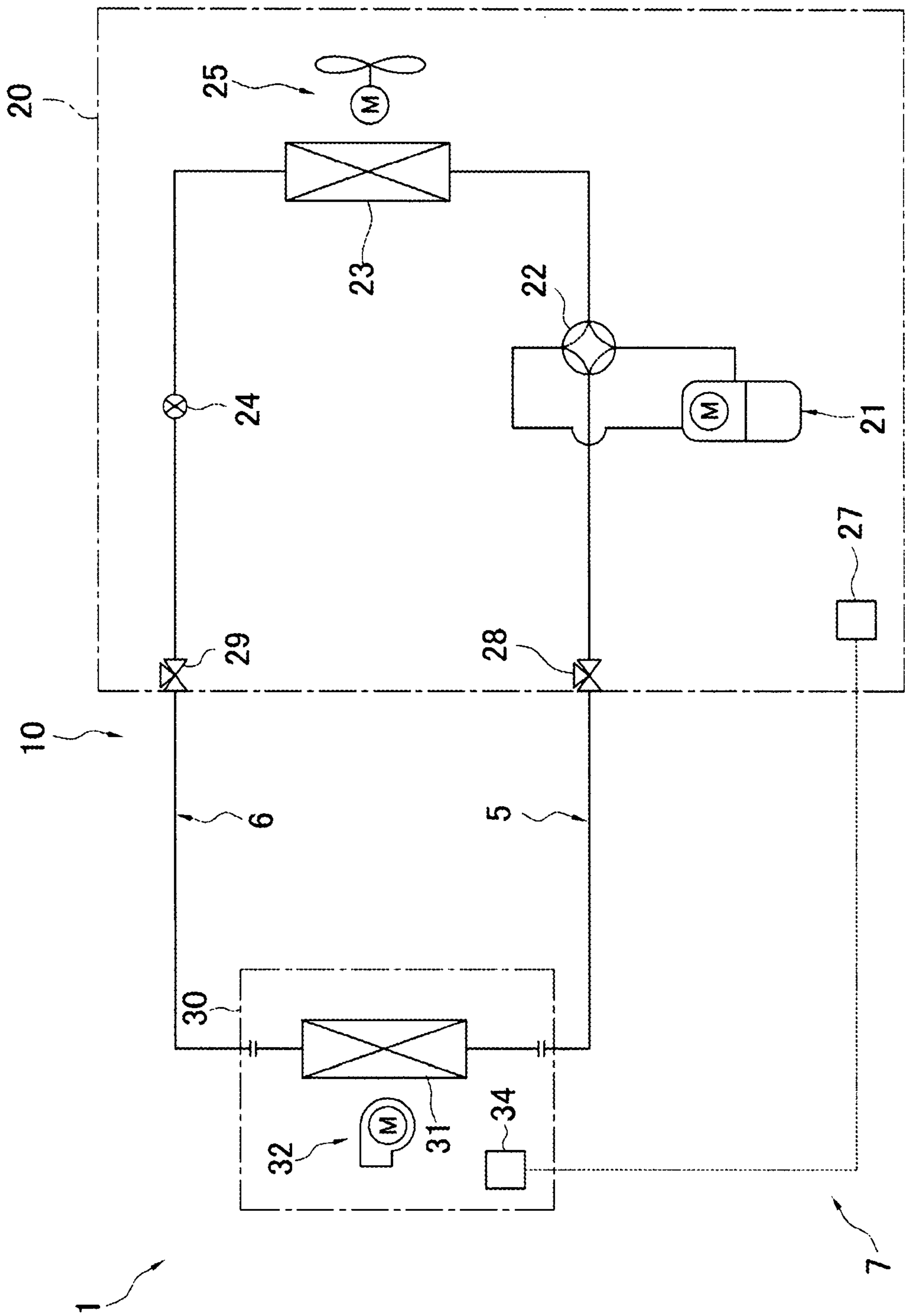
FIG. 6A is a schematic configuration diagram of a refrigerant circuit according to a first embodiment of the technique of sixth group.
Figure 6B:
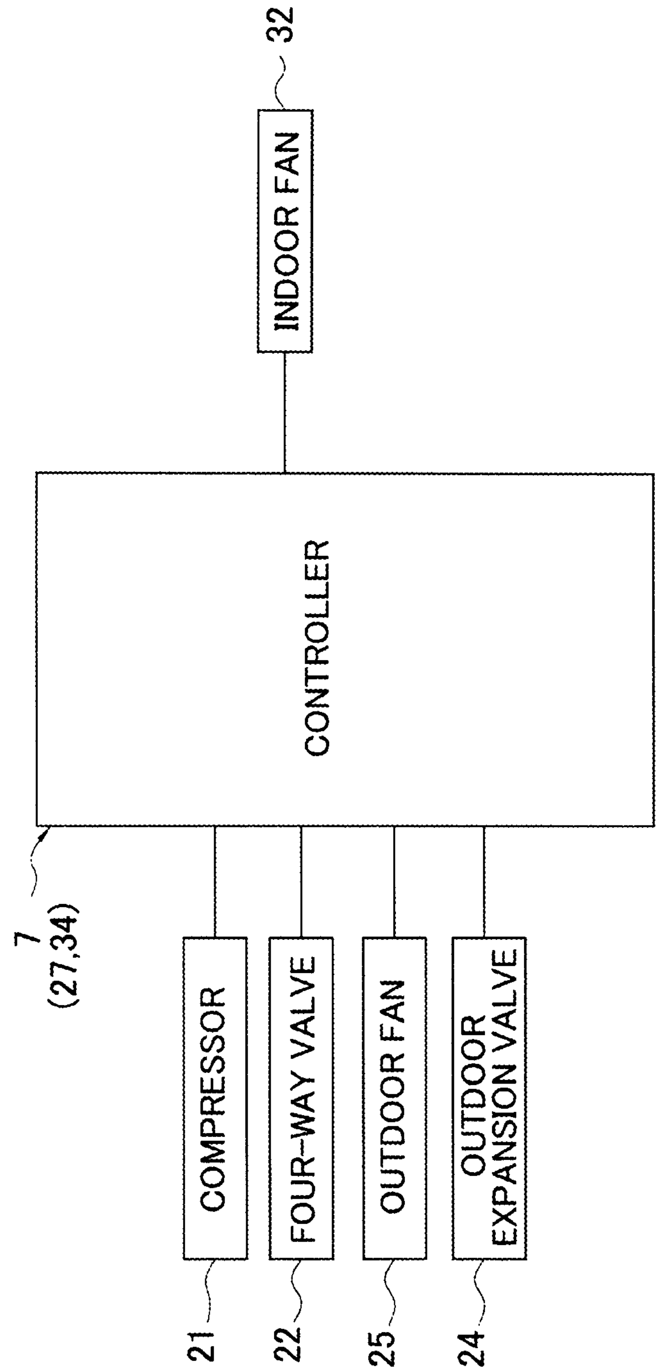
FIG. 6B is a schematic control block configuration diagram of a refrigeration cycle apparatus according to the first embodiment of the technique of sixth group.

Hereinafter, an air conditioner 1 that serves as a refrigeration cycle apparatus including an outdoor unit 20 as a heat source unit according to a first embodiment will be described with reference to FIG. 6A that is the schematic configuration diagram of a refrigerant circuit and FIG. 6B that is a schematic control block configuration diagram.

The air conditioner 1 is an apparatus that air-conditions a space to be air-conditioned by performing a vapor compression refrigeration cycle.

The air conditioner 1 mainly includes an outdoor unit 20, an indoor unit 30, a liquid-side connection pipe 6 and a gas-side connection pipe 5 connecting the outdoor unit 20 and the indoor unit 30, a remote control unit (not shown) serving as an input device and an output device, and a controller 7 that controls the operation of the air conditioner 1. The design pressure of each of the liquid-side connection pipe 6 and the gas-side connection pipe 5 may be, for example, higher than or equal to 4.5 MPa (for the one having a diameter of ⅜ inches) and lower than or equal to 5.0 MPa (for the one having a diameter of ⅘ inches).

In the air conditioner 1, the refrigeration cycle in which refrigerant sealed in a refrigerant circuit 10 is compressed, cooled or condensed, decompressed, heated or evaporated, and then compressed again is performed. In the present embodiment, the refrigerant circuit is filled with refrigerant for performing a vapor compression refrigeration cycle. The refrigerant is a refrigerant containing 1,2-difluoroethylene, and any one of the above-described refrigerants A to D may be used. The refrigerant circuit 10 is filled with refrigerating machine oil together with the refrigerant.

(6-1-1) Outdoor Unit 20

The outdoor unit 20 has substantially a rectangular parallelepiped box shape from its appearance, and has a structure in which a fan chamber and a machine chamber are formed (so-called, trunk structure) when the inside is divided by a partition plate, or the like.

The outdoor unit 20 is connected to the indoor unit 30 via the liquid-side connection pipe 6 and the gas-side connection pipe 5, and makes up part of the refrigerant circuit 10. The outdoor unit 20 mainly includes a compressor 21, a four-way valve 22, an outdoor heat exchanger 23, an outdoor expansion valve 24, an outdoor fan 25, a liquid-side stop valve 29, and a gas-side stop valve 28.

The outdoor unit 20 has a design pressure (gauge pressure) that is lower than 1.5 times the design pressure of each of the liquid-side connection pipe 6 and the gas-side connection pipe 5 (the withstanding pressure of each of the liquid-side connection pipe 6 and the gas-side connection pipe 5). The design pressure of the outdoor unit 20 may be, for example, higher than or equal to 4.0 MPa and lower than or equal to 4.5 MPa.

The compressor 21 is a device that compresses low-pressure refrigerant into high pressure in the refrigeration cycle. Here, the compressor 21 is a hermetically sealed compressor in which a positive-displacement, such as a rotary type and a scroll type, compression element (not shown) is driven for rotation by a compressor motor. The compressor motor is used to change the displacement. The operation frequency of the compressor motor is controllable with an inverter. The compressor 21 is provided with an attached accumulator (not shown) at its suction side. The outdoor unit 20 of the present embodiment does not have a refrigerant container larger than the attached accumulator (a low-pressure receiver disposed at the suction side of the compressor 21, a high-pressure receiver disposed at a liquid side of the outdoor heat exchanger 23, or the like).

The four-way valve 22 is able to switch between a cooling operation connection state and a heating operation connection state by switching the status of connection. In the cooling operation connection state, a discharge side of the compressor 21 and the outdoor heat exchanger 23 are connected, and the suction side of the compressor 21 and the gas-side stop valve 28 are connected. In the heating operation connection state, the discharge side of the compressor 21 and the gas-side stop valve 28 are connected, and the suction side of the compressor 21 and the outdoor heat exchanger 23 are connected.

The outdoor heat exchanger 23 is a heat exchanger that functions as a condenser for high-pressure refrigerant in the refrigeration cycle during cooling operation and that functions as an evaporator for low-pressure refrigerant in the refrigeration cycle during heating operation. The outdoor heat exchanger 23 includes a plurality of heat transfer fins and a plurality of heat transfer tubes fixedly extending through the heat transfer fins.

The outdoor fan 25 takes outdoor air into the outdoor unit 20, causes the air to exchange heat with refrigerant in the outdoor heat exchanger 23, and then generates air flow for emitting the air to the outside. The outdoor fan 25 is driven for rotation by an outdoor fan motor. In the present embodiment, only one outdoor fan 25 is provided.

The outdoor expansion valve 24 is able to control the valve opening degree, and is provided between a liquid-side end portion of the outdoor heat exchanger 23 and the liquid-side stop valve 29.

The liquid-side stop valve 29 is a manual valve disposed at a connection point at which the outdoor unit 20 is connected to the liquid-side connection pipe 6.

The gas-side stop valve 28 is a manual valve disposed at a connection point at which the outdoor unit 20 is connected to the gas-side connection pipe 5.

The outdoor unit 20 includes an outdoor unit control unit 27 that controls the operations of parts that makeup the outdoor unit 20. The outdoor unit control unit 27 includes a microcomputer including a CPU, a memory, and the like. The outdoor unit control unit 27 is connected to an indoor unit control unit 34 of indoor unit 30 via a communication line, and sends or receives control signals, or the like, to or from the indoor unit control unit 34. The outdoor unit control unit 27 is electrically connected to various sensors (not shown), and receives signals from the sensors.

In the outdoor unit control unit 27 (and the controller 7 including this unit), an upper limit of a controlled pressure (gauge pressure) of refrigerant is set so as to be lower than 1.5 times the design pressure of each of the liquid-side connection pipe 6 and the gas-side connection pipe 5 (the withstanding pressure of each of the liquid-side connection pipe 6 and the gas-side connection pipe 5).

(6-1-2) Indoor Unit 30

The indoor unit 30 is placed on a wall surface, or the like, in a room that is the space to be air-conditioned. The indoor unit 30 is connected to the outdoor unit 20 via the liquid-side connection pipe 6 and the gas-side connection pipe 5, and makes up part of the refrigerant circuit 10. The design pressure of the indoor unit 30, as well as the outdoor unit 20, may be, for example, higher than or equal to 4.0 MPa and lower than or equal to 4.5 MPa.

The indoor unit 30 includes an indoor heat exchanger 31, an indoor fan 32, and the like.

A liquid side of the indoor heat exchanger 31 is connected to the liquid-side connection pipe 6, and a gas side of the indoor heat exchanger 31 is connected to the gas-side connection pipe 5. The indoor heat exchanger 31 is a heat exchanger that functions as an evaporator for low-pressure refrigerant in the refrigeration cycle during cooling operation and that functions as a condenser for high-pressure refrigerant in the refrigeration cycle during heating operation. The indoor heat exchanger 31 includes a plurality of heat transfer fins and a plurality of heat transfer tubes fixedly extending through the heat transfer fins.

The indoor fan 32 takes indoor air into the indoor unit 30, causes the air to exchange heat with refrigerant in the indoor heat exchanger 31, and then generates air flow for emitting the air to the outside. The indoor fan 32 is driven for rotation by an indoor fan motor (not shown).

The indoor unit 30 includes an indoor unit control unit 34 that controls the operations of the parts that make up the indoor unit 30. The indoor unit control unit 34 includes a microcomputer including a CPU, a memory, and the like. The indoor unit control unit 34 is connected to the outdoor unit control unit 27 via a communication line, and sends or receives control signals, or the like, to or from the outdoor unit control unit 27.

The indoor unit control unit 34 is electrically connected to various sensors (not shown) provided inside the indoor unit 30, and receives signals from the sensors.

(6-1-3) Details of Controller 7

In the air conditioner 1, the outdoor unit control unit 27 and the indoor unit control unit 34 are connected via the communication line to make up the controller 7 that controls the operation of the air conditioner 1.

The controller 7 mainly includes a CPU (central processing unit) and a memory such as a ROM and a RAM. Various processes and controls made by the controller 7 are implemented by various parts included in the outdoor unit control unit 27 and/or the indoor unit control unit 34 functioning together.

(6-1-4) Operation Mode

Hereinafter, operation modes will be described.

The operation modes include a cooling operation mode and a heating operation mode.

The controller 7 determines whether the operation mode is the cooling operation mode or the heating operation mode and performs the selected operation mode based on an instruction received from the remote control unit, or the like.

(6-1-4-1) Cooling Operation Mode

In the air conditioner 1, in the cooling operation mode, the status of connection of the four-way valve 22 is set to the cooling operation connection state where the discharge side of the compressor 21 and the outdoor heat exchanger 23 are connected and the suction side of the compressor 21 and the gas-side stop valve 28 are connected, and refrigerant filled in the refrigerant circuit 10 is mainly circulated in order of the compressor 21, the outdoor heat exchanger 23, the outdoor expansion valve 24, and the indoor heat exchanger 31.

More specifically, when the cooling operation mode is started, refrigerant is taken into the compressor 21, compressed, and then discharged in the refrigerant circuit 10.

In the compressor 21, displacement control commensurate with a cooling load that is required from the indoor unit 30 is performed. Gas refrigerant discharged from the compressor 21 passes through the four-way valve 22 and flows into the gas-side end of the outdoor heat exchanger 23.

Gas refrigerant having flowed into the gas-side end of the outdoor heat exchanger 23 exchanges heat in the outdoor heat exchanger 23 with outdoor-side air that is supplied by the outdoor fan 25 to condense into liquid refrigerant and flows out from the liquid-side end of the outdoor heat exchanger 23.

Refrigerant having flowed out from the liquid-side end of the outdoor heat exchanger 23 is decompressed when passing through the outdoor expansion valve 24. The outdoor expansion valve 24 is controlled such that the degree of subcooling of refrigerant that passes through a liquid-side outlet of the outdoor heat exchanger 23 satisfies a predetermined condition.

Refrigerant decompressed in the outdoor expansion valve 24 passes through the liquid-side stop valve 29 and the liquid-side connection pipe 6 and flows into the indoor unit 30.

Refrigerant having flowed into the indoor unit 30 flows into the indoor heat exchanger 31, exchanges heat in the indoor heat exchanger 31 with indoor air that is supplied by the indoor fan 32 to evaporate into gas refrigerant, and flows out from the gas-side end of the indoor heat exchanger 31. Gas refrigerant having flowed out from the gas-side end of the indoor heat exchanger 31 flows to the gas-side connection pipe 5.

Refrigerant having flowed through the gas-side connection pipe 5 passes through the gas-side stop valve 28 and the four-way valve 22, and is taken into the compressor 21 again.

(6-1-4-2) Heating Operation Mode

In the air conditioner 1, in the heating operation mode, the status of connection of the four-way valve 22 is set to the heating operation connection state where the discharge side of the compressor 21 and the gas-side stop valve 28 are connected and the suction side of the compressor 21 and the outdoor heat exchanger 23 are connected, and refrigerant filled in the refrigerant circuit 10 is mainly circulated in order of the compressor 21, the indoor heat exchanger 31, the outdoor expansion valve 24, and the outdoor heat exchanger 23.

More specifically, when the heating operation mode is started, refrigerant is taken into the compressor 21, compressed, and then discharged in the refrigerant circuit 10.

In the compressor 21, displacement control commensurate with a heating load that is required from the indoor unit 30 is performed. Here, for example, at least anyone of the drive frequency of the compressor 21 and the volume of air of the outdoor fan 25 is controlled such that the maximum value of the pressure in the refrigerant circuit 10 is lower than 1.5 times the design pressure of the gas-side connection pipe 5. Gas refrigerant discharged from the compressor 21 flows through the four-way valve 22 and the gas-side connection pipe 5 and then flows into the indoor unit 30.

Refrigerant having flowed into the indoor unit 30 flows into the gas-side end of the indoor heat exchanger 31, exchanges heat in the indoor heat exchanger 31 with indoor air that is supplied by the indoor fan 32 to condense into refrigerant in a gas-liquid two-phase state or liquid refrigerant, and flows out from the liquid-side end of the indoor heat exchanger 31. Refrigerant having flowed out from the liquid-side end of the indoor heat exchanger 31 flows into the liquid-side connection pipe 6.

Refrigerant having flowed through the liquid-side connection pipe 6 is decompressed to a low pressure in the refrigeration cycle in the liquid-side stop valve 29 and the outdoor expansion valve 24. The outdoor expansion valve 24 is controlled such that the degree of subcooling of refrigerant that passes through a liquid-side outlet of the indoor heat exchanger 31 satisfies a predetermined condition. Refrigerant decompressed in the outdoor expansion valve 24 flows into the liquid-side end of the outdoor heat exchanger 23.

Refrigerant having flowed in from the liquid-side end of the outdoor heat exchanger 23 exchanges heat in the outdoor heat exchanger 23 with outdoor air that is supplied by the outdoor fan 25 to evaporate into gas refrigerant, and flows out from the gas-side end of the outdoor heat exchanger 23.

Refrigerant having flowed out from the gas-side end of the outdoor heat exchanger 23 passes through the four-way valve 22 and is taken into the compressor 21 again.

(6-1-5) Characteristics of First Embodiment

In the above-described air conditioner 1, since refrigerant containing 1,2-difluoroethylene is used, a GWP can be sufficiently reduced.

The air conditioner 1 uses the outdoor unit 20 of which the design pressure is lower than 1.5 times the design pressure of each of the liquid-side connection pipe 6 and the gas-side connection pipe 5. In the outdoor unit control unit 27 of the outdoor unit 20 of the air conditioner 1, the upper limit of the controlled pressure of the refrigerant is set so as to be lower than 1.5 times the design pressure of each of the liquid-side connection pipe 6 and the gas-side connection pipe 5. Therefore, even when the above-described specific refrigerants A to Dare used, damage to the liquid-side connection pipe 6 or the gas-side connection pipe 5 can be reduced.

(6-1-6) Modification A of First Embodiment

In the above-described first embodiment, the air conditioner including only one indoor unit is described as an example; however, the air conditioner may include a plurality of indoor units (with no indoor expansion valve) connected in parallel with each other.

(6-1-7) Modification B of First Embodiment

In the above-described first embodiment, the case where the design pressure of the outdoor unit 20 is lower than 1.5 times the design pressure of each of the liquid-side connection pipe 6 and the gas-side connection pipe 5 and the outdoor unit control unit 27 of the outdoor unit 20 is set such that the upper limit of the controlled pressure of the refrigerant is lower than 1.5 times the design pressure of each of the liquid-side connection pipe 6 and the gas-side connection pipe 5 is described as an example.

In contrast to this, for example, even when the outdoor unit 20 has a design pressure higher than or equal to 1.5 times the design pressure of each of the liquid-side connection pipe 6 and the gas-side connection pipe 5 but the outdoor unit 20 includes the outdoor unit control unit 27 that is configured to be able to select the upper limit of the controlled pressure of the refrigerant from among multiple types and that is able to set the upper limit of the controlled pressure of the refrigerant such that the upper limit is lower than 1.5 times the design pressure of each of the liquid-side connection pipe 6 and the gas-side connection pipe 5, the outdoor unit 20 can be used in the air conditioner 1 of the above-described embodiment.

(6-2) Second Embodiment

Figure 6C:
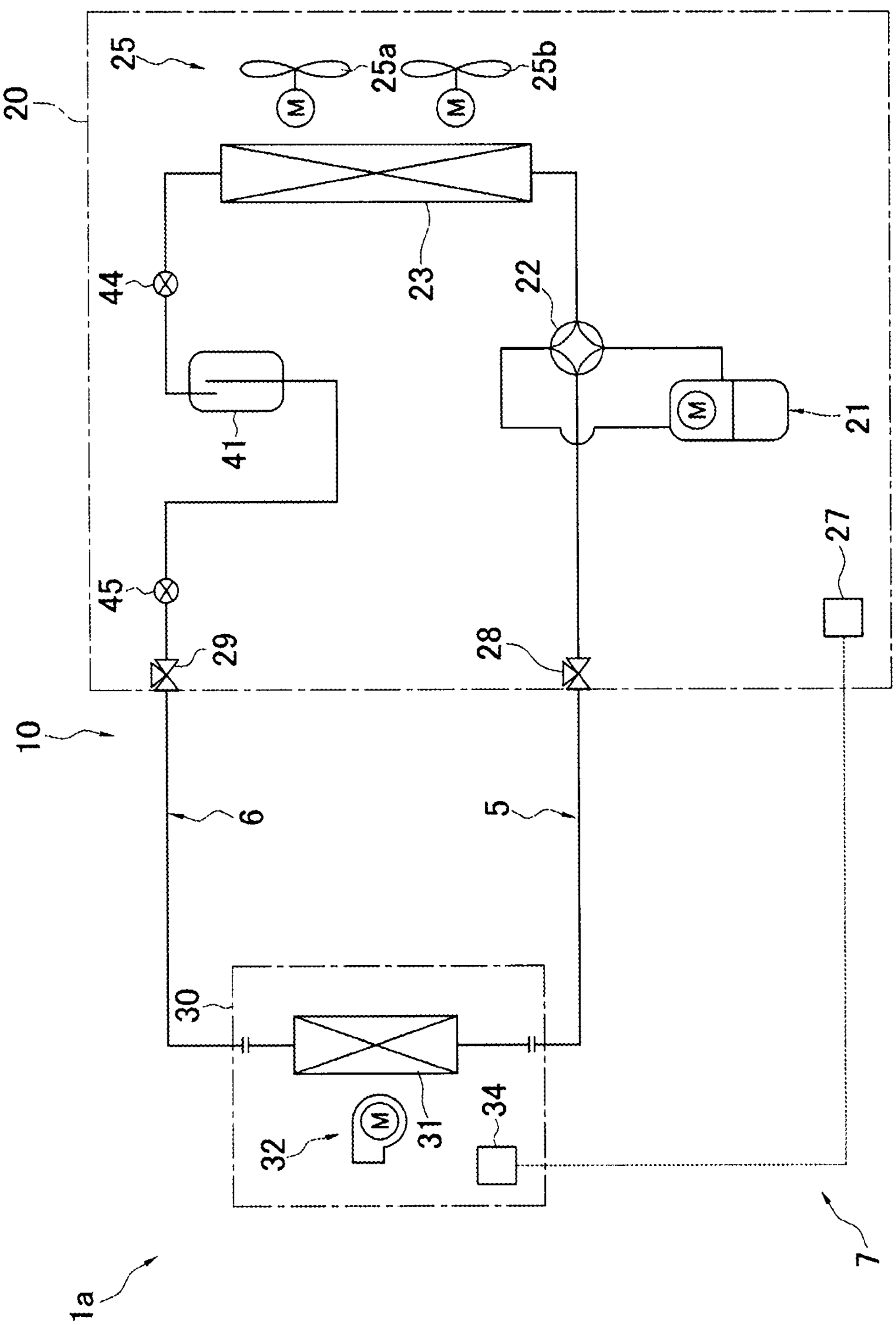
FIG. 6C is a schematic configuration diagram of a refrigerant circuit according to a second embodiment of the technique of sixth group.
Figure 6D:
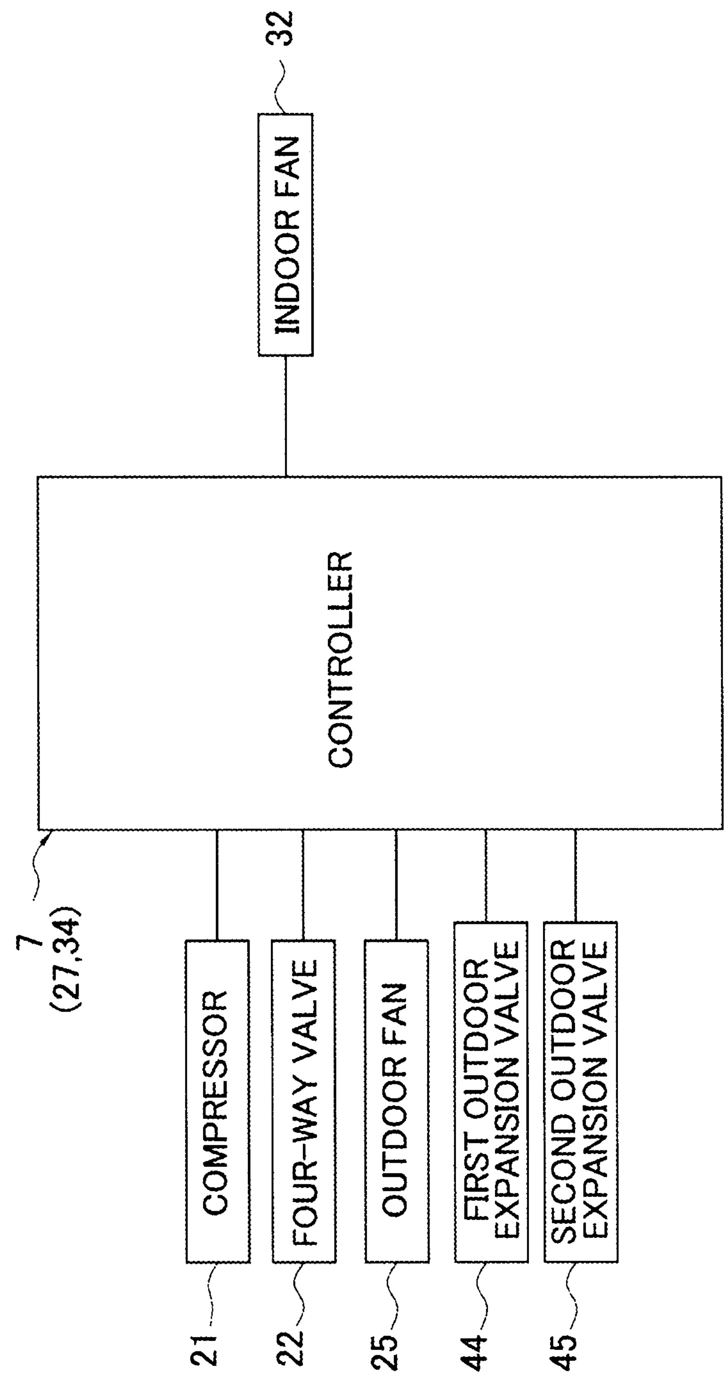
FIG. 6D is a schematic control block configuration diagram of a refrigeration cycle apparatus according to the second embodiment of the technique of sixth group.

Hereinafter, an air conditioner 1*a* that serves as a refrigeration cycle apparatus including the outdoor unit 20 as a heat source unit according to a second embodiment will be described with reference to FIG. 6C that is the schematic configuration diagram of a refrigerant circuit and FIG. 6D that is a schematic control block configuration diagram.

Hereinafter, mainly, the air conditioner 1*a* of the second embodiment will be described with a focus on a portion different from the air conditioner 1 of the first embodiment.

In the air conditioner 1*a* as well, the refrigerant circuit 10 is filled with a refrigerant mixture that contains 1,2-difluoroethylene and that is any one of the above-described refrigerants A to D as a refrigerant for performing a vapor compression refrigeration cycle. The refrigerant circuit 10 is filled with refrigerating machine oil together with the refrigerant.

(6-2-1) Outdoor Unit 20

In the outdoor unit 20 of the air conditioner 1*a* of the second embodiment, a first outdoor fan 25*a* and a second outdoor fan 25*b* are provided as the outdoor fans 25. The outdoor heat exchanger 23 of the outdoor unit 20 of the air conditioner 1*a* has a wide heat exchange area so as to adapt to air flow coming from the first outdoor fan 25*a* and the second outdoor fan 25*b*. The outdoor unit 20, as in the case of the above-described first embodiment, has a design pressure (gauge pressure) that is lower than 1.5 times the design pressure of each of the liquid-side connection pipe 6 and the gas-side connection pipe 5 (the withstanding pressure of each of the liquid-side connection pipe 6 and the gas-side connection pipe 5). The design pressure of the outdoor unit 20 may be, for example, higher than or equal to 4.0 MPa and lower than or equal to 4.5 MPa.

In the outdoor unit 20 of the air conditioner 1*a*, instead of the outdoor expansion valve 24 of the outdoor unit 20 in the above-described first embodiment, a first outdoor expansion valve 44, an intermediate pressure receiver 41, and a second outdoor expansion valve 45 are sequentially provided between the liquid side of the outdoor heat exchanger 23 and the liquid-side stop valve 29. The first outdoor expansion valve 44 and the second outdoor expansion valve 45 each are able to control the valve opening degree. The intermediate pressure receiver 41 is a container that is able to store refrigerant. Both an end portion of a pipe extending from the first outdoor expansion valve 44 side and an end portion of a pipe extending from the second outdoor expansion valve 45 side are located in the internal space of the intermediate pressure receiver 41. The internal volume of the intermediate pressure receiver 41 is greater than the internal volume of the attached accumulator attached to the compressor 21 and is preferably greater than or equal to twice.

The outdoor unit 20 of the second embodiment has substantially a rectangular parallelepiped shape and has a structure in which a fan chamber and a machine chamber are formed (so-called, trunk structure) when divided by a partition plate, or the like, extending vertically.

The outdoor heat exchanger 23 includes, for example, a plurality of heat transfer fins and a plurality of heat transfer tubes fixedly extending through the heat transfer fins. The outdoor heat exchanger 23 is disposed in an L-shape in plan view.

For the outdoor unit 20 of the second embodiment as well, in the outdoor unit control unit 27 (and the controller 7 including this unit), the upper limit of the controlled pressure (gauge pressure) of the refrigerant is set so as to be lower than 1.5 times the design pressure of each of the liquid-side connection pipe 6 and the gas-side connection pipe 5 (the withstanding pressure of each of the liquid-side connection pipe 6 and the gas-side connection pipe 5).

In the above air conditioner 1*a*, in the cooling operation mode, the first outdoor expansion valve 44 is, for example, controlled such that the degree of subcooling of refrigerant that passes through the liquid-side outlet of the outdoor heat exchanger 23 satisfies a predetermined condition. In the cooling operation mode, the second outdoor expansion valve is, for example, controlled such that the degree of superheating of refrigerant that the compressor 21 takes in satisfies a predetermined condition. In the heating operation mode, for example, at least any one of the drive frequency of the compressor 21 and the volume of air of the outdoor fan 25 is controlled such that the maximum value of the pressure in the refrigerant circuit 10 is lower than 1.5 times the design pressure of the gas-side connection pipe 5.

(6-2-2) Indoor Unit 30

The indoor unit 30 of the second embodiment is placed so as to be suspended in an upper space in a room that is a space to be air-conditioned or placed at a ceiling surface or placed on a wall surface and used. The indoor unit 30 is connected to the outdoor unit 20 via the liquid-side connection pipe 6 and the gas-side connection pipe 5, and makes up part of the refrigerant circuit 10. The design pressure of the indoor unit 30, as well as the outdoor unit 20, may be, for example, higher than or equal to 4.0 MPa and lower than or equal to 4.5 MPa.

The indoor unit 30 includes the indoor heat exchanger 31, the indoor fan 32, and the like.

The indoor heat exchanger 31 of the second embodiment includes a plurality of heat transfer fins and a plurality of heat transfer tubes fixedly extending through the heat transfer fins.

(6-2-3) Characteristics of Second Embodiment

In the above-described air conditioner 1*a* according to the second embodiment as well, as well as the air conditioner 1 according to the first embodiment, since refrigerant containing 1,2-difluoroethylene is used, a GWP can be sufficiently reduced.

The air conditioner 1*a* uses the outdoor unit 20 of which the design pressure is lower than 1.5 times the design pressure of each of the liquid-side connection pipe 6 and the gas-side connection pipe 5. In the outdoor unit control unit 27 of the outdoor unit 20 of the air conditioner 1*a*, the upper limit of the controlled pressure of the refrigerant is set so as to be lower than 1.5 times the design pressure of each of the liquid-side connection pipe 6 and the gas-side connection pipe 5. Therefore, even when the above-described specific refrigerants A to D are used, damage to the liquid-side connection pipe 6 or the gas-side connection pipe 5 can be reduced.

(6-2-4) Modification A of Second Embodiment

In the above-described second embodiment, the air conditioner including only one indoor unit is described as an example; however, the air conditioner may include a plurality of indoor units (with no indoor expansion valve) connected in parallel with each other.

(6-2-5) Modification B of Second Embodiment

In the above-described second embodiment, the case where the design pressure of the outdoor unit 20 is lower than 1.5 times the design pressure of each of the liquid-side connection pipe 6 and the gas-side connection pipe 5 and the outdoor unit control unit 27 of the outdoor unit 20 is set such that the upper limit of the controlled pressure of the refrigerant is lower than 1.5 times the design pressure of each of the liquid-side connection pipe 6 and the gas-side connection pipe 5 is described as an example.

In contrast to this, for example, even when the outdoor unit 20 has a design pressure higher than or equal to 1.5 times the design pressure of each of the liquid-side connection pipe 6 and the gas-side connection pipe 5 but the outdoor unit 20 includes the outdoor unit control unit 27 that is configured to be able to select the upper limit of the controlled pressure of the refrigerant from among multiple types and that is able to set the upper limit of the controlled pressure of the refrigerant such that the upper limit is lower than 1.5 times the design pressure of each of the liquid-side connection pipe 6 and the gas-side connection pipe 5, the outdoor unit 20 can be used in the air conditioner 1*a* of the above-described embodiment.

(6-3) Third Embodiment

Figure 6E:
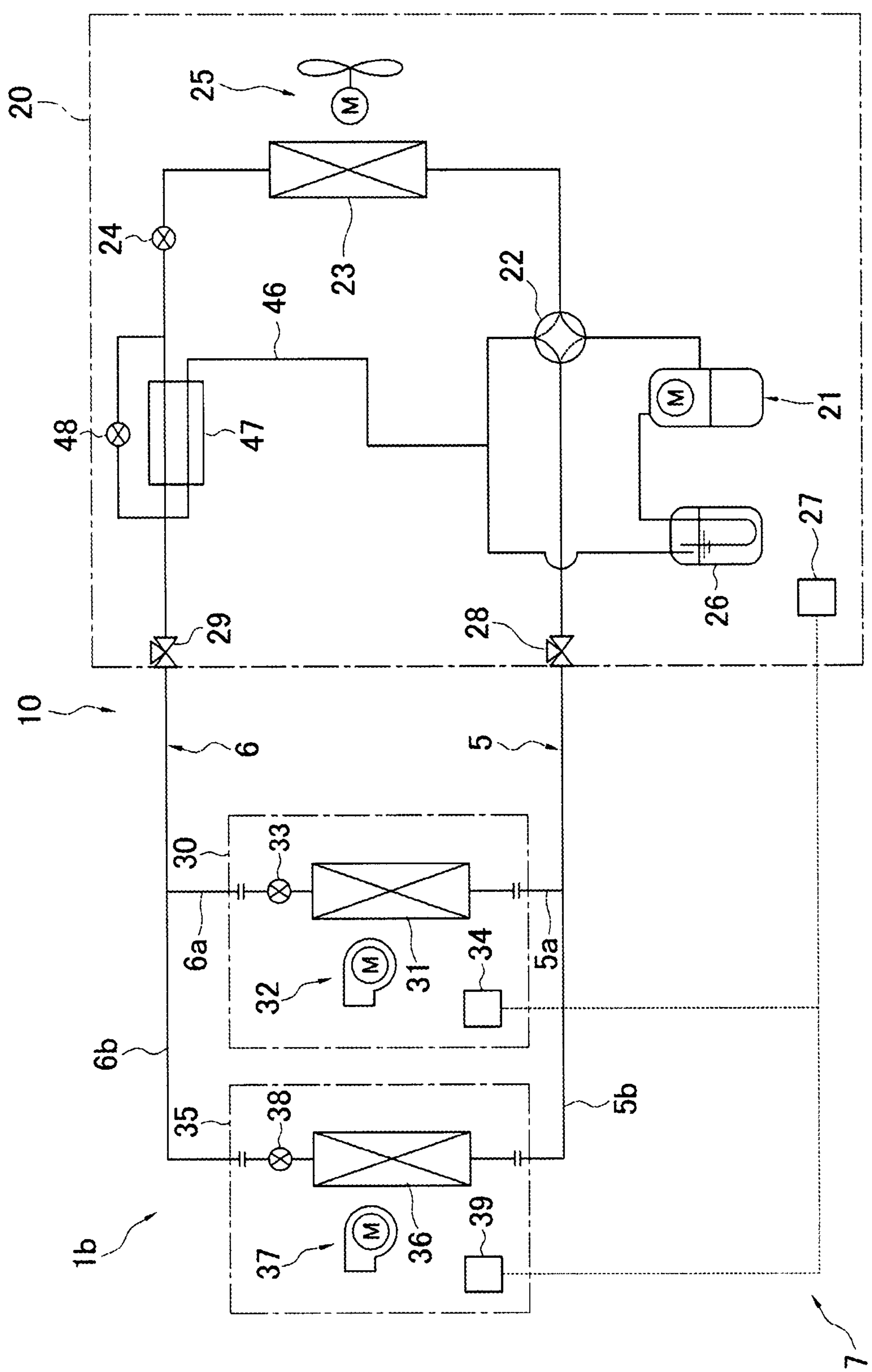
FIG. 6E is a schematic configuration diagram of a refrigerant circuit according to a third embodiment of the technique of sixth group.
Figure 6F:
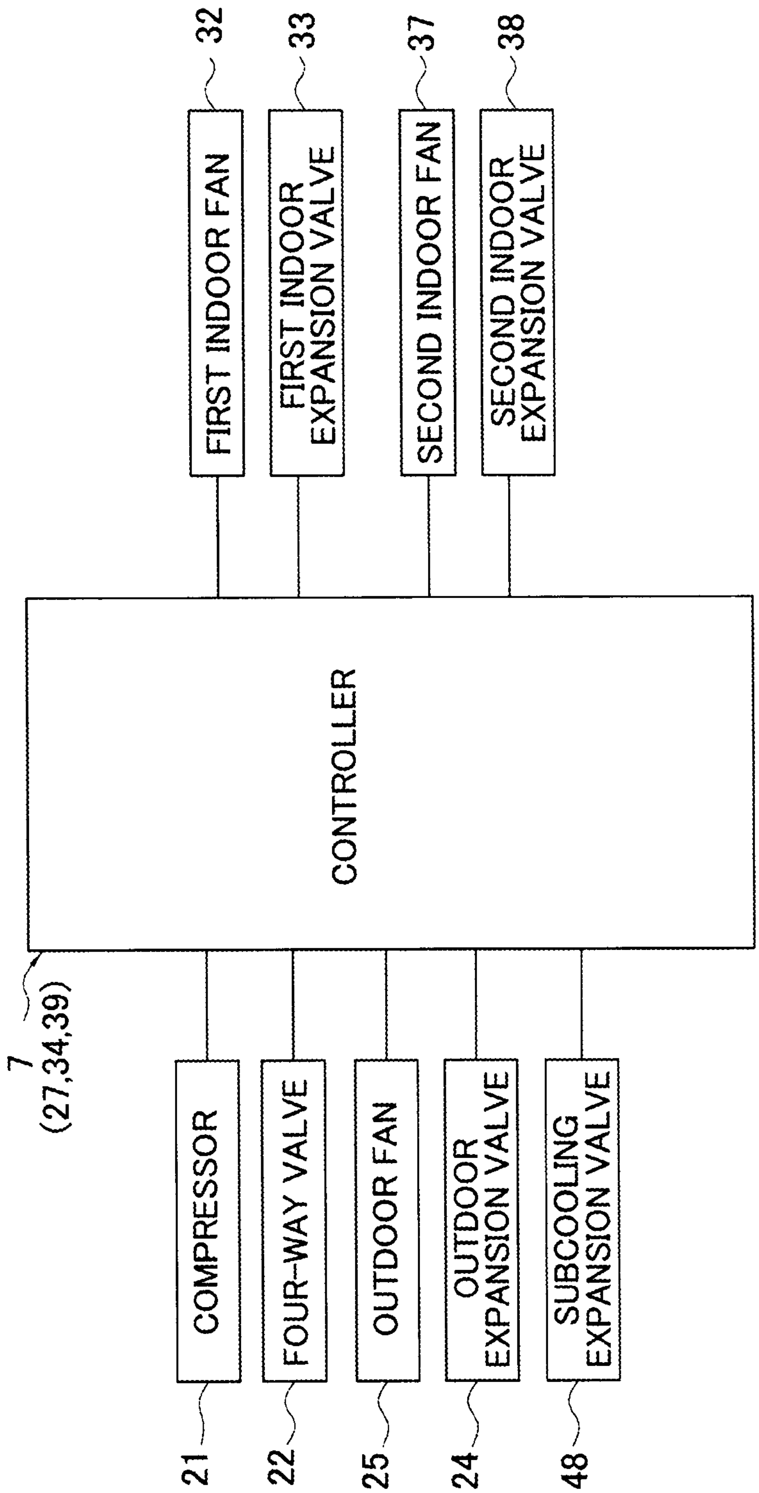
FIG. 6F is a schematic control block configuration diagram of a refrigeration cycle apparatus according to the third embodiment of the technique of sixth group.

Hereinafter, an air conditioner 1*b* that serves as a refrigeration cycle apparatus including the outdoor unit 20 as a heat source unit according to a third embodiment will be described with reference to FIG. 6E that is the schematic configuration diagram of a refrigerant circuit and FIG. 6F that is a schematic control block configuration diagram.

Hereinafter, mainly, the air conditioner 1*b* of the third embodiment will be described with a focus on a portion different from the air conditioner 1 of the first embodiment.

In the air conditioner 1*b* as well, the refrigerant circuit 10 is filled with a refrigerant that contains 1,2-difluoroethylene and that is any one of the above-described refrigerants A to D as a refrigerant for performing a vapor compression refrigeration cycle. The refrigerant circuit 10 is filled with refrigerating machine oil together with the refrigerant.

(6-3-1) Outdoor Unit 20

In the outdoor unit 20 of the air conditioner 1*b* of the third embodiment, a low-pressure receiver 26, a subcooling heat exchanger 47, and a subcooling circuit 46 are provided in the outdoor unit 20 in the above-described first embodiment. Preferably, the outdoor unit 20, as in the case of the above-described first embodiment, has a design pressure (gauge pressure) that is lower than 1.5 times the design pressure of each of the liquid-side connection pipe 6 and the gas-side connection pipe 5 (the withstanding pressure of each of the liquid-side connection pipe 6 and the gas-side connection pipe 5) and that is lower than the design pressure of each of branch pipes 5*a*, 5*b*, 6*a*, 6*b* (described later) in the air conditioner 1*b* of the present embodiment, including a plurality of indoor units 30, 35. The design pressure of the outdoor unit 20 may be, for example, higher than or equal to 4.0 MPa and lower than or equal to 4.5 MPa.

The low-pressure receiver 26 is a container that is provided between one of connection ports of the four-way valve 22 and the suction side of the compressor 21 and that is able to store refrigerant. In the present embodiment, the low-pressure receiver 26 is provided separately from the attached accumulator of the compressor 21. The internal volume of the low-pressure receiver 26 is greater than the internal volume of the attached accumulator attached to the compressor 21 and is preferably greater than or equal to twice.

The subcooling heat exchanger 47 is provided between the outdoor expansion valve 24 and the liquid-side stop valve 29.

The subcooling circuit 46 is a circuit that branches off from a main circuit between the outdoor expansion valve 24 and the subcooling heat exchanger 47 and that merges with a portion halfway from one of the connection ports of the four-way valve 22 to the low-pressure receiver 26. A subcooling expansion valve 48 that decompresses refrigerant passing therethrough is provided halfway in the subcooling circuit 46. Refrigerant flowing through the subcooling circuit 46 and decompressed by the subcooling expansion valve 48 exchanges heat with refrigerant flowing through the main circuit side in the subcooling heat exchanger 47. Thus, refrigerant flowing through the main circuit side is further cooled, and refrigerant flowing through the subcooling circuit 46 evaporates.

The outdoor unit 20 of the air conditioner 1*b* according to the third embodiment may have, for example, a so-called up-blow structure that takes in air from the lower side and discharges air outward from the upper side.

Preferably, for the outdoor unit 20 of the third embodiment as well, in the outdoor unit control unit 27 (and the controller 7 including this unit), the upper limit of the controlled pressure (gauge pressure) of the refrigerant is set so as to be lower than 1.5 times the design pressure of each of the liquid-side connection pipe 6 and the gas-side connection pipe 5 (the withstanding pressure of each of the liquid-side connection pipe 6 and the gas-side connection pipe 5) and is set so as to be lower than the design pressure of each of the branch pipes 5*a*, 5*b*, 6*a*, 6*b* (described later) in the air conditioner 1*b* of the present embodiment, including the plurality of indoor units 30, 35.

(6-3-2) First Indoor Unit 30 and Second Indoor Unit 35

In the air conditioner 1*b* according to the third embodiment, instead of the indoor unit in the above-described first embodiment, a first indoor unit 30 and a second indoor unit 35 are provided in parallel with each other. The design pressures of the first indoor unit 30 and second indoor unit 35, as well as the outdoor unit 20, each may be, for example, higher than or equal to 4.0 MPa and lower than or equal to 4.5 MPa.

The first indoor unit 30, as well as the indoor unit 30 in the above-described first embodiment, includes a first indoor heat exchanger 31, a first indoor fan 32, and a first indoor unit control unit 34, and further includes a first indoor expansion valve 33 at the liquid side of the first indoor heat exchanger 31. The first indoor expansion valve 33 is able to control the valve opening degree. The liquid side of the first indoor unit 30 is connected to the first liquid-side branch pipe 6*a* that branches and extends from an indoor unit-side end portion of the liquid-side connection pipe 6, and the gas side of the first indoor unit 30 is connected to the first gas-side branch pipe 5*a* that branches and extends from an indoor unit-side end portion of the gas-side connection pipe 5.

The second indoor unit 35, as well as the first indoor unit 30, includes a second indoor heat exchanger 36, a second indoor fan 37, a second indoor unit control unit 39, and a second indoor expansion valve 38 provided at the liquid side of the second indoor heat exchanger 36. The second indoor expansion valve 38 is able to control the valve opening degree. The liquid side of the second indoor unit 35 is connected to the second liquid-side branch pipe 6*b* that branches and extends from the indoor unit-side end portion of the liquid-side connection pipe 6, and the gas side of the second indoor unit 35 is connected to the second gas-side branch pipe 5*b* that branches and extends from the indoor unit-side end portion of the gas-side connection pipe 5.

The design pressures of the first liquid-side branch pipe 6*a*, second liquid-side branch pipe 6*b*, first gas-side branch pipe 5*a*, and second gas-side branch pipe 5*b* each may be set to, for example, 4.5 MPa.

The specific structures of the first indoor unit 30 and second indoor unit 35 of the air conditioner 1*b* according to the third embodiment each have a similar configuration to the indoor unit 30 of the second embodiment except the above-described first indoor expansion valve 33 and second indoor expansion valve 38.

The controller 7 of the third embodiment is made up of the outdoor unit control unit 27, the first indoor unit control unit 34, and the second indoor unit control unit 39 communicably connected to one another.

In the above air conditioner 1*b*, in the cooling operation mode, the outdoor expansion valve 24 is controlled such that the degree of subcooling of refrigerant that passes through the liquid-side outlet of the outdoor heat exchanger 23 satisfies a predetermined condition. In the cooling operation mode, the subcooling expansion valve 48 is controlled such that the degree of superheating of refrigerant that the compressor 21 takes in satisfies a predetermined condition. In the cooling operation mode, the first indoor expansion valve 33 and the second indoor expansion valve 38 are controlled to a fully open state.

In the heating operation mode, the first indoor expansion valve 33 is controlled such that the degree of subcooling of refrigerant that passes through the liquid-side outlet of the first indoor heat exchanger 31 satisfies a predetermined condition. Similarly, the second indoor expansion valve 38 is also controlled such that the degree of subcooling of refrigerant that passes through the liquid-side outlet of the second indoor heat exchanger 36 satisfies a predetermined condition. In the heating operation mode, the outdoor expansion valve 45 is controlled such that the degree of superheating of refrigerant that the compressor 21 takes in satisfies a predetermined condition. In the heating operation mode, the subcooling expansion valve 48 is controlled such that the degree of superheating of refrigerant that the compressor 21 takes in satisfies a predetermined condition. In the heating operation mode, for example, at least any one of the drive frequency of the compressor 21 and the volume of air of the outdoor fan 25 is controlled such that the maximum value of the pressure in the refrigerant circuit 10 is lower than 1.5 times the design pressure of the gas-side connection pipe 5. Preferably, at least any one of the drive frequency of the compressor 21 and the volume of air of the outdoor fan 25 is controlled such that the maximum value of the pressure in the refrigerant circuit 10 is lower than the design pressure of each of the first gas-side branch pipe 5*a* and the second gas-side branch pipe 5*b*.

(6-3-3) Characteristics of Third Embodiment

In the above-described air conditioner 1*b* according to the third embodiment as well, as well as the air conditioner 1 according to the first embodiment, since refrigerant containing 1,2-difluoroethylene is used, a GWP can be sufficiently reduced.

The air conditioner 1*b* uses the outdoor unit 20 of which the design pressure is lower than 1.5 times the design pressure of each of the liquid-side connection pipe 6 and the gas-side connection pipe 5. In the outdoor unit control unit 27 of the outdoor unit 20 of the air conditioner 1*b*, the upper limit of the controlled pressure of the refrigerant is set so as to be lower than 1.5 times the design pressure of each of the liquid-side connection pipe 6 and the gas-side connection pipe 5. Therefore, even when the above-described specific refrigerants A to D are used, damage to the liquid-side connection pipe 6 or the gas-side connection pipe 5 can be reduced.

(6-3-4) Modification A of Third Embodiment

In the above-described third embodiment, the case where the design pressure of the outdoor unit 20 is lower than 1.5 times the design pressure of each of the liquid-side connection pipe 6 and the gas-side connection pipe 5 and the outdoor unit control unit 27 of the outdoor unit 20 is set such that the upper limit of the controlled pressure of the refrigerant is lower than 1.5 times the design pressure of each of the liquid-side connection pipe 6 and the gas-side connection pipe 5 is described as an example.

In contrast to this, for example, even when the outdoor unit 20 has a design pressure higher than or equal to 1.5 times the design pressure of each of the liquid-side connection pipe 6 and the gas-side connection pipe 5 but the outdoor unit 20 includes the outdoor unit control unit 27 that is configured to be able to select the upper limit of the controlled pressure of the refrigerant from among multiple types and that is able to set the upper limit of the controlled pressure of the refrigerant such that the upper limit is lower than 1.5 times the design pressure of each of the liquid-side connection pipe 6 and the gas-side connection pipe 5, the outdoor unit 20 can be used in the air conditioner 1*b* of the above-described embodiment.

(6-4) Fourth Embodiment

In the above-described first to third embodiments and their modifications, the new outdoor unit 20 and air conditioners 1, 1*a*, 1*b* in which any one of the above-described refrigerants A to D is used are described as examples.

In contrast to this, an air conditioner according to a fourth embodiment, as will be described below, is an air conditioner modified from an air conditioner in which another refrigerant is used by replacing the refrigerant to be used with any one of the above-described refrigerants A to D while the liquid-side connection pipe 6 and the gas-side connection pipe 5 are reused.

(6-4-1) Modified Air Conditioner from R22

The air conditioners 1, 1*a*, 1*b* in the above-described first to third embodiments and their modifications may be the air conditioners 1, 1*a*, 1*b* having used R22 and modified so as to use any one of the refrigerants A to D containing 1,2-difluoroethylene.

Here, the design pressure of each of the liquid-side connection pipe 6 and the gas-side connection pipe 5 in an air conditioner in which refrigerant R22 (refrigerant having a lower design pressure than any one of the above-described refrigerants A to D) has been used is determined based on the outer diameter and thickness of pipes and the material of copper pipes from which the pipes are made. Of copper pipes that are generally used for such the liquid-side connection pipe 6 and the gas-side connection pipe 5, a combination of the outer diameter, thickness, and material of the pipe, of which the design pressure is the lowest, is a combination of ϕ19.05, 1.0 mm in thickness, and O-material from Copper Pipes for General Refrigerant Piping (JIS B 8607), and the design pressure is 3.72 MPa (gauge pressure).

For this reason, in the outdoor unit 20 of each of the air conditioners 1, 1*a*, 1*b* modified so as to use any one of the above-described refrigerants A to D, the heat transfer area of the outdoor heat exchanger 23 and the volume of air in the outdoor heat exchanger 23 (the amount of air that is sent by the outdoor fan 25) are set such that the upper limit of the controlled pressure of the refrigerant is lower than or equal to 3.7 MPa (gauge pressure). Alternatively, in the outdoor unit control unit 27 of the outdoor unit 20 of each of the air conditioners 1, 1*a*, 1*b* modified so as to use any one of the above-described refrigerants A to D, the upper limit of the controlled pressure of the refrigerant is set so as to be lower than or equal to 3.7 MPa (gauge pressure). Thus, the outdoor unit control unit 27 adjusts the amount of circulating refrigerant by controlling the operating frequency of the compressor 21 and adjusts the volume of air of the outdoor fan 25 in the outdoor heat exchanger 23.

As described above, the liquid-side connection pipe 6 and gas-side connection pipe 5 that have been used in an air conditioner (old machine) in which refrigerant R22 has been used can be reused when the air conditioners (new machines) 1, 1*a*, 1*b* modified so as to use any one of the above-described refrigerants A to D are introduced, and, in that case, damage to the liquid-side connection pipe 6 or the gas-side connection pipe 5 can be reduced.

In this case, preferably, the design pressure of the outdoor unit 20 of each of the air conditioners 1, 1*a*, 1*b* modified so as to use any one of the refrigerants A to D is equivalent to the design pressure of an outdoor unit in an air conditioner in which R22 has been used, and is specifically higher than or equal to 3.0 MPa and lower than or equal to 3.7 MPa. An outdoor unit and indoor unit of the air conditioner in which R22 has been used may be reused or may be replaced with new ones.

When a new one is used for the outdoor unit 20, the new one has a design pressure or an upper limit of a controlled pressure of the refrigerant, which is equivalent to the design pressure of the outdoor unit of the air conditioner in which R22 has been used or an upper limit of a controlled pressure of the refrigerant. For example, in the case where the design pressure of the outdoor unit of the air conditioner in which R22 has been used or the upper limit of the controlled pressure of the refrigerant is 3.0 MPa, even when the new outdoor unit 20 has a design pressure equivalent to 3.0 MPa or a further higher design pressure (the one that has a design pressure higher than or equal to 4.0 MPa and lower than or equal to 4.5 MPa and that can be connected to the liquid-side connection pipe 6 and the gas-side connection pipe 5 that are used for any one of the refrigerants A to D), the upper limit of the controlled pressure of the refrigerant is preferably set so as to be equivalent to 3.0 MPa.

For the air conditioner in which the plurality of indoor units 30, 35 is connected via the branch pipes such as the first liquid-side branch pipe 6*a*, the second liquid-side branch pipe 6*b*, the first gas-side branch pipe 5*a*, and the second gas-side branch pipe 5*b* as described in the third embodiment, the design pressure of each of these branch pipes when R22 is used as a refrigerant is set to 3.4 MPa that is further lower than 3.7 MPa. Therefore, for the air conditioner 1*b* that includes the plurality of indoor units 30, 35 and in which a refrigerant to be used is replaced from R22 to any one of the above-described refrigerants A to D, preferably, the outdoor unit 20 having a design pressure lower than or equal to 3.4 MPa is used or the upper limit of the controlled pressure of the refrigerant is set by the outdoor unit control unit 27 of the outdoor unit 20 so as to be lower than or equal to 3.4 MPa in order for the pressure of refrigerant flowing through the branch pipes not to exceed 3.4 MPa.

(6-4-2) Modified Air Conditioner from R407C

The air conditioners 1, 1*a*, 1*b* in the above-described first to third embodiments and their modifications may be the air conditioners 1, 1*a*, 1*b* having used R407C and modified so as to use any one of the refrigerants A to D containing 1,2-difluoroethylene.

Here, the design pressure of each of the liquid-side connection pipe 6 and the gas-side connection pipe 5 in an air conditioner in which refrigerant R407C (refrigerant having a lower design pressure than any one of the above-described refrigerants A to D) has been used is similar to the case where R22 has been used, and the design pressure of pipes having the lowest design pressure for the liquid-side connection pipe 6 and the gas-side connection pipe 5 is 3.72 MPa (gauge pressure).

For this reason, in the outdoor unit 20 of each of the air conditioners 1, 1*a*, 1*b* modified so as to use any one of the above-described refrigerants A to D, as in the case of the modification from R22, the heat transfer area of the outdoor heat exchanger 23 and the volume of air in the outdoor heat exchanger 23 (the amount of air that is sent by the outdoor fan 25) are set such that the upper limit of the controlled pressure of the refrigerant is lower than or equal to 3.7 MPa (gauge pressure). Alternatively, in the outdoor unit control unit 27 of the outdoor unit of each of the air conditioners 1, 1*a*, 1*b* modified so as to use any one of the above-described refrigerants A to D, the upper limit of the controlled pressure of the refrigerant is set so as to be lower than or equal to 3.7 MPa (gauge pressure). Thus, the outdoor unit control unit 27 adjusts the amount of circulating refrigerant by controlling the operating frequency of the compressor 21 and adjusts the volume of air of the outdoor fan 25 in the outdoor heat exchanger 23.

As described above, the liquid-side connection pipe 6 and gas-side connection pipe 5 that have been used in an air conditioner (old machine) in which refrigerant R407C has been used can be reused when the air conditioners (new machines) 1, 1*a*, 1*b* modified so as to use any one of the above-described refrigerants A to D are introduced, and, in that case, damage to the liquid-side connection pipe 6 or the gas-side connection pipe 5 can be reduced.

In this case, preferably, the design pressure of the outdoor unit 20 of each of the air conditioners 1, 1*a*, 1*b* modified so as to use any one of the refrigerants A to D is equivalent to the design pressure of an outdoor unit in an air conditioner in which R407C has been used, and is specifically higher than or equal to 3.0 MPa and lower than or equal to 3.7 MPa. An outdoor unit and indoor unit of the air conditioner in which R407C has been used may be reused or may be replaced with new ones.

When a new one is used for the outdoor unit 20, the new one has a design pressure or an upper limit of a controlled pressure of the refrigerant, which is equivalent to the design pressure of the outdoor unit of the air conditioner in which R407C has been used or an upper limit of a controlled pressure of the refrigerant. For example, in the case where the design pressure of the outdoor unit of the air conditioner in which R407C has been used or the upper limit of the controlled pressure of the refrigerant is 3.0 MPa, even when the new outdoor unit has a design pressure equivalent to 3.0 MPa or a further higher design pressure (the one that has a design pressure higher than or equal to 4.0 MPa and lower than or equal to 4.5 MPa and that can be connected to the liquid-side connection pipe 6 and the gas-side connection pipe 5 that are used for any one of the refrigerants A to D), the upper limit of the controlled pressure of the refrigerant is preferably set so as to be equivalent to 3.0 MPa.

For the air conditioner in which the plurality of indoor units 30, 35 is connected via the branch pipes such as the first liquid-side branch pipe 6*a*, the second liquid-side branch pipe 6*b*, the first gas-side branch pipe 5*a*, and the second gas-side branch pipe 5*b* as described in the third embodiment, the design pressure of each of these branch pipes when R407C is used as a refrigerant is set to 3.4 MPa, as in the case of R22, that is further lower than 3.7 MPa. Therefore, for the air conditioner 1*b* that includes the plurality of indoor units 30, 35 and in which a refrigerant to be used is replaced from R407C to any one of the above-described refrigerants A to D, preferably, the outdoor unit 20 having a design pressure lower than or equal to 3.4 MPa is used or the upper limit of the controlled pressure of the refrigerant is set by the outdoor unit control unit 27 of the outdoor unit 20 so as to be lower than or equal to 3.4 MPa in order for the pressure of refrigerant flowing through the branch pipes not to exceed 3.4 MPa.

(6-4-3) Modified Air Conditioner from R410A

The air conditioners 1, 1*a*, 1*b* in the above-described first to third embodiments and their modifications may be the air conditioners 1, 1*a*, 1*b* having used R410A and modified so as to use any one of the refrigerants A to D containing 1,2-difluoroethylene.

Here, the design pressure of each of the liquid-side connection pipe 6 and the gas-side connection pipe 5 in an air conditioner in which refrigerant R410A (refrigerant having a design pressure substantially equivalent to that of any one of the above-described refrigerants A to D) has been used is set to 4.3 MPa (gauge pressure) for pipes having an outer diameter of ⅜ inches and 4.8 MPa (gauge pressure) for pipes having an outer diameter of ½ inches.

For this reason, in the outdoor unit 20 of each of the air conditioners 1, 1*a*, 1*b* modified so as to use any one of the above-described refrigerants A to D, the heat transfer area of the outdoor heat exchanger 23 and the volume of air in the outdoor heat exchanger 23 (the amount of air that is sent by the outdoor fan 25) are set such that the upper limit of the controlled pressure of the refrigerant is lower than or equal to 4.3 MPa for the case where connection pipes having an outer diameter of ⅜ inches are used or is lower than or equal to 4.8 MPa for the case where connection pipes having an outer diameter of ½ inches are used. Alternatively, in the outdoor unit control unit 27 of the outdoor unit 20 of each of the air conditioners 1, 1*a*, 1*b* modified so as to use anyone of the above-described refrigerants A to D, the upper limit of the controlled pressure of the refrigerant is set so as to be lower than or equal to 4.3 MPa for the case where connection pipes having an outer diameter of ⅜ inches are used or so as to be lower than or equal to 4.8 MPa for the case where connection pipes having an outer diameter of ½ inches are used. Thus, the outdoor unit control unit 27 adjusts the amount of circulating refrigerant by controlling the operating frequency of the compressor 21 and adjusts the volume of air of the outdoor fan 25 in the outdoor heat exchanger 23.

As described above, the liquid-side connection pipe 6 and gas-side connection pipe 5 that have been used in an air conditioner (old machine) in which refrigerant R410A has been used can be reused when the air conditioners (new machines) 1, 1*a*, 1*b* modified so as to use any one of the above-described refrigerants A to D are introduced, and, in that case, damage to the liquid-side connection pipe 6 or the gas-side connection pipe 5 can be reduced.

In this case, preferably, the design pressure of the outdoor unit 20 of each of the air conditioners 1, 1*a*, 1*b* modified so as to use any one of the refrigerants A to D is equivalent to the design pressure of an outdoor unit in an air conditioner in which R410A has been used, and is specifically higher than or equal to 4.0 MPa and lower than or equal to 4.8 MPa. An outdoor unit and indoor unit of the air conditioner in which R410A has been used may be reused or may be replaced with new ones.

When a new one is used for the outdoor unit 20, the new one has a design pressure or an upper limit of a controlled pressure of the refrigerant, which is equivalent to the design pressure of the outdoor unit of the air conditioner in which R410A has been used or an upper limit of a controlled pressure of the refrigerant. For example, in the case where the design pressure of the outdoor unit of the air conditioner in which R410A has been used or the upper limit of the controlled pressure of the refrigerant is 4.2 MPa, even when the new outdoor unit has a design pressure equivalent to 4.2 MPa or a further higher design pressure (the one that has a design pressure higher than or equal to 4.2 MPa and lower than or equal to 4.5 MPa and that can be connected to the liquid-side connection pipe 6 and the gas-side connection pipe 5 that are used for any one of the refrigerants A to D), the upper limit of the controlled pressure of the refrigerant is preferably set so as to be equivalent to 4.2 MPa.

For the air conditioner in which the plurality of indoor units 30, 35 is connected via the branch pipes such as the first liquid-side branch pipe 6*a*, the second liquid-side branch pipe 6*b*, the first gas-side branch pipe 5*a*, and the second gas-side branch pipe 5*b* as described in the third embodiment, the design pressure of each of these branch pipes when R410A is used as a refrigerant is set to 4.2 MPa that is further lower than 4.8 MPa. Therefore, for the air conditioner 1*b* that includes the plurality of indoor units 30, 35 and in which a refrigerant to be used is replaced from R410A to any one of the above-described refrigerants A to D, preferably, the outdoor unit 20 having a design pressure lower than or equal to 4.2 MPa is used or the upper limit of the controlled pressure of the refrigerant is set by the outdoor unit control unit 27 of the outdoor unit 20 so as to be lower than or equal to 4.2 MPa in order for the pressure of refrigerant flowing through the branch pipes not to exceed 4.2 MPa.

(6-4-4) Modified Air Conditioner from R32

The air conditioners 1, 1*a*, 1*b* in the above-described first to third embodiments and their modifications may be the air conditioners 1, 1*a*, 1*b* having used R32 and modified so as to use any one of the refrigerants A to D containing 1,2-difluoroethylene.

Here, the design pressure of each of the liquid-side connection pipe 6 and the gas-side connection pipe 5 in an air conditioner in which refrigerant R32 (refrigerant having a design pressure substantially equivalent to that of any one of the above-described refrigerants A to D) has been used is set to 4.3 MPa (gauge pressure) for pipes having an outer diameter of ⅜ inches and 4.8 MPa (gauge pressure) for pipes having an outer diameter of ½ inches.

For this reason, in the outdoor unit 20 of each of the air conditioners 1, 1*a*, 1*b* modified so as to use any one of the above-described refrigerants A to D, the heat transfer area of the outdoor heat exchanger 23 and the volume of air in the outdoor heat exchanger 23 (the amount of air that is sent by the outdoor fan 25) are set such that the upper limit of the controlled pressure of the refrigerant is lower than or equal to 4.3 MPa for the case where connection pipes having an outer diameter of ⅜ inches are used or is lower than or equal to 4.8 MPa for the case where connection pipes having an outer diameter of ½ inches are used. Alternatively, in the outdoor unit control unit 27 of the outdoor unit 20 of each of the air conditioners 1, 1*a*, 1*b* modified so as to use any one of the above-described refrigerants A to D, the upper limit of the controlled pressure of the refrigerant is set so as to be lower than or equal to 4.3 MPa for the case where connection pipes having an outer diameter of ⅜ inches are used or so as to be lower than or equal to 4.8 MPa for the case where connection pipes having an outer diameter of ½ inches are used. Thus, the outdoor unit control unit 27 adjusts the amount of circulating refrigerant by controlling the operating frequency of the compressor 21 and adjusts the volume of air of the outdoor fan 25 in the outdoor heat exchanger 23.

As described above, the liquid-side connection pipe 6 and gas-side connection pipe 5 that have been used in an air conditioner (old machine) in which refrigerant R32 has been used can be reused when the air conditioners (new machines) 1, 1*a*, 1*b* modified so as to use any one of the above-described refrigerants A to D are introduced, and, in that case, damage to the liquid-side connection pipe 6 or the gas-side connection pipe 5 can be reduced.

In this case, preferably, the design pressure of the outdoor unit 20 of each of the air conditioners 1, 1*a*, 1*b* modified so as to use any one of the refrigerants A to D is equivalent to the design pressure of an outdoor unit in an air conditioner in which R32 has been used, and is specifically higher than or equal to 4.0 MPa and lower than or equal to 4.8 MPa. An outdoor unit and indoor unit of the air conditioner in which R32 has been used may be reused or may be replaced with new ones.

When a new one is used for the outdoor unit 20, the new one has a design pressure or an upper limit of a controlled pressure of the refrigerant, which is equivalent to the design pressure of the outdoor unit of the air conditioner in which R32 has been used or an upper limit of a controlled pressure of the refrigerant. For example, in the case where the design pressure of the outdoor unit of the air conditioner in which R32 has been used or the upper limit of the controlled pressure of the refrigerant is 4.2 MPa, even when the new outdoor unit 20 has a design pressure equivalent to 4.2 MPa or a further higher design pressure (the one that has a design pressure higher than or equal to 4.2 MPa and lower than or equal to 4.5 MPa and that can be connected to the liquid-side connection pipe 6 and the gas-side connection pipe 5 that are used for any one of the refrigerants A to D), the upper limit of the controlled pressure of the refrigerant is preferably set so as to be equivalent to 4.2 MPa.

For the air conditioner in which the plurality of indoor units 30, 35 is connected via the branch pipes such as the first liquid-side branch pipe 6*a*, the second liquid-side branch pipe 6*b*, the first gas-side branch pipe 5*a*, and the second gas-side branch pipe 5*b* as described in the third embodiment, the design pressure of each of these branch pipes when R32 is used as a refrigerant is set to 4.2 MPa that is further lower than 4.8 MPa. Therefore, for the air conditioner 1, 1*a*, 1*b* that includes the plurality of indoor units 30, 35 and in which a refrigerant to be used is replaced from R32 to any one of the above-described refrigerants A to D, preferably, the outdoor unit 20 having a design pressure lower than or equal to 4.2 MPa is used or the upper limit of the controlled pressure of the refrigerant is set by the outdoor unit control unit 27 of the outdoor unit 20 so as to be lower than or equal to 4.2 MPa in order for the pressure of refrigerant flowing through the branch pipes not to exceed 4.2 MPa.

(7) Embodiment of the Technique of Seventh Group

(7-1) First Embodiment

Figure 7A:
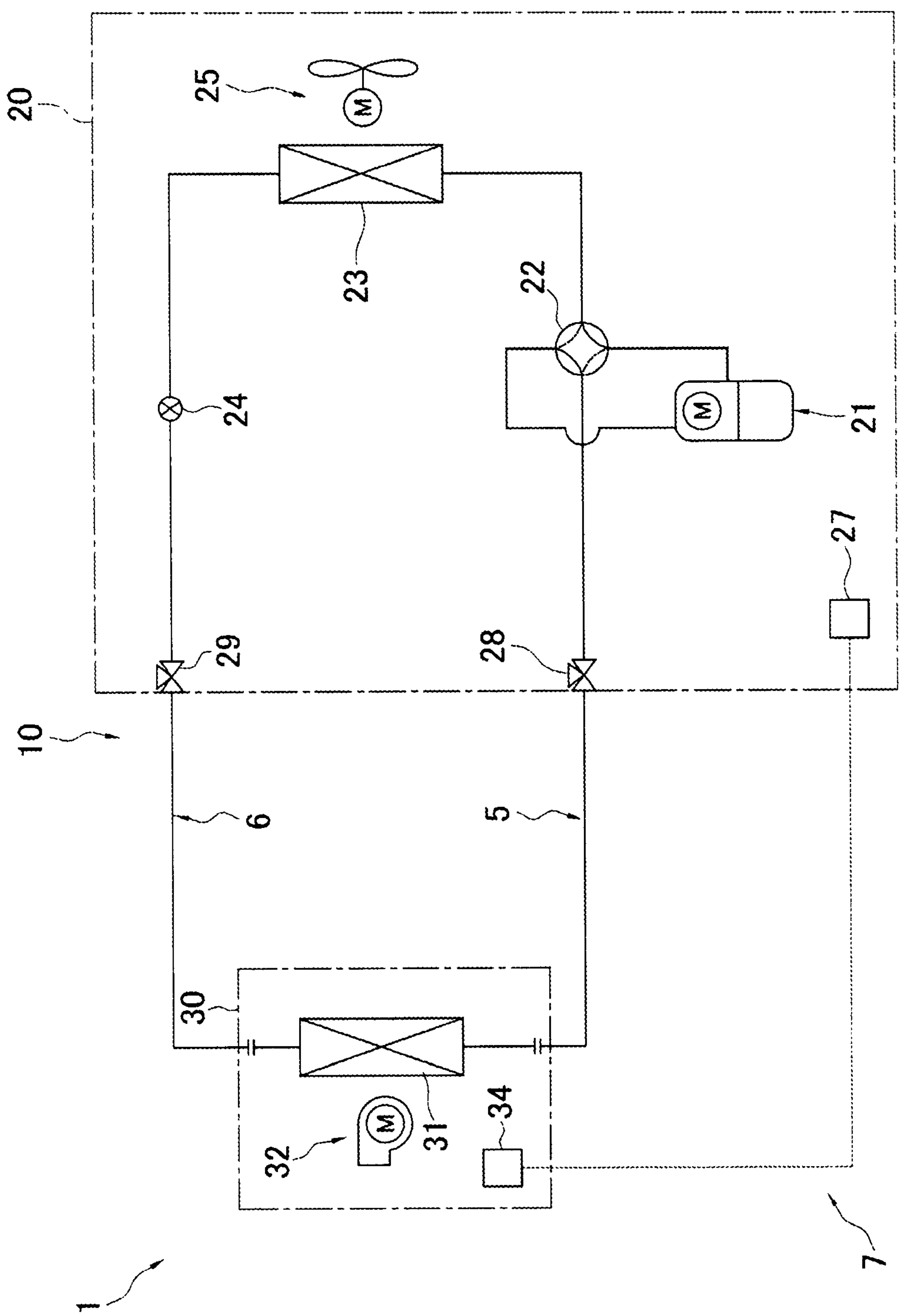
FIG. 7A is a schematic configuration diagram of a refrigerant circuit according to a first embodiment of the technique of seventh group.
Figure 7B:
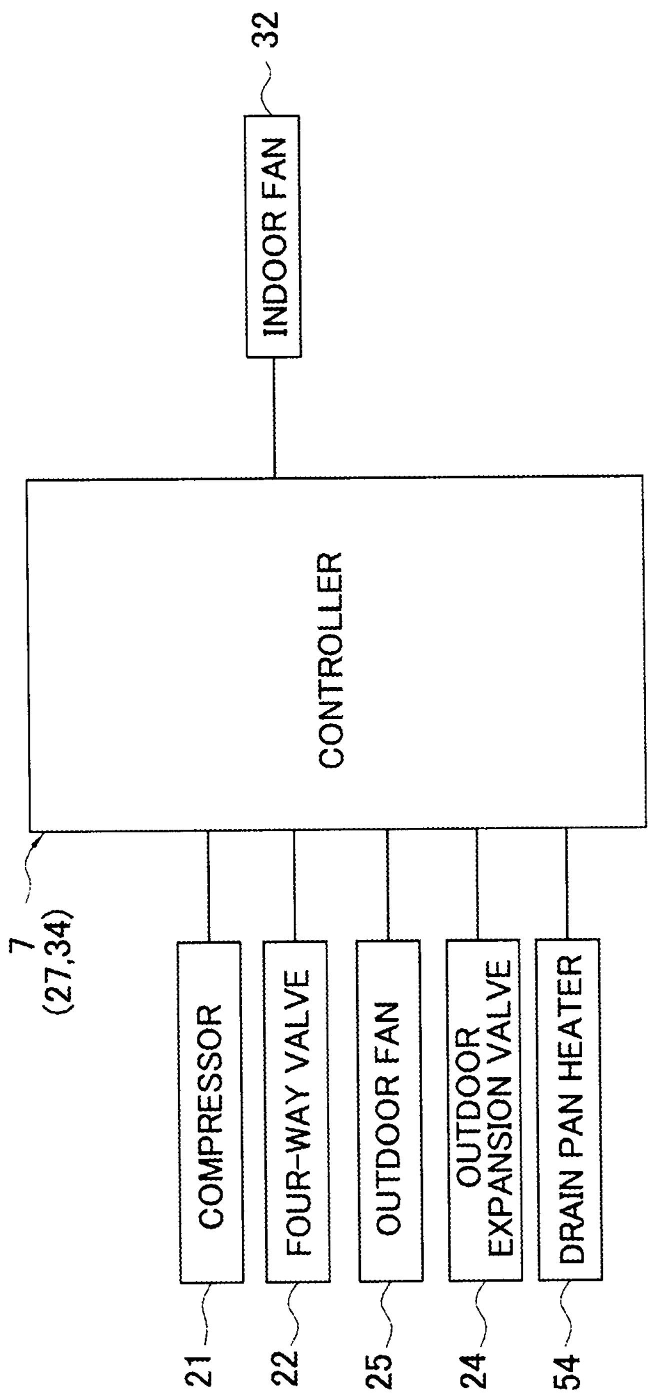
FIG. 7B is a schematic control block configuration diagram of a refrigeration cycle apparatus according to the first embodiment of the technique of seventh group.

Hereinafter, an air conditioner 1 that serves as a refrigeration cycle apparatus according to a first embodiment will be described with reference to FIG. 7A that is the schematic configuration diagram of a refrigerant circuit and FIG. 7B that is a schematic control block configuration diagram.

The air conditioner 1 is an apparatus that air-conditions a space to be air-conditioned by performing a vapor compression refrigeration cycle.

The air conditioner 1 mainly includes an outdoor unit 20, an indoor unit 30, a liquid-side connection pipe 6 and a gas-side connection pipe 5 connecting the outdoor unit 20 and the indoor unit 30, a remote control unit (not shown) serving as an input device and an output device, and a controller 7 that controls the operation of the air conditioner 1.

In the air conditioner 1, the refrigeration cycle in which refrigerant sealed in a refrigerant circuit 10 is compressed, cooled or condensed, decompressed, heated or evaporated, and then compressed again is performed. In the present embodiment, the refrigerant circuit 10 is filled with refrigerant for performing a vapor compression refrigeration cycle. The refrigerant is a refrigerant mixture containing 1,2-difluoroethylene and may use any one of the above-described refrigerants A to D. The refrigerant circuit 10 is filled with refrigerating machine oil together with the refrigerant. A rated cooling capacity of the air conditioner 1 including only the single indoor unit 30 is not limited and may be, for example, higher than or equal to 2.0 kW and lower than or equal to 17.0 kW, and, specifically, in the air conditioner 1 of the present embodiment with a size such that no refrigerant container is provided, the rated cooling capacity is preferably higher than or equal to 2.0 kW and lower than or equal to 6.0 kW.

(7-1-1) Outdoor Unit 20

The outdoor unit 20 has a structure in which a fan chamber and a machine chamber are formed (so-called, trunk structure) when the internal space of the casing 50 having substantially a rectangular parallelepiped shape into right and left spaces by a partition plate (not shown) extending vertically.

The outdoor unit 20 is connected to the indoor unit 30 via the liquid-side connection pipe 6 and the gas-side connection pipe 5, and makes up part of the refrigerant circuit 10. The outdoor unit 20 mainly includes a compressor 21, a four-way valve 22, an outdoor heat exchanger 23, an outdoor expansion valve 24, an outdoor fan 25, a liquid-side stop valve 29, and a gas-side stop valve 28.

The compressor 21 is a device that compresses low-pressure refrigerant into high pressure in the refrigeration cycle. Here, the compressor 21 is a hermetically sealed compressor in which a positive-displacement, such as a rotary type and a scroll type, compression element (not shown) is driven for rotation by a compressor motor. The compressor motor is used to change the displacement. The operation frequency of the compressor motor is controllable with an inverter. The compressor 21 is provided with an attached accumulator (not shown) at its suction side. The outdoor unit 20 of the present embodiment does not have a refrigerant container larger than the attached accumulator (a low-pressure receiver disposed at the suction side of the compressor 21, a high-pressure receiver disposed at a liquid side of the outdoor heat exchanger 23, or the like). The four-way valve 22 is able to switch between a cooling operation connection state and a heating operation connection state by switching the status of connection. In the cooling operation connection state, a discharge side of the compressor 21 and the outdoor heat exchanger 23 are connected, and the suction side of the compressor 21 and the gas-side stop valve 28 are connected. In the heating operation connection state, the discharge side of the compressor 21 and the gas-side stop valve 28 are connected, and the suction side of the compressor 21 and the outdoor heat exchanger 23 are connected.

The outdoor heat exchanger 23 is a heat exchanger that functions as a condenser for high-pressure refrigerant in the refrigeration cycle during cooling operation and that functions as an evaporator for low-pressure refrigerant in the refrigeration cycle during heating operation. In the present embodiment in which no refrigerant container (a low-pressure receiver, a high-pressure receiver, or the like, except an accumulator attached to the compressor) is provided in the refrigerant circuit 10, the internal volume (the volume of fluid that can be filled inside) of the outdoor heat exchanger 23 is preferably greater than or equal to 0.4 L and less than or equal to 2.5 L.

The outdoor fan 25 takes outdoor air into the outdoor unit 20, causes the air to exchange heat with refrigerant in the outdoor heat exchanger 23, and then generates air flow for emitting the air to the outside. The outdoor fan 25 is driven for rotation by an outdoor fan motor. In the present embodiment, only one outdoor fan 25 is provided.

The outdoor expansion valve 24 is able to control the valve opening degree, and is provided between a liquid-side end portion of the outdoor heat exchanger 23 and the liquid-side stop valve 29.

The liquid-side stop valve 29 is a manual valve disposed at a connection point at which the outdoor unit 20 is connected to the liquid-side connection pipe 6.

The gas-side stop valve 28 is a manual valve disposed at a connection point at which the outdoor unit 20 is connected to the gas-side connection pipe 5.

The outdoor unit 20 includes an outdoor unit control unit 27 that controls the operations of parts that makeup the outdoor unit 20. The outdoor unit control unit 27 includes a microcomputer including a CPU, a memory, and the like. The outdoor unit control unit 27 is connected to an indoor unit control unit 34 of indoor unit 30 via a communication line, and sends or receives control signals, or the like, to or from the indoor unit control unit 34. The outdoor unit control unit 27 is electrically connected to various sensors (not shown), and receives signals from the sensors.

Figure 7C:
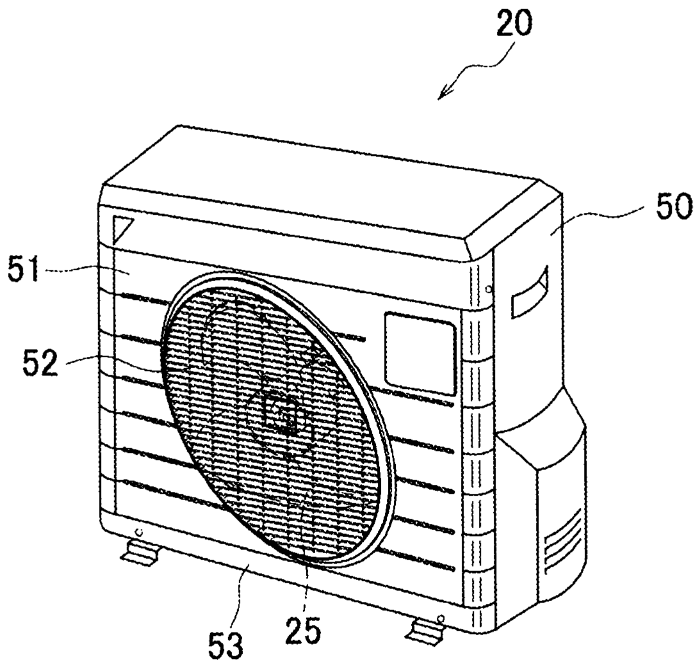
FIG. 7C is a schematic appearance perspective view of an outdoor unit according to the first embodiment of the technique of seventh group.
Figure 7D:
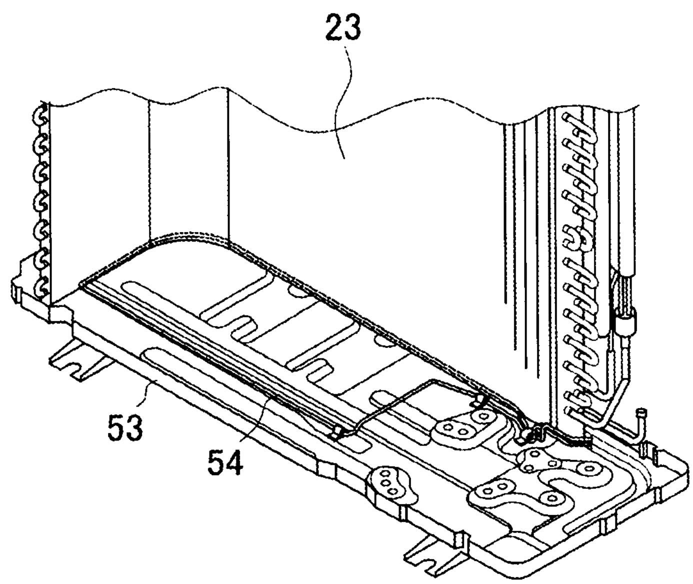
FIG. 7D is a schematic perspective view of a drain pan heater provided on a bottom plate of the technique of seventh group.

As shown in FIG. 7C, the outdoor unit 20 includes the casing 50 having an air outlet 52. The casing 50 has a substantially rectangular parallelepiped shape. The casing 50 is able to take in outdoor air from a rear side and one side (the left side in FIG. 7C) and is able to discharge air having passed through the outdoor heat exchanger 23 forward via the air outlet 52 formed in a front 51. A lower end portion of the casing 50 is covered with a bottom plate 53. As shown in FIG. 7D, the outdoor heat exchanger 23 is provided upright on the bottom plate 53 along the rear side and the one side. Atop face of the bottom plate 53 can function as a drain pan. A drain pan heater 54 that is a sheathed heater made up of heating wires is provided along a top surface of the bottom plate 53. The drain pan heater 54 has a portion running along a vertically lower part of the outdoor heat exchanger 23 and a portion running along a side closer to the front than the outdoor heat exchanger 23 on the bottom plate 53. The drain pan heater 54 is connected to the outdoor unit control unit 27 that also serves as a power supply unit and receives electric power supply. The drain pan heater 54 preferably has a rated electric power consumption of lower than or equal to 300 W and, in the present embodiment, higher than or equal to 75 W and lower than or equal to 100 W.

(7-1-2) Indoor Unit 30

The indoor unit 30 is placed on a wall surface, a ceiling, or the like, in a room that is a space to be air-conditioned. The indoor unit 30 is connected to the outdoor unit 20 via the liquid-side connection pipe 6 and the gas-side connection pipe 5, and makes up part of the refrigerant circuit 10.

The indoor unit 30 includes the indoor heat exchanger 31 and the indoor fan 32.

The liquid side of the indoor heat exchanger 31 is connected to the liquid-side connection pipe 6, and the gas side of the indoor heat exchanger 31 is connected to the gas-side connection pipe 5. The indoor heat exchanger 31 is a heat exchanger that functions as an evaporator for low-pressure refrigerant in the refrigeration cycle during cooling operation and that functions as a condenser for high-pressure refrigerant in the refrigeration cycle during heating operation.

The indoor fan 32 takes indoor air into the indoor unit 30, causes the air to exchange heat with refrigerant in the indoor heat exchanger 31, and then generates air flow for emitting the air to the outside. The indoor fan 32 is driven for rotation by an indoor fan motor.

The indoor unit 30 includes an indoor unit control unit 34 that controls the operations of the parts that make up the indoor unit 30. The indoor unit control unit 34 includes a microcomputer including a CPU, a memory, and the like. The indoor unit control unit 34 is connected to the outdoor unit control unit 27 via a communication line, and sends or receives control signals, or the like, to or from the outdoor unit control unit 27.

The indoor unit control unit 34 is electrically connected to various sensors (not shown) provided inside the indoor unit 30, and receives signals from the sensors.

(7-1-3) Details of Controller 7

In the air conditioner 1, the outdoor unit control unit 27 and the indoor unit control unit 34 are connected via the communication line to make up the controller 7 that controls the operation of the air conditioner 1.

The controller 7 mainly includes a CPU (central processing unit) and a memory such as a ROM and a RAM. Various processes and controls made by the controller 7 are implemented by various parts included in the outdoor unit control unit 27 and/or the indoor unit control unit 34 functioning together.

(7-1-4) Operation Mode

Hereinafter, operation modes will be described.

The operation modes include a cooling operation mode and a heating operation mode.

The controller 7 determines whether the operation mode is the cooling operation mode or the heating operation mode and performs the selected operation mode based on an instruction received from the remote control unit, or the like.

(7-1-4-1) Cooling Operation Mode

In the air conditioner 1, in the cooling operation mode, the status of connection of the four-way valve 22 is set to the cooling operation connection state where the discharge side of the compressor 21 and the outdoor heat exchanger 23 are connected and the suction side of the compressor 21 and the gas-side stop valve 28 are connected, and refrigerant filled in the refrigerant circuit 10 is mainly circulated in order of the compressor 21, the outdoor heat exchanger 23, the outdoor expansion valve 24, and the indoor heat exchanger 31.

More specifically, when the cooling operation mode is started, refrigerant is taken into the compressor 21, compressed, and then discharged in the refrigerant circuit 10.

In the compressor 21, displacement control commensurate with a cooling load that is required from the indoor unit 30 is performed. The displacement control is not limited. For example, a target value of suction pressure may be set according to a cooling load that is required of the indoor unit 30, and the operating frequency of the compressor 21 may be controlled such that the suction pressure becomes the target value.

Gas refrigerant discharged from the compressor 21 passes through the four-way valve 22 and flows into the gas-side end of the outdoor heat exchanger 23.

Gas refrigerant having flowed into the gas-side end of the outdoor heat exchanger 23 exchanges heat in the outdoor heat exchanger 23 with outdoor-side air that is supplied by the outdoor fan 25 to condense into liquid refrigerant and flows out from the liquid-side end of the outdoor heat exchanger 23.

Refrigerant having flowed out from the liquid-side end of the outdoor heat exchanger 23 is decompressed when passing through the outdoor expansion valve 24. The outdoor expansion valve 24 is controlled such that the degree of subcooling of refrigerant that passes through a liquid-side outlet of the outdoor heat exchanger 23 satisfies a predetermined condition. A method of controlling the valve opening degree of the outdoor expansion valve 24 is not limited. For example, the valve opening degree of the outdoor expansion valve 24 may be controlled such that a discharge temperature of refrigerant that is discharged from the compressor 21 becomes a predetermined temperature or may be controlled such that the degree of superheating of refrigerant that is discharged from the compressor 21 satisfies a predetermined condition.

Refrigerant decompressed in the outdoor expansion valve 24 passes through the liquid-side stop valve 29 and the liquid-side connection pipe 6 and flows into the indoor unit 30.

Refrigerant having flowed into the indoor unit 30 flows into the indoor heat exchanger 31, exchanges heat in the indoor heat exchanger 31 with indoor air that is supplied by the indoor fan 32 to evaporate into gas refrigerant, and flows out from the gas-side end of the indoor heat exchanger 31. Gas refrigerant having flowed out from the gas-side end of the indoor heat exchanger 31 flows to the gas-side connection pipe 5.

Refrigerant having flowed through the gas-side connection pipe 5 passes through the gas-side stop valve 28 and the four-way valve 22, and is taken into the compressor 21 again.

(7-1-4-2) Heating Operation Mode

In the air conditioner 1, in the heating operation mode, the status of connection of the four-way valve 22 is set to the heating operation connection state where the discharge side of the compressor 21 and the gas-side stop valve 28 are connected and the suction side of the compressor 21 and the outdoor heat exchanger 23 are connected, and refrigerant filled in the refrigerant circuit 10 is mainly circulated in order of the compressor 21, the indoor heat exchanger 31, the outdoor expansion valve 24, and the outdoor heat exchanger 23.

More specifically, when the heating operation mode is started, refrigerant is taken into the compressor 21, compressed, and then discharged in the refrigerant circuit 10.

In the compressor 21, displacement control commensurate with a heating load that is required from the indoor unit 30 is performed. The displacement control is not limited. For example, a target value of discharge pressure may be set according to a heating load that is required of the indoor unit 30, and the operating frequency of the compressor 21 may be controlled such that the discharge pressure becomes the target value.

Gas refrigerant discharged from the compressor 21 flows through the four-way valve 22 and the gas-side connection pipe 5 and then flows into the indoor unit 30.

Refrigerant having flowed into the indoor unit 30 flows into the gas-side end of the indoor heat exchanger 31, exchanges heat in the indoor heat exchanger 31 with indoor air that is supplied by the indoor fan 32 to condense into refrigerant in a gas-liquid two-phase state or liquid refrigerant, and flows out from the liquid-side end of the indoor heat exchanger 31. Refrigerant having flowed out from the liquid-side end of the indoor heat exchanger 31 flows into the liquid-side connection pipe 6.

Refrigerant having flowed through the liquid-side connection pipe 6 is decompressed to a low pressure in the refrigeration cycle in the liquid-side stop valve 29 and the outdoor expansion valve 24. The outdoor expansion valve 24 is controlled such that the degree of subcooling of refrigerant that passes through a liquid-side outlet of the indoor heat exchanger 31 satisfies a predetermined condition. A method of controlling the valve opening degree of the outdoor expansion valve 24 is not limited. For example, the valve opening degree of the outdoor expansion valve 24 may be controlled such that a discharge temperature of refrigerant that is discharged from the compressor 21 becomes a predetermined temperature or may be controlled such that the degree of superheating of refrigerant that is discharged from the compressor 21 satisfies a predetermined condition.

Refrigerant decompressed in the outdoor expansion valve 24 flows into the liquid-side end of the outdoor heat exchanger 23.

Refrigerant having flowed in from the liquid-side end of the outdoor heat exchanger 23 exchanges heat in the outdoor heat exchanger 23 with outdoor air that is supplied by the outdoor fan 25 to evaporate into gas refrigerant, and flows out from the gas-side end of the outdoor heat exchanger 23.

Refrigerant having flowed out from the gas-side end of the outdoor heat exchanger 23 passes through the four-way valve 22 and is taken into the compressor 21 again.

(7-1-4-3) Defrost Operation Mode

A defrost operation mode is an operation when a predetermined defrost condition, that is, for example, the duration of an operation in a state where an outdoor air temperature is lower than or equal to a predetermined temperature is longer than or equal to a predetermined time in the heating operation mode, is satisfied. In the defrost operation mode, a refrigeration cycle similar to that of the cooling operation mode is performed except that the operation of the indoor fan 32 is stopped and the status of connection of the four-way valve 22 is switched as in the case during the cooling operation mode. Thus, frost stuck to the outdoor heat exchanger 23 can be partially melted down onto the bottom plate 53 of the casing 50. At this time, the bottom plate 53 is warmed through control for energizing the drain pan heater 54, so frost fallen onto the bottom plate 53 can be melted into a liquid state to facilitate drainage.

(7-1-5) Characteristics of First Embodiment

In the above-described air conditioner 1, since refrigerant containing 1,2-difluoroethylene is used, a GWP can be sufficiently reduced.

Since the outdoor unit 20 of the air conditioner 1 includes the drain pan heater 54 on the bottom plate 53 of the casing 50, even when frost accumulates on the bottom plate 53, drainability can be improved by melting the frost.

By using the drain pan heater 54 of which the rated electric power consumption is higher than or equal to 75 W, the outdoor unit 20 having a capacity to such a degree that only the single outdoor fan 25 is provided is able to sufficiently exercise the function of the drain pan heater 54 appropriately for the capacity.

In addition, by using the drain pan heater 54 of which the rated electric power consumption is lower than or equal to 100 W, even when refrigerant containing 1,2-difluoroethylene leaks in the outdoor unit 20, a situation in which the drain pan heater 54 becomes an ignition source can be suppressed.

(7-1-6) Modification A of First Embodiment

In the above-described first embodiment, an air conditioner in which no refrigerant container other than an accumulator attached to the compressor 21 is provided at the suction side of the compressor 21 is described as an example. For an air conditioner, a refrigerant container (which is a low-pressure receiver, a high-pressure receiver, or the like, except an accumulator attached to the compressor) may be provided in a refrigerant circuit.

In this case, an internal volume (the volume of fluid that can be filled inside) of the outdoor heat exchanger 23 is preferably greater than or equal to 1.4 L and less than 3.5 L.

(7-1-7) Modification B of First Embodiment

In the above-described first embodiment, the air conditioner including only one indoor unit is described as an example, however, the air conditioner may include a plurality of indoor units (with no indoor expansion valve) connected in parallel with each other.

In this case, an internal volume (the volume of fluid that can be filled inside) of the outdoor heat exchanger 23 is preferably greater than or equal to 0.4 L and less than 3.5 L.

(7-2) Second Embodiment

Figure 7E:
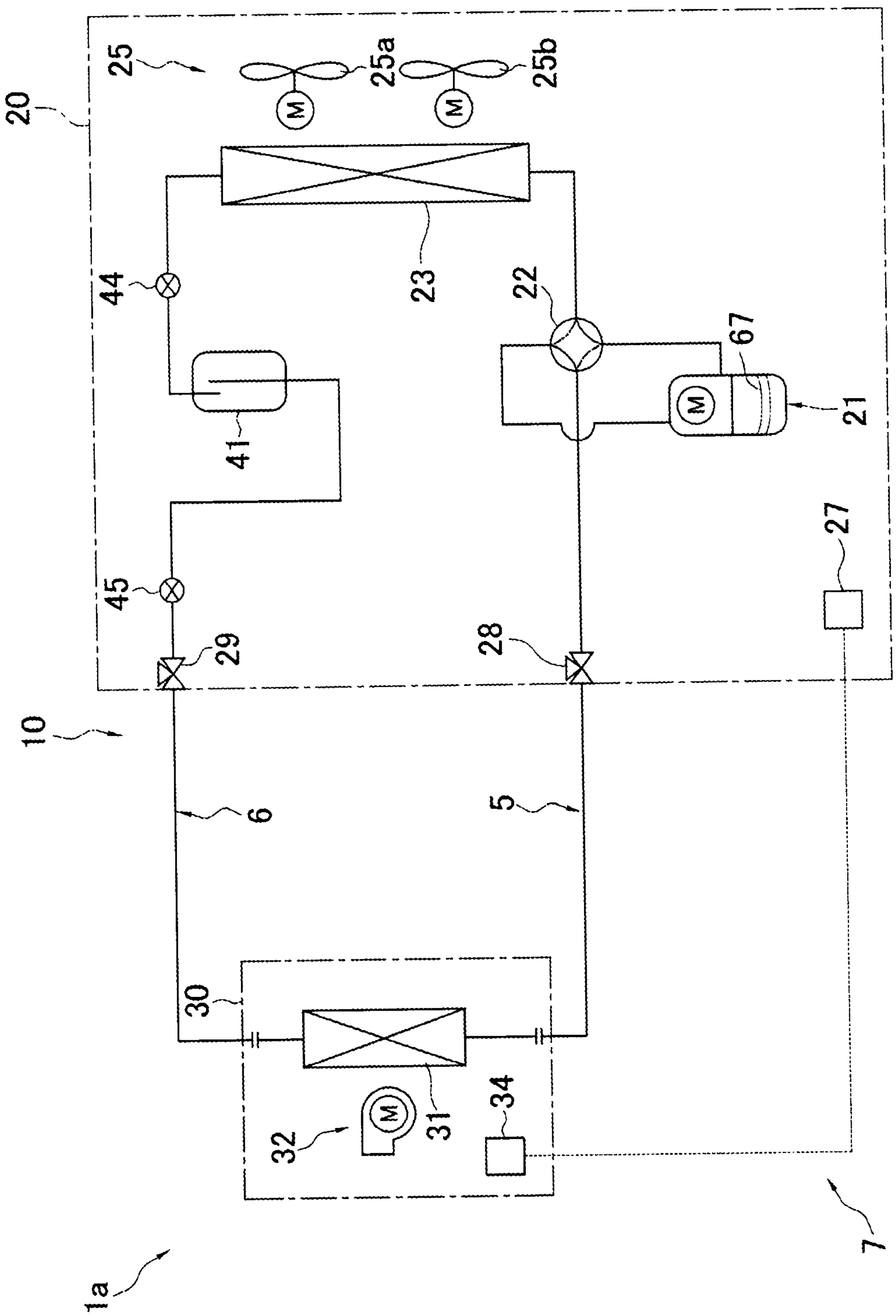
FIG. 7E is a schematic configuration diagram of a refrigerant circuit according to a second embodiment of the technique of seventh group.
Figure 7F:
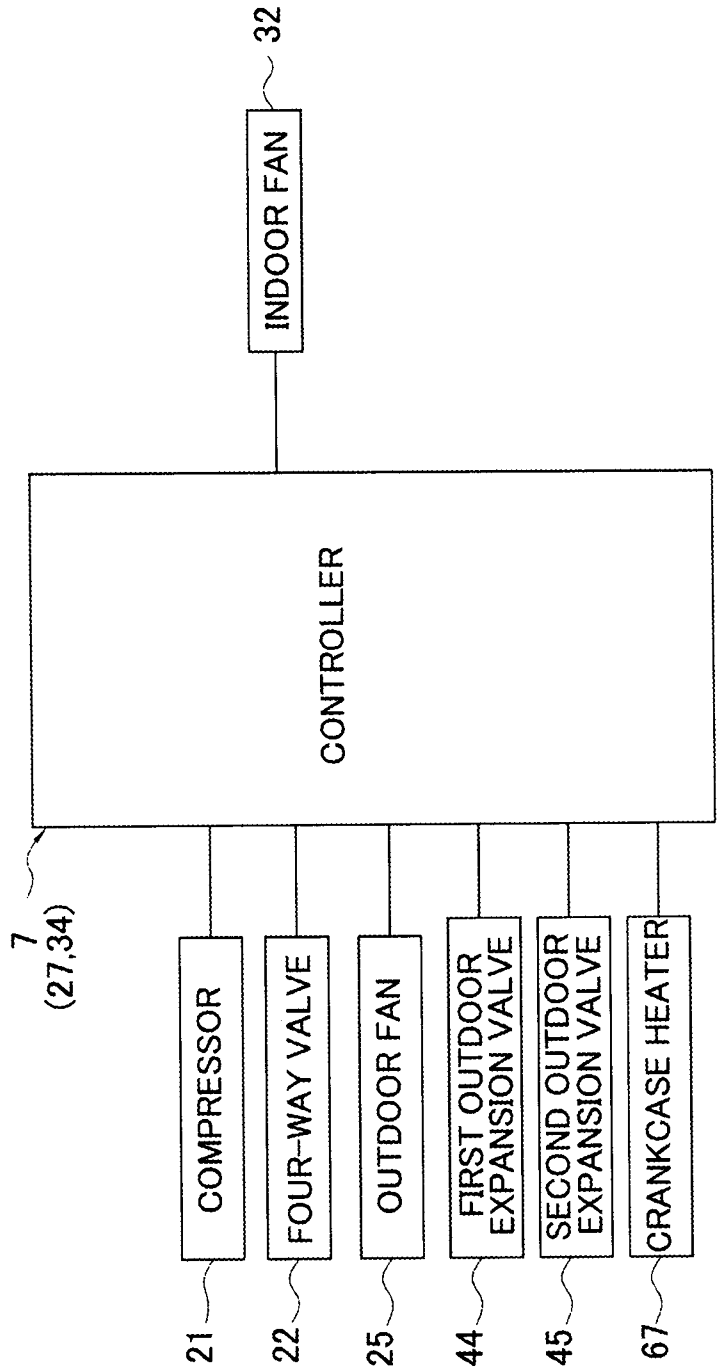
FIG. 7F is a schematic control block configuration diagram of a refrigeration cycle apparatus according to the second embodiment of the technique of seventh group.

Hereinafter, an air conditioner 1*a* that serves as a refrigeration cycle apparatus according to a second embodiment will be described with reference to FIG. 7E that is the schematic configuration diagram of a refrigerant circuit and FIG. 7F that is a schematic control block configuration diagram.

Hereinafter, mainly, the air conditioner 1*a* of the second embodiment will be described with a focus on a portion different from the air conditioner 1 of the first embodiment.

In the air conditioner 1*a* as well, the refrigerant circuit 10 is filled with a refrigerant mixture that contains 1,2-difluoroethylene and that is any one of the above-described refrigerants A to D as a refrigerant for performing a vapor compression refrigeration cycle. The refrigerant circuit 10 is filled with refrigerating machine oil together with the refrigerant. A rated cooling capacity of the air conditioner 1*a* including only the single indoor unit 30 is not limited and may be, for example, higher than or equal to 2.0 kW and lower than or equal to 17.0 kW, and, in the air conditioner 1*a* of the present embodiment in which an intermediate pressure receiver 41 that is a refrigerant container is provided as will be described later, the rated cooling capacity is preferably higher than or equal to 10.0 kW and lower than or equal to 17.0 kW.

In the outdoor unit 20 of the air conditioner 1*a* of the second embodiment, a first outdoor fan 25*a* and a second outdoor fan 25*b* are provided as the outdoor fans 25. The outdoor heat exchanger 23 of the outdoor unit 20 of the air conditioner 1*a* has a wide heat exchange area so as to adapt to air flow coming from the first outdoor fan 25*a* and the second outdoor fan 25*b*. The internal volume (the volume of fluid that can be filled inside) of the outdoor heat exchanger 23 of the outdoor unit 20 of the air conditioner 1*a* is preferably greater than or equal to 3.5 L and less than or equal to 7.0 L, and, in the air conditioner 1*a* of the present embodiment, including the indoor unit 30 in which no indoor expansion valve is provided, the internal volume of the outdoor heat exchanger 23 is preferably greater than or equal to 3.5 L and less than 5.0 L.

In the outdoor unit 20 of the air conditioner 1*a*, instead of the outdoor expansion valve 24 of the outdoor unit 20 in the above-described first embodiment, a first outdoor expansion valve 44, an intermediate pressure receiver 41, and a second outdoor expansion valve 45 are sequentially provided between the liquid side of the outdoor heat exchanger 23 and the liquid-side stop valve 29.

The first outdoor expansion valve 44 and the second outdoor expansion valve 45 each are able to control the valve opening degree.

The intermediate pressure receiver 41 is a container that is able to store refrigerant. Both an end portion of a pipe extending from the first outdoor expansion valve 44 side and an end portion of a pipe extending from the second outdoor expansion valve 45 side are located in the internal space of the intermediate pressure receiver 41.

The outdoor unit 20 of the air conditioner 1*a* includes a crankcase heater 67 for the compressor 21. The crankcase heater 67 is an electric heater attached to an oil reservoir where refrigerating machine oil is stored at a lower side in the compressor 21. When the compressor 21 has been stopped for a long time as well, the oil reservoir is heated by energizing the crankcase heater 67 before startup of the compressor 21. Thus, refrigerant mixed in refrigerating machine oil stored in the oil reservoir is evaporated to be reduced, with the result that generation of bubbles of refrigerating machine oil at the startup of the compressor 21 can be reduced. The crankcase heater 67 preferably has a rated electric power consumption of lower than or equal to 300 W and higher than or equal to 100 W.

Figure 7G:
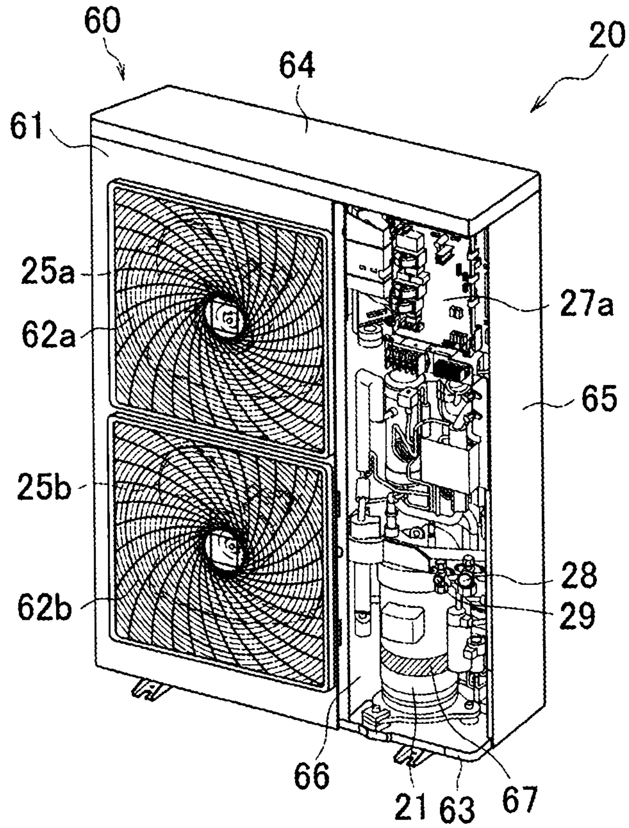
FIG. 7G is a schematic appearance perspective view of an outdoor unit according to the second embodiment of the technique of seventh group (in a state where a front panel of a machine chamber is removed).

The outdoor unit 20 of the second embodiment has a structure in which a fan chamber and a machine chamber are formed (so-called trunk structure) when the internal space of a casing 60 having a substantially rectangular parallelepiped shape is divided into right and left spaces by a partition plate 66 extending vertically, as shown in FIG. 7G.

The outdoor heat exchanger 23, the outdoor fans 25 (a first outdoor fan 25*a* and a second outdoor fan 25*b*), and the like, are disposed in the fan chamber inside the casing 60. The compressor 21, the four-way valve 22, the first outdoor expansion valve 44, the second outdoor expansion valve 45, the intermediate pressure receiver 41, the gas-side stop valve 28, the liquid-side stop valve 29, and an electric component unit 27*a* that makes up the outdoor unit control unit 27, and the like, are disposed in the machine chamber inside the casing 60.

The casing 60 mainly includes a bottom plate 63, a top panel 64, a left front panel 61, a left-side panel (not shown), a right front panel (not shown), a right-side panel 65, the partition plate 66, and the like. The bottom plate 63 makes up a bottom part of the casing 60. The top panel 64 makes up a top part of the outdoor unit 20. The left front panel 61 mainly makes up a left front part of the casing 60, and has a first air outlet 62*a* and a second air outlet 62*b* that are open in a front-rear direction and arranged one above the other. Air taken in from the rear side and left side of the casing 60 by the first outdoor fan 25*a* and having passed through an upper part of the outdoor heat exchanger 23 passes through the first air outlet 62*a*. Air taken in from the rear side and left side of the casing 60 by the second outdoor fan 25*b* and having passed through a lower part of the outdoor heat exchanger 23 passes through the second air outlet 62*b*. A fan grille is provided at each of the first air outlet 62*a* and the second air outlet 62*b*. The left-side panel mainly makes up a left side part of the casing 60 and is also able to function as an inlet for air that is taken into the casing 60. The right front panel mainly makes up a right front part and a front-side part of the right side of the casing 60. The right-side panel 65 mainly makes up a rear-side part of the right side and right-side part of the rear of the casing 60. The partition plate 66 is a plate-shaped member extending vertically and disposed on the bottom plate 63, and divides the internal space of the casing 60 into the fan chamber and the machine chamber.

The outdoor heat exchanger 23 is, for example, a cross-fin type fin-and-tube heat exchanger made up of heat transfer tubes and a large number of fins, and is disposed in the fan chamber in an L-shape in plan view along the left side and rear of the casing 60.

The compressor 21 is mounted on the bottom plate 63 and fixed by bolts in the machine chamber of the casing 60.

The gas-side stop valve 28 and the liquid-side stop valve 29 are disposed near the right front corner at the level near the upper end of the compressor 21 in the machine chamber of the casing 60.

The electric component unit 27*a* is disposed in a space above both of the gas-side stop valve 28 and the liquid-side stop valve 29 in the machine chamber of the casing 60.

In the above air conditioner 1*a*, in the cooling operation mode, the first outdoor expansion valve 44 is controlled such that the degree of subcooling of refrigerant that passes through the liquid-side outlet of the outdoor heat exchanger 23 satisfies a predetermined condition. In the cooling operation mode, the second outdoor expansion valve 45 is controlled such that the degree of superheating of refrigerant that the compressor 21 takes in satisfies a predetermined condition. In the cooling operation mode, the second outdoor expansion valve 45 may be controlled such that the temperature of refrigerant that the compressor 21 discharges becomes a predetermined temperature or may be controlled such that the degree of superheating of refrigerant that the compressor 21 discharges satisfies a predetermined condition.

In the heating operation mode, the second outdoor expansion valve 45 is controlled such that the degree of subcooling of refrigerant that passes through the liquid-side outlet of the indoor heat exchanger 31 satisfies a predetermined condition. In the heating operation mode, the first outdoor expansion valve 44 is controlled such that the degree of superheating of refrigerant that the compressor 21 takes in satisfies a predetermined condition. In the heating operation mode, the first outdoor expansion valve 44 may be controlled such that the temperature of refrigerant that the compressor 21 discharges becomes a predetermined temperature or may be controlled such that the degree of superheating of refrigerant that the compressor 21 discharges satisfies a predetermined condition. Here, in the heating operation mode of the air conditioner 1*a*, at the time of causing the compressor 21 to start up, it is determined whether a predetermined condition, for example, the duration of a drive stopped state of the compressor 21 is longer than or equal to a predetermined time, satisfies a predetermined condition, and, when the predetermined condition is satisfied, the process of energizing the crankcase heater 67 for a predetermined time or until the temperature of the oil reservoir reaches a predetermined temperature before the compressor 21 is started up.

In the above-described air conditioner 1*a* according to the second embodiment as well, as well as the air conditioner 1 according to the first embodiment, since refrigerant containing 1,2-difluoroethylene is used, a GWP can be sufficiently reduced.

Since the outdoor unit 20 of the air conditioner 1*a* includes the crankcase heater 67, oil foaming at the startup of the compressor 21 can be suppressed.

By using the crankcase heater 67 of which the rated electric power consumption is higher than or equal to 100 W, even in the outdoor unit 20 having a capacity to such a degree that two outdoor fans 25 (the first outdoor fan 25*a* and the second outdoor fan 25*b*) are provided, the function of the crankcase heater 67 can be sufficiently exercised appropriately for the capacity.

In addition, by using the crankcase heater 67 of which the rated electric power consumption is lower than or equal to 300 W, even when refrigerant containing 1,2-difluoroethylene leaks in the outdoor unit 20, a situation in which the crankcase heater 67 becomes an ignition source can be suppressed.

(7-2-1) Modification A of Second Embodiment

In the above-described second embodiment, the air conditioner including only one indoor unit is described as an example; however, the air conditioner may include a plurality of indoor units (with no indoor expansion valve) connected in parallel with each other.

In this case, an internal volume (the volume of fluid that can be filled inside) of the outdoor heat exchanger 23 is preferably greater than or equal to 3.5 L and less than 5.0 L.

(7-2-2) Modification B of Second Embodiment

In the above-described second embodiment, the air conditioner including only one indoor unit is described as an example; however, the air conditioner may include a plurality of indoor units (with no indoor expansion valve) connected in parallel with each other.

In this case, an internal volume (the volume of fluid that can be filled inside) of the outdoor heat exchanger 23 is preferably greater than or equal to 5.0 L and less than or equal to 7.0 L.

(7-3) Third Embodiment

Figure 7H:
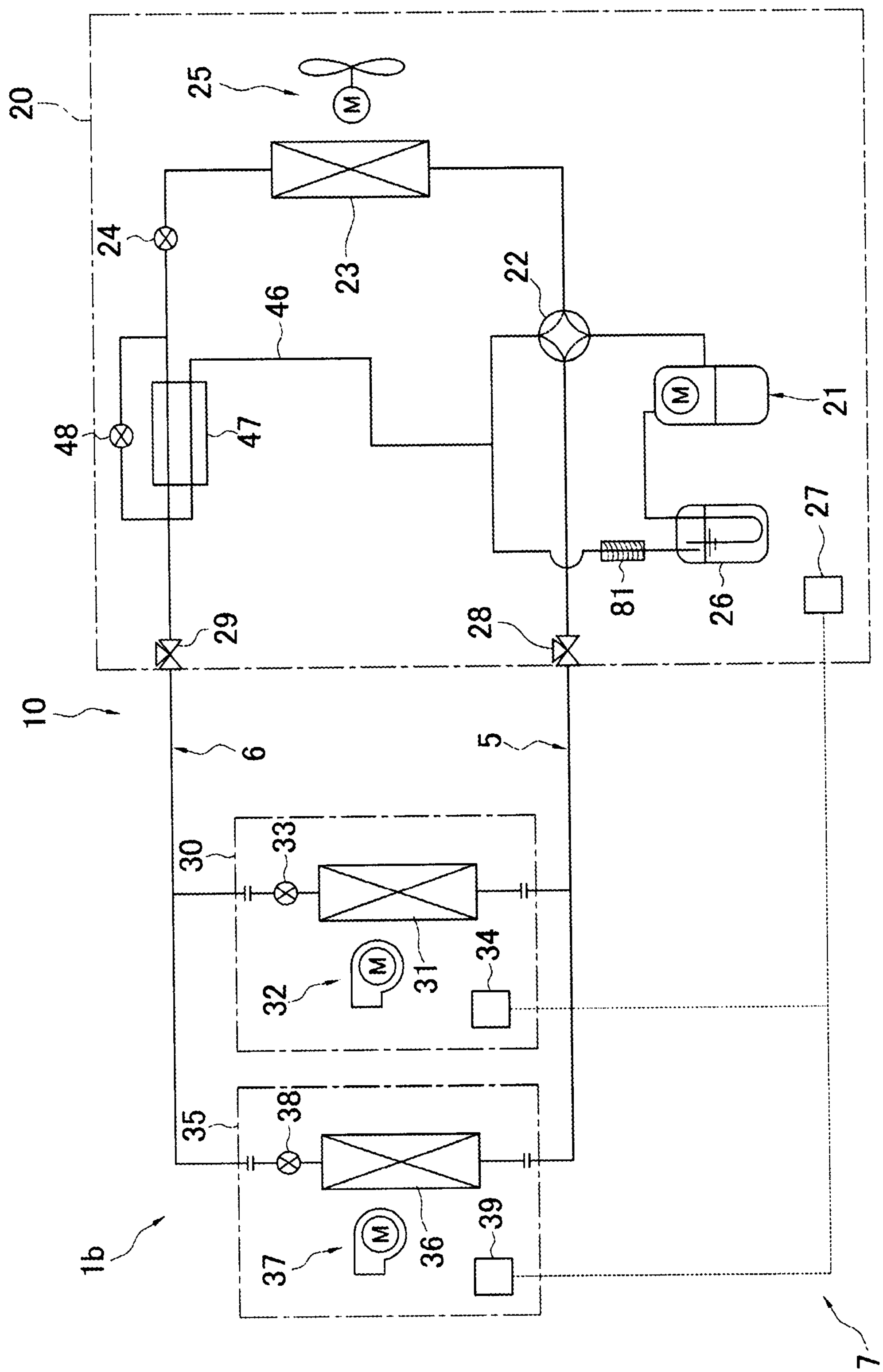
FIG. 7H is a schematic configuration diagram of a refrigerant circuit according to a third embodiment of the technique of seventh group.
Figure 7I:
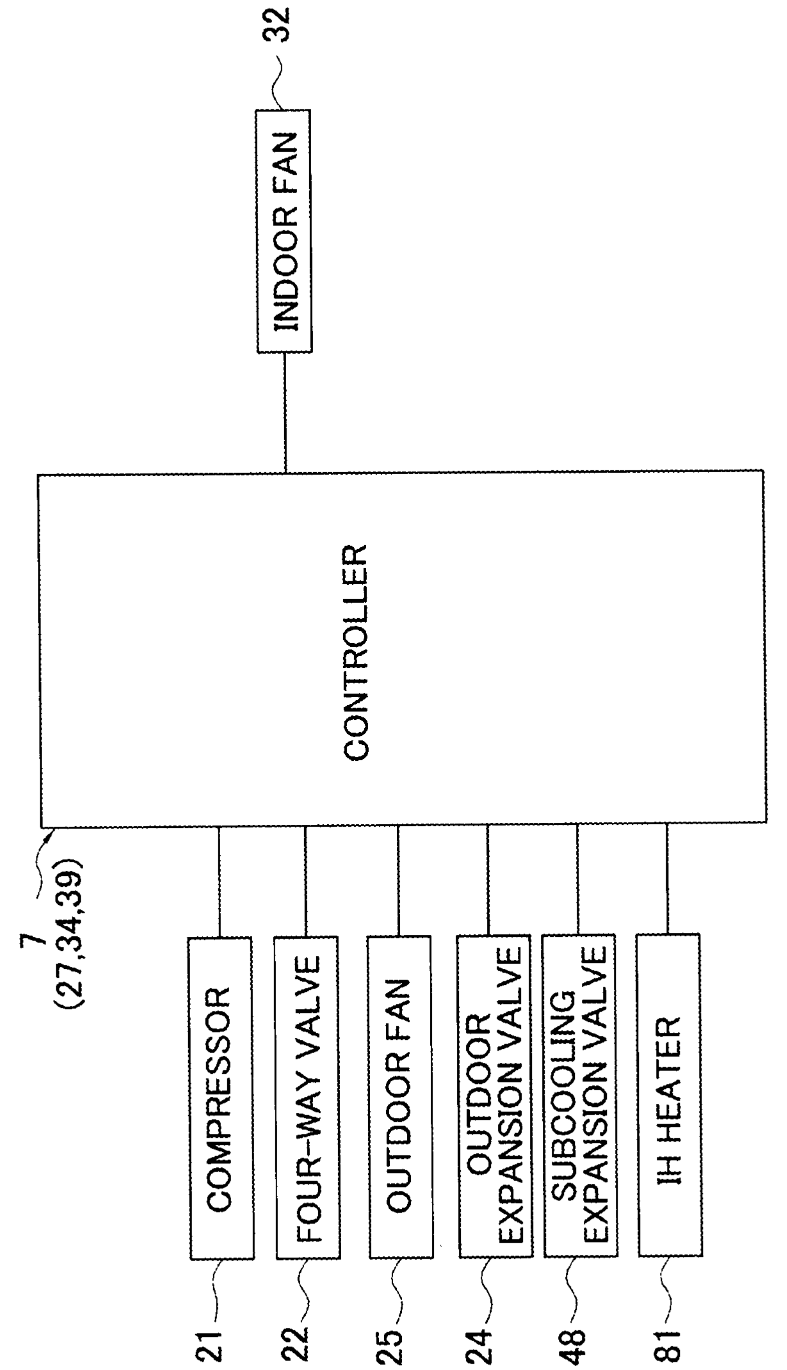
FIG. 7I is a schematic control block configuration diagram of a refrigeration cycle apparatus according to the third embodiment of the technique of seventh group.

Hereinafter, an air conditioner 1*b* that serves as a refrigeration cycle apparatus according to a third embodiment will be described with reference to FIG. 7H that is the schematic configuration diagram of a refrigerant circuit and FIG. 7I that is a schematic control block configuration diagram.

Hereinafter, mainly, the air conditioner 1*b* of the third embodiment will be described with a focus on a portion different from the air conditioner 1 of the first embodiment.

In the air conditioner 1*b* as well, the refrigerant circuit 10 is filled with a refrigerant mixture that contains 1,2-difluoroethylene and that is any one of the above-described refrigerants A to D as a refrigerant for performing a vapor compression refrigeration cycle. The refrigerant circuit 10 is filled with refrigerating machine oil together with the refrigerant. A rated cooling capacity of the air conditioner 1*b* including the multiple indoor units 30 is not limited and may be, for example, higher than or equal to 18.0 kW and lower than or equal to 160.0 kW.

In the outdoor unit 20 of the air conditioner 1*b* of the third embodiment, a low-pressure receiver 26, an IH heater 81, a subcooling heat exchanger 47, and a subcooling circuit 46 are provided in the outdoor unit 20 of the above-described first embodiment.

The low-pressure receiver 26 is a container that is provided between one of connection ports of the four-way valve 22 and the suction side of the compressor 21 and that is able to store refrigerant. In the present embodiment, the low-pressure receiver 26 is provided separately from the attached accumulator of the compressor 21.

The IH heater 81 is an electric heater that is able to heat refrigerant flowing through the refrigerant pipes. The electric heater is not limited and is preferably the one that heats refrigerant with an electromagnetic induction heating system that is an electrical system rather than a system using fire, such as a burner. With the electromagnetic induction heating system, for example, in a state where a raw material containing a magnetic material is provided at a portion that directly or indirectly contacts with refrigerant and an electromagnetic induction coil is wound around the raw material containing the magnetic material, the raw material containing the magnetic material is caused to generate heat by generating magnetic flux as a result of passing current through the electromagnetic induction coil, with the result that refrigerant can be heated.

The subcooling heat exchanger 47 is provided between the outdoor expansion valve 24 and the liquid-side stop valve 29.

The subcooling circuit 46 is a circuit that branches off from a main circuit between the outdoor expansion valve 24 and the subcooling heat exchanger 47 and that merges with a portion halfway from one of the connection ports of the four-way valve 22 to the low-pressure receiver 26. A subcooling expansion valve 48 that decompresses refrigerant passing therethrough is provided halfway in the subcooling circuit 46. Refrigerant flowing through the subcooling circuit 46 and decompressed by the subcooling expansion valve 48 exchanges heat with refrigerant flowing through the main circuit side in the subcooling heat exchanger 47. Thus, refrigerant flowing through the main circuit side is further cooled, and refrigerant flowing through the subcooling circuit 46 evaporates.

Figure 7J:
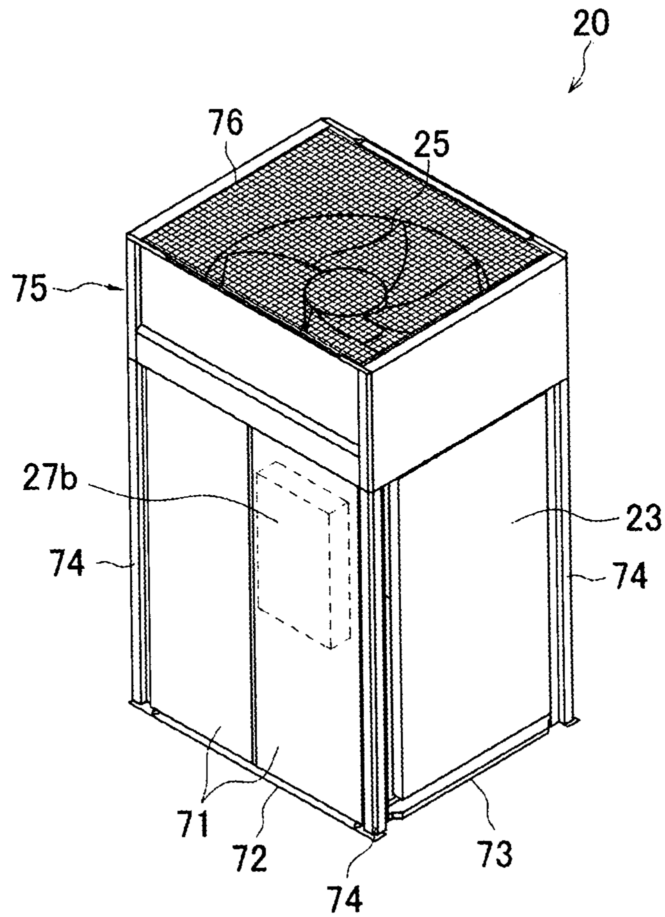
FIG. 7J is a schematic appearance perspective view of an outdoor unit according to the third embodiment of the technique of seventh group.
Figure 7K:
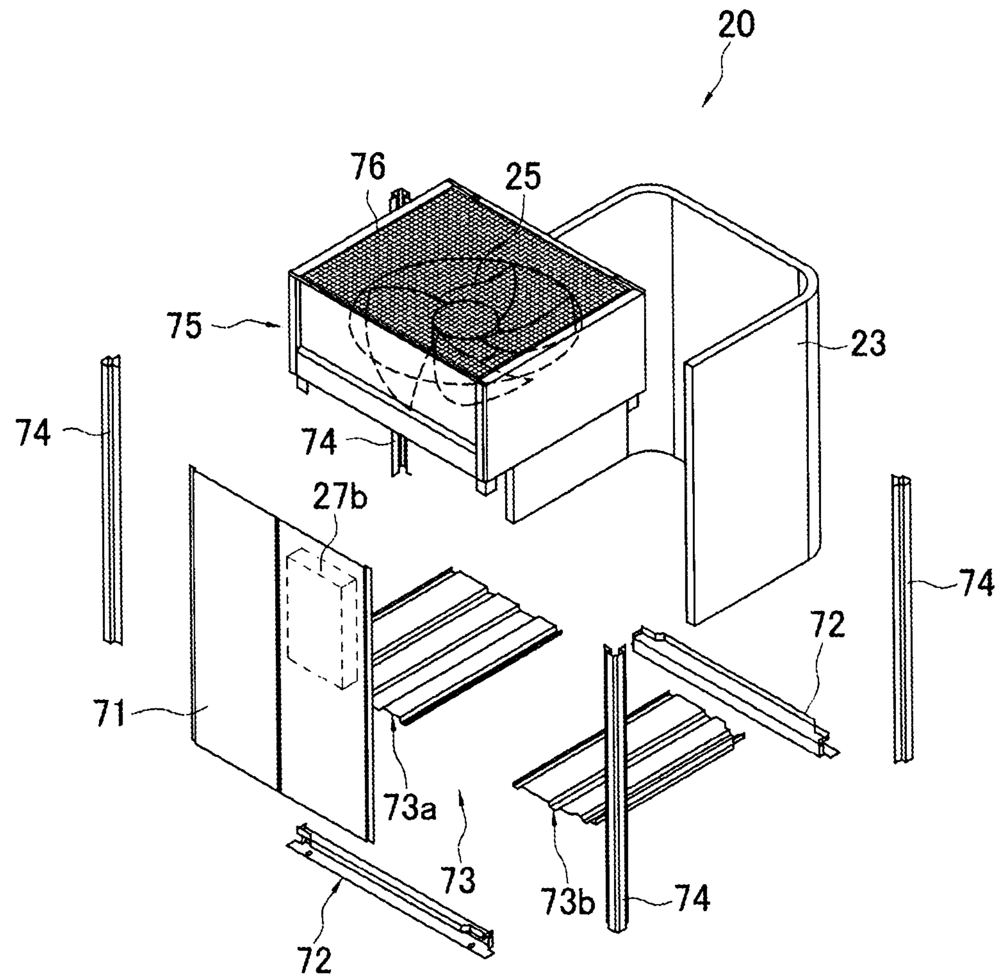
FIG. 7K is a schematic exploded perspective view of the outdoor unit according to the third embodiment of the technique of seventh group.

The detailed structure of the outdoor unit 20 of the air conditioner 1*b* according to the third embodiment will be described below with reference to the appearance perspective view of FIG. 7J and the exploded perspective view of FIG. 7K.

The outdoor unit 20 of the air conditioner 1*b* may have an up-blow structure that takes in air from the lower side into a casing 70 and discharges air outward of the casing 70 from the upper side.

The casing 70 mainly includes a bottom plate 73 bridged on a pair of installation legs 72 extending in a right-left direction, supports 74 extending in a vertical direction from corners of the bottom plate 73, a front panel 71, and a fan module 75. The bottom plate 73 forms the bottom of the casing 70 and is separated into a left-side first bottom plate 73*a* and a right-side second bottom plate 73*b*. The front panel 71 is bridged between the front-side supports 74 below the fan module 75 and makes up the front of the casing 70. Inside the casing 70, the compressor 21, the outdoor heat exchanger 23, the low-pressure receiver 26, the four-way valve 22, the IH heater 81, the outdoor expansion valve 24, the subcooling heat exchanger 47, the subcooling expansion valve 48, the subcooling circuit 46, the gas-side stop valve 28, the liquid-side stop valve 29, an electric component unit 27*b* that makes up the outdoor unit control unit 27, and the like, are disposed in the space below the fan module 75 and above the bottom plate 73. The outdoor heat exchanger 23 has a substantially U-shape in plan view facing the rear and both right and left sides within a part of the casing 70 below the fan module 75 and substantially forms the rear and both right and left sides of the casing 70. The outdoor heat exchanger 23 is disposed on the bottom plate 73 along the left-side edge portion, rear-side edge portion and right-side edge portion of the bottom plate 73. The electric component unit 27*b* is provided so as to be fixed to the rear side of the right-side part in the front panel 71.

The fan module 75 is provided above the outdoor heat exchanger 23, and includes the outdoor fan 25, a bell mouth (not shown), and the like. The outdoor fan 25 is disposed in such an orientation that the rotation axis coincides with the vertical direction.

With the above structure, air flow formed by the outdoor fan 25 passes from around the outdoor heat exchanger 23 through the outdoor heat exchanger 23 and flows into the casing 70, and is discharged upward via an air outlet 76 provided so as to extend through in an up-down direction at the upper end surface of the casing 70.

Figure 7L:
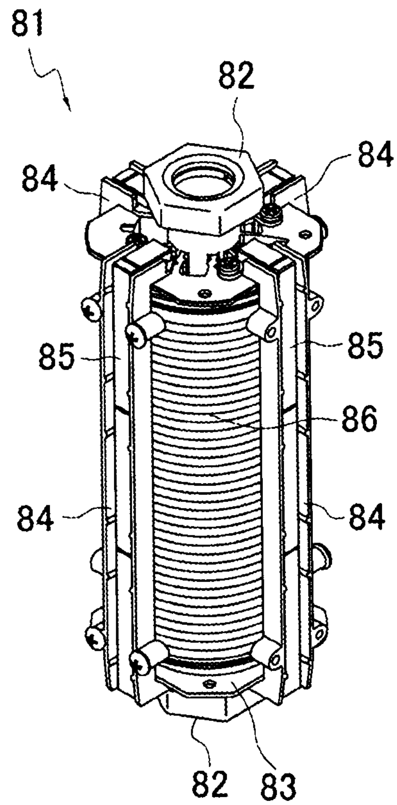
FIG. 7L is a schematic appearance perspective view of an IH heater of the technique of seventh group.
Figure 7M:
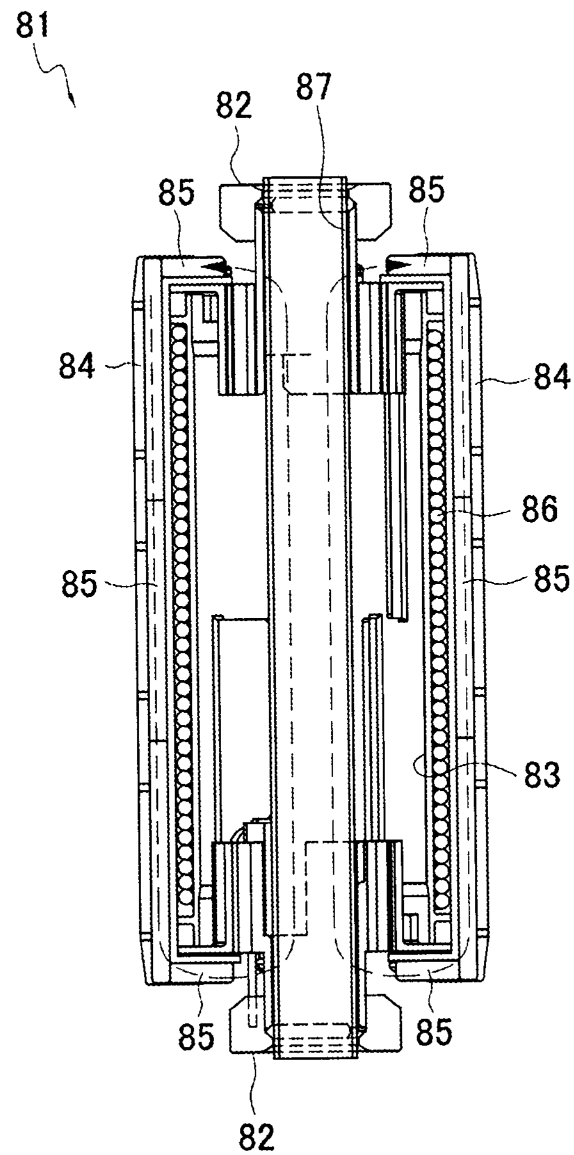
FIG. 7M is a schematic cross-sectional view of the IH heater of the technique of seventh group.

Hereinafter, the detailed structure of the IH heater 81 will be described below with reference to the appearance perspective view of FIG. 7L and the cross-sectional view of FIG. 7M.

The IH heater 81 includes a pipe portion 87, fixing members 82, a cylindrical member 83, ferrite cases 84, ferrite members 85, a coil 86, and the like. The pipe portion 87 is made of a metal, and both ends are fixedly coupled to the refrigerant pipes that make up the refrigerant circuit 10 by welding, or the like. Although not limited, the pipe portion 87 may be made such that an inner part is made of a copper alloy and an outer part is made of iron. A portion that heats refrigerant with the IH heater 81 in the refrigerant circuit 10 is not limited, and, in the present embodiment, the IH heater 81 is provided so as to be able to heat a portion from one of connection ports of the four-way valve 22 to the low-pressure receiver 26. The cylindrical member 83 is a resin member. The pipe portion 87 is located inside the cylindrical member 83. The coil 86 is wound around the outer periphery of the cylindrical member 83. Both ends of the coil 86 are connected to an electric power supply unit (not shown), and the output is controlled by the outdoor unit control unit 27. The cylindrical member 83 around which the coil 86 is wound is fixed to the pipe portion 87 via the resin fixing members 82 provided at one end and the other end of the pipe portion 87. Thus, the pipe portion 87 is located inside the coil 86 wound around the cylindrical member 83. The plurality of resin ferrite cases 84 extending along the longitudinal direction of the pipe portion 87 are attached to the outer side of the cylindrical member 83. Each ferrite case 84 accommodates the plurality of ferrite members 85 arranged in a direction along the longitudinal direction of the pipe portion 87. Of the plurality of ferrite members 85, the ferrite members 85 disposed at both end portions in the longitudinal direction of the pipe portion 87 are provided so as to approach the pipe portion 87 side.

In the above configuration, when high-frequency current is supplied to the coil 86 of the IH heater 81, magnetic flux can be generated around the coil 86. When the magnetic flux penetrates through the pipe portion 87, eddy current is induced in the pipe portion 87, and the pipe portion 87 generates heat by its own electric resistance. Thus, refrigerant passing inside the pipe portion 87 can be heated. Magnetic flux generated outside the coil 86 can be mainly caused to pass through the ferrite members 85 (see the dashed-line arrows).

The above IH heater 81 has a rated electric power consumption of lower than or equal to 300 W and preferably higher than or equal to 200 W.

In the air conditioner 1*b* according to the third embodiment, instead of the indoor unit in the above-described first embodiment, a first indoor unit 30 and a second indoor unit 35 are provided in parallel with each other.

The first indoor unit 30, as well as the indoor unit 30 in the above-described first embodiment, includes a first indoor heat exchanger 31, a first indoor fan 32, and a first indoor unit control unit 34, and further includes a first indoor expansion valve 33 at the liquid side of the first indoor heat exchanger 31. The first indoor expansion valve 33 is able to control the valve opening degree.

The second indoor unit 35, as well as the first indoor unit 30, includes a second indoor heat exchanger 36, a second indoor fan 37, a second indoor unit control unit 39, and a second indoor expansion valve 38 provided at the liquid side of the second indoor heat exchanger 36. The second indoor expansion valve 38 is able to control the valve opening degree.

In this way, in the air conditioner 1*b* according to the third embodiment in which the plurality of indoor units each including the indoor expansion valve and the up-blow type outdoor unit is provided, the internal volume (the volume of fluid that can be filled inside) of the outdoor heat exchanger 23 of the outdoor unit 20 is preferably greater than or equal to 5.5 L and less than or equal to 38 L.

The controller 7 of the third embodiment is made up of the outdoor unit control unit 27, the first indoor unit control unit 34, and the second indoor unit control unit 39 communicably connected to one another.

In the above air conditioner 1*b*, in the cooling operation mode, the outdoor expansion valve 24 is controlled such that the degree of subcooling of refrigerant that passes through the liquid-side outlet of the outdoor heat exchanger 23 satisfies a predetermined condition. In the cooling operation mode, the subcooling expansion valve 48 is controlled such that the degree of superheating of refrigerant that the compressor 21 takes in satisfies a predetermined condition. In the cooling operation mode, the first indoor expansion valve 33 and the second indoor expansion valve 38 are controlled to a fully open state.

In the heating operation mode, the first indoor expansion valve 33 is controlled such that the degree of subcooling of refrigerant that passes through the liquid-side outlet of the first indoor heat exchanger 31 satisfies a predetermined condition. Similarly, the second indoor expansion valve 38 is also controlled such that the degree of subcooling of refrigerant that passes through the liquid-side outlet of the second indoor heat exchanger 36 satisfies a predetermined condition. In the heating operation mode, the outdoor expansion valve 45 is controlled such that the degree of superheating of refrigerant that the compressor 21 takes in satisfies a predetermined condition. In the heating operation mode, the subcooling expansion valve 48 is controlled such that the degree of superheating of refrigerant that the compressor 21 takes in satisfies a predetermined condition.

In the above-described air conditioner 1*b* according to the third embodiment as well, as well as the air conditioner 1 according to the first embodiment, since refrigerant containing 1,2-difluoroethylene is used, a GWP can be sufficiently reduced.

Since the outdoor unit 20 of the air conditioner 1*b* includes the IH heater 81, refrigerant flowing through the portion where the IH heater 81 is provided in the refrigerant circuit 10 can be heated. By heating refrigerant flowing at the suction side of the compressor 21, refrigerant that is taken into the compressor 21 can be more reliably changed into a gas state, so liquid compression in the compressor 21 can be reduced.

By using the IH heater 81 of which the rated electric power consumption is higher than or equal to 200 W, for the outdoor unit 20 having a capacity to such a degree like the up-blow type as well, the function of the IH heater 81 can be sufficiently exercised appropriately for the capacity.

In addition, by using the IH heater 81 of which the rated electric power consumption is lower than or equal to 300 W, even when refrigerant containing 1,2-difluoroethylene leaks in the outdoor unit 20, a situation in which the IH heater 81 becomes an ignition source can be suppressed.

(7-4) Fourth Embodiment

An air conditioner or an outdoor unit may be made up of a combination of the above-described first embodiment to third embodiment and modifications as needed. For example, the outdoor unit of the second embodiment may further include a drain pan heater and an IH heater. In this case, it is allowable that the rated electric power consumption of each electric heater does not exceed a predetermined value. Alternatively, the total of the rated electric power consumptions of the electric heater may be configured to be lower than or equal to 300 W.

(8) Embodiment of the Technique of Eighth Group

(8-1) First Embodiment

Figure 8A:
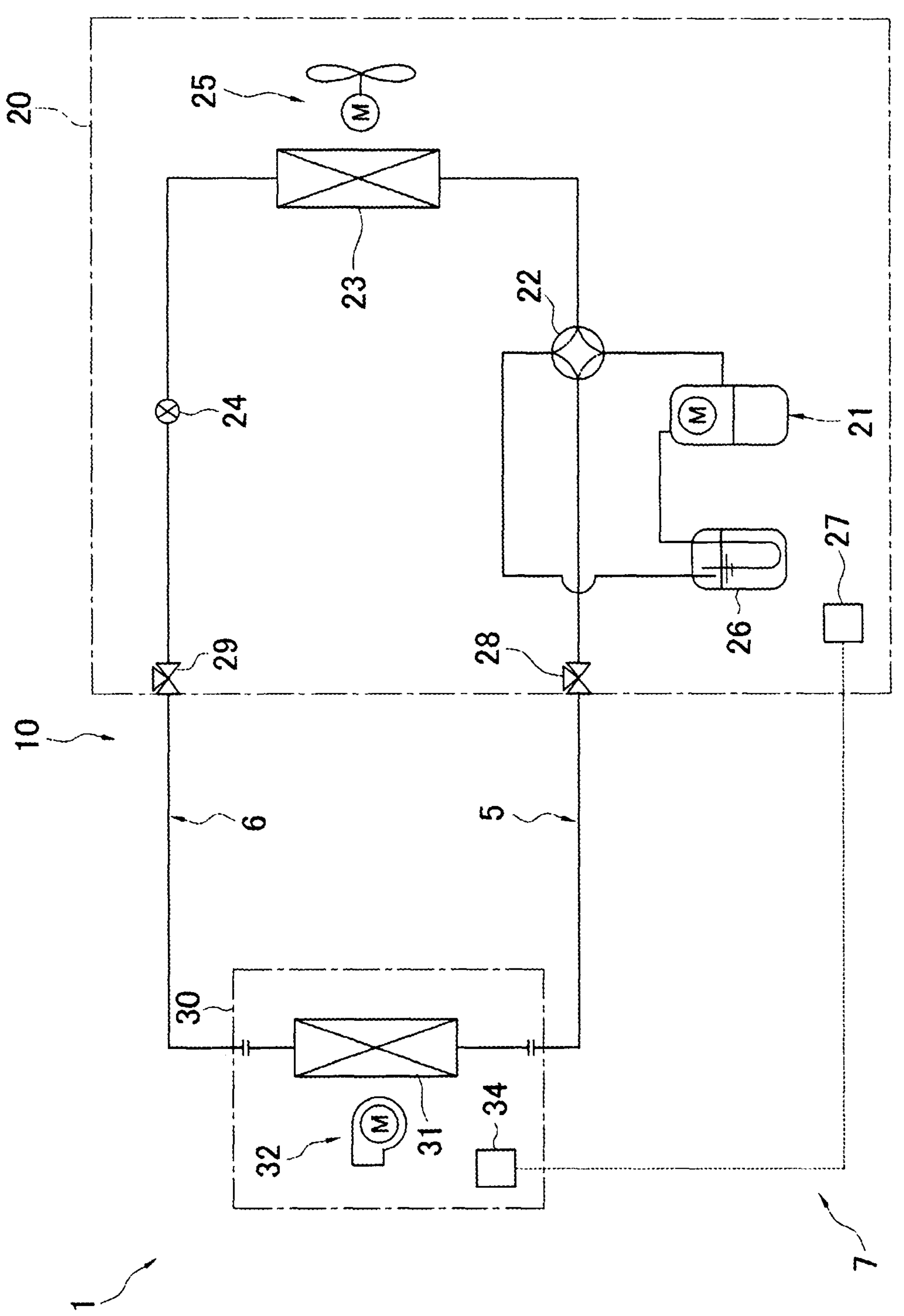
FIG. 8A is a schematic configuration diagram of a refrigerant circuit according to a first embodiment of the technique of eighth group.
Figure 8B:
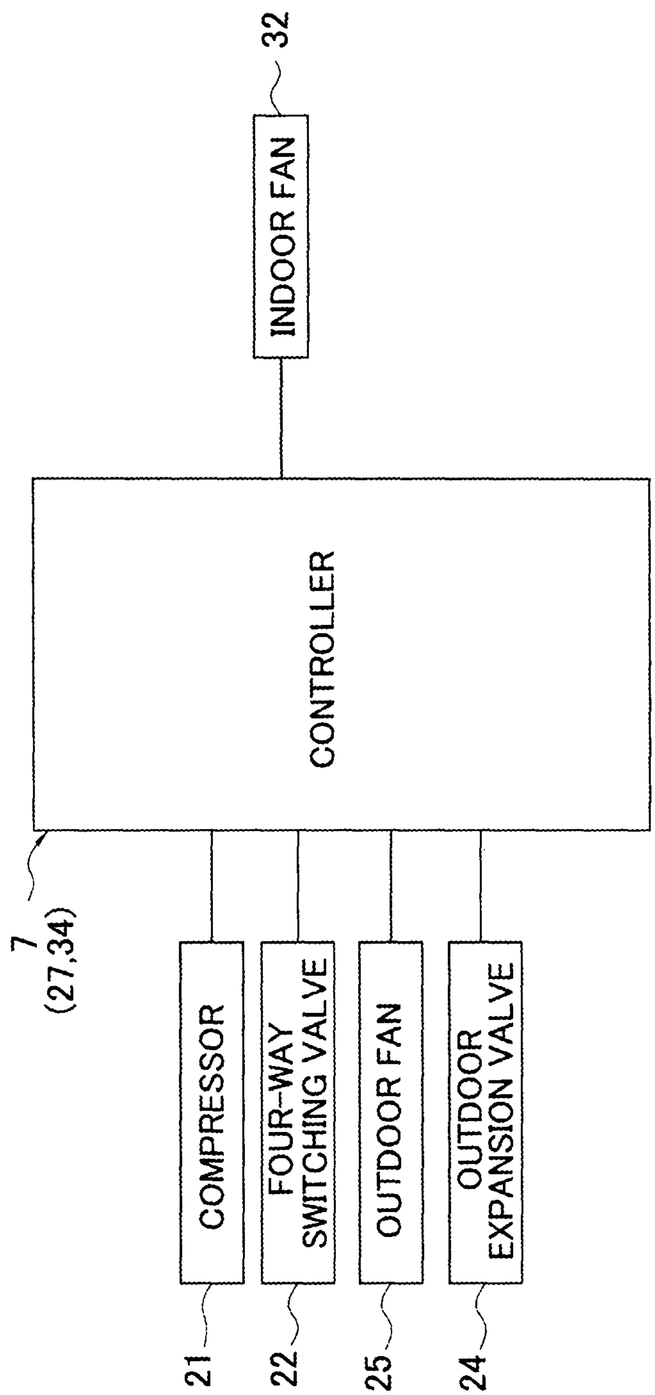
FIG. 8B is a schematic control block configuration diagram of a refrigeration cycle apparatus according to the first embodiment of the technique of eighth group.

An air conditioning apparatus 1 serving as a refrigeration cycle apparatus according to a first embodiment is described below with reference to FIG. 8A which is a schematic configuration diagram of a refrigerant circuit and FIG. 8B which is a schematic control block configuration diagram.

The air conditioning apparatus 1 is an apparatus that controls the condition of air in a subject space by performing a vapor compression refrigeration cycle.

The air conditioning apparatus 1 mainly includes an outdoor unit 20, an indoor unit 30, a liquid-side connection pipe 6 and a gas-side connection pipe 5 that connect the outdoor unit 20 and the indoor unit 30 to each other, a remote controller (not illustrated) serving as an input device and an output device, and a controller 7 that controls operations of the air conditioning apparatus 1.

The air conditioning apparatus 1 performs a refrigeration cycle in which a refrigerant enclosed in a refrigerant circuit 10 is compressed, cooled or condensed, decompressed, heated or evaporated, and then compressed again. In the present embodiment, the refrigerant circuit 10 is filled with a refrigerant for performing a vapor compression refrigeration cycle. The refrigerant is a refrigerant containing 1,2-difluoroethylene, and can use any one of the above-described refrigerants A to D. The air conditioning apparatus 1 provided with only one indoor unit 30 may have, for example, a rated cooling capacity of 2.0 kW or more and 17.0 kW or less. In particular, in the present embodiment provided with a low-pressure receiver 26 being a refrigerant container, the rated cooling capacity is preferably 4.0 kW or more and 17.0 kW or less.

(8-1-1) Outdoor Unit 20

The outdoor unit 20 is connected to the indoor unit 30 via the liquid-side connection pipe 6 and the gas-side connection pipe 5, and constitutes a part of the refrigerant circuit 10. The outdoor unit 20 mainly includes a compressor 21, a four-way switching valve 22, an outdoor heat exchanger 23, an outdoor expansion valve 24, an outdoor fan 25, the low-pressure receiver 26, a liquid-side shutoff valve 29, and a gas-side shutoff valve 28.

The compressor 21 is a device that compresses the refrigerant with a low pressure in the refrigeration cycle until the refrigerant becomes a high-pressure refrigerant. In this case, a compressor having a hermetically sealed structure in which a compression element (not illustrated) of positive-displacement type, such as rotary type or scroll type, is rotationally driven by a compressor motor is used as the compressor 21. The compressor motor is for changing the capacity, and has an operational frequency that can be controlled by an inverter. Note that the compressor 21 is provided with an additional accumulator (not illustrated) on the suction side.

The four-way switching valve 22, by switching the connection state, can switch the state between a cooling operation connection state in which the discharge side of the compressor 21 is connected to the outdoor heat exchanger 23 and the suction side of the compressor 21 is connected to the gas-side shutoff valve 28, and a heating operation connection state in which the discharge side of the compressor 21 is connected to the gas-side shutoff valve 28 and the suction side of the compressor 21 is connected to the outdoor heat exchanger 23.

The outdoor heat exchanger 23 is a heat exchanger that functions as a condenser for the high-pressure refrigerant in the refrigeration cycle during cooling operation and that functions as an evaporator for the low-pressure refrigerant in the refrigeration cycle during heating operation. Note that, for the inner capacity (the volume of a fluid with which the inside can be filled) of the outdoor heat exchanger 23, when the refrigerant circuit 10 is provided with a refrigerant container (for example, a low-pressure receiver or a high-pressure receiver, excluding the accumulator belonging to the compressor) like the present embodiment, the inner capacity is preferably 1.4 L or more and less than 5.0 L. Moreover, like the present embodiment, for the inner capacity (the volume of a fluid with which the inside can be filled) of the outdoor heat exchanger 23 included in a trunk outdoor unit 20 provided with only one outdoor fan 25, the inner capacity is preferably 0.4 L or more and less than 3.5 L.

The outdoor fan 25 sucks outdoor air into the outdoor unit 20, causes the outdoor air to exchange heat with the refrigerant in the outdoor heat exchanger 23, and then generates an air flow to be discharged to the outside. The outdoor fan 25 is rotationally driven by an outdoor fan motor.

The valve opening degree of the outdoor expansion valve 24 is controllable and the outdoor expansion valve 24 is provided between a liquid-side end portion of the outdoor heat exchanger 23 and the liquid-side shutoff valve 29.

The low-pressure receiver 26 is a container that is provided between one of the connecting ports of the four-way switching valve 22 and the suction side of the compressor 21 and that can store the refrigerant.

The liquid-side shutoff valve 29 is a manual valve disposed in a connection portion of the outdoor unit 20 with respect to the liquid-side connection pipe 6.

The gas-side shutoff valve 28 is a manual valve disposed in a connection portion of the outdoor unit 20 with respect to the gas-side connection pipe 5.

The outdoor unit 20 includes an outdoor-unit control unit 27 that controls operations of respective sections constituting the outdoor unit 20. The outdoor-unit control unit 27 includes a microcomputer including a CPU, a memory, and so forth. The outdoor-unit control unit 27 is connected to an indoor-unit control unit 34 of each indoor unit 30 via a communication line, and transmits and receives a control signal and so forth. The outdoor-unit control unit 27 is electrically connected to various sensors (not illustrated) and receives signals from the respective sensors.

(8-1-2) Indoor Unit 30

The indoor unit 30 is installed on a wall surface or a ceiling in a room that is a subject space. The indoor unit 30 is connected to the outdoor unit 20 via the liquid-side connection pipe 6 and the gas-side connection pipe 5, and constitutes a part of the refrigerant circuit 10.

The indoor unit 30 includes an indoor heat exchanger 31 and an indoor fan 32.

The liquid side of the indoor heat exchanger 31 is connected to the liquid-side connection pipe 6, and the gas-side end thereof is connected to the gas-side connection pipe 5. The indoor heat exchanger 31 is a heat exchanger that functions as an evaporator for the low-pressure refrigerant in the refrigeration cycle during cooling operation and that functions as a condenser for the high-pressure refrigerant in the refrigeration cycle during heating operation.

The indoor fan 32 sucks indoor air into the indoor unit 30, causes the indoor air to exchange heat with the refrigerant in the indoor heat exchanger 31, and then generates an air flow to be discharged to the outside. The indoor fan 32 is rotationally driven by an indoor fan motor.

The indoor unit 30 includes an indoor-unit control unit 34 that controls operations of respective sections constituting the indoor unit 30. The indoor-unit control unit 34 includes a microcomputer including a CPU, a memory, and so forth. The indoor-unit control unit 34 is connected to the outdoor-unit control unit 27 via a communication line, and transmits and receives a control signal and so forth.

The indoor-unit control unit 34 is electrically connected to various sensors (not illustrated) provided in the indoor unit 30 and receives signals from the respective sensors.

(8-1-3) Details of Controller 7

In the air conditioning apparatus 1, the outdoor-unit control unit 27 is connected to the indoor-unit control unit 34 via the communication line, thereby constituting the controller 7 that controls operations of the air conditioning apparatus 1.

The controller 7 mainly includes a CPU (central processing unit) and a memory, such as a ROM or a RAM. Various processing and control by the controller 7 are provided when respective sections included in the outdoor-unit control unit 27 and/or the indoor-unit control unit 34 function together.

(8-1-4) Operating Modes

Operating modes are described below.

The operating modes include a cooling operating mode and a heating operating mode.

The controller 7 determines whether the operating mode is the cooling operating mode or the heating operating mode and executes the determined mode based on an instruction received from the remote controller or the like.

(8-1-4-1) Cooling Operating Mode

In the air conditioning apparatus 1, in the cooling operating mode, the connection state of the four-way switching valve 22 is in the cooling operation connection state in which the discharge side of the compressor 21 is connected to the outdoor heat exchanger 23 and the suction side of the compressor 21 is connected to the gas-side shutoff valve 28, and the refrigerant filled in the refrigerant circuit 10 is circulated mainly sequentially in the compressor 21, the outdoor heat exchanger 23, the outdoor expansion valve 24, and the indoor heat exchanger 31.

More specifically, in the refrigerant circuit 10, when the cooling operating mode is started, the refrigerant is sucked into the compressor 21, compressed, and then discharged.

The compressor 21 performs capacity control in accordance with a cooling load required for the indoor unit 30. The capacity control is not limited and may be, for example, control in which a target value of suction pressure is set in accordance with the cooling load required for the indoor unit 30, and the operating frequency of the compressor 21 is controlled such that the suction pressure becomes the target value.

The gas refrigerant discharged from the compressor 21 passes through the four-way switching valve 22 and flows into the gas-side end of the outdoor heat exchanger 23.

The gas refrigerant which has flowed into the gas-side end of the outdoor heat exchanger 23 exchanges heat with outdoor-side air supplied by the outdoor fan 25, hence is condensed and turns into a liquid refrigerant in the outdoor heat exchanger 23, and flows out from the liquid-side end of the outdoor heat exchanger 23.

The refrigerant which has flowed out from the liquid-side end of the outdoor heat exchanger 23 is decompressed when passing through the outdoor expansion valve 24. Note that the outdoor expansion valve 24 is controlled such that the degree of subcooling of the refrigerant flowing through the liquid-side outlet of the outdoor heat exchanger 23 satisfies a predetermined condition. The method of controlling the valve opening degree of the outdoor expansion valve 24 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the outdoor expansion valve 24 passes through the liquid-side shutoff valve 29 and the liquid-side connection pipe 6, and flows into the indoor unit 30.

The refrigerant which has flowed into the indoor unit 30 flows into the indoor heat exchanger 31; exchanges heat with the indoor air supplied by the indoor fan 32, hence is evaporated, and turns into a gas refrigerant in the indoor heat exchanger 31; and flows out from the gas-side end of the indoor heat exchanger 31. The gas refrigerant which has flowed out from the gas-side end of the indoor heat exchanger 31 flows to the gas-side connection pipe 5.

The refrigerant which has flowed through the gas-side connection pipe 5 passes through the gas-side shutoff valve 28 and the four-way switching valve 22, and is sucked into the compressor 21 again.

(8-1-4-2) Heating Operating Mode

In the air conditioning apparatus 1, in the heating operating mode, the connection state of the four-way switching valve 22 is in the heating operation connection state in which the discharge side of the compressor 21 is connected to the gas-side shutoff valve 28 and the suction side of the compressor 21 is connected to the outdoor heat exchanger 23, and the refrigerant filled in the refrigerant circuit 10 is circulated mainly sequentially in the compressor 21, the indoor heat exchanger 31, the outdoor expansion valve 24, and the outdoor heat exchanger 23.

More specifically, in the refrigerant circuit 10, when the heating operating mode is started, the refrigerant is sucked into the compressor 21, compressed, and then discharged.

The compressor 21 performs capacity control in accordance with a heating load required for the indoor unit 30. The capacity control is not limited and may be, for example, control in which a target value of discharge pressure is set in accordance with the heating load required for the indoor unit 30, and the operating frequency of the compressor 21 is controlled such that the discharge pressure becomes the target value.

The gas refrigerant discharged from the compressor 21 flows through the four-way switching valve 22 and the gas-side connection pipe 5, and then flows into the indoor unit 30.

The refrigerant which has flowed into the indoor unit 30 flows into the gas-side end of the indoor heat exchanger 31; exchanges heat with the indoor air supplied by the indoor fan 32, hence is condensed, and turns into a refrigerant in a gas-liquid two-phase state or a liquid refrigerant in the indoor heat exchanger 31; and flows out from the liquid-side end of the indoor heat exchanger 31. The refrigerant which has flowed out from the liquid-side end of the indoor heat exchanger 31 flows to the liquid-side connection pipe 6.

The refrigerant which has flowed through the liquid-side connection pipe 6 is decompressed to a low pressure in the refrigeration cycle at the liquid-side shutoff valve 29 and the outdoor expansion valve 24. Note that the outdoor expansion valve 24 is controlled such that the degree of subcooling of the refrigerant flowing through the liquid-side outlet of the indoor heat exchanger 31 satisfies a predetermined condition. The method of controlling the valve opening degree of the outdoor expansion valve 24 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the outdoor expansion valve 24 flows into the liquid-side end of the outdoor heat exchanger 23.

The refrigerant which has flowed in from the liquid-side end of the outdoor heat exchanger 23 exchanges heat with the outdoor air supplied by the outdoor fan 25, hence is evaporated and turns into a gas refrigerant in the outdoor heat exchanger 23, and flows out from the gas-side end of the outdoor heat exchanger 23.

The refrigerant which has flowed out from the gas-side end of the outdoor heat exchanger 23 passes through the four-way switching valve 22 and is sucked into the compressor 21 again.

(8-1-5) Refrigerant Enclosure Amount

In the air conditioning apparatus 1 provided with only the above-described one indoor unit 30, the refrigerant circuit 10 is filled with the refrigerant by an enclosure amount of 160 g or more and 560 g or less per 1 kW of refrigeration capacity. In particular, in the air conditioning apparatus 1 provided with the low-pressure receiver 26 as a refrigerant container, the refrigerant circuit 10 is filled with the refrigerant by an enclosure amount of 260 g or more and 560 g or less per 1 kW of refrigeration capacity.

(8-1-6) Characteristics of First Embodiment

For example, in a refrigeration cycle apparatus using a R32 refrigerant which has been frequently used, when the filling amount of R32 is too small, an insufficiency of the refrigerant tends to decrease cycle efficiency, resulting in an increase in the LCCP; and when the filling amount of R32 is too large, the impact of the GWP tends to increase, resulting in an increase in the LCCP.

In contrast, the air conditioning apparatus 1 provided with only one indoor unit 30 according to the present embodiment uses any one of the above-described refrigerants A to D containing 1,2-difluoroethylene as the refrigerant, and the refrigerant enclosure amount is set such that the enclosure amount per 1 kW of refrigeration capacity is 160 g or more and 560 g or less (in particular, 260 g or more and 560 g or less as the low-pressure receiver 26 is provided).

Accordingly, since a refrigerant having a GWP sufficiently smaller than R32 is used and the enclosure amount per 1 kW of refrigeration capacity is not more than 560 g, the LCCP can be kept low. Moreover, even when a refrigerant having a heat-transfer capacity lower than R32 is used, since the enclosure amount per 1 kW of refrigeration capacity is 160 g or more (in particular, 260 g or more as the low-pressure receiver 26 is provided), a decrease in cycle efficiency due to an insufficiency of the refrigerant is suppressed, thereby suppressing an increase in the LCCP. As described above, when a heat cycle is performed using a sufficiently small GWP, the LCCP can be kept low.

(8-1-7) Modification A of First Embodiment

In the above-described first embodiment, the example of the air conditioning apparatus provided with the low-pressure receiver on the suction side of the compressor 21 has been described; however, the air conditioning apparatus may be one not be provided with a refrigerant container (a low-pressure receiver, a high-pressure receiver, or the like, excluding an accumulator belonging to a compressor) in a refrigerant circuit.

In this case, the refrigerant circuit 10 is filled with the refrigerant such that the refrigerant enclosure amount per 1 kW of refrigeration capacity is 160 g or more and 400 g or less. Moreover, in this case, the inner capacity (the volume of a fluid with which the inside can be filled) of the outdoor heat exchanger 23 is preferably 0.4 L or more and 2.5 L or less.

(8-1-8) Modification B of First Embodiment

In the above-described first embodiment, the example of the air conditioning apparatus provided with only one indoor unit has been described; however, the air conditioning apparatus may be one provided with a plurality of indoor units (without an indoor expansion valve) connected in parallel to one another.

In this case, the refrigerant circuit 10 is filled with the refrigerant such that the refrigerant enclosure amount per 1 kW of refrigeration capacity is 260 g or more and 560 g or less. Moreover, in this case, the inner capacity (the volume of a fluid with which the inside can be filled) of the outdoor heat exchanger 23 is preferably 1.4 L or more and less than 5.0 L.

(8-1-9) Modification C of First Embodiment

In the above-described first embodiment, the example of the air conditioning apparatus having the trunk outdoor unit 20 provided with only one outdoor fan 25 has been described; however, the air conditioning apparatus may be one having the trunk outdoor unit 20 provided with two outdoor fans 25.

In this case, the refrigerant circuit 10 is filled with the refrigerant such that the refrigerant enclosure amount per 1 kW of refrigeration capacity is 350 g or more and 540 g or less. Moreover, in this case, the inner capacity (the volume of a fluid with which the inside can be filled) of the outdoor heat exchanger 23 is preferably 3.5 L or more and 7.0 L or less.

(8-2) Second Embodiment

Figure 8C:
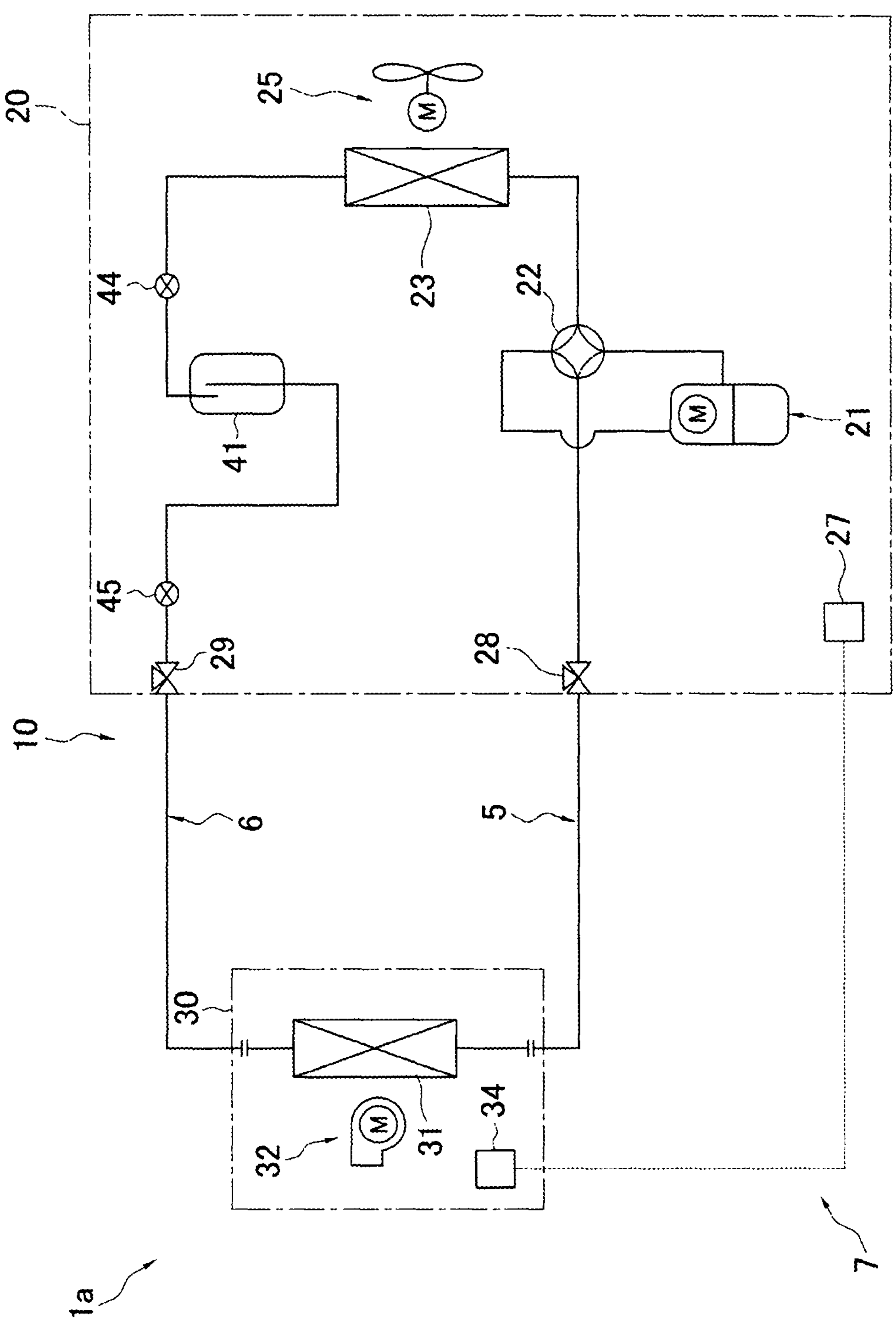
FIG. 8C is a schematic configuration diagram of a refrigerant circuit according to a second embodiment of the technique of eighth group.
Figure 8D:
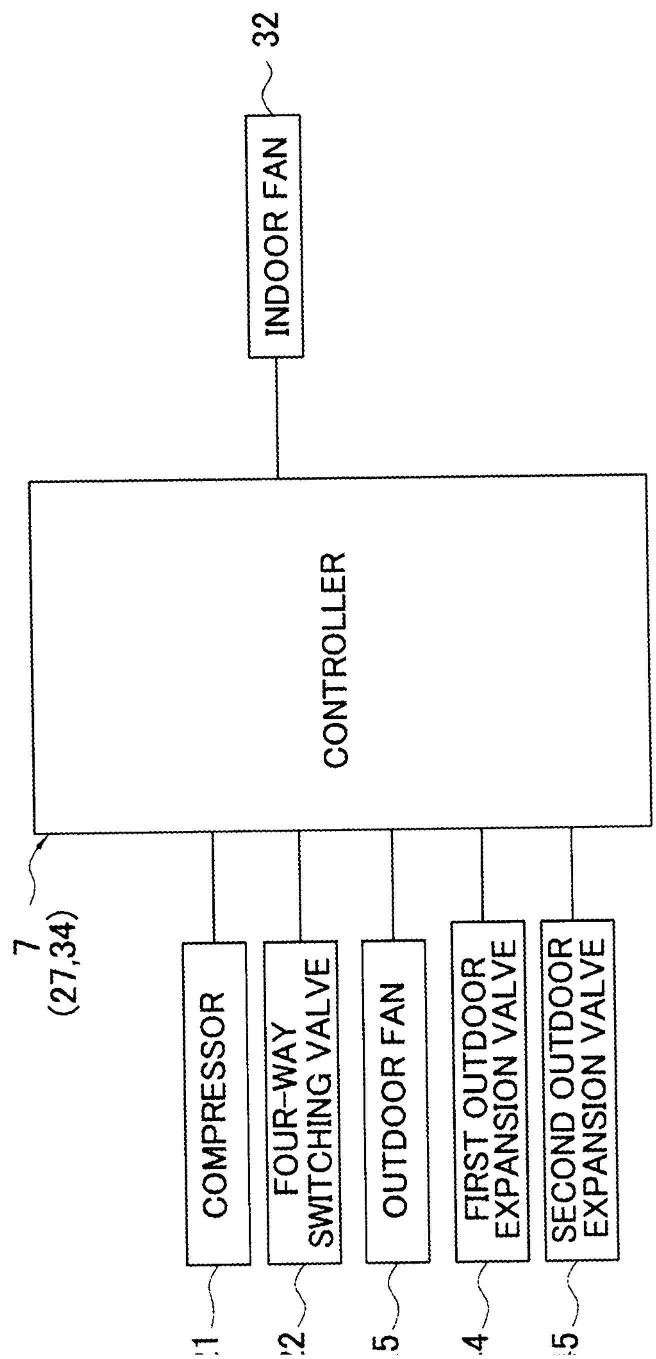
FIG. 8D is a schematic control block configuration diagram of a refrigeration cycle apparatus according to the second embodiment of the technique of eighth group.

An air conditioning apparatus 1*a* serving as a refrigeration cycle apparatus according to a second embodiment is described below with reference to FIG. 8C which is a schematic configuration diagram of a refrigerant circuit and FIG. 8D which is a schematic control block configuration diagram.

The air conditioning apparatus 1*a* according to the second embodiment is mainly described below, and portions different from the air conditioning apparatus 1 according to the first embodiment are mainly described.

Also in the air conditioning apparatus 1*a*, the refrigerant circuit 10 is filled with, as a refrigerant for performing a vapor compression refrigeration cycle, a refrigerant which contains 1,2-difluoroethylene, and which is any one of the above-described refrigerants A to D.

In the outdoor unit 20 of the air conditioning apparatus 1*a*, a first outdoor expansion valve 44, an intermediate-pressure receiver 41, and a second outdoor expansion valve 45 are sequentially provided between the liquid side of the outdoor heat exchanger 23 and the liquid-side shutoff valve 29, instead of the outdoor expansion valve 24 of the outdoor unit 20 according to the above-described first embodiment. Moreover, the low-pressure receiver 26 of the outdoor unit 20 according to the first embodiment is not provided in the outdoor unit 20 according to the second embodiment.

The valve opening degrees of the first outdoor expansion valve 44 and the second outdoor expansion valve 45 are controllable.

The intermediate-pressure receiver 41 is a container in which both an end portion of a pipe extending from the first outdoor expansion valve 44 side and an end portion of a pipe extending from the second outdoor expansion valve 45 side are located in the inner space thereof and that can store the refrigerant.

Note that, since the air conditioning apparatus 1*a* according to the second embodiment is provided with the intermediate-pressure receiver 41 that is a refrigerant container in the refrigerant circuit 10, the inner capacity (the volume of a fluid with which the inside can be filled) of the outdoor heat exchanger 23 included in the outdoor unit 20 is preferably 1.4 L or more and less than 5.0 L. Moreover, like the present embodiment, the inner capacity (the volume of a fluid with which the inside can be filled) of the outdoor heat exchanger 23 included in a trunk outdoor unit 20 provided with only one outdoor fan 25 is preferably 0.4 L or more and less than 3.5 L.

In the air conditioning apparatus 1*a*, in the cooling operating mode, the first outdoor expansion valve 44 is controlled such that the degree of subcooling of the refrigerant flowing through the liquid-side outlet of the outdoor heat exchanger 23 satisfies a predetermined condition. Also, in the cooling operating mode, the second outdoor expansion valve 45 is controlled such that the degree of superheating of the refrigerant to be sucked by the compressor 21 satisfies a predetermined condition. Note that, in the cooling operating mode, the second outdoor expansion valve 45 may be controlled such that the temperature of the refrigerant discharged from the compressor 21 becomes a predetermined temperature, or may be controlled such that the degree of superheating of the refrigerant discharged from the compressor 21 satisfies a predetermined condition.

Also, in the heating operating mode, the second outdoor expansion valve 45 is controlled such that the degree of subcooling of the refrigerant passing through the liquid-side outlet of the indoor heat exchanger 31 satisfies a predetermined condition. Also, in the cooling operating mode, the first outdoor expansion valve 44 is controlled such that the degree of superheating of the refrigerant to be sucked by the compressor 21 satisfies a predetermined condition. Note that, in the heating operating mode, the first outdoor expansion valve 44 may be controlled such that the temperature of the refrigerant discharged from the compressor 21 becomes a predetermined temperature, or may be controlled such that the degree of superheating of the refrigerant discharged from the compressor 21 satisfies a predetermined condition.

In the air conditioning apparatus 1*a* provided with only the above-described one indoor unit 30, the refrigerant circuit 10 is filled with the refrigerant by an enclosure amount of 160 g or more and 560 g or less per 1 kW of refrigeration capacity. In particular, in the air conditioning apparatus 1 provided with the intermediate-pressure receiver 41 as a refrigerant container, the refrigerant circuit 10 is filled with the refrigerant by an enclosure amount of 260 g or more and 560 g or less per 1 kW of refrigeration capacity.

The air conditioning apparatus 1 provided with only one indoor unit 30 may have a rated cooling capacity of 2.2 kW or more and 16.0 kW or less, or more preferably 4.0 kW or more and 16.0 kW or less.

Even in the air conditioning apparatus 1*a* according to the second embodiment, like the air conditioning apparatus 1 according to the first embodiment, when a heat cycle is performed using a sufficiently small GWP, the LCCP can be kept low.

(8-2-1) Modification A of Second Embodiment

In the above-described second embodiment, the example of the air conditioning apparatus provided with only one indoor unit has been described; however, the air conditioning apparatus may be one provided with a plurality of indoor units (without an indoor expansion valve) connected in parallel to one another.

In this case, the refrigerant circuit 10 is filled with the refrigerant such that the refrigerant enclosure amount per 1 kW of refrigeration capacity is 260 g or more and 560 g or less. Moreover, in this case, the inner capacity (the volume of a fluid with which the inside can be filled) of the outdoor heat exchanger 23 is preferably 1.4 L or more and less than 5.0 L.

(8-2-2) Modification B of Second Embodiment

In the above-described second embodiment, the example of the air conditioning apparatus having the trunk outdoor unit 20 provided with only one outdoor fan 25 has been described; however, the air conditioning apparatus may be one having the trunk outdoor unit 20 provided with two outdoor fans 25.

In this case, the refrigerant circuit 10 is filled with the refrigerant such that the refrigerant enclosure amount per 1 kW of refrigeration capacity is 350 g or more and 540 g or less. Moreover, in this case, the inner capacity (the volume of a fluid with which the inside can be filled) of the outdoor heat exchanger 23 is preferably 3.5 L or more and 7.0 L or less.

(8-3) Third Embodiment

Figure 8E:
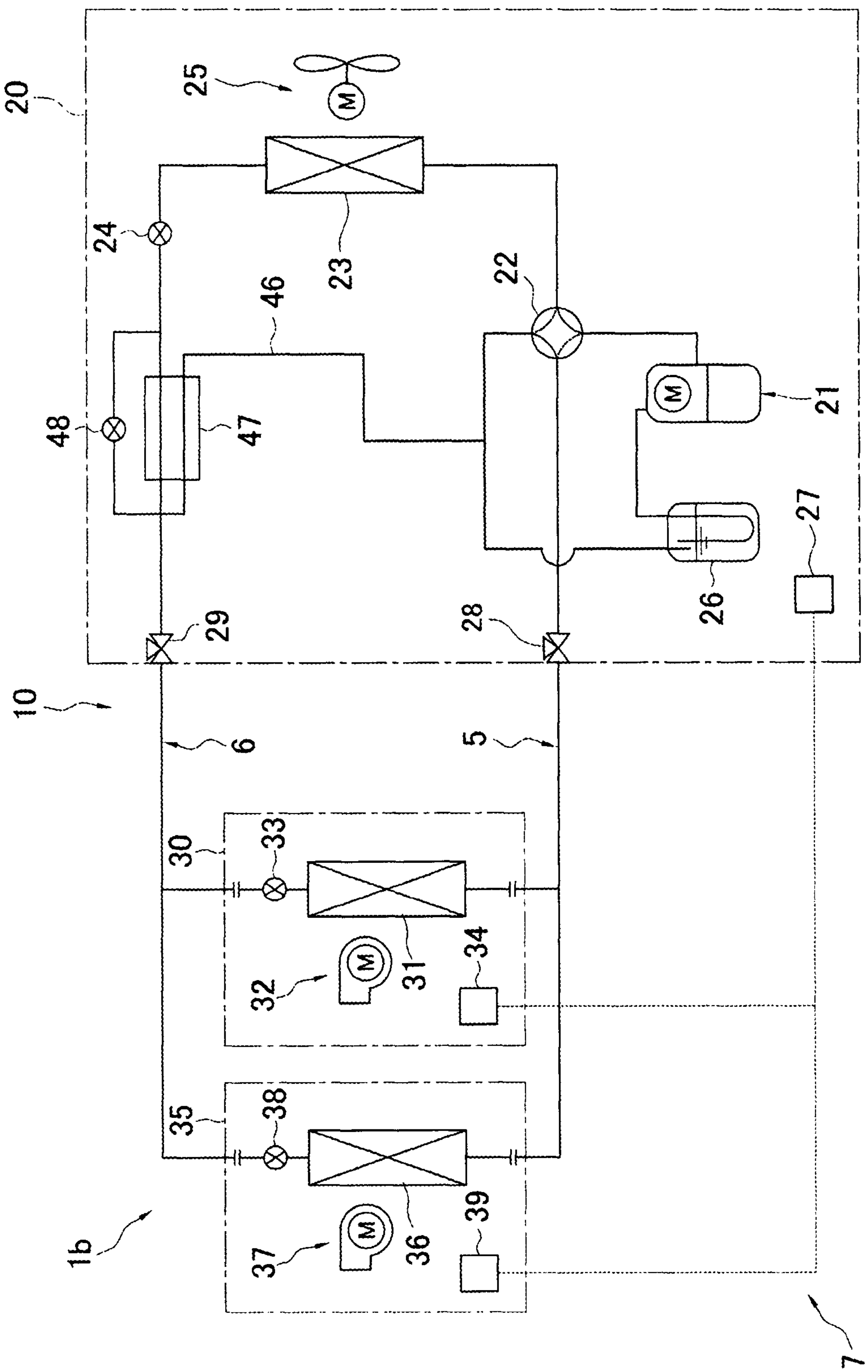
FIG. 8E is a schematic configuration diagram of a refrigerant circuit according to a third embodiment of the technique of eighth group.
Figure 8F:
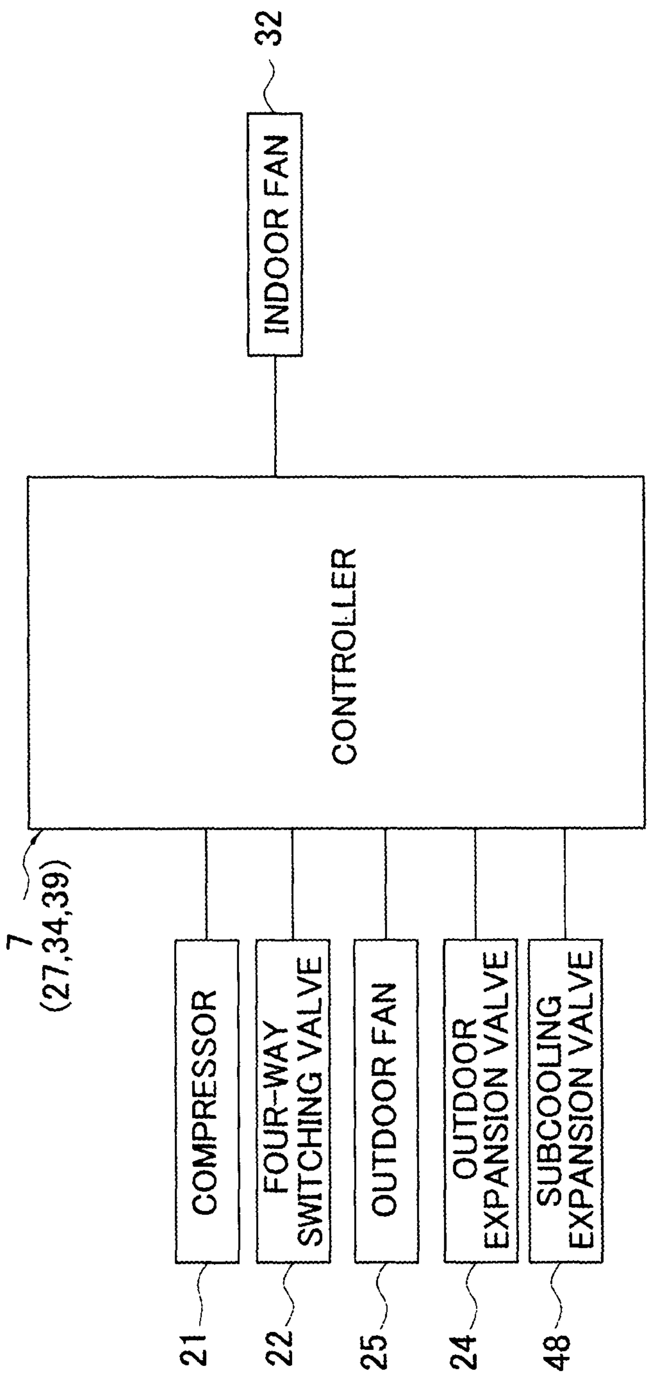
FIG. 8F is a schematic control block configuration diagram of a refrigeration cycle apparatus according to the third embodiment of the technique of eighth group.

An air conditioning apparatus 1*b* serving as a refrigeration cycle apparatus according to a third embodiment is described below with reference to FIG. 8E which is a schematic configuration diagram of a refrigerant circuit and FIG. 8F which is a schematic control block configuration diagram.

The air conditioning apparatus 1*b* according to the third embodiment is mainly described below, and portions different from the air conditioning apparatus 1 according to the first embodiment are mainly described.

In the air conditioning apparatus 1*b*, the refrigerant circuit 10 is filled with, as a refrigerant for performing a vapor compression refrigeration cycle, a refrigerant which contains 1,2-difluoroethylene, and which is any one of the above-described refrigerants A to D.

The outdoor unit 20 of the air conditioning apparatus 1*b* according to the third embodiment is obtained by providing a subcooling heat exchanger 47 and a subcooling circuit 46 in the outdoor unit 20 according to the first embodiment.

The subcooling heat exchanger 47 is provided between the outdoor expansion valve 24 and the liquid-side shutoff valve 29.

The subcooling circuit 46 is a circuit that is branched from a main circuit between the outdoor expansion valve 24 and the subcooling heat exchanger 47 and that extends to be joined to a midway portion extending from one of the connecting ports of the four-way switching valve 22 to the low-pressure receiver 26. The subcooling circuit 46 is provided with a subcooling expansion valve 48 that is located midway in the subcooling circuit 46 and that decompresses the refrigerant passing therethrough. The refrigerant flowing through the subcooling circuit 46 and decompressed at the subcooling expansion valve 48 exchanges heat with the refrigerant flowing through the main-circuit side in the subcooling heat exchanger 47. Thus, the refrigerant flowing through the main-circuit side is further cooled and the refrigerant flowing through the subcooling circuit 46 is evaporated.

Note that, in the air conditioning apparatus 1*b* according to the third embodiment including a plurality of indoor units each having an indoor expansion valve, the inner capacity (the volume of a fluid with which the inside can be filled) of the outdoor heat exchanger 23 included in the outdoor unit 20 is preferably 5.0 L or more and 38 L or less. In particular, when the outdoor unit 20 has a blow-out port facing a lateral side for the air which has passed through the outdoor heat exchanger 23 and is provided with two outdoor fans 25, the inner capacity (the volume of a fluid with which the inside can be filled) of the outdoor heat exchanger 23 is preferably 7.0 L or less. When the outdoor unit 20 blows out the air which has passed through the outdoor heat exchanger 23 upward, the inner capacity is preferably 5.5 L or more.

The air conditioning apparatus 1*b* according to the third embodiment includes a first indoor unit 30 and a second indoor unit 35 connected in parallel to each other, instead of the indoor unit 30 according to the first embodiment.

The first indoor unit 30 includes a first indoor heat exchanger 31, a first indoor fan 32, and a first indoor-unit control unit 34 like the indoor unit 30 according to the above-described first embodiment; and further a first indoor expansion valve 33 is provided on the liquid-side of the first indoor heat exchanger 31. The valve opening degree of the first indoor expansion valve 33 is controllable.

Similarly to the first indoor unit 30, the second indoor unit 35 includes a second indoor heat exchanger 36, a second indoor fan 37, a second indoor-unit control unit 39, and a second indoor expansion valve 38 provided on the liquid side of the second indoor heat exchanger 36. The valve opening degree of the second indoor expansion valve 38 is controllable.

A controller 7 according to the third embodiment is constituted of an outdoor-unit control unit 27, the first indoor-unit control unit 34, and the second indoor-unit control unit 39 that are communicably connected to one another.

In the cooling operating mode, the outdoor expansion valve 24 is controlled such that the degree of subcooling of the refrigerant passing through the liquid-side outlet of the outdoor heat exchanger 23 satisfies a predetermined condition. Also, in the cooling operating mode, the subcooling expansion valve 48 is controlled such that the degree of superheating of the refrigerant to be sucked by the compressor 21 satisfies a predetermined condition. Note that, in the cooling operating mode, the first indoor expansion valve 33 and the second indoor expansion valve 38 are controlled to be in a fully-opened state.

In the heating operating mode, the first indoor expansion valve 33 is controlled such that the degree of subcooling of the refrigerant passing through the liquid-side outlet of the first indoor heat exchanger 31 satisfies a predetermined condition. The second indoor expansion valve 38 is likewise controlled such that the degree of subcooling of the refrigerant flowing through the liquid-side outlet of the second indoor heat exchanger 36 satisfies a predetermined condition. Also, in the heating operating mode, the outdoor expansion valve 45 is controlled such that the degree of superheating of the refrigerant to be sucked by the compressor 21 satisfies a predetermined condition. Note that, in the heating operating mode, the subcooling expansion valve 48 is controlled such that the degree of superheating of the refrigerant to be sucked by the compressor 21 satisfies a predetermined condition.

In the air conditioning apparatus 1*b* provided with the above-described plurality of indoor units 30 and 35, the refrigerant circuit 10 is filled with the refrigerant such that the enclosure amount per 1 kW of refrigeration capacity is 190 g or more and 1660 g or less.

The air conditioning apparatus 1*b* provided with the plurality of indoor units 30 and 35 may have a rated cooling capacity of, for example, 4.0 kW or more and 150.0 kW or less, more preferably 14.0 kW or more and 150.0 kW or less, or further preferably 22.4 kW or more and 150.0 kW or less when the outdoor unit 20 is top blowing type.

The air conditioning apparatus 1*b* provided with the plurality of indoor units according to the third embodiment uses a refrigerant which contains 1,2-difluoroethylene and which is any one of the above-described refrigerants A to D, and the refrigerant enclosure amount is set such that the enclosure amount per 1 kW of refrigeration capacity is 190 g or more and 1660 g or less.

Accordingly, also in the air conditioning apparatus 1*b* provided with the plurality of indoor units, since a refrigerant having a GWP sufficiently smaller than R32 is used and the enclosure amount per 1 kW of refrigeration capacity is not more than 1660 g, the LCCP can be kept low. Moreover, also in the air conditioning apparatus 1*b* provided with the plurality of indoor units, even when a refrigerant having a heat-transfer capacity lower than R32 is used, since the enclosure amount per 1 kW of refrigeration capacity is 190 g or more, a decrease in cycle efficiency due to an insufficiency of the refrigerant is suppressed, thereby suppressing an increase in the LCCP. As described above, also in the air conditioning apparatus 1*b* provided with the plurality of indoor units, when a heat cycle is performed using a refrigerant having a sufficiently small GWP, the LCCP can be kept low.

(8-4) Fourth Embodiment

Regarding the enclosure refrigerant amount when a refrigerant which contains 1,2-difluoroethylene and which is one of the above-described refrigerants A to D is enclosed in the refrigerant circuit, for a refrigeration cycle apparatus provided with only one indoor unit 30 like the air conditioning apparatus 1 according to the first embodiment and the air conditioning apparatus 1*a* according to the second embodiment, the enclosure amount per 1 kW of refrigeration capacity is set to 160 g or more and 560 g or less; and for a refrigeration cycle apparatus provided with a plurality of indoor units 30 and 35 like the air conditioning apparatus 1*b* according to the third embodiment, the enclosure amount per 1 kW of refrigeration capacity is set to 190 g or more and 1660 g or less.

Accordingly, the GWP and the LCCP can be kept low in accordance with the type of the refrigeration cycle apparatus.

(9) Embodiment of the Technique of Ninth Group

(9-1) First Embodiment

Figure 9A:
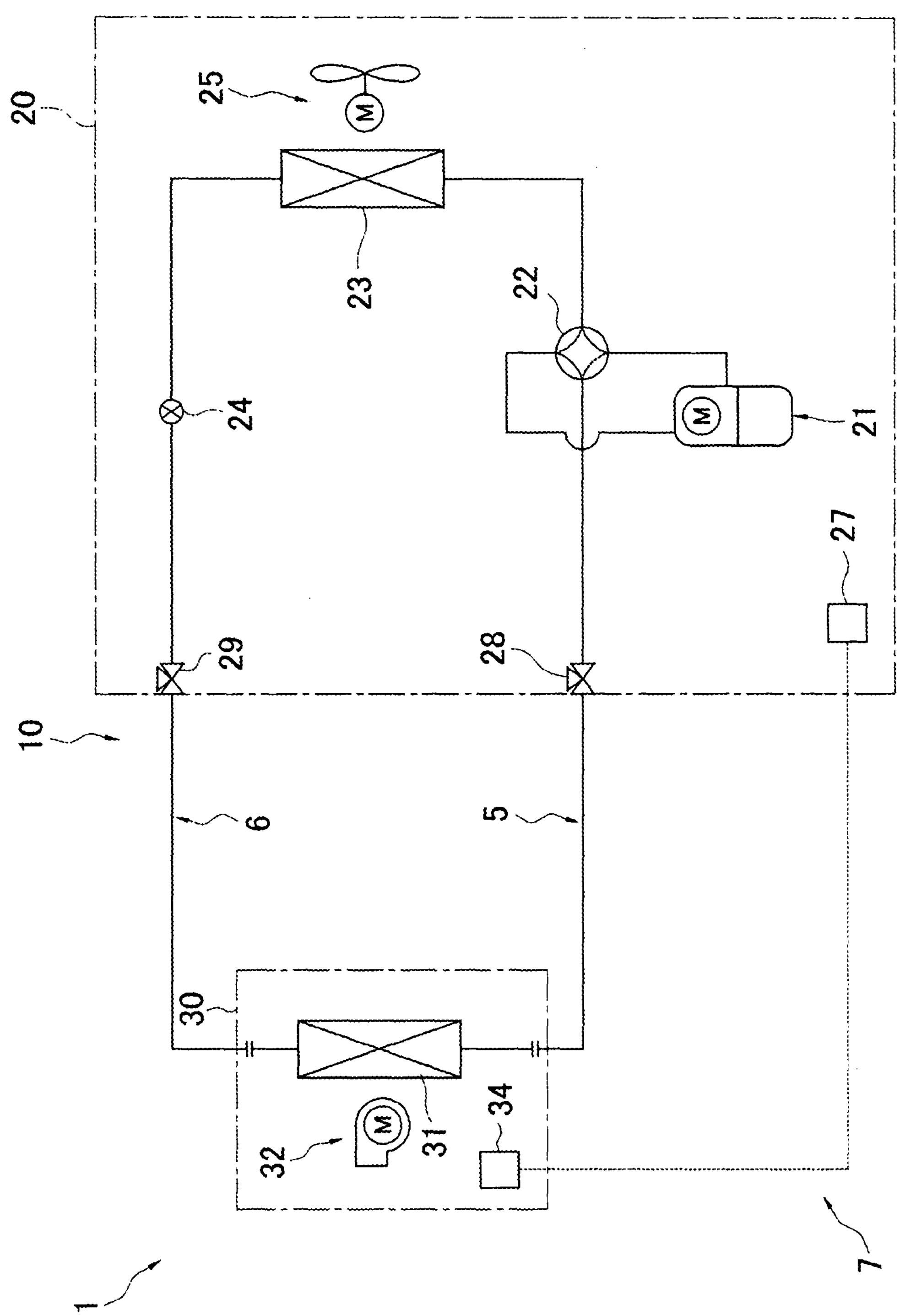
FIG. 9A is a schematic configuration diagram of a refrigerant circuit according to a first embodiment of the technique of ninth group.
Figure 9B:
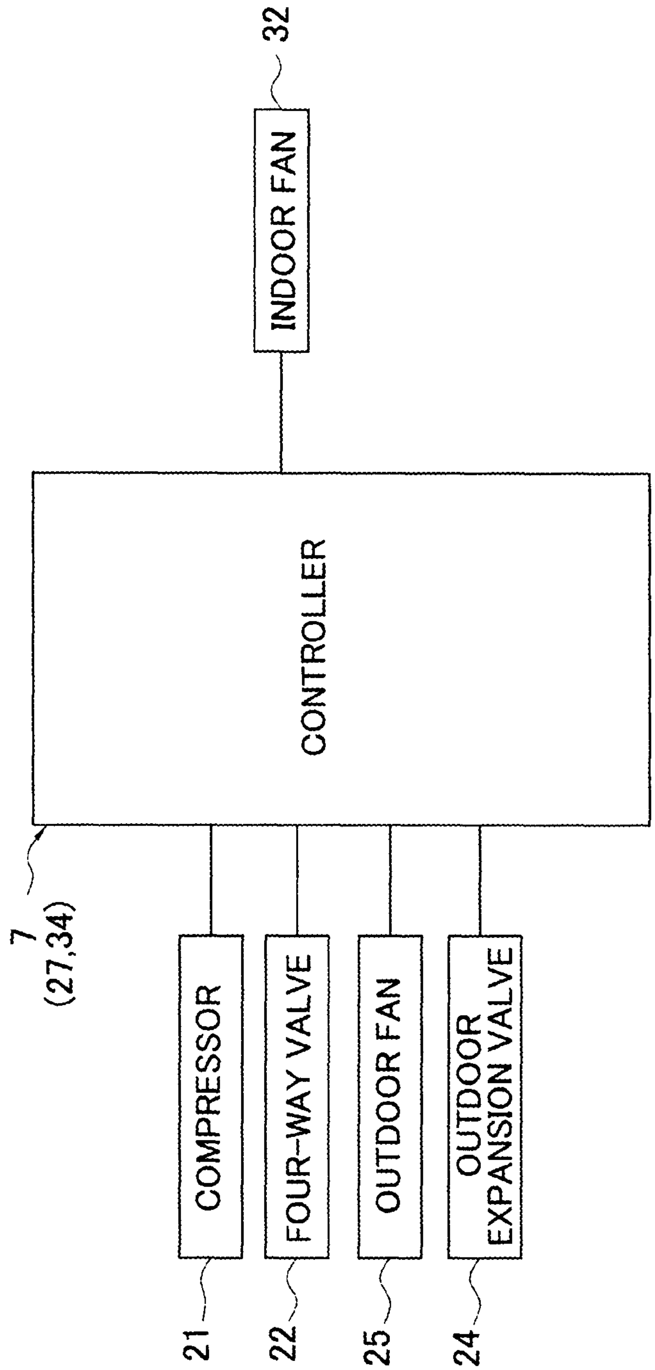
FIG. 9B is a schematic control block configuration diagram of a refrigeration cycle apparatus according to the first embodiment of the technique of ninth group.

Hereinafter, an air conditioner 1 that serves as a refrigeration cycle apparatus according to a first embodiment will be described with reference to FIG. 9A that is the schematic configuration diagram of a refrigerant circuit and FIG. 9B that is a schematic control block configuration diagram.

The air conditioner 1 is an apparatus that air-conditions a space to be air-conditioned by performing a vapor compression refrigeration cycle.

The air conditioner 1 mainly includes an outdoor unit 20, an indoor unit 30, a liquid-side connection pipe 6 and a gas-side connection pipe 5 connecting the outdoor unit 20 and the indoor unit 30, a remote control unit (not shown) serving as an input device and an output device, and a controller 7 that controls the operation of the air conditioner 1.

In the air conditioner 1, the refrigeration cycle in which refrigerant sealed in a refrigerant circuit 10 is compressed, cooled or condensed, decompressed, heated or evaporated, and then compressed again is performed. In the present embodiment, the refrigerant circuit is filled with refrigerant for performing a vapor compression refrigeration cycle. The refrigerant is a refrigerant containing 1,2-difluoroethylene, and any one of the above-described refrigerants A to D may be used. The refrigerant circuit 10 is filled with refrigerating machine oil together with the refrigerant.

(9-1-1) Outdoor Unit 20

The outdoor unit 20 has substantially a rectangular parallelepiped box shape from its appearance, and has a structure in which a fan chamber and a machine chamber are formed (so-called, trunk structure) when the inside is divided by a partition plate, or the like.

The outdoor unit 20 is connected to the indoor unit 30 via the liquid-side connection pipe 6 and the gas-side connection pipe 5, and makes up part of the refrigerant circuit 10. The outdoor unit 20 mainly includes a compressor 21, a four-way valve 22, an outdoor heat exchanger 23, an outdoor expansion valve 24, an outdoor fan 25, a liquid-side stop valve 29, and a gas-side stop valve 28.

The compressor 21 is a device that compresses low-pressure refrigerant into high pressure in the refrigeration cycle. Here, the compressor 21 is a hermetically sealed compressor in which a positive-displacement, such as a rotary type and a scroll type, compression element (not shown) is driven for rotation by a compressor motor. The compressor motor is used to change the displacement. The operation frequency of the compressor motor is controllable with an inverter. The compressor 21 is provided with an attached accumulator (not shown) at its suction side. The outdoor unit 20 of the present embodiment does not have a refrigerant container larger than the attached accumulator (a low-pressure receiver disposed at the suction side of the compressor 21, a high-pressure receiver disposed at a liquid side of the outdoor heat exchanger 23, or the like).

The four-way valve 22 is able to switch between a cooling operation connection state and a heating operation connection state by switching the status of connection. In the cooling operation connection state, a discharge side of the compressor 21 and the outdoor heat exchanger 23 are connected, and the suction side of the compressor 21 and the gas-side stop valve 28 are connected. In the heating operation connection state, the discharge side of the compressor 21 and the gas-side stop valve 28 are connected, and the suction side of the compressor 21 and the outdoor heat exchanger 23 are connected.

The outdoor heat exchanger 23 is a heat exchanger that functions as a condenser for high-pressure refrigerant in the refrigeration cycle during cooling operation and that functions as an evaporator for low-pressure refrigerant in the refrigeration cycle during heating operation. The outdoor heat exchanger 23 includes a plurality of heat transfer fins and a plurality of heat transfer tubes fixedly extending through the heat transfer fins.

The outdoor fan 25 takes outdoor air into the outdoor unit 20, causes the air to exchange heat with refrigerant in the outdoor heat exchanger 23, and then generates air flow for emitting the air to the outside. The outdoor fan 25 is driven for rotation by an outdoor fan motor. In the present embodiment, only one outdoor fan 25 is provided.

The outdoor expansion valve 24 is able to control the valve opening degree, and is provided between a liquid-side end portion of the outdoor heat exchanger 23 and the liquid-side stop valve 29.

The liquid-side stop valve 29 is a manual valve disposed at a connection point at which the outdoor unit 20 is connected to the liquid-side connection pipe 6.

The gas-side stop valve 28 is a manual valve disposed at a connection point at which the outdoor unit 20 is connected to the gas-side connection pipe 5.

The outdoor unit 20 includes an outdoor unit control unit 27 that controls the operations of parts that makeup the outdoor unit 20. The outdoor unit control unit 27 includes a microcomputer including a CPU, a memory, and the like. The outdoor unit control unit 27 is connected to an indoor unit control unit 34 of indoor unit 30 via a communication line, and sends or receives control signals, or the like, to or from the indoor unit control unit 34. The outdoor unit control unit 27 is electrically connected to various sensors (not shown), and receives signals from the sensors.

(9-1-2) Indoor Unit 30

The indoor unit 30 is placed on a wall surface, or the like, in a room that is the space to be air-conditioned. The indoor unit 30 is connected to the outdoor unit 20 via the liquid-side connection pipe 6 and the gas-side connection pipe 5, and makes up part of the refrigerant circuit 10.

The indoor unit 30 includes an indoor heat exchanger 31, an indoor fan 32, and the like.

A liquid side of the indoor heat exchanger 31 is connected to the liquid-side connection pipe 6, and a gas side of the indoor heat exchanger 31 is connected to the gas-side connection pipe 5. The indoor heat exchanger 31 is a heat exchanger that functions as an evaporator for low-pressure refrigerant in the refrigeration cycle during cooling operation and that functions as a condenser for high-pressure refrigerant in the refrigeration cycle during heating operation. The indoor heat exchanger 31 includes a plurality of heat transfer fins and a plurality of heat transfer tubes fixedly extending through the heat transfer fins.

The indoor fan 32 takes indoor air into the indoor unit 30, causes the air to exchange heat with refrigerant in the indoor heat exchanger 31, and then generates air flow for emitting the air to the outside. The indoor fan 32 is driven for rotation by an indoor fan motor (not shown).

The indoor unit 30 includes an indoor unit control unit 34 that controls the operations of the parts that make up the indoor unit 30. The indoor unit control unit 34 includes a microcomputer including a CPU, a memory, and the like. The indoor unit control unit 34 is connected to the outdoor unit control unit 27 via a communication line, and sends or receives control signals, or the like, to or from the outdoor unit control unit 27.

The indoor unit control unit 34 is electrically connected to various sensors (not shown) provided inside the indoor unit 30, and receives signals from the sensors.

(9-1-3) Details of Controller 7

In the air conditioner 1, the outdoor unit control unit 27 and the indoor unit control unit 34 are connected via the communication line to make up the controller 7 that controls the operation of the air conditioner 1.

The controller 7 mainly includes a CPU (central processing unit) and a memory such as a ROM and a RAM. Various processes and controls made by the controller 7 are implemented by various parts included in the outdoor unit control unit 27 and/or the indoor unit control unit 34 functioning together.

(9-1-4) Operation Mode

Hereinafter, operation modes will be described.

The operation modes include a cooling operation mode and a heating operation mode.

The controller 7 determines whether the operation mode is the cooling operation mode or the heating operation mode and performs the selected operation mode based on an instruction received from the remote control unit, or the like.

(9-1-4-1) Cooling Operation Mode

In the air conditioner 1, in the cooling operation mode, the status of connection of the four-way valve 22 is set to the cooling operation connection state where the discharge side of the compressor 21 and the outdoor heat exchanger 23 are connected and the suction side of the compressor 21 and the gas-side stop valve 28 are connected, and refrigerant filled in the refrigerant circuit 10 is mainly circulated in order of the compressor 21, the outdoor heat exchanger 23, the outdoor expansion valve 24, and the indoor heat exchanger 31.

More specifically, when the cooling operation mode is started, refrigerant is taken into the compressor 21, compressed, and then discharged in the refrigerant circuit 10.

In the compressor 21, displacement control commensurate with a cooling load that is required from the indoor unit 30 is performed. Gas refrigerant discharged from the compressor 21 passes through the four-way valve 22 and flows into the gas-side end of the outdoor heat exchanger 23.

Gas refrigerant having flowed into the gas-side end of the outdoor heat exchanger 23 exchanges heat in the outdoor heat exchanger 23 with outdoor-side air that is supplied by the outdoor fan 25 to condense into liquid refrigerant and flows out from the liquid-side end of the outdoor heat exchanger 23.

Refrigerant having flowed out from the liquid-side end of the outdoor heat exchanger 23 is decompressed when passing through the outdoor expansion valve 24. The outdoor expansion valve 24 is controlled such that the degree of subcooling of refrigerant that passes through a liquid-side outlet of the outdoor heat exchanger 23 satisfies a predetermined condition.

Refrigerant decompressed in the outdoor expansion valve 24 passes through the liquid-side stop valve 29 and the liquid-side connection pipe 6 and flows into the indoor unit 30.

Refrigerant having flowed into the indoor unit 30 flows into the indoor heat exchanger 31, exchanges heat in the indoor heat exchanger 31 with indoor air that is supplied by the indoor fan 32 to evaporate into gas refrigerant, and flows out from the gas-side end of the indoor heat exchanger 31. Gas refrigerant having flowed out from the gas-side end of the indoor heat exchanger 31 flows to the gas-side connection pipe 5.

Refrigerant having flowed through the gas-side connection pipe 5 passes through the gas-side stop valve 28 and the four-way valve 22, and is taken into the compressor 21 again.

(9-1-4-2) Heating Operation Mode

In the air conditioner 1, in the heating operation mode, the status of connection of the four-way valve 22 is set to the heating operation connection state where the discharge side of the compressor 21 and the gas-side stop valve 28 are connected and the suction side of the compressor 21 and the outdoor heat exchanger 23 are connected, and refrigerant filled in the refrigerant circuit 10 is mainly circulated in order of the compressor 21, the indoor heat exchanger 31, the outdoor expansion valve 24, and the outdoor heat exchanger 23.

More specifically, when the heating operation mode is started, refrigerant is taken into the compressor 21, compressed, and then discharged in the refrigerant circuit 10.

In the compressor 21, displacement control commensurate with a heating load that is required from the indoor unit 30 is performed. Gas refrigerant discharged from the compressor 21 flows through the four-way valve 22 and the gas-side connection pipe 5 and then flows into the indoor unit 30.

Refrigerant having flowed into the indoor unit 30 flows into the gas-side end of the indoor heat exchanger 31, exchanges heat in the indoor heat exchanger 31 with indoor air that is supplied by the indoor fan 32 to condense into refrigerant in a gas-liquid two-phase state or liquid refrigerant, and flows out from the liquid-side end of the indoor heat exchanger 31. Refrigerant having flowed out from the liquid-side end of the indoor heat exchanger 31 flows into the liquid-side connection pipe 6.

Refrigerant having flowed through the liquid-side connection pipe 6 is decompressed to a low pressure in the refrigeration cycle in the liquid-side stop valve 29 and the outdoor expansion valve 24. The outdoor expansion valve 24 is controlled such that the degree of subcooling of refrigerant that passes through a liquid-side outlet of the indoor heat exchanger 31 satisfies a predetermined condition. Refrigerant decompressed in the outdoor expansion valve 24 flows into the liquid-side end of the outdoor heat exchanger 23.

Refrigerant having flowed in from the liquid-side end of the outdoor heat exchanger 23 exchanges heat in the outdoor heat exchanger 23 with outdoor air that is supplied by the outdoor fan 25 to evaporate into gas refrigerant, and flows out from the gas-side end of the outdoor heat exchanger 23.

Refrigerant having flowed out from the gas-side end of the outdoor heat exchanger 23 passes through the four-way valve 22 and is taken into the compressor 21 again.

(9-1-5) Liquid-Side Connection Pipe 6

The liquid-side connection pipe 6 of the air conditioner 1 in which the above-described refrigerants A to D are used in the first embodiment has $D_0$ in the range of "$2 \leq D_0 \leq 4$" where the pipe outer diameter is expressed by $D_0/8$ inches, and has the same pipe outer diameter as a liquid-side connection pipe when refrigerant R410A is used. Since the physical properties such as pressure losses of the above-described refrigerants A to D are approximate to those of refrigerant R410A, when the pipe outer diameter of the liquid-side connection pipe 6 is set to the same pipe outer diameter as the pipe outer diameter of the liquid-side connection pipe when refrigerant R410A is used, a decrease in capacity can be suppressed.

Specifically, the liquid-side connection pipe 6 of the first embodiment preferably has $D_0$ of 2 (that is, the pipe diameter is ¼ inches).

More specifically, the liquid-side connection pipe 6 of the present embodiment more preferably has $D_0$ of 2.5 (that is, the pipe diameter is 5/16 inches) when the rated refrigeration capacity of the air conditioner 1 is greater than or equal to 7.5 kW, more preferably has $D_0$ of 2 (that is, the pipe diameter is ¼ inches) when the rated refrigeration capacity of the air conditioner 1 is greater than or equal to 2.6 kW and less than 7.5 kW, and more preferably has $D_0$ of 1.5 (that is, the pipe diameter is 3/16 inches) when the rated refrigeration capacity of the air conditioner 1 is less than 2.6 kW.

(9-1-6) Gas-Side Connection Pipe 5

The gas-side connection pipe 5 of the air conditioner 1 in which the above-described refrigerants A to D are used in the first embodiment has $D_0$ in the range of "$3 \le D_0 \le 8$" where the pipe outer diameter is expressed by $D_0/8$ inches, and has the same pipe outer diameter as the gas-side connection pipe when refrigerant R410A is used. Since the physical properties such as pressure losses of the above-described refrigerants A to D are approximate to those of refrigerant R410A, when the pipe outer diameter of the gas-side connection pipe 5 is set to the same pipe outer diameter as the pipe outer diameter of the gas-side connection pipe when refrigerant R410A is used, a decrease in capacity can be suppressed.

Specifically, the gas-side connection pipe 5 of the first embodiment preferably has $D_0$ of 4 (that is, the pipe diameter is ½ inches) when the rated refrigeration capacity of the air conditioner 1 is greater than or equal to 6.0 kW, and preferably has $D_0$ of 3 (that is, the pipe diameter is ⅜ inches) when the rated refrigeration capacity of the air conditioner 1 is less than 6.0 kW.

More specifically, the gas-side connection pipe 5 of the first embodiment more preferably has $D_0$ of 4 (that is, the pipe diameter is ½ inches) when the rated refrigeration capacity of the air conditioner 1 is greater than or equal to 6.0 kW, more preferably has $D_0$ of 3 (that is, the pipe diameter is ⅜ inches) when the rated refrigeration capacity of the air conditioner 1 is greater than or equal to 3.2 kW and less than 6.0 kW, and more preferably has $D_0$ of 2.5 (that is, the pipe diameter is 5/16 inches) when the rated refrigeration capacity of the air conditioner 1 is less than 3.2 kW.

(9-1-7) Characteristics of First Embodiment

In the above-described air conditioner 1, since refrigerant containing 1,2-difluoroethylene is used, a GWP can be sufficiently reduced.

In the air conditioner 1, when the pipe outer diameter of the liquid-side connection pipe 6 and the pipe outer diameter of the gas-side connection pipe 5 each fall within an associated predetermined range, a decrease in capacity can be suppressed even when the specific refrigerants A to D are used.

(9-1-8) Relationship Between Refrigerant and Pipe Outer Diameter of Connection Pipe In the air conditioner 1 of the first embodiment, when not the refrigerants A to D are used but refrigerant R410A or R32 is used, the liquid-side connection pipe 6 and the gas-side connection pipe 5 each having the pipe outer diameter (inches) as shown in the following Table 167 and Table 168 are generally used according to the range of the rated refrigeration capacity.

In contrast to this, in the air conditioner 1 of the first embodiment, in the case where the refrigerant A (which also applies to the refrigerants B to D) of the present disclosure, containing 1,2-difluoroethylene, is used, when the liquid-side connection pipe 6 and the gas-side connection pipe 5 having the pipe outer diameters (inches) as shown in the following Table 167 or Table 168 are used according to the range of the rated refrigeration capacity, a decrease in capacity in the case where the refrigerant A (which also applies to the refrigerants B to D) of the present disclosure, containing 1,2-difluoroethylene, is used can be suppressed.

TABLE 27

| | | R410A, R32 | | Refrigerant A | |
|---|---|---|---|---|---|
| Horse Power [HP] | Rated Refrigeration Capacity [kW] | Gas-Side Connection Pipe | Liquid-Side Connection Pipe | Gas-Side Connection Pipe | Liquid-Side Connection Pipe |
| 0.8 | 2.2 | ⅜ | ¼ | ⅜ | ¼ |
| 0.9 | 2.5 | ⅜ | ¼ | ⅜ | ¼ |
| 1.0 | 2.8 | ⅜ | ¼ | ⅜ | ¼ |
| 1.3 | 3.6 | ⅜ | ¼ | ⅜ | ¼ |
| 1.4 | 4.0 | ⅜ | ¼ | ⅜ | ¼ |
| 2.0 | 5.6 | ⅜ | ¼ | ⅜ | ¼ |
| 2.3 | 6.3 | ½ | ¼ | ½ | ¼ |
| 2.5 | 7.1 | ½ | ¼ | ½ | ¼ |
| 2.9 | 8.0 | ½ | ¼ | ½ | ¼ |
| 3.2 | 9.0 | ½ | ¼ | ½ | ¼ |

TABLE 28

| | | R410A, R32 | | Refrigerant A | |
|---|---|---|---|---|---|
| Horse Power [HP] | Rated Refrigeration Capacity [kW] | Gas-Side Connection Pipe | Liquid-Side Connection Pipe | Gas-Side Connection Pipe | Liquid-Side Connection Pipe |
| 0.8 | 2.2 | ⅜ | ¼ | 5/16 | 3/16 |
| 0.9 | 2.5 | ⅜ | ¼ | 5/16 | 3/16 |
| 1.0 | 2.8 | ⅜ | ¼ | 5/16 | ¼ |
| 1.3 | 3.6 | ⅜ | ¼ | ⅜ | ¼ |
| 1.4 | 4.0 | ⅜ | ¼ | ⅜ | ¼ |
| 2.0 | 5.6 | ⅜ | ¼ | ⅜ | ¼ |
| 2.3 | 6.3 | ½ | ¼ | ½ | ¼ |
| 2.5 | 7.1 | ½ | ¼ | ½ | ¼ |
| 2.9 | 8.0 | ½ | ¼ | ½ | 5/16 |
| 3.2 | 9.0 | ½ | ¼ | ½ | 5/16 |

Figure 9C:
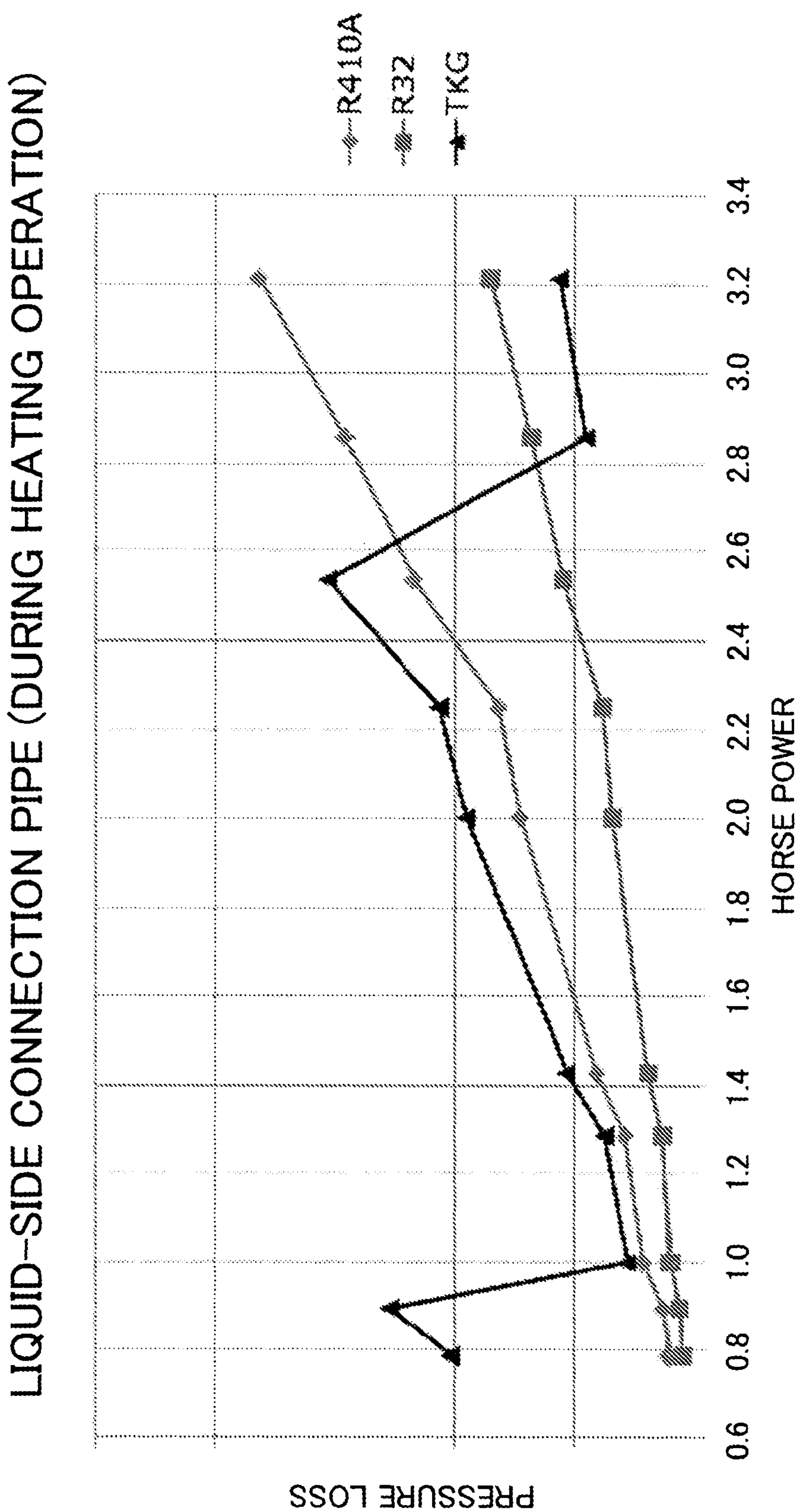
FIG. 9C is a graph of a pressure loss in a liquid-side connection pipe during heating operation for each pipe outer diameter when refrigerant R410A, refrigerant R32, and refrigerant A are used in an air conditioner according to the first embodiment of the technique of ninth group.
Figure 9D:
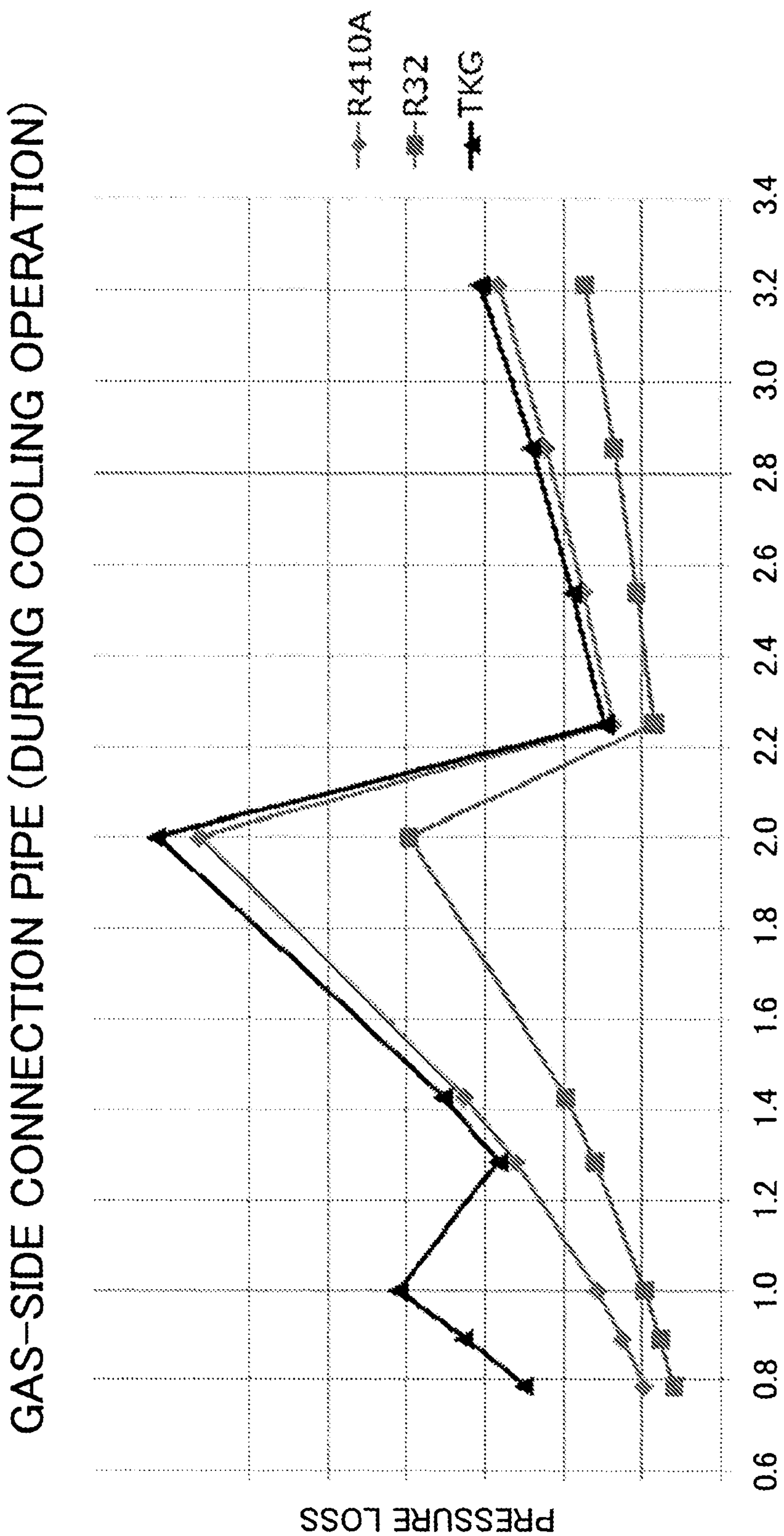
FIG. 9D is a graph of a pressure loss in a gas-side connection pipe during cooling operation for each pipe outer diameter when refrigerant R410A, refrigerant R32, and refrigerant A are used in the air conditioner according to the first embodiment of the technique of ninth group.

Here, for cases where refrigerant R410A, refrigerant R32, or the refrigerant A of the present disclosure, containing 1,2-difluoroethylene, is used and the liquid-side connection pipe 6 and the gas-side connection pipe 5 having the pipe outer diameters shown in Table 168 are used in the air conditioner 1 of the first embodiment, FIG. 9C shows a pressure loss in the liquid-side connection pipe 6 during heating operation, and FIG. 9D shows a pressure loss in the gas-side connection pipe 5 during cooling operation. In calculating a pressure loss, controlled target values of a condensation temperature, an evaporating temperature, a degree of subcooling of refrigerant at the condenser outlet, and a degree of superheating of refrigerant at the evaporator outlet are commonalized, and pressure losses of refrigerant in the connection pipes are calculated based on a refrigerant circulation amount that is required for operation at a rated capacity commensurate with a horse power. The unit of horse power is HP.

As is apparent from FIG. 9C and FIG. 9D, it is found that the refrigerant A of the present disclosure, containing 1,2-difluoroethylene, has an approximate behavior of pressure loss to the behavior of pressure loss of refrigerant R410A and a decrease in capacity can be suppressed when the refrigerant A is used in the air conditioner 1. This point also applies to the refrigerants B to D that are the same in containing 1,2-difluoroethylene.

(9-1-9) Modification A of First Embodiment

In the above-described first embodiment, the air conditioner including only one indoor unit is described as an example; however, the air conditioner may include a plurality of indoor units (with no indoor expansion valve) connected in parallel with each other.

(9-2) Second Embodiment

Figure 9E:
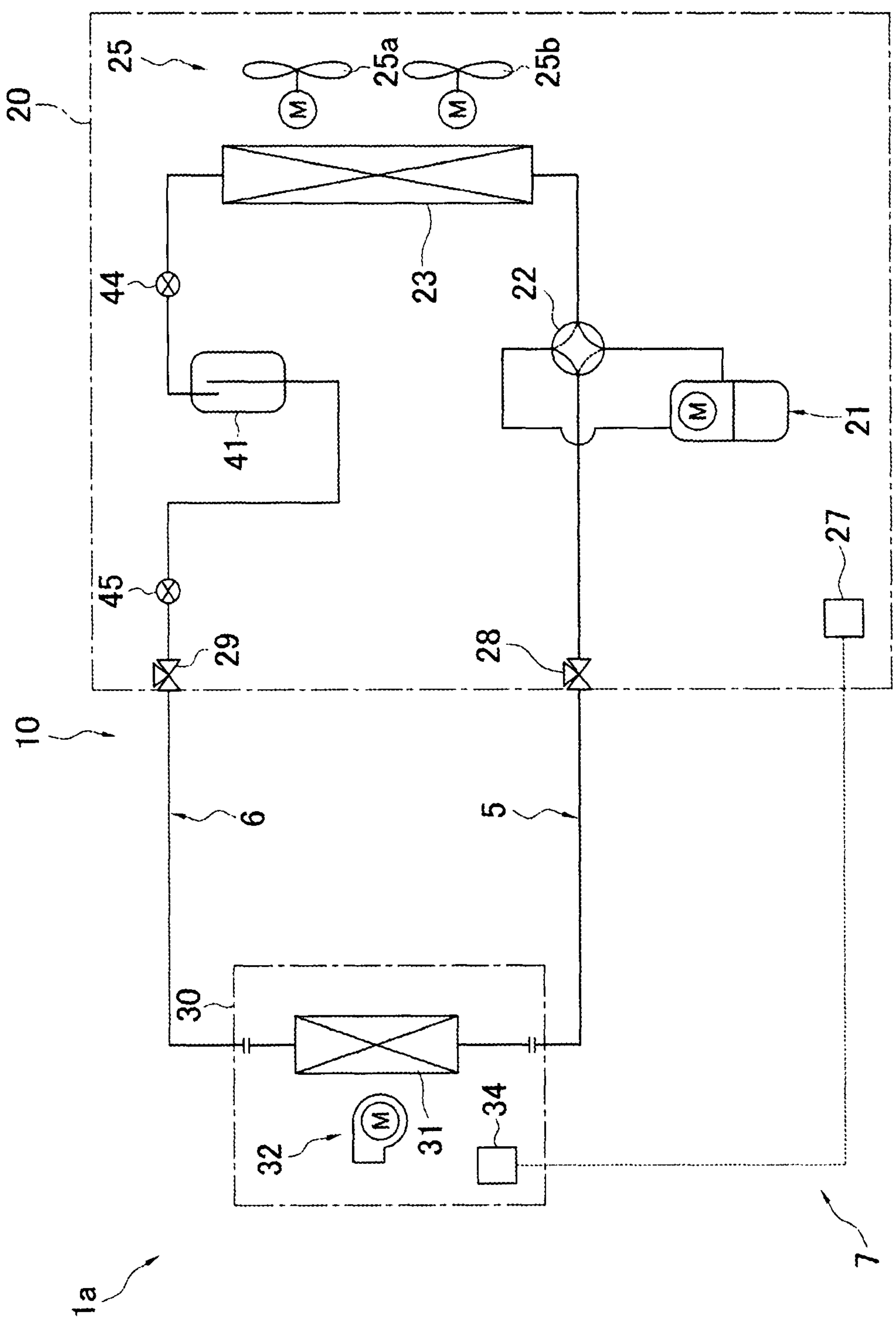
FIG. 9E is a schematic configuration diagram of a refrigerant circuit according to a second embodiment of the technique of ninth group.
Figure 9F:
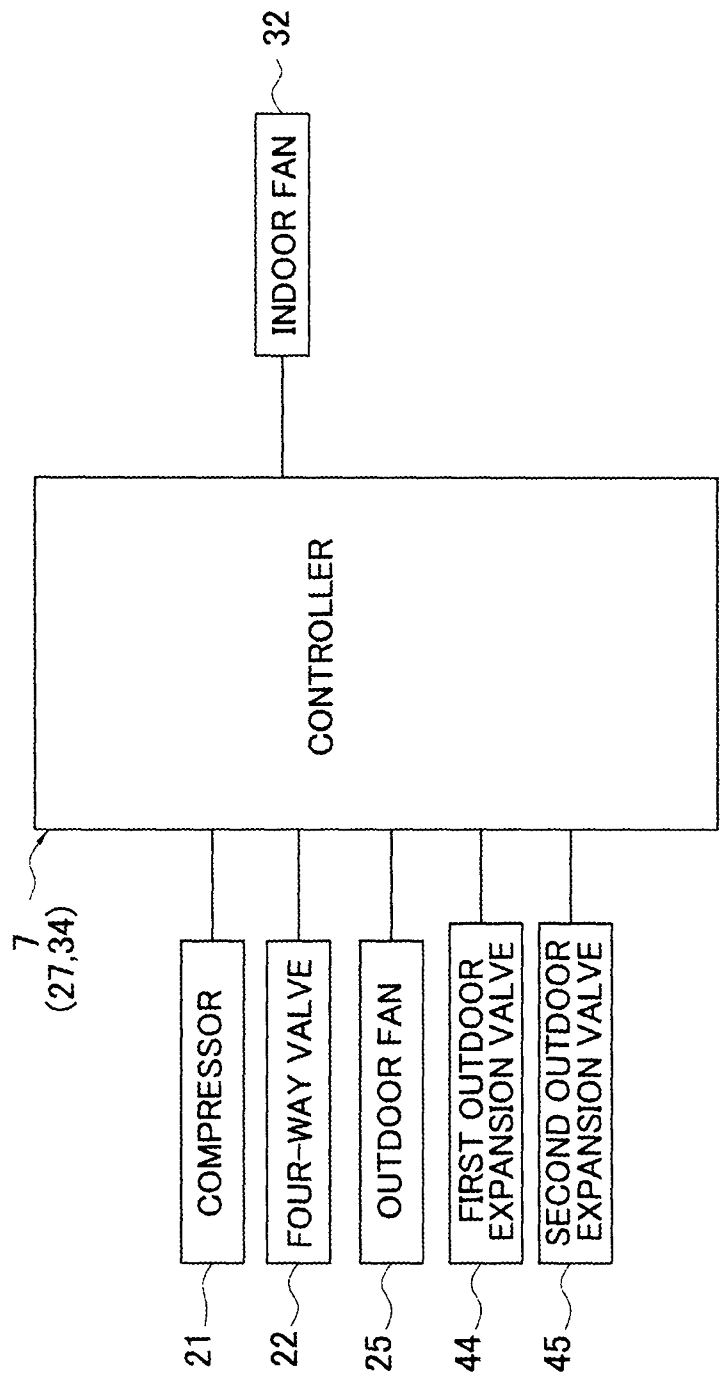
FIG. 9F is a schematic control block configuration diagram of a refrigeration cycle apparatus according to the second embodiment of the technique of ninth group.

Hereinafter, an air conditioner 1*a* that serves as a refrigeration cycle apparatus according to a second embodiment will be described with reference to FIG. 9E that is the schematic configuration diagram of a refrigerant circuit and FIG. 9F that is a schematic control block configuration diagram.

Hereinafter, mainly, the air conditioner 1*a* of the second embodiment will be described with a focus on a portion different from the air conditioner 1 of the first embodiment.

In the air conditioner 1*a* as well, the refrigerant circuit 10 is filled with a refrigerant mixture that contains 1,2-difluoroethylene and that is any one of the above-described refrigerants A to D as a refrigerant for performing a vapor compression refrigeration cycle. The refrigerant circuit 10 is filled with refrigerating machine oil together with the refrigerant.

(9-2-1) Outdoor Unit 20

In the outdoor unit 20 of the air conditioner 1*a* of the second embodiment, a first outdoor fan 25*a* and a second outdoor fan 25*b* are provided as the outdoor fans 25. The outdoor heat exchanger 23 of the outdoor unit 20 of the air conditioner 1*a* has a wide heat exchange area so as to adapt to air flow coming from the first outdoor fan 25*a* and the second outdoor fan 25*b*.

In the outdoor unit 20 of the air conditioner 1*a*, instead of the outdoor expansion valve 24 of the outdoor unit 20 in the above-described first embodiment, a first outdoor expansion valve 44, an intermediate pressure receiver 41, and a second outdoor expansion valve 45 are sequentially provided between the liquid side of the outdoor heat exchanger 23 and the liquid-side stop valve 29. The first outdoor expansion valve 44 and the second outdoor expansion valve 45 each are able to control the valve opening degree. The intermediate pressure receiver 41 is a container that is able to store refrigerant. Both an end portion of a pipe extending from the first outdoor expansion valve 44 side and an end portion of a pipe extending from the second outdoor expansion valve 45 side are located in the internal space of the intermediate pressure receiver 41. The internal volume of the intermediate pressure receiver 41 is greater than the internal volume of the attached accumulator attached to the compressor 21 and is preferably greater than or equal to twice.

The outdoor unit 20 of the second embodiment has substantially a rectangular parallelepiped shape and has a structure in which a fan chamber and a machine chamber are formed (so-called, trunk structure) when divided by a partition plate, or the like, extending vertically.

The outdoor heat exchanger 23 includes, for example, a plurality of heat transfer fins and a plurality of heat transfer tubes fixedly extending through the heat transfer fins. The outdoor heat exchanger 23 is disposed in an L-shape in plan view.

In the above air conditioner 1*a*, in the cooling operation mode, the first outdoor expansion valve 44 is, for example, controlled such that the degree of subcooling of refrigerant that passes through the liquid-side outlet of the outdoor heat exchanger 23 satisfies a predetermined condition. In the cooling operation mode, the second outdoor expansion valve 45 is, for example, controlled such that the degree of superheating of refrigerant that the compressor 21 takes in satisfies a predetermined condition.

In the heating operation mode, the second outdoor expansion valve 45 is, for example, controlled such that the degree of subcooling of refrigerant that passes through the liquid-side outlet of the indoor heat exchanger 31 satisfies a predetermined condition. In the heating operation mode, the first outdoor expansion valve 44 is, for example, controlled such that the degree of superheating of refrigerant that the compressor 21 takes in satisfies a predetermined condition.

(9-2-2) Indoor Unit 30

The indoor unit 30 of the second embodiment is placed so as to be suspended in an upper space in a room that is a space to be air-conditioned or placed at a ceiling surface or placed on a wall surface and used. The indoor unit 30 is connected to the outdoor unit 20 via the liquid-side connection pipe 6 and the gas-side connection pipe 5, and makes up part of the refrigerant circuit 10.

The indoor unit 30 includes the indoor heat exchanger 31, the indoor fan 32, and the like.

The indoor heat exchanger 31 of the second embodiment includes a plurality of heat transfer fins and a plurality of heat transfer tubes fixedly extending through the heat transfer fins.

(9-2-3) Liquid-Side Connection Pipe 6

The liquid-side connection pipe 6 of the air conditioner 1*a* in which the above-described refrigerants A to D are used in the second embodiment may have $D_0$ in the range of "$2 \leq D_0 \leq 4$" where the pipe outer diameter is expressed by $D_0/8$ inches regardless of the relationship with the pipe outer diameter when R410A or R32 is used.

The liquid-side connection pipe 6 of the air conditioner 1*a* in which the above-described refrigerants A to D are used in the second embodiment has $D_0$ in the range of "2 $D_0 \leq 4$" when the pipe outer diameter is expressed by $D_0/8$ inches (where, "$D_0-1/8$ inches" is the pipe outer diameter of the liquid-side connection pipe when refrigerant R32 is used). Since the above-described refrigerants A to D cause a pressure loss more easily than refrigerant R32 but the pipe outer diameter of the liquid-side connection pipe 6 of the air conditioner 1*a* of the second embodiment is greater than or equal to the pipe outer diameter when refrigerant R32 is used, a decrease in capacity can be suppressed. Specifically, the liquid-side connection pipe 6 of the air conditioner 1*a* preferably has $D_0$ of 3 (that is, the pipe diameter is 3/8 inches) where the pipe outer diameter is expressed by $D_0/8$ inches (where, "$D_0-1/8$ inches" is the pipe outer diameter of the liquid-side connection pipe when refrigerant R32 is used) when the rated refrigeration capacity of the air conditioner 1*a* is greater than 5.6 kW and less than 11.2 kW and more preferably has $D_0$ of 3 (that is, the pipe diameter is 3/8 inches) when the rated refrigeration capacity of the air conditioner 1*a* is greater than or equal to 6.3 kW and less than or equal to 10.0 kW.

The liquid-side connection pipe 6 of the air conditioner 1*a* in which the above-described refrigerants A to D are used in the second embodiment has $D_0$ in the range of "$2 \leq D_0 \leq 4$" where the pipe outer diameter is expressed by $D_0/8$ inches, and has the same pipe outer diameter as the liquid-side connection pipe when refrigerant R410A is used. Since the physical properties such as pressure losses of the above-described refrigerants A to D are approximate to those of refrigerant R410A, when the pipe outer diameter of the liquid-side connection pipe 6 is set to the same pipe outer diameter as the pipe outer diameter of the liquid-side connection pipe when refrigerant R410A is used, a decrease in capacity can be suppressed.

Specifically, the liquid-side connection pipe 6 of the air conditioner 1*a* in which the above-described refrigerants A to D are used in the second embodiment preferably has $D_0$ of 3 (that is, the pipe diameter is 3/8 inches) where the pipe outer diameter is expressed by $D_0/8$ inches when the rated refrigeration capacity of the air conditioner 1*a* is greater than or equal to 6.3 kW, and preferably has $D_0$ of 2 (that is, the pipe diameter is 1/4 inches) when the rated refrigeration capacity of the air conditioner 1*a* is less than 6.3 kW, and more preferably has the same pipe outer diameter as the pipe outer diameter of the liquid-side connection pipe when refrigerant R410A is used in each case.

More specifically, the liquid-side connection pipe 6 of the air conditioner 1*a* in which the above-described refrigerants A to D are used in the second embodiment preferably has $D_0$ of 3 (that is, the pipe diameter is 3/8 inches) where the pipe outer diameter is expressed by $D_0/8$ inches when the rated refrigeration capacity of the air conditioner 1*a* is greater than or equal to 12.5 kW, preferably has $D_0$ of 2.5 (that is, the pipe diameter is 5/16 inches) when the rated refrigeration capacity of the air conditioner 1*a* is greater than or equal to 6.3 kW and less than 12.5 kW, and preferably has $D_0$ of 2 (that is, the pipe diameter is 1/4 inches) when the rated refrigeration capacity of the air conditioner 1*a* is less than 6.3 kW (9-2-4) Gas-Side Connection Pipe 5

The gas-side connection pipe 5 of the air conditioner 1*a* in which the above-described refrigerants A to D are used in the second embodiment may have $D_0$ in the range of "$3 \leq D_0 \leq 8$" where the pipe outer diameter is expressed by $D_0/8$ inches regardless of the relationship with the pipe outer diameter when R410A or R32 is used.

The gas-side connection pipe 5 of the air conditioner 1*a* in which the above-described refrigerants A to Dare used in the second embodiment has $D_0$ in the range of "$3 \leq D_0 \leq 8$" when the pipe outer diameter is expressed by $D_0/8$ inches (where, "$D_0-1/8$ inches" is the pipe outer diameter of the gas-side connection pipe when refrigerant R32 is used). Since the above-described refrigerants A to D cause a pressure loss more easily than refrigerant R32 but the pipe outer diameter of the gas-side connection pipe 5 of the air conditioner 1*a* of the second embodiment is greater than or equal to the pipe outer diameter when refrigerant R32 is used, a decrease in capacity can be suppressed. Specifically, the gas-side connection pipe 5 of the air conditioner 1*a* preferably has $D_0$ of 7 (that is, the pipe diameter is 7/8 inches) where the pipe outer diameter is expressed by $D_0/8$ inches (where, "$D_0-1/8$ inches" is the pipe outer diameter of the gas-side connection pipe when refrigerant R32 is used) when the rated refrigeration capacity of the air conditioner 1*a* is greater than 22.4 kW, preferably has $D_0$ of 6 (that is, the pipe diameter is 6/8 inches) when the rated refrigeration capacity of the air conditioner 1*a* is greater than 14.0 kW and less than 22.4 kW, preferably has $D_0$ of 5 (that is, the pipe diameter is 5/8 inches) when the rated refrigeration capacity of the air conditioner 1*a* is greater than 5.6 kW and less than 11.2 kW, and preferably has $D_0$ of 4 (that is, the pipe diameter is 1/2 inches) when the rated refrigeration capacity of the air conditioner 1*a* is less than 4.5 kW In this case, $D_0$ is more preferably 7 (that is, the pipe diameter is 7/8 inches) when the rated refrigeration capacity of the air conditioner 1*a* is greater than or equal to 25.0 kW, $D_0$ is more preferably 6 (that is, the pipe diameter is 6/8 inches) when the rated refrigeration capacity of the air conditioner 1*a* is greater than or equal to 15.0 kW and less than 19.0 kW, $D_0$ is more preferably 5 (that is, the pipe diameter is 5/8 inches) when the rated refrigeration capacity of the air conditioner 1*a* is greater than or equal to 6.3 kW and less than 10.0 kW, and $D_0$ is more preferably 4 (that is, the pipe diameter is 1/2 inches) when the rated refrigeration capacity of the air conditioner 1*a* is less than 4.0 kW.

The gas-side connection pipe 5 of the air conditioner 1*a* in which the above-described refrigerants A to D are used in the second embodiment has $D_0$ in the range of "$3 \leq D_0 \leq 8$" where the pipe outer diameter is expressed by $D_0/8$ inches, and has the same pipe outer diameter as the gas-side connection pipe when refrigerant R410A is used. Since the physical properties such as pressure losses of the above-described refrigerants A to D are approximate to those of refrigerant R410A, when the pipe outer diameter of the gas-side connection pipe 5 is set to the same pipe outer diameter as the pipe outer diameter of the gas-side connection pipe when refrigerant R410A is used, a decrease in capacity can be suppressed.

Specifically, the gas-side connection pipe 5 of the air conditioner 1*a* in which the above-described refrigerants A to D are used in the second embodiment preferably has $D_0$ of 7 (that is, the pipe diameter is 7/8 inches) when the pipe outer diameter is expressed by $D_0/8$ inches when the rated refrigeration capacity of the air conditioner 1*a* is greater than or equal to 25.0 kW, preferably has $D_0$ of 6 (that is, the pipe diameter is 6/8 inches) when the rated refrigeration capacity of the air conditioner 1*a* is greater than or equal to 15.0 kW and less than 25.0 kW, preferably has $D_0$ of 5 (that is, the pipe diameter is 5/8 inches) when the rated refrigeration capacity of the air conditioner 1*a* is greater than or equal to 6.3 kW and less than 15.0 kW, preferably has $D_0$ of 4 (that is, the pipe diameter is ½ inches) when the rated refrigeration capacity of the air conditioner 1*a* is less than 6.3 kW, and more preferably has the same pipe outer diameter as the pipe outer diameter of the gas-side connection pipe when refrigerant R410A is used in each case.

(9-2-5) Characteristics of Second Embodiment

In the above-described air conditioner 1*a* according to the second embodiment as well, as well as the air conditioner 1 according to the first embodiment, since refrigerant containing 1,2-difluoroethylene is used, a GWP can be sufficiently reduced.

In the air conditioner 1*a*, when the pipe outer diameter of the liquid-side connection pipe 6 and the pipe outer diameter of the gas-side connection pipe 5 each fall within an associated predetermined range, a decrease in capacity can be suppressed even when the specific refrigerants A to D are used.

(9-2-6) Relationship Between Refrigerant and Pipe Outer Diameter of Connection Pipe In the air conditioner 1*a* of the second embodiment, when not the refrigerants A to D are used but refrigerant R410A or R32 is used, the liquid-side connection pipe 6 and the gas-side connection pipe 5 each having the pipe outer diameter (inches) as shown in the following Table 169 and Table 170 are generally used according to the range of the rated refrigeration capacity.

In contrast to this, in the air conditioner 1*a* of the second embodiment, in the case where the refrigerant A (which also applies to the refrigerants B to D) of the present disclosure, containing 1,2-difluoroethylene, is used, when the liquid-side connection pipe 6 and the gas-side connection pipe 5 having the pipe outer diameters (inches) as shown in the following Table 169 or Table 170 according to the range of the rated refrigeration capacity, a decrease in capacity in the case where the refrigerant A (which also applies to the refrigerants B to D) of the present disclosure, containing 1,2-difluoroethylene, is used can be suppressed.

TABLE 29

| | | R410A | | R32 | | Refrigerant A | |
|---|---|---|---|---|---|---|---|
| Horse Power [HP] | Rated Refrigeration Capacity [kW] | Gas-Side Connection Pipe | Liquid-Side Connection Pipe | Gas-Side Connection Pipe | Liquid-Side Connection Pipe | Gas-Side Connection Pipe | Liquid-Side Connection Pipe |
| 0.8 | 2.2 | 1/2 | 1/4 | 3/8 | 1/4 | 1/2 | 1/4 |
| 1.0 | 2.8 | 1/2 | 1/4 | 3/8 | 1/4 | 1/2 | 1/4 |
| 1.3 | 3.6 | 1/2 | 1/4 | 3/8 | 1/4 | 1/2 | 1/4 |
| 1.6 | 4.5 | 1/2 | 1/4 | 1/2 | 1/4 | 1/2 | 1/4 |
| 2.0 | 5.6 | 1/2 | 1/4 | 1/2 | 1/4 | 1/2 | 1/4 |
| 2.5 | 7.1 | 5/8 | 3/8 | 1/2 | 1/4 | 5/8 | 3/8 |
| 2.9 | 8.0 | 5/8 | 3/8 | 1/2 | 1/4 | 5/8 | 3/8 |
| 3.2 | 9.0 | 5/8 | 3/8 | 1/2 | 1/4 | 5/8 | 3/8 |
| 4.0 | 11.2 | 5/8 | 3/8 | 5/8 | 3/8 | 5/8 | 3/8 |
| 5.0 | 14.0 | 5/8 | 3/8 | 5/8 | 3/8 | 5/8 | 3/8 |
| 6.0 | 16.0 | 6/8 | 3/8 | 5/8 | 3/8 | 6/8 | 3/8 |
| 8.0 | 22.4 | 6/8 | 3/8 | 6/8 | 3/8 | 6/8 | 3/8 |
| 10.0 | 28.0 | 7/8 | 3/8 | 6/8 | 3/8 | 7/8 | 3/8 |

TABLE 30

| | | R410A | | R32 | | Refrigerant A | |
|---|---|---|---|---|---|---|---|
| Horse Power [HP] | Rated Refrigeration Capacity [kW] | Gas-Side Connection Pipe | Liquid-Side Connection Pipe | Gas-Side Connection Pipe | Liquid-Side Connection Pipe | Gas-Side Connection Pipe | Liquid-Side Connection Pipe |
| 0.8 | 2.2 | 1/2 | 1/4 | 3/8 | 1/4 | 1/2 | 1/4 |
| 1.0 | 2.8 | 1/2 | 1/4 | 3/8 | 1/4 | 1/2 | 1/4 |
| 1.3 | 3.6 | 1/2 | 1/4 | 3/8 | 1/4 | 1/2 | 1/4 |
| 1.6 | 4.5 | 1/2 | 1/4 | 1/2 | 1/4 | 1/2 | 1/4 |
| 2.0 | 5.6 | 1/2 | 1/4 | 1/2 | 1/4 | 1/2 | 1/4 |
| 2.5 | 7.1 | 5/8 | 3/8 | 1/2 | 1/4 | 5/8 | 5/16 |
| 2.9 | 8.0 | 5/8 | 3/8 | 1/2 | 1/4 | 5/8 | 5/16 |
| 3.2 | 9.0 | 5/8 | 3/8 | 1/2 | 1/4 | 5/8 | 5/16 |
| 4.0 | 11.2 | 5/8 | 3/8 | 5/8 | 3/8 | 5/8 | 5/16 |
| 5.0 | 14.0 | 5/8 | 3/8 | 5/8 | 3/8 | 5/8 | 3/8 |
| 6.0 | 16.0 | 6/8 | 3/8 | 5/8 | 3/8 | 6/8 | 3/8 |
| 8.0 | 22.4 | 6/8 | 3/8 | 6/8 | 3/8 | 6/8 | 3/8 |
| 10.0 | 28.0 | 7/8 | 3/8 | 6/8 | 3/8 | 7/8 | 3/8 |

Figure 9G:
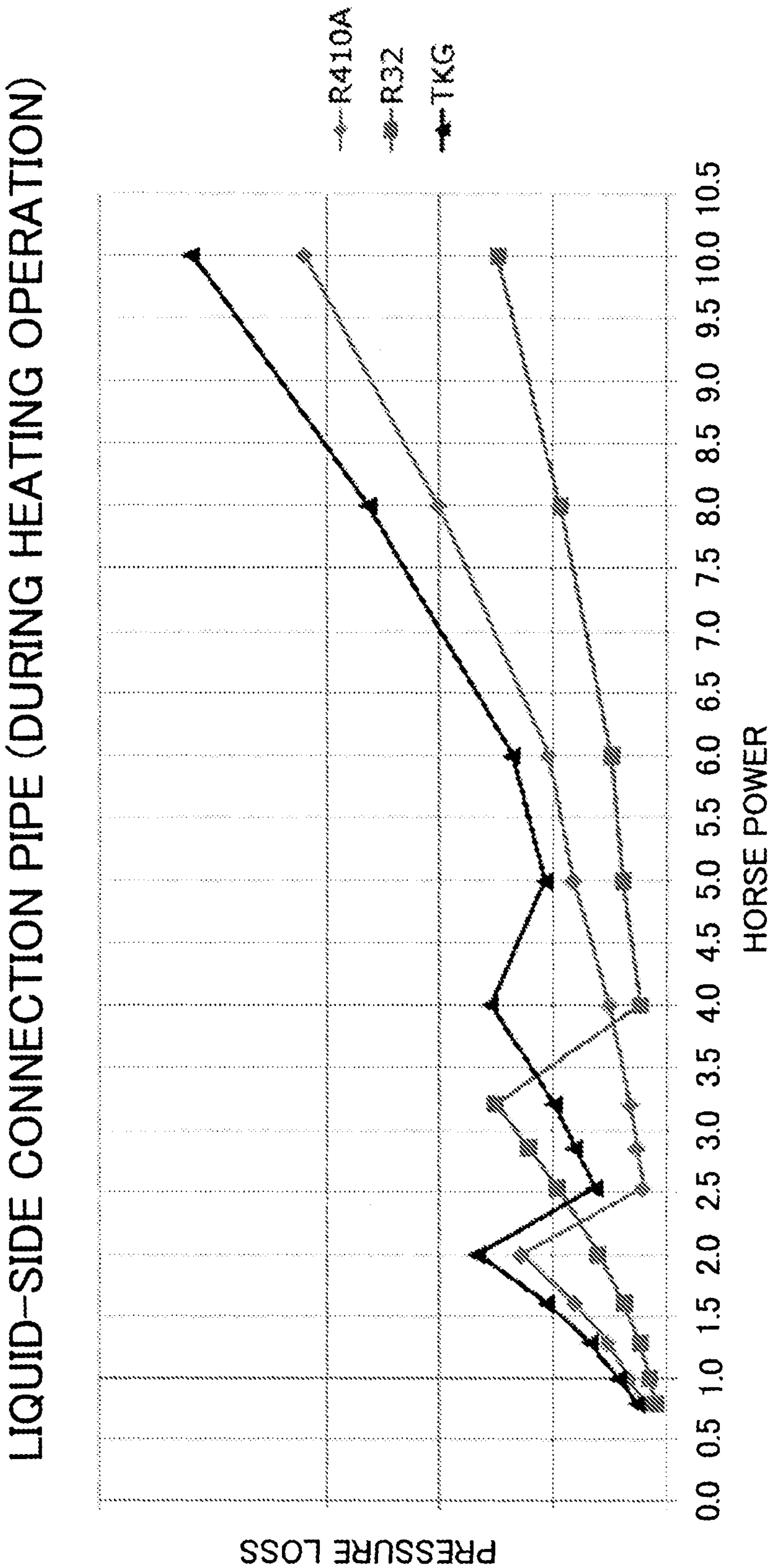
FIG. 9G is a graph of a pressure loss in a liquid-side connection pipe during heating operation for each pipe outer diameter when refrigerant R410A, refrigerant R32, and refrigerant A are used in an air conditioner according to the second embodiment of the technique of ninth group.
Figure 9H:
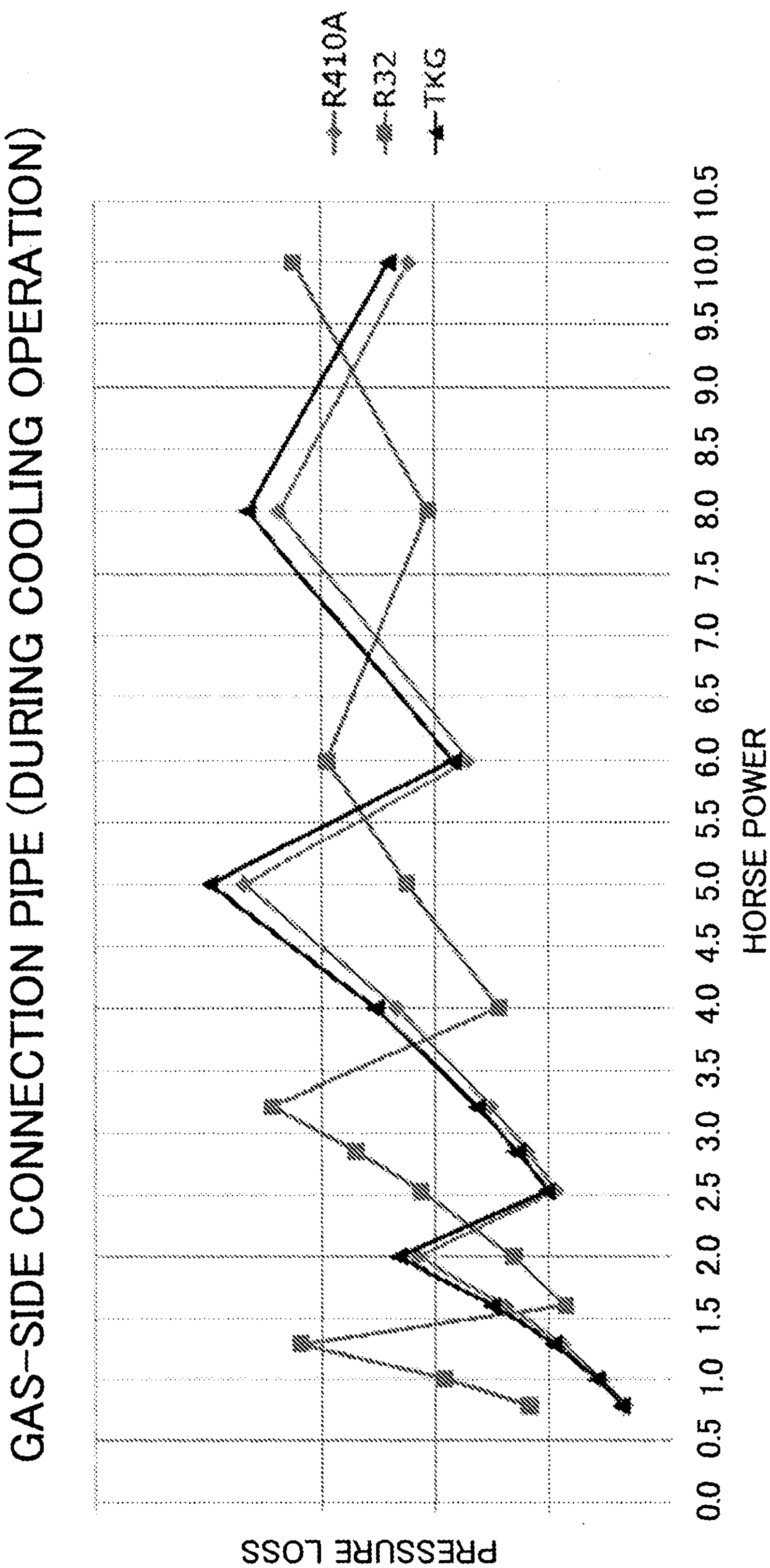
FIG. 9H is a graph of a pressure loss in a gas-side connection pipe during cooling operation for each pipe outer diameter when refrigerant R410A, refrigerant R32, and refrigerant A are used in the air conditioner according to the second embodiment of the technique of ninth group.

Here, for cases where refrigerant R410A, refrigerant R32, or the refrigerant A of the present disclosure, containing 1,2-difluoroethylene, is used and the liquid-side connection pipe 6 and the gas-side connection pipe 5 having the pipe outer diameters shown in Table 170 are used in the air conditioner 1*a* of the second embodiment, FIG. 9G shows a pressure loss in the liquid-side connection pipe 6 during heating operation, and FIG. 9H shows a pressure loss in the gas-side connection pipe 5 during cooling operation. In calculating a pressure loss, controlled target values of a condensation temperature, an evaporating temperature, a degree of subcooling of refrigerant at the condenser outlet, and a degree of superheating of refrigerant at the evaporator outlet are commonalized, and pressure losses of refrigerant in the connection pipes are calculated based on a refrigerant circulation amount that is required for operation at a rated capacity commensurate with a horse power. The unit of horse power is HP.

As is apparent from FIG. 9G and FIG. 9H, it is found that the refrigerant A of the present disclosure, containing 1,2-difluoroethylene, has an approximate behavior of pressure loss to the behavior of pressure loss of refrigerant R410A and a decrease in capacity can be suppressed when the refrigerant A is used in the air conditioner 1*a*. This point also applies to the refrigerants B to D that are the same in containing 1,2-difluoroethylene.

(9-2-7) Modification A of Second Embodiment

In the above-described second embodiment, the air conditioner including only one indoor unit is described as an example; however, the air conditioner may include a plurality of indoor units (with no indoor expansion valve) connected in parallel with each other.

(9-3) Third Embodiment

Figure 9I:
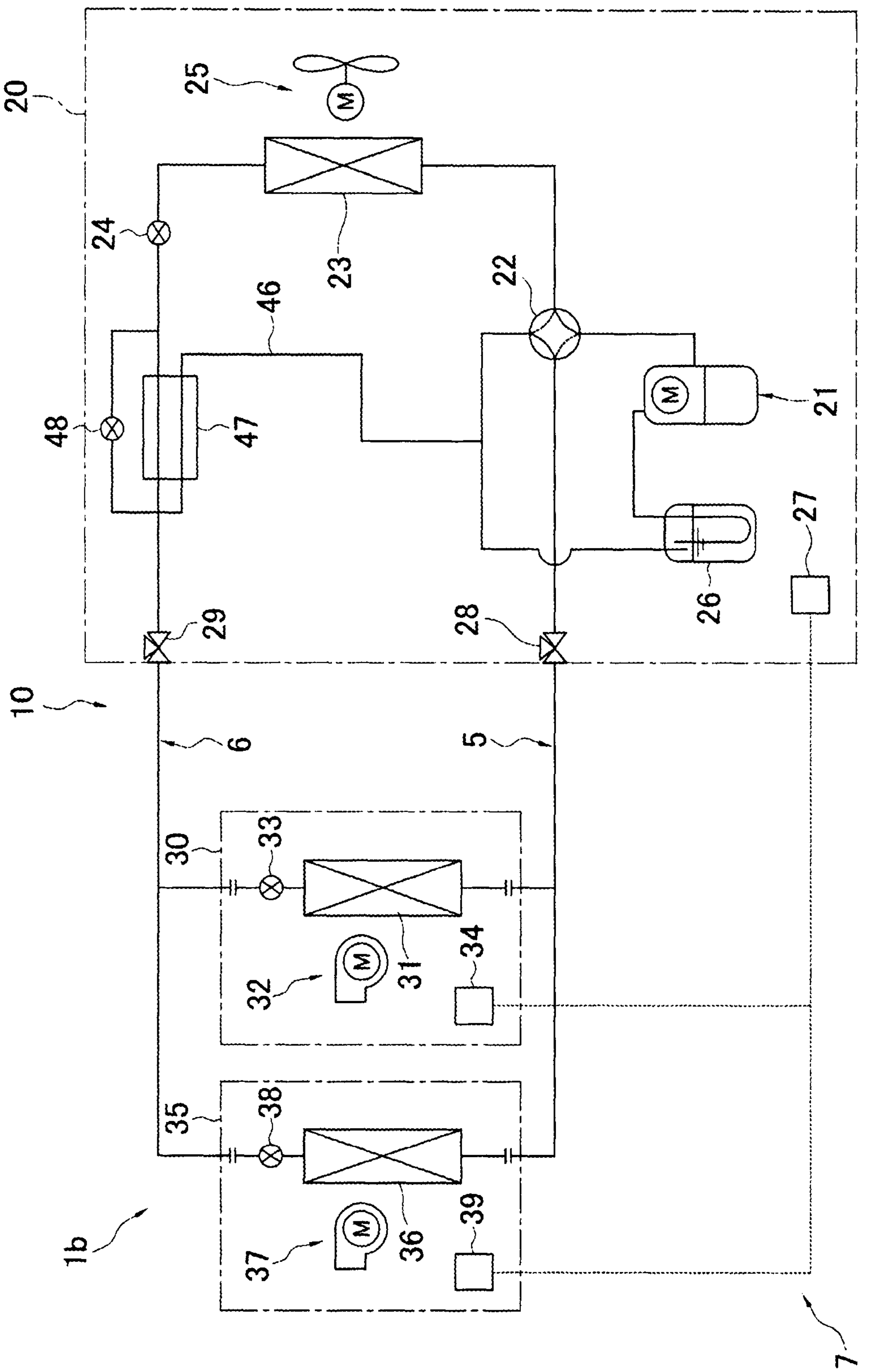
FIG. 9I is a schematic configuration diagram of a refrigerant circuit according to a third embodiment of the technique of ninth group.
Figure 9J:
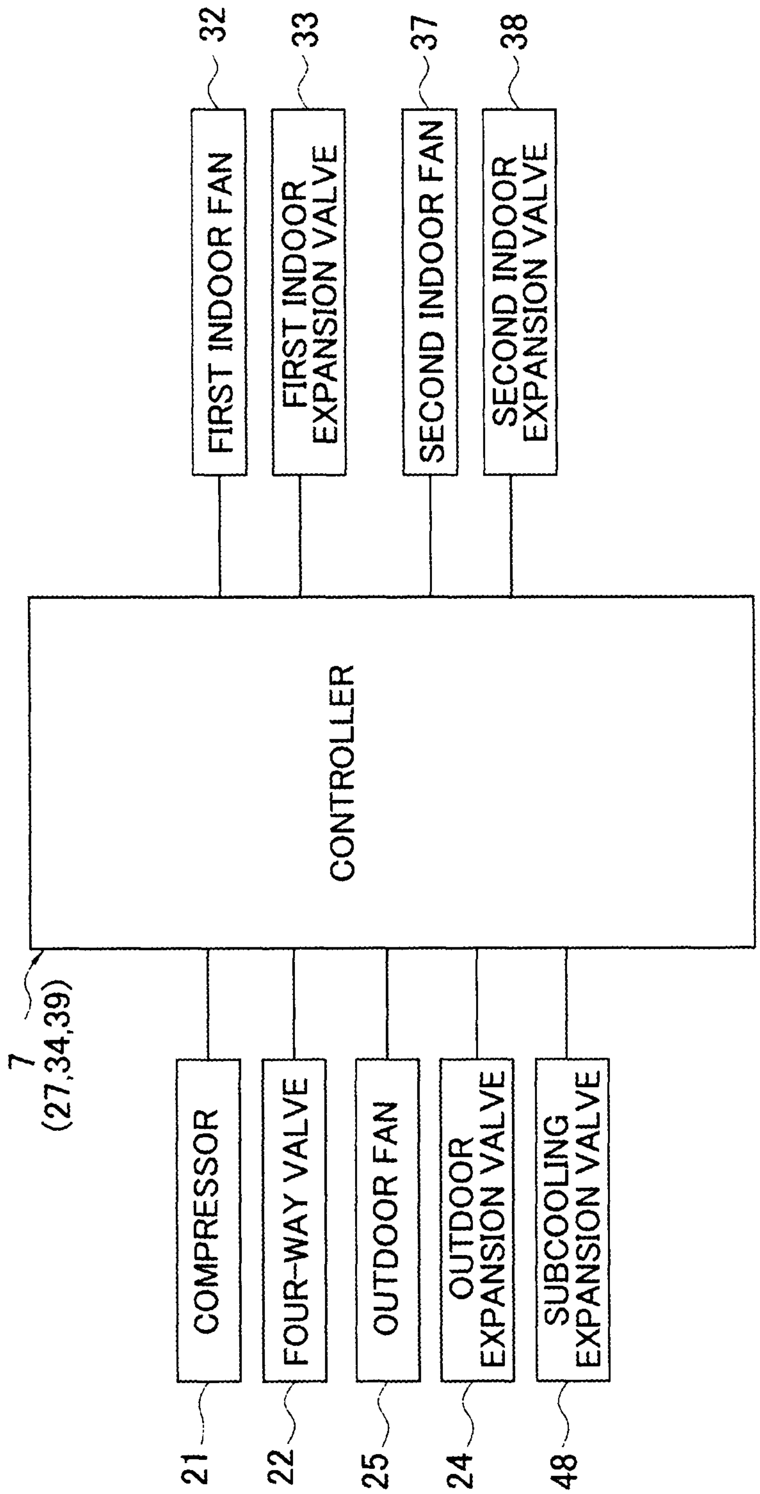
FIG. 9J is a schematic control block configuration diagram of a refrigeration cycle apparatus according to the third embodiment of the technique of ninth group.

Hereinafter, an air conditioner 1*b* that serves as a refrigeration cycle apparatus according to a third embodiment will be described with reference to FIG. 9I that is the schematic configuration diagram of a refrigerant circuit and FIG. 9J that is a schematic control block configuration diagram.

Hereinafter, mainly, the air conditioner 1*b* of the third embodiment will be described with a focus on a portion different from the air conditioner 1 of the first embodiment.

In the air conditioner 1*b* as well, the refrigerant circuit 10 is filled with a refrigerant mixture that contains 1,2-difluoroethylene and that is any one of the above-described refrigerants A to D as a refrigerant for performing a vapor compression refrigeration cycle. The refrigerant circuit 10 is filled with refrigerating machine oil together with the refrigerant.

(9-3-1) Outdoor Unit 20

In the outdoor unit 20 of the air conditioner 1*b* of the third embodiment, a low-pressure receiver 26, a subcooling heat exchanger 47, and a subcooling circuit 46 are provided in the outdoor unit 20 in the above-described first embodiment.

The low-pressure receiver 26 is a container that is provided between one of connection ports of the four-way valve 22 and the suction side of the compressor 21 and that is able to store refrigerant. In the present embodiment, the low-pressure receiver 26 is provided separately from the attached accumulator of the compressor 21. The internal volume of the low-pressure receiver 26 is greater than the internal volume of the attached accumulator attached to the compressor 21 and is preferably greater than or equal to twice.

The subcooling heat exchanger 47 is provided between the outdoor expansion valve 24 and the liquid-side stop valve 29.

The subcooling circuit 46 is a circuit that branches off from a main circuit between the outdoor expansion valve 24 and the subcooling heat exchanger 47 and that merges with a portion halfway from one of the connection ports of the four-way valve 22 to the low-pressure receiver 26. A subcooling expansion valve 48 that decompresses refrigerant passing therethrough is provided halfway in the subcooling circuit 46. Refrigerant flowing through the subcooling circuit 46 and decompressed by the subcooling expansion valve 48 exchanges heat with refrigerant flowing through the main circuit side in the subcooling heat exchanger 47. Thus, refrigerant flowing through the main circuit side is further cooled, and refrigerant flowing through the subcooling circuit 46 evaporates.

The outdoor unit 20 of the air conditioner 1*b* according to the third embodiment may have, for example, a so-called up-blow structure that takes in air from the lower side and discharges air outward from the upper side.

(9-3-2) First Indoor Unit 30 and Second Indoor Unit 35

In the air conditioner 1*b* according to the third embodiment, instead of the indoor unit in the above-described first embodiment, a first indoor unit 30 and a second indoor unit 35 are provided in parallel with each other.

The first indoor unit 30, as well as the indoor unit 30 in the above-described first embodiment, includes a first indoor heat exchanger 31, a first indoor fan 32, and a first indoor unit control unit 34, and further includes a first indoor expansion valve 33 at the liquid side of the first indoor heat exchanger 31. The first indoor expansion valve 33 is able to control the valve opening degree.

The second indoor unit 35, as well as the first indoor unit 30, includes a second indoor heat exchanger 36, a second indoor fan 37, a second indoor unit control unit 39, and a second indoor expansion valve 38 provided at the liquid side of the second indoor heat exchanger 36. The second indoor expansion valve 38 is able to control the valve opening degree.

The specific structures of the first indoor unit 30 and second indoor unit 35 of the air conditioner 1*b* according to the third embodiment each have a similar configuration to the indoor unit 30 of the second embodiment except the above-described first indoor expansion valve 33 and second indoor expansion valve 38.

The controller 7 of the third embodiment is made up of the outdoor unit control unit 27, the first indoor unit control unit 34, and the second indoor unit control unit 39 communicably connected to one another.

In the above air conditioner 1*b*, in the cooling operation mode, the outdoor expansion valve 24 is controlled such that the degree of subcooling of refrigerant that passes through the liquid-side outlet of the outdoor heat exchanger 23 satisfies a predetermined condition. In the cooling operation mode, the subcooling expansion valve 48 is controlled such that the degree of superheating of refrigerant that the compressor 21 takes in satisfies a predetermined condition. In the cooling operation mode, the first indoor expansion valve 33 and the second indoor expansion valve 38 are controlled to a fully open state.

In the heating operation mode, the first indoor expansion valve 33 is controlled such that the degree of subcooling of refrigerant that passes through the liquid-side outlet of the first indoor heat exchanger 31 satisfies a predetermined condition. Similarly, the second indoor expansion valve 38 is also controlled such that the degree of subcooling of refrigerant that passes through the liquid-side outlet of the second indoor heat exchanger 36 satisfies a predetermined condition. In the heating operation mode, the outdoor expansion valve 45 is controlled such that the degree of superheating of refrigerant that the compressor 21 takes in satisfies a predetermined condition. In the heating operation mode, the subcooling expansion valve 48 is controlled such that the degree of superheating of refrigerant that the compressor 21 takes in satisfies a predetermined condition.

(9-3-3) Liquid-Side Connection Pipe 6

The liquid-side connection pipe 6 of the air conditioner 1*b* in which the above-described refrigerants A to D are used in the third embodiment may have $D_0$ in the range of "$2 \le D_0 \le 4$" where the pipe outer diameter is expressed by $D_0/8$ inches regardless of the relationship with the pipe outer diameter when R410A or R32 is used.

The liquid-side connection pipe 6 of the air conditioner 1*b* in which the above-described refrigerants A to D are used in the third embodiment has $D_0$ in the range of "$2 \le D_0 \le 4$" when the pipe outer diameter is expressed by $D_0/8$ inches (where, "$D_0-1/8$ inches" is the pipe outer diameter of the liquid-side connection pipe when refrigerant R32 is used). Since the above-described refrigerants A to D cause a pressure loss more easily than refrigerant R32 but the pipe outer diameter of the liquid-side connection pipe 6 of the air conditioner 1*b* of the third embodiment is greater than or equal to the pipe outer diameter when refrigerant R32 is used, a decrease in capacity can be suppressed. Specifically, the liquid-side connection pipe 6 of the air conditioner 1*b* preferably has $D_0$ of 3 (that is, the pipe diameter is 3/8 inches) where the pipe outer diameter is expressed by $D_0/8$ inches (where, "$D_0-1/8$ inches" is the pipe outer diameter of the liquid-side connection pipe when refrigerant R32 is used) when the rated refrigeration capacity of the air conditioner 1*b* is greater than 5.6 kW and less than 11.2 kW and more preferably has $D_0$ of 3 (that is, the pipe diameter is 3/8 inches) when the rated refrigeration capacity of the air conditioner 1*b* is greater than or equal to 6.3 kW and less than or equal to 10.0 kW.

The liquid-side connection pipe 6 of the air conditioner 1*b* in which the above-described refrigerants A to D are used in the third embodiment has $D_0$ in the range of "$2 \le D_0 \le 4$" where the pipe outer diameter is expressed by $D_0/8$ inches, and has the same pipe outer diameter as the liquid-side connection pipe when refrigerant R410A is used. Since the physical properties such as pressure losses of the above-described refrigerants A to D are approximate to those of refrigerant R410A, when the pipe outer diameter of the liquid-side connection pipe 6 is set to the same pipe outer diameter as the pipe outer diameter of the liquid-side connection pipe when refrigerant R410A is used, a decrease in capacity can be suppressed.

Specifically, the liquid-side connection pipe 6 of the air conditioner 1*b* in which the above-described refrigerants A to D are used in the third embodiment preferably has $D_0$ of 3 (that is, the pipe diameter is 3/8 inches) where the pipe outer diameter is expressed by $D_0/8$ inches when the rated refrigeration capacity of the air conditioner 1*b* is greater than or equal to 6.3 kW, and preferably has $D_0$ of 2 (that is, the pipe diameter is 1/4 inches) when the rated refrigeration capacity of the air conditioner 1*b* is less than 6.3 kW, and more preferably has the same pipe outer diameter as the pipe outer diameter of the liquid-side connection pipe in the case where refrigerant R410A is used in each case.

More specifically, the liquid-side connection pipe 6 of the air conditioner 1*b* in which the above-described refrigerants A to D are used in the third embodiment preferably has $D_0$ of 3 (that is, the pipe diameter is 3/8 inches) where the pipe outer diameter is expressed by $D_0/8$ inches when the rated refrigeration capacity of the air conditioner 1*b* is greater than or equal to 12.5 kW, preferably has $D_0$ of 2.5 (that is, the pipe diameter is 5/16 inches) when the rated refrigeration capacity of the air conditioner 1*b* is greater than or equal to 6.3 kW and less than 12.5 kW, and preferably has $D_0$ of 2 (that is, the pipe diameter is 1/4 inches) when the rated refrigeration capacity of the air conditioner 1*b* is less than 6.3 kW (9-3-4) Gas-Side Connection Pipe 5

The liquid-side connection pipe 5 of the air conditioner 1*b* in which the above-described refrigerants A to D are used in the third embodiment may have $D_0$ in the range of "$3 \le D_0 \le 8$" where the pipe outer diameter is expressed by $D_0/8$ inches regardless of the relationship with the pipe outer diameter when R410A or R32 is used.

The gas-side connection pipe 5 of the air conditioner 1*b* in which the above-described refrigerants A to D are used in the third embodiment has $D_0$ in the range of "$3 \le D_0 \le 8$" when the pipe outer diameter is expressed by $D_0/8$ inches (where, "$D_0-1/8$ inches" is the pipe outer diameter of the gas-side connection pipe when refrigerant R32 is used). Since the above-described refrigerants A to D cause a pressure loss more easily than refrigerant R32 but the pipe outer diameter of the gas-side connection pipe 5 of the air conditioner 1*b* of the third embodiment is greater than or equal to the pipe outer diameter when refrigerant R32 is used, a decrease in capacity can be suppressed. Specifically, the gas-side connection pipe 5 of the air conditioner 1*b* preferably has $D_0$ of 7 (that is, the pipe diameter is 7/8 inches) where the pipe outer diameter is expressed by $D_0/8$ inches (where, "$D_0-1/8$ inches" is the pipe outer diameter of the gas-side connection pipe when refrigerant R32 is used) when the rated refrigeration capacity of the air conditioner 1*b* is greater than 22.4 kW, preferably has $D_0$ of 6 (that is, the pipe diameter is 6/8 inches) when the rated refrigeration capacity of the air conditioner 1*b* is greater than 14.0 kW and less than 22.4 kW, preferably has $D_0$ of 5 (that is, the pipe diameter is 5/8 inches) when the rated refrigeration capacity of the air conditioner 1*b* is greater than 5.6 kW and less than 11.2 kW, and preferably has $D_0$ of 4 (that is, the pipe diameter is 1/2 inches) when the rated refrigeration capacity of the air conditioner 1*b* is less than 4.5 kW. In this case, $D_0$ is more preferably 7 (that is, the pipe diameter is 7/8 inches) when the rated refrigeration capacity of the air conditioner 1*b* is greater than or equal to 25.0 kW, $D_0$ is more preferably 6 (that is, the pipe diameter is 6/8 inches) when the rated refrigeration capacity of the air conditioner 1*b* is greater than or equal to 15.0 kW and less than 19.0 kW, $D_0$ is more preferably (that is, the pipe diameter is 5/8 inches) when the rated refrigeration capacity of the air conditioner 1*b* is greater than or equal to 6.3 kW and less than 10.0 kW, and $D_0$ is more preferably 4 (that is, the pipe diameter is 1/2 inches) when the rated refrigeration capacity of the air conditioner 1*b* is less than 4.0 kW.

The gas-side connection pipe 5 of the air conditioner 1*b* in which the above-described refrigerants A to D are used in the third embodiment has $D_0$ in the range of "$3 \le D_0 \le 8$" where the pipe outer diameter is expressed by $D_0/8$ inches, and has the same pipe outer diameter as the gas-side connection pipe when refrigerant R410A is used. Since the physical properties such as pressure losses of the above-described refrigerants A to D are approximate to those of refrigerant R410A, when the pipe outer diameter of the gas-side connection pipe 5 is set to the same pipe outer diameter as the pipe outer diameter of the gas-side connection pipe when refrigerant R410A is used, a decrease in capacity can be suppressed.

Specifically, the gas-side connection pipe 5 of the air conditioner 1*b* in which the above-described refrigerants A to D are used in the third embodiment preferably has $D_0$ of 7 (that is, the pipe diameter is ⅞ inches) when the pipe outer diameter is expressed by $D_0/8$ inches when the rated refrigeration capacity of the air conditioner 1*b* is greater than or equal to 25.0 kW, preferably has $D_0$ of 6 (that is, the pipe diameter is 6/8 inches) when the rated refrigeration capacity of the air conditioner 1*b* is greater than or equal to 15.0 kW and less than 25.0 kW, preferably has $D_0$ of 5 (that is, the pipe diameter is ⅝ inches) when the rated refrigeration capacity of the air conditioner 1*b* is greater than or equal to 6.3 kW and less than 15.0 kW, preferably has $D_0$ of 4 (that is, the pipe diameter is ½ inches) when the rated refrigeration capacity of the air conditioner 1*b* is less than 6.3 kW, and more preferably has the same pipe outer diameter as the pipe outer diameter of the gas-side connection pipe when refrigerant R410A is used in each case.

(9-3-5) Characteristics of Third Embodiment

In the above-described air conditioner 1*b* according to the third embodiment as well, as well as the air conditioner 1 according to the first embodiment, since refrigerant containing 1,2-difluoroethylene is used, a GWP can be sufficiently reduced.

In the air conditioner 1*b*, when the pipe outer diameter of the liquid-side connection pipe 6 and the pipe outer diameter of the gas-side connection pipe 5 each fall within an associated predetermined range, a decrease in capacity can be suppressed even when the specific refrigerants A to D are used.

(9-3-6) Relationship Between Refrigerant and Pipe Outer Diameter of Connection Pipe In the air conditioner 1*b* of the third embodiment, when not the refrigerants A to D are used but refrigerant R410A or R32 is used, the liquid-side connection pipe 6 and the gas-side connection pipe 5 each having the pipe outer diameter (inches) as shown in the following Table 171 and Table 172 are generally used according to the range of the rated refrigeration capacity.

In contrast to this, in the air conditioner 1*b* of the third embodiment, in the case where the refrigerant A (which also applies to the refrigerants B to D) of the present disclosure, containing 1,2-difluoroethylene, is used, when the liquid-side connection pipe 6 and the gas-side connection pipe 5 having the pipe outer diameters (inches) as shown in the following Table 171 or Table 172 are used according to the range of the rated refrigeration capacity, a decrease in capacity in the case where the refrigerant A (which also applies to the refrigerants B to D) of the present disclosure, containing 1,2-difluoroethylene, is used can be suppressed.

TABLE 31

| | | R410A | | R32 | | Refrigerant A | |
|---|---|---|---|---|---|---|---|
| Horse Power [HP] | Rated Refrigeration Capacity [kW] | Gas-Side Connection Pipe | Liquid-Side Connection Pipe | Gas-Side Connection Pipe | Liquid-Side Connection Pipe | Gas-Side Connection Pipe | Liquid-Side Connection Pipe |
| 0.8 | 2.2 | ½ | ¼ | ⅜ | ¼ | ½ | ¼ |
| 1.0 | 2.8 | ½ | ¼ | ⅜ | ¼ | ½ | ¼ |
| 1.3 | 3.6 | ½ | ¼ | ⅜ | ¼ | ½ | ¼ |
| 1.6 | 4.5 | ½ | ¼ | ½ | ¼ | ½ | ¼ |
| 2.0 | 5.6 | ½ | ¼ | ½ | ¼ | ½ | ¼ |
| 2.5 | 7.1 | ⅝ | ⅜ | ½ | ¼ | ⅝ | ⅜ |
| 2.9 | 8.0 | ⅝ | ⅜ | ½ | ¼ | ⅝ | ⅜ |
| 3.2 | 9.0 | ⅝ | ⅜ | ½ | ¼ | ⅝ | ⅜ |
| 4.0 | 11.2 | ⅝ | ⅜ | ⅝ | ⅜ | ⅝ | ⅜ |
| 5.0 | 14.0 | ⅝ | ⅜ | ⅝ | ⅜ | ⅝ | ⅜ |
| 6.0 | 16.0 | 6/8 | ⅜ | ⅝ | ⅜ | 6/8 | ⅜ |
| 8.0 | 22.4 | 6/8 | ⅜ | 6/8 | ⅜ | 6/8 | ⅜ |
| 10.0 | 28.0 | ⅞ | ⅜ | 6/8 | ⅜ | ⅞ | ⅜ |

TABLE 32

| | | R410A | | R32 | | Refrigerant A | |
|---|---|---|---|---|---|---|---|
| Horse Power [HP] | Rated Refrigeration Capacity [kW] | Gas-Side Connection Pipe | Liquid-Side Connection Pipe | Gas-Side Connection Pipe | Liquid-Side Connection Pipe | Gas-Side Connection Pipe | Liquid-Side Connection Pipe |
| 0.8 | 2.2 | ½ | ¼ | ⅜ | ¼ | ½ | ¼ |
| 1.0 | 2.8 | ½ | ¼ | ⅜ | ¼ | ½ | ¼ |
| 1.3 | 3.6 | ½ | ¼ | ⅜ | ¼ | ½ | ¼ |
| 1.6 | 4.5 | ½ | ¼ | ½ | ¼ | ½ | ¼ |

TABLE 32-continued

| | | R410A | | R32 | | Refrigerant A | |
|---|---|---|---|---|---|---|---|
| Horse Power [HP] | Rated Refrigeration Capacity [kW] | Gas-Side Connection Pipe | Liquid-Side Connection Pipe | Gas-Side Connection Pipe | Liquid-Side Connection Pipe | Gas-Side Connection Pipe | Liquid-Side Connection Pipe |
| 2.0 | 5.6 | 1/2 | 1/4 | 1/2 | 1/4 | 1/2 | 1/4 |
| 2.5 | 7.1 | 5/8 | 3/8 | 1/2 | 1/4 | 5/8 | 5/16 |
| 2.9 | 8.0 | 5/8 | 3/8 | 1/2 | 1/4 | 5/8 | 5/16 |
| 3.2 | 9.0 | 5/8 | 3/8 | 1/2 | 1/4 | 5/8 | 5/16 |
| 4.0 | 11.2 | 5/8 | 3/8 | 5/8 | 3/8 | 5/8 | 5/16 |
| 5.0 | 14.0 | 5/8 | 3/8 | 5/8 | 3/8 | 5/8 | 3/8 |
| 6.0 | 16.0 | 6/8 | 3/8 | 5/8 | 3/8 | 6/8 | 3/8 |
| 8.0 | 22.4 | 6/8 | 3/8 | 6/8 | 3/8 | 6/8 | 3/8 |
| 10.0 | 28.0 | 7/8 | 3/8 | 6/8 | 3/8 | 7/8 | 3/8 |

Figure 9K:
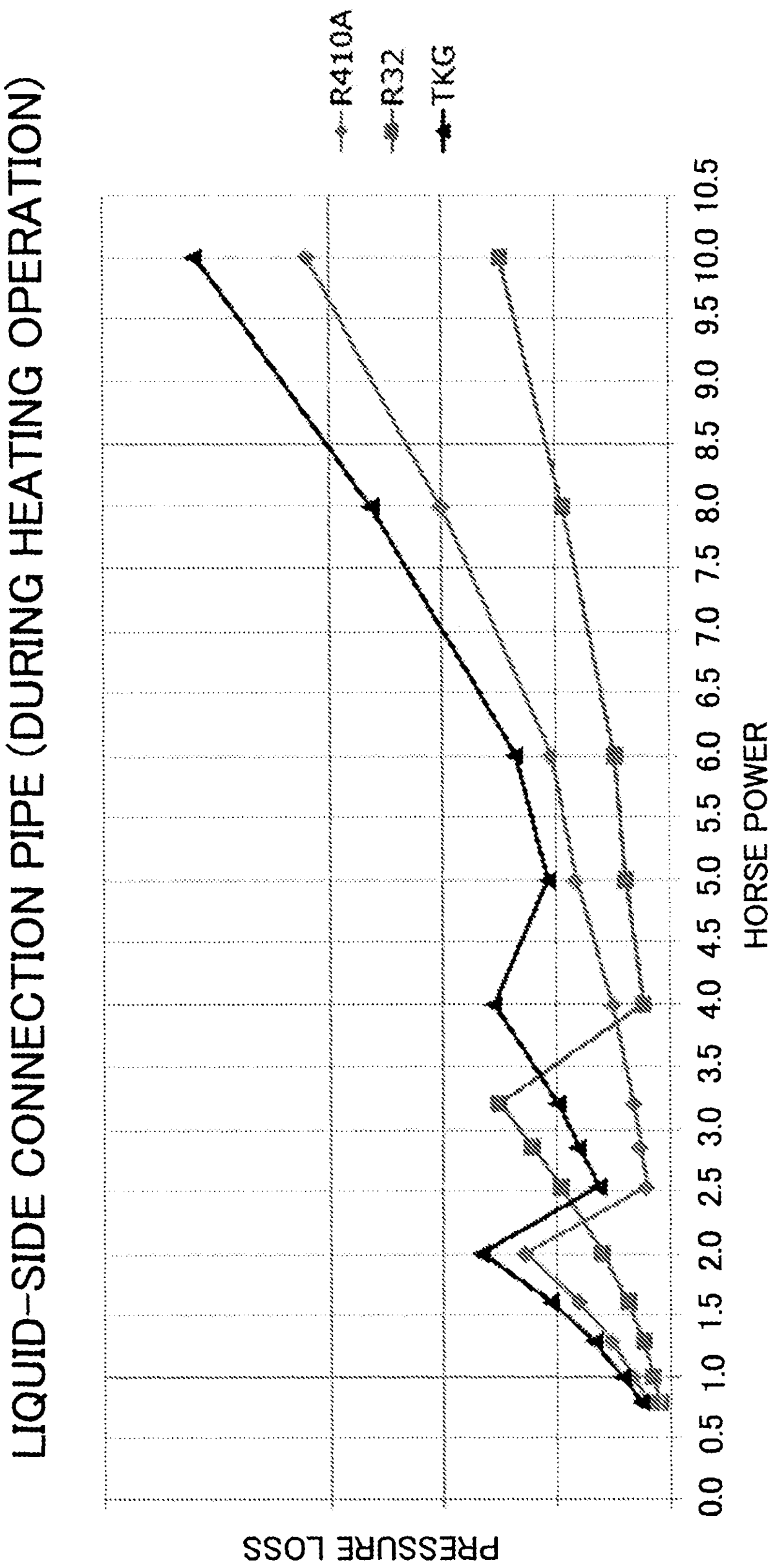
FIG. 9K is a graph of a pressure loss in a liquid-side connection pipe during heating operation for each pipe outer diameter when refrigerant R410A, refrigerant R32, and refrigerant A are used in an air conditioner according to the third embodiment of the technique of ninth group.
Figure 9L:
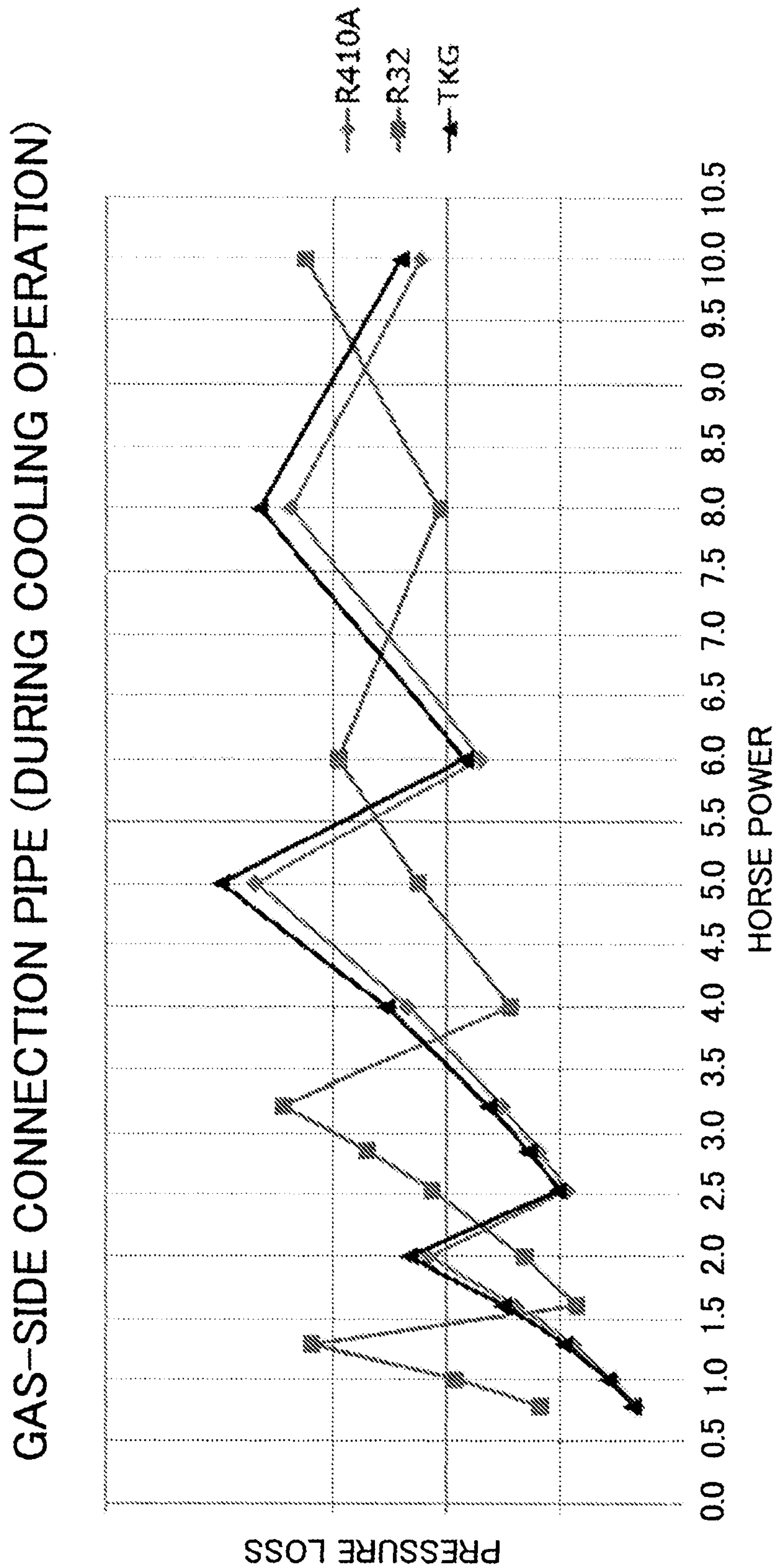
FIG. 9L is a graph of a pressure loss in a gas-side connection pipe during cooling operation for each pipe outer diameter when refrigerant R410A, refrigerant R32, and refrigerant A are used in the air conditioner according to the third embodiment of the technique of ninth group.

Here, for cases where refrigerant R410A, refrigerant R32, or the refrigerant A of the present disclosure, containing 1,2-difluoroethylene, is used and the liquid-side connection pipe 6 and the gas-side connection pipe 5 having the pipe outer diameters shown in Table 172 are used in the air conditioner 1*b* of the third embodiment, FIG. 9K shows a pressure loss in the liquid-side connection pipe 6 during heating operation, and FIG. 9L shows a pressure loss in the gas-side connection pipe 5 during cooling operation. In calculating a pressure loss, controlled target values of a condensation temperature, an evaporating temperature, a degree of subcooling of refrigerant at the condenser outlet, and a degree of superheating of refrigerant at the evaporator outlet are commonalized, and pressure losses of refrigerant in the connection pipes are calculated based on a refrigerant circulation amount that is required for operation at a rated capacity commensurate with a horse power. The unit of horse power is HP.

As is apparent from FIG. 9K and FIG. 9L, it is found that the refrigerant A of the present disclosure, containing 1,2-difluoroethylene, has an approximate behavior of pressure loss to the behavior of pressure loss of refrigerant R410A and a decrease in capacity can be suppressed when the refrigerant A is used in the air conditioner 1*b*. This point also applies to the refrigerants B to D that are the same in containing 1,2-difluoroethylene.

(9-4) Others

An air conditioner or an outdoor unit may be made up of a combination of the above-described first embodiment to third embodiment and modifications as needed.

(10) Embodiment of the Technique of Tenth Group

(10-1) Configuration of Air Conditioner 1

FIG. 16 is a refrigeration circuit diagram of an air conditioner 1 in which a compressor 100 according to an embodiment of the present invention is utilized. The air conditioner 1 is a refrigeration cycle apparatus provided with the compressor 100. As examples of the air conditioner 1 in which the compressor 100 is employed, an "air conditioner dedicated to cooling-operation", an "air conditioner dedicated to heating-operation", an "air conditioner switchable between cooling operation and heating operation by using a four-way switching valve", and the like are presented. Here, description will be provided using the "air conditioner switchable between cooling operation and heating operation by using a four-way switching valve".

Figure 10A:
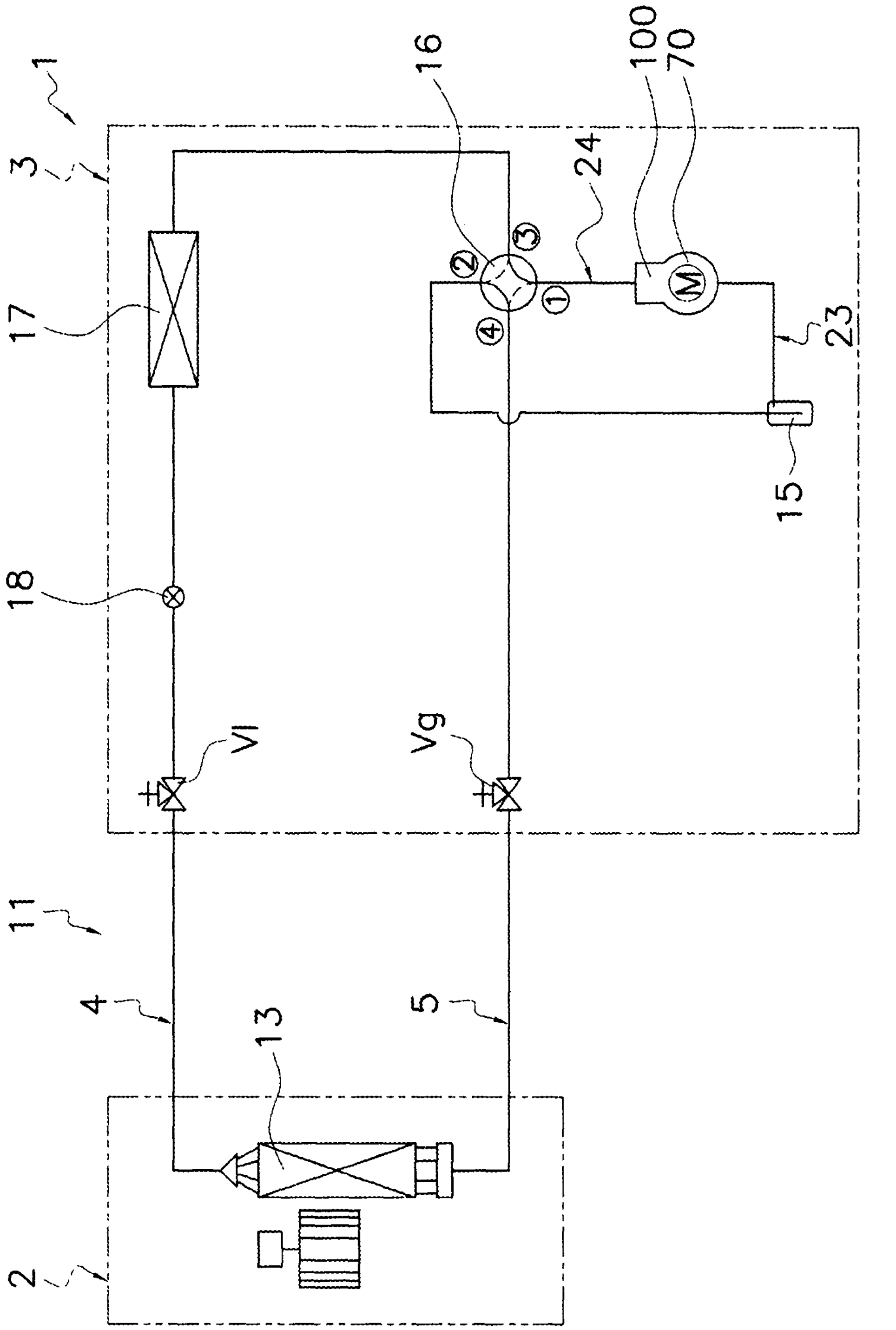
FIG. 10A is a refrigerant circuit diagram of an air conditioner in which a compressor according to an embodiment of the technique of tenth group is utilized.

Referring to FIG. 10A, the air conditioner 1 is provided with an indoor unit 2 and an outdoor unit 3. The indoor unit 2 and the outdoor unit 3 are connected to each other by a liquid-refrigerant connection pipe 4 and a gas-refrigerant connection pipe 5. As illustrated in FIG. 10A, the air conditioner 1 is of a pair-type having the indoor unit 2 and the outdoor unit 3 one each. The air conditioner 1 is, however, not limited thereto and may be of a multi-type having a plurality of the indoor units 2.

In the air conditioner 1, devices, such as an accumulator 15, the compressor 100, a four-way switching valve 16, an outdoor heat exchanger 17, an expansion valve 18, and an indoor heat exchanger 13, are connected together by pipes, thereby constituting a refrigerant circuit 11.

In the present embodiment, a refrigerant for performing a vapor compression refrigeration cycle is packed in the refrigerant circuit 11. The refrigerant is a mixed refrigerant containing 1,2-difluoroethylene, and, as the refrigerant, any one of the aforementioned refrigerants A to D is usable. A refrigerating machine oil is also packed together with the mixed refrigerant in the refrigerant circuit 11.

(10-1-1) Indoor Unit 2

The indoor heat exchanger 13 to be loaded in the indoor unit 2 is a cross-fin type fin-and-tube heat exchanger constituted by a heat transfer tube and a large number of heat transfer fins. The indoor heat exchanger 13 is connected at the liquid side thereof to the liquid-refrigerant connection pipe 4 and connected at the gas side thereof to the gas-refrigerant connection pipe 5, and the indoor heat exchanger 13 functions as a refrigerant evaporator during cooling operation.

(10-1-2) Outdoor Unit 3

The outdoor unit 3 is loaded with the accumulator 15, the compressor 100, the outdoor heat exchanger 17, and the expansion valve 18.

(10-1-2-1) Outdoor Heat Exchanger 17

The outdoor heat exchanger 17 is a cross-fin type fin-and-tube heat exchanger constituted by a heat transfer tube and a large number of heat transfer fins. The outdoor heat exchanger 17 is connected at one end thereof to the side of a discharge pipe 24 in which a refrigerant discharged from the compressor 100 flows and connected at the other end thereof to the side of the liquid-refrigerant connection pipe 4. The outdoor heat exchanger 17 functions as a condenser for a gas refrigerant supplied from the compressor 100 through the discharge pipe 24.

(10-1-2-2) Expansion Valve 18

The expansion valve 18 is disposed in a pipe that connects the outdoor heat exchanger 17 and the liquid-refrigerant connection pipe 4 to each other. The expansion valve 18 is an opening-degree adjustable electric valve for adjusting the pressure and the flow rate of a refrigerant that flows in the pipe.

(10-1-2-3) Accumulator 15

The accumulator 15 is disposed in a pipe that connects the gas-refrigerant connection pipe 5 and a suction pipe 23 of the compressor 100 to each other. The accumulator 15 separates, into a gas phase and a liquid phase, a refrigerant that flows from the indoor heat exchanger 13 toward the suction pipe 23 through the gas-refrigerant connection pipe 5 to prevent a liquid refrigerant from being supplied into the compressor 100. The compressor 100 is supplied with a gas-phase refrigerant accumulated in an upper space of the accumulator 15.

(10-1-2-4) Compressor 100

Figure 10B:
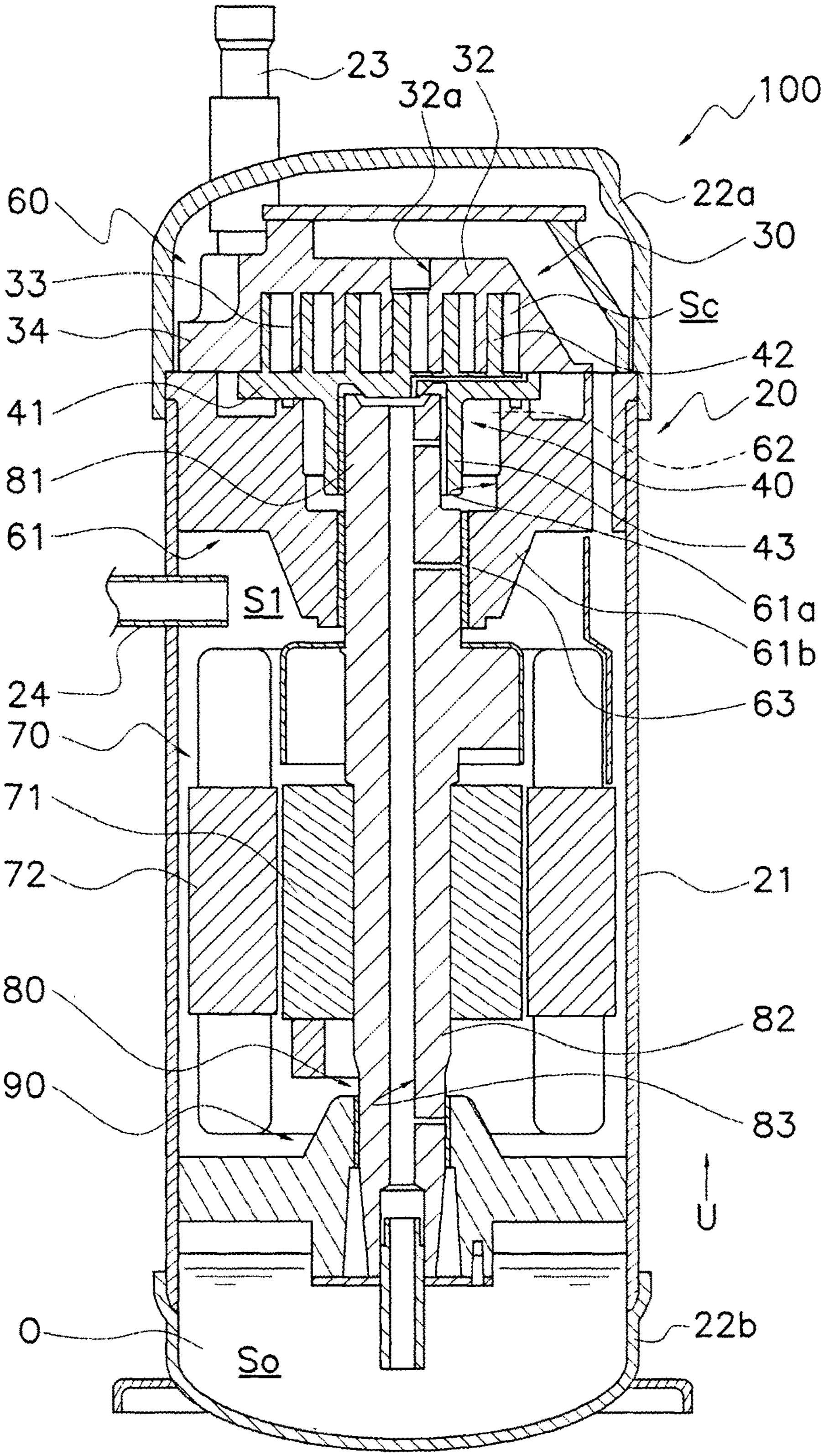
FIG. 10B is a longitudinal sectional view of the compressor according to an embodiment of the technique of tenth group.

FIG. 10B is a longitudinal sectional view of the compressor 100 according to an embodiment of the present invention. The compressor 100 in FIG. 10B is a scroll compressor. The compressor 100 compresses a refrigerant sucked through the suction pipe 23 in a compression chamber Sc and discharges the compressed refrigerant through the discharge pipe 24. Regarding the compressor 100, details will be described in the section of "(10-2) Configuration of Compressor 100".

(10-1-2-5) Four-Way Switching Valve 16

The four-way switching valve 16 has first to fourth ports. The four-way switching valve 16 is connected at the first port thereof to the discharge side of the compressor 100, connected at the second port thereof to the suction side of the compressor 100, connected at the third port thereof to the gas-side end portion of the outdoor heat exchanger 17, and connected at the fourth port thereof to a gas-side shutoff valve Vg.

Figure 1:
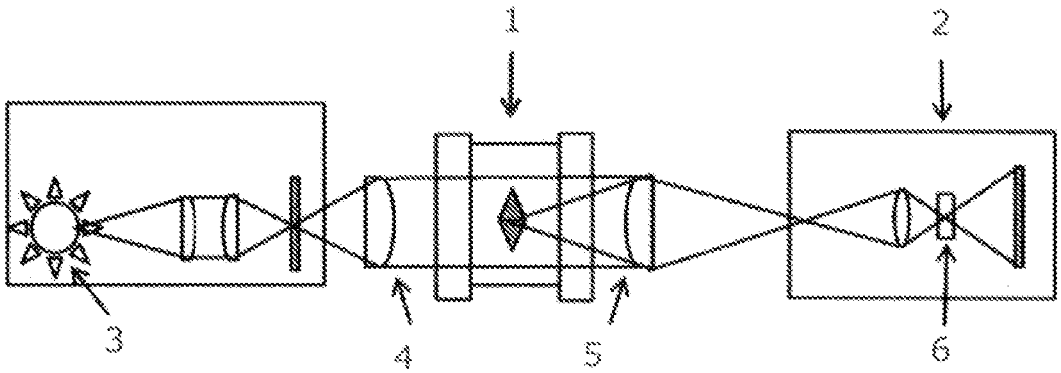
FIG. 1 is a schematic view of an apparatus used in a flammability test.
Figure 2A:
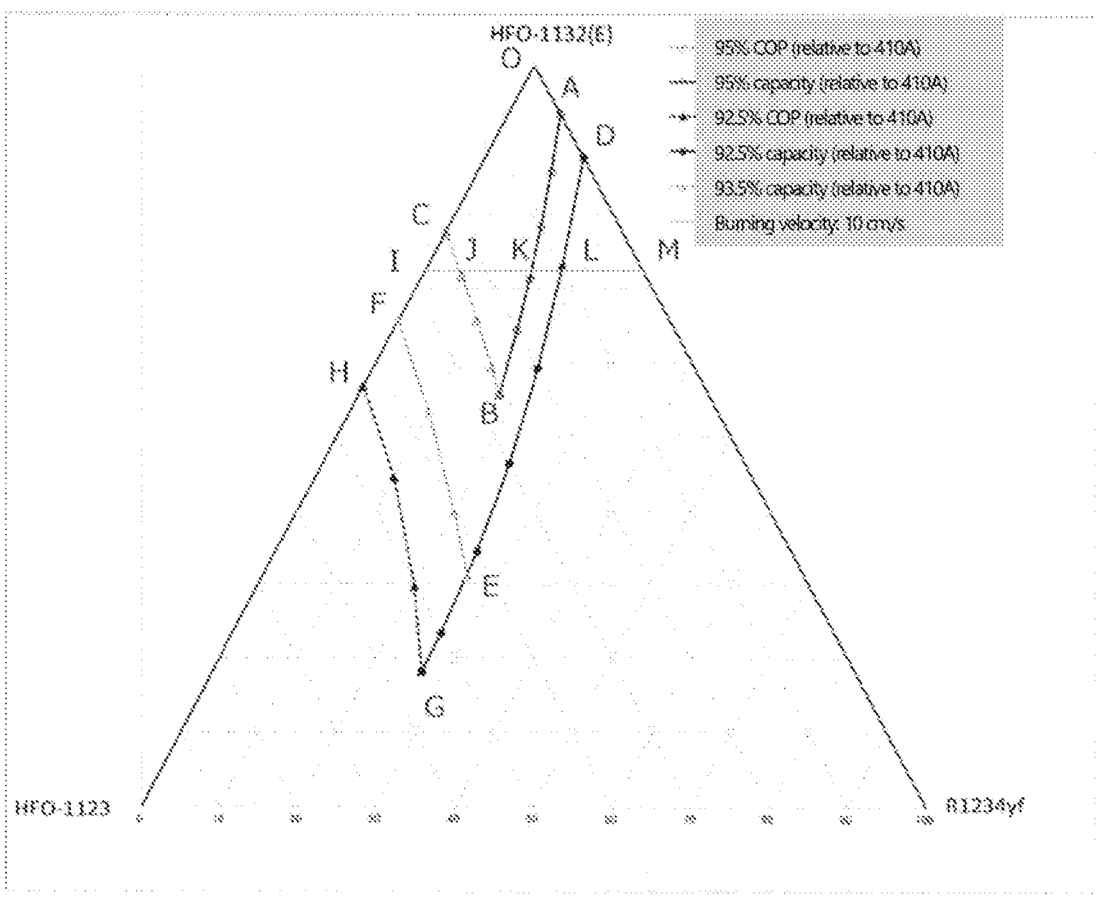
FIG. 2A is a diagram showing points A to M and O, and line segments that connect these points to each other in a ternary composition diagram in which the sum of HFO-1132 (E), HFO-1123, and R1234yf is 100 mass %.
Figure 2B:
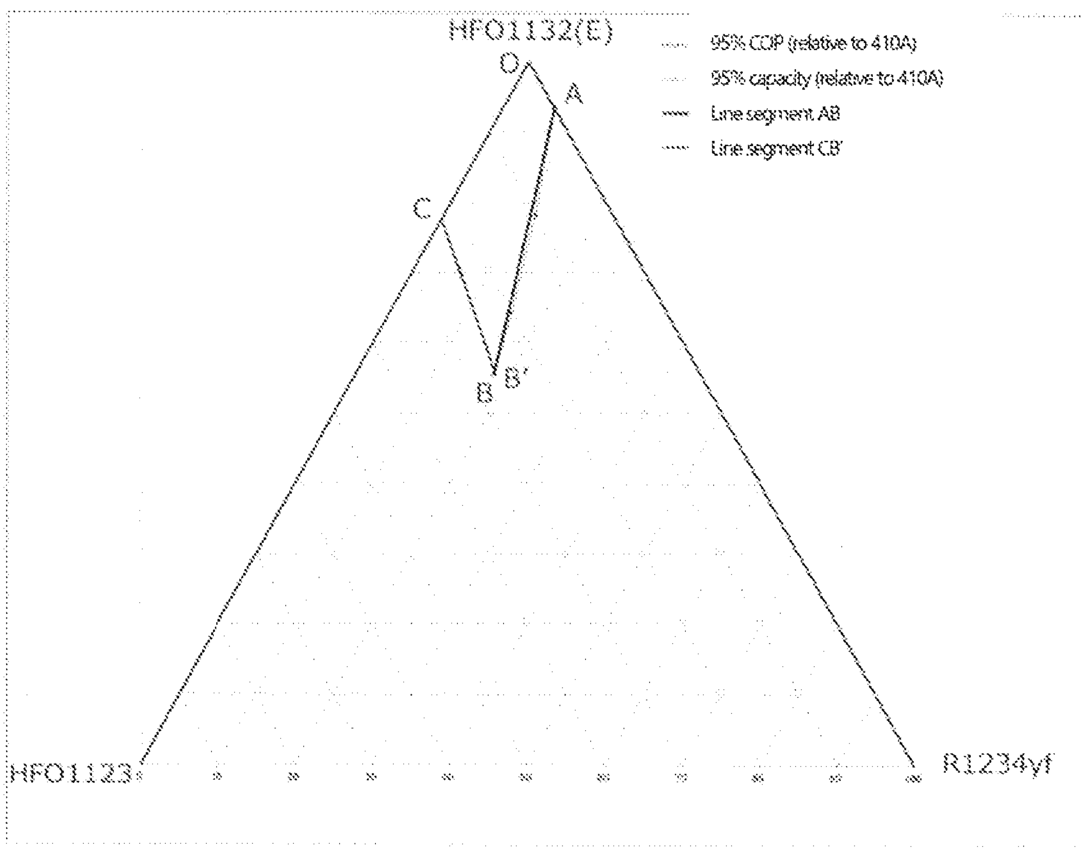
FIG. 2B is a diagram showing points A to C, B' and O, and line segments that connect these points to each other in a ternary composition diagram in which the sum of HFO-1132 (E), HFO-1123, and R1234yf is 100 mass %.
Figure 2C:
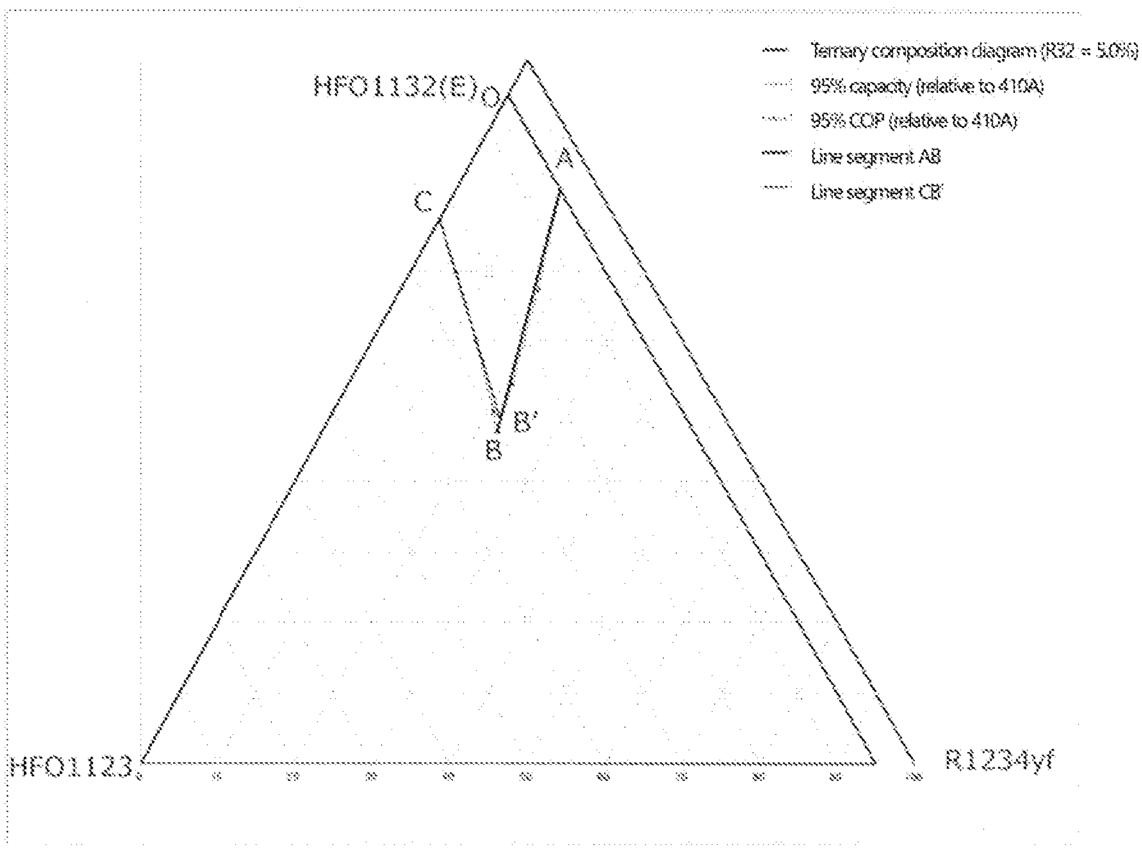
FIG. 2C is a diagram showing points A to C, B' and O, and line segments that connect these points to each other in a ternary composition diagram in which the sum of HFO-1132 (E), HFO-1123, and R1234yf is 95 mass % (R32 content is 5 mass %).
Figure 2D:
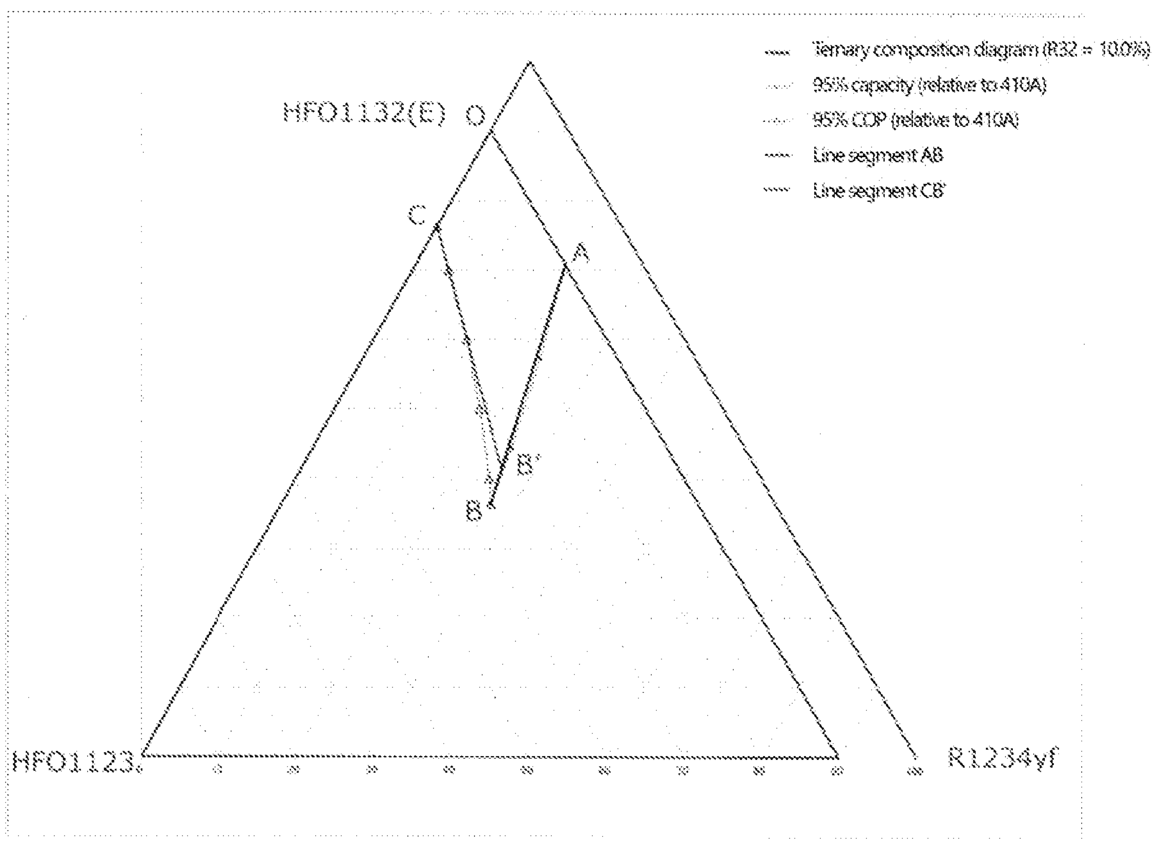
FIG. 2D is a diagram showing points A to C, B' and O, and line segments that connect these points to each other in a ternary composition diagram in which the sum of HFO-1132 (E), HFO-1123, and R1234yf is 90 mass % (R32 content is 10 mass %).
Figure 2E:
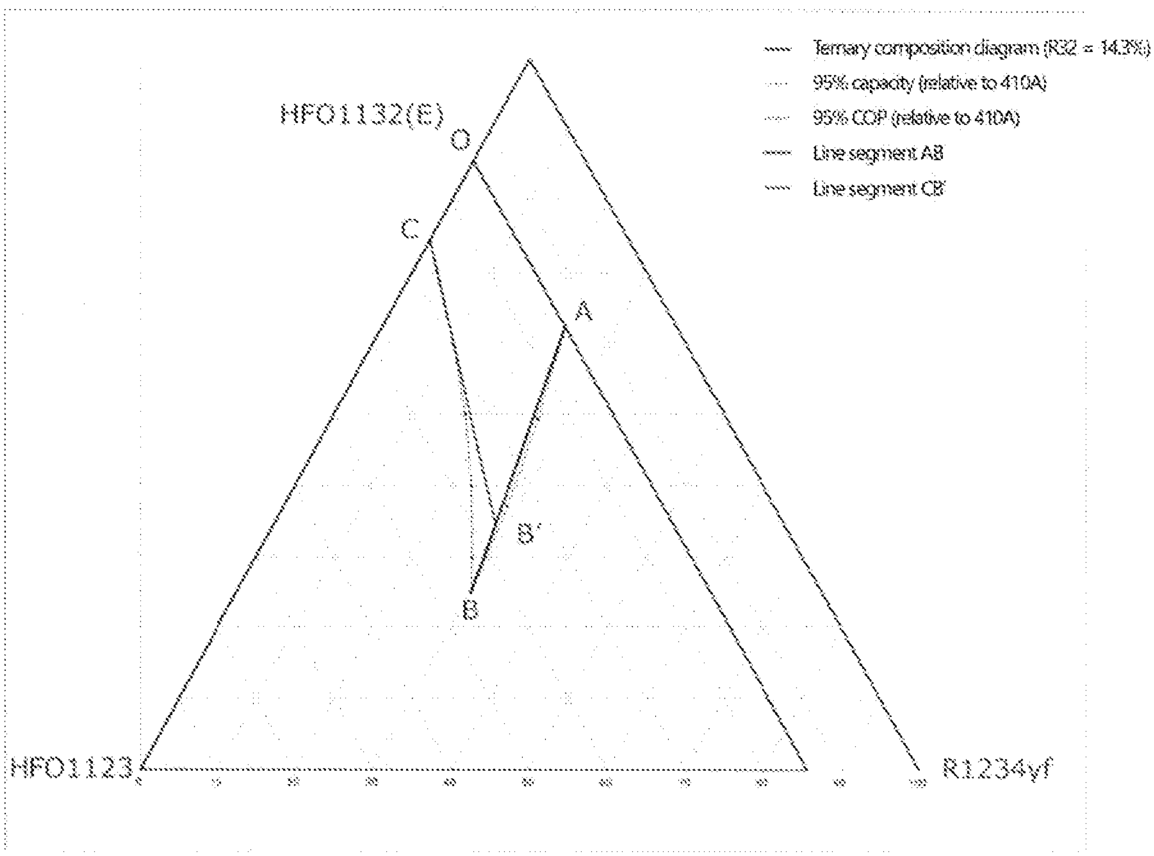
FIG. 2E is a diagram showing points A to C, B' and O, and line segments that connect these points to each other in a ternary composition diagram in which the sum of HFO-1132 (E), HFO-1123, and R1234yf is 85.7 mass % (R32 content is 14.3 mass %).
Figure 2F:
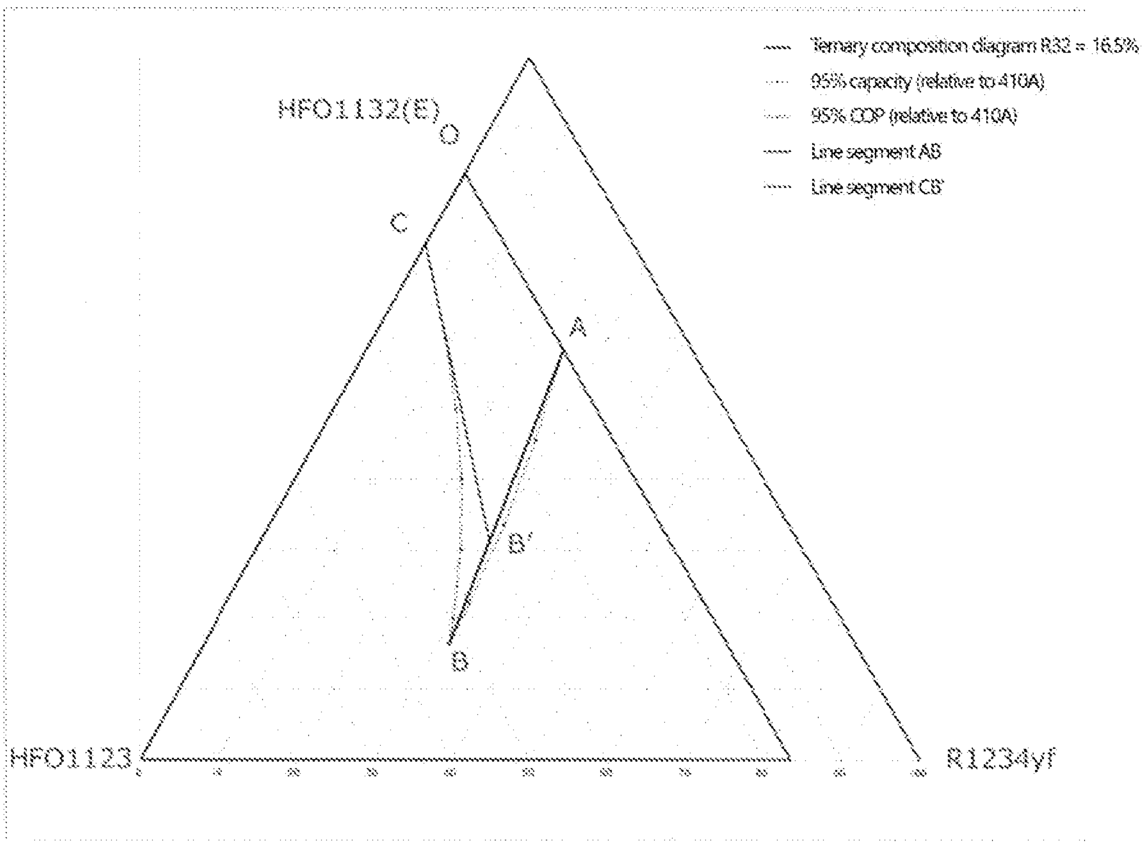
FIG. 2F is a diagram showing points A to C, B' and O, and line segments that connect these points to each other in a ternary composition diagram in which the sum of HFO-1132 (E), HFO-1123, and R1234yf is 83.5 mass % (R32 content is 16.5 mass %).
Figure 2G:
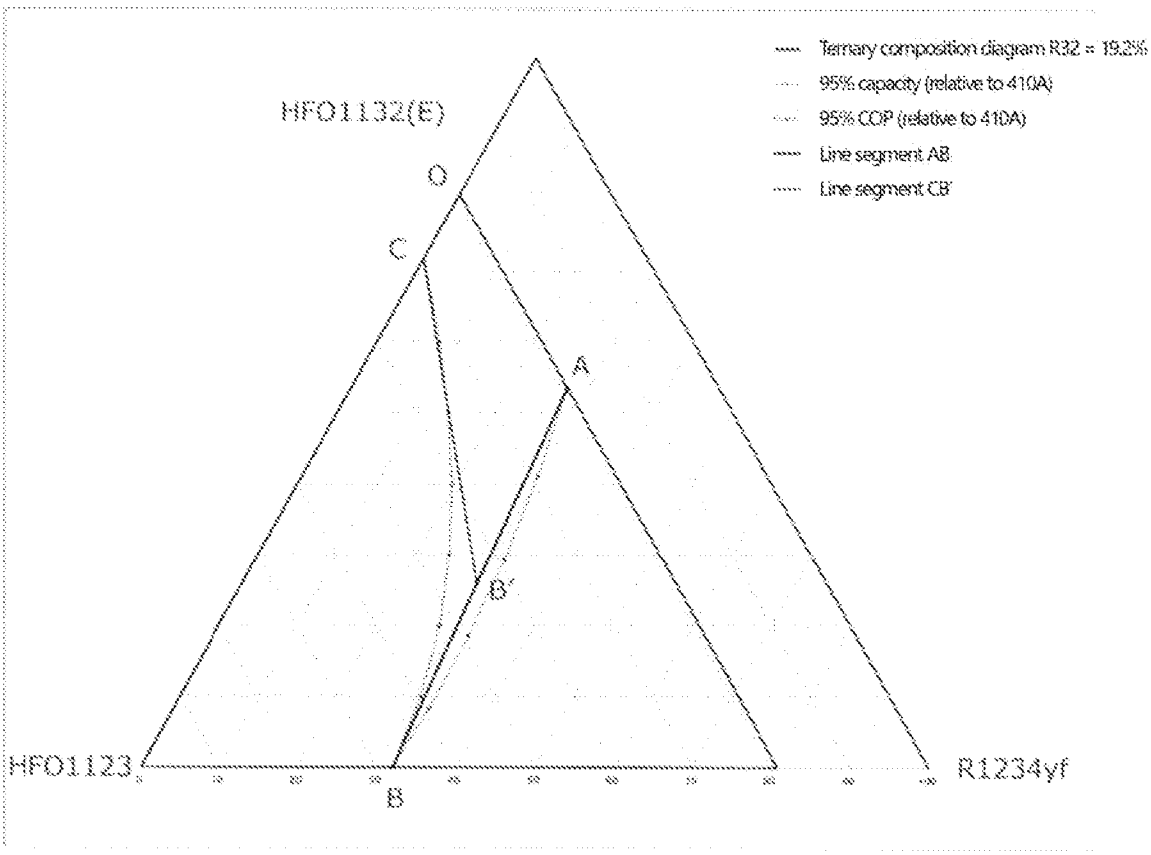
FIG. 2G is a diagram showing points A to C, B' and O, and line segments that connect these points to each other in a ternary composition diagram in which the sum of HFO-1132 (E), HFO-1123, and R1234yf is 80.8 mass % (R32 content is 19.2 mass %).
Figure 2H:
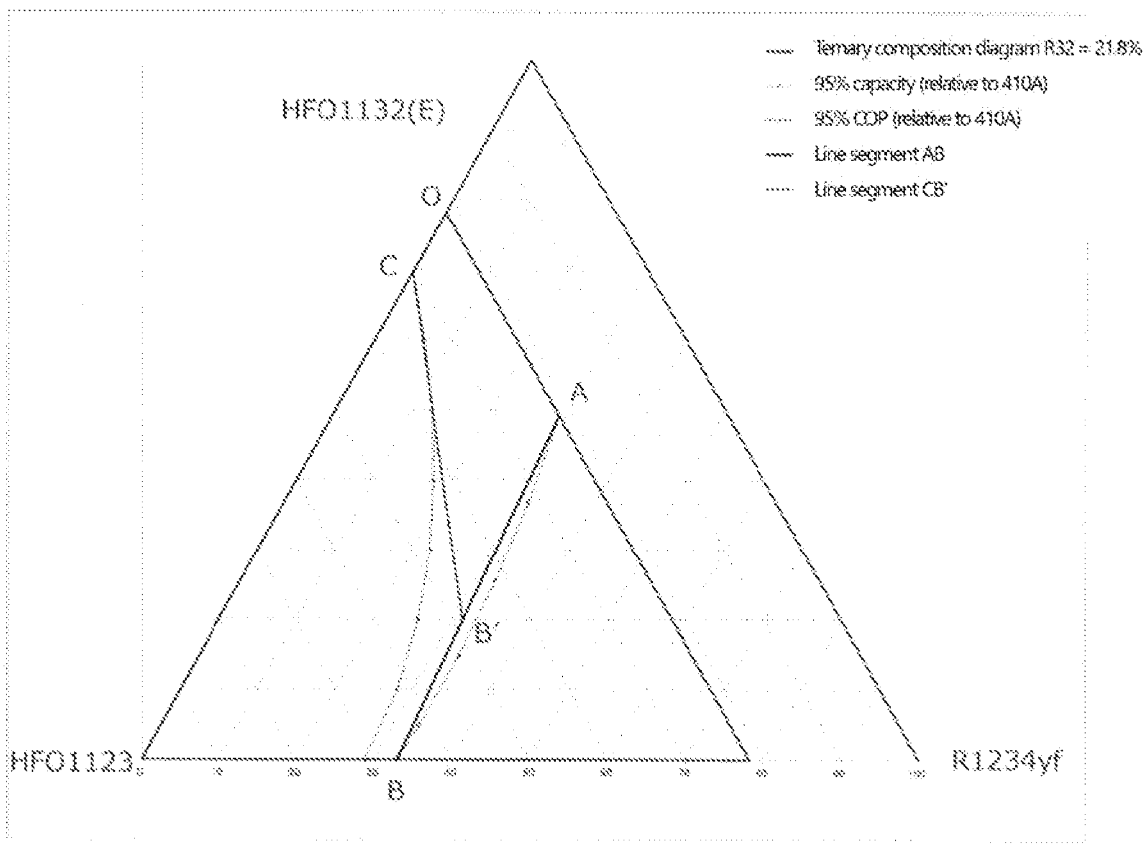
FIG. 2H is a diagram showing points A to C, B' and O, and line segments that connect these points to each other in a ternary composition diagram in which the sum of HFO-1132 (E), HFO-1123, and R1234yf is 78.2 mass % (R32 content is 21.8 mass %).
Figure 2I:
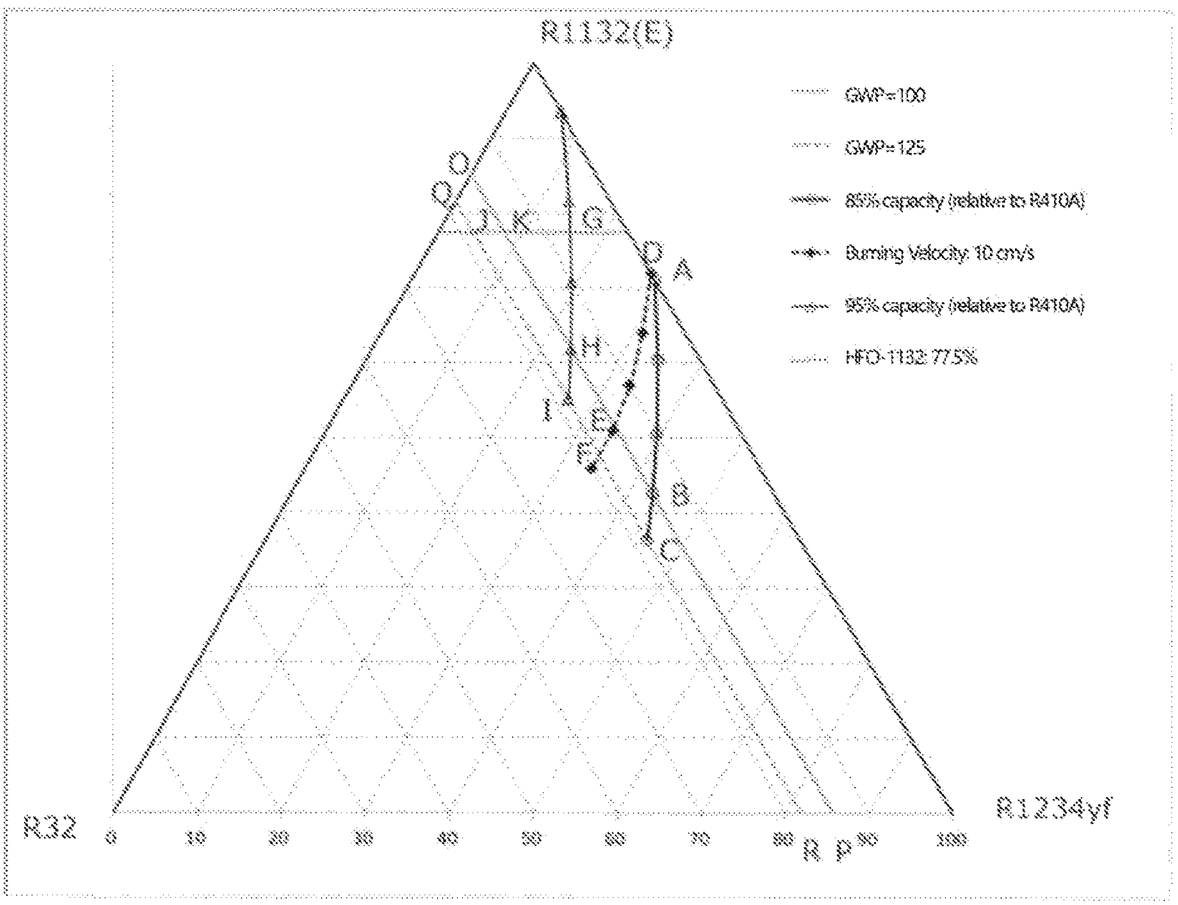
FIG. 2I is a diagram showing points A to K and O to R, and line segments that connect these points to each other in a ternary composition diagram in which the sum of HFO-1132(E), R32, and R1234yf is 100 mass %.
Figure 2J:
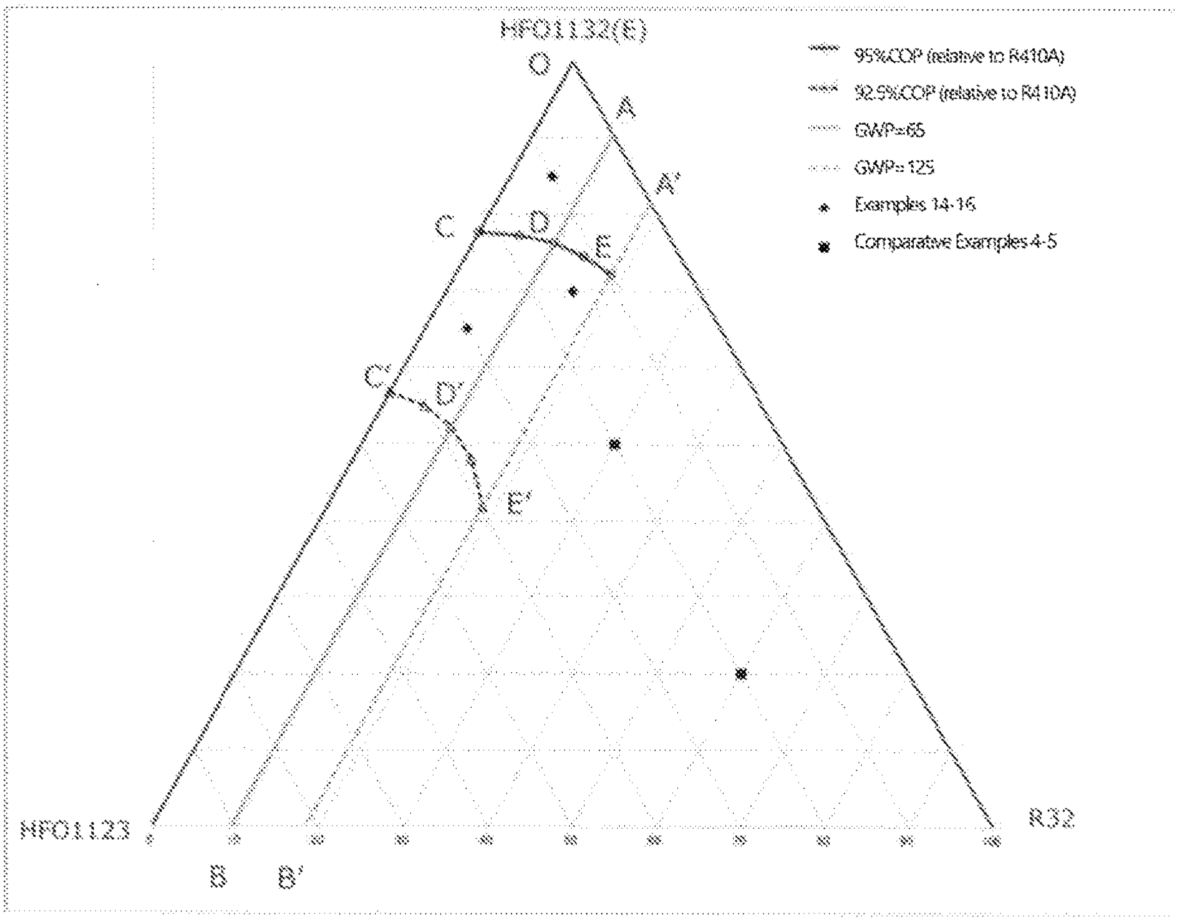
FIG. 2J is a diagram showing points A to D, A' to D', and O, and line segments that connect these points to each other in a ternary composition diagram in which the sum of HFO-1132(E), HFO-1123, and R32 is 100 mass %.

The four-way switching valve 16 is switchable between a first state (the state indicated by the solid lines in FIG. 1) and a second state (the state indicated by the dashed lines in FIG. 1). In the four-way switching valve 16 in the first state, the first port and the third port are in communication with each other, and the second port and the fourth port are in communication with each other. In the four-way switching valve 16 in the second state, the first port and the fourth port are in communication with each other, and the second port and the third port are in communication with each other.

(10-2) Configuration of Compressor 100

As illustrated in FIG. 10B, the compressor 100 is provided with a casing 20, a motor 70, a crank shaft 80, a lower bearing 90, and a compression mechanism 60 including a fixed scroll 30.

Hereinafter, expressions such as "up", "down", and the like are sometimes used to describe positional relations and the like of constituent members. Here, the direction of the arrow U in FIG. 10B is referred to as up, and the direction opposite the direction of the arrow U is referred to as down. In addition, expressions such as "perpendicular", "horizontal", "longitudinal", "lateral", and the like are sometimes used, and the up-down direction corresponds to the perpendicular direction and the longitudinal direction.

(10-2-1) Casing 20

The compressor 100 has the casing 20 that has a longitudinally elongated cylindrical shape. The casing 20 has a substantially cylindrical cylinder member 21 that opens upward and downward, and an upper cover 22*a* and a lower cover 22*b* that are disposed at the upper end and the lower end of the cylinder member 21, respectively. The upper cover 22*a* and the lower cover 22*b* are fixed to the cylinder member 21 by welding to maintain airtightness.

The casing 20 accommodates constituent devices of the compressor 100, including the compression mechanism 60, the motor 70, the crank shaft 80, and the lower bearing 90. An oil reservoir space So is formed in a lower portion of the casing 20. The oil reservoir space So stores a refrigerating machine oil O for lubricating the compression mechanism 60 and the like. The refrigerating machine oil O is the refrigerating machine oil described in the section of "(1-4-1) Refrigerating Machine Oil".

At an upper portion of the casing 20, the suction pipe 23 through which a gas refrigerant is sucked and through which the gas refrigerant is supplied to the compression mechanism 60 is disposed so as to pass through the upper cover 22*a*. The lower end of the suction pipe 23 is connected to the fixed scroll 30 of the compression mechanism 60. The suction pipe 23 is in communication with the compression chamber Sc of the compression mechanism 60. In the suction pipe 23, a low-pressure refrigerant of the refrigeration cycle before compression by the compressor 100 flows.

An intermediate portion of the cylinder member 21 of the casing 20 is provided with the discharge pipe 24 through which a refrigerant to be discharged to the outside of the casing 20 passes. Specifically, the discharge pipe 24 is disposed such that an end portion of the discharge pipe 24 in the inner portion of the casing 20 projects in a high-pressure space S1 formed below a housing 61 of the compression mechanism 60. In the discharge pipe 24, a high-pressure refrigerant of the refrigeration cycle after compression by the compression mechanism 60 flows.

(10-2-2) Compression Mechanism 60

As illustrated in FIG. 10B, the compression mechanism 60 has, mainly, the housing 61, the fixed scroll 30 disposed above the housing 61, and a movable scroll 40 that forms the compression chamber Sc by being combined with the fixed scroll 30.

(10-2-2-1) Fixed Scroll 30

As illustrated in FIG. 10B, the fixed scroll 30 includes a flat fixed-side end plate 32, a spiral fixed-side lap 33 projecting from the front surface (lower surface in FIG. 10B) of the fixed-side end plate 32, and an outer edge portion 34 surrounding the fixed-side lap 33.

At a center portion of the fixed-side end plate 32, a noncircular discharge port 32*a* in communication with the compression chamber Sc of the compression mechanism 60 is formed so as to pass through the fixed-side end plate 32 in the thickness direction. The refrigerant compressed in the compression chamber Sc is discharged through the discharge port 32*a* and flows into the high-pressure space S1 by passing through a refrigerant passage (not illustrated) formed in the fixed scroll 30 and the housing 61.

(10-2-2-2) Movable Scroll 40

As illustrated in FIG. 10B, the movable scroll 40 has a flat movable-side end plate 41, a spiral movable-side lap 42 projecting from the front surface (upper surface in FIG. 10B) of the movable-side end plate 41, and a cylindrical boss portion 43 projecting from the back surface (lower surface in FIG. 10B) of the movable-side end plate 41.

The fixed-side lap 33 of the fixed scroll 30 and the movable-side lap 42 of the movable scroll 40 are combined together with the lower surface of the fixed-side end plate 32 and the upper surface of the movable-side end plate 41 facing each other. The compression chamber Sc is formed between the fixed-side lap 33 and the movable-side lap 42 that are adjacent to each other. The volume of the compression chamber Sc is periodically changed by the movable scroll 40 revolving with respect to the fixed scroll 30, as described later, thereby causing the compression mechanism 60 to suck, compress, and discharge the refrigerant.

The boss portion 43 is a cylindrical portion closed at the upper end thereof. The movable scroll 40 and the crank shaft 80 are coupled to each other by an eccentric portion 81 of the crank shaft 80 inserted into a hollow portion of the boss portion 43. The boss portion 43 is disposed in an eccentric portion space 62 formed between the movable scroll 40 and the housing 61. The eccentric portion space 62 is in communication with the high-pressure space S1 via an oil supply path 83 and the like of the crank shaft 80, and a high pressure acts on the eccentric portion space 62. Due to this pressure, the lower surface of the movable-side end plate 41 inside the eccentric portion space 62 is pressed upward toward the fixed scroll 30. Due to this force, the movable scroll 40 becomes in close contact with the fixed scroll 30.

The movable scroll 40 is supported by the housing 61 via an oldham coupling (not illustrated). The oldham coupling is a member that prevents the rotation of the movable scroll 40 and causes the movable scroll 40 to revolve. Due to the use of the oldham coupling, when the crank shaft 80 rotates, the movable scroll 40 coupled to the crank shaft 80 in the boss portion 43 revolves with respect to the fixed scroll 30 without rotating, and the refrigerant in the compression chamber Sc is compressed.

(10-2-2-3) Housing 61

The housing 61 is press-fitted into the cylinder member 21 and fixed at the entirety of the outer circumferential surface thereof in the circumferential direction to the cylinder member 21. The housing 61 and the fixed scroll 30 are fixed to each other by a bolt and the like (not illustrated) such that the upper end surface of the housing 61 and the lower surface of the outer edge portion 34 of the fixed scroll 30 are in close contact with each other.

The housing 61 has a concave portion 61*a* disposed to be recessed in a center portion of the upper surface thereof and a bearing portion 61*b* disposed below the concave portion 61*a*.

The concave portion 61*a* surrounds the side surface of the eccentric portion space 62 in which the boss portion 43 of the movable scroll 40 is disposed.

On the bearing portion 61*b*, the bearing 63 that supports a main shaft 82 of the crank shaft 80 is disposed. The bearing 63 rotatably supports the main shaft 82 inserted into the bearing 63.

(10-2-3) Motor 70

The motor 70 has an annular stator 72 fixed to the inner wall surface of the cylinder member 21 and a rotor 71 rotatably accommodated inside the stator 72 with a slight gap (air gap) therebetween.

The rotor 71 is coupled to the movable scroll 40 via the crank shaft 80 disposed to extend in the up-down direction along the axis of the cylinder member 21. In response to the rotor 71 rotating, the movable scroll 40 revolves with respect to the fixed scroll 30.

Details of the motor 70 will be described in the section of “(10-4) Configuration of Motor 70”.

(10-2-4) Crank Shaft 80

The crank shaft 80 transmits the driving force of the motor 70 to the movable scroll 40. The crank shaft 80 is disposed to extend in the up-down direction along the axis of the cylinder member 21 and couples the rotor 71 of the motor 70 and the movable scroll 40 of the compression mechanism 60 to each other.

The crank shaft 80 has the main shaft 82 having a center axis coincident with the axis of the cylinder member 21, and the eccentric portion 81 eccentric with respect to the axis of the cylinder member 21. The eccentric portion 81 is inserted into the boss portion 43 of the movable scroll 40.

The main shaft 82 is rotatably supported by the bearing 63 on the bearing portion 61*b* of the housing 61 and the lower bearing 90. The main shaft 82 is coupled between the bearing portion 61*b* and the lower bearing 90 to the rotor 71 of the motor 70.

In the inner portion of the crank shaft 80, the oil supply path 83 for supplying the refrigerating machine oil O to the compression mechanism 60 and the like is formed. The lower end of the main shaft 82 is positioned in the oil reservoir space So formed in a lower portion of the casing 20. The refrigerating machine oil O in the oil reservoir space So is supplied to the compression mechanism 60 and the like through the oil supply path 83.

(10-2-5) Lower Bearing 90

The lower bearing 90 is disposed below the motor 70. The lower bearing 90 is fixed to the cylinder member 21. The lower bearing 90 constitutes the bearing on the lower end side of the crank shaft 80 and rotatably supports the main shaft 82 of the crank shaft 80.

(10-3) Operation of Compressor 100

Operation of the compressor 100 will be described. When the motor 70 is started, the rotor 71 rotates with respect to the stator 72, and the crank shaft 80 fixed to the rotor 71 rotates. When the crank shaft 80 rotates, the movable scroll 40 coupled to the crank shaft 80 revolves with respect to the fixed scroll 30. Then, the low-pressure gas refrigerant of the refrigeration cycle is sucked into the compression chamber Sc from the peripheral edge side of the compression chamber Sc through the suction pipe 23. As a result of the movable scroll revolving, the suction pipe 23 and the compression chamber Sc become not in communication with each other, and, in response to the decrease in the capacity of the compression chamber Sc, the pressure in the compression chamber Sc starts to increase.

The refrigerant in the compression chamber Sc is compressed in response to the decrease in the capacity of the compression chamber Sc and eventually becomes a high-pressure gas refrigerant. The high-pressure gas refrigerant is discharged through the discharge port 32*a* positioned close to the center of the fixed-side end plate 32. After that, the high-pressure gas refrigerant passes through the refrigerant passage (not illustrated) formed in the fixed scroll 30 and the housing 61 and flows into the high-pressure space S1. The high-pressure gas refrigerant of the refrigeration cycle that has flowed into the high-pressure space S1 and that has been compressed by the compression mechanism 60 is discharged through the discharge pipe 24.

(10-4) Configuration of Motor 70

Figure 10C:
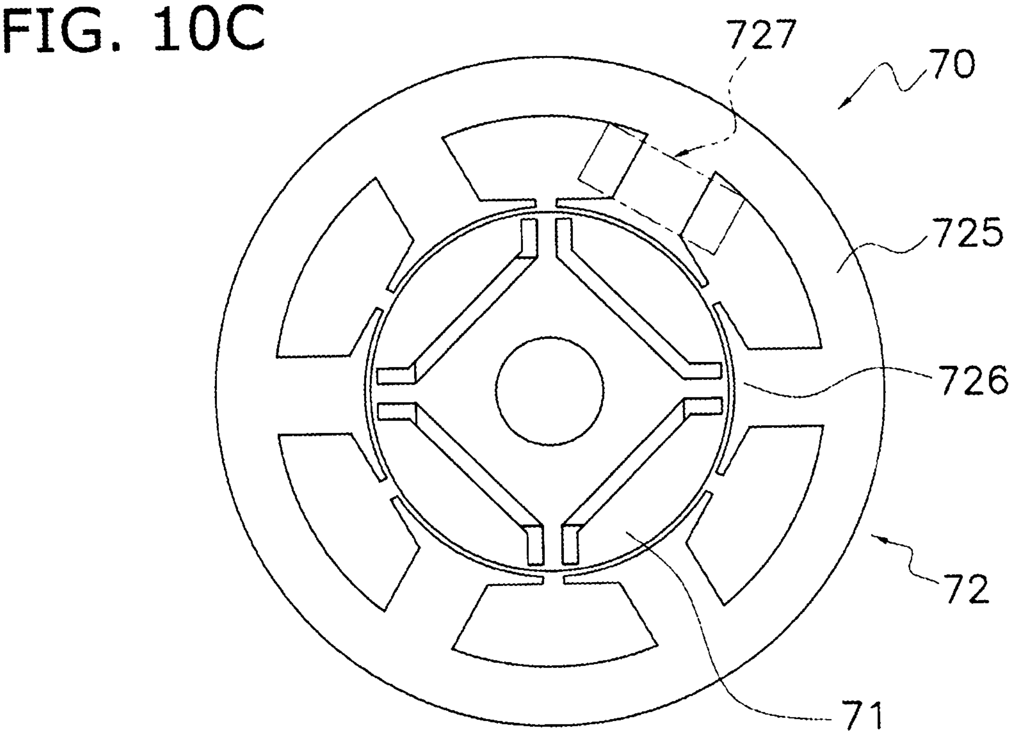
FIG. 10C is a sectional view of a motor sectioned along a plane perpendicular to an axis of the technique of tenth group.
Figure 10D:
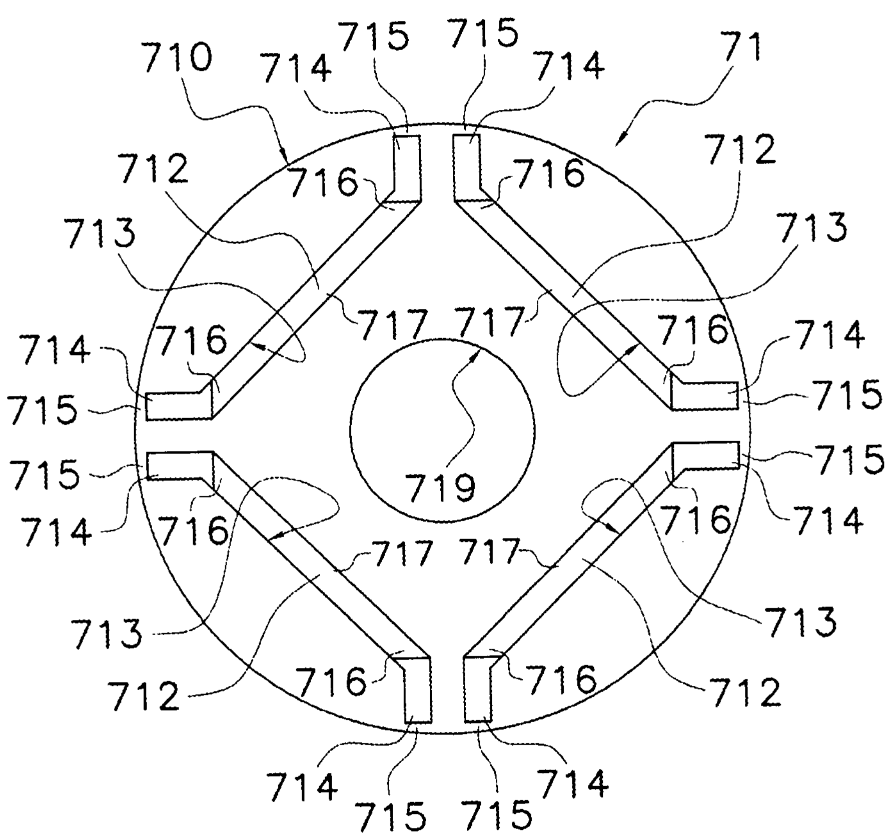
FIG. 10D is a sectional view of a rotor sectioned along a plane perpendicular to an axis of the technique of tenth group.
Figure 10E:
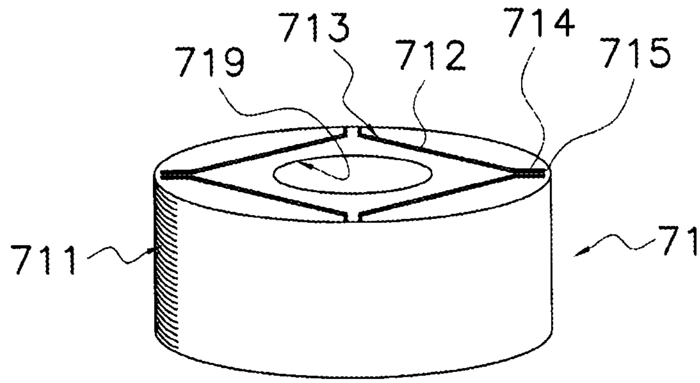
FIG. 10E is a perspective view of the rotor of the technique of tenth group.

FIG. 10C is a sectional view of the motor 70 sectioned along a plane perpendicular to the axis. FIG. 10D is a sectional view of the rotor 71 sectioned along a plane perpendicular to the axis. FIG. 10E is a perspective view of the rotor 71.

Note that illustration of the shaft coupled to the rotor 71 to transmit the rotational force to the outside is omitted in FIG. 10C to FIG. 10E. The motor 70 in FIG. 10C to FIG. 10E is a permanent-magnet synchronous motor. The motor 70 has the rotor 71 and the stator 72.

(10-4-1) Stator 72

The stator 72 is provided with a barrel portion 725 and a plurality of tooth portions 726. The barrel portion 725 has a substantially cylindrical shape having an inner circumferential diameter larger than the outer circumferential diameter of the rotor 71. The barrel portion 725 is formed by machining each of thin electromagnetic steel plates having a thickness of 0.05 mm or more and 0.5 mm or less integrally with the tooth portions 726 into a predetermined shape and laminating a predetermined number of the electromagnetic steel plates.

The plurality of tooth portions 726 project on the inner circumferential part of the barrel portion 725 in a form of being positioned at substantially equal intervals in the circumferential direction thereof. Each of the tooth portions 726 extends from the inner circumferential part of the barrel portion 725 toward the center in the radial direction of a circle centered on the axis and faces the rotor 71 with a predetermined gap.

The tooth portions 726 are magnetically coupled on the outer circumferential side via the barrel portion 725. A coil 727 is wound, as a coil, around each of the tooth portions 726 (only one of the coils 727 is illustrated in FIG. 10C). Three-phase alternating current for generating a rotating magnetic field that rotates the rotor 71 is made to flow through the coils 727. The winding type of the coils 727 is not limited and may be wound with respect to the plurality of the tooth portions 726 in a concentrated form or in a distributed form.

The rotor 71 and the stator 72 are incorporated in the casing 20 and used as a rotary electric machine.

(10-4-2) Rotor 71

The rotor 71 has a substantially cylindrical external shape and has a center axis along which the main shaft 82 of the crank shaft 80 is coupled and fixed. The rotor 71 has a rotor core 710 and a plurality of permanent magnets 712. The rotor 71 is a magnet-embedded rotor in which the permanent magnets 712 are embedded in the rotor core 710.

(10-4-2-1) Rotor Core 710

The rotor core 710 is made of a magnetic material and has a substantially cylindrical shape. The rotor core 710 is formed by machining each of thin electromagnetic steel plates 711 having a thickness of 0.05 mm or more and 0.5 mm or less into a predetermined shape and laminating a predetermined number of the electromagnetic steel plates 711. The electromagnetic steel plates are desirably a plurality of high-tensile electromagnetic steel plates each having a tensile strength of 400 MPa or more to improve the durability of the rotor during high-speed rotation.

A shaft insertion hole 719 for fixing the main shaft 82 (refer to FIG. 10B) of the crank shaft 80 is formed along the center axis of the rotor core 710. In the rotor core 710, a plurality of magnet accommodation holes 713 are formed in the circumferential direction about the axis.

(10-4-2-1-1) Magnet Accommodation Hole 713

The magnet accommodation holes 713 are spaces each having a rectangular parallelepiped shape that is flat in a direction substantially orthogonal to the radial direction of the circle centered on the axis. The magnet accommodation holes 713 may be through holes or may be bottomed holes as long as having a shape that enables the permanent magnets 712 to be embedded therein.

As illustrated in FIG. 10D, the magnet accommodation holes 713 are disposed such that two of any mutually adjacent magnet accommodation holes 713 form a substantially V-shape.

(10-4-2-1-2) Non-magnetic Space 714

A non-magnetic space 714 extends toward the outer circumferential side of the rotor core 710 by bending from each end portion of the magnet accommodation holes 713. The non-magnetic space 714 has a function of causing, when a demagnetization field is generated, a magnetic flux due to the demagnetization field to avoid the permanent magnets 712 and easily pass through the non-magnetic space 714. Thus, prevention of demagnetization is also addressed by the non-magnetic space 714.

(10-4-2-1-3) Bridge 715

A bridge 715 is positioned radially outside the non-magnetic space 714 and couples magnetic poles to each other. The thickness of the bridge 715 is set to be 3 mm or more to improve durability during high-speed rotation.

The rotor 71 illustrated in FIG. 10C to FIG. 10E is an example, and the rotor is not limited thereto.

Figure 10F:
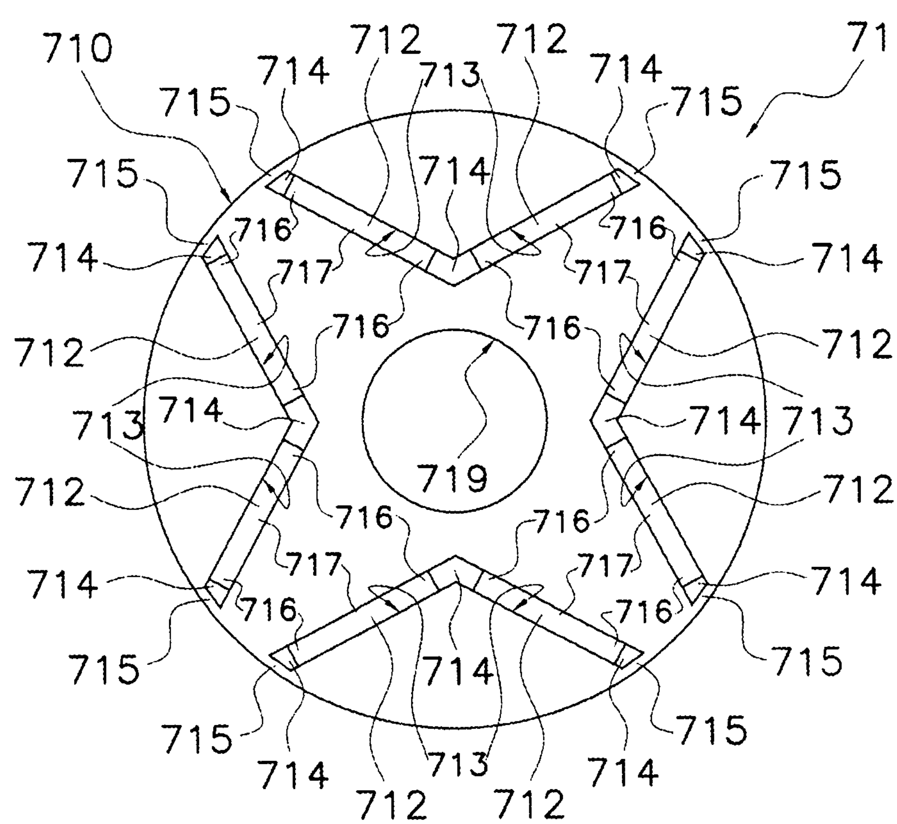
FIG. 10F is a sectional view of another rotor sectioned along a plane perpendicular to an axis of the technique of tenth group.

FIG. 10F is a sectional view of another rotor 71 sectioned along a plane perpendicular to the axis. The rotor 71 in FIG. 10F differs from the rotor in FIG. 10D in terms of that pairs of mutually adjacent two magnet accommodation holes 713 are each disposed to form a V-shape in FIG. 10F while, in FIG. 10D, mutually adjacent any two of the magnet accommodation holes are disposed to form a substantially V-shape.

Thus, in the rotor 71 of FIG. 10F, the rotor core 710 is provided with eight magnet accommodation holes 713 each having a width narrower than that of the magnet accommodation holes illustrated in FIG. 10D, pairs of mutually adjacent magnet accommodation holes 713 each form a V-shape, and four V-shapes are formed in total. The bottom side of the V-shape formed by a pair of the magnet accommodation holes 713 forms one V-shaped non-magnetic space 714 as a result of two non-magnetic spaces connected to each other.

The non-magnetic space 714 on the outer side is formed on an end portion opposite to the bottom side of the magnet accommodation hole 713 and extends toward the outer circumferential side of the rotor core 710.

The breadth of the magnet accommodation holes 713 is small compared with those of the magnet accommodation holes illustrated in FIG. 10D. Consequently, the breadth of the permanent magnets 712 is also small compared with those of the permanent magnets illustrated in FIG. 10D.

Actions of the permanent magnets 712, the magnet accommodation holes 713, the non-magnetic spaces 714, and the bridges 715 illustrated in FIG. 10F are identical to the actions of those in illustrated in FIG. 10D.

(10-4-2-2) Permanent Magnet 712

The permanent magnets 712 are neodymium rare-earth magnets containing Nd—Fe—B (neodymium-iron-boron). The coercive force of Nd—Fe—B-based magnets deteriorates by being affected by temperature. Thus, when a motor using Nd—Fe—B-based magnets is used in a compressor, the coercive force thereof decreases in high-temperature atmosphere (100° C. or higher) inside the compressor.

Therefore, the permanent magnets 712 are desirably formed by diffusing a heavy-rare-earth element (for example, dysprosium) along grain boundaries. In grain boundary diffusion in which a heavy-rare-earth element is diffused along grain boundaries, a sintered material is formed by sintering a predetermined composition, a heavy-rare-earth product is applied onto the sintered material, and then, the sintered material is subjected to heat treatment at a temperature lower than a sintering temperature, thereby manufacturing the permanent magnets 712.

According to the grain boundary diffusion, it is possible to reduce the addition amount of the heavy-rare-earth element and increase the coercive force. The permanent magnets 712 of the present embodiment each contain 1 mass % or less of dysprosium and thereby improve the holding force.

In the present embodiment, to improve demagnetization resistance of the permanent magnets 712, the average crystal grain size of each permanent magnet 712 is 10 μm or less and desirably 5 μm or less.

The permanent magnets 712 each have a quadrangular plate shape having two major faces and a uniform thickness. The permanent magnets 712 are embedded one each in each magnet accommodation hole 713. As illustrated in FIG. 10D and FIG. 10F, among the permanent magnets 712 embedded in respective magnet accommodation holes 713, two of any mutually adjacent permanent magnets 712 form a substantially V-shape.

The outward faces of the permanent magnets 712 are pole faces that cause the rotor core 710 to generate magnetic poles. The inward faces of the permanent magnets 712 are opposite pole faces opposite thereto. When the permanent magnets 712 are considered as parts that cause the stator 72 to generate magnetic poles, both end portions of the permanent magnets 712 in the circumferential direction are pole ends, and a center portion thereof in the circumferential direction is the magnetic pole center.

In the aforementioned orientation of the permanent magnets 712, both end portions of the permanent magnets 712 are in the vicinity of the end portions of the magnetic poles, and a portion close to the air gap is referred to as "proximity part 716". The proximity part 716 is a part positioned at the bottom portion of the V-shape. In the permanent magnet 712, an intermediate portion is closer than the proximity part 716 to a magnetic-pole-center portion, and a part that is distant from the air gap is referred to as "distant part 717".

In the motor 70 of a concentrated winding-type in which the coils 727 are wound around respective tooth portions 726, magnetic fluxes generated by the coils 727 flow to the tooth portions 726 adjacent thereto at a shortest distance. Accordingly, a demagnetization field acts more strongly on the proximity parts 716 of the permanent magnets 712 in the vicinity of the surface of the rotor core 710. Therefore, in the present embodiment, the holding force of the proximity part 716 (part positioned at the bottom portion of the V-shape) is set to be higher than that of the other parts by $\{1/(4\pi)\}\times10^3$ [A/m] or more, thereby suppressing demagnetization.

Thus, the demagnetization suppressing effect is large when the present embodiment is applied to the concentrated winding-type motor 70.

The thickness dimension of the permanent magnets 712 and the dimension of the magnet accommodation holes 713 in the thickness direction of the permanent magnets 712 are substantially identical to each other. Both major faces of the permanent magnets 712 are substantially in contact with the inner faces of the magnet accommodation holes 713. As a result, it is possible to reduce magnetic resistance between the permanent magnets 712 and the rotor core 710.

The "state in which both major faces of the permanent magnets 712 are substantially in contact with the inner faces of the magnet accommodation holes 713" includes a "state in which a minute gap of a size required to insert the permanent magnets 712 into the magnet accommodation holes 713 is generated between the permanent magnets 712 and the magnet accommodation holes 713".

(10-5) Features 10-5-1

The compressor 100 is suitable for a variable capacity compressor in which the number of rotations of a motor can be changed because the motor 70 has the rotor 71 including the permanent magnets 712. In this case, in the air conditioner 1 that uses a mixed refrigerant containing at least 1,2-difluoroethylene, the number of rotations can be changed in accordance with an air conditioning load, which enables high efficiency of the compressor 100.

10-5-2

The rotor 71 is a magnet-embedded rotor. In the magnet-embedded rotor, the permanent magnets 712 are embedded in the rotor 71.

10-5-3

The rotor 71 is formed by laminating a plurality of the electromagnetic steel plates 711 in the plate thickness direction. The thickness of each of the electromagnetic steel plates 711 is 0.05 mm or more and 0.5 mm or less.

Generally, the thinner the plate thickness is made, the more the eddy-current loss can be reduced. The plate thickness is, however, desirably 0.05 to 0.5 mm considering that a plate thickness of less than 0.05 mm makes processing of the electromagnetic steel plates difficult and that it takes time for siliconizing from the steel plate surface and diffusing for optimizing S1 distribution when the plate thickness is more than 0.5 mm.

10-5-4

The permanent magnets 712 are Nd—Fe—B-based magnets. As a result, the motor 70 capable of increasing a magnetic energy product is realized, which enables high efficiency of the compressor 100.

10-5-5

The permanent magnets 712 are formed by diffusing a heavy-rare-earth element along grain boundaries. As a result, the demagnetization resistance of the permanent magnets 712 is improved, and the holding force of the permanent magnets can be increased with a small amount of the heavy-rare-earth element, which enables high efficiency of the compressor 100.

10-5-6

The permanent magnets 712 each contain 1 mass % or less of dysprosium. As a result, the holding force of the permanent magnets 712 is improved, which enables high efficiency of the compressor 100.

10-5-7

The average crystal grain size of the permanent magnets 712 is 10 μm or less. As a result, the demagnetization resistance of the permanent magnets 712 is increased, which enables high efficiency of the compressor 100.

10-5-8

The permanent magnets 712 are flat, and a plurality of the permanent magnets 712 are embedded in the rotor 71 to form a V-shape. The holding force of the part positioned at the bottom portion of the V-shape is set to be higher than those of the other part by $\{1/(4\pi)\}\times10^3$ [A/m] or more. As a result, demagnetization of the permanent magnets 712 is suppressed, which enables high efficiency of the compressor 100.

10-5-9

The rotor 71 is formed by laminating a plurality of high-tensile electromagnetic steel plates in the plate thickness direction, the plurality of high-tensile electromagnetic steel plates each having a tensile strength of 400 MPa or more. As a result, durability of the rotor 71 during high-speed rotation is improved, which enables high efficiency of the compressor 100.

10-5-10

The thickness of the bridge 715 of the rotor 71 is 3 mm or more. As a result, durability of the rotor during high-speed rotation is improved, which enables high efficiency of the compressor.

(10-6) Modifications 10-6-1

The rotor 71 may be formed by laminating a plurality of plate-shaped amorphous metals in the plate thickness direction. In this case, a high-efficient motor having a less iron loss is realized, which enables high efficiency of the compressor.

10-6-2

The rotor 71 may be formed by laminating a plurality of electromagnetic steel plates each containing 5 mass % or more of silicon in the plate thickness direction. In this case, the electromagnetic steel plates in which hysteresis is reduced by containing a suitable amount of silicon realizes a high-efficient motor having a less iron loss, which enables high efficiency of the compressor.

10-6-3

In the aforementioned embodiment, the rotor 71 has been described as a magnet-embedded rotor but is not limited thereto. For example, the rotor may be a surface-magnet rotor in which permanent magnets are affixed to the surface of the rotor.

(10-7) Configuration of Compressor 300 According to Second Embodiment

In the first embodiment, a scroll compressor has been described as the compressor 100. The compressor is, however, not limited to the scroll compressor.

Figure 10G:
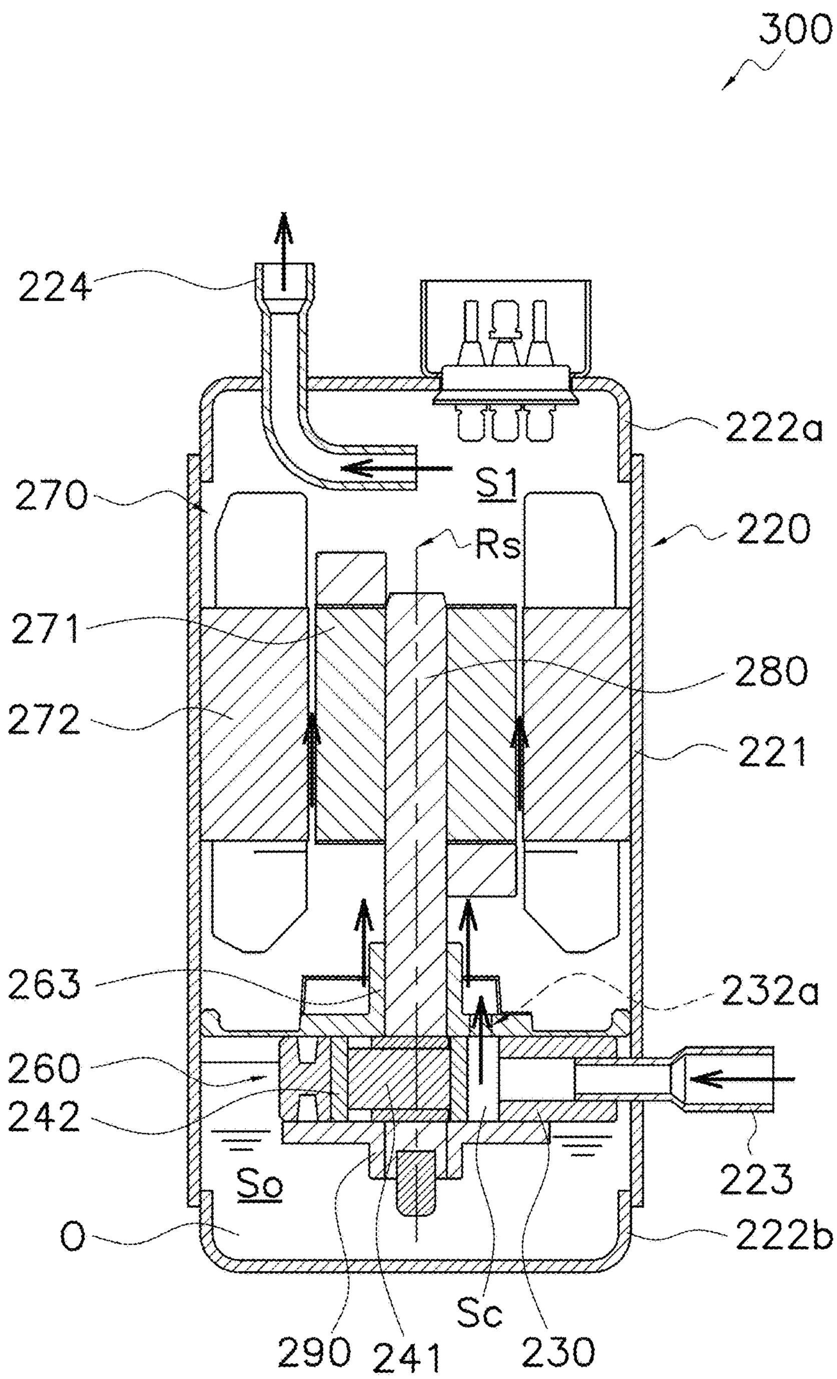
FIG. 10G is a longitudinal sectional view of a compressor according to a second embodiment of the technique of tenth group.

FIG. 10G is a longitudinal sectional view of a compressor 300 according to a second embodiment of the present disclosure. The compressor 300 in FIG. 10G is a rotary compressor. The compressor 300 constitutes a portion of a refrigerant circuit in which any one of the aforementioned refrigerants A to D circulates. The compressor 300 compresses a refrigerant and discharges a high-pressure gas refrigerant. The arrows in FIG. 10G indicate the flow of the refrigerant.

(10-7-1) Casing 220

The compressor 300 has a longitudinally elongated cylindrical casing 220. The casing 220 has a substantially cylindrical cylinder member 221 that opens upward and downward, and an upper cover 222*a* and a lower cover 222*b* disposed at the upper end and the lower end of the cylinder member 221, respectively. The upper cover 222*a* and the lower cover 222*b* are fixed to the cylinder member 221 by welding to maintain airtightness.

The casing 220 accommodates constituent devices of the compressor 300, including a compression mechanism 260, a motor 270, a crank shaft 280, an upper bearing 263, and a lower bearing 290. The oil reservoir space So is formed in a lower portion of the casing 220.

In a lower portion of the casing 220, a suction pipe 223 through which a gas refrigerant is sucked and through which the gas refrigerant is supplied to the compression mechanism 260 is disposed to extend through a lower portion of the cylinder member 221. An end of the suction pipe 223 is connected to a cylinder 230 of the compression mechanism 260. The suction pipe 223 is in communication with the compression chamber Sc of the compression mechanism 260. In the suction pipe 223, a low-pressure refrigerant of the refrigeration cycle before compression by the compressor 300 flows.

The upper cover 222*a* of the casing 220 is provided with a discharge pipe 224 through which a refrigerant to be discharged to the outside of the casing 220 passes. Specifically, an end portion of the discharge pipe 224 in the inner portion of the casing 220 is disposed in the high-pressure space S1 formed above the motor 270. In the discharge pipe 224, a high-pressure refrigerant of the refrigeration cycle after compression by the compression mechanism 260 flows.

(10-7-2) Motor 270

The motor 270 has a stator 272 and a rotor 271. Except for being used in the compressor 300, which is a rotary compressor, the motor 270 is basically equivalent to the motor 70 of the first embodiment and exerts performance and actions/effects that are equivalent to those of the motor 70 of the first embodiment. Therefore, description of the motor 270 is omitted here.

(10-7-3) Crank Shaft 280, Upper Bearing 263, and Lower Bearing 290

The crank shaft 280 is fixed to the rotor 271. Further, the crank shaft 280 is supported by the upper bearing 263 and the lower bearing 290 to be rotatable about a rotation axis Rs. The crankshaft 280 has an eccentric portion 241.

(10-7-4) Compression Mechanism 260

The compression mechanism 260 has the single cylinder 230 and a single piston 242 disposed in the cylinder 230. The cylinder 230 has a predetermined capacity and is fixed to the casing 220.

The piston 242 is disposed on the eccentric portion 241 of the crank shaft 280. The cylinder 230 and the piston 242 define the compression chamber Sc. Rotation of the rotor 271 revolves the piston 242 via the eccentric portion 241. In response to the revolution, the capacity of the compression chamber Sc changes, thereby compressing a gaseous refrigerant.

Here, "the capacity of the cylinder" means so-called theoretical capacity and, in other words, corresponds to the volume of a gaseous refrigerant sucked into the cylinder 230 through the suction pipe 223 during one rotation of the piston 242.

(10-7-5) Oil Reservoir Space So

The oil reservoir space So is disposed in a lower portion of the casing 220. The oil reservoir space So stores the refrigerating machine oil O for lubricating the compression mechanism 260. The refrigerating machine oil O is the refrigerating machine oil described in the section of "(1-4-1) Refrigerating Machine Oil".

(10-8) Operation of Compressor 300

Operation of the compressor 300 will be described. When the motor 270 is started, the rotor 271 rotates with respect to the stator 272, and the crank shaft 280 fixed to the rotor 271 rotates. When the crank shaft 280 rotates, the piston 242 coupled to the crank shaft 280 revolves with respect to the cylinder 230. Then, a low-pressure gas refrigerant of the refrigeration cycle is sucked into the compression chamber Sc through the suction pipe 223. As a result of the piston 242 revolving, the suction pipe 223 and the compression chamber Sc become not in communication with each other, and in response to the capacity of the compression chamber Sc decreasing, the pressure in the compression chamber Sc starts to increase.

The refrigerant in the compression chamber Sc is compressed in response to the capacity of the compression chamber Sc decreasing and eventually becomes a high-pressure gas refrigerant. The high-pressure gas refrigerant is discharged through a discharge port 232*a*. Then, the high-pressure gas refrigerant is discharged through the discharge pipe 224 disposed in the upper side of the casing 220 by passing through a gap between the stator 272 and the rotor 271 and other parts.

(10-9) Features of Second Embodiment

10-9-1

The compressor 300 employs the motor 270 equivalent to the motor 70 of the first embodiment and thus is suitable for a variable capacity compressor in which the number of rotations of the motor can be changed. In this case, it is possible in the air conditioner 1 that uses a mixed refrigerant containing at least 1,2-difluoroethylene to change the number of rotations of the motor in accordance with an air conditioning load, which enables high efficiency of the compressor 300.

10-9-2

By employing the motor 270 equivalent to the motor 70 of the first embodiment, the compressor 300 has the "features in (10-5-2) to (10-5-10)" of the "features (10-5)" of the first embodiment.

10-9-3

When using the compressor 300, which is a rotary compressor, as the compressor of the air conditioner 1, it is possible to reduce the packed amount of refrigerant compared with when using a scroll compressor. Thus, the compressor 300 is suitable for an air conditioner that uses a flammable refrigerant.

(10-10) Modification of Second Embodiment

Due to the compressor 300 employing the motor 270 equivalent to the motor 70 of the first embodiment, the modification is applicable to all described in "(10-6) Modifications" of the first embodiment.

(10-11) Other Embodiment

Regarding the form of the compressor, a screw compressor or a turbo compressor may be employed provided that a motor equivalent to the motor 70 is used.

(11) Embodiment of the Technique of Eleventh Group

(11-1) First Embodiment

Hereinafter, an air conditioner 1 that serves as a refrigeration cycle apparatus according to a first embodiment will be described with reference to FIG. 11A that is the schematic configuration diagram of a refrigerant circuit and FIG. 11B that is a schematic control block configuration diagram.

The air conditioner 1 is an apparatus that air-conditions a space to be air-conditioned by performing a vapor compression refrigeration cycle.

The air conditioner 1 mainly includes an outdoor unit 20, an indoor unit 30, a liquid-side connection pipe 6 and a gas-side connection pipe 5 connecting the outdoor unit 20 and the indoor unit 30, a remote control unit (not shown) serving as an input device and an output device, and a controller 7 that controls the operation of the air conditioner 1.

In the air conditioner 1, the refrigeration cycle in which refrigerant sealed in a refrigerant circuit 10 is compressed, cooled or condensed, decompressed, heated or evaporated, and then compressed again is performed. In the present embodiment, the refrigerant circuit 10 is filled with refrigerant for performing a vapor compression refrigeration cycle. The refrigerant is a refrigerant containing 1,2-difluoroethylene, and any one of the above-described refrigerants A to D may be used. The refrigerant circuit 10 is filled with refrigerating machine oil together with the refrigerant.

(11-1-1) Outdoor Unit 20

Figure 11A:
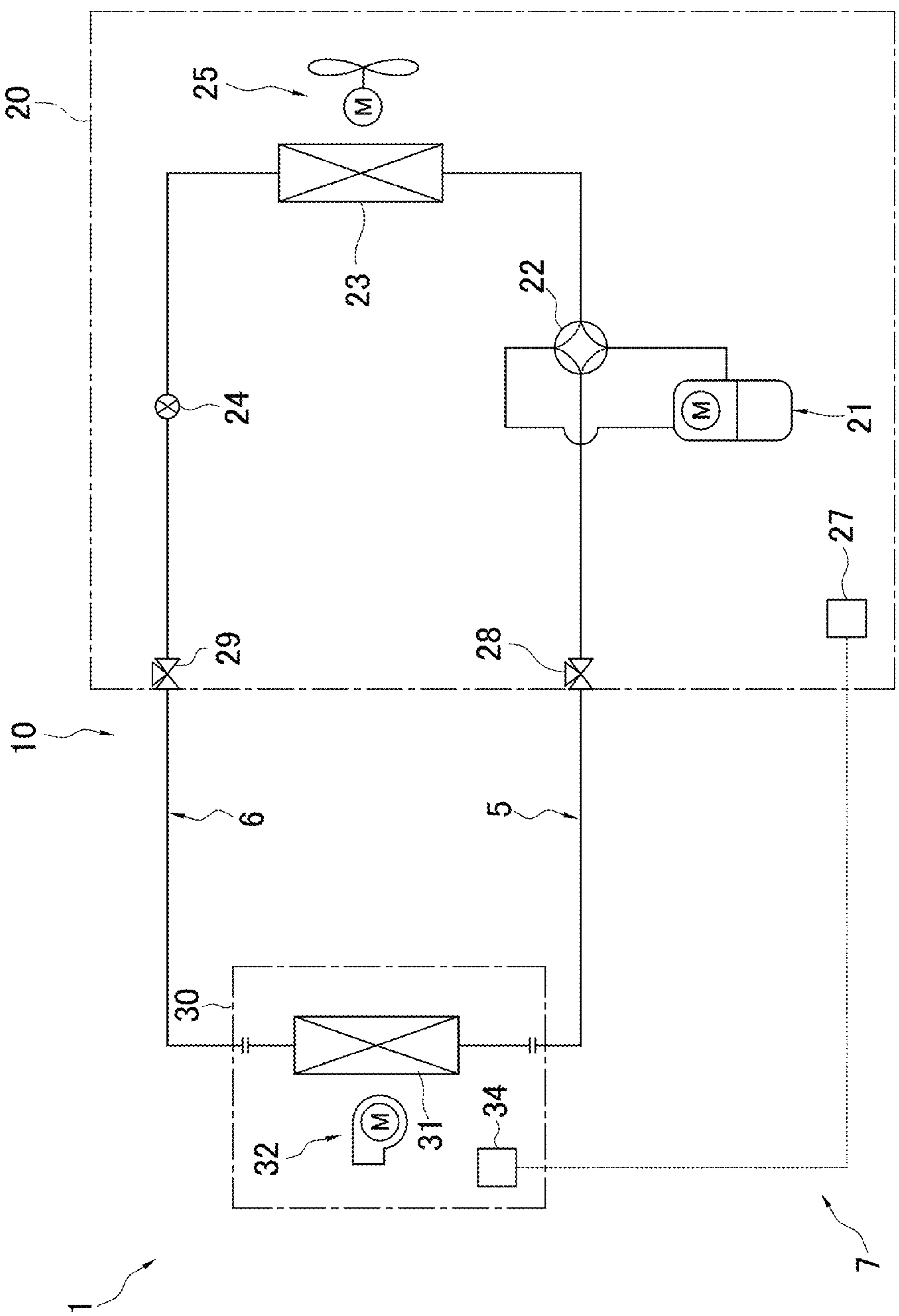
FIG. 11A is a schematic configuration diagram of a refrigerant circuit according to a first embodiment of the technique of eleventh group.
Figure 11B:
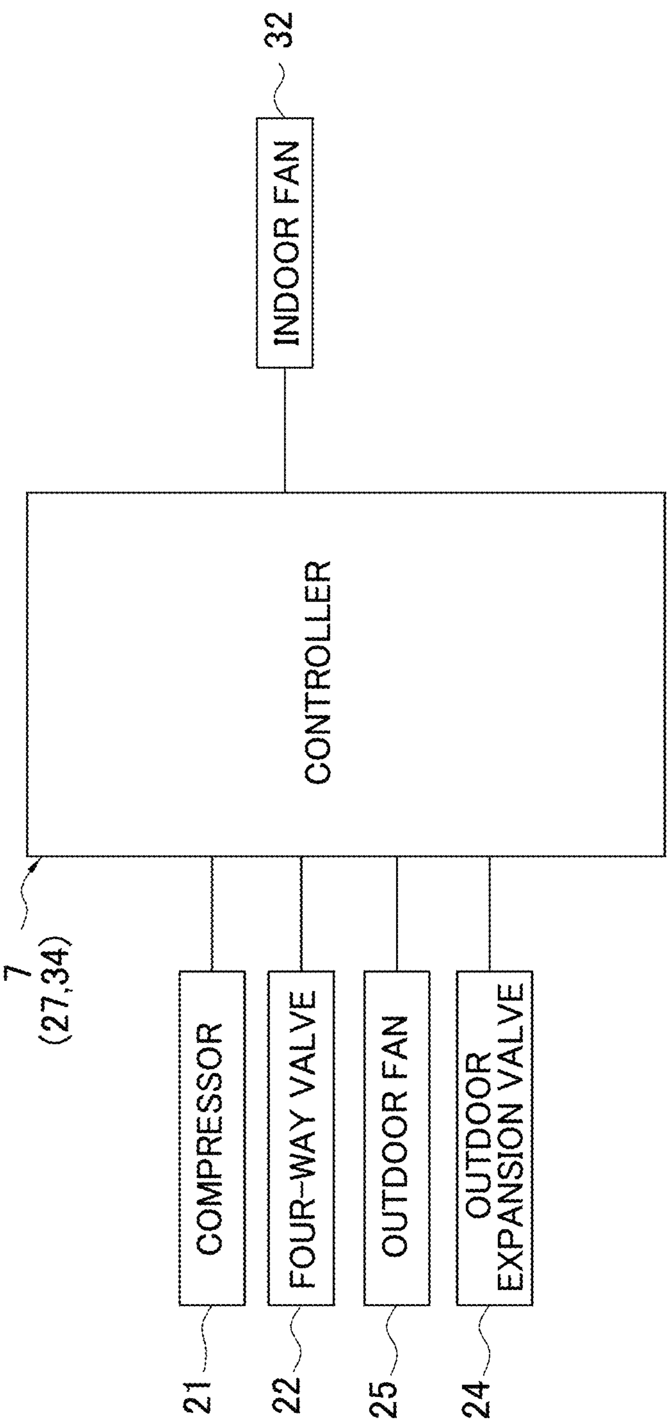
FIG. 11B is a schematic control block configuration diagram of a refrigeration cycle apparatus according to the first embodiment of the technique of eleventh group.
Figure 11C:
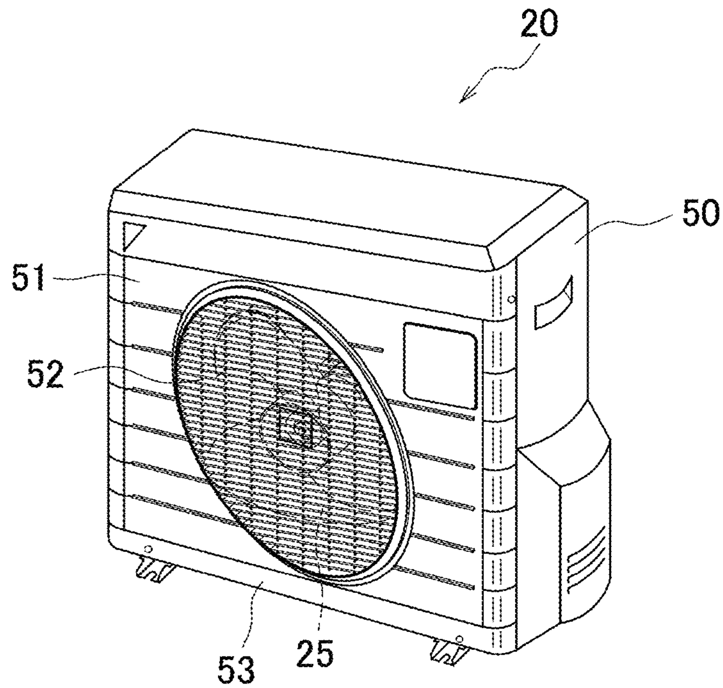
FIG. 11C is a schematic appearance perspective view of an outdoor unit according to the first embodiment of the technique of eleventh group.
Figure 11D:
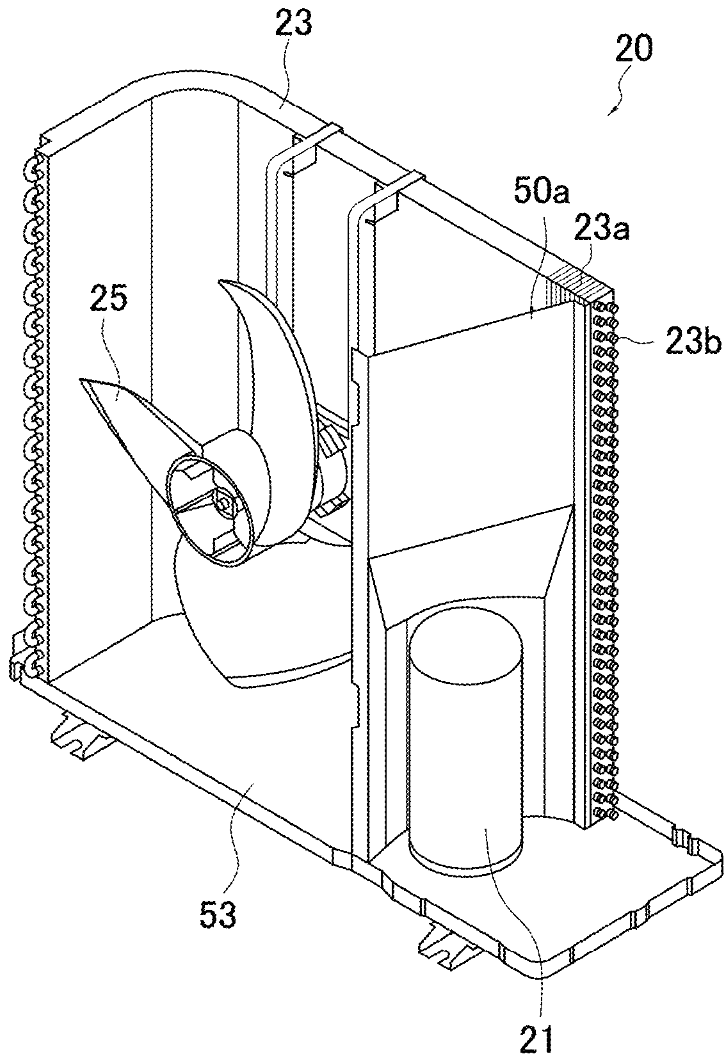
FIG. 11D is a perspective view that shows the schematic structure of the inside of the outdoor unit according to the first embodiment of the technique of eleventh group.
Figure 11E:
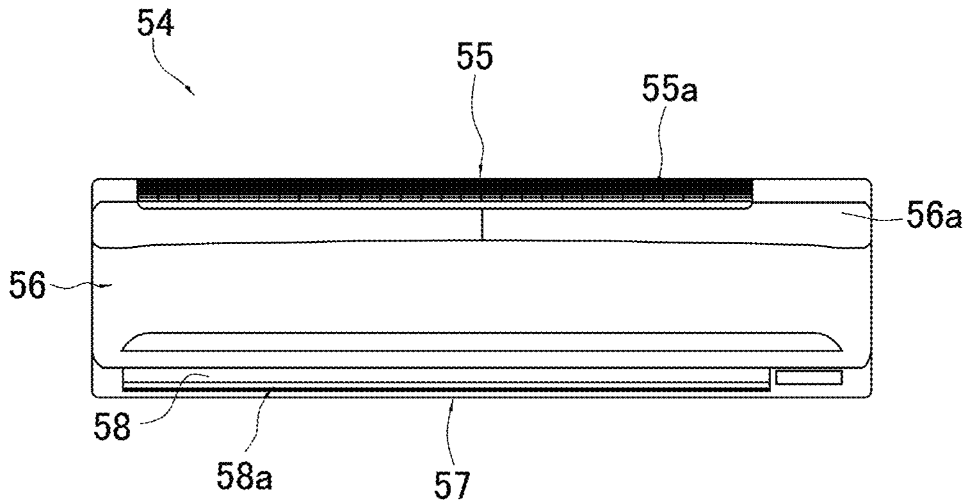
FIG. 11E is a schematic appearance perspective view of an indoor unit according to the first embodiment of the technique of eleventh group.

As shown in FIG. 11C, the outdoor unit 20 includes an outdoor casing 50 having a substantially rectangular parallelepiped shape in appearance. As shown in FIG. 11D, the outdoor unit 20 has a fan chamber and a machine chamber formed when an internal space is divided into right and left spaces by a partition plate 50*a*.

The outdoor unit 20 is connected to the indoor unit 30 via the liquid-side connection pipe 6 and the gas-side connection pipe 5, and makes up part of the refrigerant circuit 10. The outdoor unit 20 mainly includes a compressor 21, a four-way valve 22, an outdoor heat exchanger 23, an outdoor expansion valve 24, an outdoor fan 25, a liquid-side stop valve 29, and a gas-side stop valve 28.

The compressor 21 is a device that compresses low-pressure refrigerant into high pressure in the refrigeration cycle. Here, the compressor 21 is a hermetically sealed compressor in which a positive-displacement, such as a rotary type and a scroll type, compression element (not shown) is driven for rotation by a compressor motor. The compressor motor is used to change the displacement. The operation frequency of the compressor motor is controllable with an inverter. The compressor 21 is provided with an attached accumulator (not shown) at its suction side. The outdoor unit 20 of the present embodiment does not have a refrigerant container larger than the attached accumulator (a low-pressure receiver disposed at the suction side of the compressor 21, a high-pressure receiver disposed at a liquid side of the outdoor heat exchanger 23, or the like).

The four-way valve 22 is able to switch between a cooling operation connection state and a heating operation connection state by switching the status of connection. In the cooling operation connection state, a discharge side of the compressor 21 and the outdoor heat exchanger 23 are connected, and the suction side of the compressor 21 and the gas-side stop valve 28 are connected. In the heating operation connection state, the discharge side of the compressor 21 and the gas-side stop valve 28 are connected, and the suction side of the compressor 21 and the outdoor heat exchanger 23 are connected.

The outdoor heat exchanger 23 is a heat exchanger that functions as a condenser for high-pressure refrigerant in the refrigeration cycle during cooling operation and that functions as an evaporator for low-pressure refrigerant in the refrigeration cycle during heating operation. The outdoor heat exchanger 23 is a cross-fin type fin-and-tube heat exchanger that includes a plurality of heat transfer fins 23*a* stacked in a plate thickness direction and a plurality of heat transfer tubes 23*b* fixedly extending through the plurality of heat transfer fins 23*a*. The outdoor heat exchanger 23 of the present embodiment is not limited and may have a plurality of refrigerant passages such that refrigerant flows while branching into two or more and 10 or less branches. The plurality of heat transfer tubes 23*b* of the outdoor heat exchanger 23 of the present embodiment is a cylindrical pipe except for curved portions and has an outer diameter of one selected from the group consisting of 6.35 mm, 7.0 mm, 8.0 mm, and 9.5 mm. The heat transfer tubes 23*b* having an outer diameter of 6.35 mm have a thickness of 0.25 mm or greater and 0.28 mm or less and preferably have a thickness of 0.266 mm. The heat transfer tubes 23*b* having an outer diameter of 7.0 mm have a thickness of 0.26 mm or greater and 0.29 mm or less and preferably have a thickness of 0.273 mm. The heat transfer tubes 23*b* having an outer diameter of 8.0 mm has a thickness of 0.28 mm or greater and 0.31 mm or less and preferably 0.295 mm. The heat transfer tubes 23*b* having an outer diameter of 9.5 mm have a thickness of 0.32 mm or greater and 0.36 mm or less and preferably have a thickness of 0.340 mm.

The outdoor fan 25 takes outdoor air into the outdoor unit 20, causes the air to exchange heat with refrigerant in the outdoor heat exchanger 23, and then generates air flow for emitting the air to the outside. The outdoor fan 25 is driven for rotation by an outdoor fan motor. In the present embodiment, only one outdoor fan 25 is provided.

The outdoor expansion valve 24 is able to control the valve opening degree, and is provided between a liquid-side end portion of the outdoor heat exchanger 23 and the liquid-side stop valve 29.

The liquid-side stop valve 29 is a manual valve disposed at a connection point at which the outdoor unit 20 is connected to the liquid-side connection pipe 6.

The gas-side stop valve 28 is a manual valve disposed at a connection point at which the outdoor unit 20 is connected to the gas-side connection pipe 5.

The outdoor unit 20 includes an outdoor unit control unit 27 that controls the operations of parts that makeup the outdoor unit 20. The outdoor unit control unit 27 includes a microcomputer including a CPU, a memory, and the like. The outdoor unit control unit 27 is connected to an indoor unit control unit 34 of indoor unit 30 via a communication line, and sends or receives control signals, or the like, to or from the indoor unit control unit 34. The outdoor unit control unit 27 is electrically connected to various sensors (not shown), and receives signals from the sensors.

As shown in FIG. 11C, the outdoor unit 20 includes the outdoor casing 50 having an air outlet 52. The outdoor casing 50 has a substantially rectangular parallelepiped shape. The outdoor casing 50 is able to take in outdoor air from a rear side and one side (the left side in FIG. 11C) and is able to discharge air having passed through the outdoor heat exchanger 23 forward via the air outlet 52 formed in a front 51. A lower end portion of the outdoor casing 50 is covered with a bottom plate 53. As shown in FIG. 11D, the outdoor heat exchanger 23 is provided upright on the bottom plate 53 along the rear side and the one side. A top face of the bottom plate 53 can function as a drain pan.

(11-1-2) Indoor Unit 30

The indoor unit 30 is placed on a wall surface, or the like, in a room that is a space to be air-conditioned. The indoor unit 30 is connected to the outdoor unit 20 via the liquid-side connection pipe 6 and the gas-side connection pipe 5, and makes up part of the refrigerant circuit 10.

The indoor unit 30 includes an indoor heat exchanger 31, an indoor fan 32, an indoor casing 54, and the like.

A liquid side of the indoor heat exchanger 31 is connected to the liquid-side connection pipe 6, and a gas side of the indoor heat exchanger 31 is connected to the gas-side connection pipe 5. The indoor heat exchanger 31 is a heat exchanger that functions as an evaporator for low-pressure refrigerant in the refrigeration cycle during cooling operation and that functions as a condenser for high-pressure refrigerant in the refrigeration cycle during heating operation. The indoor heat exchanger 31 includes a plurality of heat transfer fins 31*a* stacked in a plate thickness direction and a plurality of heat transfer tubes 31*b* fixedly extending through the plurality of heat transfer fins 31*a*. The plurality of heat transfer tubes 31*b* of the indoor heat exchanger 31 of the present embodiment each has a cylindrical shape and has an outer diameter of one selected from the group consisting of 4.0 mm, 5.0 mm, 6.35 mm, 7.0 mm, and 8.0 mm. The heat transfer tubes 31*b* having an outer diameter of 4.0 mm have a thickness of 0.24 mm or greater and 0.26 mm or less and preferably have a thickness of 0.251 mm. The heat transfer tubes 31*b* having an outer diameter of 5.0 mm have a thickness of 0.22 mm or greater and 0.25 mm or less and preferably have a thickness of 0.239 mm. The heat transfer tubes 31*b* having an outer diameter of 6.35 mm have a thickness of 0.25 mm or greater and 0.28 mm or less and preferably have a thickness of 0.266 mm. The heat transfer tubes 31*b* having an outer diameter of 7.0 mm have a thickness of 0.26 mm or greater and 0.29 mm or less and preferably have a thickness of 0.273 mm. The heat transfer tubes 31*b* having an outer diameter of 8.0 mm have a thickness of 0.28 mm or greater and 0.31 mm or less and preferably have a thickness of 0.295 mm.

The indoor fan 32 takes indoor air into the indoor casing 54 of the indoor unit 30, causes the air to exchange heat with refrigerant in the indoor heat exchanger 31, and then generates air flow for emitting the air to the outside. The indoor fan 32 is driven for rotation by an indoor fan motor (not shown).

Figure 11F:
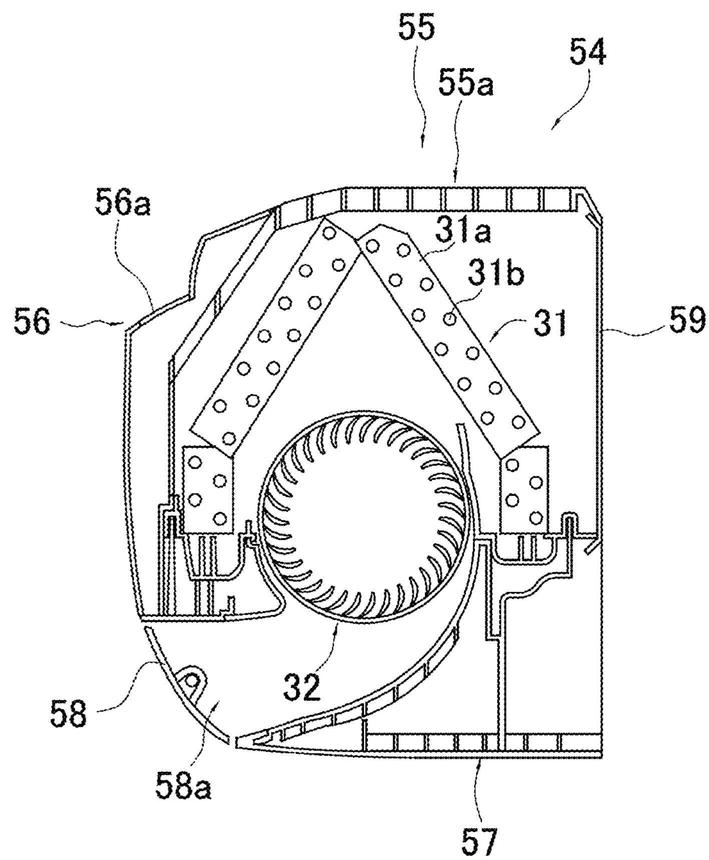
FIG. 11F is a side cross-sectional view that shows the schematic structure of the inside of the indoor unit according to the first embodiment of the technique of eleventh group.

As shown in FIG. 1E and FIG. 11F, the indoor casing 54 is a casing having a substantially rectangular parallelepiped shape and accommodates the indoor heat exchanger 31, the indoor fan 32, and an indoor unit control unit 34 inside. The indoor casing 54 includes a top 55 that makes up the upper end portion of the indoor casing 54, a front panel 56 that makes up the front of the indoor casing 54, a bottom 57 that makes up the bottom of the indoor casing 54, an air outlet 58*a*, a louver 58, a rear 59 facing an indoor wall surface, right and left sides (not shown), and the like. The top 55 has a plurality of top air inlets 55*a* open in the up-down direction. The front panel 56 is a panel expanding downward from near the front-side end portion of the top 55. The front panel 56 has a front air inlet 56*a* made up of a transversely narrow long opening at an upper part. Indoor air is taken into an air duct made up of a space in which the indoor heat exchanger 31 and the indoor fan 32 are accommodated inside the indoor casing 54 via these top air inlet 55*a* and the front air inlet 56*a*. The bottom 57 expands substantially horizontally below the indoor heat exchanger 31 and the indoor fan 32. The air outlet 58*a* is open forward and downward at the front lower side of the indoor casing 54, that is, the lower side of the front panel 56 and the front side of the bottom 57.

The indoor unit 30 includes an indoor unit control unit 34 that controls the operations of the parts that make up the indoor unit 30. The indoor unit control unit 34 includes a microcomputer including a CPU, a memory, and the like. The indoor unit control unit 34 is connected to the outdoor unit control unit 27 via a communication line, and sends or receives control signals, or the like, to or from the outdoor unit control unit 27.

The indoor unit control unit 34 is electrically connected to various sensors (not shown) provided inside the indoor unit 30, and receives signals from the sensors.

(11-1-3) Details of Controller 7

In the air conditioner 1, the outdoor unit control unit 27 and the indoor unit control unit 34 are connected via the communication line to make up the controller 7 that controls the operation of the air conditioner 1.

The controller 7 mainly includes a CPU (central processing unit) and a memory such as a ROM and a RAM. Various processes and controls made by the controller 7 are implemented by various parts included in the outdoor unit control unit 27 and/or the indoor unit control unit 34 functioning together.

(11-1-4) Operation Mode

Hereinafter, operation modes will be described.

The operation modes include a cooling operation mode and a heating operation mode.

The controller 7 determines whether the operation mode is the cooling operation mode or the heating operation mode and performs the selected operation mode based on an instruction received from the remote control unit, or the like.

(11-1-4-1) Cooling Operation Mode

In the air conditioner 1, in the cooling operation mode, the status of connection of the four-way valve 22 is set to the cooling operation connection state where the discharge side of the compressor 21 and the outdoor heat exchanger 23 are connected and the suction side of the compressor 21 and the gas-side stop valve 28 are connected, and refrigerant filled in the refrigerant circuit 10 is mainly circulated in order of the compressor 21, the outdoor heat exchanger 23, the outdoor expansion valve 24, and the indoor heat exchanger 31.

More specifically, when the cooling operation mode is started, refrigerant is taken into the compressor 21, compressed, and then discharged in the refrigerant circuit 10.

In the compressor 21, displacement control commensurate with a cooling load that is required from the indoor unit 30 is performed. Gas refrigerant discharged from the compressor 21 passes through the four-way valve 22 and flows into the gas-side end of the outdoor heat exchanger 23.

Gas refrigerant having flowed into the gas-side end of the outdoor heat exchanger 23 exchanges heat in the outdoor heat exchanger 23 with outdoor-side air that is supplied by the outdoor fan 25 to condense into liquid refrigerant and flows out from the liquid-side end of the outdoor heat exchanger 23.

Refrigerant having flowed out from the liquid-side end of the outdoor heat exchanger 23 is decompressed when passing through the outdoor expansion valve 24. The outdoor expansion valve 24 is controlled such that the degree of subcooling of refrigerant that passes through a liquid-side outlet of the outdoor heat exchanger 23 satisfies a predetermined condition.

Refrigerant decompressed in the outdoor expansion valve 24 passes through the liquid-side stop valve 29 and the liquid-side connection pipe 6 and flows into the indoor unit 30.

Refrigerant having flowed into the indoor unit 30 flows into the indoor heat exchanger 31, exchanges heat in the indoor heat exchanger 31 with indoor air that is supplied by the indoor fan 32 to evaporate into gas refrigerant, and flows out from the gas-side end of the indoor heat exchanger 31. Gas refrigerant having flowed out from the gas-side end of the indoor heat exchanger 31 flows to the gas-side connection pipe 5.

Refrigerant having flowed through the gas-side connection pipe 5 passes through the gas-side stop valve 28 and the four-way valve 22, and is taken into the compressor 21 again.

(11-1-4-2) Heating Operation Mode

In the air conditioner 1, in the heating operation mode, the status of connection of the four-way valve 22 is set to the heating operation connection state where the discharge side of the compressor 21 and the gas-side stop valve 28 are connected and the suction side of the compressor 21 and the outdoor heat exchanger 23 are connected, and refrigerant filled in the refrigerant circuit 10 is mainly circulated in order of the compressor 21, the indoor heat exchanger 31, the outdoor expansion valve 24, and the outdoor heat exchanger 23.

More specifically, when the heating operation mode is started, refrigerant is taken into the compressor 21, compressed, and then discharged in the refrigerant circuit 10.

In the compressor 21, displacement control commensurate with a heating load that is required from the indoor unit 30 is performed. Gas refrigerant discharged from the compressor 21 flows through the four-way valve 22 and the gas-side connection pipe 5 and then flows into the indoor unit 30.

Refrigerant having flowed into the indoor unit 30 flows into the gas-side end of the indoor heat exchanger 31, exchanges heat in the indoor heat exchanger 31 with indoor air that is supplied by the indoor fan 32 to condense into refrigerant in a gas-liquid two-phase state or liquid refrigerant, and flows out from the liquid-side end of the indoor heat exchanger 31. Refrigerant having flowed out from the liquid-side end of the indoor heat exchanger 31 flows into the liquid-side connection pipe 6.

Refrigerant having flowed through the liquid-side connection pipe 6 is decompressed to a low pressure in the refrigeration cycle in the liquid-side stop valve 29 and the outdoor expansion valve 24. The outdoor expansion valve 24 is controlled such that the degree of subcooling of refrigerant that passes through a liquid-side outlet of the indoor heat exchanger 31 satisfies a predetermined condition. Refrigerant decompressed in the outdoor expansion valve 24 flows into the liquid-side end of the outdoor heat exchanger 23.

Refrigerant having flowed in from the liquid-side end of the outdoor heat exchanger 23 exchanges heat in the outdoor heat exchanger 23 with outdoor air that is supplied by the outdoor fan 25 to evaporate into gas refrigerant, and flows out from the gas-side end of the outdoor heat exchanger 23.

Refrigerant having flowed out from the gas-side end of the outdoor heat exchanger 23 passes through the four-way valve 22 and is taken into the compressor 21 again.

(11-1-5) Characteristics of First Embodiment

In the above-described air conditioner 1, since refrigerant containing 1,2-difluoroethylene is used, a GWP can be sufficiently reduced.

The outdoor heat exchanger 23 of the outdoor unit 20 of the air conditioner 1 uses the heat transfer tubes **23*b* of which the pipe diameter is greater than or equal to 6.35 mm. Therefore, even when the above-described refrigerant that more easily causes a pressure loss than R32 is used, a pressure loss at the time when the refrigerant passes through the heat transfer tubes 23*b* can be reduced. Even when a change in the temperature (temperature glide) of refrigerant flowing through the outdoor heat exchanger 23 occurs, the extent of the change can be reduced. In addition, the outdoor heat exchanger 23 uses the heat transfer tubes 23*b* of which the pipe diameter is less than 10.0 mm. Therefore, the amount of refrigerant held in the outdoor heat exchanger 23** can be reduced.

The indoor heat exchanger 31 of the indoor unit 30 of the air conditioner 1 uses the heat transfer tubes **31*b* of which the pipe diameter is greater than or equal to 4.0 mm. Therefore, even when the above-described refrigerant that more easily causes a pressure loss than R32 is used, a pressure loss at the time when the refrigerant passes through the heat transfer tubes 31*b* can be reduced. Even when a change in the temperature (temperature glide) of refrigerant flowing through the indoor heat exchanger 31 occurs, the extent of the change can be reduced. In addition, the indoor heat exchanger 31 also uses the heat transfer tubes 31*b* of which the pipe diameter is less than 10.0 mm. Therefore, the amount of refrigerant held in the indoor heat exchanger 31** can be reduced.

(11-1-6) Modification A of First Embodiment

In the above-described first embodiment, the air conditioner including only one indoor unit is described as an example; however, the air conditioner may include a plurality of indoor units (with no indoor expansion valve) connected in parallel with each other.

(11-2) Second Embodiment

Figure 11G:
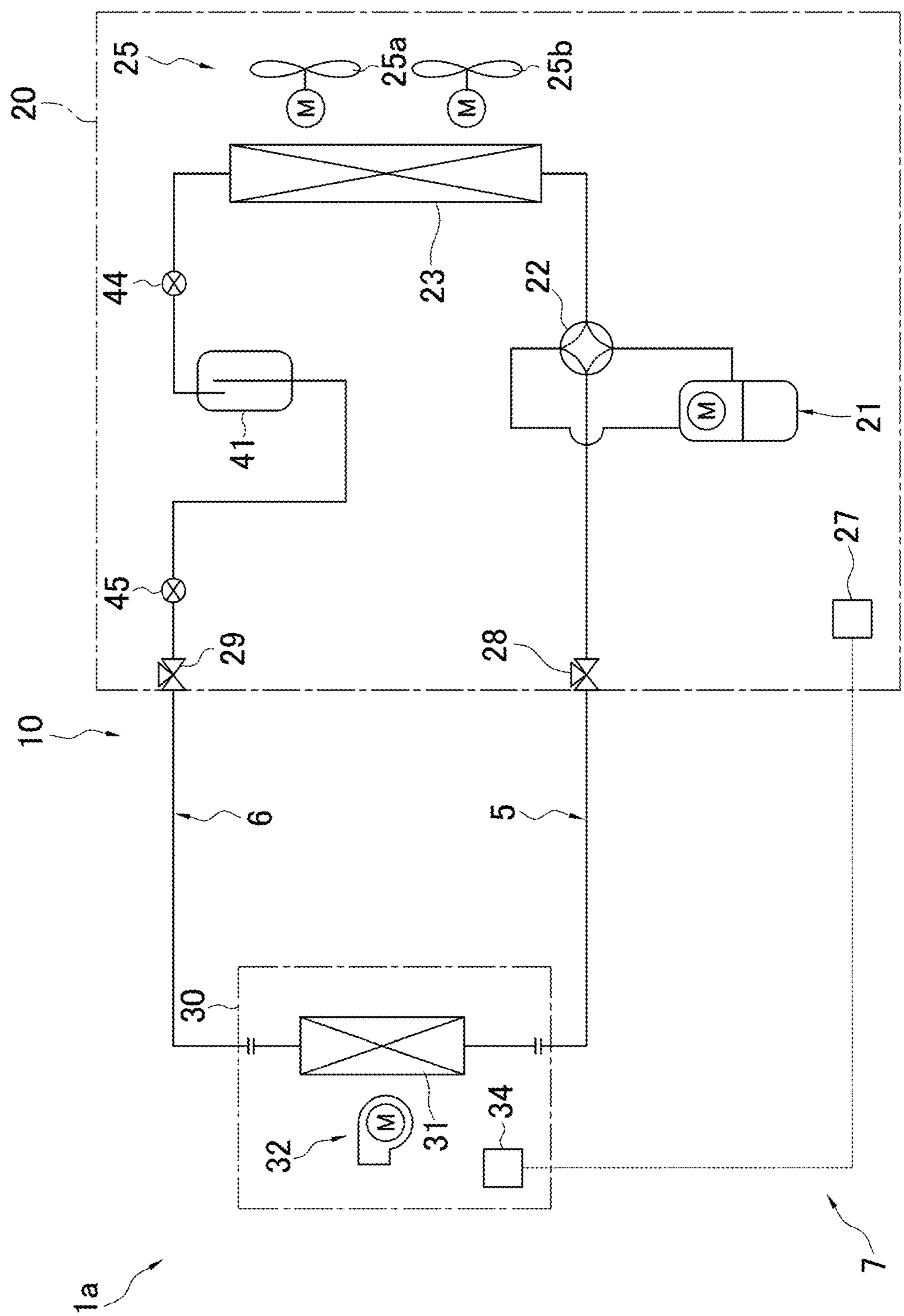
FIG. 11G is a schematic configuration diagram of a refrigerant circuit according to a second embodiment of the technique of eleventh group.
Figure 11H:
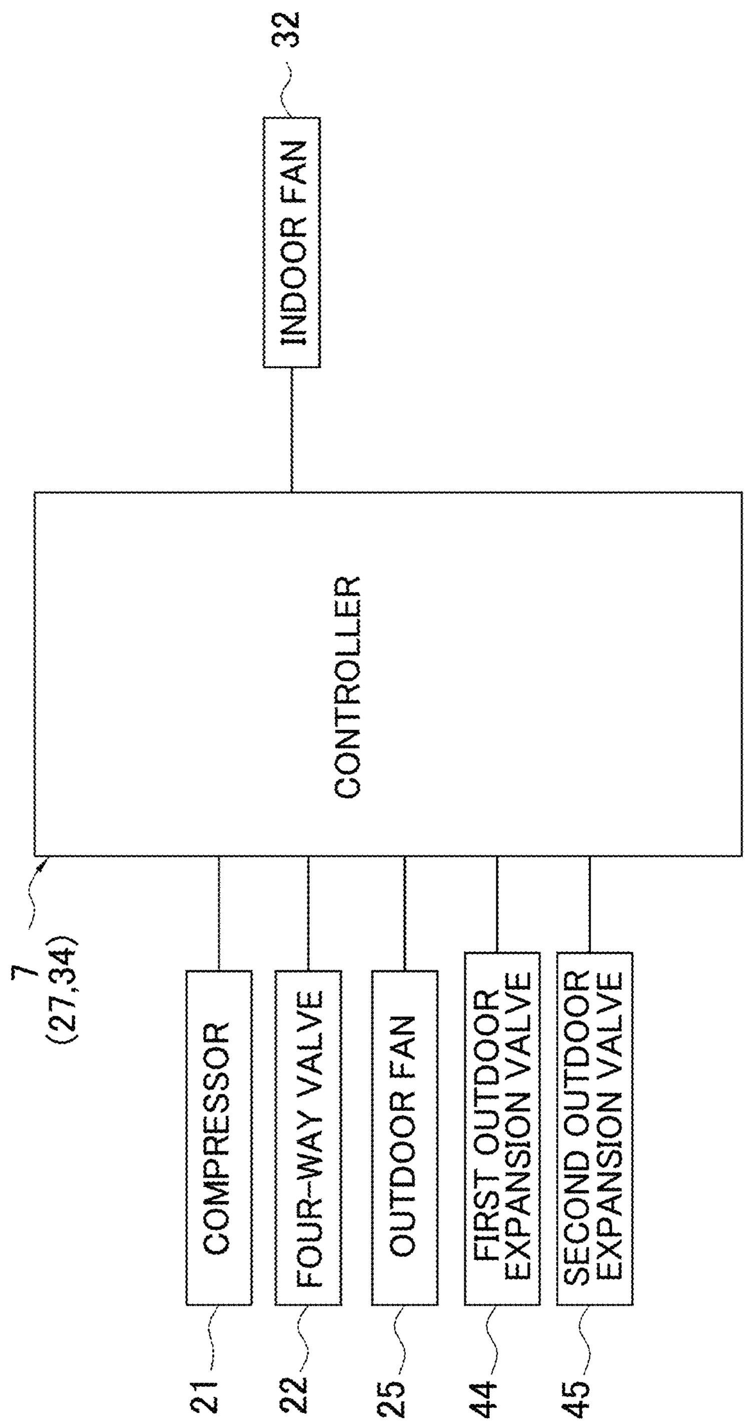

Hereinafter, an air conditioner **1*a* that serves as a refrigeration cycle apparatus according to a second embodiment will be described with reference to FIG. 11G that is the schematic configuration diagram of a refrigerant circuit and FIG. 11**H that is a schematic control block configuration diagram.

Hereinafter, mainly, the air conditioner **1*a* of the second embodiment will be described with a focus on a portion different from the air conditioner 1** of the first embodiment.

In the air conditioner **1*a* as well, the refrigerant circuit 10 is filled with a refrigerant mixture that contains 1,2-difluoroethylene and that is any one of the above-described refrigerants A to D as a refrigerant for performing a vapor compression refrigeration cycle. The refrigerant circuit 10** is filled with refrigerating machine oil together with the refrigerant.

(11-2-1) Outdoor Unit 20

In the outdoor unit 20 of the air conditioner **1*a* of the second embodiment, a first outdoor fan 25*a* and a second outdoor fan 25***b* are provided as the outdoor fans 25. The outdoor heat exchanger 23 of the outdoor unit 20 of the air conditioner 1*a* has a wide heat exchange area so as to adapt to air flow coming from the first outdoor fan 25*a* and the second outdoor fan 25*b*.

In the outdoor unit 20 of the air conditioner 1*a*, instead of the outdoor expansion valve 24 of the outdoor unit 20 in the above-described first embodiment, a first outdoor expansion valve 44, an intermediate pressure receiver 41, and a second outdoor expansion valve 45 are sequentially provided between the liquid side of the outdoor heat exchanger 23 and the liquid-side stop valve 29. The first outdoor expansion valve 44 and the second outdoor expansion valve 45 each are able to control the valve opening degree. The intermediate pressure receiver 41 is a container that is able to store refrigerant. Both an end portion of a pipe extending from the first outdoor expansion valve 44 side and an end portion of a pipe extending from the second outdoor expansion valve 45 side are located in the internal space of the intermediate pressure receiver 41.

Figure 11I:
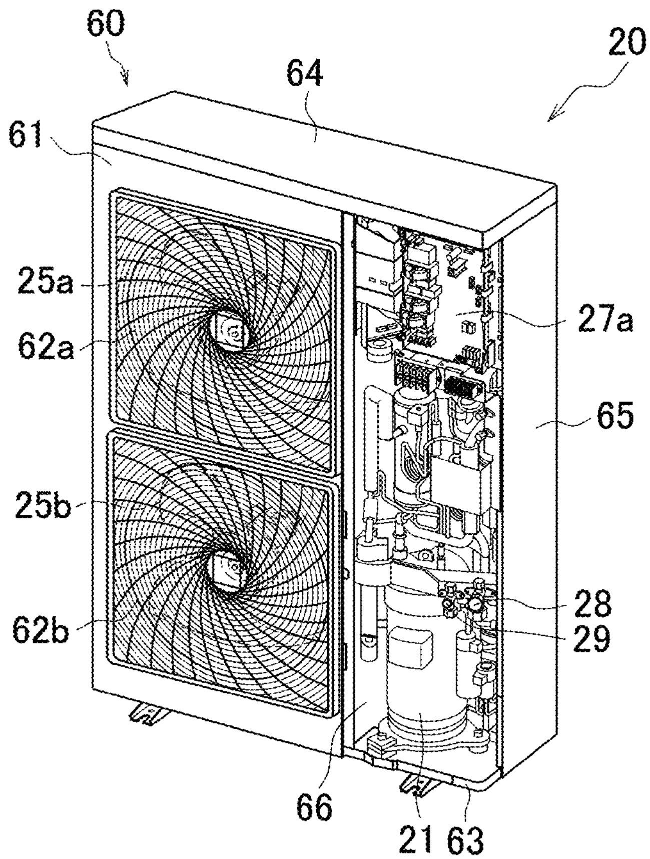

The outdoor unit 20 of the second embodiment has a structure in which a fan chamber and a machine chamber are formed (so-called trunk structure) when the internal space of a casing 60 having a substantially rectangular parallelepiped shape is divided into right and left spaces by a partition plate 66 extending vertically, as shown in FIG. 11I.

The outdoor heat exchanger 23, the outdoor fan 25 (a first outdoor fan 25*a* and a second outdoor fan 25*b*), and the like, are disposed in the fan chamber inside the casing 60. The compressor 21, the four-way valve 22, a first outdoor expansion valve 44, a second outdoor expansion valve 45, an intermediate pressure receiver 41, the gas-side stop valve 28, the liquid-side stop valve 29, and an electric component unit 27*a* that makes up the outdoor unit control unit 27, and the like, are disposed in the machine chamber inside the casing 60.

The casing 60 mainly includes a bottom plate 63, a top panel 64, a left front panel 61, a left-side panel (not shown), a right front panel (not shown), a right-side panel 65, the partition plate 66, and the like. The bottom plate 63 makes up a bottom part of the casing 60. The top panel 64 makes up a top part of the outdoor unit 20. The left front panel 61 mainly makes up a left front part of the casing 60, and has a first air outlet 62*a* and a second air outlet 62*b* that are open in a front-rear direction and arranged one above the other. Air taken in from the rear side and left side of the casing 60 by the first outdoor fan 25*a* and having passed through an upper part of the outdoor heat exchanger 23 passes through the first air outlet 62*a*. Air taken in from the rear side and left side of the casing 60 by the second outdoor fan 25*b* and having passed through a lower part of the outdoor heat exchanger 23 passes through the second air outlet 62*b*. A fan grille is provided at each of the first air outlet 62*a* and the second air outlet 62*b*. The left-side panel mainly makes up a left side part of the casing 60 and is also able to function as an inlet for air that is taken into the casing 60. The right front panel mainly makes up a right front part and a front-side part of the right side of the casing 60. The right-side panel 65 mainly makes up a rear-side part of the right side and right-side part of the rear of the casing 60. The partition plate 66 is a plate-shaped member extending vertically and disposed on the bottom plate 63, and divides the internal space of the casing 60 into the fan chamber and the machine chamber.

Figure 11J:
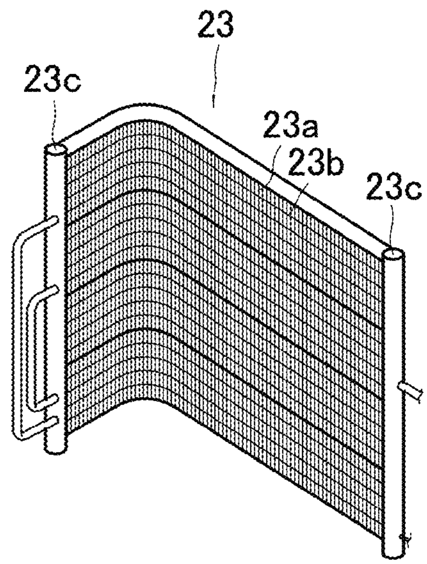

For example, as shown in FIG. 11J, the outdoor heat exchanger 23 is a cross-fin type fin-and-tube heat exchanger that includes a plurality of heat transfer fins 23*a* stacked in a plate thickness direction and a plurality of heat transfer tubes 23*b* fixedly extending through the plurality of heat transfer fins 23*a*. The outdoor heat exchanger 23 is disposed in an L-shape in plan view along the left side and rear of the casing 60 inside the fan chamber. The outdoor heat exchanger 23 of the present embodiment is not limited and may have a plurality of refrigerant passages such that refrigerant flows while branching into 10 or more and 20 or less branches. The plurality of heat transfer tubes 23*b* of the outdoor heat exchanger 23 of the present embodiment is a cylindrical pipe except for curved portions and has an outer diameter of one selected from the group consisting of 6.35 mm, 7.0 mm, 8.0 mm, and 9.5 mm. The relationship between the outer diameter and thickness of each heat transfer tube 23*b* is similar to that of the above-described first embodiment.

The compressor 21 is mounted on the bottom plate 63 and fixed by bolts in the machine chamber of the casing 60.

The gas-side stop valve 28 and the liquid-side stop valve 29 are disposed near the right front corner at the level near the upper end of the compressor 21 in the machine chamber of the casing 60.

The electric component unit 27*a* is disposed in a space above both of the gas-side stop valve 28 and the liquid-side stop valve 29 in the machine chamber of the casing 60.

In the above air conditioner 1*a*, in the cooling operation mode, the first outdoor expansion valve 44 is, for example, controlled such that the degree of subcooling of refrigerant that passes through the liquid-side outlet of the outdoor heat exchanger 23 satisfies a predetermined condition. In the cooling operation mode, the second outdoor expansion valve 45 is, for example, controlled such that the degree of superheating of refrigerant that the compressor 21 takes in satisfies a predetermined condition.

In the heating operation mode, the second outdoor expansion valve 45 is, for example, controlled such that the degree of subcooling of refrigerant that passes through the liquid-side outlet of the indoor heat exchanger 31 satisfies a predetermined condition. In the heating operation mode, the first outdoor expansion valve 44 is, for example, controlled such that the degree of superheating of refrigerant that the compressor 21 takes in satisfies a predetermined condition.

(11-2-2) Indoor Unit 30

The indoor unit 30 of the second embodiment is placed so as to be suspended in an upper space in a room that is a space to be air-conditioned or placed at a ceiling surface or placed on a wall surface and used. The indoor unit 30 is connected to the outdoor unit 20 via the liquid-side connection pipe 6 and the gas-side connection pipe 5, and makes up part of the refrigerant circuit 10.

The indoor unit 30 includes an indoor heat exchanger 31, an indoor fan 32, an indoor casing 70, and the like.

Figure 11K:
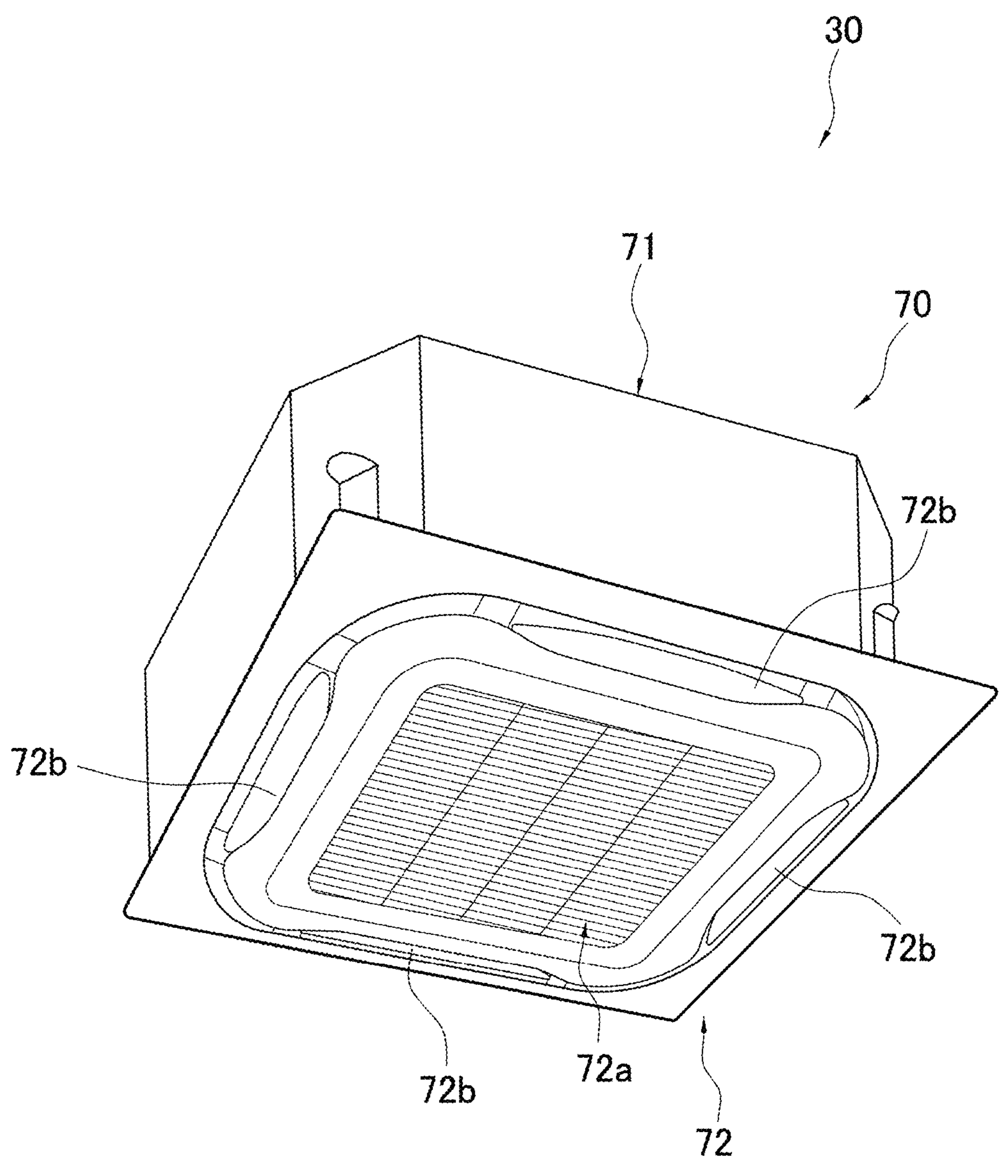
Figure 11L:
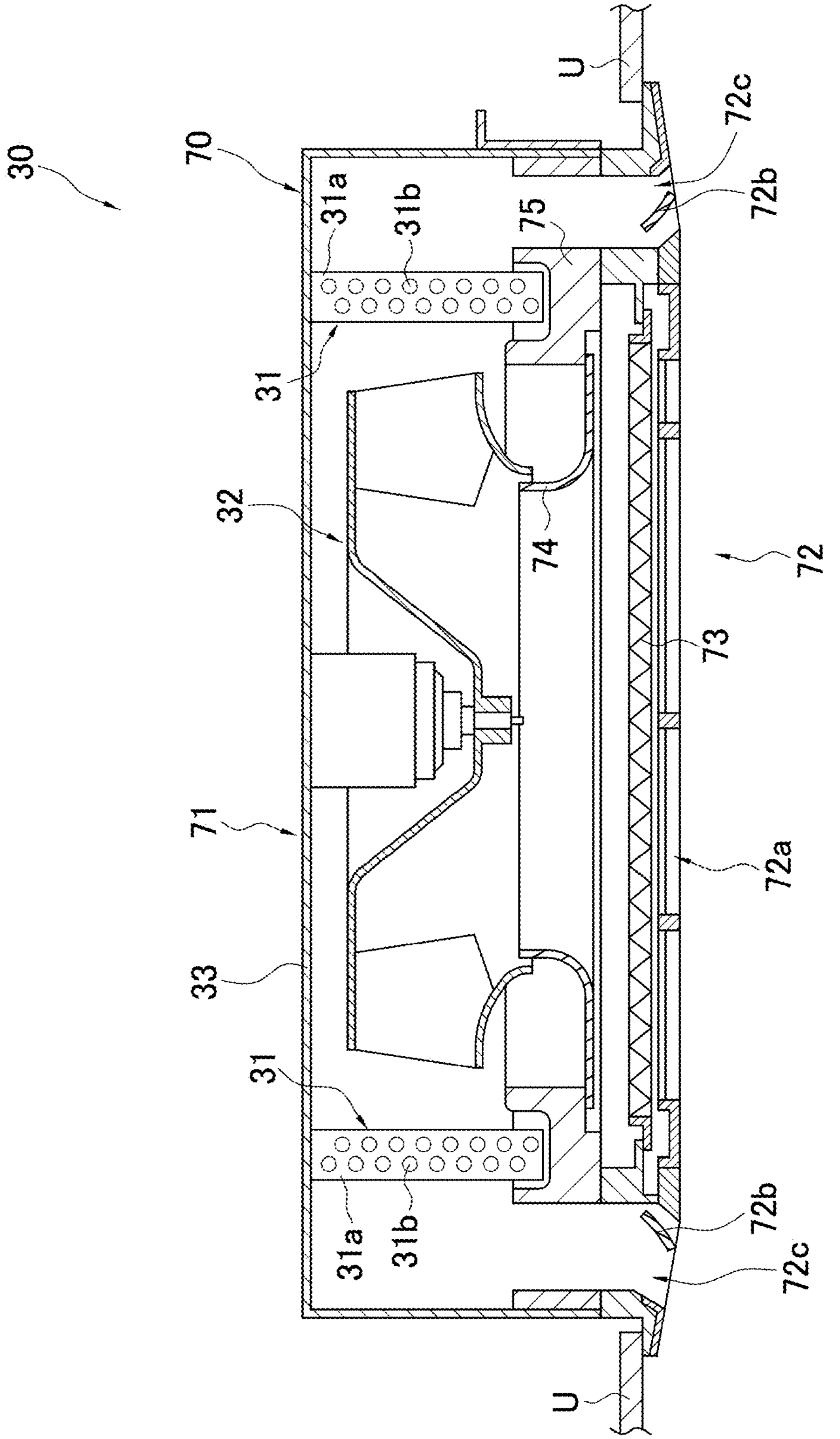

As shown in FIG. 11K and FIG. 11L, the indoor casing 70 includes a casing body 71 and a decorative panel 72. The casing body 71 is open at its lower side and accommodates the indoor heat exchanger 31, the indoor fan 32, and the like, inside. The decorative panel 72 covers the underside of the casing body 71 and includes an air inlet 72*a*, a plurality of flaps 72*b*, a plurality of air outlets 72*c*, and the like. Indoor air taken in from the air inlet 72*a* passes through a filter 73 and is then guided by a bell mouth 74 to a suction side of the indoor fan 32. Air sent from the indoor fan 32 passes through the indoor heat exchanger 31 disposed above a drain pan 75, passes through a passage provided around the drain pan 75, and then discharged from the air outlets 72*c* into a room.

The indoor heat exchanger 31 of the second embodiment is provided so as to surround the indoor fan 32 in a substantially rectangular shape in plan view. The indoor heat exchanger 31 includes a plurality of heat transfer fins 31*a* stacked in a plate thickness direction and a plurality of heat transfer tubes 31*b* fixedly extending through the plurality of heat transfer fins 31*a*. The plurality of heat transfer tubes 31*b* of the indoor heat exchanger 31 of the second embodiment each has a cylindrical shape and has an outer diameter of one selected from the group consisting of 4.0 mm, 5.0 mm, 6.35 mm, 7.0 mm, 8.0 mm, and 9.5 mm. The heat transfer tubes 31*b* having an outer diameter of 9.5 mm have a thickness of 0.32 mm or greater and 0.36 mm or less and preferably have a thickness of 0.340 mm. The other relationship between the outer diameter and thickness of each heat transfer tube 31*b* is similar to that of the above-described first embodiment.

(11-2-3) Characteristics of Second Embodiment

In the above-described air conditioner 1*a* according to the second embodiment as well, as well as the air conditioner 1 according to the first embodiment, since refrigerant containing 1,2-difluoroethylene is used, a GWP can be sufficiently reduced.

For the outdoor heat exchanger 23 of the outdoor unit 20 of the air conditioner 1*a* as well, a pressure loss at the time when the refrigerant that more easily causes a pressure loss than R32 passes through the heat transfer tubes 23*b* can be reduced, and, even when a change in the temperature (temperature glide) of refrigerant flowing through the outdoor heat exchanger 23 occurs, the extend of the change can be reduced. In addition, the amount of refrigerant held in the outdoor heat exchanger 23 can be reduced.

For the indoor heat exchanger 31 of the indoor unit 30 of the air conditioner 1*a* as well, even when the above-described refrigerant that more easily causes a pressure loss than R32 is used, a pressure loss at the time when the refrigerant that more easily causes a pressure loss than R32 passes through the heat transfer tubes 31*b* can be reduced, and, even when a change in the temperature (temperature glide) of refrigerant flowing through the indoor heat exchanger 31 occurs, the extent of the change can be reduced. In addition, the amount of refrigerant held in the indoor heat exchanger 31 can be reduced.

(11-2-4) Modification A of Second Embodiment

In the above-described second embodiment, the air conditioner including only one indoor unit is described as an example; however, the air conditioner may include a plurality of indoor units (with no indoor expansion valve) connected in parallel with each other.

(11-3) Third Embodiment

Figure 11M:
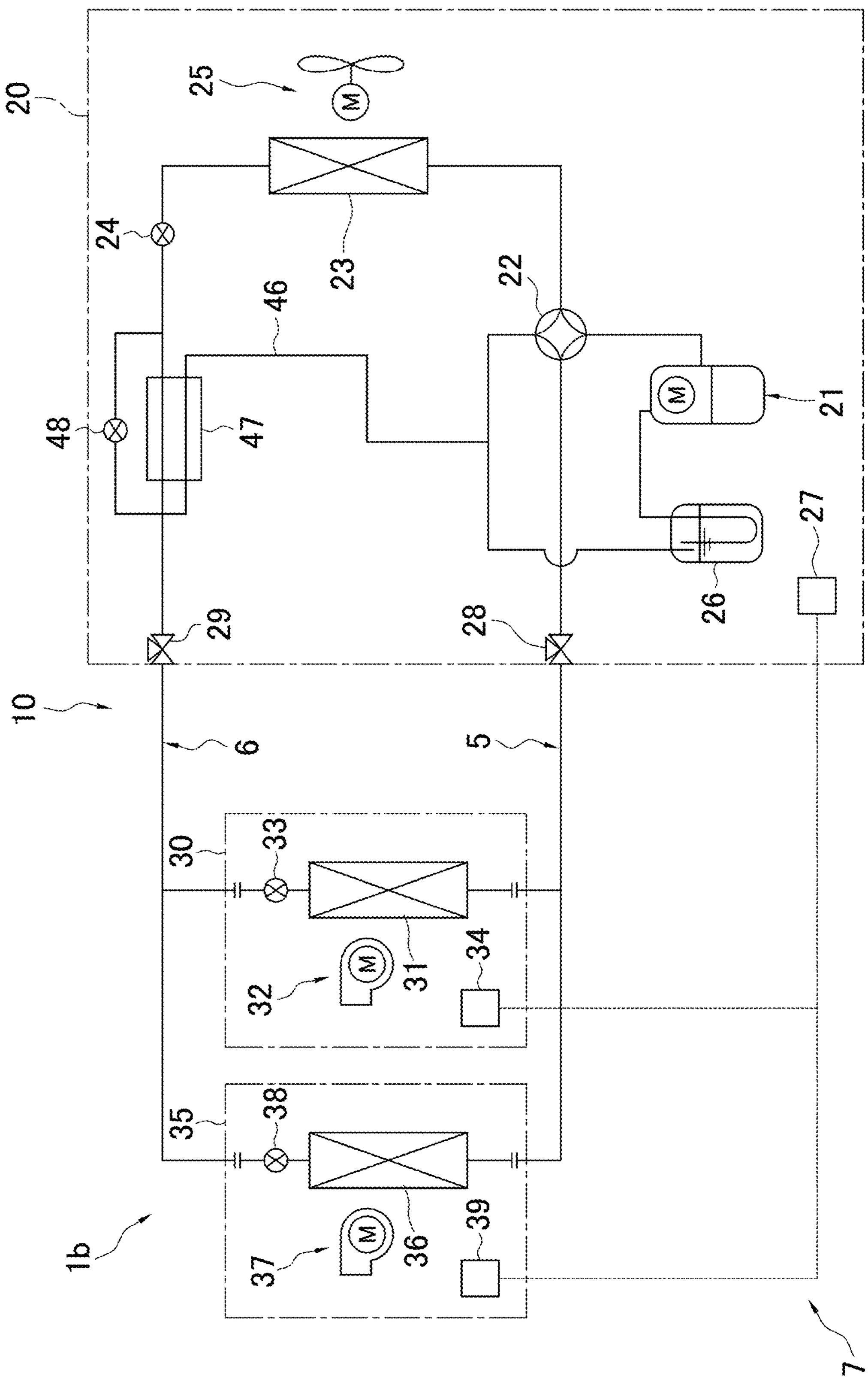
Figure 11N:
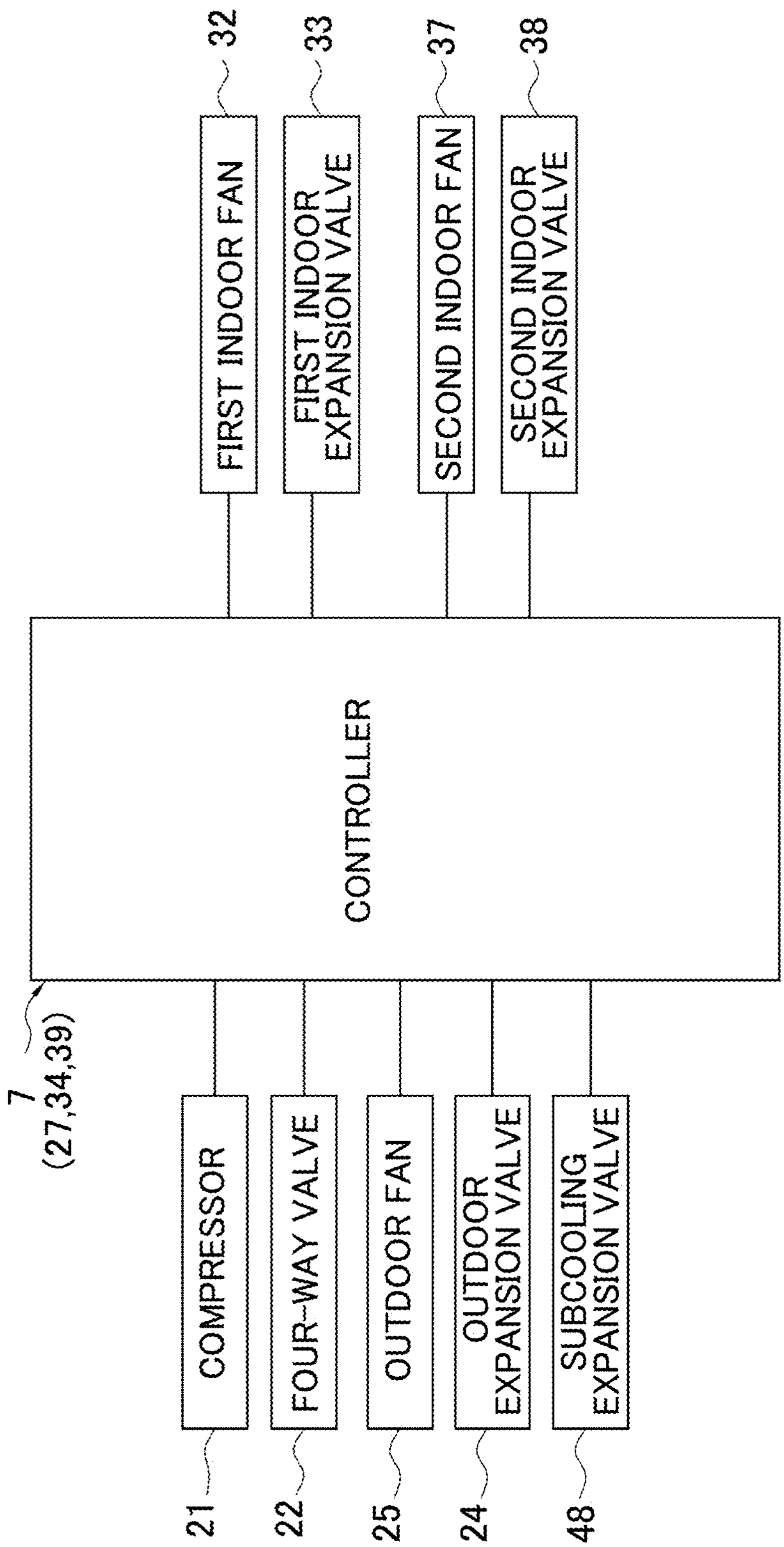

Hereinafter, an air conditioner 1*b* that serves as a refrigeration cycle apparatus according to a third embodiment will be described with reference to FIG. 11M that is the schematic configuration diagram of a refrigerant circuit and FIG. 11N that is a schematic control block configuration diagram.

Hereinafter, mainly, the air conditioner 1*b* of the third embodiment will be described with a focus on a portion different from the air conditioner 1 of the first embodiment.

In the air conditioner 1*b* as well, the refrigerant circuit 10 is filled with a refrigerant mixture that contains 1,2-difluoroethylene and that is any one of the above-described refrigerants A to D as a refrigerant for performing a vapor compression refrigeration cycle. The refrigerant circuit 10 is filled with refrigerating machine oil together with the refrigerant.

(11-3-1) Outdoor Unit 20

In the outdoor unit 20 of the air conditioner 1*b* of the third embodiment, a low-pressure receiver 26, a subcooling heat exchanger 47, and a subcooling circuit 46 are provided in the outdoor unit 20 in the above-described first embodiment.

The low-pressure receiver 26 is a container that is provided between one of connection ports of the four-way valve 22 and the suction side of the compressor 21 and that is able to store refrigerant. In the present embodiment, the low-pressure receiver 26 is provided separately from the attached accumulator of the compressor 21.

The subcooling heat exchanger 47 is provided between the outdoor expansion valve 24 and the liquid-side stop valve 29.

The subcooling circuit 46 is a circuit that branches off from a main circuit between the outdoor expansion valve 24 and the subcooling heat exchanger 47 and that merges with a portion halfway from one of the connection ports of the four-way valve 22 to the low-pressure receiver 26. A subcooling expansion valve 48 that decompresses refrigerant passing therethrough is provided halfway in the subcooling circuit 46. Refrigerant flowing through the subcooling circuit 46 and decompressed by the subcooling expansion valve 48 exchanges heat with refrigerant flowing through the main circuit side in the subcooling heat exchanger 47. Thus, refrigerant flowing through the main circuit side is further cooled, and refrigerant flowing through the subcooling circuit 46 evaporates.

Figure 11O:
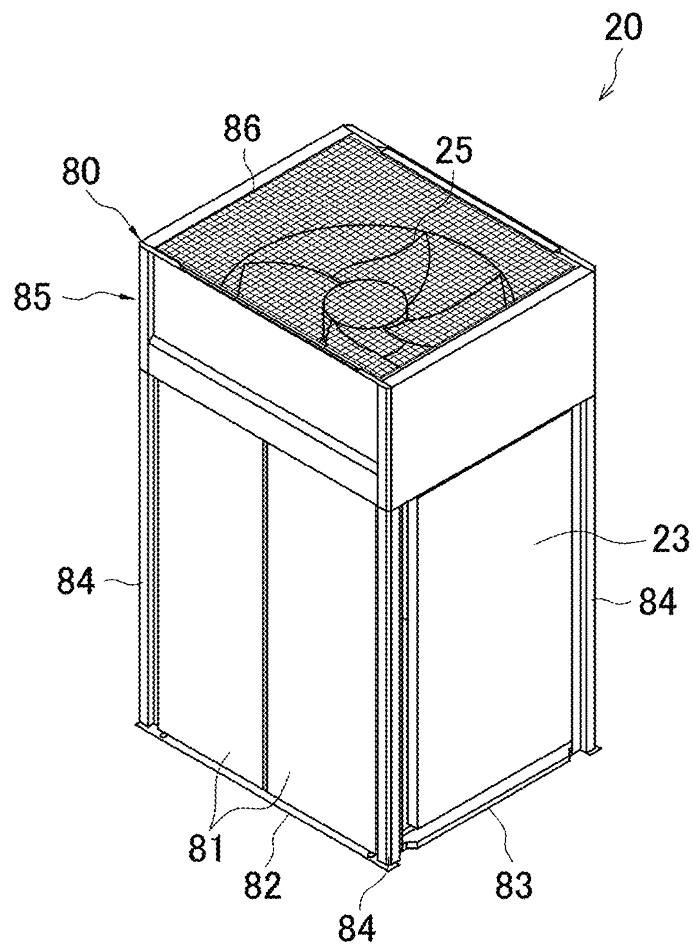

The detailed structure of the outdoor unit 20 of the air conditioner 1*b* according to the third embodiment will be described below with reference to the appearance perspective view of FIG. 11O and the exploded perspective view of FIG. 11P.

The outdoor unit 20 of the air conditioner 1*b* may have an up-blow structure that takes in air from the lower side into an outdoor casing 80 and discharges air outward of the outdoor casing 80 from the upper side.

The outdoor casing 80 mainly includes a bottom plate 83 bridged on a pair of installation legs 82 extending in a right-left direction, supports 84 extending in a vertical direction from corners of the bottom plate 83, a front panel 81, and a fan module 85. The bottom plate 83 forms the bottom of the outdoor casing 80 and is separated into a left-side first bottom plate 83*a* and a right-side second bottom plate 83*b*. The front panel 81 is bridged between the front-side supports 84 below the fan module 85 and makes up the front of the outdoor casing 80. Inside the outdoor casing 80, the compressor 21, the outdoor heat exchanger 23, the low-pressure receiver 26, the four-way valve 22, the outdoor expansion valve 24, the subcooling heat exchanger 47, the subcooling expansion valve 48, the subcooling circuit 46, the gas-side stop valve 28, the liquid-side stop valve 29, the outdoor unit control unit 27, and the like, are disposed in the space below the fan module 85 and above the bottom plate 83. The outdoor heat exchanger 23 has a substantially U-shape in plan view facing the rear and both right and left sides within a part of the casing 80 below the fan module 85 and substantially forms the rear and both right and left sides of the outdoor casing 80. The outdoor heat exchanger 23 is disposed on the bottom plate 83 along the left-side edge portion, rear-side edge portion and right-side edge portion of the bottom plate 83. The outdoor heat exchanger 23 of the third embodiment is a cross-fin type fin-and-tube heat exchanger that includes a plurality of heat transfer fins 23*a* stacked in a plate thickness direction and a plurality of heat transfer tubes 23*b* fixedly extending through the plurality of heat transfer fins 23*a*. The outdoor heat exchanger 23 of the present embodiment is not limited and may have a plurality of refrigerant passages such that refrigerant flows while branching into 20 or more and 40 or less branches. The plurality of heat transfer tubes 23*b* of the outdoor heat exchanger 23 of the third embodiment is a cylindrical pipe except for curved portions and has an outer diameter of one selected from the group consisting of 7.0 mm, 8.0 mm, and 9.5 mm. The relationship between the outer diameter and thickness of each heat transfer tube 23*b* is similar to that of the above-described first embodiment.

The fan module 85 is provided above the outdoor heat exchanger 23, and includes the outdoor fan 25, a bell mouth (not shown), and the like. The outdoor fan 25 is disposed in such an orientation that the rotation axis coincides with the vertical direction.

With the above structure, air flow formed by the outdoor fan 25 passes from around the outdoor heat exchanger 23 through the outdoor heat exchanger 23 and flows into the outdoor casing 80, and is discharged upward via an air outlet 86 provided so as to extend through in an up-down direction at the upper end surface of the outdoor casing 80.

(11-3-2) First Indoor Unit 30 and Second Indoor Unit 35

In the air conditioner 1*b* according to the third embodiment, instead of the indoor unit in the above-described first embodiment, a first indoor unit 30 and a second indoor unit 35 are provided in parallel with each other.

The first indoor unit 30, as well as the indoor unit 30 in the above-described first embodiment, includes a first indoor heat exchanger 31, a first indoor fan 32, and a first indoor unit control unit 34, and further includes a first indoor expansion valve 33 at the liquid side of the first indoor heat exchanger 31. The first indoor expansion valve 33 is able to control the valve opening degree.

The second indoor unit 35, as well as the first indoor unit 30, includes a second indoor heat exchanger 36, a second indoor fan 37, a second indoor unit control unit 39, and a second indoor expansion valve 38 provided at the liquid side of the second indoor heat exchanger 36. The second indoor expansion valve 38 is able to control the valve opening degree.

The specific structures of the first indoor unit 30 and second indoor unit 35 of the air conditioner 1*b* according to the third embodiment each have a similar configuration to the indoor unit 30 of the second embodiment except the above-described first indoor expansion valve 33 and second indoor expansion valve 38. The first indoor heat exchanger 31 and the second indoor heat exchanger 36 each have a plurality of heat transfer tubes having a cylindrical shape, and the outer diameter of each heat transfer tube is one selected from the group consisting of 4.0 mm, 5.0 mm, 6.35 mm, 7.0 mm, 8.0 mm, and 9.5 mm. The relationship between the outer diameter and thickness of each heat transfer tube 23*b* is similar to that of the above-described second embodiment.

The controller 7 of the third embodiment is made up of the outdoor unit control unit 27, the first indoor unit control unit 34, and the second indoor unit control unit 39 communicably connected to one another.

In the above air conditioner 1*b*, in the cooling operation mode, the outdoor expansion valve 24 is controlled such that the degree of subcooling of refrigerant that passes through the liquid-side outlet of the outdoor heat exchanger 23 satisfies a predetermined condition. In the cooling operation mode, the subcooling expansion valve 48 is controlled such that the degree of superheating of refrigerant that the compressor 21 takes in satisfies a predetermined condition. In the cooling operation mode, the first indoor expansion valve 33 and the second indoor expansion valve 38 are controlled to a fully open state.

In the heating operation mode, the first indoor expansion valve 33 is controlled such that the degree of subcooling of refrigerant that passes through the liquid-side outlet of the first indoor heat exchanger 31 satisfies a predetermined condition. Similarly, the second indoor expansion valve 38 is also controlled such that the degree of subcooling of refrigerant that passes through the liquid-side outlet of the second indoor heat exchanger 36 satisfies a predetermined condition. In the heating operation mode, the outdoor expansion valve 45 is controlled such that the degree of superheating of refrigerant that the compressor 21 takes in satisfies a predetermined condition. In the heating operation mode, the subcooling expansion valve 48 is controlled such that the degree of superheating of refrigerant that the compressor 21 takes in satisfies a predetermined condition.

(11-3-3) Characteristics of Third Embodiment

In the above-described air conditioner 1*b* according to the third embodiment as well, as well as the air conditioner 1 according to the first embodiment, since refrigerant containing 1,2-difluoroethylene is used, a GWP can be sufficiently reduced.

For the outdoor heat exchanger 23 of the outdoor unit 20 of the air conditioner 1*b* as well, a pressure loss at the time when the refrigerant that more easily causes a pressure loss than R32 passes through the heat transfer tubes 23*b* can be reduced, and, even when a change in the temperature (temperature glide) of refrigerant flowing through the outdoor heat exchanger 23 occurs, the extend of the change can be reduced. In addition, the amount of refrigerant held in the outdoor heat exchanger 23 can be reduced.

For the indoor heat exchanger 31 of the indoor unit 30 of the air conditioner 1*b* as well, even when the above-described refrigerant that more easily causes a pressure loss than R32 is used, a pressure loss at the time when the refrigerant that more easily causes a pressure loss than R32 passes through the heat transfer tubes 31*b* can be reduced, and, even when a change in the temperature (temperature glide) of refrigerant flowing through the indoor heat exchanger 31 occurs, the extent of the change can be reduced. In addition, the amount of refrigerant held in the indoor heat exchanger 31 can be reduced.

(11-4) Others

An air conditioner or an outdoor unit may be made up of a combination of the above-described first embodiment to third embodiment and modifications as needed.

(12) Embodiment of the Technique of Twelfth Group

(12-1) Configuration of Air Conditioner 1

FIG. 12A is a refrigeration circuit diagram of an air conditioner 1 in which a compressor 100 according to an embodiment of the present invention is utilized. The air conditioner 1 is a refrigeration cycle apparatus provided with the compressor 100. As examples of the air conditioner 1 in which the compressor 100 is employed, an "air conditioner dedicated to cooling-operation", an "air conditioner dedicated to heating-operation", an "air conditioner switchable between cooling operation and heating operation by using a four-way switching valve", and the like are presented. Here, description will be provided using the "air conditioner switchable between cooling operation and heating operation by using a four-way switching valve".

Referring to FIG. 12A, the air conditioner 1 is provided with an indoor unit 2 and an outdoor unit 3. The indoor unit 2 and the outdoor unit 3 are connected to each other by a liquid-refrigerant connection pipe 4 and a gas-refrigerant connection pipe 5. As illustrated in FIG. 12A, the air conditioner 1 is of a pair-type having the indoor unit 2 and the outdoor unit 3 one each. The air conditioner 1 is, however, not limited thereto and may be of a multi-type having a plurality of the indoor units 2.

In the air conditioner 1, devices, such as an accumulator 15, the compressor 100, a four-way switching valve 16, an outdoor heat exchanger 17, an expansion valve 18, and an indoor heat exchanger 13, are connected together by pipes, thereby constituting a refrigerant circuit 11.

In the present embodiment, a refrigerant for performing a vapor compression refrigeration cycle is packed in the refrigerant circuit 11. The refrigerant is a mixed refrigerant containing 1,2-difluoroethylene, and, as the refrigerant, any one of the aforementioned refrigerants A to D is usable. A refrigerating machine oil is also packed together with the mixed refrigerant in the refrigerant circuit 11.

(12-1-1) Indoor Unit 2

The indoor heat exchanger 13 to be loaded in the indoor unit 2 is a cross-fin type fin-and-tube heat exchanger constituted by a heat transfer tube and a large number of heat transfer fins. The indoor heat exchanger 13 is connected at the liquid side thereof to the liquid-refrigerant connection pipe 4 and connected at the gas side thereof to the gas-refrigerant connection pipe 5, and the indoor heat exchanger 13 functions as a refrigerant evaporator during cooling operation.

(12-1-2) Outdoor Unit 3

The outdoor unit 3 is loaded with the accumulator 15, the compressor 100, the outdoor heat exchanger 17, and the expansion valve 18.

(12-1-2-1) Outdoor Heat Exchanger 17

The outdoor heat exchanger 17 is a cross-fin type fin-and-tube heat exchanger constituted by a heat transfer tube and a large number of heat transfer fins. The outdoor heat exchanger 17 is connected at one end thereof to the side of a discharge pipe 24 in which a refrigerant discharged from the compressor 100 flows and connected at the other end thereof to the side of the liquid-refrigerant connection pipe 4. The outdoor heat exchanger 17 functions as a condenser for a gas refrigerant supplied from the compressor 100 through the discharge pipe 24.

(12-1-2-2) Expansion Valve 18

The expansion valve 18 is disposed in a pipe that connects the outdoor heat exchanger 17 and the liquid-refrigerant connection pipe 4 to each other. The expansion valve 18 is an opening-degree adjustable electric valve for adjusting the pressure and the flow rate of a refrigerant that flows in the pipe.

(12-1-2-3) Accumulator 15

The accumulator 15 is disposed in a pipe that connects the gas-refrigerant connection pipe 5 and a suction pipe 23 of the compressor 100 to each other. The accumulator 15 separates, into a gas phase and a liquid phase, a refrigerant that flows from the indoor heat exchanger 13 toward the suction pipe 23 through the gas-refrigerant connection pipe 5 to prevent a liquid refrigerant from being supplied into the compressor 100. The compressor 100 is supplied with a gas-phase refrigerant accumulated in an upper space of the accumulator 15.

(12-1-2-4) Compressor 100

FIG. 12B is a longitudinal sectional view of the compressor 100 according to an embodiment of the present invention. The compressor 100 in FIG. 12B is a scroll compressor. The compressor 100 compresses a refrigerant sucked through the suction pipe 23 in a compression chamber Sc and discharges the compressed refrigerant through the discharge pipe 24. Regarding the compressor 100, details will be described in the section of "(12-2) Configuration of Compressor 100".

(12-1-2-5) Four-Way Switching Valve 16

The four-way switching valve 16 has first to fourth ports. The four-way switching valve 16 is connected at the first port thereof to the discharge side of the compressor 100, connected at the second port thereof to the suction side of the compressor 100, connected at the third port thereof to the gas-side end portion of the outdoor heat exchanger 17, and connected at the fourth port thereof to a gas-side shutoff valve Vg.

The four-way switching valve 16 is switchable between a first state (the state indicated in the solid line in FIG. 12A) and a second state (the state indicated by the dashed line in FIG. 12A). In the four-way switching valve 16 in the first state, a first port and a third port are in communication with each other, and a second port and a fourth port are in communication with each other. In the four-way switching valve 16 in the second state, the first port and the fourth port are in communication with each other, and the second port and the third port are in communication with each other.

(12-2) Configuration of Compressor 100

A compressor 100 constitutes a refrigerant circuit in cooperation with an evaporator, a condenser, an expansion mechanism, and the like and plays a role of compressing a gas refrigerant in the refrigerant circuit. As illustrated in FIG. 12B, the compressor 100 is constituted by, mainly, a casing 20 of a hermetically closed dome type having a vertically-elongated cylindrical shape, a motor 70, a compression mechanism 60, an oldham ring 39, a lower bearing 90, a suction pipe 23, and a discharge pipe 24.

(12-2-1) Casing 20

The casing 20 has a substantially cylindrical cylinder member 21, a bowl-shaped upper cover 22*a* welded to an upper end portion of the cylinder member 21 in an airtight manner, and a bowl-shaped lower cover 22*b* welded to a lower end portion of the cylinder member 21 in an airtight manner.

The casing 20 accommodates, mainly, the compression mechanism 60 that compresses a gas refrigerant and the motor 70 that is disposed on the lower side of the compression mechanism 60. The compression mechanism 60 and the motor 70 are coupled to each other by a crank shaft 80 disposed to extend in an up-down direction in the casing 20. A gap space 68 is generated between the compression mechanism 60 and the motor 70.

An oil reservoir space So is formed in a lower portion of the casing 20. The oil reservoir space So stores a refrigerating machine oil O for lubricating the compression mechanism 60 and the like. The refrigerating machine oil O is the refrigerating machine oil described in the section of "(1-4-1) Refrigerating Machine Oil".

In the inner portion of the crank shaft 80, an oil supply path 83 for supplying the refrigerating machine oil O to the compression mechanism 60 and the like is formed. The lower end of a main shaft 82 of the crank shaft 80 is positioned in the oil reservoir space So formed in the lower portion of the casing 20. The refrigerating machine oil O in the oil reservoir space So is supplied to the compression mechanism 60 and the like through the oil supply path 83.

(12-2-2) Motor 70

The motor 70 is an induction motor and constituted by an annular stator 72 fixed to the inner wall surface of the casing 20, and a rotor 71 rotatably accommodated inside the stator 72 with a slight gap (air gap).

The motor 70 is disposed such that the upper end of a coil end of a coil 727 formed on the upper side of the stator 72 is at a height position substantially identical to the height position of the lower end of a bearing portion 61*b* of a housing 61.

A copper wire is wound around each tooth portion of the stator 72, and coil ends of the coil 727 are formed on the upper side and the lower side.

The rotor 71 is drive-coupled to a movable scroll 40 of the compression mechanism 60 via the crank shaft 80 disposed at the axial center of the cylinder member 21 so as to extend in the up-down direction. In addition, a guide plate 58 that guides a refrigerant that has flowed out through an outlet 49 of a connection passage 46 to a motor cooling passage 55 is formed in the gap space 68.

The stator 72 is a so-called distributed-winding stator and has a barrel portion 725, which is an iron core, and the coil 727 wound around the barrel portion 725. A narrow portion 727*a*, which is a narrow portion of the coil 727, recessed inward more than the outer circumferential surface of the barrel portion 725 is formed on each of an upper portion and a lower portion of the barrel portion 725.

Details of the motor 70 will be described in the section of "(12-4) Configuration of Motor 70".

(12-2-3) Compression Mechanism 60

As illustrated in FIG. 12B, the compression mechanism 60 is constituted by, mainly, the housing 61, a fixed scroll 30 disposed in close contact with the upper side of the housing 61, and the movable scroll 40 that engages the fixed scroll 30.

(12-2-3-1) Fixed Scroll 30

As illustrated in FIG. 12B, the fixed scroll 30 is constituted by, mainly, an end plate 34 and a spiral (involute) lap 33 formed on the lower surface of the end plate 34.

A discharge hole 341 in communication with a compression chamber Sc and an extended concave portion 342 in communication with the discharge hole 341 are formed in the end plate 34. The discharge hole 341 is formed in a center portion of the end plate 34 to extend in the up-down direction.

The extended concave portion 342 is constituted by a concave portion extending horizontally on the upper surface of the end plate 34. A cover body 344 is fastened and fixed by a bolt 344*a* to the upper surface of the fixed scroll 30 so as to close the extended concave portion 342. As a result of the extended concave portion 342 being covered by the cover body 344, a muffler space 345 constituted by an expansion chamber that muffles an operation sound of the compression mechanism 60 is formed.

(12-2-3-2) Movable Scroll 40

As illustrated in FIG. 12B, the movable scroll 40 is constituted by, mainly, an end plate 41, a spiral (involute) lap 42 formed on the upper surface of the end plate 41, and a boss portion 43 formed on the lower surface of the end plate 41.

The movable scroll 40 is a movable scroll of an outer drive. In other words, the movable scroll 40 has the boss portion 43 that is fitted on the outer side of the crank shaft 80.

The movable scroll 40 is supported by the housing 61 by the oldham ring 39 being filled into a groove portion formed in the end plate 41. The upper end of the crank shaft 80 is fitted into the boss portion 43. The movable scroll 40 revolves in the housing 61, without being rotated by the rotation of the crank shaft 80, by being thus incorporated in the compression mechanism 60. The lap 42 of the movable scroll 40 is engaged with the lap 33 of the fixed scroll 30, and the compression chamber Sc is formed between contact parts of the two laps 33 and 42. In the compression chamber Sc, the capacity of a gap between the two laps 33 and 42 contracts toward the center in response to the revolution of the movable scroll 40. It is thereby possible to compress a gas refrigerant.

(12-2-3-3) Housing 61

The housing 61 is press-fitted and fixed, at the entirety of the outer circumferential surface thereof in the circumferential direction, to the cylinder member 21. In other words, the cylinder member 21 and the housing 61 are in close contact with each other over the whole circumference in an airtight manner. Consequently, the inner portion of the casing 20 is divided into a high-pressure space on the lower side of the housing 61 and a low-pressure space on the upper side of the housing 61. In the housing 61, a housing concave portion 61*a* recessed at the center of the upper surface thereof and the bearing portion 61*b* extending from the center of the lower surface thereof on the lower side are formed. The bearing portion 61*b* has a bearing hole 63 formed to pass therethrough in the up-down direction, and the crank shaft 80 is rotatably fitted into the bearing portion 61*b* through the bearing hole 63.

(12-2-4) Oldham Ring 39

The oldham ring 39 is a member for preventing the rotation movement of the movable scroll 40 and is fitted into an oldham groove (not illustrated) formed in the housing 61. The oldham groove is an elongated-circular groove and is disposed at positions opposite each other in the housing 61.

(12-2-5) Lower Bearing 90

The lower bearing 90 is disposed in a lower space on the lower side of the motor 70. The lower bearing 90 is fixed to the cylinder member 21 while constituting the lower-end-side bearing of the crank shaft 80 and supports the crank shaft 80.

(12-2-6) Suction Pipe 23

The suction pipe 23 is a pipe for guiding a refrigerant of the refrigerant circuit to the compression mechanism 60 and is fitted into the upper cover 22*a* of the casing 20 in an airtight manner. The suction pipe 23 passes through a low-pressure space S1 in the up-down direction with an inner end portion thereof fitted into the fixed scroll 30.

(12-2-7) Discharge Pipe 24

The discharge pipe 24 is a pipe for discharging a refrigerant in the casing 20 to the outside of the casing 20 and is fitted into the cylinder member 21 of the casing 20 in an airtight manner. The discharge pipe 24 has an inner end portion 36 that has a cylindrical shape extending in the up-down direction and that is fixed to a lower end portion of the housing 61. An inner end opening, that is, an inflow port of the discharge pipe 24 opens downward.

(12-3) Operation of Compressor 100

When the motor 70 is driven, the crank shaft 80 rotates, and the movable scroll 40 performs revolving operation without rotating. A low-pressure gas refrigerant is then sucked from the peripheral side of the compression chamber Sc through the suction pipe 23 into the compression chamber Sc and compressed in response to a change in the capacity of the compression chamber Sc, thereby becoming a high-pressure gas refrigerant.

The high-pressure gas refrigerant is discharged from a center portion of the compression chamber Sc by passing through the discharge hole 341 into the muffler space 345, then flows out into the gap space 68 through the connection passage 46, a scroll-side passage 47, a housing-side passage 48, and the outlet 49, and flows downward between the guide plate 58 and the inner surface of the cylinder member 21.

When the gas refrigerant flows downward between the guide plate 58 and the inner surface of the cylinder member 21, a portion of the gas refrigerant branches to flow between the guide plate 58 and the motor 70 in the circumferential direction. At this time, a lubrication oil mixed in the gas refrigerant is separated.

The other portion of the branched gas refrigerant flows downward in the motor cooling passage 55 and, after flowing into a motor lower space, turns and flows upward in an air-gap passage between the stator 72 and the rotor 71 or in the motor cooling passage 55 on a side (left side in FIG. 12B) opposite the connection passage 46.

After that, the gas refrigerant that has passed the guide plate 58 and the gas refrigerant that has flowed in the air-gap passage or in the motor cooling passage 55 merge together in the gap space 68, flow into the discharge pipe 24 from the inner end portion 36 of the discharge pipe 24, and are discharged to the outside of the casing 20.

After circulating in the refrigerant circuit, the gas refrigerant discharged to the outside of the casing 20 is sucked through the suction pipe 23 and compressed again by the compression mechanism 60.

(12-4) Configuration of Motor 70

FIG. 12C is a sectional view of the motor 70 sectioned along a plane perpendicular to the axis. FIG. 12D is a sectional view of the rotor 71 sectioned along a plane perpendicular to the axis. FIG. 12E is a perspective view of the rotor 71.

In FIG. 12C to FIG. 12E, illustration of a shaft that is coupled to the rotor 71 to transmit a rotational force to an external portion is omitted. The motor 70 in FIG. 12C to FIG. 12E is an induction motor. The motor 70 has the rotor 71 and the stator 72.

(12-4-1) Stator 72

The stator 72 is provided with the barrel portion 725 and a plurality of tooth portions 726. The barrel portion 725 has a substantially cylindrical shape having an inner circumferential diameter larger than the outer circumferential diameter of the rotor 71. The barrel portion 725 is formed by machining each of thin electromagnetic steel plates having a thickness of 0.05 mm or more and 0.5 mm or less into a predetermined shape and laminating a predetermined number of the electromagnetic steel plates.

The plurality of tooth portions 726 project on the inner circumferential part of the barrel portion 725 in a form of being positioned at substantially equal intervals in the circumferential direction thereof. Each of the tooth portions 726 extend from the inner circumferential part of the barrel portion 725 toward the center in the radial direction of a circle centered on the axis and faces the rotor 71 with a predetermined gap.

The tooth portions 726 are magnetically coupled on the outer circumferential side via the barrel portion 725. The coil 727 is wound, as a coil, around each of the tooth portions 726 (only one of the coils 727 is illustrated in FIG. 12C). Three-phase alternating current for generating a rotating magnetic field that rotates the rotor 71 is made to flow through the coils 727. The winding type of the coils 727 is not limited and may be wound with respect to the plurality of tooth portions 726 in a concentrated form or in a distributed form.

The rotor 71 and the stator 72 are incorporated in the casing 20 and used as a rotary electric machine.

(12-4-2) Rotor 71

The rotor 71 is a basket-shaped rotor. The rotor 71 has a substantially cylindrical external shape and has a center axis along which the main shaft 82 of the crank shaft 80 is coupled and fixed. The rotor 71 has a rotor core 710, a plurality of conducting bars 716, and an end ring 717.

(12-4-2-1) Rotor Core 710

The rotor core 710 is formed of a magnetic material into a substantially cylindrical shape. The rotor core 710 is formed by machining each of thin electromagnetic steel plates having a thickness of 0.05 mm or more and 0.5 mm or less into a predetermined shape and laminating, as illustrated in FIG. 12E, a predetermined number of the electromagnetic steel plates.

The electromagnetic steel plates are desirably a plurality of electromagnetic steel plates each having a tensile strength of 400 MPa or more to improve durability of the rotor during high-speed rotation. As illustrated in FIG. 12D, the rotor core 710 has a plurality of conducting-bar formation holes 718 and a shaft insertion hole 719.

In each one of electromagnetic steel plates 711, a [hole having a planar shape identical to that of the shaft insertion hole 719] is formed at the center thereof, and in addition, [holes each having a planar shape identical to those of the conducting-bar formation holes 718] are provided at predetermined intervals. As a result of the electromagnetic steel plates 711 being laminated in a state in which the [holes each having the planar shape identical to those of the conducting-bar formation holes 718] are displaced from each other by a predetermined angle, the conducting-bar formation holes 718 and the shaft insertion hole 719 are formed. The conducting-bar formation holes 718 are holes for molding the conducting bars 716 in the rotor core 710. Note that FIG. 12E only illustrates some of the conducting bars 716 and some of the conducting-bar formation holes 718.

The shaft insertion hole 719 is a hole for fixing the main shaft 82 (refer to FIG. 12B) of the crank shaft 80 along the center axis of the rotor core 710.

(12-4-2-2) Conducting Bar 716 and End Ring 717

The conducting bars 716 packed in the conducting-bar formation holes 718 and the end ring 717 that holds the rotor core 710 from both ends are molded integrally. For example, when aluminum or an aluminum alloy is employed as a conductor, the conducting bars 716 and the end ring 717 are integrally molded by, after setting the rotor core 710 in an aluminum die-casting die, press-fitting the aluminum or the aluminum alloy that has melted into the die.

Consequently, the basket-shaped rotor 71 having the plurality of conducting bars 716 disposed in an annular form and the end ring 717 that short-circuits the plurality of conducting bars 716 at an end portion in the axial direction is realized.

(12-5) Feature

The compressor 100 is a compressor that compresses a mixed refrigerant containing at least 1,2-difluoroethylene and that enables high power at comparatively low costs by employing the induction motor 70.

(12-6) Modifications (12-6-1) First Modification

In the aforementioned embodiment, the conducting bars 716 and the end ring 717 have been described in a form in which the conducting bars 716 and the end ring 717 are integrally molded with aluminum or an aluminum alloy. The conducting bars 716 and the end ring 717 are, however, not limited thereto.

For example, the conducting bars 716 and the end ring 717 may be molded with a metal whose electric resistance is lower than that of aluminum. Specifically, the conducting bars 716 and the end ring 717 may be molded with copper or a copper alloy.

According to a first modification, heat generation due to current that flows through the conducting bars 716 of the induction motor 70 is suppressed, which enables high power of the compressor 100.

In cases of being molded with copper and a copper alloy, it is not possible to mold the conducting bars 716 and the end ring 717 by a die-casting method. The conducting bars 716 and the end ring 717 are thus welded by brazing.

Needless to say, the conducting bars 716 and the end ring 717 may be molded with metals of different types. For example, the conducting bars 716 may be molded with copper or a copper alloy while the end ring 717 may be molded with aluminum or an aluminum alloy.

(12-6-2) Second Modification

FIG. 12F is a perspective view of the rotor 71 to be used in the induction motor 70 of the compressor 100 according to a second modification. The rotor 71 in FIG. 12F has a heat sink 717*a* as a heat-radiation structure.

The heat sink 717*a* has heat-radiation fins 717*af* projecting from an end surface of the end ring 717 in the direction of the center axis of the rotor 71 and extending in the radius direction of the rotor 71. In the present modification, six heat-radiation fins 717*af* are disposed around the center axis at center-angle 60 intervals.

In the compressor 100, the rotation of the rotor 71 rotates the heat sink 717*a*, and heat radiation properties of the heat-radiation fins 717*af* are thus improved, and, moreover, the rotation causes forced convection and suppresses an increase in the peripheral temperature, which enables high power of the compressor 100.

In addition, it is possible to suppress an increase in manufacturing costs because the heat sink 717*a* is formed on the end ring 717, and the heat sink 717*a* can be molded integrally with the end ring 717 when the end ring 717 is molded.

(12-6-3) Third Modification

FIG. 12G is a refrigerant circuit diagram of an air conditioner 1 in which the compressor 100 according to a third modification is utilized. The configuration in FIG. 12G differs from the configuration in FIG. 12A in terms of that a refrigerant circuit 11 has a cooling structure that includes a branch circuit 110 and is identical to that in FIG. 12A in other features.

In the branch circuit 110, a refrigerant that has branched from the refrigerant circuit 11 flows. The branch circuit 110 is provided in parallel from a portion between an outdoor heat exchanger 17 and an expansion valve 18 of the refrigerant circuit 11 to a portion between the expansion valve 18 and an indoor heat exchanger 13. A second expansion valve 112, a cooling portion 111, and a third expansion valve 113 are connected to the branch circuit 110.

The cooling portion 111 is mounted on the outer circumferential surface of the casing 20 of the compressor 100 via a heat transfer plate. The mounted position thereof corresponds to the side of the stator 72 of the induction motor 70. The cooling portion 111 is a portion that cools the stator 72 indirectly by using the cold heat of the refrigerant flowing in the refrigerant circuit 11. Specifically, the second expansion valve 112 is connected to one end of a pipe fitted, in a state of being bent in a serpentine shape, into the heat transfer plate, and the third expansion valve 113 is connected to the other end thereof.

During cooling operation, a portion of the refrigerant flowing in the refrigerant circuit 11 branches at a portion between the outdoor heat exchanger 17 and the expansion valve 18 into the branch circuit 110, flows through the second expansion valve 112 whose opening degree has been adjusted, the cooling portion 111, and the third expansion valve 113 whose opening degree has been set to be fully open, in this order, and merges at a portion between the expansion valve 18 and the indoor heat exchanger 13. The opening degree of the second expansion valve 112 is adjusted so as to enable the refrigerant decompressed in the second expansion valve 112 to absorb heat in the cooling portion 111 and evaporate.

During heating operation, a portion of the refrigerant flowing in the refrigerant circuit 11 branches at a portion between the indoor heat exchanger 13 and the expansion valve 18 into the branch circuit 110, flows through the third expansion valve 113 whose opening degree has been adjusted, the cooling portion 111, and the second expansion valve 112 whose opening degree has been set to be fully open, in this order, and merges at a portion between the expansion valve 18 and the outdoor heat exchanger 17. The opening degree of the third expansion valve 113 is adjusted to enable the refrigerant decompressed in the third expansion valve 113 to absorb heat in the cooling portion 111 and evaporate.

With the aforementioned cooling structure, it is possible to cool the stator 72 by using the cold heat of the refrigerant that flows in the refrigerant circuit 11, which enables high power of the compressor.

(12-7) Configuration of Compressor 300 According to Second Embodiment

In the first embodiment, a scroll compressor has been described as the compressor 100. The compressor is, however, not limited to a scroll compressor.

FIG. 12H is a longitudinal sectional view of the compressor 300 according to a second embodiment of the present disclosure. The compressor 300 in FIG. 12H is a rotary compressor. The compressor 300 constitutes a portion of a refrigerant circuit in which one of the aforementioned refrigerants A to D circulates. The compressor 300 compresses a refrigerant and discharges a high-pressure gas refrigerant. The arrows in FIG. 12H indicate the flow of the refrigerant.

(12-7-1) Casing 220

The compressor 300 has a vertically elongated cylindrical casing 220. The casing 220 has a substantially cylindrical cylinder member 221 that opens upward and downward, and an upper cover 222*a* and a lower cover 222*b* that are disposed on the upper end and the lower end of the cylinder member 221, respectively. The upper cover 222*a* and the lower cover 222*b* are fixed to the cylinder member 221 by welding to maintain airtightness.

The casing 220 accommodates constituent devices of the compressor 300, including a compression mechanism 260, a motor 270, a crank shaft 280, an upper bearing 263, and a lower bearing 290. The oil reservoir space So is formed in a lower portion of the casing 220.

In the lower portion of the casing 220, a suction pipe 223 that sucks a gas refrigerant and supplies the gas refrigerant to the compression mechanism 260 is disposed to pass through a lower portion of the cylinder member 221. One end of the suction pipe 223 is connected to a cylinder 230 of the compression mechanism 260. The suction pipe 223 is in communication with the compression chamber Sc of the compression mechanism 260. In the suction pipe 223, a low-pressure refrigerant of the refrigeration cycle before compression by the compressor 300 flows.

The upper cover 222*a* of the casing 220 is provided with a discharge pipe 224 through which a refrigerant that is to be discharged to the outside of the casing 220 passes. Specifically, an end portion of the discharge pipe 224 in the inner portion of the casing 220 is disposed in a high-pressure space S5 formed in the upper side of the motor 270. In the discharge pipe 224, a high-pressure refrigerant of the refrigeration cycle after compression by the compression mechanism 260 flows.

(12-7-2) Motor 270

The motor 270 has a stator 272 and a rotor 271. Except for being used in the compressor 300, which is a rotary compressor, the motor 270 is basically equivalent to the motor 70 of the first embodiment and exerts performance and actions/effects equivalent to those of the motor 70 of the first embodiment. Therefore, description of the motor 270 is omitted here.

(12-7-3) Crank Shaft 280, Upper Bearing 263, and Lower Bearing 290

The crank shaft 280 is fixed to the rotor 271. Further, the crank shaft 280 is supported by the upper bearing 263 and the lower bearing 290 to be rotatable about a rotation axis Rs. The crankshaft 280 has an eccentric portion 241.

(12-7-4) Compression Mechanism 260

The compression mechanism 260 has the single cylinder 230 and a single piston 242 disposed in the cylinder 230. The cylinder 230 has a predetermined capacity and is fixed to the casing 220.

The piston 242 is disposed on the eccentric portion 241 of the crank shaft 280. The cylinder 230 and the piston 242 define the compression chamber Sc. Rotation of the rotor 271 revolves the piston 242 via the eccentric portion 241. In response to the revolution, the capacity of the compression chamber Sc changes, thereby compressing a gaseous refrigerant.

Here, "the capacity of the cylinder" means so-called theoretical capacity and, in other words, corresponds to the volume of a gaseous refrigerant sucked into the cylinder 230 through the suction pipe 223 during one rotation of the piston 242.

(12-7-5) Oil Reservoir Space So

The oil reservoir space So is disposed in a lower portion of the casing 220. The oil reservoir space So stores the refrigerating machine oil O for lubricating the compression mechanism 260. The refrigerating machine oil O is the refrigerating machine oil described in the section of "(1-4-1) Refrigerating Machine Oil".

(12-8) Operation of Compressor 300

Operation of the compressor 300 will be described. When the motor 270 is started, the rotor 271 rotates with respect to the stator 272, and the crank shaft 280 fixed to the rotor 271 rotates. When the crank shaft 280 rotates, the piston 242 coupled to the crank shaft 280 revolves with respect to the cylinder 230. Then, a low-pressure gas refrigerant of the refrigeration cycle is sucked into the compression chamber Sc through the suction pipe 223. As a result of the piston 242 revolving, the suction pipe 223 and the compression chamber Sc become not in communication with each other, and in response to the capacity of the compression chamber Sc decreasing, the pressure in the compression chamber Sc starts to increase.

The refrigerant in the compression chamber Sc is compressed in response to the capacity of the compression chamber Sc decreasing and eventually becomes a high-pressure gas refrigerant. The high-pressure gas refrigerant is discharged through a discharge port 232*a*. Then, the high-pressure gas refrigerant passes through a gap between the stator 272 and the rotor 271 and other parts and is discharged through the discharge pipe 224 disposed in the upper side of the casing 220.

(12-9) Features of Second Embodiment 12-9-1

The compressor 300 is a compressor that compresses a mixed refrigerant containing at least 1,2-difluoroethylene and that enables high power at comparatively low costs by employing an induction motor as the motor 270.

12-9-2

When using the compressor 300, which is a rotary compressor, as the compressor of the air conditioner 1, it is possible to reduce the packed amount of refrigerant compared with when a scroll compressor is used. Therefore, the compressor 300 is suitable for an air conditioner that uses a flammable refrigerant.

(12-10) Modification of Second Embodiment

Due to the compressor 300 employing the motor 270 equivalent to the motor 70 of the first embodiment, the modification is applicable to all described in "(12-6) Modifications" of the first embodiment.

(12-11) Other Embodiment

Regarding the form of the compressor, a screw compressor or a turbo compressor may be employed provided that a motor equivalent to the motor 70 is used.

(13) Embodiment of the Technique of Thirteenth Group (13-1) First Embodiment

FIG. 13A is a configuration diagram of an air conditioner 1 according to a first embodiment of the present disclosure. In FIG. 13A, the air conditioner 1 is constituted by a utilization unit 2 and a heat source unit 3.

(13-1-1) Configuration of Air Conditioner 1

The air conditioner 1 has a refrigerant circuit 11 in which a compressor 100, a four-way switching valve 16, a heat-source-side heat exchanger 17, an expansion valve 18 serving as a decompression mechanism, and a utilization-side heat exchanger 13 are connected in a loop shape by refrigerant pipes.

In this embodiment, the refrigerant circuit 11 is filled with refrigerant for performing a vapor compression refrigeration cycle. The refrigerant is a refrigerant mixture containing 1,2-difluoroethylene, and any one of the above-described refrigerant A to refrigerant D can be used. The refrigerant circuit 11 is filled with refrigerating machine oil together with the refrigerant mixture.

(13-1-1-1) Utilization Unit 2

In the refrigerant circuit 11, the utilization-side heat exchanger 13 belongs to the utilization unit 2. In addition, a utilization-side fan 14 is mounted in the utilization unit 2. The utilization-side fan 14 generates an air flow to the utilization-side heat exchanger 13.

A utilization-side communicator 35 and a utilization-side microcomputer 41 are mounted in the utilization unit 2. The utilization-side communicator 35 is connected to the utilization-side microcomputer 41.

The utilization-side communicator 35 is used by the utilization unit 2 to communicate with the heat source unit 3. The utilization-side microcomputer 41 is supplied with a control voltage even during a standby state in which the air conditioner 1 is not operating. Thus, the utilization-side microcomputer 41 is constantly activated.

(13-1-1-2) Heat Source Unit 3

In the refrigerant circuit 11, the compressor 100, the four-way switching valve 16, the heat-source-side heat exchanger 17, and the expansion valve 18 belong to the heat source unit 3. In addition, a heat-source-side fan 19 is mounted in the heat source unit 3. The heat-source-side fan 19 generates an air flow to the heat-source-side heat exchanger 17.

In addition, a power conversion device 30, a heat-source-side communicator 36, and a heat-source-side microcomputer 42 are mounted in the heat source unit 3. The power conversion device 30 and the heat-source-side communicator 36 are connected to the heat-source-side microcomputer 42.

The power conversion device 30 is a circuit for driving a motor 70 of the compressor 100. The heat-source-side communicator 36 is used by the heat source unit 3 to communicate with the utilization unit 2. The heat-source-side microcomputer 42 controls the motor 70 of the compressor 100 via the power conversion device 30 and also controls other devices in the heat source unit 3 (for example, the heat-source-side fan 19).

FIG. 13B is a circuit block diagram of the power conversion device 30. In FIG. 13B, the motor 70 of the compressor 100 is a three-phase brushless DC motor and includes a stator 72 and a rotor 71. The stator 72 includes star-connected phase windings Lu, Lv, and Lw of a U-phase, a V-phase, and a W-phase. One ends of the phase windings Lu, Lv, and Lw are respectively connected to phase winding terminals TU, TV, and TW of wiring lines of the U-phase, the V-phase, and the W-phase extending from an inverter 25. The other ends of the phase windings Lu, Lv, and Lw are connected to each other at a terminal TN. These phase windings Lu, Lv, and Lw each generate an induced voltage in accordance with the rotation speed and position of the rotor 71 when the rotor 71 rotates.

The rotor 71 includes a permanent magnet with a plurality of poles, the N-pole and the S-pole, and rotates about a rotation axis with respect to the stator 72.

(13-1-2) Configuration of Power Conversion Device 30

The power conversion device 30 is mounted in the heat source unit 3, as illustrated in FIG. 13A. The power conversion device 30 is constituted by a power source circuit 20, the inverter 25, a gate driving circuit 26, and the heat-source-side microcomputer 42, as illustrated in FIG. 13B. The power source circuit 20 is constituted by a rectifier circuit 21 and a capacitor 22.

(13-1-2-1) Rectifier Circuit 21

The rectifier circuit 21 has a bridge structure made up of four diodes D1_a_, D1_b_, D2_a_, and D2_b_. Specifically, the diodes D1_a_ and D1_b_ are connected in series to each other, and the diodes D2_a_ and D2_b_ are connected in series to each other. The cathode terminals of the diodes D1_a_ and D2_a_ are connected to a plus-side terminal of the capacitor 22 and function as a positive-side output terminal of the rectifier circuit 21. The anode terminals of the diodes D1_b_ and D2_b_ are connected to a minus-side terminal of the capacitor 22 and function as a negative-side output terminal of the rectifier circuit 21.

A node between the diode D1_a_ and the diode D1_b_ is connected to one pole of an alternating-current (AC) power source 90. Anode between the diode D2_a_ and the diode D2_b_ is connected to the other pole of the AC power source 90. The rectifier circuit 21 rectifies an AC voltage output from the AC power source 90 to generate a direct-current (DC) voltage, and supplies the DC voltage to the capacitor 22.

(13-1-2-2) Capacitor 22

The capacitor 22 has one end connected to the positive-side output terminal of the rectifier circuit 21 and has the other end connected to the negative-side output terminal of the rectifier circuit 21. The capacitor 22 is a small-capacitance capacitor that does not have a large capacitance for smoothing a voltage rectified by the rectifier circuit 21. Hereinafter, a voltage between the terminals of the capacitor 22 will be referred to as a DC bus voltage Vdc for the convenience of description.

The DC bus voltage Vdc is applied to the inverter 25 connected to the output side of the capacitor 22. In other words, the rectifier circuit 21 and the capacitor 22 constitute the power source circuit 20 for the inverter 25.

The capacitor 22 smoothes voltage variation caused by switching in the inverter 25. In this embodiment, a film capacitor is adopted as the capacitor 22.

(13-1-2-3) Voltage Detector 23

A voltage detector 23 is connected to the output side of the capacitor 22 and is for detecting the value of a voltage across the capacitor 22, that is, the DC bus voltage Vdc. The voltage detector 23 is configured such that, for example, two resistors connected in series to each other are connected in parallel to the capacitor 22 and the DC bus voltage Vdc is divided. A voltage value at a node between the two resistors is input to the heat-source-side microcomputer 42.

(13-1-2-4) Current Detector 24

A current detector 24 is connected between the capacitor 22 and the inverter 25 and to the negative-side output terminal side of the capacitor 22. The current detector 24 detects a motor current that flows through the motor 70 after the motor 70 is activated, as a total value of currents of the three phases.

The current detector 24 may be constituted by, for example, an amplifier circuit including a shunt resistor and an operational amplifier that amplifies a voltage across the shunt resistor. The motor current detected by the current detector 24 is input to the heat-source-side microcomputer 42.

(13-1-2-5) Inverter 25

In the inverter 25, three pairs of upper and lower arms respectively corresponding to the phase windings Lu, Lv, and Lw of the U-phase, the V-phase, and the W-phase of the motor 70 are connected in parallel to each other and connected to the output side of the capacitor 22.

In FIG. 13B, the inverter 25 includes a plurality of insulated gate bipolar transistors (IGBTs, hereinafter simply referred to as transistors) Q3_a_, Q3_b_, Q4_a_, Q4_b_, Q5_a_, and Q5_b_, and a plurality of free wheeling diodes D3_a_, D3_b_, D4_a_, D4_b_, D5_a_, and D5_b_.

The transistors Q3_a_ and Q3_b_ are connected in series to each other, the transistors Q4_a_ and Q4_b_ are connected in series to each other, and the transistors Q5_a_ and Q5_b_ are connected in series to each other, to constitute respective upper and lower arms and to form nodes NU, NV, and NW, from which output lines extend toward the phase windings Lu, Lv, and Lw of the corresponding phases.

The diodes D3_a_ to D5_b_ are connected in parallel to the respective transistors Q3_a_ to Q5_b_ such that the collector terminal of the transistor is connected to the cathode terminal of the diode and that the emitter terminal of the transistor is connected to the anode terminal of the diode. The transistor and the diode connected in parallel to each other constitute a switching element.

The inverter 25 generates driving voltages SU, SV, and SW for driving the motor 70 in response to ON and OFF of the transistors Q3_a_ to Q5_b_ at the timing when the DC bus voltage Vdc is applied from the capacitor 22 and when an instruction is provided from the gate driving circuit 26. The driving voltages SU, SV, and SW are respectively output from the node NU between the transistors Q3_a_ and Q3_b_, the node NV between the transistors Q4_a_ and Q4_b_, and the node NW between the transistors Q5_a_ and Q5_b_ to the phase windings Lu, Lv, and Lw of the motor 70.

(13-1-2-6) Gate Driving Circuit 26

The gate driving circuit 26 changes the ON and OFF states of the transistors Q3_a_ to Q5_b_ of the inverter 25 on the basis of instruction voltages from the heat-source-side microcomputer 42. Specifically, the gate driving circuit 26 generates gate control voltages Gu, Gx, Gv, Gy, Gw, and Gz to be applied to the gates of the respective transistors Q3_a_ to Q5_b_ so that the pulsed driving voltages SU, SV, and SW having a duty determined by the heat-source-side microcomputer 42 are output from the inverter 25 to the motor 70. The generated gate control voltages Gu, Gx, Gv, Gy, Gw, and Gz are applied to the gate terminals of the respective transistors Q3_a_ to Q5_b_.

(13-1-2-7) Heat-Source-Side Microcomputer 42

The heat-source-side microcomputer 42 is connected to the voltage detector 23, the current detector 24, and the gate driving circuit 26. In this embodiment, the heat-source-side microcomputer 42 causes the motor 70 to be driven by using a rotor position sensorless method. The driving method is not limited to the rotor position sensorless method, and a sensor method may be used.

The rotor position sensorless method is a method for performing driving by estimating the position and rotation rate of the rotor, performing PI control on the rotation rate, performing PI control on a motor current, and the like, by using various parameters indicating the characteristics of the motor 70, a detection result of the voltage detector 23 after the motor 70 is activated, a detection result of the current detector 24, and a predetermined formula model about control of the motor 70, and the like. The various parameters indicating the characteristics of the motor 70 include a winding resistance, an inductance component, an induced voltage, and the number of poles of the motor 70 that is used. For details of rotor position sensorless control, see patent literatures (for example, Japanese Unexamined Patent Application Publication No. 2013-17289).

(13-1-3) Features of First Embodiment 13-1-3-1

In the air conditioner 1 that uses a refrigerant mixture containing at least 1,2-difluoroethylene, the rotation rate of the motor 70 can be changed via the power conversion device 30 as necessary. In other words, the motor rotation rate of the compressor 100 can be changed in accordance with an air conditioning load, and thus a high annual performance factor (APF) can be achieved.

13-1-3-2

An electrolytic capacitor is not required on the output side of the rectifier circuit 21, and thus an increase in the size and cost of the circuit is suppressed.

(13-1-4) Modification Example of First Embodiment

FIG. 13C is a circuit block diagram of a power conversion device 130 according to a modification example of the first embodiment. In FIG. 13C, this modification example is different from the first embodiment in that a rectifier circuit 121 for three phases is adopted instead of the rectifier circuit 21 for a single phase, to support a three-phase AC power source 190 instead of the single-phase AC power source 90.

The rectifier circuit 121 has a bridge structure made up of six diodes D0*a*, D0*b*, D1*a*, D1*b*, D2*a*, and D2*b*. Specifically, the diodes D0*a* and D0*b* are connected in series to each other, the diodes D1*a* and D1*b* are connected in series to each other, and the diodes D2*a* and D2*b* are connected in series to each other.

The cathode terminals of the diodes D0*a*, D1*a*, and D2*a* are connected to the plus-side terminal of the capacitor 22 and function as a positive-side output terminal of the rectifier circuit 121. The anode terminals of the diodes D0*b*, D1*b*, and D2*b* are connected to the minus-side terminal of the capacitor 22 and function as a negative-side output terminal of the rectifier circuit 121.

A node between the diode D0*a* and the diode D0*b* is connected to an R-phase output side of the AC power source 190. A node between the diode D1*a* and the diode D1*b* is connected to an S-phase output side of the AC power source 190. A node between the diode D2*a* and the diode D2*b* is connected to a T-phase output side of the AC power source 190. The rectifier circuit 121 rectifies an AC voltage output from the AC power source 190 to generate a DC voltage, and supplies the DC voltage to the capacitor 22.

Other than that, the configuration is similar to that of the above-described embodiment, and thus the description thereof is omitted.

(13-1-5) Features of Modification Example of First Embodiment 13-1-5-1

In the air conditioner 1 that uses a refrigerant mixture containing at least 1,2-difluoroethylene, the rotation rate of the motor 70 can be changed via the power conversion device 130 as necessary. In other words, the motor rotation rate of the compressor 100 can be changed in accordance with an air conditioning load, and thus a high annual performance factor (APF) can be achieved.

13-1-5-2

An electrolytic capacitor is not required on the output side of the rectifier circuit 121, and thus an increase in the size and cost of the circuit is suppressed.

(13-2) Second Embodiment

FIG. 13D is a circuit block diagram of a power conversion device 30B mounted in an air conditioner according to a second embodiment of the present disclosure.

(13-2-1) Configuration of Power Conversion Device 30B

In FIG. 13D, the power conversion device 30B is an indirect matrix converter. The difference from the power conversion device 30 according to the first embodiment in FIG. 13B is that a converter 27 is adopted instead of the rectifier circuit 21 and that a gate driving circuit 28 and a reactor 33 are newly added. Other than that, the configuration is similar to that of the first embodiment.

Here, a description will be given of the converter 27, the gate driving circuit 28, and the reactor 33, and a description of the other components is omitted.

(13-2-1-1) Converter 27

In FIG. 13D, the converter 27 includes a plurality of insulated gate bipolar transistors (IGBTs, hereinafter simply referred to as transistors) Q1*a*, Q1*b*, Q2*a*, and Q2*b*, and a plurality of diodes D1*a*, D1*b*, D2*a*, and D2*b*.

The transistors Q1*a* and Q1*b* are connected in series to each other to constitute upper and lower arms, and a node formed accordingly is connected to one pole of the AC power source 90. The transistors Q2*a* and Q2*b* are connected in series to each other to constitute upper and lower arms, and a node formed accordingly is connected to the other pole of the AC power source 90.

The diodes D1*a* to D2*b* are connected in parallel to the respective transistors Q1*a* to Q2*b* such that the collector terminal of the transistor is connected to the cathode terminal of the diode and that the emitter terminal of the transistor is connected to the anode terminal of the diode. The transistor and the diode connected in parallel to each other constitute a switching element.

In the converter 27, the transistors Q1*a* to Q2*b* are turned ON and OFF at the timing when an instruction is provided from the gate driving circuit 28.

(13-2-1-2) Gate Driving Circuit 28

The gate driving circuit 28 changes the ON and OFF states of the transistors Q1*a* to Q2*b* of the converter 27 on the basis of instruction voltages from the heat-source-side microcomputer 42. Specifically, the gate driving circuit 28 generates pulsed gate control voltages Pq, Pr, Ps, and Pt having a duty determined by the heat-source-side microcomputer 42 so as to control a current flowing from the AC power source 90 toward the heat source to a predetermined value. The generated gate control voltages Pq, Pr, Ps, and Pt are applied to the gate terminals of the respective transistors Q1*a* to Q2*b*.

(13-2-1-3) Reactor 33

The reactor 33 is connected in series to the AC power source 90 between the AC power source 90 and the converter 27. Specifically, one end thereof is connected to one pole of the AC power source 90, and the other end thereof is connected to one input terminal of the converter 27.

(13-2-2) Operation

The heat-source-side microcomputer 42 turns ON/OFF the transistors Q1*a* and Q1*b* or the transistors Q2*a* and Q2*b* of the upper and lower arms of the converter 27 to short-circuit/open the transistors for a predetermined time, and controls a current to, for example, a substantially sinusoidal state, thereby improving a power factor of power source input and suppressing harmonic components.

In addition, the heat-source-side microcomputer 42 performs cooperative control between the converter and the inverter so as to control a short-circuit period on the basis of a duty ratio of a gate control voltage for controlling the inverter 25.

(13-2-3) Features of Second Embodiment

The air conditioner 1 is highly efficient and does not require an electrolytic capacitor on the output side of the converter 27, and thus an increase in the size and cost of the circuit is suppressed.

(13-2-4) Configuration of Power Conversion Device 130B According to Modification Example of Second Embodiment FIG. 13E is a circuit block diagram of a power conversion device 130B according to a modification example of the second embodiment. In FIG. 13E, this modification example is different from the second embodiment in that a converter 127 for three phases is adopted instead of the converter 27 for a single phase, to support the three-phase AC power source 190 instead of the single-phase AC power source 90. In accordance with the change from the converter 27 for a single phase to the converter 127 for three phases, a gate driving circuit 128 is adopted instead of the gate driving circuit 28. Furthermore, reactors 33 are connected between the converter 127 and the output sides of the respective phases. Capacitors are connected between input-side terminals of the reactors 33. Alternatively, these capacitors may be removed.

(13-2-4-1) Converter 127

The converter 127 includes a plurality of insulated gate bipolar transistors (IGBTs, hereinafter simply referred to as transistors) Q0*a*, Q0*b*, Q1*a*, Q1*b*, Q2*a*, and Q2*b*, and a plurality of diodes D0*a*, D0*b*, D1*a*, D1*b*, D2*a*, and D2*b*.

The transistors Q0*a* and Q0*b* are connected in series to each other to constitute upper and lower arms, and a node formed accordingly is connected to the R-phase output side of the AC power source 190. The transistors Q1*a* and Q1*b* are connected in series to each other to constitute upper and lower arms, and a node formed accordingly is connected to the S-phase output side of the AC power source 190. The transistors Q2*a* and Q2*b* are connected in series to each other to constitute upper and lower arms, and a node formed accordingly is connected to the T-phase output side of the AC power source 190.

The diodes D0*a* to D2*b* are connected in parallel to the respective transistors Q0*a* to Q2*b* such that the collector terminal of the transistor is connected to the cathode terminal of the diode and that the emitter terminal of the transistor is connected to the anode terminal of the diode. The transistor and the diode connected in parallel to each other constitute a switching element.

In the converter 127, the transistors Q0*a* to Q2*b* are turned ON and OFF at the timing when an instruction is provided from the gate driving circuit 128.

(13-2-4-2) Gate Driving Circuit 128

The gate driving circuit 128 changes the ON and OFF states of the transistors Q0*a* to Q2*b* of the converter 127 on the basis of instruction voltages from the heat-source-side microcomputer 42. Specifically, the gate driving circuit 128 generates pulsed gate control voltages Po, Pp, Pq, Pr, Ps, and Pt having a duty determined by the heat-source-side microcomputer 42 so as to control a current flowing from the AC power source 190 toward the heat source to a predetermined value. The generated gate control voltages Po, Pp, Pq, Pr, Ps, and Pt are applied to the gate terminals of the respective transistors Q0*a* to Q2*b*.

(13-2-5) Features of Modification Example of Second Embodiment

The air conditioner 1 is highly efficient and does not require an electrolytic capacitor on the output side of the converter 127, and thus an increase in the size and cost of the circuit is suppressed.

(13-3) Third Embodiment

FIG. 13F is a circuit block diagram of a power conversion device 30C mounted in an air conditioner according to a third embodiment of the present disclosure.

(13-3-1) Configuration of Power Conversion Device 30C According to Third Embodiment In FIG. 13F, the power conversion device 30C is a matrix converter 29.

(13-3-1-1) Configuration of Matrix Converter 29

The matrix converter 29 is configured by connecting bidirectional switches S1*a*, S2*a*, and S3*a* to one end of input from the AC power source 90 and connecting bidirectional switches S1*b*, S2*b*, and S3*b* to the other end.

An intermediate terminal between the bidirectional switch S1*a* and the bidirectional switch S1*b* connected in series to each other is connected to one end of the U-phase winding Lu among the three-phase windings of the motor 70. An intermediate terminal between the bidirectional switch S2*a* and the bidirectional switch S2*b* connected in series to each other is connected to one end of the V-phase winding Lv among the three-phase windings of the motor 70. An intermediate terminal between the bidirectional switch S3 and the bidirectional switch S3*b* connected in series to each other is connected to one end of the W-phase winding Lw among the three-phase windings of the motor 70.

AC power input from the AC power source 90 is switched by the bidirectional switches S1*a* to S3*b* and is converted into AC having a predetermined frequency, thereby being capable of driving the motor 70.

(13-3-1-2) Configuration of Bidirectional Switch

FIG. 13G is a circuit diagram conceptionally illustrating a bidirectional switch. In FIG. 13G, the bidirectional switch includes transistors Q61 and Q62, diodes D61 and D62, and terminals Ta and Tb. The transistors Q61 and Q62 are insulated gate bipolar transistors (IGBTs).

The transistor Q61 has an emitter E connected to the terminal Ta, and a collector C connected to the terminal Tb via the diode D61. The collector Cis connected to the cathode of the diode D61.

The transistor Q62 has an emitter E connected to the terminal Tb, and a collector C connected to the terminal Ta via the diode D62. The collector C is connected to the cathode of the diode D62. The terminal Ta is connected to an input side, and the terminal Tb is connected to an output side.

Turning ON of the transistor Q61 and turning OFF of the transistor Q62 enables a current to flow from the terminal Tb to the terminal Ta via the diode D61 and the transistor Q61 in this order. At this time, a flow of a current from the terminal Ta to the terminal Tb (backflow) is prevented by the diode D61.

On the other hand, turning OFF of the transistor Q61 and turning ON of the transistor Q62 enables a current to flow from the terminal Ta to the terminal Tb via the diode D62 and the transistor Q62 in this order. At this time, a flow of a current from the terminal Tb to the terminal Ta (backflow) is prevented by the diode D62.

(13-3-2) Operation

FIG. 13H is a circuit diagram illustrating an example of a current direction in the matrix converter 29. FIG. 13H illustrates an example of a path of a current that flows from the AC power source 90 via the matrix converter 29 to the motor 70. The current flows from one pole of the AC power source 90 to the other pole of the AC power source 90 via the bidirectional switch S1*a*, the U-phase winding Lu which is one of the three-phase windings of the motor 70, the W-phase winding Lw, and the bidirectional switch S3*b*. Accordingly, power is supplied to the motor 70 and the motor 70 is driven.

FIG. 13I is a circuit diagram illustrating an example of another current direction in the matrix converter 29. In FIG. 13I, a current flows from one pole of the AC power source 90 to the other pole of the AC power source 90 via the bidirectional switch S3*a*, the W-phase winding Lw which is one of the three-phase windings of the motor 70, the U-phase winding Lu, and the bidirectional switch S1*b*. Accordingly, power is supplied to the motor 70 and the motor 70 is driven.

(13-3-3) Features of Third Embodiment

The air conditioner 1 is highly efficient and does not require an electrolytic capacitor on the output side of the matrix converter 29, and thus an increase in the size and cost of the circuit is suppressed.

(13-3-4) Configuration of Power Conversion Device 130C According to Modification Example of Third Embodiment FIG. 13J is a circuit block diagram of a power conversion device 130C according to a modification example of the third embodiment. In FIG. 13J, this modification example is different from the third embodiment in that a matrix converter 129 for three phases is adopted instead of the matrix converter 29 for a single phase, to support the three-phase AC power source 190 instead of the single-phase AC power source 90.

(13-3-4-1) Configuration of Matrix Converter 129

It is also a difference that a gate driving circuit 131 is adopted instead of a gate driving circuit 31 in accordance with the change from the matrix converter 29 for a single phase to the matrix converter 129 for three phases. Furthermore, reactors L1, L2, and L3 are connected between the matrix converter 129 and the output sides of the respective phases.

Predetermined three-phase AC voltages obtained through conversion by bidirectional switches S1*a* to S3*c* are supplied to the motor 70 via the phase winding terminals TU, TV, and TW. The reactors L1, L2, and L3 are connected to respective input terminals of matrix converter 129. Capacitors C1, C2, and C3 are connected to each other at one ends thereof, and the other ends thereof are connected to output terminals of matrix converter 129.

In the power conversion device 130C, the reactors L1, L2, and L3 are short-circuited via the matrix converter 129, and thereby the energy supplied from the three-phase AC power source 190 can be accumulated in the reactors L1, L2, and L3 and the voltages across the capacitors C1, C2, and C3 can be increased. Accordingly, a voltage utilization rate of 1 or more can be achieved.

At this time, voltage-type three-phase AC voltages Vr, Vs, and Vt are input to the input terminals of the matrix converter 129, and current-type three-phase AC voltages Vu, Vv, and Vw are output from the output terminals.

In addition, the capacitors C1, C2, and C3 constitute LC filters with the reactors L1, L2, and L3, respectively. Thus, high-frequency components included in voltages output to the output terminals can be reduced, and torque pulsation components and noise generated in the motor 70 can be reduced.

Furthermore, compared with an AC-AC conversion circuit including a rectifier circuit and an inverter, the number of switching elements is smaller, and the loss that occurs in the power conversion device 130C can be reduced.

(13-3-4-2) Configuration of Clamp Circuit 133

In the power conversion device 130, a clamp circuit 133 is connected between the input terminals and the output terminals. Thus, a surge voltage generated between the input terminals and the output terminals of the matrix converter 129 through switching of the bidirectional switches S1*a* to S3*c* can be absorbed by a capacitor in the clamp circuit 133 (see FIG. 13I).

FIG. 13K is a circuit diagram of the clamp circuit 133. In FIG. 13K, the clamp circuit 133 has diodes D31*a* to D36*b*, a capacitor C37, and terminals 135 to 140.

The anode of the diode D31*a* and the cathode of the diode D31*b* are connected to the terminal 135. The anode of the diode D32*a* and the cathode of the diode D32*b* are connected to the terminal 136. The anode of the diode D33*a* and the cathode of the diode D33*b* are connected to the terminal 137.

The cathodes of the diodes D31*a*, D32*a*, and D33*a* are connected to one end of the capacitor C37. The anodes of the diodes D31*b*, D32*b*, and D33*b* are connected to the other end of the capacitor C37.

The anode of the diode D34*a* and the cathode of the diode D34*b* are connected to the terminal 138. The anode of the diode D35*a* and the cathode of the diode D35*b* are connected to the terminal 139. The anode of the diode D36*a* and the cathode of the diode D36*b* are connected to the terminal 140.

The cathodes of the diodes D34*a*, D35*a*, and D36*a* are connected to the one end of the capacitor C37. The anodes of the diodes D34*b*, D35*b*, and D36*b* are connected to the other end of the capacitor C37.

The terminals 135, 136, and 137 are connected to the input side of the matrix converter 129, and the terminals 138, 139, and 140 are connected to the output side of the matrix converter 129. Because the clamp circuit 133 is connected between the input terminals and the output terminals, a surge voltage generated between the input terminals and the output terminals of the matrix converter 129 through switching of the bidirectional switches S1*a* to S3*b* can be absorbed by the capacitor C37 in the clamp circuit 133.

As described above, the power conversion device 130C is capable of supplying a voltage larger than a power source voltage to the motor 70. Thus, even if the current flowing through the power conversion device 130C and the motor 70 is small, a predetermined motor output can be obtained, in other words, only a small current is used. Accordingly, the loss that occurs in the power conversion device 130C and the motor 70 can be reduced.

(13-3-5) Features of Modification Example of Third Embodiment

The air conditioner 1 is highly efficient and does not require an electrolytic capacitor on the output side of the matrix converter 129, and thus an increase in the size and cost of the circuit is suppressed.

(13-4) Others

13-4-1

As the compressor 100 of the air conditioner 1, any one of a scroll compressor, a rotary compressor, a turbo compressor, and a screw compressor is adopted.

13-4-2

The motor 70 of the compressor 100 is a permanent magnet synchronous motor having the rotor 71 including a permanent magnet.

(14) Embodiment of the Technique of Fourteenth Group

(14-1) Specific Embodiment

FIG. 16 is a configuration diagram of an air conditioner 1 according to a first embodiment of the present disclosure. In FIG. 14A, the air conditioner 1 is constituted by a utilization unit 2 and a heat source unit 3.

(14-1-1) Configuration of Air Conditioner 1

The air conditioner 1 has a refrigerant circuit 11 in which a compressor 100, a four-way switching valve 16, a heat-source-side heat exchanger 17, an expansion valve 18 serving as a decompression mechanism, and a utilization-side heat exchanger 13 are connected in a loop shape by refrigerant pipes.

In this embodiment, the refrigerant circuit 11 is filled with refrigerant for performing a vapor compression refrigeration cycle. The refrigerant is a refrigerant mixture containing 1,2-difluoroethylene, and any one of the above-described refrigerant A to refrigerant D can be used. The refrigerant circuit 11 is filled with refrigerating machine oil together with the refrigerant mixture.

(14-1-1-1) Utilization Unit 2

In the refrigerant circuit 11, the utilization-side heat exchanger 13 belongs to the utilization unit 2. In addition, a utilization-side fan 14 is mounted in the utilization unit 2. The utilization-side fan 14 generates an air flow to the utilization-side heat exchanger 13.

A utilization-side communicator 35 and a utilization-side microcomputer 41 are mounted in the utilization unit 2. The utilization-side communicator 35 is connected to the utilization-side microcomputer 41.

The utilization-side communicator 35 is used by the utilization unit 2 to communicate with the heat source unit 3. The utilization-side microcomputer 41 is supplied with a control voltage even during a standby state in which the air conditioner 1 is not operating. Thus, the utilization-side microcomputer 41 is constantly activated.

(14-1-1-2) Heat Source Unit 3

In the refrigerant circuit 11, the compressor 100, the four-way switching valve 16, the heat-source-side heat exchanger 17, and the expansion valve 18 belong to the heat source unit 3. In addition, a heat-source-side fan 19 is mounted in the heat source unit 3. The heat-source-side fan 19 generates an air flow to the heat-source-side heat exchanger 17.

In addition, a connection unit 30, a heat-source-side communicator 36, and a heat-source-side microcomputer 42 are mounted in the heat source unit 3. The connection unit 30 and the heat-source-side communicator 36 are connected to the heat-source-side microcomputer 42.

(14-1-2) Configuration of Connection Unit 30

FIG. 14B is an operation circuit diagram of a motor 70 of the compressor 100. In FIG. 14B, the connection unit 30 is a circuit that causes power to be supplied from an alternating-current (AC) power source 90 to the motor 70 of the compressor 100 without frequency conversion.

The motor 70 is an induction motor and includes a squirrel-cage rotor 71, and a stator 72 having a main winding 727 and an auxiliary winding 728. The squirrel-cage rotor 71 rotates following a rotating magnetic field generated by the stator 72.

The compressor 100 has an M terminal, an S terminal, and a C terminal. The M terminal and the C terminal are connected by the main winding 727. The S terminal and the C terminal are connected by the auxiliary winding 728.

The AC power source 90 and the compressor 100 are connected by power supply lines 901 and 902 that supply an AC voltage to the compressor 100. The power supply line 901 is connected to the C terminal via a thermostat 26.

The thermostat 26 detects a temperature of a room equipped with the air conditioner 1. The thermostat 26 opens the contact thereof when the room temperature is within a set temperature range and closes the contact when the room temperature is out of the set temperature range.

The power supply line 902 branches off into a first branch line 902A and a second branch line 902B. The first branch line 902A is connected to the M terminal, and the second branch line 902B is connected to the S terminal via an activation circuit 20.

The activation circuit 20 is a circuit in which a positive temperature coefficient (PTC) thermistor 21 and an operation capacitor 22 are connected in parallel to each other.

In this embodiment, the thermostat 26 connected to the power supply line 901 and the activation circuit 20 connected to the power supply line 902 are referred to as the connection unit 30.

(14-1-3) Operation

In the operation circuit of the compressor 100 having the above-described configuration, turning on of the AC power source 90 causes a current to flow through the auxiliary winding 728 via the PTC thermistor 21 and the motor 70 to be activated.

After the motor 70 has been activated, the PTC thermistor 21 self-heats by using the current flowing therethrough, and the resistance value thereof increases. As a result, the operation capacitor 22, instead of the PTC thermistor 21, is connected to the auxiliary winding 728, and the state shifts to a stable operation state.

(14-1-4) Features 14-1-4-1

In the air conditioner 1 that uses a refrigerant mixture containing at least 1,2-difluoroethylene, the compressor 100 can be driven without interposing a power conversion device between the AC power source 90 and the motor 70. Thus, it is possible to provide the air conditioner 1 that is environmentally friendly and has a relatively inexpensive configuration.

14-1-4-2

In the air conditioner 1 that uses a refrigerant mixture containing at least 1,2-difluoroethylene, the connection between the auxiliary winding 728 and the activation circuit 20, which is a parallel circuit of the PTC thermistor 21 and the operation capacitor 22, makes it possible to achieve a large activation torque of the motor 70 of the compressor 100.

After the compressor 100 has been activated, the PTC thermistor 21 self-heats and the resistance value thereof increases, the state changes to a state where the operation capacitor 22 and the auxiliary winding 728 are substantially connected to each other, and the compressor 100 is operated at a constant rotation rate (power source frequency). Thus, the compressor 100 enters a state of being capable of outputting a rated torque. As described above, in the air conditioner 1, switching of connection to the operation capacitor 22 is performed at appropriate timing, and thus the efficiency of the compressor 100 can be increased.

14-1-4-3

The motor 70 is an induction motor and is capable of high output with relatively low cost, and thus the efficiency of the air conditioner 1 can be increased.

(14-1-5) Modification Example

FIG. 14C is an operation circuit diagram of a motor 170 of a compressor 200 in the air conditioner 1 according to a modification example. In FIG. 14C, the motor 170 is a three-phase induction motor and is connected to a three-phase AC power source 190 via a connection unit 130.

The connection unit 130 is a relay having contacts 130*u*, 130*v*, and 130*w*. The contact 130*u* opens or closes a power supply line 903 between an R terminal of the three-phase AC power source 190 and a U-phase winding Lu of the motor 170. The contact 130*v* opens or closes a power supply line 904 between an S terminal of the three-phase AC power source 190 and a V-phase winding Lv of the motor 170. The contact 130*w* opens or closes a power supply line 905 between a T terminal of the three-phase AC power source 190 and a W-phase winding Lw of the motor 170.

AC voltages are supplied from the R terminal, the S terminal, and the T terminal of the three-phase AC power source 190 to the corresponding U-phase winding Lu, the V-phase winding Lv, and the W-phase winding Lw of the motor 170. The AC voltage supplied to the V-phase winding Lv of the motor 170 has a phase difference of 120 degrees with respect to the AC voltage supplied to the U-phase winding Lu. Also, the AC voltage supplied to the W-phase winding Lw of the motor 170 has a phase difference of 120 degrees with respect to the AC voltage supplied to the V-phase winding Lv.

Thus, only the supply of AC voltages from the three-phase AC power source 190 to the motor 170 causes a rotating magnetic field to be generated in the stator 172, and the rotor 171 rotates following the rotating magnetic field. As a result, the compressor 200 is operated at a constant rotation rate (power source frequency). Thus, the operation circuit of the motor 170 does not require the activation circuit 20 according to the foregoing embodiment, and only a relay circuit of the connection unit 130 is used.

(14-1-6) Features of Modification Example 14-1-6-1

In the air conditioner 1 that uses a refrigerant mixture containing at least 1,2-difluoroethylene, the compressor 200 can be driven without interposing a power conversion device between the three-phase AC power source 190 and the motor 170. Thus, it is possible to provide the air conditioner 1 that is environmentally friendly and has a relatively inexpensive configuration.

14-1-6-2

The motor 170 is an induction motor and is capable of high output with relatively low cost, and thus the efficiency of the air conditioner 1 can be increased.

(15) Embodiment of the Technique of Fifteenth Group

(15-1) First Embodiment

As illustrated in FIGS. 15A to 15C, a warm-water supply system 1 that is a warm-water generating apparatus according to a first embodiment includes a heat pump 2, a warm-water storage unit 3, a controller 50 that manages and controls the above-listed components, a remote controller 90 that displays information to a user and that receives an operation by the user, and so forth.

(15-1-1) Heat Pump

The heat pump 2 is a unit that functions as a heat source device for heating water, and includes a refrigerant circuit 20 in which a refrigerant circulates, a fan 24F, various sensors, and so forth. In the present embodiment, the refrigerant circuit 20 is filled with a refrigerant for performing a vapor compression refrigeration cycle. The refrigerant is a mixed refrigerant containing 1,2-difluoroethylene, and can use any one of the above-described refrigerants A to D.

The refrigerant circuit 20 is constituted of a compressor 21, a use-side water heat exchanger 22, an electric expansion valve 23, a heat-source-side air heat exchanger 24, a refrigerant pipe 25, and so forth.

The compressor 21 is an inverter output-variable electric compressor.

The water heat exchanger 22 functions as a use-side heat exchanger that uses heat of the refrigerant, and includes a refrigerant pipe 22*r* and a water pipe 32*w*. The water heat exchanger 22 causes a high-temperature high-pressure gas refrigerant flowing through the refrigerant pipe 22*r* after discharged by the compressor 21 of the heat pump 2 and circulating water flowing from the warm-water storage unit 3 (described later) and then flowing through the water pipe 32*w*. By the heat exchange in the water heat exchanger 22, the refrigerant passing through the refrigerant pipe 22*r* is cooled, and simultaneously the water passing through the water pipe 32*w* is heated and heated water (high-temperature water=warm water) is generated.

The electric expansion valve 23 expands a low-temperature high-pressure refrigerant which has exited from the compressor 21 and been cooled through the heat exchange with the water.

The air heat exchanger 24 functions as a heat-source-side heat exchanger that takes heat from the outside air, and causes a low-temperature low-pressure refrigerant in a two-phase state expanded at the electric expansion valve 23 and the outside air to exchange heat with each other. The refrigerant which has absorbed heat from the outside air is evaporated and turns into a low-pressure gas refrigerant, and is sucked by the compressor 21.

The refrigerant pipe 25 connects respective devices in the order of the discharge port of the compressor 21, the refrigerant pipe 22*r* in the water heat exchanger 22, the electric expansion valve 23, the air heat exchanger 24, and the suction port of the compressor 21.

The various sensors include, for example, sensors that detect the temperature and pressure relating to the refrigerant. FIG. 15B illustrates, among the sensors, a heat-exchanger inlet water temperature sensor 31T and a heat-exchanger outlet water temperature sensor 32T. The heat-exchanger inlet water temperature sensor 31T detects the temperature of water before entering the water heat exchanger 22. That is, the heat-exchanger inlet water temperature sensor 31T detects the temperature of water before passing through the water heat exchanger 22. The heat-exchanger outlet water temperature sensor 32T detects the temperature of water after passing through the water heat exchanger 22.

(15-1-2) Warm-Water Storage Unit

The warm-water storage unit 3 is a unit that sends water supplied from the outside, such as city water (tap water) to the heat pump 2 so that the heat pump 2 heats the water, and stores the water (heated water) returned from the heat pump 2. Moreover, the warm-water storage unit 3 has a function of sending the heated water of which the temperature has been adjusted by a combustion heating device 4 and a mixing valve 77 to a warm-water supply section 82 so that heated water at a temperature set by the user is supplied.

The warm-water storage unit 3 includes a water intake section 81, the warm-water supply section 82, a warm-water supply tank 35, a circulating water pipe 30, a water-intake warm-water supply pipe 70, the combustion heating device 4, and so forth.

(15-1-2-1) Water Intake Section and Warm-Water Supply Section

The water intake section 81 has a connecting port to which a city-water (tap-water) supply pipe 89*a* is connected.

The warm-water supply section 82 has a connecting port to which an in-building pipe 99*a* for water supply and warm-water supply extending from a faucet 99 or the like in a building of an installation target is connected.

(15-1-2-2) Warm-Water Storage Tank

The warm-water storage tank 35 is a tank in which water heated by the heat pump 2 (heated water) is stored in advance before the user turns the faucet 99 for use. The warm-water storage tank 35 is usually filled with water. The warm-water storage tank 35 is provided with a tank-temperature-distribution detection sensor to cause the controller 50 to recognize the amount of water at a predetermined temperature or higher, in this case, a high temperature of 70° C. or higher (hereinafter, referred to as high-temperature water). The tank-temperature-distribution detection sensor is constituted of six sensors of a first sensor T1, a second sensor T2, a third sensor T3, a fourth sensor T4, a fifth sensor T5, and a sixth sensor T6 in that order from a lower portion toward an upper portion of the warm-water storage tank 35. The controller 50 drives the heat pump 2 to perform a boiling operation based on water temperatures at respective height positions in the warm-water storage tank 35 detected by the tank-temperature-distribution detection sensors T1 to T6 and setting with the remote controller 90. The boiling operation is an operation to increase the heat quantity of water until the temperature of water in the warm-water storage tank 35 reaches a target temperature. The target temperature in the boiling operation, that is, a target warm-water storage temperature of the water in the warm-water storage tank 35 is, for example, set in advance in a manufacturing plant of the warm-water supply system 1. In the present embodiment, the target warm-water storage temperature is 75° C.

If the temperature detection value of the sixth sensor T6 is lower than 70° C., the residual warm water amount is 0. If the temperature detection value of the sixth sensor T6 is 70° C. or higher, the residual warm water amount is 1. Furthermore, if the temperature detection value of the fifth sensor T5 is also 70° C. or higher, the residual warm water amount is 2. Likewise, the levels of the residual warm water amount includes 3, 4, 5, and 6. The residual warm water amount is 6 at maximum if the temperature detection value of the first sensor T1 is also 70° C. or higher, the residual warm water amount is 6 at maximum.

(15-1-2-3) Circulating Water Pipe

The circulating water pipe 30 is a circuit for transferring heat obtained by the heat pump 2 to the water in the warm-water storage tank 35, and includes an outgoing pipe 31, the water pipe 32*w* in the water heat exchanger 22, a return pipe 33, and a circulation pump 34. The outgoing pipe 31 connects a portion near the lower end of the warm-water storage tank 35 and the upstream-side end of the water pipe 32*w* in the water heat exchanger 22. The return pipe 33 connects the downstream-side end of the water pipe 32*w* in the water heat exchanger 22 and a portion near the upper end of the warm-water storage tank 35. The circulation pump 34 is provided midway in the outgoing pipe 31. The circulation pump 34 is an electric pump of which the output is adjustable, and circulates water between the warm-water storage tank 35 and the water heat exchanger 22. Specifically, in the circulating water pipe 30, when the circulation pump 34 is driven in response to an instruction from the controller 50, water at low temperature present in a lower portion of the water in the warm-water storage tank 35 flows out to the outgoing pipe 31, increases in temperature by passing through the water pipe 32*w* in the water heat exchanger 22, and returns to the portion near the upper end of the warm-water storage tank 35 via the return pipe 33. Accordingly, the boundary between high-temperature water and water at a lower temperature in the warm-water storage tank 35 moves from the upper side toward the lower side, and hence the amount of the high-temperature water in the warm-water storage tank 35 increases.

(15-1-2-4) Water-Intake Warm-Water Supply Pipe and Combustion Heating Device

The water-intake warm-water supply pipe 70 is a circuit for using the high-temperature water stored in the warm-water storage tank 35 while receiving supply with water from external city water or the like, and includes a water intake pipe 71, a warm-water supply pipe 73, a bypass pipe 74, and the mixing valve 77.

The water intake pipe 71 receives supply with water from the external city water or the like, supplies normal-temperature water to a portion near the lower end of the warm-water storage tank 35. The water intake pipe 71 is provided with a water-intake temperature sensor 71T for detecting the temperature of the water supplied by the city water.

The warm-water supply pipe 73 guides high-temperature water which is included in the water stored in the warm-water storage tank 35 and which is present near the upper end, from the warm-water supply section 82 to an in-building pipe 99*a* through a portion to be used by a user, for example, the faucet 99 in the building.

The combustion heating device 4 is disposed midway in the warm-water supply pipe 73. The combustion heating device 4 is disposed between the warm-water storage tank 35 and the mixing valve 77, and includes a combustion burner 41 that burns a fuel gas. The combustion burner 41 is a gas burner of which the heating capacity is adjustable, and heats water flowing through the warm-water supply pipe 73 while adjusting the heating quantity in response to an instruction of the controller 50.

Moreover, a before-mixing warm-water temperature sensor 4T for detecting the temperature of the passing water is provided between the combustion heating device 4 and the mixing valve 77 in the warm-water supply pipe 73.

The bypass pipe 74 is a pipe for mixing normal-temperature water flowing through the water intake pipe 71 with water (warm water) flowing through the warm-water supply pipe 73. The bypass pipe 74 extends from the water intake pipe 71 to the warm-water supply pipe 73 and is connected to the warm-water supply pipe 73 via the mixing valve 77.

The mixing valve 77 is an adjustment valve that receives an instruction from the controller 50 and adjusts the mixing ratio of the high-temperature water (warm water) flowing through the warm-water supply pipe 73 and the normal-temperature water flowing through the bypass pipe 74.

(15-1-3) Controller and Remote Controller

The controller 50 is installed in the warm-water storage unit 3, is connected to actuators, such as the compressor 21, the electric expansion valve 23, the fan 24F, the mixing valve 77, the combustion burner 41, and the circulation pump 34, and sends operation instructions to the actuators. Moreover, the controller 50 is connected to sensors, such as the heat-exchanger inlet water temperature sensor 31T, the heat-exchanger outlet water temperature sensor 32T, the tank-temperature-distribution detection sensors T1 to T6, the water-intake temperature sensor 71T, and the before-mixing warm-water temperature sensor 4T, and acquires detection results from the sensors. Furthermore, the remote controller 90 is connected to the controller 50. The remote controller 90 receives a setting input from the user and provides information to the user.

As illustrated in FIG. 15C, the remote controller 90 is provided with a warm-water temperature setting section 91 for setting the temperature of required warm water (water), and a display section 92 that displays the set warm-water temperature and the amount of residual warm water.

(15-1-4) Characteristics of Warm-Water Supply System

In the warm-water supply system 1 according to the present embodiment, since the water heat exchanger 22 heats water using one of the above-described refrigerants A to D, efficiency is high. When the water to be supplied is hard water, a scale may be disadvantageously generated. However, when the water to be supplied is soft water, it is advantageous to employ the warm-water supply system 1 according to the present embodiment.

(15-1-5) First Modification of First Embodiment

Employing a warm-water supply system 1*a* illustrated in FIG. 15D instead of the warm-water supply system 1 according to the first embodiment can suppress the disadvantage of generation of a scale. In the warm-water supply system 1*a* in FIG. 15D, a heat pump 2*a* includes an auxiliary circulating water pipe 60 that is not included in the heat pump 2 of the first embodiment. The auxiliary circulating water pipe 60 is provided with an auxiliary circulation pump 64. The water in the auxiliary circulating water pipe 60 takes heat from the refrigerant in the water heat exchanger 22, and radiates heat to the water flowing through the main circulating water pipe 30 in the auxiliary water heat exchanger 62. The main water heat exchanger 22 is a heat exchanger that performs heat exchange between a refrigerant and water. The auxiliary water heat exchanger 62 is a heat exchanger that performs heat exchange between water and water.

In the warm-water supply system 1*a* illustrated in FIG. 15D, the high-temperature gas refrigerant discharged from the compressor 21 of the heat pump 2*a* heats, in the auxiliary water heat exchanger 62, the water flowing through the auxiliary circulating water pipe 60; and the heated water heats, in the auxiliary water heat exchanger 62, the water flowing through the main circulating water pipe 30. The flow path of water constituted by the auxiliary circulating water pipe 60 is a closed loop, and a scale is almost not generated in the closed loop.

(15-1-6) Second Modification of First Embodiment

Employing a warm-water supply system 1*b* illustrated in FIG. 15E instead of the warm-water supply system 1 according to the first embodiment can suppress the disadvantage of generation of a scale. In the warm-water supply system 1*b* in FIG. 15E, a warm-water storage unit 3*b* includes a heat exchange section 38 that is not included in the warm-water storage unit 3 of the first embodiment. The heat exchange section 38 is a portion of a circulating water pipe 30*b* and is disposed in the warm-water storage tank 35. In the warm-water supply system 1 according to the first embodiment, water flows out from a lower portion of the warm-water storage tank 35 to the circulating water pipe 30, and the heated water returns to a portion near the upper end of the warm-water storage tank 35. In contrast, in the warm-water supply system 1*b* illustrated in FIG. 15E, the water in the warm-water storage tank 35 is boiled using the heated water flowing through the circulating water pipe 30*b* constituting the closed loop. The water in the warm-water storage tank 35 takes heat from the warm water flowing through the heat exchange section 38, and hence the temperature thereof increases.

In the warm-water supply system 1*b* illustrated in FIG. 15E, the flow path of water constituted by the circulating water pipe 30*b* is a closed loop, and a scale is almost not generated in the closed loop.

Moreover, a heat pump 2*b* of the warm-water supply system 1*b* illustrated in FIG. 15E includes, in addition to the water heat exchanger 22 that functions as a use-side heat exchanger, a use-side water heat exchanger 22*a* having a function similar to the water heat exchanger 22. The water heat exchanger 22*a* is disposed on the upstream side of the flow of the refrigerant of the water heat exchanger 22, and heats the water flowing through a water circulation flow path 190. The water circulation flow path 190 is a closed loop flow path that connects a heat exchanger 192 disposed under a floor for floor heating and the water heat exchanger 22*a* of the heat pump 2*b*. The water circulation flow path 190 is provided with a pump 194. The water which has taken heat from and been heated by the high-temperature mixed refrigerant discharged from the compressor 21 in the water heat exchanger 22*a* is sent to the heat exchanger 192 under the floor by driving of the pump 194. The water which has radiated heat in the heat exchanger 192 and performed floor heating passes through the water circulation flow path 190 and flows into the water heat exchanger 22*a* again.

In this case, the heat pump 2*b* contributes to warm-water supply by heating the water in the warm-water storage tank 35, and also serves as a heat source of floor heating.

(15-2) Second Embodiment (15-2-1) Major Configuration of Warm-Water Circulation Heating System FIGS. 15F to 15H illustrate a configuration of a warm-water circulation heating system that is a warm-water generating apparatus according to a second embodiment. The warm-water circulation heating system performs heating by circulating warm water in a building and has a warm-water supply function. The warm-water circulation heating system includes a tank 240 that stores warm water, in-room radiators 261*a* and 262*a*, in-toilet radiators 269*b*, 269*c*, and 269*e*, an indoor heating circulation pump 251, a vapor compression heat pump 210 for heating warm water, a warm-water heating circulation pump 225, a warm-water supply heat exchanger 241*a*, a heated-water spray device 275, and a control unit 220.

The in-room radiators 261*a* and 262*a* are disposed in rooms 261 and 262 in the building, and radiate heat held by the warm water to the indoor airs in the rooms 261 and 262.

The in-toilet radiators 269*b*, 269*c*, and 269*e* are disposed in a toilet 269 in the building, and radiate heat held by the warm water in the toilet 269.

The indoor heating circulation pump 251 causes the warm water to flow from the tank 240 to the in-room radiators 261*a* and 262*a* and the in-toilet radiators 269*b*, 269*c*, and 269*e*, and causes the warm water which has radiated heat in the in-room radiators 261*a* and 262*a* and the in-toilet radiators 269*b*, 269*c*, and 269*e* to return to the tank 240 again. The warm water which has exited from the tank 240 flows through the in-room radiators 261*a* and 262*a*, then flows through the in-toilet radiators 269*b*, 269*c*, and 269*e*, and returns to the tank 240.

The heat pump 210 includes a refrigerant circuit having a compressor 211, a radiator 212, an expansion valve 213, and an evaporator 214, takes heat from the outside air by the evaporator 214, and radiates heat from the radiator 212, thereby heating the warm water flowing from the tank 240. In the present embodiment, the refrigerant circuit is filled with a refrigerant for performing a vapor compression refrigeration cycle. The refrigerant is a mixed refrigerant containing 1,2-difluoroethylene, and can use any one of the above-described refrigerants A to D.

The warm-water heating circulation pump 225 causes the warm water from the tank 240 to the radiator 212 of the heat pump 210, and causes the warm water to return from the radiator 212 of the heat pump 210 to the tank 240 again.

The warm-water supply heat exchanger 241*a* is disposed in the tank 240, causes the water taken in from a water supply source and the warm water in the tank 240 to exchange heat with each other to heat water, and supplies the heated water to a warm-water supply pipe 272 in the building. The water which is heated in the warm-water supply heat exchanger 241*a* and which is supplied to the warm-water supply pipe 272 is hereinafter referred to as heated water. Note that the water which is taken in from the water supply source and supplied to the warm-water supply pipe 272 is not mixed with the warm water in the tank 240.

Reference sign 241 in FIG. 15F denotes a flow path of the water flowing from the water supply source to the warm-water supply pipe 272.

The heated-water spray device 275 is a device that sprays the heated water which is supplied from the warm-water supply heat exchanger 241*a* to the warm-water supply pipe 272, onto the outer surface of the evaporator 214 of the heat pump 210.

Note that the warm water which is stored in the tank 240 and which circulates through the closed loop by the indoor heating circulation pump 251 and the warm-water heating circulation pump 225 uses normal water; however, may be a liquid and does not have to be water ($H_2O$). If there is a liquid which can decrease the powers of the indoor heating circulation pump 251 and the warm-water heating circulation pump 225 and which can decrease the sizes of the pipes 252, 231, and so forth, serving as a circulation route to be smaller than that for water ($H_2O$), the liquid is preferably used.

(15-2-2) Overview Operation of Warm-Water Circulation Heating System

In the warm-water circulation heating system, actuation of the warm-water heating circulation pump 225 causes the warm water flowing from the tank 240 to the radiator 212 of the heat pump 210 to be heated using heat radiated from the radiator 212 by actuation of the heat pump 210. Accordingly, the high-temperature warm water is returned from the heat pump 210 to the tank 240. In contrast, the warm water in the tank 240 is sent to the in-room radiators 261*a* and 262*a* in the rooms 261 and 262 and to the in-toilet radiators 269*b*, 269*c*, and 269*e* in the toilet 269 by actuation of the indoor heating circulation pump 251. The heat of the warm water shifts to the indoor airs in the rooms 261 and 262 and to the vicinity of the in-toilet radiators 269*b*, 269*c*, and 269*e*, thereby heating the rooms 261 and 262, and heating wash water in a toilet tank 269*a*, a toilet seat 269*d*, and the like, in the toilet 269. The warm water of which the temperature has decreased to about 10° C. to 20° C. is returned to the tank 240 again. The warm water whose temperature has decreased turns into high-temperature water again by actuation of the heat pump 210.

As described above, in this case, a first loop for circulation through the tank 240 and the heat pump 210 connected by a pipe 231, and a second loop for circulation through the tank 240, the in-room radiators 261*a* and 262*a*, and the in-toilet radiators 269*b*, 269*c*, and 269*e* connected by a pipe 252 are formed. The warm water circulates through the loops. Thus, the heat collected from the outside by actuation of the heat pump 210 and the heat generated by actuation of the compressor 211 finally shift to the indoor airs in the rooms 261 and 262 and the respective sections of the toilet 269 via the warm water stored in the tank 240.

Moreover, the warm-water supply heat exchanger 241*a* is disposed in the tank 240, the water taken in from the supply water source takes heat from the warm water in the tank 24 when passing through the warm-water supply heat exchanger 241*a* and turns into the heated water, and the heated water flows to the warm-water supply pipe 272 in the building. The heated water flowing to the warm-water supply pipe 272 is to be used for a shower 273 and in a bathtub 274. Furthermore, part of the heated water which has flowed to the warm-water supply pipe 272 is sprayed onto the outer surface of the evaporator 214 of the heat pump 210 by the heated-water spray device 275. The spray is periodically performed under a predetermined condition that a frost is generated on the evaporator 214 of the heat pump 210.

(15-2-3) Detailed Configuration of Control Unit 220

As illustrated in FIGS. 15F and 15, an overall controller 229 controls devices belonging to the heat pump 210 and devices belonging to the tank 240 based on signals input from the outside. The overall controller 229 is accommodated in a casing together with three-way valves 221 and 222 and the warm-water heating circulation pump 225 to form one control unit 220 (see FIG. 15F).

The three-way valves 221 and 222 are provided to adjust from which portion in the height direction of the tank 240 the warm water is to be drawn and sent to the in-room radiators 261*a* and 262*a*, and to which portion in the height direction of the tank 240 the low-temperature warm water returned from the in-toilet radiators 269*b*, 269*c*, and 269*e* is returned. The three-way valves 221 and 222 are actuated in response to instructions from the overall controller 229.

The overall controller 229 controls, in addition to the three-way valves 221 and 222, a booster heater 242, a heat-pump control unit 219, the indoor heating circulation pump 251, the warm-water heating circulation pump 225, warm-water flow-rate adjustment valves 253 to 255, a defrost valve 277, and so forth. Moreover, the overall controller 229 receives signals of measurement results from a heating warm-water outgoing temperature sensor 252*a*, a heating warm-water return temperature sensor 252*b*, temperature sensors 240*a* to 240*e* of the tank 240, a water supply pipe temperature sensor 271*a*, a warm-water supply pipe temperature sensor 272*a*, and so forth; and receives information on the indoor temperature and the indoor set temperature from a remote controller/thermostat 291 disposed in the rooms 261 and 262, and so forth.

(15-2-4) Characteristics of Warm-Water Circulation Heating System

In the warm-water circulation heating system according to the second embodiment, since the radiator 212 of the heat pump 210 heats water using one of the above-described refrigerants A to D, efficiency is high. Moreover, the water to be heated by the radiator 212 of the heat pump 210 is stored in the tank 240 and circulates through the closed loop by the indoor heating circulation pump 251 and the warm-water heating circulation pump 225. In other words, the water which is heated by the radiator 212 of the heat pump 210 is not mixed with the water which is taken in from the water supply source and supplied to the warm-water supply pipe 272. Thus, an excessive scale is not generated by heating of water by the radiator 212 of the heat pump 210.

(15-2-5) First Modification of Second Embodiment

In the warm-water circulation heating system according to the second embodiment, the warm-water heat exchanger 241*a* disposed in the tank 240 heats the water taken in from the water supply source to generate heated water for warm-water supply; however, as illustrated in FIG. 15J, a water heat exchanger 112 may generate heated water. In the warm-water circulation heating system illustrated in FIG. 15J, a water circulation flow path 110 and a pump 115 constituting a third loop are provided, warm water is taken out from an upper portion of the tank 240, the warm water passes through the water heat exchanger 112, and then the warm water from which heat is radiated is returned to a lower portion of the tank 240. In the water heat exchanger 112, the water taken in from the water supply source is heated by heat radiated from the warm water flowing from the tank 240, the water becomes heated water for warm-water supply, and the heated water flows to the warm-water supply pipe 272. Reference sign 118 in FIG. 15J denotes a flow path of water flowing from the water supply source to the warm-water supply pipe 272.

(15-2-6) Second Modification of Second Embodiment

In the warm-water circulation heating system according to the second embodiment, the warm water is fed from the lower portion of the tank 240 to the radiator 212 of the heat pump 210, and the warm water is returned from the radiator 212 of the heat pump 210 to the upper portion of the tank 240 again by the warm-water heating circulation pump 225. However, as illustrated in FIG. 15K, the radiator 212 may be omitted, a refrigerant circulation flow path 217 that guides a high-temperature high-pressure mixed refrigerant discharged from the compressor 211 to the inside of the tank 240 may be provided, and the water in the tank 240 may be heated by a heat exchanger 216 disposed in the tank 240. In the warm-water circulation heating system illustrated in FIG. 15K, the heat exchanger 216 in the tank 240 is disposed near a warm-water supply heat exchanger 241*a*. The high-temperature refrigerant which has flowed through the refrigerant circulation flow path 217 radiates heat to the water in the tank 240 in the heat exchanger 216, is condensed and turns into a low-temperature high-pressure refrigerant in a liquid phase, and is returned to a unit of the heat pump 210. The liquid refrigerant returned to the unit of the heat pump 210 is decompressed at the expansion valve 213, flows into the evaporator 214, and takes heat from the outside air to be evaporated. Then, the mixed refrigerant is compressed in the compressor 211 again and turns into a high-temperature high-pressure mixed refrigerant. The water in the tank 240 heated by the heat exchanger 216 heats the water flowing through the warm-water supply heat exchanger 241*a* that is adjacent to the heat exchanger 216. Moreover, the heat of the refrigerant is transferred to the warm-water supply heat exchanger 241*a* also by radiation from the heat exchanger 216. The water taken in from the water supply source and flowing through the warm-water supply heat exchanger 241*a* takes heat from the heat exchanger 216 via the water in the tank 240, takes heat from the heat exchanger 216 also by radiation, and hence the water becomes heated water.

In the warm-water circulation heating system illustrated in FIG. 15K, the water in the tank 240 is separated from the water flowing from the water supply source to the warm-water supply pipe 272 (water flowing through a flow path 241). Even when the heat exchanger 216 in the tank 240 that functions as the condenser of the mixed refrigerant rapidly heats the water, the amount of generation of a scale is less.

(15-3) Third Embodiment

FIG. 15L is a schematic configuration diagram of a warm-water supply system 310 serving as a warm-water generating apparatus according to a third embodiment. The warm-water supply system 310 is warm-water supply equipment used in a large-size facility, such as a hospital, a sport facility, or the like. As illustrated in FIG. 15L, the warm-water supply system 310 mainly includes a water receiving tank 320, a heat source unit 330, a warm-water storage tank 340, a warm-water use section 350, a control section 360, a water supply line 312, a warm-water exit line 314, and a warm-water circulation path 316. The water supply line 312 is a pipe that connects the water receiving tank 320 and the heat source unit 330. The warm-water exit line 314 is a pipe that connects the heat source unit 330 and the warm-water storage tank 340 to each other. The warm-water circulation path 316 is a pipe that connects the warm-water storage tank 340 and the warm-water use section 350 to each other. In FIG. 15L, arrows along the water supply line 312, the warm-water exit line 314, and the warm-water circulation path 316 represent directions in which water or warm water flows. Next, the water receiving tank 320, the heat source unit 330, the warm-water storage tank 340, the warm-water use section 350, and the control section 360 are described.

(15-3-1) Water Receiving Tank

The water receiving tank 320 is a tank for storing water to be used by the warm-water supply system 310. The water receiving tank 320 is connected to a water supply or the like. The water receiving tank 320 supplies water to the heat source unit 330 via the water supply line 312. The water-supply pressure of the water receiving tank 320 is 40 kPa to 500 kPa.

(15-3-2) Heat Source Unit

The heat source unit 330 is installed outside a room. The heat source unit 330 receives a supply with water from the water receiving tank 320 via the water supply line 312. The heat source unit 330 heats the water taken in from the water supply line 312. The heat source unit 330 sends warm water which is heated water to the warm-water storage tank 340 via the warm-water exit line 314.

FIG. 15M is a schematic configuration diagram of the heat source unit 330. FIG. 15N is a block diagram of the warm-water supply system 310. As illustrated in FIGS. 15M and 15N, the heat source unit 330 mainly includes a water flow path 331, a water supply pump 332, a second heat exchanger 333, a refrigerant circulation flow path 334, a compressor 335, an expansion valve 336, a first heat exchanger 337, and a warm-water exit temperature sensor 338. The water flow path 331 is connected to the water supply pump 332 and the second heat exchanger 333. The refrigerant circulation flow path 334 is connected to the compressor 335, the expansion valve 336, and the first heat exchanger 337. In FIG. 15M, arrows along the water flow path 331 and the refrigerant circulation flow path 334 represent directions in which the water or the refrigerant flows. Next, respective components of the heat source unit 330 are described.

(15-3-2-1) Water Flow Path

The water flow path 331 is a pipe through which the water taken in from the water supply line 312 flows. The water flow path 331 is constituted of a first water pipe 331*a*, a second water pipe 331*b*, and a third water pipe 331*c*. The first water pipe 331*a* is connected to the water supply line 312 and is also connected to the suction port of the water supply pump 332. The second water pipe 331*b* is connected to the discharge port of the water supply pump 332 and is also connected to a water pipe 333*a* of the second heat exchanger 333. The third water pipe 331*c* is connected to the water pipe 333*a* of the second heat exchanger 333 and is also connected to the warm-water exit line 314. The third water pipe 331*c* is provided with the warm-water exit temperature sensor 338 for measuring the temperature of the water flowing through the third water pipe 331*c*, at a position near the connection portion with respect to the warm-water exit line 314.

(15-3-2-2) Warm-Water Supply Pump

The water supply pump 332 is a capacity variable pump, and hence can adjust the amount of water flowing through the water flow path 331. The water flowing through the water flow path 331 is supplied from the water supply line 312, passes through the water supply pump 332 and the second heat exchanger 333, and is supplied to the warm-water exit line 314.

(15-3-2-3) Second Heat Exchanger

The second heat exchanger 333 includes the water pipe 333*a* through which the water flowing through the water flow path 331 passes, and a refrigerant pipe 333*b* through which the refrigerant flowing through the refrigerant circulation flow path 334 passes. The second heat exchanger 333 is, for example, a tornado heat exchanger having a configuration in which the refrigerant pipe 333*b* is wound around the outer periphery of the water pipe 333*a* in a helical form and a groove is formed in the water pipe 333*a*. In the second heat exchanger 333, low-temperature water flowing through the water pipe 333*a* and a high-temperature high-pressure refrigerant flowing through the refrigerant pipe 333*b* exchange heat with each other. The low-temperature water flowing through the water pipe 333*a* of the second heat exchanger 333 exchanges heat with the high-temperature refrigerant flowing through the refrigerant pipe 333*b* of the second heat exchanger 333 and hence is heated. Accordingly, the water supplied from the water supply line 312 is heated in the second heat exchanger 333, and is supplied as warm water to the warm-water exit line 314.

(15-3-2-4) Refrigerant Circulation Flow Path

The refrigerant circulation flow path 334 is a pipe through which the refrigerant circulates, heat of the refrigerant being exchanged with heat of the water in the second heat exchanger 333. In the present embodiment, the refrigerant circulation flow path 334 is filled with a refrigerant for performing a vapor compression refrigeration cycle. The refrigerant is a mixed refrigerant containing 1,2-difluoroethylene, and can use any one of the above-described refrigerants A to D.

As illustrated in FIG. 15M, the refrigerant circulation flow path 334 couples the discharge port of the compressor 335 and the refrigerant pipe 333*b* of the second heat exchanger 333 to each other, couples the refrigerant pipe 333*b* of the second heat exchanger 333 and the expansion valve 336 to each other, couples the expansion valve 336 and the first heat exchanger 337 to each other, and couples the first heat exchanger 337 and the suction port of the compressor 335 to each other. The second heat exchanger 333 has a function as a condenser in a refrigeration cycle. The first heat exchanger 337 has a function as an evaporator in the refrigeration cycle.

(15-3-2-5) Compressor

The compressor 335 is a capacity variable inverter compressor. The compressor 335 sucks and compresses the low-pressure gas refrigerant flowing through the refrigerant circulation flow path 334. The high-temperature high-pressure gas refrigerant compressed in the compressor 335 is discharged from the compressor 335, and sent to the refrigerant pipe 333*b* of the second heat exchanger 333. In the second heat exchanger 333, the high-temperature high-pressure gas refrigerant flowing through the refrigerant pipe 333*b* of the second heat exchanger 333 exchanges heat with the low-temperature water flowing through the water pipe 333*a* of the second heat exchanger 333. Thus, in the second heat exchanger 333, the high-temperature high-pressure gas refrigerant is condensed and turns into a high-pressure liquid refrigerant.

(15-3-2-6) Expansion Valve

The expansion valve 336 is an electric valve for adjusting the pressure and the flow rate of the refrigerant flowing through the refrigerant circulation flow path 334. The high-pressure liquid refrigerant which has exchanged heat in the refrigerant pipe 333*b* of the second heat exchanger 333 is decompressed by passing through the expansion valve 336, and turns into a low-pressure refrigerant in a gas-liquid two-phase state.

(15-3-2-7) First Heat Exchanger

The first heat exchanger 337 is, for example, a plate fin-and-coil heat exchanger. A fan 337*a* is provided near the first heat exchanger 337. The fan 337*a* sends the outside air to the first heat exchanger 337, and discharges the outside air which has exchanged heat with the refrigerant in the first heat exchanger 337. In the first heat exchanger 337, the low-pressure refrigerant in a gas-liquid two-phase state decompressed at the expansion valve 336 is evaporated through heat exchange with the outside air supplied by the fan 337*a* and turns into a low-pressure gas refrigerant. The low-pressure gas refrigerant which has passed through the first heat exchanger 337 is sent to the compressor 335.

(15-3-2-8) Warm-Water Exit Temperature Sensor

The warm-water exit temperature sensor 338 is a temperature sensor that is attached to the third water pipe 331*c*, at a position near the connection portion between the third water pipe 331*c* of the water flow path 331 and the warm-water exit line 314. The warm-water exit temperature sensor 338 measures the temperature of the water heated in the second heat exchanger 333 and flowing through the third water pipe 331*c*. That is, the warm-water exit temperature sensor 338 measures the temperature of the warm water supplied by the heat source unit 330.

(15-3-3) Warm-Water Storage Tank

The warm-water storage tank 340 is an open warm-water storage tank for storing the warm water supplied from the heat source unit 330 via the warm-water exit line 314. The warm-water storage tank 340 is, for example, a tank made of stainless steel and a tank made of FRP. The warm water stored in the warm-water storage tank 340 is supplied to the warm-water use section 350 via the warm-water circulation path 316. As illustrated in FIG. 15L, the warm-water circulation path 316 is constituted of a first warm-water pipe 316*a* and a second warm-water pipe 316*b*. The warm-water storage tank 340 supplies the warm water stored therein to the first warm-water pipe 316*a*, and sends the warm water to the warm-water use section 350 via the first warm-water pipe 316*a*. The warm water which has not been used in the warm-water use section 350 is returned to the warm-water storage tank 340 via the second warm-water pipe 316*b*. That is, part of the warm water stored in the warm-water storage tank 340 flows through the first warm-water pipe 316*a* and the second warm-water pipe 316*b*, and is returned to the warm-water storage tank 340 again.

Note that, as illustrated in FIG. 15L, a warm-water supply pump 351 is attached to the first warm-water pipe 316*a*. The warm-water supply pump 351 is a pressure pump for sending the warm water stored in the warm-water storage tank 340 to the warm-water use section 350. The warm-water supply pump 351 is a capacity variable pump, and hence can adjust the amount of warm water to be sent to the warm-water use section 350.

As illustrated in FIG. 15N, the warm-water storage tank 340 mainly includes a heat retaining heater 341, a water-pressure sensor 342, a float switch 343, and a warm-water storage temperature sensor 344. Next, respective components of the warm-water storage tank 340 are described.

(15-3-3-1) Keep-Warm Heater

The heat retaining heater 341 is a heater attached to the inside of the warm-water storage tank 340 to retain the temperature of the warm water stored in the warm-water storage tank 340 at a temperature at which the warm water can be used as warm water in the warm-water use section 350 or higher. The warm-water storage tank 340 performs a heat retaining operation on the warm water stored therein using the heat retaining heater 341.

(15-3-3-2) Water-Pressure Sensor

The water-pressure sensor 342 is a sensor for measuring the residual amount of the warm water stored in the warm-water storage tank 340. The water-pressure sensor 342 is attached to a lower portion of the inside of the warm-water storage tank 340 and detects the water pressure due to the warm water in the warm-water storage tank 340, to calculate the residual amount and the water level of the warm water stored in the warm-water storage tank 340. The water-pressure sensor 342 can detect, for example, whether the residual amount of the warm water stored in the warm-water storage tank 340 is less than a target residual warm water amount which is previously set.

(15-3-3-3) Float Switch

The float switch 343 auxiliary detects the residual amount of the warm water stored in the warm-water storage tank 340 using a float that moves up and down in accordance with the water level of the warm water stored in the warm-water storage tank 340.

(15-3-3-4) Warm-Water Storage Temperature Sensor

The warm-water storage temperature sensor 344 is a temperature sensor that is installed in the warm-water storage tank 340, at a position near the connection portion between the first warm-water pipe 316*a* of the warm-water circulation path 316 and the warm-water storage tank 340. The warm-water storage temperature sensor 344 measures the temperature of the warm water stored in the warm-water storage tank 340.

(15-3-4) Warm-Water Use Section

The warm-water use section 350 indicates places, such as a kitchen, a shower, a pool, and so forth, where the warm water stored in the warm water tank 340 is to be used. The warm water stored in the warm-water storage tank 340 is supplied to the warm-water use section 350 by the warm-water supply pump 351 via the first warm-water pipe 316*a* of the warm-water circulation path 316. The warm-water use section 350 may not use all the warm water supplied via the first warm-water pipe 316*a*. The warm water which has not been used in the warm-water use section 350 is returned to the warm-water storage tank 340 via the second warm-water pipe 316*b* of the warm-water circulation path 316.

(15-3-5) Control Unit

As illustrated in FIG. 15N, the control section 360 is connected to a component of the warm-water supply system 310. Specifically, the control section 360 is connected to the water supply pump 332, the compressor 335, the expansion valve 336, the fan 337*a*, the warm-water exit temperature sensor 338, the heat retaining heater 341, the water-pressure sensor 342, the float switch 343, the warm-water storage temperature sensor 344, and the warm-water supply pump 351. The control section 360 is installed in, for example, an electric component unit (not illustrated) in the heat source unit 330.

The control section 360 is a computer for controlling the components of the warm-water supply system 310. For example, the control section 360 controls the number of revolutions of the water supply pump 332, the operating frequency of the compressor 335, the opening degree of the expansion valve 336, the number of revolutions of the fan 337*a*, the power consumption of the heat retaining heater 341, and the number of revolutions of the warm-water supply pump 351; and acquires measurement values of the warm-water exit temperature sensor 338, the water-pressure sensor 342, the float switch 343, and the warm-water storage temperature sensor 344.

Moreover, as illustrated in FIG. 15N, the control section 360 is connected to a remote controller 370. The remote controller 370 is a device for controlling the warm-water supply system 310.

(15-3-6) Characteristics of Warm-Water Supply System

In the warm-water supply system according to the third embodiment, since the second heat exchanger 333 of the heat source unit 330 heats water using one of the above-described refrigerants A to D, efficiency is high.

(16) Embodiment of the Technique of Sixteenth Group (16-1) First Embodiment

In a first embodiment, an air conditioning apparatus 10 that is an example of a refrigeration cycle apparatus is described. The refrigeration cycle apparatus represents any of all apparatuses that are operated with refrigeration cycles. The refrigeration cycle apparatuses include an air conditioner, a dehumidifier, a heat pump warm-water supply apparatus, a refrigerator, a refrigeration apparatus for freezing, a cooling apparatus for manufacturing process, and so forth.

The air conditioning apparatus 10 is a separate air conditioning apparatus including an outdoor unit (not illustrated) and an indoor unit (not illustrated) and configured to switch the operation between cooling operation and heating operation.

As illustrated in FIG. 16A, the air conditioning apparatus 10 includes a refrigerant circuit 20 that performs a vapor compression refrigeration cycle. The refrigerant circuit 20 includes an outdoor circuit 20*a* installed in the outdoor unit, and an indoor circuit 20*b* installed in the indoor unit. In the outdoor circuit 20*a*, a compressor 21, an outdoor heat exchanger 23, an outdoor expansion valve 24, a four-way valve 22, a bridge circuit 31, and a gas-liquid separator 25 are connected. The outdoor heat exchanger 23 constitutes a heat-source-side heat exchanger. In contrast, in the indoor circuit 20*b*, an indoor heat exchanger 27 and an indoor expansion valve 26 are connected. The indoor heat exchanger 27 constitutes a use-side heat exchanger. A discharge pipe 45 of the compressor 21 is connected to a first port P1 of the four-way valve 22. A suction pipe 46 of the compressor 21 is connected to a second port P2 of the four-way valve 22.

An inflow pipe 36, an outflow pipe 37, and an injection pipe 38 are connected to the gas-liquid separator 25. The inflow pipe 36 is open at an upper portion of the inner space of the gas-liquid separator 25. The outflow pipe 37 is open at a lower portion of the inner space of the gas-liquid separator 25. The injection pipe 38 is open at an upper portion of the inner space of the gas-liquid separator 25. In the gas-liquid separator 25, the refrigerant which has flowed in from the inflow pipe 36 is separated into a saturated liquid and a saturated gas, the saturated liquid flows out from the outflow pipe 37, and the saturated gas flows out from the injection pipe 38. The inflow pipe 36 and the outflow pipe 37 are connected to the bridge circuit 31. The injection pipe 38 is connected to an intermediate connection pipe 47 of the compressor 21.

The refrigerant in the saturated gas state which has flowed out from the injection pipe 38 is injected into a compression chamber with an intermediate pressure of a compression mechanism 32 via an intermediate port. In this embodiment, the inflow pipe 36, the outflow pipe 37, the injection pipe 38, and the gas-liquid separator 25 supply the refrigerant in the saturated liquid state, which is included in the refrigerant which has flowed out from the outdoor heat exchanger 23 during cooling operation and which has been decompressed to have the intermediate pressure in the refrigeration cycle, to the indoor heat exchanger 27, to constitute an injection circuit 15 for supplying the refrigerant in the saturated gas state to the compressor 21.

The bridge circuit 31 is a circuit in which a first check valve CV1, a second check valve CV2, a third check valve CV3, and a fourth check valve CV4 are connected in a bridge form. In the bridge circuit 31, a connection end located on the inflow side of the first check valve CV1 and on the inflow side of the second check valve CV2 is connected to the outflow pipe 37. A connection end located on the outflow side of the second check valve CV2 and on the inflow side of the third check valve CV3 is connected to the indoor heat exchanger 27. The refrigerant pipe that connects the connection end to the indoor heat exchanger 27 is provided with the indoor expansion valve 26 of which the opening degree is changeable. A connection end located on the outflow side of the third check valve CV3 and on the outflow side of the fourth check valve CV4 is connected to the inflow pipe 36. A connection end located on the outflow side of the first check valve CV1 and on the inflow side of the fourth check valve CV4 is connected to the outdoor heat exchanger 23.

During cooling operation, the four-way valve 22 is set in a state (a state indicated by solid lines in FIG. 16A) in which the first port P1 and the third port P3 communicate with each other, and the second port P2 and the fourth port P4 communicate with each other. When the compressor 21 is operated in this state, a cooling operation is performed such that the outdoor heat exchanger 23 operates as a condenser and the indoor heat exchanger 27 operates as an evaporator in the refrigerant circuit 20.

During heating operation, the four-way valve 22 is set in a state (a state indicated by broken lines in FIG. 16A) in which the first port P1 and the fourth port P4 communicate with each other, and the second port P2 and the third port P3 communicate with each other. When the compressor 21 is operated in this state, a heating operation is performed such that the outdoor heat exchanger 23 operates as an evaporator and the indoor heat exchanger 27 operates as a condenser in the refrigerant circuit 20.

The outdoor heat exchanger 23 is constituted of a microchannel heat exchanger (also referred to as micro heat exchanger) having formed therein a microchannel 13 that serves as a flow path of a refrigerant. The microchannel 13 is a fine flow path (a flow path having a very small flow path area) fabricated by using, for example, micro-fabricating technology. In general, a heat exchanger having the microchannel 13 that is a flow path having a diameter of several millimeters or less which exhibits an effect of surface tension is called microchannel heat exchanger.

Specifically, as illustrated in FIG. 16B, the outdoor heat exchanger 23 includes a plurality of flat tubes 16 and a pair of headers 17 and 18. The pair of headers 17 and 18 are constituted of tubular hermetically sealed containers. As illustrated in FIG. 16C, each flat tube 16 has formed therein a plurality of microchannels 13. The plurality of microchannels 13 are formed at a predetermined pitch in the width direction of the flat tube 16. Each flat tube 16 is fixed to the pair of headers 17 and 18 such that one end of each microchannel 13 is open in the one header 17, and the other end of the microchannel 13 is open in the other header 18. Moreover, a wave-shaped metal plate 19 is provided between the flat tubes 16.

An outdoor fan 28 is provided near the outdoor heat exchanger 23. In the outdoor heat exchanger 23, the outdoor air supplied by the outdoor fan 28 flows through gaps formed by the flat tubes 16 and the metal plates 19. The outdoor air flows in the width direction of the flat tubes 16.

In the outdoor heat exchanger 23, the one header 17 is connected to the third port P3 of the four-way valve 22, and the other header 18 is connected to the bridge circuit 31. In the outdoor heat exchanger 23, the refrigerant which has flowed into one of the headers 17 and 18 is distributed to the plurality of microchannels 13, and the refrigerant which has passed through each of the microchannels 13 is joined in the other one of the headers 17 and 18. Each microchannel 13 serves as a refrigerant flow path through which the refrigerant flows. In the outdoor heat exchanger 23, the refrigerant flowing through each microchannel 13 exchanges heat with the outdoor air.

The indoor heat exchanger 27 is constituted of a microchannel heat exchanger. The indoor heat exchanger 27 has the same structure as the outdoor heat exchanger 23, and hence the description on the structure of the indoor heat exchanger 27 is omitted. An indoor fan 29 is provided near the indoor heat exchanger 27. In the indoor heat exchanger

27, the refrigerant flowing through each microchannel 13 exchanges heat with the indoor air supplied by the indoor fan 29. In the indoor heat exchanger 27, the one header 17 is connected to the fourth port P4 of the four-way valve 22, and the other header 18 is connected to the bridge circuit 31.

In the present embodiment, the outdoor heat exchanger 23 and the indoor heat exchanger 27 are constituted of micro-channel heat exchangers. The capacity of the inside of the microchannel heat exchanger is smaller than that of a heat exchanger of another structure type having equivalent performance (for example, cross-fin type fin-and-tube heat exchanger). Hence, the total capacity of the inside of the refrigerant circuit 20 can be decreased compared with a refrigeration cycle apparatus using a heat exchanger of another structure type.

Regarding resistance to pressure and resistance to corrosion, "0.9 mm≤flat-tube thickness (a vertical height h16 of the flat tube 16 illustrated in FIG. 16C)≤4.0 mm" is preferably established; and regarding heat exchange capacity, "8.0 mm≤flat-tube thickness (a horizontal width W16 of the flat tube 16 illustrated in FIG. 16C)≤25.0 mm" is preferably established.

In the present embodiment, the refrigerant circuit 20 is filled with a refrigerant for performing a vapor compression refrigeration cycle. The refrigerant is a mixed refrigerant containing 1,2-difluoroethylene, and can use any one of the above-described refrigerants A to D.

(16-2) Second Embodiment

As illustrated in FIG. 16D, an outdoor heat exchanger 125 includes a heat exchange section 195 and header collection pipes 191 and 192. The heat exchange section 195 includes a plurality of flat perforated tubes 193 and a plurality of insertion fins 194. The flat perforated tubes 193 are an example of a flat tube. The outdoor heat exchanger 125 is included in a refrigerant circuit of a refrigeration cycle apparatus. The refrigerant circuit of the refrigeration cycle apparatus includes a compressor, an evaporator, a condenser, and an expansion valve. In heating operation, the outdoor heat exchanger 125 functions as an evaporator in the refrigerant circuit of the refrigeration cycle apparatus. In cooling operation, the outdoor heat exchanger 125 functions as a condenser in the refrigerant circuit of the refrigeration cycle apparatus.

FIG. 16E is a partly enlarged view of the heat exchange section 195 when the flat perforated tubes 193 and the insertion fins 194 are cut in the vertical direction. The flat perforated tubes 193 function as a heat transfer tube, and transfers heat which shifts between the insertion fins 194 and the outdoor air to the refrigerant flowing thereinside.

Each of the flat perforated tubes 193 includes side surface portions serving as heat transfer surfaces, and a plurality of inner flow paths 193*a* through which the refrigerant flows. The flat perforated tubes 193 are arranged in a plurality of stages at intervals in a state in which a side surface portion of a flat perforated tube 193 vertically faces a side surface portion of another flat perforated tube 193 disposed next to the former flat perforated tube 193. The insertion fins 194 are a plurality of fins each having a shape illustrated in FIG. 16E and connected to the flat perforated tubes 193. Each of the insertion fins 194 has a plurality of cutouts 194*a* extending horizontally narrow and long so that the insertion fin 194 is inserted onto the flat perforated tubes 193 arranged in the plurality of stages between the header collection pipes 191 and 192. As illustrated in FIG. 16E, the shape of each cutout 194*a* of the insertion fins 194 corresponds to the external shape of a cross section of each flat perforated tube 193.

Here, a case where a coupling portion 194*b* of the insertion fin 194 is disposed on the leeward side has been described. In this case, the coupling portion 194*b* is a portion of the insertion fin 194 linearly coupled without a cutout 194*a*. In the outdoor heat exchanger 125, however, the coupling portion 194*b* of the insertion fin 194 may be disposed on the windward side. When the coupling portion 194*b* is disposed on the windward side, the wind is dehumidified first by the insertion fin 194 and then the wind hits the flat perforated tubes 193.

Here, a case where the heat exchanger illustrated in FIG. 16D is used for the outdoor heat exchanger 125. However, the heat exchanger illustrated in FIG. 16D may be used for an indoor heat exchanger. When an insertion fin is used for an indoor heat exchanger, the coupling portion of the insertion fin may be disposed on the leeward side. In this way, in the indoor heat exchanger, when the coupling portion of the insertion fin is disposed on the leeward side, a spray of water can be prevented.

Regarding resistance to pressure and resistance to corrosion, "0.9 mm≤flat-tube thickness (a vertical height h193 of the flat perforated tube 193 illustrated in FIG. 16E)≤4.0 mm" is preferably established; and regarding heat exchange capacity, "8.0 mm≤flat-tube thickness (a horizontal width W193 of the flat perforated tube 193 illustrated in FIG. 16E)≤25.0 mm" is preferably established.

In the present embodiment, the refrigerant circuit including the outdoor heat exchanger 125 is filled with a refrigerant for performing a vapor compression refrigeration cycle. The refrigerant is a mixed refrigerant containing 1,2-difluoroethylene, and can use any one of the above-described refrigerants A to D.

(16-3) Third Embodiment

An inner-surface grooved tube 201 is inserted into through holes 211*a* of a plurality of plate fins 211 that are illustrated in FIG. 16I and that are disposed in parallel to each other. Next, a pipe expanding tool (not illustrated) is press fitted into the inner-surface grooved tube 201. Accordingly, the inner-surface grooved tube 201 is expanded, the clearance between the inner-surface grooved tube 201 and the plate fin 211 is eliminated, thereby increasing the degree of close contact between the inner-surface grooved tube 201 and the plate fin 211. Next, the pipe expanding tool is removed from the inner-surface grooved tube 201. Accordingly, a heat exchanger in which the inner-surface grooved tube 201 is joined to the plate fin 211 without a gap is manufactured.

The inner-surface grooved tube 201 is used for a plate fin-and-tube heat exchanger of a refrigeration cycle apparatus, such as either of an air conditioner and a refrigeration air conditioning apparatus. The plate fin-and-tube heat exchanger is included in a refrigerant circuit of the refrigeration cycle apparatus. The refrigerant circuit of the refrigeration cycle apparatus includes a compressor, an evaporator, a condenser, and an expansion valve. In heating operation, the plate fin-and-tube heat exchanger functions as an evaporator in the refrigerant circuit of the refrigeration cycle apparatus. In cooling operation, the plate fin-and-tube heat exchanger functions as a condenser in the refrigerant circuit of the refrigeration cycle apparatus.

The inner-surface grooved tube 201 having a pipe outer diameter D201 of a pipe of 4 mm or more and 10 mm or less is used. The original tube of the inner-surface grooved tube 201 uses a material of aluminum or an aluminum alloy. The method of forming an inner-surface grooved shape of the inner-surface grooved tube 201 may be component rolling, rolling, or the like, however, is not limited thereby.

As illustrated in FIGS. 16F, 16G, and 16H, the inner-surface grooved tube 201 includes multiple grooves 202 formed in the inner surface thereof in a direction inclined toward a pipe-axis direction, and in-pipe fins 203 formed between the grooves 202. The number of the grooves 202 is 30 or more and 100 or less. A groove lead angle θ201 formed between each groove 202 and the pipe axis is 10 degrees or more and 50 degrees or less. A bottom thickness T201 of each inner-surface grooved tube 201 in a section orthogonal to the pipe axis (cut along line I-I) of the inner-surface grooved tube 201 is 0.2 mm or more and 1.0 mm or less. A fin height h201 of each in-pipe fin is 0.1 mm or more and is 1.2 times the bottom thickness T201 or less. A fin-thread vertex angle δ201 is 5 degrees or more and 45 degrees or less. A fin-root radius r201 is 20% or more and 50% or less of the fin height h201.

Next, limitations on numerical values of the inner-surface groove shape of the inner-surface grooved tube 201 are described.

(16-3-1) Number of Grooves: 30 or More and 100 or Less

The number of grooves is properly determined with regard to heat transfer performance, individual weight, and so forth, in combination with respective specifications (described later) of the inner-surface groove shape, and is preferably 30 or more and 100 or less. If the number of grooves is less than 30, groove moldability likely decreases. If the number of grooves is more than 100, a grooving tool (grooving plug) is likely chipped. In either case, volume productivity of the inner-surface grooved tube 201 likely decreases.

Furthermore, when the inner-surface grooved tube 201 is used for the outdoor heat exchanger and the indoor heat exchanger included in the refrigerant circuit of the refrigeration cycle apparatus, it is preferably satisfied that the number of grooves of the inner-surface grooved tube 201 of the outdoor heat exchanger>the number of grooves of the inner-surface grooved tube 201 of the indoor heat exchanger. Accordingly, in-pipe pressure loss of the inner-surface grooved tube 201 can be decreased, and heat transfer performance thereof can be increased.

(16-3-2) Groove Lead Angle θ201: 10 Degrees or More and 50 Degrees or Less

The groove lead angle θ201 is preferably 10 degrees or more and 50 degrees or less. If the groove lead angle θ201 is less than 10 degrees, heat transfer performance of the inner-surface grooved tube 201 (heat exchanger) likely decreases. If the groove lead angle θ201 is more than 50 degrees, it may be difficult to suppress deformation of the in-pipe fin 203 due to ensuring of volume productivity and expansion of the diameter of the inner-surface grooved tube 201.

Furthermore, when the inner-surface grooved tube 201 is used for the outdoor heat exchanger and the indoor heat exchanger included in the refrigerant circuit of the refrigeration cycle apparatus, it is preferably satisfied that the groove lead angle of the inner-surface grooved tube 201 of the outdoor heat exchanger<the number of grooves of the inner-surface grooved tube 201 of the indoor heat exchanger. Accordingly, in-pipe pressure loss of the inner-surface grooved tube 201 can be decreased, and heat transfer performance thereof can be increased.

(16-3-3) Bottom Thickness T201: 0.2 mm or More and 1.0 mm or Less

The bottom thickness T201 is preferably 0.2 mm or more and 1.0 mm or less. If the bottom thickness T201 is outside the range, it may be difficult to manufacture the inner-surface grooved tube 201. If the bottom thickness T201 is 0.2 mm or less, the strength of the inner-surface grooved tube 201 likely decreases, and it is likely difficult to keep the strength of resistance to pressure.

(16-3-4) Fin Height h201: 0.1 mm or More and (Bottom Thickness T201×1.2) mm or Less The fin height h201 is preferably 0.1 mm or more and (bottom thickness T201×1.2) mm or less. If the fin height h201 is less than 0.1 mm, heat transfer performance of the inner-surface grooved tube 201 (heat exchanger) likely decreases. If the fin height h201 is more than (bottom thickness T201×1.2) mm, it may be difficult to suppress significant deformation of the in-pipe fin 203 due to ensuring of volume productivity and expansion of the diameter of the inner-surface grooved tube 201.

Furthermore, when the inner-surface grooved tube 201 is used for the outdoor heat exchanger and the indoor heat exchanger included in the refrigerant circuit of the refrigeration cycle apparatus, it is preferably satisfied that the fin height h201 of the inner-surface grooved tube 201 of the outdoor heat exchanger>the fin height h201 of the inner-surface grooved tube 201 of the indoor heat exchanger. Accordingly, in-pipe pressure loss of the inner-surface grooved tube 201 can be decreased, and heat transfer performance of the outdoor heat exchanger can be further increased.

(16-3-5) Thread Vertex Angle δ201: 5 Degrees or More and 45 Degrees or Less

The thread vertex angle δ201 is preferably 5 degrees or more and 45 degrees or less. If the thread vertex angle δ201 is less than 5 degrees, it may be difficult to suppress deformation of the in-pipe fin 203 due to ensuring of volume productivity and expansion of the diameter of the inner-surface grooved tube 201. If the thread vertex angle δ201 is more than 45 degrees, maintenance of heat transfer performance of the inner-surface grooved tube 201 (heat exchanger) and the individual weight of the inner-surface grooved tube 201 likely become excessive.

(16-3-6) Fin-Root Radius r201: 20% or More and 50% or Less of Fin Height h201

The fin-root radius r201 is preferably 20% or more and 50% or less of the fin height h201. If the fin-root radius r201 is less than 20% of the fin height h201, fin inclination due to the pipe expansion likely becomes excessive, and volume productivity likely decreases. If the fin-root radius r201 is more than 50% of the fin height h201, the effective heat transfer area of the refrigerant gas-liquid interface likely decreases, and heat transfer performance of the inner-surface grooved tube 201 (heat exchanger) likely decreases.

In the present embodiment, the refrigerant circuit including the plate fin-and-tube heat exchanger using the inner-surface grooved tube 201 is filled with a refrigerant for performing a vapor compression refrigeration cycle. The refrigerant is a mixed refrigerant containing 1,2-difluoroethylene, and can use any one of the above-described refrigerants A to D.

(16-4) Characteristics

The air conditioning apparatus 10 that is the refrigeration cycle apparatus according to the first embodiment, the refrigeration cycle apparatus according to the second embodiment, and the refrigeration cycle apparatus according to the third embodiment each include a flammable refrigerant containing at least 1,2-difluoroethylene, an evaporator that evaporates the refrigerant, and a condenser that condenses the refrigerant. The refrigeration cycle apparatuses are constituted such that the refrigerant repeats a refrigeration cycle by circulating through the evaporator and the condenser.

According to the first embodiment, the outdoor heat exchanger 23 is one of the evaporator and the condenser, and the indoor heat exchanger 27 is the other one of the evaporator and the condenser; and the outdoor heat exchanger 23 and the indoor heat exchanger 27 each include the metal plates 19 serving as a plurality of fins made of aluminum or an aluminum alloy, and the flat tubes 16 serving as a plurality of heat transfer tubes made of aluminum or an aluminum alloy. The outdoor heat exchanger 23 and the indoor heat exchanger 27 are each a heat exchanger that causes the refrigerant flowing inside the heat transfer tubes 16 and the air which is a fluid flowing along the metal plates 19 to exchange heat with each other. The flat tube 16 includes a flat surface portion 16*a* illustrated in FIG. 16C. In each of the outdoor heat exchanger 23 and the indoor heat exchanger 27, the flat surface portions 16*a* of the flat tubes 16 that are disposed next to each other face each other. Each of the plurality of metal plates 19 is bent in a waveform, and disposed between the flat surface portions 16*a* of the flat tubes 16 disposed next to each other. Each metal plate 19 is connected to the flat surface portions 16*a* to be able to transfer heat to the flat surface portions 16*a*.

According to the second embodiment, the outdoor heat exchanger 125 is one of the evaporator and the condenser, and includes the plurality of insertion fins 194 made of aluminum or an aluminum alloy, and the flat perforated tubes 193 serving as a plurality of heat transfer tubes made of aluminum or an aluminum alloy. The outdoor heat exchanger 125 is a heat exchanger that causes the refrigerant flowing inside the flat perforated tube 193 and the air which is a fluid flowing along the insertion fin 194 to exchange heat with each other. The flat perforated tube 193 have the flat surface portions 193*b* illustrated in FIG. 16E. In the outdoor heat exchanger 125, the flat surface portions 193*b* of the flat perforated tubes 193 that are disposed next to each other face each other. Each of the plurality of insertion fins 194 has a plurality of cutouts 194*a*. The plurality of flat perforated tubes 193 are inserted into the plurality of cutouts 194*a* of the plurality of insertion fins 194 and connected thereto to be able to transfer heat to the plurality of insertion fins 194.

According to the third embodiment, the heat exchanger including the plurality of plate fins 211 made of aluminum or an aluminum alloy, and the inner-surface grooved tubes 201 serving as a plurality of heat transfer tubes made of aluminum or an aluminum alloy is one of the evaporator and the condenser. The heat exchanger is a heat exchanger that causes the refrigerant flowing inside the inner-surface grooved tube 201 and the air which is a fluid flowing along the plate fins 211 to exchange heat with each other. Each of the plurality of plate fins 211 has the plurality of through holes 211*a*. In the heat exchanger, the plurality of inner-surface grooved tubes 201 penetrate through the plurality of through holes 211*a* of the plurality of plate fins 211. The outer peripheries of the plurality of inner-surface grooved tubes 201 are in close contact with the inner peripheries of the plurality of through holes 211*a*.

In the above-described refrigeration cycle apparatus, the heat exchanger includes the metal plates 19, the insertion fins 194, or the plate fins 211 serving as a plurality of fins made of aluminum or an aluminum alloy; and the flat tubes 16, the flat perforated tubes 193, or the inner-surface grooved tubes 201 serving as a plurality of heat transfer tubes made of aluminum or an aluminum alloy. Since the refrigeration cycle apparatus has such a configuration, for example, as compared to a case where a heat transfer tube uses a copper pipe, the material cost of the heat exchanger can be decreased.

(17) Embodiment of the Technique of Seventeenth Group (17-1) First Embodiment

FIG. 17A is a schematic view showing a disposition of an air conditioning apparatus 1 according to a first embodiment. FIG. 17B is a schematic structural view of the air conditioning apparatus 1. In FIGS. 17A and 17B, the air conditioning apparatus 1 is a device that is used to air-condition houses or buildings.

Here, the air conditioning apparatus 1 is installed in a two-story house 100. The house 100 includes rooms 101 and 102 on the first floor and rooms 103 and 104 on the second floor. The house 100 includes a basement 105.

The air conditioning apparatus 1 is a so-called duct air conditioning system. The air conditioning apparatus 1 includes an indoor unit 2 that is a use-side unit, an outdoor unit 3 that is a heat-source-side unit, refrigerant connection pipes 306 and 307, and a first duct 209 that sends air that has been air-conditioned at the indoor unit 2 to the rooms 101 to 104. The first duct 209 branches into the rooms 101 to 104, and the branching portions are connected to ventilation ports 101*a* to 104*a* of the corresponding rooms 101 to 104. For convenience of explanation, the indoor unit 2, the outdoor unit 3, and the refrigerant connection pipes 306 and 307 are considered together as air conditioning equipment 80. The indoor unit 2 that is a use-side unit and the outdoor unit 3 that is a heat-source unit are different members.

In FIG. 17B, the indoor unit 2, the outdoor unit 3, and the refrigerant connection pipes 306 and 307 constitute a heat pump section 360 that heats an interior in a vapor compression refrigeration cycle. A gas furnace unit 205 that is a part of the indoor unit 2 constitutes a different heat source section 270 that heats the interior by using a heat source (here, heat by gas combustion) that differs from that of the heat pump section 360.

In this way, the indoor unit 2 includes the gas furnace unit 205 that constitutes the different heat source section 270 in addition to the members that constitute the heat pump section 360. The indoor unit 2 also includes an indoor fan 240 for introducing air in the rooms 101 to 104 into a casing 230 and supplying air that has been air-conditioned at the heat pump section 360 and the different heat source section 270 (the gas furnace unit 205) into the rooms 101 to 104. The indoor unit 2 is provided with a blow-out air temperature sensor 233 that detects a blow-out air temperature Trd that is the temperature of air in an air outlet 231 of the casing 230 and an indoor temperature sensor 234 that detects an indoor temperature Tr that is the temperature of air in an air inlet 232 of the casing 230. The indoor temperature sensor 234 may be provided in the rooms 101 to 104 instead of in the indoor unit 2. A second duct 210 is connected to the air inlet 232 of the casing 230. The indoor unit 2 that is a use-side unit includes the casing 230 and equipment that is accommodated therein. The indoor unit 2 is configured to guide indoor air F1 that is first air introduced from the interior to an indoor heat exchanger 242 that is a use-side heat exchanger.

(17-1-1) Heat Pump Section 360

In the heat pump section 360 of the air conditioning equipment 80, a refrigerant circuit 320 is formed by connecting the indoor unit 2 and the outdoor unit 3 via the refrigerant connection pipes 306 and 307. The refrigerant connection pipes 306 and 307 are refrigerant pipes that are constructed at a site when installing the air conditioning equipment 80.

The indoor unit 2 is installed in the basement 105 of the house 100. The location of installation of the indoor unit 2 is not limited to the basement 105, and may be other locations in the interior. The indoor unit 2 includes the indoor heat exchanger 242 that serves as a refrigerant heat dissipater that heats air by heat dissipation of a refrigerant in a refrigeration cycle, and an indoor expansion valve 241.

At the time of a cooling operation, the indoor expansion valve 241 decompresses a refrigerant that circulates in the refrigerant circuit 320 and causes the refrigerant to flow to the indoor heat exchanger 242. Here, the indoor expansion valve 241 is an electric expansion valve that is connected to a liquid side of the indoor heat exchanger 242.

The indoor heat exchanger 242 is disposed closest to a downwind side in a ventilation path extending from the air inlet 232, formed in the casing 230, to the air outlet 231, formed in the casing 230.

The outdoor unit 3 is installed outside the house 100. The outdoor unit 3 includes a compressor 321, an outdoor heat exchanger 323, an outdoor expansion valve 324, and a four-way valve 328. The compressor 321 is a hermetic compressor in which a compression element (not shown) and a compressor motor 322 that rotationally drives the compression element are accommodated in a casing.

The compressor motor 322 is configured so that electric power is supplied thereto via an inverter device (not shown), and an operating capacity can be varied by changing the frequency (that is, the number of rotations) of the inverter device.

The outdoor heat exchanger 323 is a heat exchanger that functions as a refrigerant evaporator that evaporates a refrigerant in a refrigeration cycle by using outdoor air. An outdoor fan 325 for sending outdoor air to the outdoor heat exchanger 323 is provided in the vicinity of the outdoor heat exchanger 323. The outdoor fan 325 is rotationally driven by an outdoor fan motor 326.

At the time of a heating operation, the outdoor expansion valve 324 decompresses a refrigerant that circulates in the refrigerant circuit 320 and causes the refrigerant to flow to the outdoor heat exchanger 323. Here, the outdoor expansion valve 324 is an electric expansion valve that is connected to a liquid side of the outdoor heat exchanger 323. The outdoor unit 3 is provided with an outdoor temperature sensor 327 that detects the temperature of outdoor air that exists at the outside of the house 100, where the outdoor unit 3 is disposed, that is, an outside air temperature Ta.

In the present embodiment, the refrigerant circuit 320 is filled with a refrigerant for performing a vapor compression refrigeration cycle. The refrigerant is a mixed refrigerant containing 1,2-difluoroethylene, and any one of the refrigerants A to D above may be used.

The four-way valve 328 is a valve that switches the direction of flow of a refrigerant. At the time of the cooling operation, the four-way valve 328 connects a discharge side of the compressor 321 and a gas side of the outdoor heat exchanger 323, and connects a suction side of the compressor 321 and the gas refrigerant connection pipe 307 (a cooling operation state: refer to the solid line of the four-way valve 328 in FIG. 17B). As a result, the outdoor heat exchanger 323 functions as a condenser for a refrigerant, and the indoor heat exchanger 242 functions as an evaporator for a refrigerant.

At the time of the heating operation, the four-way valve 328 connects the discharge side of the compressor 321 and the gas refrigerant connection pipe 307, and connects the suction side of the compressor 321 and the gas side of the outdoor heat exchanger 323 (a heating operation state: refer to the broken line of the four-way valve 328 in FIG. 17B). As a result, the indoor heat exchanger 242 functions as a condenser for a refrigerant, and the outdoor heat exchanger 323 functions as an evaporator for a refrigerant.

(17-1-2) Outline of Important Structure of Air Conditioning Apparatus 1

When a heat pump heating operation is being performed, in the air conditioning apparatus 1, a refrigerant that contains at least 1,2-difluoroethylene circulates in the compressor 321, the indoor heat exchanger 242 that is a use-side heat exchanger, and the outdoor heat exchanger 323 that is a heat-source-side heat exchanger to repeat a refrigeration cycle. The indoor heat exchanger 242 causes heat to be exchanged between the indoor air F1 that is the first air, and the refrigerant. The indoor air F1 is supplied to the indoor heat exchanger 242 by the indoor fan 240. Indoor air F3 (the first air) that has been heated in the indoor heat exchanger 242 is sent to each of the rooms 101 to 104 from the indoor unit 2 via the first duct 209 to heat the rooms 101 to 104. The outdoor heat exchanger 323 causes heat to be exchanged between outdoor air that is second air, and the refrigerant. The casing 230 includes a use-side space SP2 that is connected to the first duct 209 and that accommodates the indoor heat exchanger 242, and is configured to allow the indoor air F3 that has exchanged heat with the refrigerant at the indoor heat exchanger 242 to be sent out to the first duct 209.

When a different heat source heating operation is being performed, a high-temperature combustion gas that has been sent to a furnace heat exchanger 255 exchanges heat with the indoor air F1 that is supplied by the indoor fan 240, is cooled, and becomes a low-temperature combustion gas in the furnace heat exchanger 255. The low-temperature combustion gas is discharged from the gas furnace unit 205 via a discharge pipe 257. On the other hand, the indoor air F2 that has been heated in the furnace heat exchanger 255 is sent to each of the rooms 101 to 104 from the indoor unit 2 via the first duct 209 to heat the rooms 101 to 104.

(17-1-3) Different Heat Source Section 270

The different heat source section 270 is constituted by the gas furnace unit 205 that is a part of the indoor unit 2 of the air conditioning equipment 80.

The gas furnace unit 205 is provided in the casing 230 that is installed in the basement 105 of the house 100. The gas furnace unit 205 is a gas-combustion heating device, and includes a fuel gas valve 251, a furnace fan 252, a combustion section 254, the furnace heat exchanger 255, an air supply pipe 256, and the discharge pipe 257.

The fuel gas valve 251 is, for example, an electromagnetic valve whose opening and closing are controllable, and is provided at a fuel gas supply pipe 258 that extends to the combustion section 254 from the outside of the casing 230. As the fuel gas, for example, natural gas or petroleum gas is used.

The furnace fan 252 is a fan that generates an airflow in which air is introduced into the combustion section 254 via the air supply pipe 256, then, the air is sent to the furnace heat exchanger 255, and the air is discharged from the discharge pipe 257. The furnace fan 252 is rotationally driven by a furnace fan motor 253.

The combustion section 254 is equipment that acquires a high-temperature combustion gas by igniting a mixed gas containing fuel gas and air by, for example, a gas burner (not shown).

The furnace heat exchanger 255 is a heat exchanger that heats air by heat dissipation of the combustion gas acquired at the combustion section 254, and functions as a different heat source heat dissipater that heats air by heat dissipation by using a heat source (here, heat by gas combustion) differing from that of the heat pump section 360.

The furnace heat exchanger 255 is disposed on an upwind side with respect to the indoor heat exchanger 242, serving as a refrigerant dissipater, in the ventilation path from the air inlet 232, formed in the casing 230, to the air outlet 231, formed in the casing 230.

(17-1-4) Indoor Fan 240

The indoor fan 240 is a fan for supplying air that is heated by the indoor heat exchanger 242, serving as a refrigerant heat dissipater, that constitutes the heat pump section 360 and by the furnace heat exchanger 255, serving as a different heat source dissipater, that constitutes the different heat source section 270 into the rooms 101 to 104.

In the ventilation path extending from the air inlet 232, formed in the casing 230, to the air outlet 231, formed in the casing 230, the indoor fan 240 is disposed on the upwind side with respect to both the indoor heat exchanger 242 and the furnace heat exchanger 255. The indoor fan 240 includes a blade 243 and a fan motor 244 that rotationally drives the blade 243.

(17-1-5) Controller 30

The indoor unit 2 is provided with an indoor-side control board 21 that controls the operation of each portion of the indoor unit 2. The outdoor unit 3 is provided with an outdoor-side control board 31 that controls the operation of each portion of the outdoor unit 3. The indoor-side control board 21 and the outdoor-side control board 31 each include, for example, a microcomputer, and each exchange, for example, control signals with a thermostat 40. Control signals are not exchanged between the indoor-side control board 21 and the outdoor-side control board 31. A control device including the indoor-side control board 21 and the outdoor-side control board 31 is called a controller 30.

(17-1-6) Detailed Structure of Controller 30

FIG. 17C is a block diagram showing an electrical connection state of the controller 30 and the thermostat 40 in the air conditioning apparatus 1 according to the first embodiment of the present invention. The thermostat 40 is mounted in an indoor space as with the indoor unit 2. The locations where the thermostat 40 and the indoor unit 2 are mounted may be different locations in the indoor space. The thermostat 40 is connected to a control system of the indoor unit 2 and a control system of the outdoor unit 3 by a communication line.

A transformer 20 applies a voltage of a commercial power source 90 after transformation to a usable low voltage to each of the indoor unit 2, the outdoor unit 3, and the thermostat 40 via power source lines 81 and 82.

(17-2) Second Embodiment (17-2-1) Overall Structure

As shown in FIG. 17D, an air conditioning apparatus 701 according to a second embodiment is installed on a roof 801 of a building 800, that is, on a rooftop. The air conditioning apparatus 701 is equipment that air-conditions the interior of the building 800. The building 800 includes a plurality of rooms 810. The rooms 810 of the building 800 are spaces to be air-conditioned by the air conditioning apparatus 701. FIG. 17D shows an example in which the air conditioning apparatus 701 includes one first duct 721 and one second duct 722. However, the air conditioning apparatus 701 may include a plurality of the first ducts 721 and a plurality of the second ducts 722. The first duct 721 shown in FIG. 17D is branched. The first duct 721 is provided for supply air, and the second duct 722 is provided for return air. Supply air that is supplied to the plurality of rooms 810 in the interior is first air. Return air that is introduced from the interior by the second duct 722 is also first air. In FIG. 17D, arrows Ar1 and Ar2 in the first duct 721 and the second duct 722 indicate the directions in which the air flows in the first duct 721 and the second duct 722. The air is sent to the rooms 810 from the air conditioning apparatus 701 via the first duct 721, and indoor air in the rooms 810, which is air in the spaces to be air-conditioned, is sent to the air conditioning apparatus 701 via the second duct 722. A plurality of blow-out ports 723 are each provided at a boundary between the first duct 721 and a corresponding one of the rooms 810. The supply air that is supplied by the first duct 721 is blown out to the rooms 810 from the blow-out ports 723. At least one suction port 724 is provided at a boundary between the second duct 722 and a corresponding room 810. The indoor air sucked in from the suction port 724 is return air that is returned to the air conditioning apparatus 701 by the second duct 722.

(17-2-2) External Appearance of Air Conditioning Apparatus 701

FIG. 17E shows an external appearance of the air conditioning apparatus 701 when seen from obliquely above the air conditioning apparatus 701, and FIG. 17F shows the external appearance of the air conditioning apparatus 701 when seen from obliquely below the air conditioning apparatus 701. For convenience, the air conditioning apparatus 701 is described below by using upward, downward, forward, rearward, left, and right directions indicated by arrows in the figures. The air conditioning apparatus 701 includes a casing 730 having a shape based on a parallelepiped. The casing 730 includes metal plates that cover an upper surface 730*a*, a front surface 730*b*, a right surface 730*c*, a left surface 730*d*, a rear surface 730*e*, and a bottom surface 730*f*. The casing 730 has a third opening 733 in the upper surface 730*a*. The third opening 733 communicates with a heat-source-side space SP1 (see FIG. 17G). A heat-source-side fan 747 that blows out air in the heat-source-side space SP1 to the outside of the casing 730 via the third opening 733 is mounted in the third opening 733. As the heat-source-side fan 747, for example, a propeller fan is used. The casing 730 has slits 734 in the front surface 730*b*, the left surface 730*d*, and the rear surface 730*e*. These slits 734 also communicate with the heat-source-side space SP1. Since, when the air is blown out toward the outer side of the casing 730 from the heat-source-side space SP1 by the heat-source-side fan 747, the pressure in the heat-source-side space SP1 becomes negative with respect to atmospheric pressure, outdoor air is sucked into the heat-source-side space SP1 from the outside of the casing 730 via the slits 734. The third opening 733 and the slits 734 do not communicate with a use-side space SP2 (see FIG. 17G). Therefore, in an ordinary state, other than the first duct 721 and the second duct 722, there are no portions that communicate with the outside of the casing 730 from the use-side space SP2.

A bottom plate 735 having a first opening 731 and a second opening 732 is mounted on the bottom surface 730*f* of the casing 730. As shown in FIG. 17J, the first duct 721 is connected to the first opening 731 for supply air. As shown in FIG. 17J, the second duct 722 is connected to the second opening 732 for return air. Air that has returned to the use-side space SP2 of the casing 730 via the second duct 722 from the rooms 810, which are the spaces to be air conditioned, is sent to the rooms 810 via the first duct 721 from the use-side space SP2. For reinforcing the strength of the bottom plate 735, ribs 731*a* and 732*a* having a height of less than 3 cm are formed around the first opening 731 and the second opening 732 (see FIG. 17H). The ribs 731*a* and 732*a* are formed integrally with the bottom plate 735 by causing a metal plate, which is a material of the bottom plate 735, to standby press-forming thereof when the first opening 731 and the second opening 732 are formed in the bottom plate 735 by, for example, press-forming thereof.

(17-2-3) Internal Structure of Air Conditioning Apparatus 701

(17-2-3-1) Heat-Source-Side Space SP1 and Use-Side Space SP2 in Casing 730

FIG. 17G shows a state in which the metal plate covering the front surface 730*b* of the casing 730 and the metal plate covering the left surface 730*d* of the casing 730 have been removed. FIG. 17H shows a state in which the metal plate covering the right surface 730*c* of the casing 730 and the metal plate covering a part of the rear surface 730*e* have been removed. In FIG. 17H, of the metal plate covering the rear surface 730*e*, the removed part of the metal plate covering the rear surface 730*e* is the metal plate covering the use-side space SP2. Therefore, the metal plate covering the rear surface 730*e* shown in FIG. 17H only covers the heat-source-side space SP1. FIG. 17I shows a state in which the metal plate covering the right surface 730*c* of the casing 730, the metal plate covering the left surface 730*d*, and the metal plate covering a part of the upper surface 730*a* have been removed, and a heat-source-side heat exchanger 743 and the heat-source-side fan 747 have been removed.

The heat-source space SP1 and the use-side space SP2 are separated by a partition plate 739. Outdoor air flows to the heat-source-side space SP1 and indoor air flows to the use-side space SP2. By separating the heat-source space SP1 and the use-side space SP2 by the partition plate 739, the flow of air between the heat-source space SP1 and the use-side space SP2 is blocked. Therefore, in an ordinary state, the indoor air and the outdoor air do not mix in the casing 730 and the interior and the exterior do not communicate with each other via the air conditioning apparatus 701.

(17-2-3-2) Structure in Heat-Source-Side Space SP1

The heat-source-side space SP1 accommodates, in addition to the heat-source-side fan 747, a compressor 741, a four-way valve 742, the heat-source-side heat exchanger 743, and an accumulator 746. The heat-source-side heat exchanger 743 includes a plurality of heat-transfer tubes (not shown) in which a refrigerant flows, and a plurality of heat-transfer fins (not shown) in which air flows between gaps thereof. The plurality of heat-transfer tubes are arranged in an up-down direction (hereunder may be referred to as "row direction"), and each heat-transfer tube extends in a direction substantially orthogonal to the up-down direction (in a substantially horizontal direction). The plurality of heat-transfer tubes are arranged in a plurality of columns in order from a side close to the casing 730. At an end portion of the heat-source-side heat exchanger 743, for example, the heat-transfer tubes are connected to each other by being bent into a U shape or by using a U-shaped tube so that the flow of a refrigerant from a certain column to another column and/or a certain row to another row is turned back. The plurality of heat-transfer fins that extend so as to be long in the up-down direction are arranged side by side in a direction in which the heat-transfer tubes extend with a predetermined interval between the plurality of heat-transfer fins. The plurality of heat-transfer fins and the plurality of heat-transfer tubes are assembled to each other so that each heat-transfer fin extends through the plurality of heat-transfer tubes. The plurality of heat-transfer fins are also disposed in a plurality of columns.

In top view, the heat-source-side heat exchanger 743 has a C shape, and is disposed opposite to the front surface 730*b*, the left surface 730*d*, and the rear surface 730*e* of the casing 730. A portion that is not surrounded by the heat-source-side heat exchanger 743 is a portion that is opposite to the partition plate 739. Side end portions that are two ends of the C shape are disposed near the partition plate 739, and a portion between the two end portions of the heat-source-side heat exchanger 743 and the partition plate 739 is closed by a metal plate (not shown) that blocks air passage. The height of the heat-source-side heat exchanger 743 is substantially the same as the height from the bottom surface 730*f* to the upper surface 730*a* of the casing 730. Due to such a structure, a flow path of air that enters from the slits 734, passes through the heat-source-side heat exchanger 743, and exits from the third opening 733 is formed. When outdoor air sucked into the heat-source-side space SP1 via the slits 734 passes through the heat-source-side heat exchanger 743, the outdoor air exchanges heat with a refrigerant that flows in the heat-source-side heat exchanger 743. Air after the heat exchange by the heat-source-side heat exchanger 743 is discharged to the outside of the casing 730 from the third opening 733 by the heat-source-side fan 747.

(17-2-3-3) Structure in Use-Side Space SP2

An expansion valve 744, a use-side heat exchanger 745, and a use-side fan 748 are disposed in the use-side space SP2. As the use-side fan 748, for example, a centrifugal fan is used. As a centrifugal fan, for example, a sirocco fan exists. The expansion valve 744 may be disposed in the heat-source-side space SP1. As shown in FIG. 17H, the use-side fan 748 is disposed above the first opening 731 by a support base 751. As shown in FIG. 17N, in top view, a blow-out port 748*b* of the use-side fan 748 is disposed at a location so as not to overlap the first opening 731. Since portions other than the blow-out port 748*b* of the use-side fan 748 and the first opening 731 are surrounded by the support base 751 and the casing 730, substantially the entire air that is blown out from the blow-out port 748*b* of the use-side fan 748 is supplied into the interior via the first duct 721 from the first opening 731.

The use-side heat exchanger 745 includes a plurality of heat-transfer tubes 745*a* (see FIG. 17M) in which a refrigerant flows, and a plurality of heat-transfer fins (not shown) in which air flows between gaps thereof. The plurality of heat-transfer tubes 745*a* are arranged in an up-down direction (row direction), and each heat-transfer tube 745*a* extends in a direction substantially orthogonal to the up-down direction (in the second embodiment, in a left-right direction). Here, a refrigerant flows in the left-right direction in the plurality of heat-transfer tubes 745*a*. The plurality of heat-transfer tubes 745*a* are provided in a plurality of columns in a front-rear direction. At an end portion of the use-side heat exchanger 745, for example, the heat-transfer tubes 745*a* are connected to each other by being bent into a U shape or by using a U-shaped tube so that the flow of a refrigerant from a certain column to another column and/or a certain row to another row is turned back. The plurality heat-transfer fins that extend so as to be long in the left-right direction are arranged in a direction in which the heat-transfer tubes 745*a* extend with a predetermined interval between the plurality of heat-transfer fins. The plurality of heat-transfer fins and the plurality of heat-transfer tubes 745*a* are assembled to each other so that each heat-transfer fin extends through the plurality of heat-transfer tubes 745*a*. For example, a copper tube is used for each heat-transfer tube 745*a* that constitutes the use-side heat exchanger 745 and aluminum may be used for each heat-transfer fin.

The use-side heat exchanger 745 has a shape that is short in the front-rear direction and long in the up-down direction and the left-right direction. A drain pan 752 has a shape like a shape formed by removing an upper surface of a parallelepiped that extends so as to be long in the left-right direction. In top view, the drain pan 752 has a front-rear-direction dimension that is longer than a front-rear length of the use-side heat exchanger 745. The use-side heat exchanger 745 is fitted in such a drain pan 752. The drain pan 752 receives dew condensation water that is produced at the use-side heat exchanger 745 and that falls dropwise downward. The drain pan 752 extends to the partition plate 739 from the right surface 730*c* of the casing 730. A drainage port 752*a* of the drain pan 752 extends through the right surface 730*c* of the casing 730, and the dew condensation water received by the drain pan 752 passes through the drainage port 752*a* and is caused to drain away to the outside of the casing 730.

The use-side heat exchanger 745 extends up to the vicinity of the partition plate 739 from the vicinity of the right surface 730*c* of the casing 730. A portion between the right surface 730*c* of the casing 730 and a right portion 745*c* of the use-side heat exchanger 745 and a portion between the partition plate 739 and a left portion 745*d* of the use-side heat exchanger 745 are closed by metal plates. The drain pan 752 is supported by a support frame 736 at a height h1 from the bottom plate 735 so as to be upwardly separated from the bottom plate 735. A support of the use-side heat exchanger 745 includes rod-shaped frame members combined around the upper, lower, left, and right sides of the use-side heat exchanger 745, and is helped by an auxiliary frame 753 that is directly or indirectly fixed to the casing 730 and the partition plate 739. A portion between the use-side heat exchanger 745 and the upper surface 730*a* of the casing 730 is closed by the use-side heat exchanger 745 itself or the auxiliary frame 753. An opening portion between the use-side heat exchanger 745 and the bottom plate 735 is closed by the support base 751 and the drain pan 752.

In this way, the use-side heat exchanger 745 divides the use-side space SP2 into a space on an upstream side with respect to the use-side heat exchanger 745 and a space on a downstream side with respect to the use-side heat exchanger 745. All air that flows to the downstream side from the upstream side with respect to the use-side heat exchanger 745 passes through the use-side heat exchanger 745. The use-side fan 748 is disposed in the space on the downstream side with respect to the use-side heat exchanger 745 and causes an airflow that passes through the use-side heat exchanger 745 to be generated. The support base 751 that has been already described further divides the space on the downstream side with respect to the use-side heat exchanger 745 into a space on a suction side of the use-side fan 748 and a space on a blow-out side of the use-side fan 748.

(17-2-3-4) Refrigerant Circuit

FIG. 17K illustrates a refrigerant circuit 711 that is formed in the air conditioning apparatus 701. The refrigerant circuit 711 includes the use-side heat exchanger 745 and the heat-source-side heat exchanger 743. In the refrigerant circuit 711, a refrigerant circulates between the use-side heat exchanger 745 and the heat-source-side heat exchanger 743. In the refrigerant circuit 711, when, in a cooling operation or a heating operation, a vapor compression refrigeration cycle is performed, heat is exchanged at the use-side heat exchanger 745 and the heat-source-side heat exchanger 743. In FIG. 17K, an arrow Ar3 denotes supply air which is an airflow that is on the downstream side with respect to the use-side heat exchanger 745 and that is blown out from the use-side fan 748, and an arrow Ar4 denotes return air which is an airflow that is on the upstream side with respect to the use-side heat exchanger 745. An arrow Ar5 denotes an airflow that is on a downstream side with respect to the heat-source-side heat exchanger 743 and that is blown out from the third opening 733 by the heat-source-side fan 747, and an arrow Ar6 denotes an airflow that is on an upstream side with respect to the heat-source-side heat exchanger 743 and that is sucked from the slits 734 by the heat-source-side fan 747.

The refrigerant circuit 711 includes the compressor 741, the four-way valve 742, the heat-source-side heat exchanger 743, the expansion valve 744, the use-side heat exchanger 745, and the accumulator 746. The four-way valve 742 is switched to a connection state indicated by a solid line at the time of the cooling operation, and is switched to a connection state indicated by a broken line at the time of the heating operation.

At the time of the cooling operation, a gas refrigerant compressed by the compressor 741 passes through the four-way valve 742 and is sent to the heat-source-side heat exchanger 743. The refrigerant dissipates heat to outdoor air at the heat-source-side heat exchanger 743, passes along a refrigerant pipe 712, and is sent to the expansion valve 744. At the expansion valve 744, the refrigerant expands and is decompressed, passes along the refrigerant pipe 712, and is sent to the use-side heat exchanger 745. A refrigerant having a low temperature and a low pressure sent from the expansion valve 744 exchanges heat at the use-side heat exchanger 745, and takes away heat from indoor air. The air cooled by having its heat taken away at the use-side heat exchanger 745 passes through the first duct 721 and is supplied to the rooms 810. The gas refrigerant after the heat exchange at the use-side heat exchanger 745 or a gas-liquid two-phase refrigerant passes through a refrigerant pipe 713, the four-way valve 742, and the accumulator 746, and is sucked into the compressor 741.

At the time of the heating operation, a gas refrigerant compressed at the compressor 741 passes through the four-way valve 742 and the refrigerant pipe 713 and is sent to the use-side heat exchanger 745. The refrigerant exchanges heat with indoor air at the use-side heat exchanger 745 and applies heat to the indoor air. The air heated by the application of heat at the use-side heat exchanger 745 passes through the first duct 721 and is supplied to the rooms 810. The refrigerant after the heat exchange at the use-side heat exchanger 745 passes along the refrigerant pipe 712 and is sent to the expansion valve 744. A refrigerant having a low temperature and a low pressure that has expanded and that has been decompressed at the expansion valve 744 passes along the refrigerant pipe 712, is sent to the heat-source-side heat exchanger 743, exchanges heat at the heat-source-side heat exchanger 743, and acquires heat from outdoor air. The gas refrigerant after the heat exchange at the heat-source-side heat exchanger 743 or a gas-liquid two-phase refrigerant passes through the four-way valve 742 and the accumulator 746, and is sucked into the compressor 741.

(17-2-3-5) Control System

FIG. 17L illustrates, for example, a main controller 760 that controls the air conditioning apparatus 701 and main pieces of equipment that are controlled by the main controller 760. The main controller 760 controls the compressor 741, the four-way valve 742, the heat-source-side fan 747, and the use-side fan 748. The main controller 760 is configured to be capable of communicating with a remote controller 762. A user can send, for example, set values of indoor temperatures of the rooms 810 to the main controller 760 from the remote controller 762.

For controlling the air conditioning apparatus 701, a plurality of temperature sensors for measuring the temperature of a refrigerant at each portion of the refrigerant circuit 711 and/or a pressure sensor that measures the pressure of each portion and a temperature sensor for measuring the air temperature of each location are provided.

The main controller 760 performs at least on/off control of the compressor 741, on/off control of the heat-source-side fan 747, and on/off control of the use-side fan 748. When any or all of the compressor 741, the heat-source-side fan 747, and the use-side fan 748 include a motor of a type whose number of rotations is changeable, the main controller 760 may be configured to be capable of controlling the number of rotations of the motor or motors whose number of rotations is changeable among the motors of the compressor 741, the heat-source-side fan 747, and the use-side fan 748. In this case, the main controller 760 can control the circulation amount of the refrigerant that flows through the refrigerant circuit 711 by changing the number of rotations of the motor of the compressor 741. The main controller 760 can change the flow rate of outdoor air that flows between the heat-transfer fins of the heat-source-side heat exchanger 743 by changing the number of rotations of the motor of the heat-source-side fan 747. The main controller 760 can change the flow rate of indoor air that flows between the heat-transfer fins of the use-side heat exchanger 745 by changing the number of rotations of the motor of the use-side fan 748.

A refrigerant leakage sensor 761 is connected to the main controller 760. When the concentration of a refrigerant gas that has leaked into air becomes greater than or equal to a detected lower limit concentration, the refrigerant leakage sensor 761 sends a signal indicating the detection of the leakage of the gas refrigerant to the main controller 760.

The main controller 760 is realized by, for example, a computer. The computer that constitutes the main controller 760 includes a control calculation device and a storage device. For the control calculation device, a processor such as a CPU or a GPU may be used. The control calculation device reads a program that is stored in the storage device and performs a predetermined image processing operation and a computing processing operation in accordance with the program. Further, the control calculation device writes a calculated result to the storage device and reads information stored in the storage device in accordance with the program. However, the main controller 760 may be formed by using an integrated circuit (IC) that can perform control similar to the control that is performed by using a CPU and a memory. Here, IC includes, for example, LSI (large-scale integrated circuit), ASIC (application-specific integrated circuit), a gate array, and FPGA (field programmable gate array).

In the present embodiment, the refrigerant circuit 711 is filled with a refrigerant for performing a vapor compression refrigeration cycle. The refrigerant is a mixed refrigerant containing 1,2-difluoroethylene, and any one of the refrigerants A to D above may be used.

(17-3) Third Embodiment

FIG. 17O illustrates a structure of an air conditioning apparatus 601 according to a third embodiment. The air conditioning apparatus 601 is configured to perform indoor ventilation and humidity conditioning. A sensible heat exchanger 622 is provided in a central portion inside a casing 621 of the air conditioning apparatus 601. The sensible heat exchanger 622 does not exchange moisture between circulating air and circulating air. The sensible heat exchanger 622 has the function of exchanging sensible heat.

The air conditioning apparatus 601 includes a compressor 633, an outdoor heat exchanger 634 that is a heat-source-side heat exchanger, an air supply heat exchanger 625 that is a use-side heat exchanger, an air supply duct 651 that supplies supply air SA to a plurality of rooms in an interior, a return-air duct 652 that introduces indoor air RA from the interior, a suction duct 653 that introduces outdoor air OA from an exterior, and the casing 621. First air before heat exchange with a refrigerant at the air supply heat exchanger 625 is the outdoor air OA, and first air after the heat exchange with the refrigerant at the air supply heat exchanger 625 is the supply air SA. Outdoor air that is subjected to heat exchange at the outdoor heat exchanger 634 is second air. The outdoor air that is the second air and the outdoor air OA that is the first air differ from each other.

A refrigerant that contains at least 1,2-difluoroethylene circulates in the compressor 633, the air supply heat exchanger 625, and the outdoor heat exchanger 634, and a refrigeration cycle is repeated. More specifically, the refrigerant is compressed at the compressor 633, is condensed at the outdoor heat exchanger 634, is decompressed at a capillary tube 636, and is evaporated at the air supply heat exchanger 625. An evaporation valve may be used instead of the capillary tube 636.

A space including an air supply passage 641 and an outside air passage 643 in the casing 621 is a use-side space that is connected to the air supply duct 651 and that accommodates the air supply heat exchanger 625. The casing 621 is configured to be capable of allowing the supply air SA (the first air) after the heat exchange with the refrigerant at the air supply heat exchanger 625 to be sent out to the air supply duct 651. The air supply duct 651 is a first duct, and the suction duct 653 is a third duct.

Looking at it differently, the air conditioning apparatus 601 may be regarded as including a use-side unit 602 and a heat-source-side unit 603. The use-side unit 602 and the heat-source-side unit 603 are different units. The use-side unit 602 includes the casing 621, the sensible heat exchanger 622, the air supply heat exchanger 625, an exhaust fan 627, an air supply fan 628, and a humidifier 629. The heat-source-side unit 603 includes the compressor 633, the outdoor heat exchanger 634, and the capillary tube 636. The use-side unit 602 is configured to guide the outdoor air OA that is the first air introduced from the exterior to the air supply heat exchanger 625 that is a use-side heat exchanger with the casing 621 connected to the suction duct 653 that is the third duct.

The air supply passage 641 and a suction passage 644 are formed closer than the sensible heat exchanger 622 to an indoor side. An exhaust passage 642 and the outside air passage 643 are formed closer than the sensible heat exchanger 622 to an outdoor side. The air supply fan 628 and the humidifier 629 are provided in the air supply passage 641. The exhaust fan 627 is provided in the exhaust passage 642. The air supply heat exchanger 625 is provided in the outside air passage 643. The air supply heat exchanger 625 is connected to the heat-source-side unit 603. The compressor 633, the outdoor heat exchanger 634, and the capillary tube 636 that constitute a refrigerant circuit 610 along with the air supply heat exchanger 625 are provided in the heat-source-side unit 603. The compressor 633, the outdoor heat exchanger 634, and the capillary tube 636 are connected to a refrigerant pipe 645. An outdoor fan (not shown) is provided in parallel with the outdoor heat exchanger 634. In the air conditioning apparatus 601, the indoor air RA is sucked into the suction passage 644 by driving the exhaust fan 627, and the outdoor air OA is sucked into the outside air passage 643 by driving the air supply fan 628. At this time, the outdoor air OA sucked into the outside air passage 643 is cooled and dehumidified at the air supply heat exchanger 625 that functions as an evaporator, and reaches the sensible heat exchanger 622. In the sensible heat exchanger 622, the outdoor air OA exchanges sensible heat with the indoor air RA sucked into the suction passage 644. Due to the sensible heat exchange, the outdoor air OA is kept dehumidified and only its temperature becomes substantially equal to the temperature of the indoor air RA. The outdoor air OA is supplied into the interior as the supply air SA. On the other hand, the indoor air RA cooled at the sensible heat exchanger 622 is discharged to the exterior as exhaust EA.

The air conditioning apparatus 601 of the third embodiment cools the outdoor air OA at the air supply heat exchanger 625. The air cooled at the air supply heat exchanger 625 reaches the sensible heat exchanger 622. The air conditioning apparatus 601 causes the air cooled at the air supply heat exchanger 625 and the indoor air RA to exchange sensible heat at the sensible heat exchanger 622. The air conditioning apparatus 601 supplies the air that has exchanged sensible heat with the indoor air RA to be subsequently supplied as the supply air SA to the interior.

However, the structure of introducing the outdoor air is not limited thereto. For example, the air conditioning apparatus previously causes the outdoor air OA and the indoor air RA to exchange sensible heat at the sensible heat exchanger. Then, the air conditioning apparatus cools the air that has exchanged sensible heat with the indoor air RA at the use-side heat exchanger. The air conditioning apparatus supplies the air cooled at the use-side heat exchanger as the supply air SA into the interior.

The air conditioning apparatus may be configured to heat the outdoor air OA and supply the outdoor air OA into the interior so as to deal with seasons having low outdoor air temperatures. Such an air conditioning apparatus causes, for example, the outdoor air OA and the indoor air RA to exchange sensible heat at the sensible heat exchanger. The air conditioning apparatus then heats the air that has exchanged sensible heat with the indoor air RA at the use-side heat exchanger. The air conditioning apparatus supplies the air heated at the use-side heat exchanger as the supply air SA into the interior.

Since the air conditioning apparatus has a structure such as that described above, the outdoor air OA whose temperature has been previously adjusted at the sensible heat exchanger can be cooled or heated at the use-side heat exchanger afterwards, so that it is possible to increase the refrigeration cycle efficiency.

In the present embodiment, the refrigerant circuit 610 is filled with a refrigerant for performing a vapor compression refrigeration cycle. The refrigerant is a mixed refrigerant containing 1,2-difluoroethylene, and any one of the refrigerants A to D above may be used.

(17-4) Features

The air conditioning apparatus (1, 601, 701) of the first embodiment, the second embodiment, and the third embodiment above each include the compressor (321, 633, 741), the indoor heat exchanger 242, the air supply heat exchanger 625 or the use-side heat exchanger 745, the outdoor heat exchanger (323, 634) or the heat-source-side heat exchanger 743, any one of the refrigerants A to D, the first duct (209, 721) or the air supply duct 651, and the casing (230, 621, 730).

The indoor heat exchanger 242, the air supply heat exchanger 625, or the use-side heat exchanger 745 is a use-side heat exchanger that exchanges heat with the first air. The outdoor heat exchanger (323, 634) or the heat-source-side heat exchanger 743 is a heat-source-side heat exchanger that exchanges heat with the second air. The first duct (209, 721) or the air supply duct 651 is a first duct that supplies the first air into the plurality of rooms (101 to 104, 810). The refrigerants A to D contain at least 1,2-difluoroethylene, and circulate in the compressor, the use-side heat exchanger, and the heat-source-side heat exchanger to repeat the refrigeration cycle. The casings (230, 621, 730) each include the use-side space SP2 that is connected to the first duct (209, 721) or the air supply duct 651 and that accommodates the indoor heat exchanger 242, the air supply heat exchanger 625, or the use-side heat exchanger 745, and is configured to allow the first air after heat exchange with a refrigerant at the indoor heat exchanger 242, the air supply heat exchanger 625, or the use-side heat exchanger 745 to be sent out to the first duct (209, 721) or the air supply duct 651.

Since the air conditioning apparatus (1, 601, 701) having such a structure each supply the first air after heat exchange to the plurality of rooms via the first duct (209, 721) or the air supply duct 651, the structures of the refrigerant circuits (320, 711, 610) are simplified. Therefore, it is possible to reduce the amount of refrigerant with which the air conditioning apparatus (1, 601, 701) are filled.

(18) Embodiment of the Technique of Eighteenth Group

(18-1) First Embodiment

A refrigeration cycle illustrated in FIG. 18A is a vapor compression refrigeration cycle using a nonazeotropic mixed refrigerant. In FIG. 18A, reference sign 1 denotes a compressor, 2 denotes a use-side heat exchanger, 3 denotes a heat-source-side heat exchanger, and 4 denotes a first capillary tube that acts as an expansion mechanism. The devices are connected via a four-way switching valve 5 to constitute a reversible cycle. Reference sign 6 denotes an accumulator.

In the present embodiment, the refrigeration cycle is filled with a refrigerant for performing a vapor compression refrigeration cycle. The refrigerant is a mixed refrigerant containing 1,2-difluoroethylene, and can use any one of the above-described refrigerants A to D.

In the refrigeration cycle, the heat-source-side heat exchanger 3 is divided into a first heat exchange section 31 and a second heat exchange section 32. The first and second heat exchange sections 31 and 32 are connected in series via a second capillary tube 7 serving as a decompression mechanism. During heating operation, the second capillary tube 7 decreases the evaporation pressure of the mixed refrigerant while the mixed refrigerant flows through the heat-source-side heat exchanger 3. Reference sign 8 denotes a check valve provided to cause the mixed refrigerant to bypass the second capillary tube 7 during cooling operation.

The compressor 1, the heat-source-side heat exchanger 3, the first capillary tube 4, the four-way switching valve 5, the accumulator 6, and the second capillary tube 7 are disposed in a heat source unit 50 situated outside a room. The use-side heat exchanger 2 is disposed in a use unit 60 situated inside the room.

As illustrated in FIG. 18B, the use unit 60 has a rear surface that is fixed to a side wall WL in the room. The indoor air flows into the use-side heat exchanger 2 from the front-surface side (the left side in FIG. 18B) and the upper-surface side of the use unit 60. The use-side heat exchanger 2 includes a third heat exchange section 21 located on the front-surface side of the use unit 60, and a fourth heat exchange section 22 located on the rear-surface side of the use unit 60. An upper portion of the fourth heat exchange section 22 is located near an upper portion of the third heat exchange section 21. The third heat exchange section 21 extends obliquely downward from the upper portion thereof toward the front-surface side of the use unit 60. The fourth heat exchange section 22 extends obliquely downward from the upper portion thereof toward the rear-surface side of the use unit 60. The capacity of the refrigerant flow path of the third heat exchange section 21 is larger than the capacity of the refrigerant flow path of the fourth heat exchange section 22. The air velocity of the air passing through the third heat exchange section 21 is fast and the air velocity of the air passing through the fourth heat exchange section 22 is slow. The third heat exchange section 21 and the fourth heat exchange section are designed to have the capacities of the refrigerant flow paths in accordance with the air velocities. Thus, the efficiency of heat exchange of the use-side heat exchanger 2 is increased.

Next, setting of the decompression amount of each of the capillary tubes 4 and 7 is described based on the Mollier diagram in FIG. 18C.

In FIG. 18C, T1 is an isotherm indicating a frost limit temperature (for example, −3° C.) and T2 is an isotherm indicating a standard outside air temperature (for example, 7° C.) during heating operation.

The decompression amount of the first capillary tube 4 on the inlet side of the first heat exchange section 31 is set to a pressure P1 with which the evaporation temperature of the refrigerant at the inlet of the first heat exchange section 31 becomes a temperature T3 that is slightly higher than the frost limit temperature T1 during heating operation.

The decompression amount of the second capillary tube 7 disposed between the first and second heat exchange sections 31 and 32 is determined in accordance with the temperature gradient of the mixed refrigerant. Specifically, the decompression amount of the second capillary tube 7 is set to attain decompression to a pressure P2 with which the evaporation temperature at the inlet of the second heat exchange section 32 becomes a temperature T5 that is equal to or higher than the frost limit temperature T1 and the evaporation temperature at the outlet of the second heat exchange section 32 becomes a temperature T6 that is lower than the standard outside air temperature T2.

Next, the operation of the refrigeration cycle is described.

During heating operation, the four-way switching valve (5) is switched to the state indicated by solid lines in FIG. 18A, thereby forming a heating cycle. When the compressor 1 is driven, the mixed refrigerant circulates through the compressor 1, the use-side heat exchanger 2, the first capillary tube 4, the heat-source-side heat exchanger 3, and the accumulator 6 in that order. A change in state of the mixed refrigerant due to the circulation is described using the Mollier diagram in FIG. 18C.

The mixed refrigerant is discharged as a high-temperature high-pressure gas with a pressure P0 from the compressor 1 (point C1 in FIG. 18C). Then, the gas refrigerant is condensed under the same pressure in the use-side heat exchanger 2, and hence the refrigerant is turned into the refrigerant in a liquid state (C2). Next, the refrigerant is expanded (decompressed) in the first capillary tube 4, the refrigerant becomes a state with the pressure P1, and the refrigerant flows into the first heat exchange section 31 of the heat-source-side heat exchanger 3 (C3).

The refrigerant which has flowed into the first heat exchange section 31 starts evaporating at a temperature T3 that is higher than the frost limit temperature T1 near the inlet of the first heat exchange section 31. Due to the evaporation, the evaporation temperature near the outlet of the first heat exchange section 31 increases to T4 (however, T2 or less) (C4). The mixed refrigerant which has flowed out from the first heat exchange section 31 is decompressed in the second capillary tube 7 again and the pressure thereof becomes the pressure P2. By this, the evaporation temperature at the inlet of the second heat exchange section 32 decreases to a temperature T5 that is lower than the evaporation temperature at the outlet of the first heat exchange section 31 and that is higher than the frost limit temperature T1 (C5).

By the evaporation in the second heat exchange section 32, the evaporation temperature of the refrigerant increases, and the refrigerant becomes the gas refrigerant at a temperature T6 that is lower than the standard outside air temperature T2 near the outlet of the second heat exchange section 32. Then, the refrigerant returns to the compressor 1 and is compressed again.

In this way, since the second capillary tube 7 serving as a decompression mechanism is provided between the first heat exchange section 31 and the second heat exchange section 32 of the heat-source-side heat exchanger 3, the difference in the evaporation temperature between the inlet and the outlet of the heat-source-side heat exchanger 3 decreases. In other words, in the refrigeration cycle, the degree of increase in the evaporation temperature in the heat-source-side heat exchanger 3 decreases. Accordingly, the evaporation temperature can be shifted within a proper evaporation temperature. The difference between the outside air temperature and the evaporation temperature can be ensured while frost (frosting) in the heat-source-side heat exchanger 3 is avoided. With the advantageous effects, in the refrigeration cycle, the efficiency of heat exchange of the heat-source-side heat exchanger 3 increases.

Moreover, in the refrigeration cycle, even when a mixed refrigerant having a large temperature gradient of the evaporation temperature is used, a decrease in the capacity of the heat-source-side heat exchanger 3 is suppressed.

When the four-way switching valve 5 is switched to a state indicated by broken lines, a cooling operation can be performed. This is, however, like related art, and the description is omitted.

(18-2) Second Embodiment

A refrigeration cycle illustrated in FIG. 18D is a heat pump refrigeration apparatus using a nonazeotropic refrigerant similarly to the above-described refrigeration cycle according to the first embodiment. The different point from the first embodiment is that the composition of the mixed refrigerant is changed to allow the capacity to be increased or decreased in accordance with the load. Specifically, a gas-liquid separator 9 is provided between third and fourth capillary tubes 41 and 42 that operate as an expansion mechanism. A container 11 for storing a refrigerant is provided in a suction gas pipe 10. One end of the container 11 is connected to a gas region of the gas-liquid separator 9 via a first open-close valve 12. The other end of the container 11 is connected to the suction gas pipe 10 via the second open-close valve 13.

Bringing the second open-close valve 13 into a closed state and the first open-close valve 12 into an open state allows the mixed refrigerant with a large proportion of a low-boiling-point refrigerant to flow into the container 11 from the gas-liquid separator 9, and hence the refrigerant can be condensed and stored. Accordingly, the composition ratio of a high-boiling-point refrigerant in the circulating mixed refrigerant increases, and the capacity can be decreased.

Moreover, bringing the second open-close valve 13 into an open state and the first open-close valve 12 into a closed state allows the composition ratio of the mixed refrigerant to be returned to the original state and the capacity is increased.

The other configurations are similar to those of the first embodiment, and hence the same reference sign as that of the configuration according to the first embodiment is applied in FIG. 18D and the description is omitted.

In each embodiment described above, the evaporation pressure in the heating operation has two steps; however, the heat-source-side heat exchanger 3 may be divided into three or more sections, decompression mechanisms may be provided between the divided heat exchange sections, and the evaporation pressure may be changed by three or more steps.

In each embodiment described above, the capillary tube 7 is provided as a decompression mechanism; however, a decompression mechanism may be constituted by determining the inner diameter of the heat transfer tube of the heat-source-side heat exchanger 3 so as to obtain a proper decompression gradient.

Moreover, the decompression amount of the decompression mechanism may not be set such that the evaporation temperature at the inlet of the heat-source-side heat exchanger 3 is equal to or higher than the frost limit temperature during heating operation.

(19) Embodiment of the Technique of Nineteenth Group

(19-1) First Embodiment

In the present embodiment, a refrigerant circuit 10 is filled with a refrigerant for performing a vapor compression refrigeration cycle. The refrigerant is a mixed refrigerant including 1,2-difluoroethylene, and any of the refrigerants A to D described above may be used.

FIG. 19A is a piping system diagram of the refrigerant circuit 10 in an air conditioner 1 according to the first embodiment of the present disclosure. The air conditioner 1 is a heat-pump air conditioner that is capable of performing a cooling operation and a heating operation. As illustrated in FIG. 19A, the air conditioner 1 includes an outdoor unit 100 placed outdoors and an indoor unit 200 placed indoors. The outdoor unit 100 and the indoor unit 200 are connected to each other via a first connection pipe 11 and a second connection pipe 12, and constitute the refrigerant circuit 10, through which a refrigerant circulates and which performs a vapor compression refrigeration cycle.

<Indoor Unit>

In the indoor unit 200, an indoor heat exchanger 210, which causes a refrigerant to exchange heat with outdoor air, is provided. As the indoor heat exchanger 210, for example, a cross-fin type fin-and-tube heat exchanger may be used. An indoor fan 211 is disposed in the vicinity of the indoor heat exchanger 210.

<Outdoor Unit>

In the outdoor unit 100, a compressor 13, an oil separator 14, an outdoor heat exchanger 15, an outdoor fan 16, an expansion valve 17, an accumulator 18, a four-way valve 19, a refrigerant jacket 20, and an electric circuit 30 are provided, and contained in a case (an outdoor unit casing 70 described below).

The compressor 13 sucks a refrigerant from a suction port, compresses the refrigerant, and discharges the compressed refrigerant from a discharge port. As the compressor 13, for example, various compressors such as a scroll compressor may be used.

The oil separator 14 separates a mixture of a refrigerant and a lubricating oil, which is discharged from the compressor 13, into the refrigerant and the lubricating oil, feeds the refrigerant to the four-way valve 19, and returns the lubricating oil to the compressor 13.

The outdoor heat exchanger 15 is a heat exchanger, such as a cross-fin type fin-and-tube heat exchanger, for causing a refrigerant to exchange heat with outdoor air. The outdoor fan 16, which feeds outdoor air to the outdoor heat exchanger 15, is placed in the vicinity of the outdoor heat exchanger 15.

The expansion valve 17 is connected to the outdoor heat exchanger 15 and the indoor heat exchanger 210, expands a refrigerant that has flowed thereinto, decompresses the refrigerant to a predetermined pressure, and then causes the refrigerant to flow out therefrom. The expansion valve 17 may be formed of, for example, an electronic expansion valve whose opening degree is variable.

The accumulator 18 separates an incoming refrigerant into a gas refrigerant and a liquid refrigerant, and feeds the separated gas refrigerant to the compressor 13.

The four-way valve 19 has four ports, which are first to fourth ports. The four-way valve 19 is switchable between: a first state in which the first port and the third port communicate and simultaneously the second port and the fourth port communicate (a state shown by a solid line in FIG. 19A); and a second state in which the first port and the fourth port communicate and simultaneously the second port and the third port communicate (a state shown by a broken line in FIG. 19A). In the outdoor unit 100, the first port is connected to the discharge port of the compressor 13 via the oil separator 14, and the second port is connected to the suction port of the compressor 13 via the accumulator 18. The third port is connected to the second connection pipe 12 via the outdoor heat exchanger 15 and the expansion valve 17, and the fourth port is connected to the first connection pipe 11. When a cooling operation is performed in the outdoor unit 100, the four-way valve 19 is switched to the first state, and, when a heating operation is performed, the four-way valve 19 is switched to the second state.

The refrigerant jacket 20 is, for example, made by forming a metal such as aluminum into a flat rectangular-parallelepiped shape. The refrigerant jacket 20 covers a part of a refrigerant pipe 21 that connects the outdoor heat exchanger 15 and the expansion valve 17, and is thermally connected to the refrigerant pipe 21. To be specific, as illustrated in FIG. 19B, the refrigerant jacket 20 has two through-holes into which the refrigerant pipe 21 is fitted. The refrigerant pipe 21 passes through one of the through-holes, then bends in a U-shape, and passes through the other through-hole. That is, a refrigerant used for a refrigeration cycle flows through the inside of the refrigerant jacket 20.

The electric circuit 30 controls the rotation speed of the motor of the compressor 13 and the like. The electric circuit 30 is formed on a printed circuit board 31, and the printed circuit board 31 is fixed in a switch box 40 by using spacers 32. As illustrated in FIG. 19B, a power device 33 and the like are disposed on the printed circuit board 31. The power device 33 is, for example, a switching device of an inverter circuit that supplies electric power to the motor of the compressor 13. The power device 33 generates heat when the compressor 13 is operating, and, if the power device 33 is not cooled, the temperature of the power device 33 may exceed an operable temperature (for example, 90° C.) of the power device 33. Therefore, in the air conditioner 1, the power device 33 is cooled by using a refrigerant that flows through the refrigerant jacket 20.

To be specific, in the air conditioner 1, the refrigerant jacket 20 is fixed to the switch box 40 as illustrated in FIG. 19B, and the power device 33 in the switch box 40 is cooled. To be more specific, the switch box 40 has a flat box-like shape one side of which is open and has a through-hole 40*a* formed in a surface thereof facing the opening. A heat transfer plate 50 having a plate-like shape is attached to the switch box 40 by using attachment screws 51 so as to cover the through-hole 40*a*. The heat transfer plate 50 is made of a material having a comparatively low thermal resistance, such as aluminum.

To the heat transfer plate 50, the refrigerant jacket 20 is fixed from the outside of the switch box 40 by using attachment screws 51, and the power device 33 is fixed from the inside of the switch box 40 by using attachment screws 51. With this structure, heat of the power device 33 is transferred to the refrigerant jacket 20 via the heat transfer plate 50, and is released to a refrigerant that flows through the refrigerant jacket 20.

To be specific, in the refrigerant jacket 20, a refrigerant condensed by the outdoor heat exchanger 15 and having a lower temperature than the power device 33 flows during a cooling operation, and a refrigerant condensed by the indoor heat exchanger 210 and having a lower temperature than the power device 33 flows during a heating operation. Therefore, heat generated by the power device 33 of the electric circuit 30 is transferred to the refrigerant jacket 20 via the heat transfer plate 50, and is released to the refrigerant in the refrigerant pipe 21 in the refrigerant jacket 20. Thus, the power device 33 is maintained at an operable temperature.

FIG. 19C schematically illustrates the cross-sectional shape of the outdoor unit 100 and the arrangement of main components such as the compressor 13. As illustrated in FIG. 19C, the outdoor unit casing 70 is partitioned into two chambers by a partition plate 60. In one of the chambers (heat exchange chamber), the outdoor heat exchanger 15, which has an L-shaped cross-sectional shape, is disposed so as to face a side surface and a back surface of the outdoor unit casing 70, and the outdoor fan 16 is placed in the vicinity of the outdoor heat exchanger 15. In the other chamber (machine chamber), the refrigerant jacket 20, the compressor 13, the switch box 40, and the like are disposed. To be specific, the outdoor unit casing 70 has a service opening 71, which extends therethrough to the machine chamber, in a front surface thereof. The heat transfer plate 50 side of the switch box 40 faces toward the proximal side as seen from the service opening 71. The refrigerant jacket 20 is disposed on the proximal side relative to the heat transfer plate 50 as seen from the service opening 71 (that is, on the proximal side relative to the power device 33).

—Installation of Switch Box 40 into Outdoor Unit Casing 70—

In the present embodiment, the printed circuit board 31 and the heat transfer plate 50 are attached to the switch box 40 in advance. To be specific, first, the heat transfer plate 50 is fixed to the switch box 40 by using the attachment screws 51. In this state, the printed circuit board 31 is placed in the switch box 40 and fixed to the switch box 40 via the spacers 32, and the power device 33 is fixed and thermally connected to the heat transfer plate 50 by using the attachment screws 51. The switch box 40, which is assembled as described above, is placed into the outdoor unit casing 70 from the service opening 71, for example, when manufacturing the air conditioner 1 or when installing the printed circuit board 31 again for repair or the like.

FIG. 19D is a front view of the outdoor unit 100. In this example, the outdoor unit casing 70 has, above the refrigerant jacket 20, a space that allows the switch box 40 to be passed therethrough, and the service opening 71 opens also to the space. The switch box 40 is installed into the outdoor unit casing 70 from the service opening 71. In this case, the switch box 40 is moved over the refrigerant jacket 20 and placed at a position on the distal side relative to the refrigerant jacket 20. At this time, the switch box 40 is placed so that the heat transfer plate 50 side is on the proximal side (that is, a side facing the refrigerant jacket 20). In this state, the refrigerant jacket 20 and the heat transfer plate 50 are fixed to each other by using the attachment screws 51.

If there is a gap between the refrigerant jacket 20 and the heat transfer plate 50 at this time, heat exchange is not appropriately performed between the refrigerant jacket 20 and the power device 33, and a desirable cooling effect cannot be obtained. In the present embodiment, the refrigerant jacket 20 is disposed on the proximal side relative to the power device 33 as seen from the service opening 71. Therefore, when fixing the refrigerant jacket 20 and the heat transfer plate 50 to each other by using the attachment screws 51, the state of connection therebetween can be visually checked. Accordingly, with the present embodiment, it is possible to appropriately connect the refrigerant jacket 20 and the power device 33 to each other during manufacturing, during repair, and the like and to obtain a desirable cooling effect.

(19-2) Second Embodiment

Also in the present embodiment, the refrigerant is a mixed refrigerant including 1,2-difluoroethylene, and any of the refrigerants A to D described above may be used.

FIG. 19E illustrates the internal structure of an outdoor unit 100 of an air conditioner 1 according to the second embodiment of the present disclosure. The outdoor unit 100 according to the present embodiment differs from the first embodiment in that the refrigerant jacket 20 is constituted by a heat pipe 20A attached to a heat radiation plate 50. The heat pipe 20A is a pipe that is hermetically filled with a refrigerant. Because the heat pipe 20A does not communicate with the refrigerant circuit that performs a refrigerant cycle, the heat pipe 20A does not supply the refrigerant to the refrigerant circuit and does not receive the refrigerant from the refrigerant circuit.

The outdoor unit 100 according to the second embodiment includes a casing 70 and a partition plate 60 provided in the casing 70. The partition plate 60 partitions the inner space of the casing 70 into a heat exchange chamber 81, a machine chamber 82, and a control equipment chamber 83. In the machine chamber 82, a compressor 13, an accumulator 18, a suction pipe 91, and a coupling pipe 92 are provided. The compressor 13, the accumulator 18, the suction pipe 91, and the coupling pipe 92 belong to a refrigerant circuit that performs a refrigeration cycle. The suction pipe 91 introduces a refrigerant in a low pressure gas state into the accumulator 18. The coupling pipe 92 connects a suction opening of the compressor 13 to the accumulator 18. In the control equipment chamber 83, a power device 33, the heat radiation plate 50, and a refrigerant jacket 20 are provided. The power device 33 is thermally connected to the refrigerant jacket 20, as in the first embodiment.

The refrigerant jacket 20, that is, the heat pipe 20A includes a left-end vertical portion X, an inclined portion Y, ad a right-end vertical portion Z. The left-end vertical portion X is configured to be in contact with the heat radiation plate 50. The suction pipe 91 is disposed so as to be in contact with the right-end vertical portion Z via an elastic material 93. The elastic material 93 is a material having a comparatively high thermal conductivity, such as silicone rubber.

Heat generated by the power device 33 is transferred to the heat pipe 20A at the left-end vertical portion X. Due to the heat, a refrigerant inside the left-end vertical portion X evaporates. A gas refrigerant, which is generated due to the evaporation, moves upward in the inclined portion Y, and reaches the right-end vertical portion Z. At the right-end vertical portion Z, the gas refrigerant releases heat to the suction pipe 91. As a result, the gas refrigerant condenses and changes into a liquid refrigerant. The liquid refrigerant moves downward in the inclined portion Y, and reaches the left-end vertical portion X. Thus, the power device 33 is cooled by using a low-cost configuration using the heat pipe 20A.

(20) Embodiment of the Technique of Twentieth Group (20-1) Embodiment

Hereafter, an air conditioner according to an embodiment of the present disclosure will be described. In the present embodiment, a refrigerant circuit of an air conditioner 10 is filled with a refrigerant for performing a vapor compression refrigeration cycle. The refrigerant is a mixed refrigerant including 1,2-difluoroethylene, and any of the refrigerants A to D described above may be used.

<Overall Configuration of Air Conditioner 10>

As illustrated in FIG. 20A, the air conditioner 10 according to the present embodiment includes a refrigerant circuit in which a compressor 1, a four-way valve 2, an outdoor heat exchanger 3, an expansion valve 4 as an example of a decompressor, a first indoor heat exchanger 5, an electromagnetic valve 6 for dehumidification, and a second indoor heat exchanger 7 are connected in a ring shape. The air conditioner 10 includes an outdoor fan 8 disposed in the vicinity of the outdoor heat exchanger 3, and an indoor fan 9 disposed in the vicinity of the first indoor heat exchanger 5 and the second indoor heat exchanger 7. The electromagnetic valve 6 for dehumidification is disposed between the first indoor heat exchanger 5 and the second indoor heat exchanger 7.

In the air conditioner 10, during a cooling operation, the four-way valve 2 is switched to the position shown by a solid line in a state in which the electromagnetic valve 6 for dehumidification is open; and a refrigerant discharged from the compressor 1 returns to the suction side of the compressor 1 via the outdoor heat exchanger 3, the expansion valve 4, the first indoor heat exchanger 5, the electromagnetic valve 6 for dehumidification, and the second indoor heat exchanger 7. In the refrigerant circuit, the outdoor heat exchanger 3, which serves as a condenser, releases heat; and the first indoor heat exchanger 5 and the second indoor heat exchanger 7, each of which serves as an evaporator, cool indoor air to perform cooling. During a heating operation, the four-way valve 2 is switched to the position shown by a dotted line, and heating is performed with a refrigeration cycle opposite to that during the cooling operation.

In a reheat dehumidification operation, the expansion valve 4 is opened and the electromagnetic valve 6 for dehumidification is closed to be in a throttled state; further, the four-way valve 2 is switched to the position shown by the solid line; and a refrigerant discharged from the compressor 1 returns to the suction side of the compressor 1 via the outdoor heat exchanger 3, the expansion valve 4, the first indoor heat exchanger 5, the electromagnetic valve 6 for dehumidification, and the second indoor heat exchanger 7. In the refrigerant circuit, each of the outdoor heat exchanger 3 and the first indoor heat exchanger 5 serves as a condenser, and the second indoor heat exchanger 7 serves as an evaporator. Accordingly, the second indoor heat exchanger 7 dehumidifies and cools indoor air while the first indoor heat exchanger 5 warms indoor air, so that dehumidification is performed without lowering the indoor temperature. Accordingly, comfort is maintained in the reheat dehumidification operation.

FIG. 20B illustrates the electromagnetic valve 6 for dehumidification in an open state, and FIG. 20C illustrates the electromagnetic valve 6 for dehumidification in a throttled state (closed state). As illustrated in FIGS. 20B and 20C, the electromagnetic valve 6 for dehumidification includes a valve body 20 and an opening-closing mechanism 30. The valve body 20 includes a cylindrical portion 11 that includes a valve chest 19 and a valve seat 12 formed in a lower part of the valve chest 19, a valve body 13 that has a tapered surface 13*b* facing a tapered surface 12*a* of the valve seat 12, and a guide portion 14 that is fitted into an upper part of the cylindrical portion 11 and guides a stem 13*a* of the valve body 13 in the axial direction. The cylindrical portion 11 has an inlet 11*a*, to which an inlet-side passage 31 is connected, and an outlet 11*b*, to which an outlet-side passage 32 is connected.

The opening-closing mechanism 30 includes a coil spring 15 disposed outside of the stem 13*a* of the valve body 13, a cylindrical plunger 16 fixed to an end of the stem 13*a* of the valve body 13, an electromagnetic guide 17 disposed in the plunger 16, and an electromagnetic coil 18 disposed outside of the plunger 16 and the electromagnetic guide 17. The coil spring 15 urges the plunger 16 toward the electromagnetic guide 17.

As illustrated in FIG. 20D, a plurality of grooves (bleed grooves) 21 are formed in the tapered surface 12*a* of the valve seat 12. Accordingly, when the electromagnetic valve 6 for dehumidification is in the throttled state (closed state) as illustrated in FIG. 20C, between the tapered surface 13*b* of the valve body 13 and the tapered surface 12*a* of the valve seat 12, a refrigerant throttled passage having a small gap is formed from the plurality of grooves 21 in the tapered surface 12*a* of the valve seat 12.

In the electromagnetic valve 6 for dehumidification, which is configured as described above, when the electromagnetic coil 18 is energized, an electromagnetic force is generated between the electromagnetic guide 17 and the plunger 16, the plunger 16 moves downward against an urging force of the coil spring 15, and the tapered surface 13*b* of the valve body 13 contacts the tapered surface 12*a* of the valve seat 12. Accordingly, although the space between the tapered surface 13*b* of the valve body 13 and the tapered surface 12*a* of the valve seat 12 is closed, a refrigerant throttled passage having a small gap is formed due to the plurality of grooves 21 in the tapered surface 12*a* of the valve seat 12. Thus, the electromagnetic valve 6 for dehumidification enters the throttled state (closed state); and the inlet 11*a*, to which the inlet-side passage 31 is connected, and the outlet 11*b*, to which the outlet-side passage 32 is connected, communicate with each other via the plurality of grooves 21 of the valve seat 12.

When the electromagnetic coil 18 is deenergized, the electromagnetic force between the electromagnetic guide 17 and the plunger 16 vanishes, the plunger 16 moves upward due to an urging force of the coil spring 15, and the tapered surface 13*b* of the valve body 13 becomes separated from the tapered surface 12*a* of the valve seat 12. Accordingly, the electromagnetic valve 6 for dehumidification enters an open state, and the inlet 11*a*, to which the inlet-side passage 31 is connected, and the outlet 11*b*, to which the outlet-side passage 32 is connected, communicate with each other.

In the embodiment described above, the air conditioner 10 includes the electromagnetic valve 6 for dehumidification that can be switched between the open state and the closed state. Instead, the air conditioner 10 may include an expansion valve for dehumidification whose opening degree can be adjusted.

(21) Embodiment of the Technique of Twenty-First Group

(21-1) Overall Structure of Air Conditioner

As illustrated in FIG. 21A, an air conditioner 1 according to the present embodiment includes an indoor unit 2 installed in an indoor space and an outdoor unit 3 installed in an outdoor space. The air conditioner 1 includes a refrigerant circuit 50, in which a compressor 10, a four-way valve 11, an outdoor heat exchanger 12, an expansion valve 13, and an indoor heat exchanger 14 are connected. In the refrigerant circuit 50, the outdoor heat exchanger 12 is connected to the discharge opening of the compressor 10 via the four-way valve 11, and the expansion valve 13 is connected to the outdoor heat exchanger 12. One end of the indoor heat exchanger 14 is connected to the expansion valve 13, and, to the other end of the indoor heat exchanger 14, the suction opening of the compressor 10 is connected via the four-way valve 11. The indoor heat exchanger 14 includes an auxiliary heat exchanger 20 and a main heat exchanger 21.

The refrigerant circuit 50 is filled with a refrigerant for performing a vapor compression refrigeration cycle. The refrigerant is a mixed refrigerant including 1,2-difluoroethylene, and any of the refrigerants A to D described above may be used.

The air conditioner 1 can perform operations in a cooling operation mode, a predetermined dehumidifying operation mode, and a heating operation mode. A remote controller 41 allows a user to select one of the operation modes, start the operation, to switch between the operations, and to stop the operation. The remote controller 41 allows a user to set a set temperature of the indoor temperature and to change the airflow rate of the indoor unit 2 by changing the rotation speed of the indoor fan.

In the cooling operation mode and the predetermined dehumidifying operation mode, as indicated by solid-line arrows in the figure, a cooling cycle or a dehumidification cycle is formed as follows: a refrigerant discharged from the compressor 10 flows in order from the four-way valve 11 to the outdoor heat exchanger 12, the expansion valve 13, the auxiliary heat exchanger 20, and the main heat exchanger 21; and the refrigerant that has passed through the main heat exchanger 21 returns to the compressor 10 through the four-way valve 11. That is, the outdoor heat exchanger 12 functions as a condenser, and the indoor heat exchanger 14 (the auxiliary heat exchanger 20 and the main heat exchanger 21) functions as an evaporator.

In the heating operation mode, as the four-way valve 11 is switched, as indicated by broken-line arrows in the figure, a heating cycle is formed as follows: a refrigerant discharged from the compressor 10 flows in order from the four-way valve 11 to the main heat exchanger 21, the auxiliary heat exchanger 20, the expansion valve 13, and the outdoor heat exchanger 12; and the refrigerant that has passed through the outdoor heat exchanger 12 returns to the compressor 10 through the four-way valve 11. That is, the indoor heat exchanger 14 (the auxiliary heat exchanger 20 and the main heat exchanger 21) functions as a condenser, and the outdoor heat exchanger 12 functions as an evaporator.

The indoor unit 2 illustrated in FIG. 21B has a suction opening 2*a* for indoor air in an upper surface thereof, and a blow-out opening 2*b* for conditioned air in a front lower part thereof. In the indoor unit 2, an air flow path is formed from the suction opening 2*a* toward the blow-out opening 2*b*, and the indoor heat exchanger 14 and a tangential indoor fan 16 are disposed in the air flow path. Accordingly, when the indoor fan 16 rotates, indoor air is sucked into the indoor unit 2 from the suction opening 2*a*. On the front side of the indoor unit 2, air sucked from the suction opening 2*a* flows toward the indoor fan 16 through the auxiliary heat exchanger 20 and the main heat exchanger 21. On the rear side of the indoor unit 2, air sucked from the suction opening 2*a* flows toward the indoor fan 16 through the main heat exchanger 21.

As described above, the indoor heat exchanger 14 includes the main heat exchanger 21, which is disposed on the downstream side of the auxiliary heat exchanger 20. The main heat exchanger 21 includes a front heat exchanger 21*a* disposed on the front side of the indoor unit 2 and a rear heat exchanger 21*b* disposed on the rear side of the indoor unit 2. The heat exchangers 21*a* and 21*b* are disposed in an inverted-V-shape so as to surround the indoor fan 16. The auxiliary heat exchanger 20 is disposed in front of the front heat exchanger 21*a*. The auxiliary heat exchanger 20 and the main heat exchanger 21 (the front heat exchanger 21*a*, the rear heat exchanger 21*b*) each include heat exchange pipes and a large number of fins.

In the cooling operation mode and the predetermined dehumidifying operation mode, as illustrated in FIG. 21C, a liquid refrigerant is supplied from a liquid inlet 17*a*, which is disposed near a lower end of the auxiliary heat exchanger 20, and the supplied liquid refrigerant flows toward an upper end of the auxiliary heat exchanger 20. Then, the liquid refrigerant flows out from an outlet 17*b*, which is disposed near the upper end of the auxiliary heat exchanger 20, and flows into a branching portion 18*a*. The refrigerant branches in the branching portion 18*a*, and the branched refrigerants are respectively supplied from three inlets 17*c* of the main heat exchanger 21 into a lower part of the front heat exchanger 21*a*, an upper part of the front heat exchanger 21*a*, and the rear heat exchanger 21*b*; and then the refrigerants flow out from outlets 17*d* and join in a joining portion 18*b*. In the heating operation mode, the refrigerant flows in a direction opposite to the direction described above.

In the air conditioner 1, when an operation in the predetermined dehumidifying operation mode is performed, the liquid refrigerant supplied from the liquid inlet 17*a* of the auxiliary heat exchanger 20 evaporates entirely while passing through the auxiliary heat exchanger 20. Accordingly, only the region of one part of the auxiliary heat exchanger 20 near the liquid inlet 17*a* is an evaporation zone 61 in which the liquid refrigerant evaporates. Thus, when operated in the predetermined dehumidifying operation mode, in the indoor heat exchanger 14, only one part of the auxiliary heat exchanger 20 on the upstream side is the evaporation zone 61, and the region of the auxiliary heat exchanger 20 on the downstream side of the evaporation zone 61 and the main heat exchanger 21 are both a superheating zone 62.

A refrigerant that has flowed through the superheating zone 62 near the upper end of the auxiliary heat exchanger 20 flows through a lower part of the front heat exchanger 21*a*, which is disposed on the airflow-downstream side of a lower part of the auxiliary heat exchanger 20. Accordingly, air that has been sucked from the suction opening 2*a* and that has been cooled in the evaporation zone 61 of the auxiliary heat exchanger 20 is heated in the front heat exchanger 21*a*, and then blown out from the blow-out opening 2*b*. Air that has been sucked from the suction opening 2*a* and that has flowed through the superheating zone 62 of the auxiliary heat exchanger 20 and the front heat exchanger 21*a* and air that has been sucked from the suction opening 2*a* and that has flowed through the rear heat exchanger 21*b* are blown out from the blow-out opening 2*b* at substantially the same temperature as the indoor temperature.

As illustrated in FIG. 21A, in the air conditioner 1, an evaporation temperature sensor 30, which detects the evaporation temperature on the downstream side of the expansion valve 13 in the refrigerant circuit 50, is attached to the outdoor unit 3. An indoor temperature sensor 31, which detects the indoor temperature (the temperature of air sucked from the suction opening 2*a* of the indoor unit 2), and an indoor-heat-exchanger temperature sensor 32, which detects that evaporation of a liquid refrigerant has finished in the auxiliary heat exchanger 20, are attached to the indoor unit 2.

As illustrated in FIG. 21C, the indoor-heat-exchanger temperature sensor 32 is disposed on the airflow-downstream side near the upper end of the auxiliary heat exchanger 20. Air sucked from the suction opening 2*a* is hardly cooled in the superheating zone 62 near the upper end of the auxiliary heat exchanger 20. Accordingly, if a temperature detected by the indoor-heat-exchanger temperature sensor 32 is substantially the same as the indoor temperature detected by the indoor temperature sensor 31, it can be detected that evaporation has finished in the auxiliary heat exchanger 20 and the region near the upper end of the auxiliary heat exchanger 20 is the superheating zone 62. The indoor-heat-exchanger temperature sensor 32 is disposed in a heat transfer tube in a middle part of the indoor heat exchanger 14. Accordingly, the condensation temperature or the evaporation temperature in cooling and heating operations can be detected near the middle part of the indoor heat exchanger 14.

As illustrated in FIG. 21D, to a controller 40 of the air conditioner 1, the compressor 10, the four-way valve 11, the expansion valve 13, a motor 16*a* that drives the indoor fan 16, the evaporation temperature sensor 30, the indoor temperature sensor 31, and the indoor-heat-exchanger temperature sensor 32 are connected. Accordingly, the controller 40 controls the air conditioner 1 based on commands from the remote controller 41 (for staring an operation, setting the indoor temperature, and the like), the evaporation temperature detected by the evaporation temperature sensor 30, the indoor temperature detected by the indoor temperature sensor 31 (the temperature of sucked air), and the heat-exchange intermediate temperature detected by the indoor-heat-exchanger temperature sensor 32.

In the air conditioner 1, in the predetermined dehumidifying operation mode, the auxiliary heat exchanger 20 has the evaporation zone 61, in which a liquid refrigerant evaporates, and the superheating zone 62 on the downstream side of the evaporation zone 61; and the compressor 10 and the expansion valve 13 are controlled so that the region of the evaporation zone 61 changes in accordance with a load. Here, the phrase "changes in accordance with a load" means "changes in accordance with the amount of heat supplied to the evaporation zone 61", and the amount of heat is determined, for example, by the indoor temperature (the temperature of sucked air) and the indoor airflow rate. The load corresponds to required dehumidification ability (required cooling ability) and can be detected, for example, based on the difference between the indoor temperature and the set temperature.

The compressor 10 is controlled based on the difference between the indoor temperature and the set temperature. When the difference between the indoor temperature and the set temperature is large, the load is high, and thus the frequency of the compressor 10 is controlled to be increased. When the difference between the indoor temperature and the set temperature is small, the load is low, and thus the frequency of the compressor 10 is controlled to be reduced.

The expansion valve 13 is controlled based on the evaporation temperature detected by the evaporation temperature sensor 30. In the state in which the frequency of the compressor 10 is controlled as described above, the expansion valve 13 is controlled so that the evaporation temperature is within a predetermined range (10° C. to 14° C.) close to the target evaporation temperature (12° C.). Preferably, the predetermined range of the evaporation temperature is controlled to be constant irrespective of the frequency of the compressor 10. However, there is no problem even if the evaporation temperature varies slightly in accordance with the frequency, provided that the evaporation temperature is substantially constant.

In this way, in the predetermined dehumidifying operation mode, the controller 40 changes the region of the evaporation zone 61 of the auxiliary heat exchanger 20 by controlling the compressor 10 and the expansion valve 13 in accordance with a load. The controller 40 can perform control so that the evaporation temperature is within a predetermined range by changing the region of the evaporation zone 61 of the auxiliary heat exchanger 20.

In the air conditioner 1, the auxiliary heat exchanger 20 and the front heat exchanger 21*a* each have twelve tiers of heat transfer tubes. If the number of tiers of the auxiliary heat exchanger 20 that become the evaporation zone 61 in the predetermined dehumidifying operation mode is larger than or equal to the number of tiers of the front heat exchanger 21*a*, the region of the evaporation zone 61 of the auxiliary heat exchanger can be made sufficiently large and thus variation in a load can be sufficiently managed. This is effective, in particular, when the load is high.

FIG. 21E shows change in flow rate when the opening degree of the expansion valve 13 is changed. The opening degree of the expansion valve 13 continuously changes in accordance with the number of drive pulses input thereto. As the opening degree decreases, the flow rate of a refrigerant in the expansion valve 13 decreases. The expansion valve 13 is totally closed when the opening degree is t0, the flow rate increases at a first slope as the opening degree increases from t0 to t1, and the flow rate increases at a second slope as the opening degree increases from t1 to t2. Here, the first slope is steeper than the second slope.

An example of control that is performed so that the region of the evaporation zone 61 of the auxiliary heat exchanger 20 changes will be described. For example, in the predetermined dehumidifying operation mode, if the load increases when the region of the evaporation zone 61 of the auxiliary heat exchanger 20 has a predetermined area, the frequency of the compressor 10 is increased and the opening degree of the expansion valve 13 is increased. Accordingly, the region of the evaporation zone 61 of the auxiliary heat exchanger 20 becomes larger than the predetermined area, and, even when the airflow rate of air sucked into the indoor unit 2 is constant, the airflow rate of air that actually passes through the evaporation zone 61 increases.

On the other hand, in the predetermined dehumidifying operation mode, if the load decreases when the region of the evaporation zone 61 of the auxiliary heat exchanger 20 has a predetermined area, the frequency of the compressor 10 is decreased and the opening degree of the expansion valve 13 is reduced. Accordingly, the region of the evaporation zone 61 of the auxiliary heat exchanger 20 becomes smaller than the predetermined area, and, even when the airflow rate of air sucked into the indoor unit 2 is constant, the airflow rate of air that actually passes through the evaporation zone 61 decreases.

An operation that is performed when a dehumidifying operation mode is selected and an operation for starting the dehumidifying operation mode (dehumidifying operation mode starting operation) is performed on the remote controller 41 of the air conditioner 1 will be described. In the air conditioner 1, if the load is high when the operation for starting the dehumidifying operation mode is performed, the first operation is started without starting the second operation in which only one part of the auxiliary heat exchanger 20 is used as the evaporation zone 61, and subsequently the operation is switched to the second operation in accordance with decrease of the load. Here, the first operation is an operation of blowing, into an indoor space, air whose heat has been exchanged by the indoor heat exchanger 14 by using the entirety of the auxiliary heat exchanger 20 as the evaporation zone.

In the air conditioner 1, the load is detected based on the frequency of the compressor, which changes in accordance with the difference between the indoor temperature and the set temperature. Accordingly, in the air conditioner 1, when the frequency of the compressor 10 is lower than a predetermined frequency, it is detected that the load is low and dehumidification is not possible with the first operation due to increase in evaporation temperature. In the air conditioner 1, the evaporation temperature (the evaporation temperature detected by the evaporation temperature sensor 30 or the heat-exchange intermediate temperature detected by the indoor-heat-exchanger temperature sensor 32) is detected, and, when the evaporation temperature is lower than a predetermined temperature, the operation is not switched to the second operation, because sufficient dehumidification can be performed with the first operation. Accordingly, in the air conditioner 1, the second operation is started when the compressor frequency is lower than the predetermined frequency and the evaporation temperature is higher than the predetermined temperature.

As illustrated in FIG. 21F, first, when the dehumidifying operation mode starting operation is performed on the remote controller 41 (step S), whether the compressor frequency is lower than a predetermined frequency and the evaporation temperature is higher than a predetermined temperature is determined (step S2). The predetermined frequency is the upper-limit frequency in the dehumidifying operation mode. The predetermined temperature is the dehumidification limit temperature in the first operation. If it is determined that the compressor frequency is higher than or equal to the predetermined frequency or the evaporation temperature is lower than or equal to the predetermined temperature (step S2: NO), the first operation is started (step S3). Subsequently, determination in step S2 is repeated. On the other hand, if it is determined in step S2 that the compressor frequency is lower than the predetermined frequency and the evaporation temperature is higher than the predetermined temperature (step S2: YES), the second operation is started (step S4).

In the cooling operation mode, for example, the air conditioner 1 is controlled by the controller 40 so that the first operation is performed and the entirety of the indoor heat exchanger 14 functions as an evaporator.

(21-2) Features of Air Conditioner 1 According to Present Embodiment

21-2-1

In the air conditioner 1 according to the present embodiment, in the dehumidifying operation mode, the auxiliary heat exchanger 20 functions as a first heat exchanger that evaporates a refrigerant in the evaporation zone 61, and the outdoor heat exchanger 12 functions as a second heat exchanger that condenses the refrigerant. In the air conditioner 1, the expansion valve 13 is a decompressor that decompress the refrigerant. The air conditioner 1 includes the refrigerant circuit 50 that can perform dehumidification by evaporating the refrigerant in the evaporation zone 61 of the indoor heat exchanger 14, which is the first heat exchanger, and that is simplified.

In the air conditioner 1 according to the present embodiment, if the load is high when the dehumidifying operation mode starting operation is performed, because sufficient dehumidification is possible even with the first operation due to a low temperature of the heat exchanger, it is possible to efficiently perform dehumidification and cooling simultaneously by starting the first operation. When the indoor temperature decreases and the load decreases, because dehumidification becomes impossible with the first operation due to increase in evaporation temperature, the operation is switched to the second operation at this timing. Thus, it is possible to minimize the effect of deterioration of COP for performing dehumidification.

In the air conditioner 1 according to the present embodiment, if the evaporation temperature is lower than a predetermined temperature after starting the first operation in response to the dehumidifying operation mode starting operation, the operation is not switched to the second operation. In this case, because the evaporation temperature is lower than a predetermined value, it is possible to perform dehumidification without switching from the first operation to the second operation.

21-2-2

To be more specific, in the air conditioner 1, the auxiliary heat exchanger 20 can be regarded as the first heat exchanger. In this case, the air conditioner 1 includes the main heat exchanger 21 that is disposed downstream of the auxiliary heat exchanger 20, which is the first heat exchanger, in the airflow direction. When the first operation is performed in response to the dehumidifying operation mode starting operation, the entirety of the auxiliary heat exchanger 20 functions as the evaporation zone. When the entirety of the auxiliary heat exchanger 20 functions as the evaporation zone, the controller 40 may be configured to be capable of performing control so that the entirety of the main heat exchanger 21 functions as the evaporation zone. When the entirety of the auxiliary heat exchanger 20 functions as the evaporation zone, the controller 40 may be configured to be capable of performing control so that one part of the main heat exchanger 21 functions as the evaporation zone. When the entirety of the auxiliary heat exchanger 20 functions as an evaporation zone, the controller 40 may be configured to be capable of performing control so that the entirety of the main heat exchanger 21 functions as the superheating zone. The controller 40 may be configured by combining one or more of these configurations. In this case, an indoor-heat-exchanger temperature sensor may be added as necessary.

(21-3) Modification (21-3-1) Modification A

In the embodiment described above, the auxiliary heat exchanger 20 is provided in the front heat exchanger 21*a* and is not provided in the rear heat exchanger 21*b*. However, the auxiliary heat exchanger 20 may be provided on the most airflow-upstream side of the rear heat exchanger 21*b*.

(21-3-2) Modification B

In the embodiment described above, the auxiliary heat exchanger and the main heat exchanger may be integrally formed. Accordingly, in this case, the indoor heat exchanger is integrally formed, a part corresponding to the auxiliary heat exchanger is provided on the most airflow-upstream side of the indoor heat exchanger, and a part corresponding to the main heat exchanger is provided on the airflow-downstream side thereof.

In this case, the first operation is an operation that uses the entirety of the part of the indoor heat exchanger on the most airflow-upstream side corresponding to the auxiliary heat exchanger as the evaporation zone, and the second operation is an operation that uses the entirety of the part of the inner heat exchanger on the most airflow-upstream side corresponding to the auxiliary heat exchanger as the evaporation zone.

(21-3-3) Modification C

In the embodiment described above, the air conditioner performs operations in a cooling operation mode, a predetermined dehumidifying operation mode, and a heating operation mode. However, the air conditioner may perform an operation in a dehumidifying operation mode by using a method different from that of the predetermined dehumidifying operation mode.

(21-3-4) Modification D

The embodiment described above may be regarded as follows: the indoor heat exchanger 14 is regarded as a first heat exchanger; one part of the first heat exchanger is used as the evaporation zone in the dehumidifying operation mode; and the entirety of the first heat exchanger is used as the evaporation zone in the cooling operation mode.

(22) Embodiment of the Technique of Twenty-Second Group (22-1) Refrigeration Cycle Apparatus Next, a refrigeration cycle apparatus according to an embodiment of the present disclosure will be described with reference to the drawings.

The refrigeration cycle apparatus of the following embodiment of the present disclosure has a feature in which, at least during a predetermined operation, in at least one of a heat source-side heat exchanger and a usage-side heat exchanger, a flow of a refrigerant and a flow of a heating medium that exchanges heat with the refrigerant are counter flows. Hereinafter, to simplify description, a refrigeration cycle apparatus having such a feature is sometimes referred to as a refrigeration cycle apparatus including a counter-flow-type heat exchanger. Here, counter flow means that a flow direction of a refrigerant in a heat exchanger is opposite to a flow direction of an external heating medium (a heating medium that flows outside a refrigerant circuit). In other words, counter flow means that, in a heat exchanger, a refrigerant flows from the downstream side to the upstream side in a direction in which an external heating medium flows. In the following description, when a flow direction of a refrigerant in a heat exchanger is a forward direction with respect to a flow direction of an external heating medium; in other words, when a refrigerant flows from the upstream side to the downstream side in the direction in which an external heating medium flows, the flow of the refrigerant is referred to as a parallel flow.

The counter-flow-type heat exchanger will be described with reference to specific examples.

When an external heating medium is a liquid (for example, water), the heat exchanger is formed to be a double-pipe heat exchanger as illustrated in FIG. 22A(a), and a flow of a refrigerant and a flow of the external heating medium are enabled to be counter flows, for example, by causing the external heating medium to flow inside an inner pipe P1 of a double pipe from one side to the other side (in the illustration, from the upper side to the lower side) and by causing the refrigerant to flow inside an outer pipe P2 from the other side to the one side (in the illustration, from the lower side to the upper side). Alternatively, the heat exchanger is formed to be a heat exchanger in which a helical pipe P4 is coiled around the outer periphery of a cylindrical pipe P3 as illustrated in FIG. 22A(b), and a flow of a refrigerant and a flow of an external heating medium are enabled to be counter flows, for example, by causing the external heating medium to flow inside the cylindrical pipe P3 from one side to the other side (in the illustration, from the upper side to the lower side) and by causing the refrigerant to flow inside the helical pipe P4 from the other side to the one side (in the illustration, from the lower side to the upper side). Moreover, although illustration is omitted, counter flow may be realized by causing a flow direction of a refrigerant to be opposite to a flow direction of an external heating medium in another known heat exchanger such as a plate-type heat exchanger.

When an external heating medium is air, the heat exchanger can be formed to be, for example, a fin-and-tube heat exchanger as illustrated in FIG. 22B. The fin-and-tube heat exchanger includes, for example, as in FIG. 22B, a plurality of fins F that are arranged in parallel at a predetermined interval and U-shaped heat transfer tubes P5 meandering in plan view. In the fin-and-tube heat exchanger, linear portions parallel to each other that are included in the respective heat transfer tubes P5 and that are a plurality of lines (in FIG. 22B, two lines) are provided so as to penetrate the plurality of fins F. In both ends of each heat transfer tube P5, one end is to be an inlet for a refrigerant and the other end is to be an outlet for the refrigerant. As indicated by arrow X in the figure, a flow of the refrigerant in the heat exchanger and a flow of the external heating medium are enabled to be counter flows by causing the refrigerant to flow from the downstream side to the upstream side in the flow direction Y of the air.

The refrigerant that is sealed in the refrigerant circuit of the refrigeration cycle apparatus according to the present disclosure is a mixed refrigerant containing 1,2-difluoroethylene, and may be any one of the above-described refrigerants A to D can be used. During evaporation and condensation of each of the above-described refrigerants A to D, the temperature of the heating medium increases or decreases.

Such a refrigeration cycle involving temperature change (temperature glide) during evaporation and condensation is called the Lorentz cycle. In the Lorentz cycle, a temperature difference between the temperature of the refrigerant during evaporation and the temperature of the refrigerant during condensation is decreased by causing an evaporator and a condenser that function as heat exchangers performing heat exchange to be counter-flow types. However, it is possible to exchange heat efficiently because the temperature difference that is large enough to effectively transfer heat between the refrigerant and the external heating medium is maintained. In addition, another advantage of the refrigeration cycle apparatus including the counter-flow-type heat exchanger is that a pressure difference is also minimized. Therefore, in the refrigeration cycle apparatus including the counter-flow-type heat exchanger, improvement in energy efficiency and performance can be obtained compared with an existing system.

(22-1-1) First Embodiment

FIG. 22C is a schematic structural diagram of a refrigeration cycle apparatus 10 according to an embodiment.

Here, a case where a refrigerant and air as an external heating medium exchange heat with each other in a usage-side heat exchanger 15, which will be described below, of the refrigeration cycle apparatus 10 will be described as an example. However, the usage-side heat exchanger 15 may be a heat exchanger that performs heat exchange with a liquid (for example, water) as an external heating medium. Here, a case where a refrigerant and a liquid as an external heating medium exchange heat with each other in a heat source-side heat exchanger 13, which will be described below, of the refrigeration cycle apparatus 10 will be described as an example. However, the usage-side heat exchanger 15 may be a heat exchanger that performs heat exchange with air as an external heating medium. In other words, a combination of the external heating medium that exchanges heat with the refrigerant in the heat source-side heat exchanger 13 and the external heating medium that exchanges heat with the refrigerant in the usage-side heat exchanger 15 may be any one of the combinations: (liquid, air), (air, liquid), (liquid, liquid), and (air, air). The same applies to other embodiments.

Here, the refrigeration cycle apparatus 10 is an air conditioning apparatus. However, the refrigeration cycle apparatus 10 is not limited to an air conditioning apparatus, and may be, for example, a refrigerator, a freezer, a water cooler, an ice-making machine, a refrigerating showcase, a freezing showcase, a freezing and refrigerating unit, a refrigerating machine for a freezing and refrigerating warehouse or the like, a chiller (chilling unit), a turbo refrigerating machine, or a screw refrigerating machine.

Here, in the refrigeration cycle apparatus 10, the heat source-side heat exchanger 13 is used as a condenser for the refrigerant, the usage-side heat exchanger 15 is used as an evaporator for the refrigerant, and the external heating medium (in the present embodiment, air) is cooled in the usage-side heat exchanger 15. However, the refrigeration cycle apparatus 10 is not limited to this configuration. In the refrigeration cycle apparatus 10, the heat source-side heat exchanger 13 may be used as an evaporator for the refrigerant, the usage-side heat exchanger 15 may be used as a condenser for the refrigerant, and the external heating medium (in the present embodiment, air) may be heated in the usage-side heat exchanger 15. However, in this case, a flow direction of the refrigerant is opposite to that of FIG. 22C. In this case, counter flow is realized by causing a direction in which the external heating medium flows in each of the heat exchangers 13 and 15 to be also opposite to a corresponding direction in FIG. 22C. When the heat source-side heat exchanger 13 is used as an evaporator for the refrigerant and the usage-side heat exchanger 15 is used as a condenser for the refrigerant, although the use of the refrigeration cycle apparatus 10 is not limited, the refrigeration cycle apparatus 10 may be a hot water supply apparatus, a floor heating apparatus, or the like other than an air conditioning apparatus (heating apparatus).

The refrigeration cycle apparatus 10 includes a refrigerant circuit 11 in which a mixed refrigerant containing 1,2-difluoroethylene is sealed and through which the refrigerant is circulated. Any one of the above-described refrigerants A to D can be used for the mixed refrigerant containing 1,2-difluoroethylene.

The refrigerant circuit 11 includes mainly a compressor 12, the heat source-side heat exchanger 13, an expansion mechanism 14, and the usage-side heat exchanger 15 and is configured by connecting the pieces of equipment 12 to 15 one after another. In the refrigerant circuit 11, the refrigerant circulates in the direction indicated by solid-line arrows of FIG. 22C.

The compressor 12 is a piece of equipment that compresses a low-pressure gas refrigerant and discharges a gas refrigerant at a high-temperature and a high-pressure in the refrigeration cycle. The high-pressure gas refrigerant that has been discharged from the compressor 12 is supplied to the heat source-side heat exchanger 13.

The heat source-side heat exchanger 13 functions as a condenser that condenses the high-temperature and high-pressure gas refrigerant that is compressed in the compressor 12. The heat source-side heat exchanger 13 is disposed, for example, in a machine chamber. In the present embodiment, a liquid (here, cooling water) is supplied to the heat source-side heat exchanger 13 as an external heating medium. The heat source-side heat exchanger 13 is, but is not limited to, a double-pipe heat exchanger, for example. In the heat source-side heat exchanger 13, the high-temperature and high-pressure gas refrigerant condenses to become a high-pressure liquid refrigerant by heat exchange between the refrigerant and the external heating medium. The high-pressure liquid refrigerant that has passed through the heat source-side heat exchanger 13 is sent to the expansion mechanism 14.

The expansion mechanism 14 is a piece of equipment to decompress the high-pressure liquid refrigerant that has dissipated heat in the heat source-side heat exchanger 13 to a low pressure in the refrigeration cycle. For example, an electronic expansion valve is used as the expansion mechanism 14.

However, as illustrated in FIG. 22D, a thermosensitive expansion valve may be used as the expansion mechanism 14. When a thermosensitive expansion valve is used as the expansion mechanism 14, the thermosensitive expansion valve detects the temperature of the refrigerant after the refrigerant passes through the usage-side heat exchanger 15 by a thermosensitive cylinder directly connected to the expansion valve and controls the opening degree of the expansion valve based on the detected temperature of the refrigerant. Therefore, for example, when the usage-side heat exchanger 15, the expansion valve, and the thermosensitive cylinder are provided in the usage-side unit, control of the expansion valve is completed only within the usage-side unit. As a result, low cost and construction savings can be achieved because communications relevant to the control of the expansion valve are not needed between the heat source-side unit in which the heat source-side heat exchanger 13 is provided and the usage-side unit. When a thermosensitive expansion valve is used for the expansion mechanism 14, it is preferable to dispose an electromagnetic valve 17 on the heat source-side heat exchanger 13 side of the expansion mechanism 14.

Alternatively, the expansion mechanism 14 may be a capillary tube (not shown).

A low-pressure liquid refrigerant or a gas-liquid two-phase refrigerant that has passed through the expansion mechanism 14 is supplied to the usage-side heat exchanger 15.

The usage-side heat exchanger 15 functions as an evaporator that evaporates the low-pressure liquid refrigerant. The usage-side heat exchanger 15 is disposed in a target space that is to be air-conditioned. In the present embodiment, the usage-side heat exchanger 15 is supplied with air as an external heating medium by a fan 16. The usage-side heat exchanger 15 is, but is not limited to, a fin-and-tube heat exchanger, for example. In the usage-side heat exchanger 15, by heat exchange between the refrigerant and the air, the low-pressure liquid refrigerant evaporates to become a low-pressure gas refrigerant whereas the air as an external heating medium is cooled. The low-pressure gas refrigerant that has passed through the usage-side heat exchanger 13 is supplied to the compressor 12 and circulates through the refrigerant circuit 11 again.

In the above-described refrigeration cycle apparatus 10, both heat exchangers, which are the heat source-side heat exchanger 13 and the usage-side heat exchanger 15, are counter-flow-type heat exchangers during the operation.

<Features of Refrigeration Cycle Apparatus>

The refrigeration cycle apparatus 10 includes the refrigerant circuit 11 including the compressor 12, the heat source-side heat exchanger 13, the expansion mechanism 14, and the usage-side heat exchanger 15. In the refrigerant circuit 11, the refrigerant containing at least 1,2-difluoroethylene (HFO-1132 (E)) is sealed. At least during a predetermined operation, in at least one of the heat source-side heat exchanger 13 and the usage-side heat exchanger 15, the flow of the refrigerant and the flow of the heating medium that exchanges heat with the refrigerant are counter flows.

The refrigeration cycle apparatus realizes highly efficient operation effectively utilizing the heat exchangers 13 and 15 by using the refrigerant that contains 1,2-difluoroethylene (HFO-1132 (E)) and that has a low global warming potential.

When each of the heat exchangers 13 and 15 functions as a condenser for the refrigerant, the temperature of the refrigerant that passes therethrough tends to be lower on the exit side than the temperature thereof on the entrance side. However, when each of the heat exchangers 13 and 15 that functions as a condenser is formed to be a counter-flow-type heat exchanger, a temperature difference between the air and the refrigerant is easily sufficiently ensured on both the entrance side and the exit side of the refrigerant in each of the heat exchangers 13 and 15.

When each of the heat exchangers 13 and 15 functions as an evaporator for the refrigerant, the temperature of the refrigerant that passes therethrough tends to be higher on the exit side than a temperature thereof on the entrance side. However, when each of the heat exchangers 13 and 15 that functions as an evaporator is formed to be a counter-flow-type heat exchanger, the temperature difference between the air and the refrigerant is easily sufficiently ensured on both the entrance side and the exit side of the refrigerant in each of the heat exchangers 13 and 15.

<Modifications>

As illustrated in FIG. 22E, in the refrigeration cycle apparatus 10, the refrigerant circuit 11 may include a plurality of (in the illustrated example, two) expansion mechanisms 14 parallel to each other and a plurality of (in the illustrated example, two) usage-side heat exchangers 15 parallel to each other. Although illustration is omitted, the refrigerant circuit 11 may include a plurality of heat source-side heat exchangers 13 that are arranged in parallel or may include a plurality of compressors 12.

As illustrated in FIG. 22F, in the refrigeration cycle apparatus 10, the refrigerant circuit 11 may further include a flow path switching mechanism 18. The flow path switching mechanism 18 is a mechanism that switches between the heat source-side heat exchanger 13 and the usage-side heat exchanger 15 as a destination to which the gas refrigerant that is discharged from the compressor 12 flows. For example, the flow path switching mechanism 18 is a four-way switching valve but is not limited to such a valve, and the flow path switching mechanism 18 may be realized by using a plurality of valves. The flow path switching mechanism 18 can switch between a cooling operation in which the heat source-side heat exchanger 13 functions as a condenser and the usage-side heat exchanger 15 functions as an evaporator and a heating operation in which the heat source-side heat exchanger 13 functions as an evaporator and the usage-side heat exchanger 15 functions as a condenser.

In an example illustrated in FIG. 22F, during the cooling operation, the heat source-side heat exchanger 13 functioning as a condenser and the usage-side heat exchanger 15 functioning as an evaporator both become counter-flow-type heat exchangers (refer to solid arrows indicating the refrigerant flow). In contrast, the heat source-side heat exchanger 13 functioning as an evaporator and the usage-side heat exchanger 15 functioning as a condenser both become parallel-flow-type heat exchangers (the flow direction of the refrigerant is the forward direction with respect to the flow direction of the external heating medium) during the heating operation (refer to dashed arrows indicating the refrigerant flow).

However, the configuration is not limited to such a configuration, and the flow direction of the external heating medium that flows in the heat source-side heat exchanger 13 may be designed so that the heat source-side heat exchanger 13 functioning as a condenser becomes a parallel-flow-type heat exchanger during the cooling operation and the heat source-side heat exchanger 13 functioning as an evaporator becomes a counter-flow-type heat exchanger during the heating operation. In addition, the flow direction of the external heating medium that flows in the usage-side heat exchanger 15 may be designed so that the usage-side heat exchanger 15 functioning as an evaporator becomes a parallel-flow-type heat exchanger during the cooling operation and the usage-side heat exchanger 15 functioning as a condenser becomes a counter-flow-type heat exchanger during the heating operation.

The flow direction of the external heating medium is preferably designed so that, when each of the heat exchangers 13 and 15 functions as a condenser, the flow direction of the refrigerant is opposite to the flow direction of the external heating medium. In other words, when each of the heat exchangers 13 and 15 functions as a condenser, the heat exchangers 13 and 15 are preferably counter-flow-type heat exchangers.

(22-1-2) Second Embodiment

Hereinafter, an air conditioning apparatus 100 as a refrigeration cycle apparatus according to a second embodiment will be described with reference to FIG. 22G, which is a schematic structural diagram of a refrigerant circuit, and FIG. 22H, which is a schematic control block structural diagram.

The air conditioning apparatus 100 is an apparatus that conditions the air in a target space by performing a vapor-compression refrigeration cycle.

The air conditioning apparatus 100 includes mainly a heat source-side unit 120, a usage-side unit 130, a liquid-side connection pipe 106 and a gas-side connection pipe 105 that both connect the heat source-side unit 120 to the usage-side unit 130, a remote controller, which is not illustrated, as an input device and an output device, and a controller 107 that controls the operations of the air conditioning apparatus 100.

A refrigerant for performing a vapor-compression refrigeration cycle is sealed in the refrigerant circuit 110. The air conditioning apparatus 100 performs a refrigeration cycle in which the refrigerant sealed in the refrigerant circuit 110 is compressed, cooled or condensed, decompressed, and, after being heated or evaporated, compressed again. The refrigerant is a mixed refrigerant containing 1,2-difluoroethylene, and may be any one of the above-described refrigerants A to D can be used. In addition, the refrigerant circuit 110 is filled with refrigerating machine oil with the mixed refrigerant.

(22-1-2-1) Heat Source-Side Unit

The heat source-side unit 120 is connected to the usage-side unit 130 through the liquid-side connection pipe 106 and the gas-side connection pipe 105 and constitutes a portion of the refrigerant circuit 110. The heat source-side unit 120 includes mainly a compressor 121, a flow path switching mechanism 122, a heat source-side heat exchanger 123, a heat source-side expansion mechanism 124, a low-pressure receiver 141, a heat source-side fan 125, a liquid-side shutoff valve 129, a gas-side shutoff valve 128, and a heat source-side bridge circuit 153.

The compressor 121 is a piece of equipment that compresses the refrigerant at a low pressure in the refrigeration cycle to a high pressure in the refrigeration cycle. Here, a compressor that has a hermetically sealed structure and a positive-displacement compression element (not shown) such as a rotary type or a scroll type is rotatably driven by a compressor motor is used as the compressor 121. The compressor motor is for changing capacity, and it is possible to control operation frequency by using an inverter. The compressor 121 includes an accompanying accumulator, which is not illustrated, on the suction side.

The flow path switching mechanism 122 is, for example, a four-way switching valve. By switching connection states, the flow path switching mechanism 122 can switch between a cooling-operation connection state in which a discharge side of the compressor 121 is connected to the heat source-side heat exchanger 123 and a suction side of the compressor 121 is connected to the gas-side shutoff valve 128 and a heating-operation connection state in which the discharge side of the compressor 121 is connected to the gas-side shutoff valve 128 and the suction side of the compressor 121 is connected to the heat source-side heat exchanger 123.

The heat source-side heat exchanger 123 is a heat exchanger that functions as a condenser for the refrigerant at a high pressure in the refrigeration cycle during the cooling operation and that functions as an evaporator for the refrigerant at a low pressure in the refrigeration cycle during the heating operation.

After the heat source-side fan 125 causes the heat source-side unit 120 to suck air that is to be a heat source thereinto and the air exchanges heat with the refrigerant in the heat source-side heat exchanger 123, the heat source-side fan 125 generates an air flow to discharge the air to outside. The heat source-side fan 125 is rotatably driven by an outdoor fan motor.

The heat source-side expansion mechanism 124 is provided between a liquid-side end portion of the heat source-side heat exchanger 123 and the liquid-side shutoff valve 129. The heat source-side expansion mechanism 124 may be a capillary tube or a mechanical expansion valve that is used with a thermosensitive cylinder but is preferably an electrically powered expansion valve whose valve opening degree can be regulated by being controlled.

The low-pressure receiver 141 is provided between the suction side of the compressor 121 and one of the connection ports of the flow path switching mechanism 122 and is a refrigerant container capable of storing surplus refrigerant as a liquid refrigerant in the refrigerant circuit 110. In addition, the compressor 121 includes the accompanying accumulator, which is not illustrated, and the low-pressure receiver 141 is connected to the upstream side of the accompanying accumulator.

The liquid-side shutoff valve 129 is a manual valve disposed in a connection portion in the heat source-side unit 120 with the liquid-side connection pipe 106.

The gas-side shutoff valve 128 is a manual valve disposed in a connection portion in the heat source-side unit 120 with the gas-side connection pipe 105.

The heat source-side bridge circuit 153 includes four connection points and check valves provided between the respective connection points. A refrigerant pipe extending from an inflow side of the heat source-side heat exchanger 123, a refrigerant pipe extending from an outflow side of the heat source-side heat exchanger 123, a refrigerant pipe extending from the liquid-side shutoff valve 129, and a refrigerant pipe extending from one of the connection ports of the flow path switching mechanism 122 are connected to the respective connection points of the heat source-side bridge circuit 153. A corresponding check valve blocks the refrigerant flow from one of the connection ports of the flow path switching mechanism 122 to the outflow side of the heat source-side heat exchanger 123, a corresponding check valve blocks the refrigerant flow from the liquid-side shutoff valve 129 to the outflow side of the heat source-side heat exchanger 123, a corresponding check valve blocks the refrigerant flow from the inflow side of the heat source-side heat exchanger 123 to one of the connection ports of the flow path switching mechanism 122, and a corresponding check valve blocks the refrigerant flow from the inflow side of the heat source-side heat exchanger 123 to the liquid-side shutoff valve 129. The heat source-side expansion mechanism 124 is provided in the middle of the refrigerant pipe extending from the liquid-side shutoff valve 129 to one of the connection points of the heat source-side bridge circuit 153.

In FIG. 22G, the air flow formed by the heat source-side fan 125 is indicated by dotted arrows. Here, in both cases in which the heat source-side heat exchanger 123 of the heat source-side unit 120 including the heat source-side bridge circuit 153 functions as an evaporator for the refrigerant and as a condenser for the refrigerant, the heat source-side heat exchanger 123 is configured so that a point (on the downstream side of the air flow) into which the refrigerant flows at the heat source-side heat exchanger 123 is the same, a point (on the upstream side of the air flow) at which the refrigerant flows out from the heat source-side heat exchanger 123 is the same, and the direction in which the refrigerant flows in the heat source-side heat exchanger 123 is the same. Therefore, in both cases in which the heat source-side heat exchanger 123 functions as an evaporator for the refrigerant and in which the heat source-side heat exchanger 123 functions as a condenser for the refrigerant, the flow direction of the refrigerant that flows in the heat source-side heat exchanger 123 is to be opposite to the direction of the air flow formed by the heat source-side fan 125 (counter flow at all the time).

The heat source-side unit 120 includes a heat source-side unit control section 127 that controls the operation of each component constituting the heat source-side unit 120. The heat source-side unit control section 127 includes a microcomputer including a CPU, memory, and the like. The heat source-side unit control section 127 is connected to a usage-side unit control section 134 of each usage-side unit 130 through a communication line and sends and receives control signals or the like.

A discharge pressure sensor 161, a discharge temperature sensor 162, a suction pressure sensor 163, a suction temperature sensor 164, a heat source-side heat-exchanger temperature sensor 165, a heat source air temperature sensor 166, and the like are provided in the heat source-side unit 120. Each sensor is electrically coupled to the heat source-side unit control section 127 and sends a detection signal to the heat source-side unit control section 127. The discharge pressure sensor 161 detects the pressure of the refrigerant that flows through a discharge pipe that connects the discharge side of the compressor 121 to one of the connection ports of the flow path switching mechanism 122. The discharge temperature sensor 162 detects the temperature of the refrigerant that flows through the discharge pipe. The suction pressure sensor 163 detects the pressure of the refrigerant that flows through a suction pipe that connects the low-pressure receiver 141 to the suction side of the compressor 121. The suction temperature sensor 164 detects the temperature of the refrigerant that flows through the suction pipe. The heat source-side heat-exchanger temperature sensor 165 detects the temperature of the refrigerant that flows through an exit on a liquid side of the heat source-side heat exchanger 123 that is opposite to a side to which the flow path switching mechanism 122 is connected. The heat source air temperature sensor 166 detects the air temperature of heat source air before the heat source air passes through the heat source-side heat exchanger 123.

(22-1-2-2) Usage-Side Unit

The usage-side unit 130 is installed on a wall surface, a ceiling, or the like of the target space that is to be air-conditioned. The usage-side unit 130 is connected to the heat source-side unit 120 through the liquid-side connection pipe 106 and the gas-side connection pipe 105 and constitutes a portion of the refrigerant circuit 110.

The usage-side unit 130 includes a usage-side heat exchanger 131, a usage-side fan 132, and a usage-side bridge circuit 154.

In the usage-side heat exchanger 131, the liquid side is connected to the liquid-side connection pipe 106, and a gas-side end is connected to the gas-side connection pipe 105. The usage-side heat exchanger 131 is a heat exchanger that functions as an evaporator for the refrigerant at a low pressure in the refrigeration cycle during the cooling operation and functions as a condenser for the refrigerant at a high pressure in the refrigeration cycle during the heating operation.

After the usage-side fan 132 causes the usage-side unit 130 to suck indoor air thereinto and the air exchanges heat with the refrigerant in the usage-side heat exchanger 131, the usage-side fan 132 generates an air flow to discharge the air to outside. The usage-side fan 132 is rotatably driven by an indoor fan motor.

The usage-side bridge circuit 154 includes four connection points and check valves provided between the respective connection points. A refrigerant pipe extending from an inflow side of the usage-side heat exchanger 131, a refrigerant pipe extending from an outflow side of the usage-side heat exchanger 131, a refrigerant pipe connected to an end portion on the usage-side unit 130 side of the liquid-side connection pipe 106, and a refrigerant pipe connected to an end portion on the usage-side unit 130 side of the gas-side connection pipe 105 are connected to the respective connection points of the usage-side bridge circuit 154. A corresponding check valve blocks the refrigerant flow from the inflow side of the usage-side heat exchanger 131 to the liquid-side connection pipe 106, a corresponding check valve blocks the refrigerant flow from the inflow side of the usage-side heat exchanger 131 to the gas-side connection pipe 105, a corresponding check valve blocks the refrigerant flow from the liquid-side connection pipe 106 to the outflow side of the usage-side heat exchanger 131, and a corresponding check valve blocks the refrigerant flow from the gas-side connection pipe 105 to the outflow side of the usage-side heat exchanger 131.

In FIG. 22G, the air flow formed by the usage-side fan 132 is indicated by dotted arrows. Here, in both cases in which the usage-side heat exchanger 131 of the usage-side unit 130 including the usage-side bridge circuit 154 functions as an evaporator for the refrigerant and functions as a condenser for the refrigerant, the usage-side heat exchanger 131 is configured so that a point (on the downstream side of the air flow) into which the refrigerant flows at the usage-side heat exchanger 131 is the same, a point (on the upstream side of the air flow) at which the refrigerant flows out from the usage-side heat exchanger 131 is the same, and the direction in which the refrigerant flows in the usage-side heat exchanger 131 is the same. Therefore, in both cases in which the usage-side heat exchanger 131 functions as an evaporator for the refrigerant and in which the usage-side heat exchanger 131 functions as a condenser for the refrigerant, the flow direction of the refrigerant that flows in the usage-side heat exchanger 131 is to be opposite to the direction of the air flow formed by the usage-side fan 132 (counter flow at all the time).

The usage-side unit 130 includes the usage-side unit control section 134 that controls the operation of each component constituting the usage-side unit 130. The usage-side unit control section 134 includes a microcomputer including a CPU, memory, and the like. The usage-side unit control section 134 is connected to the heat source-side unit control section 127 through the communication line and sends and receives control signals or the like.

A target-space air temperature sensor 172, an inflow-side heat-exchanger temperature sensor 181, an outflow-side heat-exchanger temperature sensor 183, and the like are provided in the usage-side unit 130. Each sensor is electrically coupled to the usage-side unit control section 134 and sends a detection signal to the usage-side unit control section 134. The target-space air temperature sensor 172 detects the temperature of the air in the target space before the air passes through the usage-side heat exchanger 131. The inflow-side heat-exchanger temperature sensor 181 detects the temperature of the refrigerant before the refrigerant flows into the usage-side heat exchanger 131. The outflow-side heat-exchanger temperature sensor 183 detects the temperature of the refrigerant that flows out from the usage-side heat exchanger 131.

(22-1-2-3) Details of Controller

In the air conditioning apparatus 100, the controller 107 that controls the operations of the air conditioning apparatus 100 is configured by connecting the heat source-side unit control section 127 to the usage-side unit control section 134 through the communication line.

The controller 107 includes mainly a CPU (central processing unit) and memory such as ROM and RAM. Various processes and control operations performed by the controller 107 are realized by causing the components included in the heat source-side unit control section 127 and/or the usage-side unit control section 134 to function as an integral whole.

(22-1-2-4) Operation Modes

Hereinafter, operation modes will be described.

As operation modes, a cooling operation mode and a heating operation mode are provided.

The controller 107 determines one of the cooling operation mode and the heating operation mode to perform based on an instruction received from the remote controller or the like and performs the mode.

(A) Cooling Operation Mode

In the air conditioning apparatus 100, in the cooling operation mode, a connection state of the flow path switching mechanism 122 is to be a cooling-operation connection state in which the discharge side of the compressor 121 is connected to the heat source-side heat exchanger 123 and the suction side of the compressor 121 is connected to the gas-side shutoff valve 128, and the refrigerant filled in the refrigerant circuit 110 is circulated in mainly the order of the compressor 121, the heat source-side heat exchanger 123, the heat source-side expansion mechanism 124, and the usage-side heat exchanger 131.

Specifically, operation frequency is capacity-controlled in the compressor 121 so that, for example, the evaporation temperature of the refrigerant in the refrigerant circuit 110 becomes a target evaporation temperature that is determined in accordance with the difference between a set temperature and an indoor temperature (a temperature detected by the target-space air temperature sensor 172).

The gas refrigerant that has been discharged from the compressor 121, after passing the flow path switching mechanism 122, condenses in the heat source-side heat exchanger 123. In the heat source-side heat exchanger 123, the refrigerant flows in a direction opposite to the direction of the air flow formed by the heat source-side fan 125. In other words, during the operation of the air conditioning apparatus 100 using the heat source-side heat exchanger 123 as a condenser, in the heat source-side heat exchanger 123, the flow of the refrigerant and the flow of the heating medium that exchanges heat with the refrigerant are counter flows. The refrigerant that has flowed through the heat source-side heat exchanger 123 passes through a portion of the heat source-side bridge circuit 153 and is decompressed in the heat source-side expansion mechanism 124 to a low pressure in the refrigeration cycle.

Here, the valve opening degree is controlled in the heat source-side expansion mechanism 124 so that a predetermined condition is satisfied. Such a condition is that, for example, the degree of superheating of the refrigerant that flows on a gas side of the usage-side heat exchanger 131 or the degree of superheating of the refrigerant that is sucked by the compressor 121 becomes a target value. Here, the degree of superheating of the refrigerant that flows on the gas side of the usage-side heat exchanger 131 may be obtained by, for example, subtracting the saturation temperature of the refrigerant that corresponds to the temperature detected by the suction pressure sensor 163 from the temperature detected by the outflow-side heat-exchanger temperature sensor 183. A method for controlling the valve opening degree in the heat source-side expansion mechanism 124 is not limited, and, for example, the discharge temperature of the refrigerant that is discharged from the compressor 121 may be controlled to a predetermined temperature, or the degree of superheating of the refrigerant that is discharged from the compressor 121 may be controlled to satisfy a predetermined condition.

In the heat source-side expansion mechanism 124, the refrigerant that has been decompressed to a low pressure in the refrigeration cycle flows into the usage-side unit 130 through the liquid-side shutoff valve 129 and the liquid-side connection pipe 106 and evaporates in the usage-side heat exchanger 131. In the usage-side heat exchanger 131, the refrigerant flows in a direction opposite to the direction of the air flow formed by the usage-side fan 132. In other words, during the operation of the air conditioning apparatus 100 using the usage-side heat exchanger 131 as an evaporator, in the usage-side heat exchanger 131, the flow of the refrigerant and the flow of the heating medium that exchanges heat with the refrigerant are counter flows. The refrigerant that has flowed through the usage-side heat exchanger 131, after flowing through the gas-side connection pipe 105, passes through the gas-side shutoff valve 128, the flow path switching mechanism 122, and the low-pressure receiver 141 and is sucked by the compressor 121 again. The liquid refrigerant that cannot be evaporated in the usage-side heat exchanger 131 is stored in the low-pressure receiver 141 as surplus refrigerant.

(B) Heating Operation Mode

In the air conditioning apparatus 100, in the heating operation mode, the connection state of the flow path switching mechanism 122 is to be a heating-operation connection state in which the discharge side of the compressor 121 is connected to the gas-side shutoff valve 128 and the suction side of the compressor 121 is connected to the heat source-side heat exchanger 123, and the refrigerant filled in the refrigerant circuit 110 is circulated in mainly the order of the compressor 121, the usage-side heat exchanger 131, the heat source-side expansion mechanism 124, and the heat source-side heat exchanger 123.

More specifically, in the heating operation mode, operation frequency is capacity-controlled in the compressor 121 so that, for example, the condensation temperature of the refrigerant in the refrigerant circuit 110 is to be a target condensation temperature that is determined in accordance with the difference between a set temperature and an indoor temperature (a temperature detected by the target-space air temperature sensor 172).

The gas refrigerant that has been discharged from the compressor 121, after flowing through the flow path switching mechanism 122 and the gas-side connection pipe 105, flows into a gas-side end of the usage-side heat exchanger 131 of the usage-side unit 130 and condenses in the usage-side heat exchanger 131. In the usage-side heat exchanger 131, the refrigerant flows in a direction opposite to the direction of the air flow formed by the usage-side fan 132. In other words, during the operation of the air conditioning apparatus 100 using the usage-side heat exchanger 131 as a condenser, in the usage-side heat exchanger 131, the flow of the refrigerant and the flow of the heating medium that exchanges heat with the refrigerant are counter flows. The refrigerant that has flowed out from a liquid-side end of the usage-side heat exchanger 131 passes through the liquid-side connection pipe 106, flows into the heat source-side unit 120, passes through the liquid-side shutoff valve 129, and is decompressed in the heat source-side expansion mechanism 124 to a low pressure in the refrigeration cycle.

Here, the valve opening degree is controlled in the heat source-side expansion mechanism 124 so that a predetermined condition is satisfied. Such a condition is that, for example, the degree of superheating of the refrigerant that is sucked by the compressor 121 becomes a target value. A method for controlling the valve opening degree in the heat source-side expansion mechanism 124 is not limited, and, for example, the discharge temperature of the refrigerant that is discharged from the compressor 121 may be controlled to a predetermined temperature, or the degree of superheating of the refrigerant that is discharged from the compressor 121 may be controlled to satisfy a predetermined condition.

The refrigerant that has been decompressed in the heat source-side expansion mechanism 124 evaporates in the heat source-side heat exchanger 123. In the heat source-side heat exchanger 123, the refrigerant flows in a direction opposite to the direction of the air flow formed by the heat source-side fan 125. In other words, during the operation of the air conditioning apparatus 100 using the heat source-side heat exchanger 123 as an evaporator, in the heat source-side heat exchanger 123, the flow of the refrigerant and the flow of the heating medium that exchanges heat with the refrigerant are counter flows. The refrigerant that has been evaporated in the heat source-side heat exchanger 123 passes through the flow path switching mechanism 122 and the low-pressure receiver 141 and is sucked by the compressor 121 again. The liquid refrigerant that cannot be evaporated in the heat source-side heat exchanger 123 is stored in the low-pressure receiver 141 as surplus refrigerant.

(22-1-2-5) Features of Air Conditioning Apparatus 100

The air conditioning apparatus 100 can perform the refrigeration cycle using the refrigerant containing 1,2-difluoroethylene; thus, the refrigeration cycle is enabled with a refrigerant having a low GWP.

In addition, occurrence of liquid compression can be suppressed in the air conditioning apparatus 100 by providing the low-pressure receiver 141 and without performing control (control of the heat source-side expansion mechanism 124) by which the degree of superheating of the refrigerant that is sucked by the compressor 121 is ensured to be more than or equal to a predetermined value. Therefore, regarding the control of the heat source-side expansion mechanism 124, the heat source-side heat exchanger 123 that is to function as a condenser (the same applies to the usage-side heat exchanger 131 that is to function as a condenser) can be controlled to sufficiently ensure the degree of subcooling of the refrigerant that passes through the exit.

In addition, during both cooling operation and heating operation, the refrigerant flows in a direction opposite to the direction of the air flow formed by the heat source-side fan 125 (counter flow) in the heat source-side heat exchanger 123. Therefore, when the heat source-side heat exchanger 123 functions as an evaporator, the temperature of the refrigerant that passes therethrough tends to be higher on the exit side than the temperature thereof on the entrance side. Even in such a case, the air flow formed by the heat source-side fan 125 is in a direction opposite to the refrigerant flow; thus, a temperature difference between the air and the refrigerant is easily sufficiently ensured on both the entrance side and the exit side of the refrigerant in the heat source-side heat exchanger 123. In addition, when the heat source-side heat exchanger 123 functions as a condenser, the temperature of the refrigerant that passes therethrough tends to be lower on the exit side than the temperature thereof on the entrance side. Even in such a case, the air flow formed by the heat source-side fan 125 is in a direction opposite to the refrigerant flow; thus, the temperature difference between the air and the refrigerant is easily sufficiently ensured on both the entrance side and the exit side of the refrigerant in the heat source-side heat exchanger 123.

In addition, during both cooling operation and heating operation, the refrigerant flows in a direction opposite to the direction of the air flow formed by the usage-side fan 132 (counter flow) in the usage-side heat exchanger 131. Therefore, when the usage-side heat exchanger 131 functions as an evaporator for the refrigerant, the temperature of the refrigerant that passes therethrough tends to be higher on the exit side than the temperature thereof on the entrance side. Even in such a case, the air flow formed by the usage-side fan 132 is in a direction opposite to the refrigerant flow; thus, a temperature difference between the air and the refrigerant is easily sufficiently ensured on both the entrance side and the exit side of the refrigerant in the usage-side heat exchanger 131. When the usage-side heat exchanger 131 functions as a condenser, the temperature of the refrigerant that passes therethrough tends to be lower on the exit side than the temperature thereof on the entrance side. Even in such a case, the air flow formed by the usage-side fan 132 is in a direction opposite to the refrigerant flow; thus, the temperature difference between the air and the refrigerant is easily sufficiently ensured on both the entrance side and the exit side of the refrigerant in the usage-side heat exchanger 131.

Therefore, even when temperature glide occurs in the evaporator and in the condenser due to the use of a non-azeotropic refrigerant mixture as a refrigerant, in both cooling operation and heating operation, it is possible to sufficiently deliver performance in both the heat exchanger functioning as an evaporator and the heat exchanger functioning as a condenser.

(22-1-3) Third Embodiment

Hereinafter, an air conditioning apparatus 100*a* as a refrigeration cycle apparatus according to a third embodiment will be described with reference to FIG. 22, which is a schematic structural diagram of a refrigerant circuit, and FIG. 22J, which is a schematic control block structural diagram. The air conditioning apparatus 100*a* of the third embodiment shares many common features with the air conditioning apparatus 100 of the second embodiment; thus, differences from the air conditioning apparatus 100 of the first embodiment will be mainly described hereinafter.

(22-1-3-1) Configuration of Air Conditioning Apparatus

The air conditioning apparatus 100*a* differs from the air conditioning apparatus 100 of the above-described second embodiment mainly in that a bypass pipe 140 having a bypass expansion valve 149 is provided in the heat source-side unit 120, in that a plurality of indoor units (a first usage-side unit 130 and a second usage-side unit 135) are arranged in parallel, and in that an indoor expansion valve is provided on a liquid refrigerant side of the indoor heat exchanger in each indoor unit. In the following description of the air conditioning apparatus 100*a*, constituents that are the same as or similar to those of the air conditioning apparatus 100 are given the same references as those given for the air conditioning apparatus 100.

The bypass pipe 140 included in the heat source-side unit 120 is a refrigerant pipe that connects a portion of the refrigerant circuit 110 between the heat source-side expansion mechanism 124 and the liquid-side shutoff valve 129 with a refrigerant pipe extending from one of the connection ports of the flow path switching mechanism 122 to the low-pressure receiver 141. The bypass expansion valve 149 is preferably, but is not limited to, an electrically powered expansion valve whose valve opening degree can be regulated.

As with the above-described embodiment, the first usage-side unit 130 includes a first usage-side heat exchanger 131, a first usage-side fan 132, and a first usage-side bridge circuit 154, and, other than the components, further includes a first usage-side expansion mechanism 133. The first usage-side bridge circuit 154 includes four connection points and check valves provided between the respective connection points. A refrigerant pipe extending from a liquid side of the first usage-side heat exchanger 131, a refrigerant pipe extending from a gas side of the first usage-side heat exchanger 131, a refrigerant pipe branching off from the liquid-side connection pipe 106 toward the first usage-side unit 130, and a refrigerant pipe branching off from the gas-side connection pipe 105 toward the first usage-side unit 130 are connected to the respective connection points of the first usage-side bridge circuit 154.

In FIG. 22I, an air flow formed by the first usage-side fan 132 is indicated by dotted arrows. Here, in both cases in which the first usage-side heat exchanger 131 of the first usage-side unit 130 including the first usage-side bridge circuit 154 functions as an evaporator for the refrigerant and functions as a condenser for the refrigerant, the first usage-side heat exchanger 131 is configured so that a point (on the downstream side of the air flow) into which the refrigerant flows at the first usage-side heat exchanger 131 is the same, a point (on the upstream side of the air flow) at which the refrigerant flows out from the first usage-side heat exchanger 131 is the same, and the direction in which the refrigerant flows in the first usage-side heat exchanger 131 is the same. Therefore, in both cases in which the first usage-side heat exchanger 131 functions as an evaporator for the refrigerant and in which the first usage-side heat exchanger 131 functions as a condenser for the refrigerant, the flow direction of the refrigerant that flows in the first usage-side heat exchanger 131 is to be opposite to the direction of the air flow formed by the first usage-side fan 132 (counter flow at all the time). The first usage-side expansion mechanism 133 is provided in the middle of the refrigerant pipe that branches off from the liquid-side connection pipe 106 toward the first usage-side unit 130 (on the liquid refrigerant side of the first usage-side bridge circuit 154). The first usage-side expansion mechanism 133 is preferably an electrically powered expansion valve whose valve opening degree can be regulated. As with the above-described embodiment, a first usage-side unit control section 134 and a first inflow-side heat-exchanger temperature sensor 181, a first target-space air temperature sensor 172, a first outflow-side heat-exchanger temperature sensor 183 and the like that are electrically coupled to the first usage-side unit control section 134 are provided in the first usage-side unit 130.

As with the first usage-side unit 130, the second usage-side unit 135 includes a second usage-side heat exchanger 136, a second usage-side fan 137, a second usage-side expansion mechanism 138, and a second usage-side bridge circuit 155. The second usage-side bridge circuit 155 includes four connection points and check valves provided between the respective connection points. A refrigerant pipe extending from a liquid side of the second usage-side heat exchanger 136, a refrigerant pipe extending from a gas side of the second usage-side heat exchanger 136, a refrigerant pipe branching off from the liquid-side connection pipe 106 toward the second usage-side unit 135, and a refrigerant pipe branching off from the gas-side connection pipe 105 toward the second usage-side unit 135 are connected to the respective connection points of the second usage-side bridge circuit 155. In FIG. 22I, an air flow formed by the second usage-side fan 137 is indicated by dotted arrows. Here, in both cases in which the second usage-side heat exchanger 136 of the second usage-side unit 135 including the second usage-side bridge circuit 155 functions as an evaporator for the refrigerant and functions as a condenser for the refrigerant, the second usage-side heat exchanger 136 is configured so that a point (on the downstream side of the air flow) into which the refrigerant flows at the second usage-side heat exchanger 136 is the same, a point (on the upstream side of the air flow) at which the refrigerant flows out from the second usage-side heat exchanger 136 is the same, and the direction in which the refrigerant flows in the second usage-side heat exchanger 136 is the same. Therefore, in both cases in which the second usage-side heat exchanger 136 functions as an evaporator for the refrigerant and in which the second usage-side heat exchanger 136 functions as a condenser for the refrigerant, the flow direction of the refrigerant that flows in the second usage-side heat exchanger 136 is to be opposite to the direction of the air flow formed by the second usage-side fan 137 (counter flow at all the time). The second usage-side expansion mechanism 138 is provided in the middle of the refrigerant pipe that branches off from the liquid-side connection pipe 106 toward the second usage-side unit 135 (on the liquid refrigerant side of the second usage-side bridge circuit 155). The second usage-side expansion mechanism 138 is preferably an electrically powered expansion valve whose valve opening degree can be regulated. As with the first usage-side unit 130, a second usage-side unit control section 139 and a second inflow-side heat-exchanger temperature sensor 185, a second target-space air temperature sensor 176, a second outflow-side heat-exchanger temperature sensor 187 that are electrically coupled to the second usage-side unit control section 139 are provided in the second usage-side unit 135.

(22-1-3-2) Operation Modes (A) Cooling Operation Mode

In the air conditioning apparatus 100*a*, in a cooling operation mode, operation frequency is capacity-controlled in the compressor 121 so that, for example, the evaporation temperature of the refrigerant in the refrigerant circuit 110 becomes a target evaporation temperature. Here, the target evaporation temperature is preferably determined in accordance with one of the usage-side unit 130 and the usage-side unit 135 whose difference between a set temperature and a usage-side temperature is the largest (the usage-side unit under the heaviest load).

The gas refrigerant that has been discharged from the compressor 121, after passing through the flow path switching mechanism 122, condenses in the heat source-side heat exchanger 123. In the heat source-side heat exchanger 123, the refrigerant flows in a direction opposite to the direction of the air flow formed by the heat source-side fan 125. In other words, during the operation of the air conditioning apparatus 100*a* using the heat source-side heat exchanger 123 as a condenser, in the heat source-side heat exchanger 123, the flow of the refrigerant and the flow of the heating medium that exchanges heat with the refrigerant are counter flows. The refrigerant that has flowed through the heat source-side heat exchanger 123, after passing through a portion of the heat source-side bridge circuit 153, passes through the heat source-side expansion mechanism 124 that is controlled to be fully opened and then flows into each of the first usage-side unit 130 and the second usage-side unit 135 through the liquid-side shutoff valve 129 and the liquid-side connection pipe 106.

The valve opening degree of the bypass expansion valve 149 of the bypass pipe 140 is controlled in accordance with a generation state of surplus refrigerant. Specifically, the bypass expansion valve 149 is controlled, for example, based on a high pressure that is detected by the discharge pressure sensor 161 and/or the degree of subcooling of the refrigerant that flows on the liquid side of the heat source-side heat exchanger 123. In such a state, the surplus refrigerant, which is a portion of the refrigerant that has passed through the above-described heat source-side expansion mechanism 124, is sent to the low-pressure receiver 141 through the bypass pipe 140.

The refrigerant that has flowed into the first usage-side unit 130 is decompressed in the first usage-side expansion mechanism 133 to a low pressure in the refrigeration cycle. In addition, the refrigerant that has flowed into the second usage-side unit 135 is decompressed in the second usage-side expansion mechanism 138 to a low pressure in the refrigeration cycle.

Here, the valve opening degree is controlled in the first usage-side expansion mechanism 133 so that a predetermined condition is satisfied. Such a condition is that, for example, the degree of superheating of the refrigerant that flows on the gas side of the first usage-side heat exchanger 131 or the degree of superheating of the refrigerant that is sucked by the compressor 121 becomes a target value. Here, the degree of superheating of the refrigerant that flows on the gas side of the first usage-side heat exchanger 131 may be obtained, for example, by subtracting the saturation temperature of the refrigerant that corresponds to the temperature detected by the suction pressure sensor 163 from the temperature detected by the first outflow-side heat-exchanger temperature sensor 183. Similarly, the valve opening degree is controlled in the second usage-side expansion mechanism 138 so that a predetermined condition is satisfied. Such a condition is that, for example, the degree of superheating of the refrigerant that flows on the gas side of the second usage-side heat exchanger 136 or the degree of superheating of the refrigerant that is sucked by the compressor 121 becomes a target value. Here, the degree of superheating of the refrigerant that flows on the gas side of the second usage-side heat exchanger 136 may be obtained, for example, by subtracting the saturation temperature of the refrigerant that corresponds to the temperature detected by the suction pressure sensor 163 from the temperature detected by the second outflow-side heat-exchanger temperature sensor 187.

The refrigerant that has been decompressed in the first usage-side expansion mechanism 133 passes through a portion of the first usage-side bridge circuit 154, flows into the first usage-side heat exchanger 131, and evaporates in the first usage-side heat exchanger 131. In the first usage-side heat exchanger 131, the refrigerant flows in a direction opposite to the direction of the air flow formed by the first usage-side fan 132. In other words, during the operation of the air conditioning apparatus 100*a* using the first usage-side heat exchanger 131 as an evaporator, in the first usage-side heat exchanger 131, the flow of the refrigerant and the flow of the heating medium that exchanges heat with the refrigerant are counter flows. The refrigerant that has passed through the first usage-side heat exchanger 131 passes through a portion of the first usage-side bridge circuit 154 and flows to outside the first usage-side unit 130.

Similarly, the refrigerant that has been decompressed in the second usage-side expansion mechanism 138 passes through a portion of the second usage-side bridge circuit 155, flows into the second usage-side heat exchanger 136, and evaporates in the second usage-side heat exchanger 136. In the second usage-side heat exchanger 136, the refrigerant flows in a direction opposite to the direction of the air flow formed by the second usage-side fan 137. In other words, during the operation of the air conditioning apparatus 100*a* using the second usage-side heat exchanger 136 as an evaporator, in the second usage-side heat exchanger 136, the flow of the refrigerant and the flow of the heating medium that exchanges heat with the refrigerant are counter flows. The refrigerant that has passed through the second usage-side heat exchanger 136 passes through a portion of the second usage-side bridge circuit 155 and flows to outside the second usage-side unit 135. The refrigerant that has flowed out from the first usage-side unit 130 and the refrigerant that has flowed out from the second usage-side unit 135, after merging with each other, flow through the gas-side connection pipe 105, pass through the gas-side shutoff valve 128, the flow path switching mechanism 122, and the low-pressure receiver 141, and are sucked by the compressor 121 again. The liquid refrigerant that cannot be evaporated in the first usage-side heat exchanger 131 and in the second usage-side heat exchanger 136 is stored in the low-pressure receiver 141 as surplus refrigerant.

(B) Heating Operation Mode

In the air conditioning apparatus 100*a*, in the heating operation mode, operation frequency is capacity-controlled in the compressor 121 so that, for example, the condensation temperature of the refrigerant in the refrigerant circuit 110 becomes a target condensation temperature. Here, the target condensation temperature is preferably determined in accordance with one of the usage-side unit 130 and the usage-side unit 135 whose difference between a set temperature and a usage-side temperature is the largest (the usage-side unit under the heaviest load).

The gas refrigerant that has been discharged from the compressor 121, after flowing through the flow path switching mechanism 122 and the gas-side connection pipe 105, flows into each of the first usage-side unit 130 and the second usage-side unit 135.

The refrigerant that has flowed into the first usage-side unit 130, after passing through a portion of the first usage-side bridge circuit 154, condenses in the first usage-side heat exchanger 131. In the first usage-side heat exchanger 131, the refrigerant flows in a direction opposite to the direction of the air flow formed by the first usage-side fan 132. In other words, during the operation of the air conditioning apparatus 100*a* using the first usage-side heat exchanger 131 as a condenser, in the first usage-side heat exchanger 131, the flow of the refrigerant and the flow of heating medium that exchanges heat with the refrigerant are counter flows. The refrigerant that has flowed into the second usage-side unit 135, after passing through a portion of the second usage-side bridge circuit 155, condenses in the second usage-side heat exchanger 136. In the second usage-side heat exchanger 136, the refrigerant flows in a direction opposite to the direction of the air flow formed by the second usage-side fan 137. In other words, during the operation of the air conditioning apparatus 100*a* using the second usage-side heat exchanger 136 as a condenser, in the second usage-side heat exchanger 136, the flow of the refrigerant and the flow of the heating medium that exchanges heat with the refrigerant are counter flows.

The refrigerant that has flowed out from a liquid-side end of the first usage-side heat exchanger 131, after passing through a portion of the first usage-side bridge circuit 154, is decompressed in the first usage-side expansion mechanism 133 to an intermediate pressure in the refrigeration cycle. Similarly, the refrigerant that has flowed out from a liquid-side end of the second usage-side heat exchanger 136, after passing through a portion of the second usage-side bridge circuit 155, is decompressed in the second usage-side expansion mechanism 138 to an intermediate pressure in the refrigeration cycle.

Here, the valve opening degree is controlled in the first usage-side expansion mechanism 133 so that a predetermined condition is satisfied. Such a condition is that, for example, the degree of subcooling of the refrigerant that flows on the liquid-side exit of the first usage-side heat exchanger 131 becomes a target value. Here, the degree of subcooling of the refrigerant that flows on the liquid-side exit of the first usage-side heat exchanger 131 may be obtained, for example, by subtracting the saturation temperature of the refrigerant that corresponds to the temperature detected by the discharge pressure sensor 161 from the temperature detected by the first outflow-side heat-exchanger temperature sensor 183. Similarly, the valve opening degree is controlled in the second usage-side expansion mechanism 138 so that a predetermined condition is satisfied. Such a condition is that, for example, the degree of subcooling of the refrigerant that flows on the liquid-side exit of the second usage-side heat exchanger 136 becomes a target value. Here, the degree of subcooling of the refrigerant that flows on the liquid-side exit of the second usage-side heat exchanger 136 may be obtained, for example, by subtracting the saturation temperature of the refrigerant that corresponds to the temperature detected by the discharge pressure sensor 161 from the temperature detected by the second outflow-side heat-exchanger temperature sensor 187.

The refrigerant that has passed through the first usage-side expansion mechanism 133 passes through a portion of the first usage-side bridge circuit 154 and flows to outside the first usage-side unit 130. Similarly, the refrigerant that has passed through the second usage-side expansion mechanism 138 passes through a portion of the second usage-side bridge circuit 155 and flows to outside the second usage-side unit 135. The refrigerant that has flowed out from the first usage-side unit 130 and the refrigerant that has flowed out from the second usage-side unit 135, after merging with each other, flow into the heat source-side unit 120 through the liquid-side connection pipe 106.

The refrigerant that has flowed into the heat source-side unit 120 passes through the liquid-side shutoff valve 129 and is decompressed in the heat source-side expansion mechanism 124 to a low pressure in the refrigeration cycle.

The valve opening degree of the bypass expansion valve 149 of the bypass pipe 140 may be controlled in accordance with the generation state of the surplus refrigerant as in the cooling operation or may be controlled to be fully closed.

Here, the valve opening degree is controlled in the heat source-side expansion mechanism 124 so that a predetermined condition is satisfied. Such a condition is that, for example, the degree of superheating of the refrigerant that is sucked by the compressor 121 becomes a target value. A method for controlling the valve opening degree in the heat source-side expansion mechanism 124 is not limited, and, for example, the discharge temperature of the refrigerant that is discharged from the compressor 121 may be controlled to a predetermined temperature, or the degree of superheating of the refrigerant that is discharged from the compressor 121 may be controlled to satisfy a predetermined condition.

The refrigerant that has been decompressed in the heat source-side expansion mechanism 124 evaporates in the heat source-side heat exchanger 123. In the heat source-side heat exchanger 123, the refrigerant flows in a direction opposite to the direction of the air flow formed by the heat source-side fan 125. In other words, during the operation of the air conditioning apparatus 100*a* using the heat source-side heat exchanger 123 as an evaporator, in the heat source-side heat exchanger 123, the flow of the refrigerant and the flow of the heating medium that exchanges heat with the refrigerant are counter flows. The refrigerant that has passed through the heat source-side heat exchanger 123 passes through the flow path switching mechanism 122 and the low-pressure receiver 141 and is sucked by the compressor 121 again. The liquid refrigerant that cannot be evaporated in the heat source-side heat exchanger 123 is stored in the low-pressure receiver 141 as surplus refrigerant.

(22-1-3-3) Features of Air Conditioning Apparatus 100*a*

The air conditioning apparatus 100*a* can perform the refrigeration cycle using the refrigerant containing 1,2-difluoroethylene; thus, the refrigeration cycle is enabled with a refrigerant having a low GWP.

In addition, in the air conditioning apparatus 100*a*, occurrence of liquid compression can be suppressed by providing the low-pressure receiver 141 and without performing control (control of the heat source-side expansion mechanism 124) by which the degree of superheating of the refrigerant that is sucked by the compressor 121 is ensured to be more than or equal to a predetermined value. Further, during the heating operation, it is possible to easily sufficiently deliver performance of the first usage-side heat exchanger 131 and the second usage-side heat exchanger 136 by controlling the degree of subcooling of each of the first usage-side expansion mechanism 133 and the second usage-side expansion mechanism 138.

During both cooling operation and heating operation, in the heat source-side heat exchanger 123, the refrigerant flows in a direction opposite to the direction of the air flow formed by the heat source-side fan 125 (counter flow). In addition, during both cooling operation and heating operation, in the first usage-side heat exchanger 131, the refrigerant flows in a direction opposite to the direction of the air flow formed by the first usage-side fan 132 (counter flow). Similarly, during both cooling operation and heating operation, in the second usage-side heat exchanger 136, the refrigerant flows in a direction opposite to the direction of the air flow formed by the second usage-side fan 137 (counter flow).

Therefore, even when temperature glide occurs in the evaporator and in the condenser due to the use of a non-azeotropic refrigerant mixture as a refrigerant, in both cooling operation and heating operation, it is possible to sufficiently deliver performance in both the heat exchanger functioning as an evaporator and the heat exchanger functioning as a condenser.

(23) Embodiment of the Technique of Twenty-Third Group (23-1) Specific Embodiments FIG. 23A is a schematic diagram of a refrigerant circuit 10 in accordance with an embodiment of the present disclosure. FIG. 23B is a schematic control block diagram of a refrigeration cycle apparatus in accordance with an embodiment of the present disclosure. An air-conditioning apparatus 1 as a refrigeration cycle apparatus according to this embodiment will be described below with reference to FIGS. 23A and 23B.

The air-conditioning apparatus 1 is an apparatus that performs a vapor compression refrigeration cycle to condition air in a space that is to be air-conditioned.

The air-conditioning apparatus 1 includes the following components as its main components: an outdoor unit 20; an indoor unit 30; a liquid-side refrigerant connection pipe 6 and a gas-side refrigerant connection pipe 5 that connect the outdoor unit 20 and the indoor unit 30; a remote controller (not illustrated) serving as an input device and an output device; and a controller 7 that controls operation of the air-conditioning apparatus 1.

In the air-conditioning apparatus 1, a refrigeration cycle is performed in which refrigerant charged in the refrigerant circuit 10 undergoes compression, condensation, decompression, and evaporation before undergoing compression again. In this embodiment, the refrigerant circuit 10 is filled with a refrigerant used for performing a vapor compression refrigeration cycle. The refrigerant is a refrigerant containing 1,2-difluoroethylene. Any one of Refrigerants A to D mentioned above can be used as the refrigerant. Further, the refrigerant circuit 10 is filled with refrigerating machine oil together with the refrigerant.

(23-1-1) Outdoor Unit 20

The outdoor unit 20 has a substantially cuboid box-shaped exterior. The outdoor unit has a structure (so-called trunk-type structure) in which its internal space is divided by a component such as a partition plate into a fan chamber and a machine chamber.

The outdoor unit 20 is connected to the indoor unit 30 via the liquid-side refrigerant connection pipe 6 and the gas-side refrigerant connection pipe 5, and constitutes a portion of the refrigerant circuit 10. The outdoor unit 20 includes, as its main components, a compressor 21, a four-way switching valve 22, an outdoor heat exchanger 23, an outdoor expansion valve 24, an outdoor fan 25, a liquid-side shutoff valve 29, and a gas-side shutoff valve 28.

The compressor 21 is a device that compresses low-pressure refrigerant into a high pressure in the refrigeration cycle. The compressor 21 used in the present case is a hermetic compressor with a rotary, scroll, or other type of positive displacement compression element (not illustrated) rotatably driven by a compressor motor.

The compressor motor is used to change compressor capacity, and allows control of operating frequency by means of an inverter. The compressor 21 is provided with an attached accumulator (not illustrated) disposed on its suction side. The outdoor unit 20 according to this embodiment does not include a refrigerant container (such as a low-pressure receiver disposed on the suction side of the compressor 21, or a high-pressure receiver disposed on the liquid side of the outdoor heat exchanger 23) that is larger than the attached accumulator.

The four-way switching valve 22 is capable of switching its connection states between a cooling-operation connection state, in which the four-way switching valve 22 connects the discharge side of the compressor 21 with the outdoor heat exchanger 23 while connecting the suction side of the compressor 21 with the gas-side shutoff valve 28, and a heating-operation connection state, in which the four-way switching valve 22 connects the discharge side of the compressor 21 with the gas-side shutoff valve 28 while connecting the suction side of the compressor 21 with the outdoor heat exchanger 23.

The outdoor heat exchanger 23 is a heat exchanger that functions as a condenser for high-pressure refrigerant in the refrigeration cycle during cooling operation, and functions as an evaporator for low-pressure refrigerant in the refrigeration cycle during heating operation. The outdoor heat exchanger 23 includes a plurality of heat transfer fins, and a plurality of heat transfer tubes penetrating and secured to the heat transfer fins.

The outdoor fan 25 generates an air flow for sucking outdoor air into the outdoor unit 20 for heat exchange with refrigerant in the outdoor heat exchanger 23, and then discharging the resulting air to the outside. The outdoor fan 25 is rotationally driven by an outdoor-fan motor. In this embodiment, only one outdoor fan 25 is provided.

The outdoor expansion valve 24, whose opening degree can be controlled, is located between the liquid-side end portion of the outdoor heat exchanger 23, and the liquid-side shutoff valve 29.

The liquid-side shutoff valve 29 is a manual valve disposed at a location in the outdoor unit 20 where the outdoor unit 20 connects with the liquid-side refrigerant connection pipe 6.

The gas-side shutoff valve 28 is a manual valve disposed at a location in the outdoor unit 20 where the outdoor unit 20 connects with the gas-side refrigerant connection pipe 5.

The outdoor unit 20 includes an outdoor-unit control unit 27 that controls operation of each component constituting the outdoor unit 20. The outdoor-unit control unit 27 has a microcomputer including a CPU, a memory, and other components. The outdoor-unit control unit 27 is connected to an indoor-unit control unit 34 of each indoor unit 30 via a communication line to transmit and receive a control signal or other information. The outdoor-unit control unit 27 is electrically connected to various sensors (not illustrated) to receive a signal from each sensor.

(23-1-2) Indoor Unit 30

The indoor unit 30 is installed on, for example, the wall surface of an indoor space that is to be air-conditioned. The indoor unit 30 is connected to the outdoor unit 20 via the liquid-side refrigerant connection pipe 6 and the gas-side refrigerant connection pipe 5, and constitutes a portion of the refrigerant circuit 10.

The indoor unit 30 includes an indoor heat exchanger 31, an indoor fan 32, and other components.

The liquid side of the indoor heat exchanger 31 is connected with the liquid-side refrigerant connection pipe 6, and the gas-side end is connected with the gas-side refrigerant connection pipe 5. The indoor heat exchanger 31 is a heat exchanger that functions as an evaporator for low-pressure refrigerant in the refrigeration cycle during cooling operation, and functions as a condenser for high-pressure refrigerant in the refrigeration cycle during heating operation. The indoor heat exchanger 31 includes a plurality of heat transfer fins, and a plurality of heat transfer tubes penetrating and secured to the heat transfer fins.

The indoor fan 32 generates an air flow for sucking indoor air into the indoor unit 30 for heat exchange with refrigerant in the indoor heat exchanger 31, and then discharging the resulting air to the outside. The indoor fan 32 is rotationally driven by an indoor-fan motor (not illustrated).

The indoor unit 30 includes the indoor-unit control unit 34 that controls operation of each component constituting the indoor unit 30. The indoor-unit control unit 34 has a microcomputer including a CPU, a memory, and other components. The indoor-unit control unit 34 is connected to the outdoor-unit control unit 27 via a communication line to transmit and receive a control signal or other information.

The indoor-unit control unit 34 is electrically connected to various sensors (not illustrated) disposed inside the indoor unit 30, and receives a signal from each sensor.

(23-1-3) Details of Controller 7

For the air-conditioning apparatus 1, the outdoor-unit control unit 27 and the indoor-unit control unit 34 that are connected via a communication line constitute the controller 7 that controls operation of the air-conditioning apparatus 1.

The controller 7 includes, as its main components, a central processing unit (CPU), and a ROM, a RAM, or other memories. Various processes and controls are implemented by the controller 7 through the integral functioning of various components included in the outdoor-unit control unit 27 and/or the indoor-unit control unit 34.

(23-1-4) Operating Modes

A cooling operation mode and a heating operation mode are provided as operation modes. The controller 7 determines, based on an instruction accepted from a remote controller or other devices, whether the operating mode to be executed is the cooling operation mode or heating operation mode, and executes the operating mode.

(23-1-4-1) Cooling Operation Mode

In cooling operation mode, the air-conditioning apparatus 1 sets the four-way switching valve 22 to a cooling-operation connection state in which the four-way switching valve 22 connects the discharge side of the compressor 21 with the outdoor heat exchanger 23 while connecting the suction side of the compressor 21 with the gas-side shutoff valve 28, such that refrigerant charged in the refrigerant circuit 10 is circulated mainly through the compressor 21, the outdoor heat exchanger 23, the outdoor expansion valve 24, and the indoor heat exchanger 31 in this order.

More specifically, when the cooling operation mode is started, refrigerant in the refrigerant circuit 10 is sucked into and compressed by the compressor 21, and then discharged from the compressor 21.

The capacity of the compressor 21 is controlled in accordance with the cooling load required by the indoor unit 30. Gas refrigerant discharged from the compressor 21 passes through the four-way switching valve 22 into the gas-side end of the outdoor heat exchanger 23.

Upon entering the gas-side end of the outdoor heat exchanger 23, the refrigerant exchanges heat in the outdoor heat exchanger 23 with the outdoor-side air supplied by the outdoor fan 25 and thus condenses into liquid refrigerant, which then leaves the liquid-side end of the outdoor heat exchanger 23.

After leaving the liquid-side end of the outdoor heat exchanger 23, the refrigerant is decompressed when passing through the outdoor expansion valve 24. The outdoor expansion valve 24 is controlled such that the refrigerant passing through the liquid-side outlet of the outdoor heat exchanger 23 has a degree of subcooling that satisfies a predetermined condition.

The refrigerant decompressed in the outdoor expansion valve 24 then passes through the liquid-side shutoff valve 29 and the liquid-side refrigerant connection pipe 6 into the indoor unit 30.

Upon entering the indoor unit 30, the refrigerant flows into the indoor heat exchanger 31. In the indoor heat exchanger 31, the refrigerant exchanges heat with the indoor air supplied by the indoor fan 32 and thus evaporates into gas refrigerant, which then leaves the gas-side end of the indoor heat exchanger 31. After leaving the gas-side end of the indoor heat exchanger 31, the gas refrigerant flows toward the gas-side refrigerant connection pipe 5.

After flowing through the gas-side refrigerant connection pipe 5, the refrigerant passes through the gas-side shutoff valve 28 and the four-way switching valve 22 before being sucked into the compressor 21 again.

(23-1-4-2) Heating Operation Mode

In heating operation mode, the air-conditioning apparatus 1 sets the four-way switching valve 22 to a heating-operation connection state in which the four-way switching valve 22 connects the discharge side of the compressor 21 with the gas-side shutoff valve 28 while connecting the suction side of the compressor 21 with the outdoor heat exchanger 23, such that refrigerant charged in the refrigerant circuit 10 is circulated mainly through the compressor 21, the indoor heat exchanger 31, the outdoor expansion valve 24, and the outdoor heat exchanger 23 in this order.

More specifically, when the heating operation mode is started, refrigerant in the refrigerant circuit 10 is sucked into and compressed by the compressor 21, and then discharged from the compressor 21.

The capacity of the compressor 21 is controlled in accordance with the heating load required by the indoor unit 30. Gas refrigerant discharged from the compressor 21 flows through the four-way switching valve 22 and the gas-side refrigerant connection pipe 5, and then enters the indoor unit 30.

Upon entering the indoor unit 30, the refrigerant flows into the gas-side end of the indoor heat exchanger 31. In the indoor heat exchanger 31, the refrigerant exchanges heat with the indoor air supplied by the indoor fan 32 and thus condenses into gas-liquid two-phase refrigerant or liquid refrigerant, which then leaves the liquid-side end of the indoor heat exchanger 31. After leaving the liquid-side end of the indoor heat exchanger 31, the refrigerant flows toward the liquid-side refrigerant connection pipe 6.

After flowing through the liquid-side refrigerant connection pipe 6, the refrigerant is decompressed in the liquid-side shutoff valve 29 and the outdoor expansion valve 24 until its pressure reaches a low pressure in the refrigeration cycle. The outdoor expansion valve 24 is controlled such that the refrigerant passing through the liquid-side outlet of the indoor heat exchanger 31 has a degree of subcooling that satisfies a predetermined condition. The refrigerant decompressed in the outdoor expansion valve 24 flows into the liquid-side end of the outdoor heat exchanger 23.

Upon entering the liquid-side end of the outdoor heat exchanger 23, the refrigerant exchanges heat in the outdoor heat exchanger 23 with the outdoor air supplied by the outdoor fan 25 and thus evaporates into gas refrigerant, which then leaves the gas-side end of the outdoor heat exchanger 23.

After leaving the gas-side end of the outdoor heat exchanger 23, the refrigerant passes through the four-way switching valve 22 before being sucked into the compressor 21 again.

(23-1-5) Relationship Between Refrigerant and Outside Diameter of Refrigerant Connection Pipe For copper pipes, the following has been confirmed through research conducted by the applicant: If the refrigerant being used is Refrigerant A, at a specific rated refrigeration capacity of the air-conditioning apparatus 1, it is necessary to use the gas-side refrigerant connection pipe 5 with a greater outside diameter than if the refrigerant being used is R32, and it is necessary to use the liquid-side refrigerant connection pipe 6 with a greater outside diameter than if the refrigerant being used is R32.

The above configuration leads to increased cost. Accordingly, the applicant has considered whether it is possible to employ an aluminum pipe, which is of lower cost than a copper pipe. The results will be described below.

(23-1-6) Relationship Between Pipe Material and Outside Diameter of Refrigerant Connection Pipe FIG. 23C is a comparison table illustrating, for each individual rated refrigeration capacity, the outside diameter of a copper pipe employed as each of the gas-side refrigerant connection pipe 5 and the liquid-side refrigerant connection pipe 6 of an air-conditioning apparatus that uses Refrigerant A, and the outside diameter of a pipe made of aluminum or aluminum alloy (to be referred to as aluminum pipe hereinafter) that is employed instead of a copper pipe as each of the gas-side refrigerant connection pipe 5 and the liquid-side refrigerant connection pipe 6.

(23-1-6-1) Comparison of Outside Diameter of Gas-Side Refrigerant Connection Pipe Hereinbelow, the outside diameter of the gas-side refrigerant connection pipe 5 will be compared for each individual rated refrigeration capacity between different pipe materials (copper and aluminum pipes).

(23-1-6-1-1) Copper Pipe

Referring to FIG. 23C, if the refrigerant being used is Refrigerant A, the following copper pipes are used: for cases where the air-conditioning apparatus 1 has a rated refrigeration capacity of less than 5.0 kW, a copper pipe with an outside diameter of 12.7 mm; for cases where the air-conditioning apparatus 1 has a rated refrigeration capacity of not less than 5.0 kW and less than 10.0 kW, a copper pipe with an outside diameter of 15.9 mm; for cases where the air-conditioning apparatus 1 has a rated refrigeration capacity of not less than 10.0 kW and less than 19.0 kW, a copper pipe with an outside diameter of 19.1 mm; and for cases where the air-conditioning apparatus 1 has a rated refrigeration capacity of not less than 19.0 kW and not more than 28 kW, a copper pipe with an outside diameter of 22.2 mm.

(23-1-6-1-2) Aluminum Pipe

Referring to FIG. 23C, if the refrigerant being used is Refrigerant A, the following aluminum pipes are used: for cases where the air-conditioning apparatus 1 has a rated refrigeration capacity of less than 5.0 kW, an aluminum pipe with an outside diameter of 12.7 mm; for cases where the air-conditioning apparatus 1 has a rated refrigeration capacity of not less than 5.0 kW and less than 8.5 kW, an aluminum pipe with an outside diameter of 15.9 mm; for cases where the air-conditioning apparatus 1 has a rated refrigeration capacity of not less than 8.5 kW and less than 19.0 kW, an aluminum pipe with an outside diameter of 19.1 mm; for cases where the air-conditioning apparatus 1 has a rated refrigeration capacity of not less than 19.0 kW and less than 25 kW, an aluminum pipe with an outside diameter of 22.2 mm; and for cases where the air-conditioning apparatus 1 has a rated refrigeration capacity of not less than 25 kW and not more than 28 kW, an aluminum pipe with an outside diameter of 25.4 mm.

It is to be noted that an aluminum pipe with an outside diameter of 25.4 mm is used even for cases where the air-conditioning apparatus 1 has a rated refrigeration capacity exceeding 28 kW.

(23-1-6-1-3) Comparison Results

As illustrated in FIG. 23C, for cases where an aluminum pipe is used, when the air-conditioning apparatus 1 has rated refrigeration capacities of 9.0 kW and 28 kW, it is necessary to use the gas-side refrigerant connection pipe 5 made of an aluminum pipe with a greater outside diameter than the corresponding copper pipe.

The increase in pipe outside diameter results from increasing the inside diameter of the aluminum pipe while maintaining its withstand pressure in order to achieve the same level of pressure loss as the corresponding copper pipe when the air-conditioning apparatus 1 has rated refrigeration capacities of 9.0 kW and 28 kW.

However, due to the lower material cost of an aluminum pipe than a copper pipe, the increased pipe outside diameter does not lead to increased cost. Therefore, using an aluminum pipe instead of a copper pipe makes it possible to achieve overall cost reduction even with an accompanying increase in pipe outside diameter.

(23-1-6-2) Comparison of Outside Diameter of Liquid-Side Refrigerant Connection Pipe 6

Hereinbelow, the outside diameter of the liquid-side refrigerant connection pipe 6 will be compared for each individual rated refrigeration capacity between different pipe materials (copper and aluminum pipes).

(23-1-6-2-1) Copper Pipe

Referring to FIG. 23C, if the refrigerant being used is Refrigerant A, the following copper pipes are used: for cases where the air-conditioning apparatus 1 has a rated refrigeration capacity of less than 5.0 kW, a copper pipe with an outside diameter of 6.4 mm; for cases where the air-conditioning apparatus 1 has a rated refrigeration capacity of not less than 5.0 kW and less than 19.0 kW, a copper pipe with an outside diameter of 9.5 mm; and for cases where the air-conditioning apparatus 1 has a rated refrigeration capacity of not less than 19.0 kW and not more than 28 kW, a copper pipe with an outside diameter of 12.7 mm.

(23-1-6-2-2) Aluminum Pipe

Referring to FIG. 23C, if the refrigerant being used is Refrigerant A, the following aluminum pipes are used: for cases where the air-conditioning apparatus 1 has a rated refrigeration capacity of less than 5.0 kW, an aluminum pipe with an outside diameter of 6.4 mm; for cases where the air-conditioning apparatus 1 has a rated refrigeration capacity of not less than 5.0 kW and less than 19.0 kW, an aluminum pipe with an outside diameter of 9.5 mm; and for cases where the air-conditioning apparatus 1 has a rated refrigeration capacity of not less than 19.0 kW and not more than 28 kW, an aluminum pipe with an outside diameter of 12.7 mm.

It is to be noted that an aluminum pipe with an outside diameter of 12.7 mm is used even for cases where the air-conditioning apparatus 1 has a rated refrigeration capacity exceeding 28 kW.

(23-1-6-2-3) Comparison Results

As illustrated in FIG. 23C, if the refrigerant being used is Refrigerant A, an aluminum pipe with the same outside diameter as a copper pipe can be used as the liquid-side refrigerant connection pipe 6. The lower material cost of an aluminum pipe than a copper pipe means that cost reduction can be achieved by using an aluminum pipe instead of a copper pipe.

(23-1-7) Wall Thickness and Inside Diameter of Pipe

The following discusses "(23-1-6-1-3) Comparison Results" and "(23-1-6-2-3) Comparison Results" mentioned above from the perspectives of the wall thickness and inside diameter of an aluminum pipe.

The inside diameter of each of the gas-side refrigerant connection pipe 5 and the liquid-side refrigerant connection pipe 6 is designed for each individual rated refrigeration capacity while taking into account the pressure loss at maximum refrigerant circulation rate.

The wall thickness of each of the gas-side refrigerant connection pipe 5 and the liquid-side refrigerant connection pipe 6 is designed to satisfy a design withstand pressure for each individual rated refrigeration capacity.

FIG. 23D is a comparison table illustrating the wall thicknesses of copper and aluminum pipes for each "nominal pipe size". The comparison results will be described below for each "nominal pipe size".

(Nominal Pipe Sizes: "ϕ6.4", "ϕ9.5", and "ϕ12.7")

In FIG. 23D, for nominal pipe sizes "ϕ6.4" and "ϕ9.5", the copper and aluminum pipes are both equal in inside diameter and also have the same wall thickness of 0.8 mm. For such relatively small inside diameter ranges, the wall thickness of 0.8 mm allows for more than enough strength in the first place, and thus using an aluminum pipe instead of a copper pipe does not necessitate an increase in wall thickness.

A case is now considered where, for a pipe with the nominal size "$12.7", a design pressure acts on its entire inner peripheral surface. In this case, if the pipe is an aluminum pipe, the pipe does not have sufficient strength to withstand the pressure if the pipe has the same wall thickness of 0.8 mm as the corresponding copper pipe. The wall thickness thus needs to be increased to 1.0 mm. The resulting aluminum pipe thus has an inside diameter of 10.70 mm, which is 0.4 mm less than the inside diameter of 11.10 mm of the corresponding copper pipe. It is to be noted, however, that the reduction in inside diameter of 0.4 mm does not significantly affect pressure loss.

Consequently, with respect to the liquid-side refrigerant connection pipe 6 in which liquid refrigerant with a smaller specific volume than gas refrigerant flows, if an aluminum pipe is to be used instead of a copper pipe for a range of rated refrigeration capacities from 2.2 kW to 28 kW, an aluminum pipe with the same outside diameter as the corresponding copper pipe can be used. Therefore, "(23-1-6-2-3) Comparison Results" mentioned above are obtained.

Nominal Pipe Sizes: "ϕ15.9", "ϕ19.1", "ϕ22.2", and "ϕ25.4"

In FIG. 23D, for nominal pipe sizes "ϕ15.9", "ϕ19.1", "ϕ22.2", and "ϕ25.4", the corresponding copper pipes have a wall thickness of 1 mm. By contrast, the corresponding aluminum pipes have increased thicknesses of 1.3 mm, 1.5 mm, 1.7 mm, and 2.0 mm. This is due to the reason as described below. As the inside diameter of an aluminum pipe increases, the area of its inner peripheral surface increases. Consequently, when a design pressure acts on the entire inner peripheral surface, the aluminum pipe does not have the sufficient strength to withstand the pressure if the pipe has the same wall thickness of 1.0 mm as the corresponding copper pipe. Accordingly, the wall thickness is increased to provide the sufficient strength to withstand the design pressure.

With regard to the gas-side refrigerant connection pipe 5, as illustrated in FIG. 23C, for a range of rated refrigeration capacities from 2.2 kW to 4.5 kW, a pipe with the nominal pipe size "412.7" may be used for both the copper and aluminum pipes. In this case, although the inside diameter of the aluminum pipe is 0.4 mm smaller than the inside diameter of the corresponding copper pipe as illustrated in FIG. 23D, this does not significantly affect pressure loss even if the maximum refrigerant circulation rate is taken into account. In other words, adequate allowance is provided for pressure loss on the copper pipe side.

Likewise, as illustrated in FIG. 23C, a pipe with the nominal size "ϕ15.9" is used for both the copper and aluminum pipes for a range of rated refrigeration capacities from 5.6 kW to 8.0 kW. In this case, although the inside diameter of the aluminum pipe is 0.6 mm smaller than the inside diameter of the corresponding copper pipe as illustrated in FIG. 23D, this does not significantly affect pressure loss even if the maximum refrigerant circulation rate is taken into account. In other words, adequate allowance is provided for pressure loss on the copper pipe side.

As illustrated in FIG. 23C, for a rated refrigeration capacity of 9.0 kW, a pipe with the nominal size "ϕ15.9" is used as the copper pipe, whereas a pipe with the nominal size "ϕ19.1" needs to be used as the aluminum pipe. In other words, under the condition of maximum refrigerant circulation rate at a rated refrigeration capacity of 9.0 kW, an aluminum pipe with the nominal size "ϕ19.1", which has less pressure loss than a copper pipe with the nominal size "ϕ15.9", is used to minimize pressure loss.

As illustrated in FIG. 23C, for a range of rated refrigeration capacities from 11.2 kW to 16 kW, a pipe with the nominal size "ϕ19.1" may be used for both the copper and aluminum pipes. In this case, although the inside diameter of the aluminum pipe is 1.0 mm smaller than the inside diameter of the corresponding copper pipe as illustrated in FIG. 23D, this does not significantly affect pressure loss even if the maximum refrigerant circulation rate is taken into account. In other words, adequate allowance is provided for pressure loss on the copper pipe side.

Likewise, for a rated refrigeration capacity of 22.4 kW, a pipe with the nominal size "ϕ22.2" is used for both the copper and aluminum pipes as illustrated in FIG. 23C. In this case, although the inside diameter of the aluminum pipe is 1.4 mm smaller than the inside diameter of the corresponding copper pipe as illustrated in FIG. 23D, this does not significantly affect pressure loss even if the maximum refrigerant circulation rate is taken into account. In other words, adequate allowance is provided for pressure loss on the copper pipe side.

As illustrated in FIG. 23C, for a rated refrigeration capacity of 28 kW, a pipe with the nominal size "ϕ22.2" is used as the copper pipe, whereas a pipe with the nominal size "ϕ25.4" needs to be used as the aluminum pipe. In other words, under the condition of maximum refrigerant circulation rate at a rated refrigeration capacity of 28 kW, an aluminum pipe with the nominal size "ϕ25.4", which has less pressure loss than a copper pipe with the nominal size "ϕ22.2", is used to minimize pressure loss.

Therefore, for the gas-side refrigerant connection pipe 5, at rated refrigeration capacities of 9 kW and 28 kW, using an aluminum pipe instead of a copper pipe necessitates an increase in pipe outside diameter. Thus, "(23-1-6-1-3) Comparison Results" mentioned above are obtained.

(23-1-8) Characteristic Features

With the air-conditioning apparatus 1, even if the liquid-side refrigerant connection pipe and the gas-side refrigerant connection pipe are increased in diameter to minimize pressure loss in using a refrigerant containing 1,2-difluoroethylene, a pipe made of aluminum or aluminum alloy is used to thereby minimize an increase in cost while minimizing a decrease in capacity.

Although the foregoing description of the embodiment is based on the assumption that Refrigerant A is used in the air-conditioning apparatus 1, the same also applies to Refrigerants B to D, which are the same as Refrigerant A in that these refrigerants contain 1,2-difluoroethylene.

(23-1-9) Modifications

Although the foregoing description of the embodiment is directed to an example in which the air-conditioning apparatus is provided with only one indoor unit, the air-conditioning apparatus may be provided with a plurality of indoor units (with no indoor expansion valve) connected in parallel with each other.

(24) Embodiment of the Technique of Twenty-Fourth Group (24-1) First Embodiment

The following describes, with reference to the drawings, a first embodiment of an air conditioning apparatus including a thermal storage device according to an example described in the present disclosure.

FIG. 24A illustrates an overall configuration of an air conditioning apparatus 100 in the first embodiment. The air conditioning apparatus 100 includes an example of a thermal storage device 20 according to the present disclosure. Reference numeral 2 denotes a compressor. Reference numeral 3 denotes an outdoor heat exchanger that is an example of a heat-source-side heat exchanger configured to condense gas discharged from the compressor 2. Reference numeral 4 denotes a first electronic expansion valve that is an example of a first expansion mechanism configured to decompress refrigerant condensed by the outdoor heat exchanger 3. Reference numeral 5 denotes an indoor heat exchanger that is an example of a load-side heat exchanger in which refrigerant evaporates. The devices 2 to 5 are serially connected to each other via refrigerant pipes 6 in such a manner as to allow refrigerant to flow therethrough. The devices 2 to 5 connected to each other via the refrigerant pipes 6 constitute a main refrigerant circuit 1, which performs the heat pump function as follows: heat is taken away from room air as a result of heat exchange in the indoor heat exchanger 5 and is then released into outside air by the outdoor heat exchanger 3. The main refrigerant circuit 1 is charged with refrigerant for the vapor compression refrigeration cycle. The refrigerant is a refrigerant mixture containing 1,2-difluoroethylene and may be any one of the refrigerants A to D mentioned above.

The main refrigerant circuit 1 is additionally equipped with: a receiver 7, which is disposed downstream of the outdoor heat exchanger 3 to temporarily store refrigerant; and an accumulator 8, which is disposed upstream of the compressor 2 to separate liquid refrigerant from gas that is to be taken into the compressor 2. A thermistor Th1 is disposed upstream of the first electronic expansion valve 4, and a thermistor Th2 is disposed upstream of the accumulator 8. The thermistors Th1 and Th2 sense the temperature of refrigerant in the corresponding refrigerant pipes 6. A pressure sensor Ps is disposed upstream of the accumulator 8. The pressure sensor Ps senses the pressure of refrigerant in the refrigerant pipe 6 located upstream (on the intake side) of the compressor 2. The air conditioning apparatus 100 is configured in such a manner that on the basis of the sensed refrigerant temperature or the sensed refrigerant pressure, the opening degree of the expansion valve is controlled and the capacity of the compressor 2 is inverter-controlled.

The air conditioning apparatus 100 includes a thermal storage device 20. The thermal storage device 20 includes a thermal storage tank 9 and a thermal storage heat exchanger 10. The thermal storage tank 9 stores water W, which is a storable thermal storage medium. The thermal storage heat exchanger 10 is disposed in the thermal storage tank 9. The thermal storage heat exchanger 10 is at least partially submerged in the water W, which is a thermal storage medium stored in the thermal storage tank 9. The main refrigerant circuit 1, which is an example of a refrigerant supply apparatus, supplies the thermal storage heat exchanger 10 with refrigerant containing at least 1,2-difluoroethylene (FO-1132(E)). In the thermal storage heat exchanger 10, heat is exchanged between refrigerant and the water W. The thermal storage heat exchanger 10 cools the water W by using refrigerant. The thermal storage heat exchanger 10 includes a plurality of cooling tubes 10*a*. The cooling tubes 10*a* are branch-connected to the main refrigerant circuit 1. One end of the thermal storage heat exchanger 10 is an outdoor-side connection end 10*b* connected to a site located downstream of the receiver 7. The other end of the thermal storage heat exchanger 10 is an indoor-side connection end 10*c* connected to a site located upstream of the first electronic expansion valve 4. In the main refrigerant circuit 1, the outdoor-side connection end 10*b* is located closer than the indoor-side connection end 10*c* to the outdoor heat exchanger 3. A second electronic expansion valve 12, which decompresses refrigerant during thermal storage operation, is disposed on the refrigerant pipe 6 of the main refrigerant circuit 1 between the connection ends 10*b* and 10*c* of the thermal storage heat exchanger 10. In other words, the cooling tubes 10*a* of the thermal storage heat exchanger 10 are arranged parallel to the second electronic expansion valve 12.

According to the present disclosure, the cooling tubes 10*a* of the thermal storage heat exchanger 10 have the following layout structure.

The cooling tubes 10*a* are arranged in the thermal storage tank 9 in such a manner as to meander in vertical directions. Specifically, the cooling tubes 10*a* of the thermal storage heat exchanger 10 are arranged as illustrated in FIG. 24B; that is, linear portions 10*e* adjacent to U-shaped portions 10*d*, which are ends in up-and-down directions, extend in a vertical direction. The cooling tubes 10*a* of the thermal storage heat exchanger 10 are supported by a support base 9*a*, which is mounted upright in the thermal storage tank 9. The cooling tubes 10*a* are submerged in the water W stored in the thermal storage tank 9.

A short-circuit tube 13 forms a connection between a site close to the outdoor-side connection end 10*b* of the thermal storage heat exchanger 10 and a site located upstream of the compressor 2.

The air conditioning apparatus 100 also includes a circuit switching means 15, which enables switching between circuit connections in accordance with the operating condition. The circuit switching means 15 includes a first on-off valve 11, a second on-off valve 14, and an open-close control means 16. The first on-off valve 11 is disposed between the outdoor-side connection end 10*b* of the thermal storage heat exchanger 10 and a connection point of the short-circuit tube 13. The second on-off valve 14 is disposed on the short-circuit tube 13. The open-close control means 16 controls valves in accordance with the operating condition of the air conditioning apparatus 100, detection signals from the thermistor Th1, detection signals from the thermistor Th2, and detection signals from the pressure sensor Ps. During thermal storage operation, the open-close control means 16 sets the first on-off valve 11 to the closed state, sets the second on-off valve 14 to the opened state, sets the first electronic expansion valve 4 to the fully closed state, and controls the opening degree of the second electronic expansion valve 12 in accordance with detection signals from the thermistor Th1 and detection signals from the pressure sensor Ps. During thermal storage recovery-cooling operation, the open-close control means 16 sets the first on-off valve 11 to the opened state, sets the second on-off valve 14 to the closed state, and controls the opening degree of the first electronic expansion valve 4 and the opening degree of the second electronic expansion valve 12 in accordance with detection signals from the thermistor Th2 and detection signals from the pressure sensor Ps.

The following describes the individual operating conditions of the circuit configured as described above.

During normal cooling operation, which does not involve thermal storage recovery, the first on-off valve 11 and the second on-off valve 14 are set to the closed state, and the second electronic expansion valve 12 is set to the fully opened state. In this setup, refrigerant compressed by the compressor 2 is condensed in the outdoor heat exchanger 3, is then decompressed by the first electronic expansion valve 4, and is supplied to the indoor heat exchanger 5. The refrigerant aids in providing cooling in such a manner as to evaporate in the indoor heat exchanger 5 by taking away ambient heat and then flows into the compressor 2 to keep circulating.

During the thermal storage operation, the open-close control means 16 of the circuit switching means 15 sets the first on-off valve 11 to the closed state, sets the second on-off valve 14 to the opened state, and sets the first electronic expansion valve 4 to the fully closed state. The open-close control means 16 controls, as appropriate, the opening degree of the second electronic expansion valve 12 in accordance with detection signals from the thermistor Th1 and detection signals from the pressure sensor Ps. With the valves being controlled as described above, refrigerant flows as indicated by the arrows in FIG. 24A; that is, refrigerant discharged by the compressor 2 and transmitted through the outdoor heat exchanger 3 is decompressed by the second electronic expansion valve 12 and is then supplied to the cooling tubes 10*a* through the indoor-side connection end 10*c*. The refrigerant supplied to the cooling tubes 10*a* exchanges heat with the water W stored in the thermal storage tank 9 and evaporates in the cooling tubes 10*a* accordingly. Consequently, ice I is generated, and the cold is stored on the cooling tubes 10*a* encrusted with the ice I.

The thermal storage operation may be followed by thermal storage recovery-cooling operation, in which the open-close control means 16 sets the first on-off valve 11 to the opened state, sets the second on-off valve 14 to the closed state, and controls the opening degree of the first electronic expansion valve 4 in accordance with detection signals from the thermistor Th2 and detection signals from the pressure sensor Ps. The second electronic expansion valve 12 regulates the proportion of refrigerant circulating through the main refrigerant circuit 1 in the total refrigerant discharged by the compressor 2 and transmitted through the outdoor heat exchanger 3 as indicated by arrows in FIG. 24C. In this way, the open-close control means 16 controls the flow rate of refrigerant supplied through the outdoor-side connection end 10*b* to the cooling tubes 10*a*. The refrigerant supplied to the cooling tubes 10*a* is cooled by exchanging heat with the ice I stored in the thermal storage tank 9 and is then led through the indoor-side connection end 10*c* to the first electronic expansion valve 4. The opening degree of the first electronic expansion valve 4 is controlled to decompress the refrigerant. The refrigerant decompressed by the first electronic expansion valve 4 is led to the indoor heat exchanger 5 and evaporates in the indoor heat exchanger 5 to aid in providing cooling for a room.

With each cooling tube 10*a* being disposed in such a manner as to extend in a vertical direction, encrustations of the ice I on the cooling tube 10*a* (see, for example, FIG. 24D(a)) thaw uniformly on circles concentric with the cooling tube 10*a* as illustrated in FIG. 24D(b) during the thermal storage recovery-cooling operation. Once the ice I thaws to a predetermined level, the ice I floats up along the cooling tubes 10*a* toward the upper part of the thermal storage tank 9, thus suppressing buoyant force acting on the cooling tubes 10*a*. Thus, the cooling tubes 10*a* are less prone to deformation. After floating up, the ice I is exposed to the relatively hot water W, which in turn furthers the thawing of the ice I. Consequently, the already-existing water W does not stay on the same spot. Although the amount of ice to be made may be high enough to achieve a high ice packing factor with a safeguard against possible irregular formation of ice I, local blocking is thus less likely to occur in this configuration than in conventional configurations. This feature eliminates or reduces the possibility that the cooling tubes 10*a* or the thermal storage tank 9 will be damaged by the blocking. After thawing, the ice is regenerated in the same place during cold recovery operation as illustrated in FIG. 24D(c), thus exhibiting enhanced reproducibility during refreezing.

As the thermal storage medium stored in the thermal storage tank 9, the water W is used alone in the example above. Alternatively, an aqueous brine solution containing, for example, ethylene glycol may be used. The thermal storage heat exchanger 10 may be disposed as follows. As illustrated in FIG. 24E(a), upper-end fixed portions of the cooling tubes 10*a* may jut above the water. As illustrated in FIG. 24E(b), the U-shaped portions 10*d*, which are lower ends of the cooling tubes 10*a*, may jut out of the bottom of the thermal storage tank 9. These arrangements eliminate factors that prevent the thawing ice I from floating up, and the ice I can thus easily float up.

(24-2) Second Embodiment

The following describes, with reference to the drawings, a second embodiment of the air conditioning apparatus including the thermal storage device according to an example described in the present disclosure.

The difference between the first embodiment and the second embodiment is in a means for extracting the cold from the thermal storage tank 9. The second embodiment will be described with a focus on the difference.

As illustrated in FIG. 24F, a main refrigerant circuit 1 of an air conditioning apparatus 100 in the second embodiment is substantially identical to the main refrigerant circuit 1 described in the first embodiment. In the second embodiment, one end of a thermal storage heat exchanger 10 of a thermal storage device 20 is connected via a second electronic expansion valve 12 to a site located downstream of an outdoor heat exchanger 3, and the other end of the thermal storage heat exchanger 10 is connected to a site located upstream (on the intake side) of a compressor 2. In the second embodiment, a heat exchanger unit 17*a* of a cold extraction heat exchanger 17 is accommodated in a thermal storage tank 9 of the thermal storage device 20. The cold extraction heat exchanger 17 is connected to a site located upstream of a first electronic expansion valve 4 in the main refrigerant circuit 1.

The following describes the operation of the air conditioning apparatus 100 in the second embodiment.

During thermal storage operation, an open-close control means 16 sets a first on-off valve 11 and a second on-off valve 14 to the closed state and sets the first electronic expansion valve 4 to the fully closed state. The open-close control means 16 controls the opening degree of the second electronic expansion valve 12. Refrigerant thus flows as indicated by arrows in FIG. 24F. Consequently, ice I is generated, and cooling tubes 1*a* of the thermal storage heat exchanger 10 are encrusted with the ice I.

The thermal storage operation may be followed by thermal storage recovery-cooling operation, in which the open-close control means 16 regulates the opening degree of the first on-off valve 11, sets the second on-off valve 14 to the opened state, controls the opening degree of the first electronic expansion valve 4, and sets the second electronic expansion valve 12 to the fully closed state. When these valves are controlled as described above, refrigerant flows as indicated by arrows in FIG. 24G. Consequently, the cold is extracted from the cold extraction heat exchanger 17 and is supplied to the main refrigerant circuit 1 to aid in cooling operation.

During the thermal storage recovery-cooling operation, circulation flows are generated in such a manner as to move from the upper part toward the lower part of the thermal storage tank 9 as illustrated in FIG. 24H. The ice I is generated on the cooling tubes 10*a* in up-and-down directions along the circulation flows. Water W is moved by convection uniformly across the entire surfaces of encrustations of ice I, which in turn thaws to a uniform level. This reduces the possibility of local ice accumulation, and as a result, a blocking phenomenon is less likely to occur. When a large amount of ice is made, the individual blocks of ice I may become merged into one as illustrated in FIG. 24I(a). Since the water W between the individual blocks of ice I can move by convection, the ice I thaws in such a manner as to separate in pieces (see FIG. 24I(b)). Convection of the water W can thus occur in a larger area than would otherwise occur in conventional configurations, and the thawing efficiency is improved accordingly.

In the embodiments above, a direct expansion heat exchanger is used as the thermal storage heat exchanger. Alternatively, the embodiments are also applicable to a device in which a secondary refrigerant such as brine is used for ice making. The second embodiment is also applicable to a device in which a secondary refrigerant flows through a cold extraction heat exchanger to enable extraction of the cold and to a device in which water in the thermal storage tank circulates through, for example, a cold extraction heat exchanger or a fan coil unit outside the thermal storage tank to enable extraction of the cold.

(24-3) Features of Thermal Storage Device and Air Conditioning Apparatus According to Present Disclosure 24-3-1

The thermal storage device 20 according to the embodiments above includes the thermal storage tank 9 and the thermal storage heat exchanger 10. The water W, which is an example of a thermal storage medium is stored in the thermal storage tank 9. The thermal storage heat exchanger 10 is submerged in the water W stored in the thermal storage tank 9. The thermal storage heat exchanger 10 is connected to the main refrigerant circuit 1, which is an example of a refrigerant supply apparatus. The thermal storage heat exchanger 10 cools the water W by using refrigerant supplied by the main refrigerant circuit 1 and containing at least 1,2-difluoroethylene (HFO-1132(E)). The refrigerant may be anyone of the refrigerants A to D mentioned above.

The refrigerant supplied by the main refrigerant circuit 1, containing 1,2-difluoroethylene (HFO-1132(E)), and having a low global warming potential is used to cool the water W, and the thermal storage tank 9 stores the resultant cold. This feature contributes to power load leveling.

24-3-2

The thermal storage device 20 according to the embodiments above is configured as follows: a cooling passage through which refrigerant flows is formed in the thermal storage heat exchanger 10 in such a manner as to meander in vertical directions in the thermal storage tank 9.

24-3-3

The thermal storage device 20 according to the embodiments above is also configured as follows: the thermal storage heat exchanger 10 includes the cooling tubes 10*a*, which define the cooling passage; and the cooling tubes 10*a* are arranged in such a manner that sections of the cooling tubes 10*a* are aligned in straight lines in lengthwise and breadthwise directions when the thermal storage tank 9 is viewed in horizontal section.

24-3-4

The air conditioning apparatus 100 in the first embodiment includes the main refrigerant circuit 1, which is formed in such a manner that the compressor 2, the outdoor heat exchanger 3 provided as an example of a heat-source-side heat exchanger, the first electronic expansion valve 4 provided as an example of a first decompression mechanism that decompresses refrigerant, and the indoor heat exchanger 5 provided as an example of a load-side heat exchanger are connected to each other via the refrigerant pipes 6. The air conditioning apparatus 100 is a thermal-storage air conditioning apparatus including the thermal storage device 20 containing the water W, which is a thermal storage medium capable of storing heat. In the air conditioning apparatus 100, the second electronic expansion valve 12 provided as an example of a second decompression mechanism that decompress refrigerant during the thermal storage operation is disposed between the refrigerant pipes 6. The thermal storage device 20 is configured as follows: the water W is stored in the thermal storage tank 9, and the thermal storage heat exchanger 10 submerged in the water W is accommodated in the thermal storage tank 9. The thermal storage heat exchanger 10 and the second electronic expansion valve 12 are connected in parallel to the main refrigerant circuit 1. The thermal storage heat exchanger 10 includes the cooling tubes 10*a*, through which refrigerant flows. The cooling tubes 10*a* are formed in such a manner as to meander in vertical directions in the thermal storage tank 9. One end of the short-circuit tube 13 is connected to the outdoor-side connection end 10*b*, which is an example of a first heat-exchanger-side end of the thermal storage heat exchanger 10, and the other end of the short-circuit tube 13 is connected to the refrigerant pipe 6 located upstream of the compressor 2. During the thermal storage operation, refrigerant flows through the second electronic expansion valve 12 and enters the thermal storage heat exchanger 10 from the indoor-side connection end 10*c*, which is an example of a second heat-exchanger-side end, to cool the water W stored in the thermal storage tank 9. The refrigerant then flows through the short-circuit tube 13 and enters a site located upstream of the compressor 2. The air conditioning apparatus 100 includes the circuit switching means 15, which performs switching between circuit connections so that refrigerant flows as follows. During the thermal storage recovery-cooling operation, refrigerant flows through the outdoor heat exchanger 3 and then enters the thermal storage heat exchanger 10 from the outdoor-side connection end 10*b*. After being cooled, the refrigerant is supplied to the indoor heat exchanger 5.

24-3-5

The thermal storage device 20 of the air conditioning apparatus 100 in the second embodiment includes the thermal storage tank 9, the thermal storage heat exchanger 10 submerged in the water W and accommodated in the thermal storage tank 9, and the cold extraction heat exchanger 17. One end of the thermal storage heat exchanger 10 is connected to a site located downstream of the outdoor heat exchanger 3 via the second electronic expansion valve 12, and the other end of the thermal storage heat exchanger 10 is connected to a site located upstream of the compressor 2. The thermal storage heat exchanger 10 includes the cooling tubes 10*a*, through which refrigerant flows. The cooling tubes 10*a* are provided in such a manner as to meander in vertical directions in the thermal storage tank 9. The cold extraction heat exchanger 17 is connected to the refrigerant pipe 6 located upstream of the first electronic expansion valve 4. During the thermal storage operation, refrigerant flows through the second electronic expansion valve 12 and enters the thermal storage heat exchanger 10 to cool the water W stored in the thermal storage tank 9. The refrigerant then enters a site located upstream of the compressor 2. The air conditioning apparatus 100 includes the circuit switching means 15, which performs switching between circuit connections so that refrigerant flows as follows. During the thermal storage recovery-cooling operation, refrigerant flows through the outdoor heat exchanger 3 and then enters the cold extraction heat exchanger 17. After being cooled, the refrigerant is supplied to the indoor heat exchanger 5.

24-3-6

The thermal storage device 20 according to the present disclosure produces the following effects.

Owing to the vertical orientation of the thermal storage heat exchanger 10, substantially uniform encrustations of ice thaw uniformly during the thermal storage recovery-cooling operation. Consequently, a local build-up of ice does not occur during refreezing. This eliminates or reduces the possibility of the occurrence of blocking caused by ice formation and offers enhanced efficiency of thermal storage. Moreover, the thermal storage heat exchanger 10 and the thermal storage tank 9 are less prone to deformation and damage.

The cooling tubes 10*a* are arranged in such a manner that sections of the cooling tubes 10*a* are aligned in straight lines in lengthwise and breadthwise directions when the thermal storage tank 9 is viewed in horizontal section. When blocks of ice are merged into one, unfrozen portions may thus be left between the individual blocks of ice. The thermal storage medium moves through the unfrozen portions by convection and thus furthers the thawing of ice. The thawing efficiency may be improved accordingly.

Once the ice thaws to a predetermined level, the ice floats up along the cooling tubes 10*a* and thaws in an upper part of the thermal storage tank 9. Thus, already-existing water does not stay in the ice, and as a result, the possibility of the occurrence of local blocking may be eliminated or reduced.

(25) Embodiment of the Technique of Twenty-Fifth Group

(25-1) First Embodiment

The following describes, with reference to the drawings, a heat load treatment system 100, which is a refrigeration apparatus according to a first embodiment. The following embodiments, which are provided as specific examples, should not be construed as limiting the technical scope and may be altered as appropriate within a range not departing from the spirit thereof. Words such as up, down, left, right, forward (frontside), and rearward (backside) may be hereinafter used to refer to directions. Unless specified otherwise, these directions correspond to directions denoted by arrows in the drawings. The words relevant to the directions are merely used to facilitate the understanding of the embodiments and should not be construed as limiting the ideas presented in the present disclosure.

(25-1-1) Overall Configuration

FIG. 25A is a schematic configuration diagram of the heat load treatment system 100. The heat load treatment system 100 is a system for treating a heat load in an installation environment. In the present embodiment, the heat load treatment system 100 is an air conditioning system that air-conditions a target space.

The heat load treatment system 100 includes mainly a plurality of heat-source-side units 10 (four heat-source-side units 10 in the example concerned), a heat exchanger unit 30, a plurality of use-side units 60 (four use-side units 60 in the example concerned), a plurality of liquid-side connection pipes LP (four liquid-side connection pipes LP in the example concerned), a plurality of gas-side connection pipes GP (four gas-side connection pipes GP in the example concerned), a first heat-medium connection pipe H1, a second heat-medium connection pipe H2, a refrigerant leakage sensor 70, and a controller 80, which controls the operation of the heat load treatment system 100.

In the heat load treatment system 100, a refrigerant circuit RC, through which refrigerant circulates, is formed in such a manner that each of the heat-source-side units 10 is connected to the heat exchanger unit 30 via the corresponding one of the liquid-side connection pipes LP and the corresponding one of the gas-side connection pipes GP. The plurality of heat-source-side units 10 are arranged in parallel, and a plurality of refrigerant circuits RC (four refrigerant circuits RC in the example concerned) are formed in the heat load treatment system 100 accordingly. In other words, the heat load treatment system 100 includes the plurality of refrigerant circuits RC, each of which is constructed of the corresponding one of the plurality of heat-source-side units 10 and the heat exchanger unit 30. The heat load treatment system 100 performs a vapor compression refrigeration cycle in each refrigerant circuit RC.

In the present embodiment, refrigerant sealed in the refrigerant circuits RC is a refrigerant mixture containing 1,2-difluoroethylene and may be any one of the refrigerants A to D mentioned above.

In the heat load treatment system 100, a heat medium circuit HC, through which a heat medium circulates, is formed in such a manner that the heat exchanger unit 30 and the use-side units 60 are connected to each other via the first heat-medium connection pipe H1 and the second heat-medium connection pipe H2. In other words, the heat exchanger unit 30 and the use-side units 60 constitute the heat medium circuit HC in the heat load treatment system 100. When being driven, a pump 36 of the heat exchanger unit 30 causes the heat medium to circulate through the heat medium circuit HC.

In the present embodiment, the heat medium sealed in the heat medium circuit HC is, for example, a liquid medium such as water or brine. Examples of brine include aqueous sodium chloride solution, aqueous calcium chloride solution, aqueous ethylene glycol solution, and aqueous propylene glycol solution. The liquid medium is not limited to these examples and may be selected as appropriate. Specifically, brine is used as the heat medium in the present embodiment.

(25-1-2) Details on Configuration (25-1-2-1) Heat-Source-Side Unit

In the present embodiment, the heat load treatment system 100 includes four heat-source-side units 10 (see FIG. 25A). The four heat-source-side units 10 cool or heat refrigerant, which is in turn used by the heat exchanger unit 30 to cool or heat the liquid medium. The number of the heat-source-side units 10 is not limited to particular values such as four, which is merely given as an example. One, two, three, or five or more heat-source-side units 10 may be included. The internal configuration of one of the four heat-source-side units 10 is illustrated in FIG. 25A, in which the internal configuration of the remaining three heat-source-side units 10 is omitted. Each of the heat-source-side units 10 that are not illustrated in full has the same configuration as the heat-source-side unit 10 that will be described below.

The heat-source-side units 10 are units that use air as a heat source to cool or heat refrigerant. The heat-source-side units 10 are individually connected to the heat exchanger unit 30 via the respective liquid-side connection pipes LP and the respective gas-side connection pipes GP. In other words, the individual heat-source-side units 10 together with the heat exchanger unit 30 are constituent components of the corresponding refrigerant circuits RC. That is, the plurality of refrigerant circuits RC (four refrigerant circuits RC in the example concerned) are formed in the heat load treatment system 100 in such a manner that the respective heat-source-side units 10 (four heat-source-side units 10 in the example concerned) are individually connected to the heat exchanger unit 30. The refrigerant circuits RC are separated from each other and do not communicate with each other.

Although the installation site of the heat-source-side units 10 is not limited, each of the heat-source-side unit 10 may be installed on a roof or in a space around a building. The heat-source-side unit 10 is connected to the heat exchanger unit 30 via the liquid-side connection pipe LP and the gas-side connection pipe GP to form part of the refrigerant circuit RC.

The heat-source-side unit 10 includes mainly, as devices constituting the refrigerant circuit RC, a plurality of refrigerant pipes (a first pipe P1 to an eleventh pipe P11), a compressor 11, an accumulator 12, a four-way switching valve 13, a heat-source-side heat exchanger 14, a subcooler 15, a heat-source-side first control valve 16, a heat-source-side second control valve 17, a liquid-side shutoff valve 18, and a gas-side shutoff valve 19.

The first pipe P1 forms a connection between the gas-side shutoff valve 19 and a first port of the four-way switching valve 13. The second pipe P2 forms a connection between an inlet port of the accumulator 12 and a second port of the four-way switching valve 13. The third pipe P3 forms a connection between an outlet port of the accumulator 12 and an intake port of the compressor 11. The fourth pipe P4 forms a connection between a discharge port of the compressor 11 and a third port of the four-way switching valve 13. The fifth pipe P5 forms a connection between a fourth port of the four-way switching valve 13 and a gas-side inlet-outlet port of the heat-source-side heat exchanger 14. The sixth pipe P6 forms a connection between a liquid-side inlet-outlet port of the heat-source-side heat exchanger 14 and one end of the heat-source-side first control valve 16. The seventh pipe P7 forms a connection between the other end of the heat-source-side first control valve 16 and one end of a main channel 151 in the subcooler 15. The eighth pipe P8 forms a connection between the other end of the main channel 151 in the subcooler 15 and one end of the liquid-side shutoff valve 18.

The ninth pipe P9 forms a connection between one end of the heat-source-side second control valve 17 and a portion of the sixth pipe P6 between its two ends. The tenth pipe P10 forms a connection between the other end of the heat-source-side second control valve 17 and one end of a subchannel 152 in the subcooler 15. The eleventh pipe P11 forms a connection between the other end of the subchannel 152 in the subcooler 15 and an injection port of the compressor 11.

Each of these refrigerant pipes (the pipes P1 to P11) may be practically constructed of a single pipe or a plurality of pipes connected to each other via a joint.

The compressor 11 is a device that compresses low-pressure refrigerant in the refrigeration cycle to a high pressure. In the present embodiment, the compressor 11 has a closed structure in which a rotary-type or scroll-type positive-displacement compression element is driven and rotated by a compressor motor (not illustrated). The operating frequency of the compressor motor may be controlled by an inverter. The capacity of the compressor 11 is thus controllable. Alternatively, the compressor 11 may be a compressor with fixed capacity.

The accumulator 12 is a container provided to eliminate or reduce the possibility that an excessive amount of liquid refrigerant will be sucked into the compressor 11. The accumulator 12 has a predetermined volumetric capacity required to accommodate refrigerant charged into the refrigerant circuit RC.

The four-way switching valve 13 is a channel-switching mechanism for redirecting a flow of refrigerant in the refrigerant circuit RC. The four-way switching valve 13 enables switching between the normal cycle state and the reverse cycle state. When the four-way switching valve 13 is switched to the normal cycle state, the first port (the first pipe P1) communicates with the second port (the second pipe P2), and the third port (the fourth pipe P4) communicates with the fourth port (the fifth pipe P5) (see solid lines in the four-way switching valve 13 illustrated in FIG. 25A). When the four-way switching valve 13 is switched to the reverse cycle state, the first port (the first pipe P1) communicates with the third port (the forth pipe P4), and the second port (the second pipe P2) communicates with the fourth port (the fifth pipe P5) (see broken lines in the four-way switching valve 13 illustrated in FIG. 25A).

The heat-source-side heat exchanger 14 is a heat exchanger that functions as a refrigerant condenser (or radiator) or a refrigerant evaporator. The heat-source-side heat exchanger 14 functions as a refrigerant condenser during normal cycle operation (operation in which the four-way switching valve 13 is in the normal cycle state). The heat-source-side heat exchanger 14 functions as a refrigerant evaporator during reverse cycle operation (operation in which the four-way switching valve 13 is in the reverse cycle state). The heat-source-side heat exchanger 14 includes a plurality of heat transfer tubes and a heat transfer fin (not illustrated). The heat-source-side heat exchanger 14 is configured to enable exchange of heat between refrigerant in the heat transfer tubes and air flowing around the heat transfer tubes or around the heat transfer fin (heat-source-side airflow, which will be described later).

The subcooler 15 is a heat exchanger that transforms incoming refrigerant into liquid refrigerant in a subcooled state. The subcooler 15 is, for example, a double-tube heat exchanger, and the main channel 151 and the subchannel 152 are formed in the subcooler 15. The subcooler 15 is configured to enable exchange of heat between refrigerant flowing through the main channel 151 and refrigerant flowing through the subchannel 152.

The heat-source-side first control valve 16 is an electronic expansion valve whose opening degree is controllable, such that the pressure of incoming refrigerant may be reduced in accordance with the opening degree or the flow rate of incoming refrigerant may be regulated in accordance with the opening degree. The heat-source-side first control valve 16 is capable of switching between the opened state and the closed state. The heat-source-side first control valve 16 is disposed between the heat-source-side heat exchanger 14 and the subcooler 15 (the main channel 151).

The heat-source-side second control valve 17 is an electronic expansion valve whose opening degree is controllable, such that the pressure of incoming refrigerant may be reduced in accordance with the opening degree or the flow rate of incoming refrigerant may be regulated in accordance with the opening degree. The heat-source-side second control valve 17 is capable of switching between the opened state and the closed state. The heat-source-side second control valve 17 is disposed between the heat-source-side heat exchanger 14 and the subcooler 15 (the subchannel 152).

The liquid-side shutoff valve 18 is a manual valve disposed in the portion where the eighth pipe P8 is connected to the liquid-side connection pipe LP. One end of the liquid-side shutoff valve 18 is connected to the eighth pipe P8, and the other end of the liquid-side shutoff valve 18 is connected to the liquid-side connection pipe LP.

The gas-side shutoff valve 19 is a manual valve disposed in the portion where the first pipe P1 is connected to the gas-side connection pipe GP. One end of the gas-side shutoff valve 19 is connected to the first pipe P1, and the other end of the gas-side shutoff valve 19 is connected to the gas-side connection pipe GP.

The heat-source-side unit 10 also includes a heat-source-side fan 20, which generates heat-source-side airflow flowing through the heat-source-side heat exchanger 14. The heat-source-side fan 20 is a fan that supplies the heat-source-side heat exchanger 14 with the heat-source-side airflow, which is a cooling source or a heating source for refrigerant flowing through the heat-source-side heat exchanger 14. The heat-source-side fan 20 includes, as a drive source, a heat-source-side fan motor (not illustrated), which executes on-off control and regulates the revolution frequency as circumstances demand.

In addition, the heat-source-side unit 10 includes a plurality of heat-source-side sensors S1 (see FIG. 25C) to sense the state (the pressure or temperature in particular) of refrigerant in the refrigerant circuit RC. Each heat-source-side sensor S1 is a pressure sensor or a temperature sensor such as a thermistor or a thermocouple. A first temperature sensor 21, which senses the temperature (suction temperature) of refrigerant on the intake side of the compressor 11 (refrigerant in the third pipe P3), and/or a second temperature sensor 22, which senses the temperature (discharge temperature) of refrigerant on the discharge side of the compressor 11 (refrigerant in the fourth pipe P4) may be included as the heat-source-side sensor S1. A third temperature sensor 23, which senses the temperature of refrigerant on the liquid side of the heat-source-side heat exchanger 14 (refrigerant in the sixth pipe P6), a fourth temperature sensor 24, which senses the temperature of refrigerant in the eighth pipe P8, and/or a fifth temperature sensor 25, which senses the temperature of refrigerant in the eleventh pipe P11 may be included as the heat-source-side sensor S1. A first pressure sensor 27, which senses the pressure (intake pressure) of refrigerant on the intake side of the compressor 11 (refrigerant in the second pipe P2), and/or a second pressure sensor 28, which senses the pressure (discharge pressure) on the discharge side of the compressor 11 (refrigerant in the fourth pipe P4) may be included as the heat-source-side sensor S1.

The heat-source-side unit 10 also includes a heat-source-side unit control unit 29, which controls the operation and states of the devices included in the heat-source-side unit 10. For example, various electric circuits, a microprocessor, and a microcomputer including a memory chip that stores programs to be executed by the microprocessor are included in the heat-source-side unit control unit 29, which can thus perform its functions. The heat-source-side unit control unit 29 is electrically connected to the devices (11, 13, 16, 17, 20) and the heat-source-side sensors S1 of the heat-source-side unit 10 to perform signal input and output. The heat-source-side unit control unit 29 is electrically connected through a communication line to a heat exchanger unit control unit 49 (which will be described later) of the heat exchanger unit 30 to transmit and receive control signals.

(25-1-2-2) Heat Exchanger Unit

The heat exchanger unit 30 is a device in which a heat medium is cooled and/or heated by exchanging heat with refrigerant. In the present embodiment, cooling of the heat medium and heating of the heat medium are performed in the heat exchanger unit 30 in such a manner that heat is exchanged between the heat medium and refrigerant. The heat medium cooled or heated by the liquid refrigerant in the heat exchanger unit 30 is transferred to the use-side units 60.

The heat exchanger unit 30 is a unit in which a heat medium that is to be transferred to the use-side units 60 is cooled or heated by exchanging heat with the refrigerant. Although the installation site of the heat exchanger unit 30 is not limited, the heat exchanger unit 30 may be installed indoors (e.g., in an equipment/device room). As constituent devices of the refrigerant circuits RC, refrigerant pipes (refrigerant pipes Pa, Pb, Pc, and Pd), expansion valves 31, and on-off valves 32 are included in the heat exchanger unit 30. The number of the refrigerant pipes is the same as the number of the heat-source-side units 10 (the refrigerant circuits RC); that is, the number of the refrigerant pipes is equal to four in the example concerned. The same holds for the number of the expansion valves 31 and the number of the on-off valves 32. As a constituent device of the refrigerant circuits RC and of the heat medium circuit HC, a heat exchanger 33 is included in the heat exchanger unit 30.

The refrigerant pipe Pa forms a connection between the liquid-side connection pipe LP and one end of the expansion valve 31. The refrigerant pipe Pb forms a connection between the other end of the expansion valve 31 and a liquid-side refrigerant inlet-outlet port of the heat exchanger 33. The refrigerant pipe Pc forms a connection between a gas-side refrigerant inlet-outlet port of the heat exchanger 33 and one end of the on-off valve 32. The refrigerant pipe Pd forms a connection between the other end of the on-off valve 32 and the gas-side connection pipe GP. Each of these refrigerant pipes (the pipes Pa to Pd) may be practically constructed of a single pipe or a plurality of pipes connected to each other via a joint.

The expansion valve 31 is an electronic expansion valve whose opening degree is controllable, such that the pressure of incoming refrigerant may be reduced in accordance with the opening degree or the flow rate of incoming refrigerant may be regulated in accordance with the opening degree. The expansion valve 31 is capable of switching between the opened state and the closed state. The expansion valve 31 is disposed between the heat exchanger 33 and the liquid-side connection pipe LP.

The on-off valve 32 is a control valve capable of switching between the opened state and the closed state. The on-off valve 32 in the closed state interrupts refrigerant. The on-off valve 32 is disposed between the heat exchanger 33 and the gas-side connection pipe GP.

A plurality of paths (refrigerant paths RP) for refrigerant flowing through the refrigerant circuits RC are formed in heat exchanger 33. In the heat exchanger 33, the refrigerant paths RP do not communicate with each other. On this account, each refrigerant path RP has a liquid-side inlet-outlet port and a gas-side inlet-outlet port. The number of liquid-side inlet-outlet ports in the heat exchanger 33 is the same as the number of refrigerant paths RP; that is, the number of liquid-side inlet-outlet ports in the heat exchanger 33 is equal to four in the example concerned. The same holds for the number of gas-side inlet-outlet ports in the heat exchanger 33. A path (heat medium path HP) for the heat medium flowing through the heat medium circuit HC is also formed in the heat exchanger 33.

More specifically, a first heat exchanger 34 and a second heat exchanger 35 are included as the heat exchanger 33. The first heat exchanger 34 and the second heat exchanger 35 are discrete devices. Two separate refrigerant paths RP are formed in each of the first heat exchanger 34 and the second heat exchanger 35. The first heat exchanger 34 and the second heat exchanger 35 are configured as follows: one end of each refrigerant path RP is connected to the refrigerant pipe Pb of the corresponding one of the refrigerant circuits RC, and the other end of each refrigerant path RP is connected to the refrigerant pipe Pc of the corresponding one of the refrigerant circuits RC. In the first heat exchanger 34, one end of the heat medium path HP is connected to a heat medium pipe Hb, which will be described later, and the other end of the heat medium path HP is connected to a heat medium pipe Hc, which will be described later. In the second heat exchanger 35, one end of the heat medium path HP is connected to Hc, which will be described later, and the other end of the heat medium path HP is connected to a heat medium pipe Hd, which will be described later. In the heat medium circuit HC, the heat medium path HP of the first heat exchanger 34 and the heat medium path HP of the second heat exchanger 35 are arranged in series. Each of the first heat exchanger 34 and the second heat exchanger 35 is configured to enable exchange of heat between refrigerant flowing through the refrigerant paths RP (the refrigerant circuits RC) and the heat medium flowing through the heat medium path HP (the heat medium circuit HC).

As a constituent device of the heat medium circuit HC, heat medium pipes (heat medium pipes Ha, Hb, Hc, and Hd) and the pump 36 are also included in the heat exchanger unit 30.

One end of the heat medium pipe Ha is connected to the first heat-medium connection pipe H1, and the other end of the heat medium pipe Ha is connected to an intake-side port of the pump 36. One end of the heat medium pipe Hb is connected to a discharge-side port of the pump 36, and the other end of the heat medium pipe Hb is connected to one end of the heat medium path HP of the first heat exchanger 34. One end of the heat medium pipe He is connected to the other end of the heat medium path HP of the first heat exchanger 34, and the other end of the heat medium pipe He is connected to one end of the heat medium path HP of the second heat exchanger 35. One end of the heat medium pipe Hd is connected to the other end of the heat medium path HP of the second heat exchanger 35, and the other end of the heat medium pipe Hd is connected to the second heat-medium connection pipe H2. Each of these heat medium pipes (the pipes Ha to Hd) may be practically constructed of a single pipe or a plurality of pipes connected to each other via a joint.

The pump 36 is disposed in the heat medium circuit HC. During operation, the pump 36 sucks in and discharges the heat medium. The pump 36 includes a motor that is a drive source. The motor is inverter-controlled, and the revolution frequency is regulated accordingly. The discharge flow rate of the pump 36 is thus variable. The heat exchanger unit 30 may include a plurality of pumps 36 connected in series or parallel in the heat medium circuit HC. The pump 36 may be a metering pump.

The heat exchanger unit 30 includes a plurality of heat exchanger unit sensors S2 (see FIG. 25C) to sense the state (the pressure or temperature in particular) of refrigerant in the refrigerant circuits RC. Each heat exchanger unit sensor S2 is a pressure sensor or a temperature sensor such as a thermistor or a thermocouple. A sixth temperature sensor 41, which senses the temperature of refrigerant on the liquid side of the heat exchanger 33 (refrigerant in the refrigerant pipe Pb on the refrigerant path RP), and/or a seventh temperature sensor 42, which senses the temperature of refrigerant on the gas-side of the heat exchanger 33 (refrigerant in the refrigerant pipe Pc on the refrigerant path RP) may be included as the heat exchanger unit sensor S2. A third pressure sensor 43, which senses the pressure of refrigerant on the liquid side of the heat exchanger 33 (refrigerant in the refrigerant pipe Pb on the refrigerant path RP), and/or a fourth pressure sensor 44, which senses the pressure on the gas-side of the heat exchanger 33 (refrigerant in the refrigerant pipe Pc on the refrigerant path RP) may be included as the heat exchanger unit sensor S2.

The heat exchanger unit 30 includes an exhaust fan unit to enable the heat exchanger unit 30 to discharge leakage refrigerant at the time of occurrence of refrigerant leakage in the heat exchanger unit 30 (the refrigerant circuit RC). The exhaust fan unit includes an exhaust fan 46. The exhaust fan 46 is driven along with a drive source (e.g., a fan motor). When being driven, the exhaust fan 46 generates a first airflow AF1, which flows out of the heat exchanger unit 30. The exhaust fan 46 is not limited to a particular type of fan and is, for example, a sirocco fan or a propeller fan.

The heat exchanger unit 30 also includes a cooling fan 48. The cooling fan 48 is driven along with a drive source (e.g., a fan motor). When being driven, the cooling fan 48 generates a second airflow AF2 to cool electric components (heating components) disposed in the heat exchanger unit 30. The cooling fan 48 is disposed in such a manner that the second airflow AF2 flows around the heating components to perform heat exchange and then flows out of the heat exchanger unit 30. The cooling fan 48 is not limited to a particular type of fan and is, for example, a sirocco fan or a propeller fan.

The heat exchanger unit 30 also includes a heat exchanger unit control unit 49, which controls the operation and states of the devices included in the heat exchanger unit 30. For example, a microprocessor, a microcomputer including a memory chip that stores programs to be executed by the microprocessor, and various electric components are included in the heat exchanger unit control unit 49, which can thus perform its functions. The heat exchanger unit control unit 49 is electrically connected to the devices and the heat exchanger unit sensors S2 of the heat exchanger unit 30 to perform signal input and output. The heat exchanger unit control unit 49 is electrically connected through a communication line to a heat-source-side unit control unit 29, control units (not illustrated) disposed in the corresponding use-side units 60, or a remote control (not illustrated) to transmit and receive control signals. The electric components included in the heat exchanger unit control unit 49 are cooled by the second airflow AF2 generated by the cooling fan 48.

(25-1-2-3) Use-Side Unit

Each use-side unit 60 is equipment that uses the heat medium cooled or heated in the heat exchanger unit 30. The individual use-side units 60 are connected to the heat exchanger unit 30 via, for example, the first heat-medium connection pipe H1 and the second heat-medium connection pipe H2. The individual use-side units 60 and the heat exchanger unit 30 constitute the heat medium circuit HC.

In the present embodiment, each use-side unit 60 is an air handling unit or a fan coil unit that performs air conditioning through exchange of heat between the heat medium cooled or heated in the heat exchanger unit 30 and air.

Only one use-side unit 60 is illustrated in FIG. 25A. Nevertheless, the heat load treatment system 100 may include a plurality of use-side units, and the heat medium cooled or heated in the heat exchanger unit 30 may branch out to be transferred to the individual use-side units. The use-side units that may be included in the heat load treatment system 100 may be of the same type. Alternatively, more than one type of equipment may be included as the use-side units.

(25-1-2-4) Liquid-Side Connection Pipe and Gas-Side Connection Pipe

The liquid-side connection pipes LP and the gas-side connection pipes GP form refrigerant paths in such a manner as to connect the heat exchanger unit 30 to the corresponding heat-source-side units 10. The liquid-side connection pipes LP and the gas-side connection pipes GP are installed on-site. Each of the liquid-side connection pipes LP and the gas-side connection pipes GP may be practically constructed of a single pipe or a plurality of pipes connected to each other via a joint.

(25-1-2-5) First Heat-Medium Connection Pipe and Second Heat-Medium Connection Pipe The first heat-medium connection pipe H1 and the second heat-medium connection pipe H2 form heating medium paths in such a manner as to connect the heat exchanger unit 30 to the corresponding use-side units 60. The first heat-medium connection pipe H1 and the second heat-medium connection pipe H2 are installed on-site. Each of the first heat-medium connection pipe H1 and the second heat-medium connection pipe H2 may be practically constructed of a single pipe or a plurality of pipes connected to each other via a joint.

(25-1-2-6) Refrigerant Leakage Sensor

The refrigerant leakage sensor 70 is a sensor for sensing leakage of refrigerant in the space in which the heat exchanger unit 30 is installed (an equipment/device room R, which will be described later). More specifically, the refrigerant leakage sensor 70 is configured to sense leakage refrigerant in the heat exchanger unit 30. In the example concerned, the refrigerant leakage sensor 70 is a well-known general-purpose product suited to the type of refrigerant sealed in the refrigerant circuits RC. The refrigerant leakage sensor 70 is disposed in the space in which the heat exchanger unit 30 is installed. In the present embodiment, the refrigerant leakage sensor 70 is disposed in the heat exchanger unit 30.

The refrigerant leakage sensor 70 continuously or intermittently outputs, to the controller 80, electrical signals (refrigerant-leakage-sensor detection signals) corresponding to detection values. More specifically, the refrigerant-leakage-sensor detection signals output by the refrigerant leakage sensor 70 vary in voltage depending on the concentration of refrigerant sensed by the refrigerant leakage sensor 70. In other words, the refrigerant-leakage-sensor detection signals are output to the controller 80 in a manner so as to enable not only a determination on whether leakage of refrigerant has occurred in the refrigerant circuit RC but also a determination of the concentration of leakage refrigerant in the space in which the refrigerant leakage sensor 70 is installed, or more specifically, the concentration of refrigerant sensed by the refrigerant leakage sensor 70.

(25-1-2-7) Controller

The controller 80 illustrated in FIG. 25C is a computer that controls the states of the individual devices to control the operation of the heat load treatment system 100. In the present embodiment, the controller 80 is configured in such a manner that the heat-source-side unit control unit 29, the heat exchanger unit control unit 49, and devices connected to these units (e.g., control units disposed in the corresponding use-side units and a remote control) are connected to each other through communication lines. In the present embodiment, the heat-source-side unit control unit 29, the heat exchanger unit control unit 49, and the devices connected to these units cooperate to serve as the controller 80.

(25-1-3) Installation Layout of Heat Load Treatment System

FIG. 25B is a schematic diagram illustrating an installation layout of the heat load treatment system 100. Although the installation site of the heat load treatment system 100 is not limited, the heat load treatment system 100 is installed in, for example, a building, a commercial facility, or a plant. In the present embodiment, the heat load treatment system 100 is installed in a building B1 as illustrated in FIG. 25B. The building B1 has a plurality of floors. The number of floors or rooms in the building B1 may be changed as appropriate.

The building B1 includes the equipment/device room R. The equipment/device room R is a space in which electric equipment, such as a switchboard and a generator, or cooling/heating devices, such as a boiler, are installed. The equipment/device room R is an accessible space in which people can stay. The equipment/device room R is, for example, a basement in which people can walk. In the present embodiment, the equipment/device room R is located on the lowermost floor of the building B1. The building B1 includes a plurality of living spaces SP, each of which is provided for activities of the occupants. In the present embodiment, the living spaces SP are located on the respective floors above the equipment/device room R.

Referring to FIG. 25B, the heat-source-side unit 10 is installed on the rooftop of the building B1. The heat exchanger unit 30 is installed in the equipment/device room R. On this account, the liquid-side connection pipe LP and the gas-side connection pipe GP extend in a vertical direction between the rooftop and the equipment/device room R.

Referring to FIG. 25B, the individual use-side units 60 are disposed in the living spaces SP. On this account, the first heat-medium connection pipe H1 and the second heat-medium connection pipe H2 extend in a vertical direction through the living spaces SP and the equipment/device room R.

The building B1 is equipped with a ventilating apparatus 200, which provides ventilation (forced ventilation or natural ventilation) in the equipment/device room R. The ventilating apparatus 200 is installed in the equipment/device room R. Specifically, a ventilating fan 210 is installed as the ventilating apparatus 200 in the equipment/device room R. The ventilating fan 210 is connected to a plurality of ventilating ducts D. When being driven, the ventilating fan 210 ventilates the equipment/device room R in such a manner that air (room air RA) in the equipment/device room R is discharged as exhaust air EA to the external space and air (outside air OA) in the external space is supplied as supply air SA to the equipment/device room R. The ventilating fan 210 is thus regarded as the ventilating apparatus that provides ventilation in the equipment/device room R. The operation (e.g., on-off or the revolution frequency) of the ventilating fan 210 may be controlled by the controller 80. The ventilating fan 210 is controlled in such a manner as to switch, as appropriate, between an intermittent operation mode in which the ventilating fan 210 operates intermittently and a continuous operation mode in which the ventilating fan 210 operates continuously.

In the equipment/device room R, an open-close mechanism 220 is also installed as the ventilating apparatus 200. The open-close mechanism 220 is a mechanism capable of switching between an opened state in which the equipment/device room R communicates with another space (e.g., the external space) and a closed state in which the equipment/device room R is shielded. That is, the open-close mechanism 220 opens or closes a vent through which the equipment/device room R communicates with another space. The open-close mechanism 220 is, for example, a door, a hatch, a window, or a shutter, the opening and closing of which are controllable. The open-close mechanism 220 is electrically connected to the controller 80 through an adapter 80*b* (see FIG. 25C). The state (the opened state or the closed state) of the ventilating fan 210 is controlled by the controller 80.

(25-1-4) Features

The refrigerant mixture that is any one of the refrigerants A to D mentioned above is used as refrigerant sealed in the refrigerant circuits RC serving as a first cycle in the heat load treatment system 100 according to the present embodiment, where the efficiency of heat exchange in the heat exchanger unit 30 is enhanced accordingly.

(25-2) Second Embodiment

FIG. 25D is a diagram illustrating a refrigerant circuit included in a two-stage refrigeration apparatus 500, which is a refrigeration apparatus according to the present embodiment. The two-stage refrigeration apparatus 500 includes a first cycle 510, which is a high-stage-side refrigeration cycle on the high temperature side, and a second cycle 520, which is a low-stage-side refrigeration cycle on the low temperature side. The first cycle 510 and the second cycle 520 are thermally connected to each other through a cascade condenser 531. Constituent elements of the first cycle 510 and the constituent elements of the second cycle 520 are accommodated in an outdoor unit 501 or a cooling unit 502, which will be described later.

With consideration given to possible refrigerant leakage, carbon dioxide ($CO_2$), which does not have a significant impact on global warming, is used as refrigerant sealed in the second cycle 520. Refrigerant sealed in the first cycle 510 is a refrigerant mixture containing 1,2-difluoroethylene and may be any one of the refrigerants A to D mentioned above. The low-temperature-side refrigerant sealed in the second cycle 520 is referred to as a second refrigerant, and the high-temperature-side refrigerant sealed in the first cycle 510 is referred to as a first refrigerant.

The first cycle 510 is a refrigeration cycle through which the first refrigerant circulates. A refrigerant circuit is formed in the first cycle 510 in such a manner that a first compressor 511, a first condenser 512, a first expansion valve 513, and a first evaporator 514 are serially connected to each other via a refrigerant pipe. The refrigerant circuit provided in the first cycle 510 is herein referred to as a first refrigerant circuit.

The second cycle 520 is a refrigeration cycle through which the second refrigerant circulates. A refrigerant circuit is formed in the second cycle 520 in such a manner that a second compressor 521, a second upstream-side condenser 522, a second downstream-side condenser 523, a liquid receiver 525, a second downstream-side expansion valve 526, and a second evaporator 527 are serially connected to each other via a refrigerant pipe. The second cycle 520 includes a second upstream-side expansion valve 524, which is disposed between the second downstream-side condenser 523 and the liquid receiver 525. The refrigerant circuit provided in the second cycle 520 is herein referred to as a second refrigerant circuit.

The two-stage refrigeration apparatus 500 includes the cascade condenser 531 mentioned above. The cascade condenser 531 is configured in such a manner that the first evaporator 514 and the second downstream-side condenser 523 are coupled to each other to enable exchange of heat between refrigerant flowing through the first evaporator 514 and refrigerant flowing through the second downstream-side condenser 523. The cascade condenser 531 is thus regarded as a refrigerant heat exchanger. With the cascade condenser 531 being provided, the second refrigerant circuit and the first refrigerant circuit constitute a multistage configuration.

The first compressor 511 sucks in the first refrigerant flowing through the first refrigerant circuit, compresses the first refrigerant to transform it into high-temperature, high-pressure gas refrigerant, and then discharges the gas refrigerant. In the present embodiment, the first compressor 511 is a compressor of the type that is capable of adjusting the refrigerant discharge amount through control of the revolution frequency by an inverter circuit.

The first condenser 512 causes, for example, air or brine to exchange heat with refrigerant flowing through the first refrigerant circuit, and in turn, the refrigerant is condensed into a liquid. In the present embodiment, the first condenser 512 enables exchange of heat between outside air and refrigerant. The two-stage refrigeration apparatus 500 includes a first condenser fan 512*a*. The first condenser fan 512*a* blows outside air into the first condenser 512 to promote heat exchange in the first condenser 512. The airflow rate of the first condenser fan 512*a* is adjustable.

The first expansion valve 513 decompresses and expands the first refrigerant flowing through the first refrigerant circuit and is, for example, an electronic expansion valve.

In the first evaporator 514, refrigerant flowing through the first refrigerant circuit evaporates and gasifies as a result of heat exchange. In the present embodiment, the first evaporator 514 includes, for example, a heat transfer tube that allows, in the cascade condenser 531, passage of refrigerant flowing through the first refrigerant circuit. In the cascade condenser 531, heat is exchanged between the first refrigerant flowing through the first evaporator 514 and the second refrigerant flowing through the second refrigerant circuit.

The second compressor 521 sucks in the second refrigerant flowing through the second refrigerant circuit, compresses the second refrigerant to transform it into high-temperature, high-pressure gas refrigerant, and then discharges the gas refrigerant. In the present embodiment, the second compressor 521 is, for example, a compressor of the type that is capable of adjusting the refrigerant discharge amount through control of the revolution frequency by an inverter circuit.

The second upstream-side condenser 522 causes, for example, air or brain to exchange heat with refrigerant flowing through the first refrigerant circuit, and in turn, the refrigerant is condensed into a liquid. In the present embodiment, the second upstream-side condenser 522 enables exchange of heat between outside air and refrigerant. The two-stage refrigeration apparatus 500 includes a second condenser fan 522*a*. The second condenser fan 522*a* blows outside air into the second upstream-side condenser 522 to promote heat exchange in the second upstream-side condenser 522. The second condenser fan 522*a* is a fan whose airflow rate is adjustable.

In the second downstream-side condenser 523, the refrigerant condensed into a liquid in the second upstream-side condenser 522 is further transformed into supercooled refrigerant. In the present embodiment, the second downstream-side condenser 523 includes, for example, a heat transfer tube that allows, in the cascade condenser 531, passage of the second refrigerant flowing through the second refrigerant circuit. In the cascade condenser 531, heat is exchanged between the second refrigerant flowing through the second downstream-side condenser 523 and the first refrigerant flowing through the first refrigerant circuit.

The second upstream-side expansion valve 524 decompresses and expands the second refrigerant flowing through the second refrigerant circuit, and the second upstream-side expansion valve 524 in the example concerned is an electronic expansion valve.

The liquid receiver 525 is disposed downstream of the second downstream-side condenser 523 and the second upstream-side expansion valve 524. The liquid receiver 525 stores refrigerant temporarily.

The second downstream-side expansion valve 526 decompresses and expands the second refrigerant flowing through the second refrigerant circuit and is an electronic expansion valve.

In the second evaporator 527, the first refrigerant flowing through the first refrigerant circuit evaporates and gasifies as a result of heat exchange. Exchange of heat between a cooling target and the refrigerant in the second evaporator 527 results in direct or indirect cooling of the cooling target.

Constituent elements of the two-stage refrigeration apparatus 500 mentioned above are accommodated in the outdoor unit 501 or the cooling unit 502. The cooling unit 502 is used as, for example, a refrigerator-freezer showcase or a unit cooler. The first compressor 511, the first condenser 512, the first expansion valve 513, the first evaporator 514, the second compressor 521, the second upstream-side condenser 522, the second downstream-side condenser 523, the second upstream-side expansion valve 524, the liquid receiver 525, a supercooled refrigerant pipe 528, a vapor refrigerant pipe 529, a capillary tube 528*a*, and a check valve 529*a* in the present embodiment are accommodated in the outdoor unit 501. The second downstream-side expansion valve 526 and the second evaporator 527 are accommodated in the cooling unit 502. The outdoor unit 501 and the cooling unit 502 are connected to each other via two pipes, namely, a liquid pipe 551 and a gas pipe 552.

With the two-stage refrigeration apparatus 500 being configured as described above, the following describes, in accordance with the flow of refrigerants flowing through the respective refrigerant circuits, the way in which the constituent devices work during normal cooling operation for cooling a cooling target, namely, air.

Referring to FIG. 25D, the first cycle 510 works as follows. The first compressor 511 sucks in the first refrigerant, compresses the first refrigerant to transform it into high-temperature, high-pressure gas refrigerant, and then discharges the gas refrigerant. After being discharged, the first refrigerant flows into the first condenser 512. In the first condenser 512, the outside air supplied by the first condenser fan 512*a* exchanges heat with the first refrigerant in the form of gas refrigerant, and the first refrigerant is in turn condensed into a liquid. After being condensed into a liquid, the first refrigerant flows through the first expansion valve 513. The first refrigerant condensed into a liquid is decompressed by the first expansion valve 513. After being decompressed, the first refrigerant flows into the first evaporator 514 included in the cascade condenser 531. In the first evaporator 514, the first refrigerant evaporates and gasifies by exchanging heat with the second refrigerant flowing through the second downstream-side condenser 523. After the evaporation and gasification, the first refrigerant is sucked into the first compressor 511.

Referring to FIG. 1, the second cycle 520 works as follows. The second compressor 521 sucks in the second refrigerant, compresses the second refrigerant to transform it into high-temperature, high-pressure gas refrigerant, and then discharges the gas refrigerant. After being discharged, the second refrigerant flows into the second upstream-side condenser 522. In the second upstream-side condenser 522, the outside air supplied by the second condenser fan 522*a* exchanges heat with the second refrigerant, which is in turn condensed and flows into the second downstream-side condenser 523 included in the cascade condenser 531. In the second downstream-side condenser 523, the first refrigerant is supercooled by exchanging heat with the first refrigerant flowing through the first evaporator 514. The supercooled second refrigerant flows through the second upstream-side expansion valve 524. The supercooled second refrigerant is decompressed by the second upstream-side expansion valve 524 to an intermediate pressure. The second refrigerant decompressed to the intermediate pressure flows through the liquid receiver 525 and is then decompressed to a low pressure while flowing through the second downstream-side expansion valve 526. The second refrigerant decompressed to the low pressure flows into the second evaporator 527. The second evaporator 527 operates a second evaporator fan 527*a* so that air in a refrigerated warehouse exchanges heat with the second refrigerant, which in turn evaporates and gasifies. After the evaporation and gasification, the second refrigerant is sucked into the second compressor 521.

The refrigerant mixture that is any one of the refrigerants A to D mentioned above is used as the first refrigerant sealed in the first cycle 510 of the two-stage refrigeration apparatus 500 according to the present embodiment, where the efficiency of heat exchange in the cascade condenser 531 is enhanced accordingly. Using, as the first refrigerant, the refrigerant mixture that is any one of the refrigerant A to D can help achieve a global warming potential (GWP) lower than the GWP achievable through the use of R32.

(25-2-1) First Modification of Second Embodiment

In the embodiment above, the refrigerant mixture that is any one of the refrigerants A to D mentioned above is used as the first refrigerant sealed in the first cycle 510, and carbon dioxide is used as the second refrigerant sealed in the second cycle 520. As with the first refrigerant, the second refrigerant may be the refrigerant mixture that is any one of the refrigerants A to D mentioned above. In the example concerned, the first cycle 510 and the second cycle 520 are coupled to each other via the cascade condenser 531 to constitute the two-stage refrigeration apparatus 500. The amount of refrigerant charged into the cycle (the second cycle 520) extending through the cooling unit 502 may be smaller in the apparatus having this configuration than in a one-stage apparatus. This feature enables a reduction in costs associated with safeguards against possible refrigerant leakage in the cooling unit 502.

(25-2-2) Second Modification of Second Embodiment

In the embodiment above, the refrigerant mixture that is any one of the refrigerants A to D mentioned above is used as the first refrigerant sealed in the first cycle 510, and carbon dioxide is used as the second refrigerant sealed in the second cycle 520. Alternatively, R32 may be used as the first refrigerant, and the refrigerant mixture that is any one of the refrigerants A to D mentioned above may be used as the second refrigerant. Such a refrigerant mixture typically involves a pressure-resistance design value that is lower than the pressure-resistance design value necessitated in the case of using carbon dioxide ($CO_2$), and the level of pressure resistance required of pipes and components constituting the second cycle 520 may be lowered accordingly.

(25-3) Third Embodiment (25-3-1) Overall Configuration

FIG. 25E illustrates an air-conditioning hot water supply system 600, which is a refrigeration apparatus according to a third embodiment. FIG. 25E is a circuit configuration diagram of the air-conditioning hot water supply system 600. The air-conditioning hot water supply system 600 includes an air conditioning apparatus 610 and a hot water supply apparatus 620. The hot water supply apparatus 620 is connected with a hot-water-supply hot water circuit 640.

(25-3-2) Details on Configuration (25-3-2-1) Air Conditioning Apparatus

The air conditioning apparatus 610 includes an air-conditioning refrigerant circuit 615, with a compressor 611, an outdoor heat exchanger 612, an expansion valve 613, and an indoor heat exchanger 614 being arranged in such a manner as to be connected to the air-conditioning refrigerant circuit 615. Specifically, the discharge side of the compressor 611 is connected with a first port P1 of a four-way switching valve 616. A gas-side end of the outdoor heat exchanger 612 is connected with a second port P2 of the four-way switching valve 616. A liquid-side end of the outdoor heat exchanger 612 is connected to a liquid-side end of the indoor heat exchanger 614 via the expansion valve 613. A gas-side end of the indoor heat exchanger 614 is connected to a third port P3 of the four-way switching valve 616. A fourth port P4 of the four-way switching valve 616 is connected to the suction side of the compressor 611.

The four-way switching valve 616 allows switching between a first communication state and a second communication state. In the first communication state (denoted by broken lines in the drawing), the first port P1 communicates with the second port P2, and the third port P3 communicates with the fourth port P4. In the second communication state (denoted by solid lines), the first port P1 communicates with the third port P3, and the second port P2 communicates with the fourth port P4. The direction in which refrigerant circulates may be reversed in accordance with the switching operation of the four-way switching valve 616.

In the third embodiment, the air-conditioning refrigerant circuit 615 is charged with refrigerant for the vapor compression refrigeration cycle. The refrigerant is a refrigerant mixture containing 1,2-difluoroethylene and may be any one of the refrigerants A to D mentioned above.

(25-3-2-2) Hot Water Supply Apparatus

The hot water supply apparatus 620 includes a hot-water-supply refrigerant circuit 625. The hot-water-supply refrigerant circuit 625 includes a compressor 621, a first heat exchanger 622, an expansion valve 623, and a second heat exchanger 624, which are serially connected to each other. The hot-water-supply refrigerant circuit 625 is charged with refrigerant, which is a carbon dioxide refrigerant. The devices constituting the hot-water-supply refrigerant circuit 625 and accommodated in a casing are incorporated into the hot water supply apparatus 620 to constitute a water supply unit.

The first heat exchanger 622 is a water-refrigerant heat exchanger, which is a combination of a heat absorbing unit 622*a* and a heat radiating unit 622*b*. The heat radiating unit 622*b* of the first heat exchanger 622 is connected to the hot-water-supply refrigerant circuit 625, and the heat absorbing unit 622*a* of the first heat exchanger 622 is connected to the hot-water-supply hot water circuit 640, in which water heating is performed to generate hot water. In the first heat exchanger 622, water heating is performed to generate hot water in the hot-water-supply hot water circuit 640 in such a manner that heat is exchanged between water in the hot-water-supply hot water circuit 640 and the carbon dioxide refrigerant in the hot-water-supply refrigerant circuit 625.

The hot-water-supply hot water circuit 640 is connected with a circulating pump 641, the heat absorbing unit 622*a* of the first heat exchanger 622, and a hot water storage tank 642. The hot-water-supply hot water circuit 640 provides water-hot water circulation, where water receives heat from the carbon dioxide refrigerant in the first heat exchanger 622 and the generated hot water is then stored in the hot water storage tank 642. For water supply and drainage to and from the hot water storage tank 642, the hot-water-supply hot water circuit 640 is connected with a water supply pipe 643 leading to the hot water storage tank 642 and a hot water outflow pipe 644 leading from the hot water storage tank 642.

The second heat exchanger 624 is a cascade heat exchanger and is a combination of a heat absorbing unit 624*a* and a heat radiating unit 624*b*. The heat absorbing unit 624*a* is connected to the hot-water-supply refrigerant circuit 625, and the heat radiating unit 624*b* is connected to the air-conditioning refrigerant circuit 615. With the second heat exchanger 624 being a cascade heat exchanger, the air-conditioning refrigerant circuit 615 is in charge of operation on the low-stage (low-temperature) side of the two-stage heat pump cycle, and the hot-water-supply refrigerant circuit 625 is in charge of operation on the high-stage (high-temperature) side of the two-stage heat pump cycle.

The second heat exchanger 624 and the indoor heat exchanger 614 in the air-conditioning refrigerant circuit 615, which is the low-stage side of the two-stage heat pump cycle, are connected in parallel. A three-way switching valve 650 allows switching between the state in which refrigerant in the air-conditioning refrigerant circuit 615 flows through the second heat exchanger 624 and the state in which the refrigerant flows through the indoor heat exchanger 614. In other words, the air-conditioning refrigerant circuit 615, which is the low-stage side of the two-stage heat pump cycle, is capable of switching between a first operation and a second operation. During the first operation, refrigerant circulates between the outdoor heat exchanger 612 and the indoor heat exchanger 614. During the second operation, refrigerant circulates between the outdoor heat exchanger 612 and the second heat exchanger 624.

(25-3-3) Operation and Working of Air-Conditioning Hot Water Supply System

The following describes the operation and working of the air-conditioning hot water supply system 600.

Air conditioning operation that is the first operation may be performed in such a way as to switch between cooling operation and heating operation. During the cooling operation, the four-way switching valve 616 is set into the first communication state on the broken lines, and the three-way switching valve 650 is set into a first communication state on a broken line. In this setup, refrigerant discharged by the compressor 611 flows through the four-way switching valve 616, enters the outdoor heat exchanger 612 and is condensed in the outdoor heat exchanger 612 by transferring heat to outside air. The refrigerant is expanded in the expansion valve 613 and then enters the indoor heat exchanger 614, where the refrigerant evaporates by absorbing heat from room air. Consequently, the room air is cooled. The refrigerant then flows through the four-way switching valve 616 and is sucked into the compressor 611. The room is cooled by repeated cycles of a compression stroke, a condensation stroke, an expansion stroke, and an evaporation stroke while the refrigerant circulates as described above.

During the heating operation, the four-way switching valve 616 is set into the second communication state on the solid lines, and the three-way switching valve 650 is set into the first communication state on the broken line. In this setup, refrigerant discharged by the compressor 611 flows through the four-way switching valve 616 and the three-way switching valve 650, enters the indoor heat exchanger 614, and is condensed in the indoor heat exchanger 614 by transferring heat to room air. Consequently, the room air is heated. The refrigerant is expanded in the expansion valve 613 and then enters the outdoor heat exchanger 612, where the refrigerant evaporates by absorbing heat from outside air. The refrigerant then flows through the four-way switching valve 616 and is sucked into the compressor 611. The room is heated while the refrigerant circulates as described above.

Meanwhile, hot water storage operation that is the second operation is performed in the middle of the night when air conditioning is not needed. During this operation, the four-way switching valve 616 in the air-conditioning refrigerant circuit 615 is set into the second communication state on the solid lines as in the heating operation, and the three-way switching valve 650 in the air-conditioning refrigerant circuit 615 is set into a second communication state on a solid line as opposed to the state into which the three-way switching valve 650 is set during air conditioning operation. The compressor 621 in the hot-water-supply refrigerant circuit 625 and the circulating pump 641 in the hot-water-supply hot water circuit 640 are also operated.

In this setup, the air-conditioning refrigerant circuit 615 works as follows: refrigerant discharged by the compressor 611 flows through the four-way switching valve 616 and the three-way switching valve 650 and then enters the heat radiating unit 624*b* of the second heat exchanger 624. In the heat radiating unit 624*b*, refrigerant flowing through the air-conditioning refrigerant circuit 615 is condensed by transferring heat to the carbon dioxide refrigerant in the hot-water-supply refrigerant circuit 625. Consequently, the carbon dioxide refrigerant is heated. The refrigerant in the air-conditioning refrigerant circuit 615 is then expanded in the expansion valve 613, evaporates in the outdoor heat exchanger 612, flows through the four-way switching valve 616, and is sucked into the compressor 611. The refrigerant in the air-conditioning refrigerant circuit 615 circulates as described above to undergo repeated cycles of a compression stroke, a condensation stroke, an expansion stroke, and an evaporation stroke.

The carbon dioxide refrigerant in the hot-water-supply refrigerant circuit 625 undergoes a compression stroke in the compressor 621, a heat radiation stroke in the heat radiating unit 622*b* of the first heat exchanger 622, an expansion stroke in the expansion valve 623, and a heat absorption stroke in the heat absorbing unit 624*a* of the second heat exchanger 624 in the stated order. In the second heat exchanger 624, the carbon dioxide refrigerant absorbs heat from the refrigerant flowing through the air-conditioning refrigerant circuit 615. In the first heat exchanger 622, the carbon dioxide refrigerant transforms the warmth to water in the hot-water-supply hot water circuit 640.

In the hot-water-supply hot water circuit 640, the circulating pump 641 supplies water in the hot water storage tank 642 to the heat absorbing unit 622*a* of the first heat exchanger 622, where the water is heated (hot water is generated). The hot water generated by the application of heat is sent back to the hot water storage tank 642 and continues to circulate through the hot-water-supply hot water circuit 640 until a predetermined thermal storage temperature is reached. As mentioned above, the hot water storage operation is performed in the middle of the night. Meanwhile, hot water supply operation for letting out hot water from the hot water storage tank 642 is performed during daytime or nighttime hours. During the hot water supply operation, the hot-water-supply refrigerant circuit 625 is nonoperational, and the indoor heat exchanger 614 in the air-conditioning refrigerant circuit 615 may be used to perform the cooling operation or the heating operation.

(25-3-4) Features of Air-Conditioning Hot Water Supply System

The air-conditioning hot water supply system 600 according to the third embodiment includes the hot water supply apparatus 620, which is a unit-type apparatus. This apparatus includes a cascade heat exchanger as the second heat exchanger 624 on the heat source side of the hot-water-supply refrigerant circuit 625, in which carbon dioxide is used as refrigerant. The second heat exchanger 624 is connected to the air-conditioning refrigerant circuit 615, which is a low-stage-side refrigerant circuit. This configuration enables two-stage heat pump cycle operation. The refrigerant used in the air-conditioning refrigerant circuit 615 is a refrigerant mixture containing 1,2-difluoroethylene and is any one of the refrigerants A to D mentioned above. These features enhance the efficiency of heat exchange in the second heat exchanger 624.

(25-3-5) Modification of Third Embodiment

In the embodiment above, the refrigerant mixture that is any one of the refrigerants A to D mentioned above is used as the first refrigerant sealed in the air-conditioning refrigerant circuit 615, which is the first cycle, and carbon dioxide is used as the second refrigerant sealed in the hot-water-supply refrigerant circuit 625, which is the second cycle. It is preferred that a refrigerant whose saturation pressure at a predetermined temperature is lower than the saturation pressure of the first refrigerant at the predetermined temperature be used as the second refrigerant sealed in the hot-water-supply refrigerant 625. For example, it is preferred that R134a be sealed in the hot-water-supply refrigerant circuit 625.

While the embodiments of the present disclosure have been described herein above, it is to be appreciated that various changes in form and detail may be made without departing from the spirit and scope of the present disclosure presently or hereafter claimed.

Figure 3A:
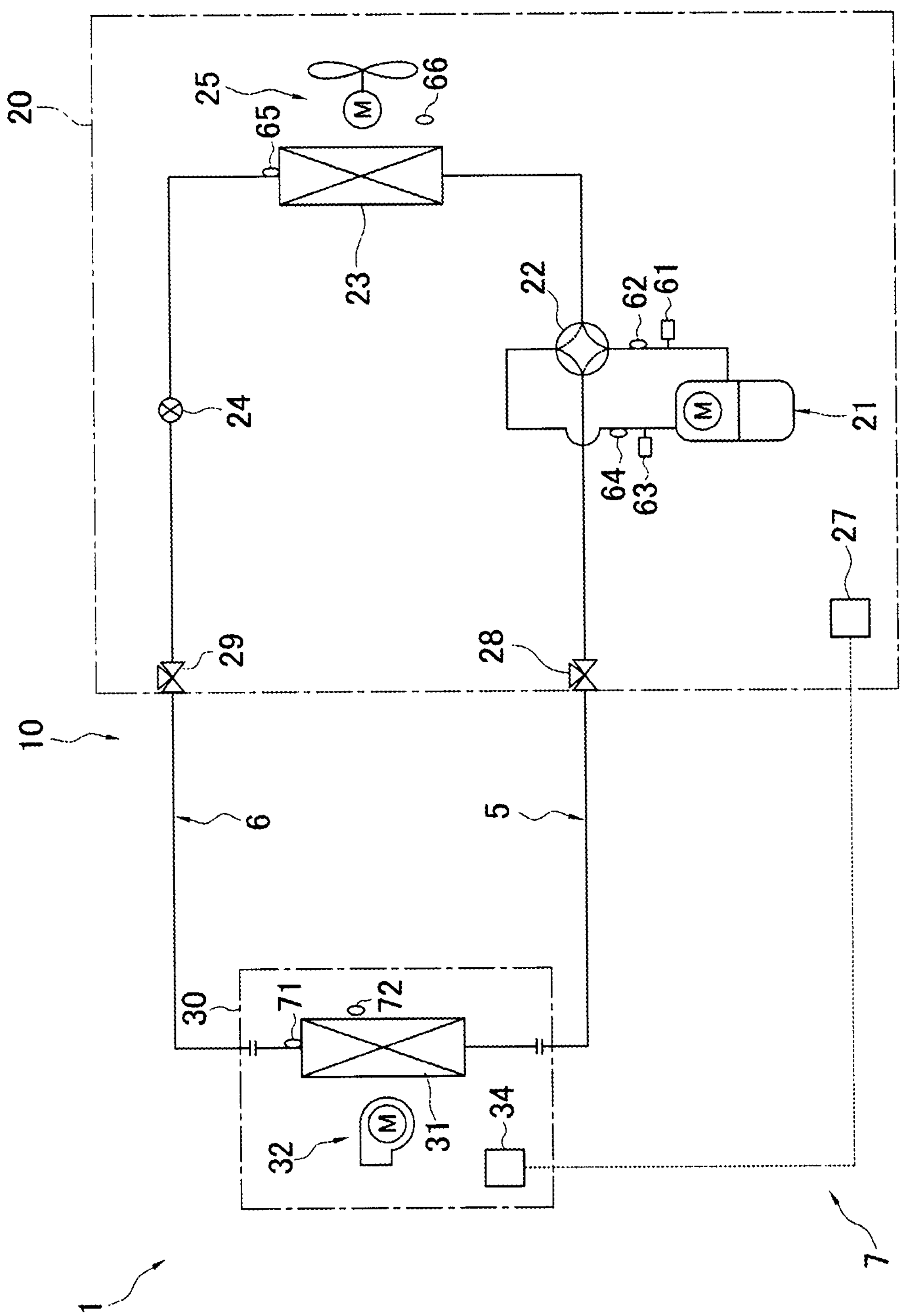
FIG. 3A is a schematic configuration diagram of a refrigerant circuit according to a first embodiment of the technique of third group.
Figure 3B:
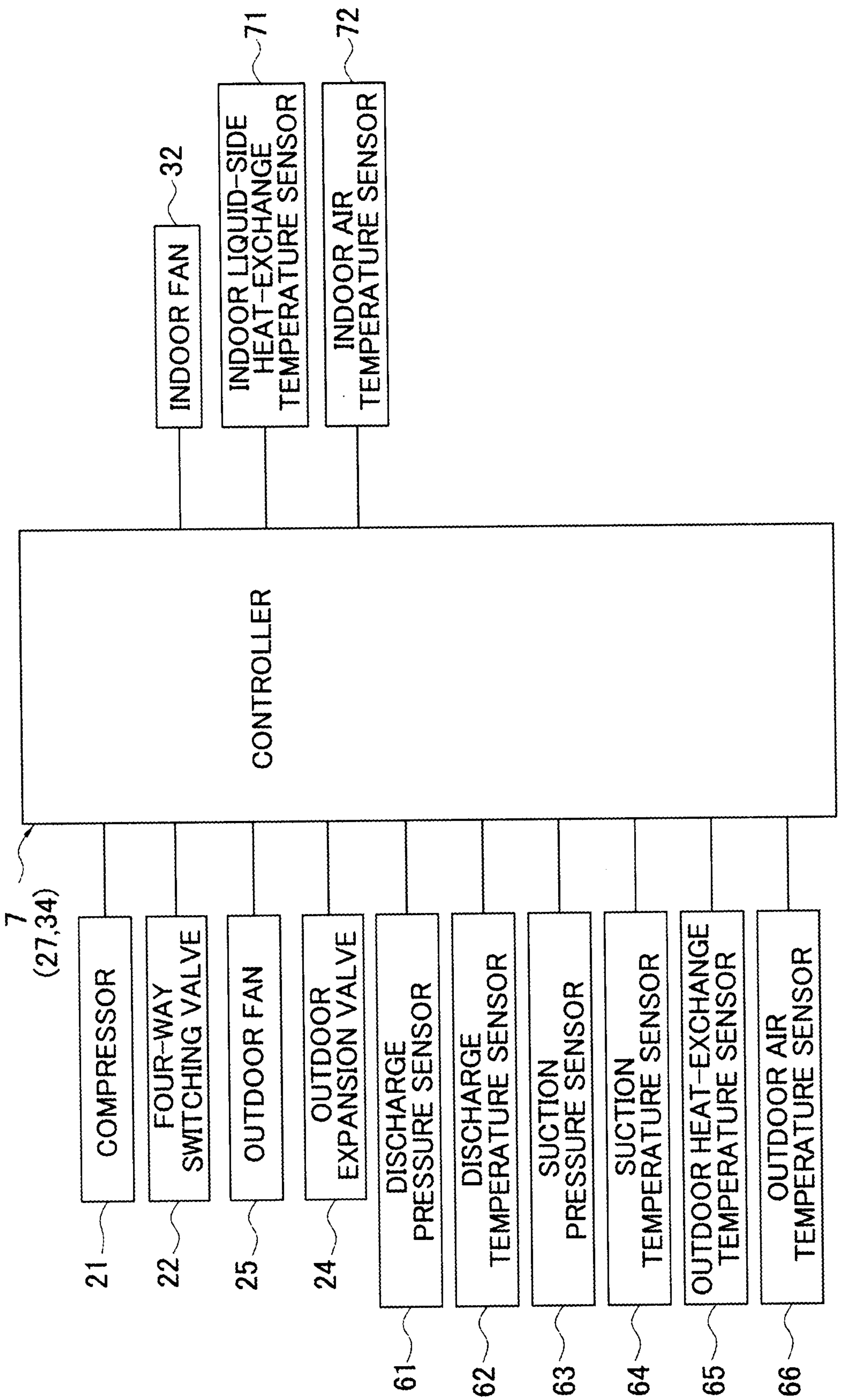
FIG. 3B is a schematic control block configuration diagram of a refrigeration cycle apparatus according to the first embodiment of the technique of third group.
Figure 3C:
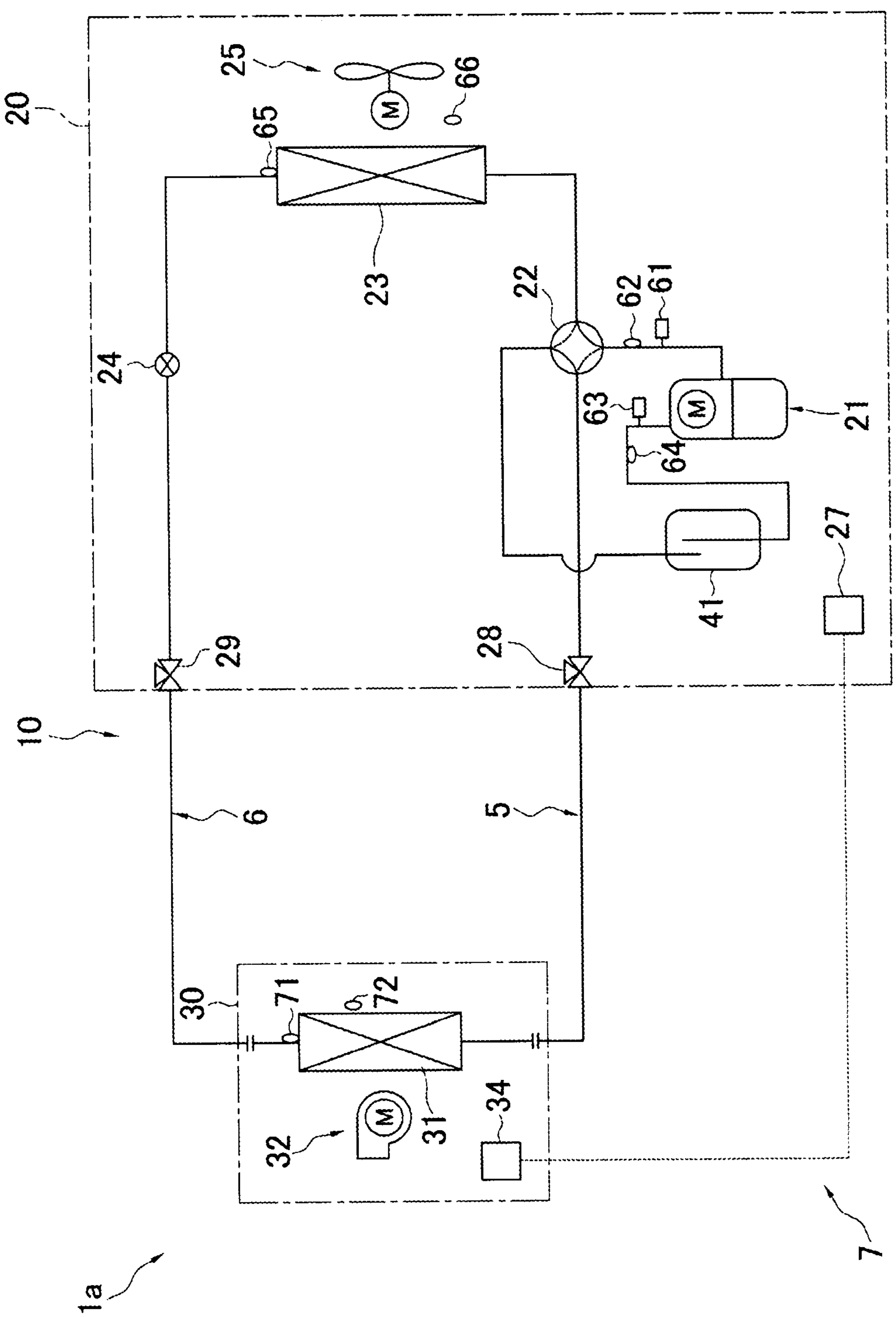
FIG. 3C is a schematic configuration diagram of a refrigerant circuit according to a second embodiment of the technique of third group.
Figure 3D:
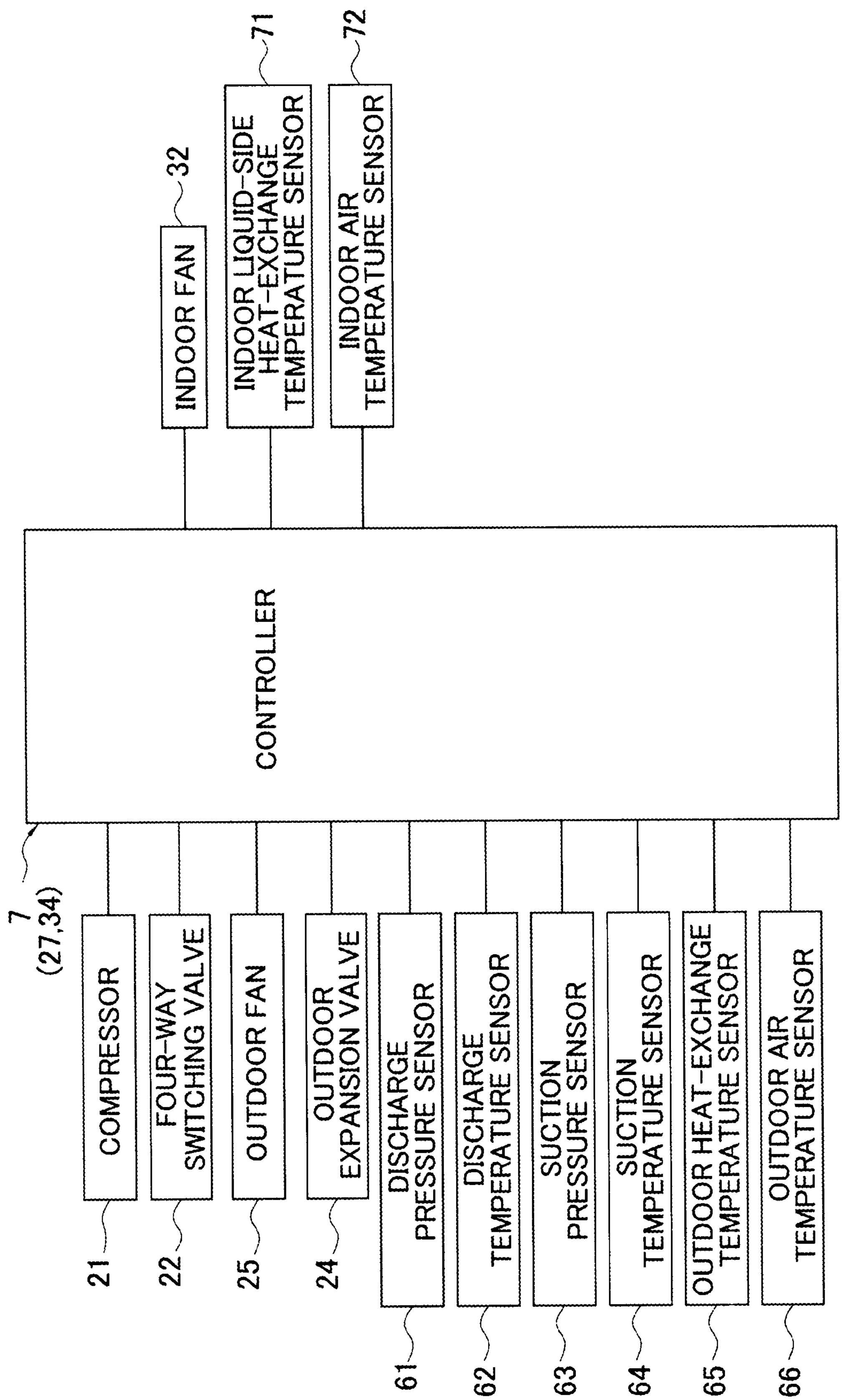
FIG. 3D is a schematic control block configuration diagram of a refrigeration cycle apparatus according to the second embodiment of the technique of third group.
Figure 3E:
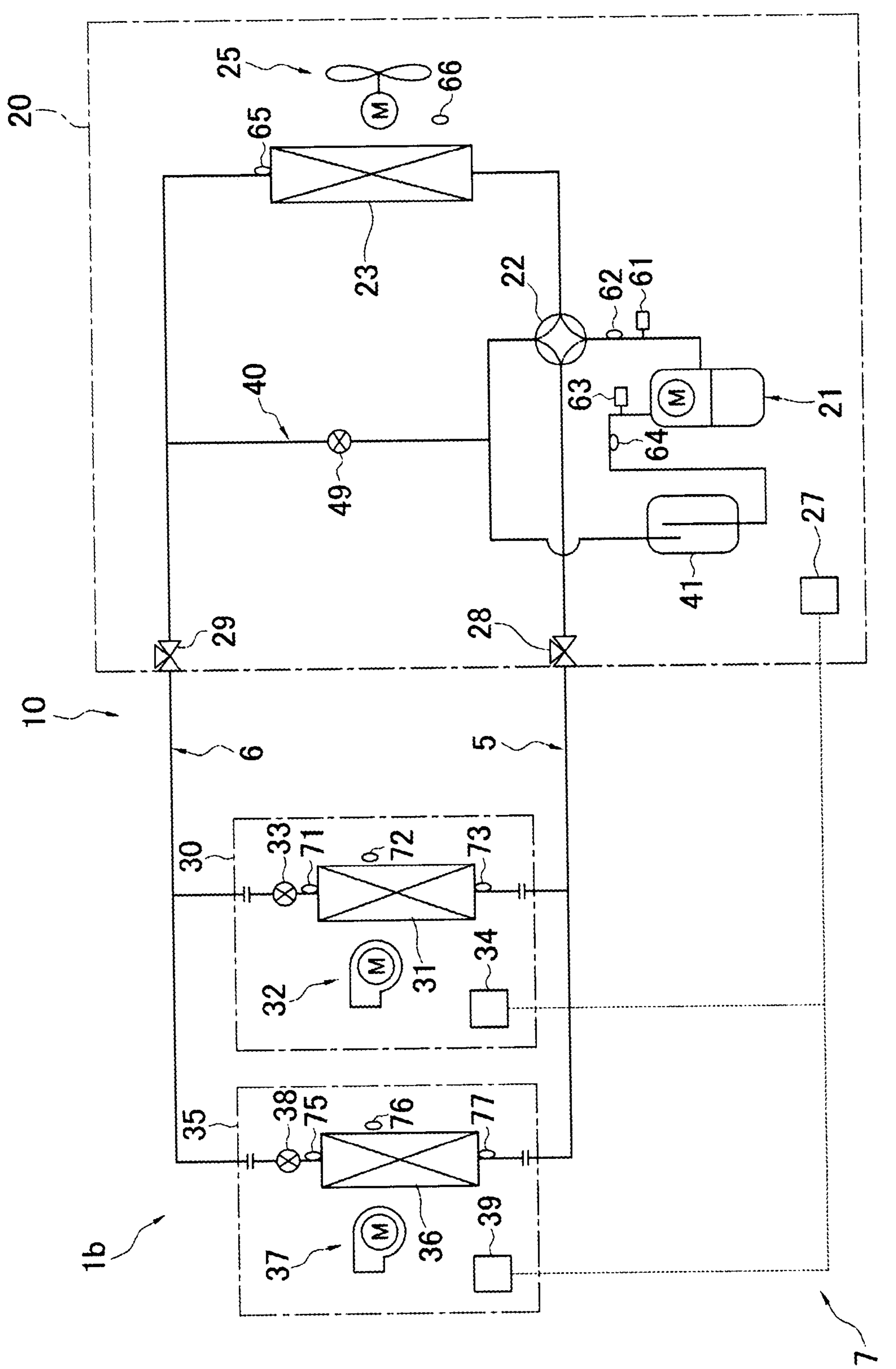
FIG. 3E is a schematic configuration diagram of a refrigerant circuit according to a third embodiment of the technique of third group.
Figure 3F:
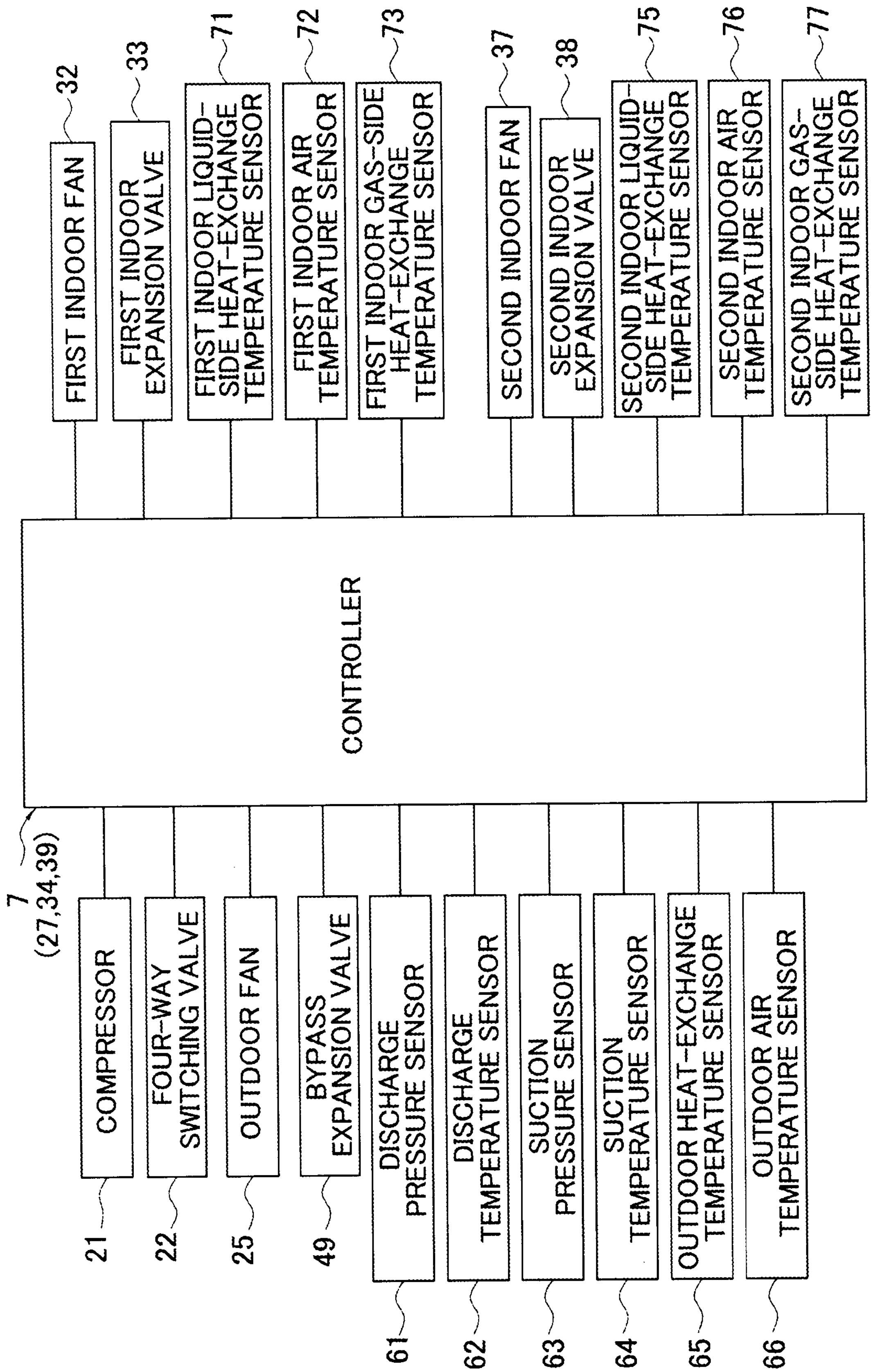
FIG. 3F is a schematic control block configuration diagram of a refrigeration cycle apparatus according to the third embodiment of the technique of third group.
Figure 3G:
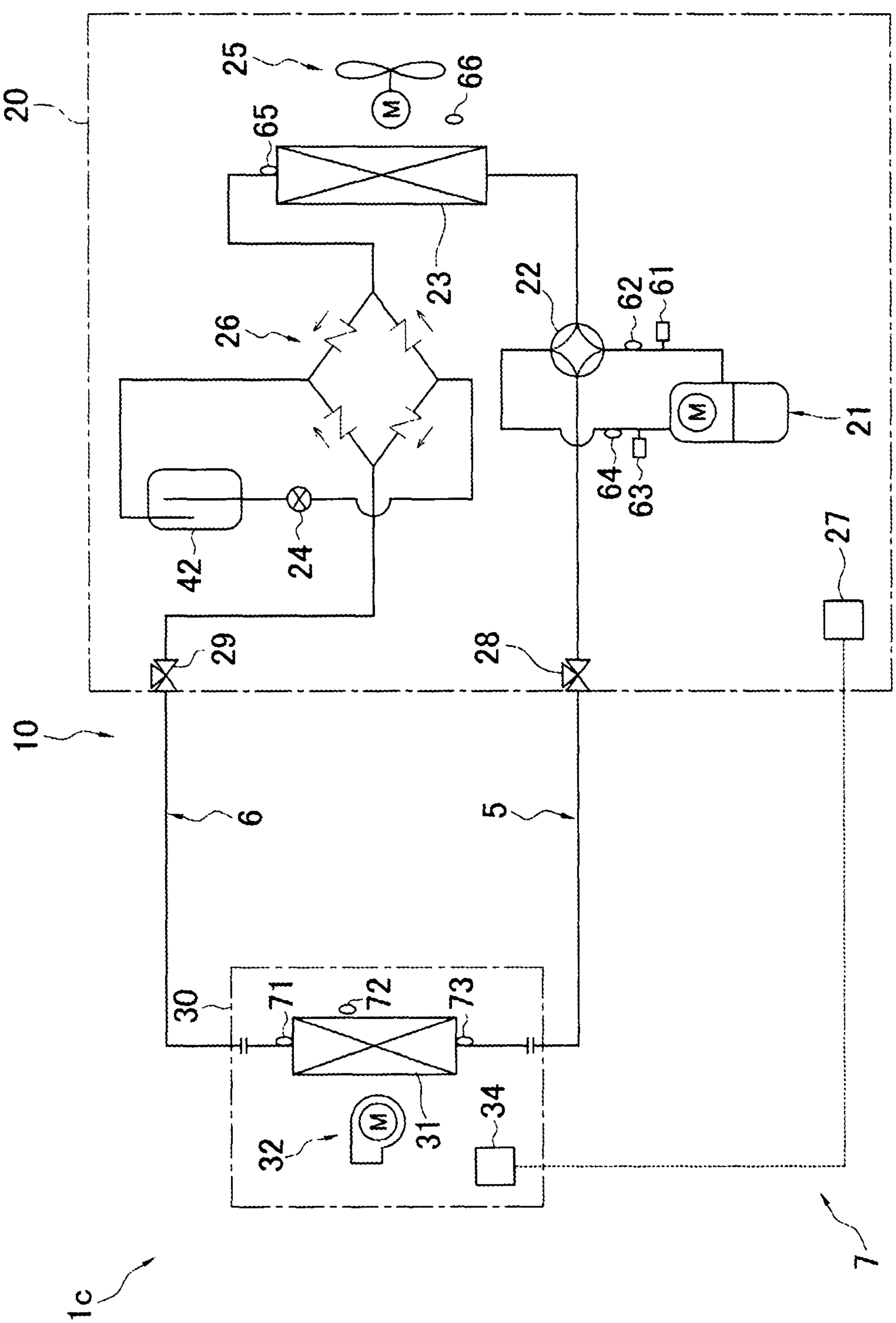
FIG. 3G is a schematic configuration diagram of a refrigerant circuit according to a fourth embodiment of the technique of third group.
Figure 3H:
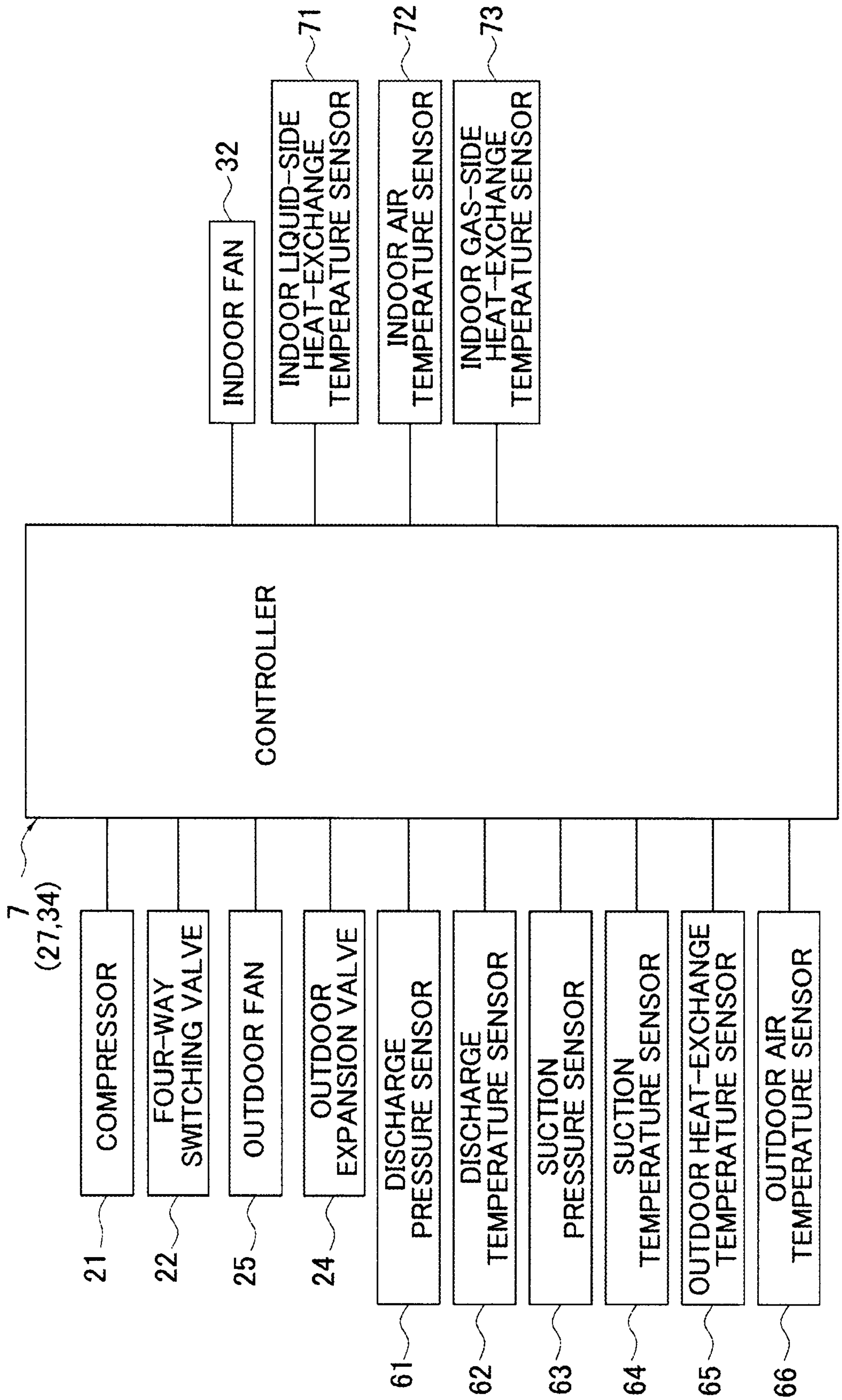
FIG. 3H is a schematic control block configuration diagram of a refrigeration cycle apparatus according to the fourth embodiment of the technique of third group.
Figure 3I:
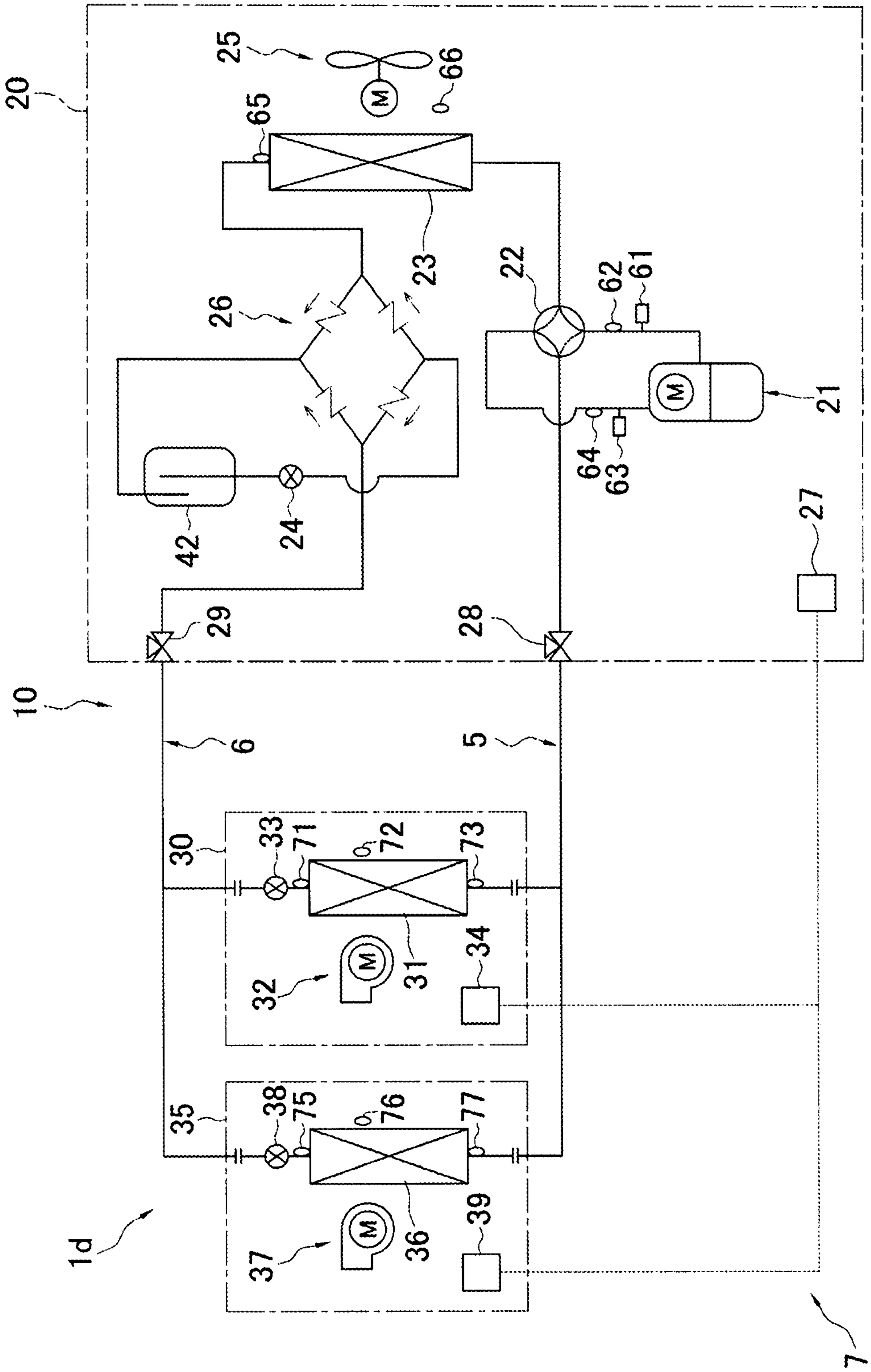
FIG. 3I is a schematic configuration diagram of a refrigerant circuit according to a fifth embodiment of the technique of third group.
Figure 3J:
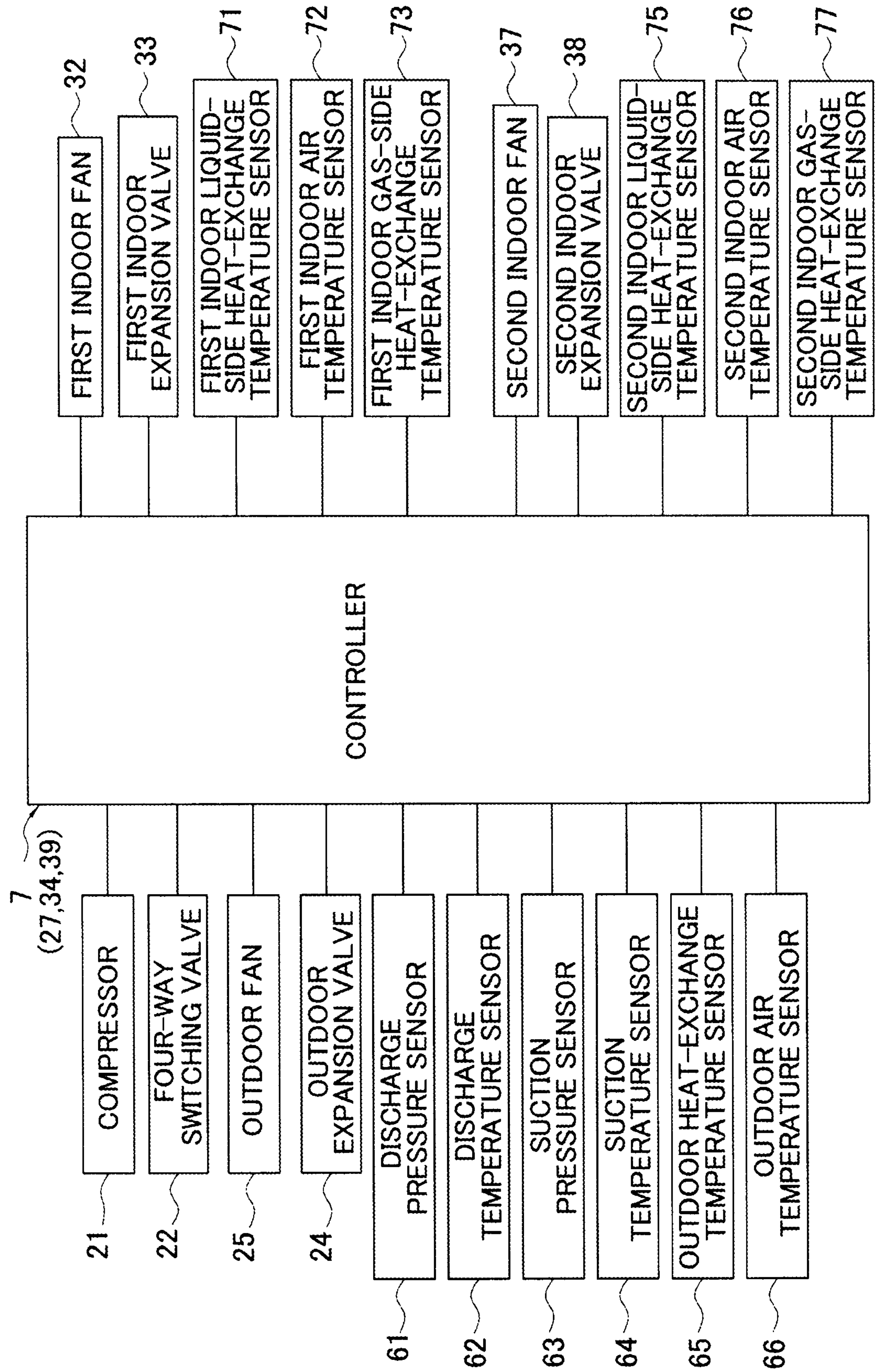
FIG. 3J is a schematic control block configuration diagram of a refrigeration cycle apparatus according to the fifth embodiment of the technique of third group.
Figure 3K:
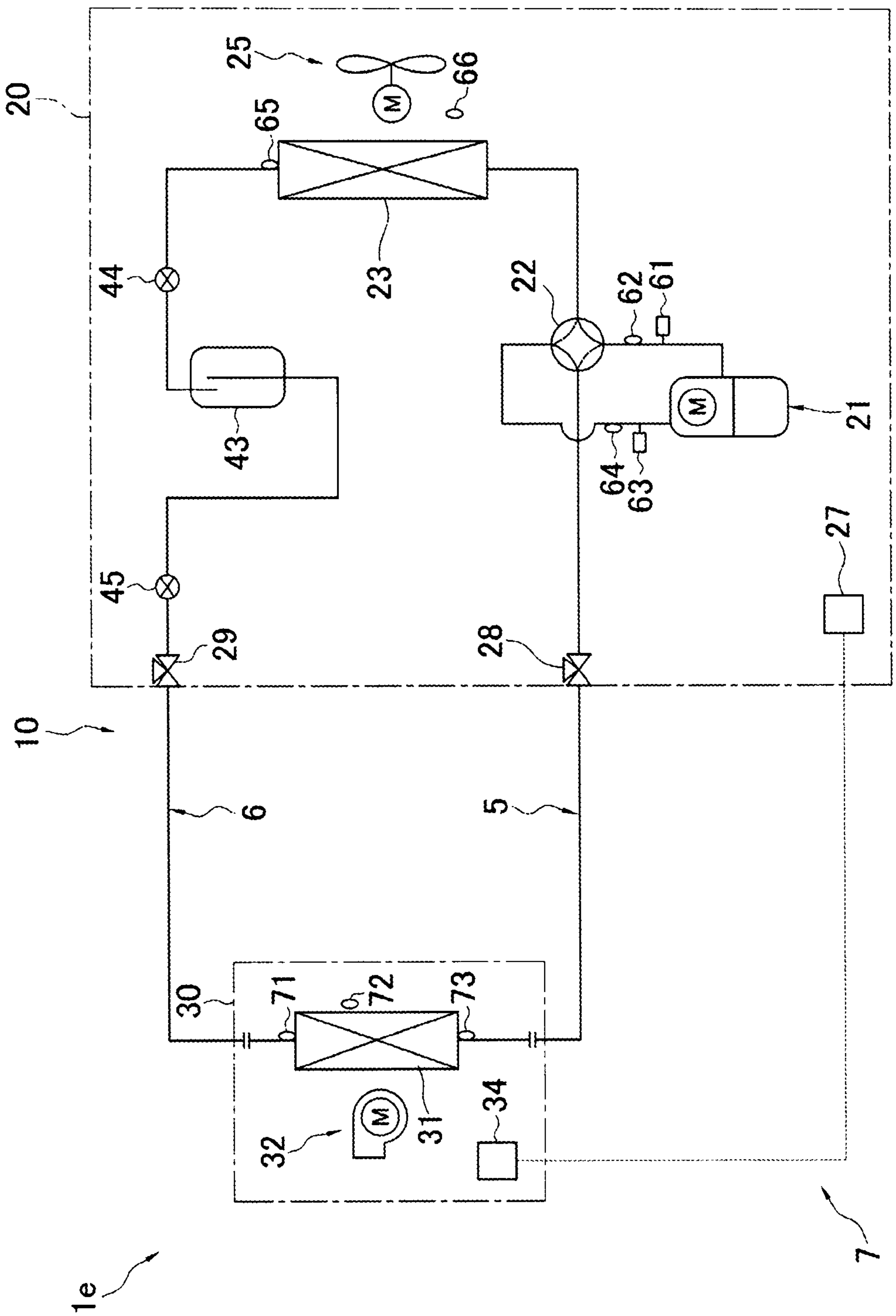
FIG. 3K is a schematic configuration diagram of a refrigerant circuit according to a sixth embodiment of the technique of third group.
Figure 3L:
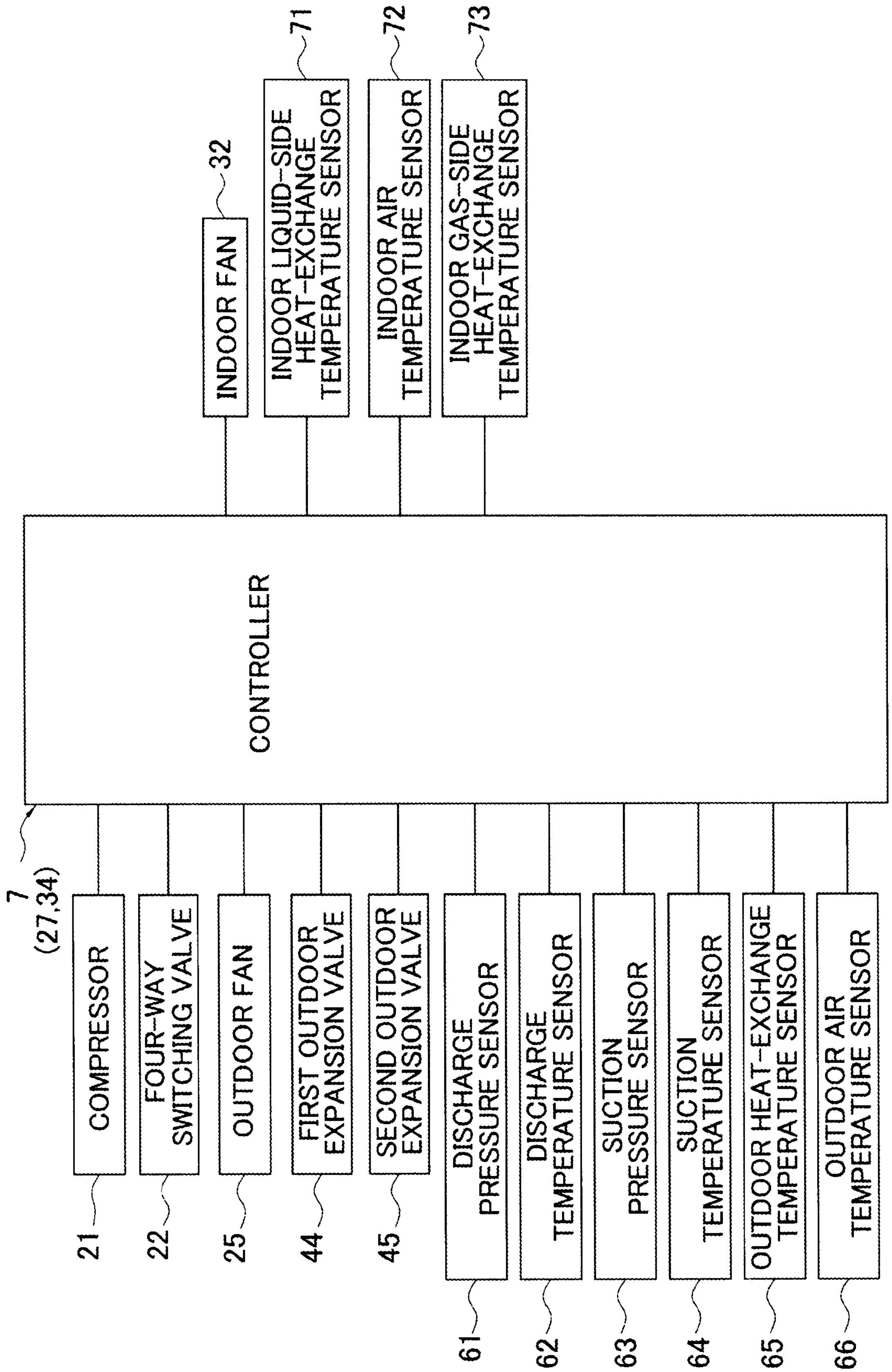
FIG. 3L is a schematic control block configuration diagram of a refrigeration cycle apparatus according to the sixth embodiment of the technique of third group.
Figure 3M:
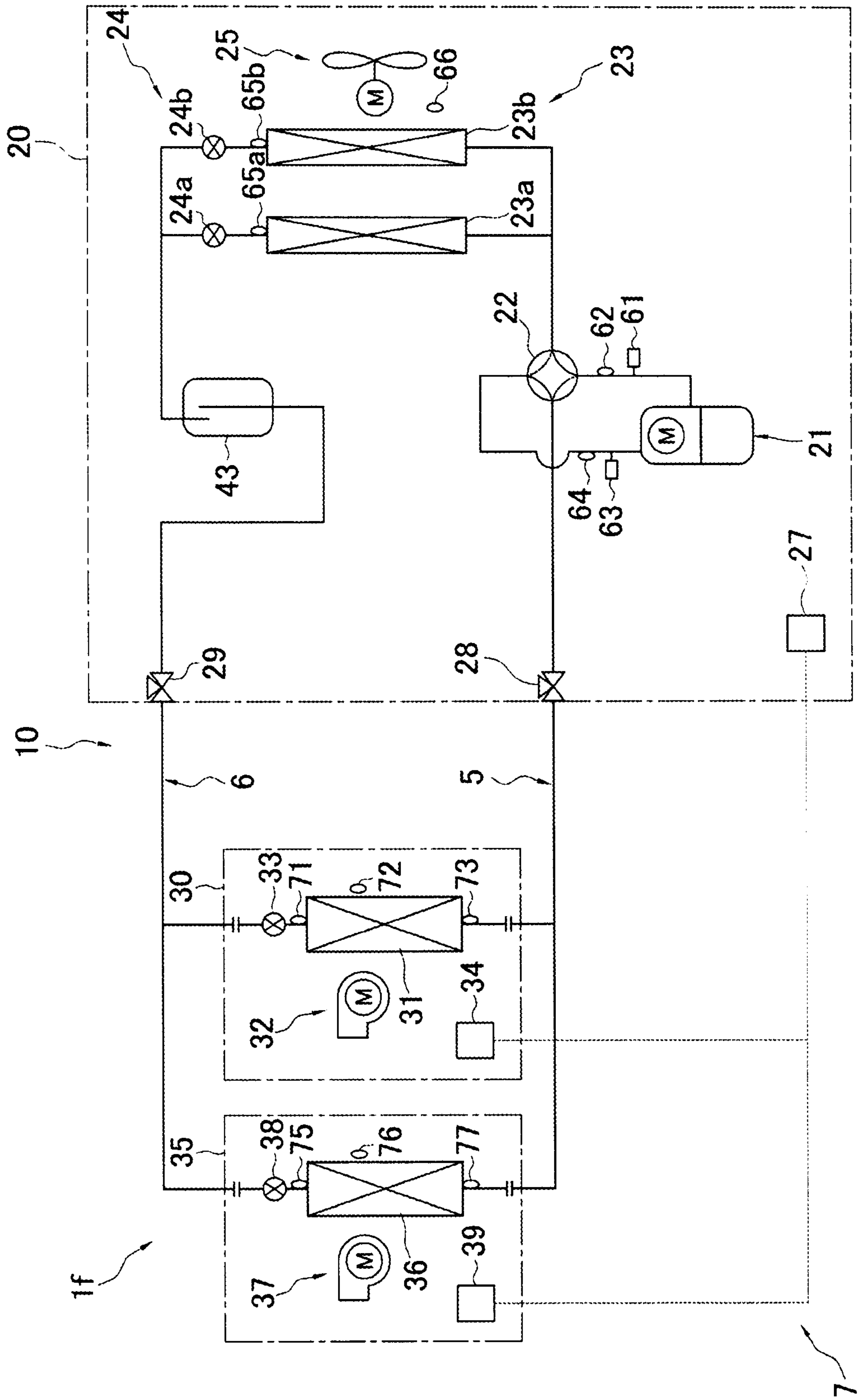
FIG. 3M is a schematic configuration diagram of a refrigerant circuit according to a seventh embodiment of the technique of third group.
Figure 3N:
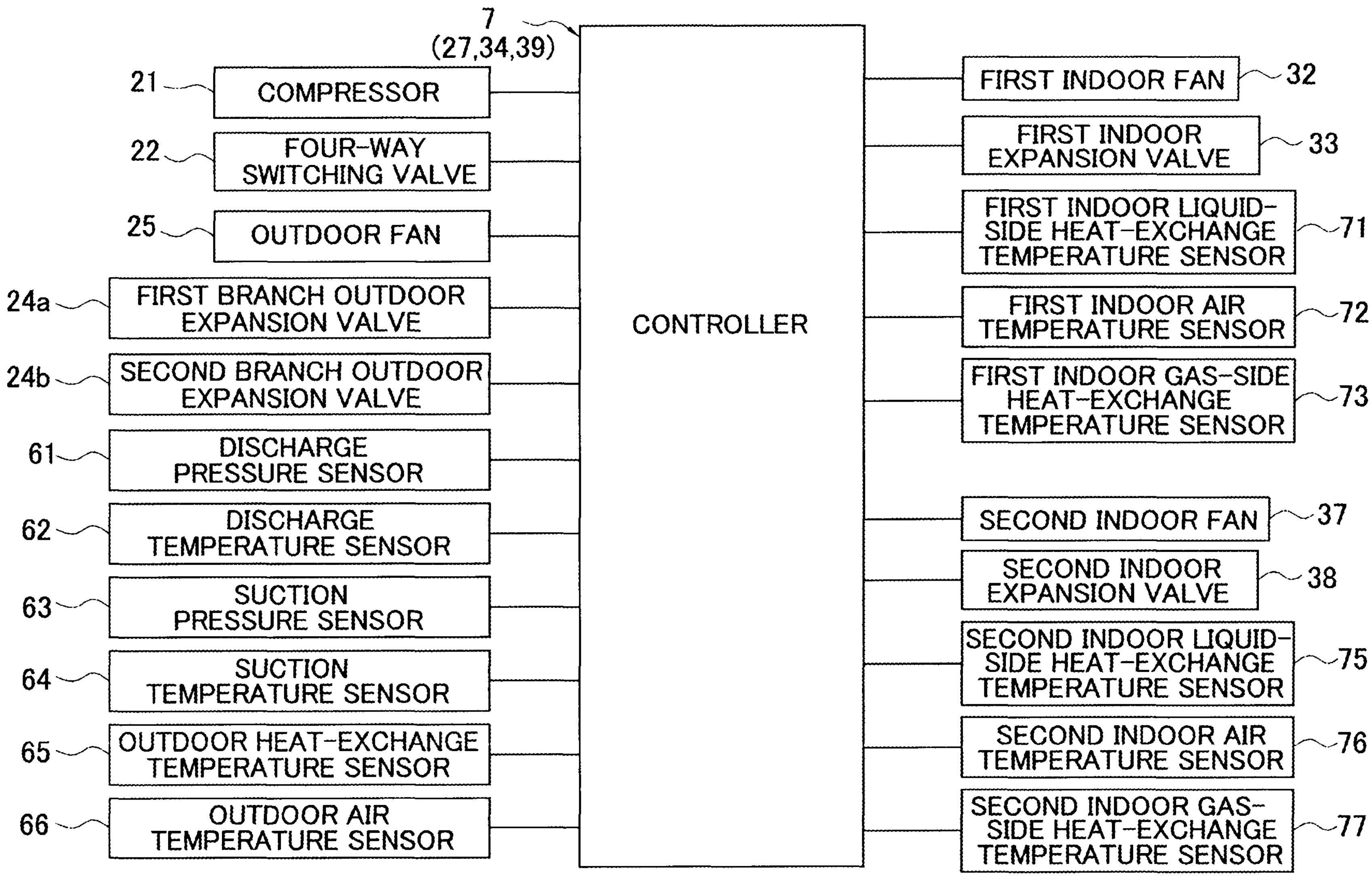
FIG. 3N is a schematic control block configuration diagram of a refrigeration cycle apparatus according to the seventh embodiment of the technique of third group.
Figure 30:
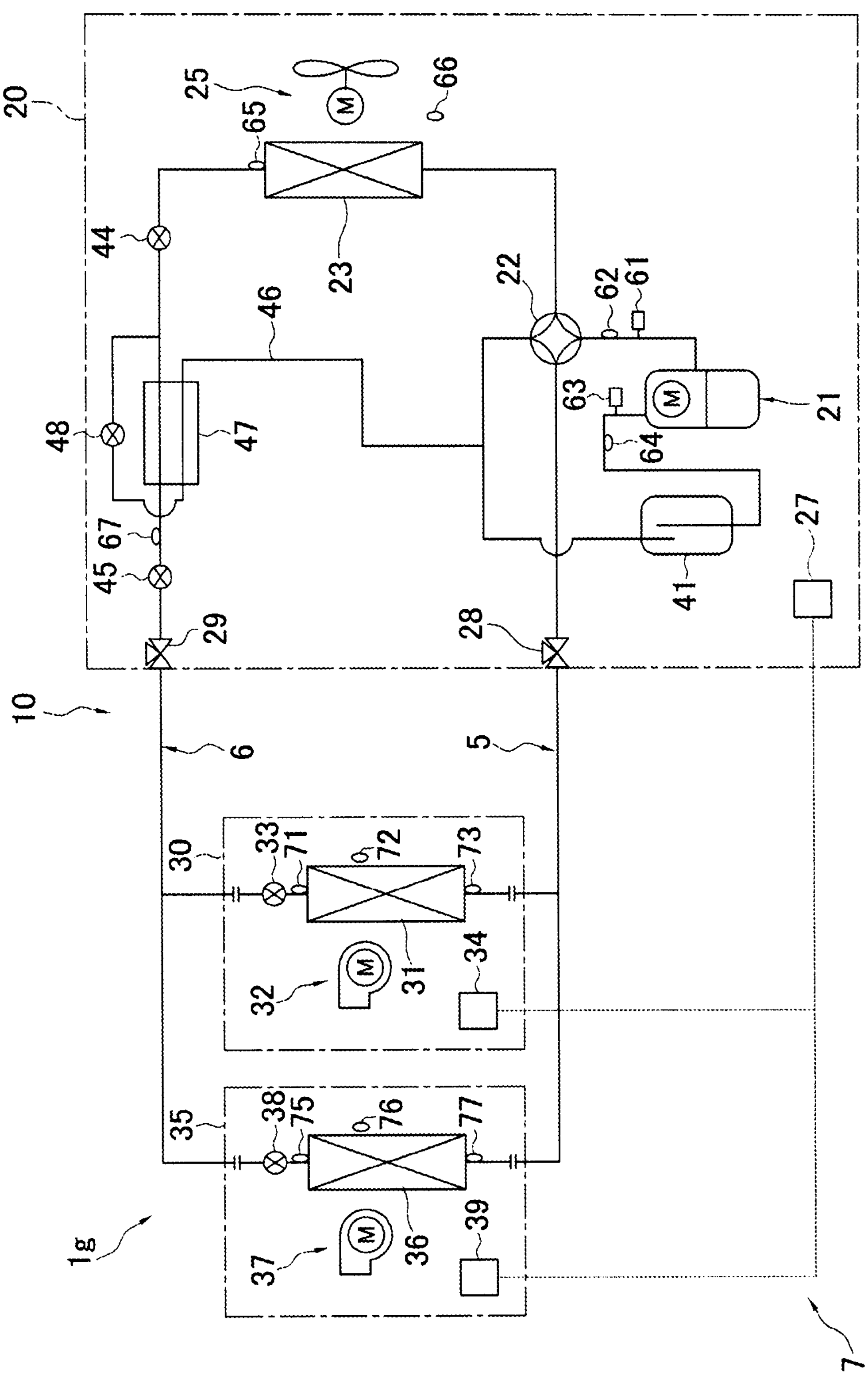
Figure 3P:
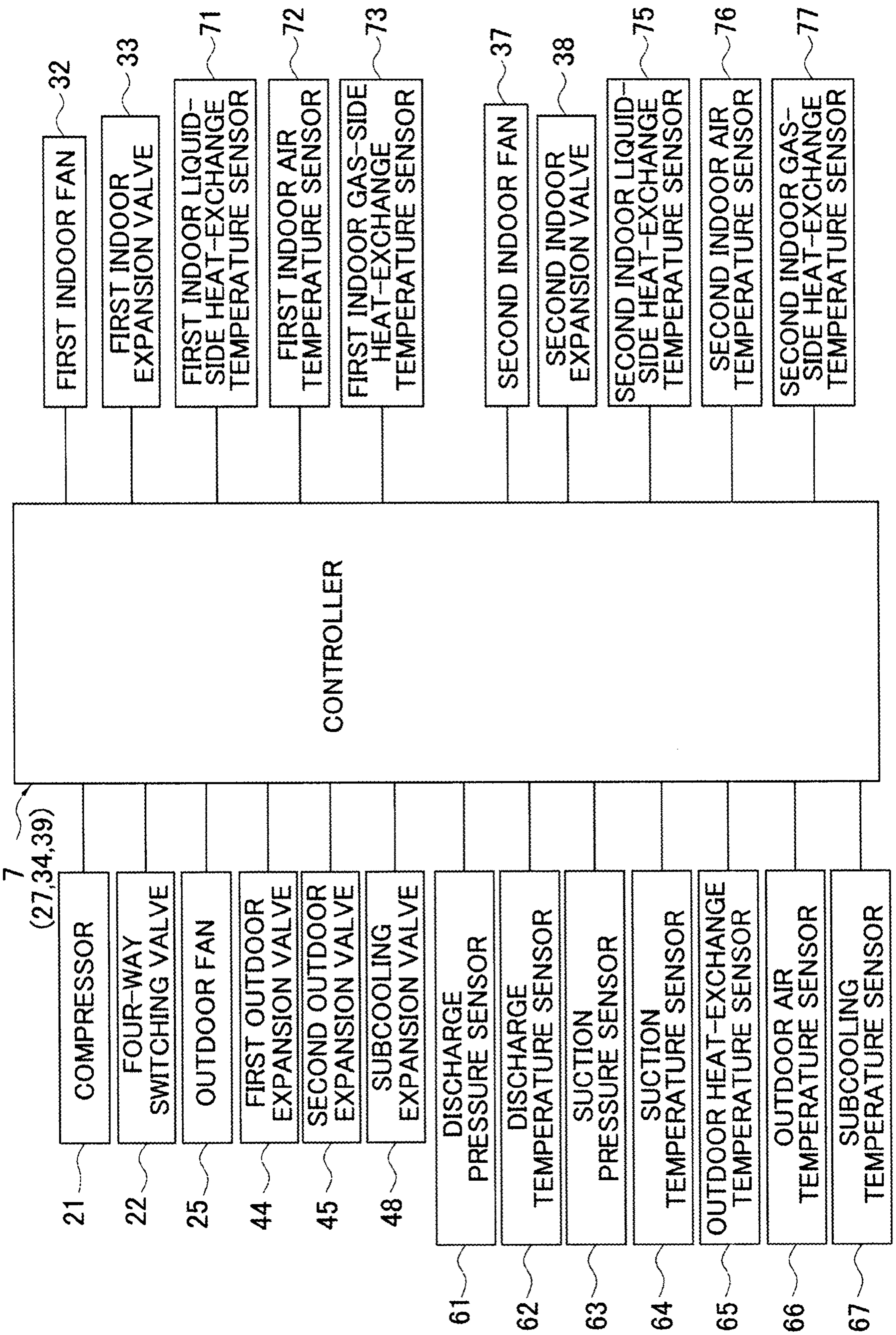
FIG. 3P is a schematic control block configuration diagram of a refrigeration cycle apparatus according to the eighth embodiment of the technique of third group.
Figure 3Q:
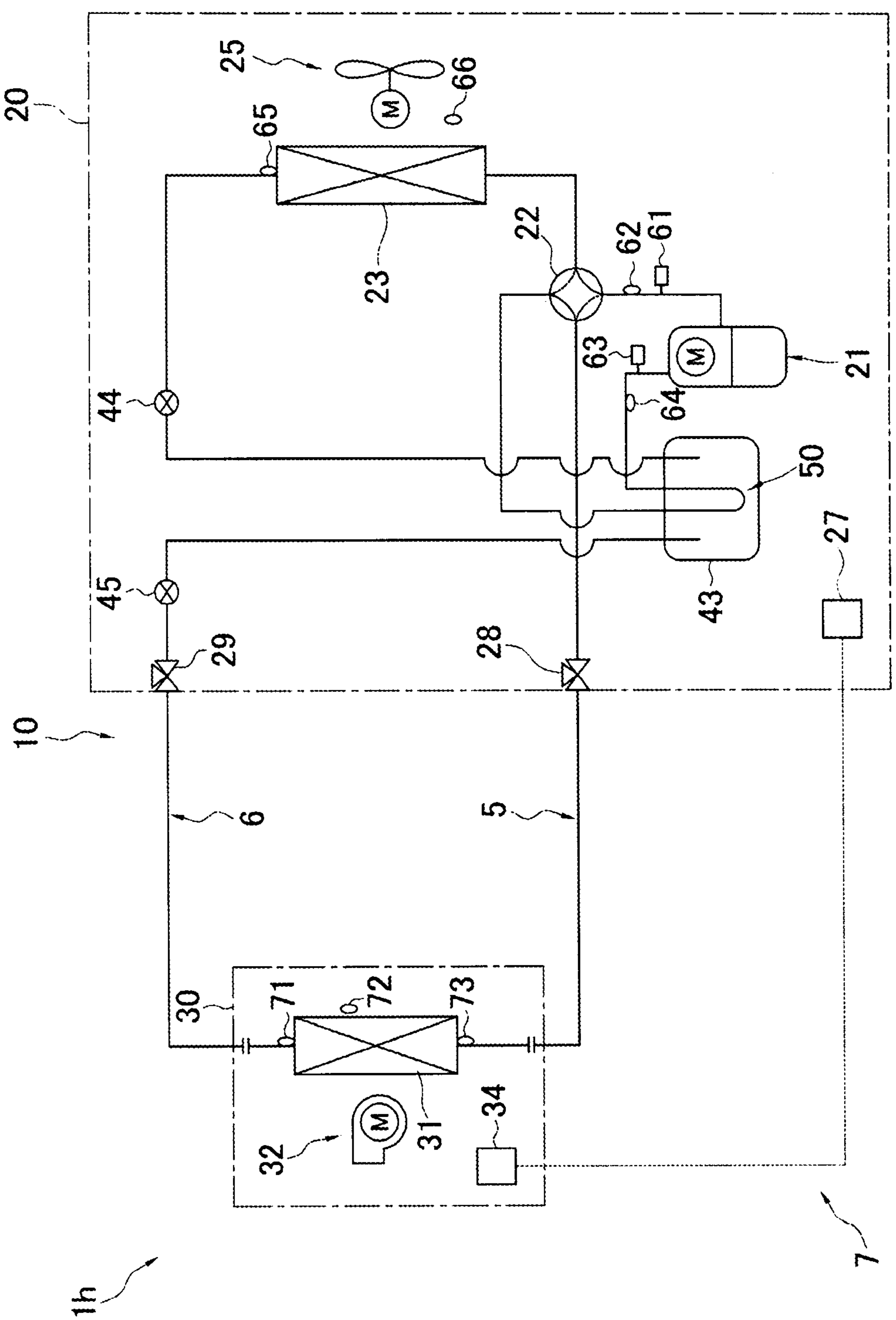
FIG. 3Q is a schematic configuration diagram of a refrigerant circuit according to a ninth embodiment of the technique of third group.
Figure 3R:
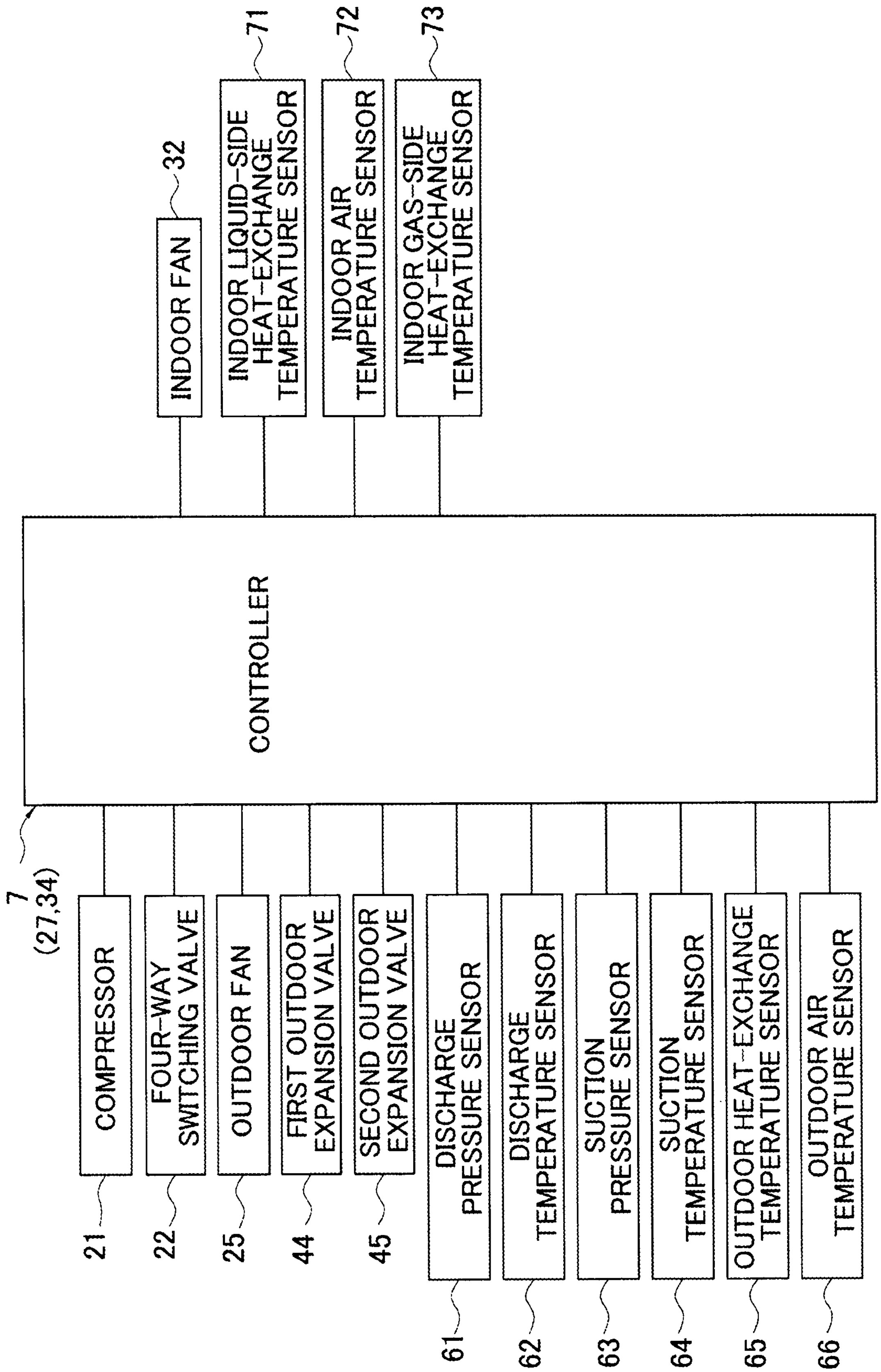
FIG. 3R is a schematic control block configuration diagram of a refrigeration cycle apparatus according to the ninth embodiment of the technique of third group.
Figure 3S:
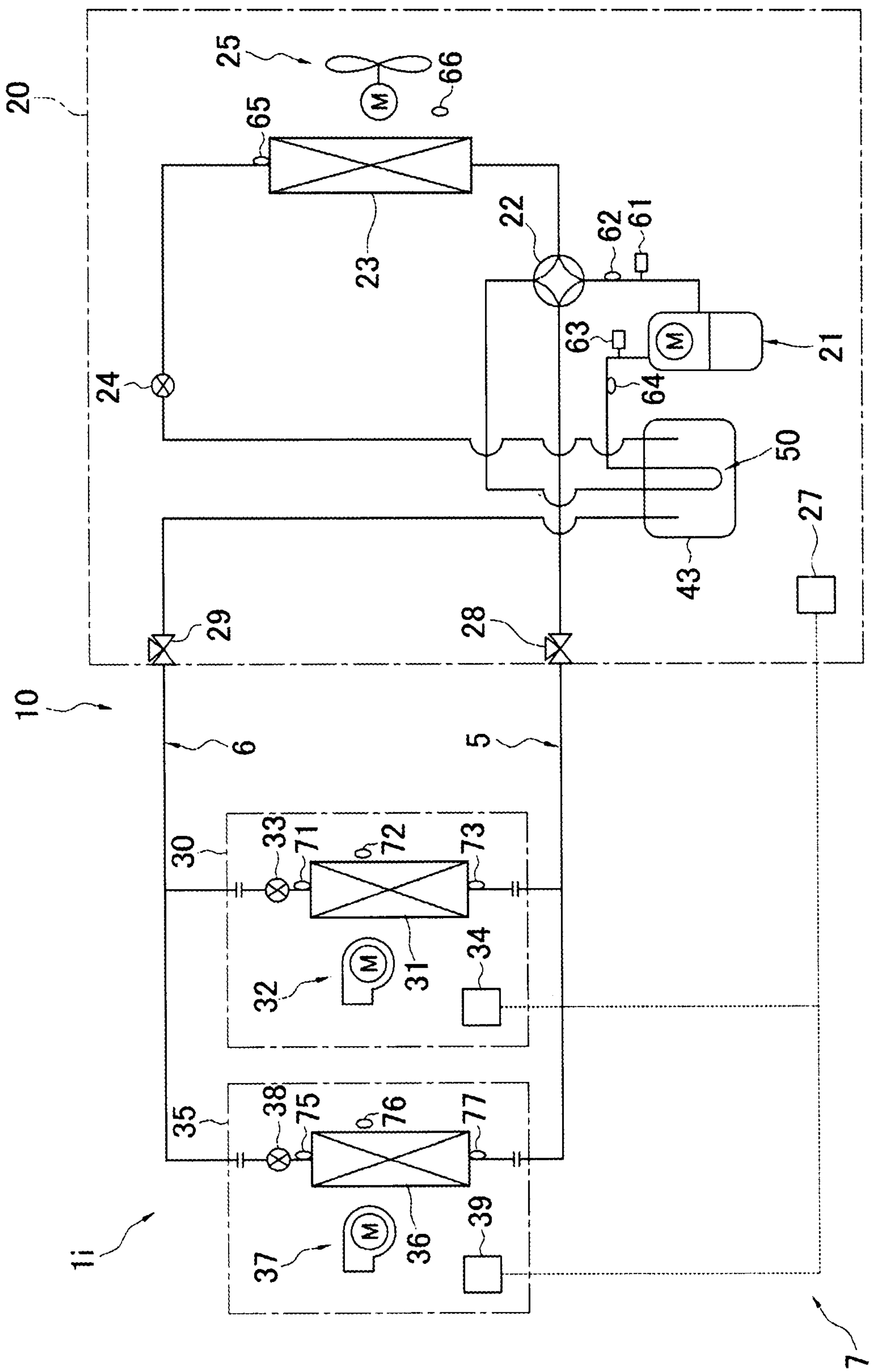
FIG. 3S is a schematic configuration diagram of a refrigerant circuit according to a tenth embodiment of the technique of third group.
Figure 3T:
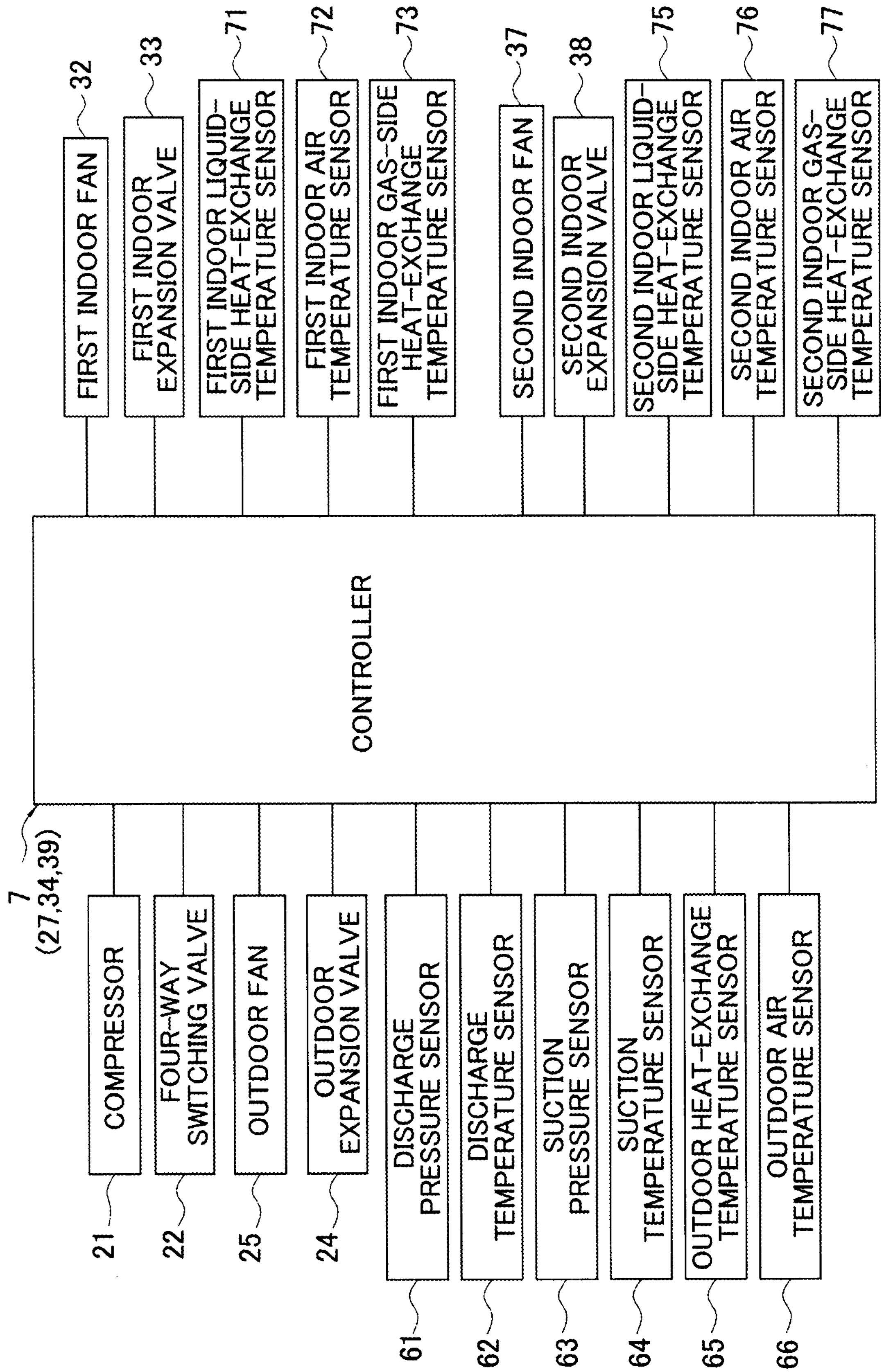
FIG. 3T is a schematic control block configuration diagram of a refrigeration cycle apparatus according to the tenth embodiment of the technique of third group.
Figure 3U:
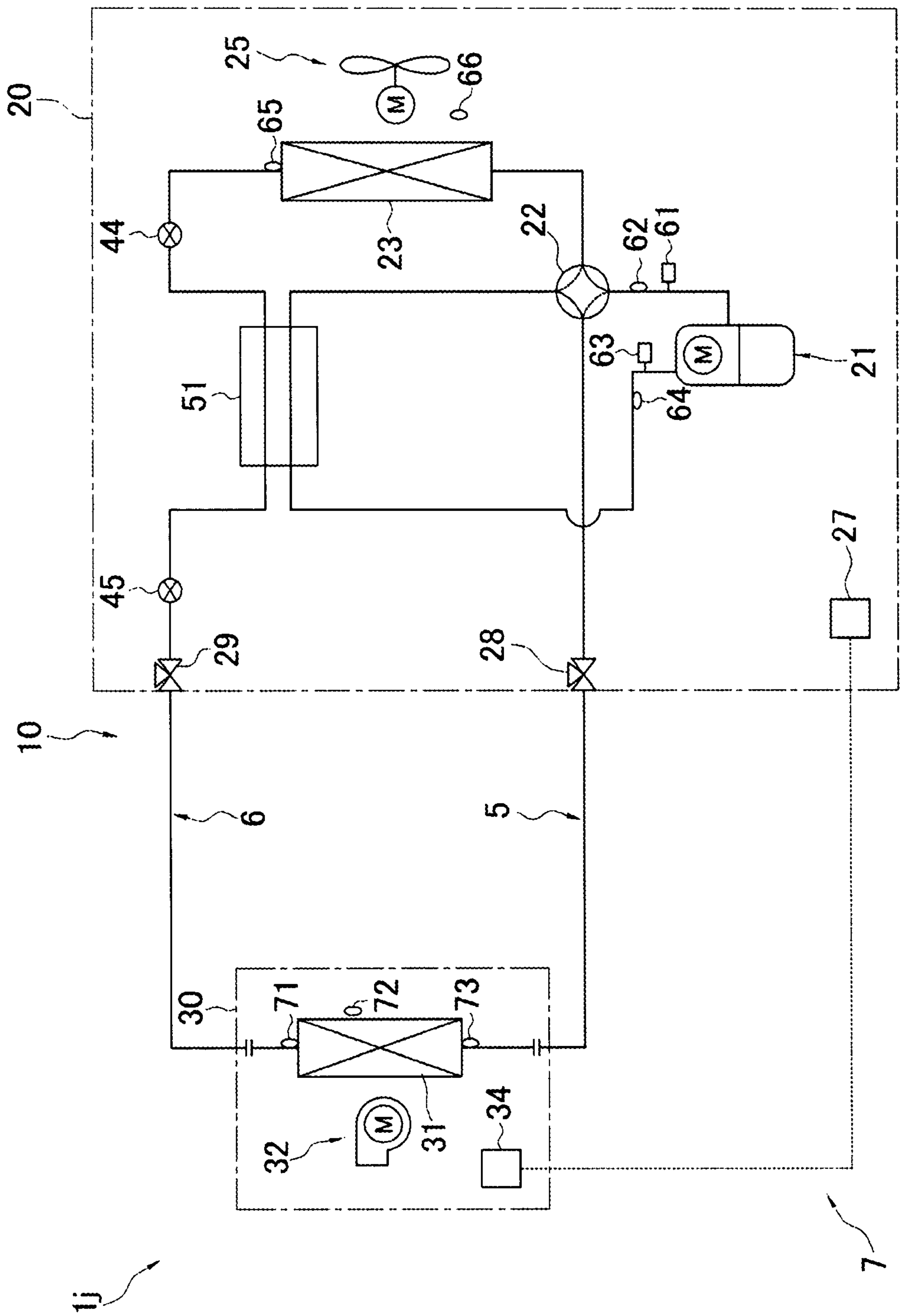
FIG. 3U is a schematic configuration diagram of a refrigerant circuit according to an eleventh embodiment of the technique of third group.
Figure 3V:
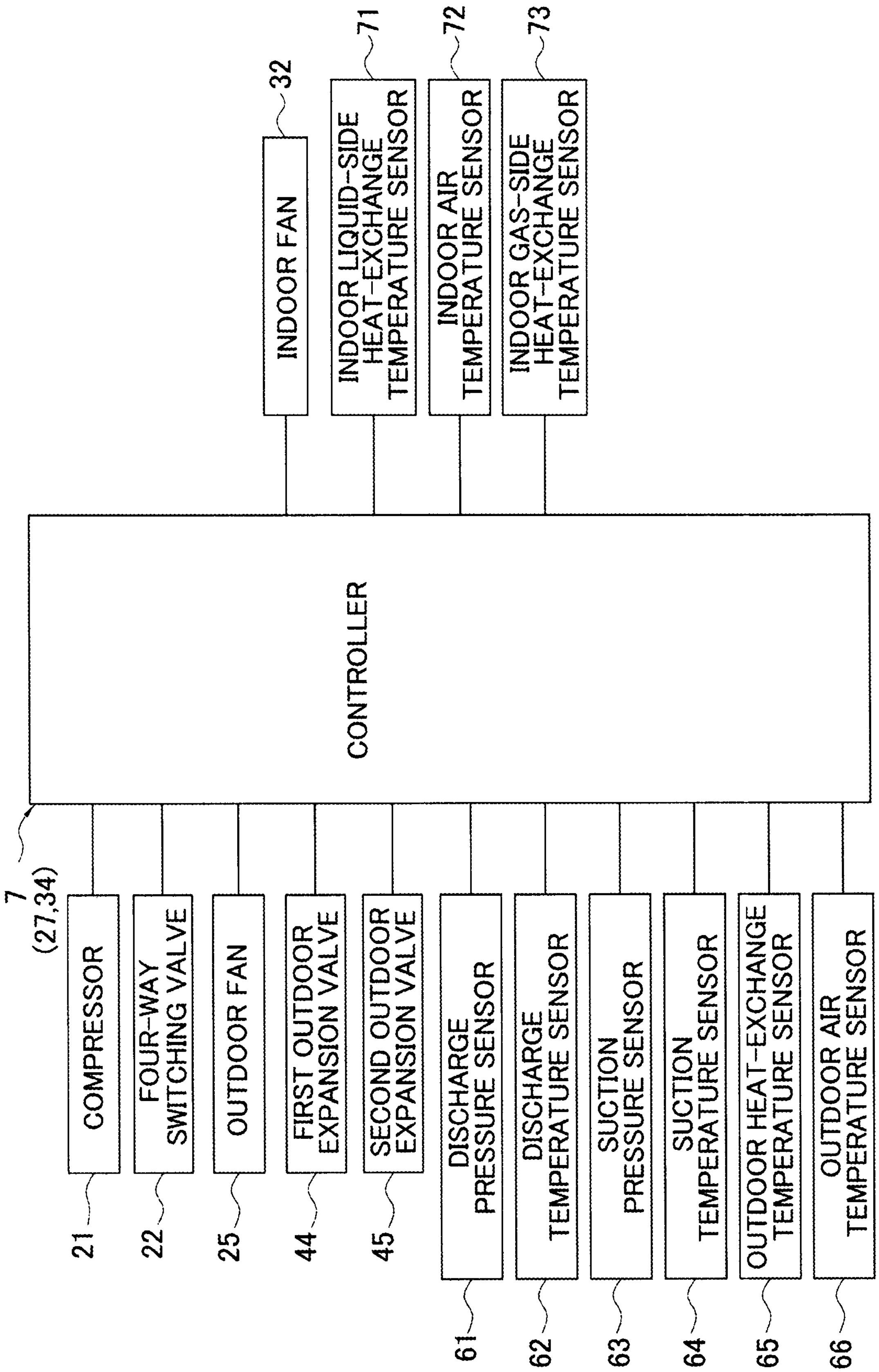
FIG. 3V is a schematic control block configuration diagram of a refrigeration cycle apparatus according to the eleventh embodiment of the technique of third group.
Figure 3W:
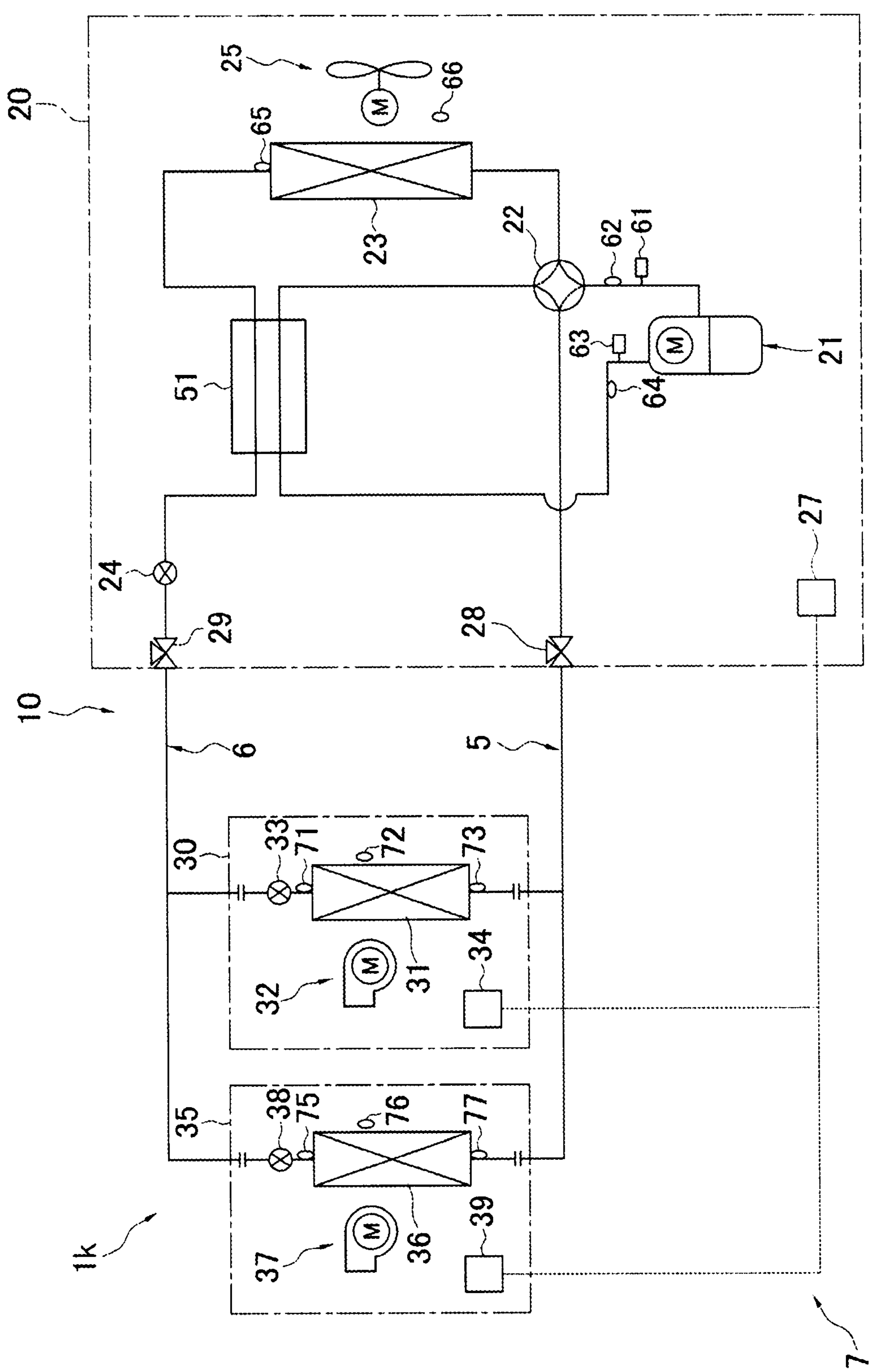
FIG. 3W is a schematic configuration diagram of a refrigerant circuit according to a twelfth embodiment of the technique of third group.
Figure 3X:
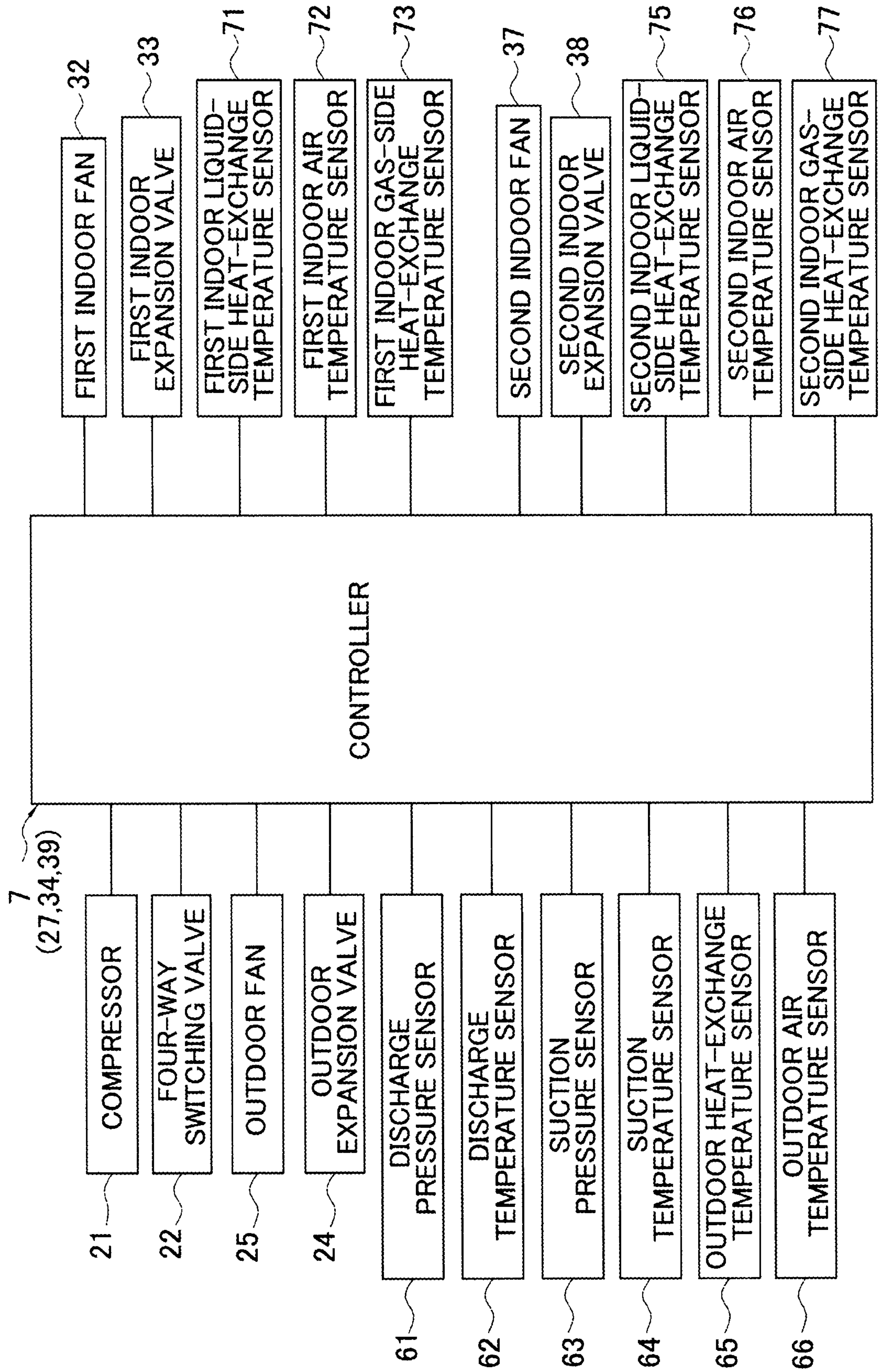
FIG. 3X is a schematic control block configuration diagram of a refrigeration cycle apparatus according to the twelfth embodiment of the technique of third group.

REFERENCE SIGNS LIST (1) Reference Signs of the Technique of First and Third Group of FIG. 3A to 3X

- 1, 1*a* to 1*m* air conditioning apparatus (refrigeration cycle apparatus)
- 7 controller (control unit)
- 10 refrigerant circuit
- 20 outdoor unit
- 21 compressor
- 23 outdoor heat exchanger (condenser, evaporator)
- 24 outdoor expansion valve (decompressing section)
- 25 outdoor fan
- 26 indoor bridge circuit
- 27 outdoor-unit control unit (control unit)
- 30 indoor unit, first indoor unit
- 31 indoor heat exchanger, first indoor heat exchanger (evaporator, condenser)
- 32 indoor fan, first indoor fan
- 33 indoor expansion valve, first indoor expansion valve (decompressing section)
- 34 indoor-unit control unit, first indoor-unit control unit (control unit)
- 35 second indoor unit
- 36 second indoor heat exchanger (evaporator, condenser)
- 37 second indoor fan
- 38 second indoor expansion valve (decompressing section)
- 39 second indoor-unit control unit (control unit)
- 40 bypass pipe
- 41 low-pressure receiver
- 42 high-pressure receiver
- 43 intermediate-pressure receiver
- 44 first outdoor expansion valve (decompressing section, first decompressing section)
- 45 second outdoor expansion valve (decompressing section, second decompressing section)
- 46 subcooling pipe
- 47 subcooling heat exchanger
- 48 subcooling expansion valve
- 49 bypass expansion valve
- 50 suction refrigerant heating section (refrigerant heat exchanging section)
- 51 internal heat exchanger (refrigerant heat exchanging section)

(2) Reference Signs of the Technique of Fourth Group of FIG. 4A to 4X

- 1, 1*a*, 1*b* air-conditioning apparatus (refrigeration cycle apparatus)
- 1*c* cold/hot water supply apparatus (refrigeration cycle apparatus)
- 1*d* hot water storage apparatus (refrigeration cycle apparatus)
- 5 gas-side refrigerant connection pipe (connection pipe)
- 6 liquid-side refrigerant connection pipe (connection pipe)
- 8 outdoor electric component unit (electric component unit)
- 9 indoor electric component unit (electric component unit)
- 9*a* cold/hot-water electric component unit (electric component unit)
- 9*b* hot-water-storage electric component unit (electric component unit)
- 10 refrigerant circuit
- 11 indoor liquid-side connection part, first indoor liquid-side connection part (pipe connection part)
- 12 indoor liquid-side refrigerant pipe, first indoor liquid-side refrigerant pipe
- 13 indoor gas-side connection part, first indoor gas-side connection part (pipe connection part)
- 14 indoor gas-side refrigerant pipe, first indoor gas-side refrigerant pipe
- 15 second indoor liquid-side connection part (pipe connection part)
- 16 second indoor liquid-side refrigerant pipe
- 17 second indoor gas-side connection part (pipe connection part)
- 18 second indoor gas-side refrigerant pipe
- 20, 20*a*, 20*b* outdoor unit (heat exchange unit, heat source-side unit)
- 21 compressor
- 23 outdoor heat exchanger (heat exchanger)
- 24 outdoor expansion valve
- 28 gas-side shutoff valve (pipe connection part)
- 28*a* outdoor gas-side refrigerant pipe
- 29 liquid-side shutoff valve (pipe connection part)
- 29*a* outdoor liquid-side refrigerant pipe
- 30, 30*a* indoor unit, first indoor unit (heat exchange unit, service-side unit)
- 30*b* cold/hot water supply unit (heat exchange unit, service-side unit)
- 30*c* hot water storage unit (heat exchange unit, service-side unit)
- 31 indoor heat exchanger, first indoor heat exchanger (heat exchanger)
- 35 second indoor unit (heat exchange unit, service-side unit)
- 36 second indoor heat exchanger (heat exchanger)
- 44 first outdoor expansion valve
- 45 second outdoor expansion valve
- 50 outdoor housing (housing)
- 54 indoor housing (housing)

60 outdoor housing (housing)
80 outdoor housing (housing)
110 indoor housing (housing)
231 water heat exchanger (heat exchanger)
237 indoor housing (housing)
327 hot water storage housing (housing)
331 water heat exchanger (heat exchanger)

(3) Reference Signs of the Technique of Fifth Group of FIG. 5A to 5I

- 1, 1*a*, 1*b* air conditioning apparatus (refrigeration cycle apparatus)
- 10 refrigerant circuit
- 19 suction tube (suction flow path)
- 20 outdoor unit
- 21, 21*a*, 21*b* compressor
- 23 outdoor heat exchanger (condenser, evaporator)
- 24 outdoor expansion valve (decompressor)
- 30 indoor unit, first indoor unit
- 31 indoor heat exchanger, first indoor heat exchanger (evaporator, condenser)
- 35 second indoor unit
- 36 second indoor heat exchanger (evaporator, condenser)
- 40 suction injection pipe (suction injection flow path, branching flow path)
- 40*a* economizer injection pipe (intermediate injection flow path, branching flow path)
- 42 high-pressure receiver (refrigerant storage tank)
- 46 intermediate injection pipe (intermediate injection flow path)
- 47 subcooling heat exchanger (injection heat exchanger)
- 47*a* economizer heat exchanger (injection heat exchanger)
- 48 subcooling expansion valve (opening degree adjusting valve)
- 48*a* economizer expansion valve (opening degree adjusting valve)
- 82 fixed scroll
- 84 movable scroll (swinging scroll)
- 196 suction tube (suction flow path)
- Sc compression chamber (4) Reference Signs of the Technique of Sixth Group of FIG. 6A to 6F

- 1, 1*a*, 1*b* air conditioner (refrigeration cycle apparatus)
- 5 gas-side connection pipe (connection pipe)
- 6 liquid-side connection pipe (connection pipe)
- 7 controller (control device)
- 10 refrigerant circuit
- 20 outdoor unit (heat source unit)
- 21 compressor
- 27 outdoor unit control unit (control device)
- 23 outdoor heat exchanger (heat source-side heat exchanger)
- 30 indoor unit, first indoor unit (service unit)
- 31 indoor heat exchanger, first indoor heat exchanger (service-side heat exchanger)
- 35 second indoor unit (service unit)
- 36 second indoor heat exchanger (service-side heat exchanger)

(5) Reference Signs of the Technique of Seventh Group of FIG. 7A to 7M

- 20 outdoor unit (air-conditioning unit)
- 21 compressor (device)
- 23 outdoor heat exchanger (heat exchanger, device)
- 25 outdoor fan (fan)
- 25*a* first outdoor fan (fan)
- 25*b* second outdoor fan (fan)
- 50 casing
- 52 air outlet
- 54 drain pan heater (electric heater)
- 60 casing
- 62*a* first air outlet (air outlet)
- 62*b* second air outlet (air outlet)
- 67 crankcase heater (electric heater)
- 70 casing
- 76 air outlet
- 81 IH heater (refrigerant heater, electric heater)

(6) Reference Signs of the Technique of Eighth Group of FIG. 8A to 8F

- 1, 1*a*, and 1*b* air conditioning apparatus (refrigeration cycle apparatus)
- 5 gas-side connection pipe (refrigerant pipe)
- 6 liquid-side connection pipe (refrigerant pipe)
- 10 refrigerant circuit
- 20 outdoor unit (heat source unit)
- 21 compressor
- 23 outdoor heat exchanger (heat-source-side heat exchanger)
- 30 indoor unit, first indoor unit (service unit, first service unit)
- 31 indoor heat exchanger, first indoor heat exchanger (first service-side heat exchanger)
- 35 second indoor unit (second service unit)
- 36 second indoor heat exchanger (second service-side heat exchanger)

(7) Reference Signs of the Technique of Ninth Group of FIG. 9A to 9L

- 1, 1*a*, 1*b* air conditioner (refrigeration cycle apparatus)
- 5 gas-side connection pipe
- 6 liquid-side connection pipe
- 10 refrigerant circuit
- 20 outdoor unit
- 21 compressor
- 23 outdoor heat exchanger (heat source-side heat exchanger)
- 24 outdoor expansion valve (decompression part)
- 30 indoor unit, first indoor unit
- 31 indoor heat exchanger, first indoor heat exchanger (service-side heat exchanger)
- 35 second indoor unit
- 36 second indoor heat exchanger (service-side heat exchanger)
- 44 first outdoor expansion valve (decompression part)
- 45 second outdoor expansion valve (decompression part)

(8) Reference Signs of the Technique of Tenth Group of FIG. 10A to 10G

Figure 11P:
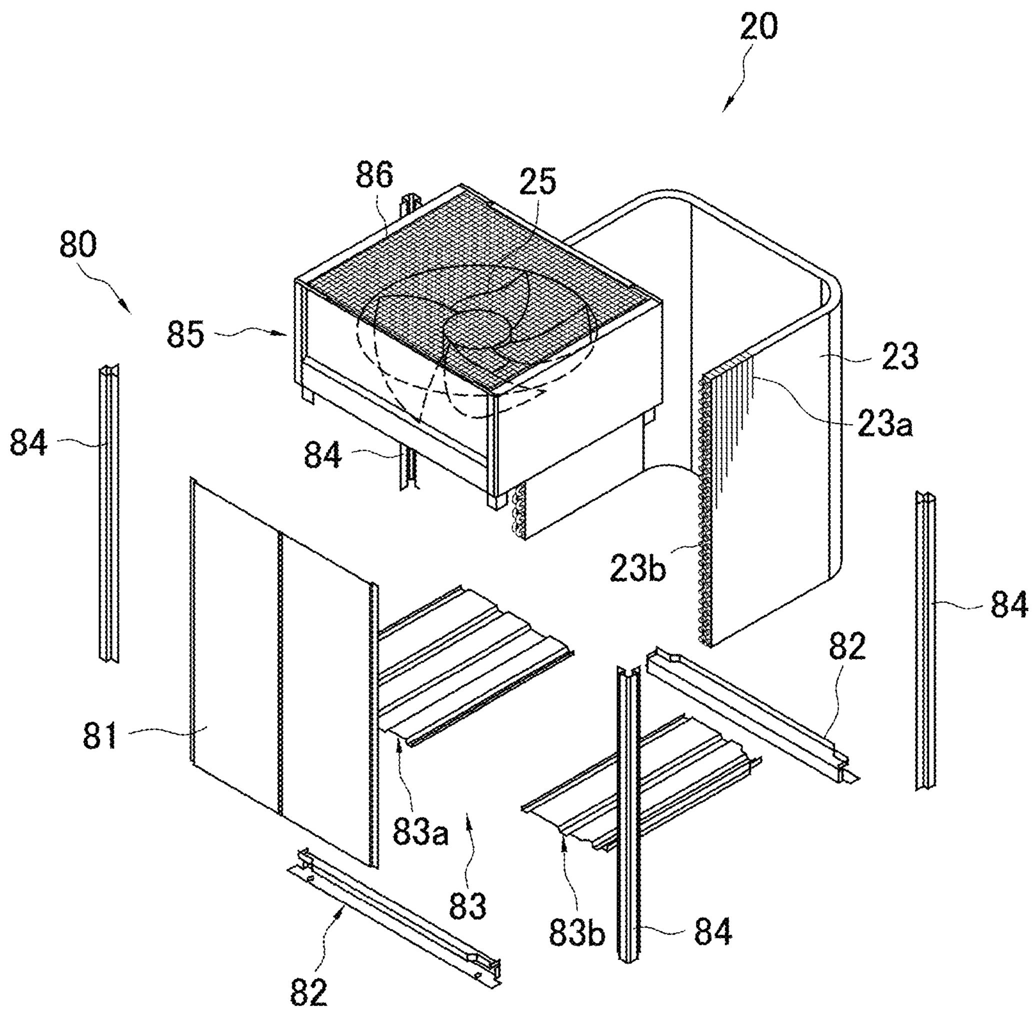

- 71 rotor
- 100 compressor
- 271 rotor
- 300 compressor
- 711 electromagnetic steel plate
- 712 permanent magnet
- 713 magnet accommodation hole (accommodation hole)
- 714 non-magnetic space
- 715 bridge (9) Reference Signs of the Technique of Eleventh Group of FIG. 11A to 11P

- 1, 1*a*, 1*b* air conditioner (refrigeration cycle apparatus)
- 10 refrigerant circuit
- 20 outdoor unit
- 21 compressor
- 23 outdoor heat exchanger (heat source-side heat exchanger)
- 23*a* fin
- 23*b* heat transfer tube

24 outdoor expansion valve (decompression part)
30 indoor unit, first indoor unit
31 indoor heat exchanger, first indoor heat exchanger (service-side heat exchanger)
31*a* fin
31*b* heat transfer tube
35 second indoor unit
36 second indoor heat exchanger (service-side heat exchanger)
36*a* fin
36*b* heat transfer tube
44 first outdoor expansion valve (decompression part)
45 second outdoor expansion valve (decompression part)

(10) Reference Signs of the Technique of Twelfth Group of FIG. 12A to 12H

11 refrigerant circuit
60 compression unit
70 induction motor
71 rotor
72 stator
100 compressor
260 compression unit
270 induction motor
271 rotor
272 stator
300 compressor
716 conducting bar
717 end ring
717*a* heat sink (heat-radiation structure)
717*af* heat-radiation fin (heat-radiation structure)
110 branch circuit (cooling structure)
111 cooling portion (cooling structure)
112 second expansion valve (cooling structure)
113 third expansion valve (cooling structure)

(11) Reference Signs of the Technique of Thirteenth Group of FIG. 13A to 13K

1: air conditioner
21: rectifier circuit
22: capacitor
25: inverter
27: converter
30: power conversion device
30B: indirect matrix converter (power conversion device)
30C: matrix converter (power conversion device)
70: motor
71: rotor
100: compressor
130: power conversion device
130B: indirect matrix converter (power conversion device)
130C: matrix converter (power conversion device)

(12) Reference Signs of the Technique of Fourteenth Group of FIG. 14A to 14C

1: air conditioner
20: activation circuit
21: positive temperature coefficient thermistor
22: operation capacitor
30: connection unit
70: motor
90: single-phase AC power source
100: compressor
130: connection unit
170: motor
190: three-phase AC power source
200: compressor

(13) Reference Signs of the Technique of Fifteenth Group of FIG. 15A to 15N

1 warm-water supply system (warm-water generating apparatus)
1*a* warm-water supply system (warm-water generating apparatus)
1*b* warm-water supply system (warm-water generating apparatus)
21 compressor
22 water heat exchanger (second heat exchanger)
23 expansion valve (expansion mechanism)
24 air heat exchanger (first heat exchanger)
30 circulating water pipe (circulation flow path; second circulation flow path)
30*b* circulating water pipe (first circulation flow path)
35 warm-water storage tank (tank)
38 heat exchange section (part of first circulation flow path)
60 auxiliary circulating water pipe (first circulation flow path)
62 auxiliary water heat exchanger (third heat exchanger)
110 water circulation pipe (second circulation flow path)
112 water heat exchanger (third heat exchanger)
118 flow path (third flow path)
211 compressor
212 radiator (second heat exchanger)
213 expansion valve (expansion mechanism)
214 evaporator (second heat exchanger)
231 pipe (first circulation flow path)
240 tank
241 flow path (second flow path)
241*a* warm-water supply heat exchanger (part of second flow path)
320 water receiving tank (water supply source)
312 water supply line (flow path)
314 warm-water exit line (flow path)
331 water flow path (flow path)
333 second heat exchanger
335 compressor
336 expansion valve (expansion mechanism)
337 first heat exchanger
340 warm-water storage tank (tank)

(14) Reference Signs of the Technique of Sixteenth Group of FIG. 16A to 16I

10 air conditioning apparatus (example of refrigeration cycle apparatus)
16 flat tube (example of heat transfer tube)
16*a*, 193*b* flat surface portion
19 metal plate (example of fin)
23, 125 outdoor heat exchanger (example of evaporator, and example of condenser)
27 indoor heat exchanger (example of evaporator, example of condenser)
193 flat perforated tube (example of heat transfer tube, example of flat tube)
194 insertion fin
194*a* cutout
201 inner-surface grooved tube (example of heat transfer tube)
211 plate fin
211*a* through hole

(15) Reference Signs of the Technique of Seventeenth Group of FIG. 17A to 17O

1, 601, 701 air conditioning apparatus
2 indoor unit (example of use-side unit)
3 outdoor unit (example of heat-source-side unit)
209, 721 first duct
210, 722 second duct
230, 621, 730 casing

242 indoor heat exchanger (example of use-side heat exchanger)
321, 633, 741 compressor
323, 634 outdoor heat exchanger (example of heat-source-side heat exchanger)
602 use-side unit
603 heat-source-side unit
625 air supply heat exchanger (example of use-side heat exchanger)
651 air supply duct (example of first duct)
653 suction duct (example of third duct)
739 partition plate
743 heat-source-side heat exchanger
745 use-side heat exchanger

(16) Reference Signs of the Technique of Eighteenth Group of FIG. 18A to 18D
1 compressor
2 use-side heat exchanger
3 heat-source-side heat exchanger
4 first capillary tube (expansion mechanism)
7 second capillary tube (decompression mechanism)
21 third heat exchange section
22 fourth heat exchange section
31 first heat exchange section
32 second heat exchange section
41 third capillary tube (expansion mechanism)
42 fourth capillary tube (expansion mechanism)
60 use unit

(17) Reference Signs of the Technique of Nineteenth Group of FIG. 19A to 19E
1: air conditioner
10: refrigerant circuit
20: refrigerant jacket
20A: heat pipe
30: electric circuit
31: printed circuit board
32: spacer
33: power device
40: switch box
50: heat transfer plate
X: left-end vertical portion
Y: inclined portion
Z: right-end vertical portion

(18) Reference Signs of the Technique of Twentieth Group of FIG. 20A to 20D
1 compressor
3 outdoor heat exchanger
4 expansion valve
5 first indoor heat exchanger
6 electromagnetic valve for dehumidification
7 second indoor heat exchanger
10 air conditioner

(19) Reference Signs of the Technique of Twenty-First Group of FIG. 21A to 21F
1 air conditioner
2 indoor unit
3 outdoor unit
10 compressor
12 outdoor heat exchanger (example of second heat exchanger)
13 expansion valve (example of decompressor)
14 indoor heat exchanger (example of first heat exchanger)
16 indoor fan
20 auxiliary heat exchanger (example of first heat exchanger)
21 main heat exchanger
50 refrigerant circuit

(20) Reference Signs of the Technique of Twenty-Second Group of FIG. 22A to 22J
10 refrigeration cycle apparatus
11, 110 refrigerant circuit
12, 122 compressor
13, 123 heat source-side heat exchanger
14 expansion mechanism
15 usage-side heat exchanger
100, 100*a* air conditioning apparatus (refrigeration cycle apparatus)
124 heat source-side expansion mechanism (expansion mechanism)
131 usage-side heat exchanger, first usage-side heat exchanger (usage-side heat exchanger)
133 usage-side expansion mechanism, first usage-side expansion mechanism (expansion mechanism)
136 second usage-side heat exchanger (usage-side heat exchanger)
138 second usage-side expansion mechanism (expansion mechanism)

(21) Reference Signs of the Technique of Twenty-Third Group of FIG. 23A to 23D
1 air-conditioning apparatus (refrigeration cycle apparatus)
5 gas-side refrigerant connection pipe
6 liquid-side refrigerant connection pipe
10 refrigerant circuit
20 outdoor unit
21 compressor
23 outdoor heat exchanger (heat source-side heat exchanger)
24 outdoor expansion valve (decompression part)
30 indoor unit
31 indoor heat exchanger (use-side heat exchanger)

(22) Reference Signs of the Technique of Twenty-Fourth Group of FIG. 24A to 24I
1 main refrigerant circuit (refrigerant supply apparatus)
9 thermal storage tank
10 thermal storage heat exchanger
20 thermal storage device
W water (thermal storage medium)

(23) Reference Signs of the Technique of Twenty-Fifth Group of FIG. 25A to 25E
11 compressor (first compressor)
14 heat-source-side heat exchanger (first radiator)
31 expansion valve (first expansion mechanism)
33 heat exchanger
60 use-side unit (second heat absorber)
100 heat load treatment system (refrigeration apparatus)
500 two-stage refrigeration apparatus (refrigeration apparatus)
510 first cycle
511 first compressor
512 first condenser (first radiator)
513 first expansion valve (first expansion mechanism)
514 first evaporator (first heat absorber)
520 second cycle
521 second compressor
523 second downstream-side condenser (second radiator)
524 second upstream-side expansion valve (second expansion mechanism)
526 second downstream-side expansion valve (second expansion mechanism)
527 second evaporator (second heat absorber)
531 cascade condenser (heat exchanger)
HC heat medium circuit (second cycle)
HP heat medium path in heat exchanger (second radiator)
RC refrigerant circuit (first cycle)

RP refrigerant path in heat exchanger (first heat absorber)
600 air-conditioning hot water supply system (refrigeration apparatus)
611 compressor (first compressor)
612 outdoor heat exchanger (first heat absorber)
613 expansion valve (first expansion mechanism)
615 air-conditioning refrigerant circuit (first cycle)
621 compressor (second compressor)
**622*b*** heat radiating unit (second radiator)
623 expansion valve (second expansion mechanism)
624 second heat exchanger (heat exchanger)
**624*a*** heat absorbing unit (second heat absorber)
**624*b*** heat radiating unit (first radiator)
625 hot-water-supply refrigerant circuit (second cycle)

CITATION LIST

Patent Literature

PTL 1: International Publication No. 2015/141678

The invention claimed is:

1. A refrigeration cycle apparatus comprising:

a refrigerant circuit including a compressor, a condenser, a decompressing section, and an evaporator; and a refrigerant enclosed in the refrigerant circuit, wherein the refrigerant comprises trans-1,2-difluoroethylene (HFO-1132 (E)), trifluoroethylene (HFO-1123), 2,3,3,3-tetrafluoro-1-propene (R1234yf), and difluoromethane (R32).

2. The refrigeration cycle apparatus according to claim 1, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments OD, DG, GH, and HO that connect the following 4 points:

point D (87.6, 0.0, 12.4),
point G (18.2, 55.1, 26.7),
point H (56.7, 43.3, 0.0), and
point O (100.0, 0.0, 0.0), or on the line segments OD, DG, and GH (excluding the points O and H);

the line segment DG is represented by coordinates ($0.0047y^2-1.5177y+87.598$, y, $-0.0047y^2+0.5177y+12.402$), the line segment GH is represented by coordinates ($-0.0134z^2-1.0825z+56.692$, $0.0134z^2+0.0825z+43.308$, z), and the line segments HO and OD are straight lines.

3. The refrigeration cycle apparatus according to claim 1, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments LG, GH, HI, and IL that connect the following 4 points:

point L (72.5, 10.2, 17.3),
point G (18.2, 55.1, 26.7),
point H (56.7, 43.3, 0.0), and
point I (72.5, 27.5, 0.0), or on the line segments LG, GH, and IL (excluding the points H and I);

the line segment LG is represented by coordinates ($0.0047y^2-1.5177y+87.598$, y, $-0.0047y^2+0.5177y+12.402$), the line segment GH is represented by coordinates ($-0.0134z^2-1.0825z+56.692$, $0.0134z^2+0.0825z+43.308$, z), and the line segments HI and IL are straight lines.

4. The refrigeration cycle apparatus according to claim 1, wherein when the mass % of HFO-1132(E), HFO-1123, R1234yf, and R32 based on their sum in the refrigerant is respectively represented by x, y, z, and a, if $0<a\leq 10.0$, coordinates (x,y,z) in a ternary composition diagram in which the sum of HFO-1132(E), HFO-1123, and R1234yf is 100 mass % are within the range of a figure surrounded by straight lines that connect the following 4 points:

point A ($0.02a^2-2.46a+93.4$, 0, $-0.02a^2+2.46a+6.6$),
point B' ($-0.008a^2-1.38a+56$, $0.018a^2-0.53a+26.3$, $-0.01a^2+1.91a+17.7$),
point C ($-0.016a^2+1.02a+77.6$, $0.016a^2-1.02a+22.4$, 0), and
point O (100.0, 0.0, 0.0), or on the straight lines OA, AB', and B'C (excluding point O and point C);

if $10.0<a\leq 16.5$, coordinates (x,y,z) in the ternary composition diagram are within the range of a figure surrounded by straight lines that connect the following 4 points:

point A ($0.0244a^2-2.5695a+94.056$, 0, $-0.0244a^2+2.5695a+5.944$),
point B' ($0.1161a^2-1.9959a+59.749$, $0.014a^2-0.3399a+24.8$, $-0.1301a^2+2.3358a+15.451$),
point C ($-0.0161a^2+1.02a+77.6$, $0.0161a^2-1.02a+22.4$, 0), and
point O (100.0, 0.0, 0.0), or on the straight lines OA, AB', and B'C (excluding point O and point C); or if $16.5<a\leq 21.8$, coordinates (x,y,z) in the ternary composition diagram are within the range of a figure surrounded by straight lines that connect the following 4 points:

point A ($0.0161a^2-2.3535a+92.742$, 0, $-0.0161a^2+2.3535a+7.258$),
point B' ($-0.0435a^2-0.0435a+50.406$, $-0.0304a^2+1.8991a-0.0661$, $0.0739a^2-1.8556a+49.6601$),
point C ($-0.0161a^2+0.9959a+77.851$, $0.0161a^2-0.9959a+22.149$, 0), and
point O (100.0, 0.0, 0.0), or on the straight lines OA, AB', and B'C (excluding point O and point C).

5. The refrigeration cycle apparatus according to claim 1, the refrigerant comprising trans-1,2-difluoroethylene (HFO-1132 (E)), trifluoroethylene (HFO-1123) in a total amount of 99.5 mass % or more based on the entire refrigerant, and the refrigerant comprising 62.5 mass % to 72.5 mass % of HFO-1132(E) based on the entire refrigerant.

6. The refrigeration cycle apparatus according to claim 1, wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments AC, CF, FD, and DA that connect the following 4 points:

point A (71.1, 0.0, 28.9),
point C (36.5, 18.2, 45.3),
point F (47.6, 18.3, 34.1), and
point D (72.0, 0.0, 28.0), or on these line segments;

the line segment AC is represented by coordinates $(0.0181y^2-2.2288y+71.096, y, -0.0181y^2+1.2288y+28.904)$, the line segment FD is represented by coordinates $(0.02y^2-1.7y+72, y, -0.02y^2+0.7y+28)$, and the line segments CF and DA are straight lines.

7. The refrigeration cycle apparatus according to claim 1, wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments AB, BE, ED, and DA that connect the following 4 points:

point A (71.1, 0.0, 28.9),
point B (42.6, 14.5, 42.9),
point E (51.4, 14.6, 34.0), and
point D (72.0, 0.0, 28.0), or on these line segments;

the line segment AB is represented by coordinates $(0.0181y^2-2.2288y+71.096, y, -0.0181y^2+1.2288y+28.904)$, the line segment ED is represented by coordinates $(0.02y^2-1.7y+72, y, -0.02y^2+0.7y+28)$, and the line segments BE and DA are straight lines.

8. The refrigeration cycle apparatus according to claim 1, wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments GI, IJ, and JG that connect the following 3 points:

point G (77.5, 6.9, 15.6),
point I (55.1, 18.3, 26.6), and
point J (77.5, 18.4, 4.1), or on these line segments;

the line segment GI is represented by coordinates $(0.02y^2-2.4583y+93.396, y, -0.02y^2+1.4583y+6.604)$, and the line segments IJ and JG are straight lines.

9. The refrigeration cycle apparatus according to claim 1, wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments GH, HK, and KG that connect the following 3 points:

point G (77.5, 6.9, 15.6),
point H (61.8, 14.6, 23.6), and
point K (77.5, 14.6, 7.9), or on these line segments;

the line segment GH is represented by coordinates $(0.02y^2-2.4583y+93.396, y, -0.02y^2+1.4583y+6.604)$, and the line segments HK and KG are straight lines.

10. The refrigeration cycle apparatus according to claim 1, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments OC', C'D', D'E', E'A', and A'O that connect the following 5 points:

point O (100.0, 0.0, 0.0),
point C' (56.7, 43.3, 0.0),
point D' (52.2, 38.3, 9.5),
point E' (41.8, 39.8, 18.4), and
point A' (81.6, 0.0, 18.4), or on the line segments C'D', D'E', and E'A' (excluding the points C' and A');

the line segment C'D' is represented by coordinates $(-0.0297z^2-0.1915z+56.7, 0.0297z^2+1.1915z+43.3, z)$, the line segment D'E' is represented by coordinates $(-0.0535z^2+0.3229z+53.957, 0.0535z^2+0.6771z+46.043, z)$, and the line segments OC', E'A', and A'O are straight lines.

11. The refrigeration cycle apparatus according to claim 1, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments OC, CD, DE, EA', and A'O that connect the following 5 points:

point O (100.0, 0.0, 0.0),
point C (77.7, 22.3, 0.0),
point D (76.3, 14.2, 9.5),
point E (72.2, 9.4, 18.4), and
point A' (81.6, 0.0, 18.4), or on the line segments CD, DE, and EA' (excluding the points C and A');

the line segment CDE is represented by coordinates $(-0.017z^2+0.0148z+77.684, 0.017z^2+0.9852z+22.316, z)$, and the line segments OC, EA', and A'O are straight lines.

12. The refrigeration cycle apparatus according to claim 1, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments OC', C'D', D'A, and AO that connect the following points:

point O (100.0, 0.0, 0.0),
point C' (56.7, 43.3, 0.0),
point D' (52.2, 38.3, 9.5), and
point A (90.5, 0.0, 9.5), or on the line segments C'D' and D'A (excluding the points C' and A);

the line segment C'D' is represented by coordinates $(-0.0297z^2-0.1915z+56.7,\ 0.0297z^2+1.1915z+43.3,\ z)$, and the line segments OC', D'A, and AO are straight lines.

13. The refrigeration cycle apparatus according to claim 1, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments OC, CD, DA, and AO that connect the following points:

point O (100.0, 0.0, 0.0),
point C (77.7, 22.3, 0.0),
point D (76.3, 14.2, 9.5), and
point A (90.5, 0.0, 9.5), or on the line segments CD and DA (excluding the points C and A);

the line segment CD is represented by coordinates $(-0.017z^2+0.0148z+77.684,\ 0.017z^2+0.9852z+22.316,\ z)$, and the line segments OC, DA, and AO are straight lines.

* * * * *